US008645228B2

(12) United States Patent
Moussa et al.

(10) Patent No.: US 8,645,228 B2
(45) Date of Patent: Feb. 4, 2014

(54) MANAGING CONSISTENT INTERFACES FOR BUSINESS OBJECTS ACROSS HETEROGENEOUS SYSTEMS

(75) Inventors: Ahmed Daddi Moussa, Edingen-Neckarhausen (DE); Oliver Dannat, Walldorf (DE); Ruediger Fritz, Karlsruhe (DE); Thomas Roesch, Sandhausen (DE); Torsten Schmitt, Munich (DE); Andreas Schoknecht, Linkenheim-Hochstetten (DE); Michael Schweitzer, Leimen (DE)

(73) Assignee: SAP AG, Walldorf (DE)

( * ) Notice: Subject to any disclaimer, the term of this patent is extended or adjusted under 35 U.S.C. 154(b) by 1128 days.

(21) Appl. No.: 12/147,449

(22) Filed: Jun. 26, 2008

(65) Prior Publication Data

US 2009/0327105 A1 Dec. 31, 2009

(51) Int. Cl.
*G06F 17/50* (2006.01)

(52) U.S. Cl.
USPC .......................................................... 705/27

(58) Field of Classification Search
USPC .......................................................... 705/29
See application file for complete search history.

(56) References Cited

U.S. PATENT DOCUMENTS

| | | | |
|---|---|---|---|
| 3,223,321 | A | 12/1965 | Baumgartner |
| 5,210,686 | A | 5/1993 | Jernigan |
| 5,247,575 | A | 9/1993 | Sprague et al. |
| 5,255,181 | A | 10/1993 | Chapman et al. |
| 5,321,605 | A | 6/1994 | Chapman et al. |
| 5,787,237 | A | 7/1998 | Reilly |
| 5,812,987 | A | 9/1998 | Luskin et al. |
| 5,966,695 | A | 10/1999 | Melchione et al. |
| 5,970,465 | A | 10/1999 | Dietrich et al. |
| 5,970,475 | A | 10/1999 | Barnes et al. |
| 5,983,284 | A | 11/1999 | Argade |
| 6,047,264 | A | 4/2000 | Fisher et al. |
| 6,073,137 | A | 6/2000 | Brown et al. |
| 6,092,196 | A | 7/2000 | Reiche |
| 6,104,393 | A | 8/2000 | Santos-Gomez |
| 6,115,690 | A | 9/2000 | Wong |
| 6,125,391 | A | 9/2000 | Meltzer et al. |
| 6,138,118 | A | 10/2000 | Koppstein et al. |
| 6,154,732 | A | 11/2000 | Tarbox |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

Newton's Telecom Dictionary; 18th Edition; 2002; pp. 347, 454.

(Continued)

*Primary Examiner* — Matthew S Gart
*Assistant Examiner* — Russell S Glass
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction. In some operations, software creates, updates, or otherwise processes information related to a freight order, a maintenance plan, a maintenance task list, a request for supplier freight quote, and/or a supplier freight quote business object.

8 Claims, 1122 Drawing Sheets

(56) References Cited

U.S. PATENT DOCUMENTS

| | | | | |
|---|---|---|---|---|
| 6,222,533 | B1 | 4/2001 | Notani et al. | |
| 6,226,675 | B1 | 5/2001 | Meltzer et al. | |
| 6,229,551 | B1 | 5/2001 | Huang | |
| 6,331,972 | B1 | 12/2001 | Harris et al. | |
| 6,332,163 | B1 | 12/2001 | Bowman-Amuah | |
| 6,424,979 | B1 | 7/2002 | Livingston et al. | |
| 6,434,159 | B1 | 8/2002 | Woodward et al. | |
| 6,438,594 | B1 | 8/2002 | Bowman-Amuah | |
| 6,542,912 | B2 | 4/2003 | Meltzer et al. | |
| 6,591,260 | B1 | 7/2003 | Schwarzhoff et al. | |
| 6,738,747 | B1 | 5/2004 | Tanaka et al. | |
| 6,745,229 | B1 | 6/2004 | Gobin et al. | |
| 6,763,353 | B2 | 7/2004 | Li et al. | |
| 6,775,647 | B1 | 8/2004 | Evans et al. | |
| 6,868,370 | B1 | 3/2005 | Burbridge et al. | |
| 6,937,992 | B1 | 8/2005 | Benda et al. | |
| 6,970,844 | B1 | 11/2005 | Bierenbaum | |
| 7,039,606 | B2 * | 5/2006 | Hoffman et al. | 705/80 |
| 7,076,449 | B2 | 7/2006 | Tsunenari et al. | |
| 7,131,069 | B1 | 10/2006 | Rush et al. | |
| 7,206,768 | B1 | 4/2007 | deGroeve et al. | |
| 7,249,157 | B2 | 7/2007 | Stewart et al. | |
| 7,269,569 | B2 | 9/2007 | Spira et al. | |
| 7,292,965 | B1 | 11/2007 | Mehta et al. | |
| 7,321,864 | B1 | 1/2008 | Gendler | |
| 7,363,271 | B2 * | 4/2008 | Morimoto | 705/37 |
| 7,379,931 | B2 | 5/2008 | Morinville | |
| 7,383,990 | B2 | 6/2008 | Veit | |
| 7,481,367 | B2 | 1/2009 | Fees et al. | |
| 7,509,278 | B2 | 3/2009 | Jones | |
| 7,515,697 | B2 | 4/2009 | Eng et al. | |
| 7,516,088 | B2 | 4/2009 | Johnson et al. | |
| 7,574,383 | B1 | 8/2009 | Parasnis et al. | |
| 7,627,504 | B2 | 12/2009 | Brady et al. | |
| 7,634,482 | B2 | 12/2009 | Mukherjee et al. | |
| 7,788,319 | B2 | 8/2010 | Schmidt et al. | |
| 7,805,383 | B2 | 9/2010 | Veit et al. | |
| 7,853,491 | B2 | 12/2010 | Wittmer et al. | |
| 7,873,965 | B2 | 1/2011 | Hayton et al. | |
| 2001/0042032 | A1 | 11/2001 | Crawshaw et al. | |
| 2002/0013721 | A1 | 1/2002 | Dabbiere et al. | |
| 2002/0026394 | A1 | 2/2002 | Savage et al. | |
| 2002/0046053 | A1 | 4/2002 | Hare et al. | |
| 2002/0052754 | A1 | 5/2002 | Joyce et al. | |
| 2002/0087481 | A1 | 7/2002 | Harif | |
| 2002/0087483 | A1 | 7/2002 | Harif | |
| 2002/0112171 | A1 | 8/2002 | Ginter et al. | |
| 2002/0138318 | A1 | 9/2002 | Ellis et al. | |
| 2002/0147668 | A1 | 10/2002 | Smith et al. | |
| 2002/0152104 | A1 | 10/2002 | Ojha et al. | |
| 2002/0156693 | A1 | 10/2002 | Stewart et al. | |
| 2002/0156930 | A1 | 10/2002 | Velasquez | |
| 2002/0157017 | A1 | 10/2002 | Mi et al. | |
| 2002/0169657 | A1 | 11/2002 | Singh et al. | |
| 2002/0184070 | A1 | 12/2002 | Chen et al. | |
| 2002/0186876 | A1 | 12/2002 | Jones et al. | |
| 2002/0194045 | A1 | 12/2002 | Shay et al. | |
| 2003/0004799 | A1 | 1/2003 | Kish | |
| 2003/0069648 | A1 | 4/2003 | Douglas et al. | |
| 2003/0086594 | A1 | 5/2003 | Gross | |
| 2003/0120502 | A1 | 6/2003 | Robb et al. | |
| 2003/0167193 | A1 | 9/2003 | Jones et al. | |
| 2003/0172135 | A1 | 9/2003 | Bobick et al. | |
| 2003/0195815 | A1 | 10/2003 | Li et al. | |
| 2003/0204452 | A1 | 10/2003 | Wheeler | |
| 2003/0208389 | A1 | 11/2003 | Kurihara et al. | |
| 2003/0212614 | A1 | 11/2003 | Chu et al. | |
| 2003/0220875 | A1 | 11/2003 | Lam et al. | |
| 2003/0233295 | A1 | 12/2003 | Tozawa et al. | |
| 2003/0236748 | A1 | 12/2003 | Gressel et al. | |
| 2004/0024662 | A1 | 2/2004 | Gray et al. | |
| 2004/0034577 | A1 | 2/2004 | Van Hoose et al. | |
| 2004/0039665 | A1 | 2/2004 | Ouchi | |
| 2004/0073510 | A1 | 4/2004 | Logan | |
| 2004/0083201 | A1 | 4/2004 | Sholl et al. | |
| 2004/0138942 | A1 | 7/2004 | Pearson et al. | |
| 2004/0172360 | A1 | 9/2004 | Mabrey et al. | |
| 2004/0220910 | A1 | 11/2004 | Zang et al. | |
| 2004/0254945 | A1 | 12/2004 | Schmidt et al. | |
| 2004/0267714 | A1 | 12/2004 | Frid et al. | |
| 2005/0015273 | A1 | 1/2005 | Iyer | |
| 2005/0021366 | A1 | 1/2005 | Pool et al. | |
| 2005/0033588 | A1 | 2/2005 | Ruiz et al. | |
| 2005/0038744 | A1 | 2/2005 | Viijoen | |
| 2005/0049903 | A1 | 3/2005 | Raja | |
| 2005/0071262 | A1 | 3/2005 | Kobeh et al. | |
| 2005/0080640 | A1 | 4/2005 | Bhaskaran et al. | |
| 2005/0108085 | A1 | 5/2005 | Dakar et al. | |
| 2005/0131947 | A1 | 6/2005 | Laub et al. | |
| 2005/0159997 | A1 | 7/2005 | John | |
| 2005/0171833 | A1 | 8/2005 | Jost et al. | |
| 2005/0187797 | A1 | 8/2005 | Johnson | |
| 2005/0187866 | A1 | 8/2005 | Lee | |
| 2005/0194431 | A1 | 9/2005 | Fees et al. | |
| 2005/0194439 | A1 | 9/2005 | Zuerl et al. | |
| 2005/0197849 | A1 | 9/2005 | Fotteler et al. | |
| 2005/0197851 | A1 | 9/2005 | Veit | |
| 2005/0197878 | A1 | 9/2005 | Fotteler et al. | |
| 2005/0197881 | A1 | 9/2005 | Fotteler et al. | |
| 2005/0197882 | A1 | 9/2005 | Fotteler et al. | |
| 2005/0197886 | A1 | 9/2005 | Veit | |
| 2005/0197887 | A1 | 9/2005 | Zuerl et al. | |
| 2005/0197896 | A1 | 9/2005 | Veit et al. | |
| 2005/0197897 | A1 | 9/2005 | Veit et al. | |
| 2005/0197898 | A1 | 9/2005 | Veit et al. | |
| 2005/0197899 | A1 | 9/2005 | Veit et al. | |
| 2005/0197900 | A1 | 9/2005 | Veit | |
| 2005/0197901 | A1 | 9/2005 | Veit et al. | |
| 2005/0197902 | A1 | 9/2005 | Veit | |
| 2005/0197928 | A1 | 9/2005 | Fotteler et al. | |
| 2005/0197941 | A1 | 9/2005 | Veit | |
| 2005/0210406 | A1 | 9/2005 | Biwer et al. | |
| 2005/0216321 | A1 | 9/2005 | Veit | |
| 2005/0216371 | A1 | 9/2005 | Fotteler et al. | |
| 2005/0222888 | A1 | 10/2005 | Hosoda et al. | |
| 2005/0222896 | A1 | 10/2005 | Rhyne et al. | |
| 2005/0222945 | A1 | 10/2005 | Pannicke et al. | |
| 2005/0234754 | A1 | 10/2005 | Veit | |
| 2005/0246240 | A1 | 11/2005 | Padilla | |
| 2005/0256753 | A1 | 11/2005 | Veit et al. | |
| 2006/0004934 | A1 | 1/2006 | Guldner et al. | |
| 2006/0005098 | A1 | 1/2006 | Lotz et al. | |
| 2006/0020515 | A1 | 1/2006 | Lee et al. | |
| 2006/0026586 | A1 | 2/2006 | Remmel et al. | |
| 2006/0047574 | A1 | 3/2006 | Sundaram et al. | |
| 2006/0047598 | A1 | 3/2006 | Hansen | |
| 2006/0059005 | A1 | 3/2006 | Horn et al. | |
| 2006/0059059 | A1 | 3/2006 | Horn et al. | |
| 2006/0059060 | A1 | 3/2006 | Horn et al. | |
| 2006/0069598 | A1 | 3/2006 | Schweitzer et al. | |
| 2006/0069629 | A1 | 3/2006 | Schweitzer et al. | |
| 2006/0069632 | A1 | 3/2006 | Kahn et al. | |
| 2006/0074728 | A1 | 4/2006 | Schweitzer et al. | |
| 2006/0080338 | A1 | 4/2006 | Seubert et al. | |
| 2006/0085336 | A1 | 4/2006 | Seubert et al. | |
| 2006/0085412 | A1 | 4/2006 | Johnson et al. | |
| 2006/0085450 | A1 | 4/2006 | Seubert et al. | |
| 2006/0089885 | A1 | 4/2006 | Finke et al. | |
| 2006/0095373 | A1 | 5/2006 | Venkatasubramanian et al. | |
| 2006/0184435 | A1 | 8/2006 | Mostowfi | |
| 2006/0212376 | A1 | 9/2006 | Snyder et al. | |
| 2006/0280302 | A1 | 12/2006 | Baumann et al. | |
| 2006/0282360 | A1 | 12/2006 | Kahn et al. | |
| 2007/0027742 | A1 | 2/2007 | Emuchay et al. | |
| 2007/0043583 | A1 | 2/2007 | Davulcu et al. | |
| 2007/0078799 | A1 | 4/2007 | Huber-Buschbeck et al. | |
| 2007/0124227 | A1 | 5/2007 | Dembo et al. | |
| 2007/0129978 | A1 | 6/2007 | Shirasu et al. | |
| 2007/0150387 | A1 | 6/2007 | Seubert et al. | |
| 2007/0150836 | A1 | 6/2007 | Deggelmann et al. | |
| 2007/0156428 | A1 | 7/2007 | Brecht-Tillinger et al. | |
| 2007/0156690 | A1 | 7/2007 | Moser et al. | |
| 2007/0165622 | A1 | 7/2007 | O'Rourke et al. | |
| 2007/0214065 | A1 | 9/2007 | Kahlon et al. | |

(56) References Cited

U.S. PATENT DOCUMENTS

| | | | | |
|---|---|---|---|---|
| 2007/0225949 | A1 | 9/2007 | Sundararajan et al. | |
| 2007/0226090 | A1 | 9/2007 | Stratton | |
| 2007/0255639 | A1 | 11/2007 | Seifert | |
| 2007/0265860 | A1 | 11/2007 | Herrmann et al. | |
| 2007/0265862 | A1 | 11/2007 | Freund et al. | |
| 2007/0294159 | A1 | 12/2007 | Cottle | |
| 2008/0005012 | A1 | 1/2008 | Deneef | |
| 2008/0021754 | A1* | 1/2008 | Horn et al. | 705/8 |
| 2008/0040243 | A1 | 2/2008 | Chang et al. | |
| 2008/0046104 | A1 | 2/2008 | Van Camp et al. | |
| 2008/0046421 | A1 | 2/2008 | Bhatia et al. | |
| 2008/0120129 | A1 | 5/2008 | Seubert et al. | |
| 2008/0120190 | A1 | 5/2008 | Joao et al. | |
| 2008/0120204 | A1 | 5/2008 | Conner et al. | |
| 2008/0154969 | A1 | 6/2008 | DeBie | |
| 2008/0162266 | A1 | 7/2008 | Griessmann et al. | |
| 2008/0196108 | A1 | 8/2008 | Dent et al. | |
| 2008/0215354 | A1 | 9/2008 | Halverson et al. | |
| 2008/0243578 | A1 | 10/2008 | Veit | |
| 2008/0288317 | A1 | 11/2008 | Kakar | |
| 2009/0063287 | A1 | 3/2009 | Tribout et al. | |
| 2009/0077074 | A1 | 3/2009 | Hosokawa | |
| 2009/0089198 | A1 | 4/2009 | Kroutik | |
| 2009/0192926 | A1 | 7/2009 | Tarapata | |
| 2009/0222360 | A1 | 9/2009 | Schmitt et al. | |
| 2009/0248431 | A1 | 10/2009 | Schoknecht et al. | |
| 2009/0248547 | A1 | 10/2009 | Doenig et al. | |
| 2009/0271245 | A1 | 10/2009 | Joshi et al. | |
| 2009/0326988 | A1* | 12/2009 | Barth et al. | 705/4 |
| 2010/0014510 | A1 | 1/2010 | Boreli et al. | |
| 2010/0070395 | A1 | 3/2010 | Elkeles et al. | |
| 2010/0106555 | A1 | 4/2010 | Mneimneh et al. | |

FOREIGN PATENT DOCUMENTS

| | | |
|---|---|---|
| CN | 1632806 | 6/2005 |
| CN | 1767537 | 5/2006 |
| CN | 101174957 | 5/2008 |

OTHER PUBLICATIONS

Notice of Allowance issued in related U.S. Appl. No. 12/147,395 on Oct. 26, 2010; 10 pages.
Office Action issued in related U.S. Appl. No. 12/147,399 on Jan. 26, 2011; 16 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/731,857 on Nov. 29, 2010; 4 pages.
Notice of Allowance issued in related U.S. Appl. No. 11/864,832 on Aug. 23, 2010; 4 pages.
Notice of Allowance issued in related U.S. Appl. No. 11/864,832 on Dec. 3, 2010; 9 pages.
Office Action issued in related U.S. Appl. No. 11/864,871 on Oct. 1, 2010; 30 pages.
Office Action issued in related U.S. Appl. No. 12/059,971 on Nov. 4, 2010; 20 pages.
Office Action issued in related U.S. Appl. No. 12/060,149 on Aug. 26, 2010; 15 pages.
Office Action issued in related U.S. Appl. No. 12/060,149 on Feb. 4, 2011; 19 pages.
Notice of Allowance issued in related U.S. Appl. No. 12/060,178 on Dec. 6, 2010; 4 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in U.S. Appl. No. 11/155,368 on Oct. 7, 2010; 4 pages.
Notice of Allowance issued in related U.S. Appl. No. 11/166,065 on Sep. 20, 2010; 6 pages.
Office Action issued in related U.S. Appl. No. 11/864,866 on Feb. 3, 2011; 20 pages.
He, Ning et al.; "B2B Contract Implementation Using Windows DNS"; 2001; pp. 71-79.
FSML—Financial Services Markup Language (Jul. 14, 1999) http://xml.coverpages.org/FSML-v1500a.pdf; pp. 1-159.
Webster's Revised Unabridged Dictionary (1913+1828); Def. "merchandise".
Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
Office Action issued in related U.S. Appl. No. 11/640,422 on Apr. 2, 2009; 13 pages.
Office Action issued in related U.S. Appl. No. 11/640,422 on Dec. 30, 2009; 9 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. App. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.

(56) References Cited

OTHER PUBLICATIONS

"Header", Newton's Telecom Dictionary; 12th Edition, 2004; pp. 389-390).
Office Action issued in U.S. Appl. No. 11/640,422 on May 14, 2010; 12 pages.
Notice of Allowance issued in related U.S. Appl. No. 11/775,821 on Jul. 16, 2010; 4 pages.
Office Action issued in related U.S. Appl. No. 11/864,871 on Apr. 21, 2010; 20 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Advisory Action issued in U.S. Appl. No. 11/155,368 on Mar. 31, 2010; 3 pages.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst_Summit_Vegas_009.pdf ; 36 pages.
"UML in the .com Enterprise. Modeling CORBA, Components, XML/XMI and Metadata Workshop"; http://www.omg.org/news/meetings/workshops/uml_presentations.htm.
Medjahed, Brahim et al; "Business-to-Business Interactions: Issues and Enabling Technologies"; The VLDB Journal; vol. 12, No. 1; Apr. 3, 2003; pp. 59-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani, Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17th Annual ACM SIGPLAN Conference on Object-Oriented Programming, Systems, Languages, and Applications; Nov. 4-8, 2002; pp. 32-33.
Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quix, Christoph et al.; "Business Data Management for Business-to-Business Electronic Commerce"; SIGMOD Record; vol. 31, No. 1; Mar. 2002; pp. 49-54.
Sutherland, Jeff; "Why I Love the OMG: Emergence of a Business Object Component Architecture"; StandardView; vol. 6, No. 1; Mar. 1998; pp. 4-13.
Dogac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002; pp. 65-70.

(56) References Cited

OTHER PUBLICATIONS

Bussler, Christoph; "The Role of B2B Engines in B2B Integration Architectures"; SIGMOD Record; vol. 31, No. 1; Mar. 2002; pp. 67-72.
Fremantle, Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
SAP; "BC-Central Maintenance and Transport Objects"; Release 4.6C; Apr. 200; 15 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
Diehl et al.; "Service Architecture for an Object-Oriented Next Generation Profile Register"; 8 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.
International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursant to Article 94(3) issued in European Application No. 05757432.9 on Apr. 12, 2011; 5 pages.
Notice of Allowance issued in U.S. Appl. No. 12/147,395 on May 4, 2011; 10 pages.
Office Action issued in related U.S. Appl. No. 12/334,175 on May 27, 2011; 12 pages.
Notice of Allowance issued in related U.S. Appl. No. 11/731,857 on Apr. 11, 2011; 8 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/060,192 on Apr. 14, 2011; 18 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Notice of Allowance issued in related U.S. Appl. No. 11/145,464 on Feb. 23, 2011; 7 pages.
Notice of Allowance issued in U.S. Appl. No. 11/155,368 on Mar. 14, 2011; 7 pages.
Notice of Allowance issued in U.S. Appl. No. 11/166,065 on Mar. 8, 2011; 5 pages.
Office Action issued in U.S. Appl. No. 11/864,811 on Mar. 18, 2011; 10 pages.
Notice of Allowance issued in related U.S. Appl. No. 11/803,178 on May 17, 2011; 13 pages.

* cited by examiner

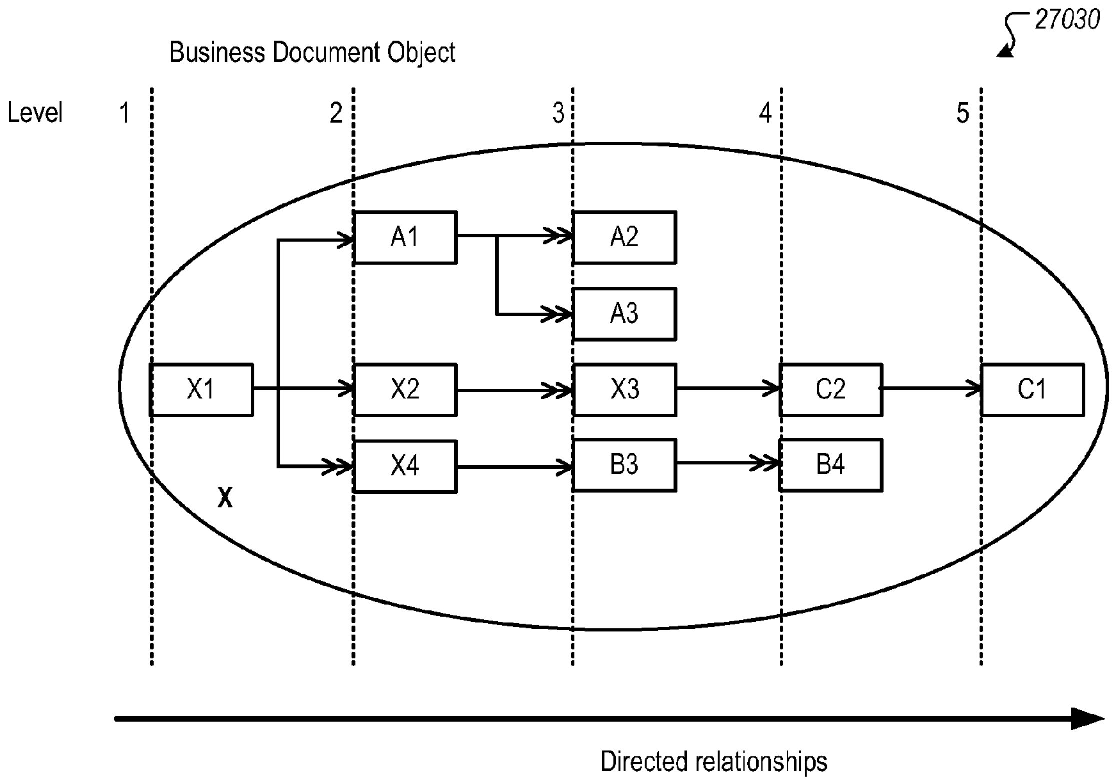
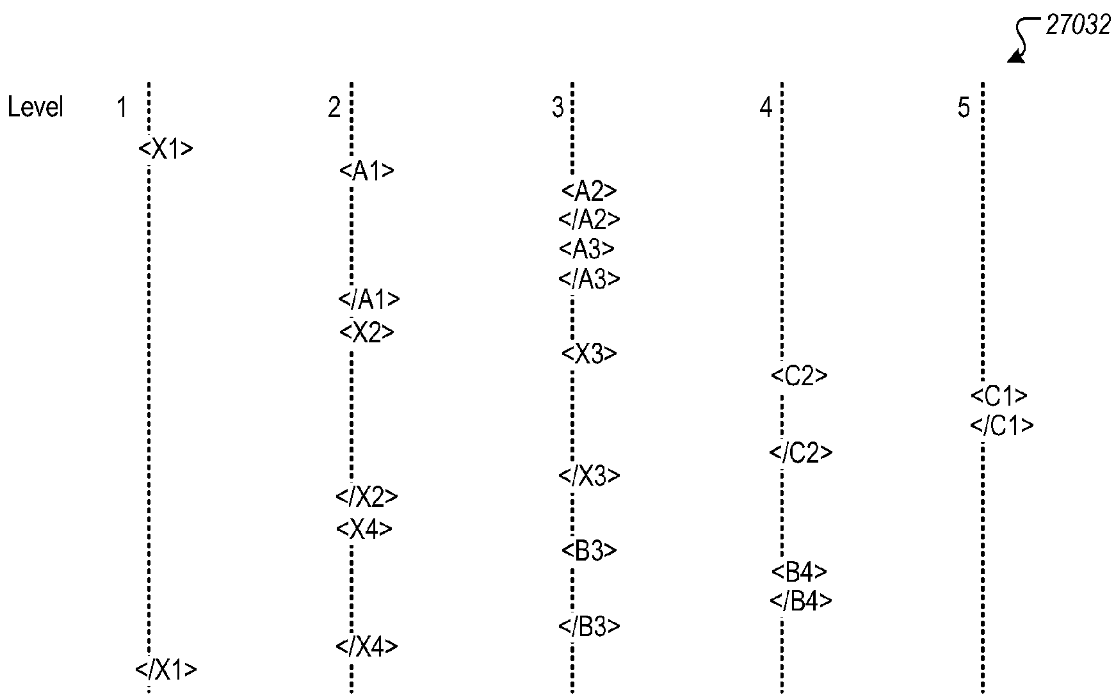
FIG. 27E

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| FreightOrderInvoicingPReparationRequestMessage 410000 | FreightOrderInvoicingPreparationRequestMessage 410002 | | | | | | | | | | | | FreightOrderInvoicingPreparationRequestMessage 410004 |
| MessageHeader 410006 | | MessageHeader 410008 | | | | | | | | | | 1 410010 | BusinessDocumentMessageHeader 410012 |
| FreightOrderInvoicingPreparation 410014 | | FreightOrderInvoicingPreparation 410016 | | | | | | | | | | 1 410018 | … |
| | | | @actioncode 410020 | | | | | | | | | 1 410022 | ActionCode 410024 |

FIG. 41-2

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | ID 410026 | | | | | | | | | 1 410028 | BusinessTransactionDocumentID 410030 |
| Request 410032 | | | Request 410034 | | | | | | | | | 1 410036 | ... |
| HeaderInformation 410038 | | | | Purchase Business Area 410040 | | | | | | | | 0..1 410042 | ... |
| | | | | | PurchasingOrganisationID 410044 | | | | | | | 1 410046 | OrganisationalCentreID 410048 |
| | | | | | PurchasingGroupID 410050 | | | | | | | 0..1 410052 | OrganisationalCentreID 410054 |

FIG. 41-3

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | DateTimePeriods 410056 | | | | | | | | 0..n 410058 | ... |
| | | | | | RequestedFulfillmentPeriod 410060 | | | | | | | 0..1 410062 | DateTimePeriod 410064 |
| | | | | | AcceptableFulfillmentPeriod 410066 | | | | | | | 0..1 410068 | DateTimePeriod 410070 |
| | | | | | PeriodRoleCode 410072 | | | | | | | 1 410074 | PeriodRoleCode 410076 |
| | | | | NatureOfCargo 410078 | | | | | | | | 0..n 410080 | ... |

FIG. 41-4

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | ClassificationCode 410082 | | | | | | | 1 410084 | NatureOfCargoClassificationCode 410086 |
| | | | | TotalQuantity 410088 | | | | | | | | 0..n 410090 | ... |
| | | | | | Quantity 410092 | | | | | | | 1 410094 | Quantity 410096 |
| | | | | | RoleCode 410098 | | | | | | | 0..1 410100 | QuantityRoleCode 410102 |
| | | | | | TypeCode 410104 | | | | | | | 0..1 410106 | QuantityTypeCode 410108 |
| | | | | TotalAmount 410110 | | | | | | | | 0..n 410112 | ... |
| | | | | | Amount 410114 | | | | | | | 1 410116 | Amount 410118 |

FIG. 41-5

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | RoleCode 410120 | | | | | | | 1 410122 | AmountRoleCode 410124 |
| | | | | TextCollection 410126 | | | | | | | | 0..1 410128 | ... |
| | | | | | TextCollection 410130 | | | | | | | 1 410132 | TextCollection 410134 |
| | | | | BusinessTransactionDocumentReference 410136 | | | | | | | | 0..n 410138 | ... |

FIG. 41-6

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentReference 410140 | | | | | | | 0..1 410142 | BusinessTransactionDocumentReference 410144 |
| | | | | | BusinessTransactionDocumentRelationshipRoleCode 410146 | | | | | | | 0..1 410148 | BusinessTransactionDocumentRelationshipRoleCode 410150 |
| | | | | | BusinessTransactionDocumentRelationshipTypeCode 410152 | | | | | | | 0..1 410154 | BusinessTransactionDocumentRelationshipTypeCode 410156 |

FIG. 41-7

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationDocumentTypeCode 410158 | | | | | | | 0..1 410160 | TransportationDocumentTypeCode 410162 |
| | | | | | TransportationDocumentNote 410164 | | | | | | | 0..1 410166 | SHORT_Note 410168 |
| | | | | | TransportationDocumentID 410170 | | | | | | | 0..1 410172 | TransportationDocumentID 410174 |
| | | | | | DateTimePeriod 410176 | | | | | | | 0..n 410178 | ... |
| | | | | | | DateTimePeriod 410180 | | | | | | 1 410182 | DateTimePeriod 410184 |

FIG. 41-8

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | PeriodRoleCode 410186 | | | | | | 1 410188 | PeriodRoleCode 410190 |
| PartyInformation 410192 | | | | Party 410194 | | | | | | | | 1..n 410196 | ... |
| | | | | | Party 410198 | | | | | | | 1 410200 | BusinessTransactionDocumentParty 410202 |
| | | | | | RoleCode 410204 | | | | | | | 1 410206 | PartyRoleCode 410208 |
| | | | | | ForamttedName 410210 | | | | | | | 0..1 410212 | LONG_Name 410214 |

FIG. 41-9

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentReference 410216 | | | | | | | 0..n 410218 | ... |
| | | | | | | BusinessTransactionDocumentReference 410220 | | | | | | 0..1 410222 | BusinessTransactionDocumentReference 410224 |
| | | | | | | BusinessTransactionDocumentRelationshipRoleCode 410226 | | | | | | 0..1 410228 | BusinessTransactionDocumentRelationshipRoleCode 410230 |

FIG. 41-10

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipTypeCode 410232 | | | | | | 0..1 410234 | BusinessTransactionDocumentRelationshipTypeCode 410236 |
| | | | | | | TransportationDocumentTypeCode 410238 | | | | | | 0..1 410240 | TransportationDocumentTypeCode 410242 |
| | | | | | | TransportationDocumentNote 410244 | | | | | | 0..1 410246 | SHORT_Note 410248 |

FIG. 41-11

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentID 410250 | | | | | | 0..1 410252 | TransportationDocumentID 410254 |
| | | | | | | DateTimePeriod 410256 | | | | | | 0..n 410258 | ... |
| | | | | | | | DateTimePeriod 410260 | | | | | 1 410262 | DateTimePeriod 410264 |
| | | | | | | | PeriodRoleCode 410266 | | | | | 1 410268 | PeriodRoleCode 410270 |
| TransportationChargesInformation 410272 | | | | TransportationChargesInformation 410274 | | | | | | | | 0..n 410276 | ... |

FIG. 41-12

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationChargesUsageCode 410278 | | | | | | | 1 410280 | TransportationChargesUsageCode 410282 |
| | | | | | TransportationCharges 410284 | | | | | | | 0..1 410286 | ... |
| | | | | | | ID 410288 | | | | | | 1 410290 | TransportationChargesID 410292 |
| | | | | | | FreightAgreementID 410294 | | | | | | 1 410296 | FreightAgreementID 410298 |
| | | | | | | OriginCode 410300 | | | | | | 0..1 410302 | TransportationChargesOriginCode 410304 |

FIG. 41-13

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TariffID 410306 | | | | | | 0..1 410308 | TransportationChargesTariffID 410310 |
| | | | | | | CalculationSheetID 410312 | | | | | | 0..1 410314 | TransportationChargesCalculationSheetID 410316 |
| | | | | | | Location 410318 | | | | | | 0..n 410320 | ... |
| | | | | | | | Location 410322 | | | | | 1 410324 | BusinessTransactionDocumentLocation 410326 |
| | | | | | | | RoleCode 410328 | | | | | 1 410330 | LoactionRoleCode 410332 |

FIG. 41-14

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TypeCode 410334 | | | | | 0..1 410336 | LocationTypeCode 410338 |
| | | | | | | | Name 410340 | | | | | 0..1 410342 | MEDIUM_Name 410344 |
| | | | | | | | DateTimePeriods 410346 | | | | | 0..n 410348 | ... |
| | | | | | | | | RequestedFulfillmentPeriod 410350 | | | | 0..1 410352 | DateTimePeriod 410354 |
| | | | | | | | | AcceptableFulfillmentPeriod 410356 | | | | 0..1 410358 | DateTimePeriod 410360 |

FIG. 41-15

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PeriodRoleCode 410362 | | | | 1 410364 | PeriodRoleCode 410366 |
| | | | | | | TextCollection 410368 | | | | | | 0..1 410370 | ... |
| | | | | | | | TextCollection 410372 | | | | | 1 410374 | TextCollection 410376 |
| | | | | | | Currency 410378 | | | | | | 0..n 410380 | ... |
| | | | | | | | Code 410382 | | | | | 1 410384 | CurrencyCode 410386 |
| | | | | | | | RoleCode 410388 | | | | | 1 410390 | CurrencyRoleCode 410392 |

FIG. 41-16

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | UsageCode 410394 | | | | | 0..1 410396 | CurrencyUsageCode 410398 |
| | | | | | | ExchangeRate 410400 | | | | | | 0..n 410402 | ... |
| | | | | | | | ExchangeRate 410404 | | | | | 1 410406 | ExchangeRate 410408 |
| | | | | | | | TypeCode 410410 | | | | | 0..1 410412 | ExchangeRateTypeCode 410414 |
| | | | | | | PercentElement 410416 | | | | | | 0..n 410418 | ... |
| | | | | | | | PercentRoleCode 410420 | | | | | 1 410422 | PercentRoleCode 410424 |

FIG. 41-17

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Percent 410426 | | | | | 1 410428 | Percent 410430 |
| | | | | | | | TransportationChargesPercentCalculationBaseCode 410432 | | | | | 0..1 410434 | TransportationChargesPercentCalculationBaseCode 410436 |
| | | | | | | | StatusCode 410438 | | | | | 0..1 410440 | TransportationChargesPercentElementStatusCode 410442 |
| | | | | | | DateTimePeriod 410444 | | | | | | 0..n 410446 | ... |
| | | | | | | | DateTimePeriod 410448 | | | | | 1 410450 | DateTimePeriod 410452 |

FIG. 41-18

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PeriodRoleCode 410454 | | | | | 1 410456 | PeriodRoleCode 410458 |
| | | | | | | BusinessTransactionDocumentReference 410460 | | | | | | 0..n 410462 | ... |
| | | | | | | | BusinessTransactionDocumentReference 410464 | | | | | 0..1 410466 | BusinessTransactionDocumentReference 410468 |

FIG. 41-19

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentRelationshipRoleCode 410470 | | | | | 0..1 410472 | BusinessTransactionDocumentRelationshipRoleCode 410474 |
| | | | | | | | BusinessTransactionDocumentRelationshipTypeCode 410476 | | | | | 0..1 410478 | BusinessTransactionDocumentRelationshipTypeCode 410480 |
| | | | | | | | TransportationDocumentTypeCode 410482 | | | | | 0..1 410484 | TransportationDocumentTypeCode 410486 |

FIG. 41-20

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentNote 410488 | | | | | 0..1 410490 | SHORT_Note 410492 |
| | | | | | | | TransportationDocumentID 410494 | | | | | 0..1 410496 | TransportationDocumentID 410498 |
| | | | | | | TaxDetail 410500 | | | | | | 0..n 410502 | ... |
| | | | | | | | ProductTax 410504 | | | | | 1 410506 | ProductTax 410508 |
| | | | | | | PaymentInstruction 410510 | | | | | | 0..n 410512 | ... |

FIG. 41-21

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PaymentInstruction 410514 | | | | | 1 410516 | PaymentInstruction 410518 |
| | | | | | | | TransportationChargesElementCategoryCode 410520 | | | | | 0..1 410522 | TransportationChargesElementCategoryCode 410524 |
| | | | | | | | TransportationChargesElementSubCategoryCode 410526 | | | | | 0..1 410528 | TransportationChargesElementSubCategoryCode 410530 |

FIG. 41-22

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesPaymentArrangementCode 410532 | | | | | 0..1 410534 | TransportationChargesPaymentArrangementCode 410536 |
| | | | | | | CashDiscountTerms 410538 | | | | | | 0..n 410540 | ... |
| | | | | | | | CashDiscountTerms 410542 | | | | | 1 410544 | CashDiscountTerms 410546 |
| | | | | | | | TransportationChargesElementCategoryCode 410548 | | | | | 0..1 410550 | TransportationChargesElementCategoryCode 410552 |

FIG. 41-23

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesElementSubCategoryCode 410554 | | | | | 0..1 410556 | TransportationChargesElementSubCategoryCode 410558 |
| | | | | | | Element 410560 | | | | | | 0..n 410562 | ... |
| | | | | | | | CategoryCode 410564 | | | | | 1 410566 | TransportationChargesElementCategoryCode 410568 |
| | | | | | | | SubCategoryCode 410570 | | | | | 1 410572 | TransportationChargesElementSubCategoryCode 410574 |

FIG. 41-24

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TypeCode 410576 | | | | | 1 410578 | TransportationChargesElementTypeCode 410580 |
| | | | | | | | CalculationResolutionCode 410582 | | | | | 1 410584 | TransportationChargesElementCalculationResolutionCode 410586 |
| | | | | | | | TransportationChargesPaymentArrangementCode 410588 | | | | | 0..1 410590 | TransportationChargesPaymentArrangementCode 410592 |
| | | | | | | | Location 410594 | | | | | 0..n 410596 | ... |

FIG. 41-25

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 410598 | | | | 1 410600 | BusinessTransactionDocumentLocation 410602 |
| | | | | | | | | RoleCode 410604 | | | | 1 410606 | LocationRoleCode 410608 |
| | | | | | | | | TypeCode 410610 | | | | 0..1 410612 | LocationTypeCode 410614 |
| | | | | | | | | Name 410616 | | | | 0..1 410618 | MEDIUM_Name 410620 |
| | | | | | | | | DateTimePeriods 410622 | | | | 0..n 410624 | ... |

FIG. 41-26

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RequestedFulfillmentPeriod 410626 | | | 0..1 410628 | DateTimePeriod 410630 |
| | | | | | | | | | AcceptableFulfillmentPeriod 410632 | | | 0..1 410634 | DateTimePeriod 410636 |
| | | | | | | | | | PeriodRoleCode 410638 | | | 1 410640 | PeriodRoleCode 410642 |
| | | | | | | | TextCollection 410644 | | | | | 0..1 410646 | ... |
| | | | | | | | | TextCollection 410648 | | | | 1 410650 | TextCollection 410652 |

FIG. 41-27

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Currency 410654 | | | | | 0..n 410656 | ... |
| | | | | | | | | Code 410658 | | | | 1 410660 | CurrencyCode 410662 |
| | | | | | | | | RoleCode 410664 | | | | 1 410666 | CurrencyRoleCode 410668 |
| | | | | | | | | UsageCode 410670 | | | | 0..1 410672 | CurrencyUsageCode 410674 |
| | | | | | | | RateElement 410676 | | | | | 0..n 410678 | ... |
| | | | | | | | | ID 410680 | | | | 1 410682 | TransportationChargesElementRateElementID 410684 |

FIG. 41-28

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Amount 410686 | | | | 1 410688 | Amount 410690 |
| | | | | | | | | BaseQuantity 410692 | | | | 1 410694 | Quantity 410696 |
| | | | | | | | | TransportationChargesRateTypeCode 410698 | | | | 0..1 410700 | TransportationChargesRateTypeCode 410702 |
| | | | | | | | | TransportationChargesRateRoleCode 410704 | | | | 1 410706 | TransportationChargesRateRoleCode 410708 |

FIG. 41-29

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesRateElementStatusCode 410710 | | | | 0..1 410712 | TransportationChargesRateElementStatusCode 410714 |
| | | | | | | | PercentElement 410716 | | | | | 0..n 410718 | ... |
| | | | | | | | | PercentRoleCode 410720 | | | | 1 410722 | PercentRoleCode 410724 |
| | | | | | | | | Percent 410726 | | | | 1 410728 | Percent 410730 |

FIG. 41-30

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesPercentCalculationBaseCode 410732 | | | | 0..1 410734 | TransportationChargesPercentCalculationBaseCode 410736 |
| | | | | | | | | StatusCode 410738 | | | | 0..1 410740 | TransportationChargesPercentElementStatusCode 410742 |
| | | | | | | | AmountElement 410744 | | | | | 0..n 410746 | ... |
| | | | | | | | | Amount 410748 | | | | 1 410750 | Amount 410752 |

FIG. 41-31

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | AmountRoleCode 410754 | | | | 1 410756 | AmountRoleCode 410758 |
| | | | | | | | | TransportationChargesAmountElementStatusCode 410760 | | | | 0..1 410762 | TransportationChargesAmountElementStatusCode 410764 |
| | | | | | | | | RateElementAssignment 410766 | | | | 0..n 410768 | ... |

FIG. 41-32

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesElementRateElementID 410770 | | | 1 410772 | TransportationChargesElementRateElementID 410774 |
| | | | | | | | CalculationBase 410776 | | | | | 0..n 410778 | ... |
| | | | | | | | | TransportationChargesElementCalculationBaseCode 410780 | | | | 1 410782 | TransportationChargesElementCalculationBaseCode 410784 |
| | | | | | | | | BaseQuantity 410786 | | | | 0..1 410788 | Quantity 410790 |

FIG. 41-33

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BaseQuantityRoleCode 410792 | | | | 0..1 410794 | QuantityRoleCode 410796 |
| | | | | | | | | BaseQuantityTypeCode 410798 | | | | 0..1 410800 | QuantityTypeCode 410802 |
| | | | | | | | TaxDetail 410804 | | | | | 0..n 410806 | ... |
| | | | | | | | | ProductTax 410808 | | | | 1 410810 | ProductTax 410812 |
| | | | | | | | DateTimePeriod 410814 | | | | | 0..n 410816 | ... |
| | | | | | | | | DateTimePeriod 410818 | | | | 1 410820 | DateTimePeriod 410822 |

FIG. 41-34

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PeriodRoleCode 410824 | | | | 1 410826 | PeriodRoleCode 410828 |
| | | | | | | | CostDistribution 410830 | | | | | 0..n 410832 | ... |
| | | | | | | | | AccountingCodingBlockAssignment 410834 | | | | 1 410836 | AccountingCodingBlockAssignment 410838 |
| ShipmentOrder 410840 | | | | ShipmentOrder 410842 | | | | | | | | 0..n 410844 | ... |
| | | | | | ID 410846 | | | | | | | 1 410848 | BusinessTransactionDocumentID 410850 |

FIG. 41-35

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| Request 410852 | | | | | Request 410854 | | | | | | | 0..1 410856 | ... |
| | | | | | | DeliveryTerms 410858 | | | | | | 0..1 410860 | DeliveryTerms 410862 |
| HeaderInformation 410864 | | | | | | DateTime Periods 410866 | | | | | | 0..n 410868 | ... |
| | | | | | | | RequestedFulfillmentPeriod 410870 | | | | | 0..1 410872 | DateTimePeriod 410874 |
| | | | | | | | AcceptableFulfillmentPeriod 410876 | | | | | 0..1 410878 | DateTimePeriod 410880 |

FIG. 41-36

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PeriodRoleCode 410882 | | | | | 1 410884 | PeriodRoleCode 410886 |
| | | | | | | NatureOfCargo 410888 | | | | | | 0..n 410890 | … |
| | | | | | | | ClassificationCode 410892 | | | | | 1 410894 | NatureOfCargoClassificationCode 410896 |
| | | | | | | TotalQuantity 410898 | | | | | | 0..n 410900 | … |
| | | | | | | | Quantity 410902 | | | | | 1 410904 | Quantity 410906 |
| | | | | | | | RoleCode 410908 | | | | | 0..1 410910 | QuantityRoleCode 410912 |

FIG. 41-37

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TypeCode 410914 | | | | | 0..1 410916 | QuantityTypeCode 410918 |
| | | | | | | TotalAmount 410920 | | | | | | 0..n 410922 | ... |
| | | | | | | | Amount 410924 | | | | | 1 410926 | Amount 410928 |
| | | | | | | | RoleCode 410930 | | | | | 1 410932 | AmountRoleCode 410934 |
| | | | | | | TextCollection 410936 | | | | | | 0..1 410938 | ... |
| | | | | | | | TextCollection 410940 | | | | | 1 410942 | TextCollection 410944 |

FIG. 41-38

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationServiceRequirement 410946 | | | | | | 0..n 410948 | ... |
| | | | | | | | TransportationServiceRequirementCode 410950 | | | | | 0..1 410952 | TransportationServiceRequirementCode 410954 |
| | | | | | | | AdditionalTransportationServiceRequirementCode 410956 | | | | | 0..1 410958 | TransportationServiceRequirementCode 410960 |

FIG. 41-39

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationContractConditionCode 410962 | | | | | 0..1 410964 | TransportationContractConditionCode 410966 |
| | | | | | | | TransportServiceLevelCode 410968 | | | | | 0..1 410970 | TransportServiceLevelCode 410972 |
| | | | | | | | NatureOfCargoClassificationCode 410974 | | | | | 0..1 410976 | NatureOfCargoClassificationCode 410978 |
| | | | | | | BusinessTransactionDocumentReference 410980 | | | | | | 0..n 410982 | ... |

FIG. 41-40

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentReference 410984 | | | | | 0..1 410986 | BusinessTransactionDocumentReference 410988 |
| | | | | | | | BusinessTransactionDocumentRelationshipRoleCode 410990 | | | | | 0..1 410992 | BusinessTransactionDocumentRelationshipRoleCode 410994 |
| | | | | | | | BusinessTransactionDocumentRelationshipTypeCode 410996 | | | | | 0..1 410998 | BusinessTransactionDocumentRelationshipTypeCode 411000 |

FIG. 41-41

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentTypeCode 411002 | | | | | 0..1 411004 | TransportationDocumentTypeCode 411006 |
| | | | | | | | TransportationDocumentNote 411008 | | | | | 0..1 411010 | SHORT_Note 411012 |
| | | | | | | | TransportationDocumentID 411014 | | | | | 0..1 411016 | TransportationDocumentID 411018 |
| | | | | | | | DateTimePeriod 411020 | | | | | 0..n 411022 | … |
| | | | | | | | | DateTimePeriod 411024 | | | | 1 411026 | DateTimePeriod 411028 |

FIG. 41-42

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PeriodRoleCode 411030 | | | | 1 411032 | PeriodRoleCode 411034 |
| PartyInformation 411036 | | | | | | Party 411038 | | | | | | 0..n 411040 | ... |
| | | | | | | | Party 411042 | | | | | 1 411044 | BusinessTransactionDocumentParty 411046 |
| | | | | | | | RoleCode 411048 | | | | | 1 411050 | PartyRoleCode 411052 |
| | | | | | | | FormattedName 411054 | | | | | 0..1 411056 | LONG_Name 411058 |

FIG. 41-43

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentReference 411060 | | | | | 0..n 411062 | ... |
| | | | | | | | | BusinessTransactionDocumentReference 411064 | | | | 0..1 411066 | BusinessTransactionDocumentReference 411068 |
| | | | | | | | | BusinessTransactionDocumentRelationshipRoleCode 411070 | | | | 0..1 411072 | BusinessTransactionDocumentRelationshipRoleCode 411074 |

FIG. 41-44

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipTypeCode 411076 | | | | 0..1 411078 | BusinessTransactionDocumentRelationshipTypeCode 411080 |
| | | | | | | | | TransportationDocumentTypeCode 411082 | | | | 0..1 411084 | TransportationDocumentTypeCode 411086 |
| | | | | | | | | TransportationDocumentNote 411088 | | | | 0..1 411090 | SHORT_Note 411092 |

FIG. 41-45

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentID 411094 | | | | 0..1 411096 | TransportationDocumentID 411098 |
| | | | | | | | | DateTimePeriod 411100 | | | | 0..n 411102 | ... |
| | | | | | | | | | DateTimePeriod 411104 | | | 1 411106 | DateTimePeriod 411108 |
| | | | | | | | | | PeriodRoleCode 411110 | | | 1 411112 | PeriodRoleCode 411114 |
| LocationInformation 411116 | | | | | | Location 411118 | | | | | | 0..n 411120 | ... |

FIG. 41-46

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Location 411122 | | | | | 1 411124 | BusinessTransactionDocumentLocation 411126 |
| | | | | | | | RoleCode 411128 | | | | | 1 411130 | LocationRoleCode 411132 |
| | | | | | | | TypeCode 411134 | | | | | 0..1 411136 | LocationTypeCode 411138 |
| | | | | | | | Name 411140 | | | | | 0..1 411142 | MEDIUM_Name 411144 |
| | | | | | | | DateTimePeriods 411146 | | | | | 0..n 411148 | ... |

FIG. 41-47

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RequestedFulfillmentPeriod 411150 | | | | 0..1 411152 | DateTimePeriod 411154 |
| | | | | | | | | AcceptableFulfillmentPeriod 411156 | | | | 0..1 411158 | DateTimePeriod 411160 |
| | | | | | | | | PeriodRoleCode 411162 | | | | 1 411164 | PeriodRoleCode 411166 |
| TransportationStageInformation 411168 | | | | | | TransportationStage 411170 | | | | | | 0..n 411172 | ... |
| | | | | | | | ID 411174 | | | | | 1 411176 | TransportationStageID 411178 |

FIG. 41-48

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OrdinalNumberValue 411180 | | | | | 0..1 411182 | OrdinalNumberValue 411184 |
| | | | | | | | TypeCode 411186 | | | | | 0..1 411188 | TransportationStageTypeCode 411190 |
| | | | | | | | JourneyID 411192 | | | | | 0..1 411194 | JourneyID 411196 |
| | | | | | | | TransportModeCode 411198 | | | | | 0..1 411200 | TransportModeCode 411202 |
| | | | | | | | TransportMeansDescription Code 411204 | | | | | 0..1 411206 | TransportMeansDescriptionCode 411208 |

FIG. 41-49

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportMeansDescription 411210 | | | | | 0..1 411212 | SHORT_Description 411214 |
| | | | | | | | TransportMeansID 411216 | | | | | 0..1 411218 | TransportMeansID 411220 |
| | | | | | | | TransportMeansHomeCountryCode 411222 | | | | | 0..1 411224 | CountryCode 411226 |
| | | | | | | | TransportMeansOwnershipTypeCode 411228 | | | | | 0..1 411230 | TransportMeansOwnershipTypeCode 411232 |

FIG. 41-50

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | CarrierStandardID 411234 | | | | | 0..1 411236 | PartyStandardID 411238 |
| | | | | | | | CarrierFormattedName 411240 | | | | | 0..1 411242 | LONG_Name 411244 |
| | | | | | | | TransportationTransitDirectionCode 411246 | | | | | 0..1 411248 | TransportationTransitDirectionCode 411250 |
| | | | | | | | CalculatedDistanceMeasure 411252 | | | | | 0..1 411254 | Measure 411256 |

FIG. 41-51

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | GivenDistanceMeasure 411258 | | | | | 0..1 411260 | Measure 411262 |
| | | | | | | | Location 411264 | | | | | 0..n 411266 | ... |
| | | | | | | | | Location 411268 | | | | 1 411270 | BusinessTransactionDocumentLocation 411272 |
| | | | | | | | | RoleCode 411274 | | | | 1 411276 | LocationRoleCode 411278 |
| | | | | | | | | TypeCode 411280 | | | | 0..1 411282 | LocationTypeCode 411284 |
| | | | | | | | | Name 411286 | | | | 0..1 411288 | MEDIUM_Name 411290 |

FIG. 41-52

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTime Periods 411292 | | | | 0..n 411294 | ... |
| | | | | | | | | | RequestedFulfillmentPeriod 411296 | | | 0..1 411298 | DateTimePeriod 411300 |
| | | | | | | | | | AcceptableFulfillmentPeriod 411302 | | | 0..1 411304 | DateTimePeriod 411306 |
| | | | | | | | | | PeriodRoleCode 411308 | | | 1 411310 | PeriodRoleCode 411312 |

FIG. 41-53

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentReference 411314 | | | | | 0..n 411316 | ... |
| | | | | | | | | BusinessTransactionDocumentReference 411318 | | | | 0..1 411320 | BusinessTransactionDocumentReference 411322 |
| | | | | | | | | BusinessTransactionDocumentRelationshipRoleCode 411324 | | | | 0..1 411326 | BusinessTransactionDocumentRelationshipRoleCode 411328 |

FIG. 41-54

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipTypeCode 411330 | | | | 0..1 411332 | BusinessTransactionDocumentRelationshipTypeCode 411334 |
| | | | | | | | | TransportationDocumentTypeCode 411336 | | | | 0..1 411338 | TransportationDocumentTypeCode 411340 |
| | | | | | | | | TransportationDocumentNote 411342 | | | | 0..1 411344 | SHORT_Note 411346 |

FIG. 41-55

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentID 411348 | | | | 0..1 411350 | TransportationDocumentID 411352 |
| | | | | | | | | DateTimePeriod 411354 | | | | 0..n 411356 | ... |
| | | | | | | | | | DateTimePeriod 411358 | | | 1 411360 | DateTimePeriod 411362 |
| | | | | | | | | | PeriodRoleCode 411364 | | | 1 411366 | PeriodRoleCode 411368 |
| | | | | | | | TransportationServiceRequirement 411370 | | | | | 0..n 411372 | ... |

FIG. 41-56

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationServiceRequirementCode 411374 | | | | 0..1 411376 | TransportationServiceRequirementCode 411378 |
| | | | | | | | | AdditionalTransportationServiceRequirementCode 411380 | | | | 0..1 411382 | TransportationServiceRequirementCode 411384 |
| | | | | | | | | TransportationContractConditionCode 411386 | | | | 0..1 411388 | TransportationContractConditionCode 411390 |

FIG. 41-57

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportServiceLevelCode 411392 | | | | 0..1 411394 | TransportServiceLevelCode 411396 |
| | | | | | | | | NatureOfCargoClassificationCode 411398 | | | | 0..1 411400 | NatureOfCargoClassificationCode 411402 |
| TransportationUnitResourceInformation 411404 | | | | | | TransportationUnitResourceInformation 411406 | | | | | | 0..n 411408 | ... |
| | | | | | | | ID 411410 | | | | | 1 411412 | ResourceInformationID 411414 |

FIG. 41-58

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ResourceNumberValue 411416 | | | | | 0..1 411418 | NumberValue 411420 |
| | | | | | | | ResourceID 411422 | | | | | 0..1 411424 | ResourceID 411426 |
| | | | | | | | ResourceHomeCountryCode 411428 | | | | | 0..1 411430 | CountryCode 411432 |
| | | | | | | | TransportationUnitResourceCategoryCode 411434 | | | | | 0..1 411436 | TransportationUnitResourceCategoryCode 411438 |

FIG. 41-59

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationUnitResourceTypeCode 411440 | | | | | 0..1 411442 | TransportationUnitResourceTypeCode 411444 |
| | | | | | | | FillLevelCode 411446 | | | | | 0..1 411448 | FillLevelCode 411450 |
| | | | | | | | ShippingTypeCode 411452 | | | | | 0..1 411454 | ShippingTypeCode 411456 |
| | | | | | | | HaulageArrangerCode 411458 | | | | | 0..1 411460 | HaulageArrangerCode 411462 |

FIG. 41-60

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationHandlingInstructionCode 411464 | | | | | 0..1 411466 | TransportationHandlingInstructionCode 411468 |
| | | | | | | | TransportationHandlingInstructionNote 411470 | | | | | 0..1 411472 | LONG_Note 411474 |
| | | | | | | | TransportationStageAssignment 411476 | | | | | 0..n 411478 | ... |
| | | | | | | | | ShipmentOrderTransportationStageID 411480 | | | | 1 411482 | TransportationStageID 411484 |

FIG. 41-61

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | AttachedEquipment 411486 | | | | | 0..n 411488 | ... |
| | | | | | | | | ShipmentOrderResourceInformationID 411490 | | | | 1 411492 | ResourceInformationID 411494 |
| | | | | | | | Quantity 411496 | | | | | 0..n 411498 | ... |
| | | | | | | | | Quantity 411500 | | | | 1 411502 | Quantity 411504 |
| | | | | | | | | RoleCode 411506 | | | | 0..1 411508 | QuantityRoleCode 411510 |
| | | | | | | | | TypeCode 411512 | | | | 0..1 411514 | QuantityTypeCode 411516 |

FIG. 41-62

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Seal 411518 | | | | | 0..n 411520 | ... |
| | | | | | | | | ID 411522 | | | | 1 411524 | SealID 411526 |
| | | | | | | | | PartyRoleCode 411528 | | | | 0..1 411530 | PartyRoleCode 411532 |
| | | | | | | | | PartyFormattedName 411534 | | | | 0..1 411536 | LONG_Name 411538 |
| | | | | | | | | StatusCode 411540 | | | | 0..1 411542 | SealStatusCode 411544 |
| | | | | | | | BusinessTransactionDocumentReference 411546 | | | | | 0..n 411548 | ... |

FIG. 41-63

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 411550 | | | | 0..1 411552 | BusinessTransactionDocumentReference 411554 |
| | | | | | | | | BusinessTransactionDocumentRelationshipRoleCode 411556 | | | | 0..1 411558 | BusinessTransactionDocumentRelationshipRoleCode 411560 |
| | | | | | | | | BusinessTransactionDocumentRelationshipTypeCode 411562 | | | | 0..1 411564 | BusinessTransactionDocumentRelationshipTypeCode 411566 |

FIG. 41-64

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 411568 | | | | 0..1 411570 | TransportationDocumentTypeCode 411572 |
| | | | | | | | | TransportationDocumentNote 411574 | | | | 0..1 411576 | SHORT_Note 411578 |
| | | | | | | | | TransportationDocumentID 411580 | | | | 0..1 411582 | TransportationDocumentID 411584 |
| | | | | | | | | DateTimePeriod 411586 | | | | 0..n 411588 | ... |
| | | | | | | | | | DateTimePeriod 411590 | | | 1 411592 | DateTimePeriod 411594 |

FIG. 41-65

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 411596 | | | 1 411598 | PeriodRoleCode 411600 |
| | | | | | | | Location 411602 | | | | | 0..n 411604 | ... |
| | | | | | | | | Location 411606 | | | | 1 411608 | BusinessTransactionDocumentLocation 411610 |
| | | | | | | | | RoleCode 411612 | | | | 1 411614 | LocationRoleCode 411616 |
| | | | | | | | | TypeCode 411618 | | | | 0..1 411620 | LocationTypeCode 411622 |
| | | | | | | | | Name 411624 | | | | 0..1 411626 | MEDIUM_Name 411628 |

FIG. 41-66

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTime Periods 411630 | | | | 0..n 411632 | ... |
| | | | | | | | | | RequestedFulfillmentPeriod 411634 | | | 0..1 411636 | DateTimePeriod 411638 |
| | | | | | | | | | AcceptableFulfillmentPeriod 411640 | | | 0..1 411642 | DateTimePeriod 411644 |
| | | | | | | | | | PeriodRoleCode 411646 | | | 1 411648 | PeriodRoleCode 411650 |
| | | | | | | | DangerousGoods 411652 | | | | | 0..n 411654 | ... |

FIG. 41-67

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ID 411656 | | | | 0..1 411658 | DangerousGoodsID 411660 |
| | | | | | | | | RegulationsCode 411662 | | | | 0..1 411664 | DangerousGoodsRegulationsCode 411666 |
| | | | | | | | | HazardCode 411668 | | | | 0..1 411670 | DangerousGoodsHazardCode 411672 |
| | | | | | | | | FlashpointMeasureInterval 411674 | | | | 0..1 411676 | MeasureInterval 411678 |
| | | | | | | | | PackagingGroupCode 411680 | | | | 0..1 411682 | DangerousGoodsPackagingGroupCode 411684 |

FIG. 41-68

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | EmergencySchedule 411686 | | | | 0..1 411688 | DangerousGoodsEmergencySchedule 411690 |
| | | | | | | | | TransportEmergencyCardCode 411692 | | | | 0..1 411694 | TransportEmergencyCardCode 411696 |
| | | | | | | | | DangerousGoodsLabelCode 411698 | | | | 0..1 411700 | DangerousGoodsLabelCode 411702 |
| | | | | | | | | DangerousGoodsLabelCode2 411704 | | | | 0..1 411706 | DangerousGoodsLabelCode 411708 |

FIG. 41-69

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DangerousGoodsLabelCode3 411710 | | | | 0..1 411712 | DangerousGoodsLabelCode 411714 |
| | | | | | | | | PackagingInstructionTypeCode 411716 | | | | 0..1 411718 | PackagingInstructionTypeCode 411720 |
| | | | | | | | | TransportMeansDescription Code 411722 | | | | 0..1 411724 | TransportMeansDescriptionCode 411726 |
| | | | | | | | | TransportationAuthorisation Code 411728 | | | | 0..1 411730 | DangerousGoodsTransportationAuthorisationCode 411732 |

FIG. 41-70

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| PackagingInformation 411734 | | | | | | PackageInformation 411736 | | | | | | 0..n 411738 | ... |
| | | | | | | | ID 411740 | | | | | 1 411742 | PackageInformationID 411744 |
| | | | | | | | PackageID 411746 | | | | | 0..1 411748 | PackageID 411750 |
| | | | | | | | PackageOrdinalNumberValue 411752 | | | | | 0..1 411754 | OrdinalNumberValue 411756 |
| | | | | | | | PackageNumberValue 411758 | | | | | 0..1 411760 | NumberValue 411762 |

FIG. 41-71

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PackageTypeCode 411764 | | | | | 0..1 411766 | PackageTypeCode 411768 |
| | | | | | | | PackagingLevelCode 411770 | | | | | 0..1 411772 | PackagingLevelCode 411774 |
| | | | | | | | PackageMarkingInstructionCode 411776 | | | | | 0..1 411778 | PackageMarkingInstructionCode 411780 |
| | | | | | | | PredecessorPackageID 411782 | | | | | 0..1 411784 | PackageID 411786 |
| | | | | | | | ItemAssignment 411788 | | | | | 0..n 411790 | ... |

FIG. 41-72

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ShipmentOrderItemID 411792 | | | | 1 411794 | BusinessTransactionDocumentItemID 411796 |
| | | | | | | | | Quantity 411798 | | | | 0..n 411800 | ... |
| | | | | | | | | | Quantity 411802 | | | 1 411804 | Quantity 411806 |
| | | | | | | | | | RoleCode 411808 | | | 0..1 411810 | QuantityRoleCode 411812 |
| | | | | | | | | | TypeCode 411814 | | | 0..1 411816 | QuantityTypeCode 411818 |

FIG. 41-73

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationUnitResourceInformationAssignment 411820 | | | | | 0..n 411822 | ... |
| | | | | | | | | ShipmentOrderResourceInformationID 411824 | | | | 1 411826 | ResourceInformationID 411828 |
| | | | | | | | | Quantity 411830 | | | | 0..n 411832 | ... |
| | | | | | | | | | Quantity 411834 | | | 1 411836 | Quantity 411838 |
| | | | | | | | | | RoleCode 411840 | | | 0..1 411842 | QuantityRoleCode 411844 |

FIG. 41-74

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 411846 | | | 0..1 411848 | QuantityTypeCode 411850 |
| | | | | | | | Quantity 411852 | | | | | 0..n 411854 | ... |
| | | | | | | | | Quantity 411856 | | | | 1 411858 | Quantity 411860 |
| | | | | | | | | RoleCode 411862 | | | | 0..1 411864 | QuantityRoleCode 411866 |
| | | | | | | | | TypeCode 411868 | | | | 0..1 411870 | QuantityTypeCode 411872 |
| Item 411874 | | | | | | Item 411876 | | | | | | 0..n 411878 | ... |
| | | | | | | | ID 411880 | | | | | 1 411882 | BusinessTransactionDocumentItemID 411884 |

FIG. 41-75

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OriginCountryCode 411886 | | | | | 0..1 411888 | CountryCode 411890 |
| | | | | | | | DestinationCountryCode 411892 | | | | | 0..1 411894 | CountryCode 411896 |
| | | | | | | | ShippingTypeCode 411898 | | | | | 0..1 411900 | ShippingTypeCode 411902 |
| | | | | | | | HaulageArrangerCode 411904 | | | | | 0..1 411906 | HaulageArrangerCode 411908 |
| | | | | | | | TemperatureMeasureInterval 411910 | | | | | 0..1 411912 | MeasureInterval 411914 |

FIG. 41-76

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationHandlingInstructionCode 411916 | | | | | 0..1 411918 | TransportationHandlingInstructionCode 411920 |
| | | | | | | | TransportationHandlingInstructionNote 411922 | | | | | 0..1 411924 | LONG_Note 411926 |
| ItemInformation 411928 | | | | | | | Amount 411930 | | | | | 0..n 411932 | ... |
| | | | | | | | | Amount 411934 | | | | 1 411936 | Amount 411938 |
| | | | | | | | | RoleCode 411940 | | | | 1 411942 | AmountRoleCode 411944 |

FIG. 41-77

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TextCollection 411946 | | | | | 0..1 411948 | ... |
| | | | | | | | | TextcCollection 411950 | | | | 1 411952 | TextCollection 411954 |
| | | | | | | | NatureOfCargo 411956 | | | | | 0..n 411958 | ... |
| | | | | | | | | ClassificationCode 411960 | | | | 1 411962 | NatureOfCargoClassificationCode 411964 |
| | | | | | | | Quantity 411966 | | | | | 0..n 411968 | ... |
| | | | | | | | | Quantity 411970 | | | | 1 411972 | Quantity 411974 |
| | | | | | | | | RoleCode 411976 | | | | 0..1 411978 | QuantityRoleCode 411980 |

FIG. 41-78

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TypeCode 411982 | | | | 0..1 411984 | QuantityTypeCode 411986 |
| | | | | | | | BusinessTransactionDocumentReference 411988 | | | | | 0..n 411990 | ... |
| | | | | | | | | BusinessTransactionDocumentReference 411992 | | | | 0..1 411994 | BusinessTransactionDocumentReference 411996 |

FIG. 41-79

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipRoleCode 411998 | | | | 0..1 412000 | BusinessTransactionDocumentRelationshipRoleCode 412002 |
| | | | | | | | | BusinessTransactionDocumentRelationshipTypeCode 412004 | | | | 0..1 412006 | BusinessTransactionDocumentRelationshipTypeCode 412008 |
| | | | | | | | | TransportationDocumentTypeCode 412010 | | | | 0..1 412012 | TransportationDocumentTypeCode 412014 |

FIG. 41-80

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentNote 412016 | | | | 0..1 412018 | SHORT_Note 412020 |
| | | | | | | | | TransportationDocumentID 412022 | | | | 0..1 412024 | TransportationDocumentID 412026 |
| | | | | | | | | DateTimePeriod 412028 | | | | 0..n 412030 | ... |
| | | | | | | | | | DateTimePeriod 412032 | | | 1 412034 | DateTimePeriod 412036 |
| | | | | | | | | | PeriodRoleCode 412038 | | | 1 412040 | PeriodRoleCode 412042 |

FIG. 41-81

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DangerousGoods 412044 | | | | | 0..n 412046 | ... |
| | | | | | | | | ID 412048 | | | | 0..1 412050 | DangerousGoodsID 412052 |
| | | | | | | | | RegulationsCode 412054 | | | | 0..1 412056 | DangerousGoodsRegulationsCode 412058 |
| | | | | | | | | HazardCode 412060 | | | | 0..1 412062 | DangerousGoodsHazardCode 412064 |
| | | | | | | | | FlashpointMeasureInterval 412066 | | | | 0..1 412068 | MeasureInterval 412070 |

FIG. 41-82

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PackagingGroupCode 412072 | | | | 0..1 412074 | DangerousGoodsPackagingGroupCode 412076 |
| | | | | | | | | EmergencySchedule 412078 | | | | 0..1 412080 | DangerousGoodsEmergencySchedule 412082 |
| | | | | | | | | TransportEmergencyCardCode 412084 | | | | 0..1 412086 | TransportEmergencyCardCode 412088 |
| | | | | | | | | DangerousGoodsLabelCode 412090 | | | | 0..1 412092 | DangerousGoodsLabelCode 412094 |

FIG. 41-83

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DangerousGoodsLabelCode2 412096 | | | | 0..1 412098 | DangerousGoodsLabelCode 412100 |
| | | | | | | | | DangerousGoodsLabelCode3 412102 | | | | 0..1 412104 | DangerousGoodsLabelCode 412106 |
| | | | | | | | | PackagingInstructionTypeCode 412108 | | | | 0..1 412110 | PackagingInstructionTypeCode 412112 |
| | | | | | | | | TransportMeansDescriptionCode 412114 | | | | 0..1 412116 | TransportMeansDescriptionCode 412118 |

FIG. 41-84

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationAuthorisationCode 412120 | | | | 0..1 412122 | DangerousGoodsTransportationAuthorisationCode 412124 |
| | | | | | | | | Quantity 412126 | | | | 0..n 412128 | ... |
| | | | | | | | | | Quantity 412130 | | | 1 412132 | Quantity 412134 |
| | | | | | | | | | RoleCode 412136 | | | 0..1 412138 | QuantityRoleCode 412140 |
| | | | | | | | | | TypeCode 412142 | | | 0..1 412144 | QuantityTypeCode 412146 |
| | | | | | | | | TextCollection 412148 | | | | 0..1 412150 | ... |

FIG. 41-85

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TextCollection 412152 | | | 1 412154 | TextCollection 412156 |
| | | | | | | | | TransportationUnitResourceInformationAssignment 412158 | | | | 0..n 412160 | ... |
| | | | | | | | | | ShipmentOrderResourceInformationID 412162 | | | 1 412164 | ResourceInformationID 412166 |
| | | | | | | | | | Quantity 412168 | | | 0..n 412170 | ... |
| | | | | | | | | | | Quantity 412172 | | 1 412174 | Quantity 412176 |

FIG. 41-86

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | RoleCode 412178 | | 0..1 412180 | QuantityRoleCode 412182 |
| | | | | | | | | | | TypeCode 412184 | | 0..1 412186 | QuantityTypeCode 412188 |
| | | | | | | | TransportationStageAssignment 412190 | | | | | 0..n 412192 | ... |
| | | | | | | | | ShipmentOrderTransportationStageID 412194 | | | | 1 412196 | TransportationStageID 412198 |
| | | | | | | | | Quantity 412200 | | | | 0..n 412202 | ... |
| | | | | | | | | | Quantity 412204 | | | 1 412206 | Quantity 412208 |

FIG. 41-87

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RoleCode 412210 | | | 0..1 412212 | QuantityRoleCode 412214 |
| | | | | | | | | | TypeCode 412216 | | | 0..1 412218 | QuantityTypeCode 412220 |
| | | | | | | | TransportationUnitResourceInformationAssignment 412222 | | | | | 0..n 412224 | ... |
| | | | | | | | | ShipmentOrderResourceInformationID 412226 | | | | 1 412228 | ResourceInformationID 412230 |
| | | | | | | | | Quantity 412232 | | | | 0..n 412234 | ... |

FIG. 41-88

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | Quantity 412236 | | | 1 412238 | Quantity 412240 |
| | | | | | | | | | RoleCode 412242 | | | 0..1 412244 | QuantityRoleCode 412246 |
| | | | | | | | | | TypeCode 412248 | | | 0..1 412250 | QuantityTypeCode 412252 |
| LocationInformation 412254 | | | | | | | Location 412256 | | | | | 0..n 412258 | ... |
| | | | | | | | | Location 412260 | | | | 1 412262 | BusinessTransactionDocumentLocation 412264 |
| | | | | | | | | RoleCode 412266 | | | | 1 412268 | LocationRoleCode 412270 |

FIG. 41-89

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TypeCode 412272 | | | | 0..1 412274 | LocationTypeCode 412276 |
| | | | | | | | | Name 412278 | | | | 0..1 412280 | MEDIUM_Name 412282 |
| | | | | | | | | DateTimePeriods 412284 | | | | 0..n 412286 | … |
| | | | | | | | | | RequestedFulfillmentPeriod 412288 | | | 0..1 412290 | DateTimePeriod 412292 |
| | | | | | | | | | AcceptableFulfillmentPeriod 412294 | | | 0..1 412296 | DateTimePeriod 412298 |

FIG. 41-90

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 412300 | | | 1 412302 | PeriodRoleCode 412304 |
| TransportGoodsInformation 412306 | | | | | | | ProductInformation 412308 | | | | | 0..n 412310 | ... |
| | | | | | | | | Product 412312 | | | | 1 412314 | BusinessTranscationDocumentProduct 412316 |
| | | | | | | | | ProductDescription 412318 | | | | 0..1 412320 | SHORT_Description 412322 |

FIG. 41-91

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationGoodsIdentification 412324 | | | | | 0..n 412326 | ... |
| | | | | | | | | TransportationGoodsIdentifierTypeCode 412328 | | | | 1 412330 | TransportationGoodsIdentifierTypeCode 412332 |
| | | | | | | | | LowerBoundaryTransportationGoodsID 412334 | | | | 1 412336 | TransportationGoodsID 412338 |

FIG. 41-92

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | UpperBoundaryTransportationGoodsID 412340 | | | | 0..1 412342 | TransportationGoodsID 412344 |
| TransportationChargesInformation 412346 | | | | | | TransportationChargesInformation 412348 | | | | | | 0..n 412350 | ... |
| | | | | | | | TransportationChargesUsageCode 412352 | | | | | 1 412354 | TransportationChargesUsageCode 412356 |
| | | | | | | | ShipmentOrderItemID 412358 | | | | | 0..1 412360 | BusinessTransactionDocumentItemID 412362 |

FIG. 41-93

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ShipmentOrderResourceInformationID 412364 | | | | | 0..1 412366 | ResourceInformationID 412368 |
| | | | | | | | ShipmentOrderPackagingID 412370 | | | | | 0..1 412372 | PackageInforamtionID 412374 |
| | | | | | | | ShipmentOrderTransportationStageID 412376 | | | | | 0..1 412378 | TransportationStageID 412380 |
| | | | | | | | TransportationCharges 412382 | | | | | 0..1 412384 | ... |

FIG. 41-94

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ID 412386 | | | | 1 412388 | TransportationChargesID 412390 |
| | | | | | | | | FreightAgreementID 412392 | | | | 1 412394 | FreightAgreementID 412396 |
| | | | | | | | | OriginCode 412398 | | | | 0..1 412400 | TransportationChargesOriginCode 412402 |
| | | | | | | | | TariffID 412404 | | | | 0..1 412406 | TransportationChargesTariffID 412408 |
| | | | | | | | | CalculationSheetID 412410 | | | | 0..1 412412 | TransportationChargesCalculationSheetID 412414 |

FIG. 41-95

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 412416 | | | | 0..n 412418 | ... |
| | | | | | | | | | Location 412420 | | | 1 412422 | BusinessTransactionDocumentLocation 412424 |
| | | | | | | | | | RoleCode 412426 | | | 1 412428 | LoactionRoleCode 412430 |
| | | | | | | | | | TypeCode 412432 | | | 0..1 412434 | LocationTypeCode 412436 |
| | | | | | | | | | Name 412438 | | | 0..1 412440 | MEDIUM_Name 412442 |
| | | | | | | | | | DateTimePeriod 412444 | | | 0..n 412446 | ... |

FIG. 41-96

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | RequestedFulfillmentPeriod 412448 | | 0..1 412450 | DateTimePeriod 412452 |
| | | | | | | | | | | AcceptableFulfillmentPeriod 412454 | | 0..1 412456 | DateTimePeriod 412458 |
| | | | | | | | | | | PeriodRoleCode 412460 | | 1 412462 | PeriodRoleCode 412464 |
| | | | | | | | | TextCollection 412466 | | | | 0..1 412468 | ... |
| | | | | | | | | | TextCollection 412470 | | | 1 412472 | TextCollection 412474 |

FIG. 41-97

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Currency 412476 | | | | 0..n 412478 | ... |
| | | | | | | | | | Code 412480 | | | 1 412482 | CurrencyCode 412484 |
| | | | | | | | | | RoleCode 412486 | | | 1 412488 | CurrencyRoleCode 412490 |
| | | | | | | | | | UsageCode 412492 | | | 0..1 412494 | CurrencyUsageCode 412496 |
| | | | | | | | | ExchangeRate 412498 | | | | 0..n 412500 | ... |
| | | | | | | | | | ExchangeRate 412502 | | | 1 412504 | ExchangeRate 412506 |

FIG. 41-98

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 412508 | | | 0..1 412510 | ExchangeRateTypeCode 412512 |
| | | | | | | | | PercentElement 412514 | | | | 0..n 412516 | ... |
| | | | | | | | | | PercentRoleCode 412518 | | | 1 412520 | PercentRoleCode 412522 |
| | | | | | | | | | Percent 412524 | | | 1 412526 | Percent 412528 |
| | | | | | | | | | TransportationChargesPercentCalculationBaseCode 412530 | | | 0..1 412532 | TransportationChargesPercentCalculationBaseCode 412534 |

FIG. 41-99

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | StatusCode 412536 | | | 0..1 412538 | TransportationChargesPercentElementStatusCode 412540 |
| | | | | | | | | DateTime Period 412542 | | | | 0..n 412544 | … |
| | | | | | | | | | DateTime Period 412546 | | | 1 412548 | DateTimePeriod 412550 |
| | | | | | | | | | PeriodRoleCode 412552 | | | 1 412554 | PeriodRoleCode 412556 |

FIG. 41-100

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 412558 | | | | 0..n 412560 | ... |
| | | | | | | | | | BusinessTransactionDocumentReference 412562 | | | 0..1 412564 | BusinessTransactionDocumentReference 412566 |
| | | | | | | | | | BusinessTransactionDocumentRelationshipRoleCode 412568 | | | 0..1 412570 | BusinessTransactionDocumentRelationshipRoleCode 412572 |

FIG. 41-101

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | BusinessTransactionDocumentRelationshipTypeCode 412574 | | | 0..1 412576 | BusinessTransactionDocumentRelationshipTypeCode 412578 |
| | | | | | | | | | TransportationDocumentTypeCode 412580 | | | 0..1 412582 | TransportationDocumentTypeCode 412584 |
| | | | | | | | | | TransportationDocumentNote 412586 | | | 0..1 412588 | SHORT_Note 412590 |

FIG. 41-102

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentID 412592 | | | 0..1 412594 | TransportationDocumentID 412596 |
| | | | | | | | | TaxDetail 412598 | | | | 0..n 412600 | ... |
| | | | | | | | | | ProductTax 412602 | | | 1 412604 | ProductTax 412606 |
| | | | | | | | | PaymentInstruction 412608 | | | | 0..n 412610 | ... |
| | | | | | | | | | PaymentInstruction 412612 | | | 1 412614 | PaymentInstruction 412616 |

FIG. 41-103

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesElementCategoryCode 412618 | | | 0..1 412620 | TransportationChargesElementCategoryCode 412622 |
| | | | | | | | | | TransportationChargesElementSubCategoryCode 412624 | | | 0..1 412626 | TransportationChargesElementSubCategoryCode 412628 |
| | | | | | | | | | TransportationChargesPaymentArrangementCode 412630 | | | 0..1 412632 | TransportationChargesPaymentArrangementCode 412634 |

FIG. 41-104

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | CashDiscountTerms 412636 | | | | 0..n 412638 | ... |
| | | | | | | | | | CashDiscountTerms 412640 | | | 1 412642 | CashDiscountTerms 412644 |
| | | | | | | | | | TransportationChargesElementCategoryCode 412646 | | | 0..1 412648 | TransportationChargesElementCategoryCode 412650 |
| | | | | | | | | | TransportationChargesElementSubCategoryCode 412652 | | | 0..1 412654 | TransportationChargesElementSubCategoryCode 412656 |

FIG. 41-105

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Element 412658 | | | | 0..n 412660 | ... |
| | | | | | | | | | CategoryCode 412662 | | | 1 412664 | TransportationChargesElementCategoryCode 412666 |
| | | | | | | | | | SubCategoryCode 412668 | | | 1 412670 | TransportationChargesElementSubCategoryCode 412672 |
| | | | | | | | | | TypeCode 412674 | | | 1 412676 | TransportationChargesElementTypeCode 412678 |

FIG. 41-106

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | CalculationResolutionCode 412680 | | | 1 412682 | TransportationChargesElementCalculationResolutionCode 412684 |
| | | | | | | | | | TransportationChargesPaymentArrangementCode 412686 | | | 0..1 412688 | TransportationChargesPaymentArrangementCode 412690 |
| | | | | | | | | | Location 412692 | | | 0..n 412694 | ... |
| | | | | | | | | | | Location 412696 | | 1 412698 | BusinessTransactionDocumentLocation 412700 |

FIG. 41-107

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | RoleCode 412702 | | 1 412704 | LocationRoleCode 412706 |
| | | | | | | | | | | TypeCode 412708 | | 0..1 412710 | LocationTypeCode 412712 |
| | | | | | | | | | | Name 412714 | | 0..1 412716 | MEDIUM_Name 412718 |
| | | | | | | | | | | DateTimePeriod 412720 | | 0..n 412722 | ... |
| | | | | | | | | | | | RequestedFulfillmentPeriod 412724 | 0..1 412726 | DateTimePeriod 412728 |

FIG. 41-108

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | | AcceptableFulfillmentPeriod 412730 | 0..1 412732 | DateTimePeriod 412734 |
| | | | | | | | | | | | PeriodRoleCode 412736 | 1 412738 | PeriodRoleCode 412740 |
| | | | | | | | | | TextCollection 412742 | | | 0..1 412744 | ... |
| | | | | | | | | | | TextCollection 412746 | | 1 412748 | TextCollection 412750 |
| | | | | | | | | | Currency 412752 | | | 0..n 412754 | ... |
| | | | | | | | | | | Code 412756 | | 1 412758 | CurrencyCode 412760 |

FIG. 41-109

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | RoleCode 412762 | | 1 412764 | CurrencyRoleCode 412766 |
| | | | | | | | | | | UsageCode 412768 | | 0..1 412770 | CurrencyUsageCode 412772 |
| | | | | | | | | | RateElement 412774 | | | 0..n 412776 | ... |
| | | | | | | | | | | ID 412778 | | 1 412780 | TransportationChargesElementRateElementID 412782 |
| | | | | | | | | | | Amount 412784 | | 1 412786 | Amount 412788 |
| | | | | | | | | | | BaseQuantity 412790 | | 1 412792 | Quantity 412794 |

FIG. 41-110

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TransportationChargesRateTypeCode 412796 | | 0..1 412798 | TransportationChargesRateTypeCode 412800 |
| | | | | | | | | | | TransportationChargesRateRoleCode 412802 | | 1 412804 | TransportationChargesRateRoleCode 412806 |
| | | | | | | | | | | TransportationChargesRateElementStatusCode 412808 | | 0..1 412810 | TransportationChargesRateElementStatusCode 412812 |
| | | | | | | | | | PercentElement 412814 | | | 0..n 412816 | ... |

FIG. 41-111

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | PercentRoleCode 412818 | | 1 412820 | PercentRoleCode 412822 |
| | | | | | | | | | | Percent 412824 | | 1 412826 | Percent 412828 |
| | | | | | | | | | | TransportationChargesPercentCalculationBaseCode 412830 | | 0..1 412832 | TransportationChargesPercentCalculationBaseCode 412834 |
| | | | | | | | | | | StatusCode 412836 | | 0..1 412838 | TransportationChargesPercentElementStatusCode 412840 |

FIG. 41-112

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | AmountElement 412842 | | | 0..n 412844 | ... |
| | | | | | | | | | | Amount 412846 | | 1 412848 | Amount 412850 |
| | | | | | | | | | | AmountRoleCode 412852 | | 1 412854 | AmountRoleCode 412856 |
| | | | | | | | | | | TransportationChargesAmountElementStatusCode 412858 | | 0..1 412860 | TransportationChargesAmountElementStatusCode 412862 |
| | | | | | | | | | | RateElementAssignment 412864 | | 0..n 412866 | ... |

FIG. 41-113

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | | TransportationChargesElementRateElementID 412868 | 1 412870 | TransportationChargesElementRateElementID 412872 |
| | | | | | | | | | CalculationBase 412874 | | | 0..n 412876 | ... |
| | | | | | | | | | | TransportationChargesElementCalculationBaseCode 412878 | | 1 412880 | TransportationChargesElementCalculationBaseCode 412882 |
| | | | | | | | | | | BaseQuantity 412884 | | 0..1 412886 | Quantity 412888 |

FIG. 41-114

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | BaseQuantityRoleCode 412890 | | 0..1 412892 | QuantityRoleCode 412894 |
| | | | | | | | | | | BaseQuantityTypeCode 412896 | | 0..1 412898 | QuantityTypeCode 412900 |
| | | | | | | | | | TaxDetail 412902 | | | 0..n 412904 | ... |
| | | | | | | | | | | ProductTax 412906 | | 1 412908 | ProductTax 412910 |
| | | | | | | | | | DateTimePeriod 412912 | | | 0..n 412914 | ... |
| | | | | | | | | | | DateTimePeriod 412916 | | 1 412918 | DateTimePeriod 412920 |

FIG. 41-115

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | PeriodRoleCode 412922 | | 1 412924 | PeriodRoleCode 412926 |
| | | | | | | | | | CostDistribution 412928 | | | 0..n 412930 | ... |
| | | | | | | | | | | AccountingCodingBlockAssignment 412932 | | 1 412934 | AccountingCodingBlockAssignment 412936 |

FIG. 42-1

| Package | level1 | level2 | level3 | level4 | level5 | level6 | Cardinality | Data Type Name |
|---|---|---|---|---|---|---|---|---|
| FreightOrderExecutionCancelRequestMessage 42000 | FreightOrderExecutionCancelRequestMessage 42002 | | | | | | | FreightOrderExecutionCancelRequestMessage 42004 |
| MessageHeader 42006 | | MessageHeader 42008 | | | | | 1 42010 | BusinessDocumentMessageHeader 42012 |
| FreightOrder 42014 | | FreightOrder 42016 | | | | | 1 42018 | … |
| | | | ID 42020 | | | | 1 42022 | BusinessTransactionDocumentID 42024 |
| Request 42026 | | | Request 42028 | | | | 1 42030 | … |

FIG. 42-2

| Package | level1 | level2 | level3 | level4 | level5 | level6 | Cardinality | Data Type Name |
|---|---|---|---|---|---|---|---|---|
| Business-Transaction-DocumentReference 42032 | | | | Business-Transaction-DocumentReference 42034 | | | 0..n 42036 | ... |
| | | | | | BusinessTransactionDocumentReference 42038 | | 0..1 42040 | BusinessTransactionDocumentReference 42042 |
| | | | | | BusinessTransactionDocumentRelationshipRoleCode 42044 | | 0..1 42046 | BusinessTransactionDocumentRelationshipRoleCode 42048 |
| | | | | | BusinessTransactionDocumentRelationshipTypeCode 42050 | | 0..1 42052 | BusinessTransactionDocumentRelationshipTypeCode 42054 |

FIG. 42-3

| Package | level1 | level2 | level3 | level4 | level5 | level6 | Cardinality | Data Type Name |
|---|---|---|---|---|---|---|---|---|
| | | | | | Transportation-DocumentTypeCode 42056 | | 0..1 42058 | TransportationDocument-TypeCode 42060 |
| | | | | | Transportation-DocumentNote 42062 | | 0..1 42064 | SHORT_Note 42066 |
| | | | | | Transportation-DocumentID 42068 | | 0..1 42070 | TransportationDocumentID 42072 |
| | | | | | DateTimePeriod 42074 | | 0..n 42076 | ... |
| | | | | | | DateTimePeriod 42078 | 1 42080 | DateTimePeriod 42082 |
| | | | | | | PeriodRoleCode 42084 | 1 42086 | PeriodRoleCode 42088 |

FIG. 43-1

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| FreightOrderExecutionConfirmationMessage 430000 | FreightOrderExecutionConfirmationMessage 430002 | | | | | | | | | | | | FreightOrderExecutionConfirmation Message 430004 |
| MessageHeader 430006 | | Message Header 430008 | | | | | | | | | | 1..1 430010 | BusinessDocumentMessageHeader 430012 |
| FreightOrder Execution 430014 | | FreightOrderExecution 430016 | | | | | | | | | | 1..1 430018 | ... |
| | | | @actioncode 430020 | | | | | | | | | 1..1 430022 | ActionCode 430024 |

FIG. 43-2

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | ID 430026 | | | | | | | | | 1..1 430028 | BusinessTransactionDocumentID 430030 |
| Confirmation 430032 | | | Confirmation 430034 | | | | | | | | | 1..1 430036 | ... |
| | | | | AcceptanceStatusCode 430038 | | | | | | | | 1 430040 | AcceptanceStatusCode 430042 |
| HeaderInformation 430044 | | | | DateTimePeriods 430046 | | | | | | | | 0..n 430048 | ... |
| | | | | | RequestedFulfillmentPeriod 430050 | | | | | | | 0..1 430052 | DateTimePeriod 430054 |

FIG. 43-3

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | AcceptableFulfillmentPeriod 430056 | | | | | | | 0..1 430058 | DateTimePeriod 430060 |
| | | | | | PeriodRoleCode 430062 | | | | | | | 1..1 430064 | PeriodRoleCode 430066 |
| | | | | NatureOfCargo 430068 | | | | | | | | 0..n 430070 | ... |
| | | | | | ClassificationCode 430072 | | | | | | | 1..1 430074 | NatureOfCargoClassificationCode 430076 |
| | | | | TotalQuantity 430078 | | | | | | | | 0..n 430080 | ... |
| | | | | | Quantity 430082 | | | | | | | 1 430084 | Quantity 430086 |

FIG. 43-4

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | RoleCode 430088 | | | | | | | 0..1 430090 | QuantityRoleCode 430092 |
| | | | | | TypeCode 430094 | | | | | | | 0..1 430096 | QuantityTypeCode 430098 |
| | | | | TotalAmount 430100 | | | | | | | | 0..n 430102 | ... |
| | | | | | Amount 430104 | | | | | | | 1..1 430106 | Amount 430108 |
| | | | | | RoleCode 430110 | | | | | | | 1..1 430112 | AmountRoleCode 430114 |
| | | | | TextCollection 430116 | | | | | | | | 0..1 430118 | ... |
| | | | | | TextCollection 430120 | | | | | | | 1..1 430122 | TextCollection 430124 |

FIG. 43-5

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | BusinessTransactionDocumentReference 430126 | | | | | | | | 0..n 430128 | ... |
| | | | | | BusinessTransactionDocumentReference 430130 | | | | | | | 0..1 430132 | BusinessTransactionDocumentReference 430134 |
| | | | | | BusinessTransactionDocumentRelationshipRoleCode 430136 | | | | | | | 0..1 430138 | BusinessTransactionDocumentRelationshipRoleCode 430140 |

FIG. 43-6

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentRelationshipTypeCode 430142 | | | | | | | 0..1 430144 | BusinessTransactionDocumentRelationshipTypeCode 430146 |
| | | | | | TransportationDocumentTypeCode 430148 | | | | | | | 0..1 430150 | TransportationDocumentTypeCode 430152 |
| | | | | | TransportationDocumentNote 430154 | | | | | | | 0..1 430156 | SHORT_Note 430158 |
| | | | | | TransportationDocumentID 430160 | | | | | | | 0..1 430162 | TransportationDocumentID 430164 |

FIG. 43-7

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | DateTimePeriod 430166 | | | | | | | 0..n 430168 | ... |
| | | | | | | DateTimePeriod 430170 | | | | | | 1..1 430172 | DateTimePeriod 430174 |
| | | | | | | PeriodRoleCode 430176 | | | | | | 1..1 430178 | PeriodRoleCode 430180 |
| GovernmentalRequirementInformation 430182 | | | | GovernmentalProcedure 430184 | | | | | | | | 0..n 430186 | ... |
| | | | | | TransportationGovernmentAgencyTypeCode 430188 | | | | | | | 0..1 430190 | TransportationGovernmentAgencyTypeCode 430192 |

FIG. 43-8

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationMovementTypeCode 430194 | | | | | | | 0..1 430196 | TransportationMovementTypeCode 430198 |
| | | | | | TransportationGovernmentAgencyInvolvementStatusCode 430200 | | | | | | | 0..1 430202 | TransportationGovernmentAgencyInvolvementStatusCode 430204 |
| | | | | | TransportationGovernmentAgencyActionCode 430206 | | | | | | | 0..1 430208 | TransportationGovernmentAgencyActionCode 430210 |

FIG. 43-9

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationGovernmentAgencyProcedureStatusCode 430212 | | | | | | | 0..1 430214 | TransportationGovernmentAgencyProcedureStatusCode 430216 |
| | | | | | Location 430218 | | | | | | | 0..n 430220 | ... |
| | | | | | | Location 430222 | | | | | | 1..1 430224 | BusinessTransactionDocumentLocation 430226 |
| | | | | | | RoleCode 430228 | | | | | | 1..1 430230 | LocationRoleCode 430232 |
| | | | | | | TypeCode 430234 | | | | | | 0..1 430236 | LocationTypeCode 430238 |

FIG. 43-10

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Name 430240 | | | | | | 0..1 430242 | MEDIUM_Name 430244 |
| | | | | | DateTime Period 430246 | | | | | | | 0..n 430248 | ... |
| | | | | | | DateTime Period 430250 | | | | | | 1..1 430252 | DateTimePeriod 430254 |
| | | | | | | PeriodRoleCode 430256 | | | | | | 1..1 430258 | PeriodRole Code 430260 |
| | | | | | Seal 430262 | | | | | | | 0..n 430264 | ... |
| | | | | | | ID 430266 | | | | | | 0..1 430268 | SealID 430270 |
| | | | | | | PartyRole Code 430272 | | | | | | 0..1 430274 | PartyRoleCode 430276 |

FIG. 43-11

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | PartyFormattedName 430278 | | | | | | 0..1 430280 | LONG_Name 430282 |
| | | | | | | StatusCode 430284 | | | | | | 0..1 430286 | SealStatusCode 430288 |
| | | | | | TextCollection 430290 | | | | | | | 0..1 430292 | ... |
| | | | | | | TextCollection 430294 | | | | | | 1..1 430296 | TextCollection 430298 |
| | | | | | TransportationDocumentInformation 430300 | | | | | | | 0..n 430302 | ... |

FIG. 43-12

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentTypeCode 430304 | | | | | | 0..1 430306 | TransportationDocumentTypeCode 430308 |
| | | | | | | TransportationDocumentNote 430310 | | | | | | 0..1 430312 | SHORT_Note 430314 |
| | | | | | | TransportationDocumentID 430316 | | | | | | 0..1 430318 | TransportationDocumentID 430320 |
| | | | | | | TransportationDocumentStatusCode 430322 | | | | | | 0..1 430324 | TransportationDocumentStatusCode 430326 |

FIG. 43-13

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | LanguageCode 430328 | | | | | | 0..1 430330 | LanguageCode 430332 |
| | | | | | | CommunicationMediumTypeCode 430334 | | | | | | 0..1 430336 | CommunicationMediumTypeCode 430338 |
| | | | | | | RequiredIndicator 430340 | | | | | | 1 430342 | Indicator 430344 |
| | | | | | | OutputCopyNumberValue 430346 | | | | | | 0..1 430348 | NumberValue 430350 |
| | | | | | | OutputOriginalNumberValue 430352 | | | | | | 0..1 430354 | NumberValue 430356 |

FIG. 43-14

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTime Period 430358 | | | | | | 0..n 430360 | ... |
| | | | | | | | DateTime Period 430362 | | | | | 1..1 430364 | DateTimePeriod 430366 |
| | | | | | | | PeriodRoleCode 430368 | | | | | 1..1 430370 | PeriodRoleCode 430372 |
| PartyInformation 430374 | | | | Party 430376 | | | | | | | | 0..n 430378 | ... |
| | | | | | Party 430380 | | | | | | | 1 430382 | BusinessTransactionDocumentParty 430384 |
| | | | | | RoleCode 430386 | | | | | | | 1 430388 | PartyRoleCode 430390 |

FIG. 43-15

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | FormattedName 430392 | | | | | | | 0..1 430394 | LONG_Name 430396 |
| | | | | | BusinessTransactionDocumentReference 430398 | | | | | | | 0..n 430400 | ... |
| | | | | | | BusinessTransactionDocumentReference 430402 | | | | | | 0..1 430404 | BusinessTransactionDocumentReference 430406 |

FIG. 43-16

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipRoleCode 430408 | | | | | | 0..1 430410 | BusinessTransactionDocumentRelationshipRoleCode 430412 |
| | | | | | | BusinessTransactionDocumentRelationshipTypeCode 430414 | | | | | | 0..1 430416 | BusinessTransactionDocumentRelationshipTypeCode 430418 |
| | | | | | | TransportationDocumentTypeCode 430420 | | | | | | 0..1 430422 | TransportationDocumentTypeCode 430424 |

FIG. 43-17

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentNote 430426 | | | | | | 0..1 430428 | SHORT_Note 430430 |
| | | | | | | TransportationDocumentID 430432 | | | | | | 0..1 430434 | TransportationDocumentID 430436 |
| | | | | | | DateTimePeriod 430438 | | | | | | 0..n 430440 | ... |
| | | | | | | | DateTimePeriod 430442 | | | | | 1 430444 | DateTimePeriod 430446 |
| | | | | | | | PeriodRoleCode 430448 | | | | | 1 430450 | PeriodRoleCode 430452 |

FIG. 43-18

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationStageInformation 430454 | | | | TransportationStage 430456 | | | | | | | | 0..n 430458 | ... |
| | | | | | ID 430460 | | | | | | | 1 430462 | TransportationStageID 430464 |
| | | | | | OrdinalNumberValue 430466 | | | | | | | 0..1 430468 | OrdinalNumberValue 430470 |
| | | | | | TypeCode 430472 | | | | | | | 0..1 430474 | TransportationStageTypeCode 430476 |
| | | | | | JourneyID 430478 | | | | | | | 0..1 430480 | JourneyID 430482 |

FIG. 43-19

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportModeCode 430484 | | | | | | | 0..1 430486 | TransportModeCode 430488 |
| | | | | | TransportMeansDescriptionCode 430490 | | | | | | | 0..1 430492 | TransportMeansDescriptionCode 430494 |
| | | | | | TransportMeansDescription 430496 | | | | | | | 0..1 430498 | SHORT_Description 430500 |
| | | | | | TransportMeansID 430502 | | | | | | | 0..1 430504 | TransportMeansID 430506 |

FIG. 43-20

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportMeansHomeCountryCode 430508 | | | | | | | 0..1 430510 | CountryCode 430512 |
| | | | | | TransportMeansOwnershipTypeCode 430514 | | | | | | | 0..1 430516 | TransportMeansOwnershipTypeCode 430518 |
| | | | | | CarrierStandardID 430520 | | | | | | | 0..1 430522 | PartyStandardID 430524 |
| | | | | | CarrierFormattedName 430526 | | | | | | | 0..1 430528 | LONG_Name 430530 |

FIG. 43-21

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationTransitDirectionCode 430532 | | | | | | | 0..1 430534 | TransportationTransitDirectionCode 430536 |
| | | | | | CalculatedDistanceMeasure 430538 | | | | | | | 0..1 430540 | Measure 430542 |
| | | | | | GivenDistanceMeasure 430544 | | | | | | | 0..1 430546 | Measure 430548 |
| | | | | | ContactInformation 430550 | | | | | | | 0..n 430552 | ... |
| | | | | | | ContactPersonFunctionTypeCode 430554 | | | | | | 1..1 430556 | ContactPersonFunctionTypeCode 430558 |

FIG. 43-22

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Address 430560 | | | | | | 1..1 430562 | Address 430564 |
| | | | | | Quantity 430566 | | | | | | | 0..n 430568 | ... |
| | | | | | | Quantity 430570 | | | | | | 1 430572 | Quantity 430574 |
| | | | | | | RoleCode 430576 | | | | | | 0..1 430578 | QuantityRoleCode 430580 |
| | | | | | | TypeCode 430582 | | | | | | 0..1 430584 | QuantityTypeCode 430586 |
| | | | | | Party 430588 | | | | | | | 1..n 430590 | ... |
| | | | | | | Party 430592 | | | | | | 1 430594 | BusinessTransactionDocumentParty 430596 |

FIG. 43-23

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | RoleCode 430598 | | | | | | 1 430600 | PartyRoleCode 430602 |
| | | | | | | FormattedName 430604 | | | | | | 0..1 430606 | LONG_Name 430608 |
| | | | | | | TransportationDocumentInformation 430610 | | | | | | 0..n 430612 | ... |
| | | | | | | | TransportationDocumentTypeCode 430614 | | | | | 0..1 430616 | TransportationDocumentTypeCode 430618 |
| | | | | | | | TransportationDocumentNote 430620 | | | | | 0..1 430622 | SHORT_Note 430624 |

FIG. 43-24

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentID 430626 | | | | | 0..1 430628 | TransportationDocumentID 430630 |
| | | | | | | | TransportationDocumentStatusCode 430632 | | | | | 0..1 430634 | TransportationDocumentStatusCode 430636 |
| | | | | | | | LanguageCode 430638 | | | | | 0..1 430640 | LanguageCode 430642 |
| | | | | | | | CommunicationMediumTypeCode 430644 | | | | | 0..1 430646 | CommunicationMediumTypeCode 430648 |
| | | | | | | | RequiredIndicator 430650 | | | | | 1 430652 | Indicator 430654 |

FIG. 43-25

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OutputCopyNumberValue 430656 | | | | | 0..1 430658 | NumberValue 430660 |
| | | | | | | | OutputOriginalNumberValue 430662 | | | | | 0..1 430664 | NumberValue 430666 |
| | | | | | | | DateTimePeriod 430668 | | | | | 0..n 430670 | ... |
| | | | | | | | | DateTimePeriod 430672 | | | | 1 430674 | DateTimePeriod 430676 |
| | | | | | | | | PeriodRoleCode 430678 | | | | 1 430680 | PeriodRoleCode 430682 |

FIG. 43-26

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentReference 430684 | | | | | | 0..n 430686 | ... |
| | | | | | | | BusinessTransactionDocumentReference 430688 | | | | | 0..1 430690 | BusinessTransactionDocumentReference 430692 |
| | | | | | | | BusinessTransactionDocumentRelationshipRoleCode 430694 | | | | | 0..1 430696 | BusinessTransactionDocumentRelationshipRoleCode 430698 |

FIG. 43-27

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentRelationshipTypeCode 430700 | | | | | 0..1 430702 | BusinessTransactionDocumentRelationshipTypeCode 430704 |
| | | | | | | | TransportationDocumentTypeCode 430706 | | | | | 0..1 430708 | TransportationDocumentTypeCode 430710 |
| | | | | | | | TransportationDocumentNote 430712 | | | | | 0..1 430714 | SHORT_Note 430716 |
| | | | | | | | TransportationDocumentID 430718 | | | | | 0..1 430720 | TransportationDocumentID 430722 |

FIG. 43-28

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTime Period 430724 | | | | | 0..n 430726 | ... |
| | | | | | | | | DateTime Period 430728 | | | | 1..1 430730 | DateTimePeriod 430732 |
| | | | | | | | | PeriodRoleCode 430734 | | | | 1..1 430736 | PeriodRole Code 430738 |
| | | | | | Location 430740 | | | | | | | 1..n 430742 | ... |
| | | | | | | Location 430744 | | | | | | 1 430746 | BusinessTransactionDocumentLocation 430748 |
| | | | | | | RoleCode 430750 | | | | | | 1 430752 | LocationRoleCode 430754 |

FIG. 43-29

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TypeCode 430756 | | | | | | 0..1 430758 | LocationTypeCode 430760 |
| | | | | | | Name 430762 | | | | | | 0..1 430764 | MEDIUM_Name 430766 |
| | | | | | | DateTimePeriods 430768 | | | | | | 0..n 430770 | ... |
| | | | | | | | RequestDateTimePeriod 430772 | | | | | 0..1 430774 | DateTimePeriod 430776 |
| | | | | | | | AcceptableDateTimePeriod 430778 | | | | | 0..1 430780 | DateTimePeriod 430782 |
| | | | | | | | PeriodRoleCode 430784 | | | | | 1..1 430786 | PeriodRoleCode 430788 |

FIG. 43-30

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | Seal 430790 | | | | | | | 0..n 430792 | ... |
| | | | | | | ID 430794 | | | | | | 1 430796 | SealID 430798 |
| | | | | | | PartyRoleCode 430800 | | | | | | 0..1 430802 | PartyRoleCode 430804 |
| | | | | | | PartyFormattedName 430806 | | | | | | 0..1 430808 | LONG_Name 430810 |
| | | | | | | StatusCode 430812 | | | | | | 0..1 430814 | SealStatusCode 430816 |
| | | | | | TextCollection 430818 | | | | | | | 0..1 430820 | ... |
| | | | | | | TextCollection 430822 | | | | | | 1..1 430824 | TextCollection 430826 |

FIG. 43-31

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentReference 430828 | | | | | | | 0..n 430830 | ... |
| | | | | | | BusinessTransactionDocumentReference 430832 | | | | | | 0..1 430834 | BusinessTransactionDocumentReference 430836 |
| | | | | | | BusinessTransactionDocumentRelationshipRoleCode 430838 | | | | | | 0..1 430840 | BusinessTransactionDocumentRelationshipRoleCode 430842 |

FIG. 43-32

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipTypeCode 430844 | | | | | | 0..1 430846 | BusinessTransactionDocumentRelationshipTypeCode 430848 |
| | | | | | | TransportationDocumentTypeCode 430850 | | | | | | 0..1 430852 | TransportationDocumentTypeCode 430854 |
| | | | | | | TransportationDocumentNote 430856 | | | | | | 0..1 430858 | SHORT_Note 430860 |
| | | | | | | TransportationDocumentID 430862 | | | | | | 0..1 430864 | TransportationDocumentID 430866 |

FIG. 43-33

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTime Period 430868 | | | | | | 0..n 430870 | ... |
| | | | | | | | DateTime Period 430872 | | | | | 1..1 430874 | DateTimePeriod 430876 |
| | | | | | | | PeriodRoleCode 430878 | | | | | 1 430880 | PeriodRole Code 430882 |
| | | | | | TransportationServiceRequirement 430884 | | | | | | | 1..1 430886 | ... |
| | | | | | | TransportationServiceRequirementCode 430888 | | | | | | 0..1 430890 | TransportationServiceRequirement Code 430892 |

FIG. 43-34

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | AdditionalTransportationServiceRequirementCode 430894 | | | | | | 0..1 430896 | TransportationServiceRequirementCode 430898 |
| | | | | | | TransportationContractConditionCode 430900 | | | | | | 0..1 430902 | TransportationContractConditionCode 430904 |
| | | | | | | TransportServiceLevelCode 430906 | | | | | | 0..1 430908 | TransportServiceLevelCode 430910 |
| | | | | | | NatureOfCargoClassificationCode 430912 | | | | | | 0..1 430914 | NatureOfCargoClassificationCode 430916 |

FIG. 43-35

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationUnitResourceInformation 430918 | | | | TransportationUnitResourceInformation 430920 | | | | | | | | 0..n 430922 | ... |
| | | | | | ID 430924 | | | | | | | 1 430926 | ResourceInformationID 430928 |
| | | | | | ResourceNumberValue 430930 | | | | | | | 0..1 430932 | NumberValue 430934 |
| | | | | | ResourceID 430936 | | | | | | | 0..1 430938 | ResourceID 430940 |
| | | | | | ResourceHomeCountryCode 430942 | | | | | | | 0..1 430944 | CountryCode 430946 |

FIG. 43-36

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationUnitResourceCategoryCode 430948 | | | | | | | 0..1 430950 | TransportationUnitResourceCategoryCode 430952 |
| | | | | | TransportationUnitResourceTypeCode 430954 | | | | | | | 0..1 430956 | TransportationUnitResourceTypeCode 430958 |
| | | | | | FillLevelCode 430960 | | | | | | | 0..1 430962 | FillLevelCode 430964 |
| | | | | | ShippingTypeCode 430966 | | | | | | | 0..1 430968 | ShippingTypeCode 430970 |

FIG. 43-37

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | HaulageArrangerCode 430972 | | | | | | | 0..1 430974 | HaulageArrangerCode 430976 |
| | | | | | TransportationHandlingInstructionCode 430978 | | | | | | | 0..1 430980 | TransportationHandlingInstructionCode 430982 |
| | | | | | TransportationHandlingInstructionNote 430984 | | | | | | | 0..1 430986 | LONG_Note 430988 |
| | | | | | TransportationStageAssignment 430990 | | | | | | | 0..n 430992 | ... |

FIG. 43-38

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | FreightOrderTransportationStageID 430994 | | | | | | 1..1 430996 | TransportationStageID 430998 |
| | | | | | AttachedEquipment 431000 | | | | | | | 0..n 431002 | ... |
| | | | | | | FreightOrderResourceInformationD 431004 | | | | | | 1..1 431006 | ResourceID 431008 |
| | | | | | Quantity 431010 | | | | | | | 0..n 431012 | ... |
| | | | | | | Quantity 431014 | | | | | | 1 431016 | Quantity 431018 |

FIG. 43-39

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | RoleCode 431020 | | | | | | 0..1 431022 | QuantityRoleCode 431024 |
| | | | | | | TypeCode 431026 | | | | | | 0..1 431028 | QuantityTypeCode 431030 |
| | | | | | Seal 431032 | | | | | | | 0..n 431034 | ... |
| | | | | | | ID 431036 | | | | | | 1 431038 | SealID 431040 |
| | | | | | | PartyRoleCode 431042 | | | | | | 0..1 431044 | PartyRoleCode 431046 |
| | | | | | | PartyFormattedName 431048 | | | | | | 0..1 431050 | LONG_Name 431052 |
| | | | | | | StatusCode 431054 | | | | | | 0..1 431056 | SealStatusCode 431058 |

FIG. 43-40

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentReference 431060 | | | | | | | 0..n 431062 | ... |
| | | | | | | BusinessTransactionDocumentReference 431064 | | | | | | 0..1 431066 | BusinessTransactionDocumentReference 431068 |
| | | | | | | BusinessTransactionDocumentRelationshipRoleCode 431070 | | | | | | 0..1 431072 | BusinessTransactionDocumentRelationshipRoleCode 431074 |

FIG. 43-41

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipTypeCode 431076 | | | | | | 0..1 431078 | BusinessTransactionDocumentRelationshipTypeCode 431080 |
| | | | | | | TransportationDocumentTypeCode 431082 | | | | | | 0..1 431084 | TransportationDocumentTypeCode 431086 |
| | | | | | | TransportationDocumentNote 431088 | | | | | | 0..1 431090 | SHORT_Note 431092 |
| | | | | | | TransportationDocumentID 431094 | | | | | | 0..1 431096 | TransportationDocumentID 431098 |

FIG. 43-42

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTime Period 431100 | | | | | | 0..n 431102 | ... |
| | | | | | | | DateTime Period 431104 | | | | | 1..1 431106 | DateTimePeriod 431108 |
| | | | | | | | PeriodRoleCode 431110 | | | | | 1..1 431112 | PeriodRole Code 431114 |
| | | | | | TextCollection 431116 | | | | | | | 0..1 431118 | ... |
| | | | | | | TextCollection 431120 | | | | | | 1..1 431122 | TextCollection 431124 |
| | | | | | Party 431126 | | | | | | | 1..n 431128 | ... |

FIG. 43-43

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Party 431130 | | | | | | 1..1 431132 | BusinessTransactionDocumentParty 431134 |
| | | | | | | RoleCode 431136 | | | | | | 1..1 431138 | PartyRoleCode 431140 |
| | | | | | Location 431142 | | | | | | | 0..n 431144 | ... |
| | | | | | | Location 431146 | | | | | | 1 431148 | BusinessTransactionDocumentLocation 431150 |
| | | | | | | RoleCode 431152 | | | | | | 1 431154 | LocationRoleCode 431156 |
| | | | | | | TypeCode 431158 | | | | | | 0..1 431160 | LocationTypeCode 431162 |

FIG. 43-44

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Name 431164 | | | | | | 0..1 431166 | MEDIUM_Name 431168 |
| | | | | | | DateTimePeriods 431170 | | | | | | 0..n 431172 | ... |
| | | | | | | | RequestDateTimePeriod 431174 | | | | | 0..1 431176 | DateTimePeriod 431178 |
| | | | | | | | AcceptableDateTimePeriod 431180 | | | | | 0..1 431182 | DateTimePeriod 431184 |
| | | | | | | | PeriodRoleCode 431186 | | | | | 1..1 431188 | PeriodRoleCode 431190 |
| | | | | | DangerousGoods 431192 | | | | | | | 0..n 431194 | ... |

FIG. 43-45

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ID 431196 | | | | | | 0..1 431198 | DangerousGoodsID 431200 |
| | | | | | | RegulationsCode 431202 | | | | | | 0..1 431204 | DangerousGoodsRegulationsCode 431206 |
| | | | | | | HazardCode 431208 | | | | | | 0..1 431210 | DangerousGoodsHazardCode 431212 |
| | | | | | | FlashpointMeasureInterval 431214 | | | | | | 0..1 431216 | MeasureInterval 431218 |
| | | | | | | PackagingGroupCode 431220 | | | | | | 0..1 431222 | DangerousGoodsPackagingGroupCode 431224 |

FIG. 43-46

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | EmergencySchedule 431226 | | | | | | 0..1 431228 | DangerousGoodsEmergencySchedule 431230 |
| | | | | | | TransportEmergencyCardCode 431232 | | | | | | 0..1 431234 | TransportEmergencyCardCode 431236 |
| | | | | | | DangerousGoodsLabelCode 431238 | | | | | | 0..1 431240 | DangerousGoodsLabelCode 431242 |
| | | | | | | DangerousGoodsLabelCode2 431244 | | | | | | 0..1 431246 | DangerousGoodsLabelCode 431248 |

FIG. 43-47

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DangerousGoodsLabelCode3 431250 | | | | | | 0..1 431252 | DangerousGoodsLabelCode 431254 |
| | | | | | | PackagingInstructionTypeCode 431256 | | | | | | 0..1 431258 | PackagingInstructionTypeCode 431260 |
| | | | | | | TransportMeansDescriptionCode 431262 | | | | | | 0..1 431264 | TransportMeansDescriptionCode 431266 |
| | | | | | | TransportationAuthorisationCode 431268 | | | | | | 0..1 431270 | DangerousGoodsTransportationAuthorisationCode 431272 |

FIG. 43-48

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ContactInformation 431274 | | | | | | 0..n 431276 | ... |
| | | | | | | | ContactPersonFunctionTypeCode 431278 | | | | | 1..1 431280 | ContactPersonFunctionTypeCode 431282 |
| | | | | | | | Address 431284 | | | | | 1..1 431286 | Address 431288 |
| | | | | | | TextCollection 431290 | | | | | | 0..1 431292 | ... |
| | | | | | | | TextCollection 431294 | | | | | 1..1 431296 | TextCollection 431298 |
| TransportationChargesInformation 431300 | | | | TransportationChargesInformation 431302 | | | | | | | | 0..n 431304 | ... |

FIG. 43-49

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationChargesUsageCode 431306 | | | | | | | 1..1 431308 | TransportationChargesUsageCode 431310 |
| | | | | | FreightOrderPartyStandardID 431312 | | | | | | | 0..1 431314 | PartyStandardID 431316 |
| | | | | | FreightOrderPartyInternalID 431318 | | | | | | | 0..1 431320 | PartyInternalID 431322 |
| | | | | | FreightOrderTransportationUnitResourceID 431324 | | | | | | | 0..1 431326 | ResourceID 431328 |

FIG. 43-50

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | FreightOrderTransportationStageID 431330 | | | | | | | 0..1 431332 | TransportationStageID 431334 |
| | | | | | TransportationCharges 431336 | | | | | | | 0..1 431338 | ... |
| | | | | | | ID 431340 | | | | | | 1 431342 | TransportationChargesID 431344 |
| | | | | | | FreightAgreementID 431346 | | | | | | 1 431348 | FreightAgreementID 431350 |
| | | | | | | OriginCode 431352 | | | | | | 0..1 431354 | TransportationChargesOriginCode 431356 |

FIG. 43-51

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TariffID 431358 | | | | | | 0..1 431360 | TransportationChargesTariffID 431362 |
| | | | | | | CalculationSheetID 431364 | | | | | | 1 431366 | TransportationChargesCalculationSheetID 431368 |
| | | | | | | Location 431370 | | | | | | 0..n 431372 | ... |
| | | | | | | | Location 431374 | | | | | 1 431376 | BusinessTransactionDocumentLocation 431378 |
| | | | | | | | RoleCode 431380 | | | | | 1 431382 | LoactionRoleCode 431384 |

FIG. 43-52

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TypeCode 431386 | | | | | 0..1 431388 | LocationTypeCode 431390 |
| | | | | | | | Name 431392 | | | | | 0..1 431394 | MEDIUM_Name 431396 |
| | | | | | | | DateTime Periods 431398 | | | | | 0..n 431400 | ... |
| | | | | | | | | RequestedFulfillmentPeriod 431402 | | | | 0..1 431404 | DateTimePeriod 431406 |
| | | | | | | | | AcceptableFulfillmentPeriod 431408 | | | | 0..1 431410 | DateTimePeriod 431412 |

FIG. 43-53

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PeriodRoleCode 431414 | | | | 1 431416 | PeriodRoleCode 431418 |
| | | | | | | TextCollection 431420 | | | | | | 0..1 431422 | ... |
| | | | | | | | TextCollection 431424 | | | | | 1..1 431426 | TextCollection 431428 |
| | | | | | | Currency 431430 | | | | | | 0..n 431432 | ... |
| | | | | | | | Code 431434 | | | | | 1..1 431436 | CurrencyCode 431438 |
| | | | | | | | RoleCode 431440 | | | | | 1..1 431442 | CurrencyRoleCode 431444 |

FIG. 43-54

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | UsageCode 431446 | | | | | 0..1 431448 | CurrencyUsageCode 431450 |
| | | | | | | ExchangeRate 431452 | | | | | | 0..n 431454 | ... |
| | | | | | | | ExchangeRate 431456 | | | | | 1..1 431458 | ExchangeRate 431460 |
| | | | | | | | TypeCode 431462 | | | | | 0..1 431464 | ExchangeRateTypeCode 431466 |
| | | | | | | PercentElement 431468 | | | | | | 0..n 431470 | ... |
| | | | | | | | PercentRoleCode 431472 | | | | | 1 431474 | PercentRoleCode 431476 |

FIG. 43-55

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Percent 431478 | | | | | 1 431480 | Percent 431482 |
| | | | | | | | TransportationChargesPercentCalculationBaseCode 431484 | | | | | 0..1 431486 | TransportationChargesPercentCalculationBaseCode 431488 |
| | | | | | | | StatusCode 431490 | | | | | 0..1 431492 | TransportationChargesPercentElementStatusCode 431494 |
| | | | | | | DateTime Period 431496 | | | | | | 0..n 431498 | ... |
| | | | | | | | DateTime Period 431500 | | | | | 1..1 431502 | DateTimePeriod 431504 |

FIG. 43-56

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PeriodRoleCode 431506 | | | | | 1..1 431508 | PeriodRoleCode 431510 |
| | | | | | | BusinessTransactionDocumentReference 431512 | | | | | | 0..n 431514 | ... |
| | | | | | | | BusinessTransactionDocumentReference 431516 | | | | | 0..1 431518 | BusinessTransactionDocumentReference 431520 |
| | | | | | | | BusinessTransactionDocumentRelationshipRoleCode 431522 | | | | | 0..1 431524 | BusinessTransactionDocumentRelationshipRoleCode 431526 |

FIG. 43-57

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentRelationshipTypeCode 431528 | | | | | 0..1 431530 | BusinessTransactionDocumentRelationshipTypeCode 431532 |
| | | | | | | | TransportationDocumentTypeCode 431534 | | | | | 0..1 431536 | TransportationDocumentTypeCode 431538 |
| | | | | | | | TransportationDocumentNote 431540 | | | | | 0..1 431542 | SHORT_Note 431544 |
| | | | | | | | TransportationDocumentID 431546 | | | | | 0..1 431548 | TransportationDocumentID 431550 |

FIG. 43-58

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TaxDetail 431552 | | | | | | 0..n 431554 | ... |
| | | | | | | | ProductTax 431556 | | | | | 1..1 431558 | ProductTax 431560 |
| | | | | | | PaymentInstruction 431562 | | | | | | 0..n 431564 | ... |
| | | | | | | | PaymentInstruction 431566 | | | | | 1 431568 | PaymentInstruction 431570 |
| | | | | | | | TransportationChargeElementCategoryCode 431572 | | | | | 0..1 431574 | TransportationChargesElementCategoryCode 431576 |

FIG. 43-59

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesElementSubCategoryCode 431578 | | | | | 0..1 431580 | TransportationChargesElementSubCategoryCode 431582 |
| | | | | | | | TransportationChargesPaymentArrangementCode 431584 | | | | | 0..1 431586 | TransportationChargesPaymentArrangementCode 431588 |
| | | | | | | CashDiscountTerms 431590 | | | | | | 0..1 431592 | ... |
| | | | | | | | CashDiscountTerms 431594 | | | | | 1 431596 | CashDiscountTerms 431598 |

FIG. 43-60

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesElementCategoryCode 431600 | | | | | 0..1 431602 | TransportationChargesElementCategoryCode 431604 |
| | | | | | | | TransportationChargesElementSubCategoryCode 431606 | | | | | 0..1 431608 | TransportationChargesElementSubCategoryCode 431610 |
| | | | | | | Element 431612 | | | | | | 0..n 431614 | ... |
| | | | | | | | CategoryCode 431616 | | | | | 1 431618 | TransportationChargesElementCategoryCode 431620 |

FIG. 43-61

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | SubCategoryCode 431622 | | | | | 1 431624 | TransportationChargesElementSubCategoryCode 431626 |
| | | | | | | | TypeCode 431628 | | | | | 1 431630 | TransportationChargesElementTypeCode 431632 |
| | | | | | | | CalculationResolutionCode 431634 | | | | | 1 431636 | TransportationChargesElementCalculationResolutionCode 431638 |

FIG. 43-62

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesPaymentArrangementCode 431640 | | | | | 0...1 431642 | TransportationChargesPaymentArrangementCode 431644 |
| | | | | | | | Location 431646 | | | | | 0..n 431648 | ... |
| | | | | | | | | Location 431650 | | | | 1 431652 | BusinessTransactionDocumentLocation 431654 |
| | | | | | | | | RoleCode 431656 | | | | 1 431658 | LocationRoleCode 431660 |
| | | | | | | | | TypeCode 431662 | | | | 0..1 431664 | LocationTypeCode 431666 |

FIG. 43-63

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Name 431668 | | | | 0..1 431670 | MEDIUM_Name 431672 |
| | | | | | | | | DateTime Periods 431674 | | | | 0..n 431676 | ... |
| | | | | | | | | | RequestedFulfillmentPeriod 431678 | | | 0..1 431680 | DateTimePeriod 431682 |
| | | | | | | | | | AcceptableFulfillmentPeriod 431684 | | | 0..1 431686 | DateTimePeriod 431688 |
| | | | | | | | | | PeriodRoleCode 431690 | | | 1 431692 | PeriodRole Code 431694 |

FIG. 43-64

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TextCollection 431696 | | | | | 0..1 431698 | ... |
| | | | | | | | | TextCollection 431700 | | | | 1..1 431702 | TextCollection 431704 |
| | | | | | | | Currency 431706 | | | | | 0..n 431708 | ... |
| | | | | | | | | Code 431710 | | | | 1..1 431712 | CurrencyCode 431714 |
| | | | | | | | | RoleCode 431716 | | | | 1..1 431718 | CurrencyRoleCode 431720 |
| | | | | | | | | UsageCode 431722 | | | | 0..1 431724 | CurrencyUsageCode 431726 |

FIG. 43-65

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | RateElement 431728 | | | | | 0..n 431730 | ... |
| | | | | | | | | ID 431732 | | | | 1 431734 | TransportationChargesElementRateElementID 431736 |
| | | | | | | | | Amount 431738 | | | | 1 431740 | Amount 431742 |
| | | | | | | | | BaseQuantity 431744 | | | | 1 431746 | Quantity 431748 |
| | | | | | | | | TransportationChargesRateTypeCode 431750 | | | | 0..1 431752 | TransportationChargesRateTypeCode 431754 |

FIG. 43-66

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesRateRoleCode 431756 | | | | 1 431758 | TransportationChargesRateRoleCode 431760 |
| | | | | | | | | TransportationChargesRateElementStatusCode 431762 | | | | 0..1 431764 | TransportationChargesRateElementStatusCode 431766 |
| | | | | | | | PercentElement 431768 | | | | | 0..n 431770 | ... |
| | | | | | | | | PercentRoleCode 431772 | | | | 1 431774 | PercentRoleCode 431776 |
| | | | | | | | | Percent 431778 | | | | 1 431780 | Percent 431782 |

FIG. 43-67

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesPercentCalculationBaseCode 431784 | | | | 0..1 431786 | TransportationChargesPercentCalculationBaseCode 431788 |
| | | | | | | | | StatusCode 431790 | | | | 0..1 431792 | TransportationChargesPercentElementStatusCode 431794 |
| | | | | | | | AmountElement 431796 | | | | | 0..n 431798 | ... |
| | | | | | | | | Amount 431800 | | | | 1 431802 | Amount 431804 |
| | | | | | | | | AmountRoleCode 431806 | | | | 1 431808 | AmountRoleCode 431810 |

FIG. 43-68

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesAmountElementStatusCode 431812 | | | | 0..1 431814 | TransportationChargesAmountElementStatusCode 431816 |
| | | | | | | | | RateDetailAssignment 431818 | | | | 0..n 431820 | ... |
| | | | | | | | | | TransportationChargeRateDetailID 431822 | | | 1 431824 | TransportationChargesElementRateElementID 431826 |
| | | | | | | | CalculationBase 431828 | | | | | 0..n 431830 | ... |

FIG. 43-69

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesElementCalculationBaseCode 431832 | | | | 1 431834 | TransportationChargesElementCalculationBaseCode 431836 |
| | | | | | | | | BaseQuantity 431838 | | | | 0..1 431840 | Quantity 431842 |
| | | | | | | | | BaseQuantityRoleCode 431844 | | | | 0..1 431846 | QuantityRoleCode 431848 |
| | | | | | | | | BaseQuantityTypeCode 431850 | | | | 0..1 431852 | QuantityTypeCode 431854 |
| | | | | | | | TaxDetail 431856 | | | | | 0..n 431858 | ... |

FIG. 43-70

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ProductTax 431860 | | | | 1..1 431862 | ProductTax 431864 |
| | | | | | | | DateTime Period 431866 | | | | | 0..n 431868 | ... |
| | | | | | | | | DateTime Period 431870 | | | | 1..1 431872 | DateTimePeriod 431874 |
| | | | | | | | | PeriodRoleCode 431876 | | | | 1..1 431878 | PeriodRole Code 431880 |
| | | | | | | | CostDistribution 431882 | | | | | 0..n 431884 | ... |
| | | | | | | | | AccountingCodingBlockAssignment 431886 | | | | 1..1 431888 | Accounting CodingBlock Assignment 431890 |

FIG. 43-71

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| ShipmentOrder 431892 | | | | Shipment Order 431894 | | | | | | | | 0..n 431896 | ... |
| | | | | | ID 431898 | | | | | | | 1..1 431900 | BusinessTransactionDocumentID 431902 |
| | | | | | TransportationStageAssignment 431904 | | | | | | | 0..n 431906 | ... |
| | | | | | | FreightOrderTransportationStageID 431908 | | | | | | 1..1 431910 | TransportationStageID 431912 |

FIG. 43-72

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationUnitResourceInformationAssignment 431914 | | | | | | | 0..n 431916 | ... |
| | | | | | | FreightOrderTransportationUnitResourceInformationID 431918 | | | | | | 1..1 431920 | TransportationUnitResourceID 431922 |
| Confirmation 431924 | | | | | Confirmation 431926 | | | | | | | 0..1 431928 | ... |
| | | | | | | DeliveryTerms 431930 | | | | | | 0..1 431932 | DeliveryTerms 431934 |

FIG. 43-73

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| HeaderInformation 431936 | | | | | | DateTime Periods 431938 | | | | | | 0..n 431940 | ... |
| | | | | | | | RequestedFulfillmentPeriod 431942 | | | | | 0..1 431944 | DateTimePeriod 431946 |
| | | | | | | | AcceptableFulfillmentPeriod 431948 | | | | | 0..1 431950 | DateTimePeriod 431952 |
| | | | | | | | PeriodRoleCode 431954 | | | | | 1 431956 | PeriodRoleCode 431958 |
| | | | | | | NatureOfCargo 431960 | | | | | | 0..n 431962 | ... |

FIG. 43-74

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ClassificationCode 431964 | | | | | 1 431966 | NatureOfCargoClassificationCode 431968 |
| | | | | | | TotalQuantity 431970 | | | | | | 0..n 431972 | … |
| | | | | | | | Quantity 431974 | | | | | 1 431976 | Quantity 431978 |
| | | | | | | | RoleCode 431980 | | | | | 0..1 431982 | QuantityRoleCode 431984 |
| | | | | | | | TypeCode 431986 | | | | | 0..1 431988 | QuantityTypeCode 431990 |
| | | | | | | TotalAmount 431992 | | | | | | 0..n 431994 | … |
| | | | | | | | Amount 431996 | | | | | 1 431998 | Amount 432000 |

FIG. 43-75

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | RoleCode 432002 | | | | | 1 432004 | AmountRoleCode 432006 |
| | | | | | | TextCollection 432008 | | | | | | 0..1 432010 | ... |
| | | | | | | | TextCollection 432012 | | | | | 1 432014 | TextCollection 432016 |
| | | | | | | TransportationServiceRequirement 432018 | | | | | | 0..n 432020 | ... |
| | | | | | | | TransportationServiceRequirementCode 432022 | | | | | 0..1 432024 | TransportationServiceRequirementCode 432026 |

FIG. 43-76

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | AdditionalTransportationServiceRequirementCode 432028 | | | | | 0..1 432030 | TransportationServiceRequirementCode 432032 |
| | | | | | | | TransportationContractConditionCode 432034 | | | | | 0..1 432036 | TransportationContractConditionCode 432038 |
| | | | | | | | TransportServiceLevelCode 432040 | | | | | 0..1 432042 | TransportServiceLevelCode 432044 |
| | | | | | | | NatureOfCargoClassificationCode 432046 | | | | | 0..1 432048 | NatureOfCargoClassificationCode 432050 |

FIG. 43-77

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentInformation <u>432052</u> | | | | | | 0..n <u>432054</u> | ... |
| | | | | | | | TransportationDocumentTypeCode <u>432056</u> | | | | | 0..1 <u>432058</u> | TransportationDocumentTypeCode <u>432060</u> |
| | | | | | | | TransportationDocumentNote <u>432062</u> | | | | | 0..1 <u>432064</u> | SHORT_Note <u>432066</u> |
| | | | | | | | TransportationDocumentID <u>432068</u> | | | | | 0..1 <u>432070</u> | TransportationDocumentID <u>432072</u> |

FIG. 43-78

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentStatusCode 432074 | | | | | 0..1 432076 | TransportationDocumentStatusCode 432078 |
| | | | | | | | LanguageCode 432080 | | | | | 0..1 432082 | LanguageCode 432084 |
| | | | | | | | CommunicationMediumTypeCode 432086 | | | | | 0..1 432088 | CommunicationMediumTypeCode 432090 |
| | | | | | | | RequiredIndiator 432092 | | | | | 1 432094 | Indicator 432096 |
| | | | | | | | OutputCopyNumberValue 432098 | | | | | 0..1 432100 | NumberValue 432102 |

FIG. 43-79

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OutputOriginalNumberValue 432104 | | | | | 0..1 432106 | NumberValue 432108 |
| | | | | | | | DateTimePeriod 432110 | | | | | 0..n 432112 | ... |
| | | | | | | | | DateTimePeriod 432114 | | | | 1 432116 | DateTimePeriod 432118 |
| | | | | | | | | PeriodRoleCode 432120 | | | | 1 432122 | PeriodRoleCode 432124 |
| | | | | | | BusinessTransactionDocumentReference 432126 | | | | | | 0..n 432128 | ... |

FIG. 43-80

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentReference 432130 | | | | | 0..1 432132 | BusinessTransactionDocumentReference 432134 |
| | | | | | | | BusinessTransactionDocumentRelationshipRoleCode 432136 | | | | | 0..1 432138 | BusinessTransactionDocumentRelationshipRoleCode 432140 |
| | | | | | | | BusinessTransactionDocumentRelationshipTypeCode 432142 | | | | | 0..1 432144 | BusinessTransactionDocumentRelationshipTypeCode 432146 |

FIG. 43-81

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentTypeCode 432148 | | | | | 0..1 432150 | TransportationDocumentTypeCode 432152 |
| | | | | | | | TransportationDocumentNote 432154 | | | | | 0..1 432156 | SHORT_Note 432158 |
| | | | | | | | TransportationDocumentID 432160 | | | | | 0..1 432162 | TransportationDocumentID 432164 |
| | | | | | | | DateTime Period 432166 | | | | | 0..n 432168 | ... |
| | | | | | | | | DateTime Period 432170 | | | | 1 432172 | DateTimePeriod 432174 |

FIG. 43-82

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PeriodRoleCode 432176 | | | | 1 432178 | PeriodRoleCode 432180 |
| GovernmentalRequirementInformation 432182 | | | | | | GovernmentalProcedure 432184 | | | | | | 0..n 432186 | ... |
| | | | | | | | TransportationGovernmentAgencyTypeCode 432188 | | | | | 0..1 432190 | TransportationGovernmentAgencyTypeCode 432192 |
| | | | | | | | TransportationMovementTypeCode 432194 | | | | | 0..1 432196 | TransportationMovementTypeCode 432198 |

FIG. 43-83

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationGovernmentAgencyInvolvementStatusCode 432200 | | | | | 0..1 432202 | TransportationGovernmentAgencyInvolvementStatusCode 432204 |
| | | | | | | | TransportationGovernmentAgencyActionCode 432206 | | | | | 0..1 432208 | TransportationGovernmentAgencyActionCode 432210 |
| | | | | | | | TransportationGovernmentAgencyProcedureStatusCode 432212 | | | | | 0..1 432214 | TransportationGovernmentAgencyProcedureStatusCode 432216 |

FIG. 43-84

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Location 432218 | | | | | 0..n 432220 | ... |
| | | | | | | | | Location 432222 | | | | 1 432224 | BusinessTransactionDocumentLocation 432226 |
| | | | | | | | | RoleCode 432228 | | | | 1 432230 | LocationRoleCode 432232 |
| | | | | | | | | TypeCode 432234 | | | | 0..1 432236 | LocationTypeCode 432238 |
| | | | | | | | | Name 432240 | | | | 0..1 432242 | MEDIUM_Name 432244 |
| | | | | | | | DateTime Period 432246 | | | | | 0..n 432248 | ... |

FIG. 43-85

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTime Period 432250 | | | | 1 432252 | DateTimePeriod 432254 |
| | | | | | | | | PeriodRoleCode 432256 | | | | 1 432258 | PeriodRoleCode 432260 |
| | | | | | | | Seal 432262 | | | | | 0..n 432264 | ... |
| | | | | | | | | ID 432266 | | | | 0..1 432268 | SealID 432270 |
| | | | | | | | | PartyRole Code 432272 | | | | 0..1 432274 | PartyRoleCode 432276 |
| | | | | | | | | PartyFormattedName 432278 | | | | 0..1 432280 | LONG_Name 432282 |
| | | | | | | | | StatusCode 432284 | | | | 0..1 432286 | SealStatusCode 432288 |

FIG. 43-86

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TextCollection 432290 | | | | | 0..1 432292 | ... |
| | | | | | | | | TextCollection 432294 | | | | 1 432296 | TextCollection 432298 |
| | | | | | | | TransportationDocumentInformation 432300 | | | | | 0..n 432302 | ... |
| | | | | | | | | TransportationDocumentTypeCode 432304 | | | | 0..1 432306 | TransportationDocumentTypeCode 432308 |
| | | | | | | | | TransportationDocumentNote 432310 | | | | 0..1 432312 | SHORT_Note 432314 |

FIG. 43-87

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentID 432316 | | | | 0..1 432318 | TransportationDocumentID 432320 |
| | | | | | | | | TransportationDocumentStatusCode 432322 | | | | 0..1 432324 | TransportationDocumentStatusCode 432326 |
| | | | | | | | | LanguageCode 432328 | | | | 0..1 432330 | LanguageCode 432332 |
| | | | | | | | | CommunicationMediumTypeCode 432334 | | | | 0..1 432336 | CommunicationMediumTypeCode 432338 |
| | | | | | | | | RequiredIndicator 432340 | | | | 1 432342 | Indicator 432344 |

FIG. 43-88

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | OutputCopyNumberValue 432346 | | | | 0..1 432348 | NumberValue 432350 |
| | | | | | | | | OutputOriginalNumberValue 432352 | | | | 0..1 432354 | NumberValue 432356 |
| | | | | | | | | DateTimePeriod 432358 | | | | 0..n 432360 | ... |
| | | | | | | | | | DateTimePeriod 432362 | | | 1 432364 | DateTimePeriod 432366 |
| | | | | | | | | | PeriodRoleCode 432368 | | | 1 432370 | PeriodRoleCode 432372 |
| PartyInformation 432374 | | | | | | Party 432376 | | | | | | 1..n 432378 | ... |

FIG. 43-89

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Party 432380 | | | | | 1 432382 | BusinessTransactionDocumentParty 432384 |
| | | | | | | | RoleCode 432386 | | | | | 1 432388 | PartyRoleCode 432390 |
| | | | | | | | FormattedName 432392 | | | | | 0..1 432394 | LONG_Name 432396 |
| | | | | | | | Amount 432398 | | | | | 0..n 432400 | ... |
| | | | | | | | | Amount 432402 | | | | 1 432404 | Amount 432406 |
| | | | | | | | | RoleCode 432408 | | | | 1 432410 | AmountRoleCode 432412 |

FIG. 43-90

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTimePeriods 432414 | | | | | 0..n 432416 | ... |
| | | | | | | | | RequestedFulfillmentPeriod 432418 | | | | 0..1 432420 | DateTimePeriod 432422 |
| | | | | | | | | AcceptableFulfillmentPeriod 432424 | | | | 0..1 432426 | DateTimePeriod 432428 |
| | | | | | | | | PeriodRoleCode 432430 | | | | 1 432432 | PeriodRoleCode 432434 |
| | | | | | | | TransportationDocumentInformation 432436 | | | | | 0..n 432438 | ... |

FIG. 43-91

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 432440 | | | | 0..1 432442 | TransportationDocumentTypeCode 432444 |
| | | | | | | | | TransportationDocumentNote 432446 | | | | 0..1 432448 | SHORT_Note 432450 |
| | | | | | | | | TransportationDocumentID 432452 | | | | 0..1 432454 | TransportationDocumentID 432456 |
| | | | | | | | | TransportationDocumentStatusCode 432458 | | | | 0..1 432460 | TransportationDocumentStatusCode 432462 |

FIG. 43-92

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | LanguageCode 432464 | | | | 0..1 432466 | LanguageCode 432468 |
| | | | | | | | | CommunicationMediumTypeCode 432470 | | | | 0..1 432472 | CommunicationMediumTypeCode 432474 |
| | | | | | | | | RequiredIndicator 432476 | | | | 1 432478 | Indicator 432480 |
| | | | | | | | | OutputCopyNumberValue 432482 | | | | 0..1 432484 | NumberValue 432486 |
| | | | | | | | | OutputOriginalNumberValue 432488 | | | | 0..1 432490 | NumberValue 432492 |

FIG. 43-93

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTime Period 432494 | | | | 0..n 432496 | ... |
| | | | | | | | | | DateTime Period 432498 | | | 1 432500 | DateTimePeriod 432502 |
| | | | | | | | | | PeriodRoleCode 432504 | | | 1 432506 | PeriodRole Code 432508 |
| | | | | | | | BusinessTransactionDocumentReference 432510 | | | | | 0..n 432512 | ... |
| | | | | | | | | BusinessTransactionDocumentReference 432514 | | | | 0..1 432516 | BusinessTransactionDocumentReference 432518 |

FIG. 43-94

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipRoleCode 432520 | | | | 0..1 432522 | BusinessTransactionDocumentRelationshipRoleCode 432524 |
| | | | | | | | | BusinessTransactionDocumentRelationshipTypeCode 432526 | | | | 0..1 432528 | BusinessTransactionDocumentRelationshipTypeCode 432530 |
| | | | | | | | | TransportationDocumentTypeCode 432532 | | | | 0..1 432534 | TransportationDocumentTypeCode 432536 |

FIG. 43-95

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentNote 432538 | | | | 0..1 432540 | SHORT_Note 432542 |
| | | | | | | | | TransportationDocumentID 432544 | | | | 0..1 432546 | TransportationDocumentID 432548 |
| | | | | | | | | DateTimePeriod 432550 | | | | 0..n 432552 | ... |
| | | | | | | | | | DateTimePeriod 432554 | | | 1 432556 | DateTimePeriod 432558 |
| | | | | | | | | | PeriodRoleCode 432560 | | | 1 432562 | PeriodRoleCode 432564 |

FIG. 43-96

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| LocationInformation 432566 | | | | | | Location 432568 | | | | | | 0..n 432570 | |
| | | | | | | | Location 432572 | | | | | 1 432574 | BusinessTransactionDocumentLocation 432576 |
| | | | | | | | RoleCode 432578 | | | | | 1 432580 | LocationRoleCode 432582 |
| | | | | | | | TypeCode 432584 | | | | | 0..1 432586 | LocationTypeCode 432588 |
| | | | | | | | Name 432590 | | | | | 0..1 432592 | MEDIUM_Name 432594 |
| | | | | | | | DateTimePeriods 432596 | | | | | 0..n 432598 | ... |

FIG. 43-97

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RequestedFulfillmentPeriod 432600 | | | | 0..1 432602 | DateTimePeriod 432604 |
| | | | | | | | | AcceptableFulfillmentPeriod 432606 | | | | 0..1 432608 | DateTimePeriod 432610 |
| | | | | | | | | PeriodRoleCode 432612 | | | | 1 432614 | PeriodRoleCode 432616 |
| TransportationStageInformation 432618 | | | | | | TransportationStage 432620 | | | | | | 0..n 432622 | ... |
| | | | | | | | ID 432624 | | | | | 1 432626 | TransportationStageID 432628 |

FIG. 43-98

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OrdinalNumberValue 432630 | | | | | 0..1 432632 | OrdinalNumberValue 432634 |
| | | | | | | | TypeCode 432636 | | | | | 0..1 432638 | TransportationStageTypeCode 432640 |
| | | | | | | | JourneyID 432642 | | | | | 0..1 432644 | JourneyID 432646 |
| | | | | | | | TransportModeCode 432648 | | | | | 0..1 432650 | TransportModeCode 432652 |
| | | | | | | | TransportMeansDescriptionCode 432654 | | | | | 0..1 432656 | TransportMeansDescriptionCode 432658 |

FIG. 43-99

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportMeansDescription 432660 | | | | | 0..1 432662 | SHORT_Description 432664 |
| | | | | | | | TransportMeansID 432666 | | | | | 0..1 432668 | TransportMeansID 432670 |
| | | | | | | | TransportMeansHomeCountryCode 432672 | | | | | 0..1 432674 | CountryCode 432676 |
| | | | | | | | TransportMeansOwnershipTypeCode 432678 | | | | | 0..1 432680 | TransportMeansOwnershipTypeCode 432682 |

FIG. 43-100

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | CarrierStandardID 432684 | | | | | 0..1 432686 | PartyStandardID 432688 |
| | | | | | | | CarrierFormattedName 432690 | | | | | 0..1 432692 | LONG_Name 432694 |
| | | | | | | | TransportationTransitDirectionCode 432696 | | | | | 0..1 432698 | TransportationTransitDirectionCode 432700 |
| | | | | | | | CalculatedDistanceMeasure 432702 | | | | | 0..1 432704 | Measure 432706 |
| | | | | | | | GivenDistanceMeasure 432708 | | | | | 0..1 432710 | Measure 432712 |

FIG. 43-101

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Location 432714 | | | | | 1..n 432716 | ... |
| | | | | | | | | Location 432718 | | | | 1 432720 | BusinessTransactionDocumentLocation 432722 |
| | | | | | | | | RoleCode 432724 | | | | 1 432726 | LocationRoleCode 432728 |
| | | | | | | | | TypeCode 432730 | | | | 0..1 432732 | LocationTypeCode 432734 |
| | | | | | | | | Name 432736 | | | | 0..1 432738 | MEDIUM_Name 432740 |
| | | | | | | | | DateTimePeriods 432742 | | | | 0..n 432744 | ... |

FIG. 43-102

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RequestedFulfillmentPeriod 432746 | | | 0..1 432748 | DateTimePeriod 432750 |
| | | | | | | | | | AcceptableFulfillmentPeriod 432752 | | | 0..1 432754 | DateTimePeriod 432756 |
| | | | | | | | | | PeriodRoleCode 432758 | | | 1 432760 | PeriodRoleCode 432762 |
| | | | | | | | BusinessTransactionDocumentReference 432764 | | | | | 0..n 432766 | ... |

FIG. 43-103

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 432768 | | | | 0..1 432770 | BusinessTransactionDocumentReference 432772 |
| | | | | | | | | BusinessTransactionDocumentRelationshipRoleCode 432774 | | | | 0..1 432776 | BusinessTransactionDocumentRelationshipRoleCode 432778 |
| | | | | | | | | BusinessTransactionDocumentRelationshipTypeCode 432780 | | | | 0..1 432782 | BusinessTransactionDocumentRelationshipTypeCode 432784 |

FIG. 43-104

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 432786 | | | | 0..1 432788 | TransportationDocumentTypeCode 432790 |
| | | | | | | | | TransportationDocumentNote 432792 | | | | 0..1 432794 | SHORT_Note 432796 |
| | | | | | | | | TransportationDocumentID 432798 | | | | 0..1 432800 | TransportationDocumentID 432802 |
| | | | | | | | | DateTimePeriod 432804 | | | | 0..n 432806 | ... |
| | | | | | | | | | DateTimePeriod 432808 | | | 1 432810 | DateTimePeriod 432812 |

FIG. 43-105

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 432814 | | | 1 432816 | PeriodRoleCode 432818 |
| | | | | | | | TransportationServiceRequirement 432820 | | | | | 0..n 432822 | ... |
| | | | | | | | | TransportationServiceRequirementCode 432824 | | | | 0..1 432826 | TransportationServiceRequirementCode 432828 |
| | | | | | | | | AdditionalTransportationServiceRequirementCode 432830 | | | | 0..1 432832 | TransportationServiceRequirementCode 432834 |

FIG. 43-106

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationContractConditionCode 432836 | | | | 0..1 432838 | TransportationContractConditionCode 432840 |
| | | | | | | | | TransportServiceLevelCode 432842 | | | | 0..1 432844 | TransportServiceLevelCode 432846 |
| | | | | | | | | NatureOfCargoClassificationCode 432848 | | | | 0..1 432850 | NatureOfCargoClassificationCode 432852 |
| TransportationUnitResourceInformation 432854 | | | | | | TransportationUnitResourceInformation 432856 | | | | | | 0..n 432858 | ... |

FIG. 43-107

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ID 432860 | | | | | 1 432862 | ResourceInformationID 432864 |
| | | | | | | | ResourceNumberValue 432866 | | | | | 0..1 432868 | NumberValue 432870 |
| | | | | | | | ResourceID 432872 | | | | | 0..1 432874 | ResourceID 432876 |
| | | | | | | | ResourceHomeCountryCode 432878 | | | | | 0..1 432880 | CountryCode 432882 |
| | | | | | | | TransportationUnitResourceCategoryCode 432884 | | | | | 0..1 432886 | TransportationUnitResourceCategoryCode 432888 |

FIG. 43-108

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationUnitResourceTypeCode 432890 | | | | | 0..1 432892 | TransportationUnitResourceTypeCode 432894 |
| | | | | | | | FillLevelCode 432896 | | | | | 0..1 432898 | FillLevelCode 432900 |
| | | | | | | | ShippingTypeCode 432902 | | | | | 0..1 432904 | ShippingTypeCode 432906 |
| | | | | | | | HaulageArrangerCode 432908 | | | | | 0..1 432910 | HaulageArrangerCode 432912 |

FIG. 43-109

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationHandlingInstructionCode 432914 | | | | | 0..1 432916 | TransportationHandlingInstructionCode 432918 |
| | | | | | | | TransportationHandlingInstructionNote 432920 | | | | | 0..1 432922 | LONG_Note 432924 |
| | | | | | | | TransportationStageAssignment 432926 | | | | | 0..n 432928 | … |
| | | | | | | | | ShipmentOrderTransportationStageID 432930 | | | | 1 432932 | TransportationStageID 432934 |

FIG. 43-110

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | AttachedEquipment 432936 | | | | | 0..n 432938 | ... |
| | | | | | | | | ShipmentOrderResourceInformationID 432940 | | | | 1 432942 | ResourceID 432944 |
| | | | | | | | Quantity 432946 | | | | | 0..n 432948 | ... |
| | | | | | | | | Quantity 432950 | | | | 1 432952 | Quantity 432954 |
| | | | | | | | | RoleCode 432956 | | | | 0..1 432958 | QuantityRoleCode 432960 |
| | | | | | | | | TypeCode 432962 | | | | 0..1 432964 | QuantityTypeCode 432966 |

FIG. 43-111

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Seal 432968 | | | | | 0..n 432970 | ... |
| | | | | | | | | ID 432972 | | | | 1 432974 | SealID 432976 |
| | | | | | | | | PartyRoleCode 432978 | | | | 0..1 432980 | PartyRoleCode 432982 |
| | | | | | | | | PartyFormattedName 432984 | | | | 0..1 432986 | LONG_Name 432988 |
| | | | | | | | | StatusCode 432990 | | | | 0..1 432992 | SealStatusCode 432994 |
| | | | | | | | BusinessTransactionDocumentReference 432996 | | | | | 0..n 432998 | ... |

FIG. 43-112

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 433000 | | | | 0..1 433002 | BusinessTransactionDocumentReference 433004 |
| | | | | | | | | BusinessTransactionDocumentRelationshipRoleCode 433006 | | | | 0..1 433008 | BusinessTransactionDocumentRelationshipRoleCode 433010 |
| | | | | | | | | BusinessTransactionDocumentRelationshipTypeCode 433012 | | | | 0..1 433014 | BusinessTransactionDocumentRelationshipTypeCode 433016 |

FIG. 43-113

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 433018 | | | | 0..1 433020 | TransportationDocumentTypeCode 433022 |
| | | | | | | | | TransportationDocumentNote 433024 | | | | 0..1 433026 | SHORT_Note 433028 |
| | | | | | | | | TransportationDocumentID 433030 | | | | 0..1 433032 | TransportationDocumentID 433034 |
| | | | | | | | | DateTime Period 433036 | | | | 0..n 433038 | |
| | | | | | | | | | DateTime Period 433040 | | | 1 433042 | DateTimePeriod 433044 |

FIG. 43-114

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 433046 | | | 1 433048 | PeriodRoleCode 433050 |
| | | | | | | | TextCollection 433052 | | | | | 0..1 433054 | ... |
| | | | | | | | | TextCollection 433056 | | | | 1 433058 | TextCollection 433060 |
| | | | | | | | Location 433062 | | | | | 0..n 433064 | ... |
| | | | | | | | | Location 433066 | | | | 1 433068 | BusinessTransactionDocumentLocation 433070 |
| | | | | | | | | RoleCode 433072 | | | | 1 433074 | LocationRoleCode 433076 |

FIG. 43-115

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TypeCode 433078 | | | | 0..1 433080 | LocationTypeCode 433082 |
| | | | | | | | | Name 433084 | | | | 0..1 433086 | MEDIUM_Name 433088 |
| | | | | | | | | DateTime Periods 433090 | | | | 0..n 433092 | ... |
| | | | | | | | | | RequestedFulfillmentPeriod 433094 | | | 0..1 433096 | DateTimePeriod 433098 |
| | | | | | | | | | AcceptableFulfillmentPeriod 433100 | | | 0..1 433102 | DateTimePeriod 433104 |

FIG. 43-116

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 433106 | | | 1 433108 | PeriodRoleCode 433110 |
| | | | | | | | DangerousGoods 433112 | | | | | 0..n 433114 | |
| | | | | | | | | ID 433116 | | | | 0..1 433118 | DangerousGoodsID 433120 |
| | | | | | | | | RegulationsCode 433122 | | | | 0..1 433124 | DangerousGoodsRegulationsCode 433126 |
| | | | | | | | | HazardCode 433128 | | | | 0..1 433130 | DangerousGoodsHazardCode 433132 |

FIG. 43-117

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | FlashpointMeasureInterval 433134 | | | | 0..1 433136 | MeasureInterval 433138 |
| | | | | | | | | PackagingGroupCode 433140 | | | | 0..1 433142 | DangerousGoodsPackagingGroupCode 433144 |
| | | | | | | | | EmergencySchedule 433146 | | | | 0..1 433148 | DangerousGoodsEmergencySchedule 433150 |
| | | | | | | | | TransportEmergencyCardCode 433152 | | | | 0..1 433154 | TransportEmergencyCardCode 433156 |

FIG. 43-118

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DangerousGoodsLabelCode 433158 | | | | 0..1 433160 | DangerousGoodsLabelCode 433162 |
| | | | | | | | | DangerousGoodsLabelCode2 433164 | | | | 0..1 433166 | DangerousGoodsLabelCode 433168 |
| | | | | | | | | DangerousGoodsLabelCode3 433170 | | | | 0..1 433172 | DangerousGoodsLabelCode 433174 |
| | | | | | | | | PackagingInstructionTypeCode 433176 | | | | 0..1 433178 | PackagingInstructionTypeCode 433180 |

FIG. 43-119

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportMeansDescriptionCode 433182 | | | | 0..1 433184 | TransportMeansDescriptionCode 433186 |
| | | | | | | | | TransportationAuthorisationCode 433188 | | | | 0..1 433190 | DangerousGoodsTransportationAuthorisationCode 433192 |
| | | | | | | | | ContactInformation 433194 | | | | 0..n 433196 | ... |
| | | | | | | | | | ContactPersonFunctionTypeCode 433198 | | | 1 433200 | ContactPersonFunctionTypeCode 433202 |
| | | | | | | | | | Address 433204 | | | 1 433206 | Address 433208 |

FIG. 43-120

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TextCollection 433210 | | | | 0..1 433212 | ... |
| | | | | | | | | | TextCollection 433214 | | | 1 433216 | TextCollection 433218 |
| PackageInformation 433220 | | | | | | PackageInformation 433222 | | | | | | 0..n 433224 | ... |
| | | | | | | | ID 433226 | | | | | 1 433228 | PackageInformationID 433230 |
| | | | | | | | PackageID 433232 | | | | | 0..1 433234 | PackageID 433236 |
| | | | | | | | PackageOrdinalNumberValue 433238 | | | | | 0..1 433240 | OrdinalNumberValue 433242 |

FIG. 43-121

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PackageNumberValue 433244 | | | | | 0..1 433246 | NumberValue 433248 |
| | | | | | | | PackageTypeCode 433250 | | | | | 0..1 433252 | PackageTypeCode 433254 |
| | | | | | | | PackagingLevelCode 433256 | | | | | 0..1 433258 | PackagingLevelCode 433260 |
| | | | | | | | PackageMarkingInstructionCode 433262 | | | | | 0..1 433264 | PackageMarkingInstructionCode 433266 |
| | | | | | | | PredecessorPackageID 433268 | | | | | 0..1 433270 | PackageID 433272 |

FIG. 43-122

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ItemAssignment 433274 | | | | | 0..n 433276 | ... |
| | | | | | | | | ShipmentOrderItemID 433278 | | | | 1 433280 | BusinessTransactionDocumentItemID 433282 |
| | | | | | | | | Quantity 433284 | | | | 0..n 433286 | ... |
| | | | | | | | | | Quantity 433288 | | | 1 433290 | Quantity 433292 |
| | | | | | | | | | RoleCode 433294 | | | 0..1 433296 | QuantityRoleCode 433298 |
| | | | | | | | | | TypeCode 433300 | | | 0..1 433302 | QuantityTypeCode 433304 |

FIG. 43-123

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 433306 | | | | 0..n 433308 | ... |
| | | | | | | | | | BusinessTransactionDocumentReference 433310 | | | 0..1 433312 | BusinessTransactionDocumentReference 433314 |
| | | | | | | | | | BusinessTransactionDocumentRelationshipRoleCode 433316 | | | 0..1 433318 | BusinessTransactionDocumentRelationshipRoleCode 433320 |

FIG. 43-124

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | BusinessTransactionDocumentRelationshipTypeCode 433322 | | | 0..1 433324 | BusinessTransactionDocumentRelationshipTypeCode 433326 |
| | | | | | | | | | TransportationDocumentTypeCode 433328 | | | 0..1 433330 | TransportationDocumentTypeCode 433332 |
| | | | | | | | | | TransportationDocumentNote 433334 | | | 0..1 433336 | SHORT_Note 433338 |
| | | | | | | | | | TransportationDocumentID 433340 | | | 0..1 433342 | TransportationDocumentID 433344 |

FIG. 43-125

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | DateTime Period 433346 | | | 0..n 433348 | ... |
| | | | | | | | | | | DateTime Period 433350 | | 1 433352 | DateTimePeriod 433354 |
| | | | | | | | | | | PeriodRoleCode 433356 | | 1 433358 | PeriodRole Code 433360 |
| | | | | | | | | TransportationGoodsIdentification 433362 | | | | 0..n 433364 | ... |
| | | | | | | | | | TransportationGoodsIdentifierTypeCode 433366 | | | 1 433368 | TransportationGoodsIdentifierTypeCode 433370 |

FIG. 43-126

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | LowerBoundaryTransportationGoodsID 433372 | | | 0..1 433374 | TransportationGoodsID 433376 |
| | | | | | | | | | UpperBoundaryTransportationGoodsID 433378 | | | 0..1 433380 | TransportationGoodsID 433382 |
| | | | | | | | TransportationUnitResourceInformationAssignment 433384 | | | | | 0..n 433386 | ... |

FIG. 43-127

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ShipmentOrderResourceInformationID 433388 | | | | 1 433390 | ResourceInformationID 433392 |
| | | | | | | | | Quantity 433394 | | | | 0..n 433396 | ... |
| | | | | | | | | | Quantity 433398 | | | 1 433400 | Quantity 433402 |
| | | | | | | | | | RoleCode 433404 | | | 0..1 433406 | QuantityRoleCode 433408 |
| | | | | | | | | | TypeCode 433410 | | | 0..1 433412 | QuantityTypeCode 433414 |
| | | | | | | | Quantity 433416 | | | | | 0..n 433418 | ... |
| | | | | | | | | Quantity 433420 | | | | 1 433422 | Quantity 433424 |

FIG. 43-128

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RoleCode 433426 | | | | 0..1 433428 | QuantityRoleCode 433430 |
| | | | | | | | | TypeCode 433432 | | | | 0..1 433434 | QuantityTypeCode 433436 |
| | | | | | | | TextCollection 433438 | | | | | 0..1 433440 | ... |
| | | | | | | | | TextCollection 433442 | | | | 1 433444 | TextCollection 433446 |
| Item 433448 | | | | | | Item 433450 | | | | | | 0..n 433452 | ... |
| | | | | | | | ID 433454 | | | | | 1 433456 | BusinessTransactionDocumentItemID 433458 |

FIG. 43-129

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OriginCountryCode 433460 | | | | | 0..1 433462 | CountryCode 433464 |
| | | | | | | | DestinationCountryCode 433466 | | | | | 0..1 433468 | CountryCode 433470 |
| | | | | | | | ShippingTypeCode 433472 | | | | | 0..1 433474 | ShippingTypeCode 433476 |
| | | | | | | | HaulageArrangerCode 433478 | | | | | 0..1 433480 | HaulageArrangerCode 433482 |
| | | | | | | | TemperatureMeasureInterval 433484 | | | | | 0..1 433486 | MeasureInterval 433488 |

FIG. 43-130

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationHandlingInstructionCode 433490 | | | | | 0..1 433492 | TransportationHandlingInstructionCode 433494 |
| | | | | | | | TransportationHandlingInstructionNote 433496 | | | | | 0..1 433498 | LONG_Note 433500 |
| ItemInformation 433502 | | | | | | | Amount 433504 | | | | | 0..n 433506 | ... |
| | | | | | | | | Amount 433508 | | | | 1 433510 | Amount 433512 |
| | | | | | | | | RoleCode 433514 | | | | 1 433516 | AmountRoleCode 433518 |

FIG. 43-131

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TextCollection 433520 | | | | | 0..1 433522 | ... |
| | | | | | | | | TextcCollection 433524 | | | | 1 433526 | TextCollection 433528 |
| | | | | | | | NatureOfCargo 433530 | | | | | 0..n 433532 | ... |
| | | | | | | | | ClassificationCode 433534 | | | | 1 433536 | NatureOfCargoClassificationCode 433538 |
| | | | | | | | Quantity 433540 | | | | | 0..n 433542 | ... |
| | | | | | | | | Quantity 433544 | | | | 1 433546 | Quantity 433548 |
| | | | | | | | | RoleCode 433550 | | | | 0..1 433552 | QuantityRoleCode 433554 |

FIG. 43-132

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TypeCode 433556 | | | | 0..1 433558 | QuantityTypeCode 433560 |
| | | | | | | | TransportationDocumentInformation 433562 | | | | | 0..n 433564 | ... |
| | | | | | | | | TransportationDocumentTypeCode 433566 | | | | 0..1 433568 | TransportationDocumentTypeCode 433570 |
| | | | | | | | | TransportationDocumentNote 433572 | | | | 0..1 433574 | SHORT_Note 433576 |
| | | | | | | | | TransportationDocumentID 433578 | | | | 0..1 433580 | TransportationDocumentID 433582 |

FIG. 43-133

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentStatusCode 433584 | | | | 0..1 433586 | TransportationDocumentStatusCode 433588 |
| | | | | | | | | LanguageCode 433590 | | | | 0..1 433592 | LanguageCode 433594 |
| | | | | | | | | CommunicationMediumTypeCode 433596 | | | | 0..1 433598 | CommunicationMediumTypeCode 433600 |
| | | | | | | | | RequiredIndiator 433602 | | | | 1 433604 | Indicator 433606 |
| | | | | | | | | OutputCopyNumberValue 433608 | | | | 0..1 433610 | NumberValue 433612 |

FIG. 43-134

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | OutputOriginalNumberValue 433614 | | | | 0..1 433616 | NumberValue 433618 |
| | | | | | | | | DateTimePeriod 433620 | | | | 0..n 433622 | ... |
| | | | | | | | | | DateTimePeriod 433624 | | | 1 433626 | DateTimePeriod 433628 |
| | | | | | | | | | PeriodRoleCode 433630 | | | 1 433632 | PeriodRoleCode 433634 |
| | | | | | | | BusinessTransactionDocumentReference 433636 | | | | | 0..n 433638 | ... |

FIG. 43-135

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 433640 | | | | 0..1 433642 | BusinessTransactionDocumentReference 433644 |
| | | | | | | | | BusinessTransactionDocumentRelationshipRoleCode 433646 | | | | 0..1 433648 | BusinessTransactionDocumentRelationshipRoleCode 433650 |
| | | | | | | | | BusinessTransactionDocumentRelationshipTypeCode 433652 | | | | 0..1 433654 | BusinessTransactionDocumentRelationshipTypeCode 433656 |

FIG. 43-136

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 433658 | | | | 0..1 433660 | TransportationDocumentTypeCode 433662 |
| | | | | | | | | TransportationDocumentNote 433664 | | | | 0..1 433666 | SHORT_Note 433668 |
| | | | | | | | | TransportationDocumentID 433670 | | | | 0..1 433672 | TransportationDocumentID 433674 |
| | | | | | | | | DateTimePeriod 433676 | | | | 0..n 433678 | ... |
| | | | | | | | | | RequestDateTimePeriod 433680 | | | 1 433682 | DateTimePeriod 433684 |

FIG. 43-137

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 433686 | | | 1 433688 | PeriodRoleCode 433690 |
| | | | | | | | DangerousGoods 433692 | | | | | 0..n 433694 | ... |
| | | | | | | | | ID 433696 | | | | 0..1 433698 | DangerousGoodsID 433700 |
| | | | | | | | | RegulationsCode 433702 | | | | 0..1 433704 | DangerousGoodsRegulationsCode 433706 |
| | | | | | | | | HazardCode 433708 | | | | 0..1 433710 | DangerousGoodsHazardCode 433712 |

FIG. 43-138

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | FlashpointMeasureInterval 433714 | | | | 0..1 433716 | MeasureInterval 433718 |
| | | | | | | | | PackagingGroupCode 433720 | | | | 0..1 433722 | DangerousGoodsPackagingGroupCode 433724 |
| | | | | | | | | EmergencySchedule 433726 | | | | 0..1 433728 | DangerousGoodsEmergencySchedule 433730 |
| | | | | | | | | TransportEmergencyCardCode 433732 | | | | 0..1 433734 | TransportEmergencyCardCode 433736 |

FIG. 43-139

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DangerousGoodsLabelCode 433738 | | | | 0..1 433740 | DangerousGoodsLabelCode 433742 |
| | | | | | | | | DangerousGoodsLabelCode2 433744 | | | | 0..1 433746 | DangerousGoodsLabelCode 433748 |
| | | | | | | | | DangerousGoodsLabelCode3 433750 | | | | 0..1 433752 | DangerousGoodsLabelCode 433754 |
| | | | | | | | | PackingInstructionTypeCode 433756 | | | | 0..1 433758 | PackingInstructionTypeCode 433760 |

FIG. 43-140

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportMeansDescriptionCode 433762 | | | | 0..1 433764 | TransportMeansDescriptionCode 433766 |
| | | | | | | | | TransportationAuthorisationCode 433768 | | | | 0..1 433770 | DangerousGoodsTransportationAuthorisationCode 433772 |
| | | | | | | | | ContactInformation 433774 | | | | 0..n 433776 | ... |
| | | | | | | | | | ContactPersonFunctionTypeCode 433778 | | | 1 433780 | ContactPersonFunctionTypeCode 433782 |
| | | | | | | | | | Address 433784 | | | 1 433786 | Address 433788 |

FIG. 43-141

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Quantity 433790 | | | | 0..n 433792 | ... |
| | | | | | | | | | Quantity 433794 | | | 1 433796 | Quantity 433798 |
| | | | | | | | | | RoleCode 433800 | | | 0..1 433802 | QuantityRoleCode 433804 |
| | | | | | | | | | TypeCode 433806 | | | 0..1 433808 | QuantityTypeCode 433810 |
| | | | | | | | | TextCollection 433812 | | | | 0..1 433814 | ... |
| | | | | | | | | | TextCollection 433816 | | | 1 433818 | TextCollection 433820 |

FIG. 43-142

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationUnitResourceInformationAssignment 433822 | | | | 0..n 433824 | ... |
| | | | | | | | | | ShipmentOrderResourceInformationID 433826 | | | 1 433828 | ResourceInformationID 433830 |
| | | | | | | | | | Quantity 433832 | | | 0..n 433834 | ... |
| | | | | | | | | | | Quantity 433836 | | 1 433838 | Quantity 433840 |
| | | | | | | | | | | RoleCode 433842 | | 0..1 433844 | QuantityRoleCode 433846 |

FIG. 43-143

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TypeCode 433848 | | 0..1 433850 | QuantityTypeCode 433852 |
| | | | | | | | TransportationStageAssignment 433854 | | | | | 0..n 433856 | ... |
| | | | | | | | | ShipmentOrderTransportationStageID 433858 | | | | 1 433860 | TransportationStageID 433862 |
| | | | | | | | | Quantity 433864 | | | | 0..n 433866 | ... |
| | | | | | | | | | Quantity 433868 | | | 1 433870 | Quantity 433872 |
| | | | | | | | | | RoleCode 433874 | | | 0..1 433876 | QuantityRoleCode 433878 |

FIG. 43-144

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 433880 | | | 0..1 433882 | QuantityTypeCode 433884 |
| | | | | | | | TransportationUnitResourceInformationAssignment 433886 | | | | | 0..n 433888 | ... |
| | | | | | | | | ShipmentOrderResourceInformationID 433890 | | | | 1 433892 | ResourceInformationID 433894 |
| | | | | | | | | Quantity 433896 | | | | 0..n 433898 | ... |
| | | | | | | | | | Quantity 433900 | | | 1 433902 | Quantity 433904 |

FIG. 43-145

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RoleCode 433906 | | | 0..1 433908 | QuantityRoleCode 433910 |
| | | | | | | | | | TypeCode 433912 | | | 0..1 433914 | QuantityTypeCode 433916 |
| GovernmentalRequirementInformation 433918 | | | | | | | GovernmentalProcedure 433920 | | | | | 0..n 433922 | ... |
| | | | | | | | | TransportationGovernmentAgencyTypeCode 433924 | | | | 0..1 433926 | TransportationGovernmentAgencyTypeCode 433928 |
| | | | | | | | | TransportationMovementTypeCode 433930 | | | | 0..1 433932 | TransportationMovementTypeCode 433934 |

FIG. 43-146

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationGovernmentAgencyInvolvementStatusCode 433936 | | | | 0..1 433938 | TransportationGovernmentAgencyInvolvementStatusCode 433940 |
| | | | | | | | | TransportationGovernmentAgencyActionCode 433942 | | | | 0..1 433944 | TransportationGovernmentAgencyActionCode 433946 |
| | | | | | | | | TransportationGovernmentAgencyProcedureStatusCode 433948 | | | | 0..1 433950 | TransportationGovernmentAgencyProcedureStatusCode 433952 |

FIG. 43-147

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 433954 | | | | 0..n 433956 | ... |
| | | | | | | | | | Location 433958 | | | 1 433960 | BusinessTransactionDocumentLocation 433962 |
| | | | | | | | | | RoleCode 433964 | | | 1 433966 | LocationRoleCode 433968 |
| | | | | | | | | | TypeCode 433970 | | | 0..1 433972 | LocationTypeCode 433974 |
| | | | | | | | | | Name 433976 | | | 0..1 433978 | MEDIUM_Name 433980 |
| | | | | | | | | DateTime Period 433982 | | | | 0..n 433984 | ... |

FIG. 43-148

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | DateTime Period 433986 | | | 1 433988 | DateTimePeriod 433990 |
| | | | | | | | | | PeriodRoleCode 433992 | | | 1 433994 | PeriodRole Code 433996 |
| | | | | | | | | Seal 433998 | | | | 0..n 434000 | ... |
| | | | | | | | | | ID 434002 | | | 1 434004 | SealID 434006 |
| | | | | | | | | | PartyRole Code 434008 | | | 0..1 434010 | PartyRoleCode 434012 |
| | | | | | | | | | PartyFormattedName 434014 | | | 0..1 434016 | LONG_Name 434018 |
| | | | | | | | | | StatusCode 434020 | | | 0..1 434022 | SealStatusCode 434024 |

FIG. 43-149

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TextCollection 434026 | | | | 0..n 434028 | ... |
| | | | | | | | | | TextCollection 434030 | | | 0..1 434032 | TextCollection 434034 |
| | | | | | | | | TransportationDocumentInformation 434036 | | | | 0..n 434038 | ... |
| | | | | | | | | | TransportationDocumentTypeCode 434040 | | | 0..1 434042 | TransportationDocumentTypeCode 434044 |
| | | | | | | | | | TransportationDocumentNote 434046 | | | 0..1 434048 | SHORT_Note 434050 |

FIG. 43-150

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentID 434052 | | | 0..1 434054 | TransportationDocumentID 434056 |
| | | | | | | | | | TransportationDocumentStatusCode 434058 | | | 0..1 434060 | TransportationDocumentStatusCode 434062 |
| | | | | | | | | | LanguageCode 434064 | | | 0..1 434066 | LanguageCode 434068 |
| | | | | | | | | | CommunicationMediumTypeCode 434070 | | | 0..1 434072 | CommunicationMediumTypeCode 434074 |
| | | | | | | | | | RequiredIndicator 434076 | | | 1 434078 | Indicator 434080 |

FIG. 43-151

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | OutputCopyNumberValue 434082 | | | 0..1 434084 | NumberValue 434086 |
| | | | | | | | | | OutputOriginalNumberValue 434088 | | | 0..1 434090 | NumberValue 434092 |
| | | | | | | | | | DateTimePeriod 434094 | | | 0..n 434096 | ... |
| | | | | | | | | | | DateTimePeriod 434098 | | 1 434100 | DateTimePeriod 434102 |
| | | | | | | | | | | PeriodRoleCode 434104 | | 1 434106 | PeriodRoleCode 434108 |
| PartyInformation 434110 | | | | | | | Party 434112 | | | | | 0..n 434114 | ... |

FIG. 43-152

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Party 434116 | | | | 1 434118 | BusinessTransactionDocumentParty 434120 |
| | | | | | | | | RoleCode 434122 | | | | 1 434124 | PartyRoleCode 434126 |
| | | | | | | | | FormattedName 434128 | | | | 0..1 434130 | LONG_Name 434132 |
| | | | | | | | | DateTimePeriods 434134 | | | | 0..n 434136 | ... |
| | | | | | | | | | RequestedFulfillmentPeriod 434138 | | | 0..1 434140 | DateTimePeriod 434142 |

FIG. 43-153

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | AcceptableFulfillmentPeriod 434144 | | | 0..1 434146 | DateTimePeriod 434148 |
| | | | | | | | | | PeriodRoleCode 434150 | | | 1 434152 | PeriodRoleCode 434154 |
| LocationInformation 434156 | | | | | | | Location 434158 | | | | | 0..n 434160 | ... |
| | | | | | | | | Location 434162 | | | | 1 434164 | BusinessTransactionDocumentLocation 434166 |
| | | | | | | | | RoleCode 434168 | | | | 1 434170 | LocationRoleCode 434172 |
| | | | | | | | | TypeCode 434174 | | | | 0..1 434176 | LocationTypeCode 434178 |

FIG. 43-154

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Name 434180 | | | | 0..1 434182 | MEDIUM_Name 434184 |
| | | | | | | | | DateTime Periods 434186 | | | | 0..n 434188 | ... |
| | | | | | | | | | RequestedFulfillmentPeriod 434190 | | | 0..1 434192 | DateTimePeriod 434194 |
| | | | | | | | | | AcceptableFulfillmentPeriod 434196 | | | 0..1 434198 | DateTimePeriod 434200 |
| | | | | | | | | | PeriodRoleCode 434202 | | | 1 434204 | PeriodRole Code 434206 |

FIG. 43-155

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationGoodsInformation 434208 | | | | | | | ProductInformation 434210 | | | | | 0..n 434212 | ... |
| | | | | | | | | Product 434214 | | | | 0..1 434216 | BusinessTransactionDocumentProduct 434218 |
| | | | | | | | | ProductDescription 434220 | | | | 0..1 434222 | SHORT_Description 434224 |
| | | | | | | | TransportationGoodsIdentification 434226 | | | | | 0..n 434228 | ... |

FIG. 43-156

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationGoodsIdentifierTypeCode 434230 | | | | 1 434232 | TransportationGoodsIdentifierTypeCode 434234 |
| | | | | | | | | LowerBoundaryTransportationGoodsID 434236 | | | | 1 434238 | TransportationGoodsID 434240 |
| | | | | | | | | UpperBoundaryTransportationGoodsID 434242 | | | | 0..1 434244 | TransportationGoodsID 434246 |
| TransportationChargesInformation 434248 | | | | | | TransportationChargesInformation 434250 | | | | | | 0..n 434252 | ... |

FIG. 43-157

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesUsageCode 434254 | | | | | 1 434256 | TransportationChargesUsageCode 434258 |
| | | | | | | | ShipmentOrderItemID 434260 | | | | | 0..1 434262 | BusinessTransactionDocumentItemID 434264 |
| | | | | | | | ShipmentOrderPartyStandardID 434266 | | | | | 0..1 434268 | PartyStandardID 434270 |
| | | | | | | | ShipmentOrderPartyInternalID 434272 | | | | | 0,,1 434274 | PartyInternalID 434276 |

FIG. 43-158

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ShipmentOrderResourceInformationID 434278 | | | | | 0..1 434280 | ResourceInformationID 434282 |
| | | | | | | | ShipmentOrderPackageInformationID 434284 | | | | | 0..1 434286 | PackageInformationID 434288 |
| | | | | | | | ShipmentOrderTransportationStageID 434290 | | | | | 0..1 434292 | TransportationStageID 434294 |
| | | | | | | | TransportationCharges 434296 | | | | | 0..1 434298 | ... |

FIG. 43-159

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ID 434300 | | | | 1 434302 | TransportationChargesID 434304 |
| | | | | | | | | FreightAgreementID 434306 | | | | 1 434308 | FreightAgreementID 434310 |
| | | | | | | | | OriginCode 434312 | | | | 0..1 434314 | TransportationChargesOriginCode 434316 |
| | | | | | | | | TariffID 434318 | | | | 0..1 434320 | TransportationChargesTariffID 434322 |
| | | | | | | | | CalculationSheetID 434324 | | | | 1 434326 | TransportationChargesCalculationSheetID 434328 |

FIG. 43-160

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 434330 | | | | 0..n 434332 | ... |
| | | | | | | | | | Location 434334 | | | 1 434336 | BusinessTransactionDocumentLocation 434338 |
| | | | | | | | | | RoleCode 434340 | | | 1 434342 | LoactionRoleCode 434344 |
| | | | | | | | | | TypeCode 434346 | | | 0..1 434348 | LocationTypeCode 434350 |
| | | | | | | | | | Name 434352 | | | 0..1 434354 | MEDIUM_Name 434356 |
| | | | | | | | | | DateTimePeriods 434358 | | | 0..n 434360 | ... |

FIG. 43-161

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | RequestedFulfillmentPeriod 434362 | | 0..1 434364 | DateTimePeriod 434366 |
| | | | | | | | | | | AcceptableFulfillmentPeriod 434368 | | 0..1 434370 | DateTimePeriod 434372 |
| | | | | | | | | | | PeriodRoleCode 434374 | | 1 434376 | PeriodRoleCode 434378 |
| | | | | | | | | TextCollection 434380 | | | | 0..1 434382 | ... |
| | | | | | | | | | TextCollection 434384 | | | 1 434386 | TextCollection 434388 |

FIG. 43-162

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Currency 434390 | | | | 0..n 434392 | ... |
| | | | | | | | | | Code 434394 | | | 1 434396 | CurrencyCode 434398 |
| | | | | | | | | | RoleCode 434400 | | | 1 434402 | CurrencyRoleCode 434404 |
| | | | | | | | | | UsageCode 434406 | | | 0..1 434408 | CurrencyUsageCode 434410 |
| | | | | | | | | Exchange Rate 434412 | | | | 0..n 434414 | ... |
| | | | | | | | | | Exchange Rate 434416 | | | 1 434418 | ExchangeRate 434420 |

FIG. 43-163

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 434422 | | | 0..1 434424 | ExchangeRateTypeCode 434426 |
| | | | | | | | | PercentElement 434428 | | | | 0..n 434430 | ... |
| | | | | | | | | | PercentRoleCode 434432 | | | 1 434434 | PercentRoleCode 434436 |
| | | | | | | | | | Percent 434438 | | | 1 434440 | Percent 434442 |
| | | | | | | | | | TransportationChargesPercentCalculationBaseCode 434444 | | | 0..1 434446 | TransportationChargesPercentCalculationBaseCode 434448 |

FIG. 43-164

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | StatusCode 434450 | | | 0..1 434452 | TransportationChargesPercentElementStatusCode 434454 |
| | | | | | | | | DateTime Period 434456 | | | | 0..n 434458 | ... |
| | | | | | | | | | DateTime Period 434460 | | | 1 434462 | DateTimePeriod 434464 |
| | | | | | | | | | PeriodRoleCode 434466 | | | 1 434468 | PeriodRole Code 434470 |
| | | | | | | | | Business TransactionDocumentReference 434472 | | | | 0..n 434474 | ... |

FIG. 43-165

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | BusinessTransactionDocumentReference 434476 | | | 0..1 434478 | BusinessTransactionDocumentReference 434480 |
| | | | | | | | | | BusinessTransactionDocumentRelationshipRoleCode 434482 | | | 0..1 434484 | BusinessTransactionDocumentRelationshipRoleCode 434486 |
| | | | | | | | | | BusinessTransactionDocumentRelationshipTypeCode 434488 | | | 0..1 434490 | BusinessTransactionDocumentRelationshipTypeCode 434492 |

FIG. 43-166

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentTypeCode 434494 | | | 0..1 434496 | TransportationDocumentTypeCode 434498 |
| | | | | | | | | | TransportationDocumentNote 434500 | | | 0..1 434502 | SHORT_Note 434504 |
| | | | | | | | | | TransportationDocumentID 434506 | | | 0..1 434508 | TransportationDocumentID 434510 |
| | | | | | | | | TaxDetail 434512 | | | | 0..n 434514 | ... |
| | | | | | | | | | ProductTax 434516 | | | 1 434518 | ProductTax 434520 |

FIG. 43-167

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PaymentInstruction 434522 | | | | 0..n 434524 | ... |
| | | | | | | | | | PaymentInstruction 434526 | | | 1 434528 | PaymentInstruction 434530 |
| | | | | | | | | | TransportationChargesElementCategoryCode 434532 | | | 0..1 434534 | TransportationChargesElementCategoryCode 434536 |
| | | | | | | | | | TransportationChargesElementSubCategoryCode 434538 | | | 0..1 434540 | TransportationChargesElementSubCategoryCode 434542 |

FIG. 43-168

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesPaymentArrangementCode 434544 | | | 0..1 434546 | TransportationChargesPaymentArrangementCode 434548 |
| | | | | | | | | CashDiscountTerms 434550 | | | | 0..1 434552 | ... |
| | | | | | | | | | CashDiscountTerms 434554 | | | 1 434556 | CashDiscountTerms 434558 |
| | | | | | | | | | TransportationChargesElementCategoryCode 434560 | | | 0..1 434562 | TransportationChargesElementCategoryCode 434564 |

FIG. 43-169

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesElementSubCategoryCode 434566 | | | 0..1 434568 | TransportationChargesElementSubCategoryCode 434570 |
| | | | | | | | | Element 434572 | | | | 0..n 434574 | ... |
| | | | | | | | | | CategoryCode 434576 | | | 1 434578 | TransportationChargesElementCategoryCode 434580 |
| | | | | | | | | | SubCategoryCode 434582 | | | 1 434584 | TransportationChargesElementSubCategoryCode 434586 |

FIG. 43-170

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 434588 | | | 1 434590 | TransportationChargesElementTypeCode 434592 |
| | | | | | | | | | CalculationResolutionCode 434594 | | | 1 434596 | TransportationChargesElementCalculationResolutionCode 434598 |
| | | | | | | | | | TransportationChargesPaymentArrangementCode 434600 | | | 0...1 434602 | TransportationChargesPaymentArrangementCode 434604 |
| | | | | | | | | | Location 434606 | | | 0..n 434608 | ... |

FIG. 43-171

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | Location 434610 | | 1 434612 | BusinessTransactionDocumentLocation 434614 |
| | | | | | | | | | | RoleCode 434616 | | 1 434618 | LocationRoleCode 434620 |
| | | | | | | | | | | TypeCode 434622 | | 0..1 434624 | LocationTypeCode 434626 |
| | | | | | | | | | | Name 434628 | | 0..1 434630 | MEDIUM_Name 434632 |
| | | | | | | | | | | DateTimePeriods 434634 | | 0..n 434636 | ... |

FIG. 43-172

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | | RequestedFulfillmentPeriod 434638 | 0..1 434640 | DateTimePeriod 434642 |
| | | | | | | | | | | | AcceptableFulfillmentPeriod 434644 | 0..1 434646 | DateTimePeriod 434648 |
| | | | | | | | | | | | PeriodRoleCode 434650 | 1 434652 | PeriodRoleCode 434654 |
| | | | | | | | | | TextCollection 434656 | | | 0..1 434658 | ... |
| | | | | | | | | | | TextCollection 434660 | | 1 434662 | TextCollection 434664 |

FIG. 43-173

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | Currency 434666 | | | 0..n 434668 | ... |
| | | | | | | | | | | Code 434670 | | 1 434672 | CurrencyCode 434674 |
| | | | | | | | | | | RoleCode 434676 | | 1 434678 | CurrencyRoleCode 434680 |
| | | | | | | | | | | UsageCode 434682 | | 0..1 434684 | CurrencyUsageCode 434686 |
| | | | | | | | | | RateElement 434688 | | | 0..n 434690 | ... |
| | | | | | | | | | | ID 434692 | | 1 434694 | TransportationChargesElementRateElementID 434696 |

FIG. 43-174

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | Amount 434698 | | 1 434700 | Amount 434702 |
| | | | | | | | | | | BaseQuantity 434704 | | 1 434706 | Quantity 434708 |
| | | | | | | | | | | TransportationChargesRateTypeCode 434710 | | 0..1 434712 | TransportationChargesRateTypeCode 434714 |
| | | | | | | | | | | TransportationChargesRateRoleCode 434716 | | 1 434718 | TransportationChargesRateRoleCode 434720 |

FIG. 43-175

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TransportationChargesRateElementStatusCode 434722 | | 0..1 434724 | TransportationChargesRateElementStatusCode 434726 |
| | | | | | | | | | PercentElement 434728 | | | 0..n 434730 | ... |
| | | | | | | | | | | PercentRoleCode 434732 | | 1 434734 | PercentRoleCode 434736 |
| | | | | | | | | | | Percent 434738 | | 1 434740 | Percent 434742 |

FIG. 43-176

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TransportationChargesPercentCalculationBaseCode 434744 | | 0..1 434746 | TransportationChargesPercentCalculationBaseCode 434748 |
| | | | | | | | | | | StatusCode 434750 | | 0..1 434752 | TransportationChargesPercentElementStatusCode 434754 |
| | | | | | | | | | AmountElement 434756 | | | 0..n 434758 | ... |
| | | | | | | | | | | Amount 434760 | | 1 434762 | Amount 434764 |
| | | | | | | | | | | AmountRoleCode 434766 | | 1 434768 | AmountRoleCode 434770 |

FIG. 43-177

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TransportationChargesAmountElementStatusCode 434772 | | 0..1 434774 | TransportationChargesAmountElementStatusCode 434776 |
| | | | | | | | | | | RateElementAssignment 434778 | | 0..n 434780 | ... |
| | | | | | | | | | | | TransportationChargesElementRateElementID 434782 | 1 434784 | TransportationChargesElementRateElementID 434786 |
| | | | | | | | | | CalculationBase 434788 | | | 0..n 434790 | ... |

FIG. 43-178

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TransportationChargesElementCalculationBaseCode 434792 | | 1 434794 | TransportationChargesElementCalculationBaseCode 434796 |
| | | | | | | | | | | BaseQuantity 434798 | | 0..1 434800 | Quantity 434802 |
| | | | | | | | | | | BaseQuantityRoleCode 434804 | | 0..1 434806 | QuantityRoleCode 434808 |
| | | | | | | | | | | BaseQuantityTypeCode 434810 | | 0..1 434812 | QuantityTypeCode 434814 |
| | | | | | | | | | TaxDetail 434816 | | | 0..n 434818 | ... |

FIG. 43-179

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | ProductTax 434820 | | 1 434822 | ProductTax 434824 |
| | | | | | | | | | DateTime Period 434826 | | | 0..n 434828 | ... |
| | | | | | | | | | | DateTime Period 434830 | | 1 434832 | DateTimePeriod 434834 |
| | | | | | | | | | | PeriodRoleCode 434836 | | 1 434838 | PeriodRole Code 434840 |
| | | | | | | | | | CostDistribution 434842 | | | 0..n 434844 | ... |
| | | | | | | | | | | AccountingCodingBlockAssignment 434846 | | 1 434848 | Accounting CodingBlock Assignment 434850 |

FIG. 44-1

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| FreightOrderExecutionRequestMessage 440000 | FreightOrderExecutionRequestMessage 440002 | | | | | | | | | | | | FreightOrderExecutionRequestMessage 440004 |
| MessageHeader 440006 | | Message Header 440008 | | | | | | | | | | 1..1 440010 | BusinessDocumentMessageHeader 440012 |
| FreightOrder Execution 440014 | | FreightOrderExecution 440016 | | | | | | | | | | 1..1 440018 | ... |
| | | | @actioncode 440020 | | | | | | | | | 1..1 440022 | ActionCode 440024 |
| | | | ID 440026 | | | | | | | | | 1..1 440028 | BusinessTransactionDocumentID 440030 |

FIG. 44-2

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| Request 440032 | | | Request 440034 | | | | | | | | | 1..1 440036 | ... |
| Header 440038 | | | | DateTime Periods 440040 | | | | | | | | 0..n 440042 | ... |
| | | | | | RequestedFulfillmentPeriod 440044 | | | | | | | 0..1 440046 | DateTimePeriod 440048 |
| | | | | | AcceptableFulfillmentPeriod 440050 | | | | | | | 0..1 440052 | DateTimePeriod 440054 |
| | | | | | PeriodRoleCode 440056 | | | | | | | 1..1 440058 | PeriodRoleCode 440060 |
| | | | | NatureOfCargo 440062 | | | | | | | | 0..n 440064 | ... |

FIG. 44-3

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | ClassificationCode 440066 | | | | | | | 1..1 440068 | NatureOfCargoClassificationCode 440070 |
| | | | | TotalQuantity 440072 | | | | | | | | 0..n 440074 | ... |
| | | | | | Quantity 440076 | | | | | | | 1 440078 | Quantity 440080 |
| | | | | | RoleCode 440082 | | | | | | | 0..1 440084 | QuantityRoleCode 440086 |
| | | | | | TypeCode 440088 | | | | | | | 0..1 440090 | QuantityTypeCode 440092 |
| | | | | TotalAmount 440094 | | | | | | | | 0..n 440096 | ... |
| | | | | | Amount 440098 | | | | | | | 1..1 440100 | Amount 440102 |

FIG. 44-4

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | RoleCode 440104 | | | | | | | 1..1 440106 | AmountRoleCode 440108 |
| | | | | TextCollection 440110 | | | | | | | | 0..1 440112 | ... |
| | | | | | TextCollection 440114 | | | | | | | 1..1 440116 | TextCollection 440118 |
| | | | | BusinessTransactionDocumentReference 440120 | | | | | | | | 0..n 440122 | ... |
| | | | | | BusinessTransactionDocumentReference 440124 | | | | | | | 0..1 440126 | BusinessTransactionDocumentReference 440128 |

FIG. 44-5

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentRelationshipRoleCode 440130 | | | | | | | 0..1 440132 | BusinessTransactionDocumentRelationshipRoleCode 440134 |
| | | | | | BusinessTransactionDocumentRelationshipTypeCode 440136 | | | | | | | 0..1 440138 | BusinessTransactionDocumentRelationshipTypeCode 440140 |
| | | | | | TransportationDocumentTypeCode 440142 | | | | | | | 0..1 440144 | TransportationDocumentTypeCode 440146 |

FIG. 44-6

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationDocumentNote 440148 | | | | | | | 0..1 440150 | SHORT_Note 440152 |
| | | | | | TransportationDocumentID 440154 | | | | | | | 0..1 440156 | TransportationDocumentID 440158 |
| | | | | | DateTimePeriod 440160 | | | | | | | 0..n 440162 | ... |
| | | | | | | DateTimePeriod 440164 | | | | | | 1..1 440166 | DateTimePeriod 440168 |
| | | | | | | PeriodRoleCode 440170 | | | | | | 1..1 440172 | PeriodRoleCode 440174 |

FIG. 44-7

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| GovernmentalRequirementInformation 440176 | | | | GovernmentalProcedure 440178 | | | | | | | | 0..n 440180 | ... |
| | | | | | TransportationGovernmentAgencyTypeCode 440182 | | | | | | | 0..1 440184 | TransportationGovernmentAgencyTypeCode 440186 |
| | | | | | TransportationMovementTypeCode 440188 | | | | | | | 0..1 440190 | TransportationMovementTypeCode 440192 |
| | | | | | TransportationGovernmentAgencyInvolvementStatusCode 440194 | | | | | | | 0..1 440196 | TransportationGovernmentAgencyInvolvementStatusCode 440198 |

FIG. 44-8

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationGovernmentAgencyActionCode 440200 | | | | | | | 0..1 440202 | TransportationGovernmentAgencyActionCode 440204 |
| | | | | | TransportationGovernmentAgencyProcedureStatusCode 440206 | | | | | | | 0..1 440208 | TransportationGovernmentAgencyProcedureStatusCode 440210 |
| | | | | | Location 440212 | | | | | | | 0..n 440214 | ... |
| | | | | | | Location 440216 | | | | | | 1..1 440218 | BusinessTransactionDocumentLocation 440220 |

FIG. 44-9

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | RoleCode 440222 | | | | | | 1..1 440224 | LocationRoleCode 440226 |
| | | | | | | TypeCode 440228 | | | | | | 0..1 440230 | LocationTypeCode 440232 |
| | | | | | | Name 440234 | | | | | | 0..1 440236 | MEDIUM_Name 440238 |
| | | | | | DateTime Period 440240 | | | | | | | 0..n 440242 | ... |
| | | | | | | DateTime Period 440244 | | | | | | 1..1 440246 | DateTimePeriod 440248 |
| | | | | | | PeriodRoleCode 440250 | | | | | | 1..1 440252 | PeriodRoleCode 440254 |
| | | | | | Seal 440256 | | | | | | | 0..n 440258 | ... |

FIG. 44-10

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ID 440260 | | | | | | 0..1 440262 | SealID 440264 |
| | | | | | | PartyRoleCode 440266 | | | | | | 0..1 440268 | PartyRoleCode 440270 |
| | | | | | | PartyFormattedName 440272 | | | | | | 0..1 440274 | LONG_Name 440276 |
| | | | | | | StatusCode 440278 | | | | | | 0..1 440280 | SealStatusCode 440282 |
| | | | | | TextCollection 440284 | | | | | | | 0..1 440286 | ... |
| | | | | | | TextCollection 440288 | | | | | | 1..1 440290 | TextCollection 440292 |

FIG. 44-11

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationDocumentInformation 440294 | | | | | | | 0..n 440296 | ... |
| | | | | | | TransportationDocumentTypeCode 440298 | | | | | | 0..1 440300 | TransportationDocumentTypeCode 440302 |
| | | | | | | TransportationDocumentNote 440304 | | | | | | 0..1 440306 | SHORT_Note 440308 |
| | | | | | | TransportationDocumentID 440310 | | | | | | 0..1 440312 | TransportationDocumentID 440314 |

FIG. 44-12

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentStatusCode 440316 | | | | | | 0..1 440318 | TransportationDocumentStatusCode 440320 |
| | | | | | | LanguageCode 440322 | | | | | | 0..1 440324 | LanguageCode 440326 |
| | | | | | | CommunicationMediumTypeCode 440328 | | | | | | 0..1 440330 | CommunicationMediumTypeCode 440332 |
| | | | | | | RequiredIndicator 440334 | | | | | | 1 440336 | Indicator 440338 |
| | | | | | | OutputCopyNumberValue 440340 | | | | | | 0..1 440342 | NumberValue 440344 |

FIG. 44-13

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | OutputOriginalNumberValue 440346 | | | | | | 0..1 440348 | NumberValue 440350 |
| | | | | | | DateTimePeriod 440352 | | | | | | 0..n 440354 | ... |
| | | | | | | | DateTimePeriod 440356 | | | | | 1..1 440358 | DateTimePeriod 440360 |
| | | | | | | | PeriodRoleCode 440362 | | | | | 1..1 440364 | PeriodRoleCode 440366 |
| PartyInformation 440368 | | | | Party 440370 | | | | | | | | 0..n 440372 | ... |
| | | | | | Party 440374 | | | | | | | 1 440376 | BusinessTransactionDocumentParty 440378 |

FIG. 44-14

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | RoleCode 440380 | | | | | | | 1 440382 | PartyRoleCode 440384 |
| | | | | | FormattedName 440386 | | | | | | | 0..1 440388 | LONG_Name 440390 |
| | | | | | BusinessTransactionDocumentReference 440392 | | | | | | | 0..n 440394 | ... |
| | | | | | | BusinessTransactionDocumentReference 440396 | | | | | | 0..1 440398 | BusinessTransactionDocumentReference 440400 |

FIG. 44-15

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipRoleCode 440402 | | | | | | 0..1 440404 | BusinessTransactionDocumentRelationshipRoleCode 440406 |
| | | | | | | BusinessTransactionDocumentRelationshipTypeCode 440408 | | | | | | 0..1 440410 | BusinessTransactionDocumentRelationshipTypeCode 440412 |
| | | | | | | TransportationDocumentTypeCode 440414 | | | | | | 0..1 440416 | TransportationDocumentTypeCode 440418 |

FIG. 44-16

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentNote 440420 | | | | | | 0..1 440422 | SHORT_Note 440424 |
| | | | | | | TransportationDocumentID 440426 | | | | | | 0..1 440428 | TransportationDocumentID 440430 |
| | | | | | | DateTimePeriod 440432 | | | | | | 0..n 440434 | ... |
| | | | | | | | DateTimePeriod 440436 | | | | | 1 440438 | DateTimePeriod 440440 |
| | | | | | | | PeriodRoleCode 440442 | | | | | 1 440444 | PeriodRoleCode 440446 |

FIG. 44-17

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationStageInformation 440448 | | | | TransportationStage 440450 | | | | | | | | 0..n 440452 | ... |
| | | | | | ID 440454 | | | | | | | 1 440456 | TransportationStageID 440458 |
| | | | | | OrdinalNumberValue 440460 | | | | | | | 0..1 440462 | OrdinalNumberValue 440464 |
| | | | | | TypeCode 440466 | | | | | | | 0..1 440468 | TransportationStageTypeCode 440470 |
| | | | | | JourneyID 440472 | | | | | | | 0..1 440474 | JourneyID 440476 |

FIG. 44-18

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportModeCode 440478 | | | | | | | 0..1 440480 | TransportModeCode 440482 |
| | | | | | TransportMeansDescriptionCode 440484 | | | | | | | 0..1 440486 | TransportMeansDescriptionCode 440488 |
| | | | | | TransportMeansDescription 440490 | | | | | | | 0..1 440492 | SHORT_Description 440494 |
| | | | | | TransportMeansID 440496 | | | | | | | 0..1 440498 | TransportMeansID 440500 |
| | | | | | TransportMeansHomeCountryCode 440502 | | | | | | | 0..1 440504 | CountryCode 440506 |

FIG. 44-19

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportMeansOwnershipTypeCode 440508 | | | | | | | 0..1 440510 | TransportMeansOwnershipTypeCode 440512 |
| | | | | | CarrierStandardID 440514 | | | | | | | 0..1 440516 | PartyStandardID 440518 |
| | | | | | CarrierFormattedName 440520 | | | | | | | 0..1 440522 | LONG_Name 440524 |
| | | | | | TransportationTransitDirectionCode 440526 | | | | | | | 0..1 440528 | TransportationTransitDirectionCode 440530 |

FIG. 44-20

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | CalculatedDistanceMeasure 440532 | | | | | | | 0..1 440534 | Measure 440536 |
| | | | | | GivenDistanceMeasure 440538 | | | | | | | 0..1 440540 | Measure 440542 |
| | | | | | ContactInformation 440544 | | | | | | | 0..n 440546 | ... |
| | | | | | | ContactPersonFunctionTypeCode 440548 | | | | | | 1..1 440550 | ContactPersonFunctionTypeCode 440552 |
| | | | | | | Address 440554 | | | | | | 1..1 440556 | Address 440558 |

FIG. 44-21

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | Quantity 440560 | | | | | | | 0..n 440562 | ... |
| | | | | | | Quantity 440564 | | | | | | 1 440566 | Quantity 440568 |
| | | | | | | RoleCode 440570 | | | | | | 0..1 440572 | QuantityRoleCode 440574 |
| | | | | | | TypeCode 440576 | | | | | | 0..1 440578 | QuantityTypeCode 440580 |
| | | | | | Party 440582 | | | | | | | 1..n 440584 | ... |
| | | | | | | Party 440586 | | | | | | 1 440588 | BusinessTransactionDocumentParty 440590 |
| | | | | | | RoleCode 440592 | | | | | | 1 440594 | PartyRoleCode 440596 |

FIG. 44-22

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | FormattedName 440598 | | | | | | 0..1 440600 | LONG_Name 440602 |
| | | | | | | TransportationDocumentInformation 440604 | | | | | | 0..n 440606 | ... |
| | | | | | | | TransportationDocumentTypeCode 440608 | | | | | 0..1 440610 | TransportationDocumentTypeCode 440612 |
| | | | | | | | TransportationDocumentNote 440614 | | | | | 0..1 440616 | SHORT_Note 440618 |
| | | | | | | | TransportationDocumentID 440620 | | | | | 0..1 440622 | TransportationDocumentID 440624 |

FIG. 44-23

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentStatusCode 440626 | | | | | 0..1 440628 | TransportationDocumentStatusCode 440630 |
| | | | | | | | LanguageCode 440632 | | | | | 0..1 440634 | LanguageCode 440636 |
| | | | | | | | CommunicationMediumTypeCode 440638 | | | | | 0..1 440640 | CommunicationMediumTypeCode 440642 |
| | | | | | | | RequiredIndicator 440644 | | | | | 1 440646 | Indicator 440648 |
| | | | | | | | OutputCopyNumberValue 440650 | | | | | 0..1 440652 | NumberValue 440654 |

FIG. 44-24

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OutputOriginalNumberValue 440656 | | | | | 0..1 440658 | NumberValue 440660 |
| | | | | | | | DateTimePeriod 440662 | | | | | 0..n 440664 | ... |
| | | | | | | | | DateTimePeriod 440666 | | | | 1 440668 | DateTimePeriod 440670 |
| | | | | | | | | PeriodRoleCode 440672 | | | | 1 440674 | PeriodRoleCode 440676 |
| | | | | | | BusinessTransactionDocumentReference 440678 | | | | | | 0..n 440680 | ... |

FIG. 44-25

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentReference 440682 | | | | | 0..1 440684 | BusinessTransactionDocumentReference 440686 |
| | | | | | | | BusinessTransactionDocumentRelationshipRoleCode 440688 | | | | | 0..1 440690 | BusinessTransactionDocumentRelationshipRoleCode 440692 |
| | | | | | | | BusinessTransactionDocumentRelationshipTypeCode 440694 | | | | | 0..1 440696 | BusinessTransactionDocumentRelationshipTypeCode 440698 |

FIG. 44-26

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentTypeCode 440700 | | | | | 0..1 440702 | TransportationDocumentTypeCode 440704 |
| | | | | | | | TransportationDocumentNote 440706 | | | | | 0..1 440708 | SHORT_Note 440710 |
| | | | | | | | TransportationDocumentID 440712 | | | | | 0..1 440714 | TransportationDocumentID 440716 |
| | | | | | | | DateTime Period 440718 | | | | | 0..n 440720 | ... |
| | | | | | | | | DateTime Period 440722 | | | | 1..1 440724 | DateTimePeriod 440726 |

FIG. 44-27

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PeriodRoleCode 440728 | | | | 1..1 440730 | PeriodRoleCode 440732 |
| | | | | | Location 440734 | | | | | | | 1..n 440736 | ... |
| | | | | | | Location 440738 | | | | | | 1 440740 | BusinessTransactionDocumentLocation 440742 |
| | | | | | | RoleCode 440744 | | | | | | 1 440746 | LocationRoleCode 440748 |
| | | | | | | TypeCode 440750 | | | | | | 0..1 440752 | LocationTypeCode 440754 |
| | | | | | | Name 440756 | | | | | | 0..1 440758 | MEDIUM_Name 440760 |

FIG. 44-28

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTime Periods 440762 | | | | | | 0..n 440764 | ... |
| | | | | | | | RequestDateTimePeriod 440766 | | | | | 0..1 440768 | DateTimePeriod 440770 |
| | | | | | | | AcceptableDateTimePeriod 440772 | | | | | 0..1 440774 | DateTimePeriod 440776 |
| | | | | | | | PeriodRoleCode 440778 | | | | | 1..1 440780 | PeriodRoleCode 440782 |
| | | | | | Seal 440784 | | | | | | | 0..n 440786 | ... |
| | | | | | | ID 440788 | | | | | | 1 440790 | SealID 440792 |

FIG. 44-29

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | PartyRoleCode 440794 | | | | | | 0..1 440796 | PartyRoleCode 440798 |
| | | | | | | PartyFormattedName 440800 | | | | | | 0..1 440802 | LONG_Name 440804 |
| | | | | | | StatusCode 440806 | | | | | | 0..1 440808 | SealStatusCode 440810 |
| | | | | | TextCollection 440812 | | | | | | | 0..1 440814 | ... |
| | | | | | | TextCollection 440816 | | | | | | 1..1 440818 | TextCollection 440820 |

FIG. 44-30

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentReference 440822 | | | | | | | 0..n 440824 | ... |
| | | | | | | BusinessTransactionDocumentReference 440826 | | | | | | 0..1 440828 | BusinessTransactionDocumentReference 440830 |
| | | | | | | BusinessTransactionDocumentRelationshipRoleCode 440832 | | | | | | 0..1 440834 | BusinessTransactionDocumentRelationshipRoleCode 440836 |

FIG. 44-31

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipTypeCode 440838 | | | | | | 0..1 440840 | BusinessTransactionDocumentRelationshipTypeCode 440842 |
| | | | | | | TransportationDocumentTypeCode 440844 | | | | | | 0..1 440846 | TransportationDocumentTypeCode 440848 |
| | | | | | | TransportationDocumentNote 440850 | | | | | | 0..1 440852 | SHORT_Note 440854 |
| | | | | | | TransportationDocumentID 440856 | | | | | | 0..1 440858 | TransportationDocumentID 440860 |

FIG. 44-32

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTime Period 440862 | | | | | | 0..n 440864 | ... |
| | | | | | | | DateTime Period 440866 | | | | | 1..1 440868 | DateTimePeriod 440870 |
| | | | | | | | PeriodRoleCode 440872 | | | | | 1 440874 | PeriodRoleCode 440876 |
| | | | | | TransportationServiceRequirement 440878 | | | | | | | 1..1 440880 | ... |
| | | | | | | TransportationServiceRequirementCode 440882 | | | | | | 0..1 440884 | TransportationServiceRequirementCode 440886 |

FIG. 44-33

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | AdditionalTransportationServiceRequirementCode 440888 | | | | | | 0..1 440890 | TransportationServiceRequirementCode 440892 |
| | | | | | | TransportationContractConditionCode 440894 | | | | | | 0..1 440896 | TransportationContractConditionCode 440898 |
| | | | | | | TransportServiceLevelCode 440900 | | | | | | 0..1 440902 | TransportServiceLevelCode 440904 |
| | | | | | | NatureOfCargoClassificationCode 440906 | | | | | | 0..1 440908 | NatureOfCargoClassificationCode 440910 |

FIG. 44-34

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationUnitResourceInformation 440912 | | | | TransportationUnitResourceInformation 440914 | | | | | | | | 0..n 440916 | ... |
| | | | | | ID 440918 | | | | | | | 1 440920 | ResourceInformationID 440922 |
| | | | | | ResourceNumberValue 440924 | | | | | | | 0..1 440926 | NumberValue 440928 |
| | | | | | ResourceID 440930 | | | | | | | 0..1 440932 | ResourceID 440934 |
| | | | | | ResourceHomeCountryCode 440936 | | | | | | | 0..1 440938 | CountryCode 440940 |

FIG. 44-35

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | TransportationUnitResourceCategoryCode 440942 | | | | | | | 0..1 440944 | TransportationUnitResourceCategoryCode 440946 |
| | | | | | TransportationUnitResourceTypeCode 440948 | | | | | | | 0..1 440950 | TransportationUnitResourceTypeCode 440952 |
| | | | | | FillLevelCode 440954 | | | | | | | 0..1 440956 | FillLevelCode 440958 |
| | | | | | ShippingTypeCode 440960 | | | | | | | 0..1 440962 | ShippingTypeCode 440964 |

FIG. 44-36

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | HaulageArrangerCode 440966 | | | | | | | 0..1 440968 | HaulageArrangerCode 440970 |
| | | | | | TransportationHandlingInstructionCode 440972 | | | | | | | 0..1 440974 | TransportationHandlingInstructionCode 440976 |
| | | | | | TransportationHandlingInstructionNote 440978 | | | | | | | 0..1 440980 | LONG_Note 440982 |
| | | | | | TransportationStageAssignment 440984 | | | | | | | 0..n 440986 | ... |

FIG. 44-37

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | FreightOrderTransportationStageID 440988 | | | | | | 1..1 440990 | TransportationStageID 440992 |
| | | | | | AttachedEquipment 440994 | | | | | | | 0..n 440996 | ... |
| | | | | | | FreightOrderResourceInformationID 440998 | | | | | | 1..1 441000 | ResourceID 441002 |
| | | | | | Quantity 441004 | | | | | | | 0..n 441006 | ... |
| | | | | | | Quantity 441008 | | | | | | 1 441010 | Quantity 441012 |
| | | | | | | RoleCode 441014 | | | | | | 0..1 441016 | QuantityRoleCode 441018 |

FIG. 44-38

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TypeCode 441020 | | | | | | 0..1 441022 | QuantityTypeCode 441024 |
| | | | | | Seal 441026 | | | | | | | 0..n 441028 | ... |
| | | | | | | ID 441030 | | | | | | 1 441032 | SealID 441034 |
| | | | | | | PartyRoleCode 441036 | | | | | | 0..1 441038 | PartyRoleCode 441040 |
| | | | | | | PartyFormattedName 441042 | | | | | | 0..1 441044 | LONG_Name 441046 |
| | | | | | | StatusCode 441048 | | | | | | 0..1 441050 | SealStatusCode 441052 |

FIG. 44-39

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | BusinessTransactionDocumentReference 441054 | | | | | | | 0..n 441056 | ... |
| | | | | | | BusinessTransactionDocumentReference 441058 | | | | | | 0..1 441060 | BusinessTransactionDocumentReference 441062 |
| | | | | | | BusinessTransactionDocumentRelationshipRoleCode 441064 | | | | | | 0..1 441066 | BusinessTransactionDocumentRelationshipRoleCode 441068 |

FIG. 44-40

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | BusinessTransactionDocumentRelationshipTypeCode 441070 | | | | | | 0..1 441072 | BusinessTransactionDocumentRelationshipTypeCode 441074 |
| | | | | | | TransportationDocumentTypeCode 441076 | | | | | | 0..1 441078 | TransportationDocumentTypeCode 441080 |
| | | | | | | TransportationDocumentNote 441082 | | | | | | 0..1 441084 | SHORT_Note 441086 |
| | | | | | | TransportationDocumentID 441088 | | | | | | 0..1 441090 | TransportationDocumentID 441092 |

FIG. 44-41

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DateTime Period 441094 | | | | | | 0..n 441096 | ... |
| | | | | | | | DateTime Period 441098 | | | | | 1..1 441100 | DateTimePeriod 441102 |
| | | | | | | | PeriodRoleCode 441104 | | | | | 1..1 441106 | PeriodRoleCode 441108 |
| | | | | | TextCollection 441110 | | | | | | | 0..1 441112 | ... |
| | | | | | | TextCollection 441114 | | | | | | 1..1 441116 | TextCollection 441118 |
| | | | | | Party 441120 | | | | | | | 1..n 441122 | ... |

FIG. 44-42

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Party 441124 | | | | | | 1..1 441126 | BusinessTransactionDocumentParty 441128 |
| | | | | | | RoleCode 441130 | | | | | | 1..1 441132 | PartyRoleCode 441134 |
| | | | | | Location 441136 | | | | | | | 0..n 441138 | ... |
| | | | | | | Location 441140 | | | | | | 1 441142 | BusinessTransactionDocumentLocation 441144 |
| | | | | | | RoleCode 441146 | | | | | | 1 441148 | LocationRoleCode 441150 |
| | | | | | | TypeCode 441152 | | | | | | 0..1 441154 | LocationTypeCode 441156 |

FIG. 44-43

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | Name 441158 | | | | | | 0..1 441160 | MEDIUM_Name 441162 |
| | | | | | | DateTime Periods 441164 | | | | | | 0..n 441166 | ... |
| | | | | | | | RequestDateTimePeriod 441168 | | | | | 0..1 441170 | DateTimePeriod 441172 |
| | | | | | | | AcceptableDateTimePeriod 441174 | | | | | 0..1 441176 | DateTimePeriod 441178 |
| | | | | | | | PeriodRoleCode 441180 | | | | | 1..1 441182 | PeriodRoleCode 441184 |
| | | | | | DangerousGoods 441186 | | | | | | | 0..n 441188 | ... |

FIG. 44-44

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ID 441190 | | | | | | 0..1 441192 | DangerousGoodsID 441194 |
| | | | | | | RegulationsCode 441196 | | | | | | 0..1 441198 | DangerousGoodsRegulationsCode 441200 |
| | | | | | | HazardCode 441202 | | | | | | 0..1 441204 | DangerousGoodsHazardCode 441206 |
| | | | | | | FlashpointMeasureInterval 441208 | | | | | | 0..1 441210 | MeasureInterval 441212 |
| | | | | | | PackagingGroupCode 441214 | | | | | | 0..1 441216 | DangerousGoodsPackagingGroupCode 441218 |

FIG. 44-45

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | EmergencySchedule 441220 | | | | | | 0..1 441222 | DangerousGoodsEmergencySchedule 441224 |
| | | | | | | TransportEmergencyCardCode 441226 | | | | | | 0..1 441228 | TransportEmergencyCardCode 441230 |
| | | | | | | DangerousGoodsLabelCode 441232 | | | | | | 0..1 441234 | DangerousGoodsLabelCode 441236 |
| | | | | | | DangerousGoodsLabelCode2 441238 | | | | | | 0..1 441240 | DangerousGoodsLabelCode 441242 |

FIG. 44-46

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DangerousGoodsLabelCode3 441244 | | | | | | 0..1 441246 | DangerousGoodsLabelCode 441248 |
| | | | | | | PackagingInstructionTypeCode 441250 | | | | | | 0..1 441252 | PackagingInstructionTypeCode 441254 |
| | | | | | | TransportMeansDescriptionCode 441256 | | | | | | 0..1 441258 | TransportMeansDescriptionCode 441260 |
| | | | | | | TransportationAuthorisationCode 441262 | | | | | | 0..1 441264 | DangerousGoodsTransportationAuthorisationCode 441266 |

FIG. 44-47

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | ContactInformation 441268 | | | | | | 0..n 441270 | ... |
| | | | | | | | ContactPersonFunctionTypeCode 441272 | | | | | 1..1 441274 | ContactPersonFunctionTypeCode 441276 |
| | | | | | | | Address 441278 | | | | | 1..1 441280 | Address 441282 |
| | | | | | | TextCollection 441284 | | | | | | 0..1 441286 | ... |
| | | | | | | | TextCollection 441288 | | | | | 1..1 441290 | TextCollection 441292 |

FIG. 44-48

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationChargesInformation 441294 | | | | TransportationChargesInformation 441296 | | | | | | | | 0..n 441298 | ... |
| | | | | | TransportationChargesUsageCode 441300 | | | | | | | 1..1 441302 | TransportationChargesUsageCode 441304 |
| | | | | | FreightOrderPartyStandardID 441306 | | | | | | | 0..1 441308 | PartyStandardID 441310 |
| | | | | | FreightOrderPartyInternalID 441312 | | | | | | | 0..1 441314 | PartyInternalID 441316 |

FIG. 44-49

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | FreightOrderTransportationUnitResourceID 441318 | | | | | | | 0..1 441320 | ResourceID 441322 |
| | | | | | FreightOrderTransportationStageID 441324 | | | | | | | 0..1 441326 | TransportationStageID 441328 |
| | | | | | TransportationCharges 441330 | | | | | | | 0..1 441332 | ... |
| | | | | | | ID 441334 | | | | | | 1 441336 | TransportationChargesID 441338 |

FIG. 44-50

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | FreightAgreementID 441340 | | | | | | 1 441342 | FreightAgreementID 441344 |
| | | | | | | OriginCode 441346 | | | | | | 0..1 441348 | TransportationChargesOriginCode 441350 |
| | | | | | | TariffID 441352 | | | | | | 0..1 441354 | TransportationChargesTariffID 441356 |
| | | | | | | CalculationSheetID 441358 | | | | | | 1 441360 | TransportationChargesCalculationSheetID 441362 |
| | | | | | | Location 441364 | | | | | | 0..n 441366 | ... |

FIG. 44-51

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Location 441368 | | | | | 1 441370 | BusinessTransactionDocumentLocation 441372 |
| | | | | | | | RoleCode 441374 | | | | | 1 441376 | LoactionRoleCode 441378 |
| | | | | | | | TypeCode 441380 | | | | | 0..1 441382 | LocationTypeCode 441384 |
| | | | | | | | Name 441386 | | | | | 0..1 441388 | MEDIUM_Name 441390 |
| | | | | | | | DateTimePeriods 441392 | | | | | 0..n 441394 | ... |
| | | | | | | | | RequestedFulfillmentPeriod 441396 | | | | 0..1 441398 | DateTimePeriod 441400 |

FIG. 44-52

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | AcceptableFulfillmentPeriod 441402 | | | | 0..1 441404 | DateTimePeriod 441406 |
| | | | | | | | | PeriodRoleCode 441408 | | | | 1 441410 | PeriodRoleCode 441412 |
| | | | | | | TextCollection 441414 | | | | | | 0..1 441416 | ... |
| | | | | | | | TextCollection 441418 | | | | | 1..1 441420 | TextCollection 441422 |
| | | | | | | Currency 441424 | | | | | | 0..n 441426 | ... |
| | | | | | | | Code 441428 | | | | | 1..1 441430 | CurrencyCode 441432 |

FIG. 44-53

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | RoleCode 441434 | | | | | 1..1 441436 | CurrencyRoleCode 441438 |
| | | | | | | | UsageCode 441440 | | | | | 0..1 441442 | CurrencyUsageCode 441444 |
| | | | | | | ExchangeRate 441446 | | | | | | 0..n 441448 | ... |
| | | | | | | | ExchangeRate 441450 | | | | | 1..1 441452 | ExchangeRate 441454 |
| | | | | | | | TypeCode 441456 | | | | | 0..1 441458 | ExchangeRateTypeCode 441460 |
| | | | | | | PercentElement 441462 | | | | | | 0..n 441464 | ... |

FIG. 44-54

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PercentRoleCode 441466 | | | | | 1 441468 | PercentRoleCode 441470 |
| | | | | | | | Percent 441472 | | | | | 1 441474 | Percent 441476 |
| | | | | | | | TransportationChargesPercentCalculationBaseCode 441478 | | | | | 0..1 441480 | TransportationChargesPercentCalculationBaseCode 441482 |
| | | | | | | | StatusCode 441484 | | | | | 0..1 441486 | TransportationChargesPercentElementStatusCode 441488 |
| | | | | | | DateTimePeriod 441490 | | | | | | 0..n 441492 | ... |

FIG. 44-55

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTime Period 441494 | | | | | 1..1 441496 | DateTimePeriod 441498 |
| | | | | | | | PeriodRoleCode 441500 | | | | | 1..1 441502 | PeriodRoleCode 441504 |
| | | | | | | BusinessTransactionDocumentReference 441506 | | | | | | 0..n 441508 | ... |
| | | | | | | | BusinessTransactionDocumentReference 441510 | | | | | 0..1 441512 | BusinessTransactionDocumentReference 441514 |

FIG. 44-56

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentRelationshipRoleCode 441516 | | | | | 0..1 441518 | BusinessTransactionDocumentRelationshipRoleCode 441520 |
| | | | | | | | BusinessTransactionDocumentRelationshipTypeCode 441522 | | | | | 0..1 441524 | BusinessTransactionDocumentRelationshipTypeCode 441526 |
| | | | | | | | TransportationDocumentTypeCode 441528 | | | | | 0..1 441530 | TransportationDocumentTypeCode 441532 |

FIG. 44-57

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentNote 441534 | | | | | 0..1 441536 | SHORT_Note 441538 |
| | | | | | | | TransportationDocumentID 441540 | | | | | 0..1 441542 | TransportationDocumentID 441544 |
| | | | | | | TaxDetail 441546 | | | | | | 0..n 441548 | ... |
| | | | | | | | ProductTax 441550 | | | | | 1..1 441552 | ProductTax 441554 |
| | | | | | | PaymentInstruction 441556 | | | | | | 0..n 441558 | ... |

FIG. 44-58

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PaymentInstruction 441560 | | | | | 1 441562 | PaymentInstruction 441564 |
| | | | | | | | TransportationChargesElementCategoryCode 441566 | | | | | 0..1 441568 | TransportationChargesElementCategoryCode 441570 |
| | | | | | | | TransportationChargesElementSubCategoryCode 441572 | | | | | 0..1 441574 | TransportationChargesElementSubCategoryCode 441576 |

FIG. 44-59

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesPaymentArrangementCode 441578 | | | | | 0..1 441580 | TransportationChargesPaymentArrangementCode 441582 |
| | | | | | | CashDiscountTerms 441584 | | | | | | 0..1 441586 | ... |
| | | | | | | | CashDiscountTerms 441588 | | | | | 1 441590 | CashDiscountTerms 441592 |
| | | | | | | | TransportationChargesElementCategoryCode 441594 | | | | | 0..1 441596 | TransportationChargesElementCategoryCode 441598 |

FIG. 44-60

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesElementSubCategoryCode 441600 | | | | | 0..1 441602 | TransportationChargesElementSubCategoryCode 441604 |
| | | | | | | Element 441606 | | | | | | 0..n 441608 | ... |
| | | | | | | | CategoryCode 441610 | | | | | 1 441612 | TransportationChargesElementCategoryCode 441614 |
| | | | | | | | SubCategoryCode 441616 | | | | | 1 441618 | TransportationChargesElementSubCategoryCode 441620 |

FIG. 44-61

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TypeCode 441622 | | | | | 1 441624 | TransportationChargesElementTypeCode 441626 |
| | | | | | | | CalculationResolutionCode 441628 | | | | | 1 441630 | TransportationChargesElementCalculationResolutionCode 441632 |
| | | | | | | | TransportationChargesPaymentArrangementCode 441634 | | | | | 0...1 441636 | TransportationChargesPaymentArrangementCode 441638 |
| | | | | | | | Location 441640 | | | | | 0..n 441642 | ... |

FIG. 44-62

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 441644 | | | | 1 441646 | BusinessTransactionDocumentLocation 441648 |
| | | | | | | | | RoleCode 441650 | | | | 1 441652 | LocationRoleCode 441654 |
| | | | | | | | | TypeCode 441656 | | | | 0..1 441658 | LocationTypeCode 441660 |
| | | | | | | | | Name 441662 | | | | 0..1 441664 | MEDIUM_Name 441666 |
| | | | | | | | | DateTimePeriods 441668 | | | | 0..n 441670 | ... |
| | | | | | | | | | RequestedFulfillmentPeriod 441672 | | | 0..1 441674 | DateTimePeriod 441676 |

FIG. 44-63

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | AcceptableFulfillmentPeriod 441678 | | | 0..1 441680 | DateTimePeriod 441682 |
| | | | | | | | | | PeriodRoleCode 441684 | | | 1 441686 | PeriodRoleCode 441688 |
| | | | | | | | TextCollection 441690 | | | | | 0..1 441692 | ... |
| | | | | | | | | TextCollection 441694 | | | | 1..1 441696 | TextCollection 441698 |
| | | | | | | | Currency 441700 | | | | | 0..n 441702 | ... |
| | | | | | | | | Code 441704 | | | | 1..1 441706 | CurrencyCode 441708 |

FIG. 44-64

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RoleCode 441710 | | | | 1..1 441712 | CurrencyRoleCode 441714 |
| | | | | | | | | UsageCode 441716 | | | | 0..1 441718 | CurrencyUsageCode 441720 |
| | | | | | | | RateElement 441722 | | | | | 0..n 441724 | … |
| | | | | | | | | ID 441726 | | | | 1 441728 | TransportationChargesElementRateElementID 441730 |
| | | | | | | | | Amount 441732 | | | | 1 441734 | Amount 441736 |
| | | | | | | | | BaseQuantity 441738 | | | | 1 441740 | Quantity 441742 |

FIG. 44-65

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationChargesRateTypeCode 441744 | | | | 0..1 441746 | TransportationChargesRateTypeCode 441748 |
| | | | | | | | | TransportationChargesRateRoleCode 441750 | | | | 1 441752 | TransportationChargesRateRoleCode 441754 |
| | | | | | | | | TransportationChargesRateElementStatusCode 441756 | | | | 0..1 441758 | TransportationChargesRateElementStatusCode 441760 |
| | | | | | | | PercentElement 441762 | | | | | 0..n 441764 | ... |

FIG. 44-66

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PercentRoleCode 441766 | | | | 1 441768 | PercentRoleCode 441770 |
| | | | | | | | | Percent 441772 | | | | 1 441774 | Percent 441776 |
| | | | | | | | | TransportationChargesPercentCalculationBaseCode 441778 | | | | 0..1 441780 | TransportationChargesPercentCalculationBaseCode 441782 |
| | | | | | | | | StatusCode 441784 | | | | 0..1 441786 | TransportationChargesPercentElementStatusCode 441788 |
| | | | | | | | AmountElement 441790 | | | | | 0..n 441792 | ... |

FIG. 44-67

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Amount 441794 | | | | 1 441796 | Amount 441798 |
| | | | | | | | | AmountRoleCode 441800 | | | | 1 441802 | AmountRoleCode 441804 |
| | | | | | | | | TransportationChargesAmountElementStatusCode 441806 | | | | 0..1 441808 | TransportationChargesAmountElementStatusCode 441810 |
| | | | | | | | | RateDetailAssignment 441812 | | | | 0..n 441814 | ... |
| | | | | | | | | | TransportationChargeRateDetailID 441816 | | | 1 441818 | TransportationChargesElementRateElementID 441820 |

FIG. 44-68

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | CalculationBase 441822 | | | | | 0..n 441824 | ... |
| | | | | | | | | TransportationChargesElementCalculationBaseCode 441826 | | | | 1 441828 | TransportationChargesElementCalculationBaseCode 441830 |
| | | | | | | | | BaseQuantity 441832 | | | | 0..1 441834 | Quantity 441836 |
| | | | | | | | | BaseQuantityRoleCode 441838 | | | | 0..1 441840 | QuantityRoleCode 441842 |
| | | | | | | | | BaseQuantityTypeCode 441844 | | | | 0..1 441846 | QuantityTypeCode 441848 |

FIG. 44-69

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TaxDetail 441850 | | | | | 0..n 441852 | ... |
| | | | | | | | | ProductTax 441854 | | | | 1..1 441856 | ProductTax 441858 |
| | | | | | | | DateTime Period 441860 | | | | | 0..n 441862 | ... |
| | | | | | | | | DateTime Period 441864 | | | | 1..1 441866 | DateTimePeriod 441868 |
| | | | | | | | | PeriodRoleCode 441870 | | | | 1..1 441872 | PeriodRoleCode 441874 |
| | | | | | | | ChargeDistribution 441876 | | | | | 0..n 441878 | ... |

FIG. 44-70

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | AccountingCodingBlockAssignment 441880 | | | | 1..1 441882 | AccountingCodingBlockAssignment 441884 |
| ShipmentOrder 441886 | | | | ShipmentOrder 441888 | | | | | | | | 0..n 441890 | ... |
| | | | | | ID 441892 | | | | | | | 1..1 441894 | BusinessTransactionDocumentID 441896 |
| | | | | | TransportationStageAssignment 441898 | | | | | | | 0..n 441900 | ... |

FIG. 44-71

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | FreightOrderTransportationStageID 441902 | | | | | | 1..1 441904 | TransportationStageID 441906 |
| | | | | | TransportationUnitResourceInformationAssignment 441908 | | | | | | | 0..n 441910 | ... |
| | | | | | | FreightOrderTransportationUnitResourceInformationID 441912 | | | | | | 1..1 441914 | TransportationUnitResourceID 441916 |
| Request 441918 | | | | | Request 441920 | | | | | | | 0..1 441922 | ... |

FIG. 44-72

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | DeliveryTerms 441924 | | | | | | 0..1 441926 | DeliveryTerms 441928 |
| HeaderInformation 441930 | | | | | | DateTimePeriods 441932 | | | | | | 0..n 441934 | ... |
| | | | | | | | RequestedFulfillmentPeriod 441936 | | | | | 0..1 441938 | DateTimePeriod 441940 |
| | | | | | | | AcceptableFulfillmentPeriod 441942 | | | | | 0..1 441944 | DateTimePeriod 441946 |
| | | | | | | | PeriodRoleCode 441948 | | | | | 1 441950 | PeriodRoleCode 441952 |
| | | | | | | NatureOfCargo 441954 | | | | | | 0..n 441956 | ... |

FIG. 44-73

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ClassificationCode 441958 | | | | | 1 441960 | NatureOfCargoClassificationCode 441962 |
| | | | | | | TotalQuantity 441964 | | | | | | 0..n 441966 | ... |
| | | | | | | | Quantity 441968 | | | | | 1 441970 | Quantity 441972 |
| | | | | | | | RoleCode 441974 | | | | | 0..1 441976 | QuantityRoleCode 441978 |
| | | | | | | | TypeCode 441980 | | | | | 0..1 441982 | QuantityTypeCode 441984 |
| | | | | | | TotalAmount 441986 | | | | | | 0..n 441988 | ... |
| | | | | | | | Amount 441990 | | | | | 1 441992 | Amount 441994 |

FIG. 44-74

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | RoleCode 441996 | | | | | 1 441998 | AmountRoleCode 442000 |
| | | | | | | TextCollection 442002 | | | | | | 0..1 442004 | ... |
| | | | | | | | TextCollection 442006 | | | | | 1 442008 | TextCollection 442010 |
| | | | | | | TransportationServiceRequirement 442012 | | | | | | 0..n 442014 | ... |
| | | | | | | | TransportationServiceRequirementCode 442016 | | | | | 0..1 442018 | TransportationServiceRequirementCode 442020 |

FIG. 44-75

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | AdditionalTransportationServiceRequirementCode 442022 | | | | | 0..1 442024 | TransportationServiceRequirementCode 442026 |
| | | | | | | | TransportationContractConditionCode 442028 | | | | | 0..1 442030 | TransportationContractConditionCode 442032 |
| | | | | | | | TransportServiceLevelCode 442034 | | | | | 0..1 442036 | TransportServiceLevelCode 442038 |
| | | | | | | | NatureOfCargoClassificationCode 442040 | | | | | 0..1 442042 | NatureOfCargoClassificationCode 442044 |

FIG. 44-76

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | TransportationDocumentInformation 442046 | | | | | | 0..n 442048 | ... |
| | | | | | | | TransportationDocumentTypeCode 442050 | | | | | 0..1 442052 | TransportationDocumentTypeCode 442054 |
| | | | | | | | TransportationDocumentNote 442056 | | | | | 0..1 442058 | SHORT_Note 442060 |
| | | | | | | | TransportationDocumentID 442062 | | | | | 0..1 442064 | TransportationDocumentID 442066 |

FIG. 44-77

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentStatusCode 442068 | | | | | 0..1 442070 | TransportationDocumentStatusCode 442072 |
| | | | | | | | LanguageCode 442074 | | | | | 0..1 442076 | LanguageCode 442078 |
| | | | | | | | CommunicationMediumTypeCode 442080 | | | | | 0..1 442082 | CommunicationMediumTypeCode 442084 |
| | | | | | | | RequiredIndicator 442086 | | | | | 1 442088 | Indicator 442090 |
| | | | | | | | OutputCopyNumberValue 442092 | | | | | 0..1 442094 | NumberValue 442096 |

FIG. 44-78

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OutputOriginalNumberValue 442098 | | | | | 0..1 442100 | NumberValue 442102 |
| | | | | | | | DateTimePeriod 442104 | | | | | 0..n 442106 | ... |
| | | | | | | | | DateTimePeriod 442108 | | | | 1 442110 | DateTimePeriod 442112 |
| | | | | | | | | PeriodRoleCode 442114 | | | | 1 442116 | PeriodRoleCode 442118 |
| | | | | | | BusinessTransactionDocumentReference 442120 | | | | | | 0..n 442122 | ... |

FIG. 44-79

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | BusinessTransactionDocumentReference 442124 | | | | | 0..1 442126 | BusinessTransactionDocumentReference 442128 |
| | | | | | | | BusinessTransactionDocumentRelationshipRoleCode 442130 | | | | | 0..1 442132 | BusinessTransactionDocumentRelationshipRoleCode 442134 |
| | | | | | | | BusinessTransactionDocumentRelationshipTypeCode 442136 | | | | | 0..1 442138 | BusinessTransactionDocumentRelationshipTypeCode 442140 |

FIG. 44-80

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationDocumentTypeCode 442142 | | | | | 0..1 442144 | TransportationDocumentTypeCode 442146 |
| | | | | | | | TransportationDocumentNote 442148 | | | | | 0..1 442150 | SHORT_Note 442152 |
| | | | | | | | TransportationDocumentID 442154 | | | | | 0..1 442156 | TransportationDocumentID 442158 |
| | | | | | | | DateTime Period 442160 | | | | | 0..n 442162 | ... |
| | | | | | | | | DateTime Period 442164 | | | | 1 442166 | DateTimePeriod 442168 |

FIG. 44-81

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PeriodRoleCode 442170 | | | | 1 442172 | PeriodRoleCode 442174 |
| GovernmentalRequirementInformation 442176 | | | | | | GovernmentalProcedure 442178 | | | | | | 0..n 442180 | ... |
| | | | | | | | TransportationGovernmentAgencyTypeCode 442182 | | | | | 0..1 442184 | TransportationGovernmentAgencyTypeCode 442186 |
| | | | | | | | TransportationMovementTypeCode 442188 | | | | | 0..1 442190 | TransportationMovementTypeCode 442192 |

FIG. 44-82

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationGovernmentAgencyInvolvementStatusCode 442194 | | | | | 0..1 442196 | TransportationGovernmentAgencyInvolvementStatusCode 442198 |
| | | | | | | | TransportationGovernmentAgencyActionCode 442200 | | | | | 0..1 442202 | TransportationGovernmentAgencyActionCode 442204 |
| | | | | | | | TransportationGovernmentAgencyProcedureStatusCode 442206 | | | | | 0..1 442208 | TransportationGovernmentAgencyProcedureStatusCode 442210 |

FIG. 44-83

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Location 442212 | | | | | 0..n 442214 | ... |
| | | | | | | | | Location 442216 | | | | 1 442218 | BusinessTransactionDocumentLocation 442220 |
| | | | | | | | | RoleCode 442222 | | | | 1 442224 | LocationRoleCode 442226 |
| | | | | | | | | TypeCode 442228 | | | | 0..1 442230 | LocationTypeCode 442232 |
| | | | | | | | | Name 442234 | | | | 0..1 442236 | MEDIUM_Name 442238 |
| | | | | | | | DateTime Period 442240 | | | | | 0..n 442242 | ... |

FIG. 44-84

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTime Period 442244 | | | | 1 442246 | DateTimePeriod 442248 |
| | | | | | | | | PeriodRoleCode 442250 | | | | 1 442252 | PeriodRoleCode 442254 |
| | | | | | | | Seal 442256 | | | | | 0..n 442258 | ... |
| | | | | | | | | ID 442260 | | | | 0..1 442262 | SealID 442264 |
| | | | | | | | | PartyRole Code 442266 | | | | 0..1 442268 | PartyRoleCode 442270 |
| | | | | | | | | PartyFormattedName 442272 | | | | 0..1 442274 | LONG_Name 442276 |
| | | | | | | | | StatusCode 442278 | | | | 0..1 442280 | SealStatusCode 442282 |

FIG. 44-85

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TextCollection 442284 | | | | | 0..1 442286 | ... |
| | | | | | | | | TextCollection 442288 | | | | 1 442290 | TextCollection 442292 |
| | | | | | | | TransportationDocumentInformation 442294 | | | | | 0..n 442296 | ... |
| | | | | | | | | TransportationDocumentTypeCode 442298 | | | | 0..1 442300 | TransportationDocumentTypeCode 442302 |
| | | | | | | | | TransportationDocumentNote 442304 | | | | 0..1 442306 | SHORT_Note 442308 |

FIG. 44-86

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentID 442310 | | | | 0..1 442312 | TransportationDocumentID 442314 |
| | | | | | | | | TransportationDocumentStatusCode 442316 | | | | 0..1 442318 | TransportationDocumentStatusCode 442320 |
| | | | | | | | | LanguageCode 442322 | | | | 0..1 442324 | LanguageCode 442326 |
| | | | | | | | | CommunicationMediumTypeCode 442328 | | | | 0..1 442330 | CommunicationMediumTypeCode 442332 |
| | | | | | | | | RequiredIndicator 442334 | | | | 1 442336 | Indicator 442338 |

FIG. 44-87

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | OutputCopyNumberValue 442340 | | | | 0..1 442342 | NumberValue 442344 |
| | | | | | | | | OutputOriginalNumberValue 442346 | | | | 0..1 442348 | NumberValue 442350 |
| | | | | | | | | DateTimePeriod 442352 | | | | 0..n 442354 | ... |
| | | | | | | | | | DateTimePeriod 442356 | | | 1 442358 | DateTimePeriod 442360 |
| | | | | | | | | | PeriodRoleCode 442362 | | | 1 442364 | PeriodRoleCode 442366 |
| PartyInformation 442368 | | | | | | Party 442370 | | | | | | 1..n 442372 | ... |

FIG. 44-88

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Party 442374 | | | | | 1 442376 | BusinessTransactionDocumentParty 442378 |
| | | | | | | | RoleCode 442380 | | | | | 1 442382 | PartyRoleCode 442384 |
| | | | | | | | FormattedName 442386 | | | | | 0..1 442388 | LONG_Name 442390 |
| | | | | | | | Amount 442392 | | | | | 0..n 442394 | ... |
| | | | | | | | | Amount 442396 | | | | 1 442398 | Amount 442400 |
| | | | | | | | | RoleCode 442402 | | | | 1 442404 | AmountRoleCode 442406 |

FIG. 44-89

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DateTime Periods 442408 | | | | | 0..n 442410 | ... |
| | | | | | | | | RequestedFulfillmentPeriod 442412 | | | | 0..1 442414 | DateTimePeriod 442416 |
| | | | | | | | | AcceptableFulfillmentPeriod 442418 | | | | 0..1 442420 | DateTimePeriod 442422 |
| | | | | | | | | PeriodRoleCode 442424 | | | | 1 442426 | PeriodRoleCode 442428 |
| | | | | | | | TransportationDocumentInformation 442430 | | | | | 0..n 442432 | ... |

FIG. 44-90

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 442434 | | | | 0..1 442436 | TransportationDocumentTypeCode 442438 |
| | | | | | | | | TransportationDocumentNote 442440 | | | | 0..1 442442 | SHORT_Note 442444 |
| | | | | | | | | TransportationDocumentID 442446 | | | | 0..1 442448 | TransportationDocumentID 442450 |
| | | | | | | | | TransportationDocumentStatusCode 442452 | | | | 0..1 442454 | TransportationDocumentStatusCode 442456 |
| | | | | | | | | LanguageCode 442458 | | | | 0..1 442460 | LanguageCode 442462 |

FIG. 44-91

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | CommunicationMediumTypeCode 442464 | | | | 0..1 442466 | CommunicationMediumTypeCode 442468 |
| | | | | | | | | RequiredIndicator 442470 | | | | 1 442472 | Indicator 442474 |
| | | | | | | | | OutputCopyNumberValue 442476 | | | | 0..1 442478 | NumberValue 442480 |
| | | | | | | | | OutputOriginalNumberValue 442482 | | | | 0..1 442484 | NumberValue 442486 |
| | | | | | | | | DateTimePeriod 442488 | | | | 0..n 442490 | ... |

FIG. 44-92

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | DateTimePeriod 442492 | | | 1 442494 | DateTimePeriod 442496 |
| | | | | | | | | | PeriodRoleCode 442498 | | | 1 442500 | PeriodRoleCode 442502 |
| | | | | | | | BusinessTransactionDocumentReference 442504 | | | | | 0..n 442506 | ... |
| | | | | | | | | BusinessTransactionDocumentReference 442508 | | | | 0..1 442510 | BusinessTransactionDocumentReference 442512 |

FIG. 44-93

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipRoleCode 442514 | | | | 0..1 442516 | BusinessTransactionDocumentRelationshipRoleCode 442518 |
| | | | | | | | | BusinessTransactionDocumentRelationshipTypeCode 442520 | | | | 0..1 442522 | BusinessTransactionDocumentRelationshipTypeCode 442524 |
| | | | | | | | | TransportationDocumentTypeCode 442526 | | | | 0..1 442528 | TransportationDocumentTypeCode 442530 |

FIG. 44-94

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentNote 442532 | | | | 0..1 442534 | SHORT_Note 442536 |
| | | | | | | | | TransportationDocumentID 442538 | | | | 0..1 442540 | TransportationDocumentID 442542 |
| | | | | | | | | DateTimePeriod 442544 | | | | 0..n 442546 | ... |
| | | | | | | | | | DateTimePeriod 442548 | | | 1 442550 | DateTimePeriod 442552 |
| | | | | | | | | | PeriodRoleCode 442554 | | | 1 442556 | PeriodRoleCode 442558 |

FIG. 44-95

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| LocationInformation 442560 | | | | | | Location 442562 | | | | | | 0..n 442564 | |
| | | | | | | | Location 442566 | | | | | 1 442568 | BusinessTransactionDocumentLocation 442570 |
| | | | | | | | RoleCode 442572 | | | | | 1 442574 | LocationRoleCode 442576 |
| | | | | | | | TypeCode 442578 | | | | | 0..1 442580 | LocationTypeCode 442582 |
| | | | | | | | Name 442584 | | | | | 0..1 442586 | MEDIUM_Name 442588 |
| | | | | | | | DateTimePeriods 442590 | | | | | 0..n 442592 | ... |

FIG. 44-96

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RequestedFulfillmentPeriod 442594 | | | | 0..1 442596 | DateTimePeriod 442598 |
| | | | | | | | | AcceptableFulfillmentPeriod 442600 | | | | 0..1 442602 | DateTimePeriod 442604 |
| | | | | | | | | PeriodRoleCode 442606 | | | | 1 442608 | PeriodRoleCode 442610 |
| TransportationStageInformation 442612 | | | | | | TransportationStage 442614 | | | | | | 0..n 442616 | … |
| | | | | | | | ID 442618 | | | | | 1 442620 | TransportationStageID 442622 |

FIG. 44-97

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OrdinalNumberValue 442624 | | | | | 0..1 442626 | OrdinalNumberValue 442628 |
| | | | | | | | TypeCode 442630 | | | | | 0..1 442632 | TransportationStageTypeCode 442634 |
| | | | | | | | JourneyID 442636 | | | | | 0..1 442638 | JourneyID 442640 |
| | | | | | | | TransportModeCode 442642 | | | | | 0..1 442644 | TransportModeCode 442646 |
| | | | | | | | TransportMeansDescriptionCode 442648 | | | | | 0..1 442650 | TransportMeansDescriptionCode 442652 |

FIG. 44-98

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportMeansDescription 442654 | | | | | 0..1 442656 | SHORT_Description 442658 |
| | | | | | | | TransportMeansID 442660 | | | | | 0..1 442662 | TransportMeansID 442664 |
| | | | | | | | TransportMeansHomeCountryCode 442666 | | | | | 0..1 442668 | CountryCode 442670 |
| | | | | | | | TransportMeansOwnershipTypeCode 442672 | | | | | 0..1 442674 | TransportMeansOwnershipTypeCode 442676 |
| | | | | | | | CarrierStandardID 442678 | | | | | 0..1 442680 | PartyStandardID 442682 |

FIG. 44-99

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | CarrierFormattedName 442684 | | | | | 0..1 442686 | LONG_Name 442688 |
| | | | | | | | TransportationTransitDirectionCode 442690 | | | | | 0..1 442692 | TransportationTransitDirectionCode 442694 |
| | | | | | | | CalculatedDistanceMeasure 442696 | | | | | 0..1 442698 | Measure 442700 |
| | | | | | | | GivenDistanceMeasure 442702 | | | | | 0..1 442704 | Measure 442706 |
| | | | | | | | Location 442708 | | | | | 1..n 442710 | ... |

FIG. 44-100

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 442712 | | | | 1 442714 | BusinessTransactionDocumentLocation 442716 |
| | | | | | | | | RoleCode 442718 | | | | 1 442720 | LocationRoleCode 442722 |
| | | | | | | | | TypeCode 442724 | | | | 0..1 442726 | LocationTypeCode 442728 |
| | | | | | | | | Name 442730 | | | | 0..1 442732 | MEDIUM_Name 442734 |
| | | | | | | | | DateTime Periods 442736 | | | | 0..n 442738 | ... |
| | | | | | | | | | RequestedFulfillmentPeriod 442740 | | | 0..1 442742 | DateTimePeriod 442744 |

FIG. 44-101

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | AcceptableFulfillmentPeriod 442746 | | | 0..1 442748 | DateTimePeriod 442750 |
| | | | | | | | | | PeriodRoleCode 442752 | | | 1 442754 | PeriodRoleCode 442756 |
| | | | | | | | BusinessTransactionDocumentReference 442758 | | | | | 0..n 442760 | ... |
| | | | | | | | | BusinessTransactionDocumentReference 442762 | | | | 0..1 442764 | BusinessTransactionDocumentReference 442766 |

FIG. 44-102

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentRelationshipRoleCode 442768 | | | | 0..1 442770 | BusinessTransactionDocumentRelationshipRoleCode 442772 |
| | | | | | | | | BusinessTransactionDocumentRelationshipTypeCode 442774 | | | | 0..1 442776 | BusinessTransactionDocumentRelationshipTypeCode 442778 |
| | | | | | | | | TransportationDocumentTypeCode 442780 | | | | 0..1 442782 | TransportationDocumentTypeCode 442784 |

FIG. 44-103

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentNote 442786 | | | | 0..1 442788 | SHORT_Note 442790 |
| | | | | | | | | TransportationDocumentID 442792 | | | | 0..1 442794 | TransportationDocumentID 442796 |
| | | | | | | | | DateTimePeriod 442798 | | | | 0..n 442800 | … |
| | | | | | | | | | DateTimePeriod 442802 | | | 1 442804 | DateTimePeriod 442806 |
| | | | | | | | | | PeriodRoleCode 442808 | | | 1 442810 | PeriodRoleCode 442812 |

FIG. 44-104

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationServiceRequirement 442814 | | | | | 0..n 442816 | ... |
| | | | | | | | | TransportationServiceRequirementCode 442818 | | | | 0..1 442820 | TransportationServiceRequirementCode 442822 |
| | | | | | | | | AdditionalTransportationServiceRequirementCode 442824 | | | | 0..1 442826 | TransportationServiceRequirementCode 442828 |
| | | | | | | | | TransportationContractConditionCode 442830 | | | | 0..1 442832 | TransportationContractConditionCode 442834 |

FIG. 44-105

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportServiceLevelCode 442836 | | | | 0..1 442838 | TransportServiceLevelCode 442840 |
| | | | | | | | | NatureOfCargoClassificationCode 442842 | | | | 0..1 442844 | NatureOfCargoClassificationCode 442846 |
| TransportationUnitResourceInformation 442848 | | | | | | TransportationUnitResourceInformation 442850 | | | | | | 0..n 442852 | ... |
| | | | | | | | ID 442854 | | | | | 1 442856 | ResourceInformationID 442858 |

FIG. 44-106

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ResourceNumberValue 442860 | | | | | 0..1 442862 | NumberValue 442864 |
| | | | | | | | ResourceID 442866 | | | | | 0..1 442868 | ResourceID 442870 |
| | | | | | | | ResourceHomeCountryCode 442872 | | | | | 0..1 442874 | CountryCode 442876 |
| | | | | | | | TransportationUnitResourceCategoryCode 442878 | | | | | 0..1 442880 | TransportationUnitResourceCategoryCode 442882 |

FIG. 44-107

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationUnitResourceTypeCode 442884 | | | | | 0..1 442886 | TransportationUnitResourceTypeCode 442888 |
| | | | | | | | FillLevelCode 442890 | | | | | 0..1 442892 | FillLevelCode 442894 |
| | | | | | | | ShippingTypeCode 442896 | | | | | 0..1 442898 | ShippingTypeCode 442900 |
| | | | | | | | HaulageArrangerCode 442902 | | | | | 0..1 442904 | HaulageArrangerCode 442906 |

FIG. 44-108

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationHandlingInstructionCode 442908 | | | | | 0..1 442910 | TransportationHandlingInstructionCode 442912 |
| | | | | | | | TransportationHandlingInstructionNote 442914 | | | | | 0..1 442916 | LONG_Note 442918 |
| | | | | | | | TransportationStageAssignment 442920 | | | | | 0..n 442922 | ... |
| | | | | | | | | ShipmentOrderTransportationStageID 442924 | | | | 1 442926 | TransportationStageID 442928 |

FIG. 44-109

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Attached Equipment 442930 | | | | | 0..n 442932 | ... |
| | | | | | | | | ShipmentOrderResourceInformationID 442934 | | | | 1 442936 | ResourceID 442938 |
| | | | | | | | Quantity 442940 | | | | | 0..n 442942 | ... |
| | | | | | | | | Quantity 442944 | | | | 1 442946 | Quantity 442948 |
| | | | | | | | | RoleCode 442950 | | | | 0..1 442952 | QuantityRoleCode 442954 |
| | | | | | | | | TypeCode 442956 | | | | 0..1 442958 | QuantityTypeCode 442960 |

FIG. 44-110

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | Seal 442962 | | | | | 0..n 442964 | ... |
| | | | | | | | | ID 442966 | | | | 1 442968 | SealID 442970 |
| | | | | | | | | PartyRoleCode 442972 | | | | 0..1 442974 | PartyRoleCode 442976 |
| | | | | | | | | PartyFormattedName 442978 | | | | 0..1 442980 | LONG_Name 442982 |
| | | | | | | | | StatusCode 442984 | | | | 0..1 442986 | SealStatusCode 442988 |
| | | | | | | | BusinessTransactionDocumentReference 442990 | | | | | 0..n 442992 | ... |

FIG. 44-111

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 442994 | | | | 0..1 442996 | BusinessTransactionDocumentReference 442998 |
| | | | | | | | | BusinessTransactionDocumentRelationshipRoleCode 443000 | | | | 0..1 443002 | BusinessTransactionDocumentRelationshipRoleCode 443004 |
| | | | | | | | | BusinessTransactionDocumentRelationshipTypeCode 443006 | | | | 0..1 443008 | BusinessTransactionDocumentRelationshipTypeCode 443010 |

FIG. 44-112

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 443012 | | | | 0..1 443014 | TransportationDocumentTypeCode 443016 |
| | | | | | | | | TransportationDocumentNote 443018 | | | | 0..1 443020 | SHORT_Note 443022 |
| | | | | | | | | TransportationDocumentID 443024 | | | | 0..1 443026 | TransportationDocumentID 443028 |
| | | | | | | | | DateTime Period 443030 | | | | 0..n 443032 | |
| | | | | | | | | | DateTime Period 443034 | | | 1 443036 | DateTimePeriod 443038 |

FIG. 44-113

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 443040 | | | 1 443042 | PeriodRoleCode 443044 |
| | | | | | | | TextCollection 443046 | | | | | 0..1 443048 | ... |
| | | | | | | | | TextCollection 443050 | | | | 1 443052 | TextCollection 443054 |
| | | | | | | | Location 443056 | | | | | 0..n 443058 | ... |
| | | | | | | | | Location 443060 | | | | 1 443062 | BusinessTransactionDocumentLocation 443064 |
| | | | | | | | | RoleCode 443066 | | | | 1 443068 | LocationRoleCode 443070 |

FIG. 44-114

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TypeCode 443072 | | | | 0..1 443074 | LocationTypeCode 443076 |
| | | | | | | | | Name 443078 | | | | 0..1 443080 | MEDIUM_Name 443082 |
| | | | | | | | | DateTimePeriods 443084 | | | | 0..n 443086 | ... |
| | | | | | | | | | RequestedFulfillmentPeriod 443088 | | | 0..1 443090 | DateTimePeriod 443092 |
| | | | | | | | | | AcceptableFulfillmentPeriod 443094 | | | 0..1 443096 | DateTimePeriod 443098 |
| | | | | | | | | | PeriodRoleCode 443100 | | | 1 443102 | PeriodRoleCode 443104 |

FIG. 44-115

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | DangerousGoods 443106 | | | | | 0..n 443108 | |
| | | | | | | | | ID 443110 | | | | 0..1 443112 | DangerousGoodsID 443114 |
| | | | | | | | | RegulationsCode 443116 | | | | 0..1 443118 | DangerousGoodsRegulationsCode 443120 |
| | | | | | | | | HazardCode 443122 | | | | 0..1 443124 | DangerousGoodsHazardCode 443126 |
| | | | | | | | | FlashpointMeasureInterval 443128 | | | | 0..1 443130 | MeasureInterval 443132 |

FIG. 44-116

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PackagingGroupCode 443134 | | | | 0..1 443136 | DangerousGoodsPackagingGroupCode 443138 |
| | | | | | | | | EmergencySchedule 443140 | | | | 0..1 443142 | DangerousGoodsEmergencySchedule 443144 |
| | | | | | | | | TransportEmergencyCardCode 443146 | | | | 0..1 443148 | TransportEmergencyCardCode 443150 |
| | | | | | | | | DangerousGoodsLabelCode 443152 | | | | 0..1 443154 | DangerousGoodsLabelCode 443156 |

FIG. 44-117

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DangerousGoodsLabelCode2 443158 | | | | 0..1 443160 | DangerousGoodsLabelCode 443162 |
| | | | | | | | | DangerousGoodsLabelCode3 443164 | | | | 0..1 443166 | DangerousGoodsLabelCode 443168 |
| | | | | | | | | PackagingInstructionTypeCode 443170 | | | | 0..1 443172 | PackagingInstructionTypeCode 443174 |
| | | | | | | | | TransportMeansDescriptionCode 443176 | | | | 0..1 443178 | TransportMeansDescriptionCode 443180 |

FIG. 44-118

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationAuthorisationCode 443182 | | | | 0..1 443184 | DangerousGoodsTransportationAuthorisationCode 443186 |
| | | | | | | | | ContactInformation 443188 | | | | 0..n 443190 | ... |
| | | | | | | | | | ContactPersonFunctionTypeCode 443192 | | | 1 443194 | ContactPersonFunctionTypeCode 443196 |
| | | | | | | | | | Address 443198 | | | 1 443200 | Address 443202 |
| | | | | | | | | TextCollection 443204 | | | | 0..1 443206 | ... |

FIG. 44-119

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TextCollection 443208 | | | 1 443210 | TextCollection 443212 |
| PackageInformation 443214 | | | | | | PackageInformation 443216 | | | | | | 0..n 443218 | ... |
| | | | | | | | ID 443220 | | | | | 1 443222 | PackageInformationID 443224 |
| | | | | | | | PackageID 443226 | | | | | 0..1 443228 | PackageID 443230 |
| | | | | | | | PackageOrdinalNumberValue 443232 | | | | | 0..1 443234 | OrdinalNumberValue 443236 |

FIG. 44-120

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | PackageNumberValue 443238 | | | | | 0..1 443240 | NumberValue 443242 |
| | | | | | | | PackageTypeCode 443244 | | | | | 0..1 443246 | PackageTypeCode 443248 |
| | | | | | | | PackagingLevelCode 443250 | | | | | 0..1 443252 | PackagingLevelCode 443254 |
| | | | | | | | PackageMarkingInstructionCode 443256 | | | | | 0..1 443258 | PackageMarkingInstructionCode 443260 |
| | | | | | | | PredecessorPackageID 443262 | | | | | 0..1 443264 | PackageID 443266 |

FIG. 44-121

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ItemAssignment 443268 | | | | | 0..n 443270 | ... |
| | | | | | | | | ShipmentOrderItemID 443272 | | | | 1 443274 | BusinessTransactionDocumentItemID 443276 |
| | | | | | | | | Quantity 443278 | | | | 0..n 443280 | ... |
| | | | | | | | | | Quantity 443282 | | | 1 443284 | Quantity 443286 |
| | | | | | | | | | RoleCode 443288 | | | 0..1 443290 | QuantityRoleCode 443292 |
| | | | | | | | | | TypeCode 443294 | | | 0..1 443296 | QuantityTypeCode 443298 |

FIG. 44-122

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 443300 | | | | 0..n 443302 | ... |
| | | | | | | | | | BusinessTransactionDocumentReference 443304 | | | 0..1 443306 | BusinessTransactionDocumentReference 443308 |
| | | | | | | | | | BusinessTransactionDocumentRelationshipRoleCode 443310 | | | 0..1 443312 | BusinessTransactionDocumentRelationshipRoleCode 443314 |

FIG. 44-123

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | BusinessTransactionDocumentRelationshipTypeCode 443316 | | | 0..1 443318 | BusinessTransactionDocumentRelationshipTypeCode 443320 |
| | | | | | | | | | TransportationDocumentTypeCode 443322 | | | 0..1 443324 | TransportationDocumentTypeCode 443326 |
| | | | | | | | | | TransportationDocumentNote 443328 | | | 0..1 443330 | SHORT_Note 443332 |
| | | | | | | | | | TransportationDocumentID 443334 | | | 0..1 443336 | TransportationDocumentID 443338 |

FIG. 44-124

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | DateTime Period 443340 | | | 0..n 443342 | ... |
| | | | | | | | | | | DateTime Period 443344 | | 1 443346 | DateTimePeriod 443348 |
| | | | | | | | | | | PeriodRoleCode 443350 | | 1 443352 | PeriodRoleCode 443354 |
| | | | | | | | | TransportationGoodsIdentification 443356 | | | | 0..n 443358 | ... |
| | | | | | | | | | TransportationGoodsIdentifierTypeCode 443360 | | | 1 443362 | TransportationGoodsIdentifierTypeCode 443364 |

FIG. 44-125

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | LowerBoundaryTransportationGoodsID 443366 | | | 0..1 443368 | TransportationGoodsID 443370 |
| | | | | | | | | | UpperBoundaryTransportationGoodsID 443372 | | | 0..1 443374 | TransportationGoodsID 443376 |
| | | | | | | | TransportationUnitResourceInformationAssignment 443378 | | | | | 0..n 443380 | ... |

FIG. 44-126

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ShipmentOrderResourceInformationID 443382 | | | | 1 443384 | ResourceInformationID 443386 |
| | | | | | | | | Quantity 443388 | | | | 0..n 443390 | ... |
| | | | | | | | | | Quantity 443392 | | | 1 443394 | Quantity 443396 |
| | | | | | | | | | RoleCode 443398 | | | 0..1 443400 | QuantityRoleCode 443402 |
| | | | | | | | | | TypeCode 443404 | | | 0..1 443406 | QuantityTypeCode 443408 |
| | | | | | | | Quantity 443410 | | | | | 0..n 443412 | ... |
| | | | | | | | | Quantity 443414 | | | | 1 443416 | Quantity 443418 |

FIG. 44-127

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | RoleCode 443420 | | | | 0..1 443422 | QuantityRoleCode 443424 |
| | | | | | | | | TypeCode 443426 | | | | 0..1 443428 | QuantityTypeCode 443430 |
| | | | | | | | TextCollection 443432 | | | | | 0..1 443434 | ... |
| | | | | | | | | TextCollection 443436 | | | | 1 443438 | TextCollection 443440 |
| Item 443442 | | | | | | Item 443444 | | | | | | 0..n 443446 | ... |
| | | | | | | | ID 443448 | | | | | 1 443450 | BusinessTransactionDocumentItemID 443452 |

FIG. 44-128

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | OriginCountryCode 443454 | | | | | 0..1 443456 | CountryCode 443458 |
| | | | | | | | DestinationCountry Code 443460 | | | | | 0..1 443462 | CountryCode 443464 |
| | | | | | | | ShippingTypeCode 443466 | | | | | 0..1 443468 | ShippingTypeCode 443470 |
| | | | | | | | HaulageArrangerCode 443472 | | | | | 0..1 443474 | HaulageArrangerCode 443476 |
| | | | | | | | TemperatureMeasureInterval 443478 | | | | | 0..1 443480 | MeasureInterval 443482 |

FIG. 44-129

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationHandlingInstructionCode 443484 | | | | | 0..1 443486 | TransportationHandlingInstructionCode 443488 |
| | | | | | | | TransportationHandlingInstructionNote 443490 | | | | | 0..1 443492 | LONG_Note 443494 |
| ItemInformation 443496 | | | | | | | Amount 443498 | | | | | 0..n 443500 | ... |
| | | | | | | | | Amount 443502 | | | | 1 443504 | Amount 443506 |
| | | | | | | | | RoleCode 443508 | | | | 1 443510 | AmountRoleCode 443512 |

FIG. 44-130

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TextCollection 443514 | | | | | 0..1 443516 | ... |
| | | | | | | | | TextcCollection 443518 | | | | 1 443520 | TextCollection 443522 |
| | | | | | | | NatureOfCargo 443524 | | | | | 0..n 443526 | ... |
| | | | | | | | | ClassificationCode 443528 | | | | 1 443530 | NatureOfCargoClassificationCode 443532 |
| | | | | | | | Quantity 443534 | | | | | 0..n 443536 | ... |
| | | | | | | | | Quantity 443538 | | | | 1 443540 | Quantity 443542 |
| | | | | | | | | RoleCode 443544 | | | | 0..1 443546 | QuantityRoleCode 443548 |

FIG. 44-131

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TypeCode 443550 | | | | 0..1 443552 | QuantityTypeCode 443554 |
| | | | | | | | TransportationDocumentInformation 443556 | | | | | 0..n 443558 | … |
| | | | | | | | | TransportationDocumentTypeCode 443560 | | | | 0..1 443562 | TransportationDocumentTypeCode 443564 |
| | | | | | | | | TransportationDocumentNote 443566 | | | | 0..1 443568 | SHORT_Note 443570 |
| | | | | | | | | TransportationDocumentID 443572 | | | | 0..1 443574 | TransportationDocumentID 443576 |

FIG. 44-132

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentStatusCode 443578 | | | | 0..1 443580 | TransportationDocumentStatusCode 443582 |
| | | | | | | | | LanguageCode 443584 | | | | 0..1 443586 | LanguageCode 443588 |
| | | | | | | | | CommunicationMediumTypeCode 443590 | | | | 0..1 443592 | CommunicationMediumTypeCode 443594 |
| | | | | | | | | RequiredIndiator 443596 | | | | 1 443598 | Indicator 443600 |
| | | | | | | | | OutputCopyNumberValue 443602 | | | | 0..1 443604 | NumberValue 443606 |

FIG. 44-133

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | OutputOriginalNumberValue 443608 | | | | 0..1 443610 | NumberValue 443612 |
| | | | | | | | | DateTimePeriod 443614 | | | | 0..n 443616 | ... |
| | | | | | | | | | DateTimePeriod 443618 | | | 1 443620 | DateTimePeriod 443622 |
| | | | | | | | | | PeriodRoleCode 443624 | | | 1 443626 | PeriodRoleCode 443628 |
| | | | | | | | BusinessTransactionDocumentReference 443630 | | | | | 0..n 443632 | ... |

FIG. 44-134

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | BusinessTransactionDocumentReference 443634 | | | | 0..1 443636 | BusinessTransactionDocumentReference 443638 |
| | | | | | | | | BusinessTransactionDocumentRelationshipRoleCode 443640 | | | | 0..1 443642 | BusinessTransactionDocumentRelationshipRoleCode 443644 |
| | | | | | | | | BusinessTransactionDocumentRelationshipTypeCode 443646 | | | | 0..1 443648 | BusinessTransactionDocumentRelationshipTypeCode 443650 |

FIG. 44-135

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationDocumentTypeCode 443652 | | | | 0..1 443654 | TransportationDocumentTypeCode 443656 |
| | | | | | | | | TransportationDocumentNote 443658 | | | | 0..1 443660 | SHORT_Note 443662 |
| | | | | | | | | TransportationDocumentID 443664 | | | | 0..1 443666 | TransportationDocumentID 443668 |
| | | | | | | | | DateTimePeriod 443670 | | | | 0..n 443672 | ... |
| | | | | | | | | | RequestDateTimePeriod 443674 | | | 1 443676 | DateTimePeriod 443678 |

FIG. 44-136

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PeriodRoleCode 443680 | | | 1 443682 | PeriodRoleCode 443684 |
| | | | | | | | DangerousGoods 443686 | | | | | 0..n 443688 | ... |
| | | | | | | | | ID 443690 | | | | 0..1 443692 | DangerousGoodsID 443694 |
| | | | | | | | | RegulationsCode 443696 | | | | 0..1 443698 | DangerousGoodsRegulationsCode 443700 |
| | | | | | | | | HazardCode 443702 | | | | 0..1 443704 | DangerousGoodsHazardCode 443706 |
| | | | | | | | | FlashpointMeasureInterval 443708 | | | | 0..1 443710 | MeasureInterval 443712 |

FIG. 44-137

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PackagingGroupCode 443714 | | | | 0..1 443716 | DangerousGoodsPackagingGroupCode 443718 |
| | | | | | | | | EmergencySchedule 443720 | | | | 0..1 443722 | DangerousGoodsEmergencySchedule 443724 |
| | | | | | | | | TransportEmergencyCardCode 443726 | | | | 0..1 443728 | TransportEmergencyCardCode 443730 |
| | | | | | | | | DangerousGoodsLabelCode 443732 | | | | 0..1 443734 | DangerousGoodsLabelCode 443736 |

FIG. 44-138

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DangerousGoodsLabelCode2 443738 | | | | 0..1 443740 | DangerousGoodsLabelCode 443742 |
| | | | | | | | | DangerousGoodsLabelCode3 443744 | | | | 0..1 443746 | DangerousGoodsLabelCode 443748 |
| | | | | | | | | PackingInstructionTypeCode 443750 | | | | 0..1 443752 | PackingInstructionTypeCode 443754 |
| | | | | | | | | TransportMeansDescriptionCode 443756 | | | | 0..1 443758 | TransportMeansDescriptionCode 443760 |

FIG. 44-139

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationAuthorisationCode 443762 | | | | 0..1 443764 | DangerousGoodsTransportationAuthorisationCode 443766 |
| | | | | | | | | ContactInformation 443768 | | | | 0..n 443770 | ... |
| | | | | | | | | | ContactPersonFunctionTypeCode 443772 | | | 1 443774 | ContactPersonFunctionTypeCode 443776 |
| | | | | | | | | | Address 443778 | | | 1 443780 | Address 443782 |
| | | | | | | | | Quantity 443784 | | | | 0..n 443786 | ... |
| | | | | | | | | | Quantity 443788 | | | 1 443790 | Quantity 443792 |

FIG. 44-140

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | RoleCode 443794 | | | 0..1 443796 | QuantityRoleCode 443798 |
| | | | | | | | | | TypeCode 443800 | | | 0..1 443802 | QuantityTypeCode 443804 |
| | | | | | | | | TextCollection 443806 | | | | 0..1 443808 | ... |
| | | | | | | | | | TextCollection 443810 | | | 1 443812 | TextCollection 443814 |
| | | | | | | | | TransportationUnitResourceInformationAssignment 443816 | | | | 0..n 443818 | ... |

FIG. 44-141

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | ShipmentOrderResourceInformationID 443820 | | | 1 443822 | ResourceInformationID 443824 |
| | | | | | | | | | Quantity 443826 | | | 0..n 443828 | ... |
| | | | | | | | | | | Quantity 443830 | | 1 443832 | Quantity 443834 |
| | | | | | | | | | | RoleCode 443836 | | 0..1 443838 | QuantityRoleCode 443840 |
| | | | | | | | | | | TypeCode 443842 | | 0..1 443844 | QuantityTypeCode 443846 |
| | | | | | | | TransportationStageAssignment 443848 | | | | | 0..n 443850 | ... |

FIG. 44-142

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ShipmentOrderTransportationStageID 443852 | | | | 1 443854 | TransportationStageID 443856 |
| | | | | | | | | Quantity 443858 | | | | 0..n 443860 | ... |
| | | | | | | | | | Quantity 443862 | | | 1 443864 | Quantity 443866 |
| | | | | | | | | | RoleCode 443868 | | | 0..1 443870 | QuantityRoleCode 443872 |
| | | | | | | | | | TypeCode 443874 | | | 0..1 443876 | QuantityTypeCode 443878 |

FIG. 44-143

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationUnitResourceInformationAssignment 443880 | | | | | 0..n 443882 | ... |
| | | | | | | | | ShipmentOrderResourceInformationID 443884 | | | | 1 443886 | ResourceInformationID 443888 |
| | | | | | | | | Quantity 443890 | | | | 0..n 443892 | ... |
| | | | | | | | | | Quantity 443894 | | | 1 443896 | Quantity 443898 |
| | | | | | | | | | RoleCode 443900 | | | 0..1 443902 | QuantityRoleCode 443904 |

FIG. 44-144

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 443906 | | | 0..1 443908 | QuantityTypeCode 443910 |
| GovernmentalRequirementInformation 443912 | | | | | | | GovernmentalProcedure 443914 | | | | | 0..n 443916 | ... |
| | | | | | | | | TransportationGovernmentAgencyTypeCode 443918 | | | | 0..1 443920 | TransportationGovernmentAgencyTypeCode 443922 |
| | | | | | | | | TransportationMovementTypeCode 443924 | | | | 0..1 443926 | TransportationMovementTypeCode 443928 |

FIG. 44-145

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationGovernmentAgencyInvolvementStatusCode 443930 | | | | 0..1 443932 | TransportationGovernmentAgencyInvolvementStatusCode 443934 |
| | | | | | | | | TransportationGovernmentAgencyActionCode 443936 | | | | 0..1 443938 | TransportationGovernmentAgencyActionCode 443940 |
| | | | | | | | | TransportationGovernmentAgencyProcedureStatusCode 443942 | | | | 0..1 443944 | TransportationGovernmentAgencyProcedureStatusCode 443946 |

FIG. 44-146

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 443948 | | | | 0..n 443950 | ... |
| | | | | | | | | | Location 443952 | | | 1 443954 | BusinessTransactionDocumentLocation 443956 |
| | | | | | | | | | RoleCode 443958 | | | 1 443960 | LocationRoleCode 443962 |
| | | | | | | | | | TypeCode 443964 | | | 0..1 443966 | LocationTypeCode 443968 |
| | | | | | | | | | Name 443970 | | | 0..1 443972 | MEDIUM_Name 443974 |
| | | | | | | | | DateTime Period 443976 | | | | 0..n 443978 | ... |

FIG. 44-147

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | DateTime Period 443980 | | | 1 443982 | DateTimePeriod 443984 |
| | | | | | | | | | PeriodRoleCode 443986 | | | 1 443988 | PeriodRoleCode 443990 |
| | | | | | | | | Seal 443992 | | | | 0..n 443994 | ... |
| | | | | | | | | | ID 443996 | | | 1 443998 | SealID 444000 |
| | | | | | | | | | PartyRole Code 444002 | | | 0..1 444004 | PartyRoleCode 444006 |
| | | | | | | | | | PartyFormattedName 444008 | | | 0..1 444010 | LONG_Name 444012 |
| | | | | | | | | | StatusCode 444014 | | | 0..1 444016 | SealStatusCode 444018 |

FIG. 44-148

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TextCollection 444020 | | | | 0..n 444022 | ... |
| | | | | | | | | | TextCollection 444024 | | | 0..1 444026 | TextCollection 444028 |
| | | | | | | | | TransportationDocumentInformation 444030 | | | | 0..n 444032 | ... |
| | | | | | | | | | TransportationDocumentTypeCode 444034 | | | 0..1 444036 | TransportationDocumentTypeCode 444038 |
| | | | | | | | | | TransportationDocumentNote 444040 | | | 0..1 444042 | SHORT_Note 444044 |

FIG. 44-149

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentID 444046 | | | 0..1 444048 | TransportationDocumentID 444050 |
| | | | | | | | | | TransportationDocumentStatusCode 444052 | | | 0..1 444054 | TransportationDocumentStatusCode 444056 |
| | | | | | | | | | LanguageCode 444058 | | | 0..1 444060 | LanguageCode 444062 |
| | | | | | | | | | CommunicationMediumTypeCode 444064 | | | 0..1 444066 | CommunicationMediumTypeCode 444068 |
| | | | | | | | | | RequiredIndicator 444070 | | | 1 444072 | Indicator 444074 |

FIG. 44-150

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | OutputCopyNumberValue 444076 | | | 0..1 444078 | NumberValue 444080 |
| | | | | | | | | | OutputOriginalNumberValue 444082 | | | 0..1 444084 | NumberValue 444086 |
| | | | | | | | | | DateTimePeriod 444088 | | | 0..n 444090 | ... |
| | | | | | | | | | | DateTimePeriod 444092 | | 1 444094 | DateTimePeriod 444096 |
| | | | | | | | | | | PeriodRoleCode 444098 | | 1 444100 | PeriodRoleCode 444102 |
| PartyInformation 444104 | | | | | | | Party 444106 | | | | | 0..n 444108 | ... |

FIG. 44-151

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Party 444110 | | | | 1 444112 | BusinessTransactionDocumentParty 444114 |
| | | | | | | | | RoleCode 444116 | | | | 1 444118 | PartyRoleCode 444120 |
| | | | | | | | | FormattedName 444122 | | | | 0..1 444124 | LONG_Name 444126 |
| | | | | | | | | DateTimePeriods 444128 | | | | 0..n 444130 | ... |
| | | | | | | | | | RequestedFulfillmentPeriod 444132 | | | 0..1 444134 | DateTimePeriod 444136 |

FIG. 44-152

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | AcceptableFulfillmentPeriod 444138 | | | 0..1 444140 | DateTimePeriod 444142 |
| | | | | | | | | | PeriodRoleCode 444144 | | | 1 444146 | PeriodRoleCode 444148 |
| LocationInformation 444150 | | | | | | | Location 444152 | | | | | 0..n 444154 | ... |
| | | | | | | | | Location 444156 | | | | 1 444158 | BusinessTransactionDocumentLocation 444160 |
| | | | | | | | | RoleCode 444162 | | | | 1 444164 | LocationRoleCode 444166 |
| | | | | | | | | TypeCode 444168 | | | | 0..1 444170 | LocationTypeCode 444172 |

FIG. 44-153

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Name 444174 | | | | 0..1 444176 | MEDIUM_Name 444178 |
| | | | | | | | | DateTimePeriods 444180 | | | | 0..n 444182 | ... |
| | | | | | | | | | RequestedFulfillmentPeriod 444184 | | | 0..1 444186 | DateTimePeriod 444188 |
| | | | | | | | | | AcceptableFulfillmentPeriod 444190 | | | 0..1 444192 | DateTimePeriod 444194 |
| | | | | | | | | | PeriodRoleCode 444196 | | | 1 444198 | PeriodRoleCode 444200 |

FIG. 44-154

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| TransportationGoodsInformation 444202 | | | | | | | ProductInformation 444204 | | | | | 0..n 444206 | ... |
| | | | | | | | | Product 444208 | | | | 0..1 444210 | BusinessTransactionDocumentProduct 444212 |
| | | | | | | | | ProductDescription 444214 | | | | 0..1 444216 | SHORT_Description 444218 |
| | | | | | | | TransportationGoodsIdentification 444220 | | | | | 0..n 444222 | ... |

FIG. 44-155

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | TransportationGoodsIdentifierTypeCode 444224 | | | | 1 444226 | TransportationGoodsIdentifierTypeCode 444228 |
| | | | | | | | | LowerBoundaryTransportationGoodsID 444230 | | | | 1 444232 | TransportationGoodsID 444234 |
| | | | | | | | | UpperBoundaryTransportationGoodsID 444236 | | | | 0..1 444238 | TransportationGoodsID 444240 |
| TransportationChargesInformation 444242 | | | | | | TransportationChargesInformation 444244 | | | | | | 0..n 444246 | ... |

FIG. 44-156

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | TransportationChargesUsageCode 444248 | | | | | 1 444250 | TransportationChargesUsageCode 444252 |
| | | | | | | | ShipmentOrderItemID 444254 | | | | | 0..1 444256 | BusinessTransactionDocumentItemID 444258 |
| | | | | | | | ShipmentOrderPartyStandardID 444260 | | | | | 0..1 444262 | PartyStandardID 444264 |
| | | | | | | | ShipmentOrderPartyInternalID 444266 | | | | | 0,,1 444268 | PartyInternalID 444270 |

FIG. 44-157

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | ShipmentOrderResourceInformationID 444272 | | | | | 0..1 444274 | ResourceInformationID 444276 |
| | | | | | | | ShipmentOrderPackageInformationID 444278 | | | | | 0..1 444280 | PackageInformationID 444282 |
| | | | | | | | ShipmentOrderTransportationStageID 444284 | | | | | 0..1 444286 | TransportationStageID 444288 |
| | | | | | | | TransportationCharges 444290 | | | | | 0..1 444292 | ... |

FIG. 44-158

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | ID 444294 | | | | 1 444296 | TransportationChargesID 444298 |
| | | | | | | | | FreightAgreementID 444300 | | | | 1 444302 | FreightAgreementID 444304 |
| | | | | | | | | OriginCode 444306 | | | | 0..1 444308 | TransportationChargesOriginCode 444310 |
| | | | | | | | | TariffID 444312 | | | | 0..1 444314 | TransportationChargesTariffID 444316 |
| | | | | | | | | CalculationSheetID 444318 | | | | 1 444320 | TransportationChargesCalculationSheetID 444322 |

FIG. 44-159

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | Location 444324 | | | | 0..n 444326 | ... |
| | | | | | | | | | Location 444328 | | | 1 444330 | BusinessTransactionDocumentLocation 444332 |
| | | | | | | | | | RoleCode 444334 | | | 1 444336 | LoactionRoleCode 444338 |
| | | | | | | | | | TypeCode 444340 | | | 0..1 444342 | LocationTypeCode 444344 |
| | | | | | | | | | Name 444346 | | | 0..1 444348 | MEDIUM_Name 444350 |
| | | | | | | | | | DateTimePeriods 444352 | | | 0..n 444354 | ... |

FIG. 44-160

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | RequestedFulfillmentPeriod 444356 | | 0..1 444358 | DateTimePeriod 444360 |
| | | | | | | | | | | AcceptableFulfillmentPeriod 444362 | | 0..1 444364 | DateTimePeriod 444366 |
| | | | | | | | | | | PeriodRoleCode 444368 | | 1 444370 | PeriodRoleCode 444372 |
| | | | | | | | | TextCollection 444374 | | | | 0..1 444376 | ... |
| | | | | | | | | | TextCollection 444378 | | | 1 444380 | TextCollection 444382 |
| | | | | | | | | Currency 444384 | | | | 0..n 444386 | ... |

FIG. 44-161

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | Code 444388 | | | 1 444390 | CurrencyCode 444392 |
| | | | | | | | | | RoleCode 444394 | | | 1 444396 | CurrencyRoleCode 444398 |
| | | | | | | | | | UsageCode 444400 | | | 0..1 444402 | CurrencyUsageCode 444404 |
| | | | | | | | | Exchange Rate 444406 | | | | 0..n 444408 | ... |
| | | | | | | | | | Exchange Rate 444410 | | | 1 444412 | ExchangeRate 444414 |
| | | | | | | | | | TypeCode 444416 | | | 0..1 444418 | ExchangeRateTypeCode 444420 |

FIG. 44-162

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | PercentElement 444422 | | | | 0..n 444424 | ... |
| | | | | | | | | | PercentRoleCode 444426 | | | 1 444428 | PercentRoleCode 444430 |
| | | | | | | | | | Percent 444432 | | | 1 444434 | Percent 444436 |
| | | | | | | | | | TransportationChargesPercentCalculationBaseCode 444438 | | | 0..1 444440 | TransportationChargesPercentCalculationBaseCode 444442 |
| | | | | | | | | | StatusCode 444444 | | | 0..1 444446 | TransportationChargesPercentElementStatusCode 444448 |

FIG. 44-163

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | DateTime Period 444450 | | | | 0..n 444452 | ... |
| | | | | | | | | | DateTime Period 444454 | | | 1 444456 | DateTimePeriod 444458 |
| | | | | | | | | | PeriodRoleCode 444460 | | | 1 444462 | PeriodRoleCode 444464 |
| | | | | | | | | BusinessTransactionDocumentReference 444466 | | | | 0..n 444468 | ... |
| | | | | | | | | | BusinessTransactionDocumentReference 444470 | | | 0..1 444472 | BusinessTransactionDocumentReference 444474 |

FIG. 44-164

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | BusinessTransactionDocumentRelationshipRoleCode 444476 | | | 0..1 444478 | BusinessTransactionDocumentRelationshipRoleCode 444480 |
| | | | | | | | | | BusinessTransactionDocumentRelationshipTypeCode 444482 | | | 0..1 444484 | BusinessTransactionDocumentRelationshipTypeCode 444486 |
| | | | | | | | | | TransportationDocumentTypeCode 444488 | | | 0..1 444490 | TransportationDocumentTypeCode 444492 |

FIG. 44-165

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationDocumentNote 444494 | | | 0..1 444496 | SHORT_Note 444498 |
| | | | | | | | | | TransportationDocumentID 444500 | | | 0..1 444502 | TransportationDocumentID 444504 |
| | | | | | | | | TaxDetail 444506 | | | | 0..n 444508 | ... |
| | | | | | | | | | ProductTax 444510 | | | 1 444512 | ProductTax 444514 |
| | | | | | | | | PaymentInstruction 444516 | | | | 0..n 444518 | ... |

FIG. 44-166

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | PaymentInstruction 444520 | | | 1 444522 | PaymentInstruction 444524 |
| | | | | | | | | | TransportationChargesElementCategoryCode 444526 | | | 0..1 444528 | TransportationChargesElementCategoryCode 444530 |
| | | | | | | | | | TransportationChargesElementSubCategoryCode 444532 | | | 0..1 444534 | TransportationChargesElementSubCategoryCode 444536 |

FIG. 44-167

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesPaymentArrangementCode 444538 | | | 0..1 444540 | TransportationChargesPaymentArrangementCode 444542 |
| | | | | | | | | CashDiscountTerms 444544 | | | | 0..1 444546 | ... |
| | | | | | | | | | CashDiscountTerms 444548 | | | 1 444550 | CashDiscountTerms 444552 |
| | | | | | | | | | TransportationChargesElementCategoryCode 444554 | | | 0..1 444556 | TransportationChargesElementCategoryCode 444558 |

FIG. 44-168

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TransportationChargesElementSubCategoryCode 444560 | | | 0..1 444562 | TransportationChargesElementSubCategoryCode 444564 |
| | | | | | | | | Element 444566 | | | | 0..n 444568 | ... |
| | | | | | | | | | CategoryCode 444570 | | | 1 444572 | TransportationChargesElementCategoryCode 444574 |
| | | | | | | | | | SubCategoryCode 444576 | | | 1 444578 | TransportationChargesElementSubCategoryCode 444580 |

FIG. 44-169

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | TypeCode 444582 | | | 1 444584 | TransportationChargesElementTypeCode 444586 |
| | | | | | | | | | CalculationResolutionCode 444588 | | | 1 444590 | TransportationChargesElementCalculationResolutionCode 444592 |
| | | | | | | | | | TransportationChargesPaymentArrangementCode 444594 | | | 0...1 444596 | TransportationChargesPaymentArrangementCode 444598 |
| | | | | | | | | | Location 444600 | | | 0..n 444602 | ... |

FIG. 44-170

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | Location 444604 | | 1 444606 | BusinessTransactionDocumentLocation 444608 |
| | | | | | | | | | | RoleCode 444610 | | 1 444612 | LocationRoleCode 444614 |
| | | | | | | | | | | TypeCode 444616 | | 0..1 444618 | LocationTypeCode 444620 |
| | | | | | | | | | | Name 444622 | | 0..1 444624 | MEDIUM_Name 444626 |
| | | | | | | | | | | DateTime Periods 444628 | | 0..n 444630 | ... |
| | | | | | | | | | | | RequestedFulfillmentPeriod 444632 | 0..1 444634 | DateTimePeriod 444636 |

FIG. 44-171

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | | AcceptableFulfillmentPeriod 444638 | 0..1 444640 | DateTimePeriod 444642 |
| | | | | | | | | | | | PeriodRoleCode 444644 | 1 444646 | PeriodRoleCode 444648 |
| | | | | | | | | | TextCollection 444650 | | | 0..1 444652 | ... |
| | | | | | | | | | | TextCollection 444654 | | 1 444656 | TextCollection 444658 |
| | | | | | | | | | Currency 444660 | | | 0..n 444662 | ... |
| | | | | | | | | | | Code 444664 | | 1 444666 | CurrencyCode 444668 |

FIG. 44-172

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | RoleCode 444670 | | 1 444672 | CurrencyRoleCode 444674 |
| | | | | | | | | | | UsageCode 444676 | | 0..1 444678 | CurrencyUsageCode 444680 |
| | | | | | | | | | RateElement 444682 | | | 0..n 444684 | ... |
| | | | | | | | | | | ID 444686 | | 1 444688 | TransportationChargesElementRateElementID 444690 |
| | | | | | | | | | | Amount 444692 | | 1 444694 | Amount 444696 |
| | | | | | | | | | | BaseQuantity 444698 | | 1 444700 | Quantity 444702 |

FIG. 44-173

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | TransportationChargesRateTypeCode 444704 | | 0..1 444706 | TransportationChargesRateTypeCode 444708 |
| | | | | | | | | | | TransportationChargesRateRoleCode 444710 | | 1 444712 | TransportationChargesRateRoleCode 444714 |
| | | | | | | | | | | TransportationChargesRateElementStatusCode 444716 | | 0..1 444718 | TransportationChargesRateElementStatusCode 444720 |
| | | | | | | | | | PercentElement 444722 | | | 0..n 444724 | ... |

FIG. 44-174

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | PercentRoleCode 444726 | | 1 444728 | PercentRoleCode 444730 |
| | | | | | | | | | | Percent 444732 | | 1 444734 | Percent 444736 |
| | | | | | | | | | | TransportationChargesPercentCalculationBaseCode 444738 | | 0..1 444740 | TransportationChargesPercentCalculationBaseCode 444742 |
| | | | | | | | | | | StatusCode 444744 | | 0..1 444746 | TransportationChargesPercentElementStatusCode 444748 |
| | | | | | | | | | AmountElement 444750 | | | 0..n 444752 | ... |

FIG. 44-175

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | Amount 444754 | | 1 444756 | Amount 444758 |
| | | | | | | | | | | AmountRoleCode 444760 | | 1 444762 | AmountRoleCode 444764 |
| | | | | | | | | | | TransportationChargesAmountElementStatusCode 444766 | | 0..1 444768 | TransportationChargesAmountElementStatusCode 444770 |
| | | | | | | | | | | RateElementIAssignment 444772 | | 0..n 444774 | ... |

FIG. 44-176

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | | TransportationChargesElementRateElementID 444776 | 1 444778 | TransportationChargesElementRateElementID 444780 |
| | | | | | | | | | CalculationBase 444782 | | | 0..n 444784 | ... |
| | | | | | | | | | | TransportationChargesElementCalculationBaseCode 444786 | | 1 444788 | TransportationChargesElementCalculationBaseCode 444790 |
| | | | | | | | | | | BaseQuantity 444792 | | 0..1 444794 | Quantity 444796 |

FIG. 44-177

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | BaseQuantityRoleCode 444798 | | 0..1 444800 | QuantityRoleCode 444802 |
| | | | | | | | | | | BaseQuantityTypeCode 444804 | | 0..1 444806 | QuantityTypeCode 444808 |
| | | | | | | | | | TaxDetail 444810 | | | 0..n 444812 | ... |
| | | | | | | | | | | ProductTax 444814 | | 1 444816 | ProductTax 444818 |
| | | | | | | | | | DateTimePeriod 444820 | | | 0..n 444822 | ... |
| | | | | | | | | | | DateTimePeriod 444824 | | 1 444826 | DateTimePeriod 444828 |

FIG. 44-178

| Package | Level 1 | Level 2 | Level 3 | Level 4 | Level 5 | Level 6 | Level 7 | Level 8 | Level 9 | Level 10 | Level 11 | Cardinality | Data Type Name |
|---|---|---|---|---|---|---|---|---|---|---|---|---|---|
| | | | | | | | | | | PeriodRoleCode 444830 | | 1 444832 | PeriodRoleCode 444834 |
| | | | | | | | | | CostDistribution 444836 | | | 0..n 444838 | ... |
| | | | | | | | | | | AccountingCodingBlockAssignment 444840 | | 1 444842 | AccountingCodingBlockAssignment 444844 |

FIG. 45-1

| Package | Level1 | Level2 | Level3 | Level4 | Level5 | Level6 | Cardinality | Data Type Name |
|---|---|---|---|---|---|---|---|---|
| FreightOrderExecutionStatusNotificationMessage 45000 | FreightOrderExecutionStatusNotificationMessage 45002 | | | | | | | FreightOrderExecutionStatusNotificationMessage 45004 |
| MessageHeader 45006 | | MessageHeader 45008 | | | | | 1..1 45010 | BusinessDocumentMessageHeader 45012 |
| FreightOrderExecution 45014 | | FreightOrderExecution 45016 | | | | | 1..1 45018 | ... |
| | | | @actioncode 45020 | | | | 1..1 45022 | ActionCode 45024 |
| | | | ID 45026 | | | | 1..1 45028 | BusinessTransactionDocumentID 45030 |

FIG. 45-2

| Package | Level1 | Level2 | Level3 | Level4 | Level5 | Level6 | Cardinality | Data Type Name |
|---|---|---|---|---|---|---|---|---|
| Confirmation 45032 | | | Confirmation 45034 | | | | 1..1 45036 | ... |
| | | | | DateTimePeriods 45038 | | | 0..n 45040 | ... |
| | | | | | RequestedFulfill-mentPeriod 45042 | | 0..1 45044 | DateTimePeriod 45046 |
| | | | | | AcceptableFulfill-mentPeriod 45048 | | 0..1 45050 | DateTimePeriod 45052 |
| | | | | | PeriodRoleCode 45054 | | 1..1 45056 | PeriodRoleCode 45058 |
| | | | | NatureOfCargo 45060 | | | 0..n 45062 | ... |

FIG. 45-3

| Package | Level1 | Level2 | Level3 | Level4 | Level5 | Level6 | Cardinality | Data Type Name |
|---|---|---|---|---|---|---|---|---|
| | | | | | ClassificationCode 45064 | | 1..1 45066 | NatureOfCargoClassificationCode 45068 |
| | | | | TotalQuantity 45070 | | | 0..n 45072 | ... |
| | | | | | Quantity 45074 | | 1 45076 | Quantity 45078 |
| | | | | | RoleCode 45080 | | 0..1 45082 | QuantityRoleCode 45084 |
| | | | | | TypeCode 45086 | | 0..1 45088 | QuantityTypeCode 45090 |
| | | | | TotalAmount 45092 | | | 0..n 45094 | ... |

FIG. 45-4

| Package | Level1 | Level2 | Level3 | Level4 | Level5 | Level6 | Cardinality | Data Type Name |
|---|---|---|---|---|---|---|---|---|
| | | | | | Amount 45096 | | 1..1 45098 | Amount 45100 |
| | | | | | RoleCode 45102 | | 1..1 45104 | AmountRoleCode 45106 |
| | | | | TextCollection 45108 | | | 0..1 45110 | ... |
| | | | | | TextCollection 45112 | | 1..1 45114 | TextCollection 45116 |
| | | | | BusinessTransaction-DocumentReference 45118 | | | 0..n 45120 | ... |
| | | | | | BusinessTransac-tionDocumen-tReference 45122 | | 0..1 45124 | BusinessTransac-tionDocumentRefer-ence 45126 |

FIG. 45-5

| Package | Level1 | Level2 | Level3 | Level4 | Level5 | Level6 | Cardinality | Data Type Name |
|---|---|---|---|---|---|---|---|---|
| | | | | | BusinessTransactionDocumentRelationshipRoleCode 45128 | | 0..1 45130 | BusinessTransactionDocumentRelationshipRoleCode 45132 |
| | | | | | BusinessTransactionDocumentRelationshipTypeCode 45134 | | 0..1 45136 | BusinessTransactionDocumentRelationshipTypeCode 45138 |
| | | | | | TransportationDocumentTypeCode 45140 | | 0..1 45142 | TransportationDocumentTypeCode 45144 |
| | | | | | TransportationDocumentNote 45146 | | 0..1 45148 | SHORT_Note 45150 |
| | | | | | TransportationDocumentID 45152 | | 0..1 45154 | TransportationDocumentID 45156 |

FIG. 45-6

| Package | Level1 | Level2 | Level3 | Level4 | Level5 | Level6 | Cardinality | Data Type Name |
|---|---|---|---|---|---|---|---|---|
| | | | | | DateTimePeriod 45158 | | 0..n 45160 | ... |
| | | | | | | DateTimePeriod 45162 | 1..1 45164 | DateTimePeriod 45166 |
| | | | | | | PeriodRoleCode 45168 | 1..1 45170 | PeriodRoleCode 45172 |

FIG. 46-1

| Package | level1 | level2 | level3 | level4 | level5 | Cardinality | Data Type Name |
|---|---|---|---|---|---|---|---|
| FreightOrderInvoicingPreparationCancelRequestMessage 46000 | FreightOrderInvoicingPreparationCancelRequestMessage 46002 | | | | | | FreightOrderInvoicingPreparationCancelRequestMessage 46004 |
| MessageHeader 46006 | | MessageHeader 46008 | | | | 1 46010 | BusinessDocumentMessageHeader 46012 |
| FreightOrderInvoicingPreparation 46014 | | FreightOrderInvoicingPreparation 46016 | | | | 1 46018 | ... |
| | | | ID 46020 | | | 1 46022 | BusinessTransactionDocumentID 46024 |
| Request 46026 | | | Request 46028 | | | 0..n 46030 | ... |

FIG. 46-2

| Package | level1 | level2 | level3 | level4 | level5 | Cardinality | Data Type Name |
|---|---|---|---|---|---|---|---|
| | | | RequestedCancellationDate 46032 | | | 0..1 46034 | Date 46036 |
| BusinessTransactionDocumentReference 46038 | | | BusinessTransactionDocumentReference 46040 | | | 0..n 46042 | ... |
| | | | | BusinessTransactionDocumentReference 46044 | | 0..1 46046 | BusinessTransactionDocumentReference 46048 |
| | | | | BusinessTransactionDocumentRelationshipRoleCode 46050 | | 0..1 46052 | BusinessTransactionDocumentRelationshipRoleCode 46054 |
| | | | | BusinessTransactionDocumentRelationshipTypeCode 46056 | | 0..1 46058 | BusinessTransactionDocumentRelationshipTypeCode 46060 |

FIG. 46-3

| Package | level1 | level2 | level3 | level4 | level5 | Cardinality | Data Type Name |
|---|---|---|---|---|---|---|---|
| | | | | TransportationDocumentTypeCode 46062 | | 0..1 46064 | TransportationDocumentTypeCode 46066 |
| | | | | TransportationDocumentNote 46068 | | 0..1 46070 | SHORT_Note 46072 |
| | | | | TransportationDocumentID 46074 | | 0..1 46076 | TransportationDocumentID 46078 |
| | | | | DateTimePeriod 46080 | | 0..n 46082 | ... |
| | | | | | DateTimePeriod 46084 | 1 46086 | DateTimePeriod 46088 |
| | | | | | PeriodRoleCode 46090 | 1 46092 | PeriodRoleCode 46094 |

FIG. 47-1

| Package | level1 | level2 | level3 | level4 | level5 | level6 | Cardinality | Data Type Name |
|---|---|---|---|---|---|---|---|---|
| FreightOrderInvoicingPreparationConfirmationMessage 47000 | FreightOrderInvoicingPreparationConfirmationMessage 47002 | | | | | | | FreightOrderInvoicingPreparationConfirmationMessage 47004 |
| MessageHeader 47006 | | MessageHeader 47008 | | | | | 1 47010 | BusinessDocumentMessageHeader 47012 |
| FreightOrderInvoicingPreparation 47014 | | FreightOrderInvoicingPreparation 47016 | | | | | 1 47018 | ... |
| | | | ID 47020 | | | | 1 47022 | BusinessTransactionDocumentID 47024 |
| Confirmation 47026 | | | Confirmation 47028 | | | | 1 47030 | ... |

FIG. 47-2

| Package | level1 | level2 | level3 | level4 | level5 | level6 | Cardinality | Data Type Name |
|---|---|---|---|---|---|---|---|---|
| | | | | AcceptanceS-tatusCode 47032 | | | 1 47034 | AcceptanceStatusCode 47036 |
| Business-Transaction-Documen-tReference 47038 | | | | Business-Transaction-Documen-tReference 47040 | | | 0..n 47042 | ... |
| | | | | | BusinessTransaction-DocumentReference 47044 | | 0..1 47046 | BusinessTransaction-DocumentReference 47048 |
| | | | | | BusinessTransaction-DocumentRelationshi-pRoleCode 47050 | | 0..1 47052 | BusinessTransaction-DocumentRelationshi-pRoleCode 47054 |
| | | | | | BusinessTransaction-DocumentRelation-shipTypeCode 47056 | | 0..1 47058 | BusinessTransaction-DocumentRelation-shipTypeCode 47060 |

FIG. 47-3

| Package | level1 | level2 | level3 | level4 | level5 | level6 | Cardinality | Data Type Name |
|---|---|---|---|---|---|---|---|---|
| | | | | | TransportationDocumentTypeCode 47062 | | 0..1 47064 | TransportationDocumentTypeCode 47066 |
| | | | | | TransportationDocumentNote 47068 | | 0..1 47070 | SHORT_Note 47072 |
| | | | | | TransportationDocumentID 47074 | | 0..1 47076 | TransportationDocumentID 47078 |
| | | | | | DateTimePeriod 47080 | | 0..n 47082 | ... |
| | | | | | | DateTimePeriod 47084 | 1 47086 | DateTimePeriod 47088 |
| | | | | | | PeriodRoleCode 47090 | 1 47092 | PeriodRoleCode 47094 |

FIG. 73-1

| Package | level1 | level2 | level3 | level4 | level5 | Cardinality | Data Type Name |
|---|---|---|---|---|---|---|---|
| MaintenancePlan-Message_sync 73000 | | | | | | | <MessageDataType> 73002 |
| MessageHeader 73004 | | Message-Header 73006 | | | | | BasicBusinessDocu-mentMessageHeader 73008 |
| MaintenancePlan 73010 | | Mainte-nancePlan 73012 | | | | | ... |
| | | | ID 73014 | | | 1 73016 | MaintenancePlanID 73018 |
| | | | CategoryCode 73020 | | | 1 73022 | MaintenancePlanCate-goryCode 73024 |
| | | | TypeCode 73026 | | | 1 73028 | MaintenancePlanType-Code 73030 |

FIG. 73-2

| Package | level1 | level2 | level3 | level4 | level5 | Cardinality | Data Type Name |
|---|---|---|---|---|---|---|---|
| | | | StatusObject 73032 | | | 0..1 73034 | StatusObject 73036 |
| | | | StartDateTime 73038 | | | 0..1 73040 | |
| | | | MeasuringDe-viceStartMeasuremen-tReadingMeasure 73042 | | | 0..1 73044 | Measure 73046 |
| | | | Description 73048 | | | 1 73050 | SHORT_Description 73052 |
| | | | TextCollection 73054 | | | 0..1 73056 | TextCollection 73058 |
| | | | SchedulingTerms 73060 | | | 0..1 73062 | |
| | | | | StartDateTime 73064 | | 0..1 73066 | TIMEZONEINDEPENDENT_DateTime 73068 |

FIG. 73-3

| Package | level1 | level2 | level3 | level4 | level5 | Cardinality | Data Type Name |
|---|---|---|---|---|---|---|---|
| | | | | MeasuringDeviceStartMeasurementReadingMeasure 73070 | | 0..1 73072 | Measure 73074 |
| | | | | LateCompletionShiftPercent 73076 | | 0..1 73078 | Percent 73080 |
| | | | | EarlyCompletionShiftPercent 73082 | | 0..1 73084 | Percent 73086 |
| | | | | LateCompletionTolerencePercent 73088 | | 0..1 73090 | Percent 73092 |
| | | | | EarlyCompletionTolerencePercent 73094 | | 0..1 73096 | Percent 73098 |
| | | | | WorkingDayCalendarCode 73100 | | 0..1 73102 | WorkingDayCalendarCode 73104 |
| | | | | MaintenancePlanCycleQuantityModificationFactorValue 73106 | | 0..1 73108 | MaintenancePlanCycleQuantityModificationFactorValue 73110 |

FIG. 73-4

| Package | level1 | level2 | level3 | level4 | level5 | Cardinality | Data Type Name |
|---|---|---|---|---|---|---|---|
| | | | | BufferStartDaysNumberValue 73112 | | 0..1 73114 | NumberValue 73116 |
| | | | | CallHorizonPercent 73118 | | 0..1 73120 | Percent 73122 |
| | | | | PredecessorCompletionRequiredIn-dicator 73124 | | 0..1 73126 | Indicator 73128 |
| | | | | SchedulingDuration 73130 | | 0..1 73132 | Duration 73134 |
| | | | | SchedulingCategoryCode 73136 | | 0..1 73138 | MaintenancePlan-SchedulingTypeCode 73140 |
| | | | | CycleDependencyIndicator 73142 | | 0..1 73144 | Indicator 73146 |
| | | | Cycle 73148 | | | Conditional-lyMandatory 73150 | |

FIG. 73-5

| Package | level1 | level2 | level3 | level4 | level5 | Cardinality | Data Type Name |
|---|---|---|---|---|---|---|---|
| | | | | CounterValue 73152 | | 1 73154 | CounterValue 73156 |
| | | | | GroupSequenceNumberValue 73158 | | 1 73160 | NumberValue 73162 |
| | | | | GroupSequenceRepetitionNumber-Value 73164 | | Conditional-lyMandatory 73166 | NumberValue 73168 |
| | | | | Quantity 73170 | | 1 73172 | Quantity 73174 |
| | | | | StartOffsetQuantity 73176 | | 0..1 73178 | Quantity 73180 |
| | | | | MeasuringDeviceID 73182 | | Conditional-lyMandatory 73184 | MeasuringDeviceID 73186 |
| | | | | Description 73188 | | 0..1 73190 | SHORT_Description 73192 |

FIG. 73-6

| Package | level1 | level2 | level3 | level4 | level5 | Cardinality | Data Type Name |
|---|---|---|---|---|---|---|---|
| | | | Item 73194 | | | 0..N 73196 | ... |
| | | | | ID 73198 | | 1 73200 | MaitenancePlanItemID 73202 |
| | | | | CategoryCode 73204 | | 1 73206 | MaintenancePlanCate-goryCode 73208 |
| | | | | CycleGroupSequenceNumberValue 73210 | | 1 73212 | NumberValue 73214 |
| | | | | Description 73216 | | 0..1 73218 | SHORT_Description 73220 |
| | | | | BusinessTransactionDocumentProc-essingTypeCode 73222 | | 1 73224 | BusinessTransaction-DocumentProcessing-TypeCode 73226 |
| | | | | MaintenancePlannerGroupCode 73228 | | 0..1 73230 | MaintenancePlanner-GroupCode 73232 |

FIG. 73-7

| Package | level1 | level2 | level3 | level4 | level5 | Cardinality | Data Type Name |
|---|---|---|---|---|---|---|---|
| | | | | ImportanceCode 73234 | | 0..1 73236 | ImportanceCode 73238 |
| | | | | MaintenanceTaskListID 73240 | | 0..1 73242 | MaintenanceTaskListID 73244 |
| | | | | MaintenanceTaskListGroupID 73246 | | 0..1 73248 | BusinessTransaction-DocumentGroupID 73250 |
| | | | | MaintenanceTaskListTypeCode 73252 | | 0..1 73254 | BusinessObjectType-Code 73256 |
| | | | | BusinessTransactionDocumentID 73258 | | 0..1 73260 | BusinessTransaction-DocumentReference 73262 |
| | | | | WorkCentreDescription 73264 | | 0..1 73266 | SHORT_Description 73268 |
| | | | | StatusObject 73270 | | 0..1 73272 | StatusObject 73274 |

FIG. 73-8

| Package | level1 | level2 | level3 | level4 | level5 | Cardinality | Data Type Name |
|---|---|---|---|---|---|---|---|
| | | | | MaintenancePlanningPlantID 73276 | | 0..1 73278 | PlantID 73280 |
| | | | | WorkCentreID 73282 | | 0..1 73284 | WorkCentreID 73286 |
| | | | | WorkCentrePlantID 73288 | | 0..1 73290 | PlantID 73292 |
| | | | | MaintenancePlantDescription 73294 | | 0..1 73296 | SHORT_Description 73298 |
| | | | | MaintenanceWorkCenterDescription 73300 | | 0..1 73302 | SHORT_Description 73304 |
| | | | | TextCollection 73306 | | 0..1 73308 | TextCollection 73310 |
| | | | | ObjectReference 73312 | | 0..N 73314 | ... |

FIG. 73-9

| Package | level1 | level2 | level3 | level4 | level5 | Cardinality | Data Type Name |
|---|---|---|---|---|---|---|---|
| | | | | | OrdinalNumberValue 73316 | 0..1 73318 | OrdinalNumberValue 73320 |
| | | | | | SerialID 73322 | 0..1 73324 | SerialID 73326 |
| | | | | | MaterailInternalID 73328 | 0..1 73330 | ProductInternalID 73332 |
| | | | | | IndividualMaterialID 73334 | 0..1 73336 | ProductInternalID 73338 |
| | | | | | MainIndicator 73340 | 1 73342 | Indicator 73344 |
| | | | | | InstallationPointID 73346 | 0..1 73348 | InstallationPointID 73350 |
| | | | | | MaterialDescription 73352 | 0..1 73354 | SHORT_Description 73356 |

FIG. 73-10

| Package | level1 | level2 | level3 | level4 | level5 | Cardinality | Data Type Name |
|---|---|---|---|---|---|---|---|
| | | | | | IndividualMaterialDescription 73358 | 0..1 73360 | SHORT_Description 73362 |
| | | | | | InstallationPointDescription 73364 | 0..1 73366 | SHORT_Description 73368 |
| | | | | | @actionCode 73370 | 1 73372 | ActionCode 73374 |
| | | | | ScheduleLine 73376 | | 0..N 73378 | ... |
| | | | | | OrdinalNumberValue 73380 | | OrdinalNumberValue 73382 |
| | | | | | PlannedDateTime 73384 | 0..1 73386 | TIMEZONEINDEPENDENT_DateTime 73388 |
| | | | | | InitiatedDateTime 73390 | 0..1 73392 | TIMEZONEINDEPENDENT_DateTime 73394 |

FIG. 73-11

| Package | level1 | level2 | level3 | level4 | level5 | Cardinality | Data Type Name |
|---|---|---|---|---|---|---|---|
| | | | | | CompleteionDateTime 73396 | 0..1 73398 | TIMEZONEINDEPENDENT_DateTime 73400 |
| | | | CycleGroup 73402 | | | Conditional-lyMandatory 73404 | … |
| | | | | SequenceNumberValue 73406 | | 1 73408 | NumberValue 73410 |
| | | | | ItemMaintenancePlanID 73412 | | 0..1 73414 | MaintenancePlanID 73416 |
| | | | | MaintenancePlanCycleSetNumber-Value 73418 | | Conditional-lyMandatory 73420 | NumberValue 73422 |
| ProcessingCondi-tions 73424 | | | ProcessingConditions 73426 | | | 0..1 73428 | |
| | | | | QueryHitsMaximumNumberValue 73430 | | 0..1 73432 | NumberValue 73434 |

FIG. 73-12

| Package | level1 | level2 | level3 | level4 | level5 | Cardinality | Data Type Name |
|---|---|---|---|---|---|---|---|
| | | | | UnlimitedQueryHitsIndicator 73436 | | 0..1 73438 | Indicator 73440 |
| | | | | ReturnedQueryHitsNumberValue 73442 | | 0..1 73444 | NumberValue 73446 |
| | | | | MoreElementsAvailableIndicator 73448 | | 0..1 73450 | MoreElementsAvail-ableIndicator 73452 |
| | | | | LastProvidedMaintenanceRequestID 73454 | | 0..1 73456 | MaintenanceRequestID 73458 |
| Log 73460 | | Log 73462 | | | | 1 73464 | Log 73466 |

FIG. 74-1

| Package | level1 | level2 | level3 | level4 | level5 | Cardinality |
|---|---|---|---|---|---|---|
| MaintPlnERPCrteReqMsg_s 74000 | MaintPlnERPCrteReqMsg_s 74002 | | | | | |
| MessageHeader 74004 | | MessageHeader 74006 | | | | 0..1 74008 |
| MaintenancePlan 74010 | | MaintenancePlan 74012 | | | | 1 74014 |
| | | | CategoryCode 74016 | | | 1 74018 |
| | | | Description 74020 | | | 1 74022 |
| | | | TextCollection 74024 | | | 0..1 74026 |
| | | | SchedulingTerms 74028 | | | 0..1 74030 |

FIG. 74-2

| Package | level1 | level2 | level3 | level4 | level5 | Cardinality |
|---|---|---|---|---|---|---|
| | | | | StartDateTime 74032 | | 0..1 74034 |
| | | | | MeasuringDeviceStartMeasurementRead-ingMeasure 74036 | | 0..1 74038 |
| | | | | LateCompletionShiftPercent 74040 | | 0..1 74042 |
| | | | | EarlyCompletionShiftPercent 74044 | | 0..1 74046 |
| | | | | LateCompletionTolerencePercent 74048 | | 0..1 74050 |
| | | | | EarlyCompletionTolerencePercent 74052 | | 0..1 74054 |
| | | | | WorkingDayCalendarCode 74056 | | 0..1 74058 |

FIG. 74-3

| Package | level1 | level2 | level3 | level4 | level5 | Cardinality |
|---|---|---|---|---|---|---|
| | | | | MaintenancePlanCycleQuantityModificationFactorValue 74060 | | 0..1 74062 |
| | | | | BufferStartDaysNumberValue 74064 | | 0..1 74066 |
| | | | | CallHorizonPercent 74068 | | 0..1 74070 |
| | | | | PredecessorCompletionRequiredIndicator 74072 | | 0..1 74074 |
| | | | | SchedulingDuration 74076 | | 0..1 74078 |
| | | | | SchedulingCategoryCode 74080 | | 0..1 74082 |
| | | | | CycleDependencyIndicator 74084 | | 0..1 74086 |

FIG. 74-4

| Package | level1 | level2 | level3 | level4 | level5 | Cardinality |
|---|---|---|---|---|---|---|
| | | | Cycle 74088 | | | 0..n 74090 |
| | | | | CounterValue 74092 | | 1 74094 |
| | | | | GroupSequenceNumberValue 74096 | | 0..1 74098 |
| | | | | GroupSequenceRepetitionNumberValue 74100 | | 0..1 74102 |
| | | | | Quantity 74104 | | 1 74106 |
| | | | | StartOffsetQuantity 74108 | | 0..1 74110 |
| | | | | MeasuringDeviceID 74112 | | 0..1 74114 |

FIG. 74-5

| Package | level1 | level2 | level3 | level4 | level5 | Cardinality |
|---|---|---|---|---|---|---|
| | | | | Description 74116 | | 0..1 74118 |
| | | | Item 74120 | | | 1..n 74122 |
| | | | | OrdinalNumberValue 74124 | | 1 74126 |
| | | | | CycleGroupSequenceNumberValue 74128 | | 0..1 74130 |
| | | | | BusinessTransactionDocumentProcess-ingTypeCode 74132 | | 1 74134 |
| | | | | WorkCentreID 74136 | | 1 74138 |
| | | | | MaintenancePlanningPlantID 74140 | | 1 74142 |

FIG. 74-6

| Package | level1 | level2 | level3 | level4 | level5 | Cardinality |
|---|---|---|---|---|---|---|
| | | | | WorkCenterPlantID 74144 | | 0..1 74146 |
| | | | | MaintenancePlannerGroupCode 74148 | | 0..1 74150 |
| | | | | ImportanceCode 74152 | | 0..1 74154 |
| | | | | MaintenanceTaskListID 74156 | | 0..1 74158 |
| | | | | BusinessTransactionDocumentGroupID 74160 | | 0..1 74162 |
| | | | | BusinessObjectTypeCode 74164 | | 0..1 74166 |
| | | | | BusinessTransactionDocumentReference 74168 | | 0..1 74170 |

FIG. 74-7

| Package | level1 | level2 | level3 | level4 | level5 | Cardinality |
|---|---|---|---|---|---|---|
| | | | | Description 74172 | | 0..1 74174 |
| | | | | TextCollection 74176 | | 0..1 74178 |
| | | | | ObjectReference 74180 | | 1..n 74182 |
| | | | | | OrdinalNumberValue 74184 | 1 74186 |
| | | | | | MainIndicator 74188 | 1 74190 |
| | | | | | SerialID 74192 | 0..1 74194 |
| | | | | | MaterailInternalID 74196 | 0..1 74198 |

FIG. 74-8

| Package | level1 | level2 | level3 | level4 | level5 | Cardinality |
|---|---|---|---|---|---|---|
| | | | | | IndividualMaterialID 74200 | 0..1 74202 |
| | | | | | InstallationPointID 74204 | 0..1 74206 |

FIG. 75

| Package | level1 | level2 | level3 | Cardinality |
|---|---|---|---|---|
| MaintPlnERPCrteConfMsg_s 75000 | MaintPlnERPCrteConfMsg_s 75002 | | | |
| MessageHeader 75004 | | MessageHeader 75006 | | 0..1 75008 |
| MaintenancePlan 75010 | | MaintenancePlan 75012 | | 0..1 75014 |
| | | | ID 75016 | 1 75018 |
| Log 75020 | | Log 75022 | | 1 75024 |

FIG. 76

| Package | level1 | level2 | level3 | Cardinality |
|---|---|---|---|---|
| MaintPlnERPActvteReqMsg_s 76000 | MaintPlnERPActvteReqMsg_s 76002 | | | |
| MessageHeader 76004 | | MessageHeader 76006 | | 0..1 76008 |
| MaintenancePlan 76010 | | MaintenancePlan 76012 | | 1 76014 |
| | | | ID 76016 | 1 76018 |

FIG. 77

| Package | level1 | level2 | Cardinality |
|---|---|---|---|
| MaintPlnERPActvteConfMsg_s 77000 | MaintPlnERPActvteConfMsg_s 77002 | | |
| MessageHeader 77004 | | MessageHeader 77006 | 0..1 77008 |
| Log 77010 | | Log 77012 | 1 77014 |

FIG. 78

| Package | level1 | level2 | level3 | Cardinality |
|---|---|---|---|---|
| MaintPlnERPDactvteReqMsg_s 78000 | MaintPlnERPDactvteReqMsg_s 78002 | | | |
| MessageHeader 78004 | | MessageHeader 78006 | | 0..1 78008 |
| MaintenancePlan 78010 | | MaintenancePlan 78012 | | 1 78014 |
| | | | ID 78016 | 1 78018 |

FIG. 79

| Package | level1 | level2 | Cardinality |
|---|---|---|---|
| MaintPlnERPDactvteConfMsg_s 79000 | MaintPlnERPDactvteConfMsg_s 79002 | | |
| MessageHeader 79004 | | MessageHeader 79006 | 0..1 79008 |
| Log 79010 | | Log 79012 | 1 79014 |

FIG. 80

| Package | level1 | level2 | level3 | Cardinality |
|---|---|---|---|---|
| MaintPlnERPSetDelIndReqMsg_s 80000 | MaintPlnERPSetDelIndReqMsg_s 80002 | | | |
| MessageHeader 80004 | | MessageHeader 80006 | | 0..1 80008 |
| MaintenancePlan 80010 | | MaintenancePlan 80012 | | 1 80014 |
| | | | ID 80016 | 1 80018 |

FIG. 81

| Package | level1 | level2 | Cardinality |
|---|---|---|---|
| MaintPlnERPSetDelIndConfMsg_s 81000 | MaintPlnERPSetDelIndConfMsg_s 81002 | | |
| MessageHeader 81004 | | MessageHeader 81006 | 0..1 81008 |
| Log 81010 | | Log 81012 | 1 81014 |

FIG. 82

| Package | level1 | level2 | level3 | Cardinality |
|---|---|---|---|---|
| MaintPlnERPRstDelIndReqMsg_s 82000 | MaintPlnERPRstDelIndReqMsg_s 82002 | | | |
| MessageHeader 82004 | | MessageHeader 82006 | | 0..1 82008 |
| MaintenancePlan 82010 | | MaintenancePlan 82012 | | 1 82014 |
| | | | ID 82016 | 1 82018 |

FIG. 83

| Package | level1 | level2 | Cardinality |
|---|---|---|---|
| MaintPlnERPRstDelIndConfMsg_s 83000 | MaintPlnERPRstDelIndConfMsg_s 83002 | | |
| MessageHeader 83004 | | MessageHeader 83006 | 0..1 83008 |
| Log 83010 | | Log 83012 | 1 83014 |

FIG. 84-1

| Package | level1 | level2 | level3 | level4 | Cardinality |
|---|---|---|---|---|---|
| MaintPlnERPSimplElmntsQryMsg_s 84000 | MaintPlnERPSimplElmntsQryMsg_s 84002 | | | | |
| Selection 84004 | | MaintenancePlanSimpleSelectionByElements 84006 | | | 1 84008 |
| | | | MaintenancePlanCategoryCode 84010 | | 0..1 84012 |
| | | | SelectionByMaintenancePlanID 84014 | | 0..1 84016 |
| | | | | InclusionExclusionCode 84018 | 0..1 84020 |
| | | | | IntervalBoundaryTypeCode 84022 | 0..1 84024 |
| | | | | LowerBoundaryMaintenancePlanID 84026 | 0..1 84028 |

FIG. 84-2

| Package | level1 | level2 | level3 | level4 | Cardinality |
|---|---|---|---|---|---|
| | | | | UpperBoundaryMaintenancePlanID 84030 | 0..1 84032 |
| ProcessingConditions 84034 | | ProcessingConditions 84036 | | | 0..1 84038 |
| | | | QueryHitsMaximumNumberValue 84040 | | 0..1 84042 |
| | | | UnlimitedQueryHitsIndicator 84044 | | 0..1 84046 |
| | | | ReturnedQueryHitsNumberValue 84048 | | 0..1 84050 |
| | | | MoreElementsAvailableIndicator 84052 | | 0..1 84054 |
| | | | LastProvidedMaintenancePlanID 84056 | | 0..1 84058 |

FIG. 85-1

| Package | level1 | level2 | level3 | Cardinality |
|---|---|---|---|---|
| MaintPlnERPSimplElmntsRspMsg_s 85000 | MaintPlnERPSimplElmntsRspMsg_s 85002 | | | |
| MaintenancePlan 85004 | | MaintenancePlan 85006 | | 0..n 85008 |
| | | | ID 85010 | 1 85012 |
| | | | Description 85014 | 0..1 85016 |
| ProcessingConditions 85018 | | ProcessingConditions 85020 | | 1 85022 |
| | | | QueryHitsMaximumNumberValue 85024 | 0..1 85026 |
| | | | UnlimitedQueryHitsIndicator 85028 | 0..1 85030 |

FIG. 85-2

| Package | level1 | level2 | level3 | Cardinality |
|---|---|---|---|---|
| | | | ReturnedQueryHitsNumberValue 85032 | 0..1 85034 |
| | | | MoreElementsAvailableIndicator 85036 | 0..1 85038 |
| | | | LastProvidedMaintenancePlanID 85040 | 0..1 85042 |
| Log 85044 | | Log 85046 | | 1 85048 |

FIG. 86-1

| Package | level1 | level2 | level3 | level4 | level5 | Cardinality |
|---|---|---|---|---|---|---|
| MaintPlnER-PUpdtReqMsg_s 86000 | MaintPlnER-PUpdtReqMsg_s 86002 | | | | | |
| MessageHeader 86004 | | MessageHeader 86006 | | | | 0..1 86008 |
| MaintenancePlan 86010 | | MaintenancePlan 86012 | | | | 1 86014 |
| | | | ID 86016 | | | 1 86018 |
| | | | ChangeStateID 86020 | | | 1 86022 |
| | | | Description 86024 | | | 0..1 86026 |
| | | | TextCollection 86028 | | | 0..1 86030 |

FIG. 86-2

| Package | level1 | level2 | level3 | level4 | level5 | Cardinality |
|---|---|---|---|---|---|---|
| | | | SchedulingTerms 86032 | | | 0..1 86034 |
| | | | | StartDateTime 86036 | | 0..1 86038 |
| | | | | MeasuringDeviceStartMeasurementRead-ingMeasure 86040 | | 0..1 86042 |
| | | | | LateCompletionShiftPercent 86044 | | 0..1 86046 |
| | | | | EarlyCompletionShiftPercent 86048 | | 0..1 86050 |
| | | | | LateCompletionTolerencePercent 86052 | | 0..1 86054 |
| | | | | EarlyCompletionTolerencePercent 86056 | | 0..1 86058 |

FIG. 86-3

| Package | level1 | level2 | level3 | level4 | level5 | Cardinality |
|---|---|---|---|---|---|---|
| | | | | WorkingDayCalendarCode 86060 | | 0..1 86062 |
| | | | | MaintenancePlanCycleQuantityModification-FactorValue 86064 | | 0..1 86066 |
| | | | | BufferStartDaysNumberValue 86068 | | 0..1 86070 |
| | | | | CallHorizonPercent 86072 | | 0..1 86074 |
| | | | | PredecessorCompletionRequiredIndicator 86076 | | 0..1 86078 |
| | | | | SchedulingDuration 86080 | | 0..1 86082 |
| | | | | SchedulingCategoryCode 86084 | | 0..1 86086 |

FIG. 86-4

| Package | level1 | level2 | level3 | level4 | level5 | Cardinality |
|---|---|---|---|---|---|---|
| | | | | CycleDependencyIndicator 86088 | | 0..1 86090 |
| | | | Cycle 86092 | | | 0..n 86094 |
| | | | | @actionCode 86096 | | 1 86098 |
| | | | | CounterValue 86100 | | 1 86102 |
| | | | | GroupSequenceNumberValue 86104 | | 0..1 86106 |
| | | | | GroupSequenceRepetitionNumberValue 86108 | | 0..1 86110 |
| | | | | Quantity 86112 | | 0..1 86114 |

FIG. 86-5

| Package | level1 | level2 | level3 | level4 | level5 | Cardinality |
|---|---|---|---|---|---|---|
| | | | | StartOffsetQuantity 86116 | | 0..1 86118 |
| | | | | MeasuringDeviceID 86120 | | 0..1 86122 |
| | | | | Description 86124 | | 0..1 86126 |
| | | | Item 86128 | | | 0..n 86130 |
| | | | | @actionCode 86132 | | 1 86134 |
| | | | | ID 86136 | | 0..1 86138 |
| | | | | CycleGroupSequenceNumberValue 86140 | | 0..1 86142 |

FIG. 86-6

| Package | level1 | level2 | level3 | level4 | level5 | Cardinality |
|---|---|---|---|---|---|---|
| | | | | BusinessTransactionDocumentProcessing-TypeCode 86144 | | 0..1 86146 |
| | | | | BusinessTransactionDocumentReference 86148 | | 0..1 86150 |
| | | | | WorkCentreID 86152 | | 0..1 86154 |
| | | | | MaintenancePlanningPlantID 86156 | | 0..1 86158 |
| | | | | MaintenancePlannerGroupCode 86160 | | 0..1 86162 |
| | | | | ImportanceCode 86164 | | 0..1 86166 |
| | | | | MaintenanceTaskListID 86168 | | 0..1 86170 |

FIG. 86-7

| Package | level1 | level2 | level3 | level4 | level5 | Cardinality |
|---|---|---|---|---|---|---|
| | | | | BusinessTransactionDocumentGroupID 86172 | | 0..1 86174 |
| | | | | BusinessObjectTypeCode 86176 | | 0..1 86178 |
| | | | | WorkCentrePlantID 86180 | | 0..1 86182 |
| | | | | Description 86184 | | 0..1 86186 |
| | | | | TextCollection 86188 | | 0..1 86190 |
| | | | | ObjectReference 86192 | | 0..n 86194 |
| | | | | | @actionCode 86196 | 1 86198 |

FIG. 86-8

| Package | level1 | level2 | level3 | level4 | level5 | Cardinality |
|---|---|---|---|---|---|---|
| | | | | | OrdinalNumberValue 86200 | 0..1 86202 |
| | | | | | MainIndicator 86204 | 1 86206 |
| | | | | | SerialID 86208 | 0..1 86210 |
| | | | | | MaterailInternalID 86212 | 0..1 86214 |
| | | | | | IndividualMaterialID 86216 | 0..1 86218 |
| | | | | | InstallationPointID 86220 | 0..1 86222 |

FIG. 87

| Package | level1 | level2 | level3 | Cardinality |
|---|---|---|---|---|
| MaintPlnERPUpdtConfMsg_s 87000 | MaintPlnERPUpdtConfMsg_s 87002 | | | |
| MessageHeader 87004 | | MessageHeader 87006 | | 0..1 87008 |
| MaintenancePlan 87010 | | MaintenancePlan 87012 | | 0..1 87014 |
| | | | ID 87016 | 1 87018 |
| Log 87020 | | Log 87022 | | 1 87024 |

FIG. 88-1

| Package | level1 | level2 | level3 | level4 | level5 | Cardinality |
|---|---|---|---|---|---|---|
| MaintPlnERPCrteCkQryMsg_s 88000 | MaintPlnERPCrteCkQryMsg_s 88002 | | | | | |
| MaintenancePlan 88004 | | MaintenancePlan 88006 | | | | 1 88008 |
| | | | CategoryCode 88010 | | | 1 88012 |
| | | | Description 88014 | | | 1 88016 |
| | | | TextCollection 88018 | | | 0..1 88020 |
| | | | SchedulingTerms 88022 | | | 0..1 88024 |
| | | | | StartDateTime 88026 | | 0..1 88028 |

FIG. 88-2

| Package | level1 | level2 | level3 | level4 | level5 | Cardinality |
|---|---|---|---|---|---|---|
| | | | | MeasuringDeviceStartMeasurementReadingMeasure 88030 | | 0..1 88032 |
| | | | | LateCompletionShiftPercent 88034 | | 0..1 88036 |
| | | | | EarlyCompletionShiftPercent 88038 | | 0..1 88040 |
| | | | | LateCompletionTolerencePercent 88042 | | 0..1 88044 |
| | | | | WorkingDayCalendarCode 88046 | | 0..1 88048 |
| | | | | EarlyCompletionTolerencePercent 88050 | | 0..1 88052 |
| | | | | MaintenancePlanCycleQuantityModificationFactorValue 88054 | | 0..1 88056 |

FIG. 88-3

| Package | level1 | level2 | level3 | level4 | level5 | Cardinality |
|---|---|---|---|---|---|---|
| | | | | BufferStartDaysNumberValue 88058 | | 0..1 88060 |
| | | | | CallHorizonPercent 88062 | | 0..1 88064 |
| | | | | PredecessorCompletionRequiredIndicator 88066 | | 0..1 88068 |
| | | | | SchedulingDuration 88070 | | 0..1 88072 |
| | | | | SchedulingCategoryCode 88074 | | 0..1 88076 |
| | | | | CycleDependencyIndicator 88078 | | 0..1 88080 |
| | | | Cycle 88082 | | | 0..n 88084 |

FIG. 88-4

| Package | level1 | level2 | level3 | level4 | level5 | Cardinality |
|---|---|---|---|---|---|---|
| | | | | CounterValue 88086 | | 1 88088 |
| | | | | GroupSequenceNumberValue 88090 | | 0..1 88092 |
| | | | | GroupSequenceRepetitionNumberValue 88094 | | 0..1 88096 |
| | | | | Quantity 88098 | | 1 88100 |
| | | | | StartOffsetQuantity 88102 | | 0..1 88104 |
| | | | | MeasuringDeviceID 88106 | | 1 88108 |
| | | | | Description 88110 | | 0..1 88112 |

FIG. 88-5

| Package | level1 | level2 | level3 | level4 | level5 | Cardinality |
|---|---|---|---|---|---|---|
| | | | Item 88114 | | | 1..N 88116 |
| | | | | OrdinalNumberValue 88118 | | 1 88120 |
| | | | | CycleGroupSequenceNumberValue 88122 | | 0..1 88124 |
| | | | | BusinessTransactionDocumentProcessing-TypeCode 88126 | | 1 88128 |
| | | | | WorkCentreID 88130 | | 1 88132 |
| | | | | WorkCentrePlantID 88134 | | 1 88136 |
| | | | | MaintenancePlanningPlantID 88138 | | 1 88140 |

FIG. 88-6

| Package | level1 | level2 | level3 | level4 | level5 | Cardinality |
|---|---|---|---|---|---|---|
| | | | | MaintenancePlannerGroupCode 88142 | | 0..1 88144 |
| | | | | ImportanceCode 88146 | | 0..1 88148 |
| | | | | MaintenanceTaskListID 88150 | | 0..1 88152 |
| | | | | BusinessTransactionDocumentGroupID 88154 | | 0..1 88156 |
| | | | | BusinessObjectTypeCode 88158 | | 0..1 88160 |
| | | | | BusinessTransactionDocumentReference 88162 | | 0..1 88164 |
| | | | | Description 88166 | | 0..1 88168 |

FIG. 88-7

| Package | level1 | level2 | level3 | level4 | level5 | Cardinality |
|---|---|---|---|---|---|---|
| | | | | TextCollection 88170 | | 0..1 88172 |
| | | | | ObjectReference 88174 | | 1..n 88176 |
| | | | | | OrdinalNumberValue 88178 | 1 88180 |
| | | | | | MainIndicator 88182 | 1 88184 |
| | | | | | SerialID 88186 | 0..1 88188 |
| | | | | | MaterailInternalID 88190 | 0..1 88192 |
| | | | | | IndividualMaterialID 88194 | 0..1 88196 |

FIG. 88-8

| Package | level1 | level2 | level3 | level4 | level5 | Cardinality |
|---|---|---|---|---|---|---|
| | | | | | InstallationPointID 88198 | 0..1 88200 |

FIG. 89

| Package | level1 | level2 | Cardinality |
|---|---|---|---|
| MaintPlnERPCrteCkRspMsg_s 89000 | MaintPlnERPCrteCkRspMsg_s 89002 | | |
| Log 89004 | | Log 89006 | 1 89008 |

FIG. 90-1

| Package | level1 | level2 | level3 | Cardinality |
|---|---|---|---|---|
| MaintPlnERPItmElmntsQryMsg_s 90000 | MaintPlnERPItmElmntsQryMsg_s 90002 | | | |
| Selection 90004 | | MaintenancePlanItemSelection-ByElements 90006 | | 1 90008 |
| | | | CategoryCode 90010 | 0..1 90012 |
| | | | MaintenancePlannerGroupCode 90014 | 0..1 90016 |
| | | | MaintenancePlanID 90018 | 0..1 90020 |
| | | | MaterialInternalID 90022 | 0..1 90024 |
| | | | IndividualMaterialID 90026 | 0..1 90028 |

FIG. 90-2

| Package | level1 | level2 | level3 | Cardinality |
| --- | --- | --- | --- | --- |
| | | | InstallationPointID 90030 | 0..1 90032 |
| ProcessingConditions 90034 | | ProcessingConditions 90036 | | 0..1 90038 |
| | | | QueryHitsMaximumNumberValue 90040 | 0..1 90042 |
| | | | UnlimitedQueryHitsIndicator 90044 | 0..1 90046 |
| | | | ReturnedQueryHitsNumberValue 90048 | 0..1 90050 |
| | | | MoreElementsAvailableIndicator 90052 | 0..1 90054 |
| | | | LastProvidedItemID 90056 | 0..1 90058 |

FIG. 91-1

| Package | level1 | level2 | level3 | level4 | Cardinality |
|---|---|---|---|---|---|
| MaintPlnERPItmElmntsRspMsg_s 91000 | MaintPlnERPItmElmntsRspMsg_s 91002 | | | | |
| MaintenancePlanItem 91004 | | MaintenancePlan 91006 | | | 0..n 91008 |
| | | | ID 91010 | | 1 91012 |
| | | | Description 91014 | | 0..1 91016 |
| | | | Item 91018 | | 1 91020 |
| | | | | ID 91022 | 1 91024 |
| | | | | Description 91026 | 0..1 91028 |

FIG. 91-2

| Package | level1 | level2 | level3 | level4 | Cardinality |
|---|---|---|---|---|---|
| | | ProcessingConditions 91030 | | | 0..1 91032 |
| | | | QueryHitsMaximumNumberValue 91034 | | 0..1 91036 |
| | | | UnlimitedQueryHitsIndicator 91038 | | 0..1 91040 |
| | | | ReturnedQueryHitsNumberValue 91042 | | 0..1 91044 |
| | | | MoreElementsAvailableIndicator 91046 | | 0..1 91048 |
| | | | LastProvidedItemID 91050 | | 0..1 91052 |
| Log 91054 | | Log 91056 | | | 1 91058 |

FIG. 92-1

| Package | level1 | level2 | level3 | level4 | level5 | Cardinality |
|---|---|---|---|---|---|---|
| MaintPlnER-PUpdtCkQryMsg_s 92000 | MaintPlnER-PUpdtCkQryMsg_s 92002 | | | | | |
| MaintenancePlan 92004 | | MaintenancePlan 92006 | | | | 1 92008 |
| | | | ID 92010 | | | 1 92012 |
| | | | ChangeStateID 92014 | | | 1 92016 |
| | | | Description 92018 | | | 0..1 92020 |
| | | | TextCollection 92022 | | | 0..1 92024 |
| | | | SchedulingTerms 92026 | | | 0..1 92028 |

FIG. 92-2

| Package | level1 | level2 | level3 | level4 | level5 | Cardinality |
|---|---|---|---|---|---|---|
| | | | | StartDateTime 92030 | | 0..1 92032 |
| | | | | MeasuringDeviceStartMeasurementReadingMeasure 92034 | | 0..1 92036 |
| | | | | LateCompletionShiftPercent 92038 | | 0..1 92040 |
| | | | | EarlyCompletionShiftPercent 92042 | | 0..1 92044 |
| | | | | LateCompletionTolerencePercent 92046 | | 0..1 92048 |
| | | | | WorkingDayCalendarCode 92050 | | 0..1 92052 |
| | | | | EarlyCompletionTolerencePercent 92054 | | 0..1 92056 |

FIG. 92-3

| Package | level1 | level2 | level3 | level4 | level5 | Cardinality |
|---|---|---|---|---|---|---|
| | | | | MaintenancePlanCycleQuantityModification-FactorValue 92058 | | 0..1 92060 |
| | | | | BufferStartDaysNumberValue 92062 | | 0..1 92064 |
| | | | | CallHorizonPercent 92066 | | 0..1 92068 |
| | | | | PredecessorCompletionRequiredIndicator 92070 | | 0..1 92072 |
| | | | | SchedulingDuration 92074 | | 0..1 92076 |
| | | | | SchedulingCategoryCode 92078 | | 0..1 92080 |
| | | | | CycleDependencyIndicator 92082 | | 0..1 92084 |

FIG. 92-4

| Package | level1 | level2 | level3 | level4 | level5 | Cardinality |
|---|---|---|---|---|---|---|
| | | | Cycle 92086 | | | 0..n 92088 |
| | | | | @actionCode 92090 | | 1 92092 |
| | | | | CounterValue 92094 | | 1 92096 |
| | | | | GroupSequenceNumberValue 92098 | | 0..1 92100 |
| | | | | GroupSequenceRepetitionNumberValue 92102 | | 0..1 92104 |
| | | | | Quantity 92106 | | 0..1 92108 |
| | | | | StartOffsetQuantity 92110 | | 0..1 92112 |

FIG. 92-5

| Package | level1 | level2 | level3 | level4 | level5 | Cardinality |
|---|---|---|---|---|---|---|
| | | | | MeasuringDeviceID 92114 | | 0..1 92116 |
| | | | | Description 92118 | | 0..1 92120 |
| | | | Item 92122 | | | 0..n 92124 |
| | | | | @actionCode 92126 | | 1 92128 |
| | | | | ID 92130 | | 0..1 92132 |
| | | | | CycleGroupSequenceNumberValue 92134 | | 0..1 92136 |
| | | | | BusinessTransactionDocumentProcessing-TypeCode 92138 | | 0..1 92140 |

FIG. 92-6

| Package | level1 | level2 | level3 | level4 | level5 | Cardinality |
|---|---|---|---|---|---|---|
| | | | | BusinessTransactionDocumentReference 92142 | | 0..1 92144 |
| | | | | WorkCentreID 92146 | | 0..1 92148 |
| | | | | WorkCentrePlantID 92150 | | 0..1 92152 |
| | | | | MaintenancePlanningPlantID 92154 | | 0..1 92156 |
| | | | | MaintenancePlannerGroupCode 92158 | | 0..1 92160 |
| | | | | ImportanceCode 92162 | | 0..1 92164 |
| | | | | MaintenanceTaskListID 92166 | | 0..1 92168 |

FIG. 92-7

| Package | level1 | level2 | level3 | level4 | level5 | Cardinality |
| --- | --- | --- | --- | --- | --- | --- |
| | | | | BusinessTransactionDocumentGroupID 92170 | | 0..1 92172 |
| | | | | BusinessObjectTypeCode 92174 | | 0..1 92176 |
| | | | | Description 92178 | | 0..1 92180 |
| | | | | TextCollection 92182 | | 0..1 92184 |
| | | | | ObjectReference 92186 | | 0..n 92188 |
| | | | | | @actionCode 92190 | 1 92192 |
| | | | | | OrdinalNumberValue 92194 | 0..1 92196 |

FIG. 92-8

| Package | level1 | level2 | level3 | level4 | level5 | Cardinality |
|---|---|---|---|---|---|---|
| | | | | | MainIndicator 92198 | 1 92200 |
| | | | | | SerialID 92202 | 0..1 92204 |
| | | | | | MaterailInternalID 92206 | 0..1 92208 |
| | | | | | IndividualMaterialID 92210 | 0..1 92212 |
| | | | | | InstallationPointID 92214 | 0..1 92216 |

FIG. 93

| Package | level1 | level2 | Cardinality |
|---|---|---|---|
| MaintPlnERPUpdtCkRspMsg_s 93000 | MaintPlnERPUpdtCkRspMsg_s 93002 | | |
| Log 93004 | | Log 93006 | 1 93008 |

FIG. 94

| Package | level1 | level2 | level3 | Cardinality |
|---|---|---|---|---|
| MaintPlnERPByIDQryMsg_s 94000 | MaintPlnERPByIDQryMsg_s 94002 | | | |
| Selection 94004 | | MaintenancePlanSelectionByID 94006 | | 1 94008 |
| | | | MaintenancePlanID 94010 | 1 94012 |

FIG. 95-1

| Package | level1 | level2 | level3 | level4 | level5 | Cardinality |
|---|---|---|---|---|---|---|
| MaintPlnERPBy-IDRspMsg_s 95000 | MaintPlnERPBy-IDRspMsg_s 95002 | | | | | |
| MaintenancePlan 95004 | | Mainte-nancePlan 95006 | | | | 0..1 95008 |
| | | | ID 95010 | | | 1 95012 |
| | | | ChangeStateID 95014 | | | 1 95016 |
| | | | CategoryCode 95018 | | | 1 95020 |
| | | | StatusObject 95022 | | | 0..1 95024 |
| | | | Description 95026 | | | 0..1 95028 |

FIG. 95-2

| Package | level1 | level2 | level3 | level4 | level5 | Cardinality |
|---|---|---|---|---|---|---|
| | | | TextCollection 95030 | | | 0..1 95032 |
| | | | SchedulingTerms 95034 | | | 0..1 95036 |
| | | | | StartDateTime 95038 | | 0..1 95040 |
| | | | | MeasuringDeviceStartMeasurementReading-Measure 95042 | | 0..1 95044 |
| | | | | LateCompletionShiftPercent 95046 | | 0..1 95048 |
| | | | | EarlyCompletionShiftPercent 95050 | | 0..1 95052 |
| | | | | LateCompletionTolerencePercent 95054 | | 0..1 95056 |

FIG. 95-3

| Package | level1 | level2 | level3 | level4 | level5 | Cardinality |
|---|---|---|---|---|---|---|
| | | | | WorkingDayCalendarCode 95058 | | 0..1 95060 |
| | | | | EarlyCompletionTolerencePercent 95062 | | 0..1 95064 |
| | | | | MaintenancePlanCycleQuantityModificationFac-torValue 95066 | | 0..1 95068 |
| | | | | BufferStartDaysNumberValue 95070 | | 0..1 95072 |
| | | | | CallHorizonPercent 95074 | | 0..1 95076 |
| | | | | PredecessorCompletionRequiredIndicator 95078 | | 0..1 95080 |
| | | | | SchedulingDuration 95082 | | 0..1 95084 |

FIG. 95-4

| Package | level1 | level2 | level3 | level4 | level5 | Cardinality |
|---|---|---|---|---|---|---|
| | | | | SchedulingCategoryCode 95086 | | 0..1 95088 |
| | | | | CycleDependencyIndicator 95090 | | 0..1 95092 |
| | | | Cycle 95094 | | | 0...n 95096 |
| | | | | CounterValue 95098 | | 1 95100 |
| | | | | GroupSequenceNumberValue 95102 | | 0..1 95104 |
| | | | | GroupSequenceRepetitionNumberValue 95106 | | 0..1 95108 |
| | | | | Quantity 95110 | | 1 95112 |

FIG. 95-5

| Package | level1 | level2 | level3 | level4 | level5 | Cardinality |
|---|---|---|---|---|---|---|
| | | | | StartOffsetQuantity 95114 | | 0..1 95116 |
| | | | | MeasuringDeviceID 95118 | | 0..1 95120 |
| | | | | Description 95122 | | 0..1 95124 |
| | | | Item 95126 | | | 1..n 95128 |
| | | | | OrdinalNumberValue 95130 | | 1 95132 |
| | | | | ID 95134 | | 1 95136 |
| | | | | CycleGroupSequenceNumberValue 95138 | | 0..1 95140 |

FIG. 95-6

| Package | level1 | level2 | level3 | level4 | level5 | Cardinality |
|---|---|---|---|---|---|---|
| | | | | BusinessTransactionDocumentProcessing-TypeCode 95142 | | 1 95144 |
| | | | | BusinessTransactionDocumentReference 95146 | | 0..1 95148 |
| | | | | WorkCentreID 95150 | | 1 95152 |
| | | | | WorkCentrePlantID 95154 | | 0..1 95156 |
| | | | | MaintenancePlanningPlantID 95158 | | 1 95160 |
| | | | | MaintenancePlannerGroupCode 95162 | | 0..1 95164 |
| | | | | ImportanceCode 95166 | | 0..1 95168 |

FIG. 95-7

| Package | level1 | level2 | level3 | level4 | level5 | Cardinality |
|---|---|---|---|---|---|---|
| | | | | MaintenanceTaskListID 95170 | | 0..1 95172 |
| | | | | BusinessTransactionDocumentGroupID 95174 | | 0..1 95176 |
| | | | | BusinessObjectTypeCode 95178 | | 0..1 95180 |
| | | | | WorkCentreDescription 95182 | | 0..1 95184 |
| | | | | MaintenancePlantDescription 95186 | | 0..1 95188 |
| | | | | StatusObject 95190 | | 0..1 95192 |
| | | | | Description 95194 | | 0..1 95196 |

FIG. 95-8

| Package | level1 | level2 | level3 | level4 | level5 | Cardinality |
|---|---|---|---|---|---|---|
| | | | | TextCollection 95198 | | 0..1 95200 |
| | | | | ObjectReference 95202 | | 1..n 95204 |
| | | | | | OrdinalNumberValue 95206 | 1 95208 |
| | | | | | MainIndicator 95210 | 1 95212 |
| | | | | | SerialID 95214 | 0..1 95216 |
| | | | | | MaterailInternalID 95218 | 0..1 95220 |
| | | | | | IndividualMaterialID 95222 | 0..1 95224 |

FIG. 95-9

| Package | level1 | level2 | level3 | level4 | level5 | Cardinality |
|---|---|---|---|---|---|---|
| | | | | | InstallationPointID 95226 | 0..1 95228 |
| | | | | | MaterialDescription 95230 | 0..1 95232 |
| | | | | | IndividualMaterialDescription 95234 | 0..1 95236 |
| | | | | | InstallationPointDescription 95238 | 0..1 95240 |
| | | | | ScheduleLine 95242 | | 0..n 95244 |
| | | | | | OrdinalNumberValue 95246 | 1 95248 |
| | | | | | PlannedDateTime 95250 | 1 95252 |

FIG. 95-10

| Package | level1 | level2 | level3 | level4 | level5 | Cardinality |
|---|---|---|---|---|---|---|
| | | | | | InitiatedDateTime 95254 | 0..1 95256 |
| | | | | | CompletionDateTime 95258 | 0..1 95260 |
| Log 95262 | | Log 95264 | | | | 1 95266 |

FIG. 96

| Package | level1 | level2 | level3 | Cardinality |
|---|---|---|---|---|
| MaintPlnERPSchedLineByIDQryMsg_s 96000 | MaintPlnERPSchedLineByIDQryMsg_s 96002 | | | |
| Selection 96004 | | MaintenancePlanScheduleLineSelectionByID 96006 | | 1 96008 |
| | | | MaintenancePlanID 96010 | 1 96012 |

FIG. 97-1

| Package | level1 | level2 | level3 | level4 | level5 | Cardinality |
|---|---|---|---|---|---|---|
| MaintPlnERPSchedLineBy-IDRspMsg_s 97000 | MaintPlnERPSchedLineBy-IDRspMsg_s 97002 | | | | | |
| MessageHeader 97004 | | MessageHeader 97006 | | | | 0..1 97008 |
| MaintenancePlan 97010 | | MaintenancePlan 97012 | | | | 0..1 97014 |
| | | | ID 97016 | | | 1 97018 |
| | | | Item 97020 | | | 0..n 97022 |
| | | | | ID 97024 | | 1 97026 |
| | | | | ScheduleLine 97028 | | 0..n 97030 |

FIG. 97-2

| Package | level1 | level2 | level3 | level4 | level5 | Cardinality |
|---|---|---|---|---|---|---|
| | | | | | OrdinalNumberValue 97032 | 0..1 97034 |
| | | | | | PlannedDateTime 97036 | 0..1 97038 |
| | | | | | InitiatedDateTime 97040 | 0..1 97042 |
| | | | | | CompleteionDateTime 97044 | 0..1 97046 |
| Log 97048 | | Log 97050 | | | | 1 97052 |

FIG. 109-1

| Package | level1 | level2 | level3 | level4 | level5 | Data Type Name |
|---|---|---|---|---|---|---|
| MaintenanceTask-ListMessage_sync 109000 | Maintenan-ceTask-ListMes-sage_sync 109002 | | | | | <MessageDataType> 109004 |
| MessageHeader 109006 | | Message-Header 109008 | | | | BasicBusinessDocument-MessageHeader 109010 |
| MaintenanceTask-List 109012 | | Maintenan-ceTaskList 109014 | | | | ... |
| | | | ID 109016 | | | MaintenanceTaskListID 109018 |
| | | | GroupID 109020 | | | BusinessTransactionDocu-mentGroupID 109022 |
| | | | MaintenancePlanningPlantID 109024 | | | PlantID 109026 |

FIG. 109-2

| Package | level1 | level2 | level3 | level4 | level5 | Data Type Name |
|---|---|---|---|---|---|---|
| | | | MaintenanceWorkCentreID 109028 | | | WorkCentreID 109030 |
| | | | MaintenanceWorkCentrePlan-tID 109032 | | | PlantID 109034 |
| | | | MaterialInternalID 109036 | | | ProductInternalID 109038 |
| | | | InstallationPointID 109040 | | | InstallationPointID 109042 |
| | | | IndividualMaterialID 109044 | | | ProductInternalD 109046 |
| | | | TypeCode 109048 | | | BusinessObjectTypeCode 109050 |
| | | | MaintenancePlannerGroup-Code 109052 | | | MaintenancePlannerGroup-Code 109054 |

FIG. 109-3

| Package | level1 | level2 | level3 | level4 | level5 | Data Type Name |
|---|---|---|---|---|---|---|
| | | | ProcessingStatusCode 109056 | | | MaintenanceTaskListLifeCycleStatusCode 109058 |
| | | | InstallationPointDescription 109060 | | | SHORT_Description 109062 |
| | | | IndividualMaterialDescription 109064 | | | SHORT_Description 109066 |
| | | | MaterialDescription 109068 | | | SHORT_Description 109070 |
| | | | Description 109072 | | | SHORT_Description 109074 |
| Operation 109076 | | | Operation 109078 | | | ... |
| | | | | ID 109080 | | OperationID 109082 |

FIG. 109-4

| Package | level1 | level2 | level3 | level4 | level5 | Data Type Name |
|---|---|---|---|---|---|---|
| | | | | ActivityID 109084 | | OperationActivityID 109086 |
| | | | | MaintenanceWorkCentreID 109088 | | WorkCentreID 109090 |
| | | | | MaintenanceWorkCentre-PlantID 109092 | | PlantID 109094 |
| | | | | ControlProfileCode 109096 | | OperationControlProfileCode 109098 |
| | | | | PlannedDurationQuantity 109100 | | Quantity 109102 |
| | | | | PlannedWorkQuantity 109104 | | Quantity 109106 |
| | | | | Description 109108 | | SHORT_Description 109110 |

FIG. 109-5

| Package | level1 | level2 | level3 | level4 | level5 | Data Type Name |
|---|---|---|---|---|---|---|
| OperationRelationship 109112 | | | | Relationship 109114 | | ... |
| | | | | | OperationID 109116 | OperationID 109118 |
| | | | | | MaintenanceWorkCentreID 109120 | WorkCentreID 109122 |
| | | | | | MaintenanceWorkCentrePlantID 109124 | PlantID 109126 |
| | | | | | NetworkPlanElementSuccessionTypeCode 109128 | NetworkPlanElementSuccessionTypeCode 109130 |
| | | | | | LagDuration 109132 | LagDuration 109134 |
| | | | | | @actionCode 109136 | ActionCode 109138 |

FIG. 109-6

| Package | level1 | level2 | level3 | level4 | level5 | Data Type Name |
|---|---|---|---|---|---|---|
| MaterialInput 109140 | | | | MaterialInput 109142 | | ... |
| | | | | | MaterialInternalID 109144 | ProductInternalID 109146 |
| | | | | | RequiredQuantity 109148 | Quantity 109150 |
| | | | | | Description 109152 | SHORT_Description 109154 |
| ProcessingConditions 109156 | | | ProcessingConditions 109158 | | | ... |
| | | | | QueryHitsMaximumNumberValue 109160 | | NumberValue 109162 |
| | | | | UnlimitedQueryHitsIndicator 109164 | | Indicator 109166 |

FIG. 109-7

| Package | level1 | level2 | level3 | level4 | level5 | Data Type Name |
|---|---|---|---|---|---|---|
| | | | | ReturnedQueryHitsNumber-Value 109168 | | NumberValue 109170 |
| | | | | MoreElementsAvailableIndi-cator 109172 | | MoreElementsAvailableIndi-cator 109174 |
| | | | | LastProvidedMaintenan-ceTaskListID 109176 | | MaintenanceTaskListID 109178 |
| Log 109180 | | | Log 109182 | | | Log 109184 |

FIG. 110-1

| Package | level1 | level2 | level3 | Cardinality |
|---|---|---|---|---|
| MaintTskListERPSim-plElmntsQryMsg_s 110000 | MaintTskListERPSim-plElmntsQryMsg_s 110002 | | | |
| Selection 110004 | | MaintenanceTaskListSimpleSelectionByElements 110006 | | 1 110008 |
| | | | ProcessingStatusCode 110010 | 0..1 110012 |
| | | | MaintenanceTaskListID 110014 | 0..1 110016 |
| | | | InstallationPointID 110018 | 0..1 110020 |
| | | | IndividualMaterialID 110022 | 0..1 110024 |
| | | | MaintenanceTaskListGroupID 110026 | 0..1 110028 |

FIG. 110-2

| Package | level1 | level2 | level3 | Cardinality |
|---|---|---|---|---|
| | | | MaintenanceTaskListTypeCode 110030 | 0..1 110032 |
| ProcessingConditions 110034 | | ProcessingConditions 110036 | | 0..1 110038 |
| | | | QueryHitsMaximumNumberValue 110040 | 0..1 110042 |
| | | | UnlimitedQueryHitsIndicator 110044 | 0..1 110046 |
| | | | LastProvidedMaintenanceTaskListID 110048 | 0..1 110050 |

FIG. 111-1

| Package | level1 | level2 | level3 | Cardinality |
|---|---|---|---|---|
| MaintTskListERPSimplElmntsRspMsg_s 111000 | MaintTskListERPSimplElmntsRspMsg_s 111002 | | | |
| MaintenanceTaskList 111004 | | MaintenanceTaskList 111006 | | 0..n 111008 |
| | | | ID 111010 | 1 111012 |
| | | | GroupID 111014 | 1 111016 |
| | | | TypeCode 111018 | 1 111020 |
| | | | Description 111022 | 0..1 111024 |
| ProcessingConditions 111026 | | ProcessingConditions 111028 | | 1 111030 |

FIG. 111-2

| Package | level1 | level2 | level3 | Cardinality |
|---|---|---|---|---|
| | | | ReturnedQueryHitsNumberValue 111032 | 1 111034 |
| | | | MoreElementsAvailableIndicator 111036 | 1 111038 |
| | | | LastProvidedMaintenanceTaskListID 111040 | 0..1 111042 |
| Log 111044 | | Log 111046 | | 1 111048 |

FIG. 112

| Package | level1 | level2 | level3 | Cardinality |
|---|---|---|---|---|
| ParMaintTskListERPSimplBy-MaintTskListQryMsg_s 112000 | ParMaintTskListERPSimplBy-MaintTskListQryMsg_s 112002 | | | |
| Selection 112004 | | ParMaintenanceTaskListSimpleSe-lectionByMaintenanceTaskList 112006 | | 1 112008 |
| | | | MaintenanceTaskListID 112010 | 1 112012 |
| | | | MaintenanceTaskListGroupID 112014 | 1 112016 |
| | | | MaintenanceTaskListTypeCode 112018 | 1 112020 |
| | | | LevelNumberValue 112022 | 1 112024 |

FIG. 113-1

| Package | level1 | level2 | level3 | Cardinality |
|---|---|---|---|---|
| ParMaintTskListERPSimplBy-MaintTskListRspMsg_s 113000 | ParMaintTskListERPSimplBy-MaintTskListRspMsg_s 113002 | | | |
| MaintenanceTaskList 113004 | | MaintenanceTaskList 113006 | | 0..n 113008 |
| | | | ID 113010 | 1 113012 |
| | | | GroupID 113014 | 1 113016 |
| | | | TypeCode 113018 | 1 113020 |
| | | | LevelNumberValue 113022 | 1 113024 |
| | | | Description 113026 | 0..1 113028 |

FIG. 113-2

| Package | level1 | level2 | level3 | Cardinality |
|---|---|---|---|---|
| Log 113030 | | Log 113032 | | 1 113034 |

FIG. 114

| Package | level1 | level2 | level3 | Cardinality |
|---|---|---|---|---|
| SubordMaintTskListERP-SimplByMaintTskListQryMsg_s 114000 | SubordMaintTskListERP-SimplByMaintTskListQryMsg_s 114002 | | | |
| Selection 114004 | | SubordinateMaintenanceTaskListSimpleSelectionByMaintenanceTaskList 114006 | | 1 114008 |
| | | | MaintenanceTaskListID 114010 | 1 114012 |
| | | | MaintenanceTaskListGroupID 114014 | 1 114016 |
| | | | MaintenanceTaskListTypeCode 114018 | 1 114020 |
| | | | LevelNumberValue 114022 | 1 114024 |

FIG. 115-1

| Package | level1 | level2 | level3 | Cardinality |
|---|---|---|---|---|
| SubordMaintTskListERPSimplBy-MaintTskListRspMsg_s 115000 | SubordMaintTskListERPSimplBy-MaintTskListRspMsg_s 115002 | | | |
| MaintenanceTaskList 115004 | | MaintenanceTaskList 115006 | | 0..N 115008 |
| | | | ID 115010 | 1 115012 |
| | | | GroupID 115014 | 1 115016 |
| | | | TypeCode 115018 | 1 115020 |
| | | | LevelNumberValue 115022 | 1 115024 |
| | | | Description 115026 | 0..1 115028 |

FIG. 115-2

| Package | level1 | level2 | level3 | Cardinality |
|---|---|---|---|---|
| Log 115030 | | Log 115032 | | 1 115034 |

FIG. 116

| Package | level1 | level2 | level3 | Cardinality |
|---|---|---|---|---|
| TopLvlMaintTskListERP-SimplByMaintTskListQryMsg_s 116000 | TopLvlMaintTskListERP-SimplByMaintTskListQryMsg_s 116002 | | | |
| Selection 116004 | | TopLevelMaintenanceTaskListSimple-SelectionByMaintenanceTaskList 116006 | | 1 116008 |
| | | | MaintenanceTaskListID 116010 | 1 116012 |
| | | | MaintenanceTaskListGroupID 116014 | 1 116016 |
| | | | MaintenanceTaskListTypeCode 116018 | 1 116020 |

FIG. 117

| Package | level1 | level2 | level3 | Cardinality |
|---|---|---|---|---|
| TopLvlMaintTskListERPSimplBy-MaintTskListRspMsg_s 117000 | TopLvlMainTskListERPSimplBy-MaintTskListRspMsg_s 117002 | | | |
| MaintenanceTaskList 117004 | | MaintenanceTaskList 117006 | | 0..1 117008 |
| | | | ID 117010 | 1 117012 |
| | | | GroupID 117014 | 1 117016 |
| | | | TypeCode 117018 | 1 117020 |
| | | | Description 117022 | 0..1 117024 |
| Log 117026 | | Log 117028 | | 1 117030 |

FIG. 118

| Package | level1 | level2 | level3 | Cardinality |
|---|---|---|---|---|
| MaintTskListERPByIDAndGrpIDAndTypeCodeQryMsg_s 118000 | MaintTskListERPByIDAndGrpIDAndTypeCodeQryMsg_s 118002 | | | |
| Selection 118004 | | MaintenanceTaskListSelectionByIDAndGrpIDAndTypeCode 118006 | | 1 118008 |
| | | | MaintenanceTaskListID 118010 | 1 118012 |
| | | | MaintenanceTaskListGroupID 118014 | 1 118016 |
| | | | MaintenanceTaskListTypeCode 118018 | 1 118020 |

FIG. 119-1

| Package | level1 | level2 | level3 | level4 | level5 | Cardinality |
|---|---|---|---|---|---|---|
| MaintTskListERPByIDAndGrpIDAndTypeCodeRspMsg_s 119000 | MaintTskListERPByIDAndGrpIDAndTypeCodeRspMsg_s 119002 | | | | | |
| MaintenanceTaskList 119004 | | MaintenanceTaskList 119006 | | | | 0..1 119008 |
| | | | ID 119010 | | | 1 119012 |
| | | | GroupID 119014 | | | 1 119016 |
| | | | MaintenancePlanningPlantID 119018 | | | 1 119020 |
| | | | MaintenanceWorkCentreID 119022 | | | 0..1 119024 |
| | | | MaintenanceWorkCentrePlantID 119026 | | | 0..1 119028 |

FIG. 119-2

| Package | level1 | level2 | level3 | level4 | level5 | Cardinality |
|---|---|---|---|---|---|---|
| | | | MaterialInternalID 119030 | | | 0..1 119032 |
| | | | InstallationPointID 119034 | | | 0..1 119036 |
| | | | IndividualMaterialID 119038 | | | 0..1 119040 |
| | | | TypeCode 119042 | | | 1 119044 |
| | | | MaintenancePlannerGroupCode 119046 | | | 0..1 119048 |
| | | | ProcessingStatusCode 119050 | | | 1 119052 |
| | | | InstallationPointDescription 119054 | | | 0..1 119056 |

FIG. 119-3

| Package | level1 | level2 | level3 | level4 | level5 | Cardinality |
|---|---|---|---|---|---|---|
| | | | IndividualMaterialDescription 119058 | | | 0..1 119060 |
| | | | MaterialDescription 119062 | | | 0..1 119064 |
| | | | Description 119066 | | | 0..1 119068 |
| | | | Operation 119070 | | | 0..n 119072 |
| | | | | ID 119074 | | 1 119076 |
| | | | | ActivityID 119078 | | 0..1 119080 |
| | | | | MaintenanceWorkCen-treID 119082 | | 1 119084 |

FIG. 119-4

| Package | level1 | level2 | level3 | level4 | level5 | Cardinality |
|---|---|---|---|---|---|---|
| | | | | MaintenanceWorkCentre-PlantID 119086 | | 1 119088 |
| | | | | ControlProfileCode 119090 | | 1 119092 |
| | | | | PlannedDurationQuantity 119094 | | 0..1 119096 |
| | | | | PlannedWorkQuantity 119098 | | 0..1 119100 |
| | | | | Description 119102 | | 0..1 119104 |
| | | | | Relationship 119106 | | 0..n 119108 |
| | | | | | OperationID 119110 | 1 119112 |

FIG. 119-5

| Package | level1 | level2 | level3 | level4 | level5 | Cardinality |
|---|---|---|---|---|---|---|
| | | | | | MaintenanceWorkCentreID 119114 | 0..1 119116 |
| | | | | | MaintenanceWorkCentre-PlantID 119118 | 0..1 119120 |
| | | | | | NetworkPlanElementSuccessionTypeCode 119122 | 0..1 119124 |
| | | | | | LagDuration 119126 | 0..1 119128 |
| | | | | MaterialInput 119130 | | 0..n 119132 |
| | | | | | MaterialInternalID 119134 | 1 119136 |
| | | | | | RequiredQuantity 119138 | 1 119140 |

FIG. 119-6

| Package | level1 | level2 | level3 | level4 | level5 | Cardinality |
|---|---|---|---|---|---|---|
| | | | | | MaterialDescription 119142 | 0..1 119144 |
| Log 119146 | | Log 119148 | | | | 1 119150 |

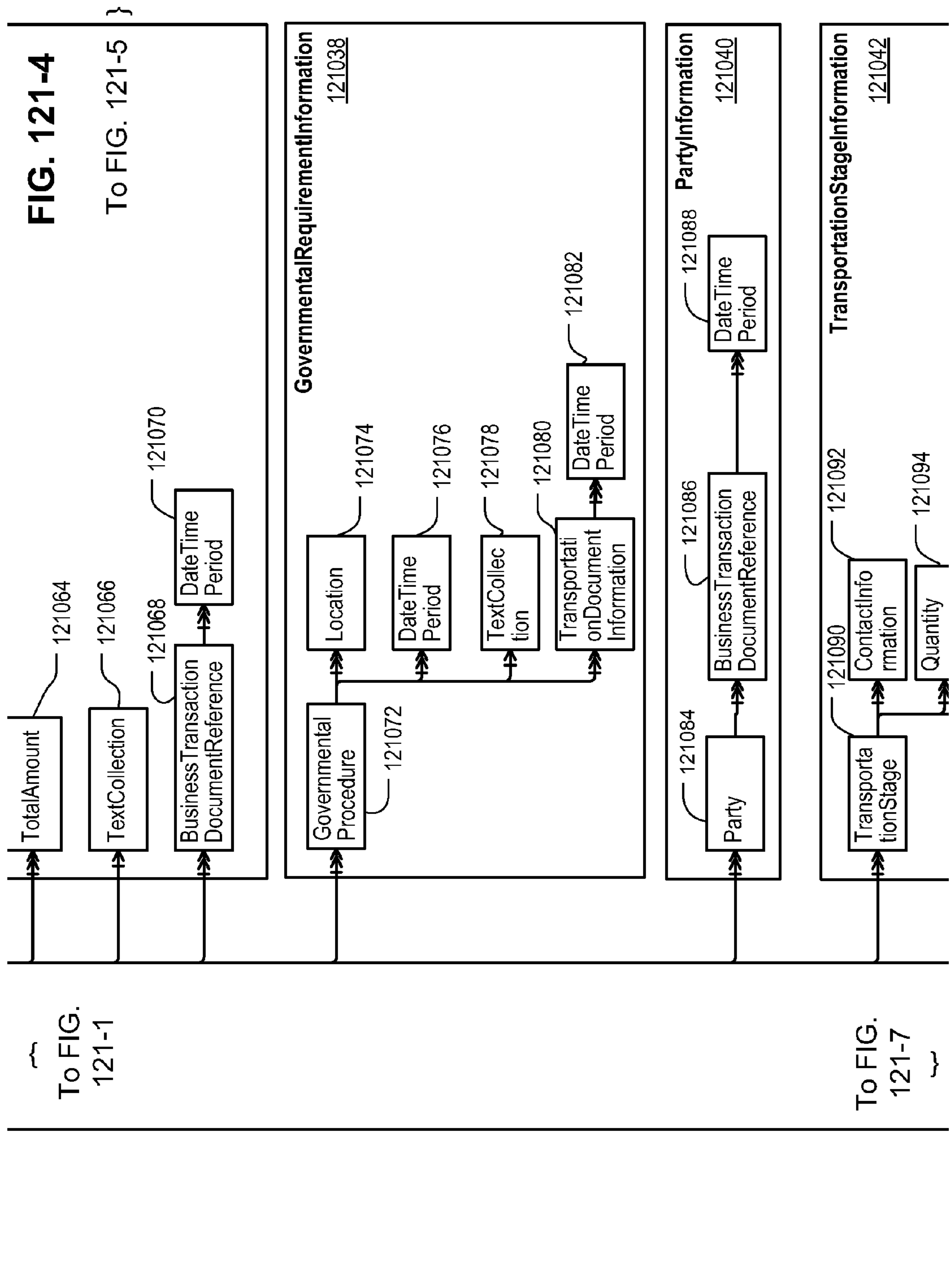
FIG. 121-4
To FIG. 121-5
To FIG. 121-1
To FIG. 121-7
TotalAmount
121064
TextCollection
121066
BusinessTransaction DocumentReference
121068
DateTime Period
121070
GovernmentalRequirementInformation
121038
Governmental Procedure
121072
Location
121074
DateTime Period
121076
TextCollec tion
121078
Transportati onDocument Information
121080
DateTime Period
121082
PartyInformation
121040
Party
121084
BusinessTransaction DocumentReference
121086
DateTime Period
121088
TransportationStageInformation
121042
Transporta tionStage
121090
ContactInfo rmation
121092
Quantity
121094

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| RequestForSupplierFreightQuoteRequestMessage 1230000 | RequestForSupplierFreightQuoteRequestMessage 1230002 | | | | | | | | | | RequestForSupplierFreightQuoteRequestMessage 1230004 |
| MessageHeader 1230006 | | MessageHeader 1230008 | | | | | | | | 1..1 1230010 | BusinessDocumentMessageHeader 1230012 |
| RequestForSupplierFreightQuote 1230014 | | RequestForSupplierFreightQuote 1230016 | | | | | | | | 1..1 1230018 | ... |
| | | | @actioncode 1230020 | | | | | | | 1..1 1230022 | ActionCode 1230024 |

FIG. 123-2

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | ID 1230026 | | | | | | | 1..1 1230028 | BusinessTransactionDocumentID 1230030 |
| HeaderInformation 1230032 | | | DateTimePeriods 1230034 | | | | | | | 0..n 1230036 | ... |
| | | | | Requested Fulfillment Period 1230038 | | | | | | 0..1 1230040 | DateTimePeriod 1230042 |
| | | | | Acceptable Fulfillment Period 1230044 | | | | | | 0..1 1230046 | DateTimePeriod 1230048 |
| | | | | PeriodRole Code 1230050 | | | | | | 1..1 1230052 | PeriodRoleCode 1230054 |
| | | | NatureOfCargo 1230056 | | | | | | | 0..n 1230058 | ... |

FIG. 123-3

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ClassificationCode 1230060 | | | | | | 1..1 1230062 | NatureOfCargoClassificationCode 1230064 |
| | | | TotalQuantity 1230066 | | | | | | | 0..n 1230068 | ... |
| | | | | Quantity 1230070 | | | | | | 1 1230072 | Quantity 1230074 |
| | | | | RoleCode 1230076 | | | | | | 0..1 1230078 | QuantityRoleCode 1230080 |
| | | | | TypeCode 1230082 | | | | | | 0..1 1230084 | QuantityTypeCode 1230086 |
| | | | TotalAmount 1230088 | | | | | | | 0..n 1230090 | ... |
| | | | | Amount 1230092 | | | | | | 1..1 1230094 | Amount 1230096 |

FIG. 123-4

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | RoleCode 1230098 | | | | | | 1..1 1230100 | AmountRoleCode 1230102 |
| | | | TextCollection 1230104 | | | | | | | 0..1 1230106 | ... |
| | | | | TextCollection 1230108 | | | | | | 1..1 1230110 | TextCollection 1230112 |
| | | | BusinessTransactionDocumentReference 1230114 | | | | | | | 0..n 1230116 | ... |
| | | | | BusinessTransactionDocumentReference 1230118 | | | | | | 0..1 1230120 | BusinessTransactionDocumentReference 1230122 |

FIG. 123-5

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | BusinessTransactionDocumentRelationshipRoleCode 1230124 | | | | | | 0..1 1230126 | BusinessTransactionDocumentRelationshipRoleCode 1230128 |
| | | | | BusinessTransactionDocumentRelationshipTypeCode 1230130 | | | | | | 0..1 1230132 | BusinessTransactionDocumentRelationshipTypeCode 1230134 |
| | | | | TransportationDocumentTypeCode 1230136 | | | | | | 0..1 1230138 | TransportationDocumentTypeCode 1230140 |
| | | | | TransportationDocumentNote 1230142 | | | | | | 0..1 1230144 | SHORT_Note 1230146 |

FIG. 123-6

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationDocumentID 1230148 | | | | | | 0..1 1230150 | TransportationDocumentID 1230152 |
| | | | | DateTimePeriod 1230154 | | | | | | 0..n 1230156 | ... |
| | | | | | DateTimePeriod 1230158 | | | | | 1..1 1230160 | DateTimePeriod 1230162 |
| | | | | | PeriodRoleCode 1230164 | | | | | 1..1 1230166 | PeriodRoleCode 1230168 |
| GovernmentalRequirementInformation 1230170 | | | GovernmentalProcedure 1230172 | | | | | | | 0..n 1230174 | ... |

FIG. 123-7

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationGovernmentAgencyTypeCode 1230176 | | | | | | 0..1 1230178 | TransportationGovernmentAgencyTypeCode 1230180 |
| | | | | TransportationMovementTypeCode 1230182 | | | | | | 0..1 1230184 | TransportationMovementTypeCode 1230186 |
| | | | | TransportationGovernmentAgencyInvolvementStatusCode 1230188 | | | | | | 0..1 1230190 | TransportationGovernmentAgencyInvolvementStatusCode 1230192 |

FIG. 123-8

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationGovernmentAgencyActionCode 1230194 | | | | | | 0..1 1230196 | TransportationGovernmentAgencyActionCode 1230198 |
| | | | | TransportationGovernmentAgencyProcedureStatusCode 1230200 | | | | | | 0..1 1230202 | TransportationGovernmentAgencyProcedureStatusCode 1230204 |
| | | | | Location 1230206 | | | | | | 0..n 1230208 | ... |
| | | | | | Location 1230210 | | | | | 1..1 1230212 | BusinessTransactionDocumentLocation 1230214 |
| | | | | | RoleCode 1230216 | | | | | 1..1 1230218 | LocationRoleCode 1230220 |

FIG. 123-9

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TypeCode 1230222 | | | | | 0..1 1230224 | LocationTypeCode 1230226 |
| | | | | | Name 1230228 | | | | | 0..1 1230230 | MEDIUM_Name 1230232 |
| | | | | DateTimePeriod 1230234 | | | | | | 0..n 1230236 | ... |
| | | | | | DateTimePeriod 1230238 | | | | | 1..1 1230240 | DateTimePeriod 1230242 |
| | | | | | PeriodRoleCode 1230244 | | | | | 1..1 1230246 | PeriodRoleCode 1230248 |
| | | | | TextCollection 1230250 | | | | | | 0..1 1230252 | ... |

FIG. 123-10

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TextCollection 1230254 | | | | | 1..1 1230256 | TextCollection 1230258 |
| | | | | TransportationDocumentInformation 1230260 | | | | | | 0..n 1230262 | ... |
| | | | | | TransportationDocumentTypeCode 1230264 | | | | | 0..1 1230266 | TransportationDocumentTypeCode 1230268 |
| | | | | | TransportationDocumentNote 1230270 | | | | | 0..1 1230272 | SHORT_Note 1230274 |
| | | | | | TransportationDocumentID 1230276 | | | | | 0..1 1230278 | TransportationDocumentID 1230280 |

FIG. 123-11

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentStatusCode 1230282 | | | | | 0..1 1230284 | TransportationDocumentStatusCode 1230286 |
| | | | | | LanguageCode 1230288 | | | | | 0..1 1230290 | LanguageCode 1230292 |
| | | | | | CommunicationMediumTypeCode 1230294 | | | | | 0..1 1230296 | CommunicationMediumTypeCode 1230298 |
| | | | | | RequiredIndicator 1230300 | | | | | 1 1230302 | Indicator 1230304 |
| | | | | | OutputCopyNumberValue 1230306 | | | | | 0..1 1230308 | NumberValue 1230310 |

FIG. 123-12

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OutputOriginalNumberValue 1230312 | | | | | 0..1 1230314 | NumberValue 1230316 |
| | | | | | DateTimePeriod 1230318 | | | | | 0..n 1230320 | ... |
| | | | | | | DateTimePeriod 1230322 | | | | 1..1 1230324 | DateTimePeriod 1230326 |
| | | | | | | PeriodRoleCode 1230328 | | | | 1..1 1230330 | PeriodRoleCode 1230332 |
| PartyInformation 1230334 | | | Party 1230336 | | | | | | | 0..n 1230338 | ... |
| | | | | Party 1230340 | | | | | | 1 1230342 | BusinessTransactionDocumentParty 1230344 |

FIG. 123-13

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | RoleCode 1230346 | | | | | | 1 1230348 | PartyRoleCode 1230350 |
| | | | | FormattedName 1230352 | | | | | | 0..1 1230354 | LONG_Name 1230356 |
| | | | | BusinessTransactionDocumentReference 1230358 | | | | | | 0..n 1230360 | ... |
| | | | | | BusinessTransactionDocumentReference 1230362 | | | | | 0..1 1230364 | BusinessTransactionDocumentReference 1230366 |

FIG. 123-14

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentRelationshipRoleCode 1230368 | | | | | 0..1 1230370 | BusinessTransactionDocumentRelationshipRoleCode 1230372 |
| | | | | | BusinessTransactionDocumentRelationshipTypeCode 1230374 | | | | | 0..1 1230376 | BusinessTransactionDocumentRelationshipTypeCode 1230378 |
| | | | | | TransportationDocumentTypeCode 1230380 | | | | | 0..1 1230382 | TransportationDocumentTypeCode 1230384 |
| | | | | | TransportationDocumentNote 1230386 | | | | | 0..1 1230388 | SHORT_Note 1230390 |

FIG. 123-15

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentID 1230392 | | | | | 0..1 1230394 | TransportationDocumentID 1230396 |
| | | | | | DateTimePeriod 1230398 | | | | | 0..n 1230400 | ... |
| | | | | | | DateTimePeriod 1230402 | | | | 1 1230404 | DateTimePeriod 1230406 |
| | | | | | | PeriodRoleCode 1230408 | | | | 1 1230410 | PeriodRoleCode 1230412 |
| TransportationStageInformation 1230414 | | | TransportationStage 1230416 | | | | | | | 0..n 1230418 | ... |
| | | | | ID 1230420 | | | | | | 1 1230422 | TransportationStageID 1230424 |

FIG. 123-16

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | OrdinalNumberValue 1230426 | | | | | | 0..1 1230428 | OrdinalNumberValue 1230430 |
| | | | | TypeCode 1230432 | | | | | | 0..1 1230434 | TransportationStageTypeCode 1230436 |
| | | | | JourneyID 1230438 | | | | | | 0..1 1230440 | JourneyID 1230442 |
| | | | | TransportModeCode 1230444 | | | | | | 0..1 1230446 | TransportModeCode 1230448 |
| | | | | TransportMeansDescriptionCode 1230450 | | | | | | 0..1 1230452 | TransportMeansDescriptionCode 1230454 |

FIG. 123-17

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportMeansDescription 1230456 | | | | | | 0..1 1230458 | SHORT_Description 1230460 |
| | | | | TransportMeansID 1230462 | | | | | | 0..1 1230464 | TransportMeansID 1230466 |
| | | | | TransportMeansHomeCountryCode 1230468 | | | | | | 0..1 1230470 | CountryCode 1230472 |
| | | | | TransportMeansOwnershipTypeCode 1230474 | | | | | | 0..1 1230476 | TransportMeansOwnershipTypeCode 1230478 |
| | | | | CarrierStandardID 1230480 | | | | | | 0..1 1230482 | PartyStandardID 1230484 |

FIG. 123-18

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | CarrierFormattedName 1230486 | | | | | | 0..1 1230488 | LONG_Name 1230490 |
| | | | | TransportationTransitDirectionCode 1230492 | | | | | | 0..1 1230494 | TransportationTransitDirectionCode 1230496 |
| | | | | CalculatedDistanceMeasure 1230498 | | | | | | 0..1 1230500 | Measure 1230502 |
| | | | | GivenDistanceMeasure 1230504 | | | | | | 0..1 1230506 | Measure 1230508 |
| | | | | ContactInformation 1230510 | | | | | | 0..n 1230512 | ... |

FIG. 123-19

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ContactPersonFunctionTypeCode 1230514 | | | | | 1..1 1230516 | ContactPersonFunctionTypeCode 1230518 |
| | | | | | Address 1230520 | | | | | 1..1 1230522 | Address 1230524 |
| | | | | Quantity 1230526 | | | | | | 0..n 1230528 | ... |
| | | | | | Quantity 1230530 | | | | | 1 1230532 | Quantity 1230534 |
| | | | | | RoleCode 1230536 | | | | | 0..1 1230538 | QuantityRoleCode 1230540 |
| | | | | | TypeCode 1230542 | | | | | 0..1 1230544 | QuantityTypeCode 1230546 |
| | | | | Party 1230548 | | | | | | 1..n 1230550 | ... |

FIG. 123-20

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | Party 1230552 | | | | | 1 1230554 | BusinessTransactionDocumentParty 1230556 |
| | | | | | RoleCode 1230558 | | | | | 1 1230560 | PartyRoleCode 1230562 |
| | | | | | FormattedName 1230564 | | | | | 0..1 1230566 | LONG_Name 1230568 |
| | | | | | TransportationDocumentInformation 1230570 | | | | | 0..n 1230572 | ... |
| | | | | | | TransportationDocumentTypeCode 1230574 | | | | 0..1 1230576 | TransportationDocumentTypeCode 1230578 |

FIG. 123-21

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentNote 1230580 | | | | 0..1 1230582 | SHORT_Note 1230584 |
| | | | | | | TransportationDocumentID 1230586 | | | | 0..1 1230588 | TransportationDocumentID 1230590 |
| | | | | | | TransportationDocumentStatusCode 1230592 | | | | 0..1 1230594 | TransportationDocumentStatusCode 1230596 |
| | | | | | | LanguageCode 1230598 | | | | 0..1 1230600 | LanguageCode 1230602 |
| | | | | | | CommunicationMediumTypeCode 1230604 | | | | 0..1 1230606 | CommunicationMediumTypeCode 1230608 |

FIG. 123-22

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RequiredIndicator 1230610 | | | | 1 1230612 | Indicator 1230614 |
| | | | | | | OutputCopyNumberValue 1230616 | | | | 0..1 1230618 | NumberValue 1230620 |
| | | | | | | OutputOriginalNumberValue 1230622 | | | | 0..1 1230624 | NumberValue 1230626 |
| | | | | | | DateTimePeriod 1230628 | | | | 0..n 1230630 | ... |
| | | | | | | | DateTimePeriod 1230632 | | | 1 1230634 | DateTimePeriod 1230636 |
| | | | | | | | PeriodRoleCode 1230638 | | | 1 1230640 | PeriodRoleCode 1230642 |

FIG. 123-23

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentReference 1230644 | | | | | 0..n 1230646 | ... |
| | | | | | | BusinessTransactionDocumentReference 1230648 | | | | 0..1 1230650 | BusinessTransactionDocumentReference 1230652 |
| | | | | | | BusinessTransactionDocumentRelationshipRoleCode 1230654 | | | | 0..1 1230656 | BusinessTransactionDocumentRelationshipRoleCode 1230658 |

FIG. 123-24

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentRelationshipTypeCode 1230660 | | | | 0..1 1230662 | BusinessTransactionDocumentRelationshipTypeCode 1230664 |
| | | | | | | TransportationDocumentTypeCode 1230666 | | | | 0..1 1230668 | TransportationDocumentTypeCode 1230670 |
| | | | | | | TransportationDocumentNote 1230672 | | | | 0..1 1230674 | SHORT_Note 1230676 |
| | | | | | | TransportationDocumentID 1230678 | | | | 0..1 1230680 | TransportationDocumentID 1230682 |

FIG. 123-25

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DateTimePeriod 1230684 | | | | 0..n 1230686 | ... |
| | | | | | | | DateTimePeriod 1230688 | | | 1..1 1230690 | DateTimePeriod 1230692 |
| | | | | | | | PeriodRoleCode 1230694 | | | 1..1 1230696 | PeriodRoleCode 1230698 |
| | | | | Location 1230700 | | | | | | 1..n 1230702 | ... |
| | | | | | Location 1230704 | | | | | 1 1230706 | BusinessTransactionDocumentLocation 1230708 |
| | | | | | RoleCode 1230710 | | | | | 1 1230712 | LocationRoleCode 1230714 |

FIG. 123-26

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TypeCode 1230716 | | | | | 0..1 1230718 | LocationTypeCode 1230720 |
| | | | | | Name 1230722 | | | | | 0..1 1230724 | MEDIUM_Name 1230726 |
| | | | | | DateTimePeriods 1230728 | | | | | 0..n 1230730 | ... |
| | | | | | | RequestDateTimePeriod 1230732 | | | | 0..1 1230734 | DateTimePeriod 1230736 |
| | | | | | | AcceptableDateTimePeriod 1230738 | | | | 0..1 1230740 | DateTimePeriod 1230742 |
| | | | | | | PeriodRoleCode 1230744 | | | | 1..1 1230746 | PeriodRoleCode 1230748 |

FIG. 123-27

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TextCollection 1230750 | | | | | | 0..1 1230752 | ... |
| | | | | | TextCollection 1230754 | | | | | 1..1 1230756 | TextCollection 1230758 |
| | | | | BusinessTransactionDocumentReference 1230760 | | | | | | 0..n 1230762 | ... |
| | | | | | BusinessTransactionDocumentReference 1230764 | | | | | 0..1 1230766 | BusinessTransactionDocumentReference 1230768 |

FIG. 123-28

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentRelationshipRoleCode 1230770 | | | | | 0..1 1230772 | BusinessTransactionDocumentRelationshipRoleCode 1230774 |
| | | | | | BusinessTransactionDocumentRelationshipTypeCode 1230776 | | | | | 0..1 1230778 | BusinessTransactionDocumentRelationshipTypeCode 1230780 |
| | | | | | TransportationDocumentTypeCode 1230782 | | | | | 0..1 1230784 | TransportationDocumentTypeCode 1230786 |
| | | | | | TransportationDocumentNote 1230788 | | | | | 0..1 1230790 | SHORT_Note 1230792 |

FIG. 123-29

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentID 1230794 | | | | | 0..1 1230796 | TransportationDocumentID 1230798 |
| | | | | | DateTimePeriod 1230800 | | | | | 0..n 1230802 | ... |
| | | | | | | DateTimePeriod 1230804 | | | | 1..1 1230806 | DateTimePeriod 1230808 |
| | | | | | | PeriodRoleCode 1230810 | | | | 1 1230812 | PeriodRoleCode 1230814 |
| | | | | TransportationServiceRequirement 1230816 | | | | | | 1..1 1230818 | ... |

FIG. 123-30

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationServiceRequirementCode 1230820 | | | | | 0..1 1230822 | TransportationServiceRequirementCode 1230824 |
| | | | | | AdditionalTransportationServiceRequirementCode 1230826 | | | | | 0..1 1230828 | TransportationServiceRequirementCode 1230830 |
| | | | | | TransportationContractConditionCode 1230832 | | | | | 0..1 1230834 | TransportationContractConditionCode 1230836 |
| | | | | | TransportServiceLevelCode 1230838 | | | | | 0..1 1230840 | TransportServiceLevelCode 1230842 |

FIG. 123-31

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | NatureOfCargoClassificationCode 1230844 | | | | | 0..1 1230846 | NatureOfCargoClassificationCode 1230848 |
| TransportationUnitResourceInformation 1230850 | | | TransportationUnitResourceInformation 1230852 | | | | | | | 0..n 1230854 | ... |
| | | | | ID 1230856 | | | | | | 1 1230858 | ResourceInformationID 1230860 |
| | | | | ResourceNumberValue 1230862 | | | | | | 0..1 1230864 | NumberValue 1230866 |
| | | | | ResourceID 1230868 | | | | | | 0..1 1230870 | ResourceID 1230872 |

FIG. 123-32

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ResourceHomeCountryCode 1230874 | | | | | | 0..1 1230876 | CountryCode 1230878 |
| | | | | TransportationUnitResourceCategoryCode 1230880 | | | | | | 0..1 1230882 | TransportationUnitResourceCategoryCode 1230884 |
| | | | | TransportationUnitResourceTypeCode 1230886 | | | | | | 0..1 1230888 | TransportationUnitResourceTypeCode 1230890 |
| | | | | FillLevelCode 1230892 | | | | | | 0..1 1230894 | FillLevelCode 1230896 |
| | | | | ShippingTypeCode 1230898 | | | | | | 0..1 1230900 | ShippingTypeCode 1230902 |

FIG. 123-33

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | HaulageArrangerCode 1230904 | | | | | | 0..1 1230906 | HaulageArrangerCode 1230908 |
| | | | | TransportationHandlingInstructionCode 1230910 | | | | | | 0..1 1230912 | TransportationHandlingInstructionCode 1230914 |
| | | | | TransportationHandlingInstructionNote 1230916 | | | | | | 0..1 1230918 | LONG_Note 1230920 |
| | | | | TransportationStageAssignment 1230922 | | | | | | 0..n 1230924 | ... |

FIG. 123-34

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RequestForSupplierFreightQuoteTransportationStageID 1230926 | | | | | 1..1 1230928 | TransportationStageID 1230930 |
| | | | | AttachedEquipment 1230932 | | | | | | 0..n 1230934 | ... |
| | | | | | RequestForSupplierFreightQuoteTransportationUnitResourceInformationID 1230936 | | | | | 1..1 1230938 | ResourceID 1230940 |
| | | | | Quantity 1230942 | | | | | | 0..n 1230944 | ... |
| | | | | | Quantity 1230946 | | | | | 1 1230948 | Quantity 1230950 |

FIG. 123-35

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RoleCode 1230952 | | | | | 0..1 1230954 | QuantityRoleCode 1230956 |
| | | | | | TypeCode 1230958 | | | | | 0..1 1230960 | QuantityTypeCode 1230962 |
| | | | | BusinessTransactionDocumentReference 1230964 | | | | | | 0..n 1230966 | ... |
| | | | | | BusinessTransactionDocumentReference 1230968 | | | | | 0..1 1230970 | BusinessTransactionDocumentReference 1230972 |

FIG. 123-36

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentRelationshipRoleCode 1230974 | | | | | 0..1 1230976 | BusinessTransactionDocumentRelationshipRoleCode 1230978 |
| | | | | | BusinessTransactionDocumentRelationshipTypeCode 1230980 | | | | | 0..1 1230982 | BusinessTransactionDocumentRelationshipTypeCode 1230984 |
| | | | | | TransportationDocumentTypeCode 1230986 | | | | | 0..1 1230988 | TransportationDocumentTypeCode 1230990 |
| | | | | | TransportationDocumentNote 1230992 | | | | | 0..1 1230994 | SHORT_Note 1230996 |

FIG. 123-37

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentID 1230998 | | | | | 0..1 1231000 | TransportationDocumentID 1231002 |
| | | | | | DateTimePeriod 1231004 | | | | | 0..n 1231006 | ... |
| | | | | | | DateTimePeriod 1231008 | | | | 1..1 1231010 | DateTimePeriod 1231012 |
| | | | | | | PeriodRoleCode 1231014 | | | | 1..1 1231016 | PeriodRoleCode 1231018 |
| | | | | TextCollection 1231020 | | | | | | 0..1 1231022 | ... |
| | | | | | TextCollection 1231024 | | | | | 1..1 1231026 | TextCollection 1231028 |

FIG. 123-38

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Party 1231030 | | | | | | 1..n 1231032 | ... |
| | | | | | Party 1231034 | | | | | 1..1 1231036 | BusinessTransactionDocumentParty 1231038 |
| | | | | | RoleCode 1231040 | | | | | 1..1 1231042 | PartyRoleCode 1231044 |
| | | | | Location 1231046 | | | | | | 0..n 1231048 | ... |
| | | | | | Location 1231050 | | | | | 1 1231052 | BusinessTransactionDocumentLocation 1231054 |
| | | | | | RoleCode 1231056 | | | | | 1 1231058 | LocationRoleCode 1231060 |

FIG. 123-39

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TypeCode 1231062 | | | | | 0..1 1231064 | LocationTypeCode 1231066 |
| | | | | | Name 1231068 | | | | | 0..1 1231070 | MEDIUM_Name 1231072 |
| | | | | | DateTimePeriods 1231074 | | | | | 0..n 1231076 | ... |
| | | | | | | RequestDateTimePeriod 1231078 | | | | 0..1 1231080 | DateTimePeriod 1231082 |
| | | | | | | AcceptableDateTimePeriod 1231084 | | | | 0..1 1231086 | DateTimePeriod 1231088 |
| | | | | | | PeriodRoleCode 1231090 | | | | 1..1 1231092 | PeriodRoleCode 1231094 |

FIG. 123-40

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Dangerous Goods 1231096 | | | | | | 0..n 1231098 | ... |
| | | | | | ID 1231100 | | | | | 0..1 1231102 | DangerousGoodsID 1231104 |
| | | | | | RegulationsCode 1231106 | | | | | 0..1 1231108 | DangerousGoodsRegulationsCode 1231110 |
| | | | | | HazardCode 1231112 | | | | | 0..1 1231114 | DangerousGoodsHazardCode 1231116 |
| | | | | | Flashpoint MeasureInterval 1231118 | | | | | 0..1 1231120 | MeasureInterval 1231122 |

FIG. 123-41

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PackagingGroupCode 1231124 | | | | | 0..1 1231126 | DangerousGoodsPackagingGroupCode 1231128 |
| | | | | | EmergencySchedule 1231130 | | | | | 0..1 1231132 | DangerousGoodsEmergencySchedule 1231134 |
| | | | | | TransportEmergencyCardCode 1231136 | | | | | 0..1 1231138 | TransportEmergencyCardCode 1231140 |
| | | | | | DangerousGoodsLabelCode 1231142 | | | | | 0..1 1231144 | DangerousGoodsLabelCode 1231146 |
| | | | | | DangerousGoodsLabelCode2 1231148 | | | | | 0..1 1231150 | DangerousGoodsLabelCode 1231152 |

FIG. 123-42

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | DangerousGoodsLabelCode3 1231154 | | | | | 0..1 1231156 | DangerousGoodsLabelCode 1231158 |
| | | | | | PackagingInstructionTypeCode 1231160 | | | | | 0..1 1231162 | PackagingInstructionTypeCode 1231164 |
| | | | | | TransportMeansDescriptionCode 1231166 | | | | | 0..1 1231168 | TransportMeansDescriptionCode 1231170 |
| | | | | | TransportationAuthorisationCode 1231172 | | | | | 0..1 1231174 | DangerousGoodsTransportationAuthorisationCode 1231176 |
| | | | | | ContactInformation 1231178 | | | | | 0..n 1231180 | ... |

FIG. 123-43

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | ContactPersonFunctionTypeCode 1231182 | | | | 1..1 1231184 | ContactPersonFunctionTypeCode 1231186 |
| | | | | | | Address 1231188 | | | | 1..1 1231190 | Address 1231192 |
| | | | | | TextCollection 1231194 | | | | | 0..1 1231196 | ... |
| | | | | | | TextCollection 1231198 | | | | 1..1 1231200 | TextCollection 1231202 |
| TransportationChargesInformation 1231204 | | | TransportationChargesInformation 1231206 | | | | | | | 0..n 1231208 | ... |

FIG. 123-44

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationChargesUsageCode 1231210 | | | | | | 1..1 1231212 | TransportationChargesUsageCode 1231214 |
| | | | | RequestForSupplierFreightQuotePartyStandardID 1231216 | | | | | | 0..1 1231218 | PartyStandardID 1231220 |
| | | | | RequestForSupplierFreightQuotePartyInternalID 1231222 | | | | | | 0..1 1231224 | PartyInternalID 1231226 |

FIG. 123-45

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | RequestForSupplierFreightQuoteTransportationUnitResourceID 1231228 | | | | | | 0..1 1231230 | ResourceID 1231232 |
| | | | | RequestForSupplierFreightQuoteTransportationStageID 1231234 | | | | | | 0..1 1231236 | TransportationStageID 1231238 |
| | | | | TransportationCharges 1231240 | | | | | | 0..1 1231242 | ... |
| | | | | | ID 1231244 | | | | | 1 1231246 | TransportationChargesID 1231248 |

FIG. 123-46

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | FreightAgreementID 1231250 | | | | | 1 1231252 | FreightAgreementID 1231254 |
| | | | | | OriginCode 1231256 | | | | | 0..1 1231258 | TransportationChargesOriginCode 1231260 |
| | | | | | TariffID 1231262 | | | | | 0..1 1231264 | TransportationChargesTariffID 1231266 |
| | | | | | CalculationSheetID 1231268 | | | | | 1 1231270 | TransportationChargesCalculationSheetID 1231272 |
| | | | | | Location 1231274 | | | | | 0..n 1231276 | ... |

FIG. 123-47

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Location 1231278 | | | | 1 1231280 | BusinessTransactionDocumentLocation 1231282 |
| | | | | | | RoleCode 1231284 | | | | 1 1231286 | LoactionRoleCode 1231288 |
| | | | | | | TypeCode 1231290 | | | | 0..1 1231292 | LocationTypeCode 1231294 |
| | | | | | | Name 1231296 | | | | 0..1 1231298 | MEDIUM_Name 1231300 |
| | | | | | | DateTimePeriods 1231302 | | | | 0..n 1231304 | ... |
| | | | | | | | Requested Fulfillment Period 1231306 | | | 0..1 1231308 | DateTimePeriod 1231310 |

FIG. 123-48

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AcceptableFulfillmentPeriod 1231312 | | | 0..1 1231314 | DateTimePeriod 1231316 |
| | | | | | | | PeriodRoleCode 1231318 | | | 1 1231320 | PeriodRoleCode 1231322 |
| | | | | | TextCollection 1231324 | | | | | 0..1 1231326 | ... |
| | | | | | | TextCollection 1231328 | | | | 1..1 1231330 | TextCollection 1231332 |
| | | | | | Currency 1231334 | | | | | 0..n 1231336 | ... |
| | | | | | | Code 1231338 | | | | 1..1 1231340 | CurrencyCode 1231342 |

FIG. 123-49

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RoleCode 1231344 | | | | 1..1 1231346 | CurrencyRoleCode 1231348 |
| | | | | | | UsageCode 1231350 | | | | 0..1 1231352 | CurrencyUsageCode 1231354 |
| | | | | | Exchange Rate 1231356 | | | | | 0..n 1231358 | ... |
| | | | | | | Exchange Rate 1231360 | | | | 1..1 1231362 | ExchangeRate 1231364 |
| | | | | | | TypeCode 1231366 | | | | 0..1 1231368 | ExchangeRateTypeCode 1231370 |
| | | | | | PercentElement 1231372 | | | | | 0..n 1231374 | ... |

FIG. 123-50

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | PercentRoleCode 1231376 | | | | 1 1231378 | PercentRoleCode 1231380 |
| | | | | | | Percent 1231382 | | | | 1 1231384 | Percent 1231386 |
| | | | | | | TransportationChargesPercentCalculationBaseCode 1231388 | | | | 0..1 1231390 | TransportationChargesPercentCalculationBaseCode 1231392 |
| | | | | | | StatusCode 1231394 | | | | 0..1 1231396 | TransportationChargesPercentElementStatusCode 1231398 |
| | | | | | DateTimePeriod 1231400 | | | | | 0..n 1231402 | ... |

FIG. 123-51

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DateTimePeriod 1231404 | | | | 1..1 1231406 | DateTimePeriod 1231408 |
| | | | | | | PeriodRoleCode 1231410 | | | | 1..1 1231412 | PeriodRoleCode 1231414 |
| | | | | | BusinessTransactionDocumentReference 1231416 | | | | | 0..n 1231418 | ... |
| | | | | | | BusinessTransactionDocumentReference 1231420 | | | | 0..1 1231422 | BusinessTransactionDocumentReference 1231424 |

FIG. 123-52

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentRelationshipRoleCode 1231426 | | | | 0..1 1231428 | BusinessTransactionDocumentRelationshipRoleCode 1231430 |
| | | | | | | BusinessTransactionDocumentRelationshipTypeCode 1231432 | | | | 0..1 1231434 | BusinessTransactionDocumentRelationshipTypeCode 1231436 |
| | | | | | | TransportationDocumentTypeCode 1231438 | | | | 0..1 1231440 | TransportationDocumentTypeCode 1231442 |
| | | | | | | TransportationDocumentNote 1231444 | | | | 0..1 1231446 | SHORT_Note 1231448 |

FIG. 123-53

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentID 1231450 | | | | 0..1 1231452 | TransportationDocumentID 1231454 |
| | | | | | TaxDetail 1231456 | | | | | 0..n 1231458 | ... |
| | | | | | | ProductTax 1231460 | | | | 1..1 1231462 | ProductTax 1231464 |
| | | | | | PaymentInstruction 1231466 | | | | | 0..n 1231468 | ... |
| | | | | | | PaymentInstruction 1231470 | | | | 1 1231472 | PaymentInstruction 1231474 |
| | | | | | | TransportationChargeElementCategoryCode 1231476 | | | | 0..1 1231478 | TransportationChargesElementCategoryCode 1231480 |

FIG. 123-54

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationChargesElementSubCategoryCode 1231482 | | | | 0..1 1231484 | TransportationChargesElementSubCategoryCode 1231486 |
| | | | | | | TransportationChargesPaymentArrangementCode 1231488 | | | | 0..1 1231490 | TransportationChargesPaymentArrangementCode 1231492 |
| | | | | | CashDiscountTerms 1231494 | | | | | 0..1 1231496 | ... |
| | | | | | | CashDiscountTerms 1231498 | | | | 1 1231500 | CashDiscountTerms 1231502 |

FIG. 123-55

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationChargesElementCategoryCode 1231504 | | | | 0..1 1231506 | TransportationChargesElementCategoryCode 1231508 |
| | | | | | | TransportationChargesElementSubCategoryCode 1231510 | | | | 0..1 1231512 | TransportationChargesElementSubCategoryCode 1231514 |
| | | | | | Element 1231516 | | | | | 0..n 1231518 | ... |
| | | | | | | CategoryCode 1231520 | | | | 1 1231522 | TransportationChargesElementCategoryCode 1231524 |

FIG. 123-56

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | SubCategoryCode 1231526 | | | | 1 1231528 | TransportationChargesElementSubCategoryCode 1231530 |
| | | | | | | TypeCode 1231532 | | | | 1 1231534 | TransportationChargesElementTypeCode 1231536 |
| | | | | | | Calculation Resolution Code 1231538 | | | | 1 1231540 | TransportationChargesElementCalculationResolution Code 1231542 |
| | | | | | | TransportationChargesPaymentArrangement Code 1231544 | | | | 0…1 1231546 | TransportationChargesPaymentArrangementCode 1231548 |

FIG. 123-57

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Location 1231550 | | | | 0..n 1231552 | ... |
| | | | | | | | Location 1231554 | | | 1 1231556 | BusinessTransactionDocumentLocation 1231558 |
| | | | | | | | RoleCode 1231560 | | | 1 1231562 | LocationRoleCode 1231564 |
| | | | | | | | TypeCode 1231566 | | | 0..1 1231568 | LocationTypeCode 1231570 |
| | | | | | | | Name 1231572 | | | 0..1 1231574 | MEDIUM_Name 1231576 |
| | | | | | | | DateTimePeriods 1231578 | | | 0..n 1231580 | ... |

FIG. 123-58

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Requested Fulfillment Period 1231582 | | 0..1 1231584 | DateTimePeriod 1231586 |
| | | | | | | | | Acceptable Fulfillment Period 1231588 | | 0..1 1231590 | DateTimePeriod 1231592 |
| | | | | | | | | PeriodRoleCode 1231594 | | 1 1231596 | PeriodRoleCode 1231598 |
| | | | | | | TextCollection 1231600 | | | | 0..1 1231602 | ... |
| | | | | | | | TextCollection 1231604 | | | 1..1 1231606 | TextCollection 1231608 |
| | | | | | | Currency 1231610 | | | | 0..n 1231612 | ... |

FIG. 123-59

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Code 1231614 | | | 1..1 1231616 | CurrencyCode 1231618 |
| | | | | | | | RoleCode 1231620 | | | 1..1 1231622 | CurrencyRoleCode 1231624 |
| | | | | | | | UsageCode 1231626 | | | 0..1 1231628 | CurrencyUsageCode 1231630 |
| | | | | | | RateElement 1231632 | | | | 0..n 1231634 | ... |
| | | | | | | | ID 1231636 | | | 1 1231638 | TransportationChargesElementRateElementID 1231640 |
| | | | | | | | Amount 1231642 | | | 1 1231644 | Amount 1231646 |

FIG. 123-60

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | BaseQuantity 1231648 | | | 1 1231650 | Quantity 1231652 |
| | | | | | | | TransportationChargesRateTypeCode 1231654 | | | 0..1 1231656 | TransportationChargesRateTypeCode 1231658 |
| | | | | | | | TransportationChargesRateRoleCode 1231660 | | | 1 1231662 | TransportationChargesRateRoleCode 1231664 |
| | | | | | | | TransportationChargesRateElementStatusCode 1231666 | | | 0..1 1231668 | TransportationChargesRateElementStatusCode 1231670 |
| | | | | | | PercentElement 1231672 | | | | 0..n 1231674 | ... |

FIG. 123-61

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | PercentRoleCode 1231676 | | | 1 1231678 | PercentRoleCode 1231680 |
| | | | | | | | Percent 1231682 | | | 1 1231684 | Percent 1231686 |
| | | | | | | | TransportationChargesPercentCalculationBaseCode 1231688 | | | 0..1 1231690 | TransportationChargesPercentCalculationBaseCode 1231692 |
| | | | | | | | StatusCode 1231694 | | | 0..1 1231696 | TransportationChargesPercentElementStatusCode 1231698 |
| | | | | | | AmountElement 1231700 | | | | 0..n 1231702 | ... |
| | | | | | | | Amount 1231704 | | | 1 1231706 | Amount 1231708 |

FIG. 123-62

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AmountRoleCode 1231710 | | | 1 1231712 | AmountRoleCode 1231714 |
| | | | | | | | TransportationChargesAmountElementStatusCode 1231716 | | | 0..1 1231718 | TransportationChargesAmountElementStatusCode 1231720 |
| | | | | | | | RateDetailAssignment 1231722 | | | 0..n 1231724 | ... |
| | | | | | | | | TransportationChargeRateDetailID 1231726 | | 1 1231728 | TransportationChargesElementRateElementID 1231730 |
| | | | | | | CalculationBase 1231732 | | | | 0..n 1231734 | ... |

FIG. 123-63

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationChargesElementCalculationBaseCode 1231736 | | | 1 1231738 | TransportationChargesElementCalculationBaseCode 1231740 |
| | | | | | | | BaseQuantity 1231742 | | | 0..1 1231744 | Quantity 1231746 |
| | | | | | | | BaseQuantityRoleCode 1231748 | | | 0..1 1231750 | QuantityRoleCode 1231752 |
| | | | | | | | BaseQuantityTypeCode 1231754 | | | 0..1 1231756 | QuantityTypeCode 1231758 |
| | | | | | | TaxDetail 1231760 | | | | 0..n 1231762 | ... |

FIG. 123-64

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | ProductTax 1231764 | | | 1..1 1231766 | ProductTax 1231768 |
| | | | | | | DateTimePeriod 1231770 | | | | 0..n 1231772 | ... |
| | | | | | | | DateTimePeriod 1231774 | | | 1..1 1231776 | DateTimePeriod 1231778 |
| | | | | | | | PeriodRoleCode 1231780 | | | 1..1 1231782 | PeriodRoleCode 1231784 |
| | | | | | | CostDistribution 1231786 | | | | 0..n 1231788 | ... |
| | | | | | | | AccountingCodingBlockAssignment 1231790 | | | 1..1 1231792 | AccountingCodingBlockAssignment 1231794 |

FIG. 123-65

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| RequestForSupplierShipmentQuote 1231796 | | | RequestForSupplierShipmentQuote 1231798 | | | | | | | 0..n 1231800 | ... |
| | | | | ID 1231802 | | | | | | 1..1 1231804 | BusinessTransactionDocumentID 1231806 |
| | | | | DeliveryTerms 1231808 | | | | | | 0..1 1231810 | DeliveryTerms 1231812 |
| RequestForSupplierFreightQuoteAssignmentInformation 1231814 | | | | TransportationStageAssignment 1231816 | | | | | | 0..n 1231818 | ... |
| | | | | | RequestForSupplierFreightQuoteTransportationStageID 1231820 | | | | | 1..1 1231822 | TransportationStageID 1231824 |

FIG. 123-66

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationUnitResourceInformationAssignment 1231826 | | | | | | 0..n 1231828 | ... |
| | | | | | RequestForSupplierFreightQuoteTransportationUnitResourceInformationID 1231830 | | | | | 1..1 1231832 | TransportationUnitResourceID 1231834 |
| HeaderInformation 1231836 | | | | DateTimePeriods 1231838 | | | | | | 0..n 1231840 | ... |
| | | | | | Requested Fulfillment Period 1231842 | | | | | 0..1 1231844 | DateTimePeriod 1231846 |

FIG. 123-67

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | AcceptableFulfillmentPeriod 1231848 | | | | | 0..1 1231850 | DateTimePeriod 1231852 |
| | | | | | PeriodRoleCode 1231854 | | | | | 1 1231856 | PeriodRoleCode 1231858 |
| | | | | NatureOfCargo 1231860 | | | | | | 0..n 1231862 | ... |
| | | | | | ClassificationCode 1231864 | | | | | 1 1231866 | NatureOfCargoClassificationCode 1231868 |
| | | | | TotalQuantity 1231870 | | | | | | 0..n 1231872 | ... |
| | | | | | Quantity 1231874 | | | | | 1 1231876 | Quantity 1231878 |

FIG. 123-68

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RoleCode 1231880 | | | | | 0..1 1231882 | QuantityRoleCode 1231884 |
| | | | | | TypeCode 1231886 | | | | | 0..1 1231888 | QuantityTypeCode 1231890 |
| | | | | TotalAmount 1231892 | | | | | | 0..n 1231894 | ... |
| | | | | | Amount 1231896 | | | | | 1 1231898 | Amount 1231900 |
| | | | | | RoleCode 1231902 | | | | | 1 1231904 | AmountRoleCode 1231906 |
| | | | | TextCollection 1231908 | | | | | | 0..1 1231910 | ... |
| | | | | | TextCollection 1231912 | | | | | 1 1231914 | TextCollection 1231916 |

FIG. 123-69

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationServiceRequirement 1231918 | | | | | | 0..n 1231920 | ... |
| | | | | | TransportationServiceRequirementCode 1231922 | | | | | 0..1 1231924 | TransportationServiceRequirementCode 1231926 |
| | | | | | AdditionalTransportationServiceRequirementCode 1231928 | | | | | 0..1 1231930 | TransportationServiceRequirementCode 1231932 |
| | | | | | TransportationContractConditionCode 1231934 | | | | | 0..1 1231936 | TransportationContractConditionCode 1231938 |

FIG. 123-70

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportServiceLevelCode 1231940 | | | | | 0..1 1231942 | TransportServiceLevelCode 1231944 |
| | | | | | NatureOfCargoClassificationCode 1231946 | | | | | 0..1 1231948 | NatureOfCargoClassificationCode 1231950 |
| | | | | TransportationDocumentInformation 1231952 | | | | | | 0..n 1231954 | ... |
| | | | | | TransportationDocumentTypeCode 1231956 | | | | | 0..1 1231958 | TransportationDocumentTypeCode 1231960 |

FIG. 123-71

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentNote 1231962 | | | | | 0..1 1231964 | SHORT_Note 1231966 |
| | | | | | TransportationDocumentID 1231968 | | | | | 0..1 1231970 | TransportationDocumentID 1231972 |
| | | | | | TransportationDocumentStatusCode 1231974 | | | | | 0..1 1231976 | TransportationDocumentStatusCode 1231978 |
| | | | | | LanguageCode 1231980 | | | | | 0..1 1231982 | LanguageCode 1231984 |
| | | | | | CommunicationMediumTypeCode 1231986 | | | | | 0..1 1231988 | CommunicationMediumTypeCode 1231990 |

FIG. 123-72

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RequiredIndicator 1231992 | | | | | 1 1231994 | Indicator 1231996 |
| | | | | | OutputCopyNumberValue 1231998 | | | | | 0..1 1232000 | NumberValue 1232002 |
| | | | | | OutputOriginalNumberValue 1232004 | | | | | 0..1 1232006 | NumberValue 1232008 |
| | | | | | DateTimePeriod 1232010 | | | | | 0..n 1232012 | ... |
| | | | | | | DateTimePeriod 1232014 | | | | 1 1232016 | DateTimePeriod 1232018 |
| | | | | | | PeriodRoleCode 1232020 | | | | 1 1232022 | PeriodRoleCode 1232024 |

FIG. 123-73

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | BusinessTransactionDocumentReference 1232026 | | | | | | 0..n 1232028 | ... |
| | | | | | BusinessTransactionDocumentReference 1232030 | | | | | 0..1 1232032 | BusinessTransactionDocumentReference 1232034 |
| | | | | | BusinessTransactionDocumentRelationshipRoleCode 1232036 | | | | | 0..1 1232038 | BusinessTransactionDocumentRelationshipRoleCode 1232040 |

FIG. 123-74

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentRelationshipTypeCode 1232042 | | | | | 0..1 1232044 | BusinessTransactionDocumentRelationshipTypeCode 1232046 |
| | | | | | TransportationDocumentTypeCode 1232048 | | | | | 0..1 1232050 | TransportationDocumentTypeCode 1232052 |
| | | | | | TransportationDocumentNote 1232054 | | | | | 0..1 1232056 | SHORT_Note 1232058 |
| | | | | | TransportationDocumentID 1232060 | | | | | 0..1 1232062 | TransportationDocumentID 1232064 |

FIG. 123-75

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | DateTimePeriod 1232066 | | | | | 0..n 1232068 | ... |
| | | | | | | DateTimePeriod 1232070 | | | | 1 1232072 | DateTimePeriod 1232074 |
| | | | | | | PeriodRoleCode 1232076 | | | | 1 1232078 | PeriodRoleCode 1232080 |
| GovernmentalRequirementInformation 1232082 | | | | GovernmentalProcedure 1232084 | | | | | | 0..n 1232086 | ... |
| | | | | | TransportationGovernmentAgencyTypeCode 1232088 | | | | | 0..1 1232090 | TransportationGovernmentAgencyTypeCode 1232092 |

FIG. 123-76

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationMovementTypeCode 1232094 | | | | | 0..1 1232096 | TransportationMovementTypeCode 1232098 |
| | | | | | TransportationGovernmentAgencyInvolvementStatusCode 1232100 | | | | | 0..1 1232102 | TransportationGovernmentAgencyInvolvementStatusCode 1232104 |
| | | | | | TransportationGovernmentAgencyActionCode 1232106 | | | | | 0..1 1232108 | TransportationGovernmentAgencyActionCode 1232110 |

FIG. 123-77

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationGovernmentAgencyProcedureStatusCode 1232112 | | | | | 0..1 1232114 | TransportationGovernmentAgencyProcedureStatusCode 1232116 |
| | | | | | Location 1232118 | | | | | 0..n 1232120 | ... |
| | | | | | | Location 1232122 | | | | 1 1232124 | BusinessTransactionDocumentLocation 1232126 |
| | | | | | | RoleCode 1232128 | | | | 1 1232130 | LocationRoleCode 1232132 |
| | | | | | | TypeCode 1232134 | | | | 0..1 1232136 | LocationTypeCode 1232138 |

FIG. 123-78

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Name 1232140 | | | | 0..1 1232142 | MEDIUM_Name 1232144 |
| | | | | | DateTimePeriod 1232146 | | | | | 0..n 1232148 | ... |
| | | | | | | DateTimePeriod 1232150 | | | | 1 1232152 | DateTimePeriod 1232154 |
| | | | | | | PeriodRoleCode 1232156 | | | | 1 1232158 | PeriodRoleCode 1232160 |
| | | | | | TextCollection 1232162 | | | | | 0..1 1232164 | ... |
| | | | | | | TextCollection 1232166 | | | | 1 1232168 | TextCollection 1232170 |

FIG. 123-79

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentInformation 1232172 | | | | | 0..n 1232174 | ... |
| | | | | | | TransportationDocumentTypeCode 1232176 | | | | 0..1 1232178 | TransportationDocumentTypeCode 1232180 |
| | | | | | | TransportationDocumentNote 1232182 | | | | 0..1 1232184 | SHORT_Note 1232186 |
| | | | | | | TransportationDocumentID 1232188 | | | | 0..1 1232190 | TransportationDocumentID 1232192 |

FIG. 123-80

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentStatusCode 1232194 | | | | 0..1 1232196 | TransportationDocumentStatusCode 1232198 |
| | | | | | | LanguageCode 1232200 | | | | 0..1 1232202 | LanguageCode 1232204 |
| | | | | | | CommunicationMediumTypeCode 1232206 | | | | 0..1 1232208 | CommunicationMediumTypeCode 1232210 |
| | | | | | | RequiredIndicator 1232212 | | | | 1 1232214 | Indicator 1232216 |
| | | | | | | OutputCopyNumberValue 1232218 | | | | 0..1 1232220 | NumberValue 1232222 |

FIG. 123-81

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OutputOriginalNumberValue 1232224 | | | | 0..1 1232226 | NumberValue 1232228 |
| | | | | | | DateTimePeriod 1232230 | | | | 0..n 1232232 | ... |
| | | | | | | | DateTimePeriod 1232234 | | | 1 1232236 | DateTimePeriod 1232238 |
| | | | | | | | PeriodRoleCode 1232240 | | | 1 1232242 | PeriodRoleCode 1232244 |
| PartyInformation 1232246 | | | | Party 1232248 | | | | | | 1..n 1232250 | ... |
| | | | | | Party 1232252 | | | | | 1 1232254 | BusinessTransactionDocumentParty 1232256 |

FIG. 123-82

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RoleCode 1232258 | | | | | 1 1232260 | PartyRoleCode 1232262 |
| | | | | | Formatted Name 1232264 | | | | | 0..1 1232266 | LONG_Name 1232268 |
| | | | | | Amount 1232270 | | | | | 0..n 1232272 | ... |
| | | | | | | Amount 1232274 | | | | 1 1232276 | Amount 1232278 |
| | | | | | | RoleCode 1232280 | | | | 1 1232282 | AmountRole Code 1232284 |
| | | | | | DateTimePeriods 1232286 | | | | | 0..n 1232288 | ... |
| | | | | | | Requested Fulfillment Period 1232290 | | | | 0..1 1232292 | DateTimePeriod 1232294 |

FIG. 123-83

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AcceptableFulfillmentPeriod 1232296 | | | | 0..1 1232298 | DateTimePeriod 1232300 |
| | | | | | | PeriodRoleCode 1232302 | | | | 1 1232304 | PeriodRoleCode 1232306 |
| | | | | | TransportationDocumentInformation 1232308 | | | | | 0..n 1232310 | ... |
| | | | | | | TransportationDocumentTypeCode 1232312 | | | | 0..1 1232314 | TransportationDocumentTypeCode 1232316 |
| | | | | | | TransportationDocumentNote 1232318 | | | | 0..1 1232320 | SHORT_Note 1232322 |

FIG. 123-84

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentID 1232324 | | | | 0..1 1232326 | TransportationDocumentID 1232328 |
| | | | | | | TransportationDocumentStatusCode 1232330 | | | | 0..1 1232332 | TransportationDocumentStatusCode 1232334 |
| | | | | | | LanguageCode 1232336 | | | | 0..1 1232338 | LanguageCode 1232340 |
| | | | | | | CommunicationMediumTypeCode 1232342 | | | | 0..1 1232344 | CommunicationMediumTypeCode 1232346 |
| | | | | | | RequiredIndicator 1232348 | | | | 1 1232350 | Indicator 1232352 |

FIG. 123-85

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OutputCopyNumberValue 1232354 | | | | 0..1 1232356 | NumberValue 1232358 |
| | | | | | | OutputOriginalNumberValue 1232360 | | | | 0..1 1232362 | NumberValue 1232364 |
| | | | | | | DateTimePeriod 1232366 | | | | 0..n 1232368 | ... |
| | | | | | | | DateTimePeriod 1232370 | | | 1 1232372 | DateTimePeriod 1232374 |
| | | | | | | | PeriodRoleCode 1232376 | | | 1 1232378 | PeriodRoleCode 1232380 |

FIG. 123-86

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentReference 1232382 | | | | | 0..n 1232384 | ... |
| | | | | | | BusinessTransactionDocumentReference 1232386 | | | | 0..1 1232388 | BusinessTransactionDocumentReference 1232390 |
| | | | | | | BusinessTransactionDocumentRelationshipRoleCode 1232392 | | | | 0..1 1232394 | BusinessTransactionDocumentRelationshipRoleCode 1232396 |

FIG. 123-87

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentRelationshipTypeCode 1232398 | | | | 0..1 1232400 | BusinessTransactionDocumentRelationshipTypeCode 1232402 |
| | | | | | | TransportationDocumentTypeCode 1232404 | | | | 0..1 1232406 | TransportationDocumentTypeCode 1232408 |
| | | | | | | TransportationDocumentNote 1232410 | | | | 0..1 1232412 | SHORT_Note 1232414 |
| | | | | | | TransportationDocumentID 1232416 | | | | 0..1 1232418 | TransportationDocumentID 1232420 |

FIG. 123-88

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DateTimePeriod 1232422 | | | | 0..n 1232424 | ... |
| | | | | | | | DateTimePeriod 1232426 | | | 1 1232428 | DateTimePeriod 1232430 |
| | | | | | | | PeriodRoleCode 1232432 | | | 1 1232434 | PeriodRoleCode 1232436 |
| LocationInformation 1232438 | | | | Location 1232440 | | | | | | 0..n 1232442 | |
| | | | | | Location 1232444 | | | | | 1 1232446 | BusinessTransactionDocumentLocation 1232448 |
| | | | | | RoleCode 1232450 | | | | | 1 1232452 | LocationRoleCode 1232454 |

FIG. 123-89

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TypeCode 1232456 | | | | | 0..1 1232458 | LocationTypeCode 1232460 |
| | | | | | Name 1232462 | | | | | 0..1 1232464 | MEDIUM_Name 1232466 |
| | | | | | DateTimePeriods 1232468 | | | | | 0..n 1232470 | ... |
| | | | | | | Requested Fulfillment Period 1232472 | | | | 0..1 1232474 | DateTimePeriod 1232476 |
| | | | | | | Acceptable Fulfillment Period 1232478 | | | | 0..1 1232480 | DateTimePeriod 1232482 |
| | | | | | | PeriodRoleCode 1232484 | | | | 1 1232486 | PeriodRoleCode 1232488 |

FIG. 123-90

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| TransportationStageInformation 1232490 | | | | TransportationStage 1232492 | | | | | | 0..n 1232494 | ... |
| | | | | | ID 1232496 | | | | | 1 1232498 | TransportationStageID 1232500 |
| | | | | | OrdinalNumberValue 1232502 | | | | | 0..1 1232504 | OrdinalNumberValue 1232506 |
| | | | | | TypeCode 1232508 | | | | | 0..1 1232510 | TransportationStageTypeCode 1232512 |
| | | | | | JourneyID 1232514 | | | | | 0..1 1232516 | JourneyID 1232518 |
| | | | | | TransportModeCode 1232520 | | | | | 0..1 1232522 | TransportModeCode 1232524 |

FIG. 123-91

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportMeansDescriptionCode 1232526 | | | | | 0..1 1232528 | TransportMeansDescriptionCode 1232530 |
| | | | | | TransportMeansDescription 1232532 | | | | | 0..1 1232534 | SHORT_Description 1232536 |
| | | | | | TransportMeansID 1232538 | | | | | 0..1 1232540 | TransportMeansID 1232542 |
| | | | | | TransportMeansHomeCountryCode 1232544 | | | | | 0..1 1232546 | CountryCode 1232548 |
| | | | | | TransportMeansOwnershipTypeCode 1232550 | | | | | 0..1 1232552 | TransportMeansOwnershipTypeCode 1232554 |

FIG. 123-92

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | CarrierStandardID 1232556 | | | | | 0..1 1232558 | PartyStandardID 1232560 |
| | | | | | CarrierFormattedName 1232562 | | | | | 0..1 1232564 | LONG_Name 1232566 |
| | | | | | TransportationTransitDirectionCode 1232568 | | | | | 0..1 1232570 | TransportationTransitDirectionCode 1232572 |
| | | | | | CalculatedDistanceMeasure 1232574 | | | | | 0..1 1232576 | Measure 1232578 |
| | | | | | GivenDistanceMeasure 1232580 | | | | | 0..1 1232582 | Measure 1232584 |

FIG. 123-93

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | Location 1232586 | | | | | 1..n 1232588 | ... |
| | | | | | | Location 1232590 | | | | 1 1232592 | BusinessTransactionDocumentLocation 1232594 |
| | | | | | | RoleCode 1232596 | | | | 1 1232598 | LocationRoleCode 1232600 |
| | | | | | | TypeCode 1232602 | | | | 0..1 1232604 | LocationTypeCode 1232606 |
| | | | | | | Name 1232608 | | | | 0..1 1232610 | MEDIUM_Name 1232612 |
| | | | | | | DateTimePeriods 1232614 | | | | 0..n 1232616 | ... |

FIG. 123-94

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | RequestedFulfillmentPeriod 1232618 | | | 0..1 1232620 | DateTimePeriod 1232622 |
| | | | | | | | AcceptableFulfillmentPeriod 1232624 | | | 0..1 1232626 | DateTimePeriod 1232628 |
| | | | | | | | PeriodRoleCode 1232630 | | | 1 1232632 | PeriodRoleCode 1232634 |
| | | | | | BusinessTransactionDocumentReference 1232636 | | | | | 0..n 1232638 | ... |
| | | | | | | BusinessTransactionDocumentReference 1232640 | | | | 0..1 1232642 | BusinessTransactionDocumentReference 1232644 |

FIG. 123-95

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentRelationshipRoleCode 1232646 | | | | 0..1 1232648 | BusinessTransactionDocumentRelationshipRoleCode 1232650 |
| | | | | | | BusinessTransactionDocumentRelationshipTypeCode 1232652 | | | | 0..1 1232654 | BusinessTransactionDocumentRelationshipTypeCode 1232656 |
| | | | | | | TransportationDocumentTypeCode 1232658 | | | | 0..1 1232660 | TransportationDocumentTypeCode 1232662 |
| | | | | | | TransportationDocumentNote 1232664 | | | | 0..1 1232666 | SHORT_Note 1232668 |

FIG. 123-96

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentID 1232670 | | | | 0..1 1232672 | TransportationDocumentID 1232674 |
| | | | | | | DateTimePeriod 1232676 | | | | 0..n 1232678 | ... |
| | | | | | | | DateTimePeriod 1232680 | | | 1 1232682 | DateTimePeriod 1232684 |
| | | | | | | | PeriodRoleCode 1232686 | | | 1 1232688 | PeriodRoleCode 1232690 |
| | | | | | TransportationServiceRequirement 1232692 | | | | | 0..n 1232694 | ... |

FIG. 123-97

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationServiceRequirementCode 1232696 | | | | 0..1 1232698 | TransportationServiceRequirementCode 1232700 |
| | | | | | | AdditionalTransportationServiceRequirementCode 1232702 | | | | 0..1 1232704 | TransportationServiceRequirementCode 1232706 |
| | | | | | | TransportationContractConditionCode 1232708 | | | | 0..1 1232710 | TransportationContractConditionCode 1232712 |
| | | | | | | TransportServiceLevelCode 1232714 | | | | 0..1 1232716 | TransportServiceLevelCode 1232718 |

FIG. 123-98

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | NatureOfCargoClassificationCode 1232720 | | | | 0..1 1232722 | NatureOfCargoClassificationCode 1232724 |
| TransportationUnitResourceInformation 1232726 | | | | TransportationUnitResourceInformation 1232728 | | | | | | 0..n 1232730 | ... |
| | | | | | ID 1232732 | | | | | 1 1232734 | ResourceInformationID 1232736 |
| | | | | | ResourceNumberValue 1232738 | | | | | 0..1 1232740 | NumberValue 1232742 |
| | | | | | ResourceID 1232744 | | | | | 0..1 1232746 | ResourceID 1232748 |

FIG. 123-99

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ResourceHomeCountryCode 1232750 | | | | | 0..1 1232752 | CountryCode 1232754 |
| | | | | | TransportationUnitResourceCategoryCode 1232756 | | | | | 0..1 1232758 | TransportationUnitResourceCategoryCode 1232760 |
| | | | | | TransportationUnitResourceTypeCode 1232762 | | | | | 0..1 1232764 | TransportationUnitResourceTypeCode 1232766 |
| | | | | | FillLevelCode 1232768 | | | | | 0..1 1232770 | FillLevelCode 1232772 |
| | | | | | ShippingTypeCode 1232774 | | | | | 0..1 1232776 | ShippingTypeCode 1232778 |

FIG. 123-100

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | HaulageArrangerCode 1232780 | | | | | 0..1 1232782 | HaulageArrangerCode 1232784 |
| | | | | | TransportationHandlingInstructionCode 1232786 | | | | | 0..1 1232788 | TransportationHandlingInstructionCode 1232790 |
| | | | | | TransportationHandlingInstructionNote 1232792 | | | | | 0..1 1232794 | LONG_Note 1232796 |
| | | | | | TransportationStageAssignment 1232798 | | | | | 0..n 1232800 | ... |

FIG. 123-101

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RequestForSupplierShipmentQuoteTransportationStageID 1232802 | | | | 1 1232804 | TransportationStageID 1232806 |
| | | | | | AttachedEquipment 1232808 | | | | | 0..n 1232810 | ... |
| | | | | | | RequestForSupplierShipmentQuoteTransportationUnitResourceInformationID 1232812 | | | | 1 1232814 | ResourceID 1232816 |
| | | | | | Quantity 1232818 | | | | | 0..n 1232820 | ... |

FIG. 123-102

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Quantity 1232822 | | | | 1 1232824 | Quantity 1232826 |
| | | | | | | RoleCode 1232828 | | | | 0..1 1232830 | QuantityRoleCode 1232832 |
| | | | | | | TypeCode 1232834 | | | | 0..1 1232836 | QuantityTypeCode 1232838 |
| | | | | | BusinessTransactionDocumentReference 1232840 | | | | | 0..n 1232842 | ... |
| | | | | | | BusinessTransactionDocumentReference 1232844 | | | | 0..1 1232846 | BusinessTransactionDocumentReference 1232848 |

FIG. 123-103

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentRelationshipRoleCode 1232850 | | | | 0..1 1232852 | BusinessTransactionDocumentRelationshipRoleCode 1232854 |
| | | | | | | BusinessTransactionDocumentRelationshipTypeCode 1232856 | | | | 0..1 1232858 | BusinessTransactionDocumentRelationshipTypeCode 1232860 |
| | | | | | | TransportationDocumentTypeCode 1232862 | | | | 0..1 1232864 | TransportationDocumentTypeCode 1232866 |
| | | | | | | TransportationDocumentNote 1232868 | | | | 0..1 1232870 | SHORT_Note 1232872 |

FIG. 123-104

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentID 1232874 | | | | 0..1 1232876 | TransportationDocumentID 1232878 |
| | | | | | | DateTimePeriod 1232880 | | | | 0..n 1232882 | |
| | | | | | | | DateTimePeriod 1232884 | | | 1 1232886 | DateTimePeriod 1232888 |
| | | | | | | | PeriodRoleCode 1232890 | | | 1 1232892 | PeriodRoleCode 1232894 |
| | | | | | TextCollection 1232896 | | | | | 0..1 1232898 | ... |
| | | | | | | TextCollection 1232900 | | | | 1 1232902 | TextCollection 1232904 |

FIG. 123-105

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | Location 1232906 | | | | | 0..n 1232908 | ... |
| | | | | | | Location 1232910 | | | | 1 1232912 | BusinessTransactionDocumentLocation 1232914 |
| | | | | | | RoleCode 1232916 | | | | 1 1232918 | LocationRoleCode 1232920 |
| | | | | | | TypeCode 1232922 | | | | 0..1 1232924 | LocationTypeCode 1232926 |
| | | | | | | Name 1232928 | | | | 0..1 1232930 | MEDIUM_Name 1232932 |
| | | | | | | DateTimePeriods 1232934 | | | | 0..n 1232936 | ... |

FIG. 123-106

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Requested Fulfillment Period 1232938 | | | 0..1 1232940 | DateTimePeriod 1232942 |
| | | | | | | | Acceptable Fulfillment Period 1232944 | | | 0..1 1232946 | DateTimePeriod 1232948 |
| | | | | | | | PeriodRole Code 1232950 | | | 1 1232952 | PeriodRoleCode 1232954 |
| | | | | | Dangerous Goods 1232956 | | | | | 0..n 1232958 | |
| | | | | | | ID 1232960 | | | | 0..1 1232962 | DangerousGoodsID 1232964 |
| | | | | | | RegulationsCode 1232966 | | | | 0..1 1232968 | DangerousGoodsRegulationsCode 1232970 |

FIG. 123-107

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | HazardCode 1232972 | | | | 0..1 1232974 | DangerousGoodsHazardCode 1232976 |
| | | | | | | Flashpoint MeasureInterval 1232978 | | | | 0..1 1232980 | MeasureInterval 1232982 |
| | | | | | | PackagingGroupCode 1232984 | | | | 0..1 1232986 | DangerousGoodsPackagingGroupCode 1232988 |
| | | | | | | EmergencySchedule 1232990 | | | | 0..1 1232992 | DangerousGoodsEmergencySchedule 1232994 |
| | | | | | | TransportEmergencyCardCode 1232996 | | | | 0..1 1232998 | TransportEmergencyCardCode 1233000 |

FIG. 123-108

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DangerousGoodsLabelCode 1233002 | | | | 0..1 1233004 | DangerousGoodsLabelCode 1233006 |
| | | | | | | DangerousGoodsLabelCode2 1233008 | | | | 0..1 1233010 | DangerousGoodsLabelCode 1233012 |
| | | | | | | DangerousGoodsLabelCode3 1233014 | | | | 0..1 1233016 | DangerousGoodsLabelCode 1233018 |
| | | | | | | PackagingInstructionTypeCode 1233020 | | | | 0..1 1233022 | PackagingInstructionTypeCode 1233024 |
| | | | | | | TransportMeansDescriptionCode 1233026 | | | | 0..1 1233028 | TransportMeansDescriptionCode 1233030 |

FIG. 123-109

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationAuthorisationCode 1233032 | | | | 0..1 1233034 | DangerousGoodsTransportationAuthorisationCode 1233036 |
| | | | | | | ContactInformation 1233038 | | | | 0..n 1233040 | ... |
| | | | | | | | ContactPersonFunctionTypeCode 1233042 | | | 1 1233044 | ContactPersonFunctionTypeCode 1233046 |
| | | | | | | | Address 1233048 | | | 1 1233050 | Address 1233052 |
| | | | | | | TextCollection 1233054 | | | | 0..1 1233056 | ... |
| | | | | | | | TextCollection 1233058 | | | 1 1233060 | TextCollection 1233062 |

FIG. 123-110

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| PackageInformation 1233064 | | | | PackageInformation 1233066 | | | | | | 0..n 1233068 | ... |
| | | | | | ID 1233070 | | | | | 1 1233072 | PackageInformationID 1233074 |
| | | | | | PackageID 1233076 | | | | | 0..1 1233078 | PackageID 1233080 |
| | | | | | PackageOrdinalNumberValue 1233082 | | | | | 0..1 1233084 | OrdinalNumberValue 1233086 |
| | | | | | PackageNumberValue 1233088 | | | | | 0..1 1233090 | NumberValue 1233092 |
| | | | | | PackageTypeCode 1233094 | | | | | 0..1 1233096 | PackageTypeCode 1233098 |

FIG. 123-111

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PackagingLevelCode 1233100 | | | | | 0..1 1233102 | PackagingLevelCode 1233104 |
| | | | | | PackageMarkingInstructionCode 1233106 | | | | | 0..1 1233108 | PackageMarkingInstructionCode 1233110 |
| | | | | | PredecessorPackageID 1233112 | | | | | 0..1 1233114 | PackageID 1233116 |
| | | | | | ItemAssignment 1233118 | | | | | 0..n 1233120 | ... |
| | | | | | | RequestForSupplierShipmentQuoteItemID 1233122 | | | | 1 1233124 | BusinessTransactionDocumentItemID 1233126 |

FIG. 123-112

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Quantity 1233128 | | | | 0..n 1233130 | ... |
| | | | | | | | Quantity 1233132 | | | 1 1233134 | Quantity 1233136 |
| | | | | | | | RoleCode 1233138 | | | 0..1 1233140 | QuantityRoleCode 1233142 |
| | | | | | | | TypeCode 1233144 | | | 0..1 1233146 | QuantityTypeCode 1233148 |
| | | | | | | BusinessTransactionDocumentReference 1233150 | | | | 0..n 1233152 | ... |
| | | | | | | | BusinessTransactionDocumentReference 1233154 | | | 0..1 1233156 | BusinessTransactionDocumentReference 1233158 |

FIG. 123-113

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | BusinessTransactionDocumentRelationshipRoleCode 1233160 | | | 0..1 1233162 | BusinessTransactionDocumentRelationshipRoleCode 1233164 |
| | | | | | | | BusinessTransactionDocumentRelationshipTypeCode 1233166 | | | 0..1 1233168 | BusinessTransactionDocumentRelationshipTypeCode 1233170 |
| | | | | | | | TransportationDocumentTypeCode 1233172 | | | 0..1 1233174 | TransportationDocumentTypeCode 1233176 |
| | | | | | | | TransportationDocumentNote 1233178 | | | 0..1 1233180 | SHORT_Note 1233182 |

FIG. 123-114

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationDocumentID 1233184 | | | 0..1 1233186 | TransportationDocumentID 1233188 |
| | | | | | | | DateTimePeriod 1233190 | | | 0..n 1233192 | ... |
| | | | | | | | | DateTimePeriod 1233194 | | 1 1233196 | DateTimePeriod 1233198 |
| | | | | | | | | PeriodRoleCode 1233200 | | 1 1233202 | PeriodRoleCode 1233204 |
| | | | | | | TransportationGoodsIdentification 1233206 | | | | 0..n 1233208 | ... |

FIG. 123-115

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationGoodsIdentifierTypeCode 1233210 | | | 1 1233212 | TransportationGoodsIdentifierTypeCode 1233214 |
| | | | | | | | LowerBoundaryTransportationGoodsID 1233216 | | | 0..1 1233218 | TransportationGoodsID 1233220 |
| | | | | | | | UpperBoundaryTransportationGoodsID 1233222 | | | 0..1 1233224 | TransportationGoodsID 1233226 |
| | | | | | TransportationUnitResourceInformationAssignment 1233228 | | | | | 0..n 1233230 | ... |

FIG. 123-116

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RequestForSupplierShipmentQuoteTransportationUnitResourceInformationID 1233232 | | | | 1 1233234 | ResourceInformationID 1233236 |
| | | | | | | Quantity 1233238 | | | | 0..n 1233240 | ... |
| | | | | | | | Quantity 1233242 | | | 1 1233244 | Quantity 1233246 |
| | | | | | | | RoleCode 1233248 | | | 0..1 1233250 | QuantityRoleCode 1233252 |
| | | | | | | | TypeCode 1233254 | | | 0..1 1233256 | QuantityTypeCode 1233258 |
| | | | | | Quantity 1233260 | | | | | 0..n 1233262 | ... |

FIG. 123-117

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Quantity 1233264 | | | | 1 1233266 | Quantity 1233268 |
| | | | | | | RoleCode 1233270 | | | | 0..1 1233272 | QuantityRoleCode 1233274 |
| | | | | | | TypeCode 1233276 | | | | 0..1 1233278 | QuantityTypeCode 1233280 |
| | | | | | TextCollection 1233282 | | | | | 0..1 1233284 | ... |
| | | | | | | TextCollection 1233286 | | | | 1 1233288 | TextCollection 1233290 |
| Item 1233292 | | | | Item 1233294 | | | | | | 0..n 1233296 | ... |
| | | | | | ID 1233298 | | | | | 1 1233300 | BusinessTransactionDocumentItemID 1233302 |

FIG. 123-118

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | OriginCountryCode 1233304 | | | | | 0..1 1233306 | CountryCode 1233308 |
| | | | | | DestinationCountryCode 1233310 | | | | | 0..1 1233312 | CountryCode 1233314 |
| | | | | | ShippingTypeCode 1233316 | | | | | 0..1 1233318 | ShippingTypeCode 1233320 |
| | | | | | HaulageArrangerCode 1233322 | | | | | 0..1 1233324 | HaulageArrangerCode 1233326 |
| | | | | | TemperatureMeasureInterval 1233328 | | | | | 0..1 1233330 | MeasureInterval 1233332 |

FIG. 123-119

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationHandlingInstructionCode 1233334 | | | | | 0..1 1233336 | TransportationHandlingInstructionCode 1233338 |
| | | | | | TransportationHandlingInstructionNote 1233340 | | | | | 0..1 1233342 | LONG_Note 1233344 |
| ItemInformation 1233346 | | | | | Amount 1233348 | | | | | 0..n 1233350 | ... |
| | | | | | | Amount 1233352 | | | | 1 1233354 | Amount 1233356 |
| | | | | | | RoleCode 1233358 | | | | 1 1233360 | AmountRoleCode 1233362 |
| | | | | | TextCollection 1233364 | | | | | 0..1 1233366 | ... |

FIG. 123-120

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TextcCollection 1233368 | | | | 1 1233370 | TextCollection 1233372 |
| | | | | | NatureOfCargo 1233374 | | | | | 0..n 1233376 | ... |
| | | | | | | ClassificationCode 1233378 | | | | 1 1233380 | NatureOfCargoClassificationCode 1233382 |
| | | | | | Quantity 1233384 | | | | | 0..n 1233386 | ... |
| | | | | | | Quantity 1233388 | | | | 1 1233390 | Quantity 1233392 |
| | | | | | | RoleCode 1233394 | | | | 0..1 1233396 | QuantityRoleCode 1233398 |
| | | | | | | TypeCode 1233400 | | | | 0..1 1233402 | QuantityTypeCode 1233404 |

FIG. 123-121

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentInformation 1233406 | | | | | 0..n 1233408 | ... |
| | | | | | | TransportationDocumentTypeCode 1233410 | | | | 0..1 1233412 | TransportationDocumentTypeCode 1233414 |
| | | | | | | TransportationDocumentNote 1233416 | | | | 0..1 1233418 | SHORT_Note 1233420 |
| | | | | | | TransportationDocumentID 1233422 | | | | 0..1 1233424 | TransportationDocumentID 1233426 |

FIG. 123-122

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentStatusCode 1233428 | | | | 0..1 1233430 | TransportationDocumentStatusCode 1233432 |
| | | | | | | LanguageCode 1233434 | | | | 0..1 1233436 | LanguageCode 1233438 |
| | | | | | | CommunicationMediumTypeCode 1233440 | | | | 0..1 1233442 | CommunicationMediumTypeCode 1233444 |
| | | | | | | Requiredindicator 1233446 | | | | 1 1233448 | Indicator 1233450 |
| | | | | | | OutputCopyNumberValue 1233452 | | | | 0..1 1233454 | NumberValue 1233456 |

FIG. 123-123

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OutputOriginalNumberValue 1233458 | | | | 0..1 1233460 | NumberValue 1233462 |
| | | | | | | DateTimePeriod 1233464 | | | | 0..n 1233466 | ... |
| | | | | | | | DateTimePeriod 1233468 | | | 1 1233470 | DateTimePeriod 1233472 |
| | | | | | | | PeriodRoleCode 1233474 | | | 1 1233476 | PeriodRoleCode 1233478 |
| | | | | | BusinessTransactionDocumentReference 1233480 | | | | | 0..n 1233482 | ... |

FIG. 123-124

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentReference 1233484 | | | | 0..1 1233486 | BusinessTransactionDocumentReference 1233488 |
| | | | | | | BusinessTransactionDocumentRelationshipRoleCode 1233490 | | | | 0..1 1233492 | BusinessTransactionDocumentRelationshipRoleCode 1233494 |
| | | | | | | BusinessTransactionDocumentRelationshipTypeCode 1233496 | | | | 0..1 1233498 | BusinessTransactionDocumentRelationshipTypeCode 1233500 |

FIG. 123-125

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentTypeCode 1233502 | | | | 0..1 1233504 | TransportationDocumentTypeCode 1233506 |
| | | | | | | TransportationDocumentNote 1233508 | | | | 0..1 1233510 | SHORT_Note 1233512 |
| | | | | | | TransportationDocumentID 1233514 | | | | 0..1 1233516 | TransportationDocumentID 1233518 |
| | | | | | | DateTimePeriod 1233520 | | | | 0..n 1233522 | ... |
| | | | | | | | RequestDateTimePeriod 1233524 | | | 1 1233526 | DateTimePeriod 1233528 |

FIG. 123-126

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | PeriodRoleCode 1233530 | | | 1 1233532 | PeriodRoleCode 1233534 |
| | | | | | DangerousGoods 1233536 | | | | | 0..n 1233538 | ... |
| | | | | | | ID 1233540 | | | | 0..1 1233542 | DangerousGoodsID 1233544 |
| | | | | | | RegulationsCode 1233546 | | | | 0..1 1233548 | DangerousGoodsRegulationsCode 1233550 |
| | | | | | | HazardCode 1233552 | | | | 0..1 1233554 | DangerousGoodsHazardCode 1233556 |
| | | | | | | FlashpointMeasureInterval 1233558 | | | | 0..1 1233560 | MeasureInterval 1233562 |

FIG. 123-127

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | PackagingGroupCode 1233564 | | | | 0..1 1233566 | DangerousGoodsPackagingGroupCode 1233568 |
| | | | | | | EmergencySchedule 1233570 | | | | 0..1 1233572 | DangerousGoodsEmergencySchedule 1233574 |
| | | | | | | TransportEmergencyCardCode 1233576 | | | | 0..1 1233578 | TransportEmergencyCardCode 1233580 |
| | | | | | | DangerousGoodsLabelCode 1233582 | | | | 0..1 1233584 | DangerousGoodsLabelCode 1233586 |
| | | | | | | DangerousGoodsLabelCode2 1233588 | | | | 0..1 1233590 | DangerousGoodsLabelCode 1233592 |

FIG. 123-128

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DangerousGoodsLabelCode3 1233594 | | | | 0..1 1233596 | DangerousGoodsLabelCode 1233598 |
| | | | | | | PackingInstructionTypeCode 1233600 | | | | 0..1 1233602 | PackingInstructionTypeCode 1233604 |
| | | | | | | TransportMeansDescriptionCode 1233606 | | | | 0..1 1233608 | TransportMeansDescriptionCode 1233610 |
| | | | | | | TransportationAuthorisationCode 1233612 | | | | 0..1 1233614 | DangerousGoodsTransportationAuthorisationCode 1233616 |
| | | | | | | ContactInformation 1233618 | | | | 0..n 1233620 | ... |

FIG. 123-129

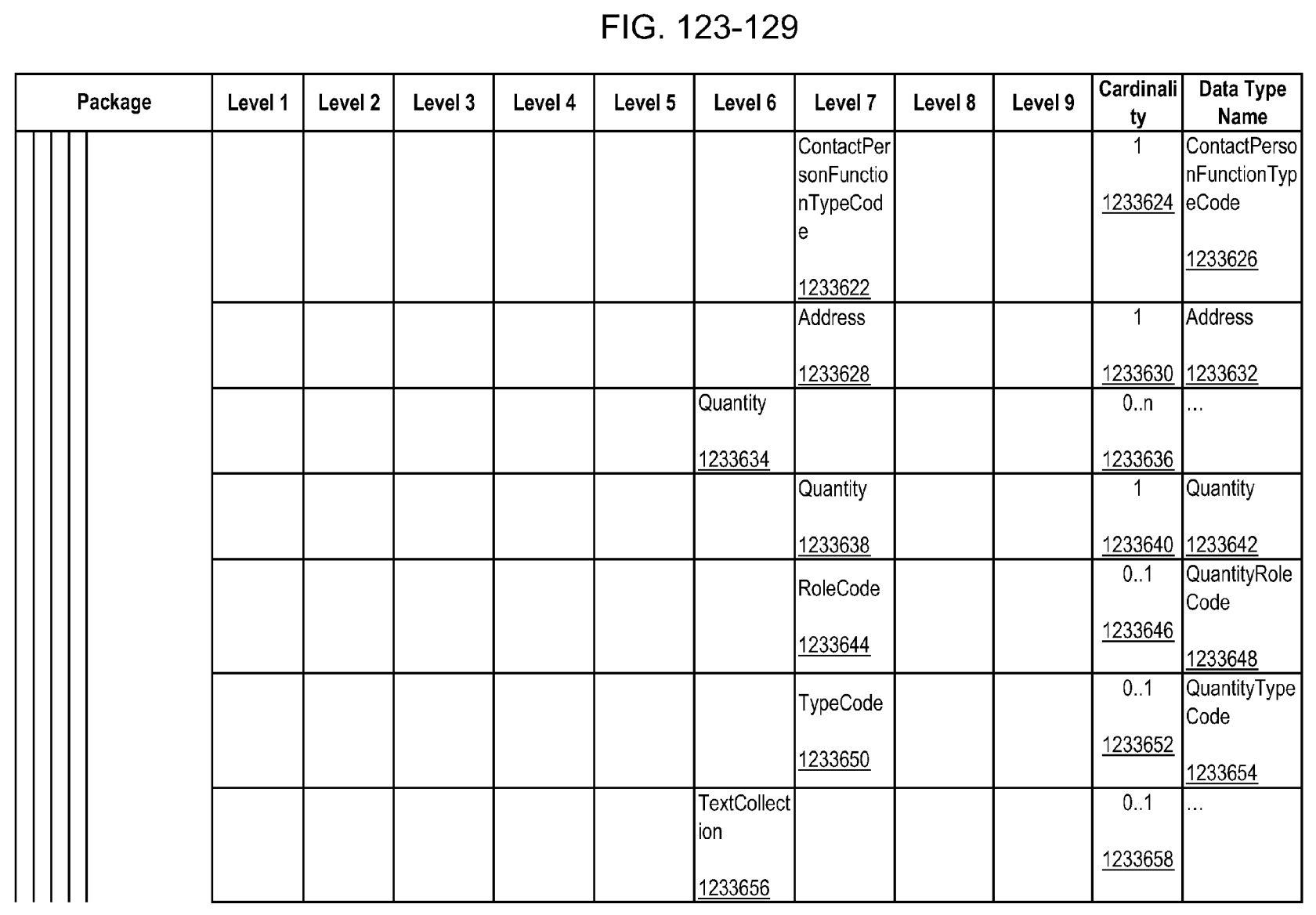

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | ContactPersonFunctionTypeCode 1233622 | | | 1 1233624 | ContactPersonFunctionTypeCode 1233626 |
| | | | | | | | Address 1233628 | | | 1 1233630 | Address 1233632 |
| | | | | | | Quantity 1233634 | | | | 0..n 1233636 | ... |
| | | | | | | | Quantity 1233638 | | | 1 1233640 | Quantity 1233642 |
| | | | | | | | RoleCode 1233644 | | | 0..1 1233646 | QuantityRoleCode 1233648 |
| | | | | | | | TypeCode 1233650 | | | 0..1 1233652 | QuantityTypeCode 1233654 |
| | | | | | | TextCollection 1233656 | | | | 0..1 1233658 | ... |

FIG. 123-130

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TextCollection 1233660 | | | 1 1233662 | TextCollection 1233664 |
| | | | | | | TransportationUnitResourceInformationAssignment 1233666 | | | | 0..n 1233668 | ... |
| | | | | | | | RequestForSupplierShipmentQuoteTransportationUnitResourceInformationID 1233670 | | | 1 1233672 | ResourceInformationID 1233674 |
| | | | | | | | Quantity 1233676 | | | 0..n 1233678 | ... |
| | | | | | | | | Quantity 1233680 | | 1 1233682 | Quantity 1233684 |

FIG. 123-131

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | RoleCode 1233686 | | 0..1 1233688 | QuantityRoleCode 1233690 |
| | | | | | | | | TypeCode 1233692 | | 0..1 1233694 | QuantityTypeCode 1233696 |
| | | | | | TransportationStageAssignment 1233698 | | | | | 0..n 1233700 | ... |
| | | | | | | RequestForSuppliersShipmentQuoteTransportationStageID 1233702 | | | | 1 1233704 | TransportationStageID 1233706 |
| | | | | | | Quantity 1233708 | | | | 0..n 1233710 | ... |
| | | | | | | | Quantity 1233712 | | | 1 1233714 | Quantity 1233716 |

FIG. 123-132

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | RoleCode 1233718 | | | 0..1 1233720 | QuantityRoleCode 1233722 |
| | | | | | | | TypeCode 1233724 | | | 0..1 1233726 | QuantityTypeCode 1233728 |
| | | | | | TransportationUnitResourceInformationAssignment 1233730 | | | | | 0..n 1233732 | ... |
| | | | | | | RequestForSupplierShipmentQuoteTransportationUnitResourceInformationID 1233734 | | | | 1 1233736 | ResourceInformationID 1233738 |

FIG. 123-133

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Quantity 1233740 | | | | 0..n 1233742 | ... |
| | | | | | | | Quantity 1233744 | | | 1 1233746 | Quantity 1233748 |
| | | | | | | | RoleCode 1233750 | | | 0..1 1233752 | QuantityRoleCode 1233754 |
| | | | | | | | TypeCode 1233756 | | | 0..1 1233758 | QuantityTypeCode 1233760 |
| GovernmentalRequirementInformation 1233762 | | | | | GovernmentalProcedure 1233764 | | | | | 0..n 1233766 | ... |
| | | | | | | TransportationGovernmentAgencyTypeCode 1233768 | | | | 0..1 1233770 | TransportationGovernmentAgencyTypeCode 1233772 |

FIG. 123-134

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationMovementTypeCode 1233774 | | | | 0..1 1233776 | TransportationMovementTypeCode 1233778 |
| | | | | | | TransportationGovernmentAgencyInvolvementStatusCode 1233780 | | | | 0..1 1233782 | TransportationGovernmentAgencyInvolvementStatusCode 1233784 |
| | | | | | | TransportationGovernmentAgencyActionCode 1233786 | | | | 0..1 1233788 | TransportationGovernmentAgencyActionCode 1233790 |

FIG. 123-135

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationGovernmentAgencyProcedureStatusCode 1233792 | | | | 0..1 1233794 | TransportationGovernmentAgencyProcedureStatusCode 1233796 |
| | | | | | | Location 1233798 | | | | 0..n 1233800 | ... |
| | | | | | | | Location 1233802 | | | 1 1233804 | BusinessTransactionDocumentLocation 1233806 |
| | | | | | | | RoleCode 1233808 | | | 1 1233810 | LocationRoleCode 1233812 |
| | | | | | | | TypeCode 1233814 | | | 0..1 1233816 | LocationTypeCode 1233818 |

FIG. 123-136

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Name 1233820 | | | 0..1 1233822 | MEDIUM_Name 1233824 |
| | | | | | | DateTimePeriod 1233826 | | | | 0..n 1233828 | ... |
| | | | | | | | DateTimePeriod 1233830 | | | 1 1233832 | DateTimePeriod 1233834 |
| | | | | | | | PeriodRoleCode 1233836 | | | 1 1233838 | PeriodRoleCode 1233840 |
| | | | | | | TextCollection 1233842 | | | | 0..n 1233844 | ... |
| | | | | | | | TextCollection 1233846 | | | 0..1 1233848 | TextCollection 1233850 |

FIG. 123-137

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentInformation 1233852 | | | | 0..n 1233854 | ... |
| | | | | | | | TransportationDocumentTypeCode 1233856 | | | 0..1 1233858 | TransportationDocumentTypeCode 1233860 |
| | | | | | | | TransportationDocumentNote 1233862 | | | 0..1 1233864 | SHORT_Note 1233866 |
| | | | | | | | TransportationDocumentID 1233868 | | | 0..1 1233870 | TransportationDocumentID 1233872 |

FIG. 123-138

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationDocumentStatusCode 1233874 | | | 0..1 1233876 | TransportationDocumentStatusCode 1233878 |
| | | | | | | | LanguageCode 1233880 | | | 0..1 1233882 | LanguageCode 1233884 |
| | | | | | | | CommunicationMediumTypeCode 1233886 | | | 0..1 1233888 | CommunicationMediumTypeCode 1233890 |
| | | | | | | | RequiredIndicator 1233892 | | | 1 1233894 | Indicator 1233896 |
| | | | | | | | OutputCopyNumberValue 1233898 | | | 0..1 1233900 | NumberValue 1233902 |

FIG. 123-139

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | OutputOriginalNumberValue 1233904 | | | 0..1 1233906 | NumberValue 1233908 |
| | | | | | | | DateTimePeriod 1233910 | | | 0..n 1233912 | ... |
| | | | | | | | | DateTimePeriod 1233914 | | 1 1233916 | DateTimePeriod 1233918 |
| | | | | | | | | PeriodRoleCode 1233920 | | 1 1233922 | PeriodRoleCode 1233924 |
| PartyInformation 1233926 | | | | | Party 1233928 | | | | | 0..n 1233930 | ... |
| | | | | | | Party 1233932 | | | | 1 1233934 | BusinessTransactionDocumentParty 1233936 |

FIG. 123-140

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RoleCode 1233938 | | | | 1 1233940 | PartyRoleCode 1233942 |
| | | | | | | Formatted Name 1233944 | | | | 0..1 1233946 | LONG_Name 1233948 |
| | | | | | | DateTimePeriods 1233950 | | | | 0..n 1233952 | ... |
| | | | | | | | Requested Fulfillment Period 1233954 | | | 0..1 1233956 | DateTimePeriod 1233958 |
| | | | | | | | Acceptable Fulfillment Period 1233960 | | | 0..1 1233962 | DateTimePeriod 1233964 |
| | | | | | | | PeriodRole Code 1233966 | | | 1 1233968 | PeriodRoleCode 1233970 |

FIG. 123-141

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| LocationInformation 1233972 | | | | | Location 1233974 | | | | | 0..n 1233976 | ... |
| | | | | | | Location 1233978 | | | | 1 1233980 | BusinessTransactionDocumentLocation 1233982 |
| | | | | | | RoleCode 1233984 | | | | 1 1233986 | LocationRoleCode 1233988 |
| | | | | | | TypeCode 1233990 | | | | 0..1 1233992 | LocationTypeCode 1233994 |
| | | | | | | Name 1233996 | | | | 0..1 1233998 | MEDIUM_Name 1234000 |
| | | | | | | DateTimePeriods 1234002 | | | | 0..n 1234004 | ... |

FIG. 123-142

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Requested Fulfillment Period 1234006 | | | 0..1 1234008 | DateTimePeriod 1234010 |
| | | | | | | | Acceptable Fulfillment Period 1234012 | | | 0..1 1234014 | DateTimePeriod 1234016 |
| | | | | | | | PeriodRole Code 1234018 | | | 1 1234020 | PeriodRoleCode 1234022 |
| TransportationGoodsInformation 1234024 | | | | | ProductInformation 1234026 | | | | | 0..n 1234028 | ... |
| | | | | | | Product 1234030 | | | | 0..1 1234032 | BusinessTransactionDocumentProduct 1234034 |
| | | | | | | ProductDescription 1234036 | | | | 0..1 1234038 | SHORT_Description 1234040 |

FIG. 123-143

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationGoodsIdentification 1234042 | | | | | 0..n 1234044 | ... |
| | | | | | | TransportationGoodsIdentifierTypeCode 1234046 | | | | 1 1234048 | TransportationGoodsIdentifierTypeCode 1234050 |
| | | | | | | LowerBoundaryTransportationGoodsID 1234052 | | | | 1 1234054 | TransportationGoodsID 1234056 |
| | | | | | | UpperBoundaryTransportationGoodsID 1234058 | | | | 0..1 1234060 | TransportationGoodsID 1234062 |

FIG. 123-144

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| TransportationChargesInformation 1234064 | | | | TransportationChargesInformation 1234066 | | | | | | 0..n 1234068 | ... |
| | | | | | TransportationChargesUsageCode 1234070 | | | | | 1 1234072 | TransportationChargesUsageCode 1234074 |
| | | | | | RequestForSupplierShipmentQuoteItemID 1234076 | | | | | 0..1 1234078 | BusinessTransactionDocumentItemID 1234080 |
| | | | | | RequestForSupplierShipmentQuotePartyStandardID 1234082 | | | | | 0..1 1234084 | PartyStandardID 1234086 |

FIG. 123-145

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RequestForSupplierShipmentQuotePartyInternalID 1234088 | | | | | 0,,1 1234090 | PartyInternalID 1234092 |
| | | | | | RequestForSupplierShipmentQuoteTransportationUnitResourceInformationID 1234094 | | | | | 0..1 1234096 | ResourceInformationID 1234098 |
| | | | | | RequestForSupplierShipmentQuotePackageInformationID 1234100 | | | | | 0..1 1234102 | PackageInformationID 1234104 |

FIG. 123-146

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RequestForSupplierShipmentQuoteTransportationStageID 1234106 | | | | | 0..1 1234108 | TransportationStageID 1234110 |
| | | | | | TransportationCharges 1234112 | | | | | 0..1 1234114 | … |
| | | | | | | ID 1234116 | | | | 1 1234118 | TransportationChargesID 1234120 |
| | | | | | | FreightAgreementID 1234122 | | | | 1 1234124 | FreightAgreementID 1234126 |
| | | | | | | OriginCode 1234128 | | | | 0..1 1234130 | TransportationChargesOriginCode 1234132 |

FIG. 123-147

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TariffID 1234134 | | | | 0..1 1234136 | TransportationChargesTariffID 1234138 |
| | | | | | | CalculationSheetID 1234140 | | | | 1 1234142 | TransportationChargesCalculationSheetID 1234144 |
| | | | | | | Location 1234146 | | | | 0..n 1234148 | ... |
| | | | | | | | Location 1234150 | | | 1 1234152 | BusinessTransactionDocumentLocation 1234154 |
| | | | | | | | RoleCode 1234156 | | | 1 1234158 | LoactionRoleCode 1234160 |
| | | | | | | | TypeCode 1234162 | | | 0..1 1234164 | LocationTypeCode 1234166 |

FIG. 123-148

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Name 1234168 | | | 0..1 1234170 | MEDIUM_Name 1234172 |
| | | | | | | | DateTimePeriods 1234174 | | | 0..n 1234176 | ... |
| | | | | | | | | Requested Fulfillment Period 1234178 | | 0..1 1234180 | DateTimePeriod 1234182 |
| | | | | | | | | Acceptable Fulfillment Period 1234184 | | 0..1 1234186 | DateTimePeriod 1234188 |
| | | | | | | | | PeriodRole Code 1234190 | | 1 1234192 | PeriodRoleCode 1234194 |
| | | | | | | TextCollection 1234196 | | | | 0..1 1234198 | ... |

FIG. 123-149

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TextCollection 1234200 | | | 1 1234202 | TextCollection 1234204 |
| | | | | | | Currency 1234206 | | | | 0..n 1234208 | ... |
| | | | | | | | Code 1234210 | | | 1 1234212 | CurrencyCode 1234214 |
| | | | | | | | RoleCode 1234216 | | | 1 1234218 | CurrencyRoleCode 1234220 |
| | | | | | | | UsageCode 1234222 | | | 0..1 1234224 | CurrencyUsageCode 1234226 |
| | | | | | | Exchange Rate 1234228 | | | | 0..n 1234230 | ... |
| | | | | | | | Exchange Rate 1234232 | | | 1 1234234 | ExchangeRate 1234236 |

FIG. 123-150

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TypeCode 1234238 | | | 0..1 1234240 | ExchangeRateTypeCode 1234242 |
| | | | | | | PercentElement 1234244 | | | | 0..n 1234246 | ... |
| | | | | | | | PercentRoleCode 1234248 | | | 1 1234250 | PercentRoleCode 1234252 |
| | | | | | | | Percent 1234254 | | | 1 1234256 | Percent 1234258 |
| | | | | | | | TransportationChargesPercentCalculationBaseCode 1234260 | | | 0..1 1234262 | TransportationChargesPercentCalculationBaseCode 1234264 |

FIG. 123-151

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StatusCode 1234266 | | | 0..1 1234268 | TransportationChargesPercentElementStatusCode 1234270 |
| | | | | | | DateTimePeriod 1234272 | | | | 0..n 1234274 | ... |
| | | | | | | | DateTimePeriod 1234276 | | | 1 1234278 | DateTimePeriod 1234280 |
| | | | | | | | PeriodRoleCode 1234282 | | | 1 1234284 | PeriodRoleCode 1234286 |
| | | | | | | BusinessTransactionDocumentReference 1234288 | | | | 0..n 1234290 | ... |

FIG. 123-152

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | BusinessTransactionDocumentReference 1234292 | | | 0..1 1234294 | BusinessTransactionDocumentReference 1234296 |
| | | | | | | | BusinessTransactionDocumentRelationshipRoleCode 1234298 | | | 0..1 1234300 | BusinessTransactionDocumentRelationshipRoleCode 1234302 |
| | | | | | | | BusinessTransactionDocumentRelationshipTypeCode 1234304 | | | 0..1 1234306 | BusinessTransactionDocumentRelationshipTypeCode 1234308 |

FIG. 123-153

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationDocumentTypeCode 1234310 | | | 0..1 1234312 | TransportationDocumentTypeCode 1234314 |
| | | | | | | | TransportationDocumentNote 1234316 | | | 0..1 1234318 | SHORT_Note 1234320 |
| | | | | | | | TransportationDocumentID 1234322 | | | 0..1 1234324 | TransportationDocumentID 1234326 |
| | | | | | | TaxDetail 1234328 | | | | 0..n 1234330 | ... |
| | | | | | | | ProductTax 1234332 | | | 1 1234334 | ProductTax 1234336 |
| | | | | | | PaymentInstruction 1234338 | | | | 0..n 1234340 | ... |

FIG. 123-154

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | PaymentInstruction 1234342 | | | 1 1234344 | PaymentInstruction 1234346 |
| | | | | | | | TransportationChargesElementCategoryCode 1234348 | | | 0..1 1234350 | TransportationChargesElementCategoryCode 1234352 |
| | | | | | | | TransportationChargesElementSubCategory Code 1234354 | | | 0..1 1234356 | TransportationChargesElementSubCategoryCode 1234358 |
| | | | | | | | TransportationChargesPaymentArrangement Code 1234360 | | | 0..1 1234362 | TransportationChargesPaymentArrangementCode 1234364 |

FIG. 123-155

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CashDiscountTerms 1234366 | | | | 0..1 1234368 | ... |
| | | | | | | | CashDiscountTerms 1234370 | | | 1 1234372 | CashDiscountTerms 1234374 |
| | | | | | | | TransportationChargesElementCategoryCode 1234376 | | | 0..1 1234378 | TransportationChargesElementCategoryCode 1234380 |
| | | | | | | | TransportationChargesElementSubCategoryCode 1234382 | | | 0..1 1234384 | TransportationChargesElementSubCategoryCode 1234386 |
| | | | | | | Element 1234388 | | | | 0..n 1234390 | ... |

FIG. 123-156

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CategoryCode 1234392 | | | 1 1234394 | TransportationChargesElementCategoryCode 1234396 |
| | | | | | | | SubCategoryCode 1234398 | | | 1 1234400 | TransportationChargesElementSubCategoryCode 1234402 |
| | | | | | | | TypeCode 1234404 | | | 1 1234406 | TransportationChargesElementTypeCode 1234408 |
| | | | | | | | CalculationResolutionCode 1234410 | | | 1 1234412 | TransportationChargesElementCalculationResolutionCode 1234414 |

FIG. 123-157

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationChargesPaymentArrangementCode 1234416 | | | 0...1 1234418 | TransportationChargesPaymentArrangementCode 1234420 |
| | | | | | | | Location 1234422 | | | 0..n 1234424 | ... |
| | | | | | | | | Location 1234426 | | 1 1234428 | BusinessTransactionDocumentLocation 1234430 |
| | | | | | | | | RoleCode 1234432 | | 1 1234434 | LocationRoleCode 1234436 |
| | | | | | | | | TypeCode 1234438 | | 0..1 1234440 | LocationTypeCode 1234442 |
| | | | | | | | | Name 1234444 | | 0..1 1234446 | MEDIUM_Name 1234448 |

FIG. 123-158

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | DateTimePeriods 1234450 | | 0..n 1234452 | ... |
| | | | | | | | | | Requested Fulfillment Period 1234454 | 0..1 1234456 | DateTimePeriod 1234458 |
| | | | | | | | | | Acceptable Fulfillment Period 1234460 | 0..1 1234462 | DateTimePeriod 1234464 |
| | | | | | | | | | PeriodRole Code 1234466 | 1 1234468 | PeriodRoleCode 1234470 |
| | | | | | | | TextCollection 1234472 | | | 0..1 1234474 | ... |
| | | | | | | | | TextCollection 1234476 | | 1 1234478 | TextCollection 1234480 |

FIG. 123-159

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Currency 1234482 | | | 0..n 1234484 | ... |
| | | | | | | | | Code 1234486 | | 1 1234488 | CurrencyCode 1234490 |
| | | | | | | | | RoleCode 1234492 | | 1 1234494 | CurrencyRoleCode 1234496 |
| | | | | | | | | UsageCode 1234498 | | 0..1 1234500 | CurrencyUsageCode 1234502 |
| | | | | | | | RateElement 1234504 | | | 0..n 1234506 | ... |
| | | | | | | | | ID 1234508 | | 1 1234510 | TransportationChargesElementRateElementID 1234512 |

FIG. 123-160

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Amount 1234514 | | 1 1234516 | Amount 1234518 |
| | | | | | | | | BaseQuantity 1234520 | | 1 1234522 | Quantity 1234524 |
| | | | | | | | | TransportationChargesRateTypeCode 1234526 | | 0..1 1234528 | TransportationChargesRateTypeCode 1234530 |
| | | | | | | | | TransportationChargesRateRoleCode 1234532 | | 1 1234534 | TransportationChargesRateRoleCode 1234536 |
| | | | | | | | | TransportationChargesRateElementStatusCode 1234538 | | 0..1 1234540 | TransportationChargesRateElementStatusCode 1234542 |

FIG. 123-161

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | PercentElement 1234544 | | | 0..n 1234546 | ... |
| | | | | | | | | PercentRoleCode 1234548 | | 1 1234550 | PercentRoleCode 1234552 |
| | | | | | | | | Percent 1234554 | | 1 1234556 | Percent 1234558 |
| | | | | | | | | TransportationChargesPercentCalculationBaseCode 1234560 | | 0..1 1234562 | TransportationChargesPercentCalculationBaseCode 1234564 |
| | | | | | | | | StatusCode 1234566 | | 0..1 1234568 | TransportationChargesPercentElementStatusCode 1234570 |

FIG. 123-162

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AmountElement 1234572 | | | 0..n 1234574 | ... |
| | | | | | | | | Amount 1234576 | | 1 1234578 | Amount 1234580 |
| | | | | | | | | AmountRoleCode 1234582 | | 1 1234584 | AmountRoleCode 1234586 |
| | | | | | | | | TransportationChargesAmountElementStatusCode 1234588 | | 0..1 1234590 | TransportationChargesAmountElementStatusCode 1234592 |
| | | | | | | | | RateElementlAssignment 1234594 | | 0..n 1234596 | ... |

FIG. 123-163

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | TransportationChargesElementRateElementID 1234598 | 1 1234600 | TransportationChargesElementRateElementID 1234602 |
| | | | | | | | Calculation Base 1234604 | | | 0..n 1234606 | ... |
| | | | | | | | | TransportationChargesElementCalculationBaseCode 1234608 | | 1 1234610 | TransportationChargesElementCalculationBaseCode 1234612 |
| | | | | | | | | BaseQuantity 1234614 | | 0..1 1234616 | Quantity 1234618 |

FIG. 123-164

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | BaseQuantityRoleCode 1234620 | | 0..1 1234622 | QuantityRoleCode 1234624 |
| | | | | | | | | BaseQuantityTypeCode 1234626 | | 0..1 1234628 | QuantityTypeCode 1234630 |
| | | | | | | | TaxDetail 1234632 | | | 0..n 1234634 | ... |
| | | | | | | | | ProductTax 1234636 | | 1 1234638 | ProductTax 1234640 |
| | | | | | | | DateTimePeriod 1234642 | | | 0..n 1234644 | ... |
| | | | | | | | | DateTimePeriod 1234646 | | 1 1234648 | DateTimePeriod 1234650 |

FIG. 123-165

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | PeriodRoleCode 1234652 | | 1 1234654 | PeriodRoleCode 1234656 |
| | | | | | | | CostDistribution 1234658 | | | 0..n 1234660 | ... |
| | | | | | | | | AccountingCodingBlockAssignment 1234662 | | 1 1234664 | AccountingCodingBlockAssignment 1234666 |

FIG. 124

| Package | level1 | level2 | level3 | Cardinality | Data Type Name |
|---|---|---|---|---|---|
| RequestForSupplierFreightQuoteCancelRequestMessage 124000 | RequestForSupplierFreightQuoteCancelRequestMessage 124002 | | | | RequestForSupplierFreightQuoteCancelRequestMessage 124004 |
| MessageHeader 124006 | | MessageHeader 124008 | | 1 124010 | BusinessDocumentMessageHeader 124012 |
| RequestForSupplierFreightQuote 124014 | | RequestForSupplier-FreightQuote 124016 | | 1 124018 | ... |
| | | | ID 124020 | 1 124022 | BusinessTransactionDocumentID 124024 |

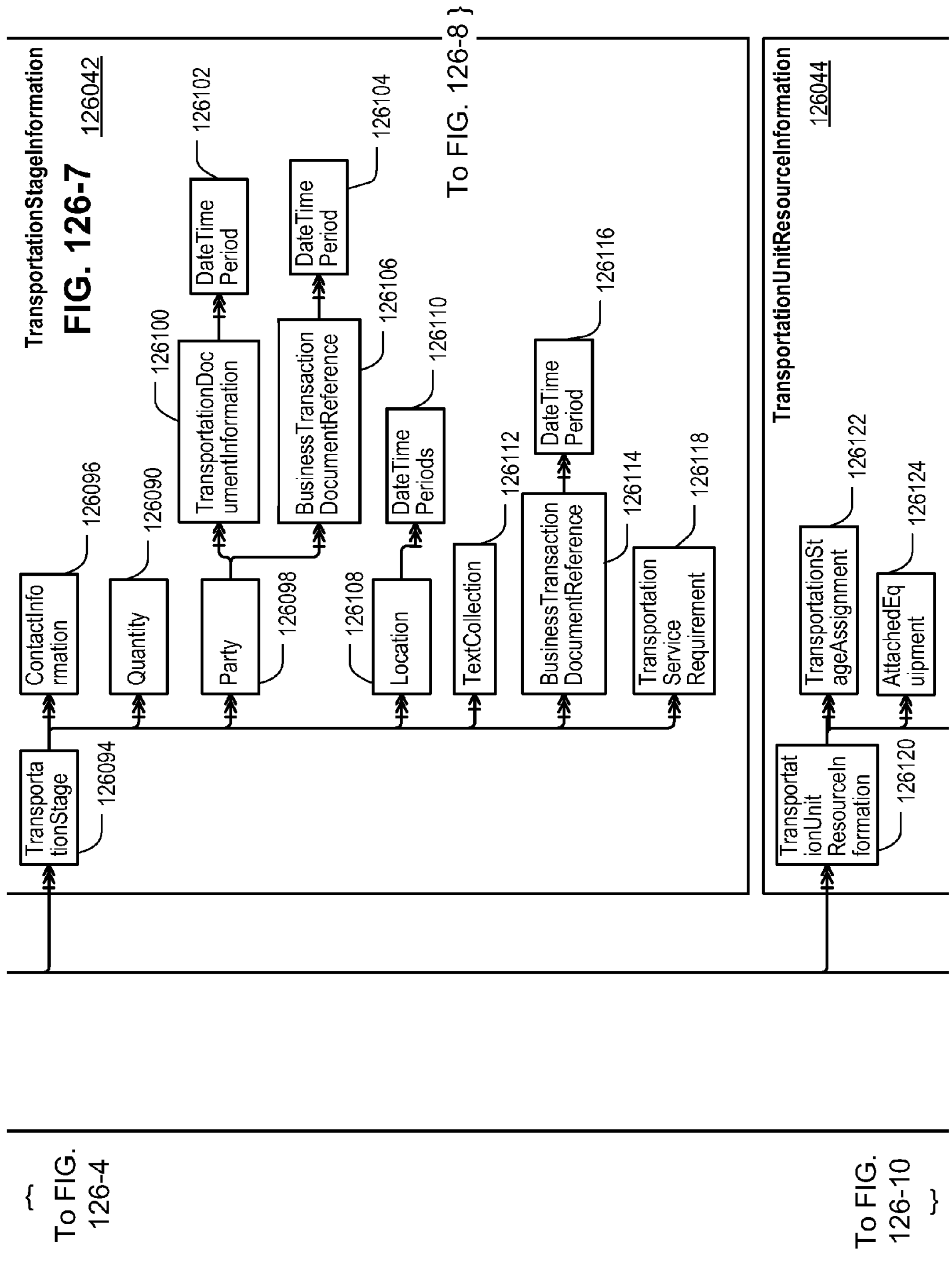
FIG. 126-7
TransportationStageInformation
126042
To FIG. 126-8
TransportationStage
126094
ContactInformation
126096
Quantity
126090
Party
126098
TransportationDocumentInformation
126100
DateTime Period
126102
BusinessTransaction DocumentReference
126106
DateTime Period
126104
Location
126108
DateTime Periods
126110
TextCollection
126112
BusinessTransaction DocumentReference
126114
DateTime Period
126116
Transportation Service Requirement
126118
TransportationUnitResourceInformation
126044
TransportationUnit ResourceInformation
126120
TransportationStageAssignment
126122
AttachedEquipment
126124
To FIG. 126-4
To FIG. 126-10

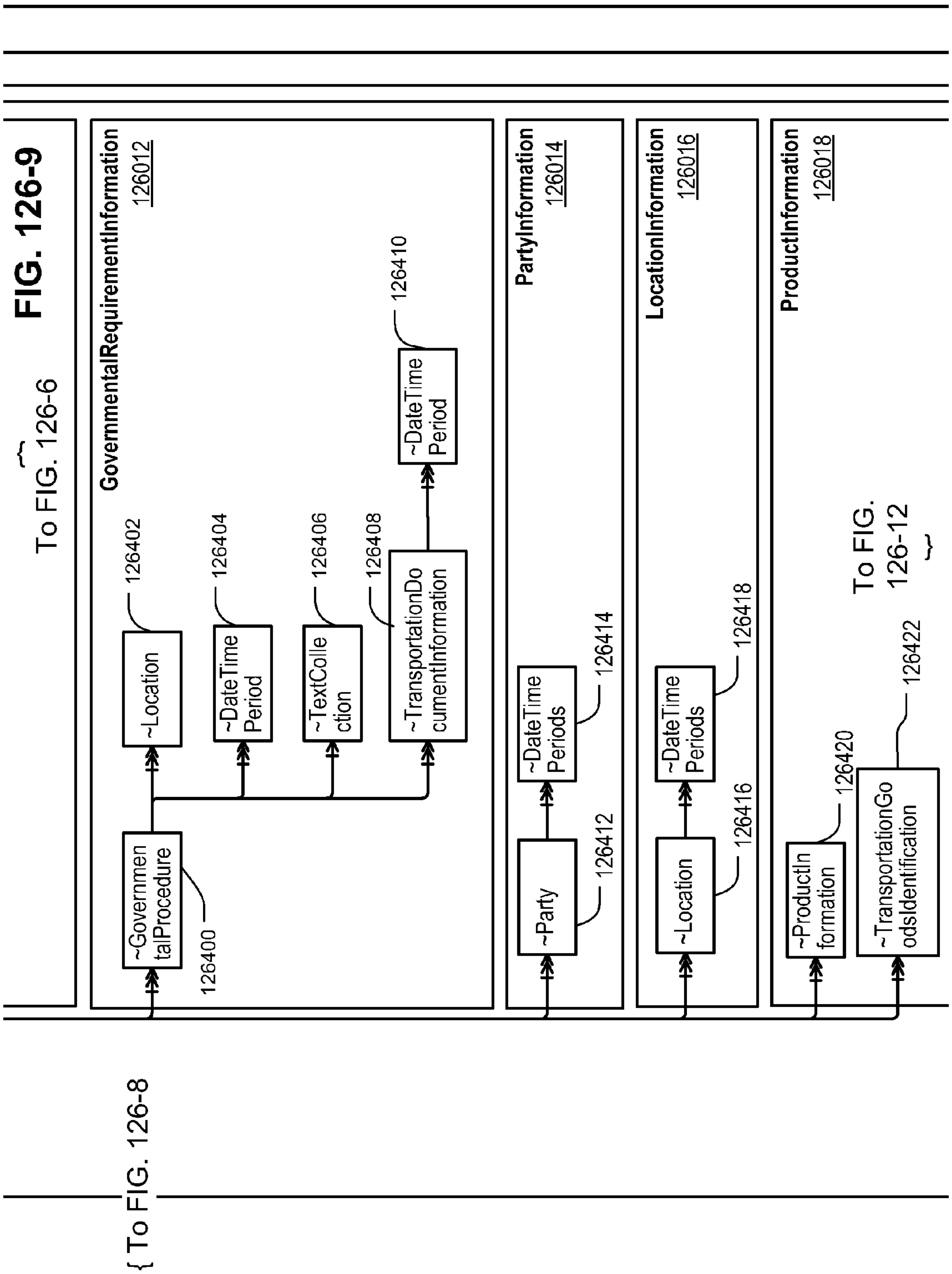
FIG. 126-9
To FIG. 126-6
To FIG. 126-8
To FIG. 126-12
GovernmentalRequirementInformation
126012
~GovernmentalProcedure
126400
~Location
126402
~DateTime Period
126404
~TextCollection
126406
~TransportationDocumentInformation
126408
~DateTime Period
126410
PartyInformation
126014
~Party
126412
~DateTime Periods
126414
LocationInformation
126016
~Location
126416
~DateTime Periods
126418
ProductInformation
126018
~ProductInformation
126420
~TransportationGoodsIdentification
126422

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| SupplierFreightQuoteNotificationMessage 1270000 | SupplierFreightQuoteNotificationMessage 1270002 | | | | | | | | | | SupplierFreightQuoteNotificationMessage 1270004 |
| MessageHeader 1270006 | | MessageHeader 1270008 | | | | | | | | 1..1 1270010 | BusinessDocumentMessageHeader 1270012 |
| SupplierFreightQuote 1270014 | | SupplierFreightQuote 1270016 | | | | | | | | 1..1 1270018 | ... |
| | | | ID 1270020 | | | | | | | 1..1 1270022 | BusinessTransactionDocumentID 1270024 |
| HeaderInformation 1270026 | | | DateTimePeriods 1270028 | | | | | | | 0..n 1270030 | ... |

FIG. 127-2

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | RequestedFulfillmentPeriod 1270032 | | | | | | 0..1 1270034 | DateTimePeriod 1270036 |
| | | | | AcceptableFulfillmentPeriod 1270038 | | | | | | 0..1 1270040 | DateTimePeriod 1270042 |
| | | | | PeriodRoleCode 1270044 | | | | | | 1..1 1270046 | PeriodRoleCode 1270048 |
| | | | NatureOfCargo 1270050 | | | | | | | 0..n 1270052 | ... |
| | | | | ClassificationCode 1270054 | | | | | | 1..1 1270056 | NatureOfCargoClassificationCode 1270058 |
| | | | TotalQuantity 1270060 | | | | | | | 0..n 1270062 | ... |

FIG. 127-3

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | Quantity 1270064 | | | | | | 1 1270066 | Quantity 1270068 |
| | | | | RoleCode 1270070 | | | | | | 0..1 1270072 | QuantityRoleCode 1270074 |
| | | | | TypeCode 1270076 | | | | | | 0..1 1270078 | QuantityTypeCode 1270080 |
| | | | TotalAmount 1270082 | | | | | | | 0..n 1270084 | ... |
| | | | | Amount 1270086 | | | | | | 1..1 1270088 | Amount 1270090 |
| | | | | RoleCode 1270092 | | | | | | 1..1 1270094 | AmountRoleCode 1270096 |
| | | | TextCollection 1270098 | | | | | | | 0..1 1270100 | ... |

FIG. 127-4

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TextCollection 1270102 | | | | | | 1..1 1270104 | TextCollection 1270106 |
| | | | BusinessTransactionDocumentReference 1270108 | | | | | | | 0..n 1270110 | ... |
| | | | | BusinessTransactionDocumentReference 1270112 | | | | | | 0..1 1270114 | BusinessTransactionDocumentReference 1270116 |
| | | | | BusinessTransactionDocumentRelationshipRoleCode 1270118 | | | | | | 0..1 1270120 | BusinessTransactionDocumentRelationshipRoleCode 1270122 |

FIG. 127-5

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | BusinessTransactionDocumentRelationshipTypeCode 1270124 | | | | | | 0..1 1270126 | BusinessTransactionDocumentRelationshipTypeCode 1270128 |
| | | | | TransportationDocumentTypeCode 1270130 | | | | | | 0..1 1270132 | TransportationDocumentTypeCode 1270134 |
| | | | | TransportationDocumentNote 1270136 | | | | | | 0..1 1270138 | SHORT_Note 1270140 |
| | | | | TransportationDocumentID 1270142 | | | | | | 0..1 1270144 | TransportationDocumentID 1270146 |

FIG. 127-6

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | DateTime Period 1270148 | | | | | | 0..n 1270150 | ... |
| | | | | | DateTimePeriod 1270152 | | | | | 1..1 1270154 | DateTimePeriod 1270156 |
| | | | | | PeriodRoleCode 1270158 | | | | | 1..1 1270160 | PeriodRoleCode 1270162 |
| | | | | RequestForSupplierFreightQuoteAcceptanceStatus 1270164 | | | | | | 0..1 1270166 | ... |
| | | | | | AcceptanceStatusCode 1270168 | | | | | 1 1270170 | AcceptanceStatusCode 1270172 |

FIG. 127-7

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RequestForQuoteRejectionReasonCode 1270174 | | | | | 0..1 1270176 | RequestForQuoteRejectionReasonCode 1270178 |
| GovernmentalRequirementInformation 1270180 | | | GovernmentalProcedure 1270182 | | | | | | | 0..n 1270184 | ... |
| | | | | TransportationGovernmentAgencyTypeCode 1270186 | | | | | | 0..1 1270188 | TransportationGovernmentAgencyTypeCode 1270190 |
| | | | | TransportationMovementTypeCode 1270192 | | | | | | 0..1 1270194 | TransportationMovementTypeCode 1270196 |

FIG. 127-8

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationGovernmentAgencyInvolvementStatusCode 1270198 | | | | | | 0..1 1270200 | TransportationGovernmentAgencyInvolvementStatusCode 1270202 |
| | | | | TransportationGovernmentAgencyActionCode 1270204 | | | | | | 0..1 1270206 | TransportationGovernmentAgencyActionCode 1270208 |
| | | | | TransportationGovernmentAgencyProcedureStatusCode 1270210 | | | | | | 0..1 1270212 | TransportationGovernmentAgencyProcedureStatusCode 1270214 |
| | | | | Location 1270216 | | | | | | 0..n 1270218 | ... |

FIG. 127-9

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | Location 1270220 | | | | | 1..1 1270222 | BusinessTransactionDocumentLocation 1270224 |
| | | | | | RoleCode 1270226 | | | | | 1..1 1270228 | LocationRoleCode 1270230 |
| | | | | | TypeCode 1270232 | | | | | 0..1 1270234 | LocationTypeCode 1270236 |
| | | | | | Name 1270238 | | | | | 0..1 1270240 | MEDIUM_Name 1270242 |
| | | | | DateTime Period 1270244 | | | | | | 0..n 1270246 | ... |
| | | | | | DateTimePeriod 1270248 | | | | | 1..1 1270250 | DateTimePeriod 1270252 |

FIG. 127-10

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PeriodRoleCode 1270254 | | | | | 1..1 1270256 | PeriodRoleCode 1270258 |
| | | | | TextCollection 1270260 | | | | | | 0..1 1270262 | ... |
| | | | | | TextCollection 1270264 | | | | | 1..1 1270266 | TextCollection 1270268 |
| | | | | TransportationDocumentInformation 1270270 | | | | | | 0..n 1270272 | ... |
| | | | | | TransportationDocumentTypeCode 1270274 | | | | | 0..1 1270276 | TransportationDocumentTypeCode 1270278 |

FIG. 127-11

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentNote 1270280 | | | | | 0..1 1270282 | SHORT_Note 1270284 |
| | | | | | TransportationDocumentID 1270286 | | | | | 0..1 1270288 | TransportationDocumentID 1270290 |
| | | | | | TransportationDocumentStatusCode 1270292 | | | | | 0..1 1270294 | TransportationDocumentStatusCode 1270296 |
| | | | | | LanguageCode 1270298 | | | | | 0..1 1270300 | LanguageCode 1270302 |
| | | | | | CommunicationMediumTypeCode 1270304 | | | | | 0..1 1270306 | CommunicationMediumTypeCode 1270308 |

FIG. 127-12

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RequiredIndicator 1270310 | | | | | 1 1270312 | Indicator 1270314 |
| | | | | | OutputCopyNumberValue 1270316 | | | | | 0..1 1270318 | NumberValue 1270320 |
| | | | | | OutputOriginalNumberValue 1270322 | | | | | 0..1 1270324 | NumberValue 1270326 |
| | | | | | DateTimePeriod 1270328 | | | | | 0..n 1270330 | ... |
| | | | | | | DateTimePeriod 1270332 | | | | 1..1 1270334 | DateTimePeriod 1270336 |
| | | | | | | PeriodRoleCode 1270338 | | | | 1..1 1270340 | PeriodRoleCode 1270342 |

FIG. 127-13

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| PartyInformation 1270344 | | | Party 1270346 | | | | | | | 0..n 1270348 | ... |
| | | | | Party 1270350 | | | | | | 1 1270352 | BusinessTransactionDocumentParty 1270354 |
| | | | | RoleCode 1270356 | | | | | | 1 1270358 | PartyRoleCode 1270360 |
| | | | | FormattedName 1270362 | | | | | | 0..1 1270364 | LONG_Name 1270366 |
| | | | | BusinessTransactionDocumentReference 1270368 | | | | | | 0..n 1270370 | ... |

FIG. 127-14

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentReference 1270372 | | | | | 0..1 1270374 | BusinessTransactionDocumentReference 1270376 |
| | | | | | BusinessTransactionDocumentRelationshipRoleCode 1270378 | | | | | 0..1 1270380 | BusinessTransactionDocumentRelationshipRoleCode 1270382 |
| | | | | | BusinessTransactionDocumentRelationshipTypeCode 1270384 | | | | | 0..1 1270386 | BusinessTransactionDocumentRelationshipTypeCode 1270388 |
| | | | | | TransportationDocumentTypeCode 1270390 | | | | | 0..1 1270392 | TransportationDocumentTypeCode 1270394 |

FIG. 127-15

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentNote 1270396 | | | | | 0..1 1270398 | SHORT_Note 1270400 |
| | | | | | TransportationDocumentID 1270402 | | | | | 0..1 1270404 | TransportationDocumentID 1270406 |
| | | | | | DateTimePeriod 1270408 | | | | | 0..n 1270410 | ... |
| | | | | | | DateTimePeriod 1270412 | | | | 1 1270414 | DateTimePeriod 1270416 |
| | | | | | | PeriodRoleCode 1270418 | | | | 1 1270420 | PeriodRoleCode 1270422 |
| TransportationStageInformation 1270424 | | | TransportationStage 1270426 | | | | | | | 0..n 1270428 | ... |

FIG. 127-16

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ID 1270430 | | | | | | 1 1270432 | TransportationStageID 1270434 |
| | | | | OrdinalNumberValue 1270436 | | | | | | 0..1 1270438 | OrdinalNumberValue 1270440 |
| | | | | TypeCode 1270442 | | | | | | 0..1 1270444 | TransportationStageTypeCode 1270446 |
| | | | | JourneyID 1270448 | | | | | | 0..1 1270450 | JourneyID 1270452 |
| | | | | TransportModeCode 1270454 | | | | | | 0..1 1270456 | TransportModeCode 1270458 |

FIG. 127-17

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportMeansDescriptionCode 1270460 | | | | | | 0..1 1270462 | TransportMeansDescriptionCode 1270464 |
| | | | | TransportMeansDescription 1270466 | | | | | | 0..1 1270468 | SHORT_Description 1270470 |
| | | | | TransportMeansID 1270472 | | | | | | 0..1 1270474 | TransportMeansID 1270476 |
| | | | | TransportMeansHomeCountryCode 1270478 | | | | | | 0..1 1270480 | CountryCode 1270482 |

FIG. 127-18

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportMeansOwnershipTypeCode 1270484 | | | | | | 0..1 1270486 | TransportMeansOwnershipTypeCode 1270488 |
| | | | | CarrierStandardID 1270490 | | | | | | 0..1 1270492 | PartyStandardID 1270494 |
| | | | | CarrierFormattedName 1270496 | | | | | | 0..1 1270498 | LONG_Name 1270500 |
| | | | | TransportationTransitDirectionCode 1270502 | | | | | | 0..1 1270504 | TransportationTransitDirectionCode 1270506 |
| | | | | CalculatedDistanceMeasure 1270508 | | | | | | 0..1 1270510 | Measure 1270512 |

FIG. 127-19

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | GivenDistanceMeasure 1270514 | | | | | | 0..1 1270516 | Measure 1270518 |
| | | | | ContactInformation 1270520 | | | | | | 0..n 1270522 | ... |
| | | | | | ContactPersonFunctionTypeCode 1270524 | | | | | 1..1 1270526 | ContactPersonFunctionTypeCode 1270528 |
| | | | | | Address 1270530 | | | | | 1..1 1270532 | Address 1270534 |
| | | | | Quantity 1270536 | | | | | | 0..n 1270538 | ... |
| | | | | | Quantity 1270540 | | | | | 1 1270542 | Quantity 1270544 |
| | | | | | RoleCode 1270546 | | | | | 0..1 1270548 | QuantityRoleCode 1270550 |

FIG. 127-20

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TypeCode 1270552 | | | | | 0..1 1270554 | QuantityTypeCode 1270556 |
| | | | | Party 1270558 | | | | | | 1..n 1270560 | ... |
| | | | | | Party 1270562 | | | | | 1 1270564 | BusinessTransactionDocumentParty 1270566 |
| | | | | | RoleCode 1270568 | | | | | 1 1270570 | PartyRoleCode 1270572 |
| | | | | | FormattedName 1270574 | | | | | 0..1 1270576 | LONG_Name 1270578 |
| | | | | | TransportationDocumentInformation 1270580 | | | | | 0..n 1270582 | ... |

FIG. 127-21

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentTypeCode 1270584 | | | | 0..1 1270586 | TransportationDocumentTypeCode 1270588 |
| | | | | | | TransportationDocumentNote 1270590 | | | | 0..1 1270592 | SHORT_Note 1270594 |
| | | | | | | TransportationDocumentID 1270596 | | | | 0..1 1270598 | TransportationDocumentID 1270600 |
| | | | | | | TransportationDocumentStatusCode 1270602 | | | | 0..1 1270604 | TransportationDocumentStatusCode 1270606 |
| | | | | | | LanguageCode 1270608 | | | | 0..1 1270610 | LanguageCode 1270612 |

FIG. 127-22

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CommunicationMediumTypeCode 1270614 | | | | 0..1 1270616 | CommunicationMediumTypeCode 1270618 |
| | | | | | | RequiredIndicator 1270620 | | | | 1 1270622 | Indicator 1270624 |
| | | | | | | OutputCopyNumberValue 1270626 | | | | 0..1 1270628 | NumberValue 1270630 |
| | | | | | | OutputOriginalNumberValue 1270632 | | | | 0..1 1270634 | NumberValue 1270636 |
| | | | | | | DateTimePeriod 1270638 | | | | 0..n 1270640 | ... |

FIG. 127-23

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DateTimePeriod 1270642 | | | 1 1270644 | DateTimePeriod 1270646 |
| | | | | | | | PeriodRoleCode 1270648 | | | 1 1270650 | PeriodRoleCode 1270652 |
| | | | | | BusinessTransactionDocumentReference 1270654 | | | | | 0..n 1270656 | ... |
| | | | | | | BusinessTransactionDocumentReference 1270658 | | | | 0..1 1270660 | BusinessTransactionDocumentReference 1270662 |
| | | | | | | BusinessTransactionDocumentRelationshipRoleCode 1270664 | | | | 0..1 1270666 | BusinessTransactionDocumentRelationshipRoleCode 1270668 |

FIG. 127-24

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentRelationshipTypeCode 1270670 | | | | 0..1 1270672 | BusinessTransactionDocumentRelationshipTypeCode 1270674 |
| | | | | | | TransportationDocumentTypeCode 1270676 | | | | 0..1 1270678 | TransportationDocumentTypeCode 1270680 |
| | | | | | | TransportationDocumentNote 1270682 | | | | 0..1 1270684 | SHORT_Note 1270686 |
| | | | | | | TransportationDocumentID 1270688 | | | | 0..1 1270690 | TransportationDocumentID 1270692 |
| | | | | | | DateTimePeriod 1270694 | | | | 0..n 1270696 | ... |

FIG. 127-25

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DateTimePeriod 1270698 | | | 1..1 1270700 | DateTimePeriod 1270702 |
| | | | | | | | PeriodRoleCode 1270704 | | | 1..1 1270706 | PeriodRoleCode 1270708 |
| | | | | Location 1270710 | | | | | | 1..n 1270712 | ... |
| | | | | | Location 1270714 | | | | | 1 1270716 | BusinessTransactionDocumentLocation 1270718 |
| | | | | | RoleCode 1270720 | | | | | 1 1270722 | LocationRoleCode 1270724 |
| | | | | | TypeCode 1270726 | | | | | 0..1 1270728 | LocationTypeCode 1270730 |
| | | | | | Name 1270732 | | | | | 0..1 1270734 | MEDIUM_Name 1270736 |

FIG. 127-26

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | DateTimePeriods 1270738 | | | | | 0..n 1270740 | ... |
| | | | | | | RequestDateTimePeriod 1270742 | | | | 0..1 1270744 | DateTimePeriod 1270746 |
| | | | | | | AcceptableDateTimePeriod 1270748 | | | | 0..1 1270750 | DateTimePeriod 1270752 |
| | | | | | | PeriodRoleCode 1270754 | | | | 1..1 1270756 | PeriodRoleCode 1270758 |
| | | | | TextCollection 1270760 | | | | | | 0..1 1270762 | ... |
| | | | | | TextCollection 1270764 | | | | | 1..1 1270766 | TextCollection 1270768 |

FIG. 127-27

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | BusinessTransactionDocumentReference 1270770 | | | | | | 0..n 1270772 | ... |
| | | | | | BusinessTransactionDocumentReference 1270774 | | | | | 0..1 1270776 | BusinessTransactionDocumentReference 1270778 |
| | | | | | BusinessTransactionDocumentRelationshipRoleCode 1270780 | | | | | 0..1 1270782 | BusinessTransactionDocumentRelationshipRoleCode 1270784 |

FIG. 127-28

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentRelationshipTypeCode 1270786 | | | | | 0..1 1270788 | BusinessTransactionDocumentRelationshipTypeCode 1270790 |
| | | | | | TransportationDocumentTypeCode 1270792 | | | | | 0..1 1270794 | TransportationDocumentTypeCode 1270796 |
| | | | | | TransportationDocumentNote 1270798 | | | | | 0..1 1270800 | SHORT_Note 1270802 |
| | | | | | TransportationDocumentID 1270804 | | | | | 0..1 1270806 | TransportationDocumentID 1270808 |
| | | | | | DateTimePeriod 1270810 | | | | | 0..n 1270812 | ... |

FIG. 127-29

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DateTimePeriod 1270814 | | | | 1..1 1270816 | DateTimePeriod 1270818 |
| | | | | | | PeriodRoleCode 1270820 | | | | 1 1270822 | PeriodRoleCode 1270824 |
| | | | | TransportationServiceRequirement 1270826 | | | | | | 1..1 1270828 | ... |
| | | | | | TransportationServiceRequirementCode 1270830 | | | | | 0..1 1270832 | TransportationServiceRequirementCode 1270834 |
| | | | | | AdditionalTransportationServiceRequirementCode 1270836 | | | | | 0..1 1270838 | TransportationServiceRequirementCode 1270840 |

FIG. 127-30

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationContractConditionCode 1270842 | | | | | 0..1 1270844 | TransportationContractConditionCode 1270846 |
| | | | | | TransportServiceLevelCode 1270848 | | | | | 0..1 1270850 | TransportServiceLevelCode 1270852 |
| | | | | | NatureOfCargoClassificationCode 1270854 | | | | | 0..1 1270856 | NatureOfCargoClassificationCode 1270858 |
| TransportationUnitResourceInformation 1270860 | | | TransportationUnitResourceInformation 1270862 | | | | | | | 0..n 1270864 | ... |
| | | | | ID 1270866 | | | | | | 1 1270868 | ResourceInformationID 1270870 |

FIG. 127-31

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | ResourceNumberValue 1270872 | | | | | | 0..1 1270874 | NumberValue 1270876 |
| | | | | ResourceID 1270878 | | | | | | 0..1 1270880 | ResourceID 1270882 |
| | | | | ResourceHomeCountryCode 1270884 | | | | | | 0..1 1270886 | CountryCode 1270888 |
| | | | | TransportationUnit Resource Category Code 1270890 | | | | | | 0..1 1270892 | TransportationUnitResourceCategoryCode 1270894 |

FIG. 127-32

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationUnitResourceTypeCode 1270896 | | | | | | 0..1 1270898 | TransportationUnitResourceTypeCode 1270900 |
| | | | | FillLevelCode 1270902 | | | | | | 0..1 1270904 | FillLevelCode 1270906 |
| | | | | ShippingTypeCode 1270908 | | | | | | 0..1 1270910 | ShippingTypeCode 1270912 |
| | | | | HaulageArrangerCode 1270914 | | | | | | 0..1 1270916 | HaulageArrangerCode 1270918 |
| | | | | TransportationHandlingInstructionCode 1270920 | | | | | | 0..1 1270922 | TransportationHandlingInstructionCode 1270924 |

FIG. 127-33

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationHandlingInstructionNote 1270926 | | | | | | 0..1 1270928 | LONG_Note 1270930 |
| | | | | TransportationStageAssignment 1270932 | | | | | | 0..n 1270934 | ... |
| | | | | | SupplierFreightQuoteTransportationStageID 1270936 | | | | | 1..1 1270938 | TransportationStageID 1270940 |
| | | | | AttachedEquipment 1270942 | | | | | | 0..n 1270944 | ... |

FIG. 127-34

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | SupplierFreightQuoteTransportationUnitResourceInformationID 1270946 | | | | | 1..1 1270948 | ResourceID 1270950 |
| | | | | Quantity 1270952 | | | | | | 0..n 1270954 | ... |
| | | | | | Quantity 1270956 | | | | | 1 1270958 | Quantity 1270960 |
| | | | | | RoleCode 1270962 | | | | | 0..1 1270964 | QuantityRoleCode 1270966 |
| | | | | | TypeCode 1270968 | | | | | 0..1 1270970 | QuantityTypeCode 1270972 |

FIG. 127-35

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | BusinessTransactionDocumentReference 1270974 | | | | | | 0..n 1270976 | ... |
| | | | | | BusinessTransactionDocumentReference 1270978 | | | | | 0..1 1270980 | BusinessTransactionDocumentReference 1270982 |
| | | | | | BusinessTransactionDocumentRelationshipRoleCode 1270984 | | | | | 0..1 1270986 | BusinessTransactionDocumentRelationshipRoleCode 1270988 |
| | | | | | BusinessTransactionDocumentRelationshipTypeCode 1270990 | | | | | 0..1 1270992 | BusinessTransactionDocumentRelationshipTypeCode 1270994 |

FIG. 127-36

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentTypeCode 1270996 | | | | | 0..1 1270998 | TransportationDocumentTypeCode 1271000 |
| | | | | | TransportationDocumentNote 1271002 | | | | | 0..1 1271004 | SHORT_Note 1271006 |
| | | | | | TransportationDocumentID 1271008 | | | | | 0..1 1271010 | TransportationDocumentID 1271012 |
| | | | | | DateTimePeriod 1271014 | | | | | 0..n 1271016 | ... |
| | | | | | | DateTimePeriod 1271018 | | | | 1..1 1271020 | DateTimePeriod 1271022 |

FIG. 127-37

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | PeriodRoleCode 1271024 | | | | 1..1 1271026 | PeriodRoleCode 1271028 |
| | | | | TextCollection 1271030 | | | | | | 0..1 1271032 | ... |
| | | | | | TextCollection 1271034 | | | | | 1..1 1271036 | TextCollection 1271038 |
| | | | | Party 1271040 | | | | | | 1..n 1271042 | ... |
| | | | | | Party 1271044 | | | | | 1..1 1271046 | BusinessTransactionDocumentParty 1271048 |
| | | | | | RoleCode 1271050 | | | | | 1..1 1271052 | PartyRoleCode 1271054 |
| | | | | Location 1271056 | | | | | | 0..n 1271058 | ... |

FIG. 127-38

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | Location 1271060 | | | | | 1 1271062 | BusinessTransactionDocumentLocation 1271064 |
| | | | | | RoleCode 1271066 | | | | | 1 1271068 | LocationRoleCode 1271070 |
| | | | | | TypeCode 1271072 | | | | | 0..1 1271074 | LocationTypeCode 1271076 |
| | | | | | Name 1271078 | | | | | 0..1 1271080 | MEDIUM_Name 1271082 |
| | | | | | DateTimePeriods 1271084 | | | | | 0..n 1271086 | ... |
| | | | | | | RequestDateTimePeriod 1271088 | | | | 0..1 1271090 | DateTimePeriod 1271092 |

FIG. 127-39

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AcceptableDateTimePeriod 1271094 | | | | 0..1 1271096 | DateTimePeriod 1271098 |
| | | | | | | PeriodRoleCode 1271100 | | | | 1..1 1271102 | PeriodRoleCode 1271104 |
| | | | | DangerousGoods 1271106 | | | | | | 0..n 1271108 | ... |
| | | | | | ID 1271110 | | | | | 0..1 1271112 | DangerousGoodsID 1271114 |
| | | | | | RegulationsCode 1271116 | | | | | 0..1 1271118 | DangerousGoodsRegulationsCode 1271120 |
| | | | | | HazardCode 1271122 | | | | | 0..1 1271124 | DangerousGoodsHazardCode 1271126 |

FIG. 127-40

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | FlashpointMeasureInterval 1271128 | | | | | 0..1 1271130 | MeasureInterval 1271132 |
| | | | | | PackagingGroupCode 1271134 | | | | | 0..1 1271136 | DangerousGoodsPackagingGroupCode 1271138 |
| | | | | | EmergencySchedule 1271140 | | | | | 0..1 1271142 | DangerousGoodsEmergencySchedule 1271144 |
| | | | | | TransportEmergencyCardCode 1271146 | | | | | 0..1 1271148 | TransportEmergencyCardCode 1271150 |
| | | | | | DangerousGoodsLabelCode 1271152 | | | | | 0..1 1271154 | DangerousGoodsLabelCode 1271156 |

FIG. 127-41

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | DangerousGoodsLabelCode2 1271158 | | | | | 0..1 1271160 | DangerousGoodsLabelCode 1271162 |
| | | | | | DangerousGoodsLabelCode3 1271164 | | | | | 0..1 1271166 | DangerousGoodsLabelCode 1271168 |
| | | | | | PackagingInstructionTypeCode 1271170 | | | | | 0..1 1271172 | PackagingInstructionTypeCode 1271174 |
| | | | | | TransportMeansDescriptionCode 1271176 | | | | | 0..1 1271178 | TransportMeansDescriptionCode 1271180 |
| | | | | | TransportationAuthorisationCode 1271182 | | | | | 0..1 1271184 | DangerousGoodsTransportationAuthorisationCode 1271186 |

FIG. 127-42

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ContactInformation 1271188 | | | | | 0..n 1271190 | ... |
| | | | | | | ContactPersonFunctionTypeCode 1271192 | | | | 1..1 1271194 | ContactPersonFunctionTypeCode 1271196 |
| | | | | | | Address 1271198 | | | | 1..1 1271200 | Address 1271202 |
| | | | | | TextCollection 1271204 | | | | | 0..1 1271206 | ... |
| | | | | | | TextCollection 1271208 | | | | 1..1 1271210 | TextCollection 1271212 |
| TransportationChargesInformation 1271214 | | | TransportationChargesInformation 1271216 | | | | | | | 0..n 1271218 | ... |

FIG. 127-43

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | TransportationChargesUsageCode 1271220 | | | | | | 1..1 1271222 | TransportationChargesUsageCode 1271224 |
| | | | | SupplierFreightQuotePartyStandardID 1271226 | | | | | | 0..1 1271228 | PartyStandardID 1271230 |
| | | | | SupplierFreightQuotePartyInternalID 1271232 | | | | | | 0..1 1271234 | PartyInternalID 1271236 |
| | | | | SupplierFreightQuoteTransportationUnitResourceInformationID 1271238 | | | | | | 0..1 1271240 | ResourceID 1271242 |

FIG. 127-44

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | SupplierFreightQuoteTransportationStageID 1271244 | | | | | | 0..1 1271246 | TransportationStageID 1271248 |
| | | | | TransportationCharges 1271250 | | | | | | 0..1 1271252 | ... |
| | | | | | ID 1271254 | | | | | 1 1271256 | TransportationChargesID 1271258 |
| | | | | | FreightAgreementID 1271260 | | | | | 1 1271262 | FreightAgreementID 1271264 |
| | | | | | OriginCode 1271266 | | | | | 0..1 1271268 | TransportationChargesOriginCode |
| | | | | | TariffID 1271272 | | | | | 0..1 1271274 | TransportationChargesTariffID 1271276 |

FIG. 127-45

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | Calculation SheetID 1271278 | | | | | 1 1271280 | TransportationChargesCalculationSheetID 1271282 |
| | | | | | Location 1271284 | | | | | 0..n 1271286 | ... |
| | | | | | | Location 1271288 | | | | 1 1271290 | BusinessTransactionDocumentLocation 1271292 |
| | | | | | | RoleCode 1271294 | | | | 1 1271296 | LoactionRoleCode 1271298 |
| | | | | | | TypeCode 1271300 | | | | 0..1 1271302 | LocationTypeCode 1271304 |
| | | | | | | Name 1271306 | | | | 0..1 1271308 | MEDIUM_Name 1271310 |

FIG. 127-46

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DateTimePeriods 1271312 | | | | 0..n 1271314 | ... |
| | | | | | | | RequestedFulfillmentPeriod 1271316 | | | 0..1 1271318 | DateTimePeriod 1271320 |
| | | | | | | | AcceptableFulfillmentPeriod 1271322 | | | 0..1 1271324 | DateTimePeriod 1271326 |
| | | | | | | | PeriodRoleCode 1271328 | | | 1 1271330 | PeriodRoleCode 1271332 |
| | | | | | TextCollection 1271334 | | | | | 0..1 1271336 | ... |
| | | | | | | TextCollection 1271338 | | | | 1..1 1271340 | TextCollection 1271342 |

FIG. 127-47

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | Currency 1271344 | | | | | 0..n 1271346 | ... |
| | | | | | | Code 1271348 | | | | 1..1 1271350 | CurrencyCode 1271352 |
| | | | | | | RoleCode 1271354 | | | | 1..1 1271356 | CurrencyRoleCode 1271358 |
| | | | | | | UsageCode 1271360 | | | | 0..1 1271362 | CurrencyUsageCode 1271364 |
| | | | | | ExchangeRate 1271366 | | | | | 0..n 1271368 | ... |
| | | | | | | ExchangeRate 1271370 | | | | 1..1 1271372 | ExchangeRate 1271374 |
| | | | | | | TypeCode 1271376 | | | | 0..1 1271378 | ExchangeRateTypeCode 1271380 |

FIG. 127-48

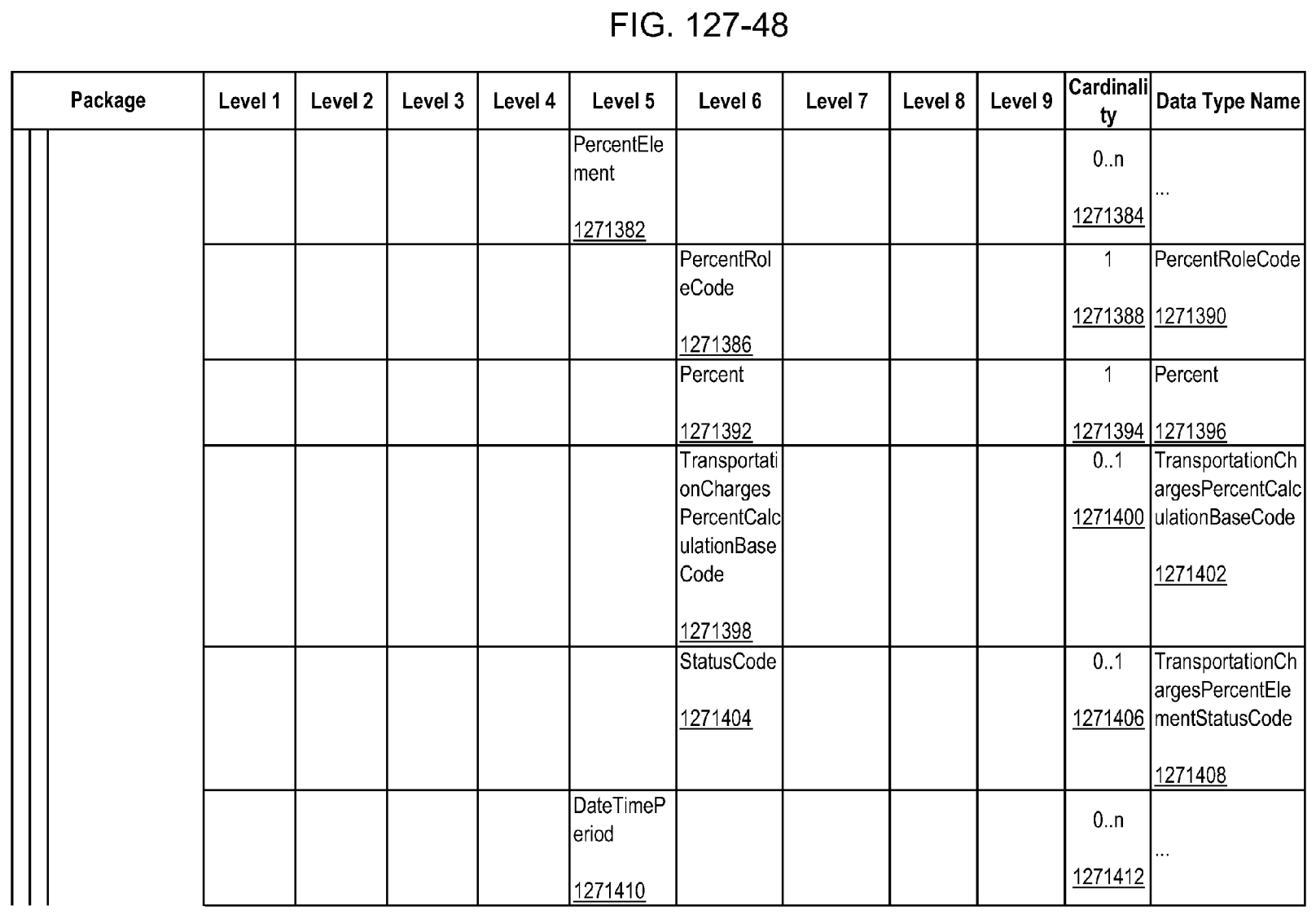

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PercentElement 1271382 | | | | | 0..n 1271384 | ... |
| | | | | | | PercentRoleCode 1271386 | | | | 1 1271388 | PercentRoleCode 1271390 |
| | | | | | | Percent 1271392 | | | | 1 1271394 | Percent 1271396 |
| | | | | | | TransportationChargesPercentCalculationBaseCode 1271398 | | | | 0..1 1271400 | TransportationChargesPercentCalculationBaseCode 1271402 |
| | | | | | | StatusCode 1271404 | | | | 0..1 1271406 | TransportationChargesPercentElementStatusCode 1271408 |
| | | | | | DateTimePeriod 1271410 | | | | | 0..n 1271412 | ... |

FIG. 127-49

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DateTimePeriod 1271414 | | | | 1..1 1271416 | DateTimePeriod 1271418 |
| | | | | | | PeriodRoleCode 1271420 | | | | 1..1 1271422 | PeriodRoleCode 1271424 |
| | | | | | BusinessTransactionDocumentReference 1271426 | | | | | 0..n 1271428 | ... |
| | | | | | | BusinessTransactionDocumentReference 1271430 | | | | 0..1 1271432 | BusinessTransactionDocumentReference 1271434 |
| | | | | | | BusinessTransactionDocumentRelationshipRoleCode 1271436 | | | | 0..1 1271438 | BusinessTransactionDocumentRelationshipRoleCode 1271440 |

FIG. 127-50

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentRelationshipTypeCode 1271442 | | | | 0..1 1271444 | BusinessTransactionDocumentRelationshipTypeCode 1271446 |
| | | | | | | TransportationDocumentTypeCode 1271448 | | | | 0..1 1271450 | TransportationDocumentTypeCode 1271452 |
| | | | | | | TransportationDocumentNote 1271454 | | | | 0..1 1271456 | SHORT_Note 1271458 |
| | | | | | | TransportationDocumentID 1271460 | | | | 0..1 1271462 | TransportationDocumentID 1271464 |
| | | | | | TaxDetail 1271466 | | | | | 0..n 1271468 | ... |

FIG. 127-51

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | ProductTax 1271470 | | | | 1..1 1271472 | ProductTax 1271474 |
| | | | | | PaymentInstruction 1271476 | | | | | 0..n 1271478 | ... |
| | | | | | | PaymentInstruction 1271480 | | | | 1 1271482 | PaymentInstruction 1271484 |
| | | | | | | TransportationChargeElementCategoryCode 1271486 | | | | 0..1 1271488 | TransportationChargesElementCategoryCode 1271490 |
| | | | | | | TransportationChargesElementSubCategoryCode 1271492 | | | | 0..1 1271494 | TransportationChargesElementSubCategoryCode 1271496 |

FIG. 127-52

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationChargesPaymentArrangementCode 1271498 | | | | 0..1 1271500 | TransportationChargesPaymentArrangementCode 1271502 |
| | | | | | CashDiscountTerms 1271504 | | | | | 0..1 1271506 | ... |
| | | | | | | CashDiscountTerms 1271508 | | | | 1 1271510 | CashDiscountTerms 1271512 |
| | | | | | | TransportationChargesElementCategoryCode 1271514 | | | | 0..1 1271516 | TransportationChargesElementCategoryCode 1271518 |

FIG. 127-53

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationChargesElementSubCategoryCode 1271520 | | | | 0..1 1271522 | TransportationChargesElementSubCategoryCode 1271524 |
| | | | | | Element 1271526 | | | | | 0..n 1271528 | ... |
| | | | | | | CategoryCode 1271530 | | | | 1 1271532 | TransportationChargesElementCategoryCode 1271534 |
| | | | | | | SubCategoryCode 1271536 | | | | 1 1271538 | TransportationChargesElementSubCategoryCode 1271540 |
| | | | | | | TypeCode 1271542 | | | | 1 1271544 | TransportationChargesElementTypeCode 1271546 |

FIG. 127-54

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | CalculationResolutionCode 1271548 | | | | 1 1271550 | TransportationChargesElementCalculationResolutionCode 1271552 |
| | | | | | | TransportationChargesPaymentArrangementCode 1271554 | | | | 0...1 1271556 | TransportationChargesPaymentArrangementCode 1271558 |
| | | | | | | Location 1271560 | | | | 0..n 1271562 | ... |
| | | | | | | | Location 1271564 | | | 1 1271566 | BusinessTransactionDocumentLocation 1271568 |
| | | | | | | | RoleCode 1271570 | | | 1 1271572 | LocationRoleCode 1271574 |

FIG. 127-55

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TypeCode 1271576 | | | 0..1 1271578 | LocationTypeCode 1271580 |
| | | | | | | | Name 1271582 | | | 0..1 1271584 | MEDIUM_Name 1271586 |
| | | | | | | | DateTimePeriods 1271588 | | | 0..n 1271590 | ... |
| | | | | | | | | RequestedFulfillmentPeriod 1271592 | | 0..1 1271594 | DateTimePeriod 1271596 |
| | | | | | | | | AcceptableFulfillmentPeriod 1271598 | | 0..1 1271600 | DateTimePeriod 1271602 |
| | | | | | | | | PeriodRoleCode 1271604 | | 1 1271606 | PeriodRoleCode 1271608 |

FIG. 127-56

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TextCollection 1271610 | | | | 0..1 1271612 | ... |
| | | | | | | | TextCollection 1271614 | | | 1..1 1271616 | TextCollection 1271618 |
| | | | | | | Currency 1271620 | | | | 0..n 1271622 | ... |
| | | | | | | | Code 1271624 | | | 1..1 1271626 | CurrencyCode 1271628 |
| | | | | | | | RoleCode 1271630 | | | 1..1 1271632 | CurrencyRoleCode 1271634 |
| | | | | | | | UsageCode 1271636 | | | 0..1 1271638 | CurrencyUsageCode 1271640 |
| | | | | | | RateElement 1271642 | | | | 0..n 1271644 | ... |

FIG. 127-57

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | ID 1271646 | | | 1 1271648 | TransportationChargesElementRateElementID 1271650 |
| | | | | | | | Amount 1271652 | | | 1 1271654 | Amount 1271656 |
| | | | | | | | BaseQuantity 1271658 | | | 1 1271660 | Quantity 1271662 |
| | | | | | | | TransportationChargesRateTypeCode 1271664 | | | 0..1 1271666 | TransportationChargesRateTypeCode 1271668 |
| | | | | | | | TransportationChargesRateRoleCode 1271670 | | | 1 1271672 | TransportationChargesRateRoleCode 1271674 |

FIG. 127-58

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationChargesRateElementStatusCode 1271676 | | | 0..1 1271678 | TransportationChargesRateElementStatusCode 1271680 |
| | | | | | | PercentElement 1271682 | | | | 0..n 1271684 | ... |
| | | | | | | | PercentRoleCode 1271686 | | | 1 1271688 | PercentRoleCode 1271690 |
| | | | | | | | Percent 1271692 | | | 1 1271694 | Percent 1271696 |
| | | | | | | | TransportationChargesPercentCalculationBaseCode 1271698 | | | 0..1 1271700 | TransportationChargesPercentCalculationBaseCode 1271702 |

FIG. 127-59

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StatusCode 1271704 | | | 0..1 1271706 | TransportationChargesPercentElementStatusCode 1271708 |
| | | | | | | AmountElement 1271710 | | | | 0..n 1271712 | ... |
| | | | | | | | Amount 1271714 | | | 1 1271716 | Amount 1271718 |
| | | | | | | | AmountRoleCode 1271720 | | | 1 1271722 | AmountRoleCode 1271724 |
| | | | | | | | TransportationChargesAmountElementStatusCode 1271726 | | | 0..1 1271728 | TransportationChargesAmountElementStatusCode 1271730 |
| | | | | | | | RateDetailAssignment 1271732 | | | 0..n 1271734 | ... |

FIG. 127-60

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | TransportationChargeRateDetailID 1271736 | | 1 1271738 | TransportationChargesElementRateElementID 1271740 |
| | | | | | | CalculationBase 1271742 | | | | 0..n 1271744 | ... |
| | | | | | | | TransportationChargesElementCalculationBaseCode 1271746 | | | 1 1271748 | TransportationChargesElementCalculationBaseCode 1271750 |
| | | | | | | | BaseQuantity 1271752 | | | 0..1 1271754 | Quantity 1271756 |
| | | | | | | | BaseQuantityRoleCode 1271758 | | | 0..1 1271760 | QuantityRoleCode 1271762 |

FIG. 127-61

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | BaseQuantityTypeCode 1271764 | | | 0..1 1271766 | QuantityTypeCode 1271768 |
| | | | | | | TaxDetail 1271770 | | | | 0..n 1271772 | ... |
| | | | | | | | ProductTax 1271774 | | | 1..1 1271776 | ProductTax 1271778 |
| | | | | | | DateTimePeriod 1271780 | | | | 0..n 1271782 | ... |
| | | | | | | | DateTimePeriod 1271784 | | | 1..1 1271786 | DateTimePeriod 1271788 |
| | | | | | | | PeriodRoleCode 1271790 | | | 1..1 1271792 | PeriodRoleCode 1271794 |
| | | | | | | CostDistribution 1271796 | | | | 0..n 1271798 | ... |

FIG. 127-62

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | AccountingCodingBlockAssignment 1271800 | | | 1..1 1271802 | AccountingCodingBlockAssignment 1271804 |
| SupplierShipmentQuote 1271806 | | | SupplierShipmentQuote 1271808 | | | | | | | 0..n 1271810 | ... |
| | | | | ID 1271812 | | | | | | 1..1 1271814 | BusinessTransactionDocumentID 1271816 |
| | | | | DeliveryTerms 1271818 | | | | | | 0..1 1271820 | DeliveryTerms 1271822 |
| SupplierFreightQuoteAssignmentInformation 1271824 | | | | TransportationStageAssignment 1271826 | | | | | | 0..n 1271828 | ... |

FIG. 127-63

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | SupplierFreightQuoteTransportationStageID 1271830 | | | | | 1..1 1271832 | TransportationStageID 1271834 |
| | | | | TransportationUnitResourceInformationAssignment 1271836 | | | | | | 0..n 1271838 | ... |
| | | | | | SupplierFreightQuoteTransportationUnitResourceInformationID 1271840 | | | | | 1..1 1271842 | TransportationUnitResourceID 1271844 |
| HeaderInformation 1271846 | | | | DateTimePeriods 1271848 | | | | | | 0..n 1271850 | ... |

FIG. 127-64

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RequestedFulfillmentPeriod 1271852 | | | | | 0..1 1271854 | DateTimePeriod 1271856 |
| | | | | | AcceptableFulfillmentPeriod 1271858 | | | | | 0..1 1271860 | DateTimePeriod 1271862 |
| | | | | | PeriodRoleCode 1271864 | | | | | 1 1271866 | PeriodRoleCode 1271868 |
| | | | | NatureOfCargo 1271870 | | | | | | 0..n 1271872 | ... |
| | | | | | ClassificationCode 1271874 | | | | | 1 1271876 | NatureOfCargoClassificationCode 1271878 |
| | | | | TotalQuantity 1271880 | | | | | | 0..n 1271882 | ... |

FIG. 127-65

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | Quantity 1271884 | | | | | 1 1271886 | Quantity 1271888 |
| | | | | | RoleCode 1271890 | | | | | 0..1 1271892 | QuantityRoleCode 1271894 |
| | | | | | TypeCode 1271896 | | | | | 0..1 1271898 | QuantityTypeCode 1271900 |
| | | | | TotalAmount 1271902 | | | | | | 0..n 1271904 | ... |
| | | | | | Amount 1271906 | | | | | 1 1271908 | Amount 1271910 |
| | | | | | RoleCode 1271912 | | | | | 1 1271914 | AmountRoleCode 1271916 |
| | | | | TextCollection 1271918 | | | | | | 0..1 1271920 | ... |

FIG. 127-66

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TextCollection 1271922 | | | | | 1 1271924 | TextCollection 1271926 |
| | | | | TransportationServiceRequirement 1271928 | | | | | | 0..n 1271930 | ... |
| | | | | | TransportationServiceRequirementCode 1271932 | | | | | 0..1 1271934 | TransportationServiceRequirementCode 1271936 |
| | | | | | AdditionalTransportationServiceRequirementCode 1271938 | | | | | 0..1 1271940 | TransportationServiceRequirementCode 1271942 |

FIG. 127-67

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationContractConditionCode 1271944 | | | | | 0..1 1271946 | TransportationContractConditionCode 1271948 |
| | | | | | TransportServiceLevelCode 1271950 | | | | | 0..1 1271952 | TransportServiceLevelCode 1271954 |
| | | | | | NatureOfCargoClassificationCode 1271956 | | | | | 0..1 1271958 | NatureOfCargoClassificationCode 1271960 |
| | | | | TransportationDocumentInformation 1271962 | | | | | | 0..n 1271964 | ... |

FIG. 127-68

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentTypeCode 1271966 | | | | | 0..1 1271968 | TransportationDocumentTypeCode 1271970 |
| | | | | | TransportationDocumentNote 1271972 | | | | | 0..1 1271974 | SHORT_Note 1271976 |
| | | | | | TransportationDocumentID 1271978 | | | | | 0..1 1271980 | TransportationDocumentID 1271982 |
| | | | | | TransportationDocumentStatusCode 1271984 | | | | | 0..1 1271986 | TransportationDocumentStatusCode 1271988 |
| | | | | | LanguageCode 1271990 | | | | | 0..1 1271992 | LanguageCode 1271994 |

FIG. 127-69

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | CommunicationMediumTypeCode 1271996 | | | | | 0..1 1271998 | CommunicationMediumTypeCode 1272000 |
| | | | | | Requiredindicator 1272002 | | | | | 1 1272004 | Indicator 1272006 |
| | | | | | OutputCopyNumberValue 1272008 | | | | | 0..1 1272010 | NumberValue 1272012 |
| | | | | | OutputOriginalNumberValue 1272014 | | | | | 0..1 1272016 | NumberValue 1272018 |
| | | | | | DateTimePeriod 1272020 | | | | | 0..n 1272022 | ... |

FIG. 127-70

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DateTimePeriod 1272024 | | | | 1 1272026 | DateTimePeriod 1272028 |
| | | | | | | PeriodRoleCode 1272030 | | | | 1 1272032 | PeriodRoleCode 1272034 |
| | | | | BusinessTransactionDocumentReference 1272036 | | | | | | 0..n 1272038 | ... |
| | | | | | BusinessTransactionDocumentReference 1272040 | | | | | 0..1 1272042 | BusinessTransactionDocumentReference 1272044 |

FIG. 127-71

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentRelationshipRoleCode 1272046 | | | | | 0..1 1272048 | BusinessTransactionDocumentRelationshipRoleCode 1272050 |
| | | | | | BusinessTransactionDocumentRelationshipTypeCode 1272052 | | | | | 0..1 1272054 | BusinessTransactionDocumentRelationshipTypeCode 1272056 |
| | | | | | TransportationDocumentTypeCode 1272058 | | | | | 0..1 1272060 | TransportationDocumentTypeCode 1272062 |
| | | | | | TransportationDocumentNote 1272064 | | | | | 0..1 1272066 | SHORT_Note 1272068 |

FIG. 127-72

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentID 1272070 | | | | | 0..1 1272072 | TransportationDocumentID 1272074 |
| | | | | | DateTimePeriod 1272076 | | | | | 0..n 1272078 | ... |
| | | | | | | DateTimePeriod 1272080 | | | | 1 1272082 | DateTimePeriod 1272084 |
| | | | | | | PeriodRoleCode 1272086 | | | | 1 1272088 | PeriodRoleCode 1272090 |
| GovernmentalRequirementInformation 1272092 | | | | GovernmentalProcedure 1272094 | | | | | | 0..n 1272096 | ... |

FIG. 127-73

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationGovernmentAgencyTypeCode 1272098 | | | | | 0..1 1272100 | TransportationGovernmentAgencyTypeCode 1272102 |
| | | | | | TransportationMovementTypeCode 1272104 | | | | | 0..1 1272106 | TransportationMovementTypeCode 1272108 |
| | | | | | TransportationGovernmentAgencyInvolvementStatusCode 1272110 | | | | | 0..1 1272112 | TransportationGovernmentAgencyInvolvementStatusCode 1272114 |

FIG. 127-74

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationGovernmentAgencyActionCode 1272116 | | | | | 0..1 1272118 | TransportationGovernmentAgencyActionCode 1272120 |
| | | | | | TransportationGovernmentAgencyProcedureStatusCode 1272122 | | | | | 0..1 1272124 | TransportationGovernmentAgencyProcedureStatusCode 1272126 |
| | | | | | Location 1272128 | | | | | 0..n 1272130 | ... |
| | | | | | | Location 1272132 | | | | 1 1272134 | BusinessTransactionDocumentLocation 1272136 |
| | | | | | | RoleCode 1272138 | | | | 1 1272140 | LocationRoleCode 1272142 |

FIG. 127-75

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TypeCode 1272144 | | | | 0..1 1272146 | LocationTypeCode 1272148 |
| | | | | | | Name 1272150 | | | | 0..1 1272152 | MEDIUM_Name 1272154 |
| | | | | | DateTimePeriod 1272156 | | | | | 0..n 1272158 | ... |
| | | | | | | DateTimePeriod 1272160 | | | | 1 1272162 | DateTimePeriod 1272164 |
| | | | | | | PeriodRoleCode 1272166 | | | | 1 1272168 | PeriodRoleCode 1272170 |
| | | | | | TextCollection 1272172 | | | | | 0..1 1272174 | ... |
| | | | | | | TextCollection 1272176 | | | | 1 1272178 | TextCollection 1272180 |

FIG. 127-76

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationDocumentInformation 1272182 | | | | | 0..n 1272184 | ... |
| | | | | | | TransportationDocumentTypeCode 1272186 | | | | 0..1 1272188 | TransportationDocumentTypeCode 1272190 |
| | | | | | | TransportationDocumentNote 1272192 | | | | 0..1 1272194 | SHORT_Note 1272196 |
| | | | | | | TransportationDocumentID 1272198 | | | | 0..1 1272200 | TransportationDocumentID 1272202 |

FIG. 127-77

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentStatusCode 1272204 | | | | 0..1 1272206 | TransportationDocumentStatusCode 1272208 |
| | | | | | | LanguageCode 1272210 | | | | 0..1 1272212 | LanguageCode 1272214 |
| | | | | | | CommunicationMediumTypeCode 1272216 | | | | 0..1 1272218 | CommunicationMediumTypeCode 1272220 |
| | | | | | | RequiredIndicator 1272222 | | | | 1 1272224 | Indicator 1272226 |
| | | | | | | OutputCopyNumberValue 1272228 | | | | 0..1 1272230 | NumberValue 1272232 |

FIG. 127-78

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OutputOriginalNumberValue 1272234 | | | | 0..1 1272236 | NumberValue 1272238 |
| | | | | | | DateTimePeriod 1272240 | | | | 0..n 1272242 | ... |
| | | | | | | | DateTimePeriod 1272244 | | | 1 1272246 | DateTimePeriod 1272248 |
| | | | | | | | PeriodRoleCode 1272250 | | | 1 1272252 | PeriodRoleCode 1272254 |
| PartyInformation 1272256 | | | | Party 1272258 | | | | | | 1..n 1272260 | ... |
| | | | | | Party 1272262 | | | | | 1 1272264 | BusinessTransactionDocumentParty 1272266 |

FIG. 127-79

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | RoleCode 1272268 | | | | | 1 1272270 | PartyRoleCode 1272272 |
| | | | | | FormattedName 1272274 | | | | | 0..1 1272276 | LONG_Name 1272278 |
| | | | | | Amount 1272280 | | | | | 0..n 1272282 | ... |
| | | | | | | Amount 1272284 | | | | 1 1272286 | Amount 1272288 |
| | | | | | | RoleCode 1272290 | | | | 1 1272292 | AmountRoleCode 1272294 |
| | | | | | DateTimePeriods 1272296 | | | | | 0..n 1272298 | ... |
| | | | | | | RequestedFulfillmentPeriod 1272300 | | | | 0..1 1272302 | DateTimePeriod 1272304 |

FIG. 127-80

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | AcceptableFulfillmentPeriod 1272306 | | | | 0..1 1272308 | DateTimePeriod 1272310 |
| | | | | | | PeriodRoleCode 1272312 | | | | 1 1272314 | PeriodRoleCode 1272316 |
| | | | | | TransportationDocumentInformation 1272318 | | | | | 0..n 1272320 | ... |
| | | | | | | TransportationDocumentTypeCode 1272322 | | | | 0..1 1272324 | TransportationDocumentTypeCode 1272326 |
| | | | | | | TransportationDocumentNote 1272328 | | | | 0..1 1272330 | SHORT_Note 1272332 |

FIG. 127-81

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentID 1272334 | | | | 0..1 1272336 | TransportationDocumentID 1272338 |
| | | | | | | TransportationDocumentStatusCode 1272340 | | | | 0..1 1272342 | TransportationDocumentStatusCode 1272344 |
| | | | | | | LanguageCode 1272346 | | | | 0..1 1272348 | LanguageCode 1272350 |
| | | | | | | CommunicationMediumTypeCode 1272352 | | | | 0..1 1272354 | CommunicationMediumTypeCode 1272356 |
| | | | | | | RequiredIndicator 1272358 | | | | 1 1272360 | Indicator 1272362 |

FIG. 127-82

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OutputCopyNumberValue 1272364 | | | | 0..1 1272366 | NumberValue 1272368 |
| | | | | | | OutputOriginalNumberValue 1272370 | | | | 0..1 1272372 | NumberValue 1272374 |
| | | | | | | DateTimePeriod 1272376 | | | | 0..n 1272378 | ... |
| | | | | | | | DateTimePeriod 1272380 | | | 1 1272382 | DateTimePeriod 1272384 |
| | | | | | | | PeriodRoleCode 1272386 | | | 1 1272388 | PeriodRoleCode 1272390 |

FIG. 127-83

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentReference 1272392 | | | | | 0..n 1272394 | ... |
| | | | | | | BusinessTransactionDocumentReference 1272396 | | | | 0..1 1272398 | BusinessTransactionDocumentReference 1272400 |
| | | | | | | BusinessTransactionDocumentRelationshipRoleCode 1272402 | | | | 0..1 1272404 | BusinessTransactionDocumentRelationshipRoleCode 1272406 |
| | | | | | | BusinessTransactionDocumentRelationshipTypeCode 1272408 | | | | 0..1 1272410 | BusinessTransactionDocumentRelationshipTypeCode 1272412 |

FIG. 127-84

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentTypeCode 1272414 | | | | 0..1 1272416 | TransportationDocumentTypeCode 1272418 |
| | | | | | | TransportationDocumentNote 1272420 | | | | 0..1 1272422 | SHORT_Note 1272424 |
| | | | | | | TransportationDocumentID 1272426 | | | | 0..1 1272428 | TransportationDocumentID 1272430 |
| | | | | | | DateTimePeriod 1272432 | | | | 0..n 1272434 | ... |
| | | | | | | | DateTimePeriod 1272436 | | | 1 1272438 | DateTimePeriod 1272440 |

FIG. 127-85

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | PeriodRoleCode 1272442 | | | 1 1272444 | PeriodRoleCode 1272446 |
| LocationInformation 1272448 | | | | Location 1272450 | | | | | | 0..n 1272452 | |
| | | | | | Location 1272454 | | | | | 1 1272456 | BusinessTransactionDocumentLocation 1272458 |
| | | | | | RoleCode 1272460 | | | | | 1 1272462 | LocationRoleCode 1272464 |
| | | | | | TypeCode 1272466 | | | | | 0..1 1272468 | LocationTypeCode 1272470 |
| | | | | | Name 1272472 | | | | | 0..1 1272474 | MEDIUM_Name 1272476 |
| | | | | | DateTimePeriods 1272478 | | | | | 0..n 1272480 | ... |

FIG. 127-86

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RequestedFulfillmentPeriod 1272482 | | | | 0..1 1272484 | DateTimePeriod 1272486 |
| | | | | | | AcceptableFulfillmentPeriod 1272488 | | | | 0..1 1272490 | DateTimePeriod 1272492 |
| | | | | | | PeriodRoleCode 1272494 | | | | 1 1272496 | PeriodRoleCode 1272498 |
| TransportationStageInformation 1272500 | | | | TransportationStage 1272502 | | | | | | 0..n 1272504 | ... |
| | | | | | ID 1272506 | | | | | 1 1272508 | TransportationStageID 1272510 |
| | | | | | OrdinalNumberValue 1272512 | | | | | 0..1 1272514 | OrdinalNumberValue 1272516 |

FIG. 127-87

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TypeCode 1272518 | | | | | 0..1 1272520 | TransportationStageTypeCode 1272522 |
| | | | | | JourneyID 1272524 | | | | | 0..1 1272526 | JourneyID 1272528 |
| | | | | | TransportModeCode 1272530 | | | | | 0..1 1272532 | TransportModeCode 1272534 |
| | | | | | TransportMeansDescriptionCode 1272536 | | | | | 0..1 1272538 | TransportMeansDescriptionCode 1272540 |
| | | | | | TransportMeansDescription 1272542 | | | | | 0..1 1272544 | SHORT_Description 1272546 |
| | | | | | TransportMeansID 1272548 | | | | | 0..1 1272550 | TransportMeansID 1272552 |

FIG. 127-88

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportMeansHomeCountryCode 1272554 | | | | | 0..1 1272556 | CountryCode 1272558 |
| | | | | | TransportMeansOwnershipTypeCode 1272560 | | | | | 0..1 1272562 | TransportMeansOwnershipTypeCode 1272564 |
| | | | | | CarrierStandardID 1272566 | | | | | 0..1 1272568 | PartyStandardID 1272570 |
| | | | | | CarrierFormattedName 1272572 | | | | | 0..1 1272574 | LONG_Name 1272576 |
| | | | | | TransportationTransitDirectionCode 1272578 | | | | | 0..1 1272580 | TransportationTransitDirectionCode 1272582 |

FIG. 127-89

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | CalculatedDistanceMeasure 1272584 | | | | | 0..1 1272586 | Measure 1272588 |
| | | | | | GivenDistanceMeasure 1272590 | | | | | 0..1 1272592 | Measure 1272594 |
| | | | | | Location 1272596 | | | | | 1..n 1272598 | ... |
| | | | | | | Location 1272600 | | | | 1 1272602 | BusinessTransactionDocumentLocation 1272604 |
| | | | | | | RoleCode 1272606 | | | | 1 1272608 | LocationRoleCode 1272610 |
| | | | | | | TypeCode 1272612 | | | | 0..1 1272614 | LocationTypeCode 1272616 |

FIG. 127-90

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | Name 1272618 | | | | 0..1 1272620 | MEDIUM_Name 1272622 |
| | | | | | | DateTimePeriods 1272624 | | | | 0..n 1272626 | ... |
| | | | | | | | RequestedFulfillmentPeriod 1272628 | | | 0..1 1272630 | DateTimePeriod 1272632 |
| | | | | | | | AcceptableFulfillmentPeriod 1272634 | | | 0..1 1272636 | DateTimePeriod 1272638 |
| | | | | | | | PeriodRoleCode 1272640 | | | 1 1272642 | PeriodRoleCode 1272644 |
| | | | | | BusinessTransactionDocumentReference 1272646 | | | | | 0..n 1272648 | ... |

FIG. 127-91

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentReference 1272650 | | | | 0..1 1272652 | BusinessTransactionDocumentReference 1272654 |
| | | | | | | BusinessTransactionDocumentRelationshipRoleCode 1272656 | | | | 0..1 1272658 | BusinessTransactionDocumentRelationshipRoleCode 1272660 |
| | | | | | | BusinessTransactionDocumentRelationshipTypeCode 1272662 | | | | 0..1 1272664 | BusinessTransactionDocumentRelationshipTypeCode 1272666 |
| | | | | | | TransportationDocumentTypeCode 1272668 | | | | 0..1 1272670 | TransportationDocumentTypeCode 1272672 |

FIG. 127-92

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentNote 1272674 | | | | 0..1 1272676 | SHORT_Note 1272678 |
| | | | | | | TransportationDocumentID 1272680 | | | | 0..1 1272682 | TransportationDocumentID 1272684 |
| | | | | | | DateTimePeriod 1272686 | | | | 0..n 1272688 | ... |
| | | | | | | | DateTimePeriod 1272690 | | | 1 1272692 | DateTimePeriod 1272694 |
| | | | | | | | PeriodRoleCode 1272696 | | | 1 1272698 | PeriodRoleCode 1272700 |

FIG. 127-93

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | TransportationServiceRequirement 1272702 | | | | | 0..n 1272704 | ... |
| | | | | | | TransportationServiceRequirementCode 1272706 | | | | 0..1 1272708 | TransportationServiceRequirementCode 1272710 |
| | | | | | | AdditionalTransportationServiceRequirementCode 1272712 | | | | 0..1 1272714 | TransportationServiceRequirementCode 1272716 |
| | | | | | | TransportationContractConditionCode 1272718 | | | | 0..1 1272720 | TransportationContractConditionCode 1272722 |

FIG. 127-94

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportServiceLevelCode 1272724 | | | | 0..1 1272726 | TransportServiceLevelCode 1272728 |
| | | | | | | NatureOfCargoClassificationCode 1272730 | | | | 0..1 1272732 | NatureOfCargoClassificationCode 1272734 |
| TransportationUnitResourceInformation 1272736 | | | | TransportationUnitResourceInformation 1272738 | | | | | | 0..n 1272740 | ... |
| | | | | | ID 1272742 | | | | | 1 1272744 | ResourceInformationID 1272746 |
| | | | | | ResourceNumberValue 1272748 | | | | | 0..1 1272750 | NumberValue 1272752 |

FIG. 127-95

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ResourceID 1272754 | | | | | 0..1 1272756 | ResourceID 1272758 |
| | | | | | ResourceHomeCountryCode 1272760 | | | | | 0..1 1272762 | CountryCode 1272764 |
| | | | | | TransportationUnitResourceCategoryCode 1272766 | | | | | 0..1 1272768 | TransportationUnitResourceCategoryCode 1272770 |
| | | | | | TransportationUnitResourceTypeCode 1272772 | | | | | 0..1 1272774 | TransportationUnitResourceTypeCode 1272776 |
| | | | | | FillLevelCode 1272778 | | | | | 0..1 1272780 | FillLevelCode 1272782 |

FIG. 127-96

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | ShippingTypeCode 1272784 | | | | | 0..1 1272786 | ShippingTypeCode 1272788 |
| | | | | | HaulageArrangerCode 1272790 | | | | | 0..1 1272792 | HaulageArrangerCode 1272794 |
| | | | | | TransportationHandlingInstructionCode 1272796 | | | | | 0..1 1272798 | TransportationHandlingInstructionCode 1272800 |
| | | | | | TransportationHandlingInstructionNote 1272802 | | | | | 0..1 1272804 | LONG_Note 1272806 |
| | | | | | TransportationStageAssignment 1272808 | | | | | 0..n 1272810 | ... |

FIG. 127-97

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | SupplierShipmentQuoteTransportationStageID 1272812 | | | | 1 1272814 | TransportationStageID 1272816 |
| | | | | | AttachedEquipment 1272818 | | | | | 0..n 1272820 | ... |
| | | | | | | SupplierShipmentQuoteTransportationUnitResourceInformationID 1272822 | | | | 1 1272824 | ResourceID 1272826 |
| | | | | | Quantity 1272828 | | | | | 0..n 1272830 | ... |
| | | | | | | Quantity 1272832 | | | | 1 1272834 | Quantity 1272836 |

FIG. 127-98

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RoleCode 1272838 | | | | 0..1 1272840 | QuantityRoleCode 1272842 |
| | | | | | | TypeCode 1272844 | | | | 0..1 1272846 | QuantityTypeCode 1272848 |
| | | | | | BusinessTransactionDocumentReference 1272850 | | | | | 0..n 1272852 | ... |
| | | | | | | BusinessTransactionDocumentReference 1272854 | | | | 0..1 1272856 | BusinessTransactionDocumentReference 1272858 |
| | | | | | | BusinessTransactionDocumentRelationshipRoleCode 1272860 | | | | 0..1 1272862 | BusinessTransactionDocumentRelationshipRoleCode 1272864 |

FIG. 127-99

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | BusinessTransactionDocumentRelationshipTypeCode 1272866 | | | | 0..1 1272868 | BusinessTransactionDocumentRelationshipTypeCode 1272870 |
| | | | | | | TransportationDocumentTypeCode 1272872 | | | | 0..1 1272874 | TransportationDocumentTypeCode 1272876 |
| | | | | | | TransportationDocumentNote 1272878 | | | | 0..1 1272880 | SHORT_Note 1272882 |
| | | | | | | TransportationDocumentID 1272884 | | | | 0..1 1272886 | TransportationDocumentID 1272888 |
| | | | | | | DateTimePeriod 1272890 | | | | 0..n 1272892 | |

FIG. 127-100

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | DateTimePeriod 1272894 | | | 1 1272896 | DateTimePeriod 1272898 |
| | | | | | | | PeriodRoleCode 1272900 | | | 1 1272902 | PeriodRoleCode 1272904 |
| | | | | | TextCollection 1272906 | | | | | 0..1 1272908 | ... |
| | | | | | | TextCollection 1272910 | | | | 1 1272912 | TextCollection 1272914 |
| | | | | | Location 1272916 | | | | | 0..n 1272918 | ... |
| | | | | | | Location 1272920 | | | | 1 1272922 | BusinessTransactionDocumentLocation 1272924 |

FIG. 127-101

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RoleCode 1272926 | | | | 1 1272928 | LocationRoleCode 1272930 |
| | | | | | | TypeCode 1272932 | | | | 0..1 1272934 | LocationTypeCode 1272936 |
| | | | | | | Name 1272938 | | | | 0..1 1272940 | MEDIUM_Name 1272942 |
| | | | | | | DateTimePeriods 1272944 | | | | 0..n 1272946 | ... |
| | | | | | | | RequestedFulfillmentPeriod 1272948 | | | 0..1 1272950 | DateTimePeriod 1272952 |
| | | | | | | | AcceptableFulfillmentPeriod 1272954 | | | 0..1 1272956 | DateTimePeriod 1272958 |

FIG. 127-102

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | PeriodRoleCode 1272960 | | | 1 1272962 | PeriodRoleCode 1272964 |
| | | | | | DangerousGoods 1272966 | | | | | 0..n 1272968 | |
| | | | | | | ID 1272970 | | | | 0..1 1272972 | DangerousGoodsID 1272974 |
| | | | | | | RegulationsCode 1272976 | | | | 0..1 1272978 | DangerousGoodsRegulationsCode 1272980 |
| | | | | | | HazardCode 1272982 | | | | 0..1 1272984 | DangerousGoodsHazardCode 1272986 |
| | | | | | | FlashpointMeasureInterval 1272988 | | | | 0..1 1272990 | MeasureInterval 1272992 |

FIG. 127-103

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | PackagingGroupCode 1272994 | | | | 0..1 1272996 | DangerousGoodsPackagingGroupCode 1272998 |
| | | | | | | EmergencySchedule 1273000 | | | | 0..1 1273002 | DangerousGoodsEmergencySchedule 1273004 |
| | | | | | | TransportEmergencyCardCode 1273006 | | | | 0..1 1273008 | TransportEmergencyCardCode 1273010 |
| | | | | | | DangerousGoodsLabelCode 1273012 | | | | 0..1 1273014 | DangerousGoodsLabelCode 1273016 |
| | | | | | | DangerousGoodsLabelCode2 1273018 | | | | 0..1 1273020 | DangerousGoodsLabelCode 1273022 |

FIG. 127-104

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DangerousGoodsLabelCode3 1273024 | | | | 0..1 1273026 | DangerousGoodsLabelCode 1273028 |
| | | | | | | PackagingInstructionTypeCode 1273030 | | | | 0..1 1273032 | PackagingInstructionTypeCode 1273034 |
| | | | | | | TransportMeansDescriptionCode 1273036 | | | | 0..1 1273038 | TransportMeansDescriptionCode 1273040 |
| | | | | | | TransportationAuthorisationCode 1273042 | | | | 0..1 1273044 | DangerousGoodsTransportationAuthorisationCode 1273046 |
| | | | | | | ContactInformation 1273048 | | | | 0..n 1273050 | ... |

FIG. 127-105

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | ContactPersonFunctionTypeCode 1273052 | | | 1 1273054 | ContactPersonFunctionTypeCode 1273056 |
| | | | | | | | Address 1273058 | | | 1 1273060 | Address 1273062 |
| | | | | | | TextCollection 1273064 | | | | 0..1 1273066 | ... |
| | | | | | | | TextCollection 1273068 | | | 1 1273070 | TextCollection 1273072 |
| PackageInformation 1273074 | | | | PackageInformation | | | | | | 0..n 1273078 | ... |
| | | | | | ID 1273080 | | | | | 1 1273082 | PackageInformationID 1273084 |
| | | | | | PackageID 1273086 | | | | | 0..1 1273088 | PackageID 1273090 |

FIG. 127-106

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PackageOrdinalNumberValue 1273092 | | | | | 0..1 1273094 | OrdinalNumberValue 1273096 |
| | | | | | PackageNumberValue 1273098 | | | | | 0..1 1273100 | NumberValue 1273102 |
| | | | | | PackageTypeCode 1273104 | | | | | 0..1 1273106 | PackageTypeCode 1273108 |
| | | | | | PackagingLevelCode 1273110 | | | | | 0..1 1273112 | PackagingLevelCode 1273114 |
| | | | | | PackageMarkingInstructionCode 1273116 | | | | | 0..1 1273118 | PackageMarkingInstructionCode 1273120 |

FIG. 127-107

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | PredecessorPackageID 1273122 | | | | | 0..1 1273124 | PackageID 1273126 |
| | | | | | ItemAssignment 1273128 | | | | | 0..n 1273130 | ... |
| | | | | | | SupplierShipmentQuoteItemID 1273132 | | | | 1 1273134 | BusinessTransactionDocumentItemID 1273136 |
| | | | | | | Quantity 1273138 | | | | 0..n 1273140 | ... |
| | | | | | | | Quantity 1273142 | | | 1 1273144 | Quantity 1273146 |
| | | | | | | | RoleCode 1273148 | | | 0..1 1273150 | QuantityRoleCode 1273152 |

FIG. 127-108

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TypeCode 1273154 | | | 0..1 1273156 | QuantityTypeCode 1273158 |
| | | | | | | BusinessTransactionDocumentReference 1273160 | | | | 0..n 1273162 | ... |
| | | | | | | | BusinessTransactionDocumentReference 1273164 | | | 0..1 1273166 | BusinessTransactionDocumentReference 1273168 |
| | | | | | | | BusinessTransactionDocumentRelationshipRoleCode 1273170 | | | 0..1 1273172 | BusinessTransactionDocumentRelationshipRoleCode 1273174 |

FIG. 127-109

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | BusinessTransactionDocumentRelationshipTypeCode 1273176 | | | 0..1 1273178 | BusinessTransactionDocumentRelationshipTypeCode 1273180 |
| | | | | | | | TransportationDocumentTypeCode 1273182 | | | 0..1 1273184 | TransportationDocumentTypeCode 1273186 |
| | | | | | | | TransportationDocumentNote 1273188 | | | 0..1 1273190 | SHORT_Note 1273192 |
| | | | | | | | TransportationDocumentID 1273194 | | | 0..1 1273196 | TransportationDocumentID 1273198 |
| | | | | | | | DateTimePeriod 1273200 | | | 0..n 1273202 | ... |

FIG. 127-110

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | DateTimePeriod 1273204 | | 1 1273206 | DateTimePeriod 1273208 |
| | | | | | | | | PeriodRoleCode 1273210 | | 1 1273212 | PeriodRoleCode 1273214 |
| | | | | | | TransportationGoodsIdentification 1273216 | | | | 0..n 1273218 | ... |
| | | | | | | | TransportationGoodsIdentifierTypeCode 1273220 | | | 1 1273222 | TransportationGoodsIdentifierTypeCode 1273224 |
| | | | | | | | LowerBoundaryTransportationGoodsID 1273226 | | | 0..1 1273228 | TransportationGoodsID 1273230 |

FIG. 127-111

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | UpperBoundaryTransportationGoodsID 1273232 | | | 0..1 1273234 | TransportationGoodsID 1273236 |
| | | | | | TransportationUnitResourceInformationAssignment 1273238 | | | | | 0..n 1273240 | ... |
| | | | | | | SupplierShipmentQuoteTransportationUnitResourceInformationID 1273242 | | | | 1 1273244 | ResourceInformationID 1273246 |
| | | | | | | Quantity 1273248 | | | | 0..n 1273250 | ... |
| | | | | | | | Quantity 1273252 | | | 1 1273254 | Quantity 1273256 |

FIG. 127-112

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | RoleCode 1273258 | | | 0..1 1273260 | QuantityRoleCode 1273262 |
| | | | | | | | TypeCode 1273264 | | | 0..1 1273266 | QuantityTypeCode 1273268 |
| | | | | | Quantity 1273270 | | | | | 0..n 1273272 | ... |
| | | | | | | Quantity 1273274 | | | | 1 1273276 | Quantity 1273278 |
| | | | | | | RoleCode 1273280 | | | | 0..1 1273282 | QuantityRoleCode 1273284 |
| | | | | | | TypeCode 1273286 | | | | 0..1 1273288 | QuantityTypeCode 1273290 |
| | | | | | TextCollection 1273292 | | | | | 0..1 1273294 | ... |

FIG. 127-113

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TextCollection 1273296 | | | | 1 1273298 | TextCollection 1273300 |
| Item 1273302 | | | | Item 1273304 | | | | | | 0..n 1273306 | ... |
| | | | | | ID 1273308 | | | | | 1 1273310 | BusinessTransactionDocumentItemID 1273312 |
| | | | | | OriginCountryCode 1273314 | | | | | 0..1 1273316 | CountryCode 1273318 |
| | | | | | DestinationCountryCode 1273320 | | | | | 0..1 1273322 | CountryCode 1273324 |
| | | | | | ShippingTypeCode 1273326 | | | | | 0..1 1273328 | ShippingTypeCode 1273330 |

FIG. 127-114

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | HaulageArrangerCode 1273332 | | | | | 0..1 1273334 | HaulageArrangerCode 1273336 |
| | | | | | TemperatureMeasureInterval 1273338 | | | | | 0..1 1273340 | MeasureInterval 1273342 |
| | | | | | TransportationHandlingInstructionCode 1273344 | | | | | 0..1 1273346 | TransportationHandlingInstructionCode 1273348 |
| | | | | | TransportationHandlingInstructionNote 1273350 | | | | | 0..1 1273352 | LONG_Note 1273354 |
| ItemInformation 1273356 | | | | | Amount 1273358 | | | | | 0..n 1273360 | ... |
| | | | | | | Amount 1273362 | | | | 1 1273364 | Amount 1273366 |

FIG. 127-115

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RoleCode 1273368 | | | | 1 1273370 | AmountRoleCode 1273372 |
| | | | | | TextCollection 1273374 | | | | | 0..1 1273376 | ... |
| | | | | | | TextcCollection 1273378 | | | | 1 1273380 | TextCollection 1273382 |
| | | | | | NatureOfCargo 1273384 | | | | | 0..n 1273386 | ... |
| | | | | | | ClassificationCode 1273388 | | | | 1 1273390 | NatureOfCargoClassificationCode 1273392 |
| | | | | | Quantity 1273394 | | | | | 0..n 1273396 | ... |
| | | | | | | Quantity 1273398 | | | | 1 1273400 | Quantity 1273402 |

FIG. 127-116

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | RoleCode 1273404 | | | | 0..1 1273406 | QuantityRoleCode 1273408 |
| | | | | | | TypeCode 1273410 | | | | 0..1 1273412 | QuantityTypeCode 1273414 |
| | | | | | TransportationDocumentInformation 1273416 | | | | | 0..n 1273418 | ... |
| | | | | | | TransportationDocumentTypeCode 1273420 | | | | 0..1 1273422 | TransportationDocumentTypeCode 1273424 |
| | | | | | | TransportationDocumentNote 1273426 | | | | 0..1 1273428 | SHORT_Note 1273430 |

FIG. 127-117

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentID 1273432 | | | | 0..1 1273434 | TransportationDocumentID 1273436 |
| | | | | | | TransportationDocumentStatusCode 1273438 | | | | 0..1 1273440 | TransportationDocumentStatusCode 1273442 |
| | | | | | | LanguageCode 1273444 | | | | 0..1 1273446 | LanguageCode 1273448 |
| | | | | | | CommunicationMediumTypeCode 1273450 | | | | 0..1 1273452 | CommunicationMediumTypeCode 1273454 |
| | | | | | | Requiredindicator 1273456 | | | | 1 1273458 | Indicator 1273460 |

FIG. 127-118

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OutputCopyNumberValue 1273462 | | | | 0..1 1273464 | NumberValue 1273466 |
| | | | | | | OutputOriginalNumberValue 1273468 | | | | 0..1 1273470 | NumberValue 1273472 |
| | | | | | | DateTimePeriod 1273474 | | | | 0..n 1273476 | ... |
| | | | | | | | DateTimePeriod 1273478 | | | 1 1273480 | DateTimePeriod 1273482 |
| | | | | | | | PeriodRoleCode 1273484 | | | 1 1273486 | PeriodRoleCode 1273488 |

FIG. 127-119

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | BusinessTransactionDocumentReference 1273490 | | | | | 0..n 1273492 | ... |
| | | | | | | BusinessTransactionDocumentReference 1273494 | | | | 0..1 1273496 | BusinessTransactionDocumentReference 1273498 |
| | | | | | | BusinessTransactionDocumentRelationshipRoleCode 1273500 | | | | 0..1 1273502 | BusinessTransactionDocumentRelationshipRoleCode 1273504 |
| | | | | | | BusinessTransactionDocumentRelationshipTypeCode 1273506 | | | | 0..1 1273508 | BusinessTransactionDocumentRelationshipTypeCode 1273510 |

FIG. 127-120

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationDocumentTypeCode 1273512 | | | | 0..1 1273514 | TransportationDocumentTypeCode 1273516 |
| | | | | | | TransportationDocumentNote 1273518 | | | | 0..1 1273520 | SHORT_Note 1273522 |
| | | | | | | TransportationDocumentID 1273524 | | | | 0..1 1273526 | TransportationDocumentID 1273528 |
| | | | | | | DateTimePeriod 1273530 | | | | 0..n 1273532 | ... |
| | | | | | | | RequestDateTimePeriod 1273534 | | | 1 1273536 | DateTimePeriod 1273538 |

FIG. 127-121

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | PeriodRole Code 1273540 | | | 1 1273542 | PeriodRoleCode 1273544 |
| | | | | | Dangerous Goods 1273546 | | | | | 0..n 1273548 | ... |
| | | | | | | ID 1273550 | | | | 0..1 1273552 | DangerousGoods ID 1273554 |
| | | | | | | Regulations Code 1273556 | | | | 0..1 1273558 | DangerousGoods RegulationsCode 1273560 |
| | | | | | | HazardCode 1273562 | | | | 0..1 1273564 | DangerousGoods HazardCode 1273566 |
| | | | | | | FlashpointMeasureInterval 1273568 | | | | 0..1 1273570 | MeasureInterval 1273572 |

FIG. 127-122

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | PackagingGroupCode 1273574 | | | | 0..1 1273576 | DangerousGoodsPackagingGroupCode 1273578 |
| | | | | | | EmergencySchedule 1273580 | | | | 0..1 1273582 | DangerousGoodsEmergencySchedule 1273584 |
| | | | | | | TransportEmergencyCardCode 1273586 | | | | 0..1 1273588 | TransportEmergencyCardCode 1273590 |
| | | | | | | DangerousGoodsLabelCode 1273592 | | | | 0..1 1273594 | DangerousGoodsLabelCode 1273596 |
| | | | | | | DangerousGoodsLabelCode2 1273598 | | | | 0..1 1273600 | DangerousGoodsLabelCode 1273602 |

FIG. 127-123

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DangerousGoodsLabelCode3 1273604 | | | | 0..1 1273606 | DangerousGoodsLabelCode 1273608 |
| | | | | | | PackingInstructionTypeCode 1273610 | | | | 0..1 1273612 | PackingInstructionTypeCode 1273614 |
| | | | | | | TransportMeansDescriptionCode 1273616 | | | | 0..1 1273618 | TransportMeansDescriptionCode 1273620 |
| | | | | | | TransportationAuthorisationCode 1273622 | | | | 0..1 1273624 | DangerousGoodsTransportationAuthorisationCode 1273626 |
| | | | | | | ContactInformation 1273628 | | | | 0..n 1273630 | ... |

FIG. 127-124

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | ContactPersonFunctionTypeCode 1273632 | | | 1 1273634 | ContactPersonFunctionTypeCode 1273636 |
| | | | | | | | Address 1273638 | | | 1 1273640 | Address 1273642 |
| | | | | | | Quantity 1273644 | | | | 0..n 1273646 | ... |
| | | | | | | | Quantity 1273648 | | | 1 1273650 | Quantity 1273652 |
| | | | | | | | RoleCode 1273654 | | | 0..1 1273656 | QuantityRoleCode 1273658 |
| | | | | | | | TypeCode 1273660 | | | 0..1 1273662 | QuantityTypeCode 1273664 |
| | | | | | | TextCollection 1273666 | | | | 0..1 1273668 | ... |

FIG. 127-125

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TextCollection 1273670 | | | 1 1273672 | TextCollection 1273674 |
| | | | | | | TransportationUnitResourceInformationAssignment 1273676 | | | | 0..n 1273678 | ... |
| | | | | | | | SupplierShipmentQuoteTransportationUnitResourceInformationID 1273680 | | | 1 1273682 | ResourceInformationID 1273684 |
| | | | | | | | Quantity 1273686 | | | 0..n 1273688 | ... |
| | | | | | | | | Quantity 1273690 | | 1 1273692 | Quantity 1273694 |

FIG. 127-126

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | RoleCode 1273696 | | 0..1 1273698 | QuantityRoleCode 1273700 |
| | | | | | | | | TypeCode 1273702 | | 0..1 1273704 | QuantityTypeCode 1273706 |
| | | | | | TransportationStageAssignment 1273708 | | | | | 0..n 1273710 | ... |
| | | | | | | SupplierShipmentQuoteTransportationStageID 1273712 | | | | 1 1273714 | TransportationStageID 1273716 |
| | | | | | | Quantity 1273718 | | | | 0..n 1273720 | ... |
| | | | | | | | Quantity 1273722 | | | 1 1273724 | Quantity 1273726 |

FIG. 127-127

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | RoleCode 1273728 | | | 0..1 1273730 | QuantityRoleCode 1273732 |
| | | | | | | | TypeCode 1273734 | | | 0..1 1273736 | QuantityTypeCode 1273738 |
| | | | | | TransportationUnitResourceInformationAssignment 1273740 | | | | | 0..n 1273742 | ... |
| | | | | | | SupplierShipmentQuoteTransportationUnitResourceInformationID 1273744 | | | | 1 1273746 | ResourceInformationID 1273748 |
| | | | | | | Quantity 1273750 | | | | 0..n 1273752 | ... |

FIG. 127-128

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | Quantity 1273754 | | | 1 1273756 | Quantity 1273758 |
| | | | | | | | RoleCode 1273760 | | | 0..1 1273762 | QuantityRoleCode 1273764 |
| | | | | | | | TypeCode 1273766 | | | 0..1 1273768 | QuantityTypeCode 1273770 |
| GovernmentalRequirementInformation 1273772 | | | | | GovernmentalProcedure 1273774 | | | | | 0..n 1273776 | ... |
| | | | | | | TransportationGovernmentAgencyTypeCode 1273778 | | | | 0..1 1273780 | TransportationGovernmentAgencyTypeCode 1273782 |

FIG. 127-129

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationMovementTypeCode 1273784 | | | | 0..1 1273786 | TransportationMovementTypeCode 1273788 |
| | | | | | | TransportationGovernmentAgencyInvolvementStatusCode 1273790 | | | | 0..1 1273792 | TransportationGovernmentAgencyInvolvementStatusCode 1273794 |
| | | | | | | TransportationGovernmentAgencyActionCode 1273796 | | | | 0..1 1273798 | TransportationGovernmentAgencyActionCode 1273800 |

FIG. 127-130

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TransportationGovernmentAgencyProcedureStatusCode 1273802 | | | | 0..1 1273804 | TransportationGovernmentAgencyProcedureStatusCode 1273806 |
| | | | | | | Location 1273808 | | | | 0..n 1273810 | ... |
| | | | | | | | Location 1273812 | | | 1 1273814 | BusinessTransactionDocumentLocation 1273816 |
| | | | | | | | RoleCode 1273818 | | | 1 1273820 | LocationRoleCode 1273822 |
| | | | | | | | TypeCode 1273824 | | | 0..1 1273826 | LocationTypeCode 1273828 |
| | | | | | | | Name 1273830 | | | 0..1 1273832 | MEDIUM_Name 1273834 |

FIG. 127-131

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | DateTimePeriod 1273836 | | | | 0..n 1273838 | ... |
| | | | | | | | DateTimePeriod 1273840 | | | 1 1273842 | DateTimePeriod 1273844 |
| | | | | | | | PeriodRoleCode 1273846 | | | 1 1273848 | PeriodRoleCode 1273850 |
| | | | | | | TextCollection 1273852 | | | | 0..n 1273854 | ... |
| | | | | | | | TextCollection 1273856 | | | 0..1 1273858 | TextCollection 1273860 |
| | | | | | | TransportationDocumentInformation 1273862 | | | | 0..n 1273864 | ... |

FIG. 127-132

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationDocumentTypeCode 1273866 | | | 0..1 1273868 | TransportationDocumentTypeCode 1273870 |
| | | | | | | | TransportationDocumentNote 1273872 | | | 0..1 1273874 | SHORT_Note 1273876 |
| | | | | | | | TransportationDocumentID 1273878 | | | 0..1 1273880 | TransportationDocumentID 1273882 |
| | | | | | | | TransportationDocumentStatusCode 1273884 | | | 0..1 1273886 | TransportationDocumentStatusCode 1273888 |
| | | | | | | | LanguageCode 1273890 | | | 0..1 1273892 | LanguageCode 1273894 |

FIG. 127-133

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CommunicationMediumTypeCode 1273896 | | | 0..1 1273898 | CommunicationMediumTypeCode 1273900 |
| | | | | | | | RequiredIndicator 1273902 | | | 1 1273904 | Indicator 1273906 |
| | | | | | | | OutputCopyNumberValue 1273908 | | | 0..1 1273910 | NumberValue 1273912 |
| | | | | | | | OutputOriginalNumberValue 1273914 | | | 0..1 1273916 | NumberValue 1273918 |
| | | | | | | | DateTimePeriod 1273920 | | | 0..n 1273922 | ... |

FIG. 127-134

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | DateTime Period 1273924 | | 1 1273926 | DateTimePeriod 1273928 |
| | | | | | | | | PeriodRoleCode 1273930 | | 1 1273932 | PeriodRoleCode 1273934 |
| PartyInformation 1273936 | | | | | Party 1273938 | | | | | 0..n 1273940 | ... |
| | | | | | | Party 1273942 | | | | 1 1273944 | BusinessTransactionDocumentParty 1273946 |
| | | | | | | RoleCode 1273948 | | | | 1 1273950 | PartyRoleCode 1273952 |
| | | | | | | FormattedName 1273954 | | | | 0..1 1273956 | LONG_Name 1273958 |
| | | | | | | DateTimePeriods 1273960 | | | | 0..n 1273962 | ... |

FIG. 127-135

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | RequestedFulfillmentPeriod 1273964 | | | 0..1 1273966 | DateTimePeriod 1273968 |
| | | | | | | | AcceptableFulfillmentPeriod 1273970 | | | 0..1 1273972 | DateTimePeriod 1273974 |
| | | | | | | | PeriodRoleCode 1273976 | | | 1 1273978 | PeriodRoleCode 1273980 |
| LocationInformation 1273982 | | | | | Location 1273984 | | | | | 0..n 1273986 | ... |
| | | | | | | Location 1273988 | | | | 1 1273990 | BusinessTransactionDocumentLocation 1273992 |
| | | | | | | RoleCode 1273994 | | | | 1 1273996 | LocationRoleCode 1273998 |

FIG. 127-136

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TypeCode 1274000 | | | | 0..1 1274002 | LocationTypeCode 1274004 |
| | | | | | | Name 1274006 | | | | 0..1 1274008 | MEDIUM_Name 1274010 |
| | | | | | | DateTimePeriods 1274012 | | | | 0..n 1274014 | ... |
| | | | | | | | RequestedFulfillmentPeriod 1274016 | | | 0..1 1274018 | DateTimePeriod 1274020 |
| | | | | | | | AcceptableFulfillmentPeriod 1274022 | | | 0..1 1274024 | DateTimePeriod 1274026 |
| | | | | | | | PeriodRoleCode 1274028 | | | 1 1274030 | PeriodRoleCode 1274032 |

FIG. 127-137

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| TransportationGoodsInformation 1274034 | | | | | ProductInformation 1274036 | | | | | 0..n 1274038 | ... |
| | | | | | | Product 1274040 | | | | 0..1 1274042 | BusinessTransactionDocumentProduct 1274044 |
| | | | | | | ProductDescription 1274046 | | | | 0..1 1274048 | SHORT_Description 1274050 |
| | | | | | TransportationGoodsIdentification 1274052 | | | | | 0..n 1274054 | ... |
| | | | | | | TransportationGoodsIdentifierTypeCode 1274056 | | | | 1 1274058 | TransportationGoodsIdentifierTypeCode 1274060 |

FIG. 127-138

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | LowerBoundaryTransportationGoodsID 1274062 | | | | 1 1274064 | TransportationGoodsID 1274066 |
| | | | | | | UpperBoundaryTransportationGoodsID 1274068 | | | | 0..1 1274070 | TransportationGoodsID 1274072 |
| TransportationChargesInformation 1274074 | | | | TransportationChargesInformation 1274076 | | | | | | 0..n 1274078 | ... |
| | | | | | TransportationChargesUsageCode 1274080 | | | | | 1 1274082 | TransportationChargesUsageCode 1274084 |

FIG. 127-139

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | SupplierShipmentQuoteItemID 1274086 | | | | | 0..1 1274088 | BusinessTransactionDocumentItemID 1274090 |
| | | | | | SupplierShipmentQuotePartyStandardID 1274092 | | | | | 0..1 1274094 | PartyStandardID 1274096 |
| | | | | | SupplierShipmentQuotePartyInternalID 1274098 | | | | | 0,,1 1274100 | PartyInternalID 1274102 |
| | | | | | SupplierShipmentQuoteTransportationUnitResourceInformationID 1274104 | | | | | 0..1 1274106 | ResourceInformationID 1274108 |

FIG. 127-140

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | SupplierShipmentQuotePackageInformationID 1274110 | | | | | 0..1 1274112 | PackageInformationID 1274114 |
| | | | | | SupplierShipmentQuoteTransportationStageID 1274116 | | | | | 0..1 1274118 | TransportationStageID 1274120 |
| | | | | | TransportationCharges 1274122 | | | | | 0..1 1274124 | ... |
| | | | | | | ID 1274126 | | | | 1 1274128 | TransportationChargesID 1274130 |
| | | | | | | FreightAgreementID 1274132 | | | | 1 1274134 | FreightAgreementID 1274136 |

FIG. 127-141

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | OriginCode 1274138 | | | | 0..1 1274140 | TransportationChargesOriginCode 1274142 |
| | | | | | | TariffID 1274144 | | | | 0..1 1274146 | TransportationChargesTariffID 1274148 |
| | | | | | | Calculation SheetID 1274150 | | | | 1 1274152 | TransportationChargesCalculation SheetID 1274154 |
| | | | | | | Location 1274156 | | | | 0..n 1274158 | ... |
| | | | | | | | Location 1274160 | | | 1 1274162 | BusinessTransactionDocumentLocation 1274164 |
| | | | | | | | RoleCode 1274166 | | | 1 1274168 | LoactionRoleCode 1274170 |

FIG. 127-142

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TypeCode 1274172 | | | 0..1 1274174 | LocationTypeCode 1274176 |
| | | | | | | | Name 1274178 | | | 0..1 1274180 | MEDIUM_Name 1274182 |
| | | | | | | | DateTimePeriods 1274184 | | | 0..n 1274186 | ... |
| | | | | | | | | RequestedFulfillmentPeriod 1274188 | | 0..1 1274190 | DateTimePeriod 1274192 |
| | | | | | | | | AcceptableFulfillmentPeriod 1274194 | | 0..1 1274196 | DateTimePeriod 1274198 |
| | | | | | | | | PeriodRoleCode 1274200 | | 1 1274202 | PeriodRoleCode 1274204 |

FIG. 127-143

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | TextCollection 1274206 | | | | 0..1 1274208 | ... |
| | | | | | | | TextCollection 1274210 | | | 1 1274212 | TextCollection 1274214 |
| | | | | | | Currency 1274216 | | | | 0..n 1274218 | ... |
| | | | | | | | Code 1274220 | | | 1 1274222 | CurrencyCode 1274224 |
| | | | | | | | RoleCode 1274226 | | | 1 1274228 | CurrencyRoleCode 1274230 |
| | | | | | | | UsageCode 1274232 | | | 0..1 1274234 | CurrencyUsageCode 1274236 |
| | | | | | | ExchangeRate 1274238 | | | | 0..n 1274240 | ... |

FIG. 127-144

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | ExchangeRate 1274242 | | | 1 1274244 | ExchangeRate 1274246 |
| | | | | | | | TypeCode 1274248 | | | 0..1 1274250 | ExchangeRateTypeCode 1274252 |
| | | | | | | PercentElement 1274254 | | | | 0..n 1274256 | ... |
| | | | | | | | PercentRoleCode 1274258 | | | 1 1274260 | PercentRoleCode 1274262 |
| | | | | | | | Percent 1274264 | | | 1 1274266 | Percent 1274268 |
| | | | | | | | TransportationChargesPercentCalculationBaseCode 1274270 | | | 0..1 1274272 | TransportationChargesPercentCalculationBaseCode 1274274 |

FIG. 127-145

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | StatusCode 1274276 | | | 0..1 1274278 | TransportationChargesPercentElementStatusCode 1274280 |
| | | | | | | DateTimePeriod 1274282 | | | | 0..n 1274284 | ... |
| | | | | | | | DateTimePeriod 1274286 | | | 1 1274288 | DateTimePeriod 1274290 |
| | | | | | | | PeriodRoleCode 1274292 | | | 1 1274294 | PeriodRoleCode 1274296 |
| | | | | | | BusinessTransactionDocumentReference 1274298 | | | | 0..n 1274300 | ... |

FIG. 127-146

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | BusinessTransactionDocumentReference 1274302 | | | 0..1 1274304 | BusinessTransactionDocumentReference 1274306 |
| | | | | | | | BusinessTransactionDocumentRelationshipRoleCode 1274308 | | | 0..1 1274310 | BusinessTransactionDocumentRelationshipRoleCode 1274312 |
| | | | | | | | BusinessTransactionDocumentRelationshipTypeCode 1274314 | | | 0..1 1274316 | BusinessTransactionDocumentRelationshipTypeCode 1274318 |
| | | | | | | | TransportationDocumentTypeCode 1274320 | | | 0..1 1274322 | TransportationDocumentTypeCode 1274324 |

FIG. 127-147

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationDocumentNote 1274326 | | | 0..1 1274328 | SHORT_Note 1274330 |
| | | | | | | | TransportationDocumentID 1274332 | | | 0..1 1274334 | TransportationDocumentID 1274336 |
| | | | | | | TaxDetail 1274338 | | | | 0..n 1274340 | ... |
| | | | | | | | ProductTax 1274342 | | | 1 1274344 | ProductTax 1274346 |
| | | | | | | PaymentInstruction 1274348 | | | | 0..n 1274350 | ... |
| | | | | | | | PaymentInstruction 1274352 | | | 1 1274354 | PaymentInstruction 1274356 |

FIG. 127-148

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | TransportationChargesElementCategoryCode 1274358 | | | 0..1 1274360 | TransportationChargesElementCategoryCode 1274362 |
| | | | | | | | TransportationChargesElementSubCategoryCode 1274364 | | | 0..1 1274366 | TransportationChargesElementSubCategoryCode 1274368 |
| | | | | | | | TransportationChargesPaymentArrangementCode 1274370 | | | 0..1 1274372 | TransportationChargesPaymentArrangementCode 1274374 |
| | | | | | | CashDiscountTerms 1274376 | | | | 0..1 1274378 | ... |

FIG. 127-149

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | CashDiscountTerms 1274380 | | | 1 1274382 | CashDiscountTerms 1274384 |
| | | | | | | | TransportationChargesElementCategoryCode 1274386 | | | 0..1 1274388 | TransportationChargesElementCategoryCode 1274390 |
| | | | | | | | TransportationChargesElementSubCategoryCode 1274392 | | | 0..1 1274394 | TransportationChargesElementSubCategoryCode 1274396 |
| | | | | | | Element 1274398 | | | | 0..n 1274400 | ... |
| | | | | | | | CategoryCode 1274402 | | | 1 1274404 | TransportationChargesElementCategoryCode 1274406 |

FIG. 127-150

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | SubCategoryCode 1274408 | | | 1 1274410 | TransportationChargesElementSubCategoryCode 1274412 |
| | | | | | | | TypeCode 1274414 | | | 1 1274416 | TransportationChargesElementTypeCode 1274418 |
| | | | | | | | CalculationResolutionCode 1274420 | | | 1 1274422 | TransportationChargesElementCalculationResolutionCode 1274424 |
| | | | | | | | TransportationChargesPaymentArrangementCode 1274426 | | | 0...1 1274428 | TransportationChargesPaymentArrangementCode 1274430 |
| | | | | | | | Location 1274432 | | | 0..n 1274434 | ... |

FIG. 127-151

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | Location 1274436 | | 1 1274438 | BusinessTransactionDocumentLocation 1274440 |
| | | | | | | | | RoleCode 1274442 | | 1 1274444 | LocationRoleCode 1274446 |
| | | | | | | | | TypeCode 1274448 | | 0..1 1274450 | LocationTypeCode 1274452 |
| | | | | | | | | Name 1274454 | | 0..1 1274456 | MEDIUM_Name 1274458 |
| | | | | | | | | DateTimePeriods 1274460 | | 0..n 1274462 | ... |
| | | | | | | | | | RequestedFulfillmentPeriod 1274464 | 0..1 1274466 | DateTimePeriod 1274468 |

FIG. 127-152

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | | AcceptableFulfillmentPeriod 1274470 | 0..1 1274472 | DateTimePeriod 1274474 |
| | | | | | | | | | PeriodRoleCode 1274476 | 1 1274478 | PeriodRoleCode 1274480 |
| | | | | | | | TextCollection 1274482 | | | 0..1 1274484 | ... |
| | | | | | | | | TextCollection 1274486 | | 1 1274488 | TextCollection 1274490 |
| | | | | | | | Currency 1274492 | | | 0..n 1274494 | ... |
| | | | | | | | | Code 1274496 | | 1 1274498 | CurrencyCode 1274500 |
| | | | | | | | | RoleCode 1274502 | | 1 1274504 | CurrencyRoleCode 1274506 |

FIG. 127-153

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | UsageCode 1274508 | | 0..1 1274510 | CurrencyUsageCode 1274512 |
| | | | | | | | RateElement 1274514 | | | 0..n 1274516 | ... |
| | | | | | | | | ID 1274518 | | 1 1274520 | TransportationChargesElementRateElementID 1274522 |
| | | | | | | | | Amount 1274524 | | 1 1274526 | Amount 1274528 |
| | | | | | | | | BaseQuantity 1274530 | | 1 1274532 | Quantity 1274534 |
| | | | | | | | | TransportationChargesRateTypeCode 1274536 | | 0..1 1274538 | TransportationChargesRateTypeCode 1274540 |

FIG. 127-154

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | TransportationChargesRateRoleCode 1274542 | | 1 1274544 | TransportationChargesRateRoleCode 1274546 |
| | | | | | | | | TransportationChargesRateElementStatusCode 1274548 | | 0..1 1274550 | TransportationChargesRateElementStatusCode 1274552 |
| | | | | | | | PercentElement 1274554 | | | 0..n 1274556 | ... |
| | | | | | | | | PercentRoleCode 1274558 | | 1 1274560 | PercentRoleCode 1274562 |
| | | | | | | | | Percent 1274564 | | 1 1274566 | Percent 1274568 |

FIG. 127-155

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | TransportationChargesPercentCalculationBaseCode 1274570 | | 0..1 1274572 | TransportationChargesPercentCalculationBaseCode 1274574 |
| | | | | | | | | StatusCode 1274576 | | 0..1 1274578 | TransportationChargesPercentElementStatusCode 1274580 |
| | | | | | | | AmountElement 1274582 | | | 0..n 1274584 | ... |
| | | | | | | | | Amount 1274586 | | 1 1274588 | Amount 1274590 |
| | | | | | | | | AmountRoleCode 1274592 | | 1 1274594 | AmountRoleCode 1274596 |

FIG. 127-156

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | TransportationChargesAmountElementStatusCode 1274598 | | 0..1 1274600 | TransportationChargesAmountElementStatusCode 1274602 |
| | | | | | | | | RateElementIAssignment 1274604 | | 0..n 1274606 | ... |
| | | | | | | | | | TransportationChargesElementRateElementID 1274608 | 1 1274610 | TransportationChargesElementRateElementID 1274612 |
| | | | | | | | CalculationBase 1274614 | | | 0..n 1274616 | ... |

FIG. 127-157

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | TransportationChargesElementCalculationBaseCode 1274618 | | 1 1274620 | TransportationChargesElementCalculationBaseCode 1274622 |
| | | | | | | | | BaseQuantity 1274624 | | 0..1 1274626 | Quantity 1274628 |
| | | | | | | | | BaseQuantityRoleCode 1274630 | | 0..1 1274632 | QuantityRoleCode 1274634 |
| | | | | | | | | BaseQuantityTypeCode 1274636 | | 0..1 1274638 | QuantityTypeCode 1274640 |
| | | | | | | | TaxDetail 1274642 | | | 0..n 1274644 | ... |

FIG. 127-158

| Package | Level 1 | Level 2 | Level 3 | Level 4 | Level 5 | Level 6 | Level 7 | Level 8 | Level 9 | Cardinality | Data Type Name |
|---|---|---|---|---|---|---|---|---|---|---|---|
| | | | | | | | | ProductTax 1274646 | | 1 1274648 | ProductTax 1274650 |
| | | | | | | | DateTimePeriod 1274652 | | | 0..n 1274654 | ... |
| | | | | | | | | DateTime Period 1274656 | | 1 1274658 | DateTimePeriod 1274660 |
| | | | | | | | | PeriodRoleCode 1274662 | | 1 1274664 | PeriodRoleCode 1274666 |
| | | | | | | | CostDistribution 1274668 | | | 0..n 1274670 | ... |
| | | | | | | | | AccountingCodingBlockAssignment 1274672 | | 1 1274674 | AccountingCodingBlockAssignment 1274676 |

MANAGING CONSISTENT INTERFACES FOR BUSINESS OBJECTS ACROSS HETEROGENEOUS SYSTEMS

TECHNICAL FIELD

The subject matter described herein relates generally to the generation and use of consistent interfaces (or services) derived from a business object model. More particularly, the present disclosure relates to the generation and use of consistent interfaces or services that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

In a first aspect, computer readable medium includes program code for providing a message-based interface for performing a freight order service. The interface exposes at least one service as defined in a service registry. Upon execution, the program code executes in an environment of computer systems providing message-based services. The service comprises program code for receiving, from a service consumer, a first message for processing information representing an order to a transportation service provider to ship goods from shippers to consignees. Program code invokes a freight order business object. The business object is a logically centralized, semantically disjointed object for representing an order to a transportation service provider to ship goods from shippers to consignees. The business object comprises data logically organized as a freight order root node and a date time periods subordinate node. Program code initiates transmission of a message to a heterogeneous second application, executing in the environment of computer systems providing message-based services, based on the data in the freight order business object. The message comprises a freight order execution request message entity, a message header package, and a freight order execution package.

In a second aspect, computer readable medium includes program code for providing a message-based interface for performing a freight order service. The software comprises computer readable instructions embodied on tangible media. Upon execution, the software executes in a landscape of computer systems providing message-based services. The software comprises program code for initiating transmission of a message to a heterogeneous second application, executing in the environment of computer systems providing message-based services, based on data in a freight order business object invoked by the second application. The business object is a logically centralized, semantically disjointed object for representing an order to a transportation service provider to ship goods from shippers to consignees. The business object comprises data logically organized as a freight order root node and a date time periods subordinate node. The message comprises a freight order execution request message entity, a message header package, and a freight order execution package. The software comprises program code for receiving a second message from the second application. The second message is associated with the invoked freight order business object and in response to the first message.

In a third aspect, a distributed system operates in a landscape of computer systems providing message-based services. The system processes business objects involving a freight order. The system comprises memory and a graphical user interface remote from the memory. The memory stores a business object repository storing a plurality of business objects. Each business object is a logically centralized, semantically disjointed object. At least one of the business objects is for representing an order to a transportation service provider to ship goods from shippers to consignees. The business object comprises data logically organized as a freight order root node and a date time periods subordinate node. The graphical user interface presents data associated with an invoked instance of the freight order business object. The interface comprises computer readable instructions embodied on tangible media.

In a fourth aspect, a computer readable medium includes program code for providing a message-based interface for performing a maintenance plan service. The interface exposes at least one service as defined in a service registry. Upon execution, the program code executes in an environment of computer systems providing message-based services. The service comprises program code for receiving, from a service consumer, a first message for processing maintenance plans. Program code invokes a maintenance plan business object. The business object is a logically centralized, semantically disjointed object for representing information used to manage maintenance plans. The service comprises data logically organized as a maintenance plan root node, a scheduling terms subordinate node, a cycles subordinate node, and a maintenance plan item subordinate node. The maintenance plan item node contains an object reference subordinate node, an accounting coding block subordinate node, and an item cycle group assignment subordinate node. Program code initiates transmission of a message to a heterogeneous second application, executing in the environment of computer systems providing message-based services, based on the data in the maintenance plan business object. The message comprises a maintenance plan create confirmation message entity, a message header package, a maintenance plan package, and a log package.

In a fifth aspect, a computer readable medium includes program code for providing a message-based interface for performing a maintenance plan service. The software comprises computer readable instructions embodied on tangible media. Upon execution, the software executes in a landscape of computer systems providing message-based services. The service comprises program code for initiating transmission of a message to a heterogeneous second application, executing in the environment of computer systems providing message-based services, based on data in a maintenance plan business object invoked by the second application. The business object is a logically centralized, semantically disjointed object for representing information used to manage maintenance plans. The business object comprises data logically organized as a maintenance plan root node, a scheduling terms subordinate node, a cycles subordinate node, and a maintenance plan item subordinate node. The maintenance plan item node contains an object reference subordinate node, an accounting coding block subordinate node, and an item cycle group assignment subordinate node. The message comprises a maintenance plan create confirmation message entity, a message header package, a maintenance plan package, and a log package. Program code receives a second message from the second application, the second message associated with the invoked maintenance plan business object and in response to the first message.

In a sixth aspect, a distributed system operates in a landscape of computer systems providing message-based services. The system processes business objects involving a maintenance plan service. The service comprises memory and a graphical user interface remote from the memory. Memory stores a business object repository storing a plurality of business objects. Each business object is a logically centralized, semantically disjointed object and at least one of the business objects is for representing information used to manage maintenance plans. The business object comprises data logically organized as a maintenance plan root node, a scheduling terms subordinate node, a cycles subordinate node, and a maintenance plan item subordinate node. The maintenance plan item node contains an object reference subordinate node, an accounting coding block subordinate node, and an item cycle group assignment subordinate node. The graphical user interface presents data associated with an invoked instance of the maintenance plan business object, the interface comprising computer readable instructions embodied on tangible media.

In a seventh aspect, a computer readable medium includes program code for providing a message-based interface for performing a maintenance task list service. The interface exposes at least one service as defined in a service registry. Upon execution, the program code executes in an environment of computer systems providing message-based services. The service comprises program code for receiving, from a service consumer, a first message for processing maintenance task lists. Program code invokes a maintenance task list business object. The business object is a logically centralized, semantically disjointed object for representing information used to manage maintenance task lists. The business object comprises data logically organized as a maintenance task list root node, an operation subordinate node, a relationship subordinate node, and a material input subordinate node. Program code initiates transmission of a message to a heterogeneous second application, executing in the environment of computer systems providing message-based services, based on the data in the maintenance task list business object. The message comprises a maintenance task list simple by elements response message entity, a maintenance task list package, a processing conditions package, and a log package.

In an eighth aspect, a computer readable medium includes program code for providing a message-based interface for performing a maintenance task list service. The software comprises computer readable instructions embodied on tangible media. Upon execution the software executes in a landscape of computer systems providing message-based services. The service comprises program code for initiating transmission of a message to a heterogeneous second application, executing in the environment of computer systems providing message-based services, based on data in a maintenance task list business object invoked by the second application. The business object is a logically centralized, semantically disjointed object for representing information used to manage maintenance task lists. The business object comprises data logically organized as a maintenance task list root node, an operation subordinate node, a relationship subordinate node, and a material input subordinate node. The message comprises a maintenance task list simple by elements response message entity, a maintenance task list package, a processing conditions package, and a log package. Program code receives a second message from the second application, the second message associated with the invoked maintenance task list business object and in response to the first message.

In a ninth aspect, a distributed system operates in a landscape of computer systems providing message-based services. The system processes business objects involving a maintenance task list service. The service comprises memory and a graphical user interface remote from the memory. Memory stores a business object repository storing a plurality of business objects. Each business object is a logically centralized, semantically disjointed object and at least one of the business objects is for representing information used to manage maintenance task lists. The business object comprises data logically organized as a maintenance task list root node, an operation subordinate node, a relationship subordinate node, and a material input subordinate node. The graphical user interface presents data associated with an invoked instance of the maintenance task list business object, the interface comprising computer readable instructions embodied on tangible media.

In a tenth aspect, computer readable medium includes program code for providing a message-based interface for performing a request for supplier freight quote service. The interface exposes at least one service as defined in a service registry. Upon execution, the program code executes in an environment of computer systems providing message-based services. The service comprises program code for receiving, from a service consumer, a first message for processing information for requesting a freight quote from a supplier, including terms and conditions of a transportation service and bidding rules of the tendering process. Program code invokes a request for a supplier freight quote business object. The business object is a logically centralized, semantically disjointed object for representing information for requesting a freight quote from a supplier, including terms and conditions of a transportation service and bidding rules of the tendering process. The business object comprises data logically organized as a request for supplier freight quote root node and at least one subordinate node, including a nature of cargo subordinate node, each subordinate node having zero or more hierarchically more structured subordinate nodes. Program code initiates transmission of a message to a heterogeneous second application, executing in the environment of computer systems providing message-based services, based on the data in the request for a supplier freight quote business object. The message comprises a request for supplier freight quote request message entity, a message header package, and a request for supplier freight quote package.

In an eleventh aspect, computer readable medium includes program code for providing a message-based interface for performing a request for supplier freight quote service. The software comprises computer readable instructions embodied on tangible media. Upon execution, the software executes in a landscape of computer systems providing message-based services. The software comprises program code for initiating transmission of a message to a heterogeneous second application, executing in the environment of computer systems providing message-based services, based on data in a request for supplier freight quote business object invoked by the second application. The business object is a logically centralized, semantically disjointed object for representing information for requesting a freight quote from a supplier, including terms and conditions of a transportation service and bidding rules of the tendering process. The business object comprises data logically organized as a request for supplier freight quote root node and at least one subordinate node, including a nature of cargo subordinate node, each subordinate node having zero or more hierarchically more structured subordinate nodes. The message comprises a request for supplier freight quote request message entity, a message header package, and a request for supplier freight quote package. The software comprises program code for receiving a second message from the second application. The second message is associated with the invoked request for supplier freight quote business object and in response to the first message.

In a twelfth aspect, a distributed system operates in a landscape of computer systems providing message-based services. The system processes business objects involving a request for supplier freight quote. The system comprises memory and a graphical user interface remote from the memory. The memory stores a business object repository storing a plurality of business objects. Each business object is a logically centralized, semantically disjointed object. At least one of the business objects is for representing information for requesting a freight quote from a supplier. The business object comprises data logically organized as a request for supplier freight quote root node and at least one subordinate node, including a nature of cargo subordinate node, each subordinate node having zero or more hierarchically more structured subordinate nodes. The graphical user interface presents data associated with an invoked instance of the request for supplier freight quote business object. The interface comprises computer readable instructions embodied on tangible media.

In a thirteenth aspect, computer readable medium includes program code for providing a message-based interface for performing a supplier freight quote service. The interface exposes at least one service as defined in a service registry. Upon execution, the program code executes in an environment of computer systems providing message-based services. The service comprises program code for receiving, from a service consumer, a first message for processing information for transportation services tendered between transportation service providers, including quoted services in response to a request for a supplier freight quote. Program code invokes a supplier freight quote business object. The business object is a logically centralized, semantically disjointed object for representing information for transportation services tendered between transportation service providers, including quoted services in response to a request for a supplier freight quote. The business object comprises data logically organized as a supplier freight quote root node and at least one subordinate node, including a nature of cargo subordinate node, each subordinate node having zero or more hierarchically more structured subordinate nodes. Program code initiates transmission of a message to a heterogeneous second application, executing in the environment of computer systems providing message-based services, based on the data in the supplier freight quote business object. The message comprises a supplier freight quote request message entity, a message header package, and a supplier freight quote package.

In a fourteenth aspect, computer readable medium includes program code for providing a message-based interface for performing a supplier freight quote service. The software comprises computer readable instructions embodied on tangible media. Upon execution, the software executes in a landscape of computer systems providing message-based services. The software comprises program code for initiating transmission of a message to a heterogeneous second application, executing in the environment of computer systems providing message-based services, based on data in a supplier freight quote business object invoked by the second application. The business object is a logically centralized, semantically disjointed object for representing information for transportation services tendered between transportation service providers, including quoted services in response to a request for a supplier freight quote. The business object comprises data logically organized as a supplier freight quote root node and at least one subordinate node, including a nature of cargo subordinate node, each subordinate node having zero or more hierarchically more structured subordinate nodes. The message comprises a supplier freight quote request message entity, a message header package, and a supplier freight quote package. The software comprises program code for receiving a second message from the second application. The second message is associated with the invoked supplier freight quote business object and in response to the first message.

In a fifteenth aspect, a distributed system operates in a landscape of computer systems providing message-based services. The system processes business objects involving a supplier freight quote. The system comprises memory and a graphical user interface remote from the memory. The memory stores a business object repository storing a plurality of business objects. Each business object is a logically centralized, semantically disjointed object. At least one of the business objects is for representing information for transportation services tendered between transportation service providers, including quoted services in response to a request for a supplier freight quote. The business object comprises data logically organized as a supplier freight quote root node and at least one subordinate node, including a nature of cargo subordinate node, each subordinate node having zero or more hierarchically more structured subordinate nodes. The graphical user interface presents data associated with an invoked instance of the supplier freight quote business object. The interface comprises computer readable instructions embodied on tangible media.

In some implementations, processing business objects includes creating, updating and/or retrieving information associated with the business objects.

BRIEF DESCRIPTION OF THE DRAWINGS

FIGS. 27A-E depict a hierarchization process in accordance with methods and systems consistent with the subject matter described herein.

FIGS. 34-1 through 34-28 show an exemplary FreightOrderExecutionRequestMessage Message Data Type.

FIGS. 36-1 through 36-28 show an exemplary FreightOrderExecution Message Data Type.

FIGS. 38-1 through 38-28 show an exemplary FreightOrderInvoicingPreparationRequestMessage Message Data Type.

FIGS. 41-1 through 41-115 show an exemplary FreightOrderInvoicingPrepRequest Element Structure.

FIGS. 42-1 through 42-3 show an exemplary FreightOrderExecutionCancelRequest Element Structure.

FIGS. 43-1 through 43-179 show an exemplary FreightOrderExecutionConfirmation Element Structure.

FIGS. 44-1 through 44-178 show an exemplary FreightOrderExecutionReques Element Structure.

FIGS. 45-1 through 45-6 show an exemplary FreightOrderExecutionStatusNotification Element Structure.

FIGS. 46-1 through 46-3 show an exemplary FreightOrderInvoicingPrepCancelRequest Element Structure.

FIGS. 47-1 through 47-3 show an exemplary FreightOrderInvoicingPrepConfirmation Element Structure.

FIGS. 73-1 through 73-12 show an exemplary MaintenancePlanMessage_ync Element Structure.

FIGS. 74-1 through 74-8 show an exemplary MaintPlnERPCrteReqMsg_Element Structure.

FIG. 75 shows an exemplary MaintPlnERPCrteConfMsg_Element Structure.

FIG. 76 shows an exemplary MaintPlnERPActvteReqMsg_Element Structure.

FIG. 77 shows an exemplary MaintPlnERPActvteConfMsg_Element Structure.

FIG. 78 shows an exemplary MaintPlnERPDactvteReqMsg_Element Structure.

FIG. 79 shows an exemplary MaintPlnERPDactvteConfMsg_Element Structure.

FIG. 80 shows an exemplary MaintPlnERPSetDelIndReqMsg_Element Structure.

FIG. 81 shows an exemplary MaintPlnERPSetDelIndConfMsg_Element Structure.

FIG. 82 shows an exemplary MaintPlnERPRstDelIndReqMsg_Element Structure.

FIG. 83 shows an exemplary MaintPlnERPRstDelIndConfMsg_Element Structure.

FIGS. 84-1 through 84-2 show an exemplary MaintPlnERPSimplElmntsQryMsg_Element Structure.

FIGS. 85-1 through 85-2 show an exemplary MaintPlnERPSimplElmntsRspMsg_Element Structure.

FIGS. 86-1 through 86-8 show an exemplary MaintPlnERPUpdtReqMsg_Element Structure.

FIG. 87 shows an exemplary MaintPlnERPUpdtConfMsg_Element Structure.

FIGS. 88-1 through 88-8 show an exemplary MaintPlnERPCrteCkQryMsg_Element Structure.

FIG. 89 shows an exemplary MaintPlnERPCrteCkRspMsg_Element Structure.

FIGS. 90-1 through 90-2 show an exemplary MaintPlnERPItmElmntsQryMsg_Element Structure.

FIGS. 91-1 through 91-2 show an exemplary MaintPlnERPItmElmntsRspMsg_Element Structure.

FIGS. 92-1 through 92-8 show an exemplary MaintPlnERPUpdtCkQryMsg_Element Structure.

FIG. 93 shows an exemplary MaintPlnERPUpdtCkRspMsg_Element Structure.

FIG. 94 shows an exemplary MaintPlnERPByIDQryMsg_Element Structure.

FIGS. 95-1 through 95-10 show an exemplary MaintPlnERPByIDRspMsg_Element Structure.

FIG. 96 shows an exemplary MaintPlnERPSchedLineByIDQryMsg_Element Structure.

FIGS. 97-1 through 97-2 show an exemplary MaintPlnERPSchedLineByIDRspMsg_Element Structure.

FIGS. 109-1 through 109-7 show an exemplary MaintenanceTaskListMessage_ync Element Structure.

FIGS. 110-1 through 110-2 show an exemplary MaintTskListERPSimplElmntsQryMsg_Element Structure.

FIGS. 111-1 through 111-2 show an exemplary MaintTskListERPSimplElmntsRspMsg_Element Structure.

FIG. 112 shows an exemplary ParMaintTskListERPSimplByMaintTskListQryMsg_Element Structure.

FIGS. 113-1 through 113-2 show an exemplary ParMaintTskListERPSimplByMaintTskListRspMsg_Element Structure.

FIG. 114 shows an exemplary SubordMaintTskListERPSimplByMaintTskListQryMsg_Element Structure.

FIGS. 115-1 through 115-2 show an exemplary SubordMaintTskListERPSimplByMaintTskListRspMsg_Element Structure.

FIG. 116 shows an exemplary TopLvlMaintTskListERPSimplByMaintTskListQryMsg_Element Structure.

FIG. 117 shows an exemplary TopLvlMaintTskListERPSimplByMaintTskListRspMsg_Element Structure.

FIG. 118 shows an exemplary MaintTskListERPByIDAndGrpIDAndTypeCodeQryMsg_Element Structure.

FIGS. 119-1 through 119-6 show an exemplary MaintTskListERPByIDAndGrpIDAndTypeCodeRspMsg_Element Structure.

FIG. 120 shows an exemplary RequestForSupplierFreightQuote Message Choreography.

FIGS. 121-1 through 121-21 show an exemplary RequestForSupplierFreightQuoteRequestMessage Message Data Type.

FIG. 122 shows an exemplary RequestForSupplierFreightQuoteCancelRequestMessage Message Data Type.

FIGS. 123-1 through 123-165 show an exemplary RequestForSupplierFreightQuoteRequestMessage Element Structure.

FIG. 124 shows an exemplary RequestForSupplierFreightQuoteCancelRequestMessage Element Structure.

FIG. 125 shows an exemplary SupplierFreightQuote Message Choreography.

FIGS. 126-1 through 126-21 show an exemplary SupplierFreightQuoteNotificationMessage Message Data Type.

FIGS. 127-1 through 127-158 show an exemplary SupplierFreightQuoteNotificationMessage Element Structure.

DETAILED DESCRIPTION

A. Overview

Figure 1:
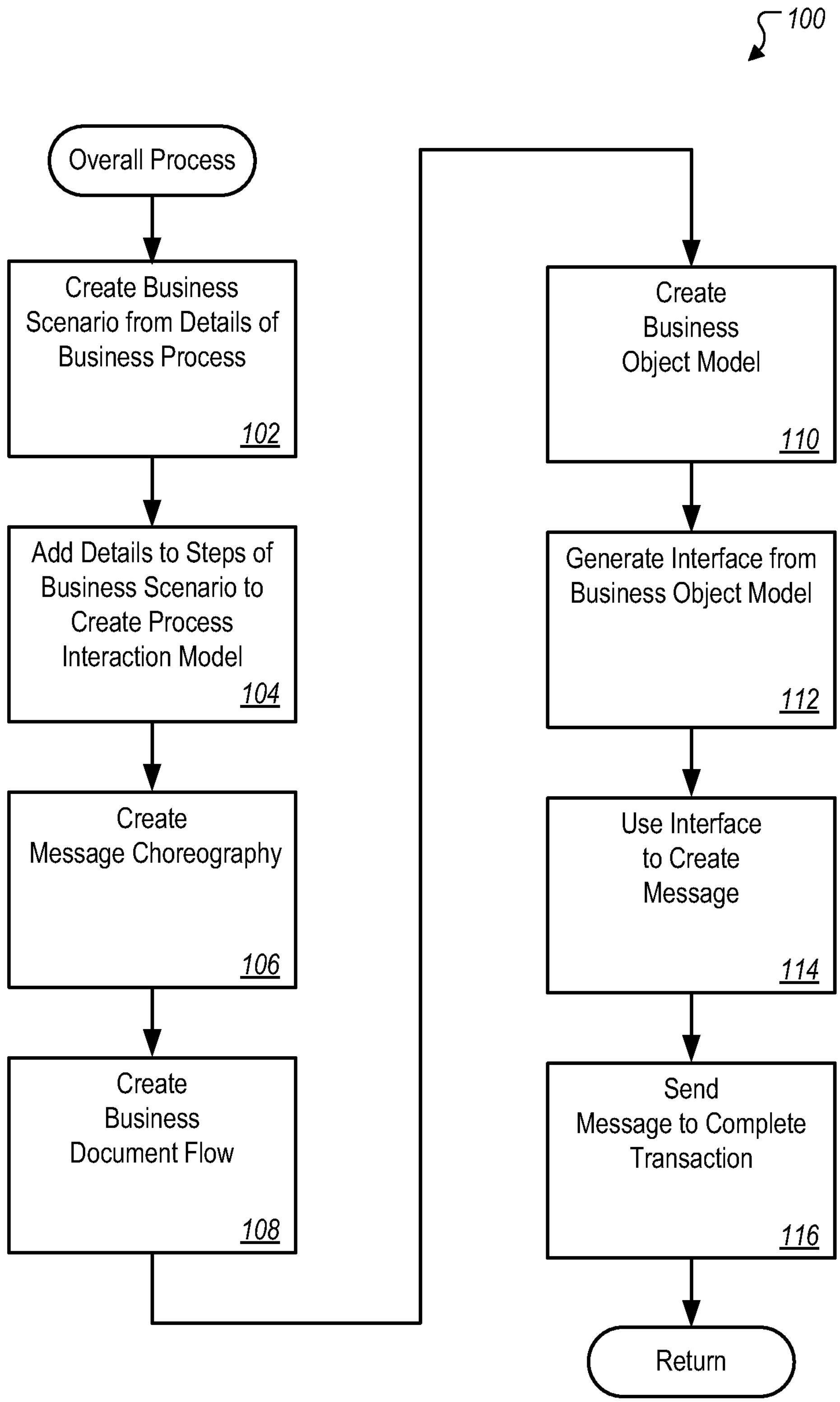
FIG. 1 depicts a flow diagram of the overall steps performed by methods and systems consistent with the subject matter described herein.

Methods and systems consistent with the subject matter described herein facilitate e-commerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Each deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

Figure 2:
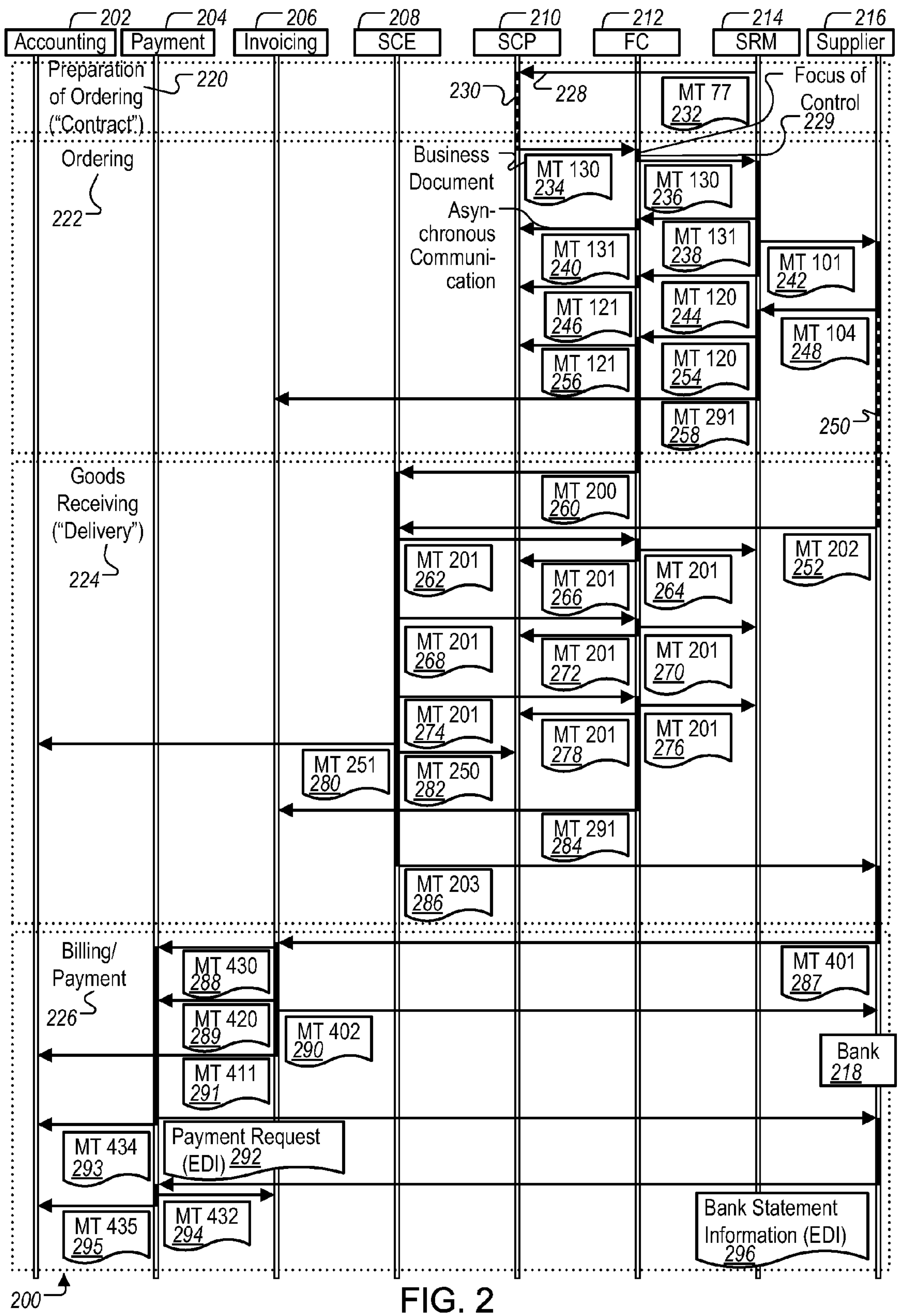
FIG. 2 depicts a business document flow for an invoice request in accordance with methods and systems consistent with the subject matter described herein.

FIG. 2 depicts an example business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208. The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type.

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG.

1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Figure 3A:
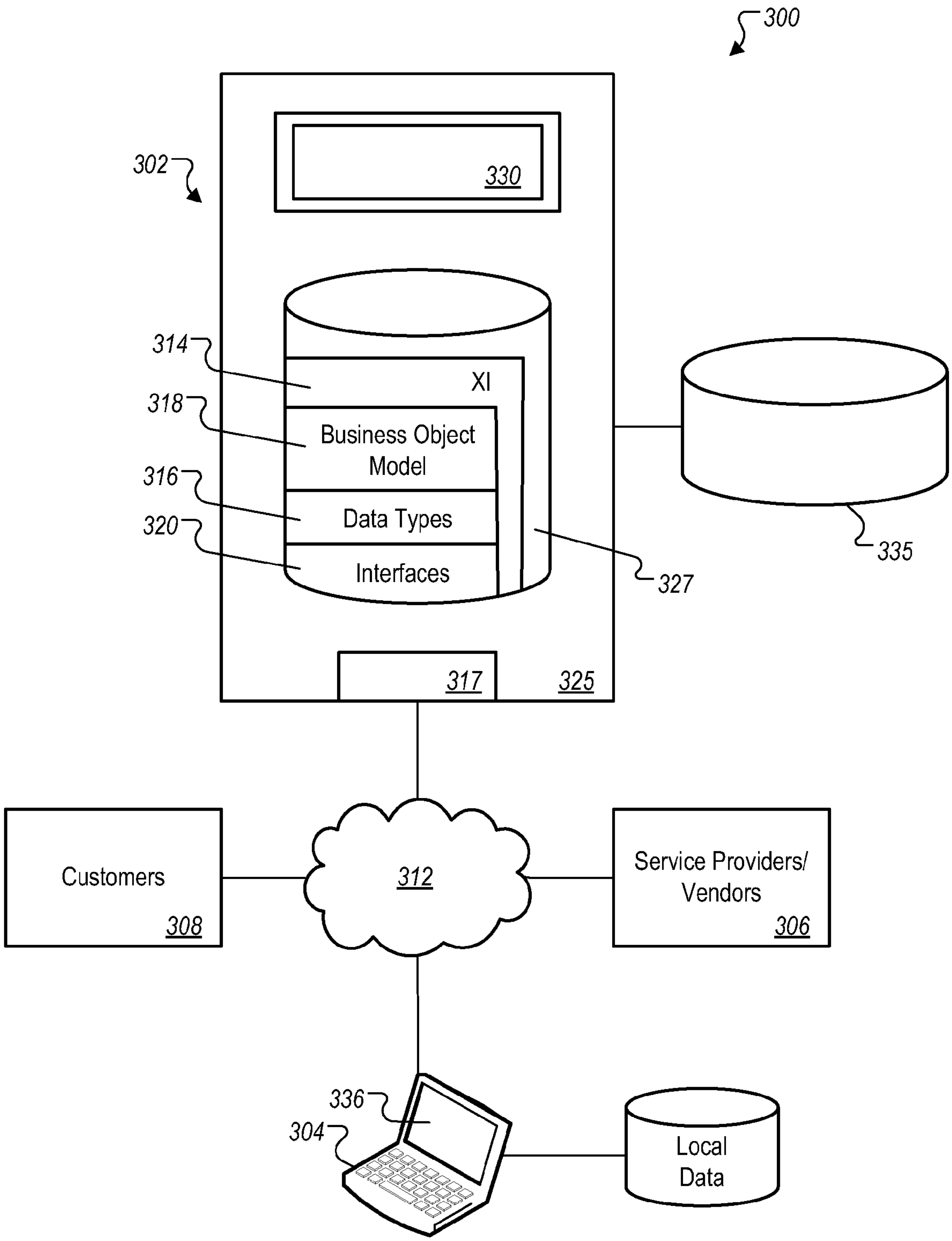
FIGS. 3A-B illustrate example environments implementing the transmission, receipt, and processing of data between heterogeneous applications in accordance with certain embodiments included in the present disclosure.

Turning to the illustrated embodiment in FIG. 3A, environment 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with environment 300. Generally, FIG. 3A provides merely one example of computers that may be used with the disclosure. Each computer is generally intended to encompass any suitable processing device. For example, although FIG. 3A illustrates one server 302 that may be used with the disclosure, environment 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the environment 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java and ABAP). XI 314 is based on an open architecture, and makes use of open standards, such as eXtensible Markup Language (XML)™ and Java environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3A illustrates a single processor 325 in server 302, multiple processors 325 may be used according to particular needs and reference to processor 325 is meant to include multiple processors 325 where applicable. In the illustrated embodiment, processor 325 executes at least business application 330.

Figure 4:
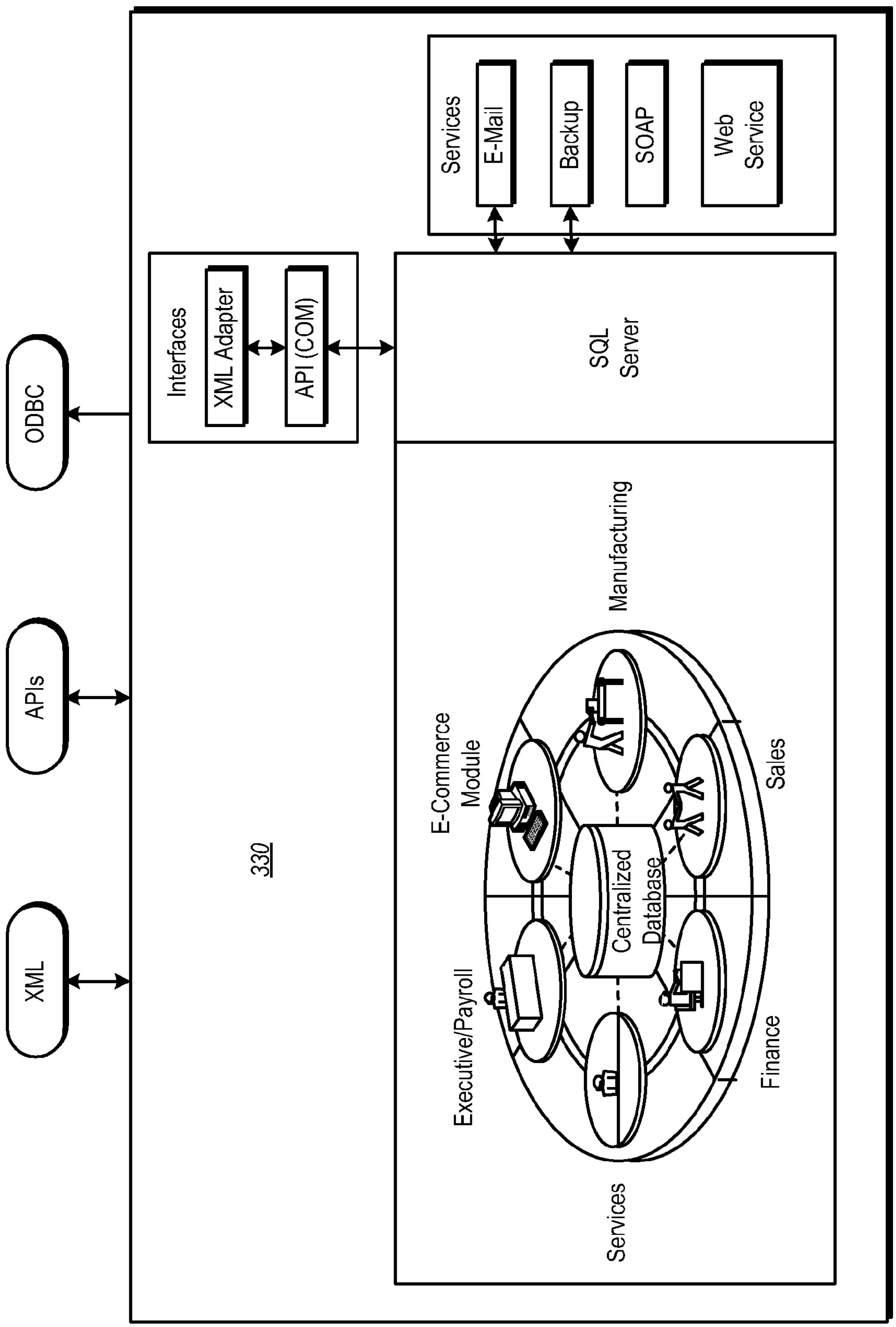
FIG. 4 illustrates an example application implementing certain techniques and components in accordance with one embodiment of the system of FIG. 1.

At a high level, business application 330 is any application, program, module, process, or other software that utilizes or facilitates the exchange of information via messages (or services) or the use of business objects. For example, application 330 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, environment 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of environment 300. It should be understood that automatically further contemplates any suitable administrator or other user interaction with application 330 or other components of environment 300 without departing from the scope of this disclosure.

Returning to FIG. 3A, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, sub-network, or combination thereof operable to facilitate communications between various computing components in environment 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use environment 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 06 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with environment 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of environment 300 for any suitable purpose, such as viewing application or other transaction data. Generally, GUI 336 provides the particular user with an efficient and user-friendly presentation of data provided by or communicated within environment 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in environment 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 3B:
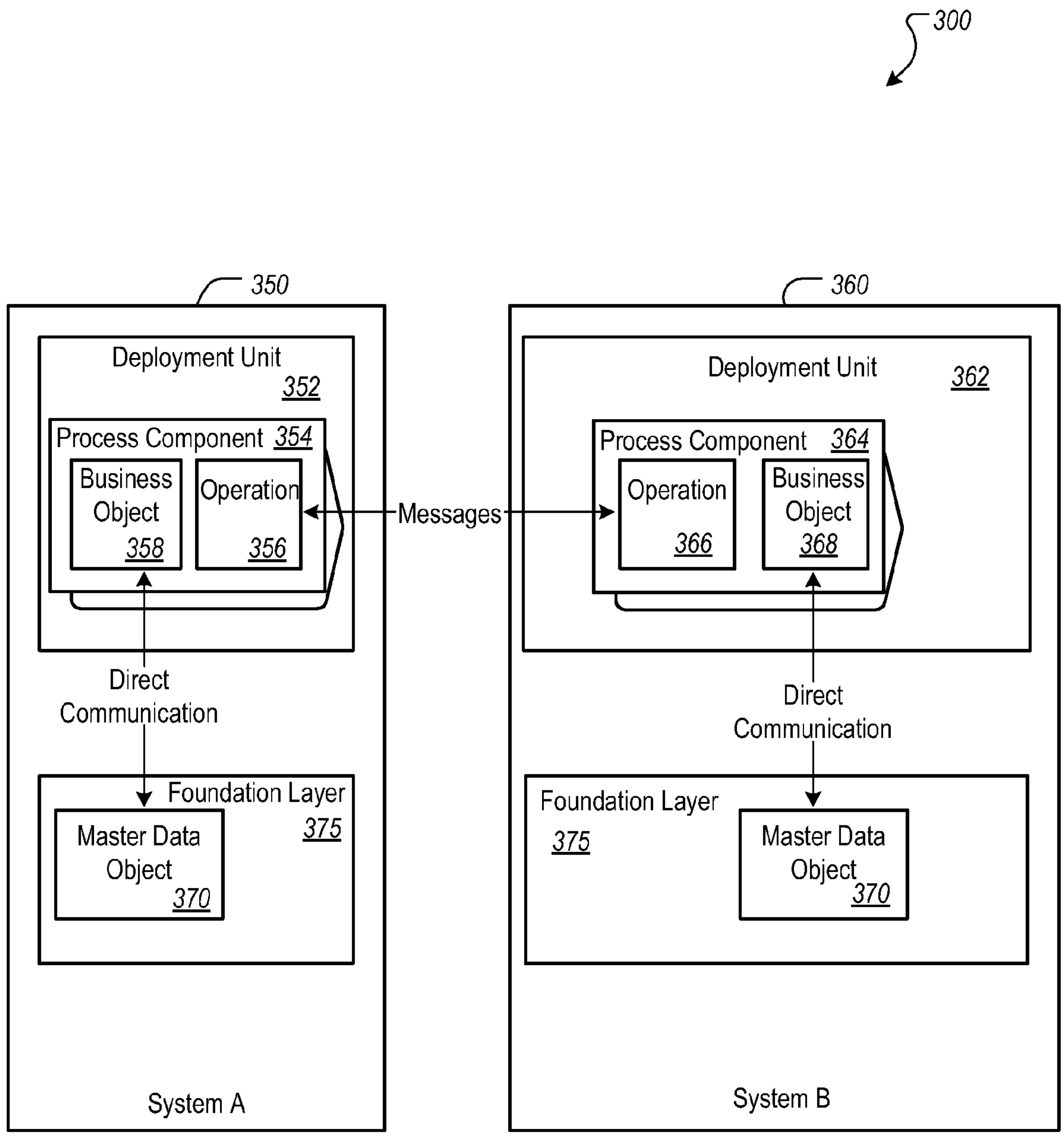

More generally in environment 300 as depicted in FIG. 3B, a Foundation Layer 375 can be deployed on multiple separate and distinct hardware platforms, e.g., System A 350 and System B 360, to support application software deployed as two or more deployment units distributed on the platforms, including deployment unit 352 deployed on System A and deployment unit 362 deployed on System B. In this example, the foundation layer can be used to support application software deployed in an application layer. In particular, the foundation layer can be used in connection with application software implemented in accordance with a software architecture that provides a suite of enterprise service operations having various application functionality. In some implementations, the application software is implemented to be deployed on an application platform that includes a foundation layer that contains all fundamental entities that can used from multiple deployment units. These entities can be process components, business objects, and reuse service components. A reuse service component is a piece of software that is reused in different transactions. A reuse service component is used by its defined interfaces, which can be, e.g., local APIs or service interfaces. As explained above, process components in separate deployment units interact through service operations, as illustrated by messages passing between service operations 356 and 366, which are implemented in process components 354 and 364, respectively, which are included in deployment units 352 and 362, respectively. As also explained above, some form of direct communication is generally the form of interaction used between a business object, e.g., business object 358 and 368, of an application deployment unit and a business object, such as master data object 370, of the Foundation Layer 375.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding.

Figure 5A:
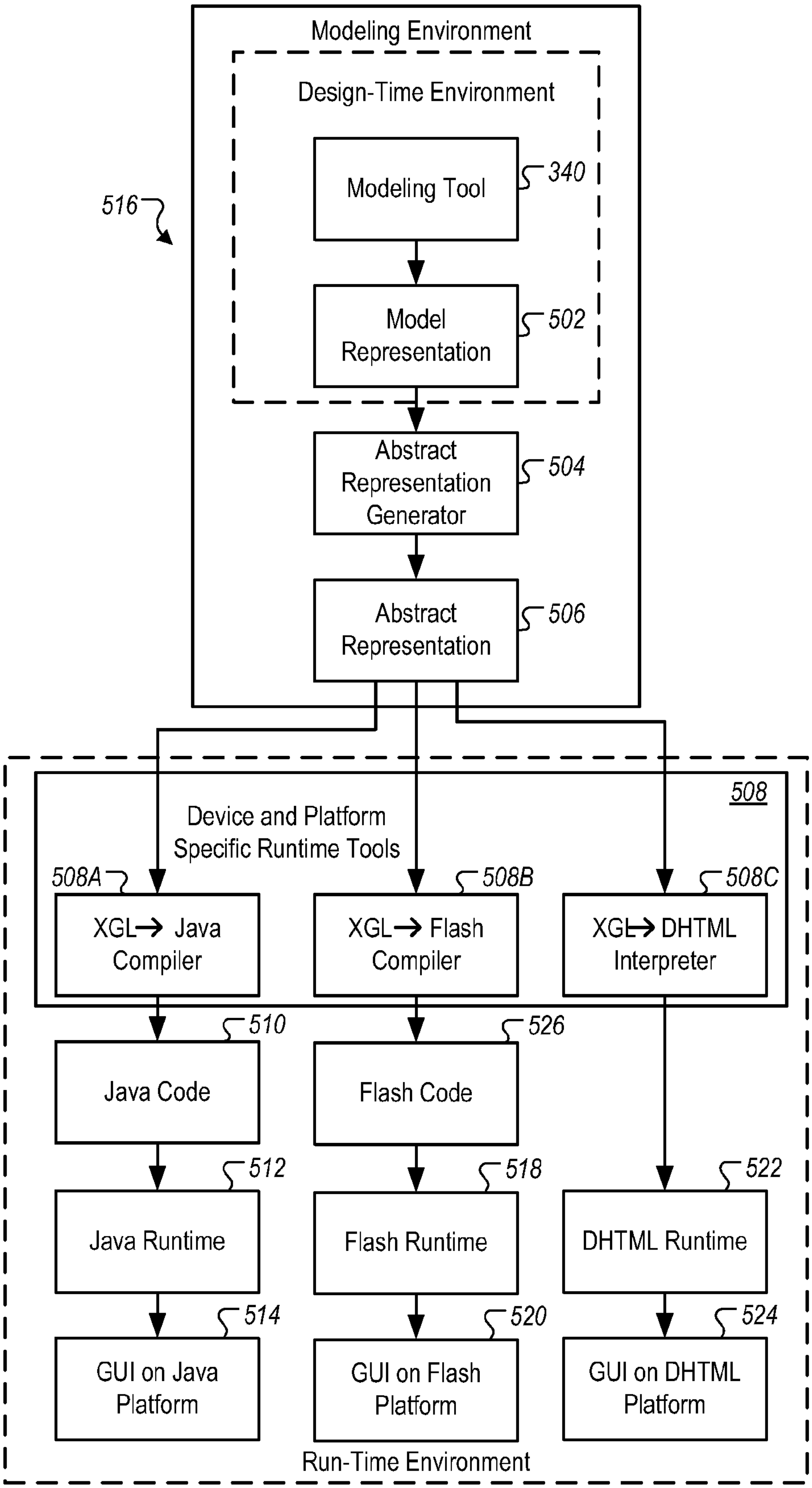
FIG. 5A depicts an example development environment in accordance with one embodiment of FIG. 1.

FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific.

The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508A may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508B may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508C may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
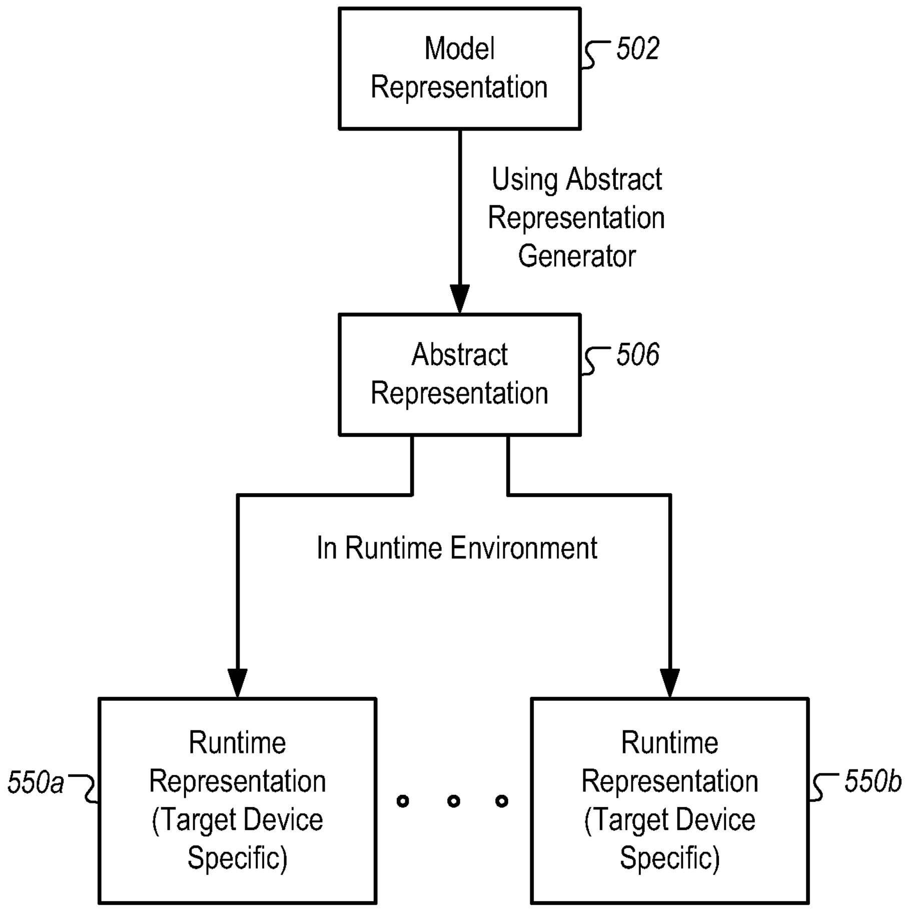
FIG. 5B depicts a simplified process for mapping a model representation to a runtime representation using the example development environment of FIG. 5A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

Figure 6:
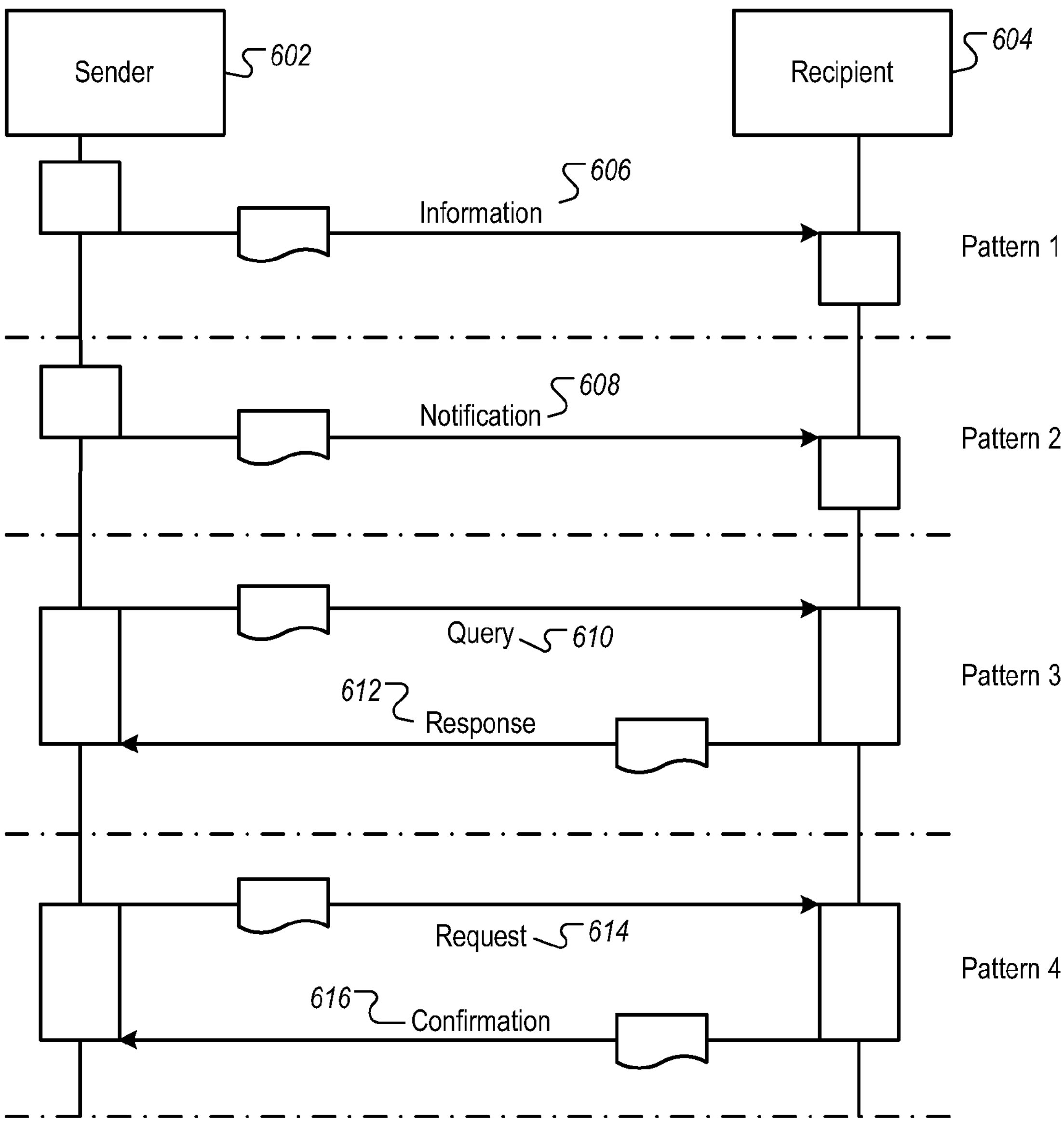
FIG. 6 depicts message categories in accordance with methods and systems consistent with the subject matter described herein.

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is generally a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. Such data types may include those generally described at pages 96 through 1642 (which are incorporated by reference herein) of U.S. patent application Ser. No. 11/803,178, filed on May 11, 2007 and entitled "Consistent Set Of Interfaces Derived From A Business Object Model". For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Figure 7:
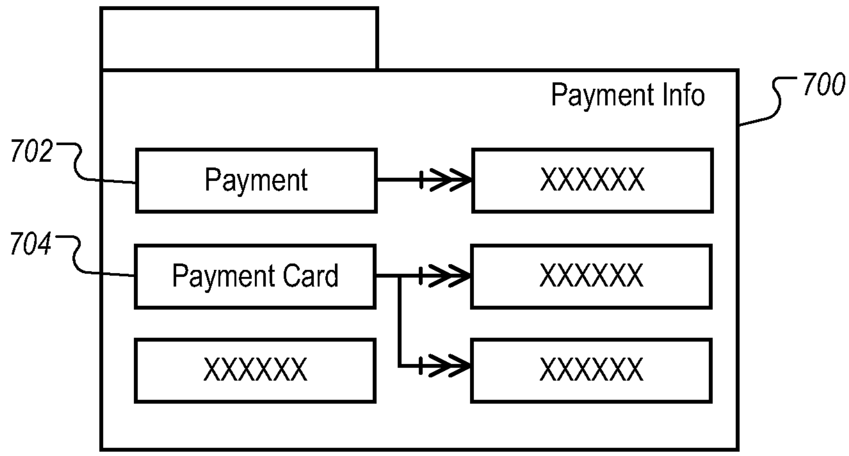
FIG. 7 depicts an example of a package in accordance with methods and systems consistent with the subject matter described herein.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Figure 8:
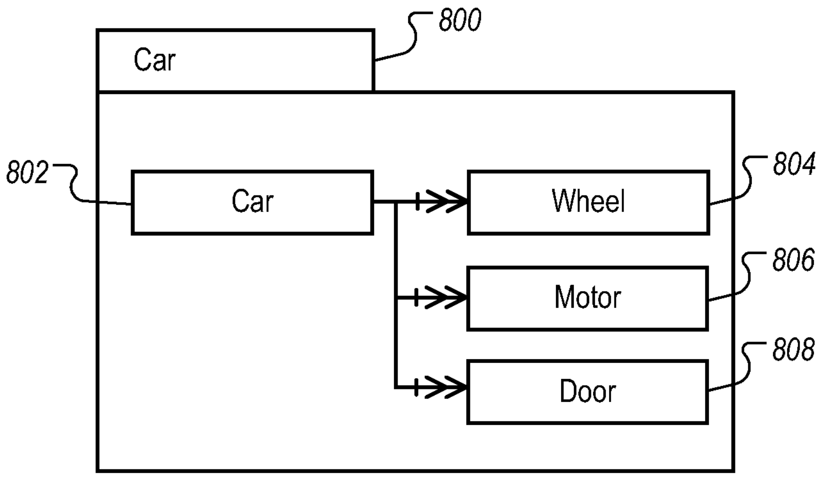
FIG. 8 depicts another example of a package in accordance with methods and systems consistent with the subject matter described herein.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Figure 9:
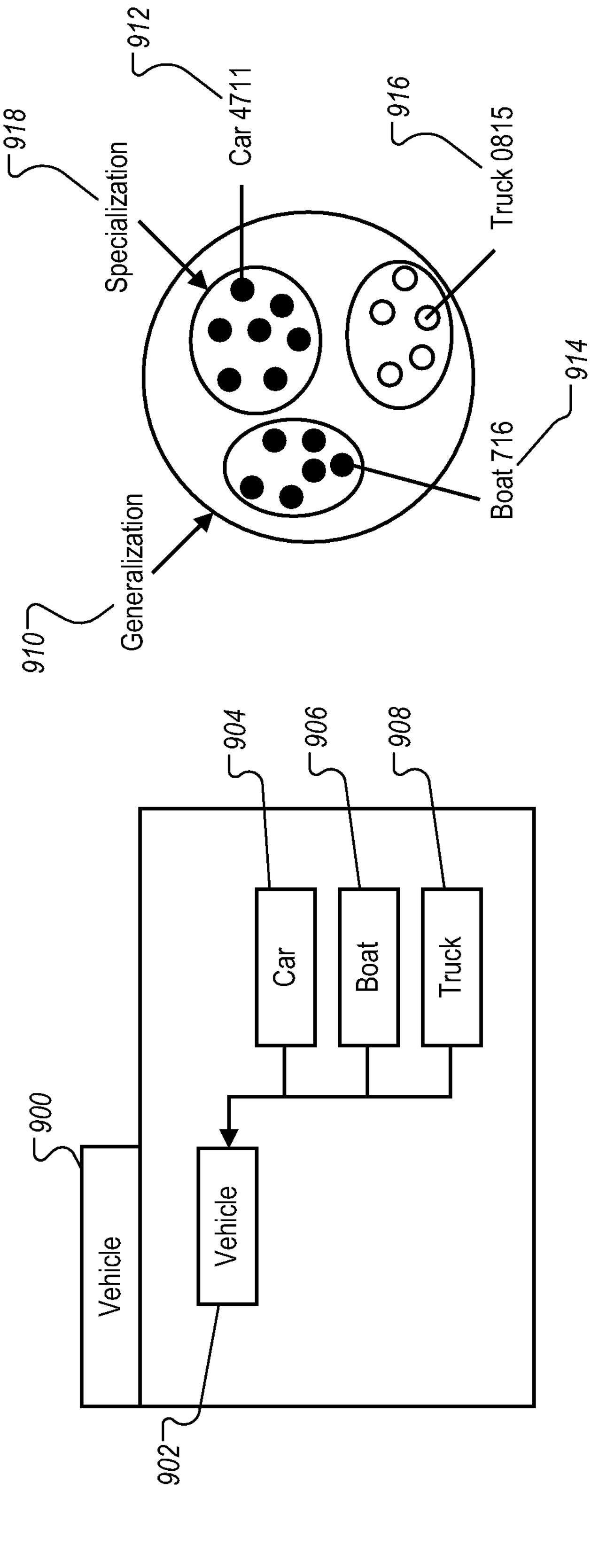
FIG. 9 depicts a third example of a package in accordance with methods and systems consistent with the subject matter described herein.

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Figure 10:
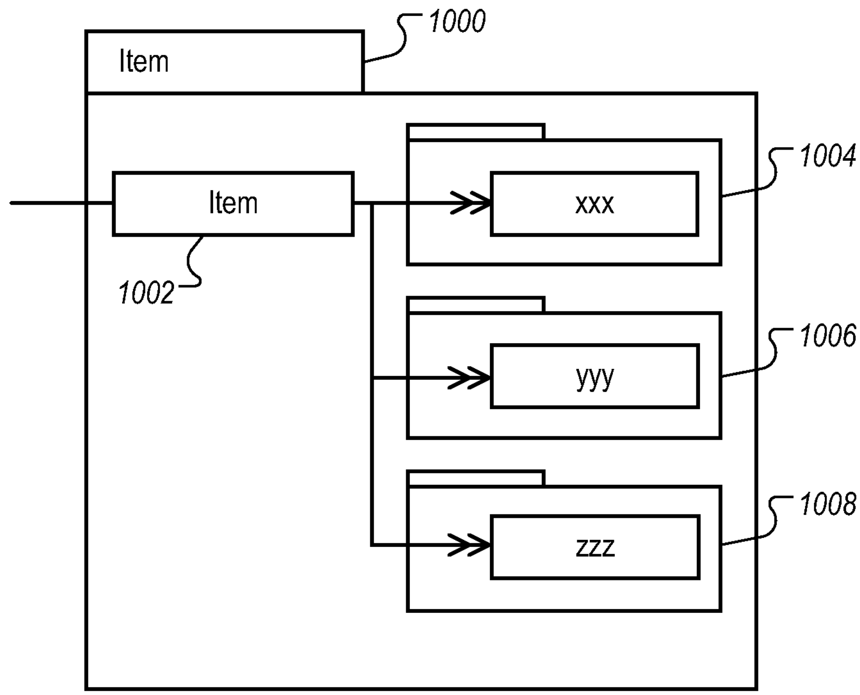
FIG. 10 depicts a fourth example of a package in accordance with methods and systems consistent with the subject matter described herein.

Packages also may be used to represent hierarchy levels. For example, as depicted in FIG. 10, the Item Package 1000 includes Item 1002 with subitem xxx 1004, subitem yyy 1006, and subitem zzz 1008.

Figure 11:
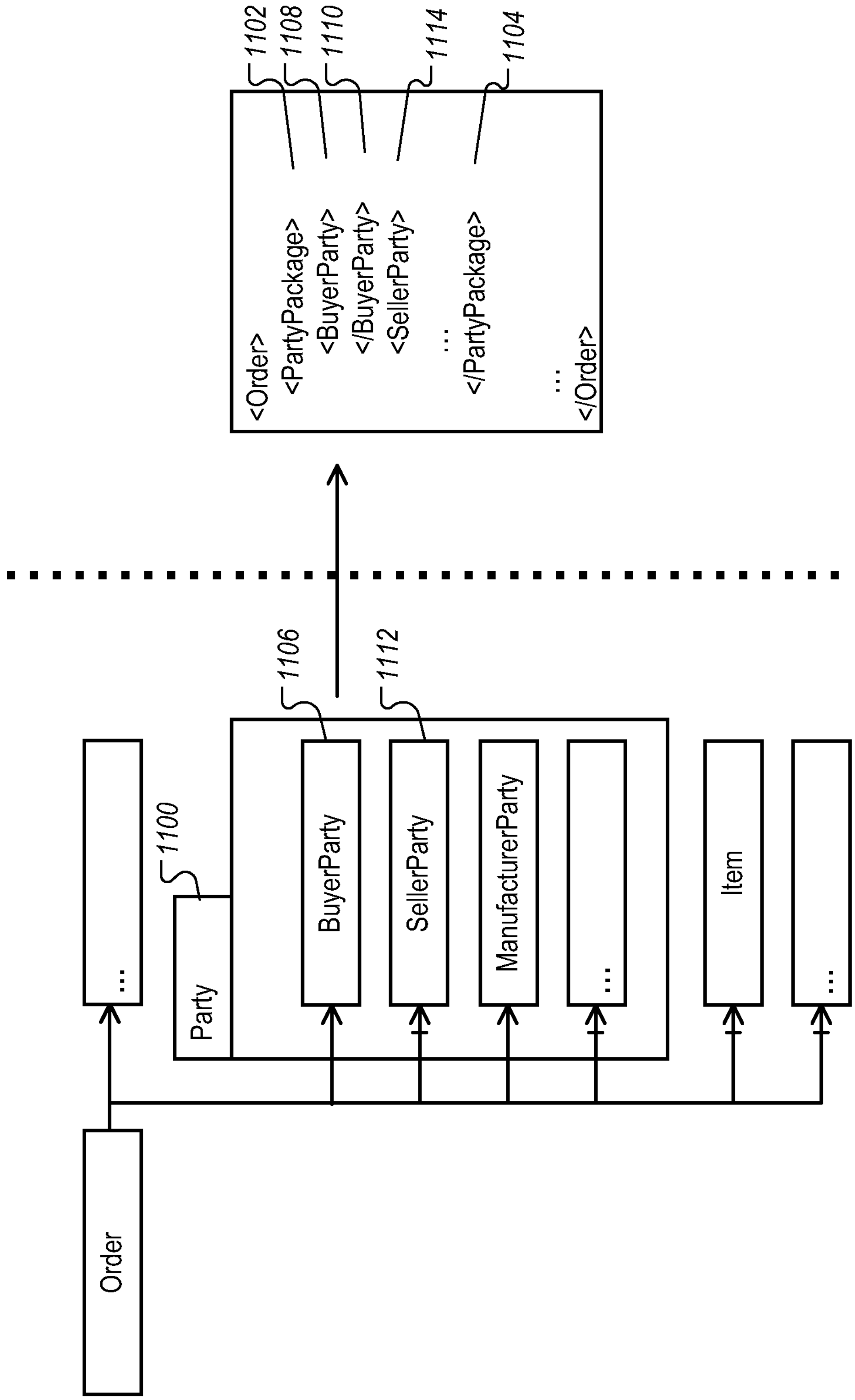
FIG. 11 depicts the representation of a package in the XML schema in accordance with methods and systems consistent with the subject matter described herein.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and </BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

Figure 12:
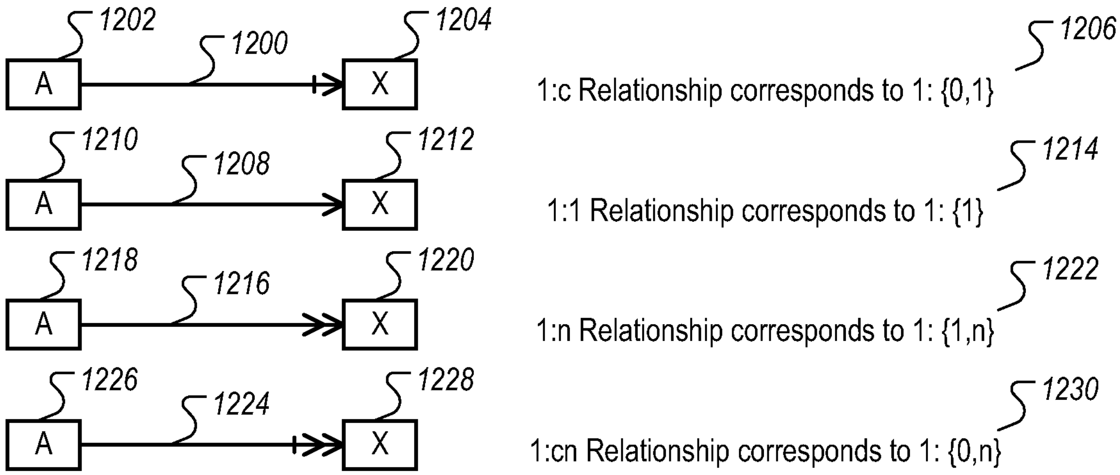
FIG. 12 depicts a graphical representation of cardinalities between two entities in accordance with methods and systems consistent with the subject matter described herein.

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

Figure 13:
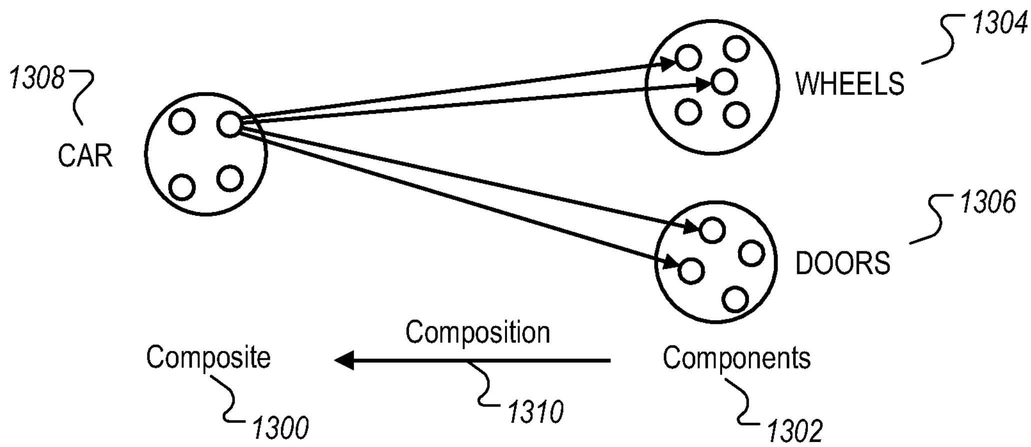
FIG. 13 depicts an example of a composition in accordance with methods and systems consistent with the subject matter described herein.
Figure 14:
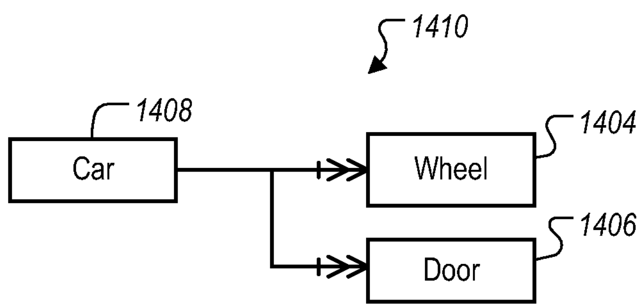
FIG. 14 depicts an example of a hierarchical relationship in accordance with methods and systems consistent with the subject matter described herein.

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
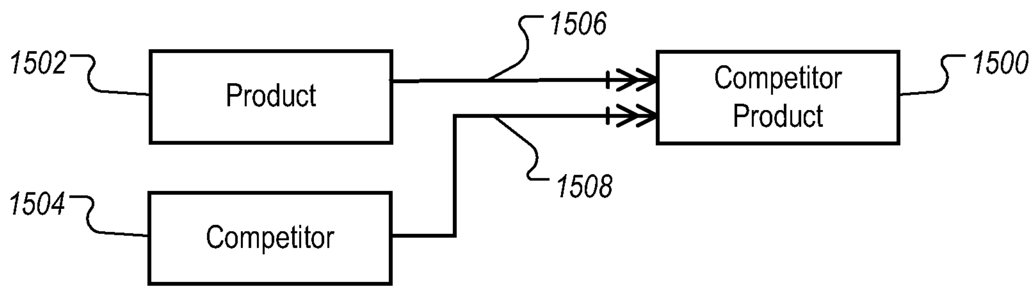
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

Figure 16:
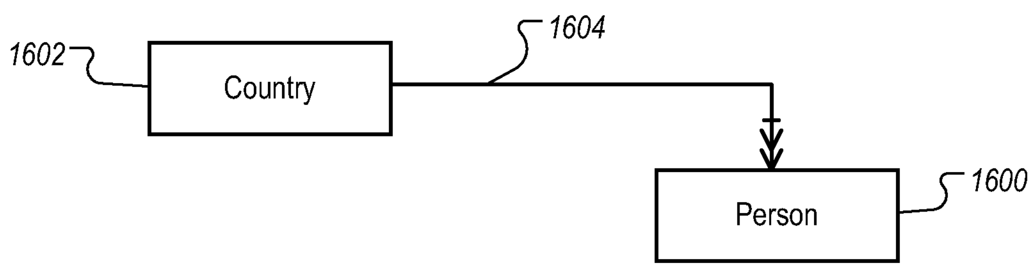
FIG. 16 depicts an example of an association in accordance with methods and systems consistent with the subject matter described herein.

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Figure 17:
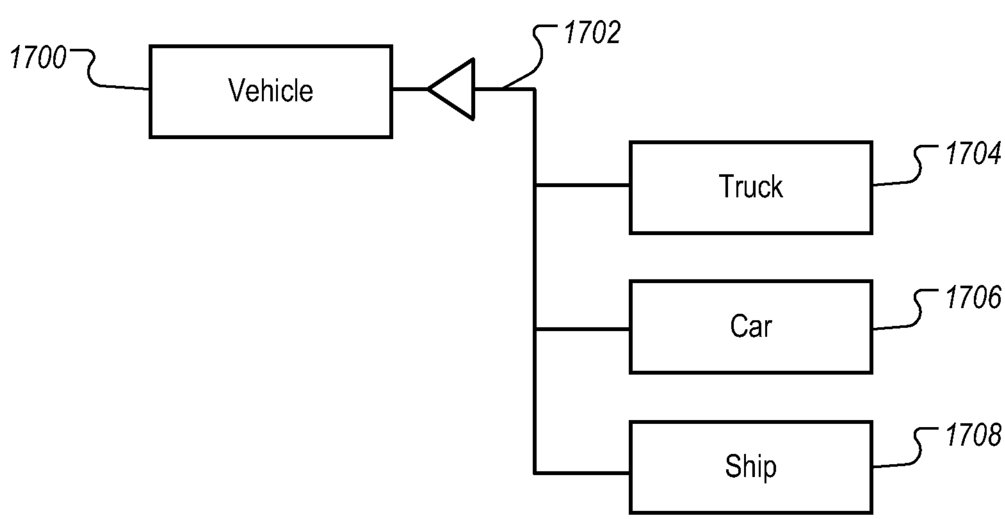
FIG. 17 depicts an example of a specialization in accordance with methods and systems consistent with the subject matter described herein.

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

Figure 18:
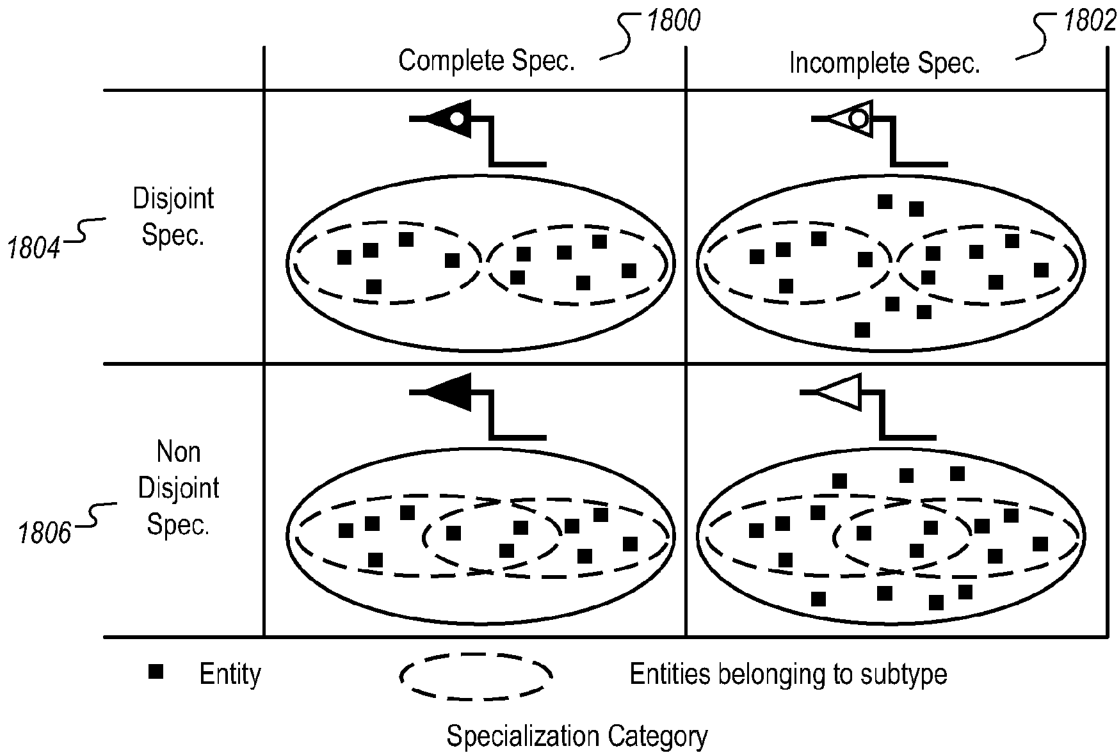
FIG. 18 depicts the categories of specializations in accordance with methods and systems consistent with the subject matter described herein.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

Figure 19:
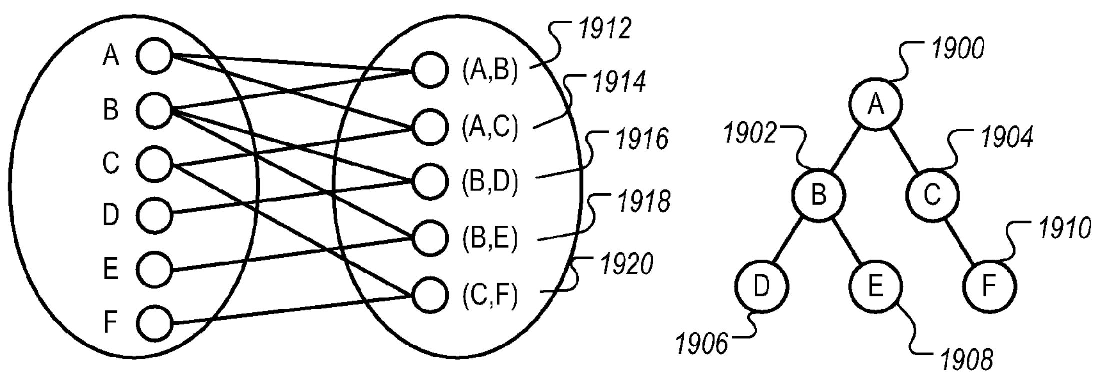
FIG. 19 depicts an example of a hierarchy in accordance with methods and systems consistent with the subject matter described herein.

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Figure 20:
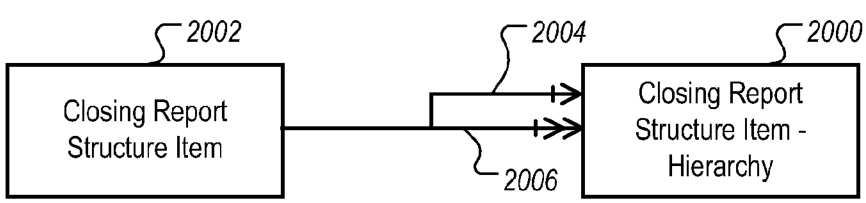
FIG. 20 depicts a graphical representation of a hierarchy in accordance with methods and systems consistent with the subject matter described herein.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
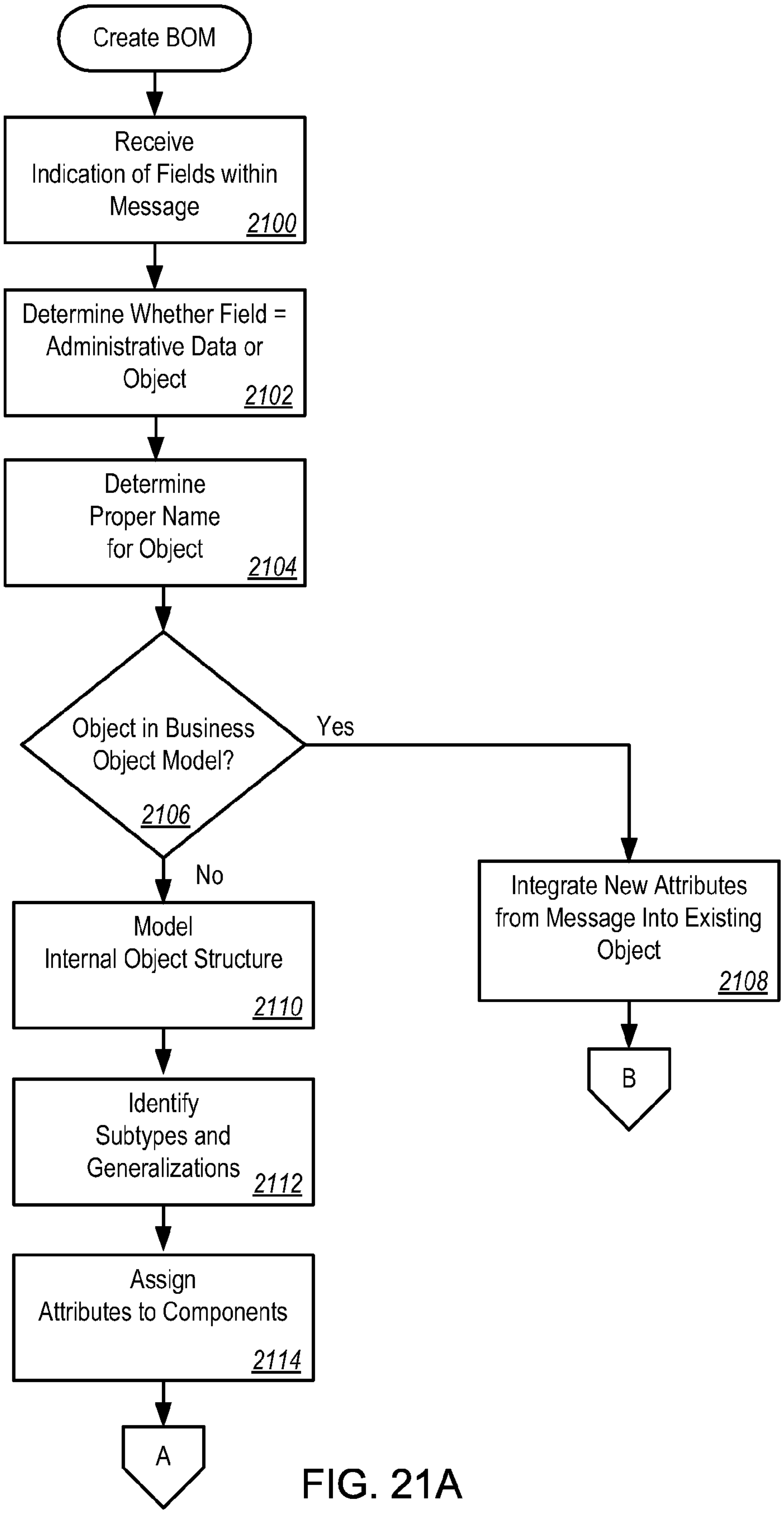
FIGS. 21A-B depict a flow diagram of the steps performed to create a business object model in accordance with methods and systems consistent with the subject matter described herein.
Figure 21B:
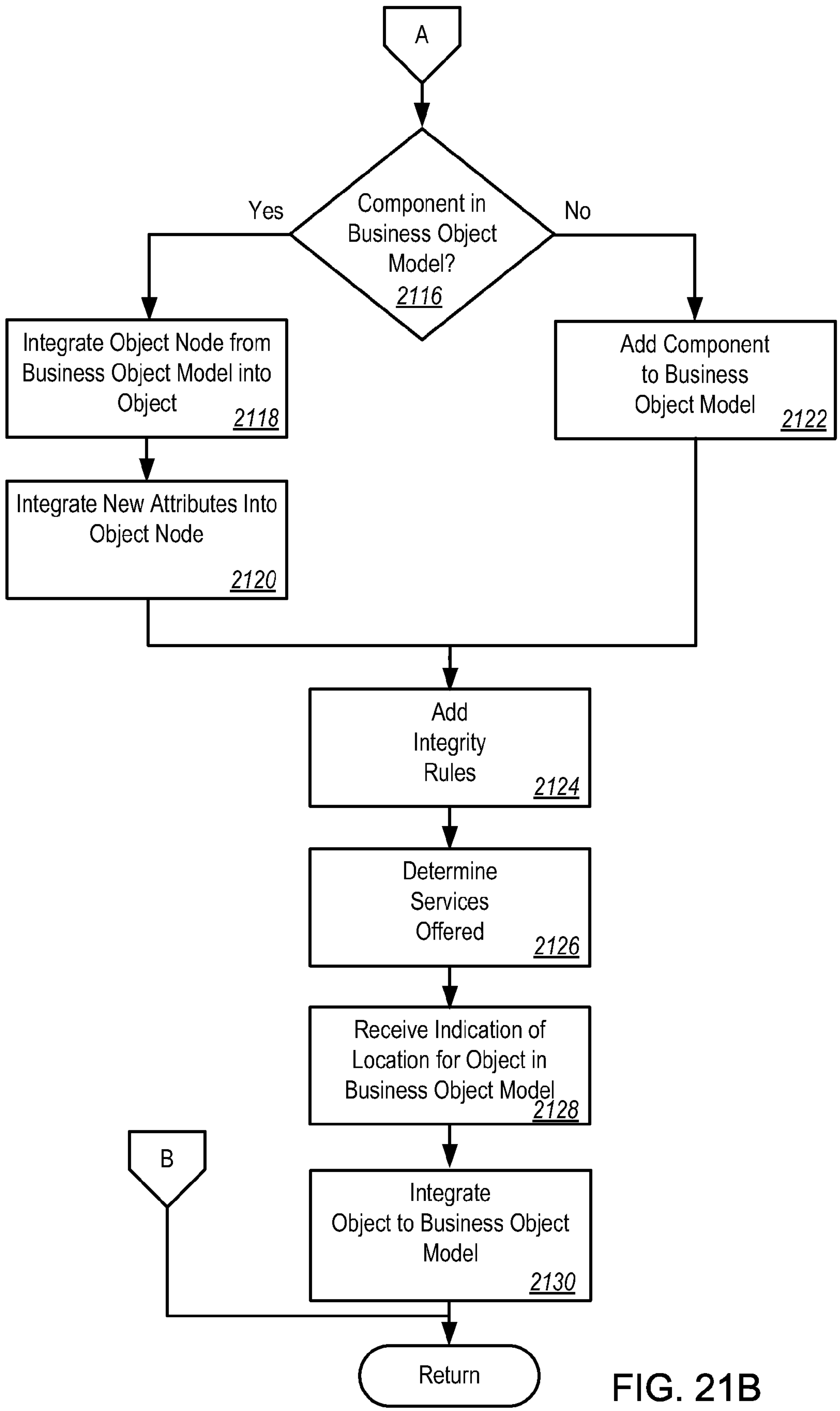

FIGS. 21A-B depict the steps performed using methods and systems consistent with the subject matter described herein to create a business object model. Although some steps are described as being performed by a computer, these steps may alternatively be performed manually, or computer-assisted, or any combination thereof Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |

-continued

| | |
|---|---|
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |
| Amount | |
| BaseQuantity | |
| ConfirmedAmount | |
| ConfirmedBaseQuantity | |
| ItemBuyer | |
| ItemBuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | |
| ItemSellerAddress | |
| ItemLocation | |
| ItemLocationType | |
| ItemDeliveryItemGroupID | |
| ItemDeliveryPriority | |
| ItemDeliveryCondition | |
| ItemTransferLocation | |
| ItemNumberofPartialDelivery | |
| ItemQuantityTolerance | |
| ItemMaximumLeadTime | |
| ItemTransportServiceLevel | |
| ItemTranportCondition | |
| ItemTransportDescription | |
| ContractReference | |
| QuoteReference | |
| CatalogueReference | |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | |
|---|---|
| ID | Pur-<br>chase<br>Order |
| AdditionalID | |
| PostingDate | |
| LastChangeDate | |

-continued

| | | |
|---|---|---|
| AcceptanceStatus | | |
| Note | | |
| CompleteTransmission Indicator | | |
| Buyer | Buyer | |
| BuyerOrganisationName | | |
| Person Name | | |
| FunctionalTitle | | |
| DepartmentName | | |
| CountryCode | | |
| StreetPostalCode | | |
| POBox Postal Code | | |
| Company Postal Code | | |
| City Name | | |
| DistrictName | | |
| PO Box ID | | |
| PO Box Indicator | | |
| PO Box Country Code | | |
| PO Box Region Code | | |
| PO Box City Name | | |
| Street Name | | |
| House ID | | |
| Building ID | | |
| Floor ID | | |
| Room ID | | |
| Care Of Name | | |
| AddressDescription | | |
| Telefonnumber | | |
| MobileNumber | | |
| Facsimile | | |
| Email | | |
| Seller | Seller | |
| SellerAddress | | |
| Location | Location | |
| LocationType | | |
| DeliveryItemGroupID | DeliveryTerms | |
| DeliveryPriority | | |
| DeliveryCondition | | |
| TransferLocation | | |
| NumberofPartialDelivery | | |
| QuantityTolerance | | |
| MaximumLeadTime | | |
| TransportServiceLevel | | |
| TranportCondition | | |
| TransportDescription | | |
| CashDiscountTerms | | |
| PaymentForm | Payment | |
| PaymentCardID | | |
| PaymentCardReferenceID | | |
| SequenceID | | |
| Holder | | |
| ExpirationDate | | |
| AttachmentID | | |
| AttachmentFilename | | |
| DescriptionofMessage | | |
| ConfirmationDescriptionof Message | | |
| FollowUpActivity | | |
| ItemID | Purchase Order Item | |
| ParentItemID | | |
| HierarchyType | | |
| ProductID | | Product |
| ProductType | | |
| ProductNote | | |
| ProductCategoryID | | ProductCategory |
| Amount | | |
| BaseQuantity | | |
| ConfirmedAmount | | |
| ConfirmedBaseQuantity | | |
| ItemBuyer | | Buyer |
| ItemBuyerOrganisation Name | | |
| Person Name | | |
| FunctionalTitle | | |
| DepartmentName | | |
| CountryCode | | |
| StreetPostalCode | | |

-continued

| | |
|---|---|
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscount Terms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetunitPrice | 0 . . . 1 |
| | | ConfirmedPrice | | 0 . . . 1 |
| | | | NetunitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| Purchase Order | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |

-continued

| | | | |
|---|---|---|---|
| | Transport | | 0 . . . 1 |
| CashDiscount Terms | | | 0 . . . 1 |
| | MaximumCash Discount | | 0 . . . 1 |
| | NormalCashDiscount | | 0 . . . 1 |
| PaymentForm | | | 0 . . . 1 |
| | PaymentCard | | 0 . . . 1 |
| Attachment | | | 0 . . . n |
| Description | | | 0 . . . 1 |
| Confirmation Description | | | 0 . . . 1 |
| Item | | | 0 . . . n |
| | HierarchyRelationship | | 0 . . . 1 |
| | Product | | 0 . . . 1 |
| | ProductCategory | | 0 . . . 1 |
| | Price | | 0 . . . 1 |
| | | NetunitPrice | 0 . . . 1 |
| | ConfirmedPrice | | 0 . . . 1 |
| | | NetunitPrice | 0 . . . 1 |
| | Party | | |
| | | BuyerParty | 0 . . . 1 |
| | | SellerParty | 0 . . . 1 |
| | Location | | |
| | | ShipTo Location | 0 . . . 1 |
| | | ShipFrom Location | 0 . . . 1 |
| | DeliveryTerms | | 0 . . . 1 |
| | Attachment | | 0 . . . n |
| | Description | | 0 . . . 1 |
| | Confirmation Description | | 0 . . . 1 |
| | ScheduleLine | | 0 . . . n |
| | | Delivery Period | 1 |
| | ConfirmedScheduleLine | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete Transmission Indicator | | | 0 . . . 1 |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |

-continued

| | | |
|---|---|---|
| SellerParty | | 0 . . . 1 |
| Product | | 0 . . . 1 |
| RecipientParty | | |
| VendorParty | | 0 . . . 1 |
| Manufacturer Party | | 0 . . . 1 |
| BillToParty | | 0 . . . 1 |
| PayerParty | | 0 . . . 1 |
| CarrierParty | | 0 . . . 1 |
| ShipTo Location | | 0 . . . 1 |
| | StandardID | 0 . . . n |
| | BuyerID | 0 . . . 1 |
| | SellerID | 0 . . . 1 |
| | Address | 0 . . . 1 |
| ShipFrom Location | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Figure 27A:
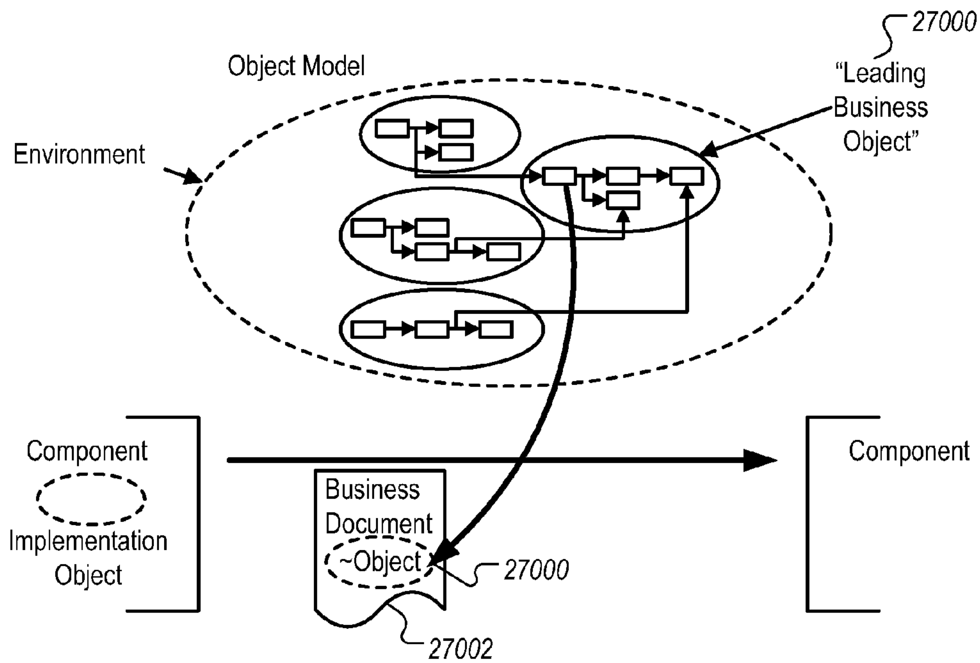

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. As illustrated in FIG. 27A, communication between components takes place via messages that contain business documents (e.g., business document 27002). The business document 27002 ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object 27000. The interface represents a usage-specific, hierarchical view of the underlying usage-neutral object model.

Figure 27B:
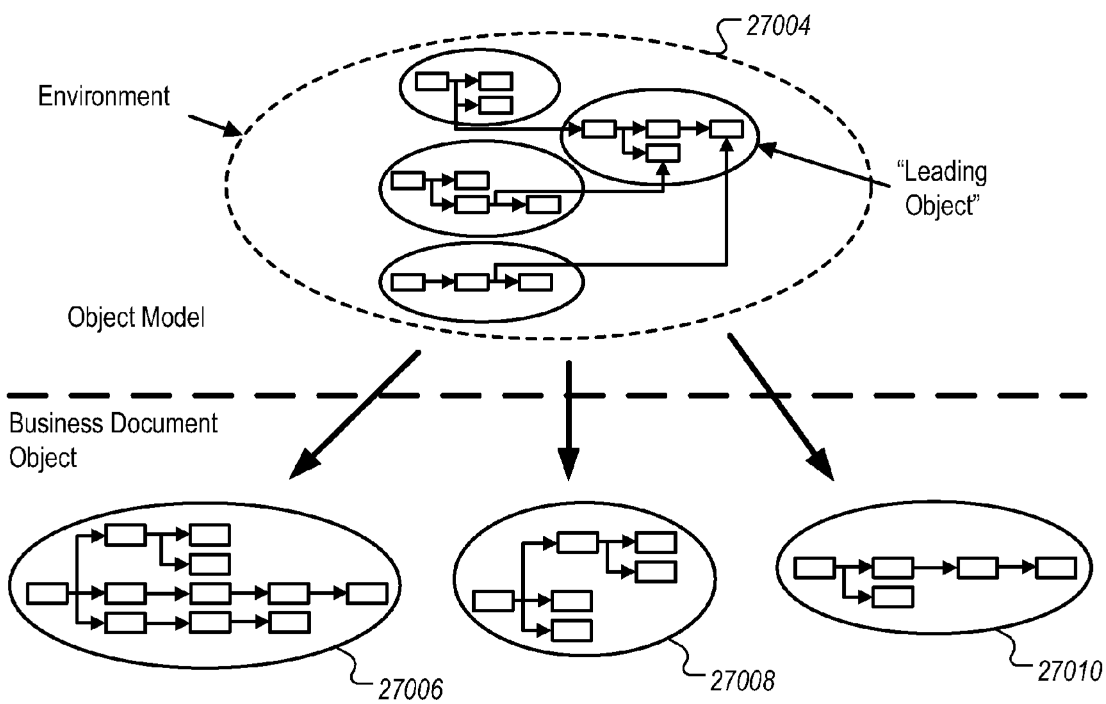

As illustrated in FIG. 27B, several business document objects 27006, 27008, and 27010 as overlapping views may be derived for a given leading object 27004. Each business document object results from the object model by hierarchization.

Figure 27C:
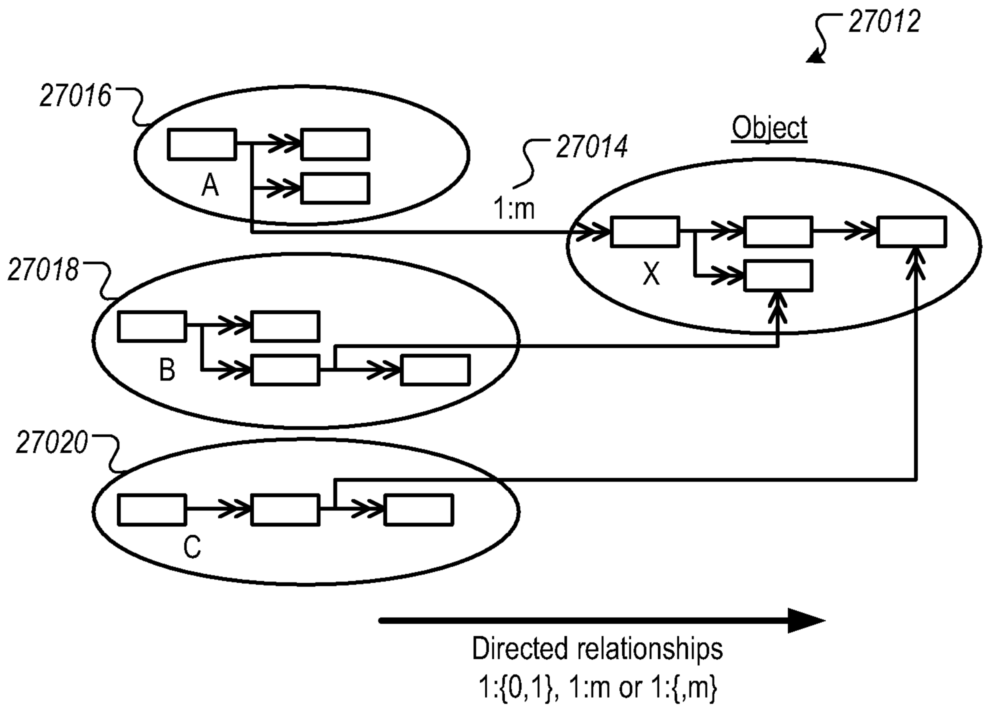

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
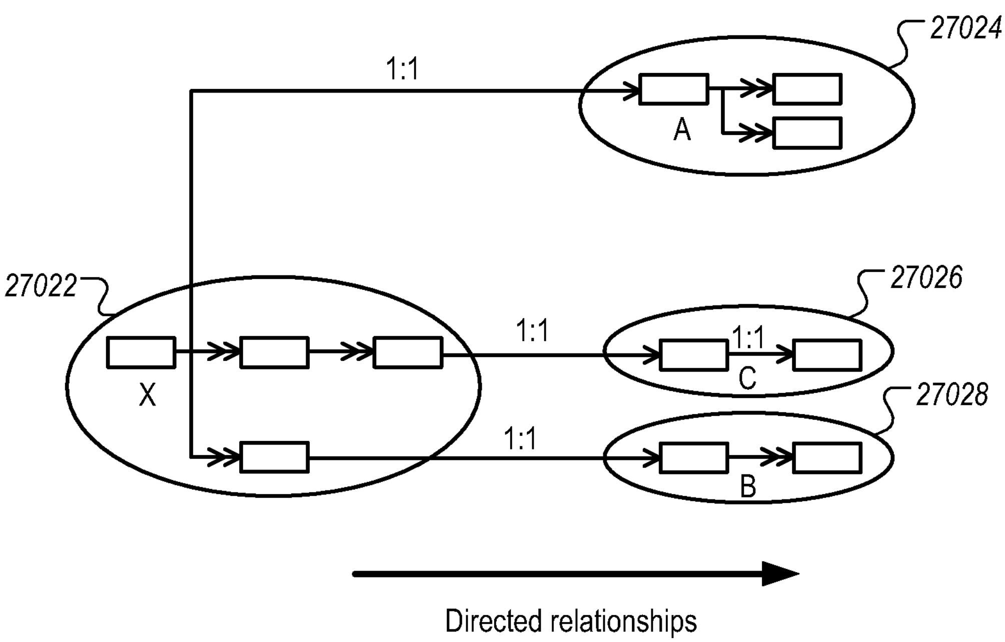

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

A business document object always refers to a leading business document object and is derived from this object.

The name of the root entity in the business document entity is the name of the business object or the name of a specialization of the business object or the name of a service specific view onto the business object.

The nodes and elements of the business object that are relevant (according to the semantics of the associated message type) are contained as entities and elements in the business document object.

The name of a business document entity is predefined by the name of the corresponding business object node. The name of the superordinate entity is not repeated in the name of the business document entity. The "full" semantic name results from the concatenation of the entity names along the hierarchical structure of the business document object.

The structure of the business document object is, except for deviations due to hierarchization, the same as the structure of the business object.

The cardinalities of the business document object nodes and elements are adopted identically or more restrictively to the business document object.

An object from which the leading business object is dependent can be adopted to the business document object. For this arrangement, the relationship is inverted, and the object (or its parts, respectively) are hierarchically subordinated in the business document object.

Nodes in the business object representing generalized business information can be adopted as explicit entities to the business document object (generally speaking, multiply TypeCodes out). When this adoption occurs, the entities are named according to their more specific semantic (name of TypeCode becomes prefix).

Party nodes of the business object are modeled as explicit entities for each party role in the business document object. These nodes are given the name <Prefix><Party Role>Party, for example, BuyerParty, ItemBuyerParty.

BTDReference nodes are modeled as separate entities for each reference type in the business document object. These nodes are given the name <Qualifier><BO><Node>Reference, for example SalesOrderReference, OriginSalesOrderReference, SalesOrderItemReference.

A product node in the business object comprises all of the information on the Product, ProductCategory, and Batch. This information is modeled in the business document object as explicit entities for Product, ProductCategory, and Batch.

Entities which are connected by a 1:1 relationship as a result of hierarchization can be combined to a single entity, if they are semantically equivalent. Such a combination can often occurs if a node in the business document object that results from an assignment node is removed because it does not have any elements.

The message type structure is typed with data types.

Elements are typed by GDTs according to their business objects.

Aggregated levels are typed with message type specific data types (Intermediate Data Types), with their names being built according to the corresponding paths in the message type structure.

The whole message type structured is typed by a message data type with its name being built according to the root entity with the suffix "Message".

For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
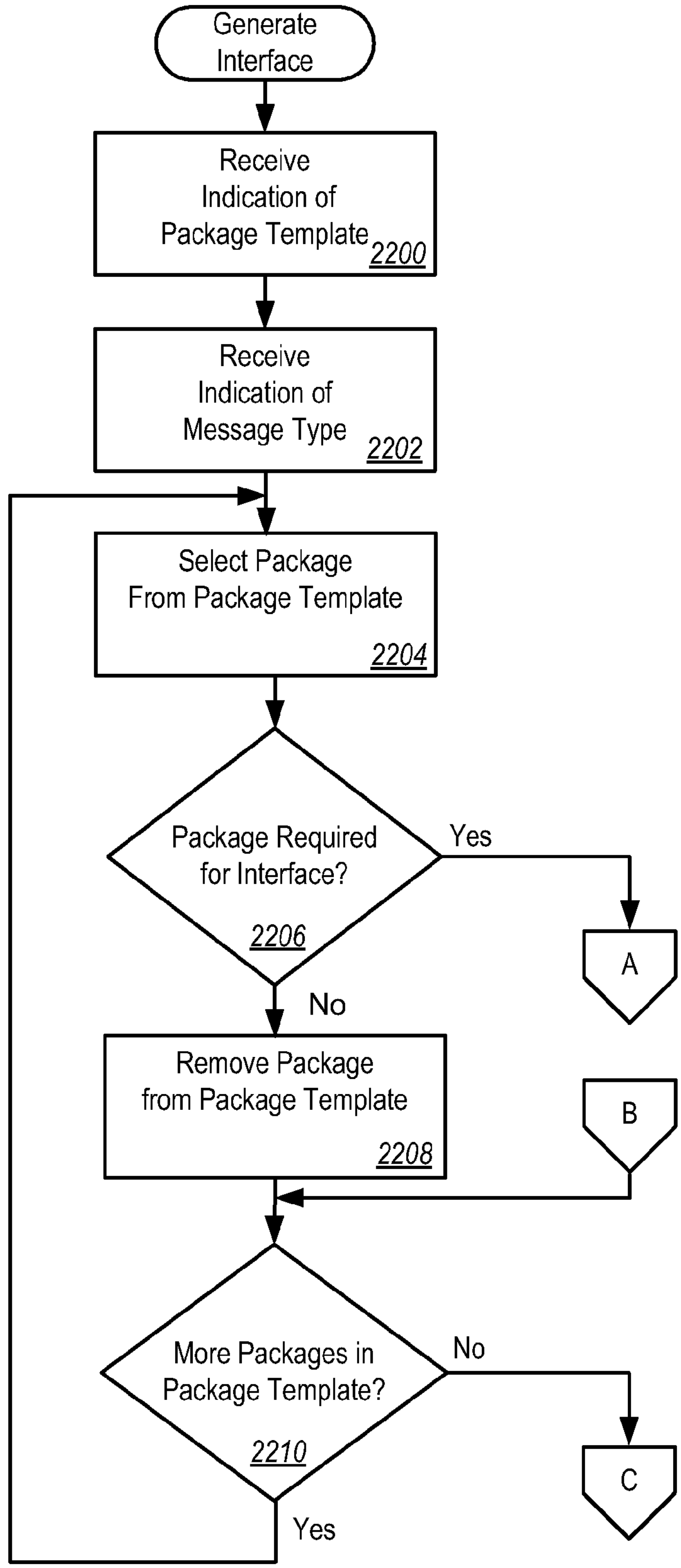
FIGS. 22A-F depict a flow diagram of the steps performed to generate an interface from the business object model in accordance with methods and systems consistent with the subject matter described herein.
Figure 22B:
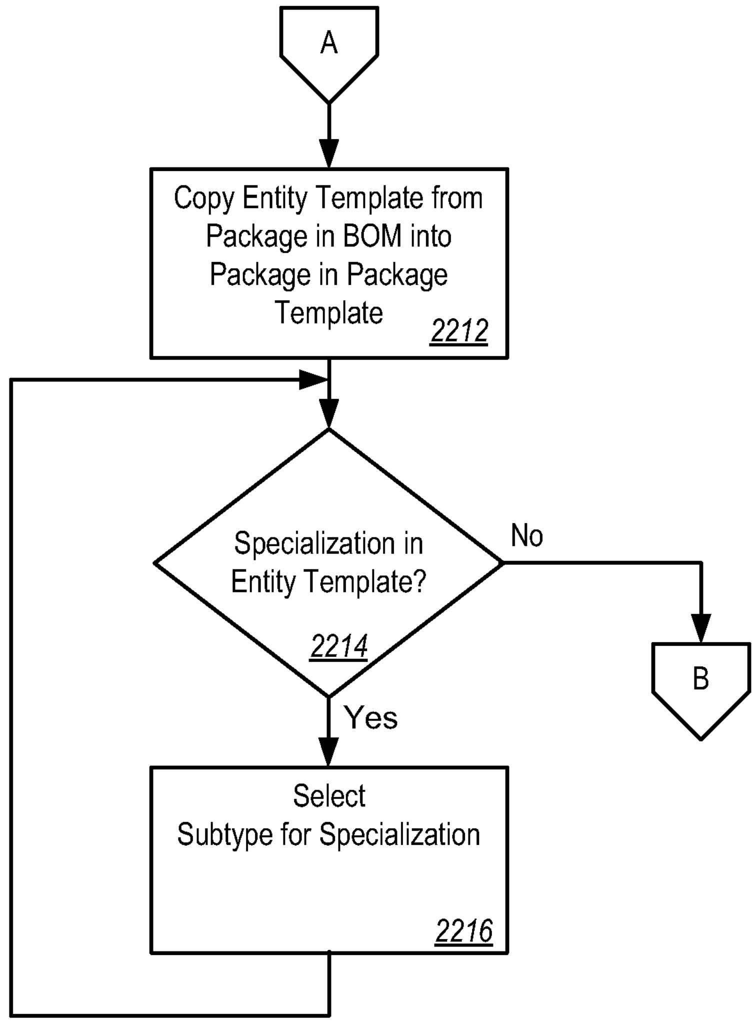
Figure 22C:
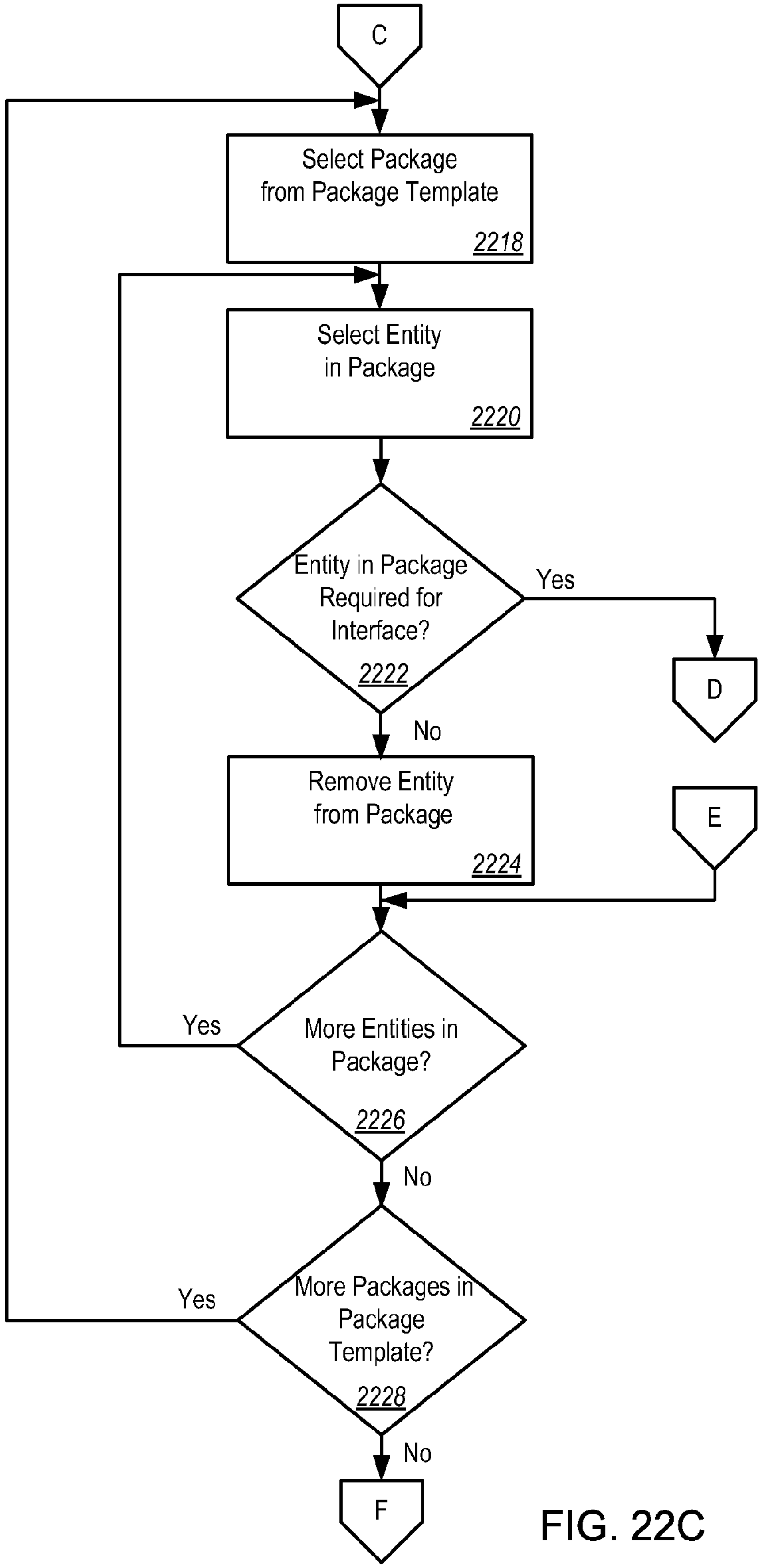

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

Figure 22D:
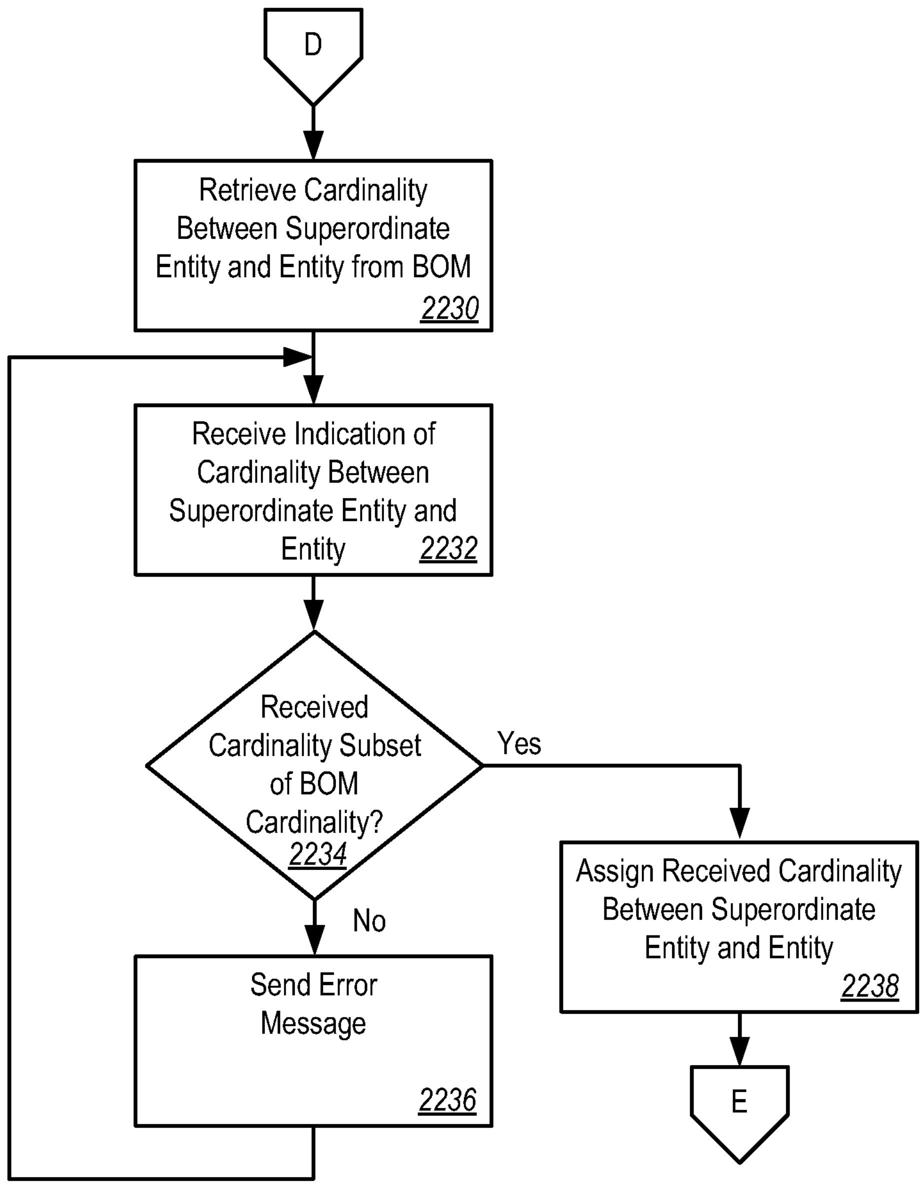

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

Figure 22E:
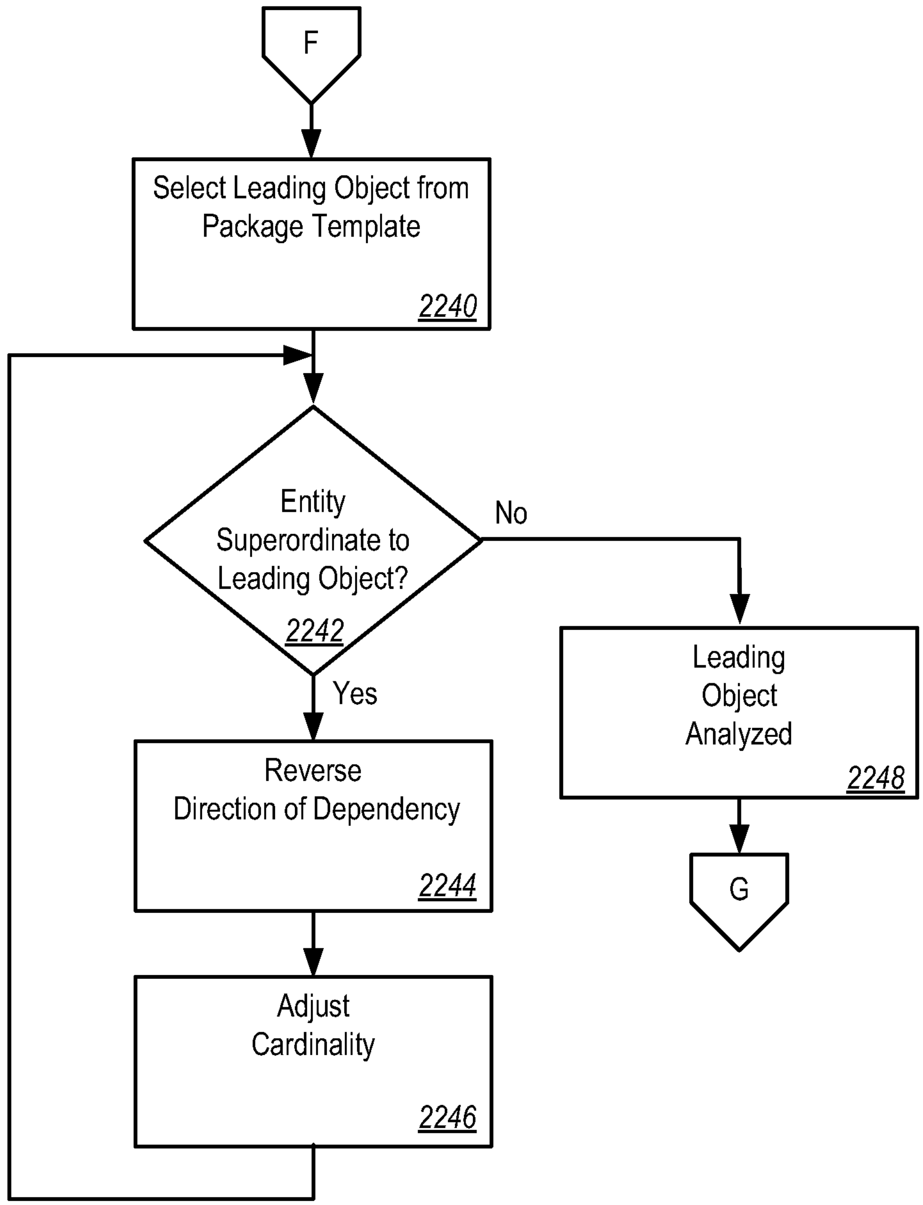

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

Figure 22F:
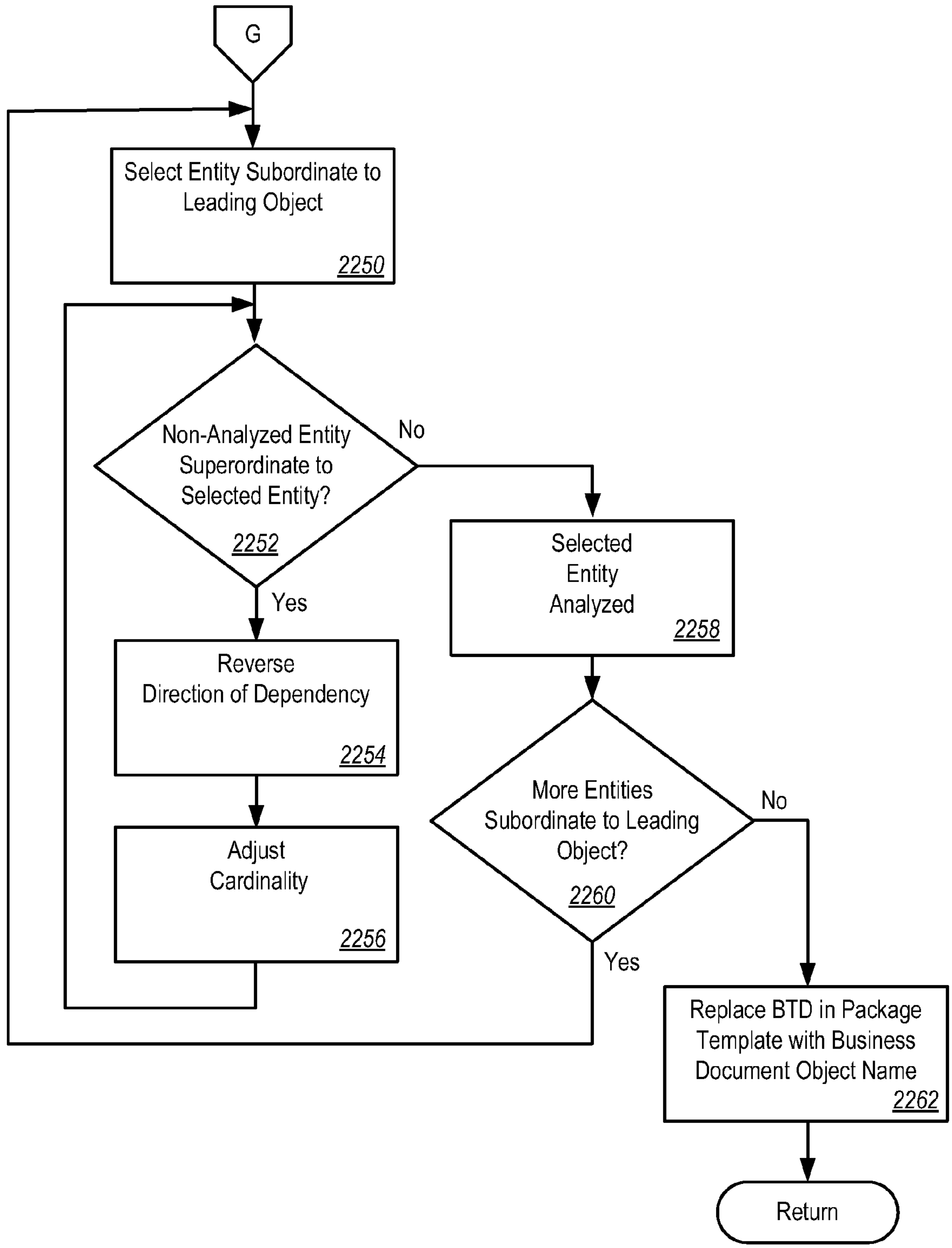

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransaction-Document ("BTD") in the package template with the name of the interface (step 2262). This includes the "BTD" in the BTDItem package and the "BTD" in the BTDItemSchedule-Line package.

6. Use of an Interface

Figure 23:
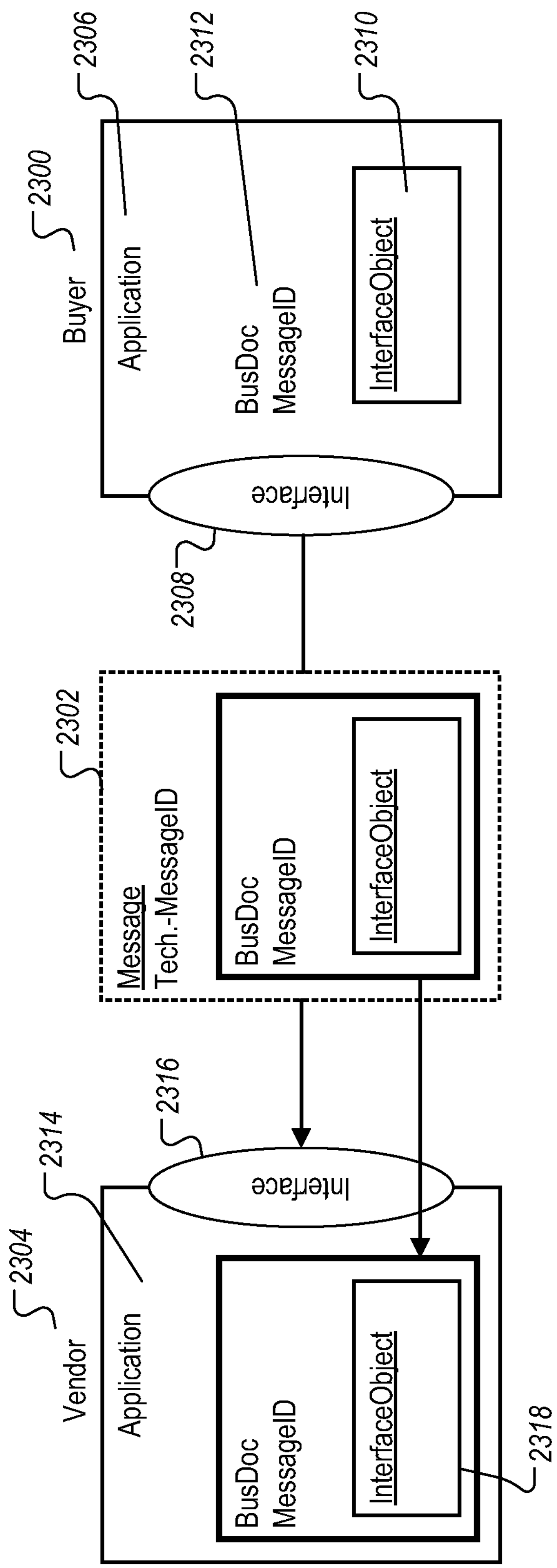
FIG. 23 depicts an example illustrating the transmittal of a business document in accordance with methods and systems consistent with the subject matter described herein.

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 24:
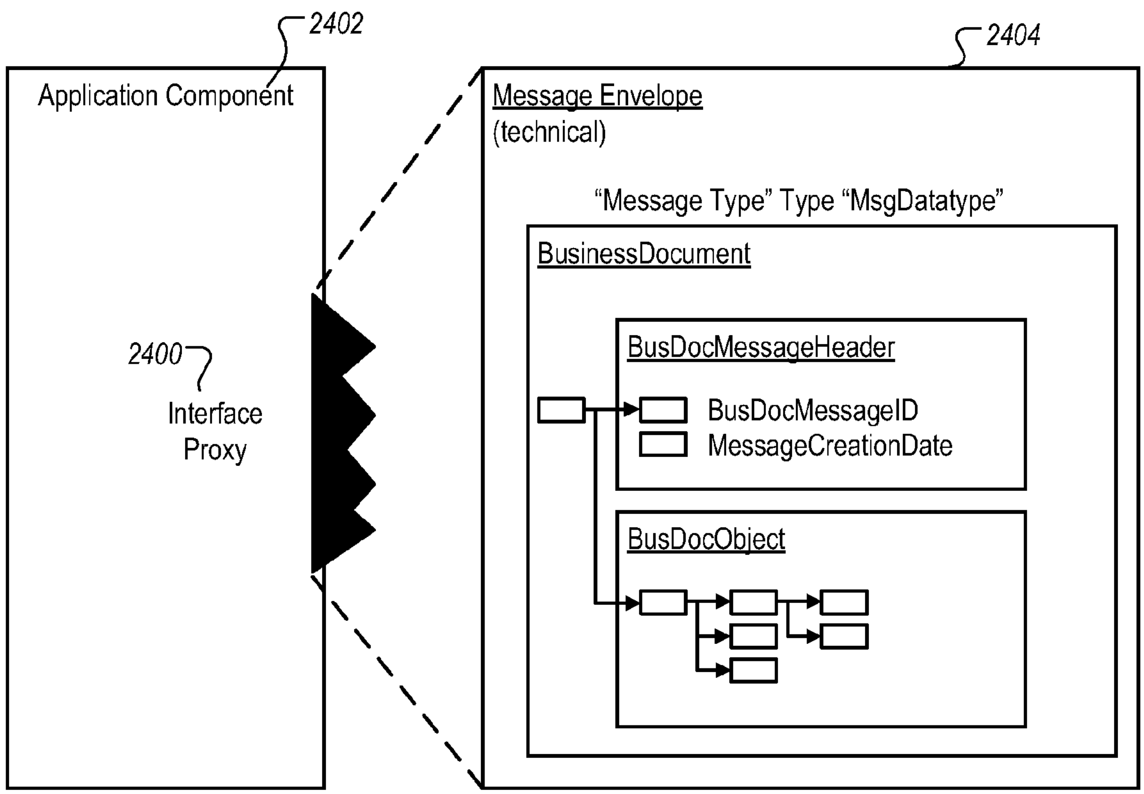
FIG. 24 depicts an interface proxy in accordance with methods and systems consistent with the subject matter described herein.
Figure 25:
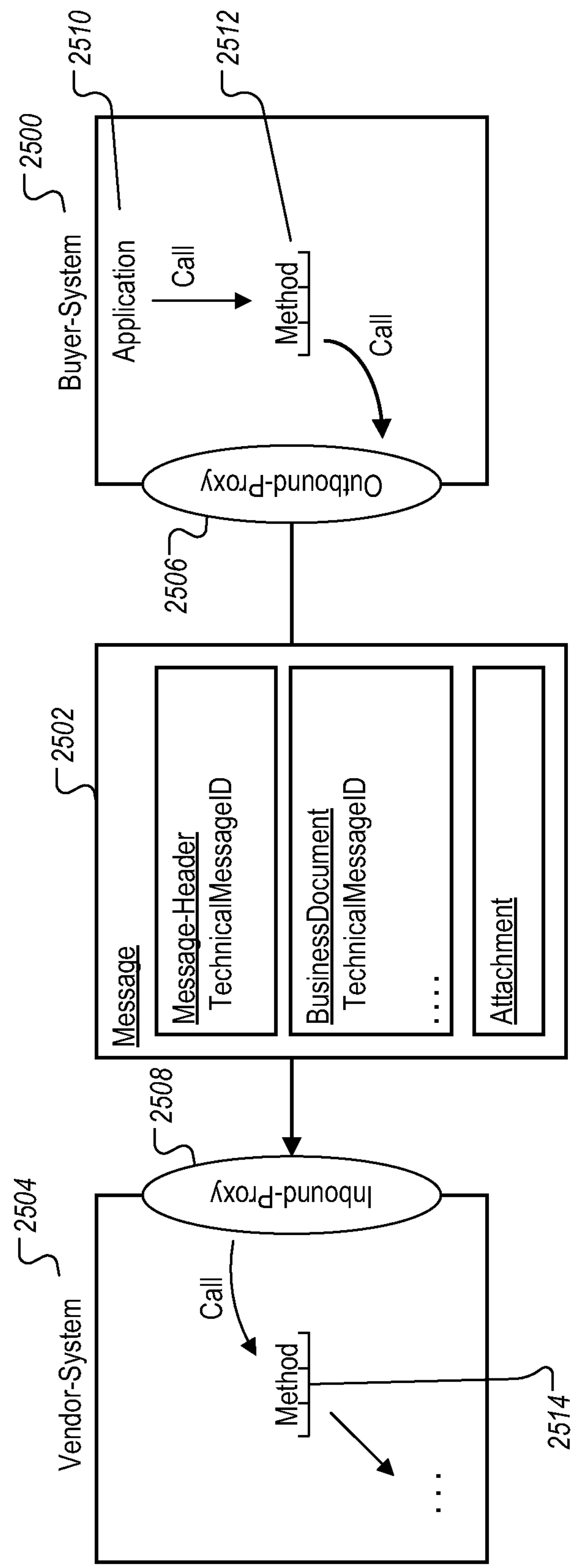
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
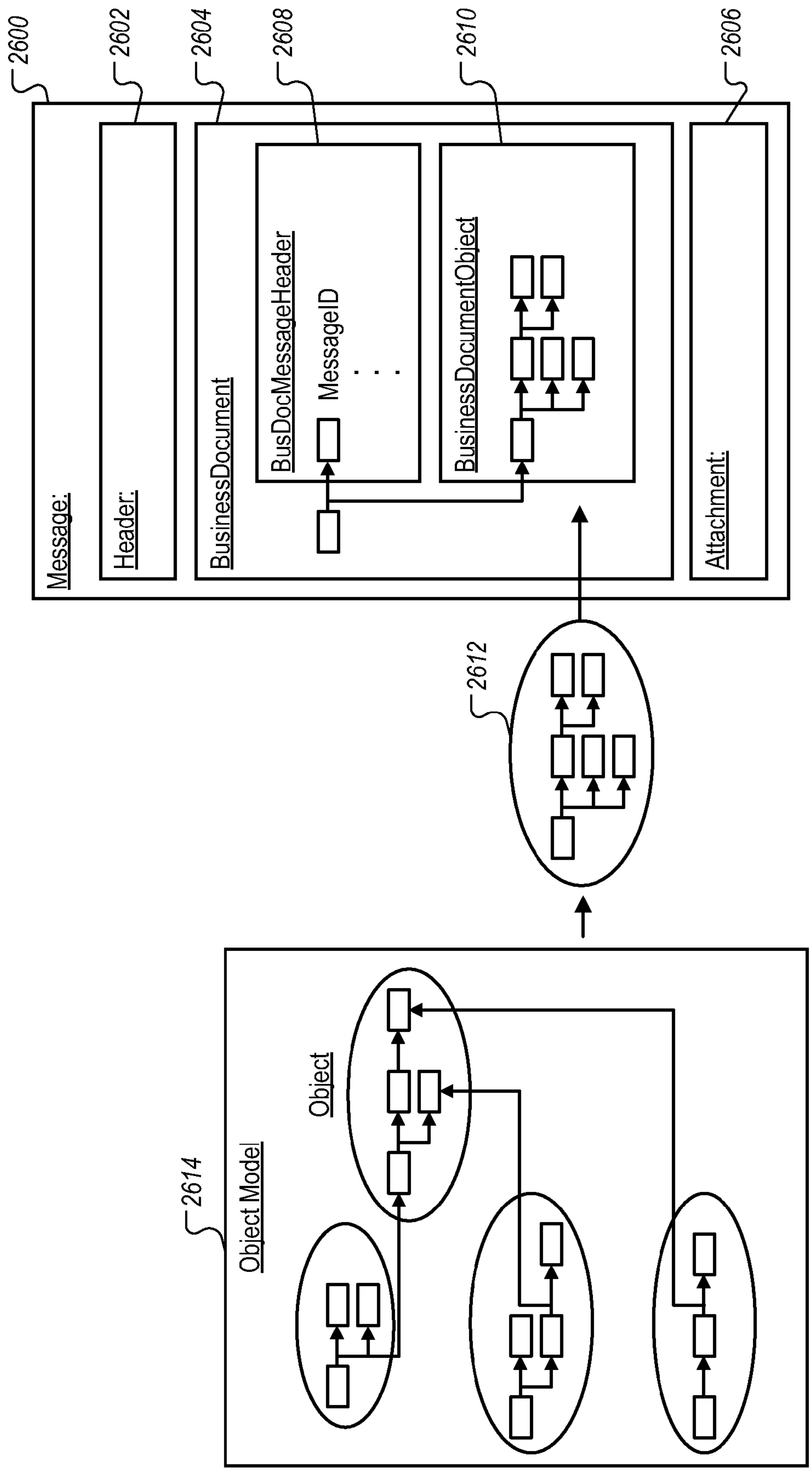
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
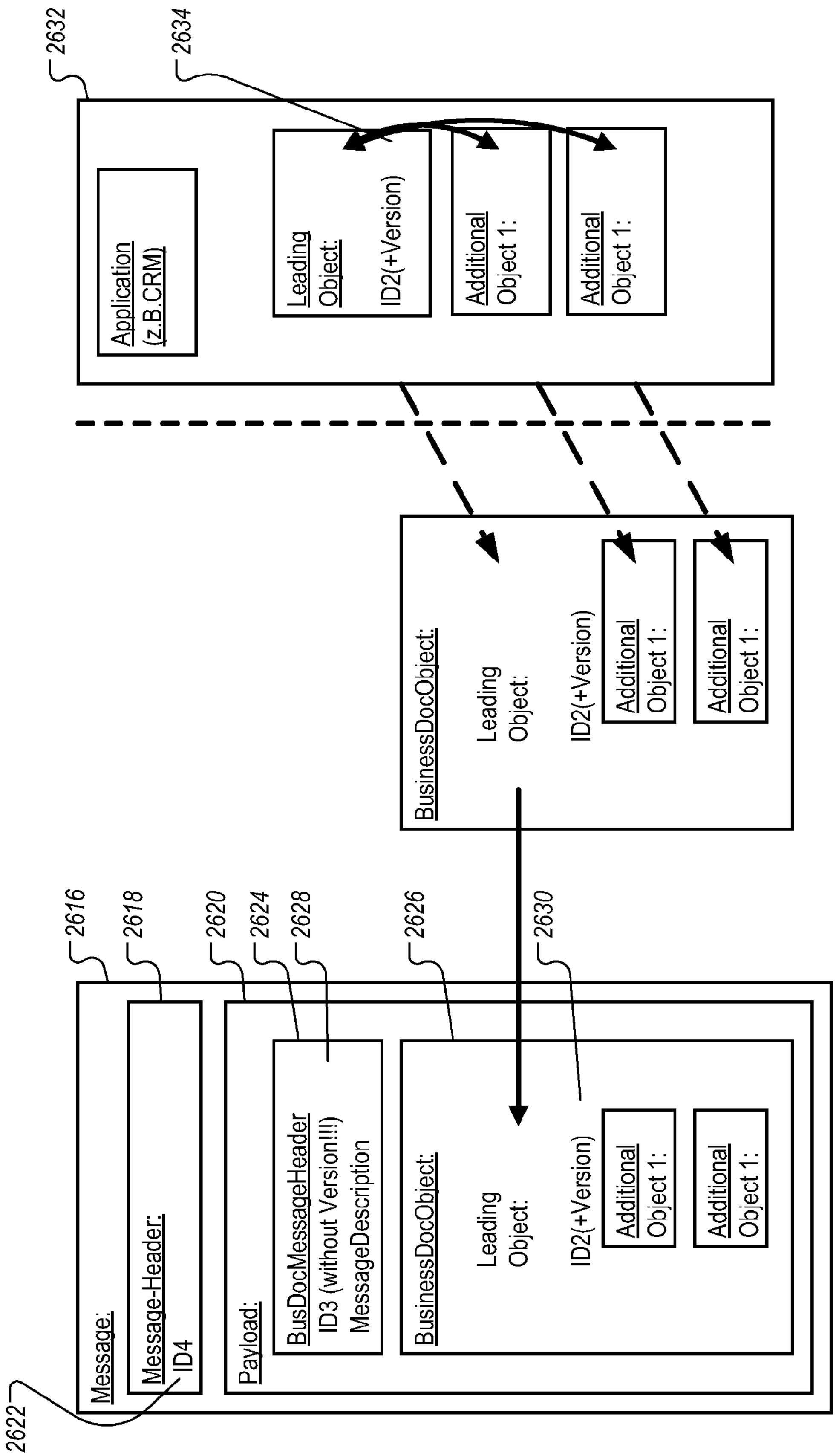
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces or services that can be used across different industry standards.

Figure 28:
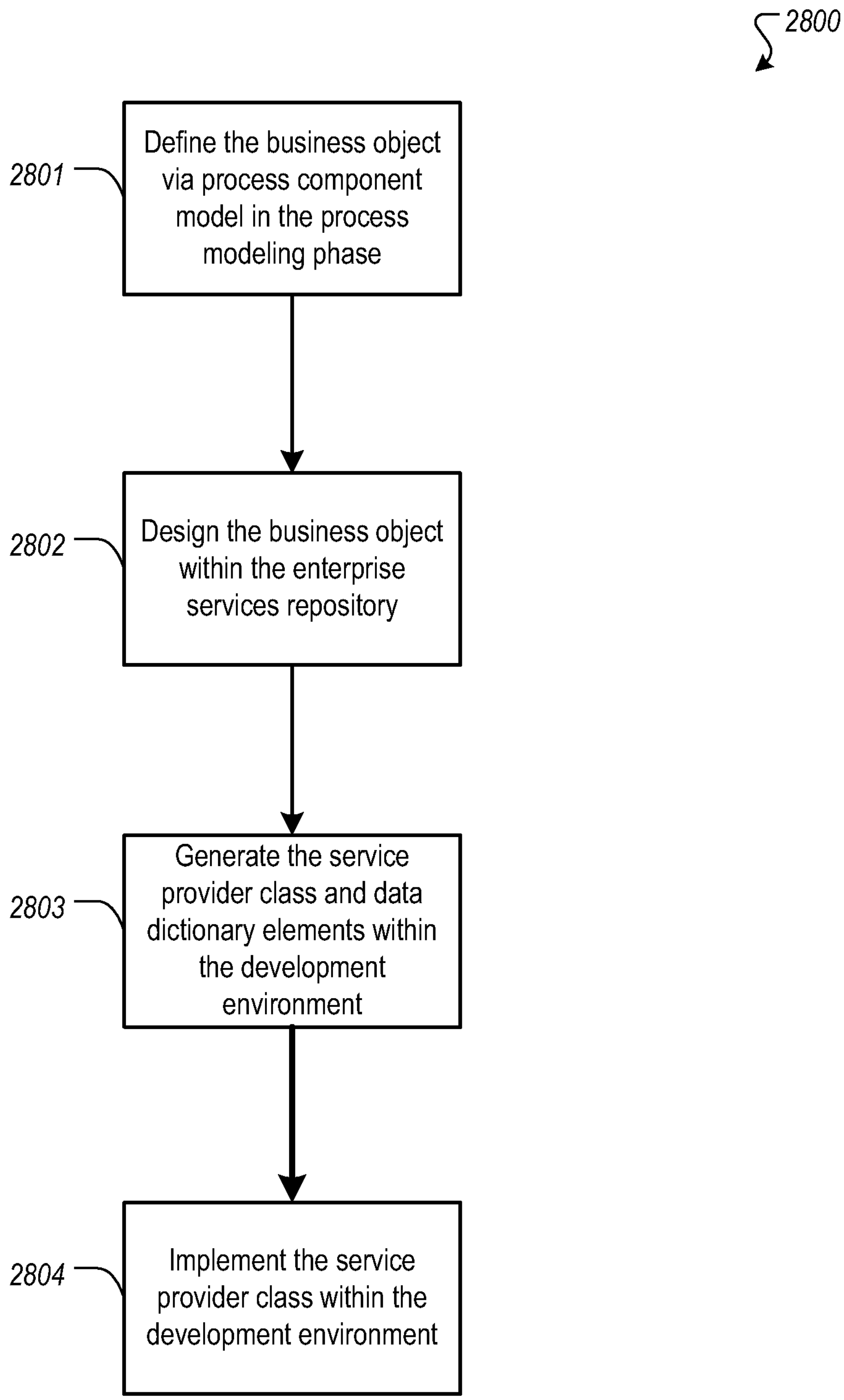
FIG. 28 illustrates an example method for service enabling in accordance with one embodiment of the present disclosure.
Figure 29:
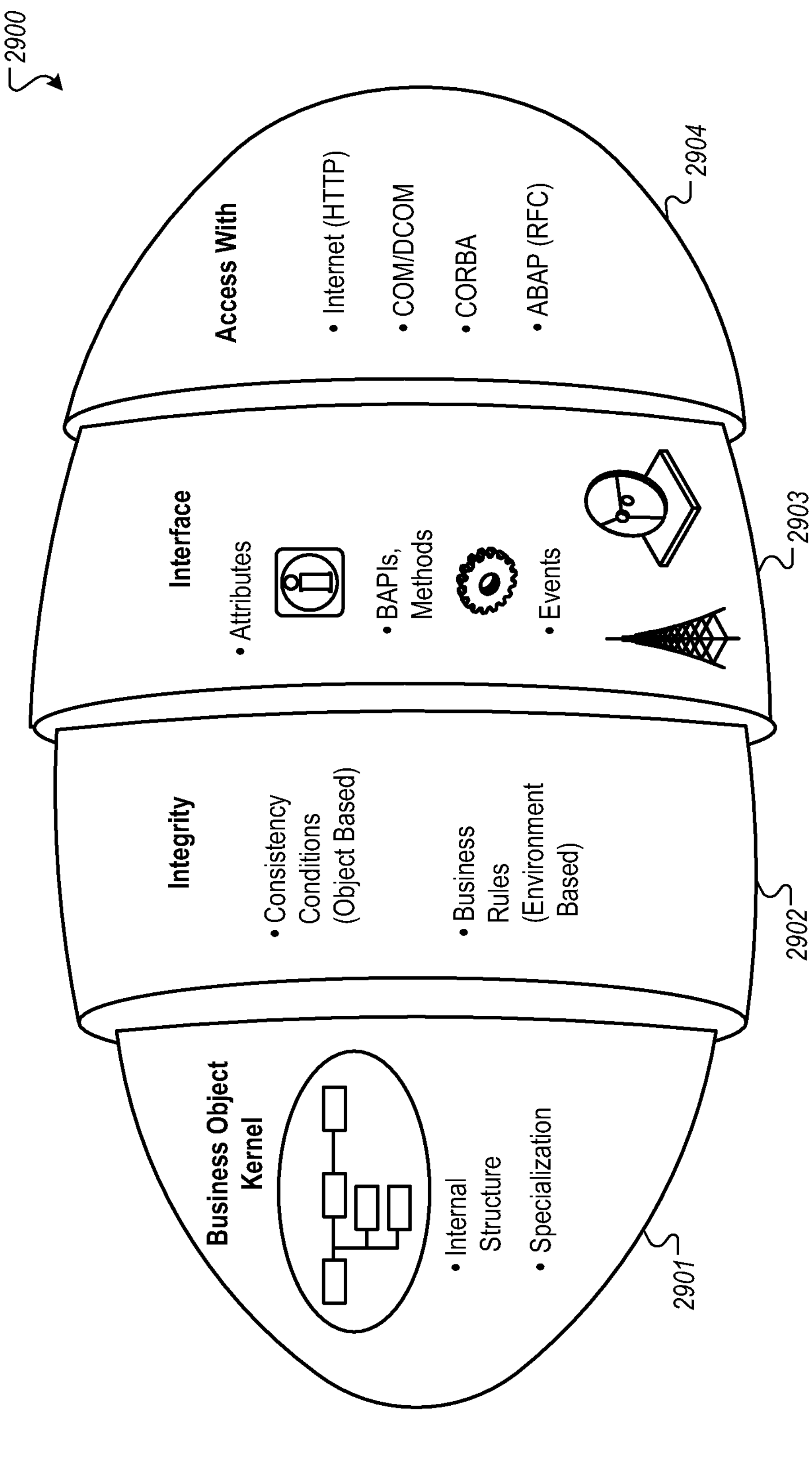
FIG. 29 is a graphical illustration of an example business object and associated components as may be used in the enterprise service infrastructure system of the present disclosure.

For example, FIG. 28 illustrates an example method 2800 for service enabling. In this example, the enterprise services infrastructure may offer one common and standard-based service infrastructure. Further, one central enterprise services repository may support uniform service definition, implementation and usage of services for user interface, and cross-application communication. In step 2801, a business object is defined via a process component model in a process modeling phase. Next, in step 2802, the business object is designed within an enterprise services repository. For example, FIG. 29 provides a graphical representation of one of the business objects 2900. As shown, an innermost layer or kernel 2901 of the business object may represent the business object's inherent data. Inherent data may include, for example, an employee's name, age, status, position, address, etc. A second layer 2902 may be considered the business object's logic. Thus, the layer 2902 includes the rules for consistently embedding the business object in a system environment as well as constraints defining values and domains applicable to the business object. For example, one such constraint may limit sale of an item only to a customer with whom a company has a business relationship. A third layer 2903 includes validation options for accessing the business object. For example, the third layer 2903 defines the business object's interface that may be interfaced by other business objects or applications. A fourth layer 2904 is the access layer that defines technologies that may externally access the business object.

Accordingly, the third layer 2903 separates the inherent data of the first layer 2901 and the technologies used to access the inherent data. As a result of the described structure, the business object reveals only an interface that includes a set of clearly defined methods. Thus, applications access the business object via those defined methods. An application wanting access to the business object and the data associated therewith usually includes the information or data to execute the clearly defined methods of the business object's interface. Such clearly defined methods of the business object's interface represent the business object's behavior. That is, when the methods are executed, the methods may change the business object's data. Therefore, an application may utilize any business object by providing the information or data without having any concern for the details related to the internal operation of the business object. Returning to method 2800, a service provider class and data dictionary elements are generated within a development environment at step 2803. In step 2804, the service provider class is implemented within the development environment.

Figure 30:
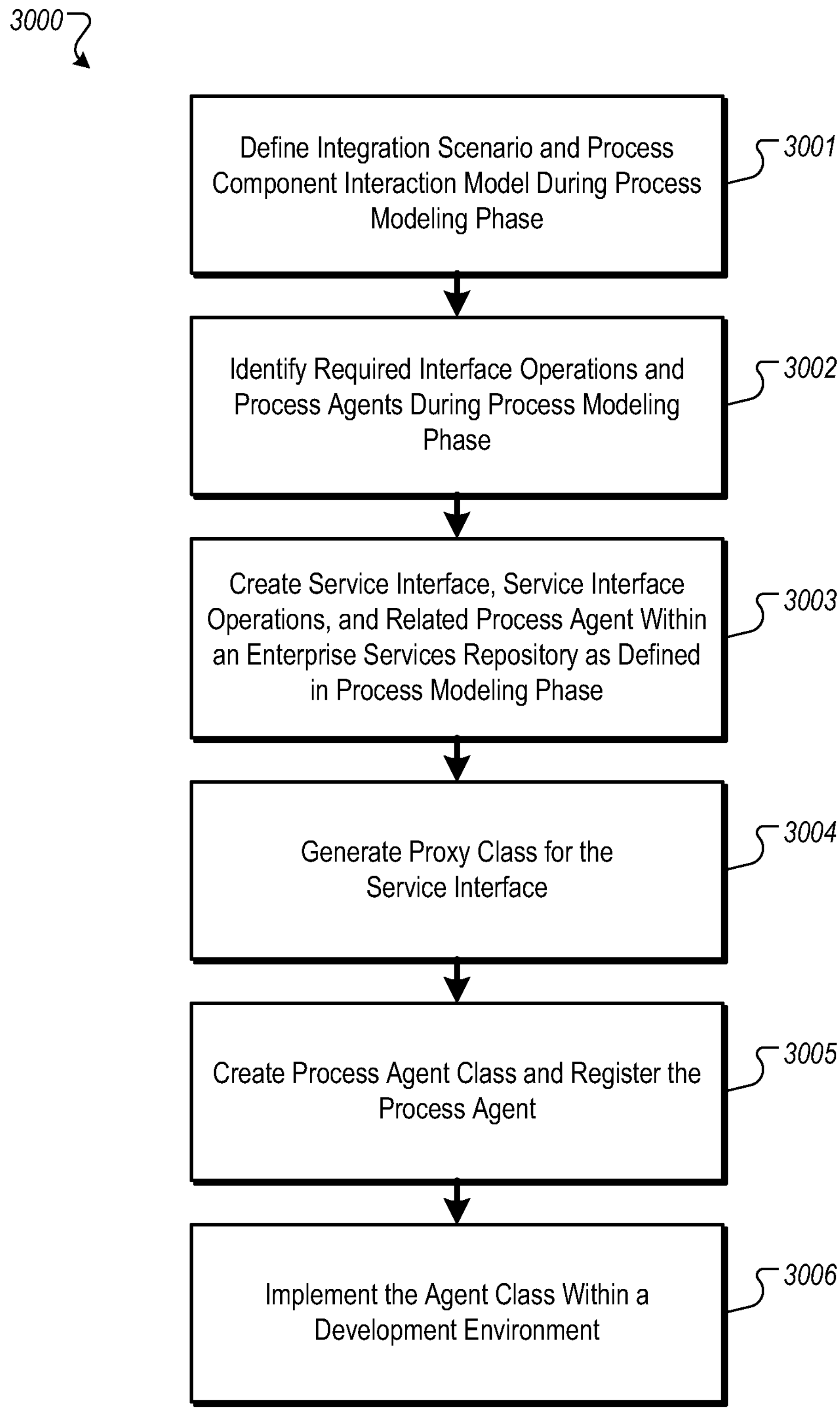
FIG. 30 illustrates an example method for managing a process agent framework in accordance with one embodiment of the present disclosure.

FIG. 30 illustrates an example method 3000 for a process agent framework. For example, the process agent framework may be the basic infrastructure to integrate business processes located in different deployment units. It may support a loose coupling of these processes by message based integration. A process agent may encapsulate the process integration logic and separate it from business logic of business objects. As shown in FIG. 30, an integration scenario and a process component interaction model are defined during a process modeling phase in step 3001. In step 3002, required interface operations and process agents are identified during the process modeling phase also. Next, in step 3003, a service interface, service interface operations, and the related process agent are created within an enterprise services repository as defined in the process modeling phase. In step 3004, a proxy class for the service interface is generated. Next, in step 3005, a process agent class is created and the process agent is registered. In step 3006, the agent class is implemented within a development environment.

Figure 31:
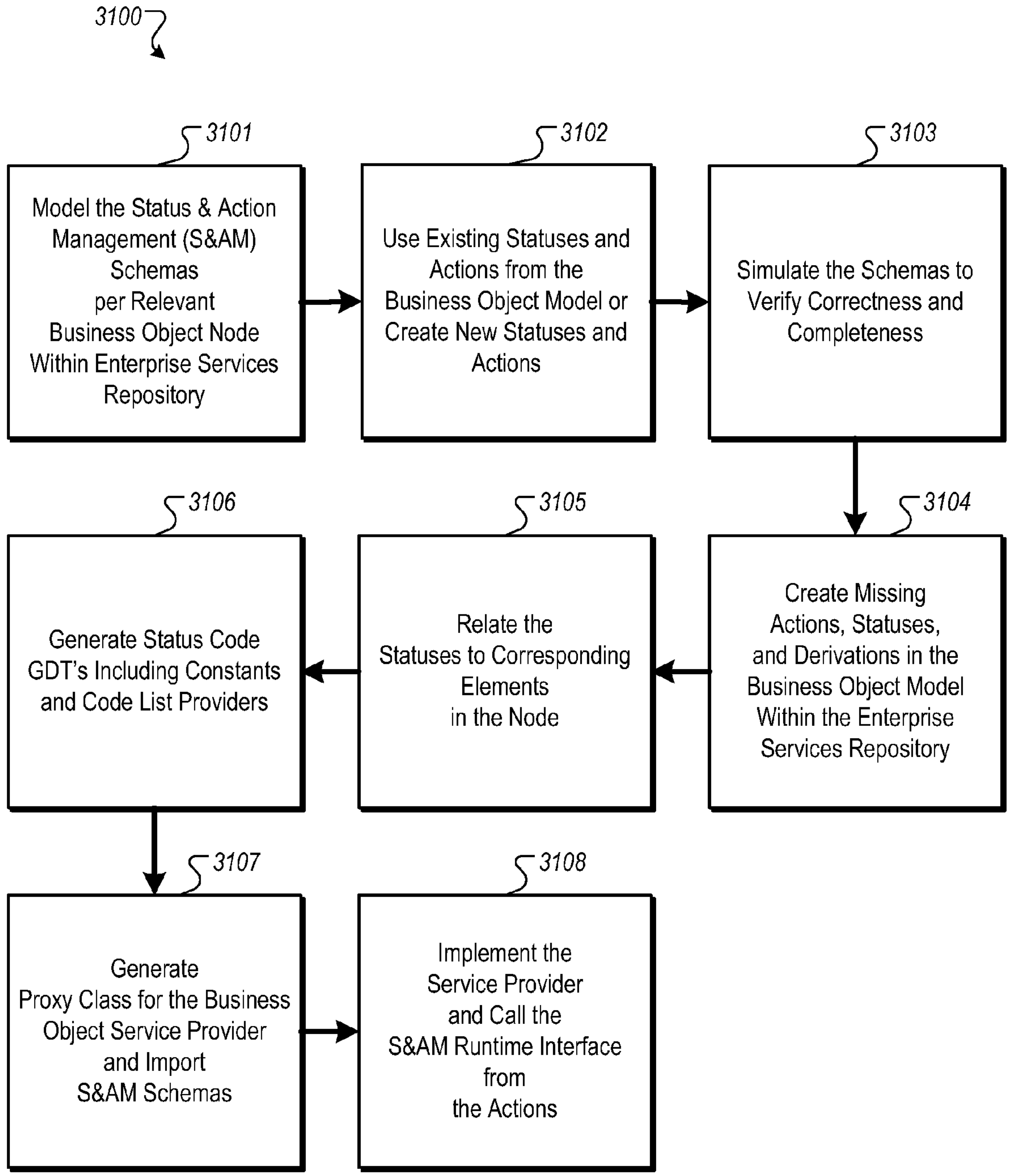
FIG. 31 illustrates an example method for status and action management in accordance with one embodiment of the present disclosure.

FIG. 31 illustrates an example method 3100 for status and action management (S&AM). For example, status and action management may describe the life cycle of a business object (node) by defining actions and statuses (as their result) of the business object (node), as well as, the constraints that the statuses put on the actions. In step 3101, the status and action management schemas are modeled per a relevant business object node within an enterprise services repository. In step 3102, existing statuses and actions from the business object model are used or new statuses and actions are created. Next, in step 3103, the schemas are simulated to verify correctness and completeness. In step 3104, missing actions, statuses, and derivations are created in the business object model with the enterprise services repository. Continuing with method 3100, the statuses are related to corresponding elements in the node in step 3105. In step 3106, status code GDT's are generated, including constants and code list providers. Next, in step 3107, a proxy class for a business object service provider is generated and the proxy class S&AM schemas are imported. In step 3108, the service provider is implemented and the status and action management runtime interface is called from the actions.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

Moreover, the preceding flowcharts and accompanying description illustrate example methods. The present services environment contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, the services environment may use methods with additional steps, fewer steps, and/or different steps, so long as the methods remain appropriate.

Freight Order Interfaces

A freight order can be an order to a transportation service provider to ship goods from shippers to consignees. A freight order can be a combination of shipment orders, which can be assigned to stages and resources. The combination can be based on transportation planning or transportation charges calculations. The freight order execution interface can be used to delegate execution of planned transportation of goods (from shippers to consignees) to transportation execution processing of an ERP (Enterprise Resource Planning) system. The freight order invoicing preparation interface can be used for preparation of invoice verification which can be executed later on.

A FreightOrderExecutionRequest can be a request for a FreightOrderExecution from Transportation Order Processing to Transportation Execution Processing. The structure of the FreightOrderExecutionRequest can be specified by the message data type FreightOrderExecutionRequestMessage.

A FreightOrderExecutionCancelRequest can be a request to cancel a FreightOrderExecution. The structure of the FreightOrderExecutionCancelRequest can be specified by the message data type FreightOrderExecutionCancelRequestMessage.

A FreightOrderExecutionConfirmation can be a confirmation of the FreightOrderExecutionRequest from Transportation Execution Processing to Transportation Order Processing. Through the confirmation, a FreightOrderExecutionRequest can be accepted, rejected, or conditionally accepted. The confirmation can include information on transport and carriage conditions, such as carrier, mode of transport, or stages. The confirmation can be related to a part of the FreightOrderExecution, in the case of a split scenario. The structure of the FreightOrderExecutionConfirmation can be specified by the message data type FreightOrderExecutionConfirmationMessage.

A FreightOrderExecutionStatusNotification can be a message from Transportation Execution Processing to Transportation Order Processing, confirming a receipt of a FreightOrderExecutionRequest message or of a FreightOrderExecutionCancelRequest message, and reporting administrative errors included in the received message. The structure of the FreightOrderExecutionStatusNotification can be specified by the message data type FreightOrderExecutionStatusNotification Message.

A FreightOrderInvoicingPreparationRequest can be a request to prepare an invoice verification from transportation order processing to purchase order processing. The structure of the FreightOrderInvoicePreparationRequest can be specified by the message data type FreightOrderInvoicingPreparationRequestMessage.

A FreightOrderInvoicingPreparationCancelRequest can be a request to cancel a FreightOrderInvoicingPreparation from transportation order processing to purchase order processing. The structure of the FreightOrderInvoicingPreparationCancelRequest can be specified by the message data type FreightOrderInvoicingPreparationCancelRequestMessage.

A FreightOrderInvoicingPreparationConfirmation can be a confirmation of the FreightOrderInvoicingPreparation from purchase order processing to transportation order processing. The structure of the FreightOrderInvoicingPreparationConfirmation can be specified by the message data type FreightOrderInvoicingPreparationConfirmationMessage.

The FreightOrderExecution messages can be implemented by the following message interfaces that may be equally distributed on a transportation order processing side and on a transportation execution processing side. In some implementations, only the message interfaces on the Transportation Order Processing side may be implemented in transportation management. The message interfaces on the Transportation Order Processing side include the following: FreightOrderExecutionRequest_Out, FreightOrderExecutionCancelRequest_Out, FreightOrderExecutionConfirmation_In, and FreightOrderExecutionStatusNotification_In.

The FreightOrderInvoicingPreparation messages can be implemented by the following message interfaces that may be equally distributed on the transportation order processing side and on the purchase order processing side. The message interfaces on the Transportation Order Processing side can include the following: FreightOrderInvoicingPreparationRequest_Out, FreightOrderInvoicingPreparationCancelRequest_Out, and FreightOrderInvoicingPreparationConfirmation_In. The message interfaces on the Purchase Order Processing side can include the following: FreightOrderInvoicingPreparationRequest_In, FreightOrderInvoicingPreparationCancelRequest_In, and FreightOrderInvoicingPreparationConfirmation_Out.

Figure 32:
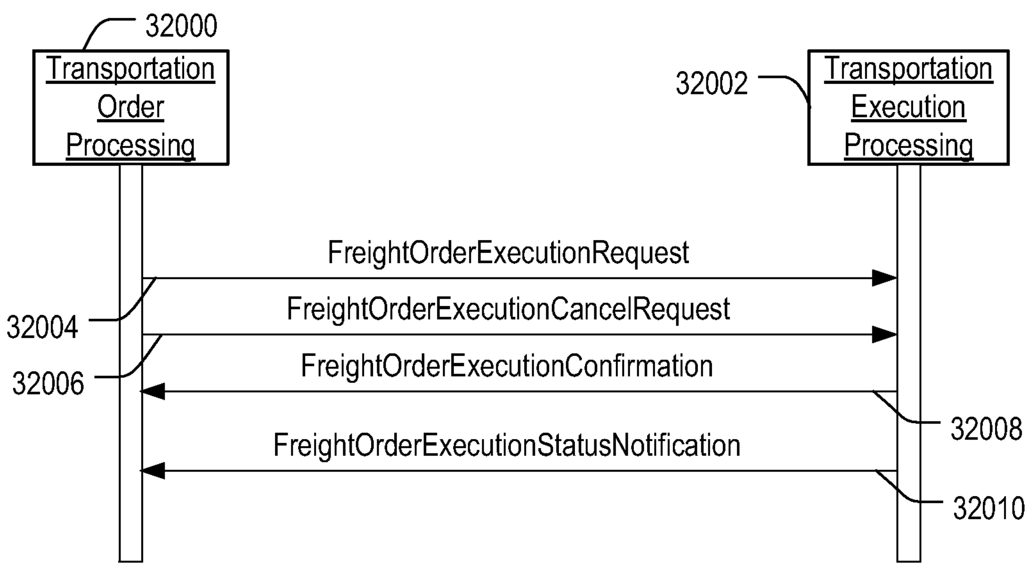
FIG. 32 shows an exemplary Freight Order Execution Message Choreography.

The message choreography of FIG. 32 describes a possible logical sequence of messages that can be used to realize a Freight Order business scenario.

A "Transportation Ordering Processing" system 32000 can request a freight order execution, using a FreightOrderExecutionRequest message 32004 as shown, for example in FIG. 32. A "Transportation Execution Processing" system 32002 can confirm the receipt of a request, and report any administrative errors, using a FreightOrderExecutionStatusNotification message 32010 as shown, for example, in FIG. 32. The "Transportation Execution Processing" system 32002 can confirm a freight order execution using a FreightOrderExecutionConfirmation message 32008 as shown, for example, in FIG. 32.

The "Transportation Order Processing" system 32000 can request the cancellation of a freight order execution using a FreightOrderExecutionCancelRequest message 32006 as shown, for example, in FIG. 32. The "Transportation Execution Processing" system 32002 can confirm the receipt of a request, and report any administrative errors, using the FreightOrderExecutionStatusNotification message 32010 as shown, for example, in FIG. 32.

Figure 33:
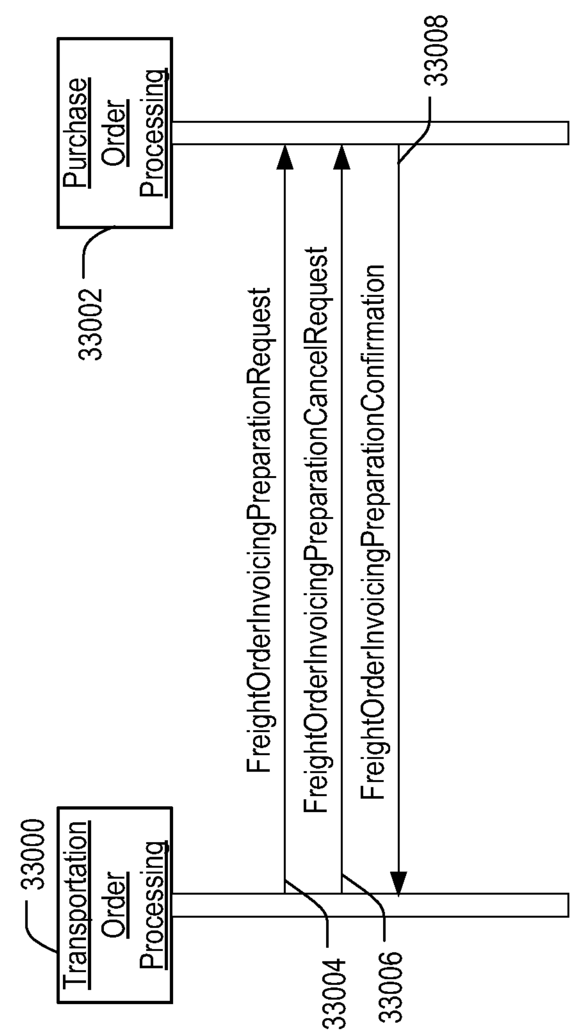
FIG. 33 shows an exemplary Freight Order Invoicing Preparation Message Choreography.

The message choreography of FIG. 33 describes a possible logical sequence of messages that can be used to realize a Freight Order business scenario. A "Transportation Order Processing" system 33000 can request a freight order invoice preparation from a "Purchase Order Processing" system 33002, using a FreightOrderInvoicingPreparationRequest message 33004 as shown, for example in FIG. 33. The "Purchase Order Processing" system 33002 can confirm the freight order invoicing preparation, using a FreightOrderInvoicingPreparationConfirmation message 33008 as shown, for example in FIG. 33. The "Transportation Order Processing" system 33000 can request to cancel a freight order invoice preparation from the "Purchase Order Processing" system 33002, using a FreightOrderInvoicingPreparationRequest message 33006 as shown, for example in FIG. 33.

Figures 1, 34:
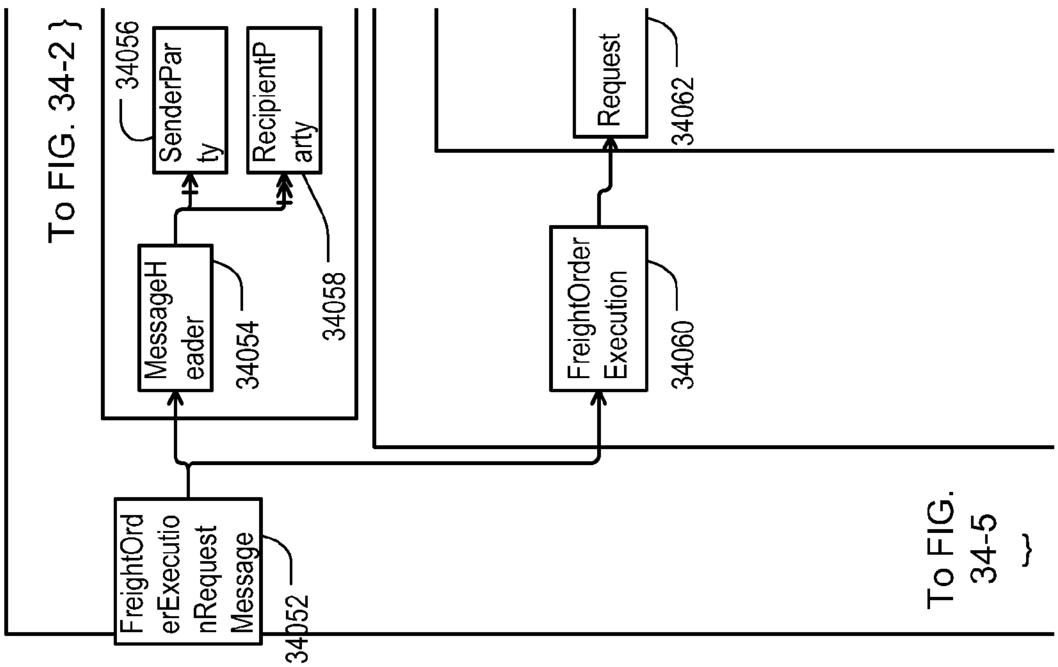
Figures 2, 34:
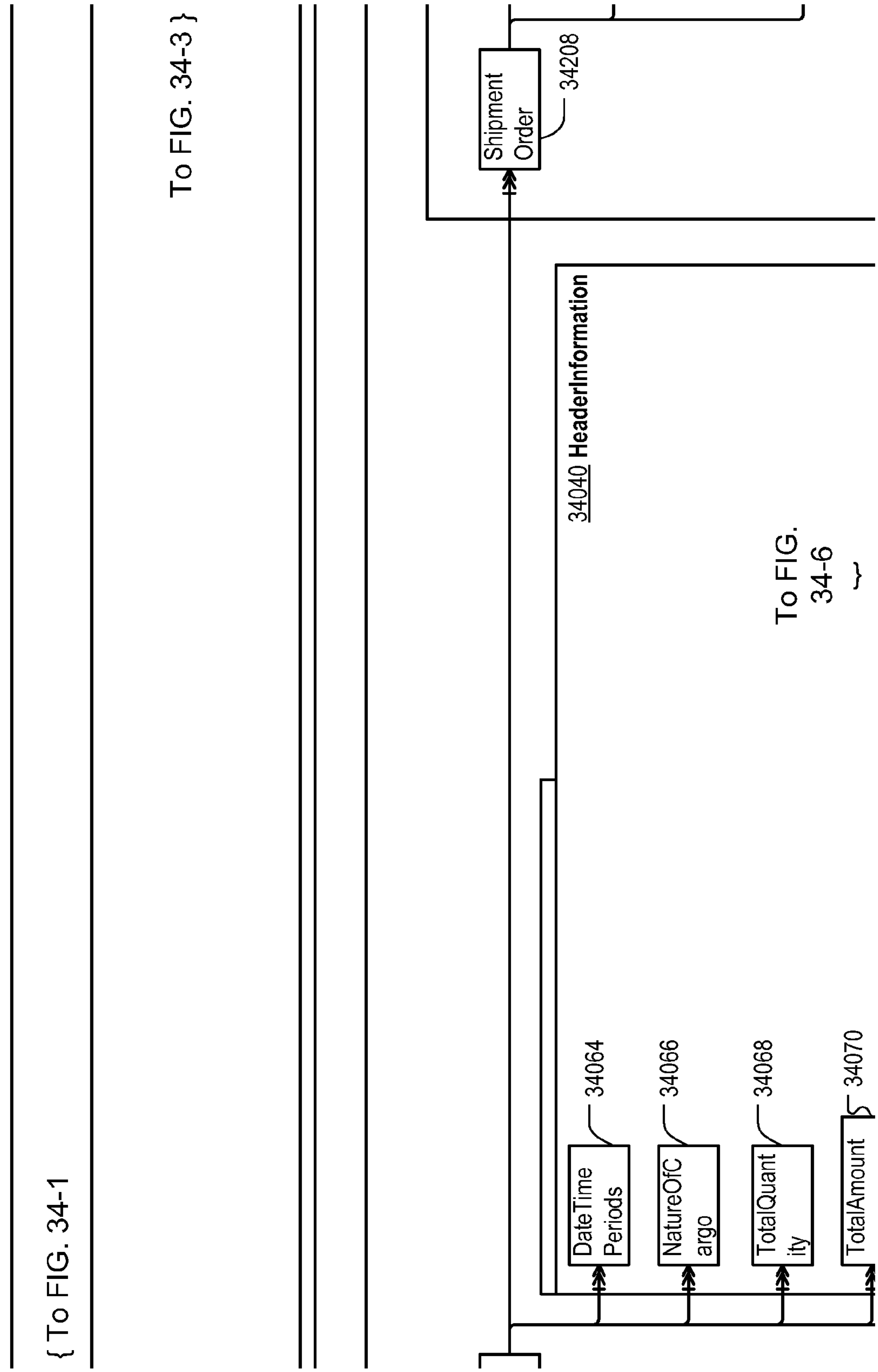

FIGS. 34-1 through 34-28 illustrate one example logical configuration of FreightOrderExecutionRequestMessage message 34000. Specifically, this figure depicts the arrangement and hierarchy of various components such as one or more levels of packages, entities, and datatypes, shown here as 34002 through 34440. As described above, packages may be used to represent hierarchy levels. Entities are discrete business elements that are used during a business transaction. Data types are used to type object entities and interfaces with a structure. For example, FreightOrderExecutionRequestMessage message 34000 includes, among other things, FreightOrderExecution 34060. Accordingly, heterogeneous applications may communicate using this consistent message configured as such.

Figure 35:
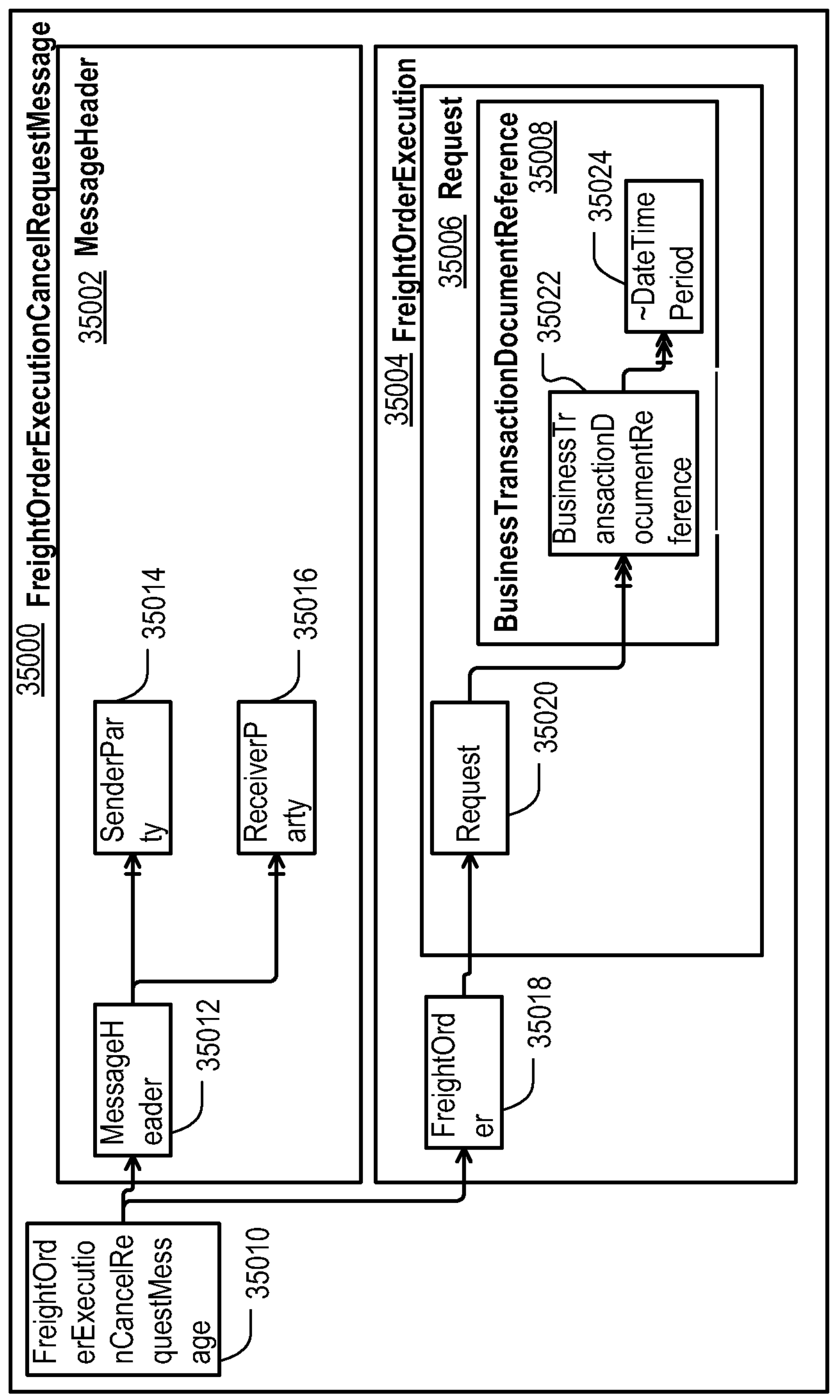
FIG. 35 shows an exemplary FreightOrderExecutionCancelRequestMessage Message Data Type.

Additionally, FIG. 35 illustrates one example logical configuration of FreightOrderExecutionCancelRequestMessage message 35000. Specifically, this figure depicts the arrangement and hierarchy of various components such as one or more levels of packages, entities, and datatypes, shown here as 35002 through 35024. As described above, packages may be used to represent hierarchy levels. Entities are discrete business elements that are used during a business transaction. Data types are used to type object entities and interfaces with a structure. For example, FreightOrderExecutionCancelRequestMessage message 35000 includes, among other things, FreightOrder 35018. Accordingly, heterogeneous applications may communicate using this consistent message configured as such.

Figures 1, 36:
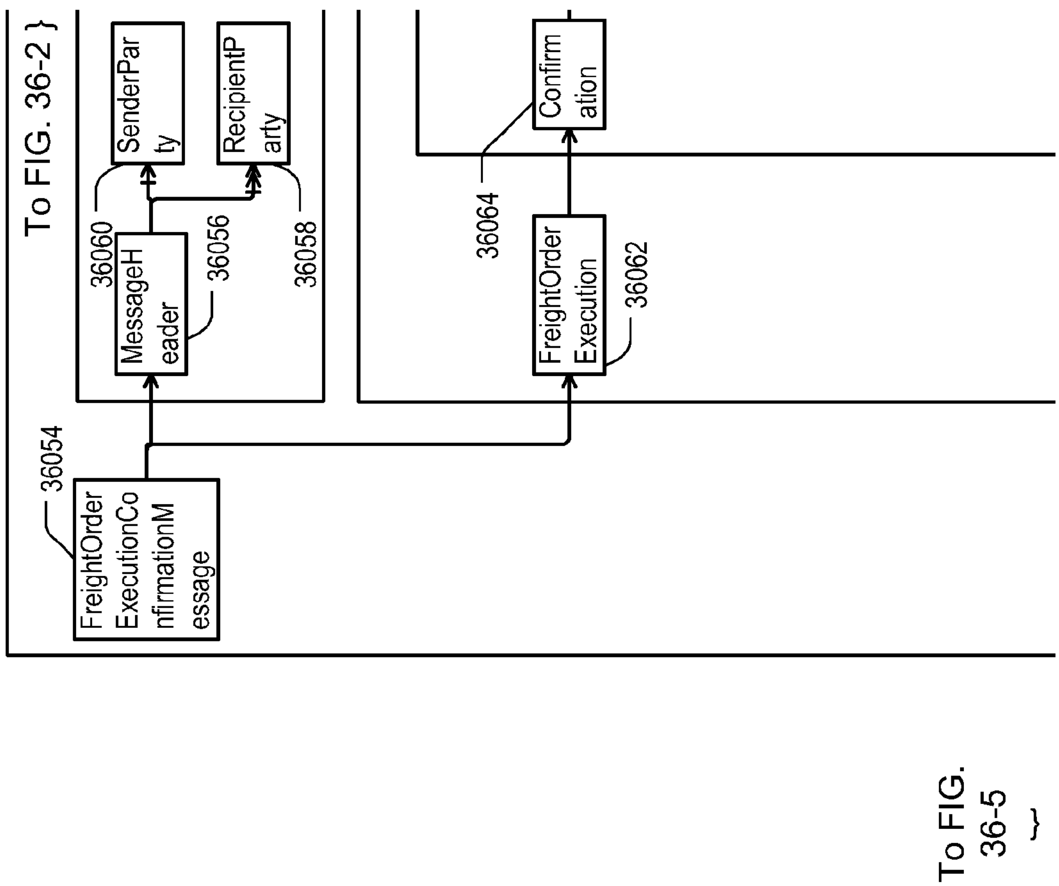
Figures 2, 36:
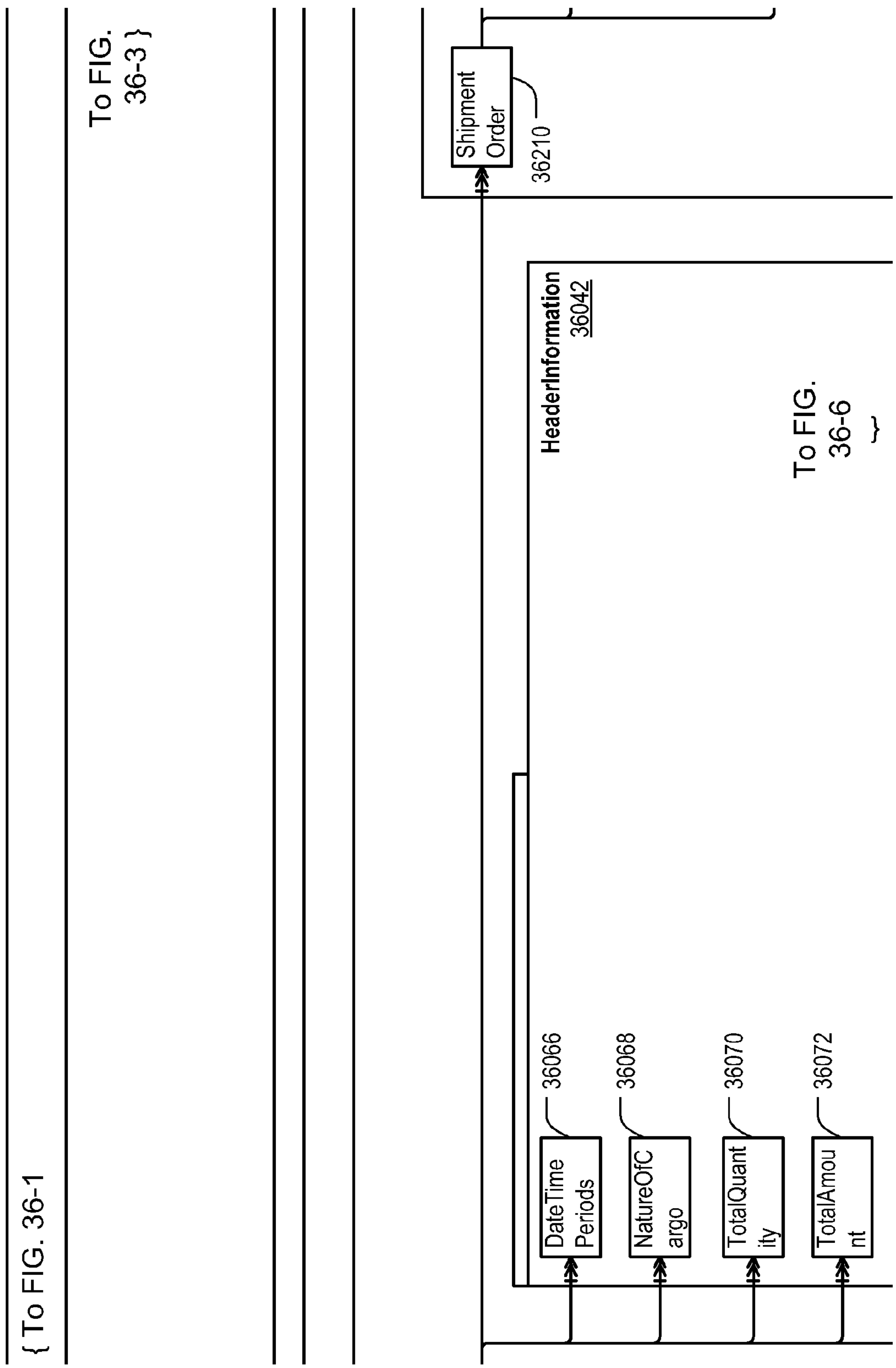
Figures 3, 36:
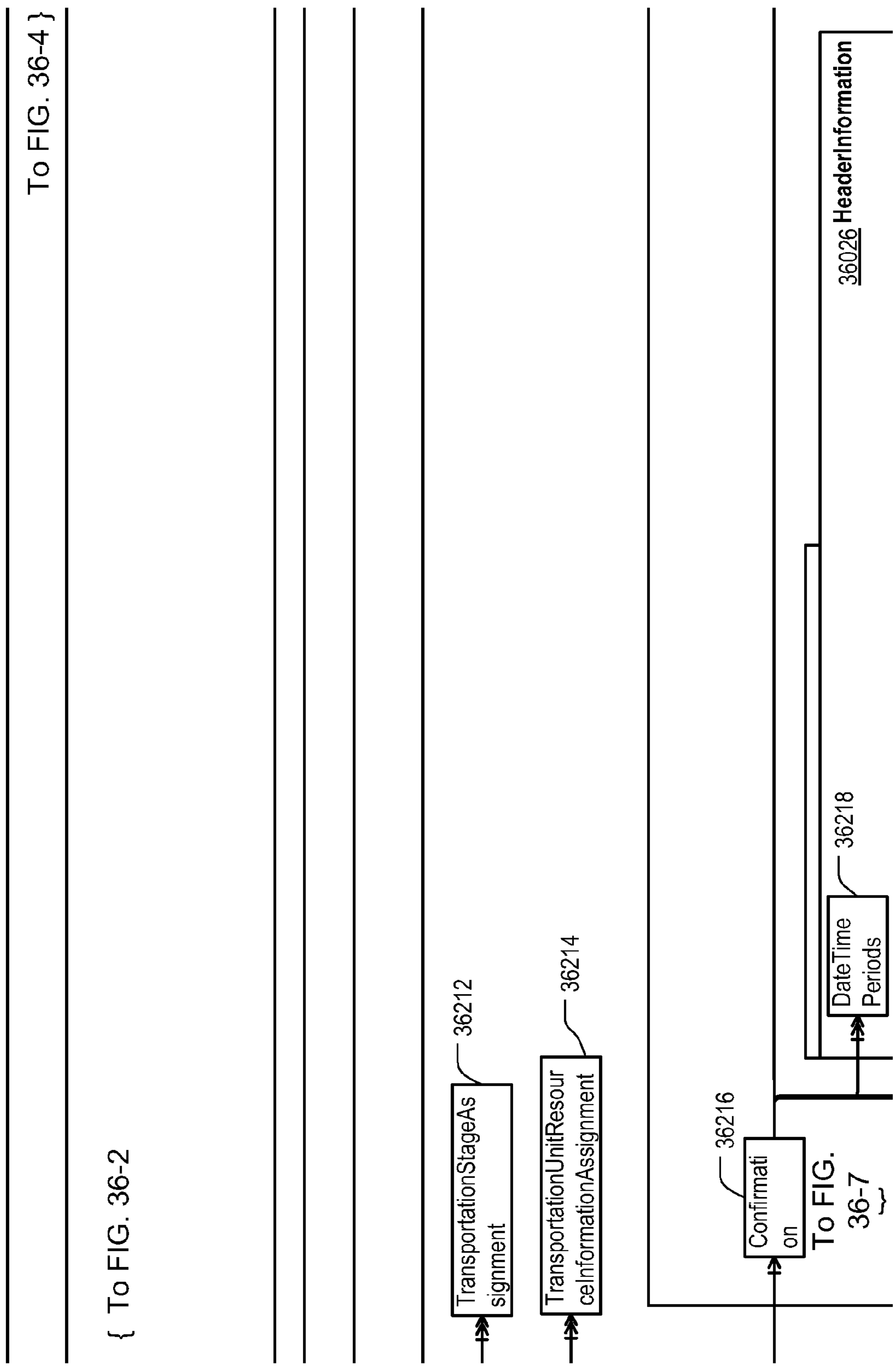
Figures 4, 36:
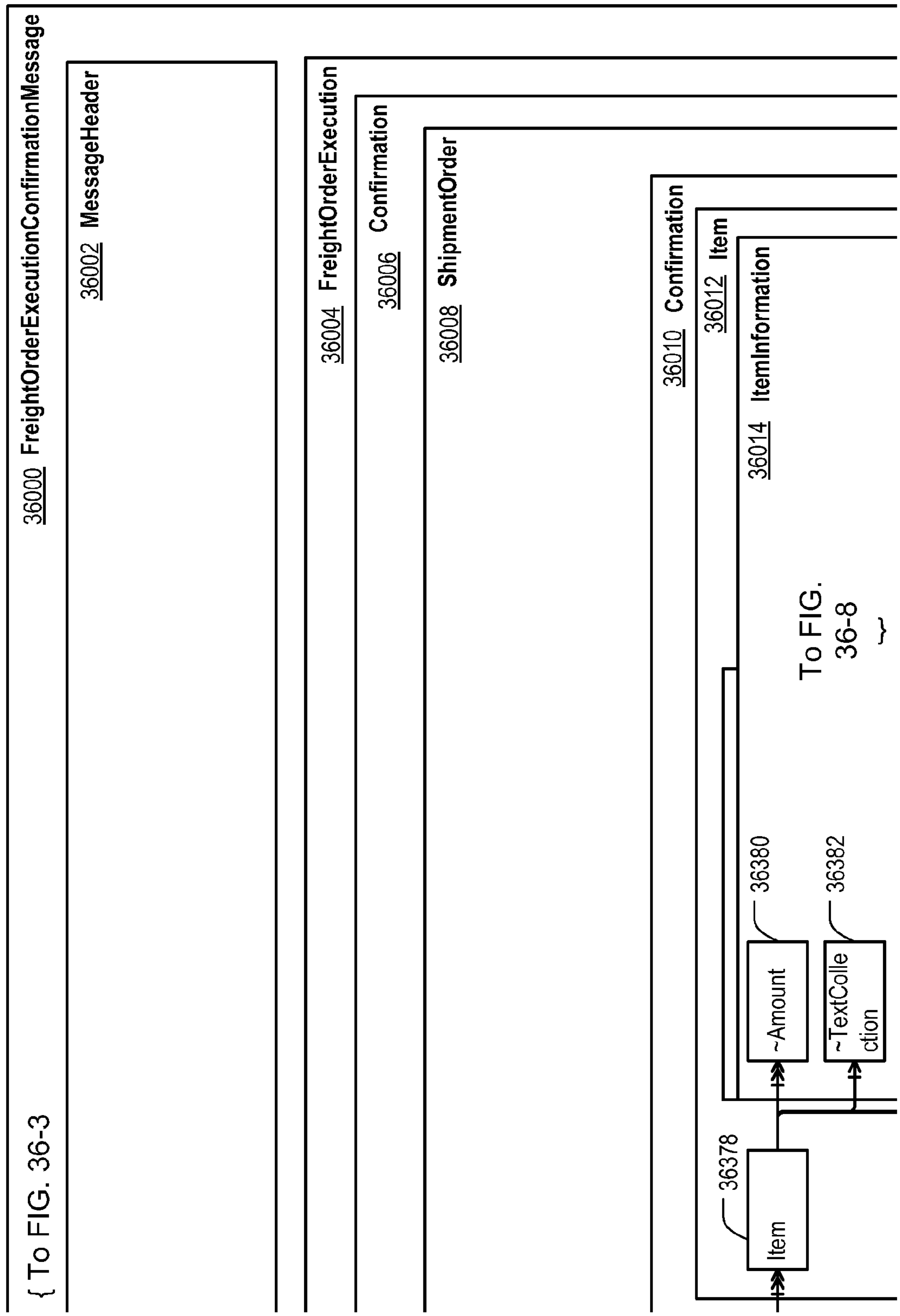
Figures 6, 36:
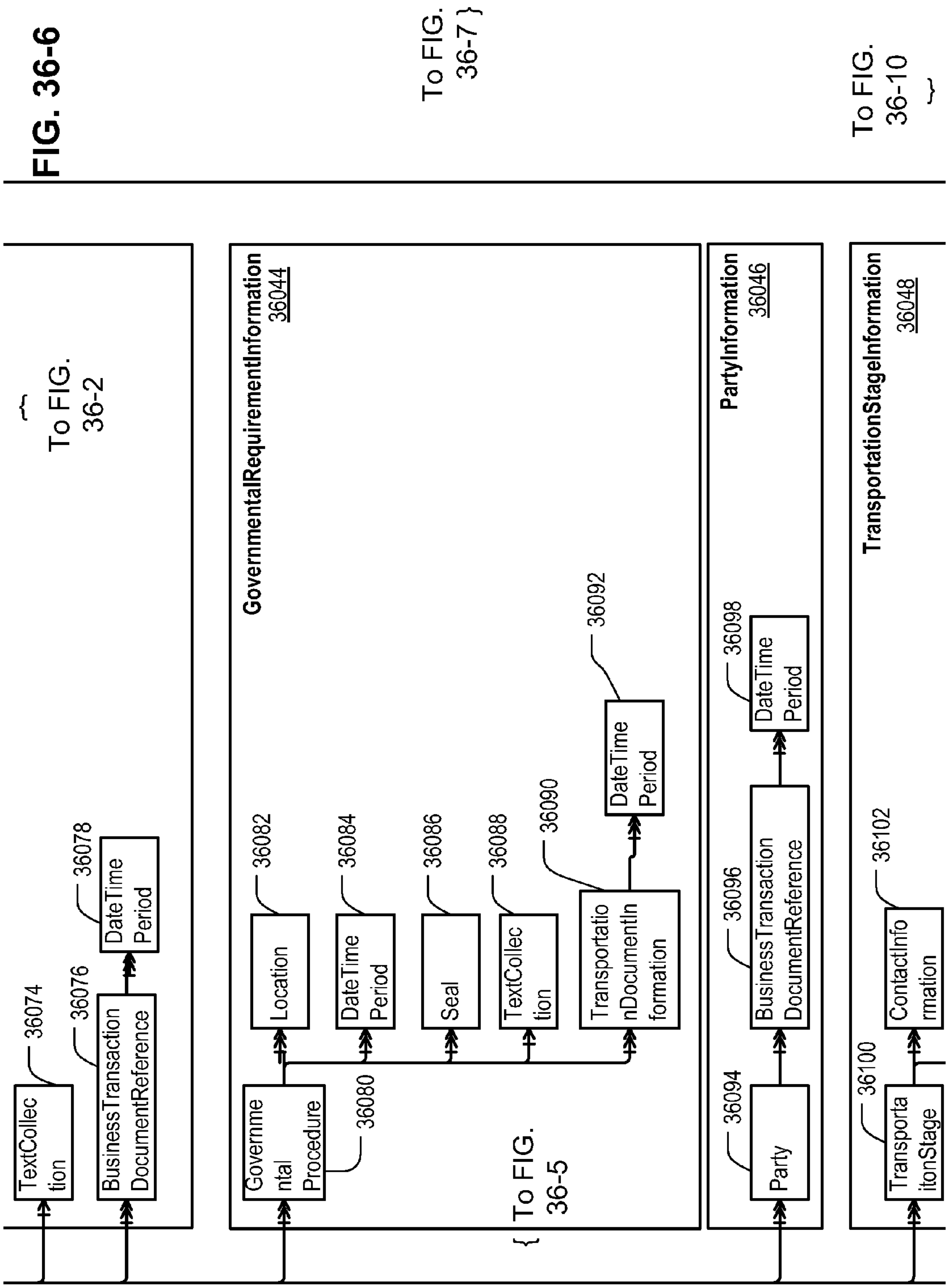
Figures 7, 36:
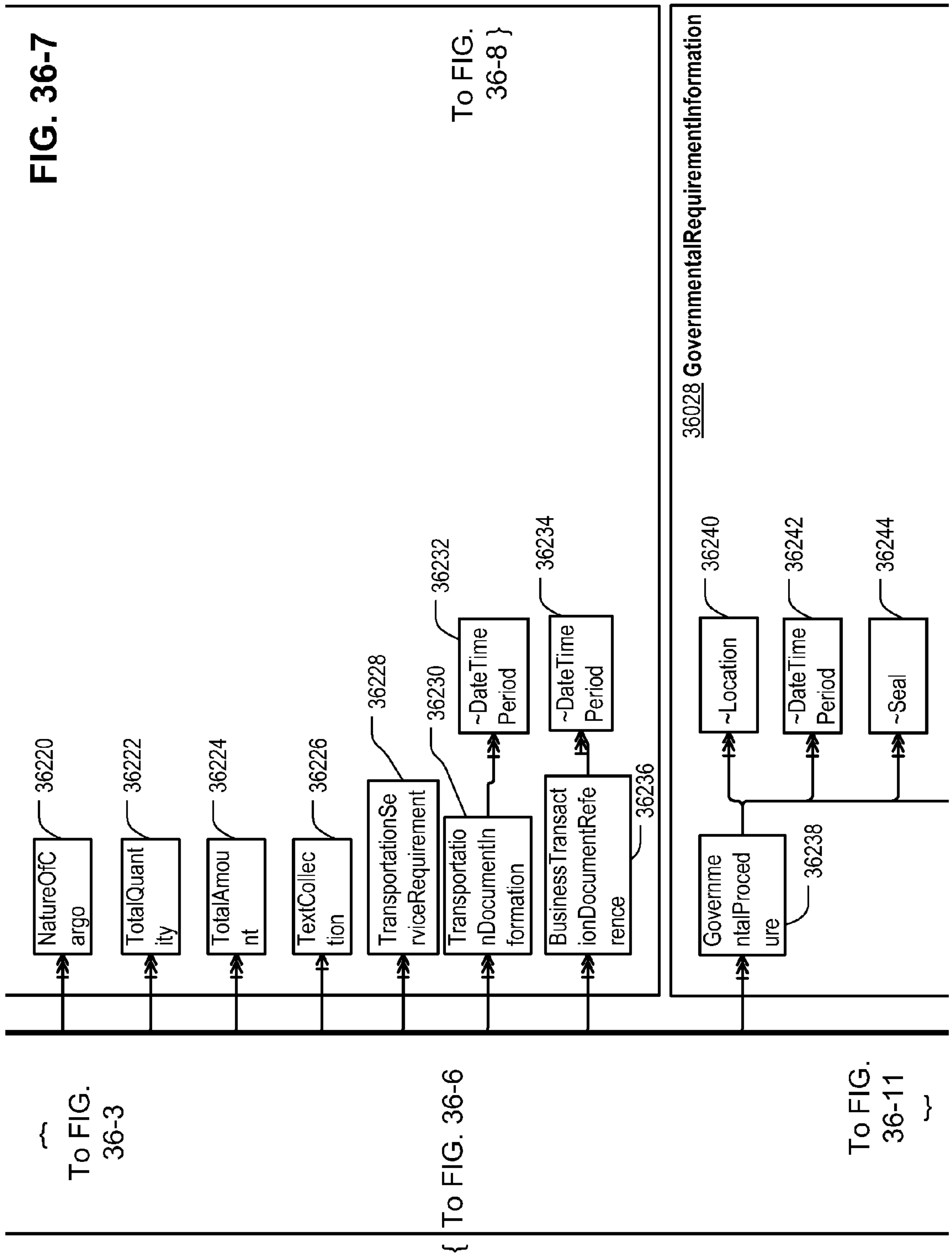
Figures 8, 36:
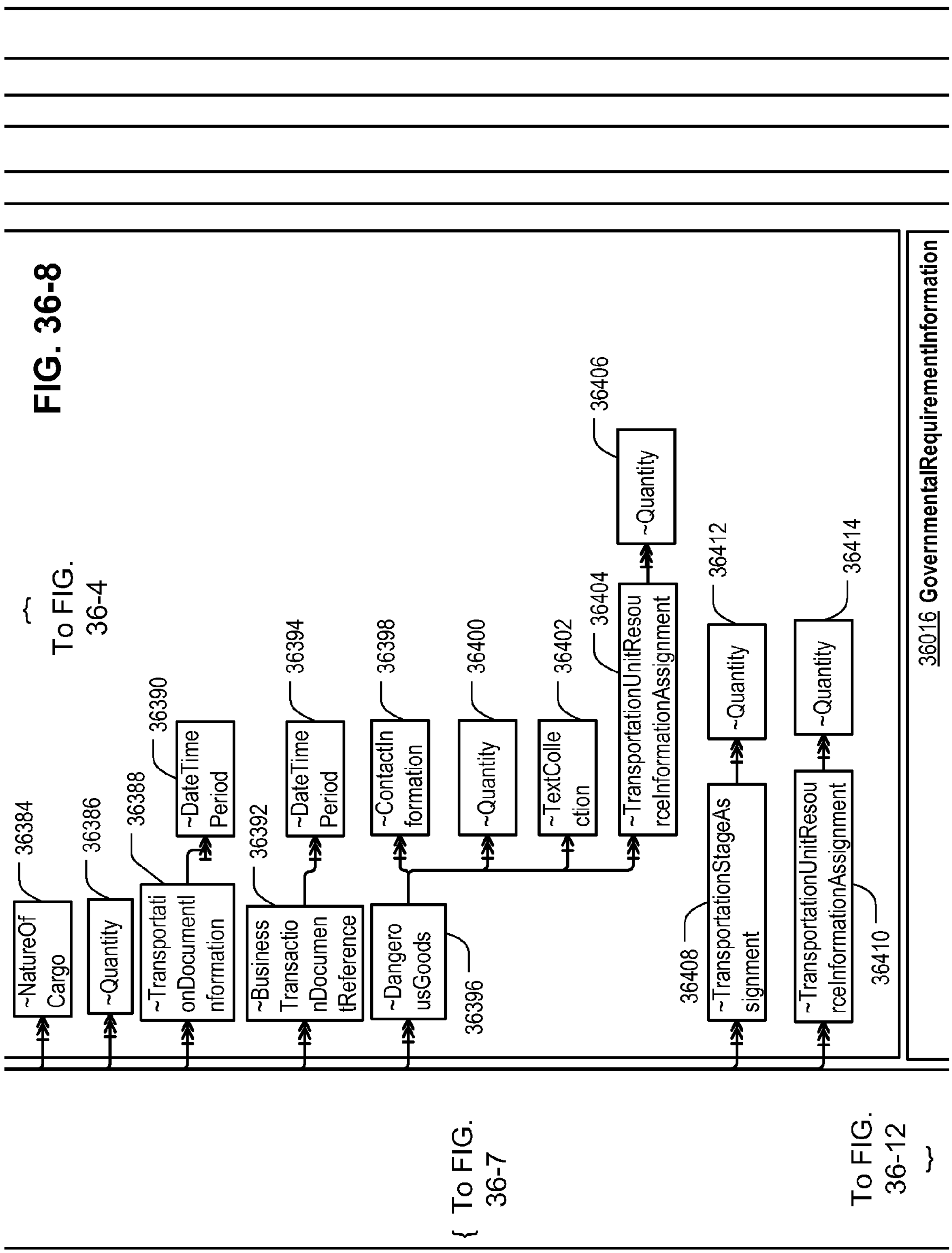
Figures 10, 36:
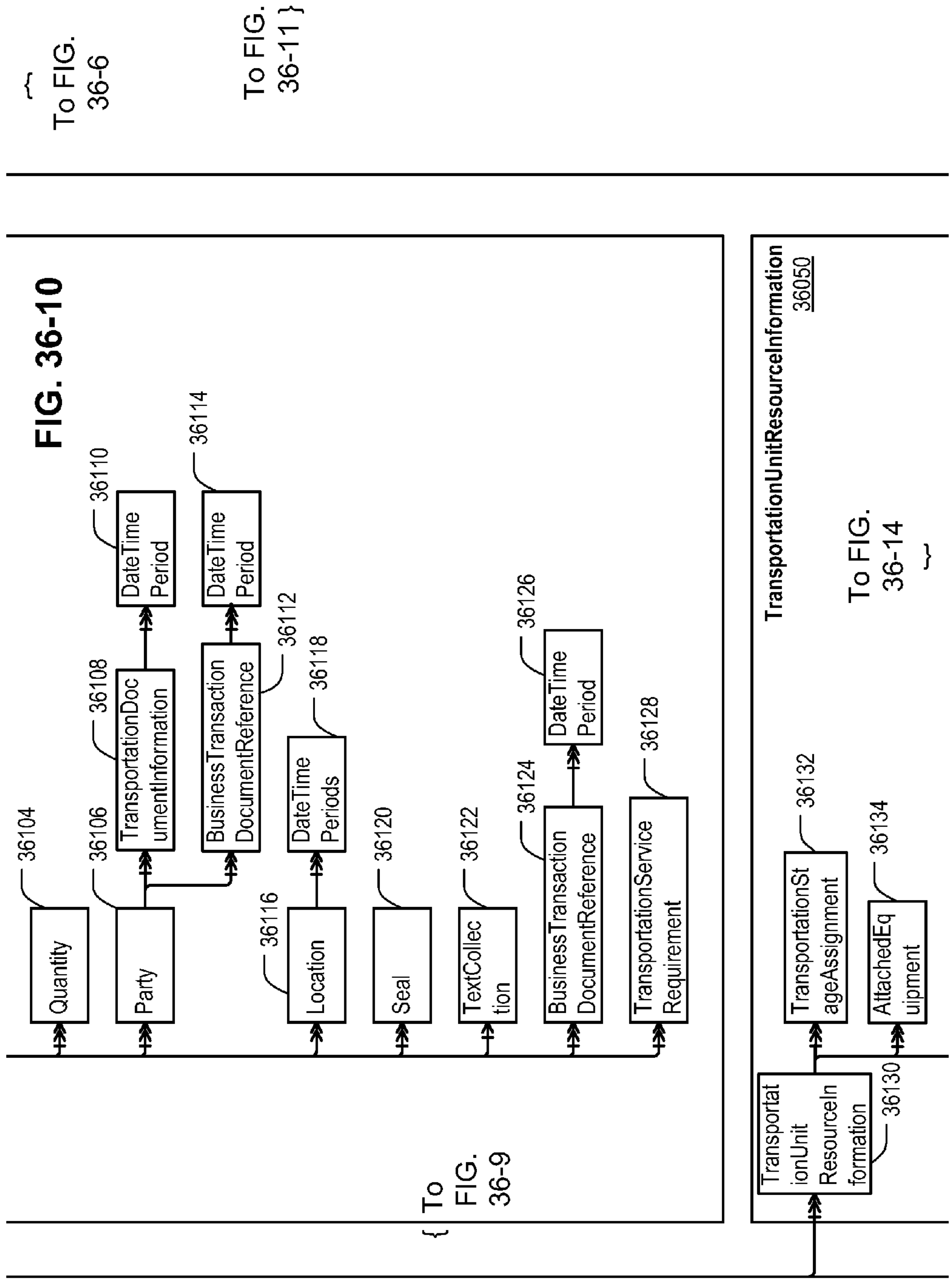
Figures 11, 36:
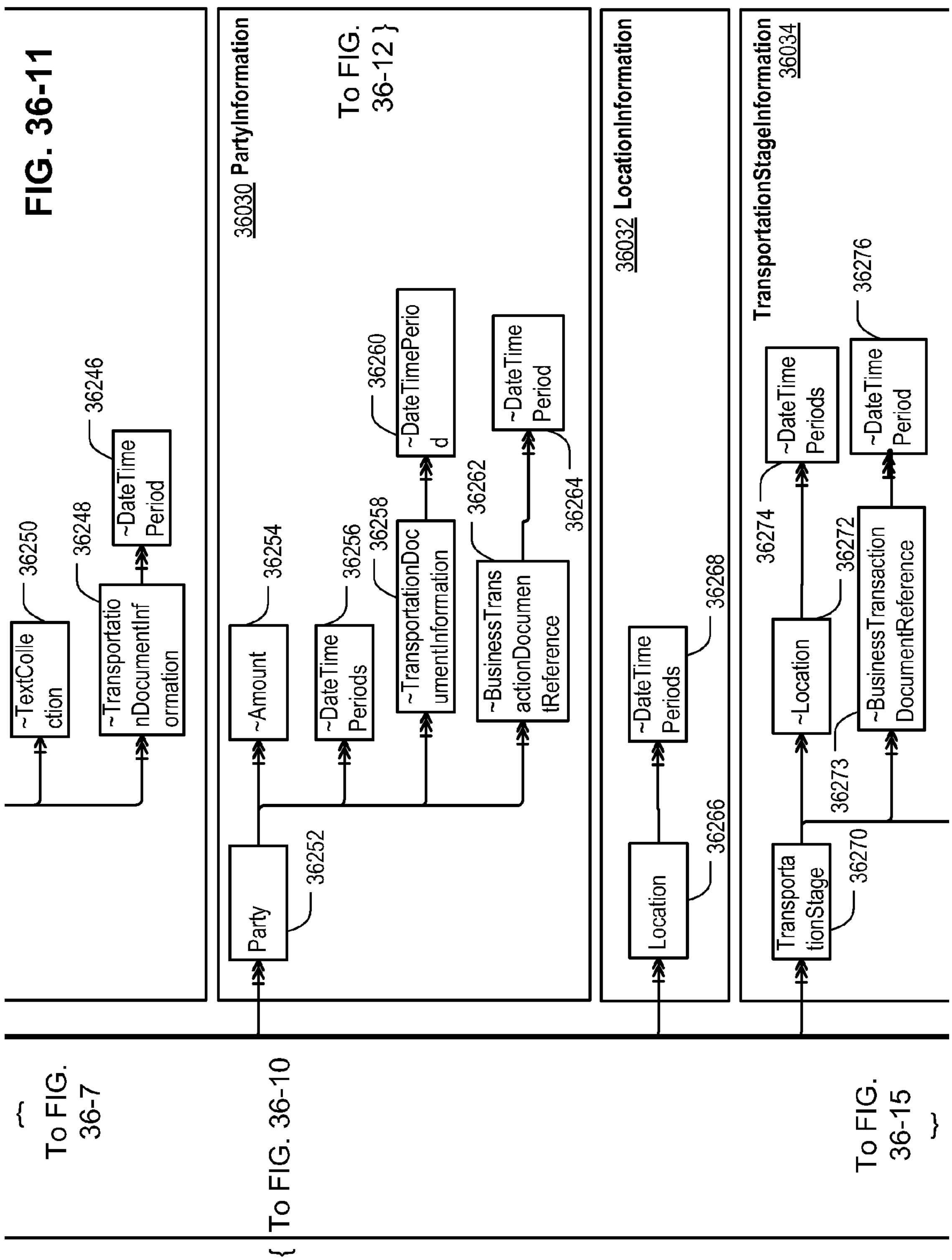
Figures 12, 36:
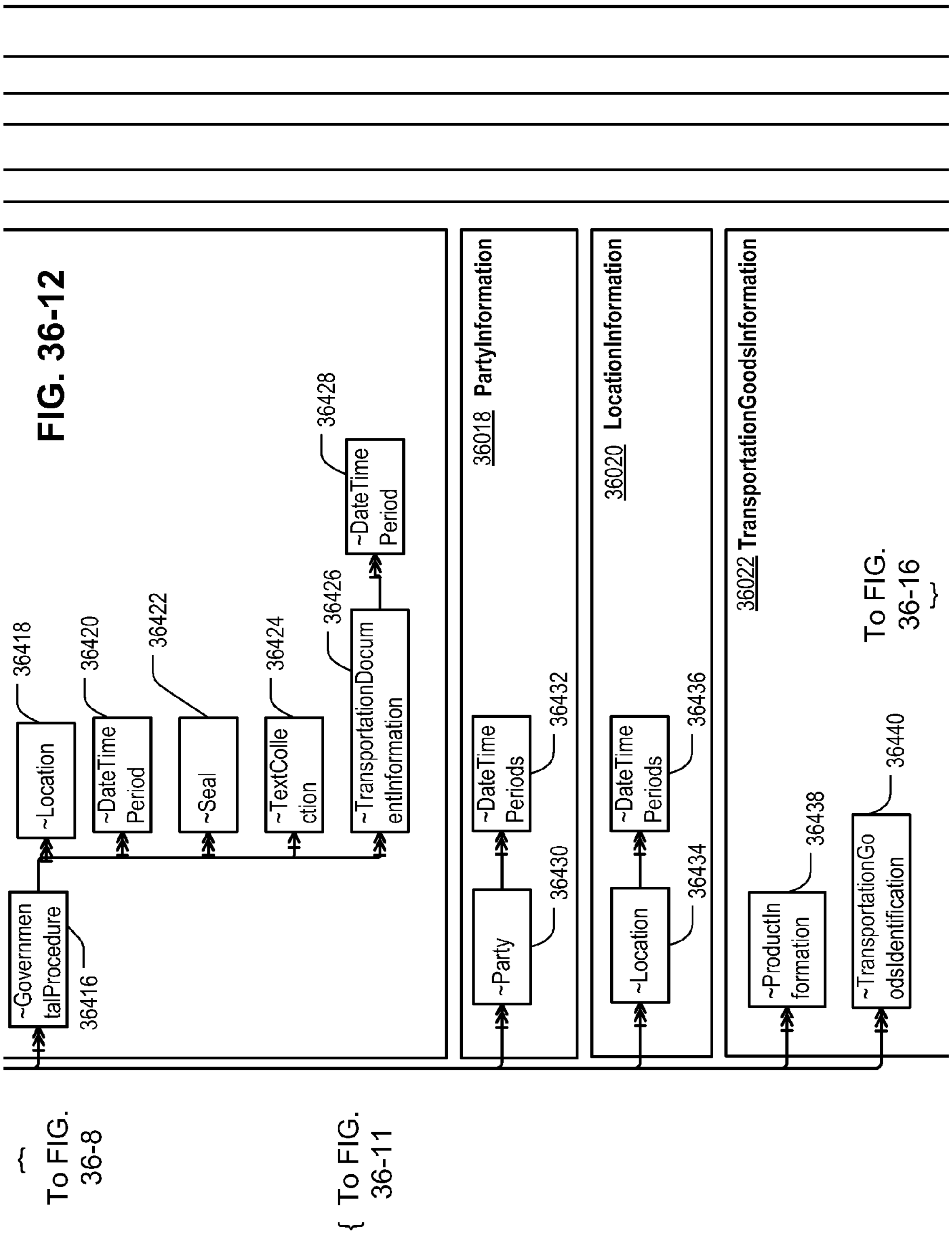
Figures 14, 36:
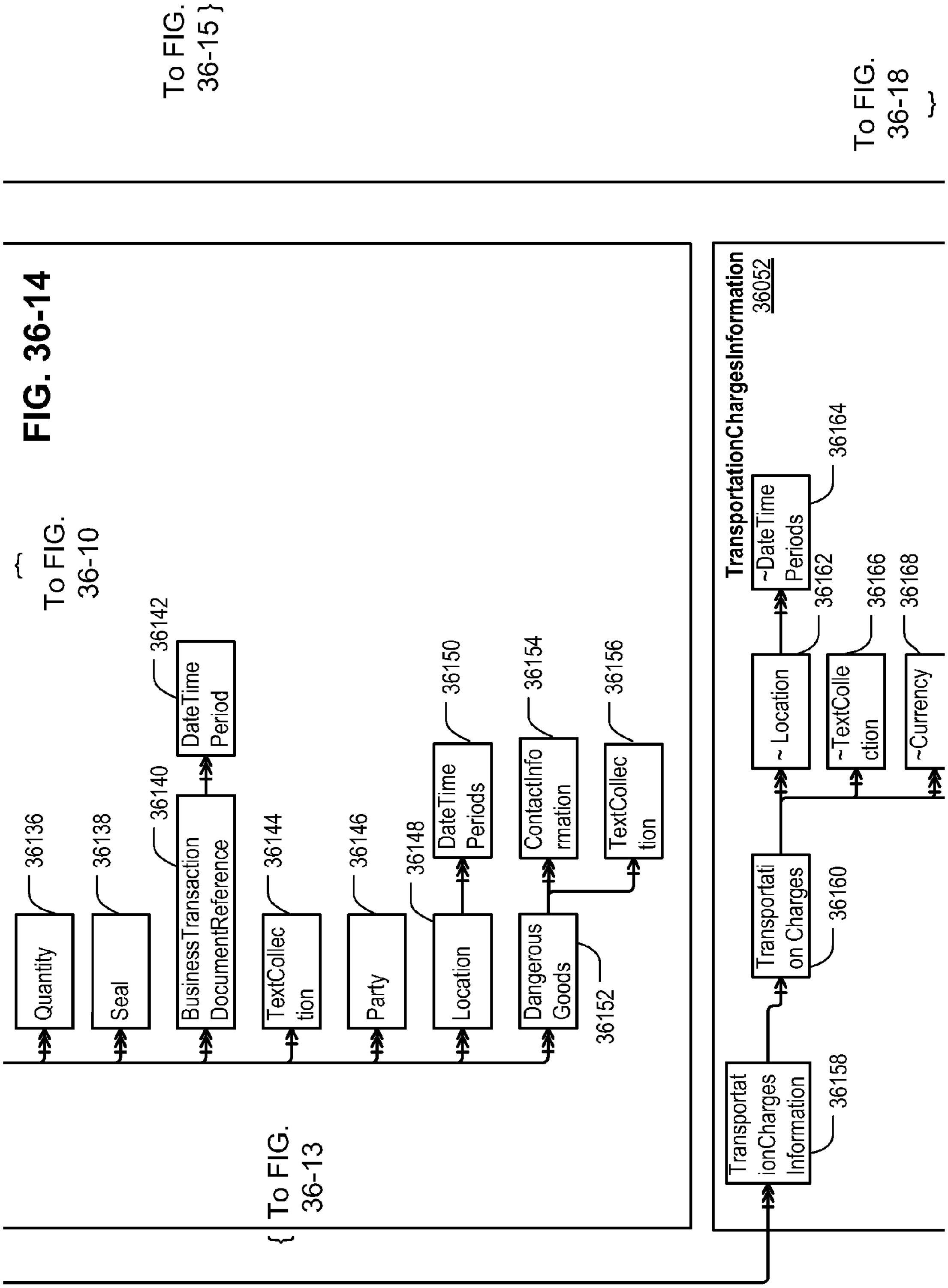
Figures 15, 36:
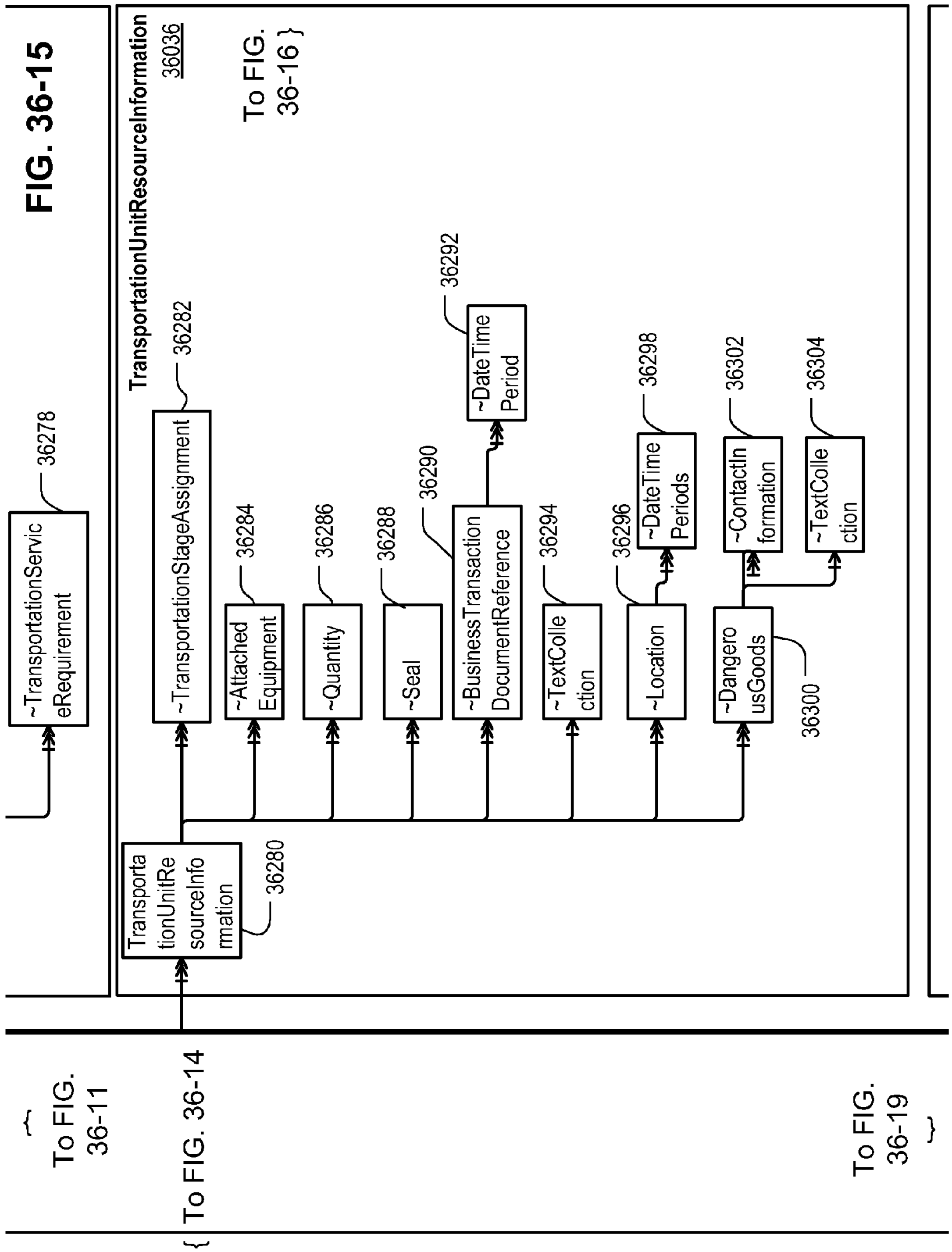
Figures 18, 36:
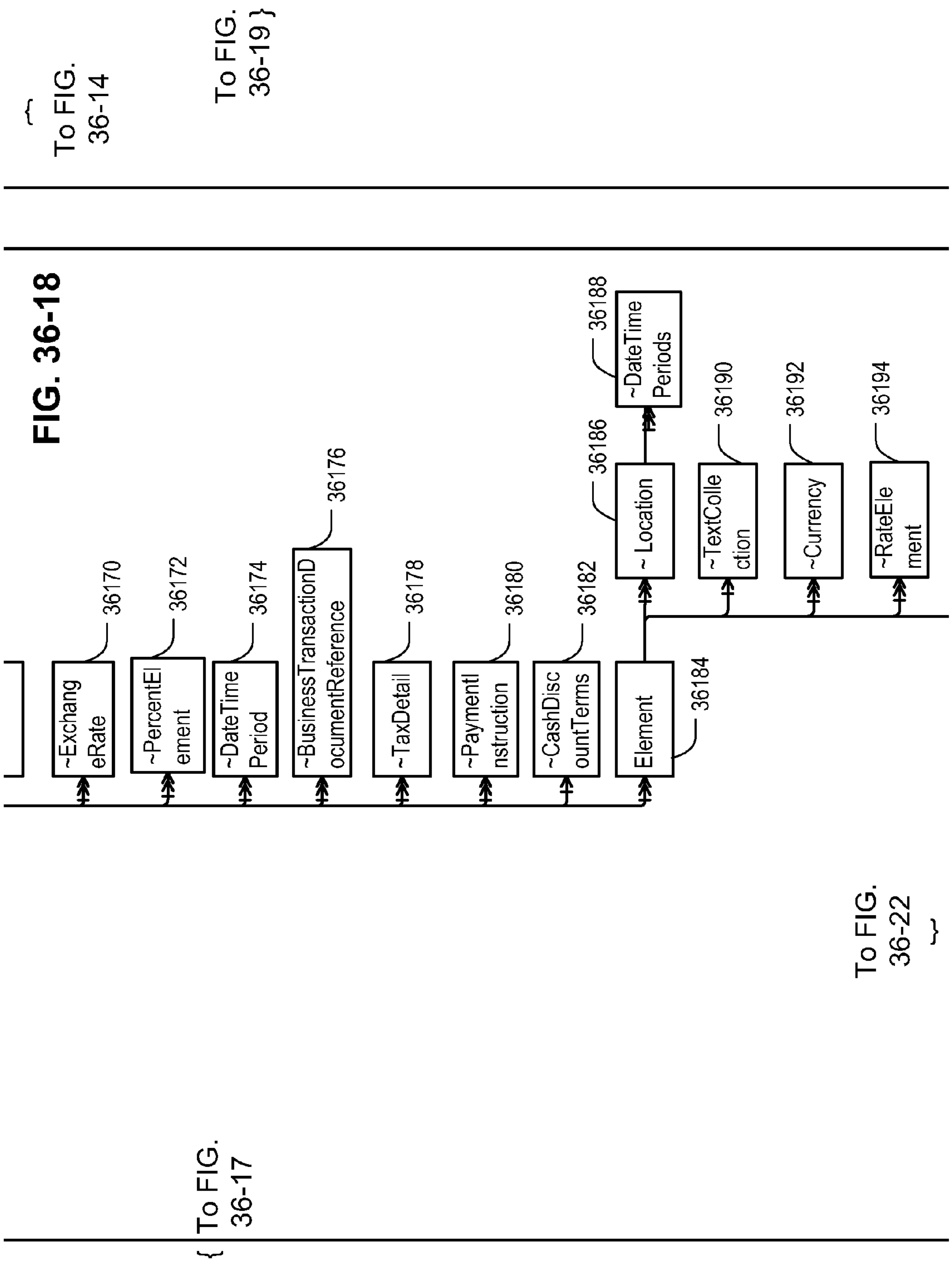
Figures 19, 36:
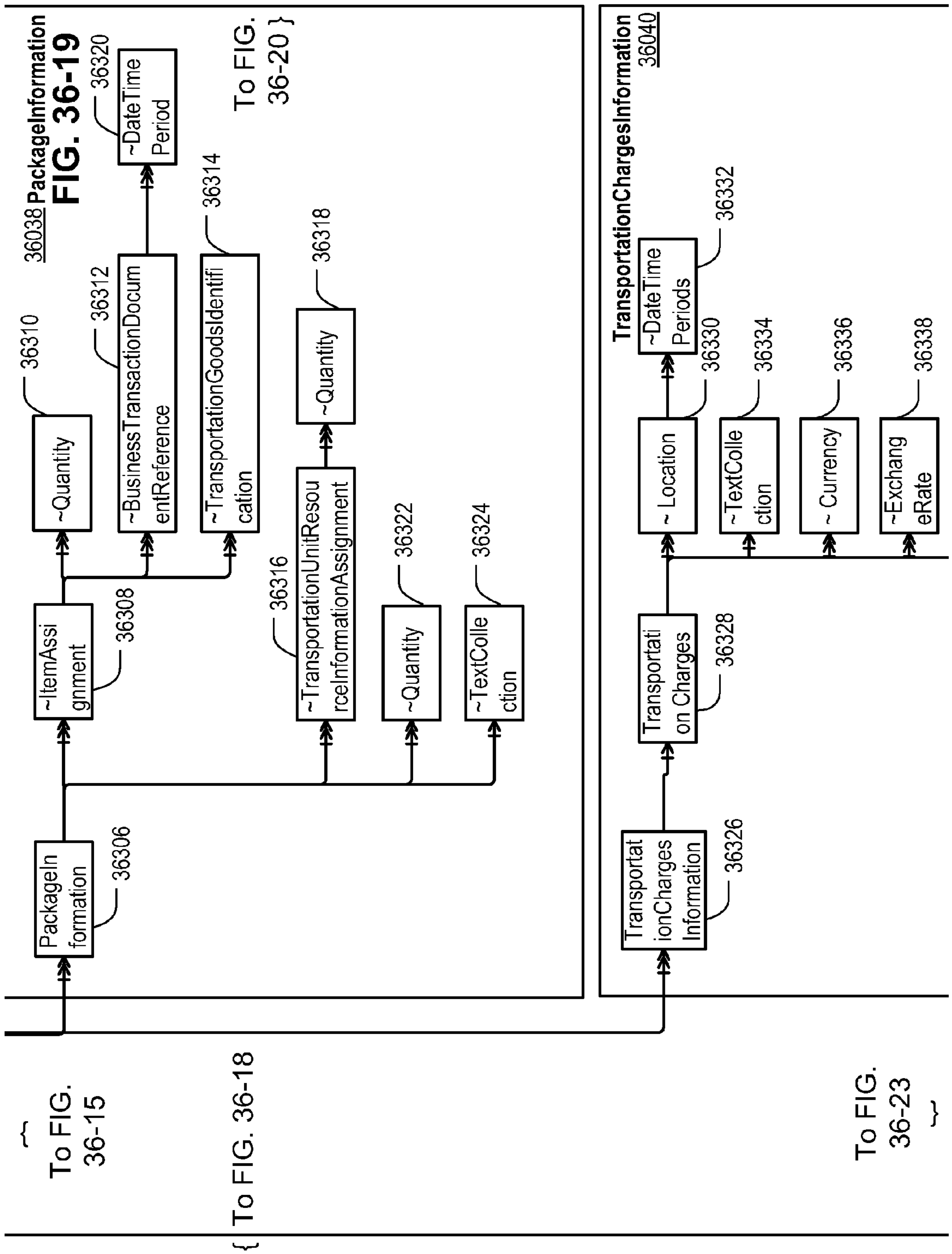
Figures 22, 36:
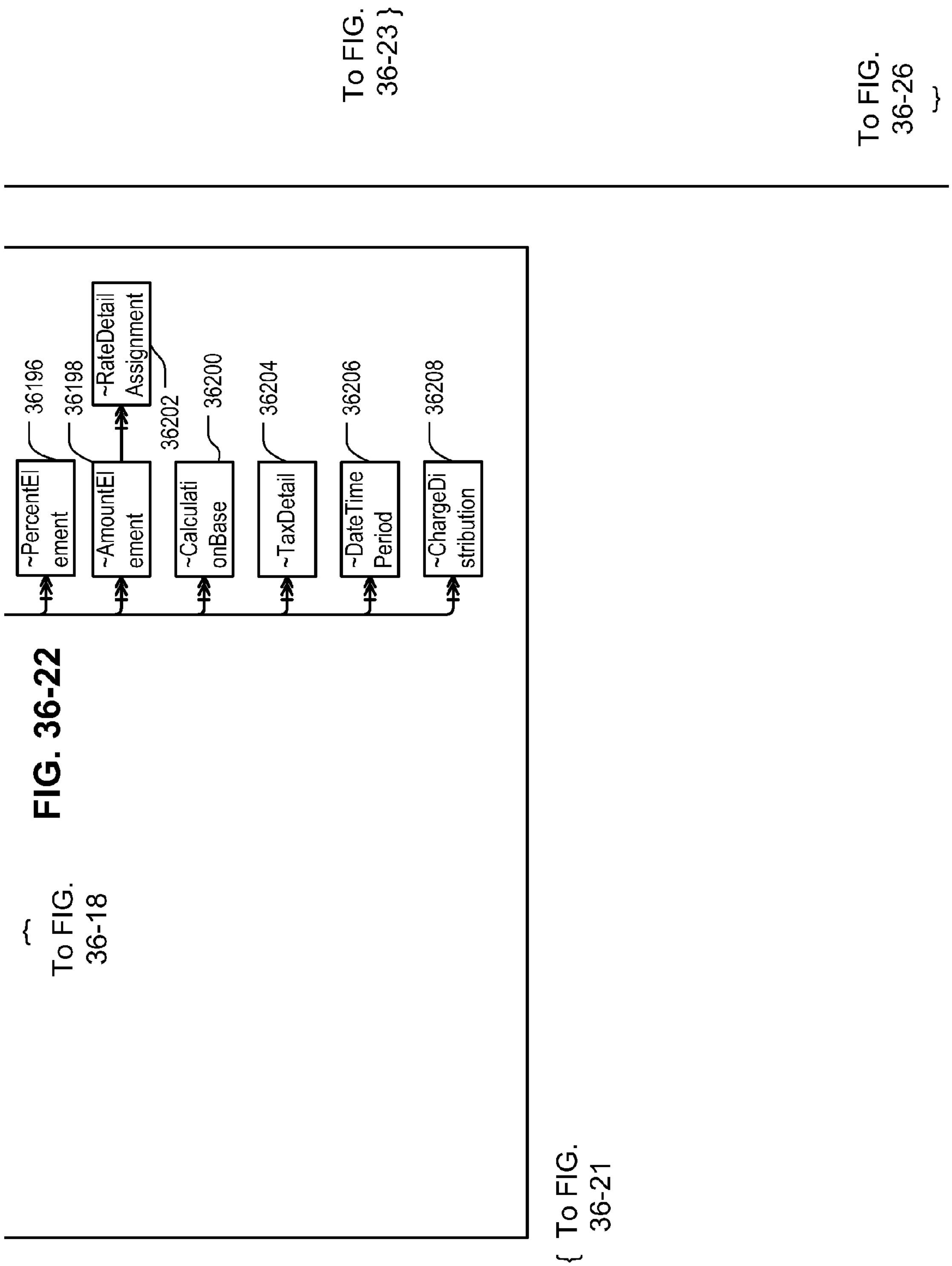
Figures 23, 36:
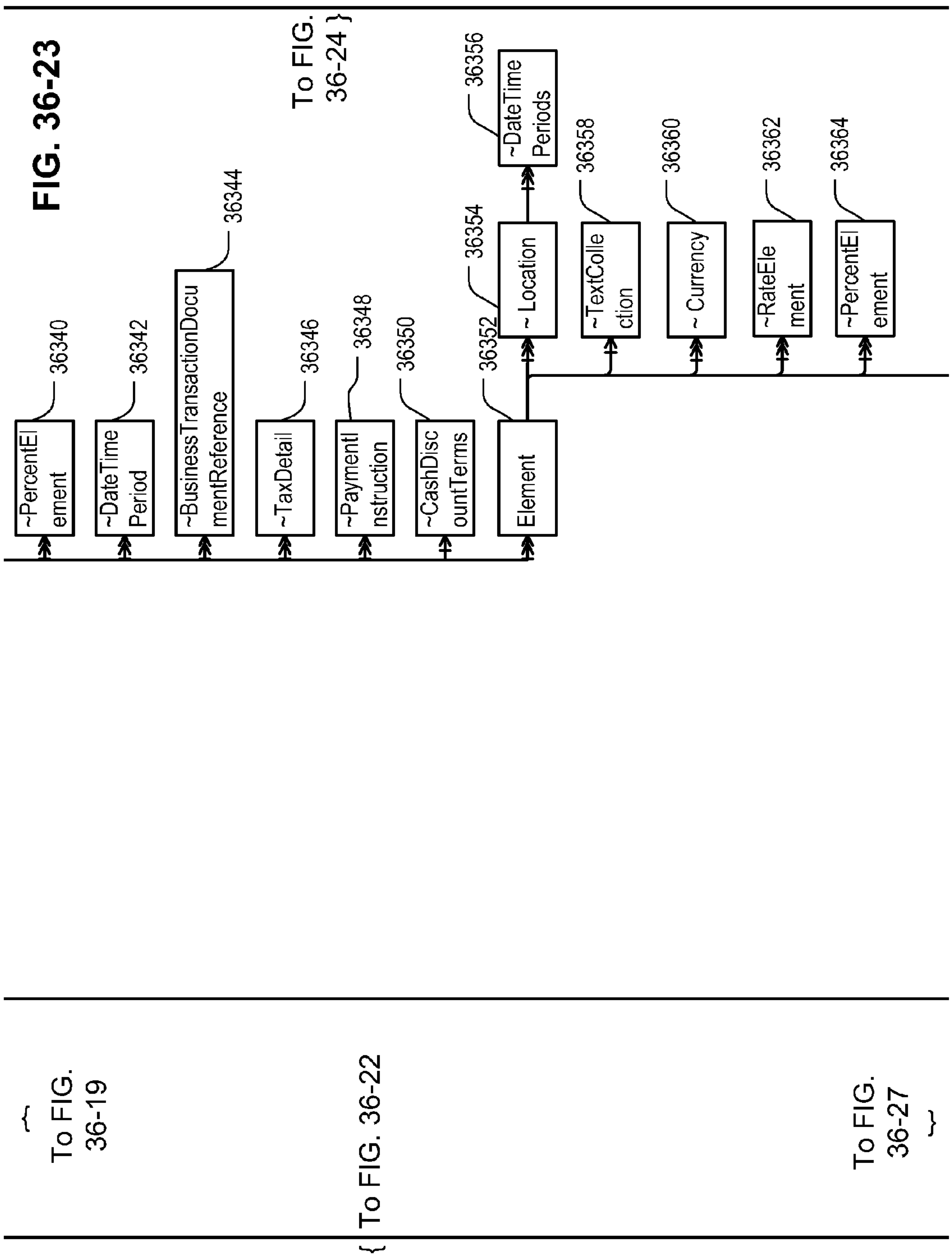
Figures 25, 36:
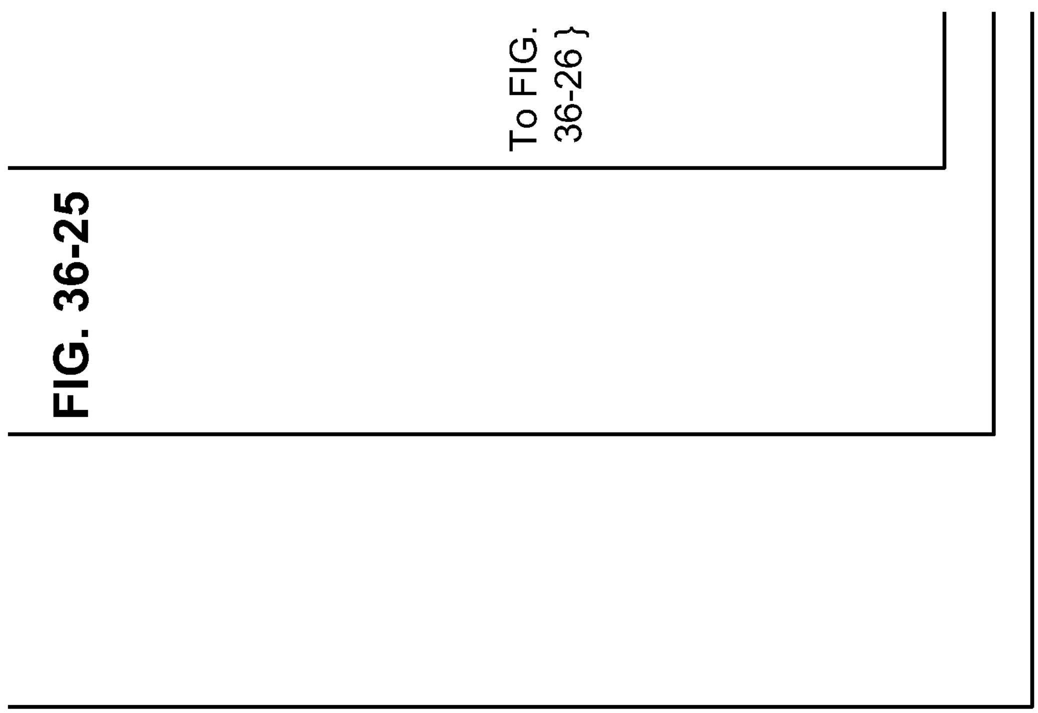
Figures 27, 36:
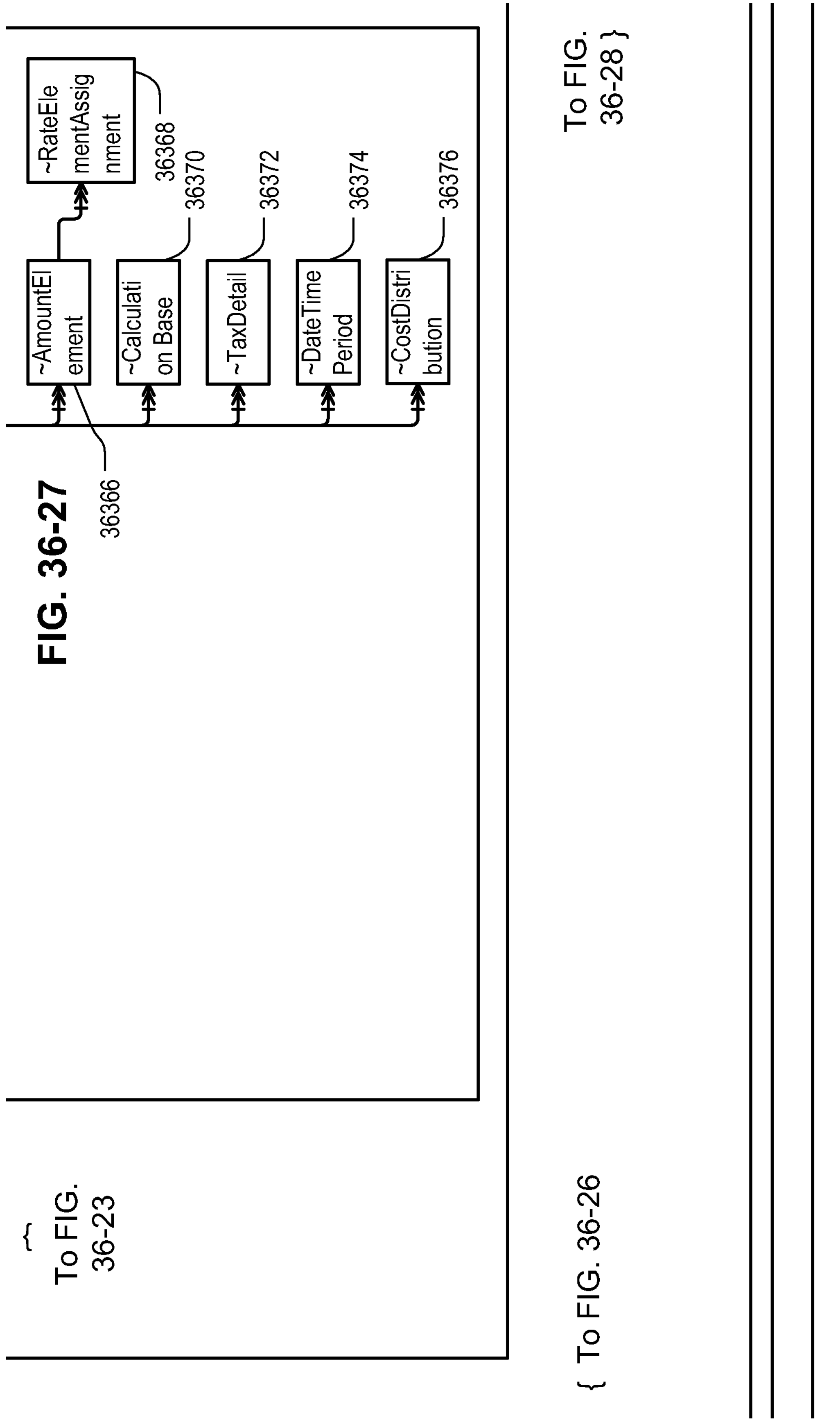
Figures 28, 36:
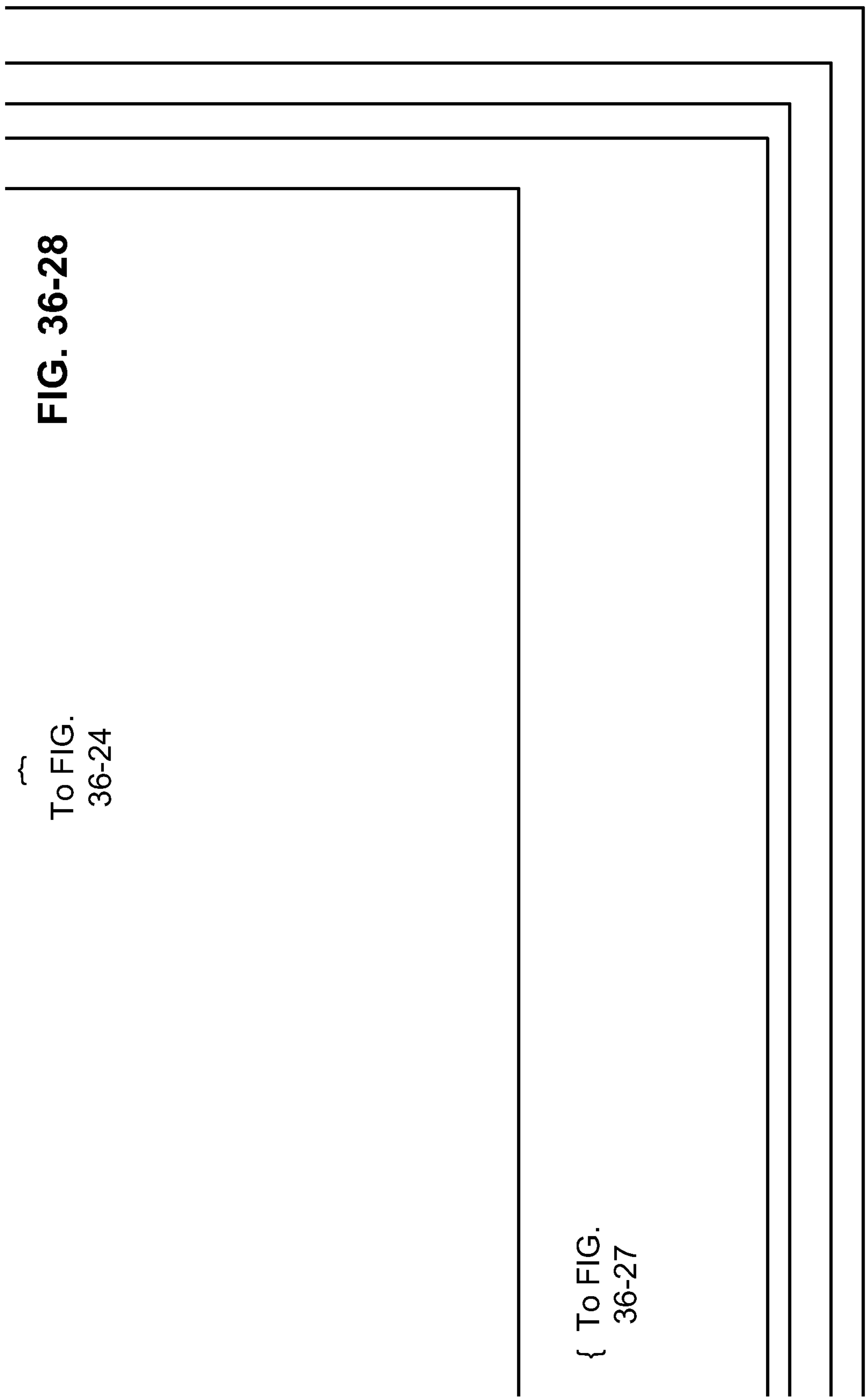

Additionally, FIGS. 36-1 through 36-28 illustrate one example logical configuration of FreightOrderExecutionConfirmationMessage message 36000. Specifically, this figure depicts the arrangement and hierarchy of various components such as one or more levels of packages, entities, and datatypes, shown here as 36002 through 36440. As described above, packages may be used to represent hierarchy levels. Entities are discrete business elements that are used during a business transaction. Data types are used to type object entities and interfaces with a structure. For example, FreightOrderExecutionConfirmationMessage message 36000 includes, among other things, FreightOrderExecution 36062.

Accordingly, heterogeneous applications may communicate using this consistent message configured as such.

Figure 37:
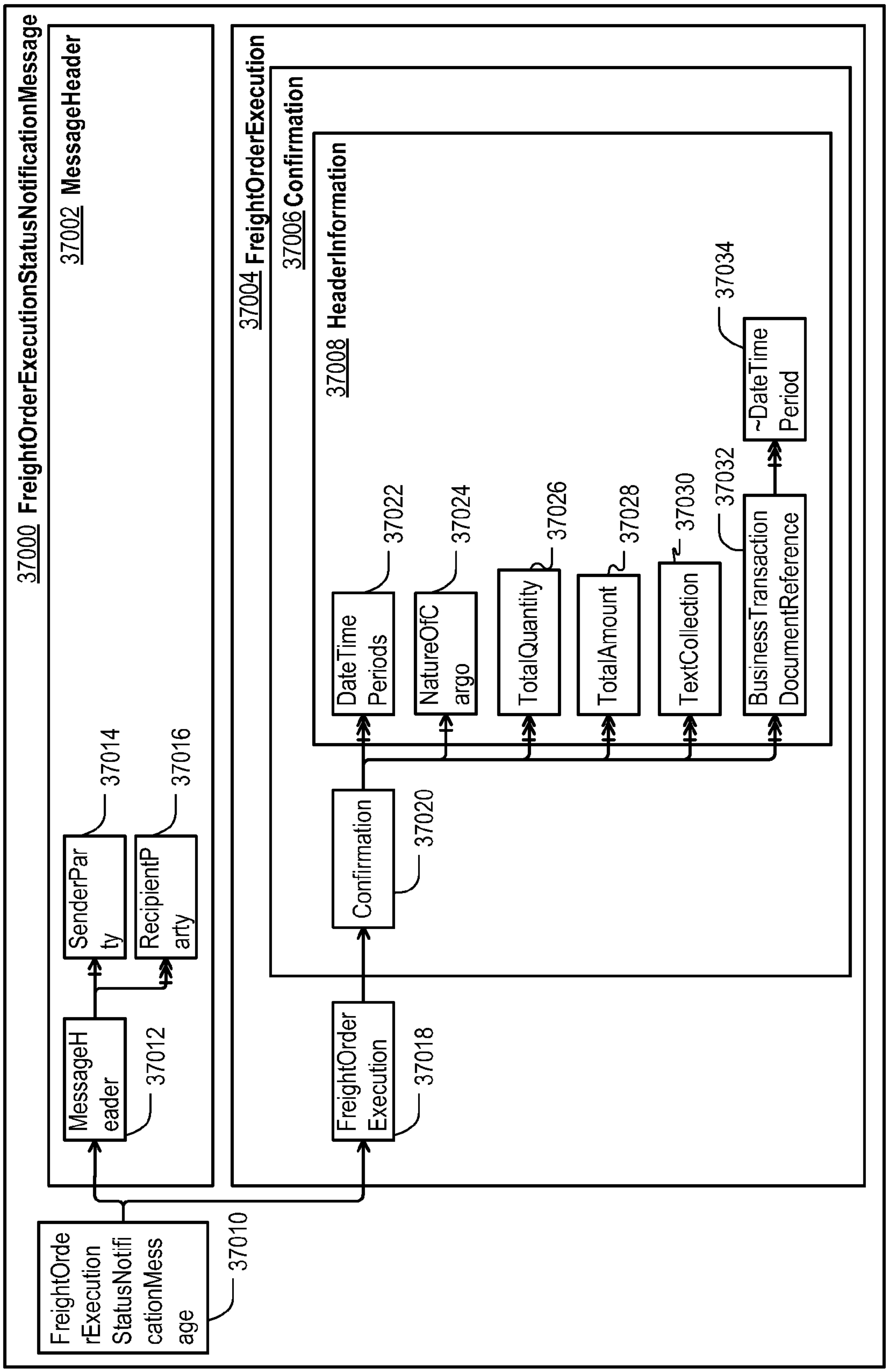
FIG. 37 shows an exemplary FreightOrderExecutionStatusNotificationMessage Message Data Type.

Additionally, FIG. 37 illustrates one example logical configuration of FreightOrderExecutionStatusNotificationMessage message 37000. Specifically, this figure depicts the arrangement and hierarchy of various components such as one or more levels of packages, entities, and datatypes, shown here as 37002 through 37034. As described above, packages may be used to represent hierarchy levels. Entities are discrete business elements that are used during a business transaction. Data types are used to type object entities and interfaces with a structure. For example, FreightOrderExecutionStatusNotificationMessage message 37000 includes, among other things, FreightOrderExecution 37018. Accordingly, heterogeneous applications may communicate using this consistent message configured as such.

Figures 1, 38:
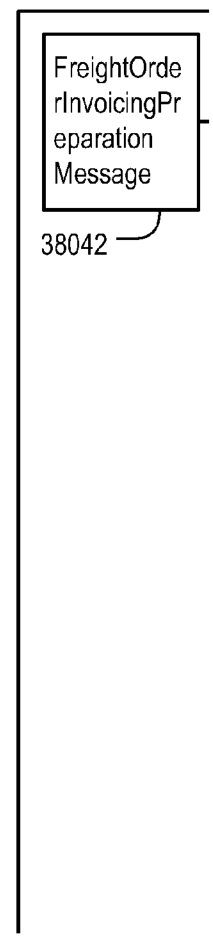
Figures 2, 38:
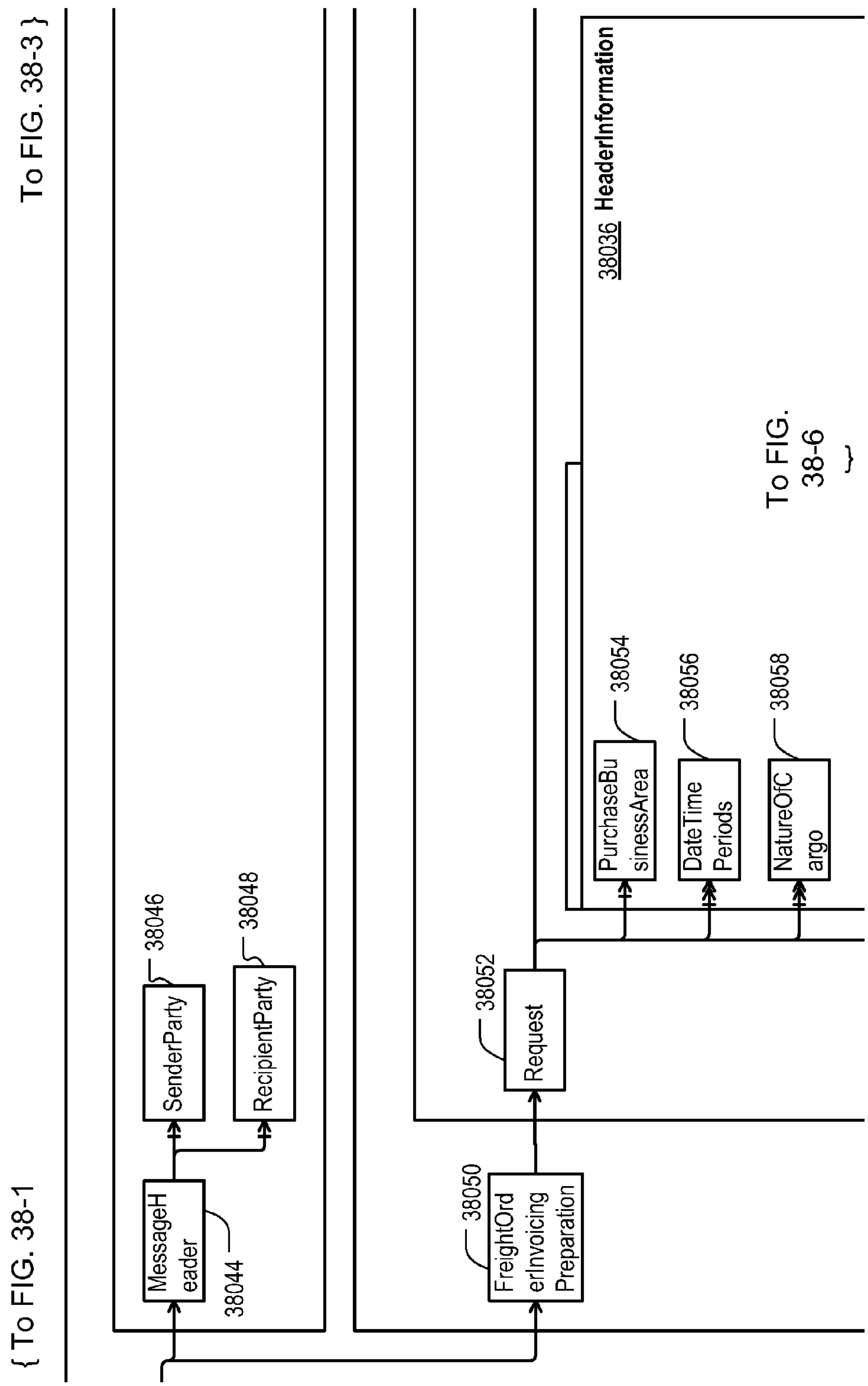
Figures 3, 38:
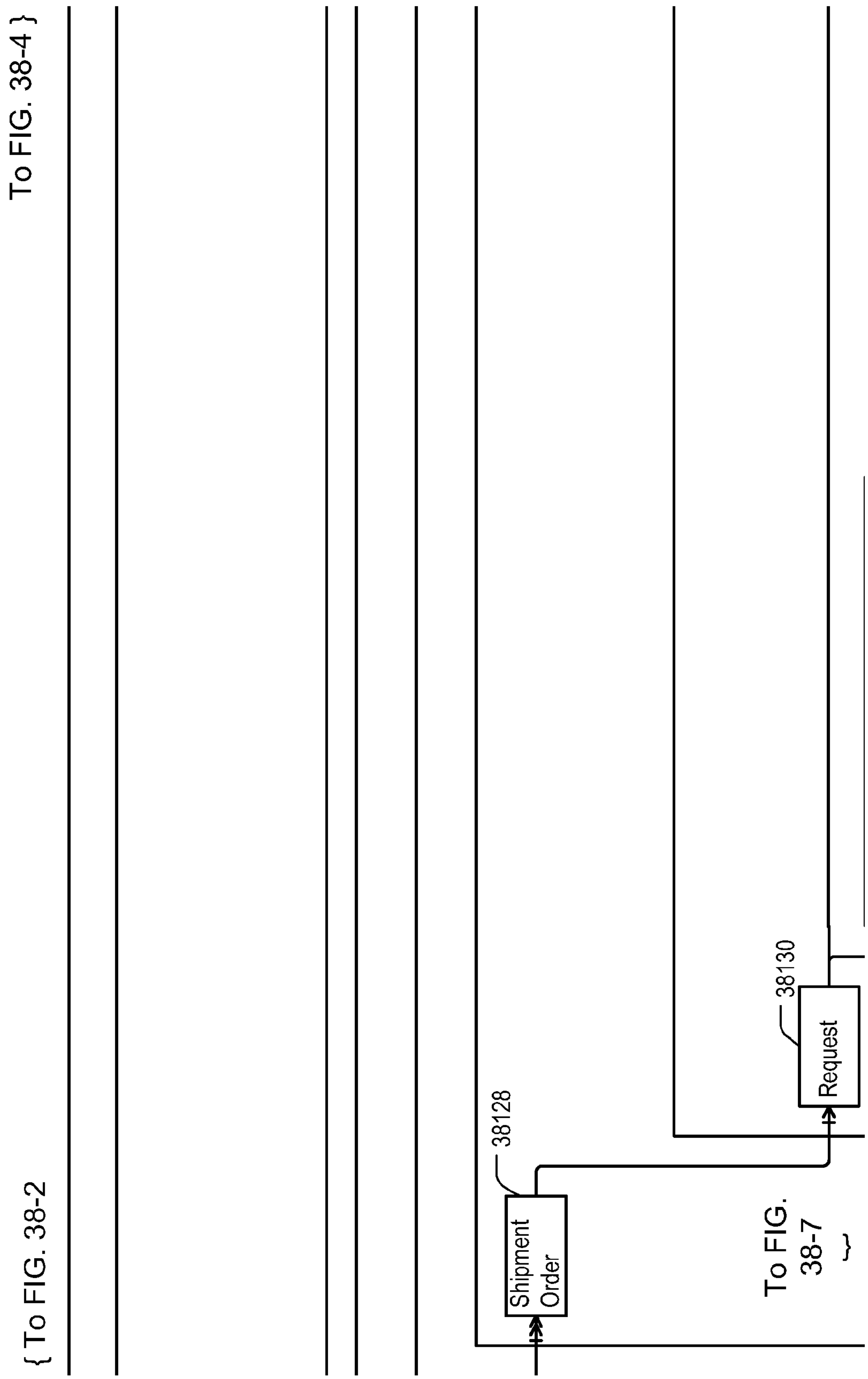
Figures 4, 38:
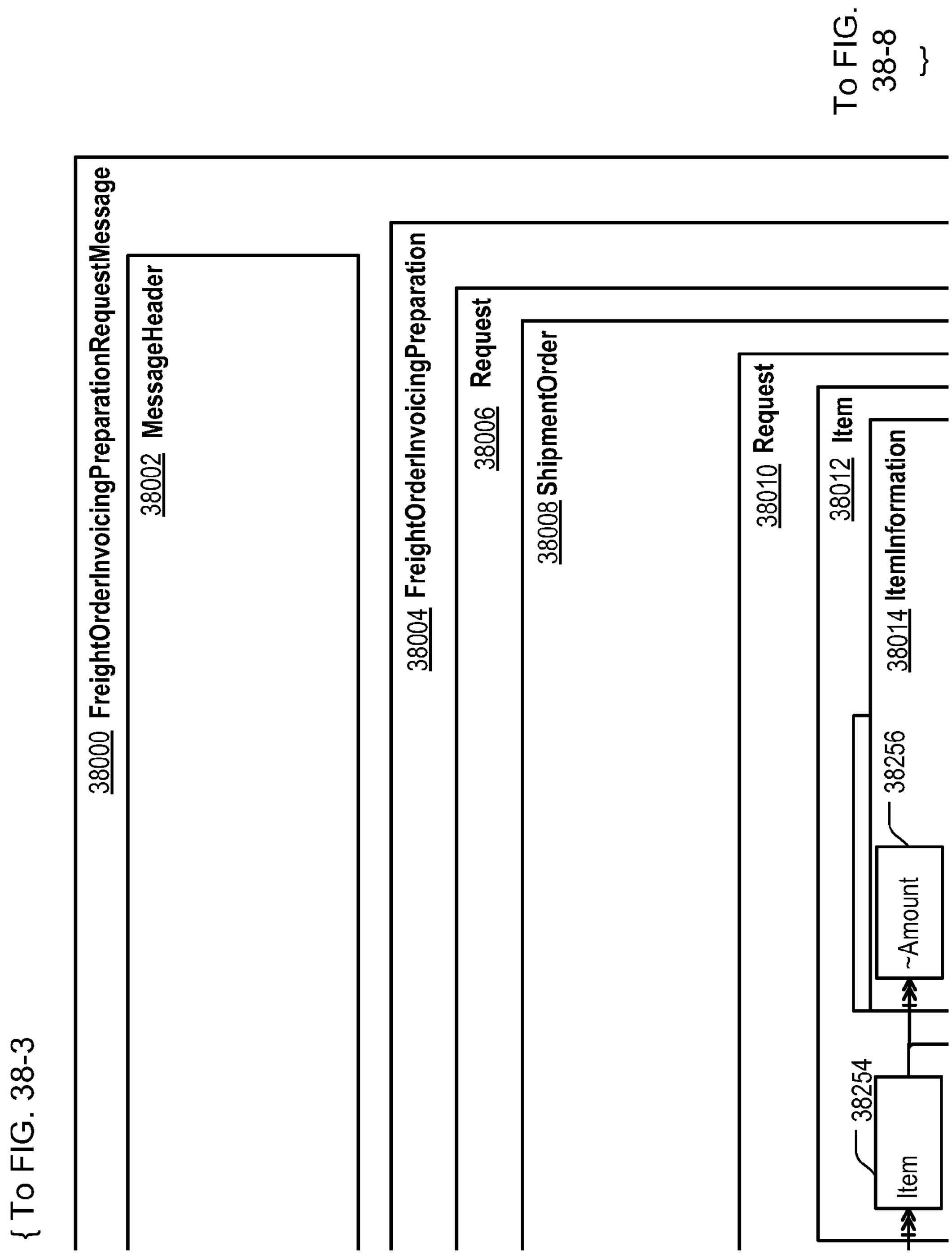
Figures 6, 38:
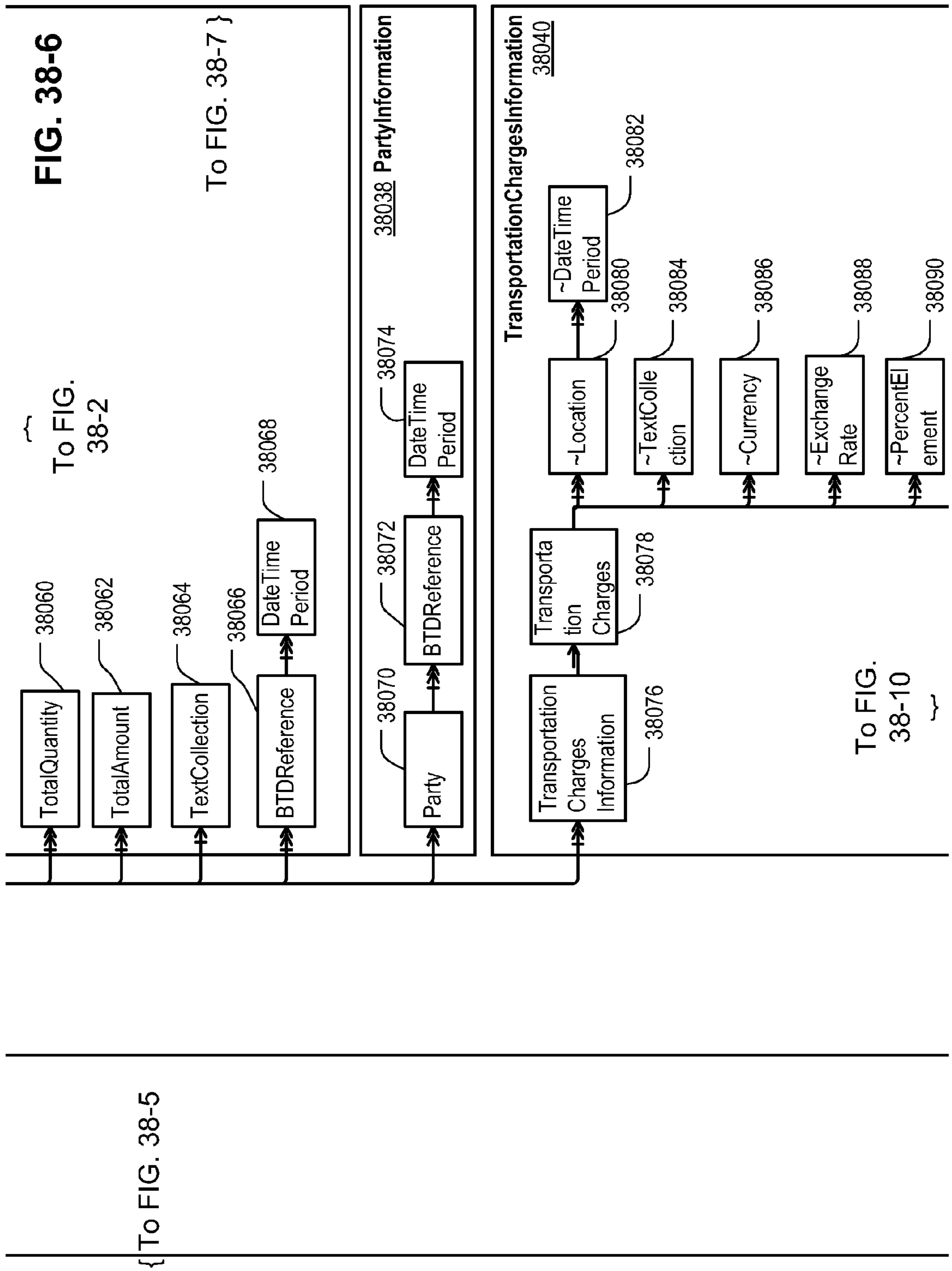
Figures 7, 38:
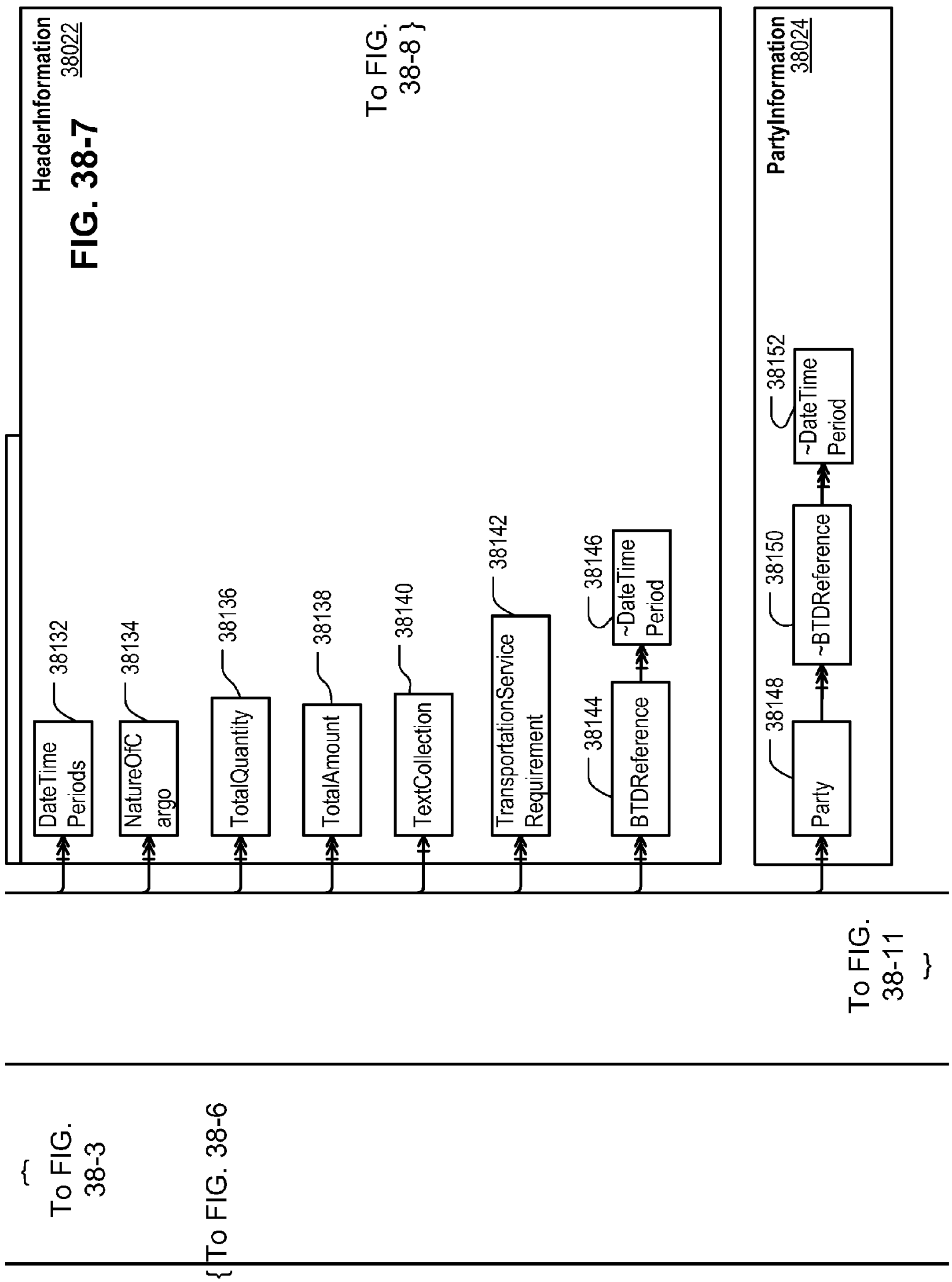
Figures 8, 38:
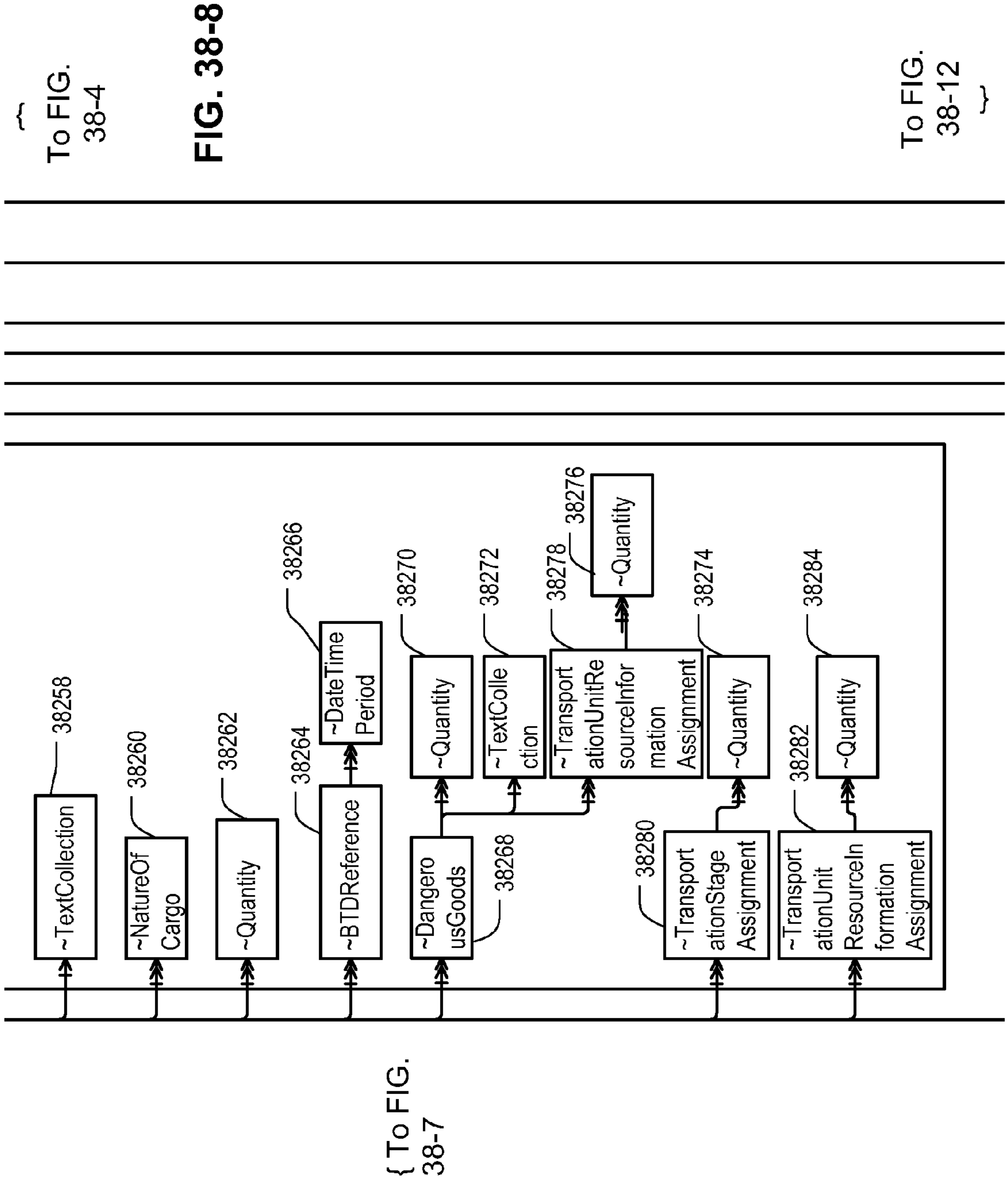
Figures 10, 38:
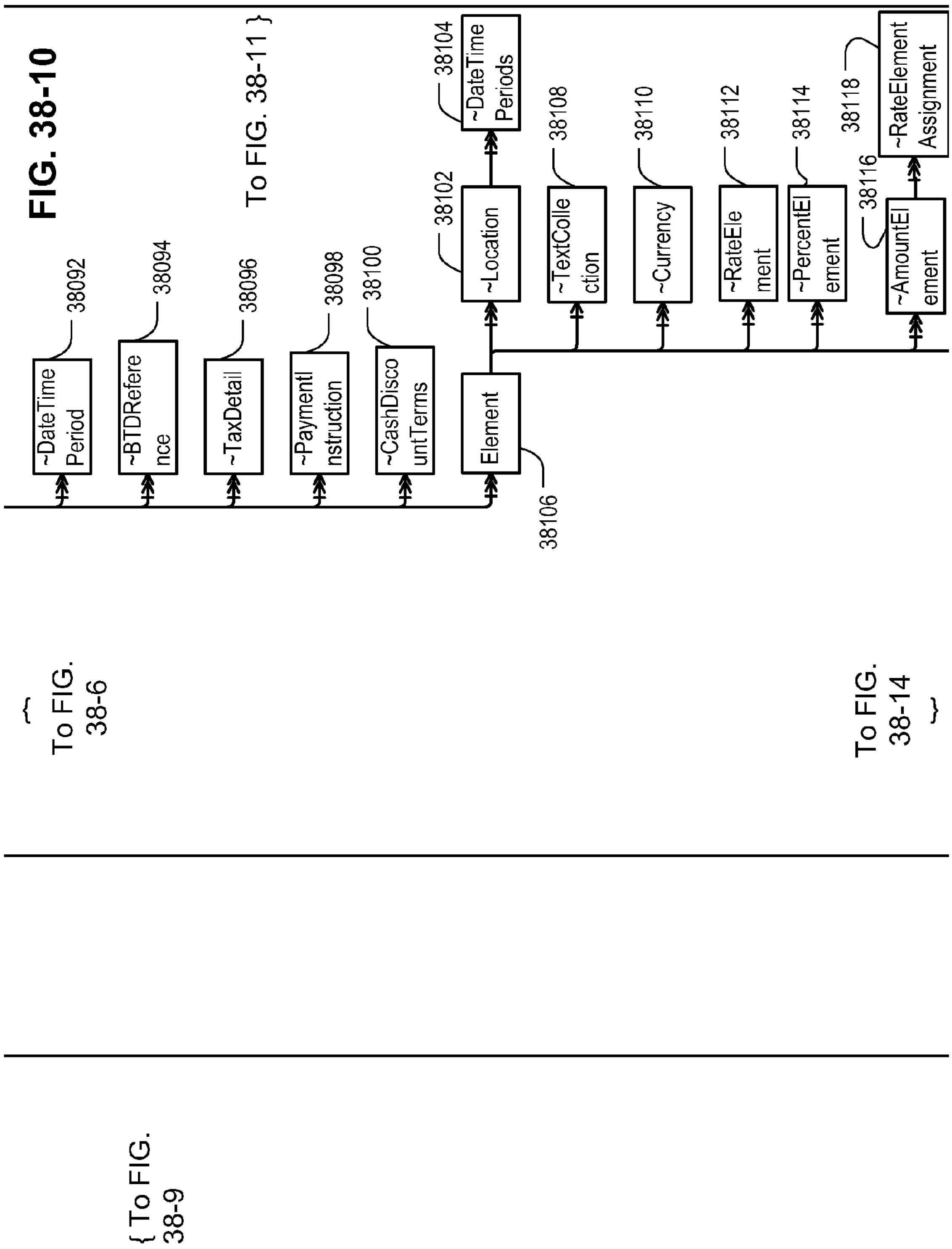
Figures 11, 38:
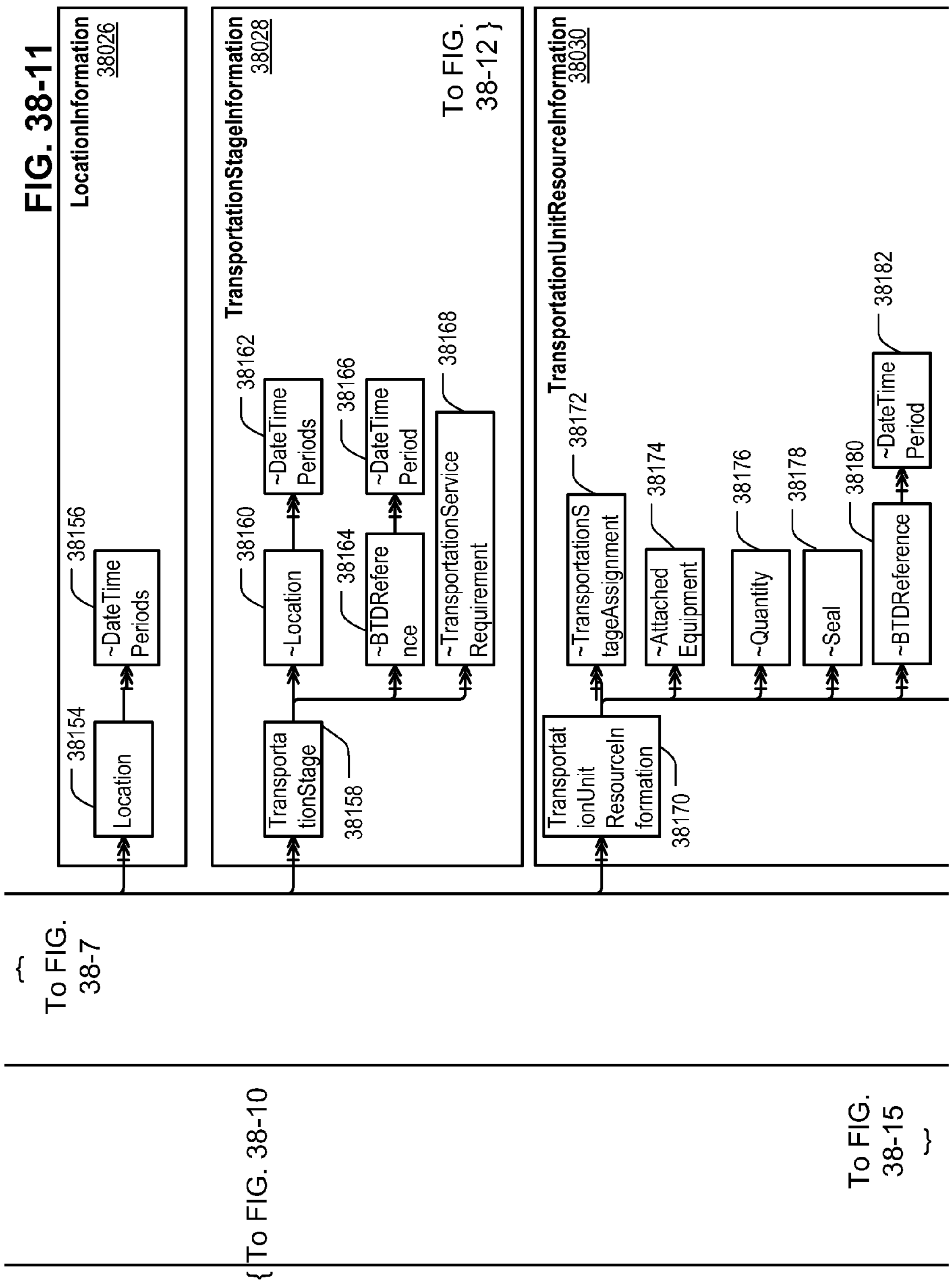
Figures 12, 38:
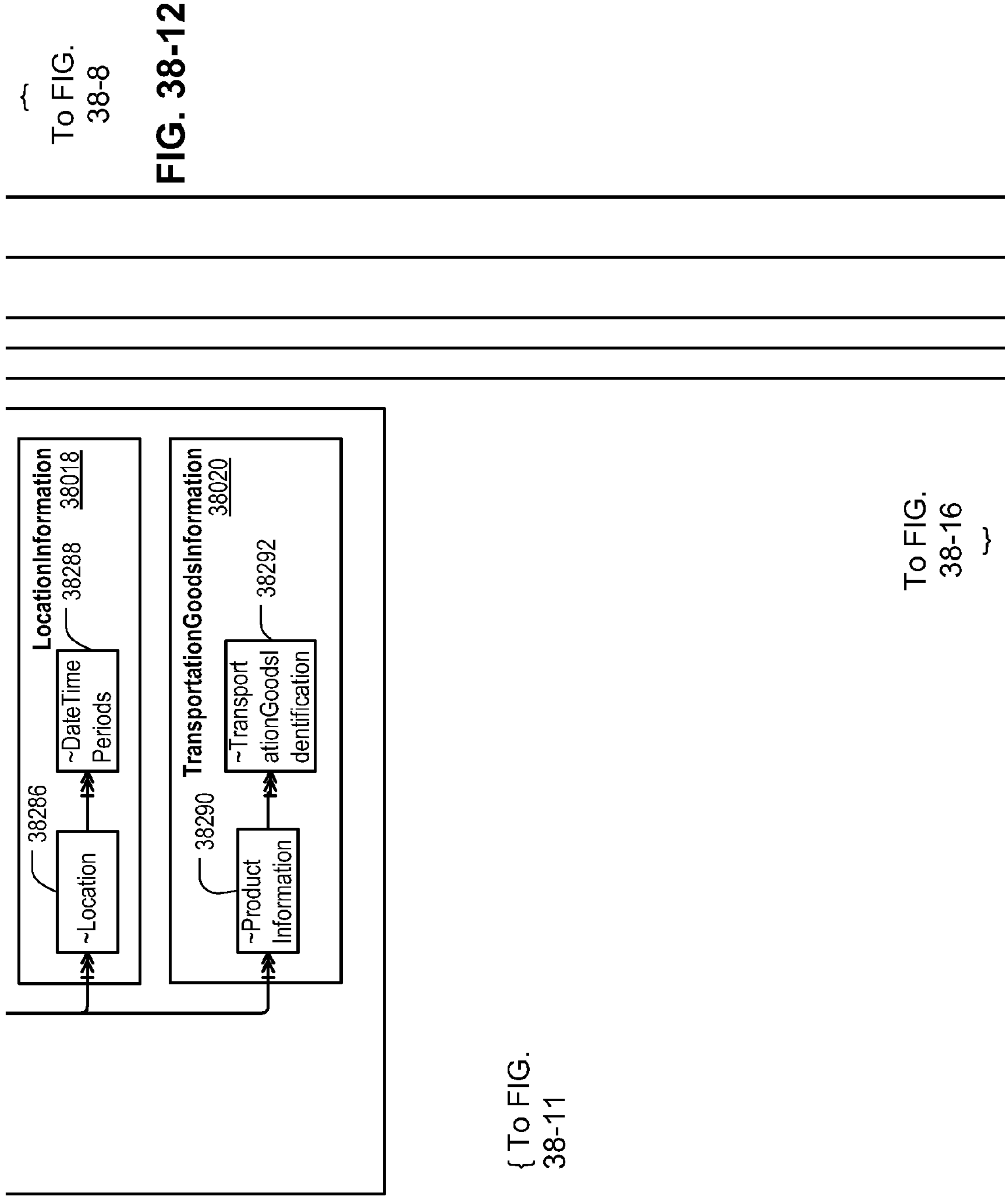
Figures 14, 38:
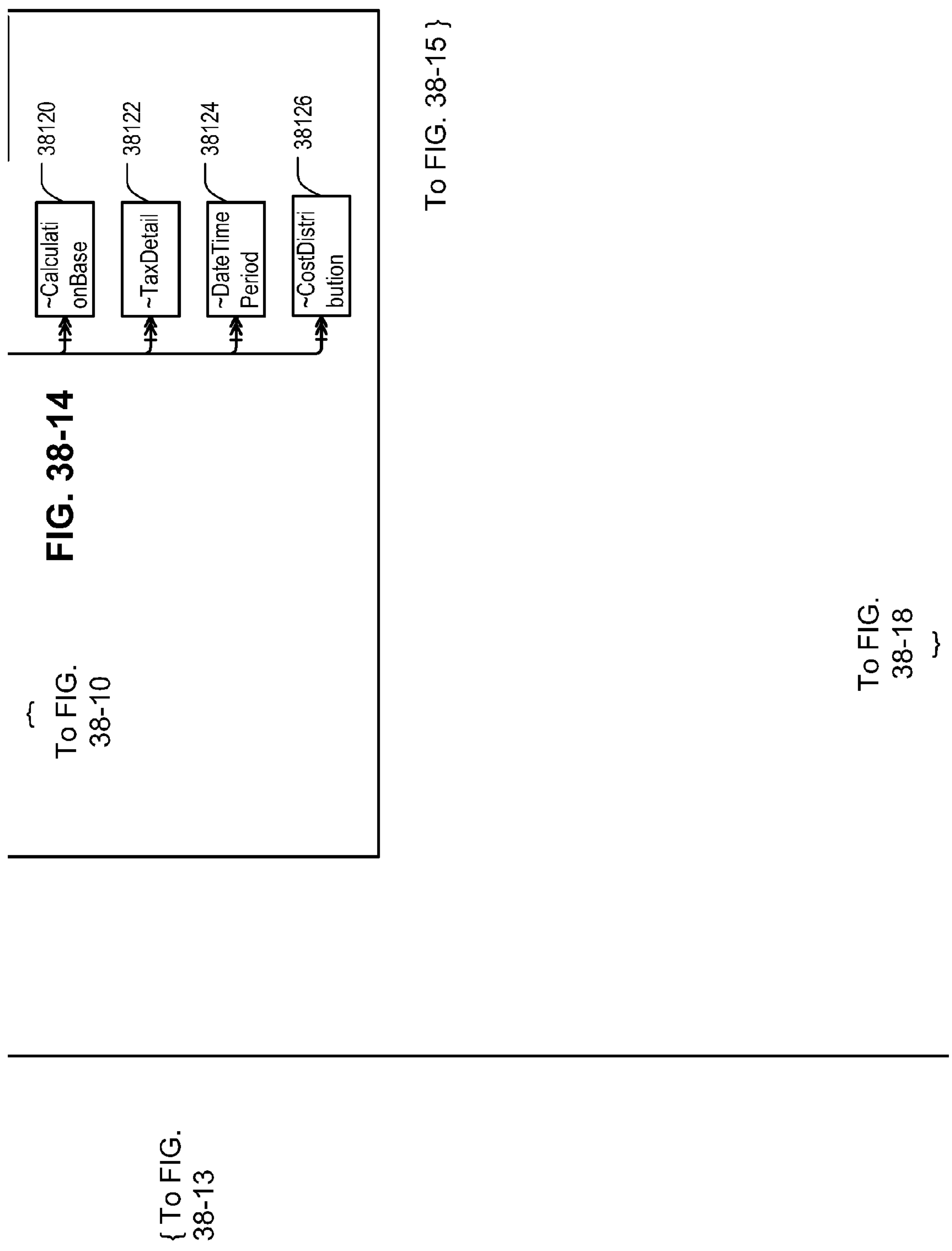
Figures 15, 38:
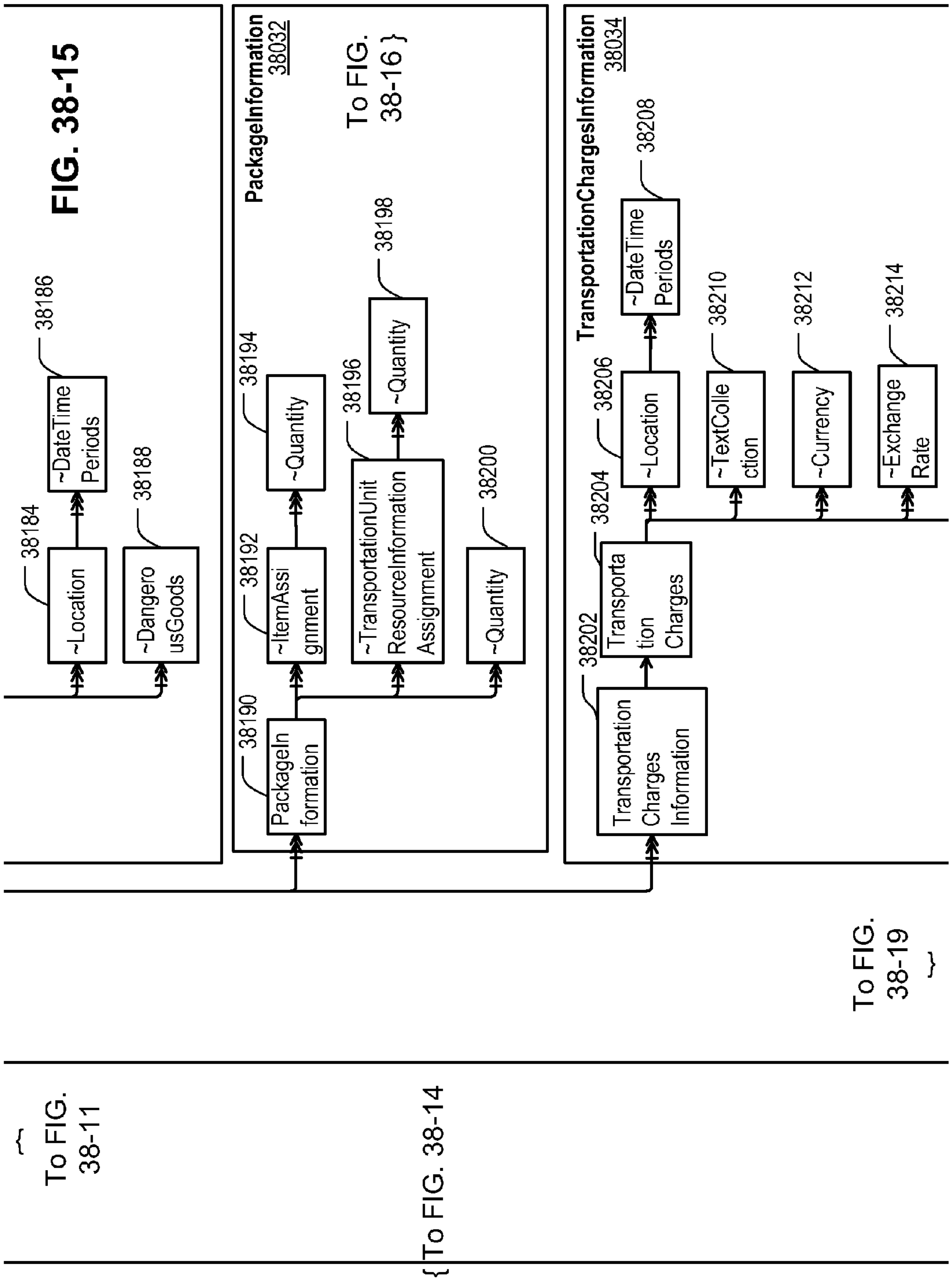
Figures 16, 38:
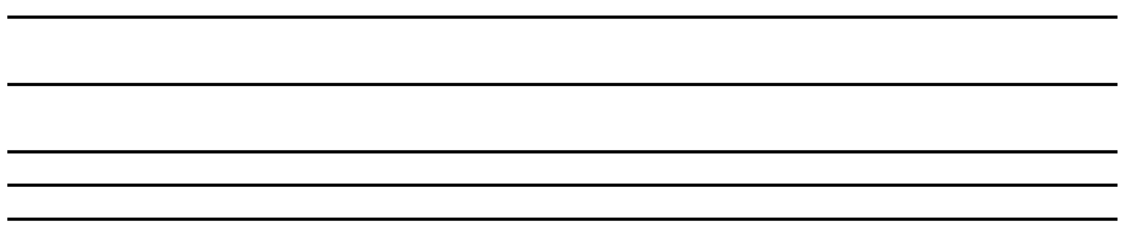
Figures 19, 38:
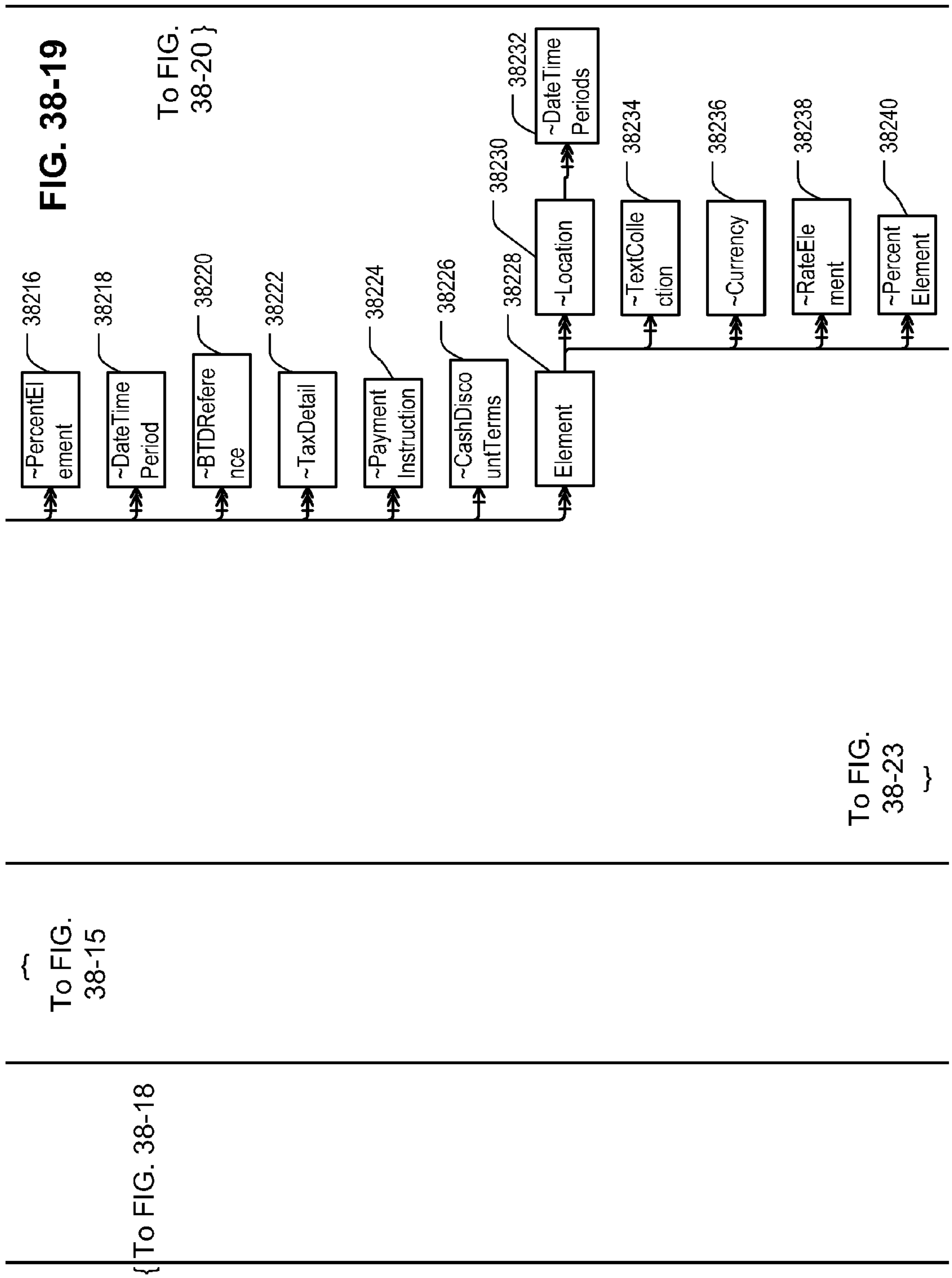
Figures 20, 38:
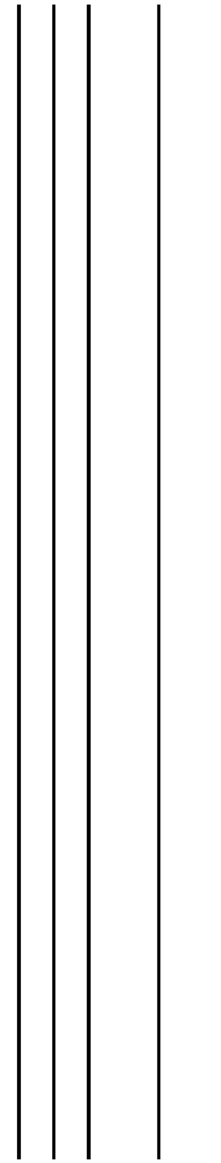
Figures 23, 38:
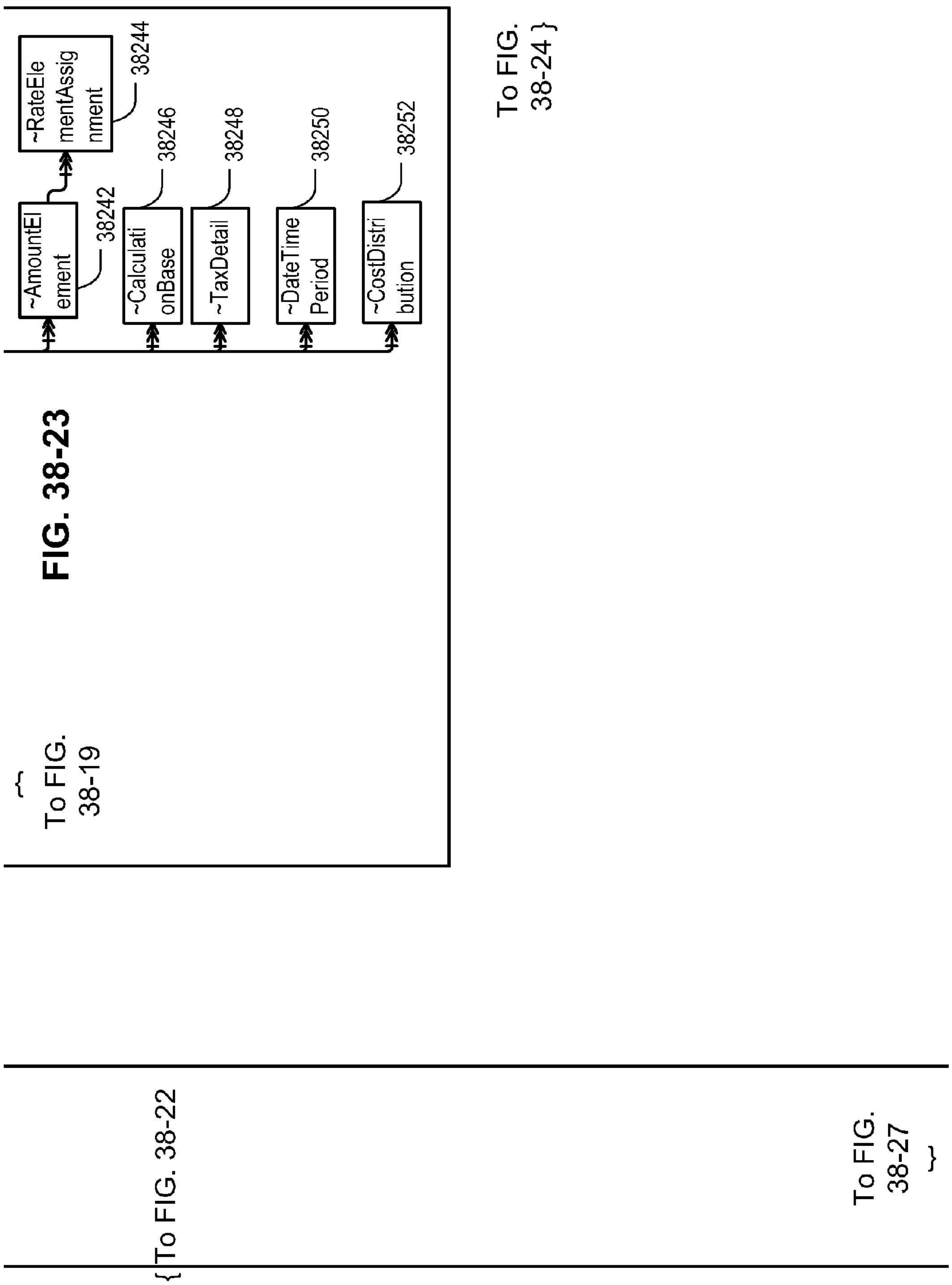
Figures 24, 38:
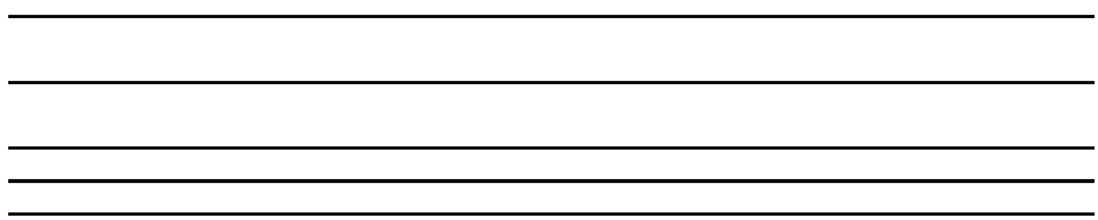
Figures 26, 38:
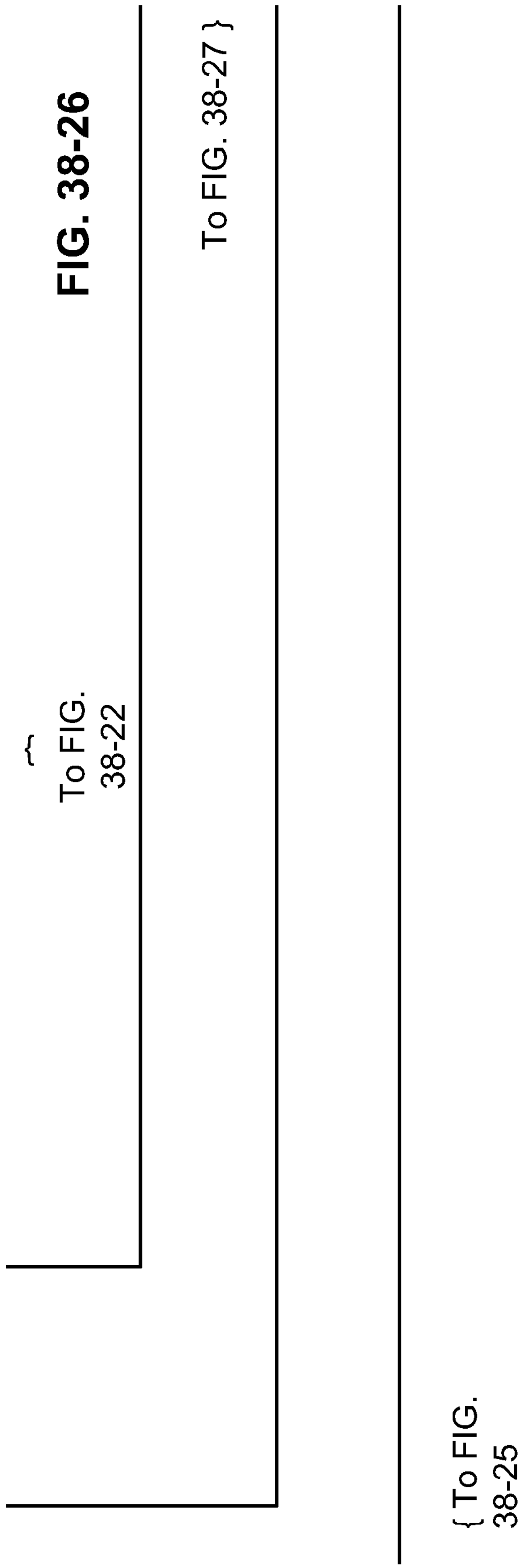
Figures 27, 38:
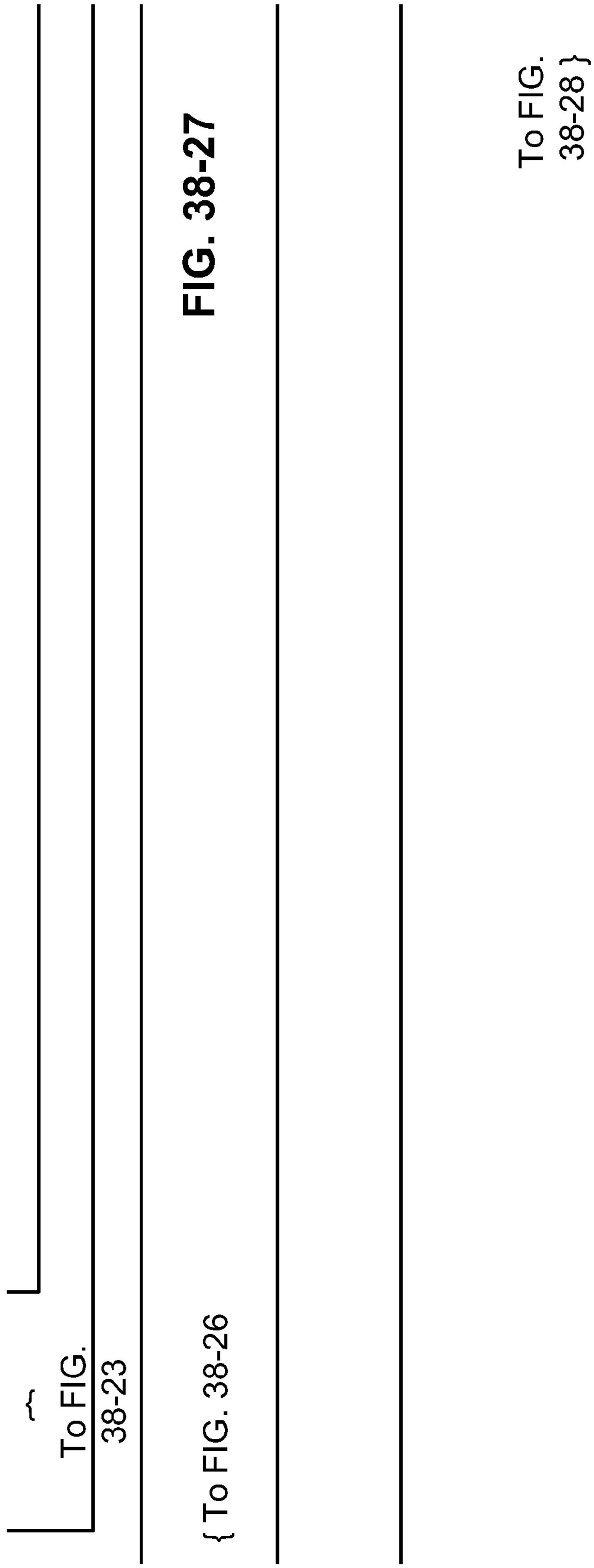
Figures 28, 38:
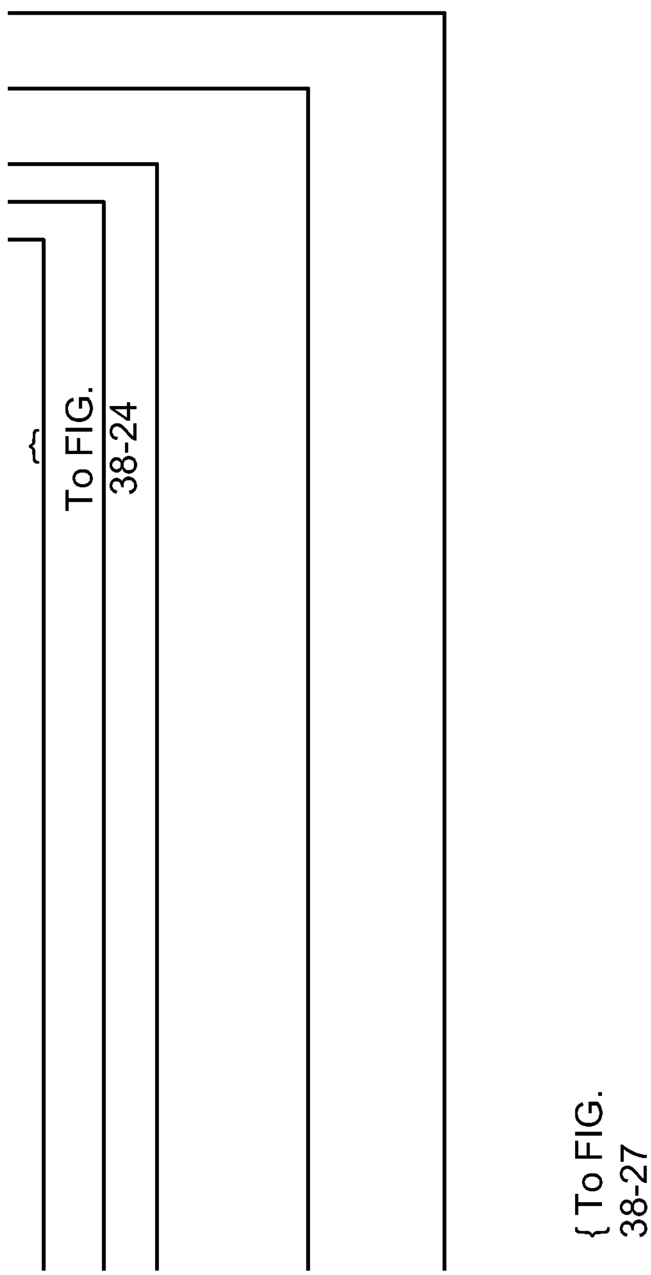

Additionally, FIGS. 38-1 through 38-28 illustrates one example logical configuration of FreightOrderInvoicingPreparationRequestMessage message 38000. Specifically, this figure depicts the arrangement and hierarchy of various components such as one or more levels of packages, entities, and datatypes, shown here as 38002 through 38292. As described above, packages may be used to represent hierarchy levels. Entities are discrete business elements that are used during a business transaction. Data types are used to type object entities and interfaces with a structure. For example, FreightOrderInvoicingPreparationRequestMessage message 38000 includes, among other things, FreightOrderInvoicingPreparationMessage 38050. Accordingly, heterogeneous applications may communicate using this consistent message configured as such.

Figure 39:
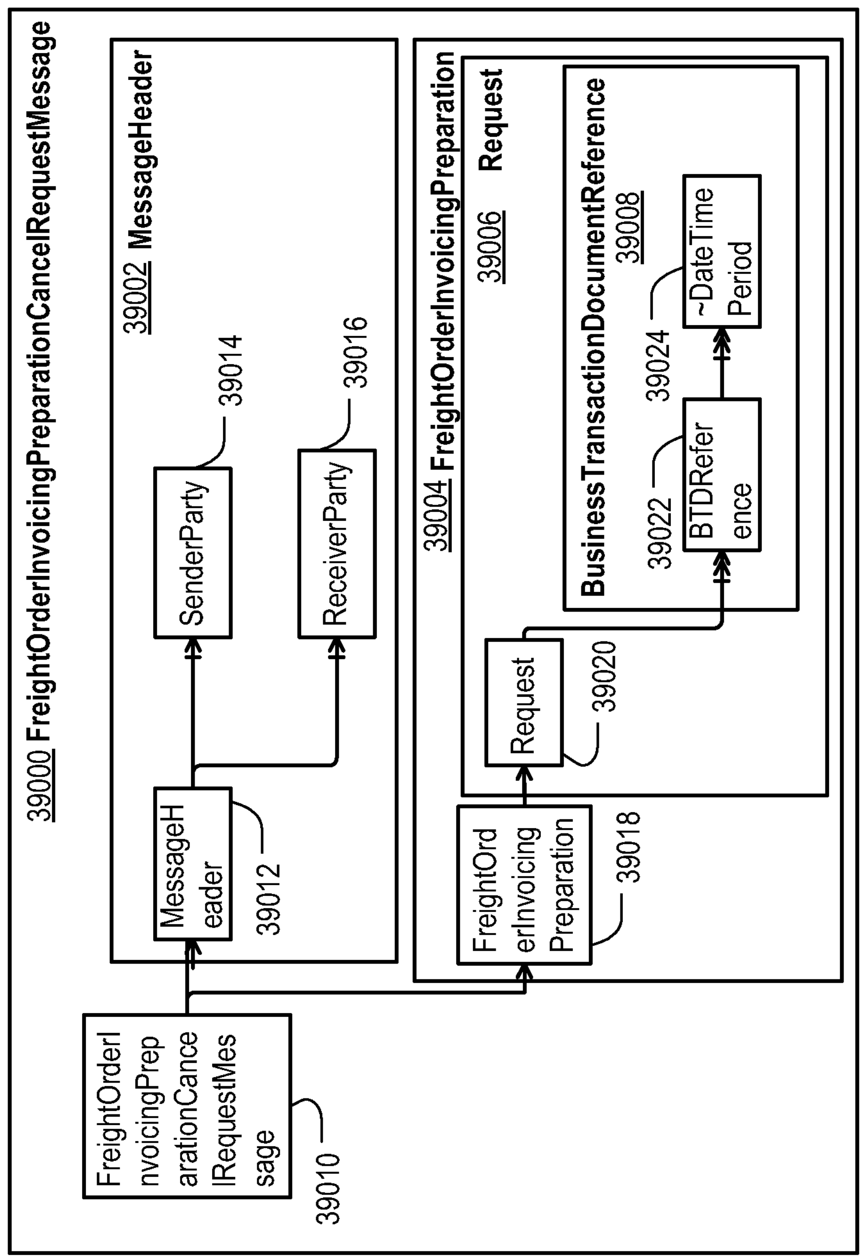
FIG. 39 shows an exemplary FreightOrderInvoicingPreparationCancelRequest Message Data Type.

Additionally, FIG. 39 illustrates one example logical configuration of FreightOrderInvoicingPreparationCancelRequestMessage message 39000. Specifically, this figure depicts the arrangement and hierarchy of various components such as one or more levels of packages, entities, and datatypes, shown here as 39002 through 39024. As described above, packages may be used to represent hierarchy levels. Entities are discrete business elements that are used during a business transaction. Data types are used to type object entities and interfaces with a structure. For example, FreightOrderInvoicingPreparationCancelRequestMessage message 39000 includes, among other things, FreightOrderInvoicingPreparation 39018. Accordingly, heterogeneous applications may communicate using this consistent message configured as such.

Figure 40:
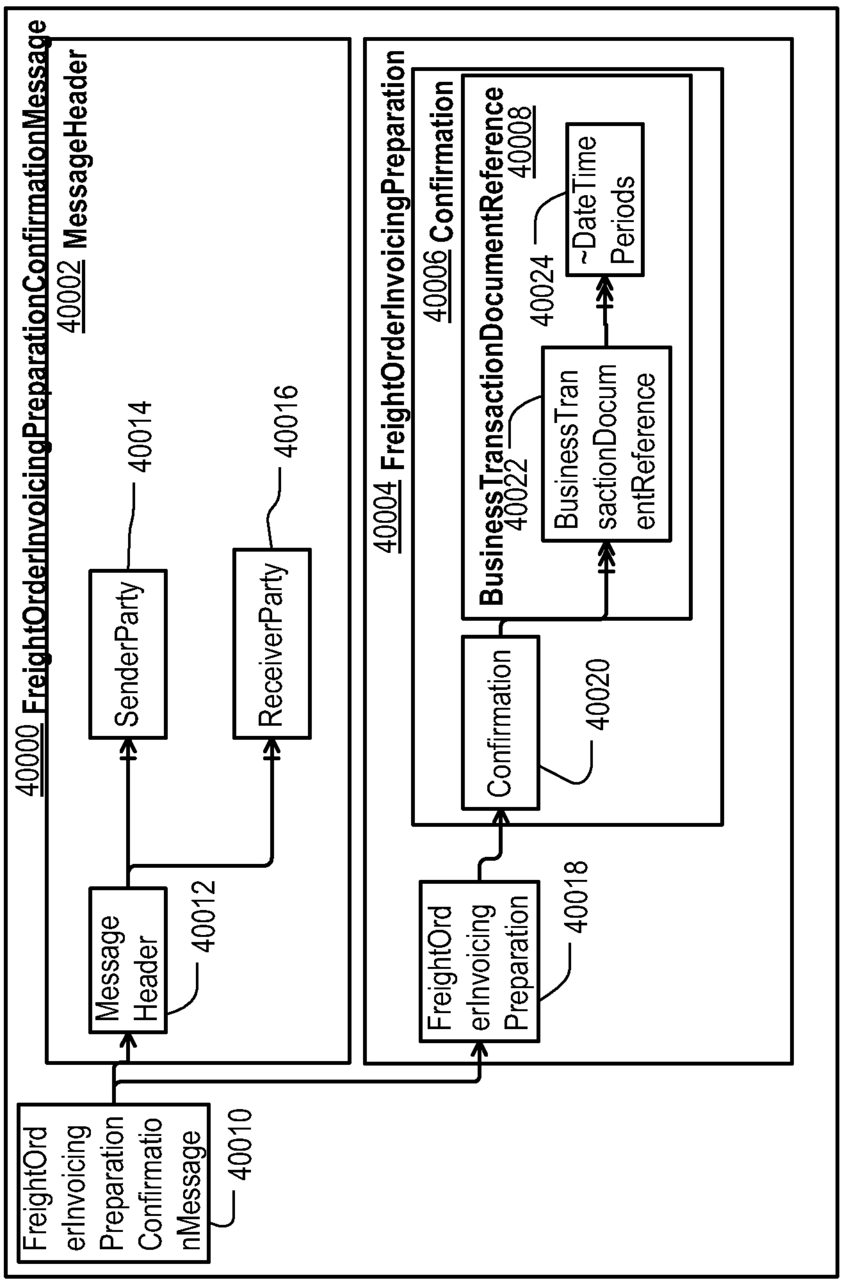
FIG. 40 shows an exemplary FreightOrderInvoicingPreparationConfirmationMessage Message Data Type.

Additionally, FIG. 40 illustrates one example logical configuration of FreightOrderInvoicingPreparationConfirmationMessage message 40000. Specifically, this figure depicts the arrangement and hierarchy of various components such as one or more levels of packages, entities, and datatypes, shown here as 40002 through 40024. As described above, packages may be used to represent hierarchy levels. Entities are discrete business elements that are used during a business transaction. Data types are used to type object entities and interfaces with a structure. For example, FreightOrderInvoicingPreparationConfirmationMessage message 40000 includes, among other things, FreightOrderInvoicingPreparation 40018. Accordingly, heterogeneous applications may communicate using this consistent message configured as such.

FIGS. 41-1 through 41-115 illustrate one example logical configuration of a FreightOrderInvoicingPreparationRequestMessage 410000 element structure. Specifically, these figures depict the arrangement and hierarchy of various components such as one or more levels of packages, entities, and datatypes, shown here as 410000 through 412936. As described above, packages may be used to represent hierarchy levels. Entities are discrete business elements that are used during a business transaction. Data types are used to type object entities and interfaces with a structure. For example, the FreightOrderInvoicingPreparationRequestMessage 410000 includes, among other things, a FreightOrderInvoicingPreparationRequestMessage entity 410002. Accordingly, heterogeneous applications may communicate using this consistent message configured as such.

Figures 3, 34:
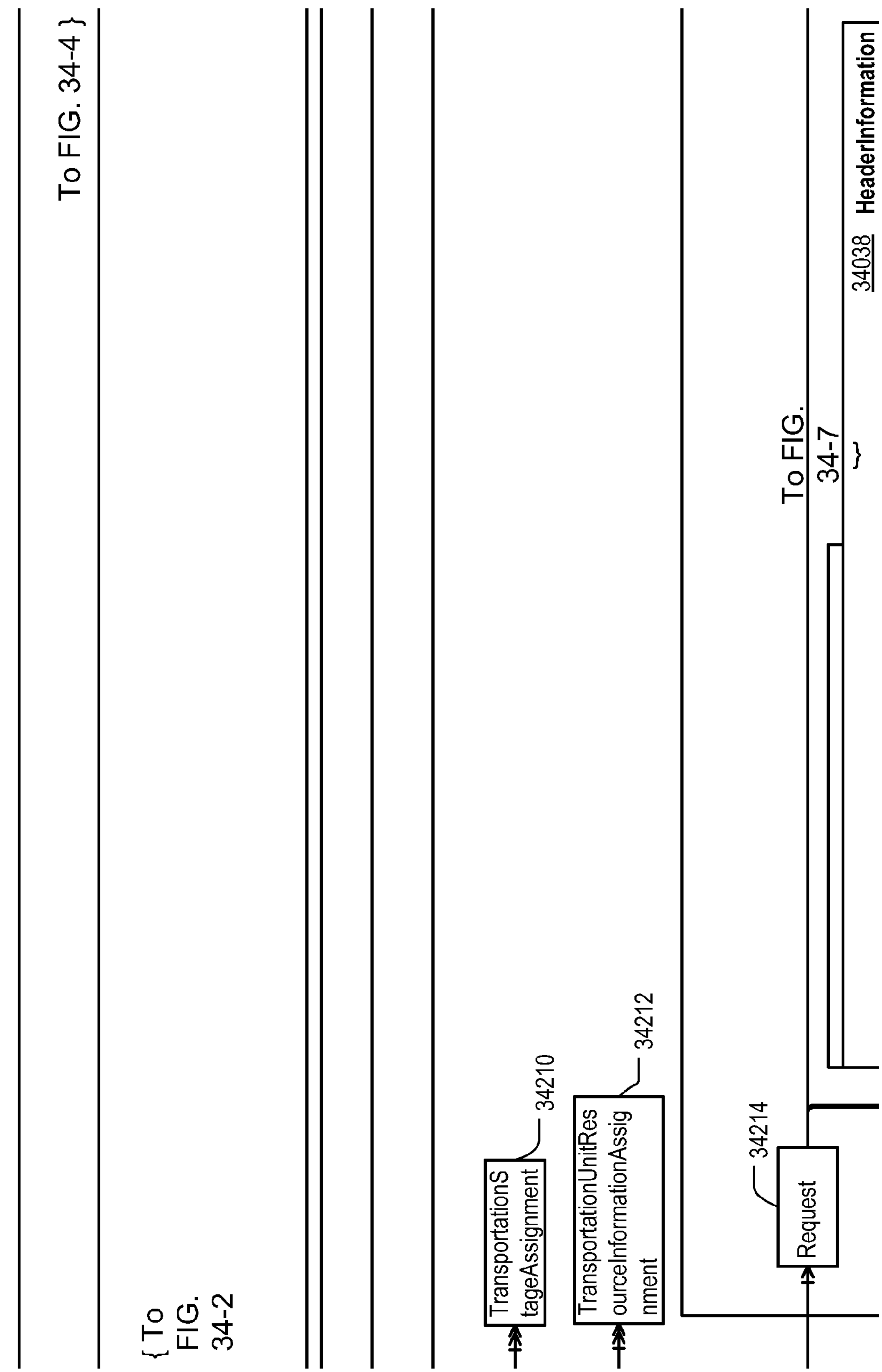
Figures 4, 34:
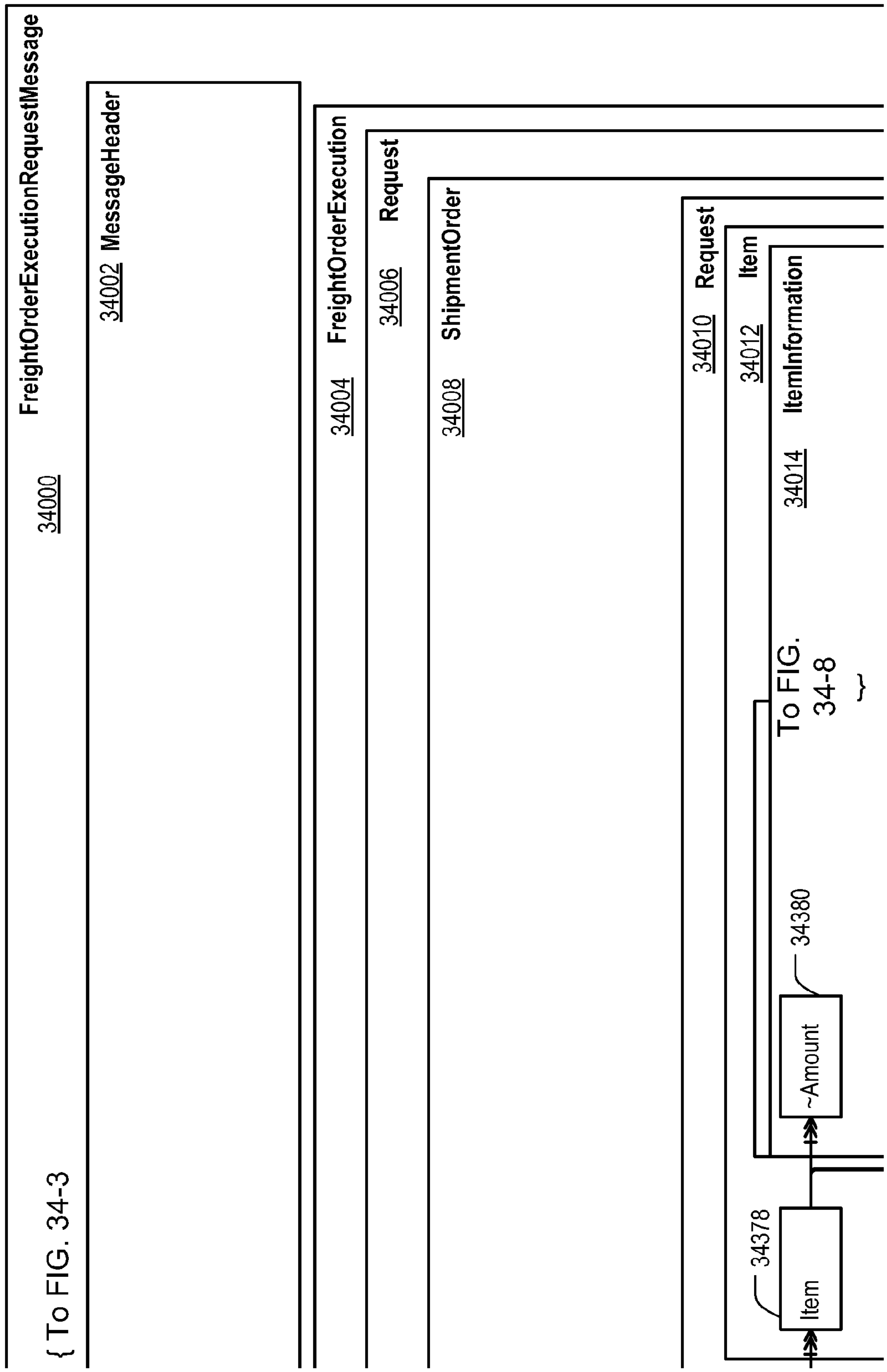
Figures 6, 34:
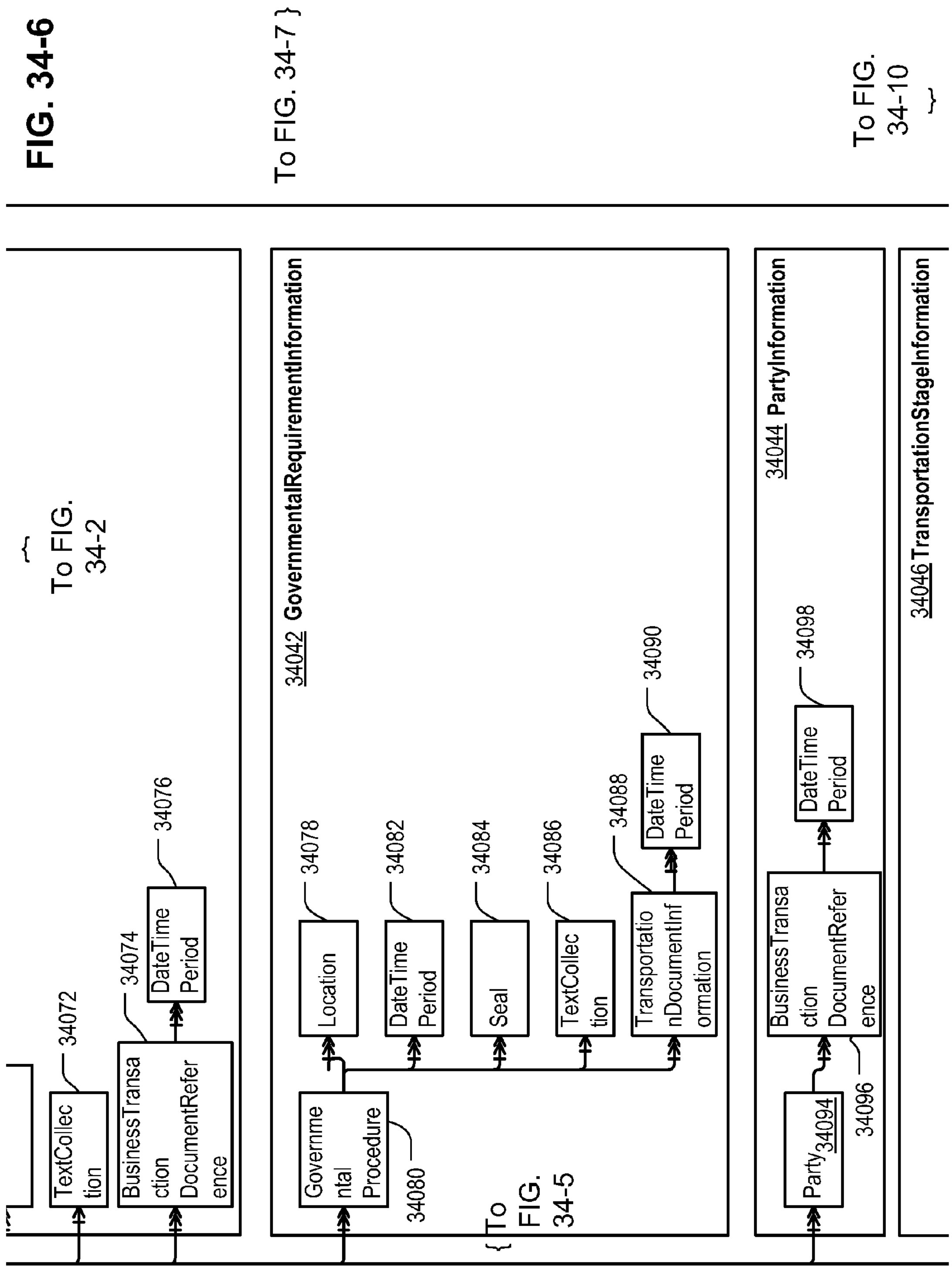
Figures 7, 34:
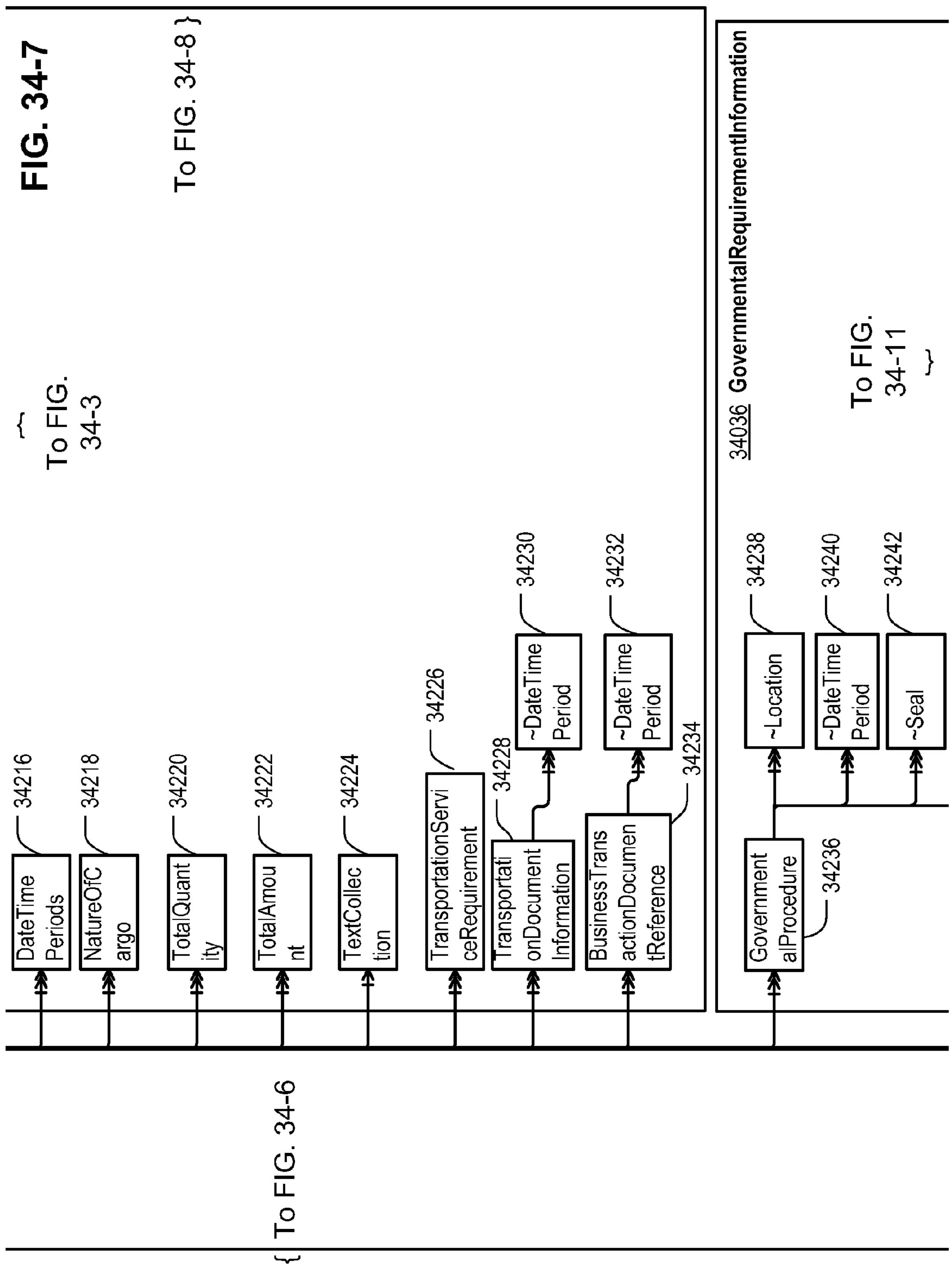
Figures 8, 34:
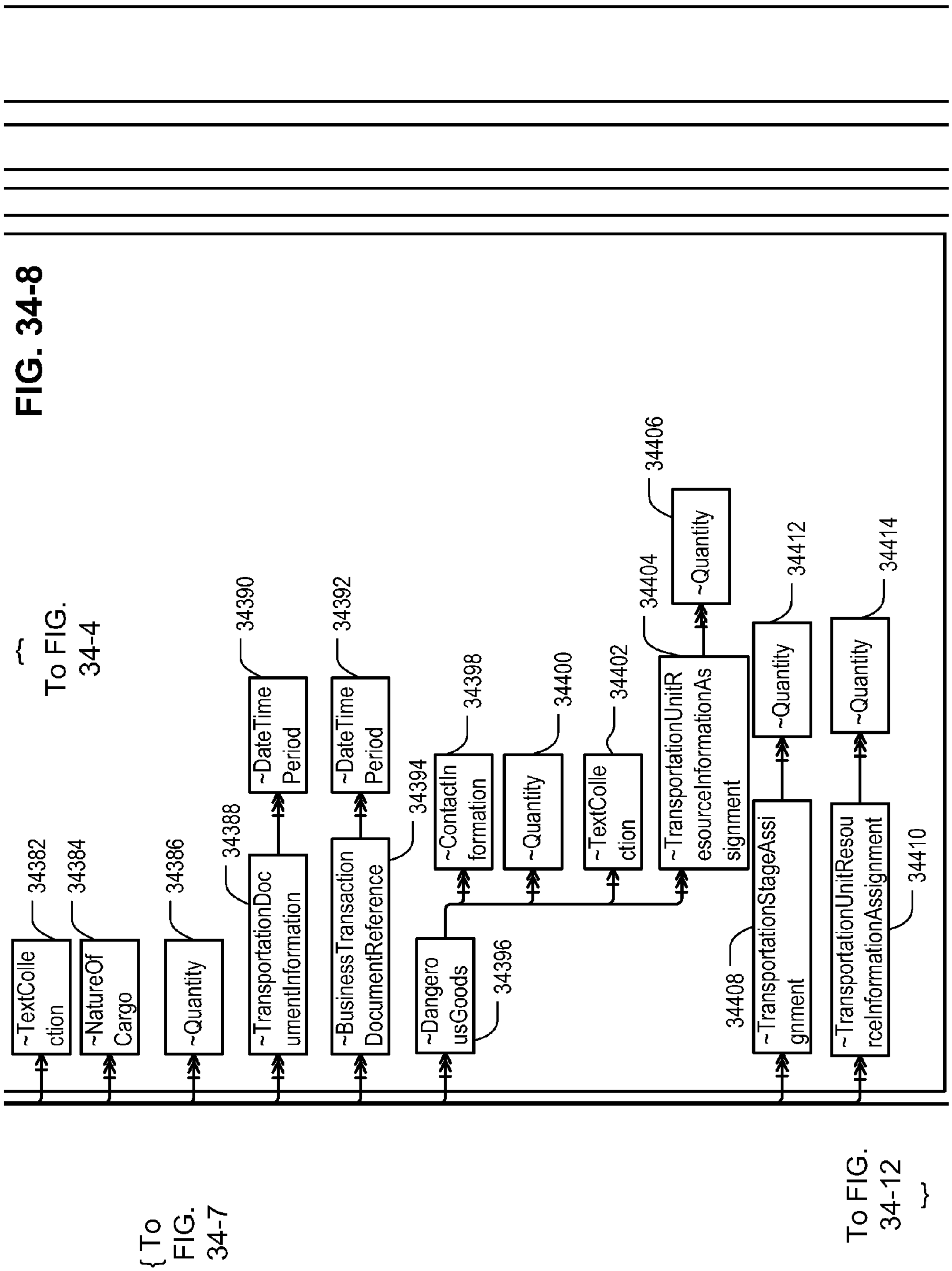
Figures 10, 34:
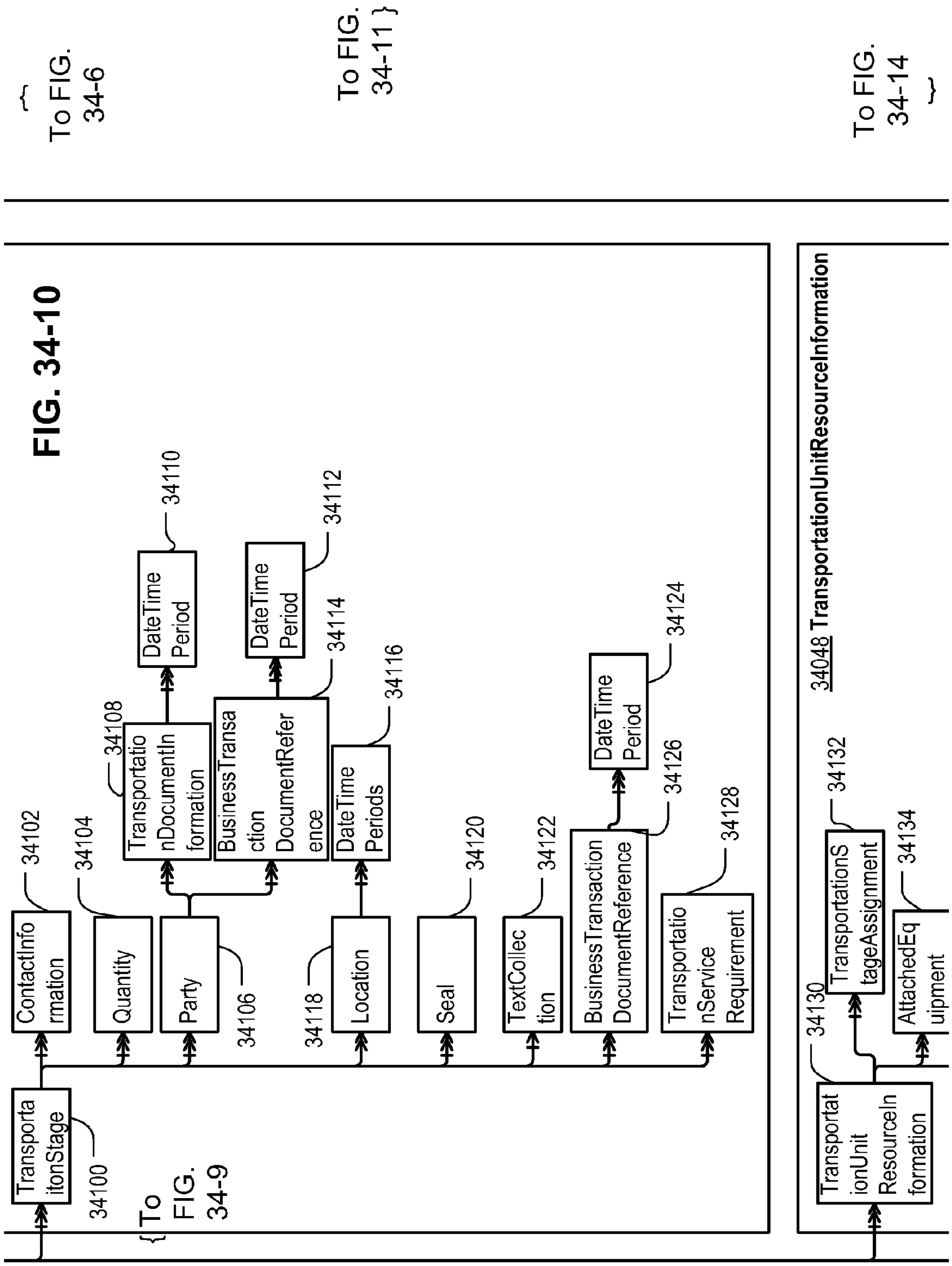
Figures 11, 34:
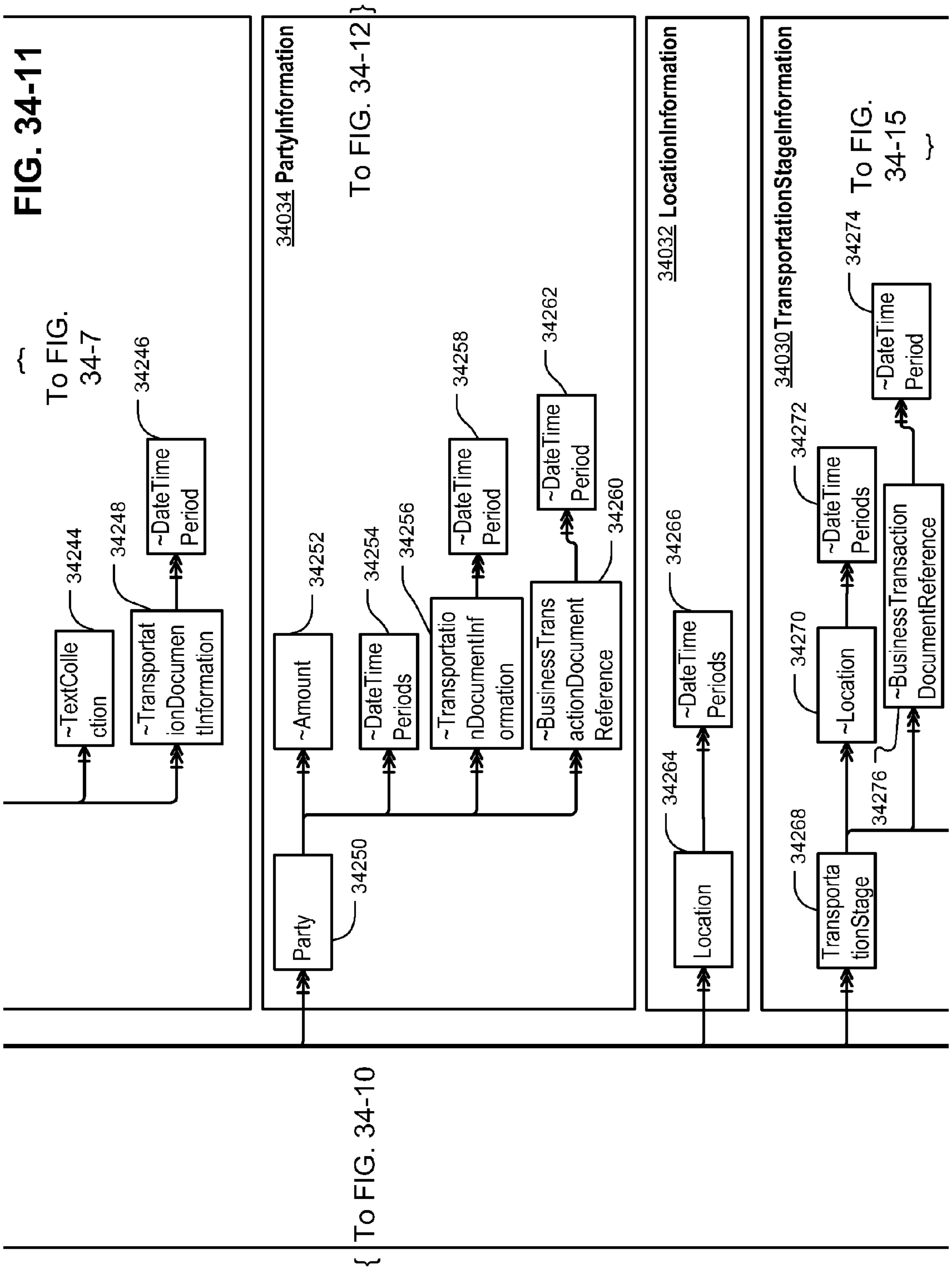
Figures 12, 34:
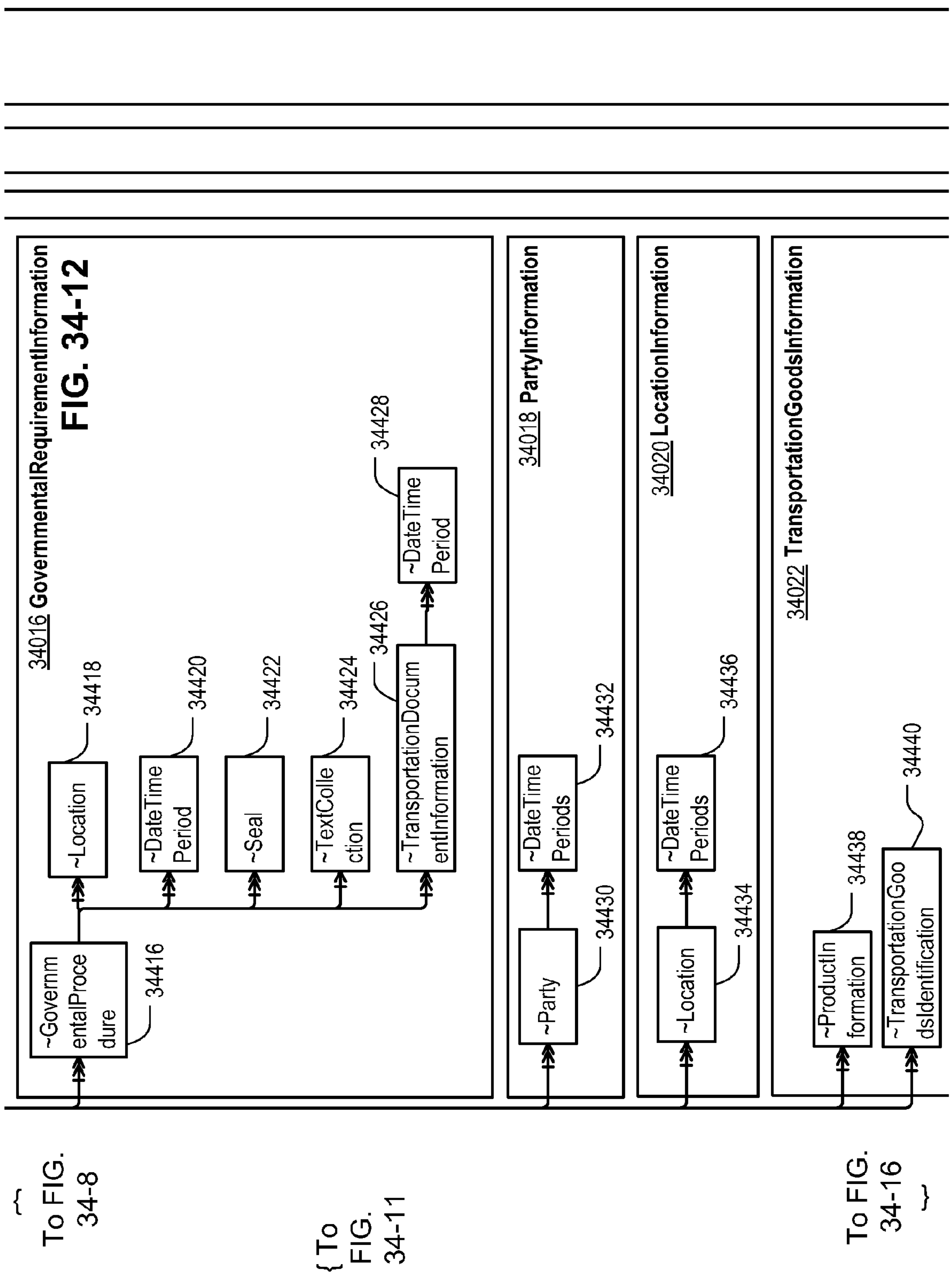
Figures 14, 34:
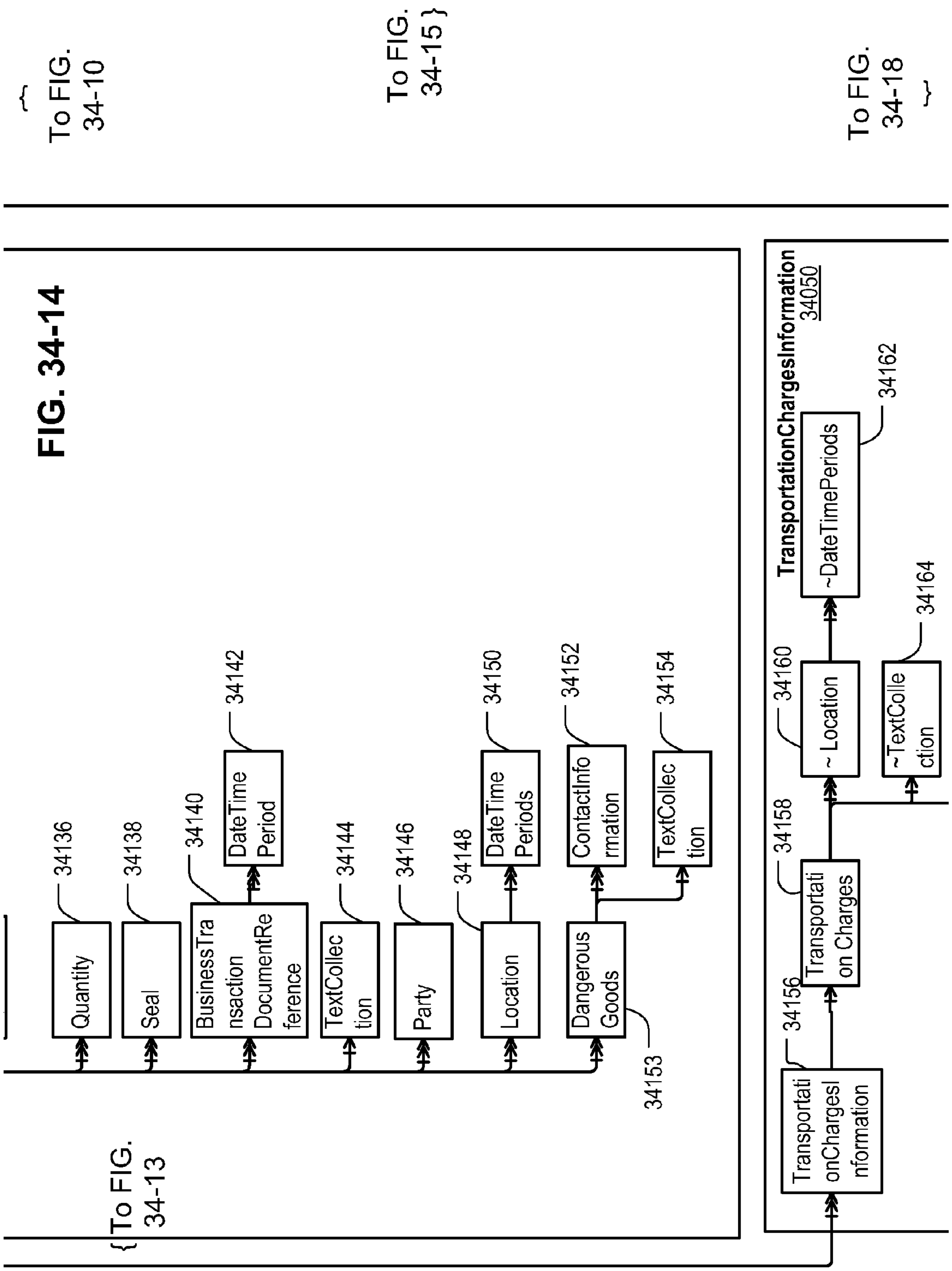
Figures 15, 34:
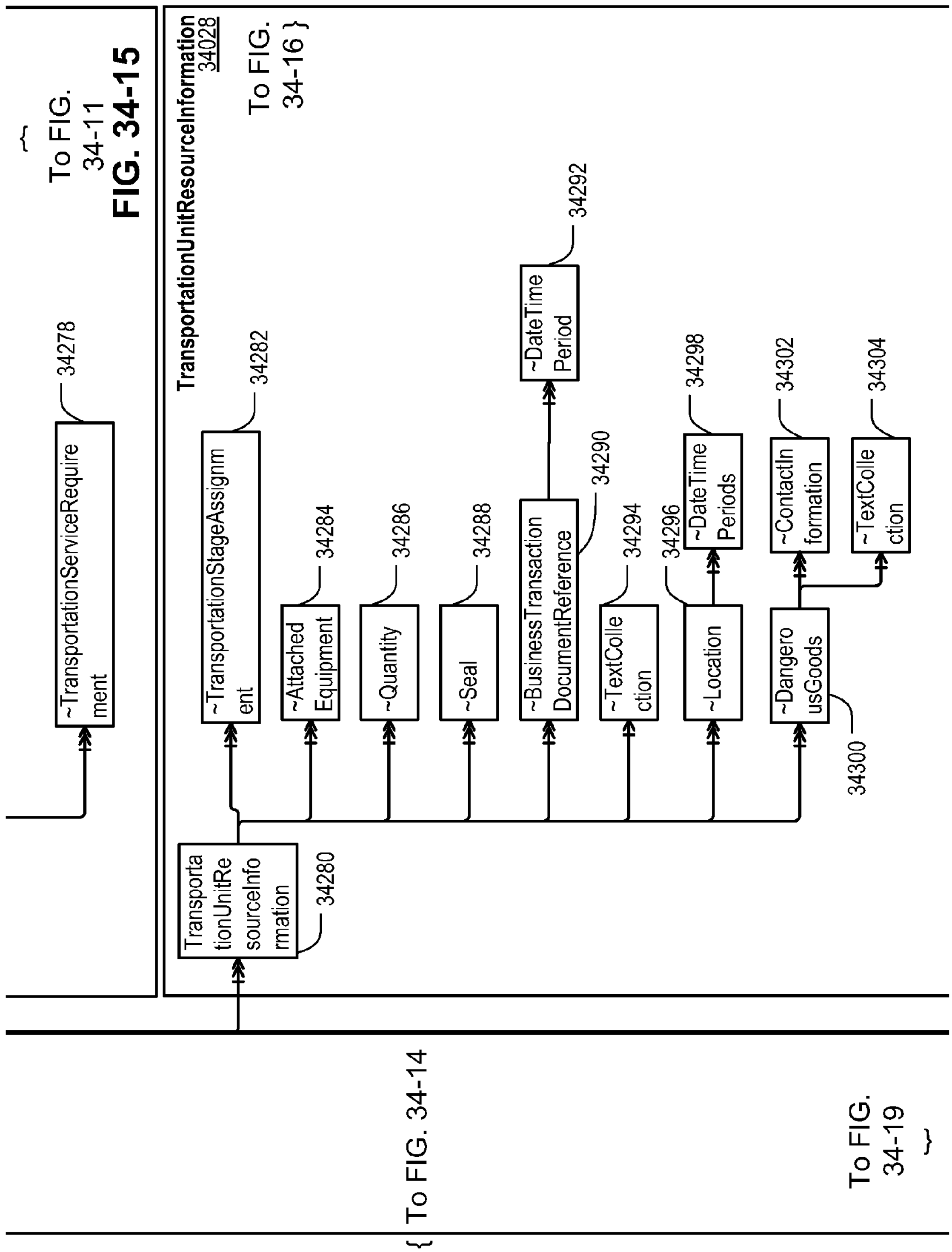
Figures 16, 34:
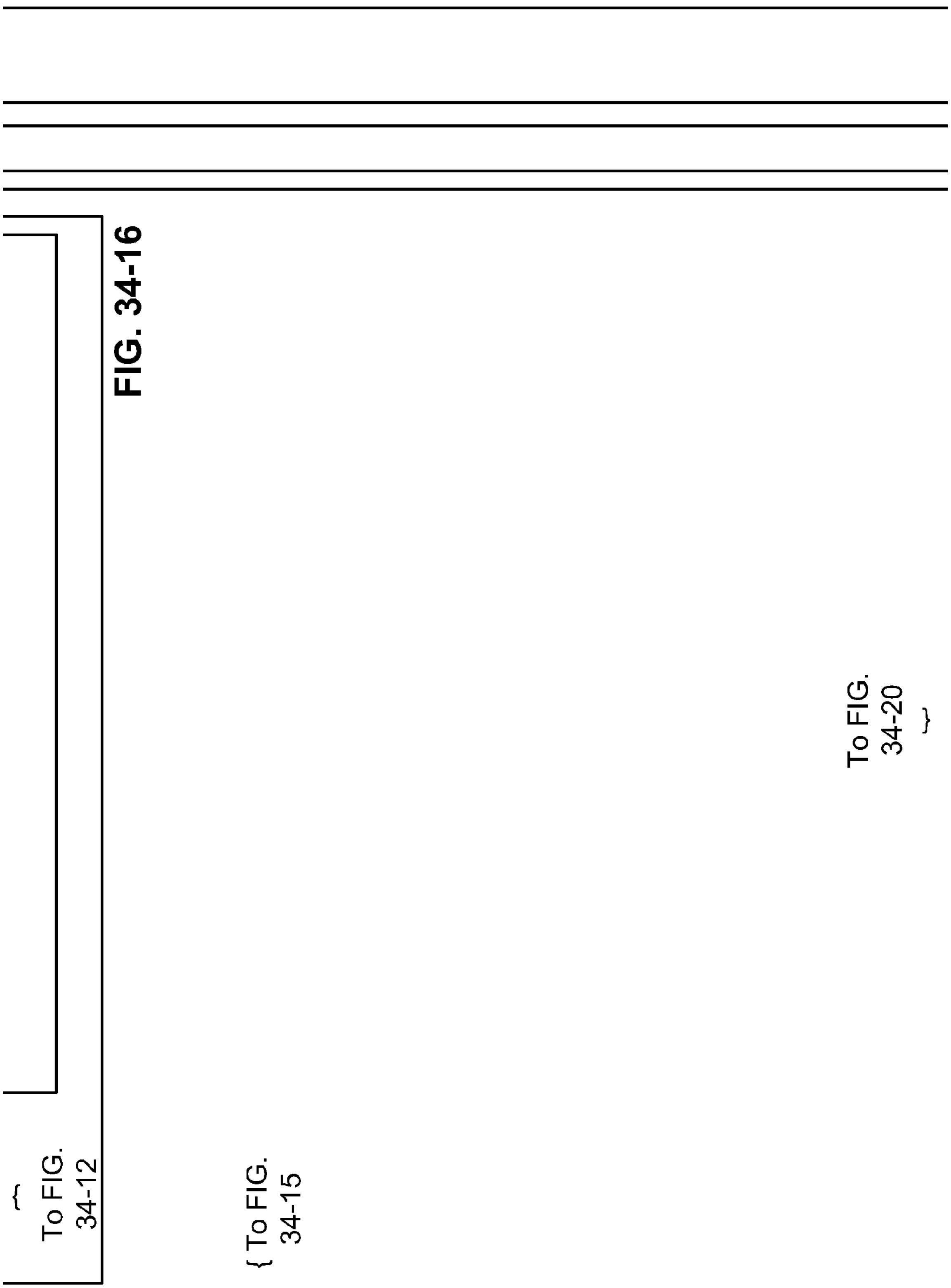
Figures 18, 34:
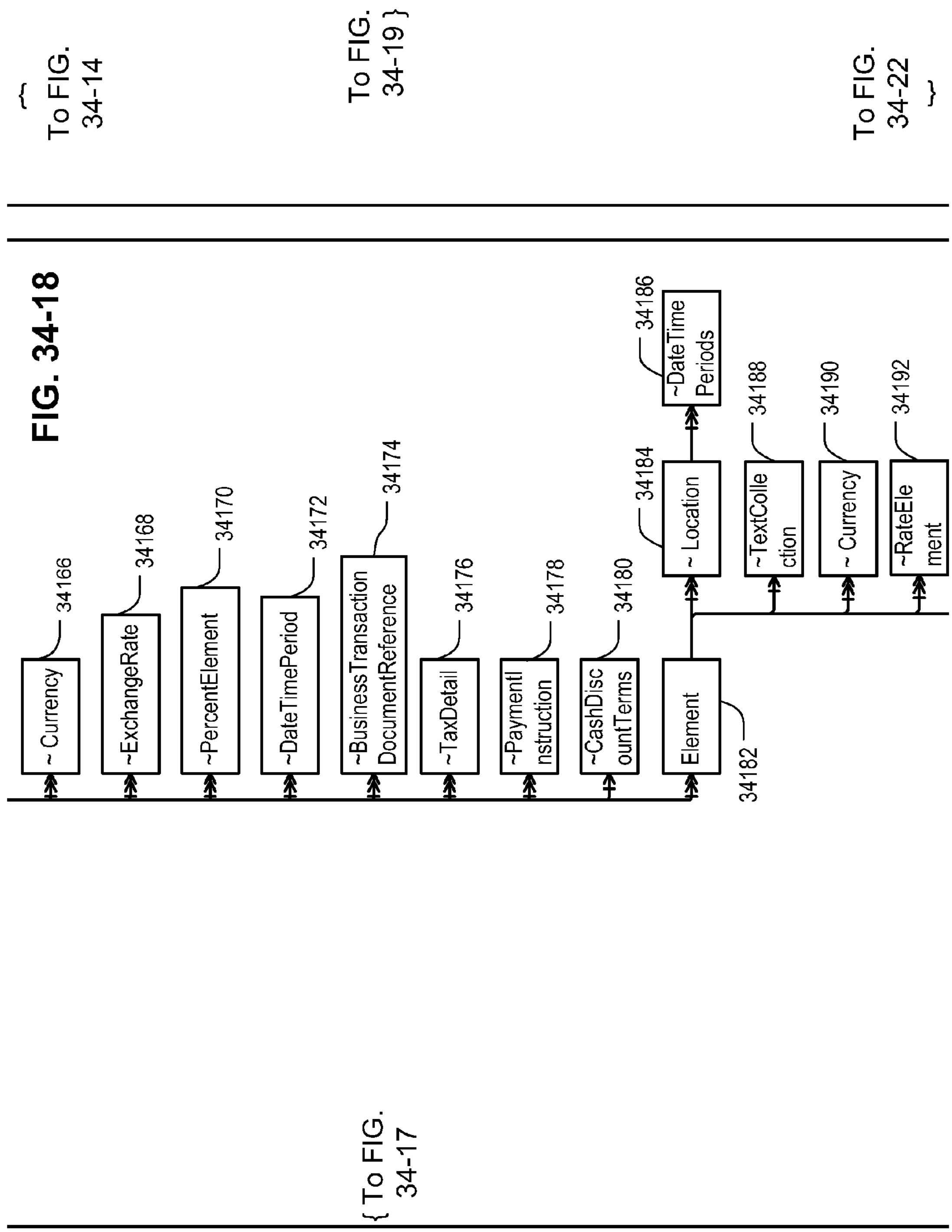
Figures 19, 34:
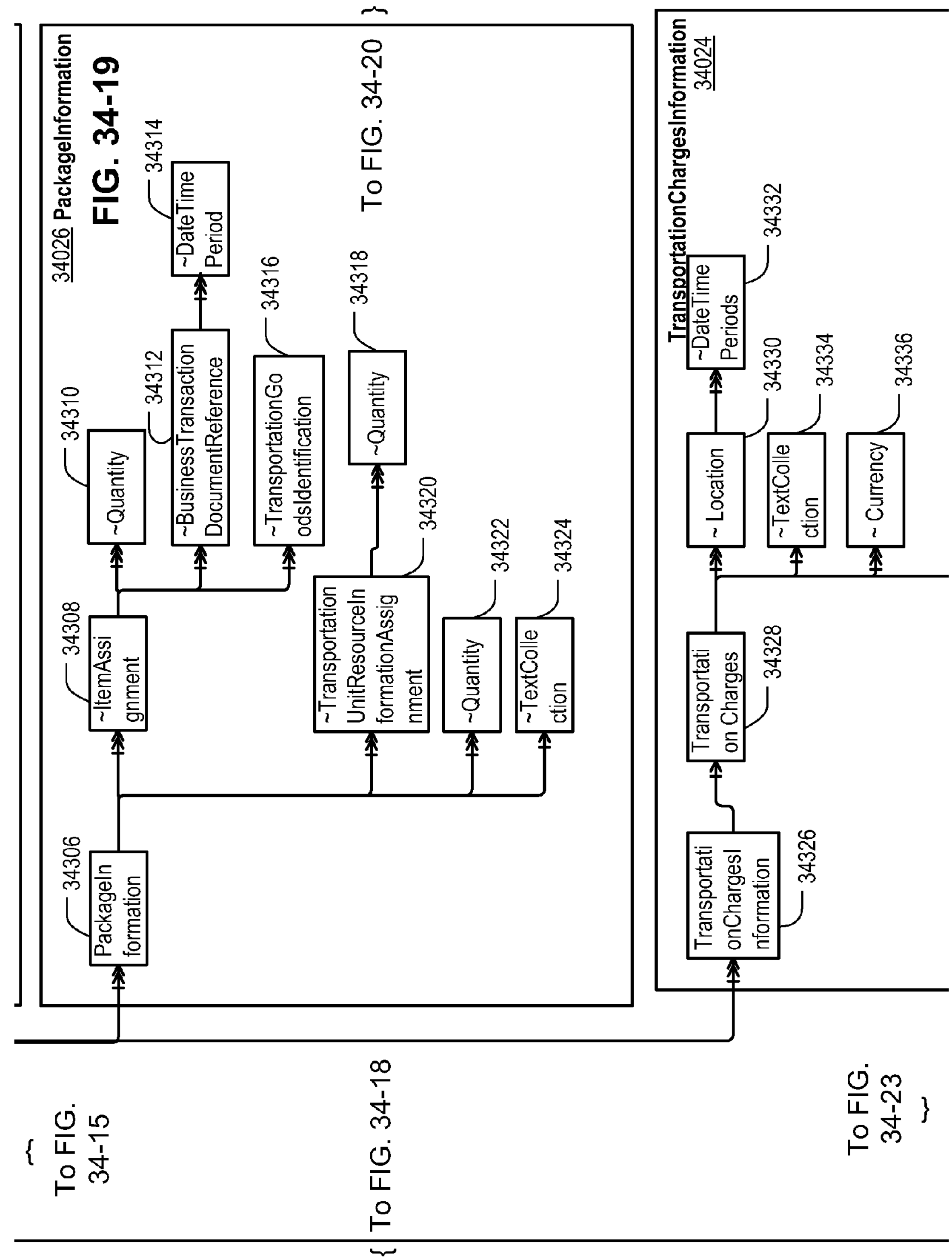
Figures 22, 34:
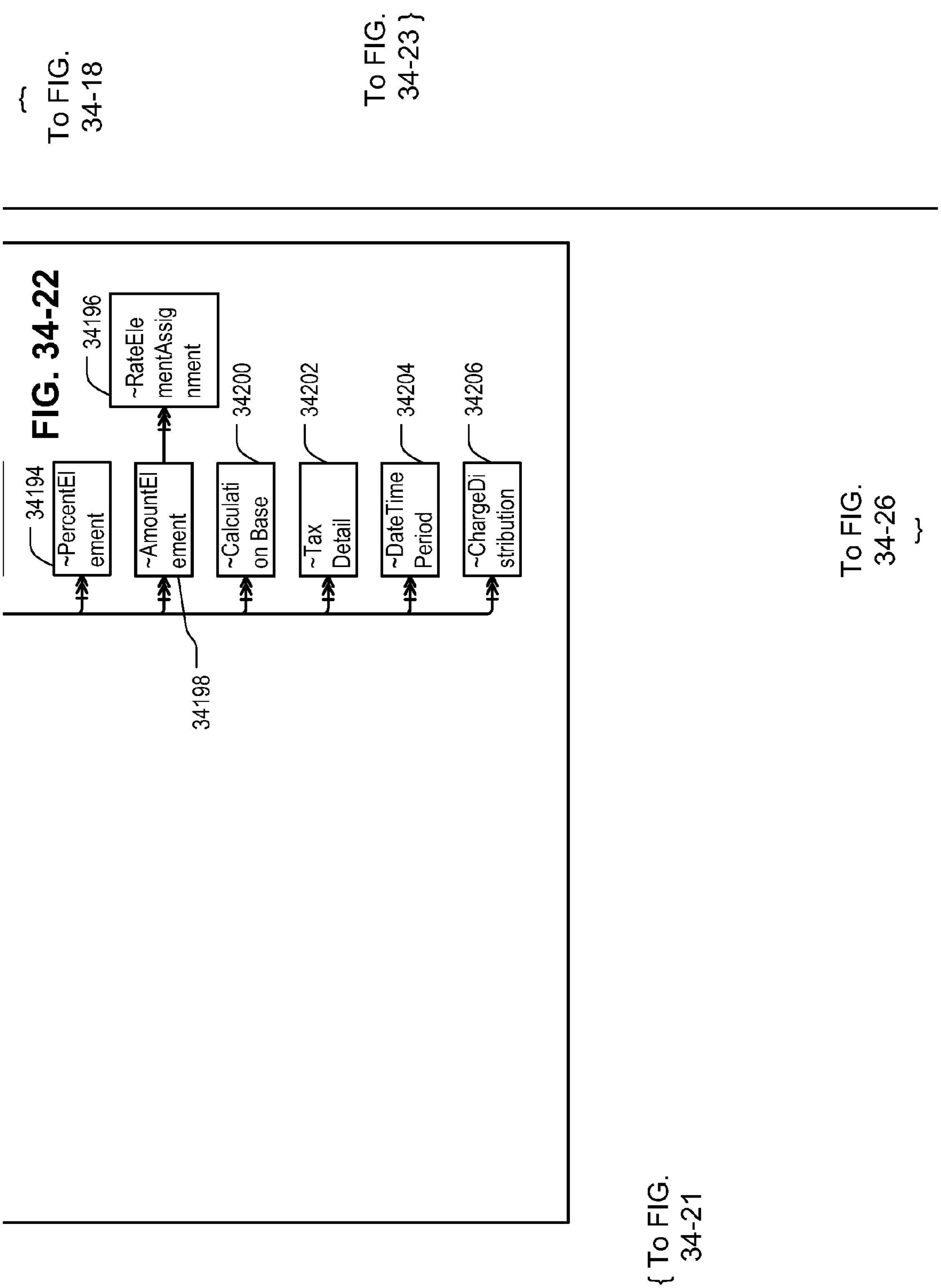
Figures 23, 34:
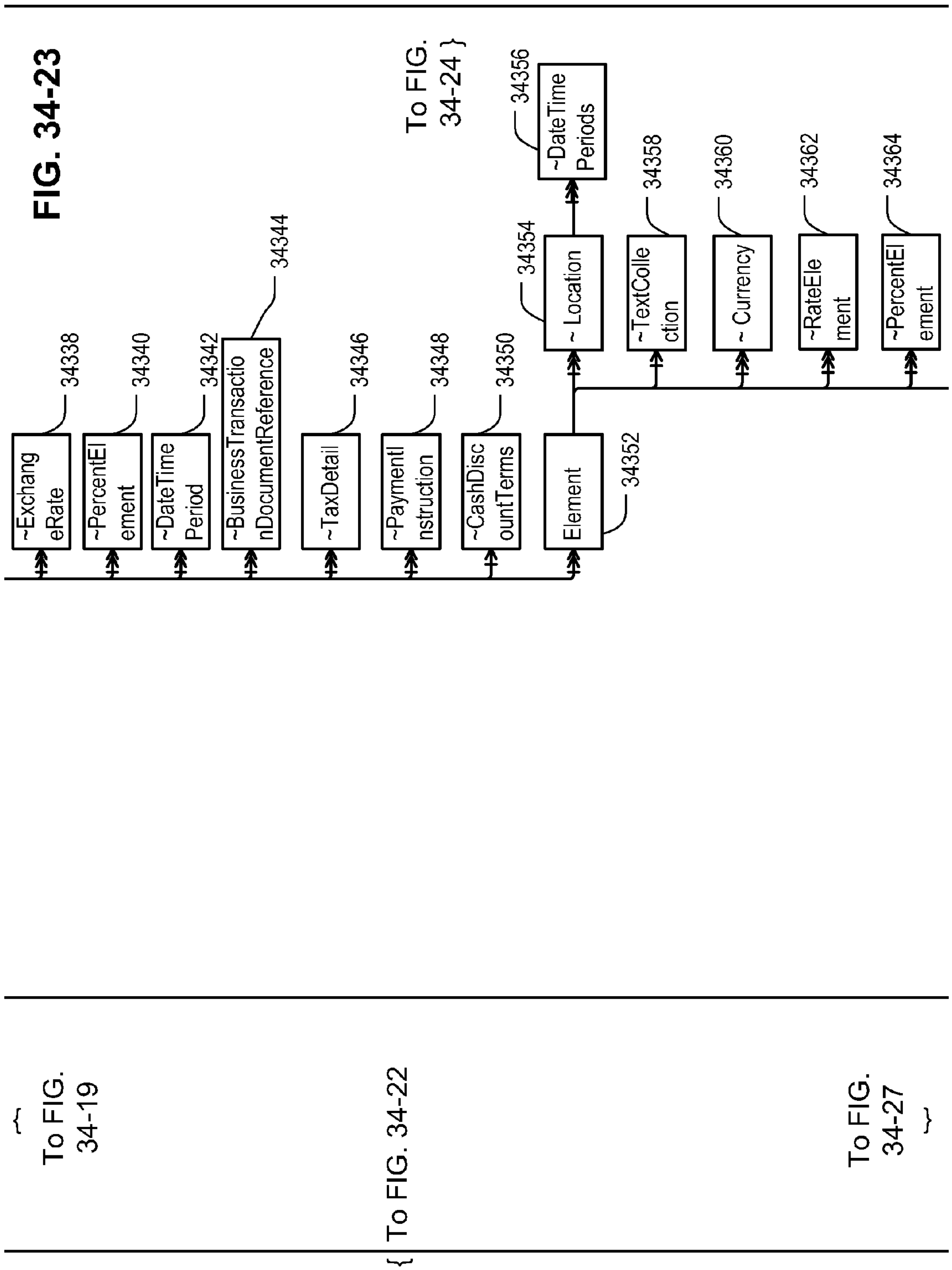
Figures 25, 34:
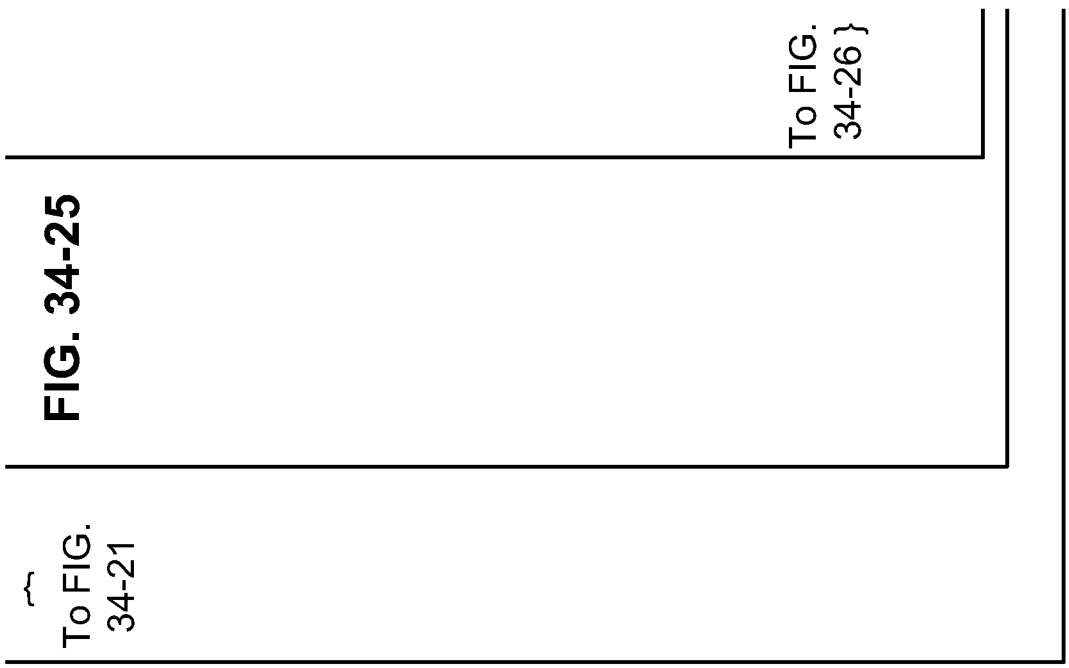
Figures 27, 34:
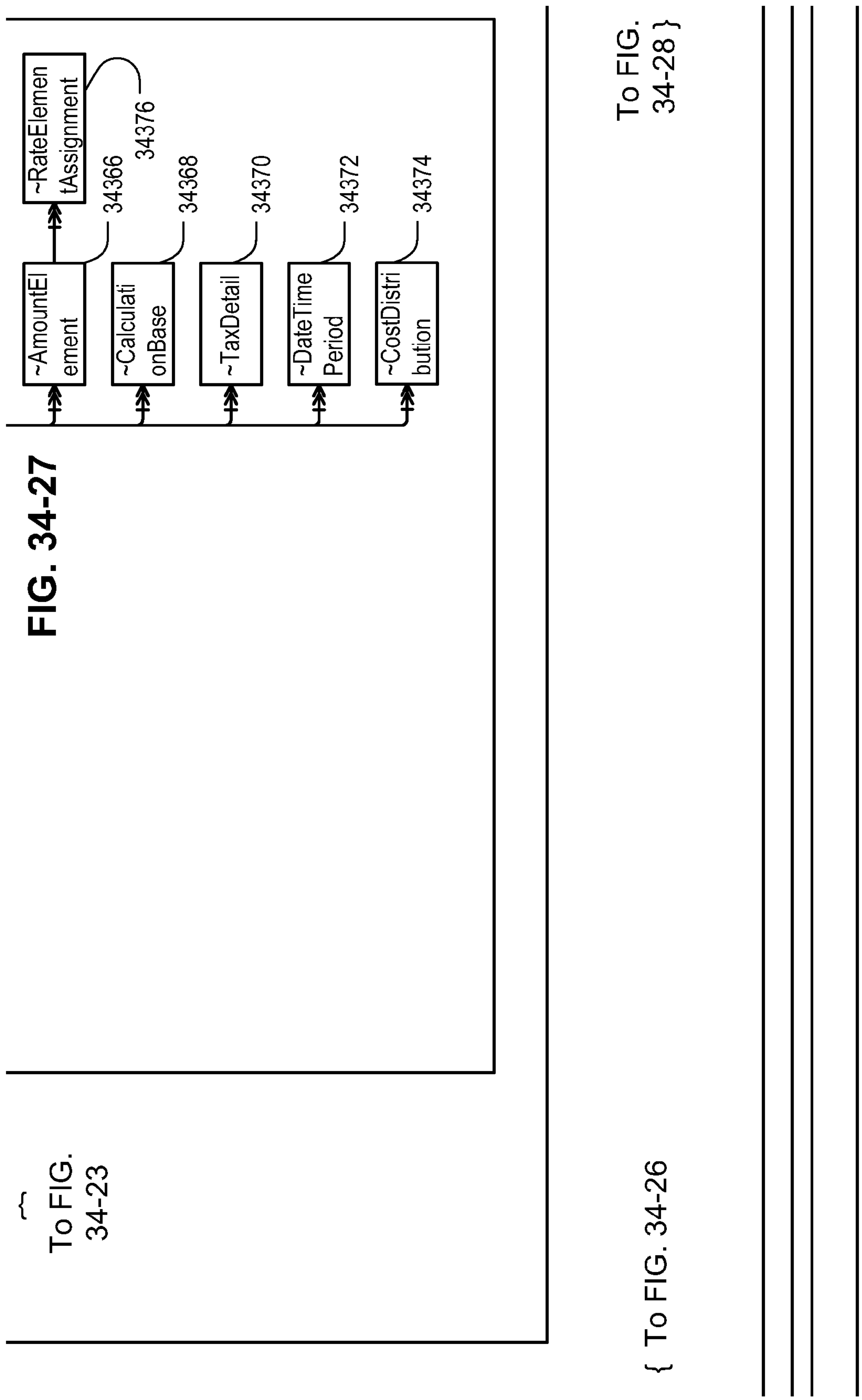
Figures 28, 34:
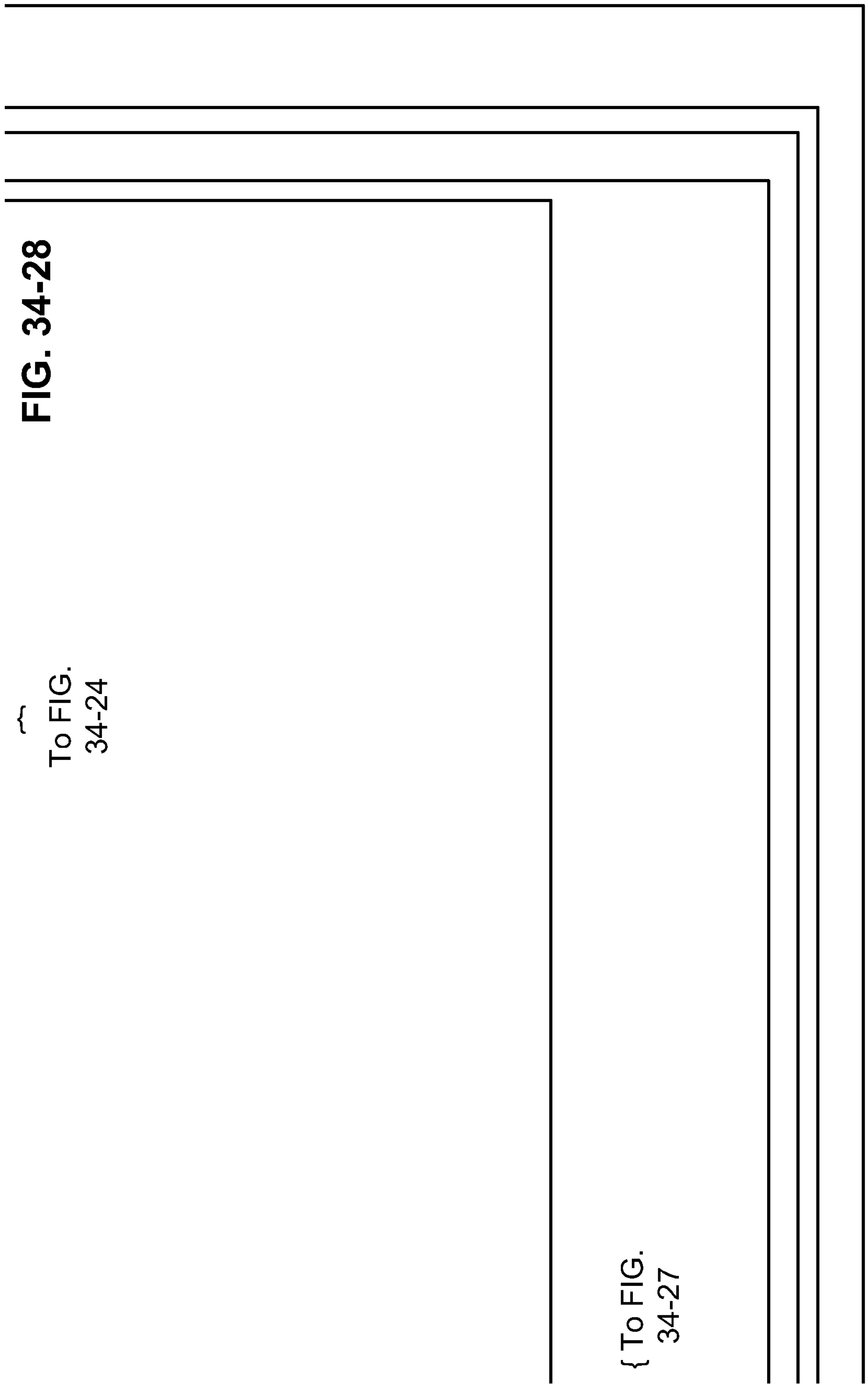

FIGS. 42-1 through 42-3 illustrate one example logical configuration of a FreightOrderExecutionCancelRequestMessage 42000 element structure. Specifically, these figures depict the arrangement and hierarchy of various components such as one or more levels of packages, entities, and datatypes, shown here as 42000 through 42088. As described above, packages may be used to represent hierarchy levels. Entities are discrete business elements that are used during a business transaction. Data types are used to type object entities and interfaces with a structure. For example, the FreightOrderExecutionCancelRequestMessage 42000 includes, among other things, a FreightOrderExecutionCancelRequestMessage entity 42002. Accordingly, heterogeneous applications may communicate using this consistent message configured as such.

FIGS. 43-1 through 43-179 illustrate one example logical configuration of a FreightOrderExecutionConfirmationMessage 430000 element structure. Specifically, these figures depict the arrangement and hierarchy of various components such as one or more levels of packages, entities, and datatypes, shown here as 430000 through 434850. As described above, packages may be used to represent hierarchy levels. Entities are discrete business elements that are used during a business transaction. Data types are used to type object entities and interfaces with a structure. For example, the FreightOrderExecutionConfirmationMessage 430000 includes, among other things, a FreightOrderExecutionConfirmationMessage entity 430002. Accordingly, heterogeneous applications may communicate using this consistent message configured as such.

FIGS. 44-1 through 44-178 illustrate one example logical configuration of a FreightOrderExecutionRequestMessage 440000 element structure. Specifically, these figures depict the arrangement and hierarchy of various components such as one or more levels of packages, entities, and datatypes, shown here as 440000 through 444844. As described above, packages may be used to represent hierarchy levels. Entities are discrete business elements that are used during a business transaction. Data types are used to type object entities and interfaces with a structure. For example, the FreightOrderExecutionRequestMessage 440000 includes, among other things, a FreightOrderExecutionRequestMessage entity 440002. Accordingly, heterogeneous applications may communicate using this consistent message configured as such.

FIGS. 45-1 through 45-6 illustrate one example logical configuration of a FreightOrderExecutionStatusNotificationMessage 45000 element structure. Specifically, these figures depict the arrangement and hierarchy of various components such as one or more levels of packages, entities, and datatypes, shown here as 45000 through 45172. As described above, packages may be used to represent hierarchy levels. Entities are discrete business elements that are used during a business transaction. Data types are used to type object entities and interfaces with a structure. For example, the FreightOrderExecutionStatusNotificationMessage 45000 includes, among other things, a FreightOrderExecutionStatusNotificationMessage entity 45002. Accordingly, heterogeneous applications may communicate using this consistent message configured as such.

FIGS. 46-1 through 46-3 illustrate one example logical configuration of a FreightOrderInvoicingPreparationCancelRequestMessage 46000 element structure. Specifically, these figures depict the arrangement and hierarchy of various components such as one or more levels of packages, entities, and datatypes, shown here as 46000 through 46094. As described above, packages may be used to represent hierarchy levels. Entities are discrete business elements that are used during a business transaction. Data types are used to type object entities and interfaces with a structure. For example, the FreightOrderInvoicingPreparationCancelRequestMessage 46000 includes, among other things, a FreightOrderInvoicingPreparationCancelRequestMessage entity 46002. Accordingly, heterogeneous applications may communicate using this consistent message configured as such.

FIGS. 47-1 through 47-3 illustrate one example logical configuration of a FreightOrderInvoicingPreparationConfirmationMessage 47000 element structure. Specifically, these figures depict the arrangement and hierarchy of various components such as one or more levels of packages, entities, and datatypes, shown here as 47000 through 47094. As described above, packages may be used to represent hierarchy levels. Entities are discrete business elements that are used during a business transaction. Data types are used to type object entities and interfaces with a structure. For example, the FreightOrderInvoicingPreparationConfirmationMessage 47000 includes, among other things, a FreightOrderInvoicingPreparationConfirmationMessage entity 47002. Accordingly, heterogeneous applications may communicate using this consistent message configured as such.

Message Data Type FreightOrderExecutionRequestMessage

The message data type FreightOrderExecutionRequestMessage includes business information relevant for sending a business document in a message and the FreightOrderExecution included in a business document. The message data type FreightOrderExecutionRequestMessage includes the MessageHeader and FreightOrderExecution packages. The message data type FreightOrderExecutionRequestMessage can provide a structure for the message type FreightOrderExecutionRequest and for interfaces that are based on it.

A MessageHeader package can group together business information relevant for sending a business document in a message. The MessageHeader package includes the MessageHeader entity. A MessageHeader can group together business information from a perspective of the sending application in order to identify a business document in a message, provide information about the sender, or provide information about the recipient. The MessageHeader can be divided up into the SenderParty and RecipientParty entities. The MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with the message. A contact person can be useful if an additional infrastructure, such as a marketplace, is located between the sender and the recipient. The SenderParty can be used to transfer the message and can be ignored by the receiving application. SenderParty can be filled by the sender if the participating parties are not transferred with the FreightOrderExecution Package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that occur with the message. A contact person can be useful if an additional infrastructure, such as a marketplace, is located between the sender and the recipient. The RecipientParty can be used to transfer a message and can be ignored by the receiving application. In some implementations, RecipientParty may be filled by the sender if the FreightOrderExecution Package cannot be used to transfer the participating parties.

The FreightOrderExecution package can group the FreightOrderExecution with its packages. The FreightOrderExecution package includes the FreightOrderExecution entity and the Request package. The FreightOrderExecution interface can be used to delegate execution of planned transportation of goods, from shippers to consignees, to transportation execution processing of an ERP system. The attributes and elements located directly at the FreightOrder entity can include @actioncode and ID. The @actioncode attribute can be a coded representation of an instruction to a message recipient describing how to process a transmitted element. The @actioncode attribute can be based on GDT: ActionCode. ID can be a unique identifier of a FreightOrder. ID can be based on GDT: BusinessTransactionDocumentID. In some implementations, the attribute @actioncode may include the two values "01—Create" and "02—Change". In some implementations, the ID might not be changed once a FreightOrder has been created. In some implementations, the Complete Transmission Indicator may be set to true (i.e., the complete message content may be transmitted in every message). As a consequence, previously transferred data that is not sent with the change message may be deleted.

The Request package can group a Request with its packages. The Request package includes the Request entity. The Request package includes the following packages: HeaderInformation, GovernmentalRequirementInformation, PartyInformation, TransportationStageInformation, TransportationUnitResourceInformation, TransportationChargesInformation, and ShipmentOrder. Request can be an agreement between a transportation service provider and an ordering party on transportation of goods from a single ship-from party to a single ship-to party in accordance with agreed terms and conditions.

The HeaderInformation package can group dates, total values, document and references related to a freight order. The HeaderInformation package includes the following entities: DateTimePeriods, NatureOfCargo, TotalQuantity, TotalAmount, TextCollection, and BusinessTransactionDocumentReference.

DateTimePeriods can specify a requested and an acceptable date, time and period applying to a shipment request (e.g. date and time of document issue). A requested period can be a period in which an event is requested to take place. An acceptable period can be a period in which an event may take place at an earliest start date/time to a latest end date/time. The elements located directly at the DateTimePeriods entity can include the following: RequestedFulfillmentPeriod, AcceptableFulfillmentPeriod, and PeriodRoleCode.

RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them can be filled.

NatureOfCargo can indicate a nature of cargo related to a shipment request (e.g., palletized, containerized, documents). The structure of NatureOfCargo includes the ClassificationCode element. ClassificationCode can be a coded representation of a classification of a nature of cargo. ClassificationCode can be based on GDT: NatureOfCargoClassificationCode.

TotalQuantity can specify a total quantity which is related to a whole shipment request (e.g., total number of equipment, total number of items). The structure of TotalQuantity includes the following elements: Quantity, RoleCode, and TypeCode. Quantity can be a non-monetary numerical specification of an amount in a unit of measurement. Quantity can be based on GDT: Quantity. RoleCode can be a coded representation of a role of a quantity. RoleCode can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them can be filled.

TotalAmount can specify a cumulated monetary amount related to a shipment request (e.g., duty amount, insurance amount, or total value). The structure of TotalAmount includes the Amount and RoleCode elements. Amount can be an amount with a corresponding currency unit. Amount can be based on CDT: Amount. RoleCode can be a coded representation of a role of an amount. RoleCode can be based on GDT: AmountRoleCode. TextCollection can be a group of textual information that relates to a shipment request. The structure of TextCollection includes the TextCollection element. TextCollection can be based on GDT: TextCollection.

BusinessTransactionDocumentReference can specify a business document reference that is related to a whole shipment request. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process.

BusinessTransactionDocumentReference can be based on GDT: BusinessTransactionDocumentReference. BusinessTransactionDocumentRelationshipRoleCode can be a coded representation of a role that a business document or a business document item can have when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type. TransportationDocumentTypeCode can be based on GDT: TransportationDocumentTypeCode. TransportationDocumentNote can be a short Note regarding documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID can be filled.

DateTimePeriod can specify a date, time and/or period related to a DocumentReference. The structure of the DateTimePeriod entity includes the elements DateTimePeriod and PeriodRoleCode. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

GovernmentalProcedureInformation can specify applicable governmental procedures related to import, export and transport of goods of a shipment request. GovernmentalProcedureInformation includes the GovernmentalProcedure entity. GovernmentalProcedure can specify applicable governmental procedures related to import, export and transport of goods of a shipment request. GovernmentalProcedure includes the following entities: Location, DateTimePeriod, Seal, TextCollection, and TransportationDocumentInformation. The structure of GovernmentalProcedure includes the elements TransportationGovernmentAgencyTypeCode, TransportationMovementTypeCode, TransportationGovernmentAgencyInvolvementStatusCode, TransportationGovernmentAgencyActionCode, and TransportationGovernmentAgencyProcedureStatusCode.

TransportationGovernmentAgencyTypeCode can be a coded representation of a type of a government agency. TransportationGovernmentAgencyTypeCode can be based on GDT: TransportationGovernmentAgencyTypeCode. TransportationMovementTypeCode can be a coded representation of a type of a transport movement. Examples can include Import, Export, Transit, and Transshipment. TransportationMovementTypeCode can be based on GDT: TransportationMovementTypeCode. TransportationGovernmentAgencyInvolvementStatusCode can be a coded representation for an involvement status of a transportation related government agency. TransportationGovernmentAgencyInvolvementStatusCode can be based on GDT: TransportationGovernmentAgencyInvolvementStatusCode. TransportationGovernmentAgencyActionCode can be a coded representation of an action of a transportation related government agency. TransportationGovernmentAgencyActionCode can be based on GDT: TransportationGovernmentAgencyActionCode.

TransportationGovernmentAgencyProcedureStatusCode can be a coded representation of a status of a procedure related to a transportation government agency. TransportationGovernmentAgencyProcedureStatusCode can be based on GDT: TransportationGovernmentAgencyProcedureStatusCode.

The PartyInformation package includes information regarding a party of a freight order (i.e., Shipper, Carrier, Agent). The PartyInformation package includes the Party entity. Party includes information exchanged, in accordance with common business understanding, in business documents about a party involved in business transactions. This information can be used to identify the party and the party's address, as well as the party's contact person and the contact person's address. This identification can take place using an internal ID, a standardized ID, or IDs assigned by the parties involved.

The Party entity includes the following entities: Amount, DateTimePeriods, TransportationDocumentInformation, and BusinessTransactionDocumentReference. The structure of Party includes the Party, RoleCode and FormattedName elements. A Party includes information exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations a party has regarding a business object and corresponding processes. In some implementations, PartyRole is assigned to a PartyRoleCategory and refines its semantics. RoleCode can be based on GDT: PartyRoleCode. FormattedName can be a formatted name of a party. FormattedName can be based on GDT: LONG_Name, Qualifier: PartyFormatted.

BusinessTransactionDocumentReference can specify a business document reference that is related to a whole shipment request. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process.

BusinessTransactionDocumentReference can be based on GDT: BusinessTransactionDocumentReference. BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of documentation type. TransportationDocumentTypeCode can be based on GDT: TransportationDocumentTypeCode. TransportationDocumentNote can be a short Note regarding documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID can be filled. DateTimePeriod can specify a date, time and/or period related to the DocumentReference.

The TransportationStageInformation package includes information regarding a stage of a freight order. A stage can represent a section of a transport. The TransportationStageInformation package includes the TransportationStage entity. TransportationStage can specify details related to a stage of a transport which is part of a freight order. TransportationStage includes the following entities: ContactInformation, Quantity, Party, Location, Seal, TextCollection, BusinessTransactionDocumentReference, and TransportationServiceRequirement. The structure of TransportationStage includes the following elements: ID, OrdinalNumberValue, TypeCode, JourneyID, TransportModeCode, TransportMeansDescriptionCode, TransportMeansDescription, TransportMeansID, TransportMeansHomeCountryCode, TransportMeansOwnershipTypeCode, CarrierStandardID, CarrierFormattedName, TransportationTransitDirectionCode, CalculatedDistanceMeasure, and GivenDistanceMeasure.

ID can be a unique identifier of a stage in a shipment request. ID can be based on GDT: TransportationStageID. OrdinalNumberValue can be an ordinal number to indicate a position of a transportation stage in a set of transportation stages. OrdinalNumberValue can be based on GDT: OrdinalNumberValue, Qualifier: TransportationStage. TypeCode can be a coded representation of a type of a TransportationStage. TypeCode can be based on GDT: TransportationStageTypeCode. JourneyID can be an identifier of a Journey. JourneyID can be based on GDT: JourneyID. TransportModeCode can be a coded representation of a mode of transportation used for delivery. TransportModeCode can be based on GDT: TransportModeCode. TransportMeansDescriptionCode can be a coded representation of a transport means type with which goods or persons are to be transported.

TransportMeansDescriptionCode can be based on GDT: TransportMeansDescriptionCode. TransportMeansDescription can be a description of a means of transport. TransportMeansDescription can be based on GDT: SHORT_Description, Qualifier: TransportMeans. TransportMeansID can be a unique identifier of a means of transport. TransportMeansID can be based on GDT: TransportMeansID. TransportMeansHomeCountryCode can be a coded representation of the home country of a transport means. TransportMeansHomeCountryCode can be based on GDT: CountryCode, Qualifier: TransportMeansHome. TransportMeansOwnershipTypeCode can be a coded representation of a type of ownership for a means of transport.

TransportMeansOwnershipTypeCode can be based on GDT: TransportMeansOwnershipTypeCode. CarrierStandardID can be a standard identifier of a carrier. CarrierStandardID can be based on GDT: PartyStandardID. CarrierFormattedName can be a name of a carrier. CarrierFormattedName can be based on GDT: LONG_Name, Qualifier: PartyFormatted. TransportationTransitDirectionCode can be a coded representation for a transportation transit direction. TransportationTransitDirectionCode can be based on GDT: TransportationTransitDirectionCode. CalculatedDistanceMeasure can be a calculated distance measure. CalculatedDistanceMeasure can be based on GDT: Measure, Qualifier: CalculatedDistance. GivenDistanceMeasure can be a given distance measure. GivenDistanceMeasure can be based on GDT: Measure, Qualifier: GivenDistance.

ContactInformation can specify information on a department or person to whom information regarding a Stage can be directed. The structure of ContactInformation includes the ContactPersonFunctionTypeCode and Address elements. ContactPersonFunctionTypeCode can be a coded representation of a type of function that a contact person has. ContactPersonFunctionTypeCode can be based on GDT: ContactPersonFunctionTypeCode. Address can be an address related to contact information defined by a corresponding FunctionTypeCode. Address can be based on GDT: Address.

Quantity can specify a quantity related to a Stage. The structure of Quantity includes the elements Quantity, RoleCode, and TypeCode. Quantity can be a non-monetary numerical specification of an amount in a unit of measurement. Quantity can be based on GDT: Quantity. RoleCode can be a coded representation of a role of a quantity. RoleCode can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of may be filled.

Party includes information exchanged, in accordance with common business understanding, in business documents, about a party involved in a current stage. This information can be used to identify the party and the party's address. Party includes the TransportationDocumentInformation and BusinessTransactionDocumentReference entities. The structure of Party includes the following elements: Party, RoleCode, and FormattedName.

A Party includes information exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations the party has regarding a business object and corresponding processes. In some implementations, a PartyRole is assigned to a PartyRoleCategory and refines its semantics. RoleCode can be based on GDT: PartyRoleCode. FormattedName can be a formatted name of a party. FormattedName can be based on GDT: LONG_Name, Qualifier: PartyFormatted.

TransportationDocumentInformation can specify information on a transportation document related to a shipment request. TransportationDocumentInformation includes the DateTimePeriod entity. The structure of TransportationDocumentInformation includes the following elements: TransportationDocumentTypeCode, TransportationDocumentNote, TransportationDocumentID, TransportationDocumentStatusCode, LanguageCode, CommunicationMediumTypeCode, RequiredIndicator, OutputCopyNumberValue, and OutputOriginalNumberValue.

TransportationDocumentTypeCode can be a coded representation of a documentation type. TransportationDocumentTypeCode can be based on GDT: TransportationDocumentTypeCode. TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. TransportationDocumentStatusCode can be a coded representation of a status of a transportation document (e.g., to be printed, document complete). TransportationDocumentStatusCode can be based on GDT: TransportationDocumentStatusCode. LanguageCode can be a coded representation of the language of a documentation. LanguageCode can be based on GDT: LanguageCode. CommunicationMediumTypeCode can be a coded representation of a type of a medium used for communication of documentation (e.g., fax, mail, EDI (Electronic Data Interchange), or letter). CommunicationMediumTypeCode can be based on GDT : CommunicationMediumTypeCode.

RequiredIndicator can indicate whether a documentation is required or not. RequiredIndicator can be based on GDT: Indicator Qualifier: Required. OutputCopyNumberValue can be a number specifying the number of copies of a document that should be issued. OutputCopyNumberValue can be based on GDT: NumberValue, Qualifier : OutputCopy. OutputOriginalNumberValue can be a number specifying the number of originals of a document that should be issued. OutputOriginalNumberValue can be based on GDT: NumberValue, Qualifier : OutputOriginal. In some implementations, TypeCode and TypeDescription are both optional, but at least one of them may be used. In some implementations, if the RequiredIndicator is set to true, at least one of the NumberValues OutputCopyNumberValue or OutputOriginalNumberValue may be filled.

BusinessTransactionDocumentReference can specify a business document reference that is related to a whole shipment request. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process.

BusinessTransactionDocumentReference can be based on GDT: BusinessTransactionDocumentReference. BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of a documentation type. TransportationDocumentTypeCode can be based on GDT: TransportationDocumentTypeCode. TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both can be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID can be filled. DateTimePeriod can specify a date, time and/or period related to a DocumentReference.

The Location can specify a physical place to which the TransportationCharges and an associated calculation can refer. Location includes the DateTimePeriod entity. The structure of Location includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole. RoleCode can be based on GDT: LocationRoleCode. TypeCode can be a coded representation of a type of a physical location. TypeCode can be based on GDT: LocationTypeCode. Name can be a name of a location. Name can be based on GDT: MEDIUM_Name, Qualifier:Location.

Seal can specify seal information related to a Stage. The structure of Seal includes the following elements: ID, PartyRoleCode, PartyFormattedName, and StatusCode. ID can be a unique identifier of a seal. ID can be based on GDT: SealID. PartyRoleCode can be a coded representation of a party role. PartyRoleCode can be based on GDT: PartyRoleCode. PartyFormattedName can be a complete, formatted name of a party (e.g., the name of a SealingParty). PartyFormattedName can be based on GDT: LONG_Name, Qualifier: PartyFormatted. StatusCode can be a coded representation of a status of a seal. StatusCode can be based on GDT: SealStatusCode.

TextCollection can be a group of textual information that relates to a Stage. The structure of TextCollection includes the element TextCollection. TextCollection can be based on GDT: TextCollection.

BusinessTransactionDocumentReference can specify a business document reference that is related to a whole shipment request. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipRoleCode can be based on GDT: BusinessTransactionDocumentRelationshipTypeCode. TransportationDocumentTypeCode can be a coded representation of a documentation type. TransportationDocumentTypeCode can be based on GDT: TransportationDocumentTypeCode.

TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID can be filled.

TransportationServiceRequirement can specify a contract and carriage condition and service and priority requirements for transport which apply to a whole shipment request. The structure of TransportationServiceRequirement includes the following elements: TransportationServiceRequirementCode, AdditionalTransportationServiceRequirementCode, TransportationContractConditionCode, TransportServiceLevelCode, and NatureOfCargoClassificationCode. TransportationServiceRequirementCode can be a coded representation of a requirement related to a transportation service. TransportationServiceRequirementCode can be based on GDT : TransportationServiceRequirementCode.

AdditionalTransportationServiceRequirementCode can be a coded representation of an additional requirement related to a transportation service. AdditionalTransportationServiceRequirementCode can be based on GDT : TransportationServiceRequirementCode, Qualifier: Additional. TransportationContractConditionCode can be a coded representation of a contract and carriage condition. TransportationContractConditionCode can be based on GDT: TransportationContractConditionCode. TransportServiceLevelCode can be a coded representation of agreed or defined services in terms of the delivery of goods with respect to the speed of the delivery. TransportServiceLevelCode can be based on GDT : TransportServiceLevelCode. NatureOfCargoClassificationCode can be a coded representation of a classification of a nature of cargo. NatureOfCargoClassificationCode can be based on GDT : NatureOfCargoClassificationCode.

The TransportationUnitResourceInformation package includes information regarding a transportation unit resource that is relevant for the freight order (e.g., a container). The TransportationUnitResourceInformation package includes the TransportationUnitResourceInformation entity. TransportationUnitResourceInformation includes information on one or more transportation unit resources, such as a resource type and related properties, and related measures or handling instructions. A TransportationUnitResource can be a unit into which goods are loaded and/or from which goods are unloaded. In some implementations, this unit can provide transportation capacity for goods but cannot move by itself. TransportationUnitResource includes the following entities: TransportationStageAssignment, AttachedEquipment, Quantity, Seal, BusinessTransactionDocumentReference, TextCollection, Party, Location, and DangerousGoods.

The structure of TransportationUnitResourceInformation includes the following elements: ID, ResourceNumberValue, ResourceID, ResourceHomeCountryCode, TransportationUnitResourceCategoryCode, TransportationUnitResourceTypeCode, FillLevelCode, ShippingTypeCode, HaulageArrangerCode, TransportationHandlingInstructionCode, and TransportationHandlingInstructionNote. ID can be a unique identifier for a resource information. ID can be based on GDT ResourceInformationID. ResourceNumberValue can be a count of resources. ResourceNumberValue can be based on GDT: NumberValue, Qualifier: Resource. ResourceID can be a unique identifier for a resource. ResourceID can be based on GDT: ResourceID. ResourceHomeCountryCode can be a coded representation of the home country of a resource. ResourceHomeCountryCode can be based on GDT: CountryCode, Qualifier: ResourceHome.

TransportationUnitResourceCategoryCode can be a coded representation of a category of transportation unit resources. TransportationUnitResourceCategoryCode can be based on GDT: TransportationUnitResourceCategoryCode. TransportationUnitResourceTypeCode can be a coded representation of a type of a transportation unit resource. TransportationUnitResourceTypeCode can be based on GDT: TransportationUnitResourceTypeCode. FillLevelCode can be a coded representation of a fill level of a resource. FillLevelCode can be based on GDT: FillLevelCode. ShippingTypeCode can be a coded representation of a shipping type. A shipping type can specify how planning and execution of a transportation can be performed.

Transportation terms include detailed specifications on agreed means of transportation, such as shipping and transport type and means of transport to be used. ShippingTypeCode can be based on GDT: ShippingTypeCode. HaulageArrangerCode can be a coded representation of an arranger of a haulage. Haulage can be inland transport of cargo. HaulageArrangerCode can be based on GDT: HaulageArrangerCode. TransportationHandlingInstructionCode can be a coded representation of the type of a transportation handling instruction. TransportationHandlingInstructionCode can be based on GDT: TransportationHandlingInstructionCode. TransportationHandlingInstructionNote can be a note regarding a transportation handling instruction. TransportationHandlingInstructionNote can be based on GDT: LONG_Note, Qualifier: TransportationHandlingInstruction.

TransportationStageAssignment can specify an assignment of a resource to a stage. The structure of TransportationStageAssignment includes the element FreightOrderTransportationStageID. FreightOrderTransportationStageID can be a unique identifier of a TransportationStage in a freight order. FreightOrderTransportationStageID can be based on GDT: TransportationStageID.

AttachedEquipment can specify equipment attached to a TransportationUnitResource. The structure of AttachedEquipment includes the ShipmentRequestResourceInformationID element. ShipmentRequestResourceInformationID can be a unique identifier of a resource information in a ShipmentRequest. ShipmentRequestResourceInformationID can be based on GDT: ResourceInformationID.

Quantity can specify a quantity related to TransportationUnitResourceInformation. The structure of Quantity includes the following elements: Quantity, RoleCode, and TypeCode. Quantity can be a non-monetary numerical specification of an amount in a unit of measurement. Quantity can be based on GDT: Quantity. RoleCode can be a coded representation of a role of a quantity. RoleCode can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them may be filled.

Seal can specify a seal related to a TransportationUnitResource. The structure of Seal includes the following elements: ID, PartyRoleCode, PartyFormattedName, and StatusCode. ID can be a unique identifier of a seal. ID can be based on GDT: SealID. PartyRoleCode can be a coded representation of a party role. PartyRoleCode can be based on GDT: PartyRoleCode. PartyFormattedName can be a complete, formatted name of a party, or the name of the SealingParty. PartyFormattedName can be based on GDT: LONG_Name, Qualifier: PartyFormatted. StatusCode can be a coded representation of a status of a seal. StatusCode can be based on GDT: SealStatusCode.

TextCollection can be a group of textual information that relates to a GovernmentalProcedure. The structure of the TextCollection entity includes the TextCollection element. TextCollection can be based on GDT: TextCollection.

BusinessTransactionDocumentReference can specify a business document reference that is related to a whole shipment request. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipRoleCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID can be filled.

TextCollection can be a group of textual information that relates to a TransportationUnitResource. The structure of TextCollection includes the element TextCollection. TextCollection can be based on GDT: TextCollection.

Party includes information exchanged, in accordance with common business understanding, in business documents, about a party involved in the current TransportationUnitResource. This information can be used to identify the party and the party's address. The structure of Party includes the following elements: Party, RoleCode, and FormattedName. A Party includes information exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations the party has regarding a business object and corresponding processes. In some implementations, a PartyRole is assigned to one PartyRoleCategory and refines its semantics. PartyRole can be based on GDT: PartyRoleCode. FormattedName can be a complete, formatted name of a party. FormattedName can be based on GDT: LONG_Name, Qualifier: PartyFormatted.

Location can specify a physical place related to a TransportationUnitResource. The structure of Location includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole. RoleCode can be based on GDT: LocationRoleCode. TypeCode can be a coded representation of a type of a physical location. TypeCode can be based on GDT: LocationTypeCode. Name can be a name of a location. Name can be based on GDT: MEDIUM_Name, Qualifier:Location.

DangerousGoods can specify dangerous goods included in a resource. DangerousGoods includes the ContactInformation and TextCollection entities. The structure of DangerousGoods includes the following elements: ID, RegulationsCode, HazardCode, FlashpointMeasureInterval, PackagingGroupCode, EmergencySchedule, TransportEmergencyCardCode, DangerousGoodsLabelCode, DangerousGoodsLabelCode2, DangerousGoodsLabelCode3, PackagingInstructionTypeCode, TransportMeansDescriptionCode, and TransportAuthorisationCode. ID can be a unique identifier for a dangerous good, using the United Nations Dangerous Goods Number. ID can be based on GDT: DangerousGoodsID.

RegulationsCode can be a coded representation of national or international dangerous goods rules or regulations. RegulationsCode can be based on GDT: DangerousGoodsRegulationsCode. HazardCode can be a coded representation of a hazard that is imminent in a dangerous good. HazardCode can be based on GDT: DangerousGoodsHazardCode. FlashpointMeasureInterval can be an interval of measures defined by a lower and an upper boundary indicating a flashpoint of a dangerous good. FlashpointMeasureInterval can be based on GDT: MeasureInterval, Qualifier: Flashpoint. PackagingGroupCode can be a coded representation of the effectiveness of a packaging to transport dangerous goods depending on the degree of danger of the goods. PackagingGroupCode can be based on GDT: DangerousGoodsPackagingGroupCode.

EmergencySchedule can be a coded representation of an emergency schedule for dangerous goods. EmergencySchedule can identify an emergency schedule. The DangerousGoodsEmergencySchedule can be used for transports of dangerous goods by sea similar to a Transport Emergency Card which is used for transports of dangerous goods by road. EmergencySchedule can be based on GDT: DangerousGoodsEmergencySchedule. TransportEmergencyCardCode can be a coded representation of a transport emergency card which specifies how to react in case of an accident. TransportEmergencyCardCode can be based on GDT: TransportEmergencyCardCode. DangerousGoodsLabelCode can be a coded representation of a label for a dangerous good.

In some implementations, DangerousGoodsLabelCode's values are dependant on the DangerousGoodsRegulationsCode. DangerousGoodsLabelCode can be based on GDT: DangerousGoodsLabelCode. DangerousGoodsLabelCode2 can be a coded representation of a label for a dangerous good. In some implementations, DangerousGoodsLabelCode's values are dependant on the DangerousGoodsRegulationsCode. DangerousGoodsLabelCode2 can be based on GDT: DangerousGoodsLabelCode. DangerousGoodsLabelCode3 can be a coded representation of a label for a dangerous good. In some implementations, DangerousGoodsLabelCode's values are dependant on the DangerousGoodsRegulationsCode. DangerousGoodsLabelCode3 can be based on GDT: DangerousGoodsLabelCode.

PackagingInstructionTypeCode can be a coded representation of a packaging instruction. A packaging instruction can be an instruction defining which packagings can be used to pack a dangerous good. PackagingInstructionTypeCode can be based on GDT: PackagingInstructionTypeCode. TransportMeansDescriptionCode can be a coded representation of a transport means type with which goods or persons are to be transported. TransportMeansDescriptionCode can be based on GDT: TransportMeansDescriptionCode. TransportAuthorisationCode can be a coded representation of an authorisation for a transportation of dangerous goods. This code can specify an authorisation for a transportation of a particular dangerous good. TransportAuthorisationCode can be based on GDT: DangerousGoodsTransportAuthorisationCode.

The TransportationChargesInformation package includes information regarding a transportation charge calculation specific to components related to a FreightOrder. The TransportationChargesInformation package includes the TransportationChargesInformation entity. The entity TransportationChargesInformation can define a relationship between transportation charges and the origin of these charges. TransportationChargesInformation includes the TransportationCharges entity. The structure of TransportationChargesInformation includes the following elements: TransportationChargesUsageCode, FreightOrderPartyStandardID, FreightOrderTransportationUnitResourceID, and FreightOrderTransportationStageID. TransportationChargesUsageCode can be a coded representation of the usage of TransportationCharges. The usage points out if subsequent information represents a revenue view or cost view on transportation charges.

TransportationChargesUsageCode can be based on GDT: TransportationChargesUsageCode. FreightOrderPartyStandardID can be a unique identifier of a Party in a FreightOrder. FreightOrderPartyStandardID can be based on GDT: PartyStandardID. FreightOrderTransportationUnitResourceID can be a unique identification of a TransportationUnitResource in a FreightOrder. FreightOrderTransportationUnitResourceID can be based on GDT: ResourceID. FreightOrderTransportationStageID can be a unique identification of a TransportationStage in a FreightOrder. FreightOrderTransportationStageID can be based on GDT: TransportationStageID. If none of the IDs is maintained, the transportation charges are related to the entire freight order.

TransportationCharges can be a summary of determined transportation charge specific components for a transportation business case. TransportationCharges includes the following entities: Location, TextCollection, Currency, ExchangeRate, PercentElement, DateTimePeriod, BusinessTransactionDocumentReference, TaxDetail, PaymentInstruction, CashDiscountTerms, and Element. The structure of TransportationCharges includes the following elements: ID, FreightAgreementID, CalculationOriginCode, TariffID, and CalculationSheetID. ID can be a unique identifier of TransportationCharges in a ShipmentRequest. ID can be based on GDT: TransportationChargesID. FreightAgreementID can be an identification of a Freight Agreement which includes and points to a configuration for the Transportation Charges Calculation.

FreightAgreementID can be based on GDT: FreightAgreementID. CalculationOriginCode can be a coded representation of the origin of a transportation charges calculation. The calculation can be done automatically based on a system configuration. Data for the calculation, including the results, can be manually entered or received from another business system via a message. In some implementations, it may be necessary to have a clear distinction of the origin of TransportationChargesCalculation details, such as the TransportationChargesCalculationSheet and its TransportationChargeElements. The distinction can give information whether the calculation was done completely automatically, or if the results were manually adopted. CalculationOriginCode can be based on GDT: TransportationChargesOriginCode.

TariffID can be an identifier for a transportation charges tariff. A transportation charges tariff can be a specific combination of a transportation charges calculation sheet and terms and conditions. The terms and conditions can define if a certain transportation charges calculation sheet and its related rates are applicable for a transportation business case. TariffID can be based on GDT: TransportationChargesTariffID. CalculationSheetID can be a unique Identifier for a transportation charges calculation sheet. A TransportationChargesCalculationSheet can represent a configuration describing how to calculate necessary transportation charges for a transportation business case. TransportationChargesCalculationSheet includes instructions, indications of which charges are applicable, indications of which data from the transportation business case can be considered for the calculation, information describing how the underlying transportation charge rates determined, and information describing which special calculation methods can be considered. CalculationSheetID can be based on GDT: TransportationChargesCalculationSheetID.

A ShipmentOrder package can specify or group together data related to a shipment request which is assigned to a freight order. The ShipmentOrder package includes the ShipmentOrder entity and the Request package. ShippingOrder can be an agreement between an ordering party and a transportation service provider on the shipment of goods from a single shipper to a single consignee in accordance with agreed terms and conditions. ShippingOrder includes the TransportationStageAssignment and TransportationUnitResourceInformationAssignment entities. The structure of ShipmentOrder includes the ID element. ID can be a unique identifier of a ShipmentOrder. ID can be based on GDT: BusinessTransactionDocumentID.

TransportationStageAssignment can specify an assignment of a shipment order to a transportation stage of a freight order. The structure of TransportationStageAssignment includes the element FreightOrderTransportationStageID. FreightOrderTransportationStageID can be a unique identifier of a TransportationStage in a freight order. FreightOrderTransportationStageID can be based on GDT: TransportationStageID.

TransportationUnitResourceInformationAssignment can specify an assignment of a shipment order to a TransportationUnitResourceInformation of a freight order. The structure of TransportationUnitResourceInformationAssignment includes the FreightOrderTransportationUnitResourceID element. FreightOrderTransportationUnitResourceID can be a unique identifier of a TransportationUnitResource in a freight order. FreightOrderTransportationUnitResourceID can be based on GDT: ResourceID.

The Request package can group a Request with its packages. The Request package includes the Request entity and the packages HeaderInformation, TransportationChargesInformation, GovernmentalRequirementInformation, PartyInformation, LocationInformation, TransportationStageInformation, TransportationUnitResourceInformation, PackagingInformation, and Item. In some implementations, the Request Package is filled either for none or for all of the shipment requests which are assigned to a freight order. In a first case (short form message), ShipmentRequest and its subentities identify the ShipmentRequest requests that have already been sent before. In a second case (extended form message) the Request Package includes ShipmentRequest request data, and in a standard process the subentities of entity ShipmentRequest may or may not be filled.

Message Data Type FreightOrderExecutionCancelRequestMessage

The message data type FreightOrderExecutionCancelRequestMessage can group together business information relevant for sending a business document in a message and the FreightOrderExecution object in a business document. The message data type FreightOrderExecutionCancelRequestMessage includes the MessageHeader and FreightOrderExecution packages. The message data type FreightOrderExecutionCancelRequestMessage can provide a structure for the message type FreightOrderExecutionCancelRequest and the interfaces that are based on it.

A MessageHeader package can group together business information relevant for sending a business document in a message. The MessageHeader package includes the MessageHeader entity. A MessageHeader can group together business information from the perspective of a sending application to identify a business document in a message, to provide information about the sender, or to provide information about the recipient. The MessageHeader can be divided up into the SenderParty and RecipientParty entities. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with the message. A contact person can be useful if an additional infrastructure, such as a marketplace, is located between the sender and the recipient. The SenderParty can be used to transfer a message and can be ignored by the receiving application. SenderParty can be filled by the sender if the participating parties are not transferred with the FreightOrderExecution Package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with the message. A contact person can be useful if an additional infrastructure, such as a marketplace, is located between the sender and the recipient. The RecipientParty can be used to transfer a message and can be ignored by the receiving application. RecipientParty can be filled by the sender if the FreightOrderExecution Package cannot be used to transfer the participating parties.

The FreightOrderExecution package can group together information about the FreightOrderExecution. The FreightOrderExecution package includes the FreightOrderExecution entity and the BusinessTransactionDocumentReference package. The FreightOrderExecution interface can be used to delegate the execution of planned transportation of goods, from shippers to consignees, to the transportation execution processing of an ERP system. The attributes and elements located directly at the FreightOrder entity include ID. ID can be a unique identifier of a FreightOrder. ID can be based on GDT: BusinessTransactionDocumentID.

Request can be an agreement between a transportation service provider and an ordering party on the transportation of goods from a single ship-from party to a single ship-to party in accordance with agreed terms and conditions.

A BusinessTransactionDocumentReference package can group references to business documents. A BusinessTransactionDocumentReference package includes the BusinessTransactionDocumentReference entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type. TransportationDocumentTypeCode can be based on GDT: TransportationDocumentTypeCode.

TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

Message Data Type FreightOrderExecutionConfirmationMessage

The message data type FreightOrderExecutionConfirmationMessage includes business information relevant for sending a business document in a message, and the FreightOrderExecution included in a business document. The message data type FreightOrderExecutionConfirmationMessage includes the MessageHeader and FreightOrderExecution packages. The message data type FreightOrderExecutionConfirmationMessage can provide a structure for the message type FreightOrderExecutionConfirmation and the interfaces that are based on it.

A MessageHeader package can group together business information relevant for sending a business document in a message. The MessageHeader package includes the MessageHeader entity. A MessageHeader can group together business information from a perspective of a sending application to identify a business document in a message, to provide information about the sender, and to provide information about the recipient. The MessageHeader can be divided up into the SenderParty and RecipientParty entities. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with the message. A contact person can be useful if an additional infrastructure, such as a marketplace, is located between the sender and the recipient. The SenderParty can be used to transfer the message and can be ignored by the receiving application. SenderParty can be filled by the sender if the participating parties are not transferred with the FreightOrderExecution Package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with the message. A contact person can be useful if an additional infrastructure, such as a marketplace, is located between the sender and the recipient. The RecipientParty can be used to transfer the message and can be ignored by the receiving application. RecipientParty can be filled by the sender if the FreightOrderExecution Package cannot be used to transfer the participating parties.

The FreightOrderExecution package can group the FreightOrderExecution together with its packages. The FreightOrderExecution package includes the FreightOrderExecution entity and the Confirmation package. The freight order execution interface can be used to delegate the execution of planned transportation of goods, from shippers to consignees, to the transportation execution processing of an ERP system. The attributes and elements located directly at the FreightOrder entity include @actioncode and ID. @actioncode can be a coded representation of an instruction to a message recipient describing how to process a transmitted element. @actioncode can be based on GDT: ActionCode. ID can be a unique identifier of a FreightOrder. ID can be based on GDT: BusinessTransactionDocumentID. In some implementations, the attribute @actioncode may only include the two values "01—Create" and "02—Change". In some implementations, the ID is not changed once a FreightOrder has been created. In some implementations, the Complete Transmission Indicator is set to true (i.e., the complete message content is transmitted in every message). As a consequence, previously transferred data that is not sent with the change message may be deleted.

The Confirmation package can be a confirmation of an agreement between a transportation service provider and an ordering party on the transportation of goods from a single ship-from party to a single ship-to party in accordance with agreed terms and conditions. The Confirmation package includes the Confirmation entity. The Confirmation package includes the following packages: HeaderInformation, TransportationChargesInformation, GovernmentalRequirementInformation, PartyInformation, LocationInformation, TransportationStageInformation, TransportationUnitResourceInformation, PackagingInformation, and Item. Confirmation can be a confirmation of an agreement between a transportation service provider and an ordering party on the transportation of goods from a single ship-from party to a single ship-to party in accordance with agreed terms and conditions. The confirmation entity includes the AcceptanceStatusCode element. AcceptanceStatusCode can be a coded representation of a status of an acceptance by a communication partner regarding a business transaction that has been transmitted to that partner. AcceptanceStatusCode can be based on GDT: AcceptanceStatusCode.

The HeaderInformation package can group dates, total values, document and references related to a freight order. The HeaderInformation package includes the following entities: DateTimePeriods, NatureOfCargo, TotalQuantity, TotalAmount, TextCollection, and BusinessTransactionDocumentReference.

The GovernmentalProcedureInformation package can specify applicable governmental procedures related to import, export and transport of goods of a shipment request. The GovernmentalProcedureInformation package includes the GovernmentalProcedure entity. GovernmentalProcedure can specify applicable governmental procedures related to import, export and transport of goods of a shipment request. GovernmentalProcedure includes the following entities: Location, DateTimePeriod, Seal, TextCollection, and TransportationDocumentInformation. The structure of GovernmentalProcedure includes the following elements: TransportationGovernmentAgencyTypeCode, TransportationMovementTypeCode, TransportationGovernmentAgencyInvolvementStatusCode, TransportationGovernmentAgencyActionCode, and TransportationGovernmentAgencyProcedureStatusCode.

TransportationGovernmentAgencyTypeCode can be a coded representation of a type of a government agency. TransportationGovernmentAgencyTypeCode can be based on GDT: TransportationGovernmentAgencyTypeCode. TransportationMovementTypeCode can be a coded representation of a type of a transport movement. Examples include Import, Export, Transit, and Transshipment. TransportationMovementTypeCode can be based on GDT: TransportationMovementTypeCode. TransportationGovernmentAgencyInvolvementStatusCode can be a coded representation for an involvement status of a transportation related government agency. TransportationGovernmentAgencyInvolvementStatusCode can be based on GDT: TransportationGovernmentAgencyInvolvementStatusCode. TransportationGovernmentAgencyActionCode can be a coded representation of an action of a transportation related government agency.

TransportationGovernmentAgencyActionCode can be based on GDT: TransportationGovernmentAgencyActionCode. TransportationGovernmentAgencyProcedureStatusCode can be a coded representation of a status of a procedure related to a transportation government agency. TransportationGovernmentAgencyProcedureStatusCode can be based on GDT: TransportationGovernmentAgencyProcedureStatusCode.

The PartyInformation package includes information regarding a party of a freight order (e.g., Shipper, Carrier, Agent). PartyInformation includes the Party entity. The LocationInformation package includes information regarding a location of a shipment order (e.g., Ship-from location). The LocationInformation package includes the Location entity.

The TransportationStageInformation package includes information regarding a stage of a freight order. A stage can represent a section of a transport. The TransportationStageInformation package includes the TransportationStage entity. TransportationStage can specify details related to a stage of a transport which is part of a freight order. TransportationStage includes the following entities: ContactInformation, Quantity, Party, Location, Seal, TextCollection, BusinessTransactionDocumentReference, and TransportationServiceRequirement. The structure of TransportationStage includes the following elements: ID, OrdinalNumberValue, TypeCode, JourneyID, TransportModeCode, TransportMeansDescriptionCode, TransportMeansDescription, TransportMeansID, TransportMeansHomeCountryCode, TransportMeansOwnershipTypeCode, CarrierStandardID, CarrierFormattedName, TransportationTransitDirectionCode, CalculatedDistanceMeasure, and GivenDistanceMeasure.

ID can be a unique identifier of a stage in a shipment request. ID can be based on GDT: TransportationStageID. OrdinalNumberValue can be an ordinal number to indicate a position of a transportation stage in a set of transportation stages. OrdinalNumberValue can be based on GDT: OrdinalNumberValue, Qualifier: TransportationStage. TypeCode can be a coded representation of a type of a TransportationStage. TypeCode can be based on GDT: TransportationStageTypeCode. JourneyID can be an identifier of a Journey. JourneyID can be based on GDT: JourneyID. TransportModeCode can be a coded representation of a mode of transportation used for delivery. TransportModeCode can be based on GDT: TransportModeCode.

TransportMeansDescriptionCode can be a coded representation of a transport means type with which goods or persons are to be transported. TransportMeansDescriptionCode can be based on GDT: TransportMeansDescriptionCode. TransportMeansDescription can be a description of a means of transport. TransportMeansDescription can be based on GDT: SHORT_Description, Qualifier: TransportMeans. TransportMeansID can be a unique identifier of a means of transport. TransportMeansID can be based on GDT: TransportMeansID. TransportMeansHomeCountryCode can be a coded representation of the home country of a transport means. TransportMeansHomeCountryCode can be based on GDT: CountryCode, Qualifier: TransportMeansHome. TransportMeansOwnershipTypeCode can be a coded representation of a type of ownership for a means of transport.

TransportMeansOwnershipTypeCode can be based on GDT: TransportMeansOwnershipTypeCode. CarrierStandardID can be a standard identifier of a carrier. CarrierStandardID can be based on GDT: PartyStandardID. CarrierFormattedName can be a name of a carrier. CarrierFormattedName can be based on GDT: LONG_Name, Qualifier: PartyFormatted. TransportationTransitDirectionCode can be a coded representation for a transportation transit direction. TransportationTransitDirectionCode can be based on GDT: TransportationTransitDirectionCode. CalculatedDistanceMeasure can be a calculated distance measure. CalculatedDistanceMeasure can be based on GDT: Measure, Qualifier: CalculatedDistance. GivenDistanceMeasure can be a given distance measure. GivenDistanceMeasure can be based on GDT: Measure, Qualifier: GivenDistance.

The TransportationUnitResourceInformation package includes information regarding a transportation unit resource that is relevant for a freight order, (e.g., a container). The TransportationUnitResourceInformation package includes the TransportationUnitResourceInformation entity. TransportationUnitResourceInformation includes information on one or more transportation unit resources, such as a resource type and related properties, related measures or handling instructions. A Transportation Unit Resource can be a unit into which goods are loaded and/or from which goods are unloaded. In some implementations, this unit can provide transportation capacity for goods but may or may not move by itself.

TransportationUnitResourceInformation includes the following entities: TransportationStageAssignment, AttachedEquipment, Quantity, Seal, BusinessTransactionDocumentReference, TextCollection, Party, Location, and DangerousGoods. The structure of TransportationUnitResourceInformation includes the following elements: ID, ResourceNumberValue, ResourceID, ResourceHomeCountryCode, TransportationUnitResourceCategoryCode, TransportationUnitResourceTypeCode, FillLevelCode, ShippingTypeCode, HaulageArrangerCode, TransportationHandlingInstructionCode, and TransportationHandlingInstructionNote. ID can be a unique identifier for a resource information, and can be based on GDT ResourceInformationID. ResourceNumberValue can be a number of resources, and can be based on GDT: NumberValue, Qualifier: Resource.

ResourceID can be a unique identifier for a resource, and can be based on GDT: ResourceID. ResourceHomeCountryCode can be a coded representation of the home country of a resource. ResourceHomeCountryCode can be based on GDT: CountryCode, Qualifier: ResourceHome. TransportationUnitResourceCategoryCode can be a coded representation of a category of transportation unit resources. TransportationUnitResourceCategoryCode can be based on GDT: TransportationUnitResourceCategoryCode. TransportationUnitResourceTypeCode can be a coded representation of a type of a transportation unit resource. TransportationUnitResourceTypeCode can be based on GDT: TransportationUnitResourceTypeCode. FillLevelCode can be a coded representation of a fill level of a resource. FillLevelCode can be based on GDT: FillLevelCode. ShippingTypeCode can be a coded representation of a shipping type.

A shipping type can specify how planning and execution of a transportation may be performed. Transportation terms include detailed specifications on agreed means of transportation, such as shipping or transport type and means of transport to be used. The ShippingTypeCode can be based on GDT: ShippingTypeCode. HaulageArrangerCode can be a coded representation of an arranger of a haulage. Haulage can be inland transport of cargo. HaulageArrangerCode can be based on GDT: HaulageArrangerCode. TransportationHandlingInstructionCode can be a coded representation of the type of a transportation handling instruction. TransportationHandlingInstructionCode can be based on GDT: TransportationHandlingInstructionCode. TransportationHandlingInstructionNote can be a note regarding a transportation handling instruction. TransportationHandlingInstructionNote can be based on GDT: LONG_Note, Qualifier: TransportationHandlingInstruction.

A PackageInformation package can describe package information related to a whole shipment order. A PackageInformation package includes the following entities: ItemAssignment, TransportationUnitResourceInformationAssignment, and Quantity. The structure of PackageInformation includes ID, PackageID, PackageOrdinalNumberValue, PackageNumberValue, PackageTypeCode, PackagingLevelCode, PackageMarkingInstructionCode, and PredecessorPackageID. ID can be a unique identifier for a package information, and can be based on GDT: PackageInformationID. PackageID can be a unique identifier of a package used in a packaging, and can be based on GDT: PackageID. PackageOrdinalNumberValue can be an ordinal number to indicate a position of a package in a set of packages. In a transportation document, a position of a package can be a position that has been specified at shipping time.

PackageOrdinalNumberValue can be based on GDT:OrdinalNumberValue, Qualifier: Package. PackageNumberValue can be the number of packages used in a packaging. PackageNumberValue can be based on GDT: NumberValue, Qualifier: Package. PackageTypeCode can be a coded representation of a type of a package, and can be based on GDT: PackageTypeCode. PackagingLevelCode can be a coded representation of a packaging level. A packaging level can specify a rank of a packaging in a packaging hierarchy. PackagingLevelCode can be based on GDT: PackagingLevelCode. PackageMarkingInstructionCode can be a coded representation of a marking instruction of a package, and can be based on GDT: PackageMarkingInstructionCode. PredecessorPackageID can be a unique identification of a related package, and can be based on GDT: PackageID. In some implementations, PredecessorPackageID may be filled in case a PackageID is available.

The TransportationChargesInformation package includes information regarding transportation charge calculation specific components related to a FreightOrder. The TransportationChargesInformation package includes the TransportationChargesInformation entity. The entity TransportationChargesInformation can define a relationship between transportation charges and an origin of these charges. TransportationChargesInformation includes the TransportationCharges entity. The structure of TransportationChargesInformation includes the following elements: TransportationChargesUsageCode, FreightOrderPartyStandardID, FreightOrderTransportationUnitResourceID, and FreightOrderTransportationStageID. TransportationChargesUsageCode can be a coded representation of usage of the TransportationCharges.

The usage points out if subsequent information represents a revenue view or cost view on transportation charges. TransportationChargesUsageCode can be based on GDT: TransportationChargesUsageCode. FreightOrderPartyStandardID can be a unique identifier of a Party in a FreightOrder. FreightOrderPartyStandardID can be based on GDT: PartyStandardID. FreightOrderTransportationUnitResourceID can be a unique identification of a TransportationUnitResource in a FreightOrder. FreightOrderTransportationUnitResourceID can be based on GDT: ResourceID. FreightOrderTransportationStageID can be a unique identification of a TransportationStage in a FreightOrder, and can be based on GDT: TransportationStageID. In some implementations, if none of the IDs is maintained, the transportation charges are related to an entire freight order.

An Item package includes information regarding products included in a shipment order and additional information on these products. The Item package includes the Item entity and the following packages: ItemInformation, LocationInformation, and TransportGoodsInformation. The structure of Item includes the following elements: ID, OriginCountryCode, DestinationCountryCode, ShippingTypeCode, HaulageArrangerCode, TemperatureMeasureInterval, and TransportationHandlingInstructionCode. ID can be a unique identifier of an Item in a shipment request, and can be based on GDT: BusinessTransactionDocumentItemID. OriginCountryCode can be a country of origin of goods that are considered in a shipment request.

OriginCountryCode can be based on GDT: CountryCode, Qualifier: Origin. DestinationCountryCode can be the ultimate country of destination of goods that are considered in a shipment request. DestinationCountryCode can be based on GDT: CountryCode, Qualifier: Destination. ShippingTypeCode can be a coded representation of a shipping type. A shipping type can specify how planning and execution of a transportation may be performed. Transportation terms include detailed specifications on agreed means of transportation, such as shipping or transport type and means of transport to be used. ShippingTypeCode can be based on GDT: ShippingTypeCode. HaulageArrangerCode can be a coded representation of an arranger of a haulage. Haulage can be inland transportation of cargo.

HaulageArrangerCode can be based on GDT: HaulageArrangerCode. TemperatureMeasureInterval can be an interval of temperature measures defined by a lower and an upper boundary and a measure type code. TemperatureMeasureInterval can be based on GDT: MeasureInterval, Qualifier: Temperature. TransportationHandlingInstructionCode can be a coded representation of a transportation handling instruction. TransportationHandlingInstructionCode can be based on GDT: TransportationHandlingInstructionNote. In some implementations, for a measure related to a temperature, the units of measurement Celsius and Fahrenheit are allowed.

Message Data Type FreightOrderExecutionStatusNotificationMessage

The message data type FreightOrderExecutionStatusNotificationMessage includes business information relevant for sending a business document in a message, and the FreightOrderExecution included in a business document. The message data type FreightOrderExecutionStatusNotificationMessage includes the MessageHeader and FreightOrderExecution packages. The message data type FreightOrderExecutionStatusNotificationMessage can provide a structure for the message type FreightOrderExecutionStatusNotification and for interfaces that are based on it.

A MessageHeader package can group together business information relevant for sending a business document in a message. The MessageHeader package includes the MessageHeader entity. A MessageHeader can group together business information from the perspective of the sending application to identify a business document in a message, to provide information about the sender, and to provide information about the recipient. The MessageHeader can be divided up into the SenderParty and RecipientParty entities. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with a message. A contact person can be useful if an additional infrastructure, such as a marketplace, is located between the sender and the recipient. The SenderParty can be used to transfer a message and can be ignored by the receiving application. SenderParty can be filled by the sender if the participating parties are not transferred with the FreightOrderExecution Package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with a message. This can be useful if an additional infrastructure, such as a marketplace, is located between the sender and the recipient. The RecipientParty can be used to transfer a message and can be ignored by the receiving application. RecipientParty can be filled by the sender if the FreightOrderExecution Package cannot be used to transfer the participating parties.

The FreightOrderExecution package can group the FreightOrderExecution together with its packages. The FreightOrderExecution package includes the FreightOrderExecution entity and the Confirmation package. The FreightOrderExecution interface can be used to delegate execution of planned transportation of goods, from shippers to consignees, to transportation execution processing of an ERP system. The attributes and elements located directly at the FreightOrder entity include @actioncode and ID. @actioncode can be a coded representation of an instruction to a message recipient describing how to process a transmitted element. @actioncode can be based on GDT: ActionCode. ID can be a unique identifier of a FreightOrder. ID can be based on GDT: BusinessTransactionDocumentID. In some implementations, the attribute @actioncode may only contain the two values “01—Create” and “02—Change”.

In some implementations, the ID is not changed once a FreightOrder has been created. In some implementations, the Complete Transmission Indicator is set to true, (i.e., the complete message content may be transmitted in every message). As a consequence, previously transferred data that is not sent with the change message may be deleted.

The Confirmation package can group the Confirmation with its packages. The Confirmation package includes the Confirmation entity and the HeaderInformation package. Confirmation can be a confirmation of an agreement between a transportation service provider and an ordering party on transportation of goods from a single ship-from party to a single ship-to party in accordance with agreed terms and conditions.

The HeaderInformation package can group dates, total values, document and references related to a freight order. The HeaderInformation package includes the following entities:

DateTimePeriods, NatureOfCargo, TotalQuantity, TotalAmount, TextCollection, and BusinessTransactionDocumentReference.

Message Data Type FreightOrderInvoicingPreparationRequestMessage

The message data type FreightOrderInvoicingPreparationRequestMessage includes business information relevant for sending a business document in a message, and the FreightOrderInvoicingPreparation included in a business document. The message data type FreightOrderInvoicingPreparationRequestMessage includes the MessageHeader and FreightOrderInvoicingPreparation packages. The message data type FreightOrderInvoicingPreparationRequestMessage can provide a structure for the message type FreightOrderInvoicingPreparationRequest and for interfaces that are based on it.

A MessageHeader package can group together business information relevant for sending a business document in a message. The MessageHeader package includes the MessageHeader entity. A MessageHeader can group together business information from the perspective of the sending application in order to identify a business document in a message, provide information about the sender, and provide information about the recipient. The MessageHeader can be divided up into the SenderParty and RecipientParty entities. The MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with a message. A contact person can be useful if an additional infrastructure, such as a marketplace, is located between the sender and the recipient. The SenderParty can be used to transfer a message and can be ignored by the receiving application. SenderParty can be filled by the sender if the participating parties are not transferred with the FreightOrderInvoicingPreparation Package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with a message. A contact person can be useful if an additional infrastructure, such as a marketplace, is located between the sender and the recipient. The RecipientParty can be used to transfer a message and can be ignored by the receiving application. RecipientParty can be filled by the sender if the FreightOrderInvoicingPreparation Package cannot be used to transfer the participating parties.

The FreightOrderInvoicingPreparation package can group the FreightOrderInvoicingPreparation with its packages. The FreightOrderInvoicingPreparation package includes the FreightOrderInvoicingPreparation entity and the Request package. A FreightOrderInvoicingPreparation can be used in purchase order processing for the preparation of supplier invoicing. The attributes and elements located directly at the FreightOrderInvoicingPreparation entity include @actioncode and ID. @actioncode can be a coded representation of an instruction to a message recipient describing how to process a transmitted element. @actioncode can be based on GDT: ActionCode. ID can be a unique identifier of a FreightOrder. ID can be based on GDT: BusinessTransactionDocumentID. In some implementations, the attribute @actioncode may include the two values "01—Create" and "02—Change".

The Request package can group a Request with its packages. The Request package includes the Request entity and the following packages: HeaderInformation, PartyInformation, TransportationChargesInformation, and ShipmentOrder.

The HeaderInformation package can group dates, total values, document and references related to freight order invoicing preparation. The HeaderInformation package includes the following entities: PurchaseBusinessArea, DateTimePeriods, NatureOfCargo, TotalQuantity, TotalAmount, TextCollection, and BusinessTransactionDocumentReference.

The PurchaseBusinessArea can be a purchase specific area within an enterprise. For example, a PurchaseBusinessArea can be a purchasing organization or purchasing group. The structure of PurchaseBusinessArea includes the PurchasingOrganisationID and PurchasingGroupID elements. PurchasingOrganisationID can be an identifier for a purchasing organisation, and can be based on GDT: OrganisationalCentreID. PurchasingGroupID can be an identifier for a purchasing group, and can be based on GDT: OrganisationalCentreID.

DateTimePeriods can specify a requested and an acceptable date, time and period applying to a shipment request (e.g. date and time of document issue). A requested period can be a period in which an event is requested to take place. An acceptable period can be a period in which an event may take place at an earliest start date/time to a latest end date/time. The elements located directly at the DateTimePeriods entity include RequestedFulfillmentPeriod, AcceptableFulfillmentPeriod, and PeriodRoleCode. RequestedFulfillmentPeriod can be a period which is requested depending on the semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on the semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

NatureOfCargo can indicate a nature of cargo related to a shipment request (e.g., palletized, containerized, documents). The structure of NatureOfCargo includes the ClassificationCode element. ClassificationCode can be a coded representation of a classification of a nature of cargo. ClassificationCode can be based on GDT: NatureOfCargoClassificationCode.

TotalQuantity can specify a total quantity which is related to a whole shipment request (e.g., total number of equipment, total number of items). The structure of TotalQuantity includes the elements Quantity, RoleCode, and TypeCode. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them can be filled.

TotalAmount can specify a cumulated monetary amount related to a shipment request (e.g., duty amount, insurance amount, total value). The structure of TotalAmount includes the Amount and RoleCode elements. Amount can be an amount with a corresponding currency unit, and can be based on CDT: Amount. RoleCode can be a coded representation of a role of an amount, and can be based on GDT: AmountRoleCode.

TextCollection can be a group of textual information that relates to a shipment request. The structure of TextCollection includes the TextCollection element. TextCollection can be based on GDT: TextCollection.

BusinessTransactionDocumentReference can specify a business document reference that is related to a whole shipment request. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of a documentation type. TransportationDocumentTypeCode can be based on GDT: TransportationDocumentTypeCode. TransportationDocumentNote can be a short Note on documentation, and can be based on GDT: SHORT_Note. TransportationDocumentID can be a unique identifier for a transportation document, and can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The PartyInformation package includes information regarding a party of freight order invoicing preparation (e.g., Shipper, Carrier, Agent). The PartyInformation package includes the Party entity. Party includes information exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. The Party entity includes the following entities: Amount, DateTimePeriods, TransportationDocumentInformation, and BusinessTransactionDocumentReference.

The structure of Party includes the elements Party, RoleCode, and FormattedName. A Party includes information exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations the party has regarding a business object and corresponding processes. In some implementations, a PartyRole is assigned to exactly one PartyRoleCategory and refines its semantics. RoleCode can be based on GDT: PartyRoleCode. FormattedName can be a complete, formatted name of a party, and can be based on GDT: LONG_Name, Qualifier: PartyFormatted.

BusinessTransactionDocumentReference can specify a business document reference that is related to a party. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item can have when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type. TransportationDocumentTypeCode can be based on GDT: TransportationDocumentTypeCode.

TransportationDocumentNote can be a short Note on documentation, and can be based on GDT: SHORT_Note. TransportationDocumentID can be a unique identifier for a transportation document, and can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The TransportationChargesInformation package includes information regarding transportation charge calculation specific components related to a FreightOrderInvoicingPreparation. The TransportationChargesInformation package includes the TransportationChargesInformation entity. The entity TransportationChargesInformation can define a relationship between transportation charges and an origin of these charges. The TransportationChargesInformation entity includes the TransportationCharges entity. The structure of TransportationChargesInformation includes the TransportationChargesUsageCode element. TransportationChargesUsageCode can be a coded representation of usage of the TransportationCharges. The usage can point out if subsequent information represents a revenue view or cost view on transportation charges. TransportationChargesUsageCode can be based on GDT: TransportationChargesUsageCode.

TransportationCharges can be a summary of determined transportation charge specific components for a transportation business case. TransportationCharges includes the following entities: Location, TextCollection, Currency, ExchangeRate, PercentElement, DateTimePeriod, BusinessTransactionDocumentReference, TaxDetail, PaymentInstruction, CashDiscountTerms, and Element. The structure of TransportationCharges includes the following elements: ID, FreightAgreementID, CalculationOriginCode, TariffID, and CalculationSheetID. ID can be a unique identifier of TransportationCharges in a ShipmentRequest, and can be based on GDT: TransportationChargesID. FreightAgreementID can be an identification of a Freight Agreement which includes and points to a configuration for a Transportation Charges Calculation.

FreightAgreementID can be based on GDT: FreightAgreementID. CalculationOriginCode can be a coded representation of an origin of a transportation charges calculation. The calculation can be done automatically based on system configuration. Data for a calculation, including results, can be manually entered or received from another business system via a message. In some implementations, there can be a clear distinction of the origin of TransportationChargesCalculation details such as the TransportationChargesCalculationSheet and its TransportationChargeElements. A distinction can give information whether the calculation was done completely automatically, or if results were manually adopted. CalculationOriginCode can be based on GDT: TransportationChargesOriginCode.

TariffID can be an identifier for a transportation charges tariff. A transportation charges tariff can be a specific combination of transportation charges calculation sheet and terms and conditions. Terms and conditions can define if a certain transportation charges calculation sheet and its related rates are applicable for a transportation business case. TariffID can be based on GDT: TransportationChargesTariffID. CalculationSheetID can be a unique identifier for a transportation charges calculation sheet. A TransportationChargesCalculationSheet can represent a configuration for how to calculate transportation charges for a transportation business case. A TransportationChargesCalculationSheet includes instructions describing which charges are applicable, which data from the transportation business case can be considered for a calculation, how the underlying transportation charge rates are determined, and which special calculation methods may be considered. CalculationSheetID can be based on GDT: TransportationChargesCalculationSheetID.

A ShipmentOrder package can specify or group together the data related to a Shipment Order which is assigned to a freight order invoicing preparation. A ShipmentOrder package includes the ShipmentOrder entity and the Request package. ShipmentOrder can be an agreement between an ordering party and a transportation service provider on the shipment of goods from a single shipper to a single consignee in accordance with agreed terms and conditions. The structure of ShipmentOrder includes the ID element. ID can be a unique identifier of a ShipmentOrder, and can be based on GDT: BusinessTransactionDocumentID.

The Request package can group a Request with its packages. The Request package includes the Request entity and the following packages: HeaderInformation, PartyInformation, LocationInformation, TransportationStageInformation, TransportationUnitResourceInformation, PackageInformation, TransportationChargesInformation, and Item. In some implementations, the Request package is filled for all of the shipment orders which are assigned to a freight order invoicing preparation. Request can be an agreement between a transportation service provider and an ordering party on the transportation of goods from a single ship-from party to a single ship-to party in accordance with agreed terms and conditions. The elements located directly at the Request entity include DeliveryTerms. DeliveryTerms can be a collection of conditions and agreements that apply when delivering ordered goods and providing services and activities. DeliveryTerms can be based on GDT: DeliveryTerms.

The HeaderInformation package can group dates, total values, document and references related to a shipment order. The HeaderInformation package includes the following entities: DateTimePeriods, NatureOfCargo, TotalQuantity, TotalAmount, TextCollection, TransportationServiceRequirement, and BusinessTransactionDocumentReference.

DateTimePeriods can specify a requested and an acceptable date, time and period applying to a shipment request (e.g. date and time of document issue). A requested period can be a period in which an event is requested to take place. An acceptable period can be a period in which an event may take place at an earliest start date/time to a latest end date/time. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

NatureOfCargo can indicate a nature of cargo related to a shipment request (e.g., palletized, containerized, documents). The structure of NatureOfCargo includes the element ClassificationCode. ClassificationCode can be a coded representation of a classification of a nature of cargo. ClassificationCode can be based on GDT: NatureOfCargoClassificationCode.

TotalQuantity can specify a total quantity which is related to a whole shipment request (e.g., total number of equipment, total number of items). The structure of TotalQuantity includes the following elements: Quantity, RoleCode, and TypeCode. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them may be filled.

TotalAmount can specify a cumulated monetary amount related to a shipment request (e.g., duty amount, insurance amount, total value). The structure of TotalAmount includes the elements Amount and RoleCode. Amount can be an amount with a corresponding currency unit, and can be based on CDT: Amount. RoleCode can be a coded representation of a role of an amount, and can be based on GDT: AmountRoleCode.

TextCollection can be a group of textual information that relates to a shipment request. TextCollection includes the element TextCollection. TextCollection can be based on GDT: TextCollection.

TransportationServiceRequirement can specify a contract and carriage condition and service and priority requirements for a transport which apply to a whole shipment request. The structure of TransportationServiceRequirement includes the following elements: TransportationServiceRequirementCode, AdditionalTransportationServiceRequirementCode, TransportationContractConditionCode, TransportServiceLevelCode, and NatureOfCargoClassificationCode. TransportationServiceRequirementCode can be a coded representation of a requirement related to a transportation service, and can be based on GDT: TransportationServiceRequirementCode. AdditionalTransportationServiceRequirementCode can be a coded representation of an additional requirement related to a transportation service, and can be based on GDT : TransportationServiceRequirementCode, Qualifier: Additional. TransportationContractConditionCode can be a coded representation of a contract and carriage condition, and can be based on GDT: TransportationContractConditionCode.

TransportServiceLevelCode can be a coded representation of agreed or defined services in terms of the delivery of goods with respect to the speed of the delivery. TransportServiceLevelCode can be based on GDT : TransportServiceLevelCode. NatureOfCargoClassificationCode can be a coded representation of a classification of a nature of cargo. NatureOfCargoClassificationCode can be based on GDT : NatureOfCargoClassificationCode.

BusinessTransactionDocumentReference can specify a business document reference that is related to a whole shipment request. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item can have when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of a type of a documentation. TransportationDocumentTypeCode can be based on GDT: TransportationDocumentTypeCode. TransportationDocumentNote can be a short Note on documentation, and can be based on GDT: SHORT_Note. TransportationDocumentID can be a unique identifier for a transportation document, and can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The PartyInformation package includes information regarding a party of a shipment request (e.g., Shipper, Carrier, Agent). The PartyInformation package includes the Party entity. Party includes information exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. The Party entity includes the following entities: Amount, DateTimePeriods, TransportationDocumentInformation, and BusinessTransactionDocumentReference.

The structure of the Party entity includes the Party, RoleCode, and FormattedName elements. A Party includes information exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations the party has regarding a business object and corresponding processes. In some implementations, a PartyRole is assigned to exactly one PartyRoleCategory and refines its semantics. RoleCode can be based on GDT: PartyRoleCode. FormattedName can be a complete, formatted name of a party, and can be based on GDT: LONG_Name, Qualifier: PartyFormatted.

BusinessTransactionDocumentReference can specify a business document reference that is related to a whole shipment request. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item can have when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short Note on documentation, and can be based on GDT: SHORT_Note. TransportationDocumentID can be a unique identifier for a transportation document, and can be based on GDT: TransportationDocumentID. RelationshipTypeCode and RelationshipRoleCode are both optional. In some implementations, if used, both maybe filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

The LocationInformation package includes information regarding a location of the shipment order (e.g., Ship-from location). The LocationInformation package includes the Location entity. Location can specify a physical place that a shipment request refers as relevant for the processing of the shipment request. The LocationInformation package includes the DateTimePeriods entity. The structure of Location includes the elements Location, RoleCode, TypeCode, and Name. Location includes information exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location. TypeCode can be based on GDT: LocationTypeCode. Name can be a name of a location, and can be based on GDT: MEDIUM_Name, Qualifier:Location.

The TransportationStageInformation package includes information regarding a transportation stage of a shipment order. A transportation stage can represent a section of a transport. The TransportationStageInformation package includes the TransportationStage entity. TransportationStage can specify details related to a stage of a transport which is part of a shipment order. TransportationStage includes the following entities: Location, BusinessTransactionDocumentReference, and TransportationServiceRequirement. The structure of TransportationStage includes the following elements: ID, OrdinalNumberValue, TypeCode, JourneyID, TransportModeCode, TransportMeansDescriptionCode, TransportMeansDescription, TransportMeansID, TransportMeansHomeCountryCode, TransportMeansOwnershipTypeCode, CarrierStandardID, CarrierFormattedName, TransportationTransitDirectionCode, CalculatedDistanceMeasure, and GivenDistanceMeasure.

ID can be a unique identifier of a stage in a shipment request, and can be based on GDT: TransportationStageID. OrdinalNumberValue can be an ordinal number to indicate a position of a transportation stage in a set of transportation stages. OrdinalNumberValue can be based on GDT: OrdinalNumberValue, Qualifier: TransportationStage. TypeCode can be a coded representation of a type of a TransportationStage, and can be based on GDT: TransportationStageTypeCode. JourneyID can be an identifier of a Journey, and can be based on GDT: JourneyID. TransportModeCode can be a coded representation of a mode of transportation used for delivery, and can be based on GDT: TransportModeCode. TransportMeansDescriptionCode can be a coded representation of a transport means type with which goods or persons are to be transported. TransportMeansDescriptionCode can be based on GDT: TransportMeansDescriptionCode. TransportMeansDescription can be a description of a means of transport, and can be based on GDT: SHORT_Description, Qualifier: TransportMeans. TransportMeansID can be a unique identifier of a means of transport, and can be based on GDT: TransportMeansID.

TransportMeansHomeCountryCode can be a coded representation of the home country of a transport means. TransportMeansHomeCountryCode can be based on GDT: CountryCode, Qualifier: TransportMeansHome. TransportMeansOwnershipTypeCode can be a coded representation of the type of ownership for a means of transport, and can be based on GDT: TransportMeansOwnershipTypeCode. CarrierStandardID can be a standard identifier of a carrier, and can be based on GDT: PartyStandardID. CarrierFormattedName can be a name of a carrier, and can be based on GDT: LONG_Name, Qualifier: PartyFormatted. TransportationTransitDirectionCode can be a coded representation for a transportation transit direction. TransportationTransitDirectionCode can be based on GDT: TransportationTransitDirectionCode. CalculatedDistanceMeasure can be a calculated distance measure, and can be based on GDT: Measure, Qualifier: CalculatedDistance. GivenDistanceMeasure can be a given distance measure, and can be based on GDT: Measure, Qualifier: GivenDistance.

StageLocation can specify a physical place related to a stage. StageLocation includes the DateTimePeriods entity. The structure of StageLocation includes the elements Location, RoleCode, TypeCode, and Name. Location includes information exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location, and can be based on GDT: LocationTypeCode. Name can be a name of a location, and can be based on GDT: MEDIUM_Name, Qualifier:Location.

BusinessTransactionDocumentReference can specify a business document reference that is related to a Stage. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item can have when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short Note on documentation, and can be based on GDT: SHORT_Note. TransportationDocumentID can be a unique identifier for a transportation document, and can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

TransportationServiceRequirement can specify a contract and carriage condition and service and priority requirements related to a stage. The structure of TransportationServiceRequirement includes the following elements: TransportationServiceRequirementCode, AdditionalTransportationServiceRequirementCode, TransportationContractConditionCode, TransportServiceLevelCode, and NatureOfCargoClassificationCode. TransportationServiceRequirementCode can be a coded representation of a requirement related to a transportation service, and can be based on GDT: TransportationServiceRequirementCode.

AdditionalTransportationServiceRequirementCode can be a coded representation of an additional requirement related to a transportation service, and can be based on GDT: TransportationServiceRequirementCode, Qualifier: Additional. TransportationContractConditionCode can be a coded representation of a contract and carriage condition, and can be based on GDT: TransportationContractConditionCode. TransportServiceLevelCode can be a coded representation of agreed or defined services in terms of the delivery of goods with respect to the speed of the delivery. TransportServiceLevelCode can be based on GDT : TransportServiceLevelCode. NatureOfCargoClassificationCode can be a coded representation of a classification of a nature of cargo, and can be based on GDT : NatureOfCargoClassificationCode.

The TransportationUnitResourceInformation package includes information regarding a transportation unit resource that is relevant for a shipment order (e.g., a container). The TransportationUnitResourceInformation package includes the TransportationUnitResourceInformation entity. TransportationUnitResourceInformation can include information on one or more transportation unit resources, such as a resource type and related properties, or related measures, or handling instructions. A Transportation Unit Resource can be a unit into which goods are loaded and/or from which goods are unloaded. In some implementations, this unit can provide transportation capacity for goods but may or may not move by itself. TransportationUnitResourceInformation includes the following entities: TransportationStageAssignment, AttachedEquipment, Quantity, Seal, BusinessTransactionDocumentReference, Location, and DangerousGoods.

The structure of TransportationUnitResourceInformation includes the following elements: ID, ResourceNumberValue, ResourceID, ResourceHomeCountryCode, TransportationUnitResourceCategoryCode, TransportationUnitResourceTypeCode, FillLevelCode, ShippingTypeCode, HaulageArrangerCode, TransportationHandlingInstructionCode, and TransportationHandlingInstructionNote. ID can be a unique identifier for a resource information, and can be based on GDT ResourceInformationID. ResourceNumberValue can be a count of resources, and can be based on GDT: NumberValue, Qualifier: Resource. ResourceID can be a unique identifier for a resource, and can be based on GDT: ResourceID.

ResourceHomeCountryCode can be a coded representation of the home country of a resource, and can be based on GDT: CountryCode, Qualifier: ResourceHome. TransportationUnitResourceCategoryCode can be a coded representation of a category of transportation unit resources, and can be based on GDT: TransportationUnitResourceCategoryCode. TransportationUnitResourceTypeCode can be a coded representation of a type of a transportation unit resource, and can be based on GDT: TransportationUnitResourceTypeCode. FillLevelCode can be a coded representation of a fill level of a resource, and can be based on GDT: FillLevelCode. ShippingTypeCode can be a coded representation of a shipping type. A shipping type can specify how planning and execution of a transportation can be performed.

Transportation terms include detailed specifications on agreed means of transportation, such as shipping or transport type and means of transport to be used. ShippingTypeCode can be based on GDT: ShippingTypeCode. HaulageArrangerCode can be a coded representation of an arranger of a haulage. Haulage can be an inland transport of cargo. HaulageArrangerCode can be based on GDT: HaulageArrangerCode. TransportationHandlingInstructionCode can be a coded representation of a type of a transportation handling instruction, and can be based on GDT: TransportationHandlingInstructionCode. TransportationHandlingInstructionNote can be a note regarding a transportation handling instruction, and can be based on GDT: LONG_Note, Qualifier: TransportationHandlingInstruction.

TransportationStageAssignment can specify an assignment of a transportation stage to a transportation unit resource information. The structure of the TransportationStageAssignment includes the ShipmentOrderTransportationStageID element. ShipmentOrderTransportationStageID can be a unique identifier of a TransportationStage in a shipment request, and can be based on GDT: TransportationStageID.

AttachedEquipment can specify equipment attached to a TransportationUnitResource. The structure of AttachedEquipment includes the element ShipmentOrderResourceInformationID. ShipmentOrderResourceInformationID can be a unique identifier of a resource information in a Shipment Order, and can be based on GDT: ResourceInformationID.

Quantity can specify a quantity related to TransportationUnitResourceInformation. The structure of the Quantity entity includes the Quantity, RoleCode and TypeCode elements. Quantity can be a non-monetary numerical specification of an amount in a unit of measurement, and can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon, and can be based on GDT: QuantityTypeCode. In some implementations, QuantityRoleCode and QuantityTypeCode are optional, but in every instance one of them may be filled.

Seal can specify a seal related to a TransportationUnitResource. The structure of Seal includes the following elements: ID, PartyRoleCode, PartyFormattedName, and StatusCode.

ID can be a unique identifier of a seal, and can be based on GDT: SealID. PartyRoleCode can be a coded representation of a party role, and can be based on GDT: PartyRoleCode. PartyFormattedName can be a complete, formatted name of a party, or the name of a SealingParty. PartyFormattedName can be based on GDT: LONG_Name, Qualifier: PartyFormatted. StatusCode can be a coded representation of a status of a seal, and can be based on GDT: SealStatusCode.

BusinessTransactionDocumentReference can specify a business document reference that is related to a Stage. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item can have when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short Note on documentation, and can be based on GDT: SHORT_Note. TransportationDocumentID can be a unique identifier for a transportation document, and can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

Location can specify a physical place related to the TransportationUnitResource. The structure of Location includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location. TypeCode can be based on GDT: LocationTypeCode. Name can be a name of a location, and can be based on GDT: MEDIUM_Name, Qualifier:Location.

DangerousGoods can specify dangerous goods included in a resource. DangerousGoods includes the ContactInformation and TextCollection entities. The structure of DangerousGoods includes the following elements: ID, RegulationsCode, HazardCode, FlashpointMeasureInterval, PackagingGroupCode, EmergencySchedule, TransportEmergencyCardCode, DangerousGoodsLabelCode, DangerousGoodsLabelCode2, DangerousGoodsLabelCode3, PackagingInstructionTypeCode, TransportMeansDescriptionCode, and TransportAuthorisationCode. ID can be a unique identifier for a dangerous good, using the United Nations Dangerous Goods Number. ID can be based on GDT: DangerousGoodsID. RegulationsCode can be a coded representation of national or international dangerous goods rules or regulations, and can be based on GDT: DangerousGoodsRegulationsCode.

HazardCode can be a coded representation of a hazard that is imminent in a dangerous good, and can be based on GDT: DangerousGoodsHazardCode. FlashpointMeasureInterval can be an interval of measures defined by a lower and an upper boundary indicating a flashpoint of a dangerous good, and can be based on GDT: MeasureInterval, Qualifier: Flashpoint. PackagingGroupCode can be a coded representation of the effectiveness of a packaging to transport dangerous goods depending on a degree of danger of the goods. PackagingGroupCode can be based on GDT: DangerousGoodsPackagingGroupCode. EmergencySchedule can be a coded representation of an emergency schedule for dangerous goods. EmergencySchedule identifies an emergency schedule. The DangerousGoodsEmergencySchedule can be used for transports of dangerous goods by sea similar to the Transport Emergency Card which is used for transports of dangerous goods by road.

EmergencySchedule can be based on GDT: DangerousGoodsEmergencySchedule. TransportEmergencyCardCode can be a coded representation of a transport emergency card which specifies how to react in case of an accident, and can be based on GDT: TransportEmergencyCardCode. DangerousGoodsLabelCode can be a coded representation of a label for a dangerous good. In some implementations, DangerousGoodsLabelCode's values are dependant on the DangerousGoodsRegulationsCode. DangerousGoodsLabelCode can be based on GDT: DangerousGoodsLabelCode. DangerousGoodsLabelCode2 can be a coded representation of a label for a dangerous good. In some implementations, DangerousGoodsLabelCode's values are dependant on the DangerousGoodsRegulationsCode. DangerousGoodsLabelCode2 can be based on GDT: DangerousGoodsLabelCode.

DangerousGoodsLabelCode3 can be a coded representation of a label for a dangerous good. In some implementations, DangerousGoodsLabelCode's values are dependant on the DangerousGoodsRegulationsCode. DangerousGoodsLabelCode3 can be based on GDT: DangerousGoodsLabelCode. PackagingInstructionTypeCode can be a coded representation of a packaging instruction. In some implementations, a packaging instruction is an instruction defining which packagings may be used to pack a dangerous good. PackagingInstructionTypeCode can be based on GDT: PackagingInstructionTypeCode. TransportMeansDescriptionCode can be a coded representation of a transport means type with which goods or persons are to be transported, and can be based on GDT: TransportMeansDescriptionCode. TransportAuthorisationCode can be a coded representation of an authorisation for a transportation of dangerous goods. This code can specify an authorisation for the transportation of a particular dangerous good. TransportAuthorisationCode can be based on GDT: DangerousGoodsTransportAuthorisationCode.

The PackageInformation package can describe package information related to a whole shipment order. The Package- Information package includes the ItemAssignment, TransportationUnitResourceInformationAssignment, and Quantity entities.

The structure of PackageInformation includes the following elements: ID, PackageID, PackageOrdinalNumberValue, PackageNumberValue, PackageTypeCode, PackagingLevelCode, PackageMarkingInstructionCode, and PredecessorPackageID. ID can be a unique identifier for a package information, and can be based on GDT: PackageInformationID. PackageID can be a unique identifier of a package used in this packaging, and can be based on GDT: PackageID. PackageOrdinalNumberValue can be an ordinal number indicating a position of a package in a set of packages. In a transportation document, the position of a package is one that has been specified at shipping time. PackageOrdinalNumberValue can be based on GDT:OrdinalNumberValue, Qualifier: Package.

PackageNumberValue can be a count of the number of packages used in a packaging, and can be based on GDT: NumberValue, Qualifier: Package. PackageTypeCode can be a coded representation of a type of a package, and can be based on GDT: PackageTypeCode. PackagingLevelCode can be a coded representation of a packaging level. A packaging level can specify a rank of packaging in a packaging hierarchy. PackagingLevelCode can be based on GDT: PackagingLevelCode. PackageMarkingInstructionCode can be a coded representation of a marking instruction of a package, and can be based on GDT: PackageMarkingInstructionCode. PredecessorPackageID can be a unique identification of a related package, and can be based on GDT: PackageID. In some implementations, PredecessorPackageID may be filled in case a PackageID is available.

ItemAssignment can specify an assignment of a packaging to an item with corresponding information on quantities. ItemAssignment includes the Quantity entity. The structure of ItemAssignment includes the element ShipmentOrderItemID. ShipmentOrderItemID can be a unique identifier of an item of a ShipmentOrder, and can be based on GDT: BusinessTransactionDocumentItemID.

Quantity can specify a quantity related to an assignment of a packaging to an item. The structure of the Quantity entity includes the following elements: Quantity, RoleCode, and TypeCode. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them may be filled.

TransportationUnitResourceInformationAssignment can specify an assignment of a packaging to a TransportationUnitResourceInformation with corresponding quantity information. The structure of TransportationUnitResourceInformationAssignment includes the element ShipmentOrderResourceInformationID. ShipmentOrderResourceInformationID can be a unique identifier of a TransportationUnitResourceInformation in a shipment order. ShipmentOrderResourceInformationID can be based on GDT: ResourceInformationID.

Quantity can specify a quantity related to a TransportationUnitResourceAssignment. The structure of the Quantity entity includes the Quantity, RoleCode, and TypeCode elements. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them can be filled.

The TransportationChargesInformation package includes information regarding transportation charge calculation specific components related to a ShipmentOrder. The TransportationChargesInformation package includes the TransportationChargesInformation entity. The TransportationChargesInformation entity can define a relationship between transportation charges and an origin of these charges. The TransportationChargesInformation entity includes the TransportationCharges entity. The structure of TransportationChargesInformation includes the following elements: TransportationChargesUsageCode, ShipmentOrderItemID, ShipmentOrderResourceInformationID, ShipmentOrderPackageInformationID, and ShipmentOrderTransportationStageID. TransportationChargesUsageCode can be a coded representation of a usage of TransportationCharges.

A usage can point out if subsequent information represents a revenue- or cost-view on transportation charges. TransportationChargesUsageCode can be based on GDT: TransportationChargesUsageCode. ShipmentOrderItemID can be a unique identifier of an Item in a ShipmentOrder, and can be based on GDT: BusinessTransactionDocumentItemID. ShipmentOrderResourceInformationID can be a unique identification of a TransportationUnitResource in a ShipmentOrder, and can be based on GDT: ResourceInformationID. ShipmentOrderPackageInformationID can be a unique identification of a PackageInformation in a ShipmentOrder, and can be based on GDT: PackageInformationID. ShipmentOrderTransportationStageID can be a unique identification of a TransportationStage in a ShipmentOrder, and can be based on GDT: TransportationStageID. In some implementations, if none of the identifiers is maintained, transportation charges are related to a whole shipment order.

TransportationCharges can be a summary of determined transportation charge specific components for a transportation business case. TransportationCharges includes the following entities: Location, TextCollection, Currency, ExchangeRate, PercentElement, DateTimePeriod, BusinessTransactionDocumentReference, TaxDetail, PaymentInstruction, CashDiscountTerms, and Element. The structure of TransportationCharges includes the following elements: ID, FreightAgreementID, CalculationOriginCode, TariffID, and CalculationSheetID. ID can be a unique identifier of TransportationCharges in a ShipmentRequest, and can be based on GDT: TransportationChargesID. FreightAgreementID can be an identification of a Freight Agreement which includes and points to a configuration for a Transportation Charges Calculation.

FreightAgreementID can be based on GDT: FreightAgreementID. CalculationOriginCode can be a coded representation of an origin of a transportation charges calculation. A calculation can be done automatically based on a system configuration. All necessary data for a calculation, including results, can be manually entered or received from another business system via a message. In some implementations, there may be a clear distinction of an origin of TransportationChargesCalculation details like a TransportationChargesCalculationSheet and its TransportationChargeElements. A distinction can give information whether a calculation was done completely automatically, or if results were manually adopted. CalculationOriginCode can be based on GDT: TransportationChargesOriginCode. TariffID can be an identifier for a transportation charges tariff.

A transportation charges tariff can be a specific combination of transportation charges calculation sheet and terms and conditions. Terms and conditions can define if a certain transportation charges calculation sheet and its related rates are applicable for a transportation business case. TariffID can be based on GDT: TransportationChargesTariffID. CalculationSheetID can be a unique Identifier for a transportation charges calculation sheet. A TransportationChargesCalculationSheet can represent a configuration to calculate transportation charges for a transportation business case. A TransportationChargesCalculationSheet includes instructions describing which charges are applicable, which data from a transportation business case may be considered for a calculation, how the underlying transportation charge rates are determined, and which special calculation methods may be considered. CalculationSheetID can be based on GDT: TransportationChargesCalculationSheetID.

The Item package includes information regarding products included in a shipment order and additional information on these products. The Item package includes the Item entity and the following packages: ItemInformation, LocationInformation, and TransportGoodsInformation. Item can specify products included in a shipment request and additional information about these products. The structure of Item includes the following elements: ID, OriginCountryCode, DestinationCountryCode, ShippingTypeCode, HaulageArrangerCode, TemperatureMeasureInterval, TransportationHandlingInstructionCode, and TransportationHandlingInstructionNote. ID can be a unique identifier of an Item in a shipment request, and can be based on GDT: BusinessTransactionDocumentItemID. OriginCountryCode can be a country of origin of goods that are considered in a shipment request.

OriginCountryCode can be based on GDT: CountryCode, Qualifier: Origin. DestinationCountryCode can be the ultimate country of destination of goods that are considered in a shipment request. DestinationCountryCode can be based on GDT: CountryCode, Qualifier: Destination. ShippingTypeCode can be a coded representation of a shipping type. A shipping type can specify how planning and execution of a transportation can be performed. Transportation terms include detailed specifications on agreed means of transportation, such as shipping or transport type and means of transport to be used. ShippingTypeCode can be based on GDT: ShippingTypeCode. HaulageArrangerCode can be a coded representation of an arranger of a haulage. Haulage can be inland transportation of cargo.

HaulageArrangerCode can be based on GDT: HaulageArrangerCode. TemperatureMeasureInterval can be an interval of temperature measures defined by a lower and an upper boundary and a measure type code. TemperatureMeasureInterval can be based on GDT: MeasureInterval, Qualifier: Temperature. TransportationHandlingInstructionCode can be a coded representation of a transportation handling instruction. TransportationHandlingInstructionCode can be based on GDT: TransportationHandlingInstructionCode. TransportationHandlingInstructionNote can be a note regarding a transportation handling instruction, and can be based on GDT: TransportationHandlingInstructionNote. In some implementations, for a measure related to a temperature, the units of measurement Celsius and Fahrenheit are allowed.

The ItemInformation package can specify products included in a shipment order and additional information related to the transportation of these products. The ItemInformation package includes the following entities: Amount, TextCollection, NatureOfCargo, Quantity, BusinessTransactionDocumentReference, DangerousGoods, TransportationStageAssignment, and TransportationUnitResourceInformationAssignment.

An Amount can specify a monetary amount associated with an item, such as a declared value, or insured value. The structure of the Amount entity includes the Amount and RoleCode elements. Amount can be an amount with a corresponding currency unit, and can be based on CDT: Amount. RoleCode can be a coded representation of a role of an amount, and can be based on GDT: AmountRoleCode.

TextCollection can be a group of textual information that relates to an item. The structure of the TextCollection entity includes the element TextCollection. TextCollection can be based on GDT: TextCollection. NatureOfCargo can indicate a nature of cargo related to an item (e.g., palletized, containerized, documents). The structure of NatureOfCargo includes the element ClassificationCode. ClassificationCode can be a coded representation of a classification of a nature of cargo. ClassificationCode can be based on GDT: NatureOfCargoClassificationCode.

Quantity can specify a quantity related to an item. The structure of the Quantity entity includes the elements Quantity, RoleCode, and TypeCode. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode.

In some implementations, QuantityRoleCode and QuantityTypeCode are optional, but in every instance one of them may be filled. BusinessTransactionDocumentReference can specify a business document reference that is related to an item. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item can have when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of the type of a documentation. TransportationDocumentTypeCode can be based on GDT: TransportationDocumentTypeCode. TransportationDocumentNote can be a short Note on documentation, and can be based on GDT: SHORT_Note. TransportationDocumentID can be a unique identifier for a transportation document, and can be based on GDT: TransportationDocumentID. RelationshipTypeCode and RelationshipRoleCode are both optional. In some implementations, if used, both can be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

DangerousGoods can specify the identification, description and classification of dangerous goods related to an item. DangerousGoods includes the following entities: Quantity, TextCollection, and TransportationUnitResourceInformationAssignment.

Quantity can specify a quantity of DangerousGoods. The structure of Quantity includes the following elements: Quantity, RoleCode, and TypeCode. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them can be filled.

TextCollection can be a group of textual information that relates to ItemDangerousGoods. The structure of the TextCollection entity includes the TextCollection element. TextCollection can be based on GDT: TextCollection.

TransportationUnitResourceAssignment can specify an assignment of dangerous goods of an item to a TransportationUnitResource with corresponding quantity information. TransportationUnitResourceAssignment includes the Quantity entity. The structure of TransportationUnitResourceInformationAssignment includes the ShipmentOrderResourceInformationID element. ShipmentOrderResourceInformationID can be a unique identifier of a TransportationUnitResource. ShipmentOrderResourceInformationID can be based on GDT: ResourceInformationID.

Quantity can specify a quantity related to dangerous goods assigned to a Resource. The structure of the Quantity entity includes the Quantity, RoleCode, and TypeCode elements. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them has to be filled.

The TransportationStageAssignment can specify the assignment of an item to a transportation stage with corresponding quantity information. The structure of TransportationStageAssignment includes the element ShipmentOrderTransportationStageID. ShipmentOrderTransportationStageID can be a unique identifier of a TransportationStage. ShipmentOrderTransportationStageID can be based on GDT: TransportationStageID.

The Quantity can specify a quantity related to an item assigned to a transportation stage. The structure of the Quantity entity includes the Quantity, RoleCode and TypeCode elements. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them can be filled.

TransportationUnitResourceInformationAssignment can specify an assignment of an item to a transportation unit resource information with corresponding quantity information. TransportationUnitResourceInformationAssignment includes the Quantity entity. The structure of TransportationUnitResourceInformationAssignment includes the ShipmentOrderTransportationUnitResourceID element. ShipmentOrderTransportationUnitResourceID can be a unique identifier of a TransportationUnitResource, and can be based on GDT: ResourceID.

Quantity can specify a quantity related to an item which is assigned to a TransportationUnitResource. The structure of the Quantity entity includes the Quantity, RoleCode and TypeCode elements. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them can be filled.

The ItemLocationInformation package includes information regarding a location that is related to an item. ItemLocationInformation includes the Location entity. Location can specify a physical place which is part of a shipment request item. Location includes the DateTimePeriods entity. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location. TypeCode can be based on GDT: LocationTypeCode. Name can be a name of a location, and can be based on GDT: MEDIUM_Name, Qualifier:Location.

The TransportationGoodsInformation package can group information on goods that are to be transported according to an item. The TransportationGoodsInformation package includes the ProductInformation and TransportationGoodsIdentification entities. ProductInformation includes information on a commodity that is the object of a business activity of a company and serves to generate value for the company. ProductInformation can be tangible or intangible. A product can have relationships to other products or objects. For example, there can be a service for a specially manufactured product.

The structure of ProductInformation includes the Product and ProductDescription elements. Product includes information exchanged, in accordance with common business understanding, in business documents, about a product. Product can be based on GDT: BusinessTransactionDocumentProduct. ProductDescription can be a natural-language representation of properties of a product. ProductDescription can be based on GDT: SHORT_Description, Qualifier: Product. TransportationGoodsIdentification can describe content identification related to a PackagingItem. The structure of TransportationGoodsIdentification includes the elements: TransportationGoodsIdentifierTypeCode, LowerBoundaryTransportationGoodsID, and UpperBoundaryTransportationGoodsID. TransportationGoodsIdentifierTypeCode can be a coded representation of a type of identifier for transportation goods. Goods can be movable property, merchandise or wares, to name a few examples.

Transportation Goods can be goods that are to be transported. TransportationGoodsIdentifierTypeCode can be based on GDT: TransportationGoodsIdentifierTypeCode. LowerBoundaryTransportationGoodsID can be a lower boundary of a TransportationGoodsID interval. In some implementations, LowerBoundaryTransportationGoodsID may also be used for intervals that contain a single value. LowerBoundaryTransportationGoodsID can be based on GDT: TransportationGoodsID, Qualifier: LowerBoundary. UpperBoundaryTransportationGoodsID can be an upper boundary of a TransportationGoodsID interval. UpperBoundaryTransportationGoodsID can be based on GDT: TransportationGoodsID, Qualifier: UpperBoundary.

Message Data Type FreightOrderInvoicingPreparationCancelRequestMessage The message data type FreightOrderInvoicingPreparationCancelRequestMessage can group together business information relevant for sending a business document in a message, and the FreightOrderInvoicingPreparation object in a business document. The message data type FreightOrderInvoicingPreparationCancelRequestMessage includes the MessageHeader and FreightOrderInvoicingPreparation packages. The message data type FreightOrderInvoicingPreparationCancelRequestMessage can provide a structure for the message type FreightOrderInvoicingPreparationCancelRequest and the interfaces that are based on it.

A MessageHeader package can group together business information relevant for sending a business document in a message. The MessageHeader package includes the MessageHeader entity. A MessageHeader can group together business information from the perspective of the sending application to identify a business document in a message, to provide information about the sender, or to provide information about the recipient. The MessageHeader can be divided up into the SenderParty and RecipientParty entities. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with the message. A contact person can be useful if an additional infrastructure, such as a marketplace, is located between the sender and the recipient. The SenderParty can be used to transfer a message and can be ignored by the receiving application. SenderParty can be filled by the sender if the participating parties are not transferred with the FreightOrderInvoicingPreparation Package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with the message. A contact person can be useful if an additional infrastructure, such as a marketplace, is located between the sender and the recipient. The RecipientParty can be used to transfer a message and can be ignored by the receiving application. RecipientParty can be filled by the sender if the FreightOrderInvoicingPreparation Package cannot be used to transfer the participating parties.

The FreightOrderInvoicingPreparation package can group together information about the FreightOrderInvoicingPreparation. The FreightOrderInvoicingPreparation package includes the FreightOrderInvoicingPreparation entity and the BusinessTransactionDocumentReference package.

A freight order invoicing preparation can be used in purchase order processing for preparation of supplier invoicing. The attributes and elements located directly at the FreightOrderInvoicingPreparation entity include ID. ID can be a unique identifier of a FreightOrder, and can be based on GDT: BusinessTransactionDocumentID.

The Request package can group a Request with its packages. The Request package includes the Request entity and the BusinessTransactionDocumentReference package. The structure of Request includes the element RequestedCancellationDate. RequestedCancellationDate can be a requested date for a cancellation, and can be based on GDT: Date, Qualifier: Cancellation.

A BusinessTransactionDocumentReference package can group references to business documents. A BusinessTransactionDocumentReference package includes the BusinessTransactionDocumentReference entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item can have when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type, and can be based on GDT: TransportationDocumentTypeCode. TransportationDocumentNote can be a short Note on documentation, and can be based on GDT: SHORT_Note.

TransportationDocumentID can be a unique identifier for a transportation document, and can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransaction- DocumentRelationshipTypeCode, or TransportationDocumentTypeCode, TransportationDocumentNote, TransportationDocumentID may be filled.

Message Data Type FreightOrderInvoicingPreparationConfirmationMessage

The message data type FreightOrderInvoicingPreparationConfirmationMessage includes business information relevant for sending a business document in a message and FreightOrderInvoicingPreparation included in a business document. The message data type FreightOrderInvoicingPreparationConfirmationMessage can provide a structure for the message type FreightOrderInvoicingPreparationConfirmationMessage and for interfaces that are based on it.

A MessageHeader package can group together business information relevant for sending a business document in a message. The MessageHeader package includes the MessageHeader entity. A MessageHeader can group together business information from the perspective of the sending application to identify a business document in a message, to provide information about the sender, or to provide information about the recipient. The MessageHeader can be divided up into the SenderParty and RecipientParty entities. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with the message. A contact person can be useful if an additional infrastructure, such as a marketplace, is located between the sender and the recipient. The SenderParty can be used to transfer a message and can be ignored by the receiving application. SenderParty can be filled by the sender if the participating parties are not transferred with the FreightOrderInvoicingPreparation package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with a message. A contact person can be useful if an additional infrastructure, such as a marketplace, is located between the sender and the recipient. The RecipientParty can be used to transfer a message and can be ignored by the receiving application. RecipientParty can be filled by the sender if the FreightOrderInvoicingPreparation package cannot be used to transfer the participating parties. The FreightOrderInvoicingPreparation package can group the FreightOrderInvoicingPreparation together with its packages.

The FreightOrderInvoicingPreparation package includes the FreightOrderInvoicingPreparation entity and the Confirmation package. A FreightOrderInvoicingPreparation can be used in purchase order processing for preparation of supplier invoicing.

The Confirmation package can be part of a FreightOrderInvoicingPreparation which confirms FreightOrderInvoicingPreparation. The Confirmation package includes the Confirmation entity and the BusinessTransactionDocumentReference package. A Confirmation can be part of a FreightOrderInvoicingPreparation which confirms FreightOrderInvoicingPreparation. The element located directly at the Confirmation entity include AcceptanceStatusCode. The AcceptanceStatusCode can be a coded representation of the status of an acceptance by a communication partner regarding a business transaction that has been transmitted to that partner. AcceptanceStatusCode can be based on GDT: AcceptanceStatusCode.

A BusinessTransactionDocumentReference package can group references to a business transaction documents. A BusinessTransactionDocumentReference package includes the BusinessTransactionDocumentReference entity. BusinessTransactionDocumentReference specifies a business document reference that is related to a whole shipment request. BusinessTransactionDocumentReference includes the DateTimePeriod entity. The structure of BusinessTransactionDocumentReference includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item can have when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of a documentation type, and can be based on GDT: TransportationDocumentTypeCode. TransportationDocumentNote can be a short Note on documentation, and can be based on GDT: SHORT_Note. TransportationDocumentID can be a unique identifier for a transportation document, and can be based on GDT: TransportationDocumentID. RelationshipTypeCode and RelationshipRoleCode are both optional. In some implementations, if used, both can be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID may be filled.

Maintenance Plan Interfaces

In order to keep a company up and running from usually occurring down times or break downs, it can be useful to take preventive measures by performing regular checks and maintenance. In order to schedule maintenance and checks at regular intervals, Maintenance Plans are created for technical objects in the company, thereby ensuring that technical objects function optimally.

The Maintenance Plan interface can perform various operations, namely a MaintenancePlanERPCreateRequestConfirmation_In, a MaintenancePlanERPUpdateRequestConfirmation_In, a MaintenancePlanERPCreateCheckQueryResponse_In, a MaintenancePlanERP- UpdateCheckQueryResponse_In, a MaintenancePlanERPByIDQueryResponse_In, a MaintenancePlanERPSimpleByElementsQueryResponse_In, a MaintenancePlanERPItemByElementsQueryResponse_In, a MaintenancePlanERPScheduleLineByIDQueryResponse_In, a MaintenancePlanERPActivateRequestConfirmation_In, a MaintenancePlanERPDeactivateRequestConfirmation_In, a MaintenancePlanERPSetDeleteIndicatorRequestConfirmation_In, and a MaintenancePlanERPResetDeleteIndicatorRequestConfirmation_In.

The MaintenancePlanERPCreateRequestConfirmation_In operation can handle a request to Maintenance Planning to create a MaintenancePlan and get a confirmation of the same. A Maintenance Planner can use a 'Create Maintenance Plan' inbound operation to create a MaintenancePlan. The MaintenancePlanERPCreateRequestConfirmation_In operation includes various message types, namely a MaintenancePlanERPCreateRequest_ync and a MaintenancePlanERPCreateConfirmation_ync. The structure of the MaintenancePlanERPCreateRequest_ync message type can be specified by a MaintPlnERPCrteReqMsg_message data type. The structure of the MaintenancePlanERPCreateConfirmation_ync message type can be specified by a MaintPlnERPCrteConfMsg_message data type.

The MaintenancePlanERPUpdateRequestConfirmation_In operation can handle a request to Maintenance Planning to update a MaintenancePlan and get a confirmation of the same. A Maintenance Planner can use an 'Update MaintenancePlan' inbound operation to update a MaintenancePlan. The MaintenancePlanERPUpdateRequestConfirmation_In operation includes various message types, namely a MaintenancePlanERPUpdateRequest_ync and a MaintenancePlanERPUpdateConfirmation_ync. The structure of the MaintenancePlanERPUpdateRequest_ync message type can be specified by a MaintPlnERPUpdtReqMsg_message data type. The structure of the MaintenancePlanERPUpdateConfirmation_ync message type can be specified by a MaintPlnERPUpdtConfMsg_message data type.

The MaintenancePlanERPCreateCheckQueryResponse_In operation can handle an inquiry to Maintenance Planning to check the consistency of the creation of a MaintenancePlan. A Maintenance Planner can use a 'Create Check Maintenance Plan' inbound operation to check the consistency of the creation of a maintenance plan. The MaintenancePlanERPCreateCheckQueryResponse_In operation includes various message types, namely a MaintenancePlanERPCreateCheckQuery_ync and a MaintenancePlanERPCreateCheckResponse_ync. The structure of the MaintenancePlanERPCreateCheckQuery_ync message type can be specified by a MaintPlnERPCrteCkQryMsg_message data type. The structure of the MaintenancePlanERPCreateCheckResponse_ync message type can be specified by a MaintPlnERPCrteCkRspMsg_message data type.

The MaintenancePlanERPUpdateCheckQueryResponse_In operation can handle an inquiry to Maintenance Planning to check the consistency of the update of a MaintenancePlan. A Maintenance Planner can use an 'Update Check Maintenance Plan' inbound operation to check the consistency of the update of a MaintenancePlan. The MaintenancePlanERPUpdateCheckQueryResponse_In operation includes various message types, namely a MaintenancePlanERPUpdateCheckQuery_ync and a MaintenancePlanERPUpdateCheckResponse_ync. The structure of the MaintenancePlanERPUpdateCheckQuery_ync message type can be specified by a MaintPlnERPUpdtCkQryMsg_message data type. The structure of the MaintenancePlanERPUpdateCheckResponse_ync message type can be specified by a MaintPlnERPUpdtCkRspMsg_message data type.

The MaintenancePlanERPByIDQueryResponse_In operation can handle an inquiry to Maintenance Planning to read a MaintenancePlan. A Maintenance Planner can use a 'Read Maintenance Plan' inbound operation to read a MaintenancePlan by using an ID (identifier). The MaintenancePlanERPByIDQueryResponse_In operation includes various message types, namely a MaintenancePlanERPByIDQuery_ync and a MaintenancePlanERPByIDResponse_ync. The structure of the MaintenancePlanERPByIDQuery_ync message type can be specified by a MaintPlnERPByIDQryMsg_message data type. The structure of the MaintenancePlanERPByIDResponse_ync message type can be specified by a MaintPlnERPByIDRspMsg_message data type.

The MaintenancePlanERPSimpleByElementsQueryResponse_In operation can handle an inquiry to Maintenance Planning to get a list of MaintenancePlans based on the selection criteria. A Maintenance Planner can use a 'Find Maintenance Plan By Elements' inbound operation to get a list of MaintenancePlans based on a selection criteria. The MaintenancePlanERPSimpleByElementsQueryResponse_In operation includes various message types, namely a MaintenancePlanERPSimpleByElementsQuery_ync and a MaintenancePlanERPSimpleByElementsResponse_ync. The structure of the MaintenancePlanERPSimpleByElementsQuery_ync message type can be specified by a MaintPlnERPSimplElmntsQryMsg_message data type. The structure of the MaintenancePlanERPSimpleByElementsResponse_ync message type can be specified by a MaintPlnERPSimplElmntsRspMsg_message data type.

The MaintenancePlanERPItemByElementsQueryResponse_In operation can be an inquiry to Maintenance Planning to get a list of MaintenancePlanItems based on selection criteria. A Maintenance planner can use a 'Find Maintenance Plan Item By Elements' inbound operation to get a list of Maintenance plan items based on selection criteria. The MaintenancePlanERPItemByElementsQueryResponse_In operation includes various message types, namely a MaintenancePlanERPItemByElementsQuery_ync and a MaintenancePlanERPItemByElementsResponse_ync. The structure of the MaintenancePlanERPItemByElementsQuery_ync message type can be specified by a MaintPlnERPItmElmntsQryMsg_message data type. The structure of the MaintenancePlanERPItemByElementsResponse_ync message type can be specified by a MaintPlnERPItmElmntsRspMsg_message data type.

The MaintenancePlanERPScheduleLineByIDQueryResponse_In operation can handle an inquiry to Maintenance Planning to read a MaintenancePlanSchedule. A Maintenance Planner can use a 'Read Maintenance Plan Schedule' inbound operation to read a MaintenancePlanSchedule by ID. The MaintenancePlanERPScheduleLineByIDQueryResponse_In operation includes various message types, namely a MaintenancePlanERPScheduleLineByIDQuery_ync and a MaintenancePlanERPScheduleLineByIDResponse_ync. The structure of the MaintenancePlanERPScheduleLineByIDQuery_ync message type can be specified by a MaintPlnERPSchedLineByIDQryMsg_message data type. The structure of the MaintenancePlanERPScheduleLineByIDResponse_ync message type can be specified by a MaintPlnERPSchedLineByIDRspMsg_message data type.

The MaintenancePlanERPActivateRequestConfirmation_In operation can be a request to Maintenance Planning to activate a MaintenancePlan and get a confirmation of the same. A Maintenance Planner can use the 'Activate MaintenancePlan' inbound operation to activate a MaintenancePlan. The MaintenancePlanERPActivateRequestConfirmation_In operation includes various message types, namely a MaintenancePlanERPActivateRequest_ync and a MaintenancePlanERPActivateConfirmation_ync. The structure of the MaintenancePlanERPActivateRequest_ync message type can be specified by a MaintPlnERPActvteReqMsg_message data type. The structure of the MaintenancePlanERPActivateConfirmation_ync message type can be specified by a MaintPlnERPActvteConfMsg_message data type.

The MaintenancePlanERPDeactivateRequestConfirmation_In operation can handle a request to Maintenance Planning to deactivate a MaintenancePlan and get a confirmation of the same. A Maintenance Planner can use a 'Deactivate MaintenancePlan' inbound operation to deactivate a MaintenancePlan. The MaintenancePlanERPDeactivateRequestConfirmation_In operation includes various message types, namely a MaintenancePlanERPDeactivateRequest_ync and a MaintenancePlanERPDeactivateConfirmation_ync. The structure of the MaintenancePlanERPDeactivateRequest_ync message type can be specified by a MaintPlnERPDactvteReqMsg_message data type. The structure of the MaintenancePlanERPDeactivateConfirmation_ync message type can be specified by a MaintPlnERPDactvteConfMsg_message data type.

The MaintenancePlanERPSetDeleteIndicatorRequestConfirmation_In operation can handle a request to Maintenance Planning to set a deletion flag for a MaintenancePlan and get a confirmation of the same. A Maintenance Planner can use a 'Set Delete Indicator MaintenancePlan' inbound operation to set a deletion flag for a MaintenancePlan. The MaintenancePlanERPSetDeleteIndicatorRequestConfirmation_In operation includes various message types, namely a MaintenancePlanERPSetDeleteIndicatorRequest_ync and a MaintenancePlanERPSetDeleteIndicatorConfirmation_ync. The structure of the MaintenancePlanERPSetDeleteIndicatorRequest_ync message type can be specified by a MaintPlnERPSetDelIndReqMsg_message data type. The structure of the MaintenancePlanERPSetDeleteIndicatorConfirmation_ync message type can be specified by a MaintPlnERPSetDelIndConfMsg_message data type.

The MaintenancePlanERPResetDeleteIndicatorRequestConfirmation_In operation can handle a request to Maintenance Planning to reset a deletion flag for a MaintenancePlan and get the confirmation of the same. A Maintenance Planner can use a 'Reset Delete Indicator MaintenancePlan' inbound operation to reset a deletion flag for a MaintenancePlan. The MaintenancePlanERPResetDeleteIndicatorRequestConfirmation_In operation includes various message types, namely a MaintenancePlanERPResetDeleteIndicatorRequest_ync and a MaintenancePlanERPResetDeleteIndicatorConfirmation_ync. The structure of the MaintenancePlanERPResetDeleteIndicatorRequest_ync message type can be specified by a MaintPlnERPRstDelIndReqMsg_message data type. The structure of the MaintenancePlanERPResetDeleteIndicatorConfirmation_ync message type can be specified by an MaintPlnERPRstDelIndConfMsg_message data type.

Figure 48:
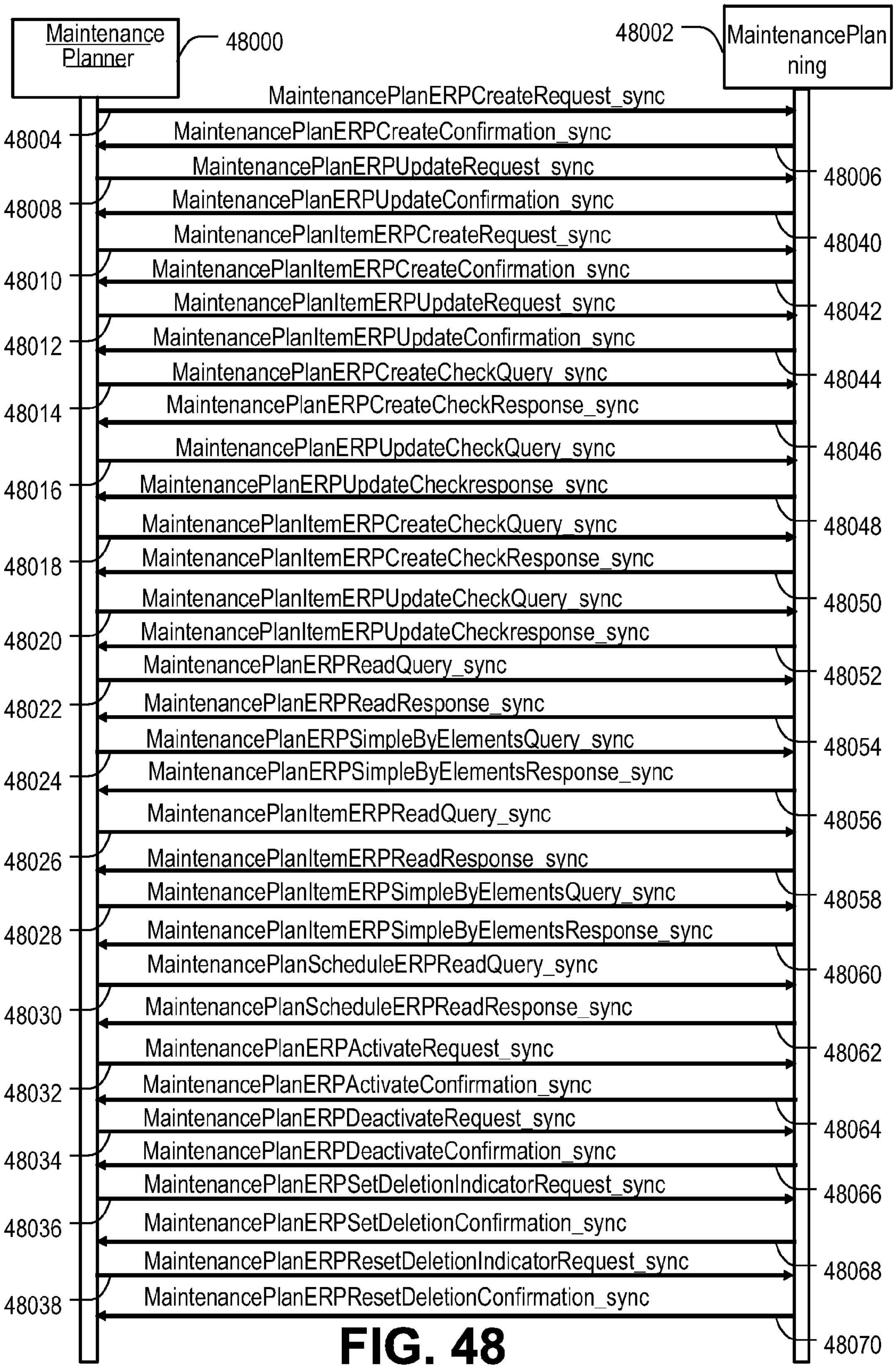
FIG. 48 shows an exemplary Maintenance Plan Message Choreography.

The message choreography of FIG. 48 describes a possible logical sequence of messages that can be used to realize a Maintenance Plan business scenario.

A "Maintenance Planner" system 48000 can request the creation of a maintenance plan, using a MaintenancePlanERPCreateRequest_ync message 48004 as shown, for example in FIG. 48. A "Maintenance Planning" system 48002 can confirm the request, using a MaintenancePlanERPCreateConfirmation_ync message 48006 as shown, for example, in FIG. 48.

The "Maintenance Planner" system 48000 can request an update of a maintenance plan using a MaintenancePlanERPUpdateRequest message 48008 as shown, for example, in FIG. 48. The "Maintenance Planning" system 48002 can confirm the request, using the MaintenancePlanERPUpdateConfirmation_ync message 48040 as shown, for example, in FIG. 48.

The "Maintenance Planner" system 48000 can request the creation of a maintenance plan item using a MaintenancePlanItemERPCreateRequest message 48010 as shown, for example, in FIG. 48. The "Maintenance Planning" system 48002 can confirm the request, using the MaintenancePlanItemERPCreateConfirmation_ync message 48042 as shown, for example, in FIG. 48.

The "Maintenance Planner" system 48000 can request an update of a maintenance plan item using a MaintenancePlanItemERPUpdateRequest message 48012 as shown, for example, in FIG. 48. The "Maintenance Planning" system 48002 can confirm the request, using the MaintenancePlanItemERPUpdateConfirmation_ync message 48044 as shown, for example, in FIG. 48.

The "Maintenance Planner" system 48000 can query the "Maintenance Planning" system 48002 to check the consistency of the creation of a maintenance plan, using a MaintenancePlanERPCreateCheckQuery_ync message 48014 as shown, for example in FIG. 48. The "Maintenance Planning" system 48002 can respond to the query, using a MaintenancePlanERPCreateCheckResponse_ync message 48046 as shown, for example, in FIG. 48.

The "Maintenance Planner" system 48000 can query the "Maintenance Planning" system 48002 to check the consistency of the update of a maintenance plan, using a MaintenancePlanERPUpdateCheckQuery_ync message 48016 as shown, for example in FIG. 48. The "Maintenance Planning" system 48002 can respond to the query, using a MaintenancePlanERPUpdateCheckResponse_ync message 48048 as shown, for example, in FIG. 48.

The "Maintenance Planner" system 48000 can query the "Maintenance Planning" system 48002 to check the consistency of the creation of a maintenance plan item using a MaintenancePlanItemERPCreateCheckQuery message 48018 as shown, for example, in FIG. 48. The "Maintenance Planning" system 48002 can respond to the query, using the MaintenancePlanItemERPCreateCheckResponse_ync message 48050 as shown, for example, in FIG. 48.

The "Maintenance Planner" system 48000 can query the "Maintenance Planning" system 48002 to check the consistency of the update of a maintenance plan item, using a MaintenancePlanItemERPUpdateCheckQuery_ync message 48020 as shown, for example in FIG. 48. The "Maintenance Planning" system 48002 can respond to the query, using a MaintenancePlanItemERPUpdateCheckResponse_ync message 48052 as shown, for example, in FIG. 48.

The "Maintenance Planner" system 48000 can query the "Maintenance Planning" system 48002 to read a maintenance plan, using a MaintenancePlanERPReadQuery_ync message 48022 as shown, for example in FIG. 48. The "Maintenance Planning" system 48002 can respond to the query, using a MaintenancePlanERPReadResponse_ync message 48054 as shown, for example, in FIG. 48.

The "Maintenance Planner" system 48000 can query the "Maintenance Planning" system 48002 to get a list of maintenance plans based on selection criteria, using a MaintenancePlanERPSimpleByElementsQuery_ync message 48024 as shown, for example in FIG. 48. The "Maintenance Planning" system 48002 can respond to the query, using a MaintenancePlanERPSimpleByElementsResponse_ync message 48056 as shown, for example, in FIG. 48.

The "Maintenance Planner" system 48000 can query the "Maintenance Planning" system 48002 to read a maintenance plan item, using a MaintenancePlanItemERPReadQuery_ync message 48026 as shown, for example in FIG. 48. The "Maintenance Planning" system 48002 can respond to the query, using a MaintenancePlanItemERPReadResponse_ync message 48058 as shown, for example, in FIG. 48.

The "Maintenance Planner" system 48000 can query the "Maintenance Planning" system 48002 to get a list of maintenance plan items based on selection criteria, using a MaintenancePlanItemERPSimpleByElementsQuery_ync message 48028 as shown, for example in FIG. 48. The "Maintenance Planning" system 48002 can respond to the query, using a MaintenancePlanItemERPSimpleByElementsResponse_ync message 48060 as shown, for example, in FIG. 48.

The "Maintenance Planner" system 48000 can query the "Maintenance Planning" system 48002 to read a maintenance plan schedule, using a MaintenancePlanScheduleERPReadQuery_ync message 48030 as shown, for example in FIG. 48. The "Maintenance Planning" system 48002 can respond to the query, using a MaintenancePlanScheduleERPReadResponse_ync message 48062 as shown, for example, in FIG. 48.

The "Maintenance Planner" system 48000 can request the activation of a maintenance plan, using a MaintenancePlanERPActivateRequest_ync message 48032 as shown, for example in FIG. 48. A "Maintenance Planning" system 48002 can confirm the request, using a MaintenancePlanERPActivateConfirmation_ync message 48064 as shown, for example, in FIG. 48.

The "Maintenance Planner" system 48000 can request the deactivation of a maintenance plan, using a MaintenancePlanERPDeactivateRequest_ync message 48034 as shown, for example in FIG. 48. A "Maintenance Planning" system 48002 can confirm the request, using a MaintenancePlanERPDeactivateConfirmation_ync message 48066 as shown, for example, in FIG. 48.

The "Maintenance Planner" system 48000 can request the "Maintenance Planning" system 48002 to set a deletion flag for a maintenance plan, using a MaintenancePlanERPSetDeletionIndicatorRequest_ync message 48036 as shown, for example in FIG. 48. A "Maintenance Planning" system 48002 can confirm the request, using a MaintenancePlanERPSetDeletionConfirmation_ync message 48068 as shown, for example, in FIG. 48.

The "Maintenance Planner" system 48000 can request the "Maintenance Planning" system 48002 to reset a deletion flag for a maintenance plan, using a MaintenancePlanERPResetDeletionIndicatorRequest_ync message 48038 as shown, for example in FIG. 48. A "Maintenance Planning" system 48002 can confirm the request, using a MaintenancePlanERPResetDeletionConfirmation_ync message 48070 as shown, for example, in FIG. 48.

Figure 49:
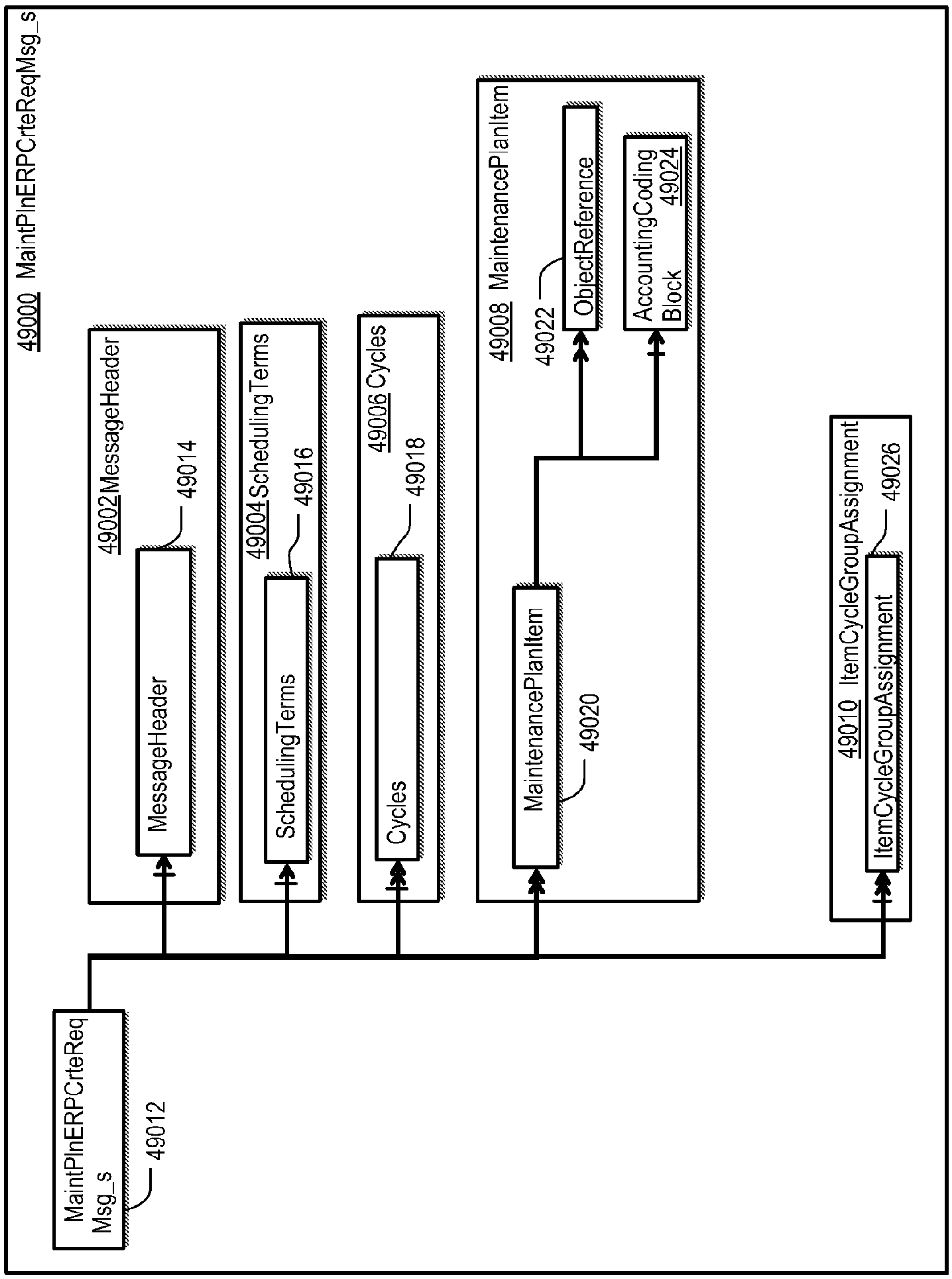
FIG. 49 shows an exemplary MaintPlnERPCrteReqMsg_ync Message Data Type.

FIG. 49 illustrates one example logical configuration of MaintPlnERPCrteReqMsg_message 49000. Specifically, this figure depicts the arrangement and hierarchy of various components such as one or more levels of packages, entities, and datatypes, shown here as 49002 through 49026. As described above, packages may be used to represent hierarchy levels. Entities are discrete business elements that are used during a business transaction. Data types are used to type object entities and interfaces with a structure. For example, MaintPlnERPCrteReqMsg_message 49000 includes, among other things, SchedulingTerms 49016. Accordingly, heterogeneous applications may communicate using this consistent message configured as such.

Figure 50:
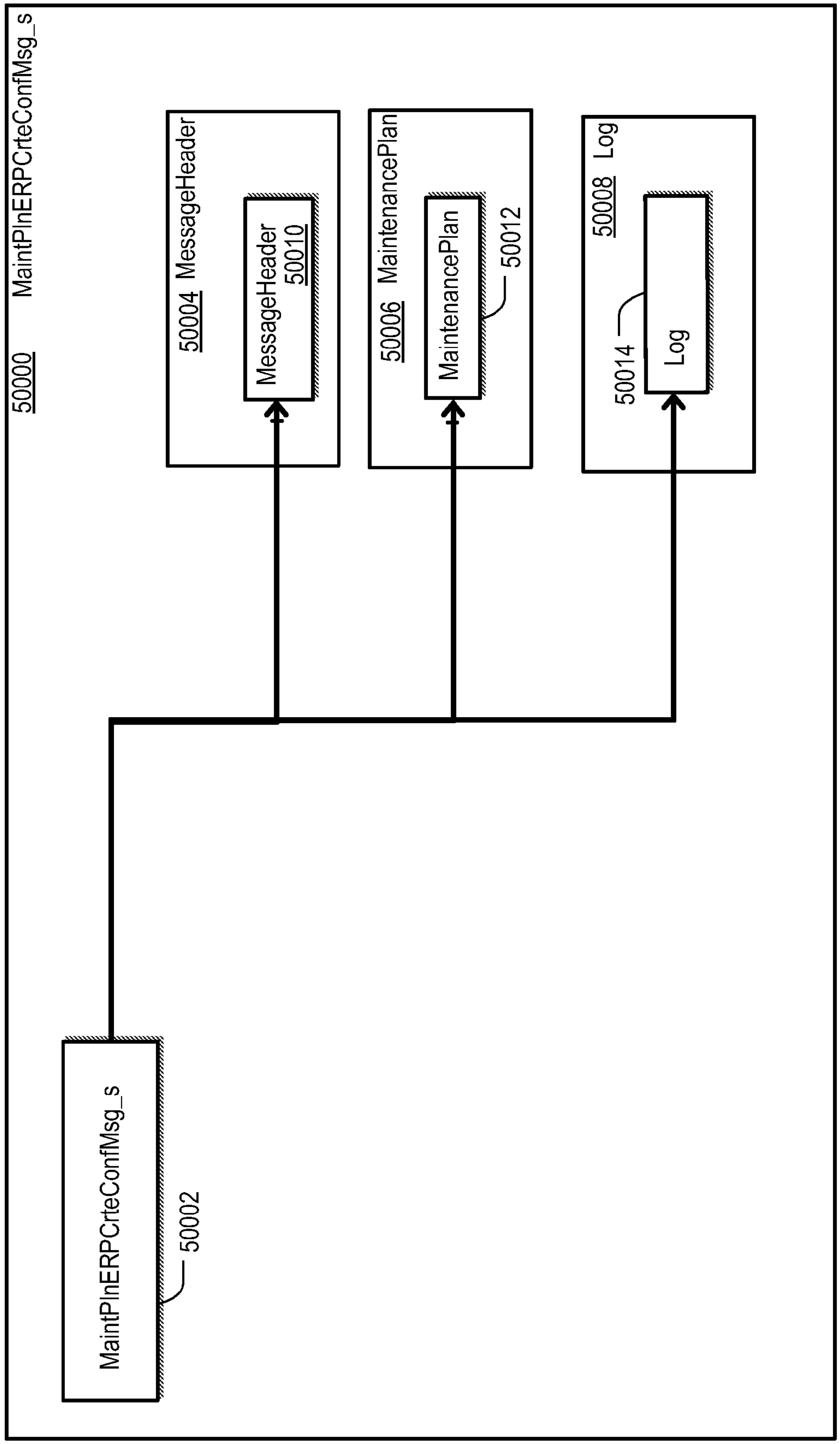
FIG. 50 shows an exemplary MaintPlnERPCrteConfMsg_ync Message Data Type.

Additionally, FIG. 50 illustrates one example logical configuration of MaintPlnERPCrteConfMsg_message 50000. Specifically, this figure depicts the arrangement and hierarchy of various components such as one or more levels of packages, entities, and datatypes, shown here as 50002 through 50014. As described above, packages may be used to represent hierarchy levels. Entities are discrete business elements that are used during a business transaction. Data types are used to type object entities and interfaces with a structure. For example, MaintPlnERPCrteConfMsg_message 50000 includes, among other things, MaintenancePlan 50012. Accordingly, heterogeneous applications may communicate using this consistent message configured as such.

Figure 51:
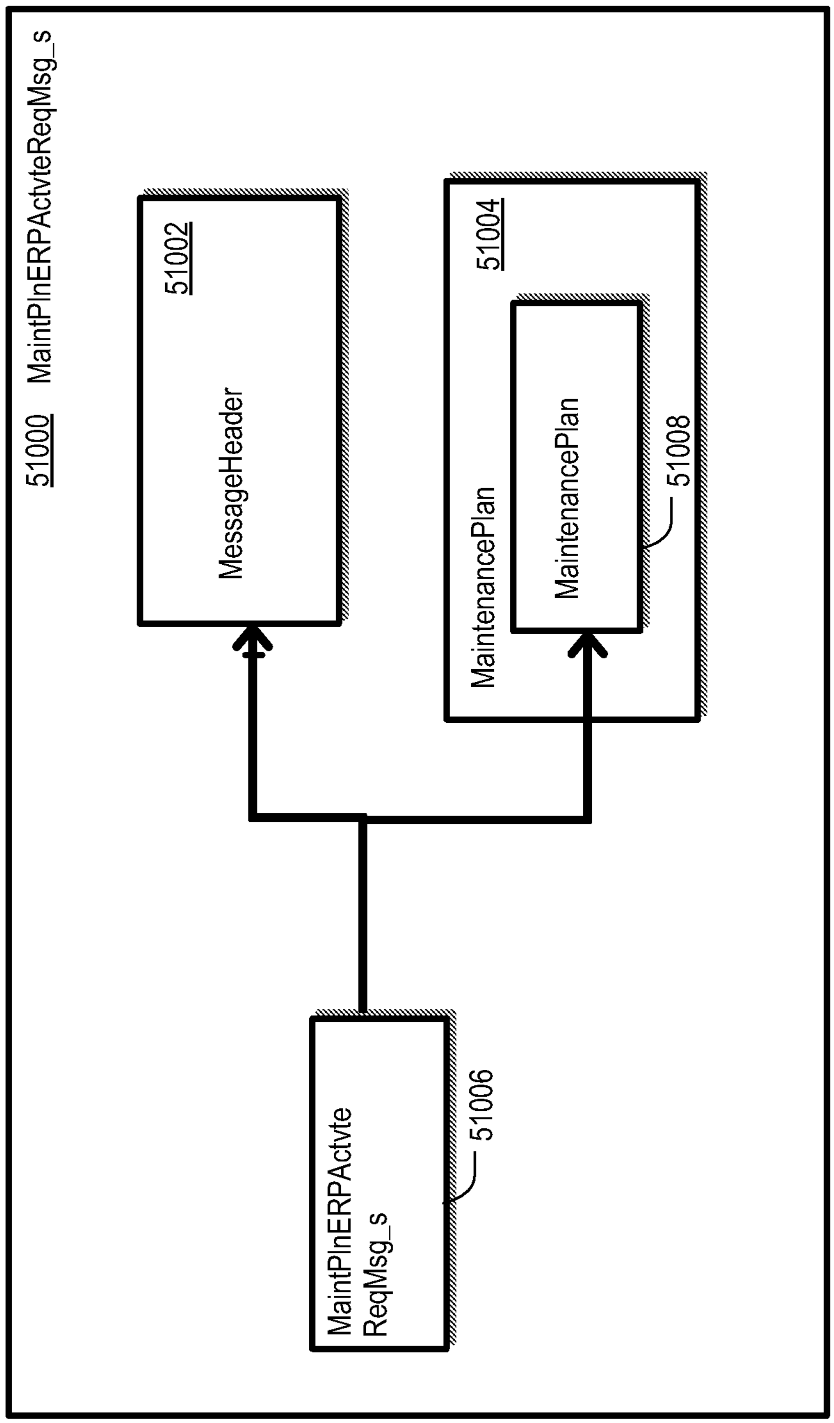
FIG. 51 shows an exemplary MaintPlnERPActvteReqMsg_ync Message Data Type.

Additionally, FIG. 51 illustrates one example logical configuration of MaintPlnERPActvteReqMgs_message 51000. Specifically, this figure depicts the arrangement and hierarchy of various components such as one or more levels of packages, entities, and datatypes, shown here as 51002 through 51008. As described above, packages may be used to represent hierarchy levels. Entities are discrete business elements that are used during a business transaction. Data types are used to type object entities and interfaces with a structure. For example, MaintPlnERPActvteReqMgs_message 51000 includes, among other things, MaintenancePlan 51004. Accordingly, heterogeneous applications may communicate using this consistent message configured as such.

Figure 52:
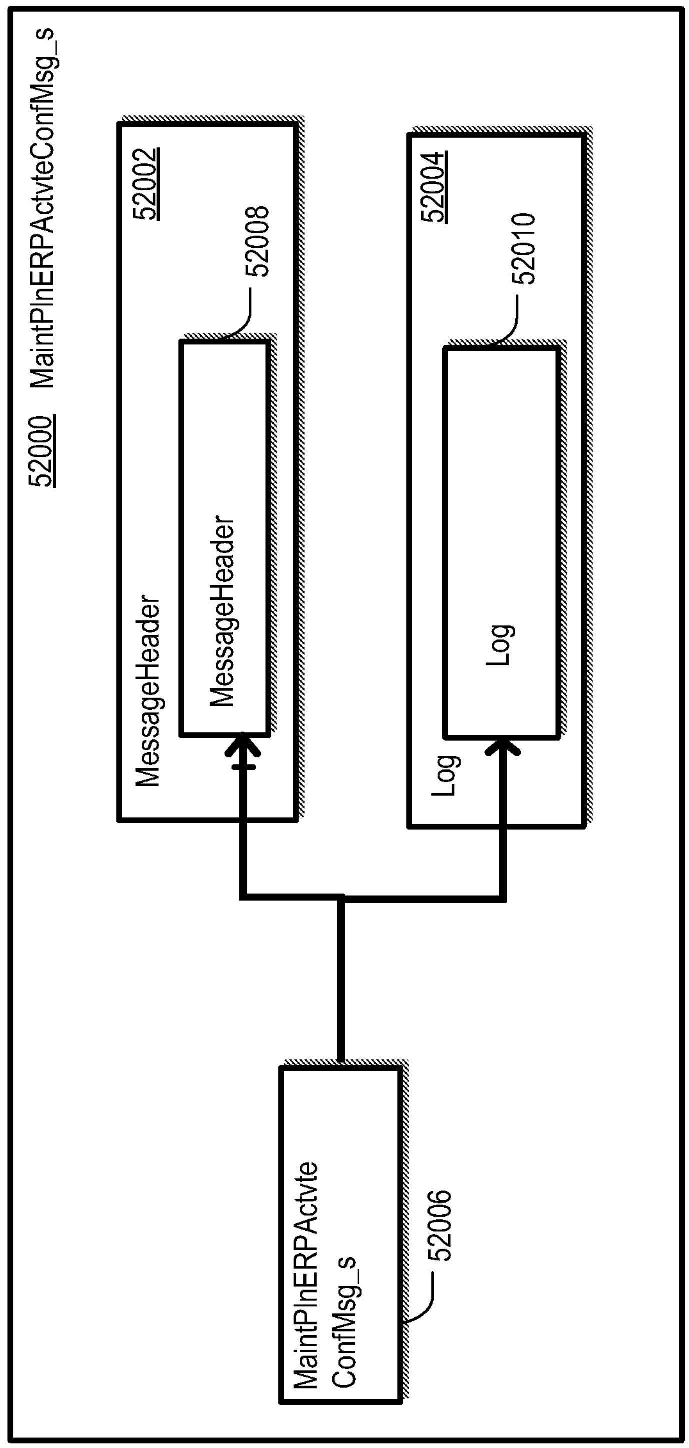
FIG. 52 shows an exemplary MaintPlnERPActvteConfMsg_ync Message Data Type.

Additionally, FIG. 52 illustrates one example logical configuration of MaintPlnERPActvteConfMsg_message 52000. Specifically, this figure depicts the arrangement and hierarchy of various components such as one or more levels of packages, entities, and datatypes, shown here as 52002 through 52010. As described above, packages may be used to represent hierarchy levels. Entities are discrete business elements that are used during a business transaction. Data types are used to type object entities and interfaces with a structure. For example, MaintPlnERPActvteConfMsg_message 52000 includes, among other things, Log 52004. Accordingly, heterogeneous applications may communicate using this consistent message configured as such.

Figure 53:
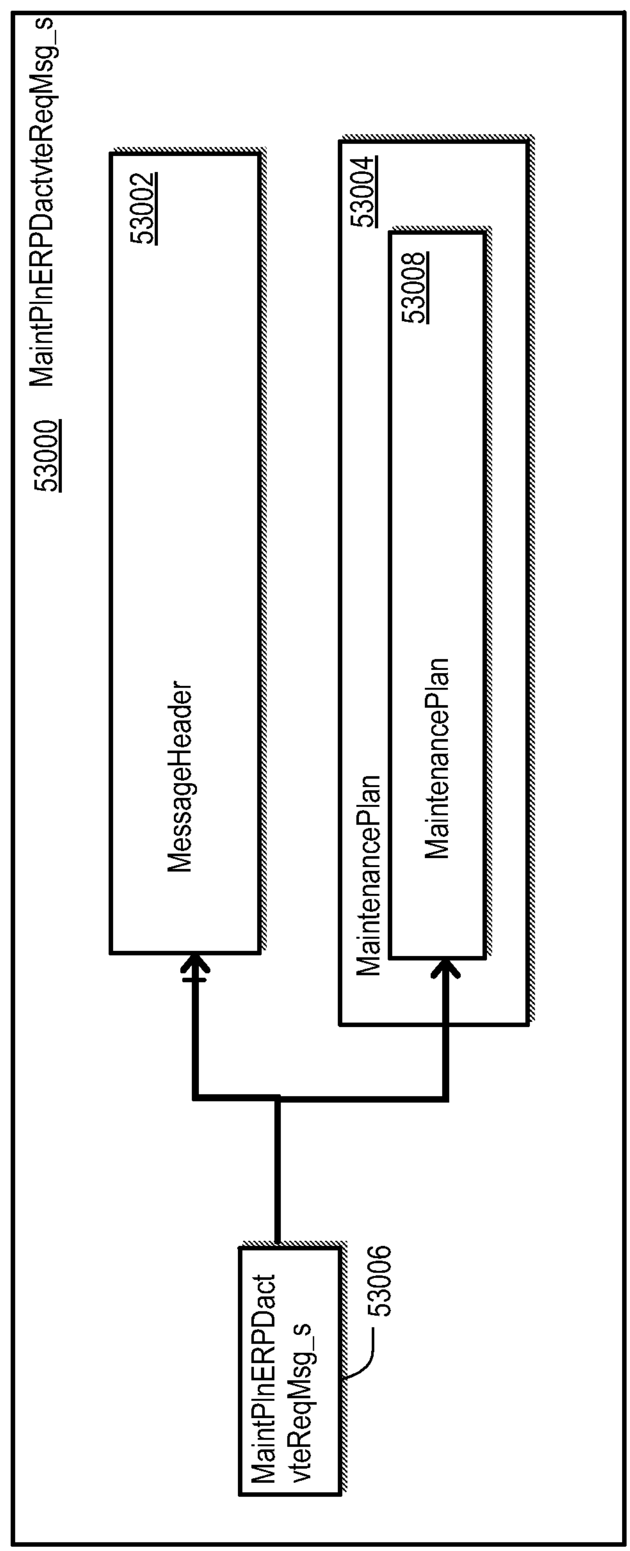
FIG. 53 shows an exemplary MaintPlnERPDactvteReqMsg_ync Message Data Type.

Additionally, FIG. 53 illustrates one example logical configuration of MaintPlnERPDactvteReqMsg_message 53000. Specifically, this figure depicts the arrangement and hierarchy of various components such as one or more levels of packages, entities, and datatypes, shown here as 53002 through 53008. As described above, packages may be used to represent hierarchy levels. Entities are discrete business elements that are used during a business transaction. Data types are used to type object entities and interfaces with a structure. For example, MaintPlnERPDactvteReqMsg_message 53000 includes, among other things, MaintenancePlan 53004. Accordingly, heterogeneous applications may communicate using this consistent message configured as such.

Figure 54:
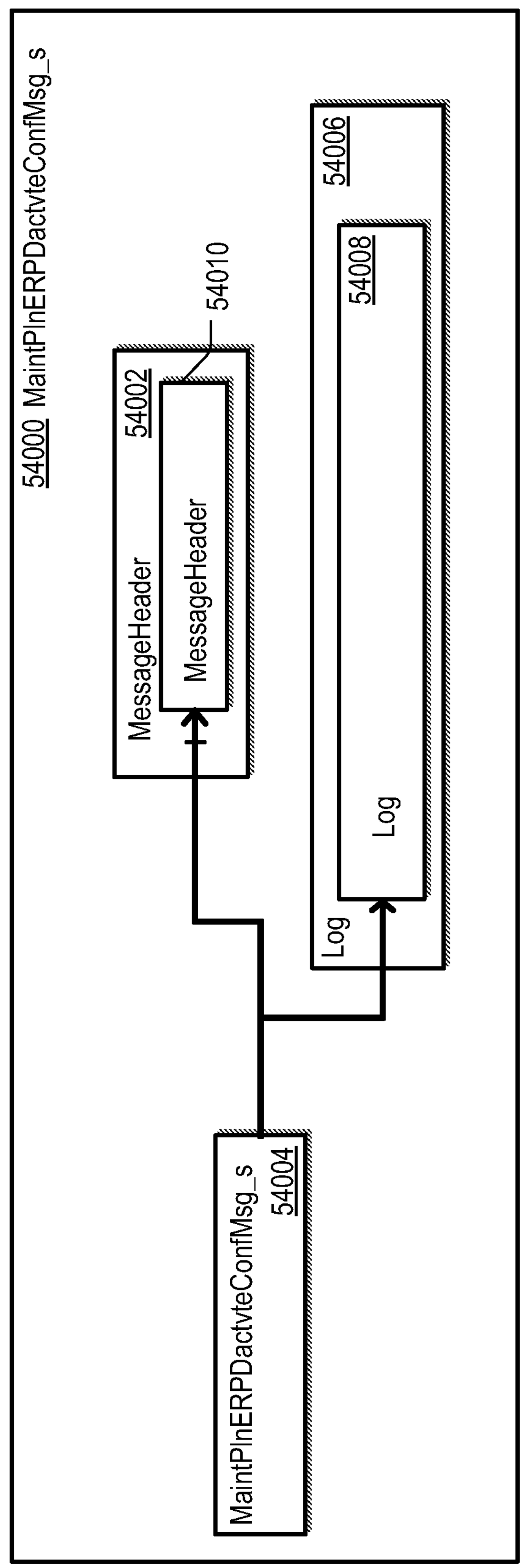
FIG. 54 shows an exemplary MaintPlnERPDactvteConfMsg_ync Message Data Type.

Additionally, FIG. 54 illustrates one example logical configuration of MaintPlnERPDactvteConfMsg_message 54000. Specifically, this figure depicts the arrangement and hierarchy of various components such as one or more levels of packages, entities, and datatypes, shown here as 54002 through 54010. As described above, packages may be used to represent hierarchy levels. Entities are discrete business elements that are used during a business transaction. Data types are used to type object entities and interfaces with a structure. For example, MaintPlnERPDactvteConfMsg_message 54000 includes, among other things, Log 54006. Accordingly, heterogeneous applications may communicate using this consistent message configured as such.

Figure 55:
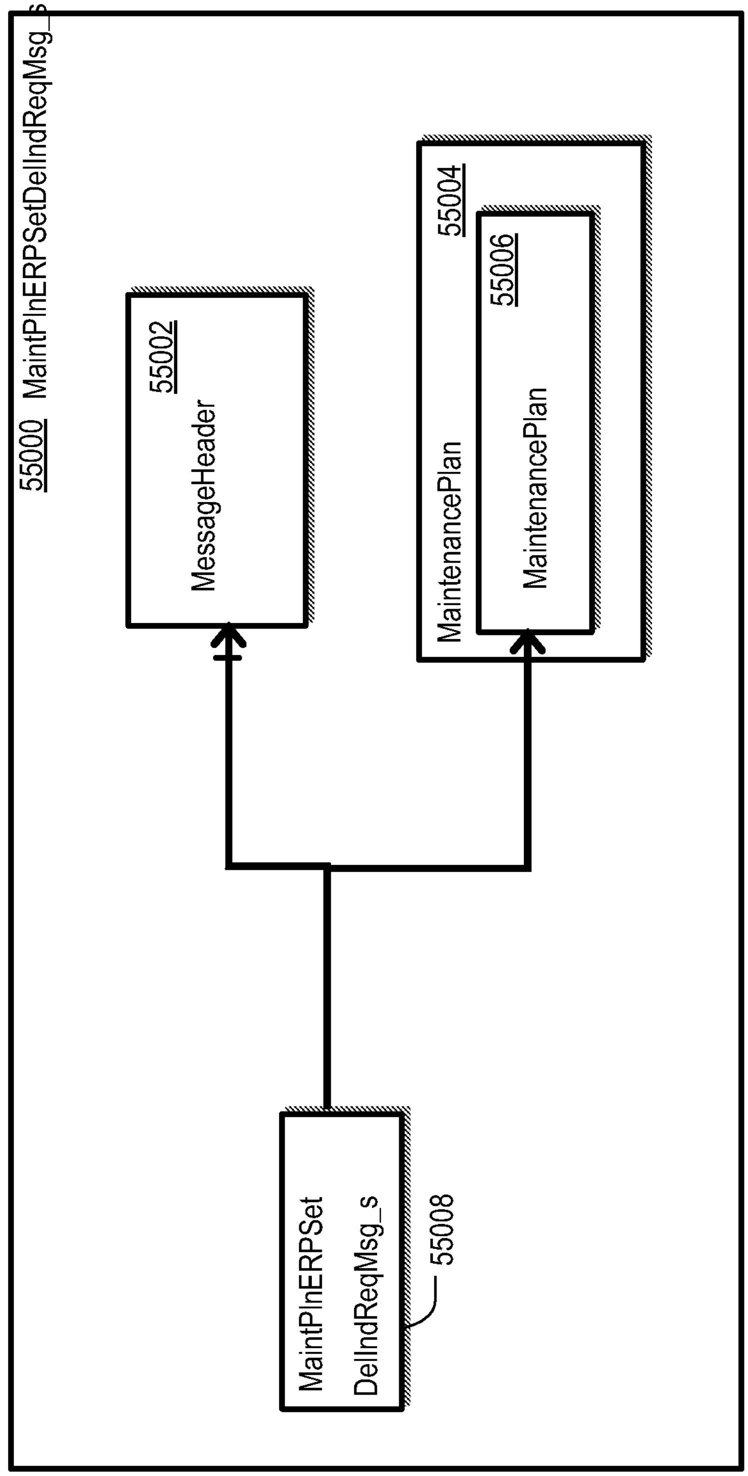
FIG. 55 shows an exemplary MaintPlnERPSetDelIndReqMsg_ync Message Data Type.

Additionally, FIG. 55 illustrates one example logical configuration of MaintPlnERPSetDelIndReqMsg_message 55000. Specifically, this figure depicts the arrangement and hierarchy of various components such as one or more levels of packages, entities, and datatypes, shown here as 55002 through 55008. As described above, packages may be used to represent hierarchy levels. Entities are discrete business elements that are used during a business transaction. Data types are used to type object entities and interfaces with a structure. For example, MaintPlnERPSetDelIndReqMsg_message 55000 includes, among other things, MaintenancePlan 55004. Accordingly, heterogeneous applications may communicate using this consistent message configured as such.

Figure 56:
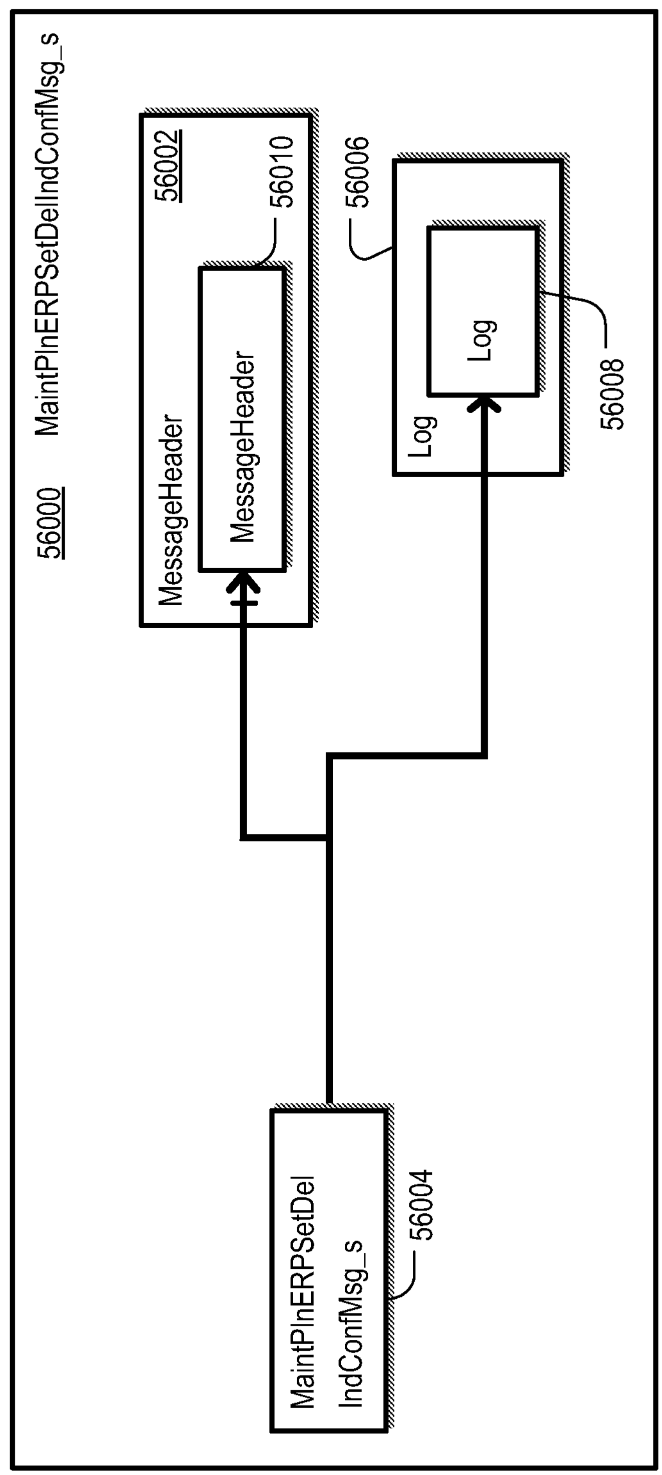
FIG. 56 shows an exemplary MaintPlnERPSetDelIndConfMsg_ync Message Data Type.

Additionally, FIG. 56 illustrates one example logical configuration of MaintPlnERPSetDelConfMsg_message 56000. Specifically, this figure depicts the arrangement and hierarchy of various components such as one or more levels of packages, entities, and datatypes, shown here as 56002 through 56010. As described above, packages may be used to represent hierarchy levels. Entities are discrete business elements that are used during a business transaction. Data types are used to type object entities and interfaces with a structure. For example, MaintPlnERPSetDelConfMsg_message 56000 includes, among other things, Log 56008. Accordingly, heterogeneous applications may communicate using this consistent message configured as such.

Figure 57:
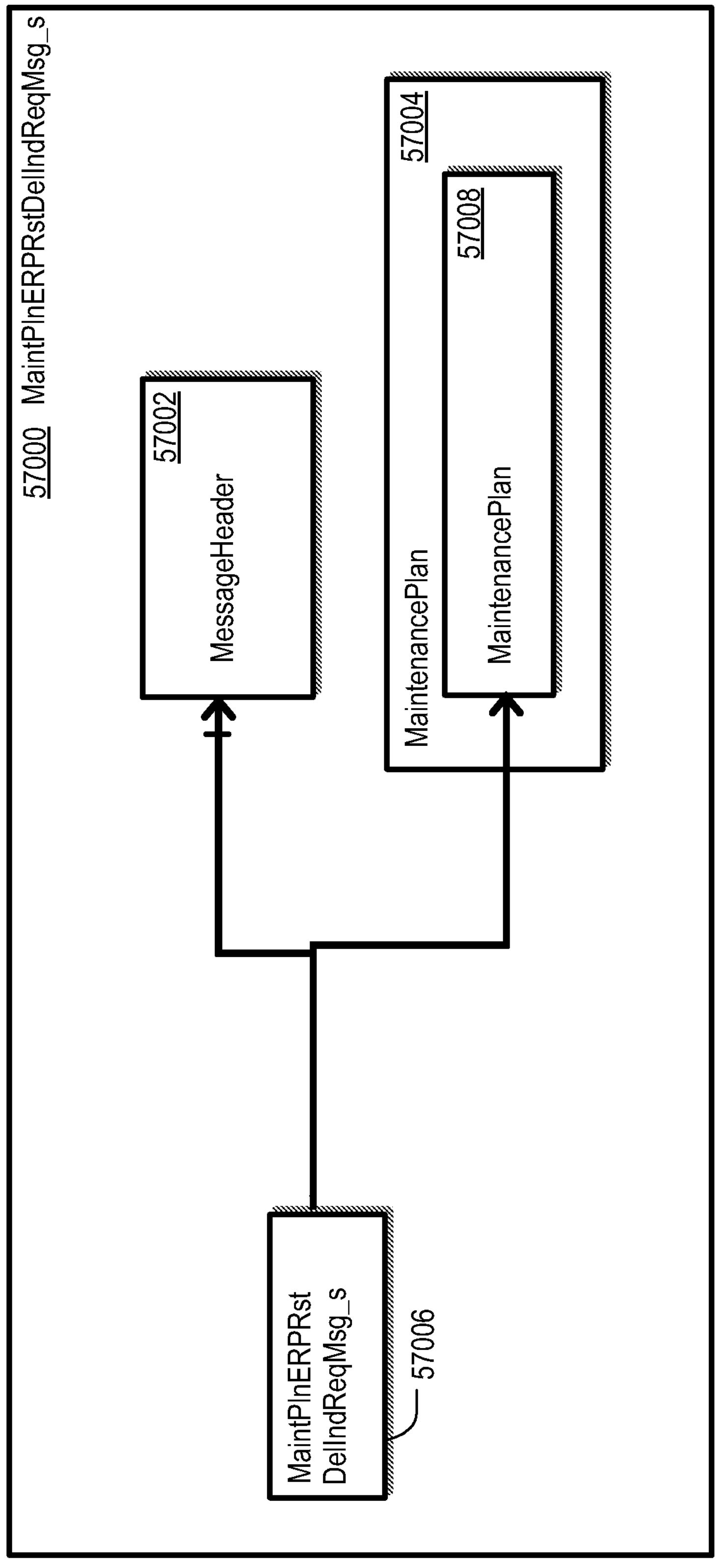
FIG. 57 shows an exemplary MaintPlnERPRstDelIndReqMsg_ync Message Data Type.

Additionally, FIG. 57 illustrates one example logical configuration of MaintPlnERPRstDelIndReqMsg_message 57000. Specifically, this figure depicts the arrangement and hierarchy of various components such as one or more levels of packages, entities, and datatypes, shown here as 57002 through 57008. As described above, packages may be used to represent hierarchy levels. Entities are discrete business elements that are used during a business transaction. Data types are used to type object entities and interfaces with a structure. For example, MaintPlnERPRstDelIndReqMsg_message 57000 includes, among other things, MaintenancePlan 57004. Accordingly, heterogeneous applications may communicate using this consistent message configured as such.

Figure 58:
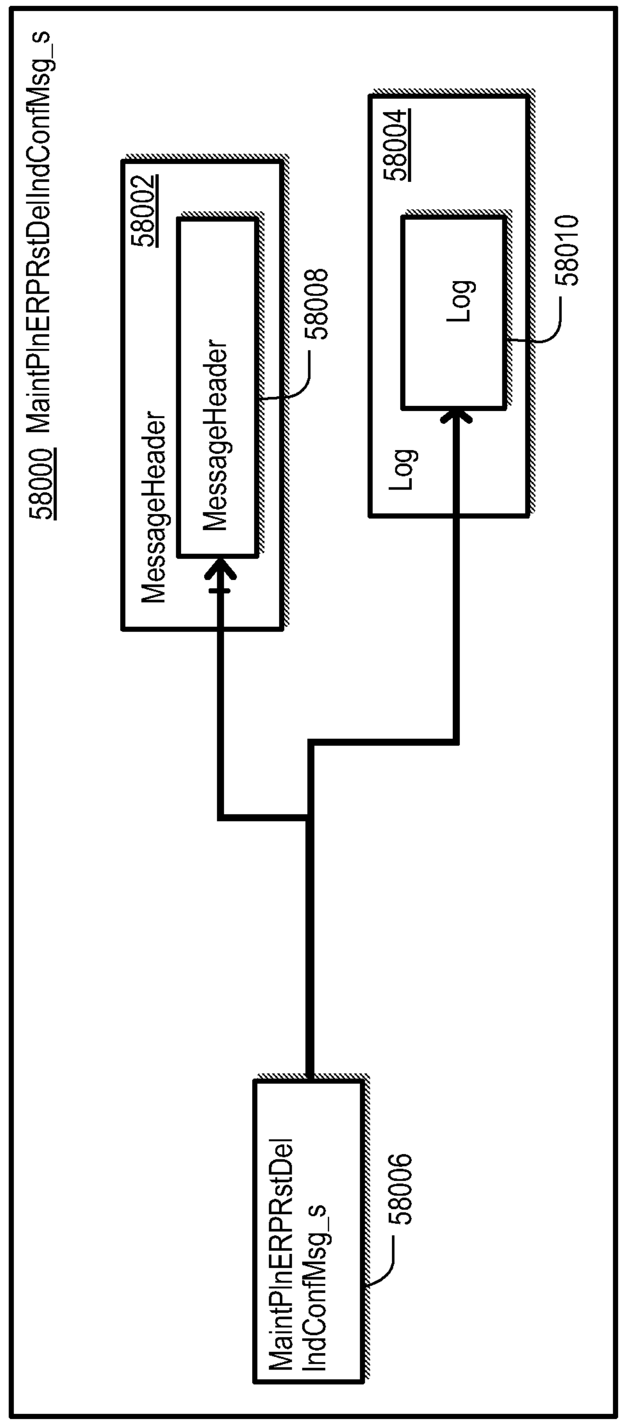
FIG. 58 shows an exemplary MaintPlnERPRstDelIndConfMsg_ync Message Data Type.

Additionally, FIG. 58 illustrates one example logical configuration of MaintPlnERPRstDelIndConfMsg_message 58000. Specifically, this figure depicts the arrangement and hierarchy of various components such as one or more levels of packages, entities, and datatypes, shown here as 58002 through 58010. As described above, packages may be used to represent hierarchy levels. Entities are discrete business elements that are used during a business transaction. Data types are used to type object entities and interfaces with a structure. For example, MaintPlnERPRstDelIndConfMsg_message 58000 includes, among other things, Log 58004. Accordingly, heterogeneous applications may communicate using this consistent message configured as such.

Figure 59:
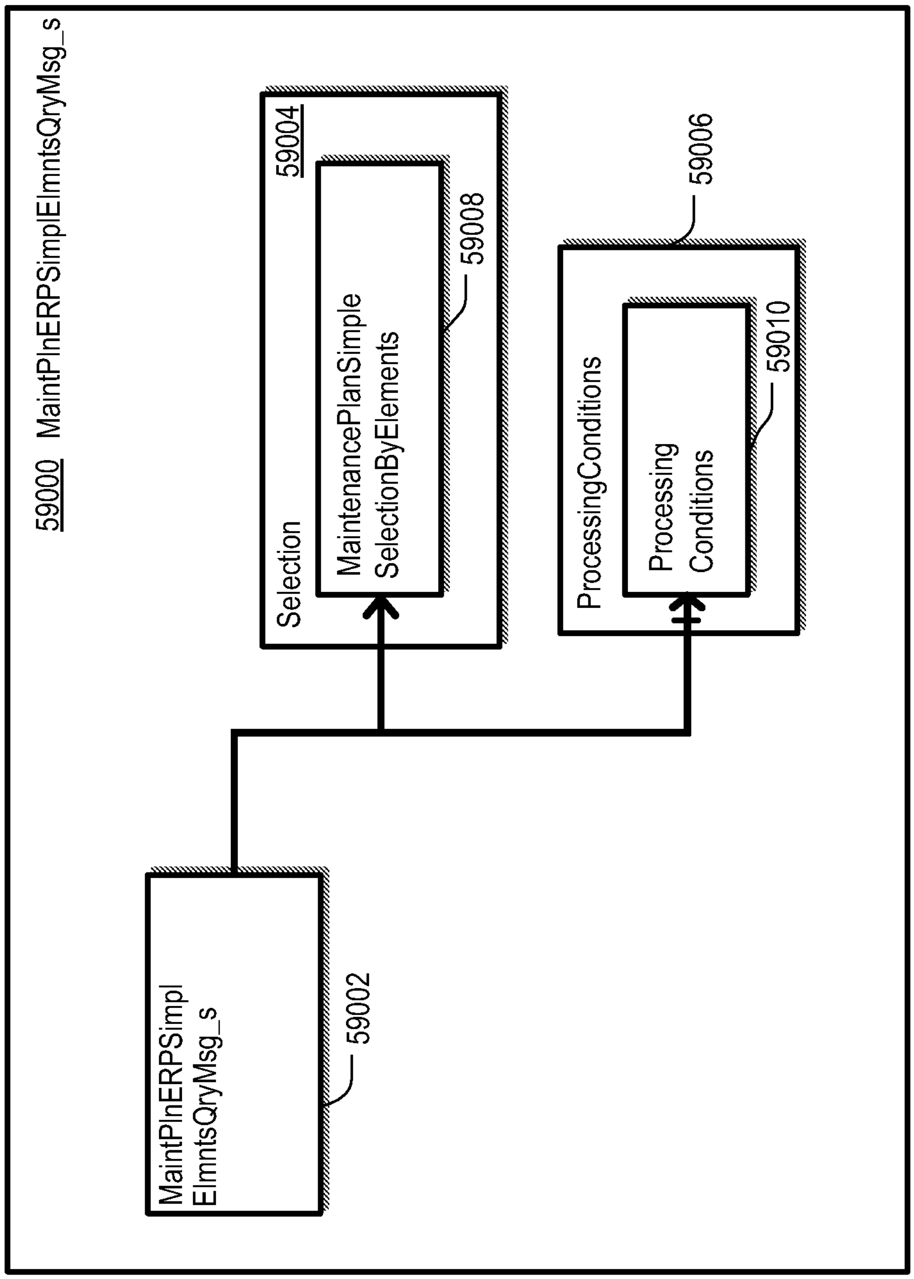
FIG. 59 shows an exemplary MaintPlnERPSimplElmntsQryMsg_ync Message Data Type.

Additionally, FIG. 59 illustrates one example logical configuration of MaintPlnERPSimplElmntsQryMsg_message 59000. Specifically, this figure depicts the arrangement and hierarchy of various components such as one or more levels of packages, entities, and datatypes, shown here as 59002 through 59010. As described above, packages may be used to represent hierarchy levels. Entities are discrete business elements that are used during a business transaction. Data types are used to type object entities and interfaces with a structure. For example, MaintPlnERPSimplElmntsQryMsg_message 59000 includes, among other things, ProcessingConditions 59006. Accordingly, heterogeneous applications may communicate using this consistent message configured as such.

Figure 60:
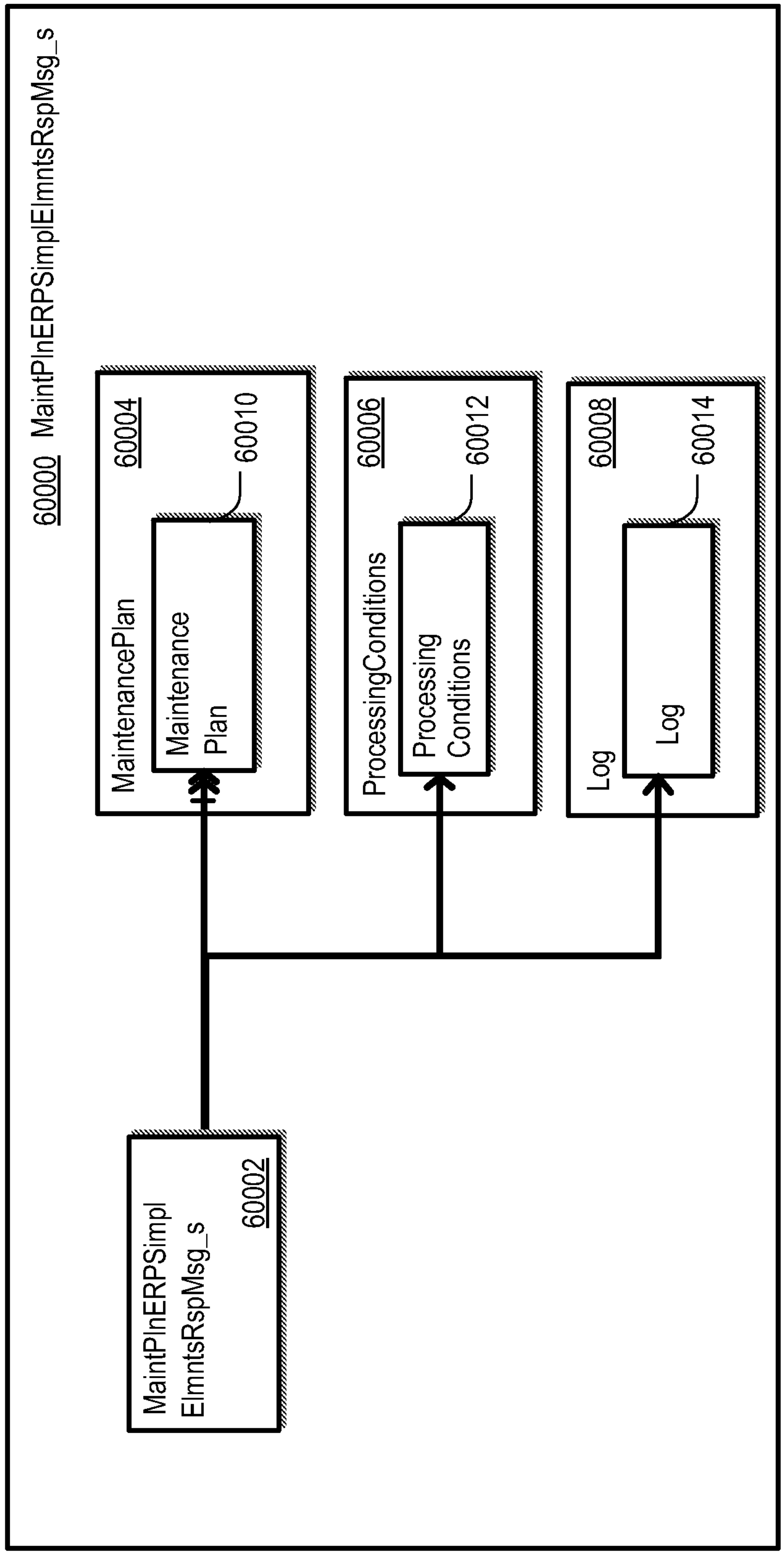
FIG. 60 shows an exemplary MaintPlnERPSimplElmntsRspMsg_ync Message Data Type.

Additionally, FIG. 60 illustrates one example logical configuration of MaintPlnERPSimplElmntsRspMsg_message 60000. Specifically, this figure depicts the arrangement and hierarchy of various components such as one or more levels of packages, entities, and datatypes, shown here as 60002 through 60014. As described above, packages may be used to represent hierarchy levels. Entities are discrete business elements that are used during a business transaction. Data types are used to type object entities and interfaces with a structure. For example, MaintPlnERPSimplElmntsRspMsg_message 60000 includes, among other things, MaintenancePlan 60010. Accordingly, heterogeneous applications may communicate using this consistent message configured as such.

Figure 61:
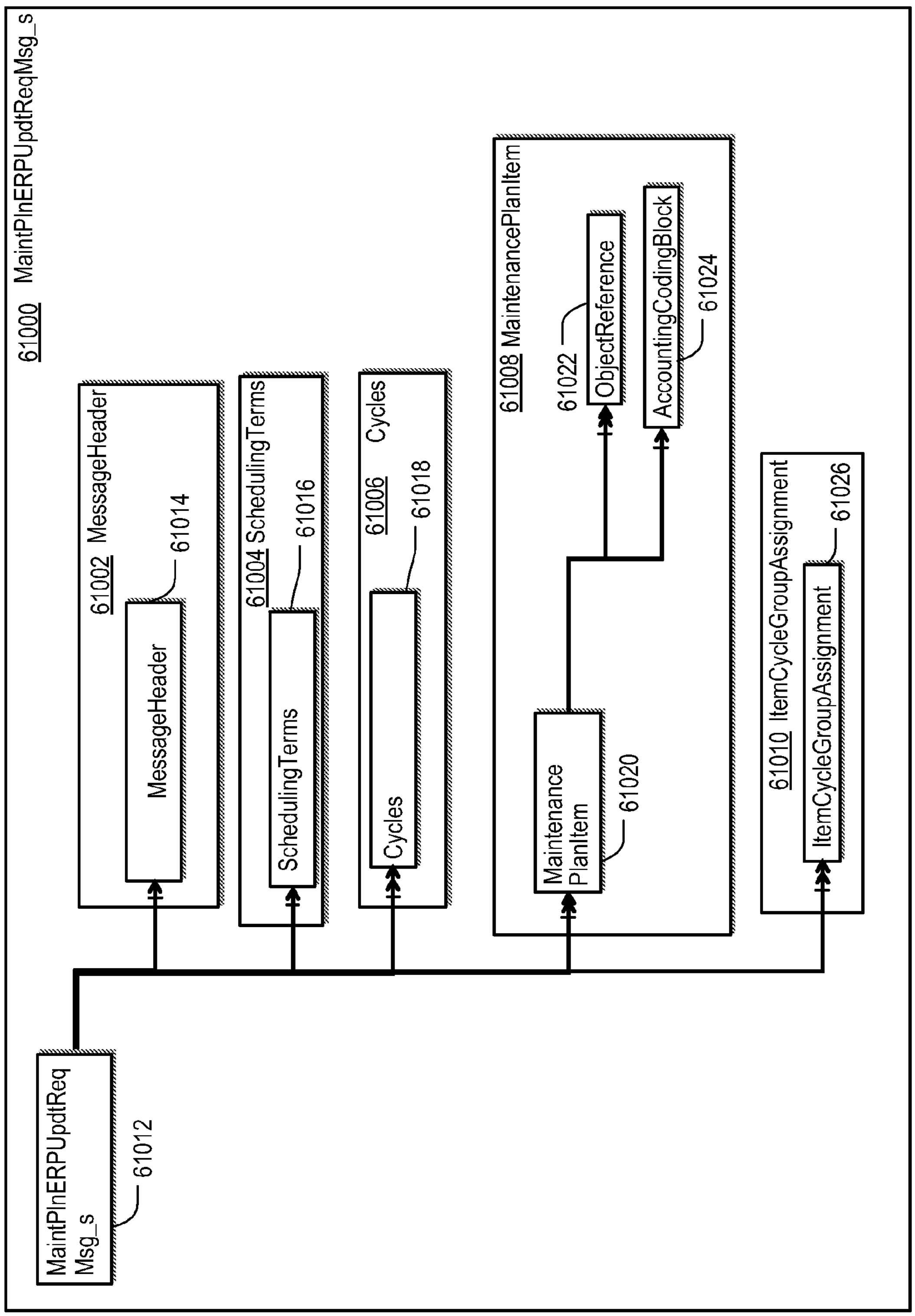
FIG. 61 shows an exemplary MaintPlnERPUpdtReqMsg_ync Message Data Type.

Additionally, FIG. 61 illustrates one example logical configuration of MaintPlnERPUpdtReqMsg_message 61000. Specifically, this figure depicts the arrangement and hierarchy of various components such as one or more levels of packages, entities, and datatypes, shown here as 61002 through 61026. As described above, packages may be used to represent hierarchy levels. Entities are discrete business elements that are used during a business transaction. Data types are used to type object entities and interfaces with a structure. For example, MaintPlnERPUpdtReqMsg_message 61000 includes, among other things, SchedulingTerms 61016. Accordingly, heterogeneous applications may communicate using this consistent message configured as such.

Figure 62:
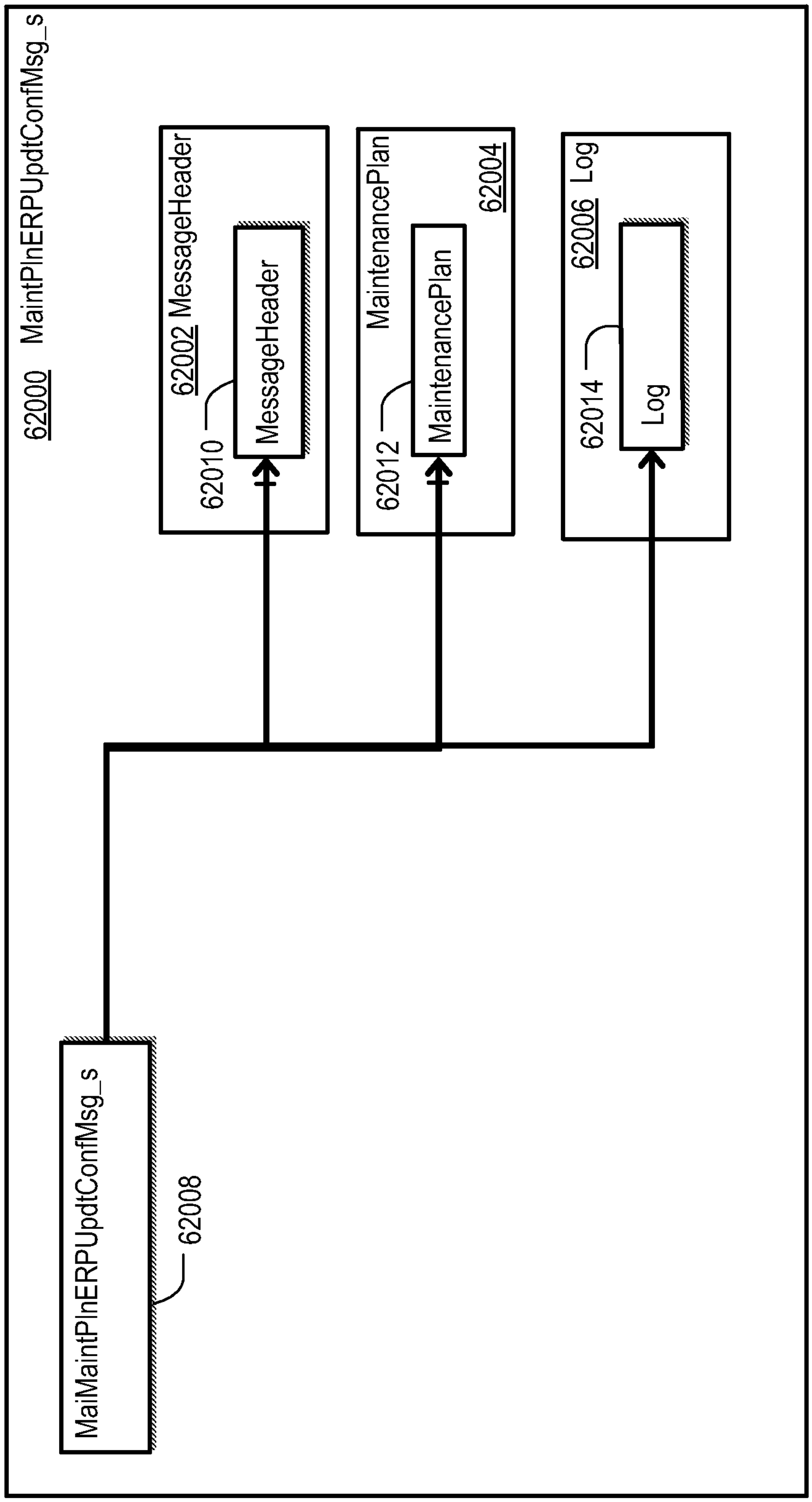
FIG. 62 shows an exemplary MaintPlnERPUpdtConfMsg_ync Message Data Type.

Additionally, FIG. 62 illustrates one example logical configuration of MaintPlnERPUpdtConfMsg_message 62000. Specifically, this figure depicts the arrangement and hierarchy of various components such as one or more levels of packages, entities, and datatypes, shown here as 62002 through 62014. As described above, packages may be used to represent hierarchy levels. Entities are discrete business elements that are used during a business transaction. Data types are used to type object entities and interfaces with a structure. For example, MaintPlnERPUpdtConfMsg_message 62000 includes, among other things, MaintenancePlan 62012. Accordingly, heterogeneous applications may communicate using this consistent message configured as such.

Figure 63:
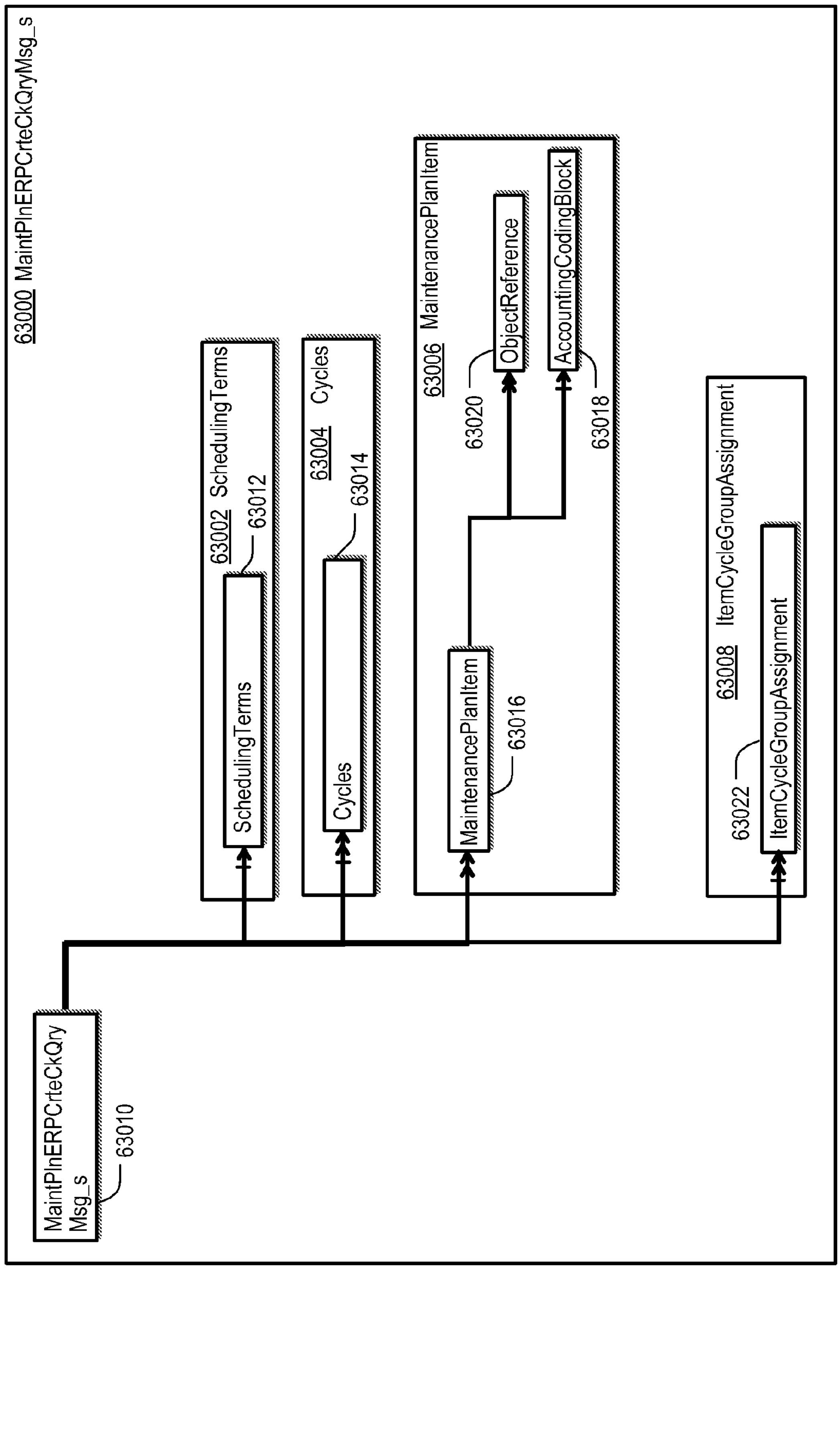
FIG. 63 shows an exemplary MaintPlnERPCrteCkQryMsg_ync Message Data Type.

Additionally, FIG. 63 illustrates one example logical configuration of MaintPlnERPCrteCkQryMsg_message 63000. Specifically, this figure depicts the arrangement and hierarchy of various components such as one or more levels of packages, entities, and datatypes, shown here as 63002 through 63022. As described above, packages may be used to represent hierarchy levels. Entities are discrete business elements that are used during a business transaction. Data types are used to type object entities and interfaces with a structure. For example, MaintPlnERPCrteCkQryMsg_message 63000 includes, among other things, Cycles 63014. Accordingly, heterogeneous applications may communicate using this consistent message configured as such.

Figure 64:
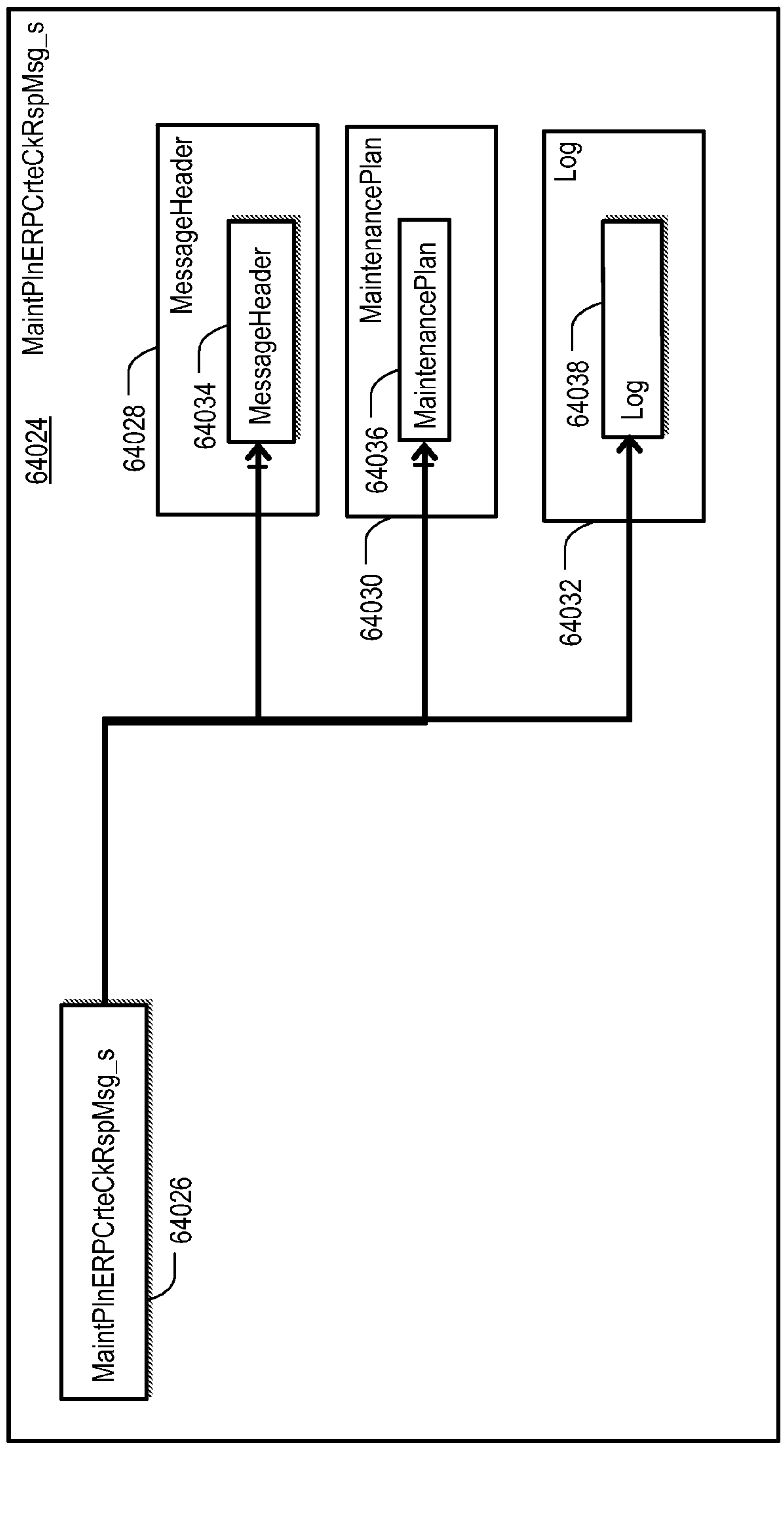
FIG. 64 shows an exemplary MaintPlnERPCrteCkRspMsg_ync Message Data Type.

Additionally, FIG. 64 illustrates one example logical configuration of MaintPlnERPCrteCkRspMsg_message 64000. Specifically, this figure depicts the arrangement and hierarchy of various components such as one or more levels of packages, entities, and datatypes, shown here as 64024 through 64038. As described above, packages may be used to represent hierarchy levels. Entities are discrete business elements that are used during a business transaction. Data types are used to type object entities and interfaces with a structure. For example, MaintPlnERPCrteCkRspMsg_message 64000 includes, among other things, MaintenancePlan 64036. Accordingly, heterogeneous applications may communicate using this consistent message configured as such.

Figure 65:
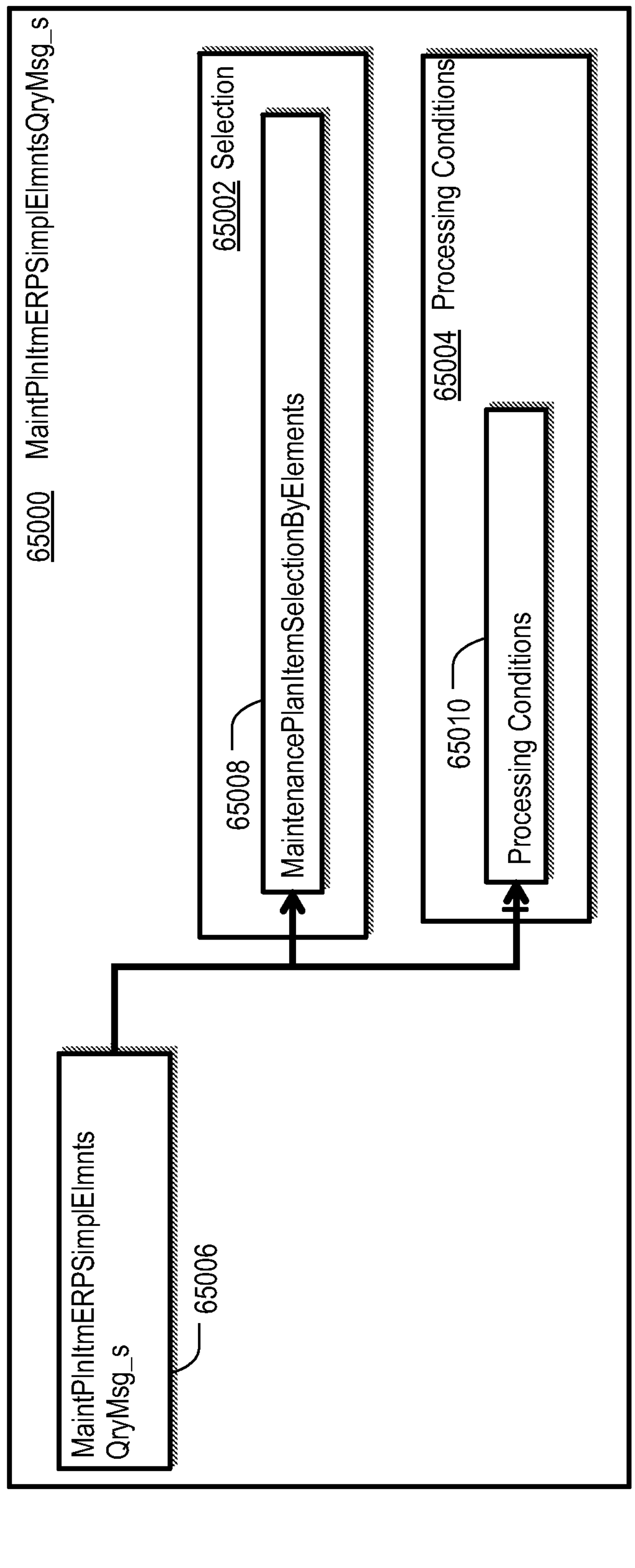
FIG. 65 shows an exemplary MaintPlnItmERPSimplElmntsQryMsg_ync Message Data Type.

Additionally, FIG. 65 illustrates one example logical configuration of MaintPlnItmERPSimplElmntsQryMsg_message 65000. Specifically, this figure depicts the arrangement and hierarchy of various components such as one or more levels of packages, entities, and datatypes, shown here as 65002 through 65010. As described above, packages may be used to represent hierarchy levels. Entities are discrete business elements that are used during a business transaction. Data types are used to type object entities and interfaces with a structure. For example, MaintPlnItmERPSimplElmntsQryMsg_message 65000 includes, among other things, ProcessingConditions 65004. Accordingly, heterogeneous applications may communicate using this consistent message configured as such.

Figure 66:
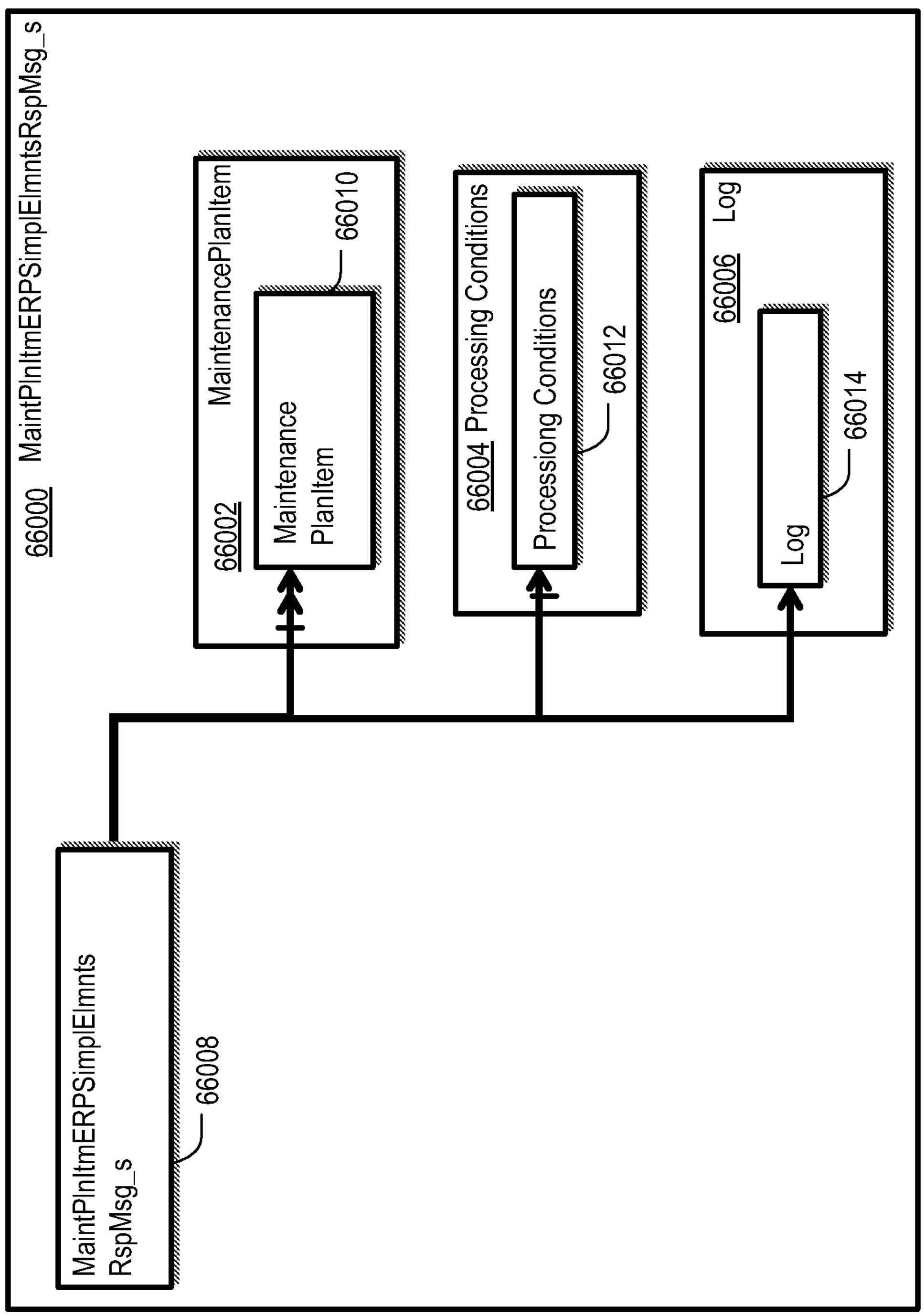
FIG. 66 shows an exemplary MaintPlnItmERPSimplElmntsRspMsg_ync Message Data Type.

Additionally, FIG. 66 illustrates one example logical configuration of MaintPlnItmERPSimplElmntsRspMsg_message 66000. Specifically, this figure depicts the arrangement and hierarchy of various components such as one or more levels of packages, entities, and datatypes, shown here as 66002 through 66014. As described above, packages may be used to represent hierarchy levels. Entities are discrete business elements that are used during a business transaction. Data types are used to type object entities and interfaces with a structure. For example, MaintPlnItmERPSimplElmntsRspMsg_message 66000 includes, among other things, MaintenancePlanItem 66010. Accordingly, heterogeneous applications may communicate using this consistent message configured as such.

Figure 67:
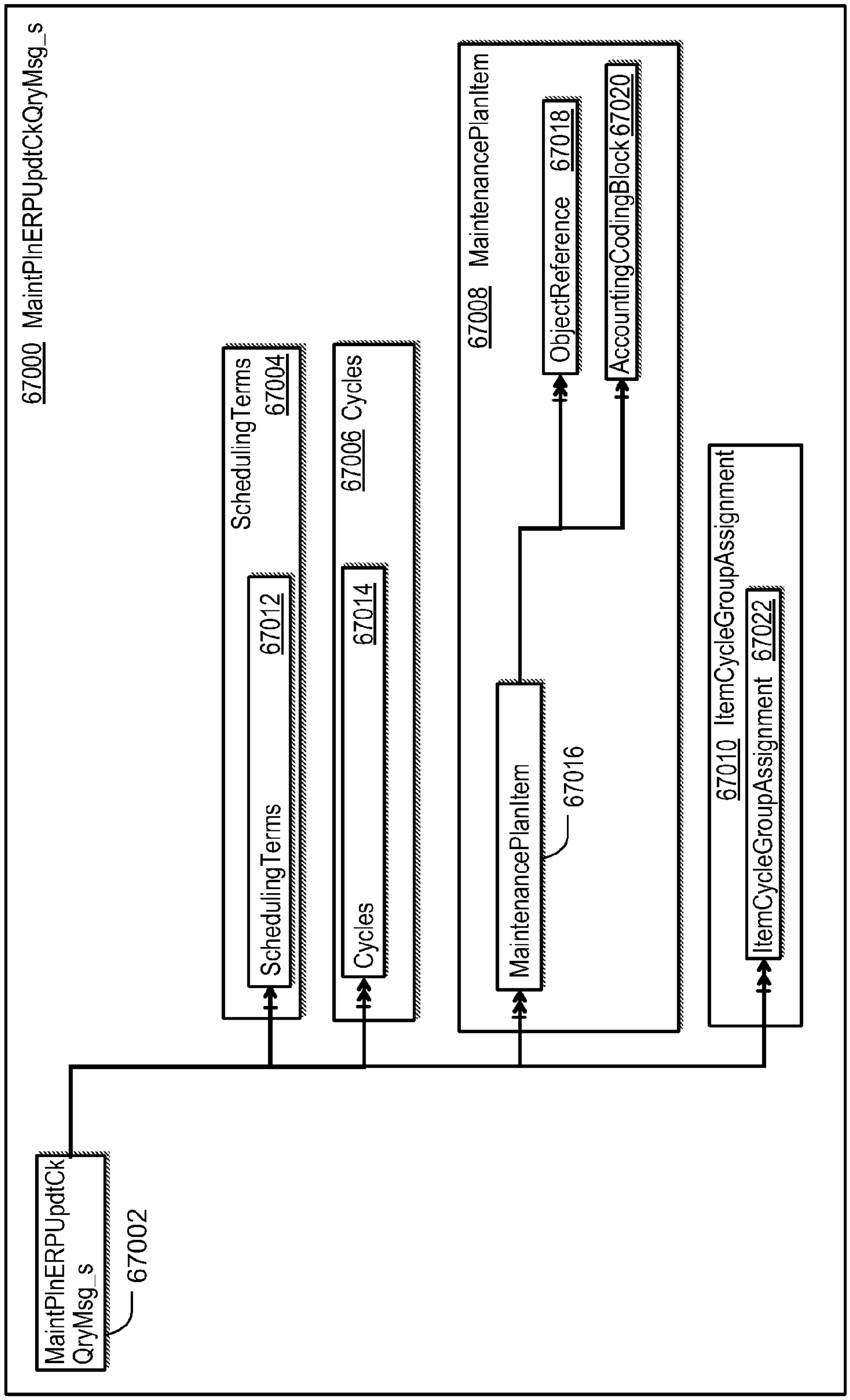
FIG. 67 shows an exemplary MaintPlnERPUpdtCkQryMsg_ync Message Data Type.

Additionally, FIG. 67 illustrates one example logical configuration of MaintPlnERPUpdtCkQryMsg_message 67000. Specifically, this figure depicts the arrangement and hierarchy of various components such as one or more levels of packages, entities, and datatypes, shown here as 67002 through 67022. As described above, packages may be used to represent hierarchy levels. Entities are discrete business elements that are used during a business transaction. Data types are used to type object entities and interfaces with a structure. For example, MaintPlnERPUpdtCkQryMsg_message 67000 includes, among other things, ItemCycleGroupAssignment 67022. Accordingly, heterogeneous applications may communicate using this consistent message configured as such.

Figure 68:
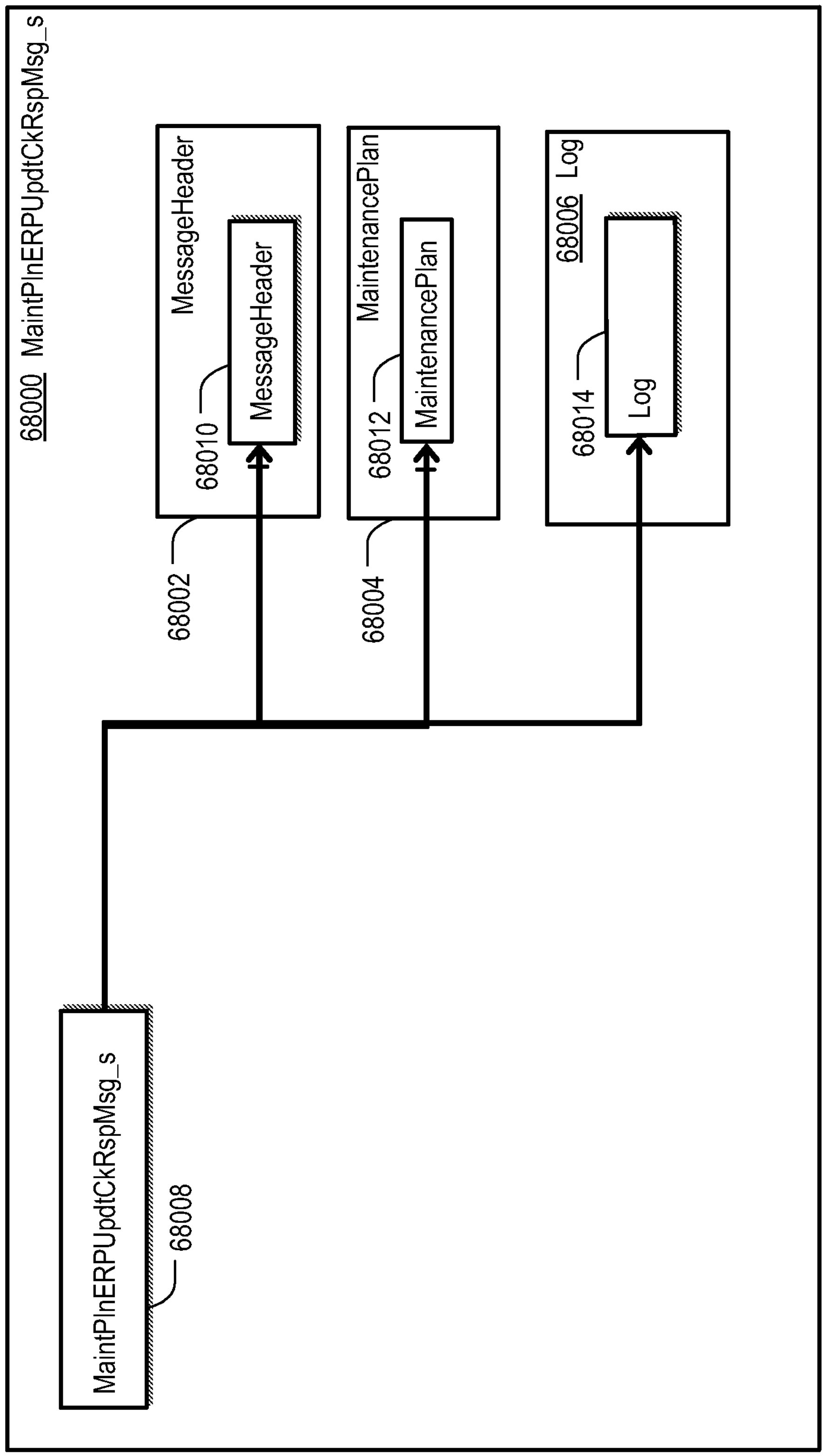
FIG. 68 shows an exemplary MaintPlnERPUpdtCkRspMsg_ync Message Data Type.

Additionally, FIG. 68 illustrates one example logical configuration of MaintPlnERPUpdtCkRspMsg_message 68000. Specifically, this figure depicts the arrangement and hierarchy of various components such as one or more levels of packages, entities, and datatypes, shown here as 68002 through 68014. As described above, packages may be used to represent hierarchy levels. Entities are discrete business elements that are used during a business transaction. Data types are used to type object entities and interfaces with a structure. For example, MaintPlnERPUpdtCkRspMsg_message 68000 includes, among other things, Log 68006. Accordingly, heterogeneous applications may communicate using this consistent message configured as such.

Figure 69:
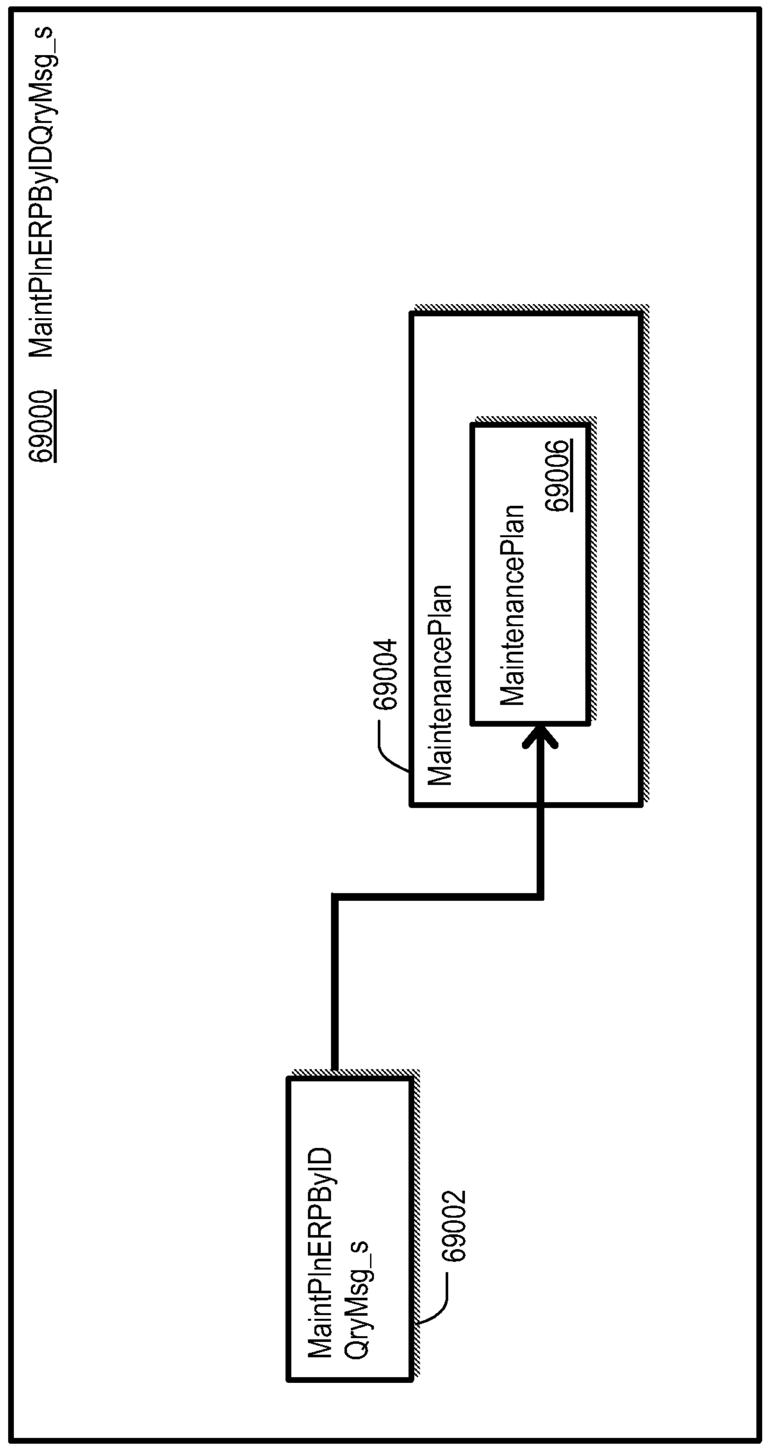
FIG. 69 shows an exemplary MaintPlnERPByIDQryMsg_ync Message Data Type.

Additionally, FIG. 69 illustrates one example logical configuration of MaintPlnERPByIDQryMsg_message 69000. Specifically, this figure depicts the arrangement and hierarchy of various components such as one or more levels of packages, entities, and datatypes, shown here as 69002 through 69006. As described above, packages may be used to represent hierarchy levels. Entities are discrete business elements that are used during a business transaction. Data types are used to type object entities and interfaces with a structure. For example, MaintPlnERPByIDQryMsg_message 69000 includes, among other things, MaintenancePlan 69004. Accordingly, heterogeneous applications may communicate using this consistent message configured as such.

Figure 70:
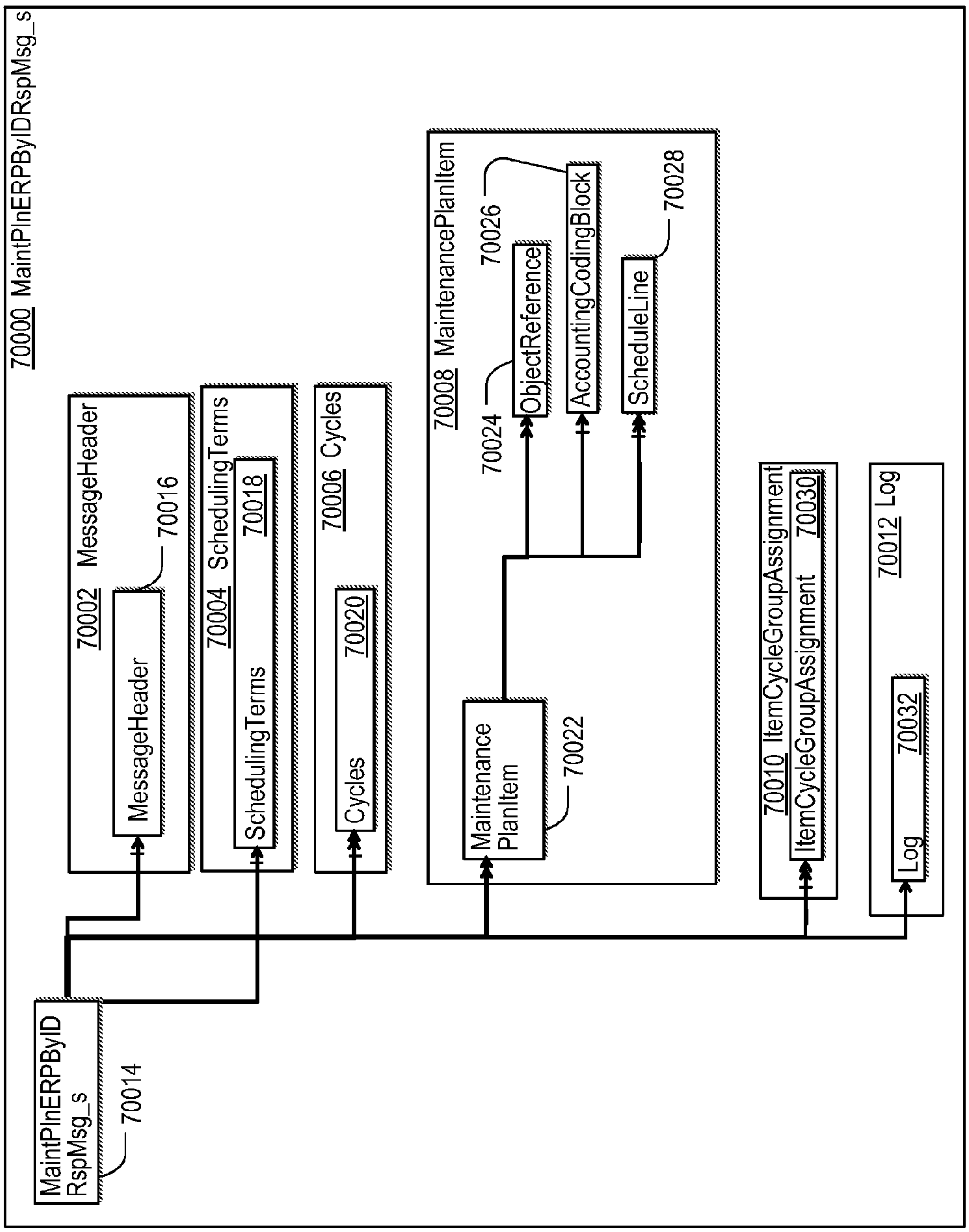
FIG. 70 shows an exemplary MaintPlnERPByIDRspMsg_ync Message Data Type.

Additionally, FIG. 70 illustrates one example logical configuration of MaintPlnERPByIDRspMsg_message 70000. Specifically, this figure depicts the arrangement and hierarchy of various components such as one or more levels of packages, entities, and datatypes, shown here as 70002 through 70032. As described above, packages may be used to represent hierarchy levels. Entities are discrete business elements that are used during a business transaction. Data types are used to type object entities and interfaces with a structure. For example, MaintPlnERPByIDRspMsg_message 70000 includes, among other things, SchedulingTerms 70018. Accordingly, heterogeneous applications may communicate using this consistent message configured as such.

Figure 71:
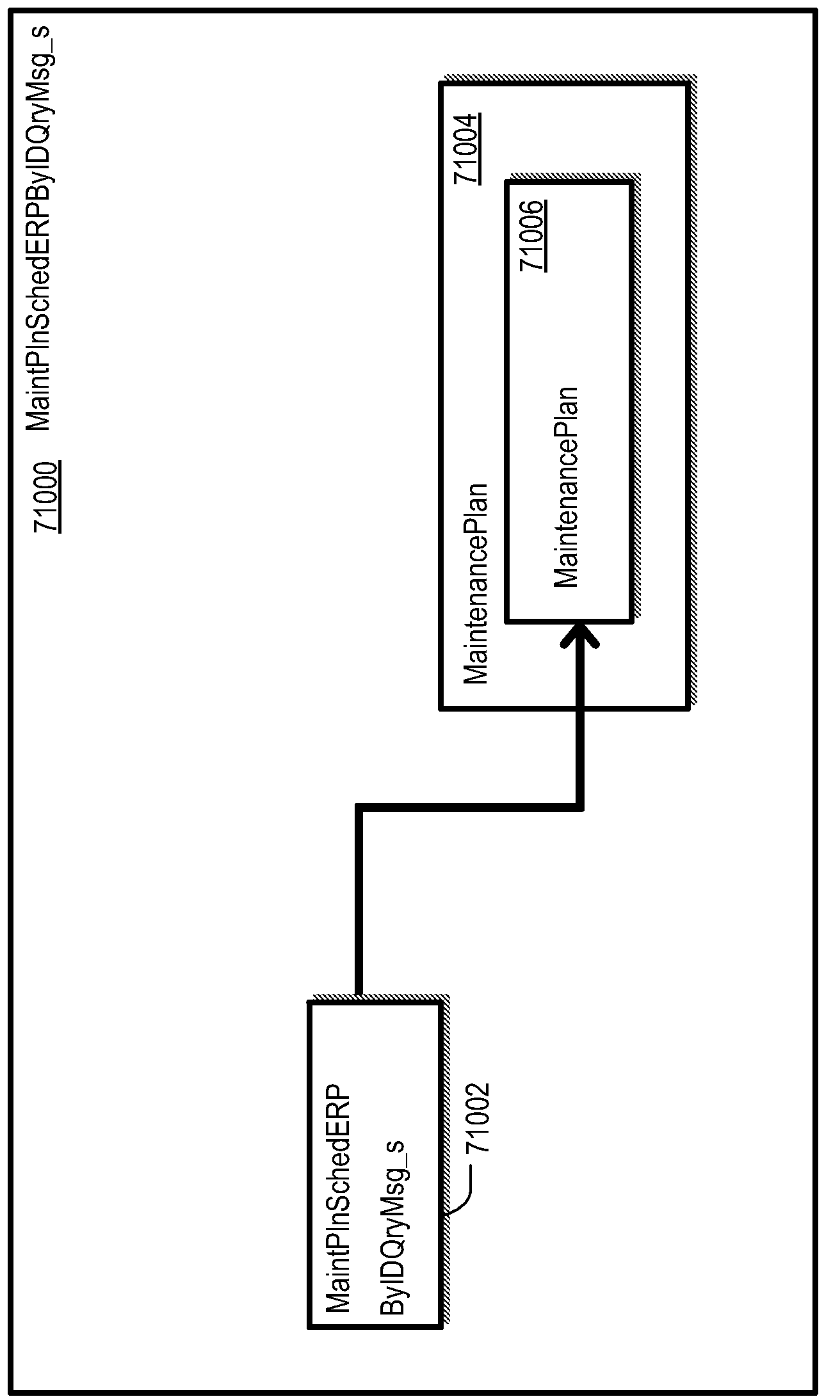
FIG. 71 shows an exemplary MaintPlnSchedERPByIDQryMsg_ync Message Data Type.

Additionally, FIG. 71 illustrates one example logical configuration of MaintPlnSchedERPByIDQryMsg_message 71000. Specifically, this figure depicts the arrangement and hierarchy of various components such as one or more levels of packages, entities, and datatypes, shown here as 71002 through 71006. As described above, packages may be used to represent hierarchy levels. Entities are discrete business elements that are used during a business transaction. Data types are used to type object entities and interfaces with a structure. For example, MaintPlnSchedERPByIDQryMsg_message 71000 includes, among other things, MaintenancePlan 71004. Accordingly, heterogeneous applications may communicate using this consistent message configured as such.

Figure 72:
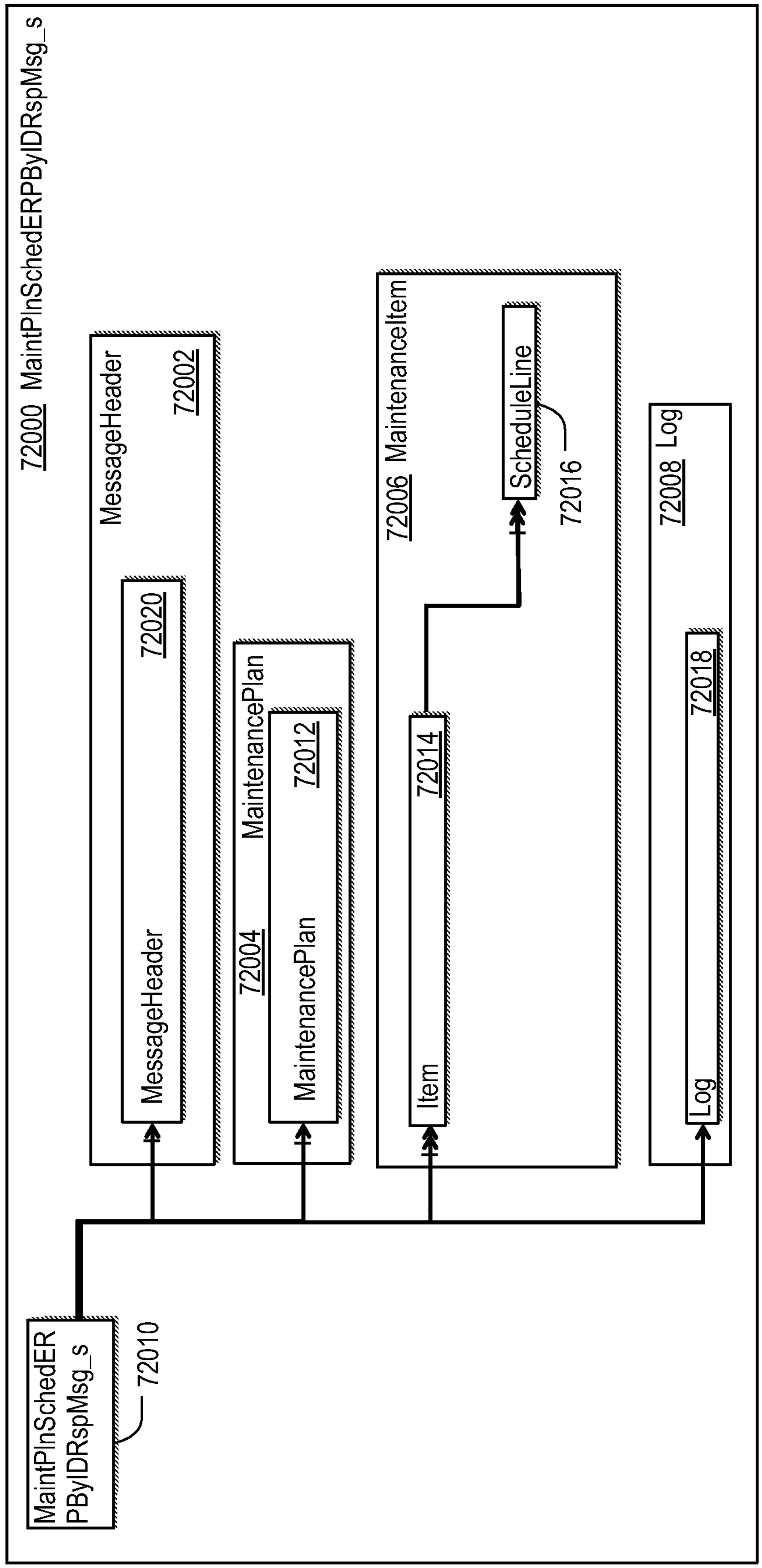
FIG. 72 shows an exemplary MaintPlnSchedERPByIDRspMsg_ync Message Data Type.

Additionally, FIG. 72 illustrates one example logical configuration of MaintPlnSchedERPByIDRspMsg_message 72000. Specifically, this figure depicts the arrangement and hierarchy of various components such as one or more levels of packages, entities, and datatypes, shown here as 72002 through 72018. As described above, packages may be used to represent hierarchy levels. Entities are discrete business elements that are used during a business transaction. Data types are used to type object entities and interfaces with a structure. For example, MaintPlnSchedERPByIDRspMsg_message 72000 includes, among other things, Item 72014. Accordingly, heterogeneous applications may communicate using this consistent message configured as such.

FIGS. 73-1 through 73-12 show an example configuration of an Element Structure that includes a MaintenancePlanMessage_ync 73000 package. The MaintenancePlanMessage_ync 73000 package is a <MessageDataType> 73002 data type. The MaintenancePlanMessage_ync 73000 package includes various packages, namely a MessageHeader 73004, a MaintenancePlan 73010, a ProcessingConditions 73424 and a Log 73460.

The MessageHeader 73004 package can be a BasicBusinessDocumentMessageHeader 73008 data type. The MessageHeader 73004 package includes a MessageHeader 73006 entity. A BasicBusinessDocumentMessageHeader can be a collection of identification data of an instance of a business document message, or reference data to another instance of a business document message, or both. The subject of the identification data can be a message instance that conveys them, whereas the reference data can be related to a different message instance previously exchanged between the same interaction parties.

The MaintenancePlan 73010 package includes a MaintenancePlan 73012 entity. The MaintenancePlan 73012 entity includes various attributes, namely an ID 73014, a CategoryCode 73020, a TypeCode 73026, a StatusObject 73032, a StartDateTime 73038, a MeasuringDeviceStartMeasurementReadingMeasure 73042, a Description 73048 and a TextCollection 73054. The MaintenancePlan 73012 entity includes various subordinate entities, namely a SchedulingTerms 73060, a Cycle 73148, an Item 73194 and a CycleGroup 73402.

The ID 73014 attribute can be a MaintenancePlanID 73018 data type. The ID 73014 attribute has a cardinality of 1 73016 meaning that for each instance of the MaintenancePlan 73012 entity there is one ID 73014 attribute. A MaintenancePlanID can be a unique identifier for a maintenance plan. The CategoryCode 73020 attribute can be a MaintenancePlanCategoryCode 73024 data type. The CategoryCode 73020 attribute has a cardinality of 1 73022 meaning that for each instance of the MaintenancePlan 73012 entity there is one CategoryCode 73020 attribute. A MaintenancePlanCategoryCode can be a coded representation of a maintenance plan category, and can determine which maintenance call object the system generates for a maintenance plan.

The TypeCode 73026 attribute can be a MaintenancePlanTypeCode 73030 data type. The TypeCode 73026 attribute has a cardinality of 1 73028 meaning that for each instance of the MaintenancePlan 73012 entity there is one TypeCode 73026 attribute. The StatusObject 73032 attribute can be a StatusObject 73036 data type. The StatusObject 73032 attribute has a cardinality of 0 . . . 1 73034 meaning that for each instance of the MaintenancePlan 73012 entity there may be one StatusObject 73032 attribute. A StatusObject can describe the processing status of a maintenance plan in a structured form. The StartDateTime 73038 attribute has a cardinality of 0 . . . 1 73040 meaning that for each instance of the MaintenancePlan 73012 entity there may be one StartDateTime 73038 attribute.

A CycleStartDateTime can be a date on which the system starts a maintenance plan. The MeasuringDeviceStartMeasurementReadingMeasure 73042 attribute can be a Measure 73046 data type. The MeasuringDeviceStartMeasurementReadingMeasure 73042 attribute has a cardinality of 0 . . . 1 73044 meaning that for each instance of the MaintenancePlan 73012 entity there may be one MeasuringDeviceStartMeasurementReadingMeasure 73042 attribute. A MeasuringDeviceStartMeasurementReadingMeasure can be a measure from where the system starts a maintenance plan. The Description 73048 attribute can be a SHORT_Description 73052 data type.

The Description 73048 attribute has a cardinality of 1 73050 meaning that for each instance of the MaintenancePlan 73012 entity there is one Description 73048 attribute. A Description can be a representation of the properties of a maintenance plan in natural language. The TextCollection 73054 attribute can be a TextCollection 73058 data type. The TextCollection 73054 attribute has a cardinality of 0 . . . 1 73056 meaning that for each instance of the MaintenancePlan 73012 entity there may be one TextCollection 73054 attribute. A TextCollection can be a collection of text descriptions of a business object or a part of a business object.

The SchedulingTerms 73060 entity has a cardinality of 0 . . . 1 73062 meaning that for each instance of the MaintenancePlan 73012 entity there may be one SchedulingTerms 73060 entity. The SchedulingTerms 73060 entity includes various attributes, namely a StartDateTime 73064, a MeasuringDeviceStartMeasurementReadingMeasure 73070, a LateCompletionShiftPercent 73076, an EarlyCompletionShiftPercent 73082, a LateCompletionTolerencePercent 73088, an EarlyCompletionTolerencePercent 73094, a WorkingDayCalendarCode 73100, a MaintenancePlanCycleQuantityModificationFactorValue 73106, a BufferStartDaysNumberValue 73112, a CallHorizonPercent 73118, a PredecessorCompletionRequiredIndicator 73124, a SchedulingDuration 73130, a SchedulingCategoryCode 73136 and a CycleDependencyIndicator 73142.

The StartDateTime 73064 attribute is a TIMEZONEINDEPENDENT_DateTime 73068 data type. The StartDateTime 73064 attribute has a cardinality of 0 . . . 1 73066 meaning that for each instance of the SchedulingTerms 73060 entity there may be one StartDateTime 73064 attribute. A StartDateTime can be a date on which the system starts a maintenance plan. The MeasuringDeviceStartMeasurementReadingMeasure 73070 attribute can be a Measure 73074 data type. The MeasuringDeviceStartMeasurementReadingMeasure 73070 attribute has a cardinality of 0 . . . 1 73072 meaning that for each instance of the SchedulingTerms 73060 entity there may be one MeasuringDeviceStartMeasurementReadingMeasure 73070 attribute.

A MeasuringDeviceStartMeasurementReadingMeasure can be a measure from where the system starts a maintenance plan. The LateCompletionShiftPercent 73076 attribute can be a Percent 73080 data type. The LateCompletionShiftPercent 73076 attribute has a cardinality of 0 . . . 1 73078 meaning that for each instance of the SchedulingTerms 73060 entity there may be one LateCompletionShiftPercent 73076 attribute. A LateCompletionShiftPercent can be a percentage of a shift to be applied to a calculation of a next date in an event of late completion. The EarlyCompletionShiftPercent 73082 attribute can be a Percent 73086 data type.

The EarlyCompletionShiftPercent 73082 attribute has a cardinality of 0 . . . 1 73084 meaning that for each instance of the SchedulingTerms 73060 entity there may be one EarlyCompletionShiftPercent 73082 attribute. An EarlyCompletionShiftPercent can be a percentage of a shift to be applied to a calculation of a next date in an event of early completion. The LateCompletionTolerencePercent 73088 attribute can be a Percent 73092 data type. The LateCompletionTolerencePercent 73088 attribute has a cardinality of 0 . . . 1 73090 meaning that for each instance of the SchedulingTerms 73060 entity there may be one LateCompletionTolerencePercent 73088 attribute. A LateCompletionTolerencePercent can be a percentage rate of the smallest interval between maintenance cycles which determines a time span in which positive variances between actual and planned dates do not influence subsequent scheduling. The EarlyCompletionTolerencePercent 73094 attribute can be a Percent 73098 data type.

The EarlyCompletionTolerencePercent 73094 attribute has a cardinality of 0 . . . 1 73096 meaning that for each instance of the SchedulingTerms 73060 entity there may be one EarlyCompletionTolerencePercent 73094 attribute. A LateCompletionTolerencePercent can be a percentage rate of the smallest interval between maintenance cycles which determines a time span in which negative variances between actual and planned dates do not influence subsequent planning. The WorkingDayCalendarCode 73100 attribute can be a WorkingDayCalendarCode 73104 data type. The WorkingDayCalendarCode 73100 attribute has a cardinality of 0 . . . 1 73102 meaning that for each instance of the SchedulingTerms 73060 entity there may be one WorkingDayCalendarCode 73100 attribute. A WorkingDayCalendarCode can be a coded representation of a working day calendar.

The MaintenancePlanCycleQuantityModificationFactorValue 73106 attribute can be a MaintenancePlanCycleQuantityModificationFactorValue 73110 data type. The MaintenancePlanCycleQuantityModificationFactorValue 73106 attribute has a cardinality of 0 . . . 1 73108 meaning that for each instance of the SchedulingTerms 73060 entity there may be one MaintenancePlanCycleQuantityModificationFactorValue 73106 attribute. A MaintenancePlanCycleModificationValue can be a multiplication factor number that changes the cycle times of maintenance plan. The BufferStartDaysNumberValue 73112 attribute can be a NumberValue 73116 data type. The BufferStartDaysNumberValue 73112 attribute has a cardinality of 0 . . . 1 73114 meaning that for each instance of the SchedulingTerms 73060 entity there may be one BufferStartDaysNumberValue 73112 attribute.

A BufferStartDaysNumberValue can be the number of days specified as a preliminary buffer for a maintenance call object start date. The CallHorizonPercent 73118 attribute can be a Percent 73122 data type. The CallHorizonPercent 73118 attribute has a cardinality of 0 . . . 1 73120 meaning that for each instance of the SchedulingTerms 73060 entity there may be one CallHorizonPercent 73118 attribute. A CallHorizonPercent can be a percentage value which determines when a maintenance call object may be generated for a maintenance plan. The PredecessorCompletionRequiredIndicator 73124 attribute can be an Indicator 73128 data type. The PredecessorCompletionRequiredIndicator 73124 attribute has a cardinality of 0 . . . 1 73126 meaning that for each instance of the SchedulingTerms 73060 entity there may be one PredecessorCompletionRequiredIndicator 73124 attribute.

A PredecessorCompletionRequiredIndicator can be an indicator to generate the next maintenance call object after the completion of a predecessor. The SchedulingDuration 73130 attribute can be a Duration 73134 data type. The SchedulingDuration 73130 attribute has a cardinality of 0 . . . 1 73132 meaning that for each instance of the SchedulingTerms 73060 entity there may be one SchedulingDuration 73130 attribute. SchedulingDuration can be a length of time for which the system creates maintenance calls during maintenance plan scheduling. The SchedulingCategoryCode 73136 attribute can be a MaintenancePlanSchedulingTypeCode 73140 data type.

The SchedulingCategoryCode 73136 attribute has a cardinality of 0 . . . 1 73138 meaning that for each instance of the SchedulingTerms 73060 entity there may be one SchedulingCategoryCode 73136 attribute. A SchedulingCategoryCode can be an indicator for identification of specific time-based or counter-based maintenance. The CycleDependencyIndicator 73142 attribute can be an Indicator 73146 data type. The CycleDependencyIndicator 73142 attribute has a cardinality of 0 . . . 1 73144 meaning that for each instance of the SchedulingTerms 73060 entity there may be one CycleDependencyIndicator 73142 attribute. An CycleDependencyIndicator can be an indicator for defining a relationship between maintenance cycles.

The Cycle 73148 entity has a cardinality of 0 . . . N 73150 meaning that for each instance of the MaintenancePlan 73012 entity there may be one or more Cycle 73148 entities. The Cycle 73148 entity includes various attributes, namely a CounterValue 73152, a GroupSequenceNumberValue 73158, a GroupSequenceRepetitionNumberValue 73164, a Quantity 73170, a StartOffsetQuantity 73176, a MeasuringDeviceID 73182 and a Description 73188. The CounterValue 73152 attribute can be a CounterValue 73156 data type.

The CounterValue 73152 attribute has a cardinality of 1 73154 meaning that for each instance of the Cycle 73148 entity there is one CounterValue 73152 attribute. A MaintenancePlanCycleID can be a unique identifier for a maintenance plan cycle. The GroupSequenceNumberValue 73158 attribute can be a NumberValue 73162 data type. The GroupSequenceNumberValue 73158 attribute has a cardinality of 1 73160 meaning that for each instance of the Cycle 73148 entity there is one GroupSequenceNumberValue 73158 attribute. A MaintenancePlanCycleGroupSequenceNumberValue can be a value to determine a maintenance cycle group.

The GroupSequenceRepetitionNumberValue 73164 attribute can be a NumberValue 73168 data type. The GroupSequenceRepetitionNumberValue 73164 attribute has a cardinality of 0 . . . N 73166 meaning that for each instance of the Cycle 73148 entity there may be one or more GroupSequenceRepetitionNumberValue 73164 attributes. A GroupSequenceRepetitionNumberValue can be a value to determine how often in a sequence a cycle set is used to calculate a date, before the system changes to the next cycle set.

The Quantity 73170 attribute can be a Quantity 73174 data type. The Quantity 73170 attribute has a cardinality of 1 73172 meaning that for each instance of the Cycle 73148 entity there is one Quantity 73170 attribute. A maintenance plan cycle quantity can be a quantity after which a maintenance task is due to be performed. The StartOffsetQuantity 73176 attribute can be a Quantity 73180 data type. The StartOffsetQuantity 73176 attribute has a cardinality of 0 . . . 1 73178 meaning that for each instance of the Cycle 73148 entity there may be one StartOffsetQuantity 73176 attribute. A StartOffsetQuantity can be a quantity using which the first due task is determined. The MeasuringDeviceID 73182 attribute can be a MeasuringDeviceID 73186 data type.

The MeasuringDeviceID 73182 attribute has a cardinality of 0 . . . N 73184 meaning that for each instance of the Cycle 73148 entity there may be one or more MeasuringDeviceID 73182 attributes. A MeasuringDeviceID can be a unique identifier for a measuring device. The Description 73188 attribute can be a SHORT_Description 73192 data type. The Description 73188 attribute has a cardinality of 0 . . . 1 73190 meaning that for each instance of the Cycle 73148 entity there may be one Description 73188 attribute. A Description can be a representation of properties of a maintenance plan cycle in natural language.

The Item 73194 entity has a cardinality of 0 . . . N 73196 meaning that for each instance of the MaintenancePlan 73012 entity there may be one or more Item 73194 entities. The Item 73194 entity includes various attributes, namely an ID 73198, a CategoryCode 73204, a CycleGroupSequenceNumberValue 73210, a Description 73216, a BusinessTransactionDocumentProcessingTypeCode 73222, a MaintenancePlannerGroupCode 73228, an ImportanceCode 73234, a MaintenanceTaskListID 73240, a MaintenanceTaskListGroupID 73246, a MaintenanceTaskListTypeCode 73252, a BusinessTransactionDocumentID 73258, a WorkCentreDescription 73264, a StatusObject 73270, a MaintenancePlanningPlantID 73276, a WorkCentreID 73282, a WorkCentrePlantID 73288, a MaintenancePlantDescription 73294, a MaintenanceWorkCenterDescription 73300 and a TextCollection 73306.

The Item 73194 entity includes various subordinate entities, namely an ObjectReference 73312 and a ScheduleLine 73376. The ID 73198 attribute can be a MaintenancePlanItemID 73202 data type. The ID 73198 attribute has a cardinality of 1 73200 meaning that for each instance of the Item 73194 entity there is one ID 73198 attribute. A MaintenancePlanItemID can be a unique identifier for a maintenance plan item. The CategoryCode 73204 attribute can be a MaintenancePlanCategoryCode 73208 data type. The CategoryCode 73204 attribute has a cardinality of 1 73206 meaning that for each instance of the Item 73194 entity there is one CategoryCode 73204 attribute. A MaintenancePlanCategoryCode can be a coded representation of a maintenance plan category that determines which maintenance call object the system generates for a maintenance plan. The CycleGroupSequenceNumberValue 73210 attribute can be a NumberValue 73214 data type.

The CycleGroupSequenceNumberValue 73210 attribute has a cardinality of 1 73212 meaning that for each instance of the Item 73194 entity there is one CycleGroupSequenceNumberValue 73210 attribute. A MaintenancePlanCycleGroupSequenceNumberValue can be a value to determine a maintenance cycle group. The Description 73216 attribute can be a SHORT_Description 73220 data type. The Description 73216 attribute has a cardinality of 0 . . . 1 73218 meaning that for each instance of the Item 73194 entity there may be one Description 73216 attribute. A Description can be a representation of properties of a maintenance plan item in natural language.

The BusinessTransactionDocumentProcessingTypeCode 73222 attribute can be a BusinessTransactionDocumentProcessingTypeCode 73226 data type. The BusinessTransactionDocumentProcessingTypeCode 73222 attribute has a cardinality of 1 73224 meaning that for each instance of the Item 73194 entity there is one BusinessTransactionDocumentProcessingTypeCode 73222 attribute. A BusinessTransactionDocumentProcessingTypeCode can be a coded representation of a type of a MaintenanceOrder. The MaintenancePlannerGroupCode 73228 attribute can be a MaintenancePlannerGroupCode 73232 data type. The MaintenancePlannerGroupCode 73228 attribute has a cardinality of 0 . . . 1 73230 meaning that for each instance of the Item 73194 entity there may be one MaintenancePlannerGroupCode 73228 attribute.

A PlannerGroupCode can be a coded representation of a PlannerGroup. The ImportanceCode 73234 attribute can be an ImportanceCode 73238 data type. The ImportanceCode 73234 attribute has a cardinality of 0 . . . 1 73236 meaning that for each instance of the Item 73194 entity there may be one ImportanceCode 73234 attribute. An ImportanceCode can be a coded representation of the importance of a maintenance plan. The MaintenanceTaskListID 73240 attribute can be a MaintenanceTaskListID 73244 data type. The MaintenanceTaskListID 73240 attribute has a cardinality of 0 . . . 1 73242 meaning that for each instance of the Item 73194 entity there may be one MaintenanceTaskListID 73240 attribute. A MaintenanceTaskListID can be an identifier for a maintenance task list in a MaintenanceTaskList Group.

The MaintenanceTaskListGroupID 73246 attribute can be a BusinessTransactionDocumentGroupID 73250 data type. The MaintenanceTaskListGroupID 73246 attribute has a cardinality of 0 . . . 1 73248 meaning that for each instance of the Item 73194 entity there may be one MaintenanceTaskListGroupID 73246 attribute. A MaintenanceTaskListGroupID can be an identifier for a TaskListGroup. The MaintenanceTaskListTypeCode 73252 attribute can be a BusinessObjectTypeCode 73256 data type. The MaintenanceTaskListTypeCode 73252 attribute has a cardinality of 0 . . . 1 73254 meaning that for each instance of the Item 73194 entity there may be one MaintenanceTaskListTypeCode 73252 attribute.

A MaintenanceTaskListTypeCode can be a coded representation of the type of a maintenance task list. The BusinessTransactionDocumentID 73258 attribute can be a BusinessTransactionDocumentReference 73262 data type. The BusinessTransactionDocumentID 73258 attribute has a cardinality of 0 . . . 1 73260 meaning that for each instance of the Item 73194 entity there may be one BusinessTransactionDocumentID 73258 attribute. A BusinessTransactionDocumentID can be a unique identifier for a business transaction document.

The WorkCentreDescription 73264 attribute can be a SHORT_Description 73268 data type. The WorkCentreDescription 73264 attribute has a cardinality of 0 . . . 1 73266 meaning that for each instance of the Item 73194 entity there may be one WorkCentreDescription 73264 attribute. A WorkCentreDescription can be a representation of the properties of a maintenance work centre in natural language.

The StatusObject 73270 attribute can be a StatusObject 73274 data type. The StatusObject 73270 attribute has a cardinality of 0 . . . 1 73272 meaning that for each instance of the Item 73194 entity there may be one StatusObject 73270 attribute. A StatusObject can describe the processing status of a maintenance plan item in structured form. The MaintenancePlanningPlantID 73276 attribute can be a PlantID 73280 data type. The MaintenancePlanningPlantID 73276 attribute has a cardinality of 0 . . . 1 73278 meaning that for each instance of the Item 73194 entity there may be one MaintenancePlanningPlantID 73276 attribute.

A MaintenancePlanningPlantID can be an identifier of a plant in which planning and supervision of the execution of maintenance work is done. The WorkCentreID 73282 attribute can be a WorkCentreID 73286 data type. The WorkCentreID 73282 attribute has a cardinality of 0 . . . 1 73284 meaning that for each instance of the Item 73194 entity there may be one WorkCentreID 73282 attribute. A WorkCentreID can be an identifier of a work centre where the execution of maintenance work is done. The WorkCentrePlantID 73288 attribute can be a PlantID 73292 data type. The WorkCentrePlantID 73288 attribute has a cardinality of 0 . . . 1 73290 meaning that for each instance of the Item 73194 entity there may be one WorkCentrePlantID 73288 attribute. A WorkCentrePlantID can be an identifier of a plant where a work centre which is responsible for the execution of maintenance work is present. The MaintenancePlantDescription 73294 attribute can be a SHORT_Description 73298 data type.

The MaintenancePlantDescription 73294 attribute has a cardinality of 0 . . . 1 73296 meaning that for each instance of the Item 73194 entity there may be one MaintenancePlantDescription 73294 attribute. A MaintenancePlantDescription can be a representation of properties of a Maintenance Plant in natural language. The MaintenanceWorkCenterDescription 73300 attribute can be a SHORT_Description 73304 data type. The MaintenanceWorkCenterDescription 73300 attribute has a cardinality of 0 . . . 1 73302 meaning that for each instance of the Item 73194 entity there may be one MaintenanceWorkCenterDescription 73300 attribute. A WorkCenterDescription can be a representation of properties of a Maintenance Work Center in natural language. The TextCollection 73306 attribute can be a TextCollection 73310 data type. The TextCollection 73306 attribute has a cardinality of 0 . . . 1 73308 meaning that for each instance of the Item 73194 entity there may be one TextCollection 73306 attribute. A TextCollection can be a collection of text descriptions of a business object or a part of a business object.

The ObjectReference 73312 entity has a cardinality of 0 . . . N 73314 meaning that for each instance of the Item 73194 entity there may be one or more ObjectReference 73312 entities. The ObjectReference 73312 entity includes various attributes, namely an OrdinalNumberValue 73316, a SerialID 73322, a MaterialInternalID 73328, an IndividualMaterialID 73334, a MainIndicator 73340, an InstallationPointID 73346, a MaterialDescription 73352, an IndividualMaterialDescription 73358, an InstallationPointDescription 73364 and a @actionCode 73370. The OrdinalNumberValue 73316 attribute can be an OrdinalNumberValue 73320 data type. The OrdinalNumberValue 73316 attribute has a cardinality of 0 . . . 1 73318 meaning that for each instance of the ObjectReference 73312 entity there may be one OrdinalNumberValue 73316 attribute.

An OrdinalNumberValue can be a number that indicates a position of a maintenance plan item object reference in a linearly ordered set that is ordered according to particular factors. The SerialID 73322 attribute can be a SerialID 73326 data type. The SerialID 73322 attribute has a cardinality of 0 . . . 1 73324 meaning that for each instance of the ObjectReference 73312 entity there may be one SerialID 73322 attribute. A SerialID (serial number) can be a unique identifier for an individual material that is assigned in a maintenance request. The MaterialInternalID 73328 attribute can be a ProductInternalID 73332 data type. The MaterialInternalID 73328 attribute has a cardinality of 0 . . . 1 73330 meaning that for each instance of the ObjectReference 73312 entity there may be one MaterialInternalID 73328 attribute. A MaterialInternalID can be a proprietary identifier for a material.

The IndividualMaterialID 73334 attribute can be a ProductInternalID 73338 data type. The IndividualMaterialID 73334 attribute has a cardinality of 0 . . . 1 73336 meaning that for each instance of the ObjectReference 73312 entity there may be one IndividualMaterialID 73334 attribute. An IndividualMaterialID can be a proprietary identifier for an individual material. The MainIndicator 73340 attribute can be an Indicator 73344 data type. The MainIndicator 73340 attribute has a cardinality of 1 73342 meaning that for each instance of the ObjectReference 73312 entity there is one MainIndicator 73340 attribute. A MainIndicator can be an indicator which describes a focused object reference. The InstallationPointID 73346 attribute can be an InstallationPointID 73350 data type. The InstallationPointID 73346 attribute has a cardinality of 0 . . . 1 73348 meaning that for each instance of the ObjectReference 73312 entity there may be one InstallationPointID 73346 attribute.

An InstallationPointID can be a unique identifier for an installation point. The MaterialDescription 73352 attribute can be a SHORT_Description 73356 data type. The MaterialDescription 73352 attribute has a cardinality of 0 . . . 1 73354 meaning that for each instance of the ObjectReference 73312 entity there may be one MaterialDescription 73352 attribute. A MaterialInternalDescription can be a representation of properties of a material in natural language. The IndividualMaterialDescription 73358 attribute can be a SHORT_Description 73362 data type. The IndividualMaterialDescription 73358 attribute has a cardinality of 0 . . . 1 73360 meaning that for each instance of the ObjectReference 73312 entity there may be one IndividualMaterialDescription 73358 attribute. An IndividualMaterialDescription can be a representation of properties of an individual material in natural language.

The InstallationPointDescription 73364 attribute can be a SHORT_Description 73368 data type. The InstallationPointDescription 73364 attribute has a cardinality of 0 . . . 1 73366 meaning that for each instance of the ObjectReference 73312 entity there may be one InstallationPointDescription 73364 attribute. An InstallationPointDescription can be a representation of properties of an installation point in natural language. The @actionCode 73370 attribute can be an ActionCode 73374 data type. The @actionCode 73370 attribute has a cardinality of 1 73372 meaning that for each instance of the ObjectReference 73312 entity there is one @actionCode 73370 attribute. An ActionCode can be a coded representation of an instruction to a recipient of a message telling the recipient how to process a transmitted element. ActionCode can determine if the Service Execution Order Operation may be created (Code 01), changed (Code 02), or deleted (Code 03). In some implementations, other codes are not allowed.

The ScheduleLine 73376 entity has a cardinality of 0 . . . N 73378 meaning that for each instance of the Item 73194 entity there may be one or more ScheduleLine 73376 entities. The ScheduleLine 73376 entity includes various attributes, namely an OrdinalNumberValue 73380, a PlannedDateTime 73384, an InitiatedDateTime 73390 and a CompletionDateTime 73396. The OrdinalNumberValue 73380 attribute can be an OrdinalNumberValue 73382 data type. An OrdinalNumberValue can be a number that indicates a position of an element in a linearly ordered set that is ordered according to particular factors.

The PlannedDateTime 73384 attribute can be a TIMEZONEINDEPENDENT_DateTime 73388 data type. The PlannedDateTime 73384 attribute has a cardinality of 0 . . . 1 73386 meaning that for each instance of the ScheduleLine 73376 entity there may be one PlannedDateTime 73384 attribute. A PlannedDateTime can be a date on which a maintenace call object can be executed. The InitiatedDateTime 73390 attribute can be a TIMEZONEINDEPENDENT_DateTime 73394 data type. The InitiatedDateTime 73390 attribute has a cardinality of 0 . . . 1 73392 meaning that for each instance of the ScheduleLine 73376 entity there may be one InitiatedDateTime 73390 attribute. A CallDateTime can be a date on which the system creates a maintenance call object. The CompletionDateTime 73396 attribute can be a TIMEZONEINDEPENDENT_DateTime 73400 data type. The CompletionDateTime 73396 attribute has a cardinality of 0 . . . 1 73398 meaning that for each instance of the ScheduleLine 73376 entity there may be one CompletionDateTime 73396 attribute. A CompletionDateTime can be a date on which a maintenance task was completed.

The CycleGroup 73402 entity has a cardinality of 0 . . . N 73404 meaning that for each instance of the MaintenancePlan 73012 entity there may be one or more CycleGroup 73402 entities. The CycleGroup 73402 entity includes various attributes, namely a SequenceNumberValue 73406, an ItemMaintenancePlanID 73412 and a MaintenancePlanCycleSetNumberValue 73418. The SequenceNumberValue 73406 attribute can be a NumberValue 73410 data type. The SequenceNumberValue 73406 attribute has a cardinality of 1 73408 meaning that for each instance of the CycleGroup 73402 entity there is one SequenceNumberValue 73406 attribute. A GroupSequenceNumberValue can be a value to determine a maintenance cycle group. The ItemMaintenancePlanID 73412 attribute can be a MaintenancePlanID 73416 data type.

The ItemMaintenancePlanID 73412 attribute has a cardinality of 0 . . . 1 73414 meaning that for each instance of the CycleGroup 73402 entity there may be one ItemMaintenancePlanID 73412 attribute. A MaintenancePlanID can be a unique identifier for a maintenance plan. The MaintenancePlanCycleSetNumberValue 73418 attribute can be a NumberValue 73422 data type. The MaintenancePlanCycleSetNumberValue 73418 attribute has a cardinality of 0 . . . N 73420 meaning that for each instance of the CycleGroup 73402 entity there may be one or more MaintenancePlanCycleSetNumberValue 73418 attributes. A MaintenancePlanCycleSetNumberValue can be a value to determine a maintenance cycles group.

The ProcessingConditions 73424 package includes a ProcessingConditions 73426 entity. The ProcessingConditions 73426 entity has a cardinality of 0 . . . 1 73428 meaning that for each instance of the ProcessingConditions 73424 package there may be one ProcessingConditions 73426 entity. The ProcessingConditions 73426 entity includes various attributes, namely a QueryHitsMaximumNumberValue 73430, an UnlimitedQueryHitsIndicator 73436, a ReturnedQueryHitsNumberValue 73442, a MoreElementsAvailableIndicator 73448 and a LastProvidedMaintenanceRequestID 73454. The QueryHitsMaximumNumberValue 73430 attribute can be a NumberValue 73434 data type.

The QueryHitsMaximumNumberValue 73430 attribute has a cardinality of 0 . . . 1 73432 meaning that for each instance of the ProcessingConditions 73426 entity there may be one QueryHitsMaximumNumberValue 73430 attribute. A NumberValue can be a number. In some implementations, NumberValue is used for cardinal numbers. The UnlimitedQueryHitsIndicator 73436 attribute can be an Indicator 73440 data type. The UnlimitedQueryHitsIndicator 73436 attribute has a cardinality of 0 . . . 1 73438 meaning that for each instance of the ProcessingConditions 73426 entity there may be one UnlimitedQueryHitsIndicator 73436 attribute. An Indicator can be a representation of a situation that has exactly two mutually exclusive Boolean values. The ReturnedQueryHitsNumberValue 73442 attribute can be a NumberValue 73446 data type. The ReturnedQueryHitsNumberValue 73442 attribute has a cardinality of 0 . . . 1 73444 meaning that for each instance of the ProcessingConditions 73426 entity there may be one ReturnedQueryHitsNumberValue 73442 attribute. A NumberValue can be a number. In some implementations, NumberValue is used for cardinal numbers.

The MoreElementsAvailableIndicator 73448 attribute can be a MoreElementsAvailableIndicator 73452 data type. The MoreElementsAvailableIndicator 73448 attribute has a cardinality of 0 . . . 1 73450 meaning that for each instance of the ProcessingConditions 73426 entity there may be one MoreElementsAvailableIndicator 73448 attribute. An Indicator can be a representation of a situation that has exactly two mutually exclusive Boolean values. The LastProvidedMaintenanceRequestID 73454 attribute can be a MaintenanceRequestID 73458 data type. The LastProvidedMaintenanceRequestID 73454 attribute has a cardinality of 0 . . . 1 73456 meaning that for each instance of the ProcessingConditions 73426 entity there may be one LastProvidedMaintenanceRequestID 73454 attribute. A MaintenanceRequestID can be a unique identifier for a MaintenanceRequest The Log 73460 package can be a Log 73466 data type. The Log 73460 package includes a Log 73462 entity. The Log 73462 entity has a cardinality of 1 73464 meaning that for each instance of the Log 73460 package there is one Log 73462 entity.

FIGS. 74-1 through 74-8 show an example configuration of an Element Structure that includes a MaintPlnERPCrteReqMsg_74000 package. The MaintPlnERPCrteReqMsg_74000 package includes a MaintPlnERPCrteReqMsg_74002 entity. The MaintPlnERPCrteReqMsg_74000 package includes various packages, namely a MessageHeader 74004 and a MaintenancePlan 74010.

The MessageHeader 74004 package includes a MessageHeader 74006 entity. The MessageHeader 74006 entity has a cardinality of 0 . . . 1 74008 meaning that for each instance of the MessageHeader 74004 package there may be one MessageHeader 74006 entity. The MaintenancePlan 74010 package includes a MaintenancePlan 74012 entity.

The MaintenancePlan 74012 entity has a cardinality of 1 74014 meaning that for each instance of the MaintenancePlan 74010 package there is one MaintenancePlan 74012 entity. The MaintenancePlan 74012 entity includes various attributes, namely a CategoryCode 74016, a Description 74020 and a TextCollection 74024. The MaintenancePlan 74012 entity includes various subordinate entities, namely a SchedulingTerms 74028, a Cycle 74088 and an Item 74120. The CategoryCode 74016 attribute has a cardinality of 1 74018 meaning that for each instance of the MaintenancePlan 74012 entity there is one CategoryCode 74016 attribute. The Description 74020 attribute has a cardinality of 1 74022 meaning that for each instance of the MaintenancePlan 74012 entity there is one Description 74020 attribute. The TextCollection 74024 attribute has a cardinality of 0 . . . 1 74026 meaning that for each instance of the MaintenancePlan 74012 entity there may be one TextCollection 74024 attribute.

The SchedulingTerms 74028 entity has a cardinality of 0 . . . 1 74030 meaning that for each instance of the MaintenancePlan 74012 entity there may be one SchedulingTerms 74028 entity. The SchedulingTerms 74028 entity includes various attributes, namely a StartDateTime 74032, a MeasuringDeviceStartMeasurementReadingMeasure 74036, a LateCompletionShiftPercent 74040, an EarlyCompletionShiftPercent 74044, a LateCompletionTolerencePercent 74048, an EarlyCompletionTolerencePercent 74052, a WorkingDayCalendarCode 74056, a MaintenancePlanCycleQuantityModificationFactorValue 74060, a BufferStartDaysNumberValue 74064, a CallHorizonPercent 74068, a PredecessorCompletionRequiredIndicator 74072, a SchedulingDuration 74076, a SchedulingCategoryCode 74080 and a CycleDependencyIndicator 74084. The StartDateTime 74032 attribute has a cardinality of 0 . . . 1 74034 meaning that for each instance of the SchedulingTerms 74028 entity there may be one StartDateTime 74032 attribute.

The MeasuringDeviceStartMeasurementReadingMeasure 74036 attribute has a cardinality of 0 . . . 1 74038 meaning that for each instance of the SchedulingTerms 74028 entity there may be one MeasuringDeviceStartMeasurementReadingMeasure 74036 attribute. The LateCompletionShiftPercent 74040 attribute has a cardinality of 0 . . . 1 74042 meaning that for each instance of the SchedulingTerms 74028 entity there may be one LateCompletionShiftPercent 74040 attribute. The EarlyCompletionShiftPercent 74044 attribute has a cardinality of 0 . . . 1 74046 meaning that for each instance of the SchedulingTerms 74028 entity there may be one EarlyCompletionShiftPercent 74044 attribute. The LateCompletionTolerencePercent 74048 attribute has a cardinality of 0 . . . 1 74050 meaning that for each instance of the SchedulingTerms 74028 entity there may be one LateCompletionTolerencePercent 74048 attribute.

The EarlyCompletionTolerencePercent 74052 attribute has a cardinality of 0 . . . 1 74054 meaning that for each instance of the SchedulingTerms 74028 entity there may be one EarlyCompletionTolerencePercent 74052 attribute. The WorkingDayCalendarCode 74056 attribute has a cardinality of 0 . . . 1 74058 meaning that for each instance of the SchedulingTerms 74028 entity there may be one WorkingDayCalendarCode 74056 attribute. The MaintenancePlanCycleQuantityModificationFactorValue 74060 attribute has a cardinality of 0 . . . 1 74062 meaning that for each instance of the SchedulingTerms 74028 entity there may be one MaintenancePlanCycleQuantityModificationFactorValue 74060 attribute. The BufferStartDaysNumberValue 74064 attribute has a cardinality of 0 . . . 1 74066 meaning that for each instance of the SchedulingTerms 74028 entity there may be one BufferStartDaysNumberValue 74064 attribute.

The CallHorizonPercent 74068 attribute has a cardinality of 0 . . . 1 74070 meaning that for each instance of the SchedulingTerms 74028 entity there may be one CallHorizonPercent 74068 attribute. The PredecessorCompletionRequiredIndicator 74072 attribute has a cardinality of 0 . . . 1 74074 meaning that for each instance of the SchedulingTerms 74028 entity there may be one PredecessorCompletionRequiredIndicator 74072 attribute. The SchedulingDuration 74076 attribute has a cardinality of 0 . . . 1 74078 meaning that for each instance of the SchedulingTerms 74028 entity there may be one SchedulingDuration 74076 attribute. The SchedulingCategoryCode 74080 attribute has a cardinality of 0 . . . 1 74082 meaning that for each instance of the SchedulingTerms 74028 entity there may be one SchedulingCategoryCode 74080 attribute. The CycleDependencyIndicator 74084 attribute has a cardinality of 0 . . . 1 74086 meaning that for each instance of the SchedulingTerms 74028 entity there may be one CycleDependencyIndicator 74084 attribute.

The Cycle 74088 entity has a cardinality of 0 . . . n 74090 meaning that for each instance of the MaintenancePlan 74012 entity there may be one or more Cycle 74088 entities. The Cycle 74088 entity includes various attributes, namely a CounterValue 74092, a GroupSequenceNumberValue 74096, a GroupSequenceRepetitionNumberValue 74100, a Quantity 74104, a StartOffsetQuantity 74108, a MeasuringDeviceID 74112 and a Description 74116. The CounterValue 74092 attribute has a cardinality of 1 74094 meaning that for each instance of the Cycle 74088 entity there is one CounterValue 74092 attribute. The GroupSequenceNumberValue 74096 attribute has a cardinality of 0 . . . 1 74098 meaning that for each instance of the Cycle 74088 entity there may be one GroupSequenceNumberValue 74096 attribute.

The GroupSequenceRepetitionNumberValue 74100 attribute has a cardinality of 0 . . . 1 74102 meaning that for each instance of the Cycle 74088 entity there may be one GroupSequenceRepetitionNumberValue 74100 attribute. The Quantity 74104 attribute has a cardinality of 1 74106 meaning that for each instance of the Cycle 74088 entity there is one Quantity 74104 attribute. The StartOffsetQuantity 74108 attribute has a cardinality of 0 . . . 1 74110 meaning that for each instance of the Cycle 74088 entity there may be one StartOffsetQuantity 74108 attribute. The MeasuringDeviceID 74112 attribute has a cardinality of 0 . . . 1 74114 meaning that for each instance of the Cycle 74088 entity there may be one MeasuringDeviceID 74112 attribute. The Description 74116 attribute has a cardinality of 0 . . . 1 74118 meaning that for each instance of the Cycle 74088 entity there may be one Description 74116 attribute.

The Item 74120 entity has a cardinality of 1 . . . n 74122 meaning that for each instance of the MaintenancePlan 74012 entity there are one or more Item 74120 entities. The Item 74120 entity includes various attributes, namely an OrdinalNumberValue 74124, a CycleGroupSequenceNumberValue 74128, a BusinessTransactionDocumentProcessingTypeCode 74132, a WorkCentreID 74136, a MaintenancePlanningPlantID 74140, a WorkCenterPlantID 74144, a MaintenancePlannerGroupCode 74148, an ImportanceCode 74152, a MaintenanceTaskListID 74156, a BusinessTransactionDocumentGroupID 74160, a BusinessObjectTypeCode 74164, a BusinessTransactionDocumentReference 74168, a Description 74172 and a TextCollection 74176. The Item 74120 entity includes an ObjectReference 74180 subordinate entity.

The OrdinalNumberValue 74124 attribute has a cardinality of 1 74126 meaning that for each instance of the Item 74120 entity there is one OrdinalNumberValue 74124 attribute. The CycleGroupSequenceNumberValue 74128 attribute has a cardinality of 0 . . . 1 74130 meaning that for each instance of the Item 74120 entity there may be one CycleGroupSequenceNumberValue 74128 attribute. The BusinessTransactionDocumentProcessingTypeCode 74132 attribute has a cardinality of 1 74134 meaning that for each instance of the Item 74120 entity there is one BusinessTransactionDocumentProcessingTypeCode 74132 attribute. The WorkCentreID 74136 attribute has a cardinality of 1 74138 meaning that for each instance of the Item 74120 entity there is one WorkCentreID 74136 attribute. The MaintenancePlanningPlantID 74140 attribute has a cardinality of 1 74142 meaning that for each instance of the Item 74120 entity there is one MaintenancePlanningPlantID 74140 attribute. The WorkCenterPlantID 74144 attribute has a cardinality of 0 . . . 1 74146 meaning that for each instance of the Item 74120 entity there may be one WorkCenterPlantID 74144 attribute. The MaintenancePlannerGroupCode 74148 attribute has a cardinality of 0 . . . 1 74150 meaning that for each instance of the Item 74120 entity there may be one MaintenancePlannerGroupCode 74148 attribute. The ImportanceCode 74152 attribute has a cardinality of 0 . . . 1 74154 meaning that for each instance of the Item 74120 entity there may be one ImportanceCode 74152 attribute.

The MaintenanceTaskListID 74156 attribute has a cardinality of 0 . . . 1 74158 meaning that for each instance of the Item 74120 entity there may be one MaintenanceTaskListID 74156 attribute. The BusinessTransactionDocumentGroupID 74160 attribute has a cardinality of 0 . . . 1 74162 meaning that for each instance of the Item 74120 entity there may be one BusinessTransactionDocumentGroupID 74160 attribute. The BusinessObjectTypeCode 74164 attribute has a cardinality of 0 . . . 1 74166 meaning that for each instance of the Item 74120 entity there may be one BusinessObjectTypeCode 74164 attribute. The BusinessTransactionDocumentReference 74168 attribute has a cardinality of 0 . . . 1 74170 meaning that for each instance of the Item 74120 entity there may be one BusinessTransactionDocumentReference 74168 attribute. The Description 74172 attribute has a cardinality of 0 . . . 1 74174 meaning that for each instance of the Item 74120 entity there may be one Description 74172 attribute. The TextCollection 74176 attribute has a cardinality of 0 . . . 1 74178 meaning that for each instance of the Item 74120 entity there may be one TextCollection 74176 attribute.

The ObjectReference 74180 entity has a cardinality of 1 . . . n 74182 meaning that for each instance of the Item 74120 entity there are one or more ObjectReference 74180 entities. The ObjectReference 74180 entity includes various attributes, namely an OrdinalNumberValue 74184, a MainIndicator 74188, a SerialID 74192, a MaterialInternalID 74196, an IndividualMaterialID 74200 and an InstallationPointID 74204. The OrdinalNumberValue 74184 attribute has a cardinality of 1 74186 meaning that for each instance of the ObjectReference 74180 entity there is one OrdinalNumberValue 74184 attribute. The MainIndicator 74188 attribute has a cardinality of 1 74190 meaning that for each instance of the ObjectReference 74180 entity there is one MainIndicator 74188 attribute.

The SerialID 74192 attribute has a cardinality of 0 . . . 1 74194 meaning that for each instance of the ObjectReference 74180 entity there may be one SerialID 74192 attribute. The MaterialInternalID 74196 attribute has a cardinality of 0 . . . 1 74198 meaning that for each instance of the ObjectReference 74180 entity there may be one MaterialInternalID 74196 attribute. The IndividualMaterialID 74200 attribute has a cardinality of 0 . . . 1 74202 meaning that for each instance of the ObjectReference 74180 entity there may be one IndividualMaterialID 74200 attribute. The InstallationPointID 74204 attribute has a cardinality of 0 . . . 1 74206 meaning that for each instance of the ObjectReference 74180 entity there may be one InstallationPointID 74204 attribute. The data types of the various packages, entities, and attributes are described with respect to FIG. 73.

FIG. 75 shows an example configuration of an Element Structure that includes a MaintPlnERPCrteConfMsg_75000 package. The MaintPlnERPCrteConfMsg_75000 package includes a MaintPlnERPCrteConfMsg_75002 entity. The MaintPlnERPCrteConfMsg_75000 package includes various packages, namely a MessageHeader 75004, a MaintenancePlan 75010 and a Log 75020.

The MessageHeader 75004 package includes a MessageHeader 75006 entity. The MessageHeader 75006 entity has a cardinality of 0 . . . 1 75008 meaning that for each instance of the MessageHeader 75004 package there may be one MessageHeader 75006 entity. The MaintenancePlan 75010 package includes a MaintenancePlan 75012 entity.

The MaintenancePlan 75012 entity has a cardinality of 0 . . . 1 75014 meaning that for each instance of the MaintenancePlan 75010 package there may be one MaintenancePlan 75012 entity. The MaintenancePlan 75012 entity includes an ID 75016 attribute. The ID 75016 attribute has a cardinality of 1 75018 meaning that for each instance of the MaintenancePlan 75012 entity there is one ID 75016 attribute.

The Log 75020 package includes a Log 75022 entity. The Log 75022 entity has a cardinality of 1 75024 meaning that for each instance of the Log 75020 package there is one Log 75022 entity. The data types of the various packages, entities, and attributes are described with respect to FIG. 73.

FIG. 76 shows an example configuration of an Element Structure that includes a MaintPlnERPActvteReqMsg_76000 package. The MaintPlnERPActvteReqMsg_76000 package includes a MaintPlnERPActvteReqMsg_76002 entity. The MaintPlnERPActvteReqMsg_76000 package includes various packages, namely a MessageHeader 76004 and a MaintenancePlan 76010.

The MessageHeader 76004 package includes a MessageHeader 76006 entity. The MessageHeader 76006 entity has a cardinality of 0 . . . 1 76008 meaning that for each instance of the MessageHeader 76004 package there may be one MessageHeader 76006 entity. The MaintenancePlan 76010 package includes a MaintenancePlan 76012 entity.

The MaintenancePlan 76012 entity has a cardinality of 1 76014 meaning that for each instance of the MaintenancePlan 76010 package there is one MaintenancePlan 76012 entity. The MaintenancePlan 76012 entity includes an ID 76016 attribute. The ID 76016 attribute has a cardinality of 1 76018 meaning that for each instance of the MaintenancePlan 76012 entity there is one ID 76016 attribute. The data types of the various packages, entities, and attributes are described with respect to FIG. 73.

FIG. 77 shows an example configuration of an Element Structure that includes a MaintPlnERPActvteConfMsg_77000 package. The MaintPlnERPActvteConfMsg_77000 package includes a MaintPlnERPActvteConfMsg_77002 entity. The MaintPlnERPActvteConfMsg_77000 package includes various packages, namely a MessageHeader 77004 and a Log 77010.

The MessageHeader 77004 package includes a MessageHeader 77006 entity. The MessageHeader 77006 entity has a cardinality of 0 . . . 1 77008 meaning that for each instance of the MessageHeader 77004 package there may be one MessageHeader 77006 entity. The Log 77010 package includes a Log 77012 entity. The Log 77012 entity has a cardinality of 1 77014 meaning that for each instance of the Log 77010 package there is one Log 77012 entity. The data types of the various packages, entities, and attributes are described with respect to FIG. 73.

FIG. 78 shows an example configuration of an Element Structure that includes a MaintPlnERPDactvteReqMsg_78000 package. The MaintPlnERPDactvteReqMsg_78000 package includes a MaintPlnERPDactvteReqMsg_78002 entity. The MaintPlnERPDactvteReqMsg_78000 package includes various packages, namely a MessageHeader 78004 and a MaintenancePlan 78010.

The MessageHeader 78004 package includes a MessageHeader 78006 entity. The MessageHeader 78006 entity has a cardinality of 0 . . . 1 78008 meaning that for each instance of the MessageHeader 78004 package there may be one MessageHeader 78006 entity. The MaintenancePlan 78010 package includes a MaintenancePlan 78012 entity. The MaintenancePlan 78012 entity has a cardinality of 1 78014 meaning that for each instance of the MaintenancePlan 78010 package there is one MaintenancePlan 78012 entity. The MaintenancePlan 78012 entity includes an ID 78016 attribute. The ID 78016 attribute has a cardinality of 1 78018 meaning that for each instance of the MaintenancePlan 78012 entity there is one ID 78016 attribute. The data types of the various packages, entities, and attributes are described with respect to FIG. 73.

FIG. 79 shows an example configuration of an Element Structure that includes a MaintPlnERPDactvteConfMsg_79000 package. The MaintPlnERPDactvteConfMsg_79000 package includes a MaintPlnERPDactvteConfMsg_79002 entity. The MaintPlnERPDactvteConfMsg_79000 package includes various packages, namely a MessageHeader 79004 and a Log 79010.

The MessageHeader 79004 package includes a MessageHeader 79006 entity. The MessageHeader 79006 entity has a cardinality of 0 . . . 1 79008 meaning that for each instance of the MessageHeader 79004 package there may be one MessageHeader 79006 entity. The Log 79010 package includes a Log 79012 entity. The Log 79012 entity has a cardinality of 1 79014 meaning that for each instance of the Log 79010 package there is one Log 79012 entity. The data types of the various packages, entities, and attributes are described with respect to FIG. 73.

FIG. 80 shows an example configuration of an Element Structure that includes a MaintPlnERPSetDelIndReqMsg_80000 package. The MaintPlnERPSetDelIndReqMsg_80000 package includes a MaintPlnERPSetDelIndReqMsg_80002 entity. The MaintPlnERPSetDelIndReqMsg_80000 package includes various packages, namely a MessageHeader 80004 and a MaintenancePlan 80010.

The MessageHeader 80004 package includes a MessageHeader 80006 entity. The MessageHeader 80006 entity has a cardinality of 0 . . . 1 80008 meaning that for each instance of the MessageHeader 80004 package there may be one MessageHeader 80006 entity. The MaintenancePlan 80010 package includes a MaintenancePlan 80012 entity. The MaintenancePlan 80012 entity has a cardinality of 1 80014 meaning that for each instance of the MaintenancePlan 80010 package there is one MaintenancePlan 80012 entity. The MaintenancePlan 80012 entity includes an ID 80016 attribute. The ID 80016 attribute has a cardinality of 1 80018 meaning that for each instance of the MaintenancePlan 80012 entity there is one ID 80016 attribute. The data types of the various packages, entities, and attributes are described with respect to FIG. 73.

FIG. 81 shows an example configuration of an Element Structure that includes a MaintPlnERPSetDelIndConfMsg_81000 package. The MaintPlnERPSetDelIndConf- Msg_81000 package includes a MaintPlnERPSetDelInd-ConfMsg_81002 entity. The MaintPlnERPSet-DelIndConfMsg_81000 package includes various packages, namely a MessageHeader 81004 and a Log 81010.

The MessageHeader 81004 package includes a Message-Header 81006 entity. The MessageHeader 81006 entity has a cardinality of 0 . . . 1 81008 meaning that for each instance of the MessageHeader 81004 package there may be one Mes-sageHeader 81006 entity. The Log 81010 package includes a Log 81012 entity. The Log 81012 entity has a cardinality of 1 81014 meaning that for each instance of the Log 81010 pack-age there is one Log 81012 entity. The data types of the various packages, entities, and attributes are described with respect to FIG. 73.

FIG. 82 shows an example configuration of an Element Structure that includes a MaintPlnERPRstDelIn-dReqMsg_82000 package. The MaintPlnERPRstDelIn-dReqMsg_82000 package includes a MaintPlnERPRst-DelIndReqMsg_82002 entity. The MaintPlnERPRstDelIndReqMsg_82000 package includes various packages, namely a MessageHeader 82004 and a MaintenancePlan 82010.

The MessageHeader 82004 package includes a Message-Header 82006 entity. The MessageHeader 82006 entity has a cardinality of 0 . . . 1 82008 meaning that for each instance of the MessageHeader 82004 package there may be one Mes-sageHeader 82006 entity. The MaintenancePlan 82010 pack-age includes a MaintenancePlan 82012 entity. The Mainte-nancePlan 82012 entity has a cardinality of 1 82014 meaning that for each instance of the MaintenancePlan 82010 package there is one MaintenancePlan 82012 entity. The Maintenan-cePlan 82012 entity includes an ID 82016 attribute. The ID 82016 attribute has a cardinality of 1 82018 meaning that for each instance of the MaintenancePlan 82012 entity there is one ID 82016 attribute. The data types of the various pack-ages, entities, and attributes are described with respect to FIG. 73.

FIG. 83 shows an example configuration of an Element Structure that includes a MaintPlnERPRstDelIndCon-fMsg_83000 package. The MaintPlnERPRstDelIndCon-fMsg_83000 package includes a MaintPlnERPRstDelInd-ConfMsg_83002 entity. The MaintPlnERPRstDelIndConfMsg_83000 package includes various packages, namely a MessageHeader 83004 and a Log 83010.

The MessageHeader 83004 package includes a Message-Header 83006 entity. The MessageHeader 83006 entity has a cardinality of 0 . . . 1 83008 meaning that for each instance of the MessageHeader 83004 package there may be one Mes-sageHeader 83006 entity. The Log 83010 package includes a Log 83012 entity. The Log 83012 entity has a cardinality of 1 83014 meaning that for each instance of the Log 83010 pack-age there is one Log 83012 entity. The data types of the various packages, entities, and attributes are described with respect to FIG. 73.

FIGS. 84-1 through 84-2 show an example configuration of an Element Structure that includes a MaintPlnERPSim-plElmntsQryMsg_84000 package. The MaintPlnERPSim-plElmntsQryMsg_84000 package includes a MaintPl-nERPSimplElmntsQryMsg_84002 entity. The MaintPlnERPSimplElmntsQryMsg_84000 package includes various packages, namely a Selection 84004 and a ProcessingConditions 84034.

The Selection 84004 package includes a MaintenancePlan-SimpleSelectionByElements 84006 entity. The Maintenan-cePlanSimpleSelectionByElements 84006 entity has a cardi-nality of 1 84008 meaning that for each instance of the Selection 84004 package there is one MaintenancePlan-SimpleSelectionByElements 84006 entity. The Maintenan-cePlanSimpleSelectionByElements 84006 entity includes a MaintenancePlanCategoryCode 84010 attribute. The Main-tenancePlanSimpleSelectionByElements 84006 entity includes a SelectionByMaintenancePlanID 84014 subordi-nate entity. The MaintenancePlanCategoryCode 84010 attribute has a cardinality of 0 . . . 1 84012 meaning that for each instance of the MaintenancePlanSimpleSelec-tionByElements 84006 entity there may be one Maintenan-cePlanCategoryCode 84010 attribute.

The SelectionByMaintenancePlanID 84014 entity has a cardinality of 0 . . . 1 84016 meaning that for each instance of the MaintenancePlanSimpleSelectionByElements 84006 entity there may be one SelectionByMaintenancePlanID 84014 entity. The SelectionByMaintenancePlanID 84014 entity includes various attributes, namely an InclusionExclu-sionCode 84018, an IntervalBoundaryTypeCode 84022, a LowerBoundaryMaintenancePlanID 84026 and an Upper-BoundaryMaintenancePlanID 84030. The InclusionExclu-sionCode 84018 attribute has a cardinality of 0 . . . 1 84020 meaning that for each instance of the SelectionByMaintenan-cePlanID 84014 entity there may be one InclusionExclusion-Code 84018 attribute.

The IntervalBoundaryTypeCode 84022 attribute has a car-dinality of 0 . . . 1 84024 meaning that for each instance of the SelectionByMaintenancePlanID 84014 entity there may be one IntervalBoundaryTypeCode 84022 attribute. The Lower-BoundaryMaintenancePlanID 84026 attribute has a cardinal-ity of 0 . . . 1 84028 meaning that for each instance of the SelectionByMaintenancePlanID 84014 entity there may be one LowerBoundaryMaintenancePlanID 84026 attribute. The UpperBoundaryMaintenancePlanID 84030 attribute has a cardinality of 0 . . . 1 84032 meaning that for each instance of the SelectionByMaintenancePlanID 84014 entity there may be one UpperBoundaryMaintenancePlanID 84030 attribute.

The ProcessingConditions 84034 package includes a Pro-cessingConditions 84036 entity. The ProcessingConditions 84036 entity has a cardinality of 0 . . . 1 84038 meaning that for each instance of the ProcessingConditions 84034 package there may be one ProcessingConditions 84036 entity. The ProcessingConditions 84036 entity includes various attributes, namely a QueryHitsMaximumNumberValue 84040, an UnlimitedQueryHitsIndicator 84044, a ReturnedQueryHitsNumberValue 84048, a MoreElement-sAvailableIndicator 84052 and a LastProvidedMaintenance-PlanID 84056. The QueryHitsMaximumNumberValue 84040 attribute has a cardinality of 0 . . . 1 84042 meaning that for each instance of the ProcessingConditions 84036 entity there may be one QueryHitsMaximumNumberValue 84040 attribute.

The UnlimitedQueryHitsIndicator 84044 attribute has a cardinality of 0 . . . 1 84046 meaning that for each instance of the ProcessingConditions 84036 entity there may be one UnlimitedQueryHitsIndicator 84044 attribute. The ReturnedQueryHitsNumberValue 84048 attribute has a car-dinality of 0 . . . 1 84050 meaning that for each instance of the ProcessingConditions 84036 entity there may be one ReturnedQueryHitsNumberValue 84048 attribute. The MoreElementsAvailableIndicator 84052 attribute has a car-dinality of 0 . . . 1 84054 meaning that for each instance of the ProcessingConditions 84036 entity there may be one MoreElementsAvailableIndicator 84052 attribute. The Last-ProvidedMaintenancePlanID 84056 attribute has a cardinal-ity of 0 . . . 1 84058 meaning that for each instance of the ProcessingConditions 84036 entity there may be one LastProvidedMaintenancePlanID 84056 attribute. The data types of the various packages, entities, and attributes are described with respect to FIG. 73.

FIGS. 85-1 through 85-2 show an example configuration of an Element Structure that includes a MaintPlnERPSimplElmntsRspMsg_85000 package. The MaintPlnERPSimplElmntsRspMsg_85000 package includes a MaintPlnERPSimplElmntsRspMsg_85002 entity. The MaintPlnERPSimplElmntsRspMsg_85000 package includes various packages, namely a MaintenancePlan 85004, a ProcessingConditions 85018 and a Log 85044.

The MaintenancePlan 85004 package includes a MaintenancePlan 85006 entity. The MaintenancePlan 85006 entity has a cardinality of 0 . . . n 85008 meaning that for each instance of the MaintenancePlan 85004 package there may be one or more MaintenancePlan 85006 entities. The MaintenancePlan 85006 entity includes various attributes, namely an ID 85010 and a Description 85014. The ID 85010 attribute has a cardinality of 1 85012 meaning that for each instance of the MaintenancePlan 85006 entity there is one ID 85010 attribute. The Description 85014 attribute has a cardinality of 0 . . . 1 85016 meaning that for each instance of the MaintenancePlan 85006 entity there may be one Description 85014 attribute.

The ProcessingConditions 85018 package includes a ProcessingConditions 85020 entity. The ProcessingConditions 85020 entity has a cardinality of 1 85022 meaning that for each instance of the ProcessingConditions 85018 package there is one ProcessingConditions 85020 entity. The ProcessingConditions 85020 entity includes various attributes, namely a QueryHitsMaximumNumberValue 85024, an UnlimitedQueryHitsIndicator 85028, a ReturnedQueryHitsNumberValue 85032, a MoreElementsAvailableIndicator 85036 and a LastProvidedMaintenancePlanID 85040. The QueryHitsMaximumNumberValue 85024 attribute has a cardinality of 0 . . . 1 85026 meaning that for each instance of the ProcessingConditions 85020 entity there may be one QueryHitsMaximumNumberValue 85024 attribute.

The UnlimitedQueryHitsIndicator 85028 attribute has a cardinality of 0 . . . 1 85030 meaning that for each instance of the ProcessingConditions 85020 entity there may be one UnlimitedQueryHitsIndicator 85028 attribute. The ReturnedQueryHitsNumberValue 85032 attribute has a cardinality of 0 . . . 1 85034 meaning that for each instance of the ProcessingConditions 85020 entity there may be one ReturnedQueryHitsNumberValue 85032 attribute. The MoreElementsAvailableIndicator 85036 attribute has a cardinality of 0 . . . 1 85038 meaning that for each instance of the ProcessingConditions 85020 entity there may be one MoreElementsAvailableIndicator 85036 attribute. The LastProvidedMaintenancePlanID 85040 attribute has a cardinality of 0 . . . 1 85042 meaning that for each instance of the ProcessingConditions 85020 entity there may be one LastProvidedMaintenancePlanID 85040 attribute.

The Log 85044 package includes a Log 85046 entity. The Log 85046 entity has a cardinality of 1 85048 meaning that for each instance of the Log 85044 package there is one Log 85046 entity. The data types of the various packages, entities, and attributes are described with respect to FIG. 73.

FIGS. 86-1 through 86-8 show an example configuration of an Element Structure that includes a MaintPlnERPUpdtReqMsg_86000 package. The MaintPlnERPUpdtReqMsg_86000 package includes a MaintPlnERPUpdtReqMsg_86002 entity. The MaintPlnERPUpdtReqMsg_86000 package includes various packages, namely a MessageHeader 86004 and a MaintenancePlan 86010.

The MessageHeader 86004 package includes a MessageHeader 86006 entity. The MessageHeader 86006 entity has a cardinality of 0 . . . 1 86008 meaning that for each instance of the MessageHeader 86004 package there may be one MessageHeader 86006 entity.

The MaintenancePlan 86010 package includes a MaintenancePlan 86012 entity. The MaintenancePlan 86012 entity has a cardinality of 1 86014 meaning that for each instance of the MaintenancePlan 86010 package there is one MaintenancePlan 86012 entity. The MaintenancePlan 86012 entity includes various attributes, namely an ID 86016, a ChangeStateID 86020, a Description 86024 and a TextCollection 86028. The MaintenancePlan 86012 entity includes various subordinate entities, namely a SchedulingTerms 86032, a Cycle 86092 and an Item 86128. The ID 86016 attribute has a cardinality of 1 86018 meaning that for each instance of the MaintenancePlan 86012 entity there is one ID 86016 attribute.

The ChangeStateID 86020 attribute has a cardinality of 1 86022 meaning that for each instance of the MaintenancePlan 86012 entity there is one ChangeStateID 86020 attribute. The Description 86024 attribute has a cardinality of 0 . . . 1 86026 meaning that for each instance of the MaintenancePlan 86012 entity there may be one Description 86024 attribute. The TextCollection 86028 attribute has a cardinality of 0 . . . 1 86030 meaning that for each instance of the MaintenancePlan 86012 entity there may be one TextCollection 86028 attribute.

The SchedulingTerms 86032 entity has a cardinality of 0 . . . 1 86034 meaning that for each instance of the MaintenancePlan 86012 entity there may be one SchedulingTerms 86032 entity. The SchedulingTerms 86032 entity includes various attributes, namely a StartDateTime 86036, a MeasuringDeviceStartMeasurementReadingMeasure 86040, a LateCompletionShiftPercent 86044, an EarlyCompletionShiftPercent 86048, a LateCompletionTolerencePercent 86052, an EarlyCompletionTolerencePercent 86056, a WorkingDayCalendarCode 86060, a MaintenancePlanCycleQuantityModificationFactorValue 86064, a BufferStartDaysNumberValue 86068, a CallHorizonPercent 86072, a PredecessorCompletionRequiredIndicator 86076, a SchedulingDuration 86080, a SchedulingCategoryCode 86084 and a CycleDependencyIndicator 86088. The StartDateTime 86036 attribute has a cardinality of 0 . . . 1 86038 meaning that for each instance of the SchedulingTerms 86032 entity there may be one StartDateTime 86036 attribute.

The MeasuringDeviceStartMeasurementReadingMeasure 86040 attribute has a cardinality of 0 . . . 1 86042 meaning that for each instance of the SchedulingTerms 86032 entity there may be one MeasuringDeviceStartMeasurementReadingMeasure 86040 attribute. The LateCompletionShiftPercent 86044 attribute has a cardinality of 0 . . . 1 86046 meaning that for each instance of the SchedulingTerms 86032 entity there may be one LateCompletionShiftPercent 86044 attribute. The EarlyCompletionShiftPercent 86048 attribute has a cardinality of 0 . . . 1 86050 meaning that for each instance of the SchedulingTerms 86032 entity there may be one EarlyCompletionShiftPercent 86048 attribute.

The LateCompletionTolerencePercent 86052 attribute has a cardinality of 0 . . . 1 86054 meaning that for each instance of the SchedulingTerms 86032 entity there may be one LateCompletionTolerencePercent 86052 attribute. The EarlyCompletionTolerencePercent 86056 attribute has a cardinality of 0 . . . 1 86058 meaning that for each instance of the SchedulingTerms 86032 entity there may be one EarlyCompletionTolerencePercent 86056 attribute. The WorkingDayCalendarCode 86060 attribute has a cardinality of 0 . . . 1 86062 meaning that for each instance of the SchedulingTerms 86032 entity there may be one WorkingDayCalendarCode 86060 attribute. The MaintenancePlanCycleQuantityModificationFactorValue 86064 attribute has a cardinality of 0 . . . 1 86066 meaning that for each instance of the SchedulingTerms 86032 entity there may be one MaintenancePlanCycleQuantityModificationFactorValue 86064 attribute. The BufferStartDaysNumberValue 86068 attribute has a cardinality of 0 . . . 1 86070 meaning that for each instance of the SchedulingTerms 86032 entity there may be one BufferStartDaysNumberValue 86068 attribute.

The CallHorizonPercent 86072 attribute has a cardinality of 0 . . . 1 86074 meaning that for each instance of the SchedulingTerms 86032 entity there may be one CallHorizonPercent 86072 attribute. The PredecessorCompletionRequiredIndicator 86076 attribute has a cardinality of 0 . . . 1 86078 meaning that for each instance of the SchedulingTerms 86032 entity there may be one PredecessorCompletionRequiredIndicator 86076 attribute. The SchedulingDuration 86080 attribute has a cardinality of 0 . . . 1 86082 meaning that for each instance of the SchedulingTerms 86032 entity there may be one SchedulingDuration 86080 attribute. The SchedulingCategoryCode 86084 attribute has a cardinality of 0 . . . 1 86086 meaning that for each instance of the SchedulingTerms 86032 entity there may be one SchedulingCategoryCode 86084 attribute. The CycleDependencyIndicator 86088 attribute has a cardinality of 0 . . . 1 86090 meaning that for each instance of the SchedulingTerms 86032 entity there may be one CycleDependencyIndicator 86088 attribute.

The Cycle 86092 entity has a cardinality of 0 . . . n 86094 meaning that for each instance of the MaintenancePlan 86012 entity there may be one or more Cycle 86092 entities. The Cycle 86092 entity includes various attributes, namely a @actionCode 86096, a CounterValue 86100, a GroupSequenceNumberValue 86104, a GroupSequenceRepetitionNumberValue 86108, a Quantity 86112, a StartOffsetQuantity 86116, a MeasuringDeviceID 86120 and a Description 86124. The @actionCode 86096 attribute has a cardinality of 1 86098 meaning that for each instance of the Cycle 86092 entity there is one @actionCode 86096 attribute. The CounterValue 86100 attribute has a cardinality of 1 86102 meaning that for each instance of the Cycle 86092 entity there is one CounterValue 86100 attribute. The GroupSequenceNumberValue 86104 attribute has a cardinality of 0 . . . 1 86106 meaning that for each instance of the Cycle 86092 entity there may be one GroupSequenceNumberValue 86104 attribute.

The GroupSequenceRepetitionNumberValue 86108 attribute has a cardinality of 0 . . . 1 86110 meaning that for each instance of the Cycle 86092 entity there may be one GroupSequenceRepetitionNumberValue 86108 attribute. The Quantity 86112 attribute has a cardinality of 0 . . . 1 86114 meaning that for each instance of the Cycle 86092 entity there may be one Quantity 86112 attribute. The StartOffsetQuantity 86116 attribute has a cardinality of 0 . . . 1 86118 meaning that for each instance of the Cycle 86092 entity there may be one StartOffsetQuantity 86116 attribute. The MeasuringDeviceID 86120 attribute has a cardinality of 0 . . . 1 86122 meaning that for each instance of the Cycle 86092 entity there may be one MeasuringDeviceID 86120 attribute. The Description 86124 attribute has a cardinality of 0 . . . 1 86126 meaning that for each instance of the Cycle 86092 entity there may be one Description 86124 attribute.

The Item 86128 entity has a cardinality of 0 . . . n 86130 meaning that for each instance of the MaintenancePlan 86012 entity there may be one or more Item 86128 entities. The Item 86128 entity includes various attributes, namely a @actionCode 86132, an ID 86136, a CycleGroupSequenceNumberValue 86140, a BusinessTransactionDocumentProcessingTypeCode 86144, a BusinessTransactionDocumentReference 86148, a WorkCentreID 86152, a MaintenancePlanningPlantID 86156, a MaintenancePlannerGroupCode 86160, an ImportanceCode 86164, a MaintenanceTaskListID 86168, a BusinessTransactionDocumentGroupID 86172, a BusinessObjectTypeCode 86176, a WorkCentrePlantID 86180, a Description 86184 and a TextCollection 86188. The Item 86128 entity includes an ObjectReference 86192 subordinate entity. The @actionCode 86132 attribute has a cardinality of 1 86134 meaning that for each instance of the Item 86128 entity there is one @actionCode 86132 attribute. The ID 86136 attribute has a cardinality of 0 . . . 1 86138 meaning that for each instance of the Item 86128 entity there may be one ID 86136 attribute. The CycleGroupSequenceNumberValue 86140 attribute has a cardinality of 0 . . . 1 86142 meaning that for each instance of the Item 86128 entity there may be one CycleGroupSequenceNumberValue 86140 attribute.

The BusinessTransactionDocumentProcessingTypeCode 86144 attribute has a cardinality of 0 . . . 1 86146 meaning that for each instance of the Item 86128 entity there may be one BusinessTransactionDocumentProcessingTypeCode 86144 attribute. The BusinessTransactionDocumentReference 86148 attribute has a cardinality of 0 . . . 1 86150 meaning that for each instance of the Item 86128 entity there may be one BusinessTransactionDocumentReference 86148 attribute. The WorkCentreID 86152 attribute has a cardinality of 0 . . . 1 86154 meaning that for each instance of the Item 86128 entity there may be one WorkCentreID 86152 attribute. The MaintenancePlanningPlantID 86156 attribute has a cardinality of 0 . . . 1 86158 meaning that for each instance of the Item 86128 entity there may be one MaintenancePlanningPlantID 86156 attribute. The MaintenancePlannerGroupCode 86160 attribute has a cardinality of 0 . . . 1 86162 meaning that for each instance of the Item 86128 entity there may be one MaintenancePlannerGroupCode 86160 attribute.

The ImportanceCode 86164 attribute has a cardinality of 0 . . . 1 86166 meaning that for each instance of the Item 86128 entity there may be one ImportanceCode 86164 attribute. The MaintenanceTaskListID 86168 attribute has a cardinality of 0 . . . 1 86170 meaning that for each instance of the Item 86128 entity there may be one MaintenanceTaskListID 86168 attribute. The BusinessTransactionDocumentGroupID 86172 attribute has a cardinality of 0 . . . 1 86174 meaning that for each instance of the Item 86128 entity there may be one BusinessTransactionDocumentGroupID 86172 attribute. The BusinessObjectTypeCode 86176 attribute has a cardinality of 0 . . . 1 86178 meaning that for each instance of the Item 86128 entity there may be one BusinessObjectTypeCode 86176 attribute. The WorkCentrePlantID 86180 attribute has a cardinality of 0 . . . 1 86182 meaning that for each instance of the Item 86128 entity there may be one WorkCentrePlantID 86180 attribute. The Description 86184 attribute has a cardinality of 0 . . . 1 86186 meaning that for each instance of the Item 86128 entity there may be one Description 86184 attribute. The TextCollection 86188 attribute has a cardinality of 0 . . . 1 86190 meaning that for each instance of the Item 86128 entity there may be one TextCollection 86188 attribute.

The ObjectReference 86192 entity has a cardinality of 0 . . . n 86194 meaning that for each instance of the Item 86128 entity there may be one or more ObjectReference 86192 entities. The ObjectReference 86192 entity includes various attributes, namely a @actionCode 86196, an OrdinalNumberValue 86200, a MainIndicator 86204, a SerialID 86208, a MaterialInternalID 86212, an IndividualMaterialID 86216 and an InstallationPointID 86220. The @actionCode 86196 attribute has a cardinality of 1 86198 meaning that for each instance of the ObjectReference 86192 entity there is one @actionCode 86196 attribute. The OrdinalNumberValue 86200 attribute has a cardinality of 0 . . . 1 86202 meaning that for each instance of the ObjectReference 86192 entity there may be one OrdinalNumberValue 86200 attribute.

The MainIndicator 86204 attribute has a cardinality of 1 86206 meaning that for each instance of the ObjectReference 86192 entity there is one MainIndicator 86204 attribute. The SerialID 86208 attribute has a cardinality of 0 . . . 1 86210 meaning that for each instance of the ObjectReference 86192 entity there may be one SerialID 86208 attribute. The MaterialInternalID 86212 attribute has a cardinality of 0 . . . 1 86214 meaning that for each instance of the ObjectReference 86192 entity there may be one MaterialInternalID 86212 attribute. The IndividualMaterialID 86216 attribute has a cardinality of 0 . . . 1 86218 meaning that for each instance of the ObjectReference 86192 entity there may be one IndividualMaterialID 86216 attribute. The InstallationPointID 86220 attribute has a cardinality of 0 . . . 1 86222 meaning that for each instance of the ObjectReference 86192 entity there may be one InstallationPointID 86220 attribute. The data types of the various packages, entities, and attributes are described with respect to FIG. 73.

FIG. 87 shows an example configuration of an Element Structure that includes a MaintPlnERPUpdtConfMsg_87000 package. The MaintPlnERPUpdtConfMsg_87000 package includes a MaintPlnERPUpdtConfMsg_87002 entity. The MaintPlnERPUpdtConfMsg_87000 package includes various packages, namely a MessageHeader 87004, a MaintenancePlan 87010 and a Log 87020.

The MessageHeader 87004 package includes a MessageHeader 87006 entity. The MessageHeader 87006 entity has a cardinality of 0 . . . 1 87008 meaning that for each instance of the MessageHeader 87004 package there may be one MessageHeader 87006 entity.

The MaintenancePlan 87010 package includes a MaintenancePlan 87012 entity. The MaintenancePlan 87012 entity has a cardinality of 0 . . . 1 87014 meaning that for each instance of the MaintenancePlan 87010 package there may be one MaintenancePlan 87012 entity. The MaintenancePlan 87012 entity includes an ID 87016 attribute. The ID 87016 attribute has a cardinality of 1 87018 meaning that for each instance of the MaintenancePlan 87012 entity there is one ID 87016 attribute.

The Log 87020 package includes a Log 87022 entity. The Log 87022 entity has a cardinality of 1 87024 meaning that for each instance of the Log 87020 package there is one Log 87022 entity. The data types of the various packages, entities, and attributes are described with respect to FIG. 73.

FIGS. 88-1 through 88-8 show an example configuration of an Element Structure that includes a MaintPlnERPCrteCkQryMsg_88000 package. The MaintPlnERPCrteCkQryMsg_88000 package includes a MaintPlnERPCrteCkQryMsg_88002 entity. The MaintPlnERPCrteCkQryMsg_88000 package includes a MaintenancePlan 88004 package.

The MaintenancePlan 88004 package includes a MaintenancePlan 88006 entity. The MaintenancePlan 88006 entity has a cardinality of 1 88008 meaning that for each instance of the MaintenancePlan 88004 package there is one MaintenancePlan 88006 entity. The MaintenancePlan 88006 entity includes various attributes, namely a CategoryCode 88010, a Description 88014 and a TextCollection 88018. The MaintenancePlan 88006 entity includes various subordinate entities, namely a SchedulingTerms 88022, a Cycle 88082 and an Item 88114. The CategoryCode 88010 attribute has a cardinality of 1 88012 meaning that for each instance of the MaintenancePlan 88006 entity there is one CategoryCode 88010 attribute. The Description 88014 attribute has a cardinality of 1 88016 meaning that for each instance of the MaintenancePlan 88006 entity there is one Description 88014 attribute. The TextCollection 88018 attribute has a cardinality of 0 . . . 1 88020 meaning that for each instance of the MaintenancePlan 88006 entity there may be one TextCollection 88018 attribute.

The SchedulingTerms 88022 entity has a cardinality of 0 . . . 1 88024 meaning that for each instance of the MaintenancePlan 88006 entity there may be one SchedulingTerms 88022 entity. The SchedulingTerms 88022 entity includes various attributes, namely a StartDateTime 88026, a MeasuringDeviceStartMeasurementReadingMeasure 88030, a LateCompletionShiftPercent 88034, an EarlyCompletionShiftPercent 88038, a LateCompletionTolerencePercent 88042, a WorkingDayCalendarCode 88046, an EarlyCompletionTolerencePercent 88050, a MaintenancePlanCycleQuantityModificationFactorValue 88054, a BufferStartDaysNumberValue 88058, a CallHorizonPercent 88062, a PredecessorCompletionRequiredIndicator 88066, a SchedulingDuration 88070, a SchedulingCategoryCode 88074 and a CycleDependencyIndicator 88078. The StartDateTime 88026 attribute has a cardinality of 0 . . . 1 88028 meaning that for each instance of the SchedulingTerms 88022 entity there may be one StartDateTime 88026 attribute.

The MeasuringDeviceStartMeasurementReadingMeasure 88030 attribute has a cardinality of 0 . . . 1 88032 meaning that for each instance of the SchedulingTerms 88022 entity there may be one MeasuringDeviceStartMeasurementReadingMeasure 88030 attribute. The LateCompletionShiftPercent 88034 attribute has a cardinality of 0 . . . 1 88036 meaning that for each instance of the SchedulingTerms 88022 entity there may be one LateCompletionShiftPercent 88034 attribute. The EarlyCompletionShiftPercent 88038 attribute has a cardinality of 0 . . . 1 88040 meaning that for each instance of the SchedulingTerms 88022 entity there may be one EarlyCompletionShiftPercent 88038 attribute.

The LateCompletionTolerencePercent 88042 attribute has a cardinality of 0 . . . 1 88044 meaning that for each instance of the SchedulingTerms 88022 entity there may be one LateCompletionTolerencePercent 88042 attribute. The WorkingDayCalendarCode 88046 attribute has a cardinality of 0 . . . 1 88048 meaning that for each instance of the SchedulingTerms 88022 entity there may be one WorkingDayCalendarCode 88046 attribute. The EarlyCompletionTolerencePercent 88050 attribute has a cardinality of 0 . . . 1 88052 meaning that for each instance of the SchedulingTerms 88022 entity there may be one EarlyCompletionTolerencePercent 88050 attribute. The MaintenancePlanCycleQuantityModificationFactorValue 88054 attribute has a cardinality of 0 . . . 1 88056 meaning that for each instance of the SchedulingTerms 88022 entity there may be one MaintenancePlanCycleQuantityModificationFactorValue 88054 attribute.

The BufferStartDaysNumberValue 88058 attribute has a cardinality of 0 . . . 1 88060 meaning that for each instance of the SchedulingTerms 88022 entity there may be one BufferStartDaysNumberValue 88058 attribute. The CallHorizonPercent 88062 attribute has a cardinality of 0 . . . 1 88064 meaning that for each instance of the SchedulingTerms 88022 entity there may be one CallHorizonPercent 88062 attribute. The PredecessorCompletionRequiredIndicator 88066 attribute has a cardinality of 0 . . . 1 88068 meaning that for each instance of the SchedulingTerms 88022 entity there may be one PredecessorCompletionRequiredIndicator 88066 attribute.

The SchedulingDuration 88070 attribute has a cardinality of 0 . . . 1 88072 meaning that for each instance of the SchedulingTerms 88022 entity there may be one SchedulingDuration 88070 attribute. The SchedulingCategoryCode 88074 attribute has a cardinality of 0 . . . 1 88076 meaning that for each instance of the SchedulingTerms 88022 entity there may be one SchedulingCategoryCode 88074 attribute. The CycleDependencyIndicator 88078 attribute has a cardinality of 0 . . . 1 88080 meaning that for each instance of the SchedulingTerms 88022 entity there may be one CycleDependencyIndicator 88078 attribute.

The Cycle 88082 entity has a cardinality of 0 . . . n 88084 meaning that for each instance of the MaintenancePlan 88006 entity there may be one or more Cycle 88082 entities. The Cycle 88082 entity includes various attributes, namely a CounterValue 88086, a GroupSequenceNumberValue 88090, a GroupSequenceRepetitionNumberValue 88094, a Quantity 88098, a StartOffsetQuantity 88102, a MeasuringDeviceID 88106 and a Description 88110. The CounterValue 88086 attribute has a cardinality of 1 88088 meaning that for each instance of the Cycle 88082 entity there is one CounterValue 88086 attribute. The GroupSequenceNumberValue 88090 attribute has a cardinality of 0 . . . 1 88092 meaning that for each instance of the Cycle 88082 entity there may be one GroupSequenceNumberValue 88090 attribute.

The GroupSequenceRepetitionNumberValue 88094 attribute has a cardinality of 0 . . . 1 88096 meaning that for each instance of the Cycle 88082 entity there may be one GroupSequenceRepetitionNumberValue 88094 attribute. The Quantity 88098 attribute has a cardinality of 1 88100 meaning that for each instance of the Cycle 88082 entity there is one Quantity 88098 attribute. The StartOffsetQuantity 88102 attribute has a cardinality of 0 . . . 1 88104 meaning that for each instance of the Cycle 88082 entity there may be one StartOffsetQuantity 88102 attribute. The MeasuringDeviceID 88106 attribute has a cardinality of 1 88108 meaning that for each instance of the Cycle 88082 entity there is one MeasuringDeviceID 88106 attribute. The Description 88110 attribute has a cardinality of 0 . . . 1 88112 meaning that for each instance of the Cycle 88082 entity there may be one Description 88110 attribute.

The Item 88114 entity has a cardinality of 1 . . . N 88116 meaning that for each instance of the MaintenancePlan 88006 entity there are one or more Item 88114 entities. The Item 88114 entity includes various attributes, namely an OrdinalNumberValue 88118, a CycleGroupSequenceNumberValue 88122, a BusinessTransactionDocumentProcessingTypeCode 88126, a WorkCentreID 88130, a WorkCentrePlantID 88134, a MaintenancePlanningPlantID 88138, a MaintenancePlannerGroupCode 88142, an ImportanceCode 88146, a MaintenanceTaskListID 88150, a BusinessTransactionDocumentGroupID 88154, a BusinessObjectTypeCode 88158, a BusinessTransactionDocumentReference 88162, a Description 88166 and a TextCollection 88170. The Item 88114 entity includes an ObjectReference 88174 subordinate entity. The OrdinalNumberValue 88118 attribute has a cardinality of 1 88120 meaning that for each instance of the Item 88114 entity there is one OrdinalNumberValue 88118 attribute.

The CycleGroupSequenceNumberValue 88122 attribute has a cardinality of 0 . . . 1 88124 meaning that for each instance of the Item 88114 entity there may be one CycleGroupSequenceNumberValue 88122 attribute. The BusinessTransactionDocumentProcessingTypeCode 88126 attribute has a cardinality of 1 88128 meaning that for each instance of the Item 88114 entity there is one BusinessTransactionDocumentProcessingTypeCode 88126 attribute. The WorkCentreID 88130 attribute has a cardinality of 1 88132 meaning that for each instance of the Item 88114 entity there is one WorkCentreID 88130 attribute. The WorkCentrePlantID 88134 attribute has a cardinality of 1 88136 meaning that for each instance of the Item 88114 entity there is one WorkCentrePlantID 88134 attribute. The MaintenancePlanningPlantID 88138 attribute has a cardinality of 1 88140 meaning that for each instance of the Item 88114 entity there is one MaintenancePlanningPlantID 88138 attribute.

The MaintenancePlannerGroupCode 88142 attribute has a cardinality of 0 . . . 1 88144 meaning that for each instance of the Item 88114 entity there may be one MaintenancePlannerGroupCode 88142 attribute. The ImportanceCode 88146 attribute has a cardinality of 0 . . . 1 88148 meaning that for each instance of the Item 88114 entity there may be one ImportanceCode 88146 attribute. The MaintenanceTaskListID 88150 attribute has a cardinality of 0 . . . 1 88152 meaning that for each instance of the Item 88114 entity there may be one MaintenanceTaskListID 88150 attribute. The BusinessTransactionDocumentGroupID 88154 attribute has a cardinality of 0 . . . 1 88156 meaning that for each instance of the Item 88114 entity there may be one BusinessTransactionDocumentGroupID 88154 attribute.

The BusinessObjectTypeCode 88158 attribute has a cardinality of 0 . . . 1 88160 meaning that for each instance of the Item 88114 entity there may be one BusinessObjectTypeCode 88158 attribute. The BusinessTransactionDocumentReference 88162 attribute has a cardinality of 0 . . . 1 88164 meaning that for each instance of the Item 88114 entity there may be one BusinessTransactionDocumentReference 88162 attribute. The Description 88166 attribute has a cardinality of 0 . . . 1 88168 meaning that for each instance of the Item 88114 entity there may be one Description 88166 attribute. The TextCollection 88170 attribute has a cardinality of 0 . . . 1 88172 meaning that for each instance of the Item 88114 entity there may be one TextCollection 88170 attribute.

The ObjectReference 88174 entity has a cardinality of 1 . . . n 88176 meaning that for each instance of the Item 88114 entity there are one or more ObjectReference 88174 entities. The ObjectReference 88174 entity includes various attributes, namely an OrdinalNumberValue 88178, a MainIndicator 88182, a SerialID 88186, a MaterialInternalID 88190, an IndividualMaterialID 88194 and an InstallationPointID 88198. The OrdinalNumberValue 88178 attribute has a cardinality of 1 88180 meaning that for each instance of the ObjectReference 88174 entity there is one OrdinalNumberValue 88178 attribute. The MainIndicator 88182 attribute has a cardinality of 1 88184 meaning that for each instance of the ObjectReference 88174 entity there is one MainIndicator 88182 attribute.

The SerialID 88186 attribute has a cardinality of 0 . . . 1 88188 meaning that for each instance of the ObjectReference 88174 entity there may be one SerialID 88186 attribute. The MaterialInternalID 88190 attribute has a cardinality of 0 . . . 1 88192 meaning that for each instance of the ObjectReference 88174 entity there may be one MaterialInternalID 88190 attribute. The IndividualMaterialID 88194 attribute has a cardinality of 0 . . . 1 88196 meaning that for each instance of the ObjectReference 88174 entity there may be one IndividualMaterialID 88194 attribute. The InstallationPointID 88198 attribute has a cardinality of 0 . . . 1 88200 meaning that for each instance of the ObjectReference 88174 entity there may be one InstallationPointID 88198 attribute. The data types of the various packages, entities, and attributes are described with respect to FIG. 73.

FIG. 89 shows an example configuration of an Element Structure that includes a MaintPlnERPCrteCkRspMsg_89000 package. The MaintPlnERPCrteCkRspMsg_89000 package includes a MaintPlnERPCrteCkRspMsg_89002 entity. The MaintPlnERPCrteCkRspMsg_89000 package includes a Log 89004 package.

The Log 89004 package includes a Log 89006 entity. The Log 89006 entity has a cardinality of 1 89008 meaning that for each instance of the Log 89004 package there is one Log 89006 entity. The data types of the various packages, entities, and attributes are described with respect to FIG. 73.

FIGS. 90-1 through 90-2 show an example configuration of an Element Structure that includes a MaintPlnERPItmElmntsQryMsg_90000 package. The MaintPlnERPItmElmntsQryMsg_90000 package includes a MaintPlnERPItmElmntsQryMsg_90002 entity. The MaintPlnERPItmElmntsQryMsg_90000 package includes various packages, namely a Selection 90004, and a ProcessingConditions 90034.

The Selection 90004 package includes a MaintenancePlanItemSelectionByElements 90006 entity. The MaintenancePlanItemSelectionByElements 90006 entity has a cardinality of 1 90008 meaning that for each instance of the Selection 90004 package there is one MaintenancePlanItemSelectionByElements 90006 entity. The MaintenancePlanItemSelectionByElements 90006 entity includes various attributes, namely a CategoryCode 90010, a MaintenancePlannerGroupCode 90014, a MaintenancePlanID 90018, a MaterialInternalID 90022, an IndividualMaterialID 90026 and an InstallationPointID 90030. The CategoryCode 90010 attribute has a cardinality of 0 . . . 1 90012 meaning that for each instance of the MaintenancePlanItemSelectionByElements 90006 entity there may be one CategoryCode 90010 attribute.

The MaintenancePlannerGroupCode 90014 attribute has a cardinality of 0 . . . 1 90016 meaning that for each instance of the MaintenancePlanItemSelectionByElements 90006 entity there may be one MaintenancePlannerGroupCode 90014 attribute. The MaintenancePlanID 90018 attribute has a cardinality of 0 . . . 1 90020 meaning that for each instance of the MaintenancePlanItemSelectionByElements 90006 entity there may be one MaintenancePlanID 90018 attribute. The MaterialInternalID 90022 attribute has a cardinality of 0 . . . 1 90024 meaning that for each instance of the MaintenancePlanItemSelectionByElements 90006 entity there may be one MaterialInternalID 90022 attribute. The IndividualMaterialID 90026 attribute has a cardinality of 0 . . . 1 90028 meaning that for each instance of the MaintenancePlanItemSelectionByElements 90006 entity there may be one IndividualMaterialID 90026 attribute. The InstallationPointID 90030 attribute has a cardinality of 0 . . . 1 90032 meaning that for each instance of the MaintenancePlanItemSelectionByElements 90006 entity there may be one InstallationPointID 90030 attribute.

The ProcessingConditions 90034 package includes a ProcessingConditions 90036 entity. The ProcessingConditions 90036 entity has a cardinality of 0 . . . 1 90038 meaning that for each instance of the ProcessingConditions 90034 package there may be one ProcessingConditions 90036 entity. The ProcessingConditions 90036 entity includes various attributes, namely a QueryHitsMaximumNumberValue 90040, an UnlimitedQueryHitsIndicator 90044, a ReturnedQueryHitsNumberValue 90048, a MoreElementsAvailableIndicator 90052 and a LastProvidedItemID 90056. The QueryHitsMaximumNumberValue 90040 attribute has a cardinality of 0 . . . 1 90042 meaning that for each instance of the ProcessingConditions 90036 entity there may be one QueryHitsMaximumNumberValue 90040 attribute.

The UnlimitedQueryHitsIndicator 90044 attribute has a cardinality of 0 . . . 1 90046 meaning that for each instance of the ProcessingConditions 90036 entity there may be one UnlimitedQueryHitsIndicator 90044 attribute. The ReturnedQueryHitsNumberValue 90048 attribute has a cardinality of 0 . . . 1 90050 meaning that for each instance of the ProcessingConditions 90036 entity there may be one ReturnedQueryHitsNumberValue 90048 attribute. The MoreElementsAvailableIndicator 90052 attribute has a cardinality of 0 . . . 1 90054 meaning that for each instance of the ProcessingConditions 90036 entity there may be one MoreElementsAvailableIndicator 90052 attribute. The LastProvidedItemID 90056 attribute has a cardinality of 0 . . . 1 90058 meaning that for each instance of the ProcessingConditions 90036 entity there may be one LastProvidedItemID 90056 attribute. The data types of the various packages, entities, and attributes are described with respect to FIG. 73.

FIGS. 91-1 through 91-2 show an example configuration of an Element Structure that includes a MaintPlnERPItmElmntsRspMsg_91000 package. The MaintPlnERPItmElmntsRspMsg_91000 package includes a MaintPlnERPItmElmntsRspMsg_91002 entity. The MaintPlnERPItmElmntsRspMsg_91000 package includes various packages, namely a MaintenancePlanItem 91004, and a Log 91054.

The MaintenancePlanItem 91004 package includes various entities, namely a MaintenancePlan 91006 and a ProcessingConditions 91030. The MaintenancePlan 91006 entity has a cardinality of 0 . . . n 91008 meaning that for each instance of the MaintenancePlanItem 91004 package there may be one or more MaintenancePlan 91006 entities. The MaintenancePlan 91006 entity includes various attributes, namely an ID 91010 and a Description 91014. The MaintenancePlan 91006 entity includes an Item 91018 subordinate entity. The ID 91010 attribute has a cardinality of 1 91012 meaning that for each instance of the MaintenancePlan 91006 entity there is one ID 91010 attribute.

The Description 91014 attribute has a cardinality of 0 . . . 1 91016 meaning that for each instance of the MaintenancePlan 91006 entity there may be one Description 91014 attribute. The Item 91018 entity has a cardinality of 1 91020 meaning that for each instance of the MaintenancePlan 91006 entity there is one Item 91018 entity. The Item 91018 entity includes various attributes, namely an ID 91022 and a Description 91026. The ID 91022 attribute has a cardinality of 1 91024 meaning that for each instance of the Item 91018 entity there is one ID 91022 attribute. The Description 91026 attribute has a cardinality of 0 . . . 1 91028 meaning that for each instance of the Item 91018 entity there may be one Description 91026 attribute.

The ProcessingConditions 91030 entity has a cardinality of 0 . . . 1 91032 meaning that for each instance of the MaintenancePlanItem 91004 package there may be one ProcessingConditions 91030 entity. The ProcessingConditions 91030 entity includes various attributes, namely a QueryHitsMaximumNumberValue 91034, an UnlimitedQueryHitsIndicator 91038, a ReturnedQueryHitsNumberValue 91042, a MoreElementsAvailableIndicator 91046 and a LastProvidedItemID 91050. The QueryHitsMaximumNumberValue 91034 attribute has a cardinality of 0 . . . 1 91036 meaning that for each instance of the ProcessingConditions 91030 entity there may be one QueryHitsMaximumNumberValue 91034 attribute.

The UnlimitedQueryHitsIndicator 91038 attribute has a cardinality of 0 . . . 1 91040 meaning that for each instance of the ProcessingConditions 91030 entity there may be one UnlimitedQueryHitsIndicator 91038 attribute. The ReturnedQueryHitsNumberValue 91042 attribute has a cardinality of 0 . . . 1 91044 meaning that for each instance of the ProcessingConditions 91030 entity there may be one ReturnedQueryHitsNumberValue 91042 attribute. The MoreElementsAvailableIndicator 91046 attribute has a cardinality of 0 . . . 1 91048 meaning that for each instance of the ProcessingConditions 91030 entity there may be one MoreElementsAvailableIndicator 91046 attribute. The LastProvidedItemID 91050 attribute has a cardinality of 0 . . . 1 91052 meaning that for each instance of the ProcessingConditions 91030 entity there may be one LastProvidedItemID 91050 attribute.

The Log 91054 package includes a Log 91056 entity. The Log 91056 entity has a cardinality of 1 91058 meaning that for each instance of the Log 91054 package there is one Log 91056 entity. The data types of the various packages, entities, and attributes are described with respect to FIG. 73.

FIGS. 92-1 through 92-8 show an example configuration of an Element Structure that includes a MaintPlnERPUpdtCkQryMsg_92000 package. The MaintPlnERPUpdtCkQryMsg_92000 package includes a MaintPlnERPUpdtCkQryMsg_92002 entity. The MaintPlnERPUpdtCkQryMsg_92000 package includes a MaintenancePlan 92004 package.

The MaintenancePlan 92004 package includes a MaintenancePlan 92006 entity. The MaintenancePlan 92006 entity has a cardinality of 1 92008 meaning that for each instance of the MaintenancePlan 92004 package there is one MaintenancePlan 92006 entity. The MaintenancePlan 92006 entity includes various attributes, namely an ID 92010, a ChangeStateID 92014, a Description 92018 and a TextCollection 92022. The MaintenancePlan 92006 entity includes various subordinate entities, namely a SchedulingTerms 92026, a Cycle 92086 and an Item 92122. The ID 92010 attribute has a cardinality of 1 92012 meaning that for each instance of the MaintenancePlan 92006 entity there is one ID 92010 attribute.

The ChangeStateID 92014 attribute has a cardinality of 1 92016 meaning that for each instance of the MaintenancePlan 92006 entity there is one ChangeStateID 92014 attribute. The Description 92018 attribute has a cardinality of 0 . . . 1 92020 meaning that for each instance of the MaintenancePlan 92006 entity there may be one Description 92018 attribute. The TextCollection 92022 attribute has a cardinality of 0 . . . 1 92024 meaning that for each instance of the MaintenancePlan 92006 entity there may be one TextCollection 92022 attribute.

The SchedulingTerms 92026 entity has a cardinality of 0 . . . 1 92028 meaning that for each instance of the MaintenancePlan 92006 entity there may be one SchedulingTerms 92026 entity. The SchedulingTerms 92026 entity includes various attributes, namely a StartDateTime 92030, a MeasuringDeviceStartMeasurementReadingMeasure 92034, a LateCompletionShiftPercent 92038, an EarlyCompletionShiftPercent 92042, a LateCompletionTolerencePercent 92046, a WorkingDayCalendarCode 92050, an EarlyCompletionTolerencePercent 92054, a MaintenancePlanCycleQuantityModificationFactorValue 92058, a BufferStartDaysNumberValue 92062, a CallHorizonPercent 92066, a PredecessorCompletionRequiredIndicator 92070, a SchedulingDuration 92074, a SchedulingCategoryCode 92078 and a CycleDependencyIndicator 92082. The StartDateTime 92030 attribute has a cardinality of 0 . . . 1 92032 meaning that for each instance of the SchedulingTerms 92026 entity there may be one StartDateTime 92030 attribute.

The MeasuringDeviceStartMeasurementReadingMeasure 92034 attribute has a cardinality of 0 . . . 1 92036 meaning that for each instance of the SchedulingTerms 92026 entity there may be one MeasuringDeviceStartMeasurementReadingMeasure 92034 attribute. The LateCompletionShiftPercent 92038 attribute has a cardinality of 0 . . . 1 92040 meaning that for each instance of the SchedulingTerms 92026 entity there may be one LateCompletionShiftPercent 92038 attribute. The EarlyCompletionShiftPercent 92042 attribute has a cardinality of 0 . . . 1 92044 meaning that for each instance of the SchedulingTerms 92026 entity there may be one EarlyCompletionShiftPercent 92042 attribute. The LateCompletionTolerencePercent 92046 attribute has a cardinality of 0 . . . 1 92048 meaning that for each instance of the SchedulingTerms 92026 entity there may be one LateCompletionTolerencePercent 92046 attribute.

The WorkingDayCalendarCode 92050 attribute has a cardinality of 0 . . . 1 92052 meaning that for each instance of the SchedulingTerms 92026 entity there may be one WorkingDayCalendarCode 92050 attribute. The EarlyCompletionTolerencePercent 92054 attribute has a cardinality of 0 . . . 1 92056 meaning that for each instance of the SchedulingTerms 92026 entity there may be one EarlyCompletionTolerencePercent 92054 attribute. The MaintenancePlanCycleQuantityModificationFactorValue 92058 attribute has a cardinality of 0 . . . 1 92060 meaning that for each instance of the SchedulingTerms 92026 entity there may be one MaintenancePlanCycleQuantityModificationFactorValue 92058 attribute. The BufferStartDaysNumberValue 92062 attribute has a cardinality of 0 . . . 1 92064 meaning that for each instance of the SchedulingTerms 92026 entity there may be one BufferStartDaysNumberValue 92062 attribute. The CallHorizonPercent 92066 attribute has a cardinality of 0 . . . 1 92068 meaning that for each instance of the SchedulingTerms 92026 entity there may be one CallHorizonPercent 92066 attribute.

The PredecessorCompletionRequiredIndicator 92070 attribute has a cardinality of 0 . . . 1 92072 meaning that for each instance of the SchedulingTerms 92026 entity there may be one PredecessorCompletionRequiredIndicator 92070 attribute. The SchedulingDuration 92074 attribute has a cardinality of 0 . . . 1 92076 meaning that for each instance of the SchedulingTerms 92026 entity there may be one SchedulingDuration 92074 attribute. The SchedulingCategoryCode 92078 attribute has a cardinality of 0 . . . 1 92080 meaning that for each instance of the SchedulingTerms 92026 entity there may be one SchedulingCategoryCode 92078 attribute. The CycleDependencyIndicator 92082 attribute has a cardinality of 0 . . . 1 92084 meaning that for each instance of the SchedulingTerms 92026 entity there may be one CycleDependencyIndicator 92082 attribute.

The Cycle 92086 entity has a cardinality of 0 . . . n 92088 meaning that for each instance of the MaintenancePlan 92006 entity there may be one or more Cycle 92086 entities. The Cycle 92086 entity includes various attributes, namely a @actionCode 92090, a CounterValue 92094, a GroupSequenceNumberValue 92098, a GroupSequenceRepetitionNumberValue 92102, a Quantity 92106, a StartOffsetQuantity 92110, a MeasuringDeviceID 92114 and a Description 92118. The @actionCode 92090 attribute has a cardinality of 1 92092 meaning that for each instance of the Cycle 92086 entity there is one @actionCode 92090 attribute. The CounterValue 92094 attribute has a cardinality of 1 92096 meaning that for each instance of the Cycle 92086 entity there is one CounterValue 92094 attribute. The GroupSequenceNumberValue 92098 attribute has a cardinality of 0 . . . 1 92100 meaning that for each instance of the Cycle 92086 entity there may be one GroupSequenceNumberValue 92098 attribute.

The GroupSequenceRepetitionNumberValue 92102 attribute has a cardinality of 0 . . . 1 92104 meaning that for each instance of the Cycle 92086 entity there may be one GroupSequenceRepetitionNumberValue 92102 attribute. The Quantity 92106 attribute has a cardinality of 0 . . . 1 92108 meaning that for each instance of the Cycle 92086 entity there may be one Quantity 92106 attribute. The StartOffsetQuantity 92110 attribute has a cardinality of 0 . . . 1 92112 meaning that for each instance of the Cycle 92086 entity there may be one StartOffsetQuantity 92110 attribute. The MeasuringDeviceID 92114 attribute has a cardinality of 0 . . . 1 92116 meaning that for each instance of the Cycle 92086 entity there may be one MeasuringDeviceID 92114 attribute. The Description 92118 attribute has a cardinality of 0 . . . 1 92120 meaning that for each instance of the Cycle 92086 entity there may be one Description 92118 attribute.

The Item 92122 entity has a cardinality of 0 . . . n 92124 meaning that for each instance of the MaintenancePlan 92006 entity there may be one or more Item 92122 entities. The Item 92122 entity includes various attributes, namely a @actionCode 92126, an ID 92130, a CycleGroupSequenceNumberValue 92134, a BusinessTransactionDocumentProcessingTypeCode 92138, a BusinessTransactionDocumentReference 92142, a WorkCentreID 92146, a WorkCentrePlantID 92150, a MaintenancePlanningPlantID 92154, a MaintenancePlannerGroupCode 92158, an ImportanceCode 92162, a MaintenanceTaskListID 92166, a BusinessTransactionDocumentGroupID 92170, a BusinessObjectTypeCode 92174, a Description 92178 and a TextCollection 92182. The Item 92122 entity includes an ObjectReference 92186 subordinate entity.

The @actionCode 92126 attribute has a cardinality of 1 92128 meaning that for each instance of the Item 92122 entity there is one @actionCode 92126 attribute. The ID 92130 attribute has a cardinality of 0 . . . 1 92132 meaning that for each instance of the Item 92122 entity there may be one ID 92130 attribute. The CycleGroupSequenceNumberValue 92134 attribute has a cardinality of 0 . . . 1 92136 meaning that for each instance of the Item 92122 entity there may be one CycleGroupSequenceNumberValue 92134 attribute. The BusinessTransactionDocumentProcessingTypeCode 92138 attribute has a cardinality of 0 . . . 1 92140 meaning that for each instance of the Item 92122 entity there may be one BusinessTransactionDocumentProcessingTypeCode 92138 attribute. The BusinessTransactionDocumentReference 92142 attribute has a cardinality of 0 . . . 1 92144 meaning that for each instance of the Item 92122 entity there may be one BusinessTransactionDocumentReference 92142 attribute.

The WorkCentreID 92146 attribute has a cardinality of 0 . . . 1 92148 meaning that for each instance of the Item 92122 entity there may be one WorkCentreID 92146 attribute. The WorkCentrePlantID 92150 attribute has a cardinality of 0 . . . 1 92152 meaning that for each instance of the Item 92122 entity there may be one WorkCentrePlantID 92150 attribute. The MaintenancePlanningPlantID 92154 attribute has a cardinality of 0 . . . 1 92156 meaning that for each instance of the Item 92122 entity there may be one MaintenancePlanningPlantID 92154 attribute. The MaintenancePlannerGroupCode 92158 attribute has a cardinality of 0 . . . 1 92160 meaning that for each instance of the Item 92122 entity there may be one MaintenancePlannerGroupCode 92158 attribute. The ImportanceCode 92162 attribute has a cardinality of 0 . . . 1 92164 meaning that for each instance of the Item 92122 entity there may be one ImportanceCode 92162 attribute.

The MaintenanceTaskListID 92166 attribute has a cardinality of 0 . . . 1 92168 meaning that for each instance of the Item 92122 entity there may be one MaintenanceTaskListID 92166 attribute. The BusinessTransactionDocumentGroupID 92170 attribute has a cardinality of 0 . . . 1 92172 meaning that for each instance of the Item 92122 entity there may be one BusinessTransactionDocumentGroupID 92170 attribute. The BusinessObjectTypeCode 92174 attribute has a cardinality of 0 . . . 1 92176 meaning that for each instance of the Item 92122 entity there may be one BusinessObjectTypeCode 92174 attribute. The Description 92178 attribute has a cardinality of 0 . . . 1 92180 meaning that for each instance of the Item 92122 entity there may be one Description 92178 attribute. The TextCollection 92182 attribute has a cardinality of 0 . . . 1 92184 meaning that for each instance of the Item 92122 entity there may be one TextCollection 92182 attribute.

The ObjectReference 92186 entity has a cardinality of 0 . . . n 92188 meaning that for each instance of the Item 92122 entity there may be one or more ObjectReference 92186 entities. The ObjectReference 92186 entity includes various attributes, namely a @actionCode 92190, an OrdinalNumberValue 92194, a MainIndicator 92198, a SerialID 92202, a MaterialInternalID 92206, an IndividualMaterialID 92210 and an InstallationPointID 92214. The @actionCode 92190 attribute has a cardinality of 1 92192 meaning that for each instance of the ObjectReference 92186 entity there is one @actionCode 92190 attribute. The OrdinalNumberValue 92194 attribute has a cardinality of 0 . . . 1 92196 meaning that for each instance of the ObjectReference 92186 entity there may be one OrdinalNumberValue 92194 attribute. The MainIndicator 92198 attribute has a cardinality of 1 92200 meaning that for each instance of the ObjectReference 92186 entity there is one MainIndicator 92198 attribute. The SerialID 92202 attribute has a cardinality of 0 . . . 1 92204 meaning that for each instance of the ObjectReference 92186 entity there may be one SerialID 92202 attribute. The MaterialInternalID 92206 attribute has a cardinality of 0 . . . 1 92208 meaning that for each instance of the ObjectReference 92186 entity there may be one MaterialInternalID 92206 attribute. The IndividualMaterialID 92210 attribute has a cardinality of 0 . . . 1 92212 meaning that for each instance of the ObjectReference 92186 entity there may be one IndividualMaterialID 92210 attribute. The InstallationPointID 92214 attribute has a cardinality 0 . . . 1 92216 meaning that for each instance of the ObjectReference 92186 entity there may be one InstallationPointID 92214 attribute. The data types of the various packages, entities, and attributes are described with respect to FIG. 73.

FIG. 93 shows an example configuration of an Element Structure that includes a MaintPlnERPUpdtCkRspMsg_93000 package. The MaintPlnERPUpdtCkRspMsg_93000 package includes a MaintPlnERPUpdtCkRspMsg_93002 entity. The MaintPlnERPUpdtCkRspMsg_93000 package includes a Log 93004 package.

The Log 93004 package includes a Log 93006 entity. The Log 93006 entity has a cardinality of 1 93008 meaning that for each instance of the Log 93004 package there is one Log 93006 entity. The data types of the various packages, entities, and attributes are described with respect to FIG. 73.

FIG. 94 shows an example configuration of an Element Structure that includes a MaintPlnERPByIDQryMsg_94000 package. The MaintPlnERPByIDQryMsg_94000 package includes a MaintPlnERPByIDQryMsg_94002 entity. The MaintPlnERPByIDQryMsg_94000 package includes a Selection 94004 package.

The Selection 94004 package includes a MaintenancePlanSelectionByID 94006 entity. The MaintenancePlanSelectionByID 94006 entity has a cardinality of 1 94008 meaning that for each instance of the Selection 94004 package there is one MaintenancePlanSelectionByID 94006 entity. The MaintenancePlanSelectionByID 94006 entity includes a MaintenancePlanID 94010 attribute. The MaintenancePlanID 94010 attribute has a cardinality of 1 94012 meaning that for each instance of the MaintenancePlanSelectionByID 94006 entity there is one MaintenancePlanID 94010 attribute. The data types of the various packages, entities, and attributes are described with respect to FIG. 73.

FIGS. 95-1 through 95-10 show an example configuration of an Element Structure that includes a MaintPlnERPByIDRspMsg_95000 package. The MaintPlnERPByIDRspMsg_95000 package includes a MaintPlnERPByIDRspMsg_95002 entity. The MaintPlnERPByIDRspMsg_95000 package includes various packages, namely a MaintenancePlan 95004 and a Log 95262.

The MaintenancePlan 95004 package includes a MaintenancePlan 95006 entity. The MaintenancePlan 95006 entity has a cardinality of 0 . . . 1 95008 meaning that for each instance of the MaintenancePlan 95004 package there may be one MaintenancePlan 95006 entity. The MaintenancePlan 95006 entity includes various attributes, namely an ID 95010, a ChangeStateID 95014, a CategoryCode 95018, a StatusObject 95022, a Description 95026 and a TextCollection 95030. The MaintenancePlan 95006 entity includes various subordinate entities, namely a SchedulingTerms 95034, a Cycle 95094 and an Item 95126. The ID 95010 attribute has a cardinality of 1 95012 meaning that for each instance of the MaintenancePlan 95006 entity there is one ID 95010 attribute.

The ChangeStateID 95014 attribute has a cardinality of 1 95016 meaning that for each instance of the MaintenancePlan 95006 entity there is one ChangeStateID 95014 attribute. The CategoryCode 95018 attribute has a cardinality of 1 95020 meaning that for each instance of the MaintenancePlan 95006 entity there is one CategoryCode 95018 attribute. The StatusObject 95022 attribute has a cardinality of 0 . . . 1 95024 meaning that for each instance of the MaintenancePlan 95006 entity there may be one StatusObject 95022 attribute. The Description 95026 attribute has a cardinality of 0 . . . 1 95028 meaning that for each instance of the MaintenancePlan 95006 entity there may be one Description 95026 attribute. The TextCollection 95030 attribute has a cardinality of 0 . . . 1 95032 meaning that for each instance of the MaintenancePlan 95006 entity there may be one TextCollection 95030 attribute.

The SchedulingTerms 95034 entity has a cardinality of 0 . . . 1 95036 meaning that for each instance of the MaintenancePlan 95006 entity there may be one SchedulingTerms 95034 entity. The SchedulingTerms 95034 entity includes various attributes, namely a StartDateTime 95038, a MeasuringDeviceStartMeasurementReadingMeasure 95042, a LateCompletionShiftPercent 95046, an EarlyCompletionShiftPercent 95050, a LateCompletionTolerencePercent 95054, a WorkingDayCalendarCode 95058, an EarlyCompletionTolerencePercent 95062, a MaintenancePlanCycleQuantityModificationFactorValue 95066, a BufferStartDaysNumberValue 95070, a CallHorizonPercent 95074, a PredecessorCompletionRequiredIndicator 95078, a SchedulingDuration 95082, a SchedulingCategoryCode 95086 and a CycleDependencyIndicator 95090. The StartDateTime 95038 attribute has a cardinality of 0 . . . 1 95040 meaning that for each instance of the SchedulingTerms 95034 entity there may be one StartDateTime 95038 attribute.

The MeasuringDeviceStartMeasurementReadingMeasure 95042 attribute has a cardinality of 0 . . . 1 95044 meaning that for each instance of the SchedulingTerms 95034 entity there may be one MeasuringDeviceStartMeasurementReadingMeasure 95042 attribute. The LateCompletionShiftPercent 95046 attribute has a cardinality of 0 . . . 1 95048 meaning that for each instance of the SchedulingTerms 95034 entity there may be one LateCompletionShiftPercent 95046 attribute. The EarlyCompletionShiftPercent 95050 attribute has a cardinality of 0 . . . 1 95052 meaning that for each instance of the SchedulingTerms 95034 entity there may be one EarlyCompletionShiftPercent 95050 attribute. The LateCompletionTolerencePercent 95054 attribute has a cardinality of 0 . . . 1 95056 meaning that for each instance of the SchedulingTerms 95034 entity there may be one LateCompletionTolerencePercent 95054 attribute.

The WorkingDayCalendarCode 95058 attribute has a cardinality of 0 . . . 1 95060 meaning that for each instance of the SchedulingTerms 95034 entity there may be one WorkingDayCalendarCode 95058 attribute. The EarlyCompletionTolerencePercent 95062 attribute has a cardinality of 0 . . . 1 95064 meaning that for each instance of the SchedulingTerms 95034 entity there may be one EarlyCompletionTolerencePercent 95062 attribute. The MaintenancePlanCycleQuantityModificationFactorValue 95066 attribute has a cardinality of 0 . . . 1 95068 meaning that for each instance of the SchedulingTerms 95034 entity there may be one MaintenancePlanCycleQuantityModificationFactorValue 95066 attribute. The BufferStartDaysNumberValue 95070 attribute has a cardinality of 0 . . . 1 95072 meaning that for each instance of the SchedulingTerms 95034 entity there may be one BufferStartDaysNumberValue 95070 attribute.

The CallHorizonPercent 95074 attribute has a cardinality of 0 . . . 1 95076 meaning that for each instance of the SchedulingTerms 95034 entity there may be one CallHorizonPercent 95074 attribute. The PredecessorCompletionRequiredIndicator 95078 attribute has a cardinality of 0 . . . 1 95080 meaning that for each instance of the SchedulingTerms 95034 entity there may be one PredecessorCompletionRequiredIndicator 95078 attribute. The SchedulingDuration 95082 attribute has a cardinality of 0 . . . 1 95084 meaning that for each instance of the SchedulingTerms 95034 entity there may be one SchedulingDuration 95082 attribute. The SchedulingCategoryCode 95086 attribute has a cardinality of 0 . . . 1 95088 meaning that for each instance of the SchedulingTerms 95034 entity there may be one SchedulingCategoryCode 95086 attribute. The CycleDependencyIndicator 95090 attribute has a cardinality of 0 . . . 1 95092 meaning that for each instance of the SchedulingTerms 95034 entity there may be one CycleDependencyIndicator 95090 attribute.

The Cycle 95094 entity includes various attributes, namely a CounterValue 95098, a GroupSequenceNumberValue 95102, a GroupSequenceRepetitionNumberValue 95106, a Quantity 95110, a StartOffsetQuantity 95114, a MeasuringDeviceID 95118 and a Description 95122. The CounterValue 95098 attribute has a cardinality of 1 95100 meaning that for each instance of the Cycle 95094 entity there is one CounterValue 95098 attribute. The GroupSequenceNumberValue 95102 attribute has a cardinality of 0 . . . 1 95104 meaning that for each instance of the Cycle 95094 entity there may be one GroupSequenceNumberValue 95102 attribute.

The GroupSequenceRepetitionNumberValue 95106 attribute has a cardinality of 0 . . . 1 95108 meaning that for each instance of the Cycle 95094 entity there may be one GroupSequenceRepetitionNumberValue 95106 attribute. The Quantity 95110 attribute has a cardinality of 1 95112 meaning that for each instance of the Cycle 95094 entity there is one Quantity 95110 attribute. The StartOffsetQuantity 95114 attribute has a cardinality of 0 . . . 1 95116 meaning that for each instance of the Cycle 95094 entity there may be one StartOffsetQuantity 95114 attribute. The MeasuringDeviceID 95118 attribute has a cardinality of 0 . . . 1 95120 meaning that for each instance of the Cycle 95094 entity there may be one MeasuringDeviceID 95118 attribute. The Description 95122 attribute has a cardinality of 0 . . . 1 95124 meaning that for each instance of the Cycle 95094 entity there may be one Description 95122 attribute.

The Item 95126 entity has a cardinality of 1 . . . n 95128 meaning that for each instance of the MaintenancePlan 95006 entity there are one or more Item 95126 entities. The Item 95126 entity includes various attributes, namely an OrdinalNumberValue 95130, an ID 95134, a CycleGroupSequenceNumberValue 95138, a BusinessTransactionDocumentProcessingTypeCode 95142, a BusinessTransactionDocumentReference 95146, a WorkCentreID 95150, a WorkCentrePlantID 95154, a MaintenancePlanningPlantID 95158, a MaintenancePlannerGroupCode 95162, an ImportanceCode 95166, a MaintenanceTaskListID 95170, a BusinessTransactionDocumentGroupID 95174, a BusinessObjectTypeCode 95178, a WorkCentreDescription 95182, a MaintenancePlantDescription 95186, a StatusObject 95190, a Description 95194 and a TextCollection 95198. The Item 95126 entity includes various subordinate entities, namely an ObjectReference 95202 and a ScheduleLine 95242.

The OrdinalNumberValue 95130 attribute has a cardinality of 1 95132 meaning that for each instance of the Item 95126 entity there is one OrdinalNumberValue 95130 attribute. The ID 95134 attribute has a cardinality of 1 95136 meaning that for each instance of the Item 95126 entity there is one ID 95134 attribute. The CycleGroupSequenceNumberValue 95138 attribute has a cardinality of 0 . . . 1 95140 meaning that for each instance of the Item 95126 entity there may be one CycleGroupSequenceNumberValue 95138 attribute. The BusinessTransactionDocumentProcessingTypeCode 95142 attribute has a cardinality of 1 95144 meaning that for each instance of the Item 95126 entity there is one BusinessTransactionDocumentProcessingTypeCode 95142 attribute.

The BusinessTransactionDocumentReference 95146 attribute has a cardinality of 0 . . . 1 95148 meaning that for each instance of the Item 95126 entity there may be one BusinessTransactionDocumentReference 95146 attribute. The WorkCentreID 95150 attribute has a cardinality of 1 95152 meaning that for each instance of the Item 95126 entity there is one WorkCentreID 95150 attribute. The WorkCentrePlantID 95154 attribute has a cardinality of 0 . . . 1 95156 meaning that for each instance of the Item 95126 entity there may be one WorkCentrePlantID 95154 attribute. The MaintenancePlanningPlantID 95158 attribute has a cardinality of 1 95160 meaning that for each instance of the Item 95126 entity there is one MaintenancePlanningPlantID 95158 attribute. The MaintenancePlannerGroupCode 95162 attribute has a cardinality of 0 . . . 1 95164 meaning that for each instance of the Item 95126 entity there may be one MaintenancePlannerGroupCode 95162 attribute. The ImportanceCode 95166 attribute has a cardinality of 0 . . . 1 95168 meaning that for each instance of the Item 95126 entity there may be one ImportanceCode 95166 attribute.

The MaintenanceTaskListID 95170 attribute has a cardinality of 0 . . . 1 95172 meaning that for each instance of the Item 95126 entity there may be one MaintenanceTaskListID 95170 attribute. The BusinessTransactionDocumentGroupID 95174 attribute has a cardinality of 0 . . . 1 95176 meaning that for each instance of the Item 95126 entity there may be one BusinessTransactionDocumentGroupID 95174 attribute. The BusinessObjectTypeCode 95178 attribute has a cardinality of 0 . . . 1 95180 meaning that for each instance of the Item 95126 entity there may be one BusinessObjectTypeCode 95178 attribute. The WorkCentreDescription 95182 attribute has a cardinality of 0 . . . 1 95184 meaning that for each instance of the Item 95126 entity there may be one WorkCentreDescription 95182 attribute.

The MaintenancePlantDescription 95186 attribute has a cardinality of 0 . . . 1 95188 meaning that for each instance of the Item 95126 entity there may be one MaintenancePlantDescription 95186 attribute. The StatusObject 95190 attribute has a cardinality of 0 . . . 1 95192 meaning that for each instance of the Item 95126 entity there may be one StatusObject 95190 attribute. The Description 95194 attribute has a cardinality of 0 . . . 1 95196 meaning that for each instance of the Item 95126 entity there may be one Description 95194 attribute. The TextCollection 95198 attribute has a cardinality of 0 . . . 1 95200 meaning that for each instance of the Item 95126 entity there may be one TextCollection 95198 attribute.

The ObjectReference 95202 entity has a cardinality of 1 . . . n 95204 meaning that for each instance of the Item 95126 entity there are one or more ObjectReference 95202 entities. The ObjectReference 95202 entity includes various attributes, namely an OrdinalNumberValue 95206, a MainIndicator 95210, a SerialID 95214, a MaterialInternalID 95218, an IndividualMaterialID 95222, an InstallationPointID 95226, a MaterialDescription 95230, an IndividualMaterialDescription 95234 and an InstallationPointDescription 95238. The OrdinalNumberValue 95206 attribute has a cardinality of 1 95208 meaning that for each instance of the ObjectReference 95202 entity there is one OrdinalNumberValue 95206 attribute. The MainIndicator 95210 attribute has a cardinality of 1 95212 meaning that for each instance of the ObjectReference 95202 entity there is one MainIndicator 95210 attribute. The SerialID 95214 attribute has a cardinality of 0 . . . 1 95216 meaning that for each instance of the ObjectReference 95202 entity there may be one SerialID 95214 attribute.

The MaterialInternalID 95218 attribute has a cardinality of 0 . . . 1 95220 meaning that for each instance of the ObjectReference 95202 entity there may be one MaterialInternalID 95218 attribute. The IndividualMaterialID 95222 attribute has a cardinality of 0 . . . 1 95224 meaning that for each instance of the ObjectReference 95202 entity there may be one IndividualMaterialID 95222 attribute. The InstallationPointID 95226 attribute has a cardinality of 0 . . . 1 95228 meaning that for each instance of the ObjectReference 95202 entity there may be one InstallationPointID 95226 attribute. The MaterialDescription 95230 attribute has a cardinality of 0 . . . 1 95232 meaning that for each instance of the ObjectReference 95202 entity there may be one MaterialDescription 95230 attribute. The IndividualMaterialDescription 95234 attribute has a cardinality of 0 . . . 1 95236 meaning that for each instance of the ObjectReference 95202 entity there may be one IndividualMaterialDescription 95234 attribute. The InstallationPointDescription 95238 attribute has a cardinality of 0 . . . 1 95240 meaning that for each instance of the ObjectReference 95202 entity there may be one InstallationPointDescription 95238 attribute.

The ScheduleLine 95242 entity has a cardinality of 0 . . . n 95244 meaning that for each instance of the Item 95126 entity there may be one or more ScheduleLine 95242 entities. The ScheduleLine 95242 entity includes various attributes, namely an OrdinalNumberValue 95246, a PlannedDateTime 95250, an InitiatedDateTime 95254 and a CompletionDateTime 95258. The OrdinalNumberValue 95246 attribute has a cardinality of 1 95248 meaning that for each instance of the ScheduleLine 95242 entity there is one OrdinalNumberValue 95246 attribute. The PlannedDateTime 95250 attribute has a cardinality of 1 95252 meaning that for each instance of the ScheduleLine 95242 entity there is one PlannedDateTime 95250 attribute. The InitiatedDateTime 95254 attribute has a cardinality of 0 . . . 1 95256 meaning that for each instance of the ScheduleLine 95242 entity there may be one InitiatedDateTime 95254 attribute. The CompletionDateTime 95258 attribute has a cardinality of 0 . . . 1 95260 meaning that for each instance of the ScheduleLine 95242 entity there may be one CompletionDateTime 95258 attribute.

The Log 95262 package includes a Log 95264 entity. The Log 95264 entity has a cardinality of 1 95266 meaning that for each instance of the Log 95262 package there is one Log 95264 entity. The data types of the various packages, entities, and attributes are described with respect to FIG. 73.

FIG. 96 shows an example configuration of an Element Structure that includes a MaintPlnERPSchedLineByIDQryMsg_96000 package. The MaintPlnERPSchedLineByIDQryMsg_96000 package includes a MaintPlnERPSchedLineByIDQryMsg_96002 entity. The MaintPlnERPSchedLineByIDQryMsg_96000 package includes a Selection 96004 package.

The Selection 96004 package includes a MaintenancePlanScheduleLineSelectionByID 96006 entity. The MaintenancePlanScheduleLineSelectionByID 96006 entity has a cardinality of 1 96008 meaning that for each instance of the Selection 96004 package there is one MaintenancePlanScheduleLineSelectionByID 96006 entity. The MaintenancePlanScheduleLineSelectionByID 96006 entity includes a MaintenancePlanID 96010 attribute. The MaintenancePlanID 96010 attribute has a cardinality of 1 96012 meaning that for each instance of the MaintenancePlanScheduleLineSelectionByID 96006 entity there is one MaintenancePlanID 96010 attribute. The data types of the various packages, entities, and attributes are described with respect to FIG. 73.

FIGS. 97-1 through 97-2 show an example configuration of an Element Structure that includes a MaintPlnERPSchedLineByIDRspMsg_97000 package. The MaintPlnERPSchedLineByIDRspMsg_97000 package includes a MaintPlnERPSchedLineByIDRspMsg_97002 entity. The MaintPlnERPSchedLineByIDRspMsg_97000 package includes various packages, namely a MessageHeader 97004, a MaintenancePlan 97010 and a Log 97048.

The MessageHeader 97004 package includes a MessageHeader 97006 entity. The MessageHeader 97006 entity has a cardinality of 0 . . . 1 97008 meaning that for each instance of the MessageHeader 97004 package there may be one MessageHeader 97006 entity.

The MaintenancePlan 97010 package includes a MaintenancePlan 97012 entity. The MaintenancePlan 97012 entity has a cardinality of 0 . . . 1 97014 meaning that for each instance of the MaintenancePlan 97010 package there may be one MaintenancePlan 97012 entity. The MaintenancePlan 97012 entity includes an ID 97016 attribute. The MaintenancePlan 97012 entity includes an Item 97020 subordinate entity. The ID 97016 attribute has a cardinality of 1 97018 meaning that for each instance of the MaintenancePlan 97012 entity there is one ID 97016 attribute.

The Item 97020 entity has a cardinality of 0 . . . n 97022 meaning that for each instance of the MaintenancePlan 97012 entity there may be one or more Item 97020 entities. The Item 97020 entity includes an ID 97024 attribute. The Item 97020 entity includes a ScheduleLine 97028 subordinate entity. The ID 97024 attribute has a cardinality of 1 97026 meaning that for each instance of the Item 97020 entity there is one ID 97024 attribute.

The ScheduleLine 97028 entity has a cardinality of 0 . . . n 97030 meaning that for each instance of the Item 97020 entity there may be one or more ScheduleLine 97028 entities. The ScheduleLine 97028 entity includes various attributes, namely an OrdinalNumberValue 97032, a PlannedDateTime 97036, an InitiatedDateTime 97040 and a CompletionDateTime 97044. The OrdinalNumberValue 97032 attribute has a cardinality of 0 . . . 1 97034 meaning that for each instance of the ScheduleLine 97028 entity there may be one OrdinalNumberValue 97032 attribute. The PlannedDateTime 97036 attribute has a cardinality of 0 . . . 1 97038 meaning that for each instance of the ScheduleLine 97028 entity there may be one PlannedDateTime 97036 attribute. The InitiatedDateTime 97040 attribute has a cardinality of 0 . . . 1 97042 meaning that for each instance of the ScheduleLine 97028 entity there may be one InitiatedDateTime 97040 attribute. The CompletionDateTime 97044 attribute has a cardinality of 0 . . . 1 97046 meaning that for each instance of the ScheduleLine 97028 entity there may be one CompletionDateTime 97044 attribute.

The Log 97048 package includes a Log 97050 entity. The Log 97050 entity has a cardinality of 1 97052 meaning that for each instance of the Log 97048 package there is one Log 97050 entity. The data types of the various packages, entities, and attributes are described with respect to FIG. 73.

MaintenanceTaskList Interfaces

Maintenance Task List can be a list of maintenance tasks which may be performed repeatedly for maintaining a product. Task lists can be used to standardize recurring work sequences and to plan them more effectively. Many manufacturers can deliver task lists along with their products for the maintenance of those products.

The MaintenanceTaskList interface can perform various operations, namely a MaintenanceTaskListERPSimpleByElementsQueryResponse_In, a ParentMaintenanceTaskListERPSimpleByMaintenanceTaskListQueryResponse_In, a SubordinateMaintenanceTaskListERPSimpleByMaintenanceTaskListQueryResponse_In, a TopLevelMaintenanceTaskListERPSimpleByMaintenanceTaskListQueryResponse_In, a MaintenanceTaskListERPByIDAndGroupIDAndTypeCodeQueryResponse_In, and a MaintenanceTaskListERPSimulateMaintenanceOrderCalculationRequestConfirmation_In. The MaintenanceTaskListERPSimpleByElementsQueryResponse_In operation can handle an inquiry to and response from Maintenance Planning to list Maintenance Task Lists according to a given selection criteria.

Maintenance Planner can use a 'Find Maintenance Task List By Elements' inbound operation to get a list of Maintenance Task Lists based on a given selection criteria. The MaintenanceTaskListERPSimpleByElementsQueryResponse_In operation includes various message types, namely a MaintenanceTaskListERPSimpleByElementsQuery_ync and a MaintenanceTaskListERPSimpleByElementsResponse_ync. The structure of the MaintenanceTaskListERPSimpleByElementsQuery_ync message type can be specified by a MaintTskListERPSimplElmntsQryMsg_message data type. The structure of the MaintenanceTaskListERPSimpleByElementsResponse_ync message type can be specified by a MaintTskListERPSimplElmntsRspMsg_message data type.

The ParentMaintenanceTaskListERPSimpleByMaintenanceTaskListQueryResponse_In operation can handle an inquiry to and response from Maintenance Planning to list Parent Maintenance Task Lists for a given Maintenance Task List and level. Maintenance Planner can use a 'Find Parent Maintenance Task List By Maintenance Task List' inbound operation to find Parent Maintenance Task Lists for a given Maintenance Task List and a given level. The upper hierarchy can be returned until a specified level is reached. The ParentMaintenanceTaskListERPSimpleByMaintenanceTaskListQueryResponse_In operation includes various message types, namely a ParentMaintenanceTaskListERPSimpleByMaintenanceTaskListQuery_ync and a ParentMaintenanceTaskListERPSimpleByMaintenanceTaskListResponse_ync. The structure of the ParentMaintenanceTaskListERPSimpleByMaintenanceTaskListQuery_ync message type can be specified by a ParMaintTskListERPSimplMaintTskListRspMsg_message data type. The structure of the ParentMaintenanceTaskListERPSimpleByMaintenanceTaskListResponse_ync message type can be specified by a ParMaintTskListERPSimplMaintTskListRspMsg_message data type.

The SubordinateMaintenanceTaskListERPSimpleByMaintenanceTaskListQueryResponse_In operation can handle an inquiry to and response from Maintenance Planning to list Subordinate Maintenance Task Lists according to a specified Maintenance Task List. Maintenance Planner can use a 'Find Subordinate Maintenance Task List By Maintenance Task List' inbound operation to find Subordinate Maintenance Task Lists for a given Maintenance Task List and a given level. A lower hierarchy can be returned until a specified level is reached. The SubordinateMaintenanceTaskListERPSimpleByMaintenanceTaskListQueryResponse_In operation includes various message types, namely a SubordinateMaintenanceTaskListERPSimpleByMaintenanceTaskListQuery_ync and a SubordinateMaintenanceTaskListERPSimpleByMaintenanceTaskListResponse_ync. The structure of the SubordinateMaintenanceTaskListERPSimpleByMaintenanceTaskListQuery_ync message type can be specified by a SubordMaintTskListERPSimplMaintTskListQryMsg_message data type. The structure of the SubordinateMaintenanceTaskListERPSimpleByMaintenanceTaskListResponse_ync message type can be specified by a SubordMaintTskListERPSimplMaintTskListRspMsg_message data type.

The TopLevelMaintenanceTaskListERPSimpleByMaintenanceTaskListQueryResponse_In operation can handle an inquiry to and response from Maintenance Planning to find the Top Level Maintenance Task List in the given Maintenance Task List hierarchy. Maintenance Planner can use a 'Find Top Level Maintenance Task List By Maintenance Task List' inbound operation to find a Top Level Maintenance Task List in a given Maintenance Task List hierarchy. The TopLevelMaintenanceTaskListERPSimpleByMaintenanceTaskListQueryResponse_In operation includes various message types, namely a TopLevelMaintenanceTaskListERPSimpleByMaintenanceTaskListQuery_ync and a TopLevelMaintenanceTaskListERPSimpleByMaintenanceTaskListResponse_ync. The structure of the TopLevelMaintenanceTaskListERPSimpleByMaintenanceTaskListQuery_ync message type can be specified by a TopLvlMaintTskListERPSimplMaintTskListQryMsg_message data type. The structure of the TopLevelMaintenanceTaskListERPSimpleByMaintenanceTaskListResponse_ync message type can be specified by a TopLvlMaintTskListERPSimplMaintTskListRspMsg_message data type.

The MaintenanceTaskListERPByIDAndGroupIDAndTypeCodeQueryResponse_In operation can handle an inquiry to and response from Maintenance Planning to read a Maintenance Task List. Maintenance Planner can use a 'Read Maintenance Task List' inbound operation to read a Maintenance Task List. The MaintenanceTaskListERPByIDAndGroupIDAndTypeCodeQueryResponse_In operation includes various message types, namely a MaintenanceTaskListERPByIDAnd-GroupIDAndTypeCodeQuery_ync and a MaintenanceTaskListERPByIDAndGroupIDAndTypeCodeResponse_ync. The structure of the MaintenanceTaskListERPByIDAndGroupIDAndTypeCodeQuery_ync message type can be specified by a MaintTskListERPByIDAndGrpIDAndTypeCodeQryMsg_message data type. The structure of the MaintenanceTaskListERPByIDAndGroupIDAndTypeCodeResponse_ync message type can be specified by a MaintTskListERPByIDAndGrpIDAndTypeCodeRspMsg_message data type.

The MaintenanceTaskListERPSimulateMaintenanceOrderCalculationRequestConfirmation_In operation can request to and confirm from Maintenance Planning to simulate Maintenance Order calculation. The Maintenance Planner can use a 'Simulate Task List Maintenance Order Calculation' inbound operation to simulate a Maintenance Order calculation. The MaintenanceTaskListERPSimulateMaintenanceOrderCalculationRequestConfirmation_In operation includes various message types, namely a MaintenanceTaskListERPSimulateMaintenanceOrderCalculationRequest_ync and a MaintenanceTaskListERPSimulateMaintenanceOrderCalculationConfirmation_ync. The structure of the MaintenanceTaskListERPSimulateMaintenanceOrderCalculationRequest_ync message type can be specified by a MaintenanceTaskListERPSimulateMaintenanceOrderCalculationRequestMessage_ync message data type. The structure of the MaintenanceTaskListERPSimulateMaintenanceOrderCalculationConfirmation_ync message type can be specified by a MaintenanceTaskListERPSimulateMaintenanceOrderCalculationConfirmationMessage_ync message data type.

Figure 98:
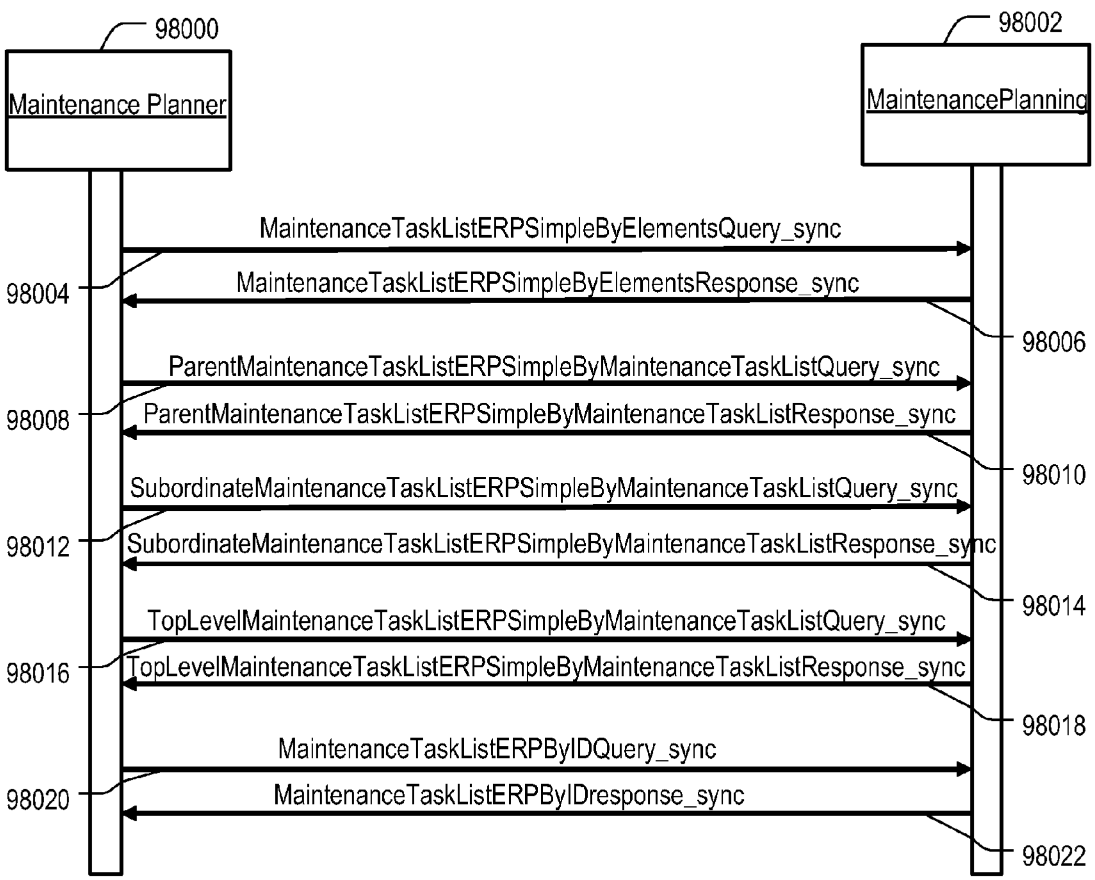
FIG. 98 shows an exemplary Maintenance Task List Message Choreography.

The message choreography of FIG. 98 describes a possible logical sequence of messages that can be used to realize a Maintenance Task List business scenario. A "Maintenance Planner" system 98000 can query a "Maintenance Planning" system 98002 to list maintenance task lists according to a given selection criteria, using a MaintenanceTaskListERPSimpleByElementsQuery_ync message 98004 as shown, for example in FIG. 98. The "Maintenance Planning" system 98002 can respond to the query, using a MaintenanceTaskListERPSimpleByElementsResponse_ync message 98006 as shown, for example, in FIG. 98.

The "Maintenance Planner" system 98000 can query the "Maintenance Planning" system 98002 to list parent maintenance task lists for a given maintenance task list and level, using a ParentMaintenanceTaskListERPSimpleByMaintenanceTaskListQuery_ync message 98008 as shown, for example in FIG. 98. The "Maintenance Planning" system 98002 can respond to the query, using a ParentMaintenanceTaskListERPSimpleByMaintenanceTaskListResponse_ync message 98010 as shown, for example, in FIG. 98.

The "Maintenance Planner" system 98000 can query the "Maintenance Planning" system 98002 to list subordinate maintenance task lists for a given maintenance task list, using a SubordinateMaintenanceTaskListERPSimpleByMaintenanceTaskListQuery_ync message 98012 as shown, for example in FIG. 98. The "Maintenance Planning" system 98002 can respond to the query, using a SubordinateMaintenanceTaskListERPSimpleByMaintenanceTaskListResponse_ync message 98014 as shown, for example, in FIG. 98.

The "Maintenance Planner" system 98000 can query the "Maintenance Planning" system 98002 to find the top level maintenance task list for a given maintenance task list hierarchy, using a TopLevelMaintenanceTaskListERPSimpleByMaintenanceTaskListQuery_ync message 98016 as shown, for example in FIG. 98. The "Maintenance Planning" system 98002 can respond to the query, using a TopLevelMaintenanceTaskListERPSimpleByMaintenanceTaskListResponse_ync message 98018 as shown, for example, in FIG. 98.

The "Maintenance Planner" system 98000 can query the "Maintenance Planning" system 98002 to read a maintenance task list, using a MaintenanceTaskListERPByIDQuery_ync message 98020 as shown, for example in FIG. 98. The "Maintenance Planning" system 98002 can respond to the query, using a MaintenanceTaskListERPByIDResponse_ync message 98022 as shown, for example, in FIG. 98.

Figure 99:
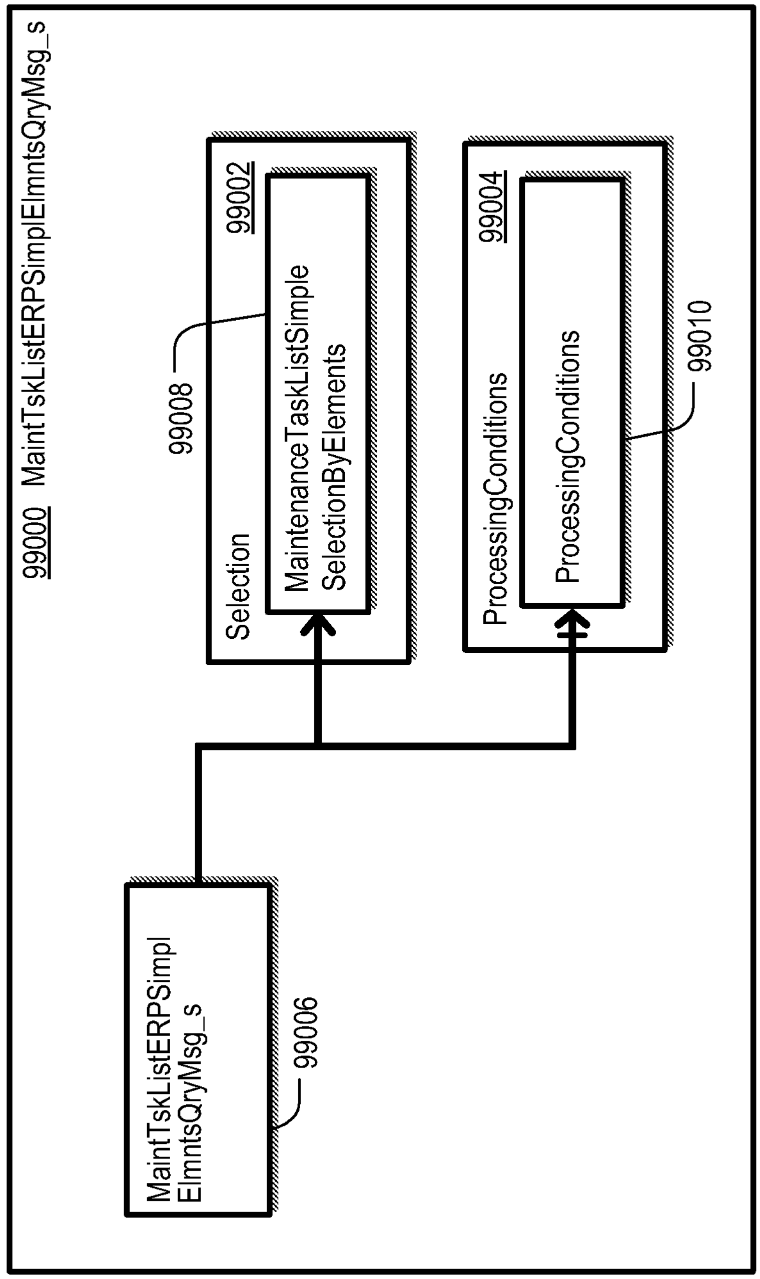
FIG. 99 shows an exemplary MaintenanceTaskListERPSimpleByElementsQuery_ync Message Data Type.

FIG. 99 illustrates one example logical configuration of MaintTskListERPSimplElmntsQryMsg_message 99000. Specifically, this figure depicts the arrangement and hierarchy of various components such as one or more levels of packages, entities, and datatypes, shown here as 99002 through 99010. As described above, packages may be used to represent hierarchy levels. Entities are discrete business elements that are used during a business transaction. Data types are used to type object entities and interfaces with a structure. For example, MaintTskListERPSimplElmntsQryMsg_message 99000 includes, among other things, ProcessingConditions 99004. Accordingly, heterogeneous applications may communicate using this consistent message configured as such.

Figure 100:
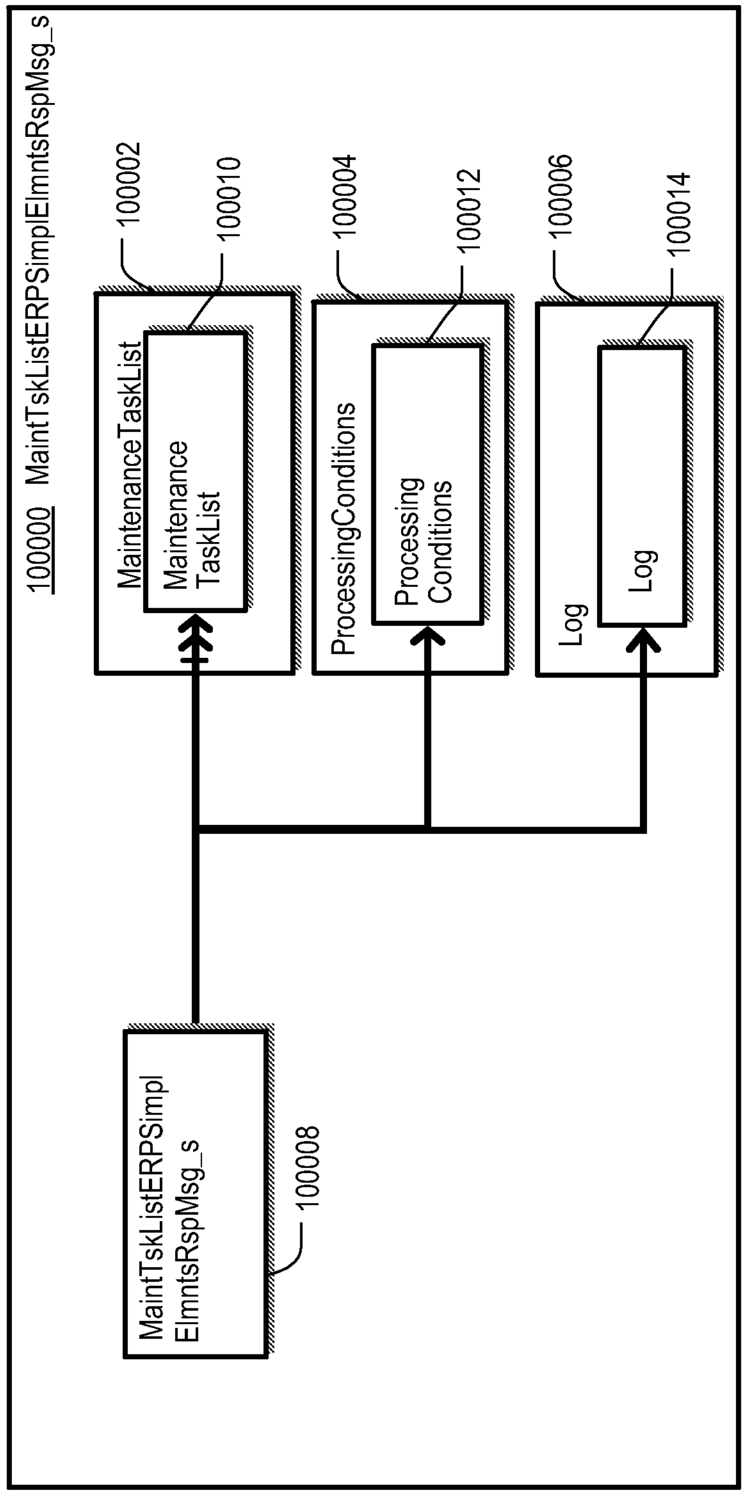
FIG. 100 shows an exemplary MaintenanceTaskListERPSimpleByElementsResponse_ync Message Data Type.

Additionally, FIG. 100 illustrates one example logical configuration of MaintTskListERPSimplElmntsRspMsg_message 100000. Specifically, this figure depicts the arrangement and hierarchy of various components such as one or more levels of packages, entities, and datatypes, shown here as 100002 through 100014. As described above, packages may be used to represent hierarchy levels. Entities are discrete business elements that are used during a business transaction. Data types are used to type object entities and interfaces with a structure. For example, MaintTskListERPSimplElmntsRspMsg_message 100000 includes, among other things, ProcessingConditions 100012. Accordingly, heterogeneous applications may communicate using this consistent message configured as such.

Figure 101:
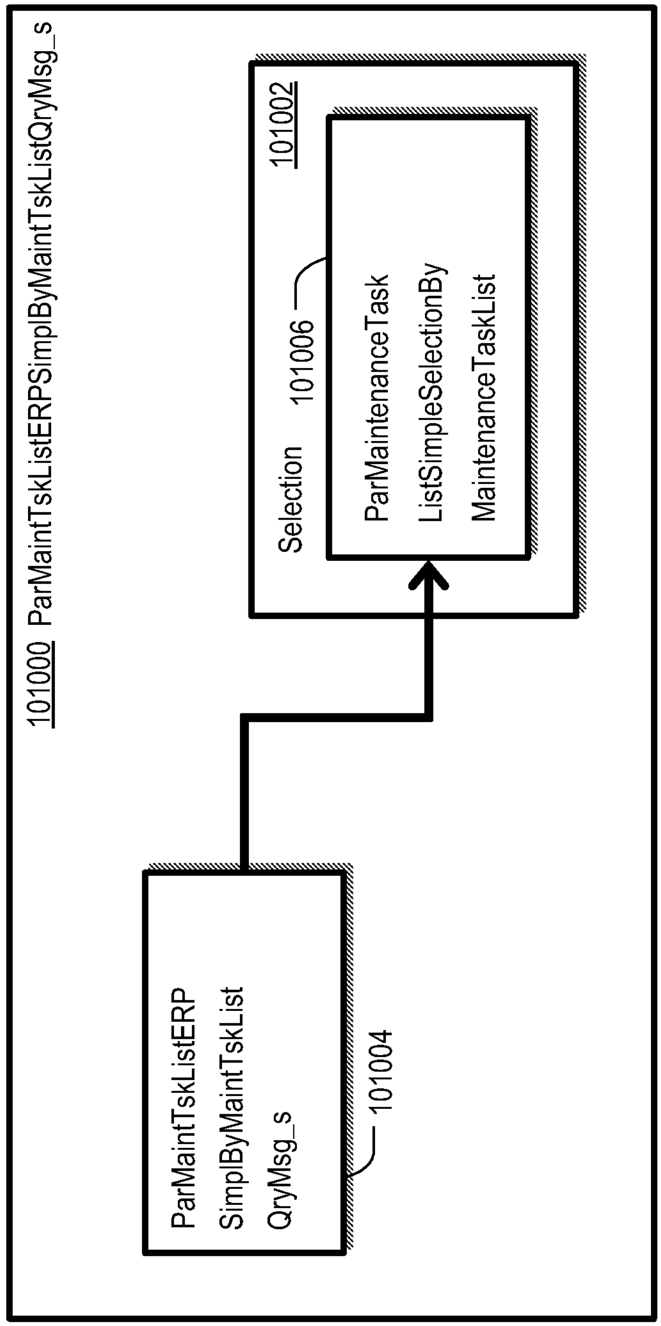
FIG. 101 shows an exemplary ParentMaintenanceTaskListERPSimpleByMaintenanceTaskListQuery_ync Message Data Type.

Additionally, FIG. 101 illustrates one example logical configuration of ParMaintTskListERPSimplByMaintTskListQryMsg_message 101000. Specifically, this figure depicts the arrangement and hierarchy of various components such as one or more levels of packages, entities, and datatypes, shown here as 101002 through 101006. As described above, packages may be used to represent hierarchy levels. Entities are discrete business elements that are used during a business transaction. Data types are used to type object entities and interfaces with a structure. For example, ParMaintTskListERPSimplByMaintTskListQryMsg_message 101000 includes, among other things, Selection 101002. Accordingly, heterogeneous applications may communicate using this consistent message configured as such.

Figure 102:
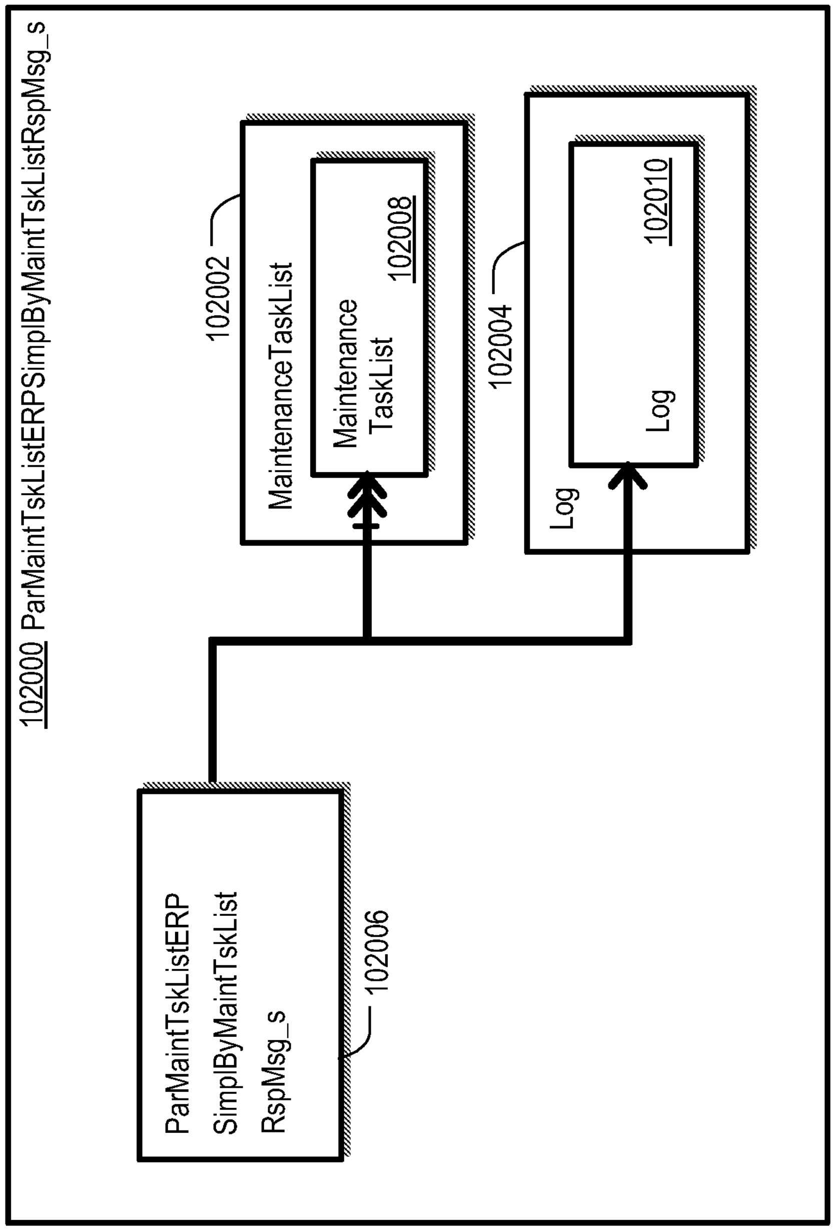
FIG. 102 shows an exemplary ParentMaintenanceTaskListERP SimpleByMaintenanceTaskListResponse_ync Message Data Type.

Additionally, FIG. 102 illustrates one example logical configuration of ParMaintTskListERPSimplByMaintTskListRspMsg_message 102000. Specifically, this figure depicts the arrangement and hierarchy of various components such as one or more levels of packages, entities, and datatypes, shown here as 102002 through 102010. As described above, packages may be used to represent hierarchy levels. Entities are discrete business elements that are used during a business transaction. Data types are used to type object entities and interfaces with a structure. For example, ParMaintTskListERPSimplByMaintTskListRspMsg_message 102000 includes, among other things, MaintenanceTaskList 102008. Accordingly, heterogeneous applications may communicate using this consistent message configured as such.

Figure 103:
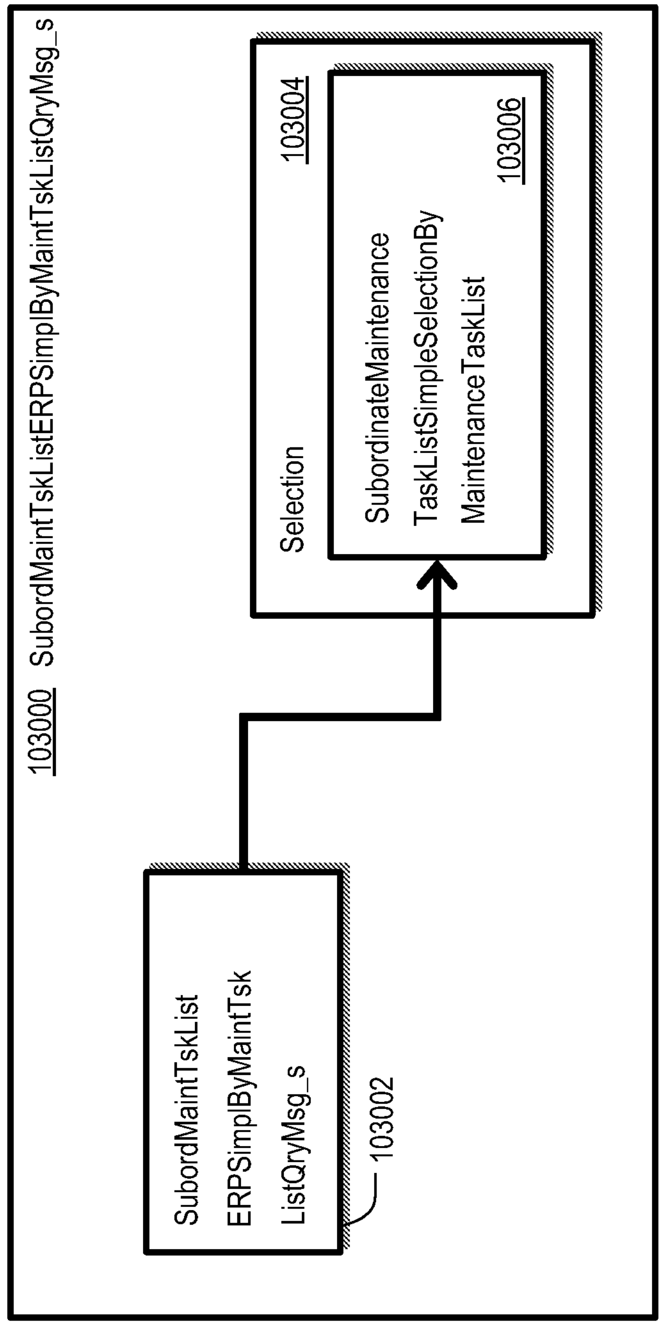
FIG. 103 shows an exemplary SubordinateMaintenanceTaskListERPSimpleByMaintenanceTaskListQuery_ync Message Data Type.

Additionally, FIG. 103 illustrates one example logical configuration of SubordMaintTskListERPSimplByMaintTskListQryMsg_message 103000. Specifically, this figure depicts the arrangement and hierarchy of various components such as one or more levels of packages, entities, and datatypes, shown here as 103002 through 103006. As described above, packages may be used to represent hierarchy levels. Entities are discrete business elements that are used during a business transaction. Data types are used to type object entities and interfaces with a structure. For example, SubordMaintTskListERPSimplByMaintTskListQryMsg_message 103000 includes, among other things, Selection 103004. Accordingly, heterogeneous applications may communicate using this consistent message configured as such.

Figure 104:
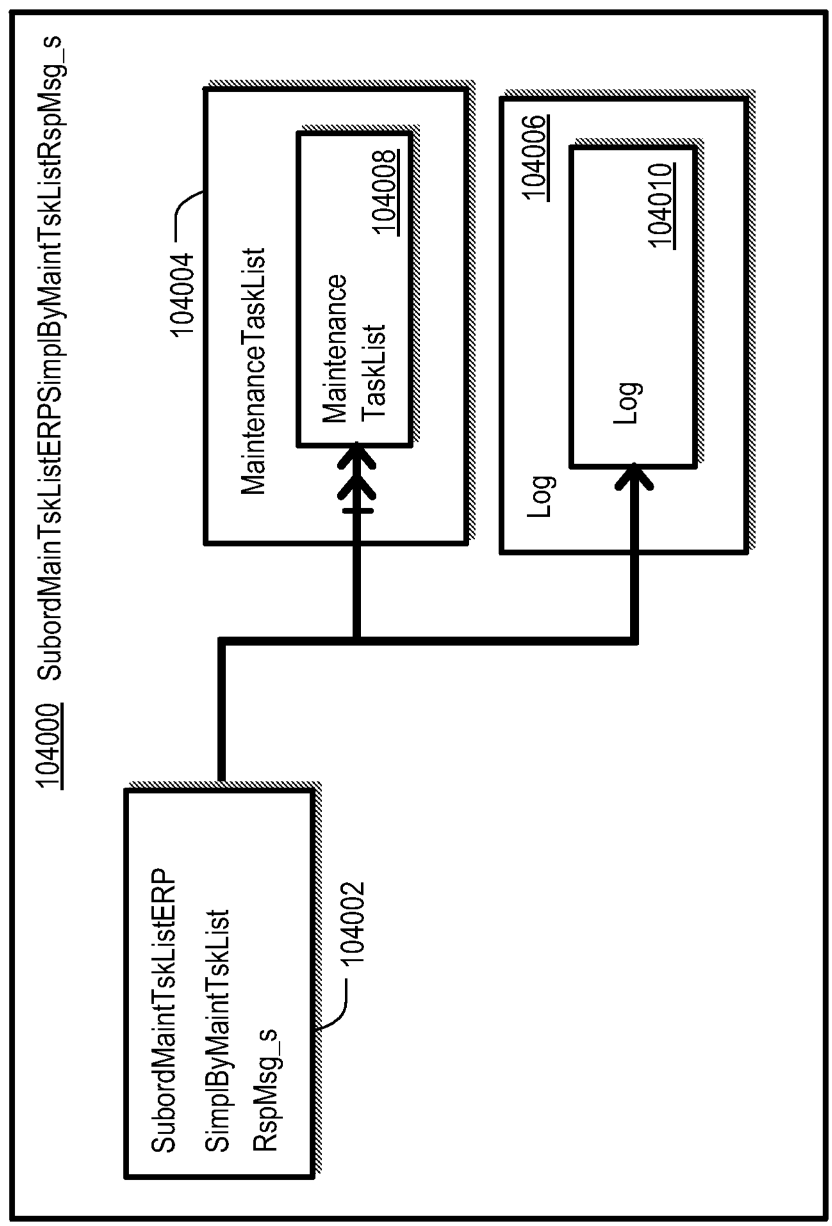
FIG. 104 shows an exemplary SubordinateMaintenanceTaskListERPSimpleByMaintenanceTaskListResponse_ync Message Data Type.

Additionally, FIG. 104 illustrates one example logical configuration of SubordMaintTskListERPSimplByMaintTskListRspMsg_message 104000. Specifically, this figure depicts the arrangement and hierarchy of various components such as one or more levels of packages, entities, and datatypes, shown here as 104002 through 104010. As described above, packages may be used to represent hierarchy levels. Entities are discrete business elements that are used during a business transaction. Data types are used to type object entities and interfaces with a structure. For example, SubordMaintTskListERPSimplByMaintTskListRspMsg_message 104000 includes, among other things, MaintenanceTaskList 104008. Accordingly, heterogeneous applications may communicate using this consistent message configured as such.

Figure 105:
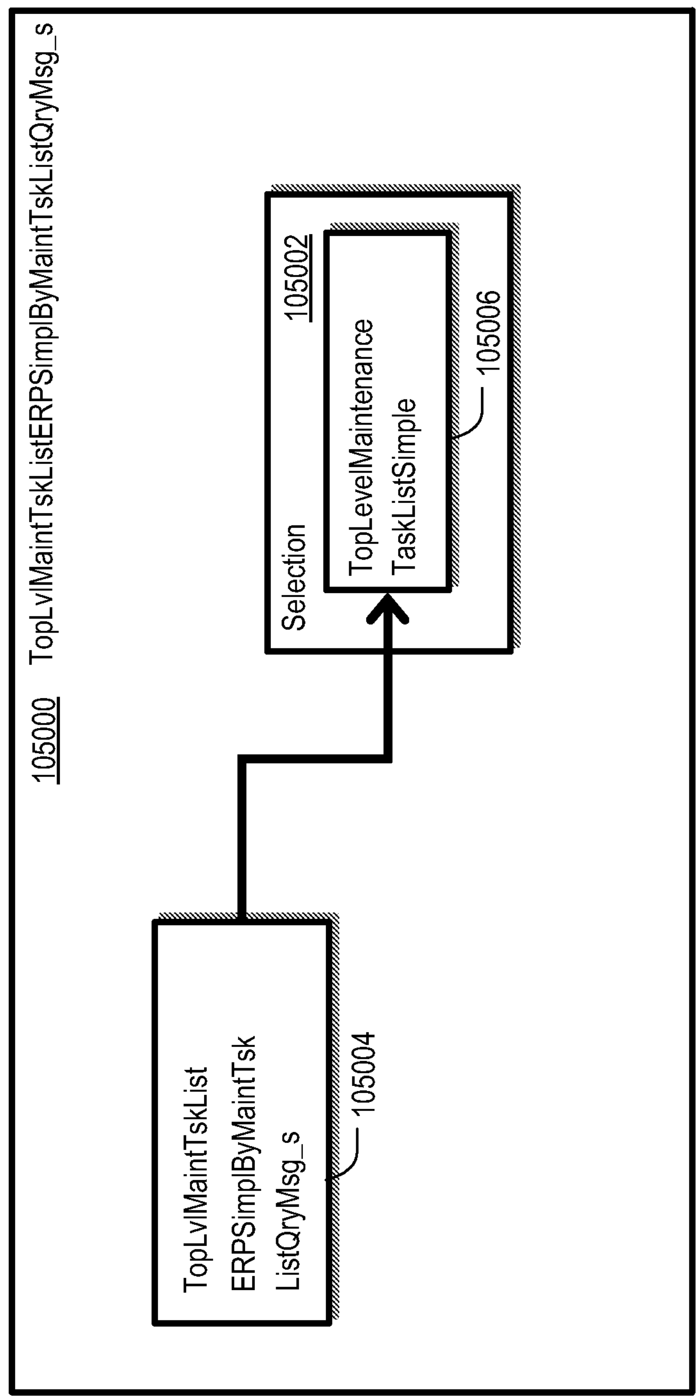
FIG. 105 shows an exemplary TopLevelMaintenanceTaskListERPSimpleByMaintenanceTaskListQuery_ync Message Data Type.

Additionally, FIG. 105 illustrates one example logical configuration of TopLvlMaintTskListERPSimplByMaintTskListQryMsg_message 105000. Specifically, this figure depicts the arrangement and hierarchy of various components such as one or more levels of packages, entities, and datatypes, shown here as 105002 through 105006. As described above, packages may be used to represent hierarchy levels. Entities are discrete business elements that are used during a business transaction. Data types are used to type object entities and interfaces with a structure. For example, TopLvlMaintTskListERPSimplByMaintTskListQryMsg_message 105000 includes, among other things, Selection 105002. Accordingly, heterogeneous applications may communicate using this consistent message configured as such.

Figure 106:
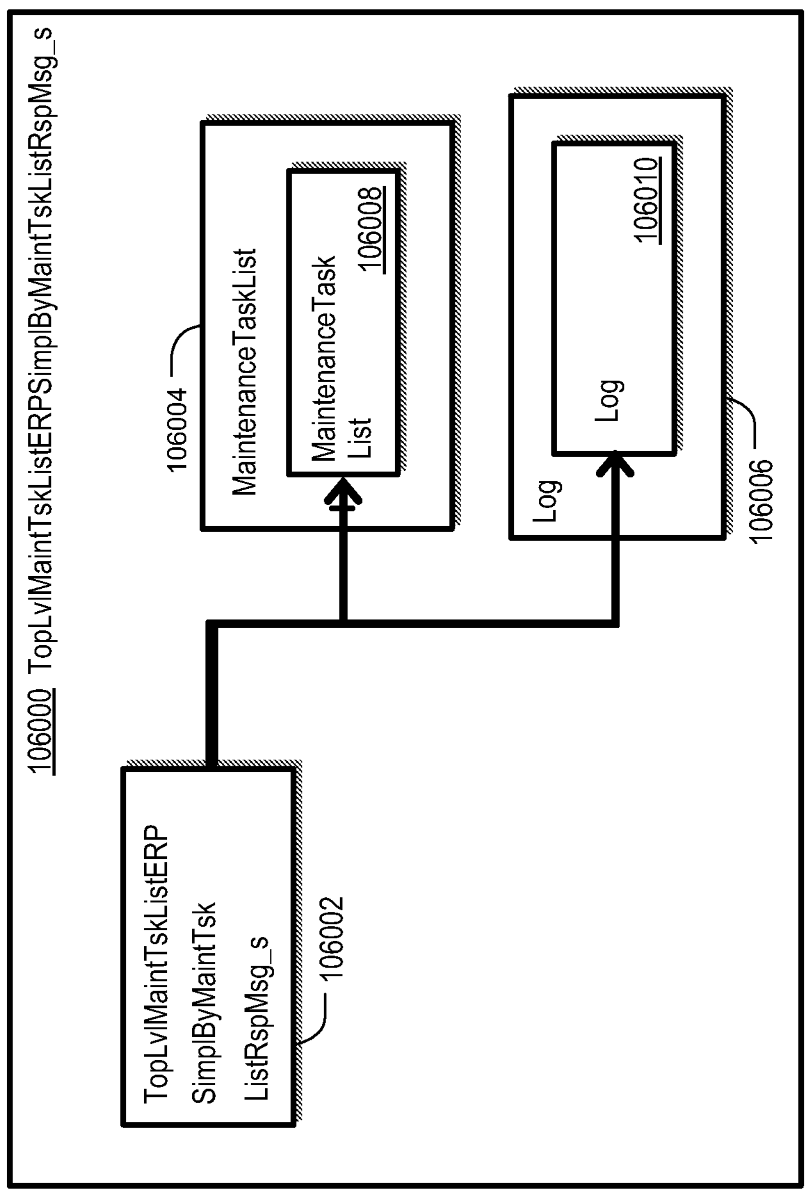
FIG. 106 shows an exemplary TopLevelMaintenanceTaskListERPSimpleByMaintenanceTaskListResponse_ync Message Data Type.

Additionally, FIG. 106 illustrates one example logical configuration of TopLvlMaintTskListERPSimplByMaintTskListRspMsg_message 106000. Specifically, this figure depicts the arrangement and hierarchy of various components such as one or more levels of packages, entities, and datatypes, shown here as 106002 through 106010. As described above, packages may be used to represent hierarchy levels. Entities are discrete business elements that are used during a business transaction. Data types are used to type object entities and interfaces with a structure. For example, TopLvlMaintTskListERPSimplBy-MaintTskListRspMsg_message 106000 includes, among other things, MaintenanceTaskList 106008. Accordingly, heterogeneous applications may communicate using this consistent message configured as such.

Figure 107:
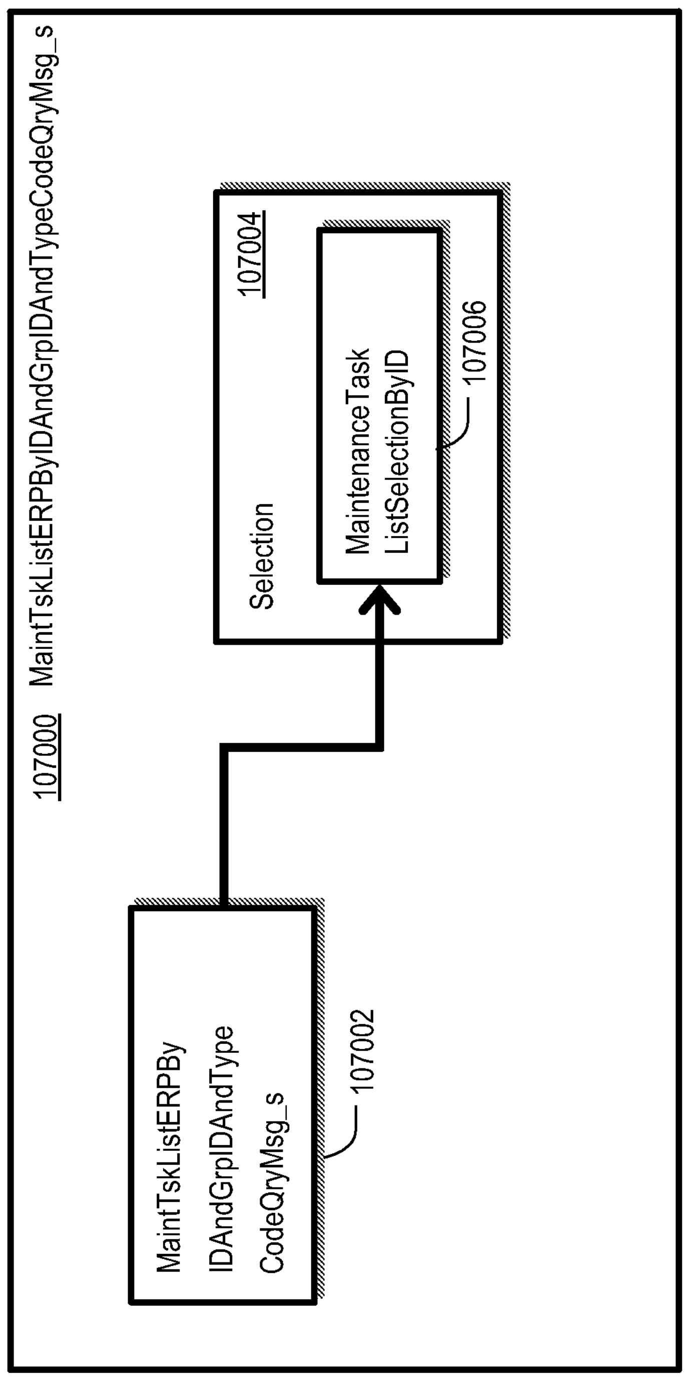
FIG. 107 shows an exemplary MaintenanceTaskListERPByIDQuery_ync Message Data Type.

Additionally, FIG. 107 illustrates one example logical configuration of MaintTskListERPByIDAndGrpI-DAndTypeCodeQryMsg_message 107000. Specifically, this figure depicts the arrangement and hierarchy of various components such as one or more levels of packages, entities, and datatypes, shown here as 107002 through 107006. As described above, packages may be used to represent hierarchy levels. Entities are discrete business elements that are used during a business transaction. Data types are used to type object entities and interfaces with a structure. For example, MaintTskListERPByIDAndGrpI-DAndTypeCodeQryMsg_message 107000 includes, among other things, Selection 107004. Accordingly, heterogeneous applications may communicate using this consistent message configured as such.

Figure 108:
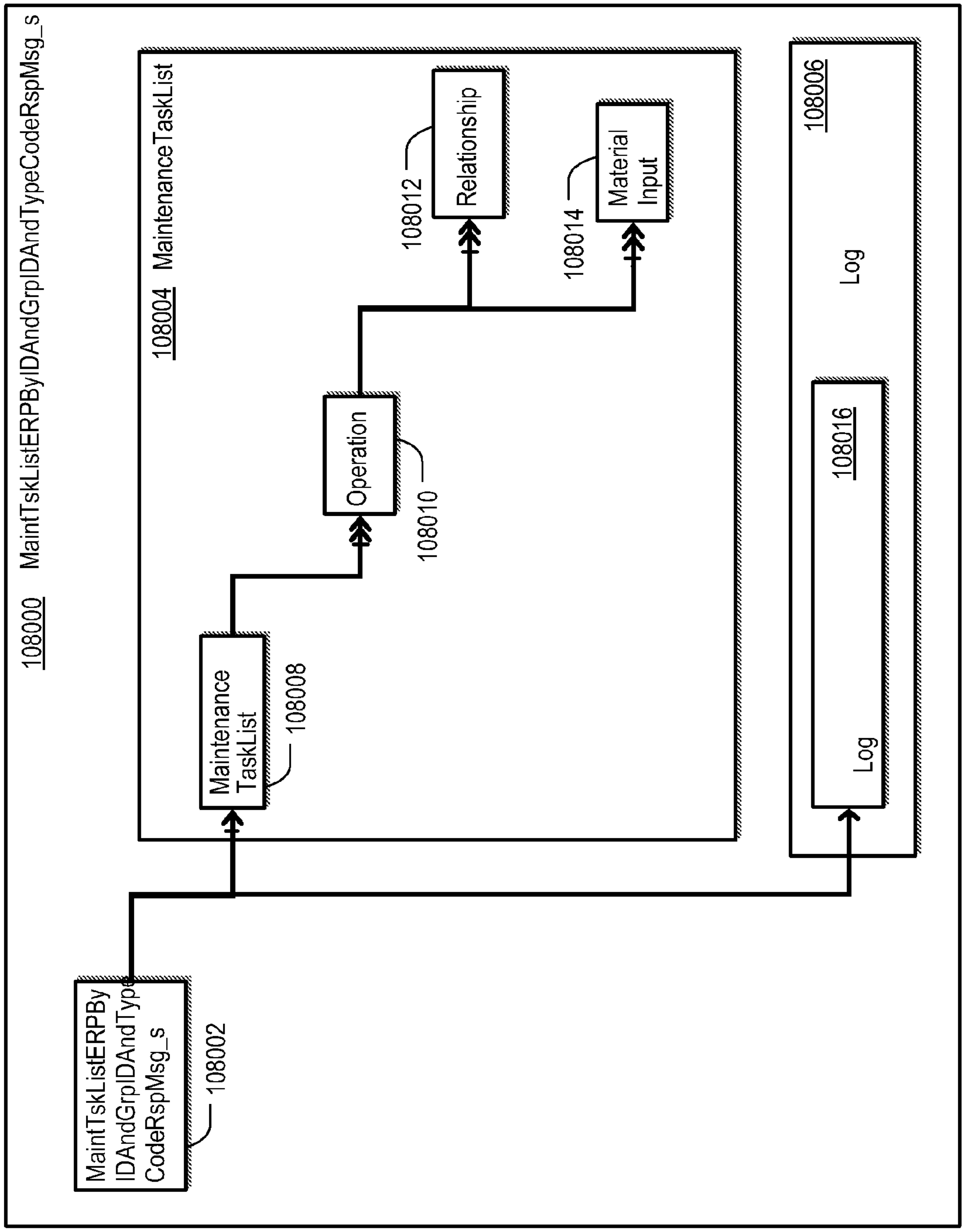
FIG. 108 shows an exemplary MaintenanceTaskListERPByIDresponse_ync Message Data Type.

Additionally, FIG. 108 illustrates one example logical configuration of MaintTskListERPByIDAndGrpI-DAndTypeCodeRspMsg_message 108000. Specifically, this figure depicts the arrangement and hierarchy of various components such as one or more levels of packages, entities, and datatypes, shown here as 108002 through 108016. As described above, packages may be used to represent hierarchy levels. Entities are discrete business elements that are used during a business transaction. Data types are used to type object entities and interfaces with a structure. For example, MaintTskListERPByIDAndGrpI-DAndTypeCodeRspMsg_message 108000 includes, among other things, Relationship 108012. Accordingly, heterogeneous applications may communicate using this consistent message configured as such.

FIGS. 109-1 through 109-7 show an example configuration of an Element Structure that includes a MaintenanceTaskListMessage_ync 109000 package. The MaintenanceTaskListMessage_ync 109000 package is a <MessageDataType> 109004 data type. The MaintenanceTaskListMessage_ync 109000 package includes a MaintenanceTaskListMessage_ync 109002 entity. The MaintenanceTaskListMessage_ync 109000 package includes various packages, namely a MessageHeader 109006, a MaintenanceTaskList 109012 and a Log 109180.

The MessageHeader 109006 package can be a BasicBusinessDocumentMessageHeader 109010 data type. The MessageHeader 109006 package includes a MessageHeader 109008 entity. The MaintenanceTaskList 109012 package includes a MaintenanceTaskList 109014 entity. The MaintenanceTaskList 109012 package includes various packages, namely an Operation 109076 and a ProcessingConditions 109156. The MaintenanceTaskList 109014 entity includes various attributes, namely an ID 109016, a GroupID 109020, a MaintenancePlanningPlantID 109024, a Maintenance-WorkCentreID 109028, a MaintenanceWorkCentrePlantID 109032, a MaterialInternalID 109036, an InstallationPointID 109040, an IndividualMaterialID 109044, a TypeCode 109048, a MaintenancePlannerGroupCode 109052, a ProcessingStatusCode 109056, an InstallationPointDescription 109060, an IndividualMaterialDescription 109064, a MaterialDescription 109068 and a Description 109072.

The ID 109016 attribute can be a MaintenanceTaskListID 109018 data type. The MaintenanceTaskListID can be an identifier for a maintenance task list in a MaintenanceTaskList Group. The GroupID 109020 attribute can be a BusinessTransactionDocumentGroupID 109022 data type. The BusinessTransactionDocumentGroupID can be an identifier for a TaskListGroup. The MaintenancePlanningPlantID 109024 attribute can be a PlantID 109026 data type. The MaintenancePlanningPlantID can be an identifier of a plant in which planning and supervision of the execution of maintenance work is done. The MaintenanceWorkCentreID 109028 attribute can be a WorkCentreID 109030 data type.

The MaintenanceWorkCentreID can be an identifier of a work centre where the execution of maintenance work is done. The MaintenanceWorkCentrePlantID 109032 attribute can be a PlantID 109034 data type. The MaintenanceWork-CentrePlantID can be an identifier of a plant where a work centre which is responsible for the execution of maintenance work is present. The MaterialInternalID 109036 attribute can be a ProductInternalID 109038 data type. The MaterialInternalID can be a proprietary identifier for a material. The InstallationPointID 109040 attribute can be an InstallationPointID 109042 data type. The InstallationPointID can be a unique identifier for an installation point. The IndividualMaterialID 109044 attribute can be a ProductInternalID 109046 data type. The IndividualMaterialID can be a proprietary identifier for an individual material. The TypeCode 109048 attribute can be a BusinessObjectTypeCode 109050 data type. The BusinessObjectTypeCode can be a coded representation of the type of a maintenance task list. The MaintenancePlannerGroupCode 109052 attribute can be a MaintenancePlannerGroupCode 109054 data type.

The MaintenancePlannerGroupCode can be a coded representation of a MaintenancePlannerGroup. The Processing-StatusCode 109056 attribute can be a MaintenanceTaskListLifeCycleStatusCode 109058 data type. The MaintenanceTaskListLifeCycleStatusCode can be used to indicate the processing status of a task list. The Installation-PointDescription 109060 attribute can be a SHORT_Description 109062 data type. The InstallationPointDescription can be a representation of properties of an InstallationPoint in natural language. The IndividualMaterialDescription 109064 attribute can be a SHORT_Description 109066 data type. The IndividualMaterialDescription can be a representation of properties of a IndividualMaterial in natural language. The MaterialDescription 109068 attribute can be a SHORT_Description 109070 data type. The MaterialDescription can be a representation of properties of a material in natural language. The Description 109072 attribute can be a SHORT_Description 109074 data type. The Description can be a representation of properties of a maintenance task list in natural language.

The Operation 109076 package includes an Operation 109078 entity. The Operation 109076 package includes various packages, namely an OperationRelationship 109112 and a MaterialInput 109140. The Operation 109078 entity includes various attributes, namely an ID 109080, an ActivityID 109084, a MaintenanceWorkCentreID 109088, a MaintenanceWorkCentrePlantID 109092, a ControlProfileCode 109096, a PlannedDurationQuantity 109100, a Planned-WorkQuantity 109104 and a Description 109108. The ID 109080 attribute can be an OperationID 109082 data type. The OperationID can be a unique identifier of an operation within a MaintenanceTaskList. The ActivityID 109084 attribute can be an OperationActivityID 109086 data type.

The ActivityID can be a unique identifier of an activity in an operation. The MaintenanceWorkCentreID 109088 attribute can be a WorkCentreID 109090 data type. The MaintenanceWorkCentreID can be an identifier of a work centre where the execution of maintenance work is done.

The MaintenanceWorkCentrePlantID 109092 attribute can be a PlantID 109094 data type. The MaintenanceWorkCentrePlantID can be an identifier of a plant where a work centre which is responsible for the execution of maintenance work is present. The ControlProfileCode 109096 attribute can be an OperationControlProfileCode 109098 data type. The OperationControlProfileCode can be a coded representation of a ControlProfile of an operation, which can combine controlling elements of business transactions in an operation. The PlannedDurationQuantity 109100 attribute can be a Quantity 109102 data type. The PlannedDurationQuantity can be a non-monetary numerical specification of an amount in a unit of measurement. The PlannedWorkQuantity 109104 attribute can be a Quantity 109106 data type. The PlannedWorkQuantity can be a non-monetary numerical specification of an amount in a unit of measurement. The Description 109108 attribute can be a SHORT_Description 109110 data type. The Description can be a representation of properties of a maintenance task list in natural language.

The OperationRelationship 109112 package includes a Relationship 109114 entity. The Relationship 109114 entity includes various attributes, namely an OperationID 109116, a MaintenanceWorkCentreID 109120, a MaintenanceWorkCentrePlantID 109124, a NetworkPlanElementSuccessionTypeCode 109128, a LagDuration 109132 and a @actionCode 109136. The OperationID 109116 attribute can be an OperationID 109118 data type. The OperationID can be a unique identifier of an operation. The MaintenanceWorkCentreID 109120 attribute can be a WorkCentreID 109122 data type. The MaintenanceWorkCentreID can be an identifier of a work centre where the execution of maintenance work is done. The MaintenanceWorkCentrePlantID 109124 attribute can be a PlantID 109126 data type.

The MaintenanceWorkCentrePlantID can be an identifier of a plant where a work centre which is responsible for the execution of maintenance work is present. The NetworkPlanElementSuccessionTypeCode 109128 attribute can be a NetworkPlanElementSuccessionTypeCode 109130 data type. The MaintenanceTaskListOperationSuccessionTypeCode can be a coded representation of the type of a directed relationship between two successive operations in a maintenance task list. The LagDuration 109132 attribute can be a LagDuration 109134 data type. LagDuration can be a time span between a preceding and succeeding operation, which are linked by a relationship. The @actionCode 109136 attribute can be an ActionCode 109138 data type. The ActionCode can be a coded representation of an instruction to the recipient of a message describing how to process a transmitted element.

The MaterialInput 109140 package includes a MaterialInput 109142 entity. The MaterialInput 109142 entity includes various attributes, namely a MaterialInternalID 109144, a RequiredQuantity 109148 and a Description 109152. The MaterialInternalID 109144 attribute can be a ProductInternalID 109146 data type. The MaterialInternalID can be a proprietary identifier for a material. The RequiredQuantity 109148 attribute can be a Quantity 109150 data type. The Quantity can be a non-monetary numerical specification of an amount in a unit of measurement. The Description 109152 attribute can be a SHORT_Description 109154 data type. The Description can be a representation of properties of a maintenance task list in natural language.

The ProcessingConditions 109156 package includes a ProcessingConditions 109158 entity. The ProcessingConditions 109158 entity includes various attributes, namely a QueryHitsMaximumNumberValue 109160, an UnlimitedQueryHitsIndicator 109164, a ReturnedQueryHitsNumberValue 109168, a MoreElementsAvailableIndicator 109172 and a LastProvidedMaintenanceTaskListID 109176. The QueryHitsMaximumNumberValue 109160 attribute can be a NumberValue 109162 data type. The NumberValue can be a number used for cardinal numbers. The UnlimitedQueryHitsIndicator 109164 attribute can be an Indicator 109166 data type. The Indicator can be a representation of a situation that has exactly two mutually exclusive Boolean values.

The ReturnedQueryHitsNumberValue 109168 attribute can be a NumberValue 109170 data type. The NumberValue can be a number used for cardinal numbers. The MoreElementsAvailableIndicator 109172 attribute can be a MoreElementsAvailableIndicator 109174 data type. An Indicator can be a representation of a situation that has exactly two mutually exclusive Boolean values. The LastProvidedMaintenanceTaskListID 109176 attribute can be a MaintenanceTaskListID 109178 data type. The MaintenanceTaskListID can be an identifier for a maintenance task list in a MaintenanceTaskList Group.

The Log 109180 package can be a Log 109184 data type. The Log 109180 package includes a Log 109182 entity. The Log can be a sequence of messages that result when an application executes a task.

FIGS. 110-1 through 110-2 show an example configuration of an Element Structure that includes a MaintTskListERPSimplElmntsQryMsg_110000 package. The MaintTskListERPSimplElmntsQryMsg_110000 package includes a MaintTskListERPSimplElmntsQryMsg_110002 entity. The MaintTskListERPSimplElmntsQryMsg_110000 package includes various packages, namely a Selection 110004, and a ProcessingConditions 110034.

The Selection 110004 package includes a MaintenanceTaskListSimpleSelectionByElements 110006 entity. The MaintenanceTaskListSimpleSelectionByElements 110006 entity has a cardinality of 1 110008 meaning that for each instance of the Selection 110004 package there is one MaintenanceTaskListSimpleSelectionByElements 110006 entity. The MaintenanceTaskListSimpleSelectionByElements 110006 entity includes various attributes, namely a ProcessingStatusCode 110010, a MaintenanceTaskListID 110014, an InstallationPointID 110018, an IndividualMaterialID 110022, a MaintenanceTaskListGroupID 110026 and a MaintenanceTaskListTypeCode 110030.

The ProcessingStatusCode 110010 attribute has a cardinality of 0 . . . 1 110012 meaning that for each instance of the MaintenanceTaskListSimpleSelectionByElements 110006 entity there may be one ProcessingStatusCode 110010 attribute. The MaintenanceTaskListID 110014 attribute has a cardinality of 0 . . . 1 110016 meaning that for each instance of the MaintenanceTaskListSimpleSelectionByElements 110006 entity there may be one MaintenanceTaskListID 110014 attribute. The InstallationPointID 110018 attribute has a cardinality of 0 . . . 1 110020 meaning that for each instance of the MaintenanceTaskListSimpleSelectionByElements 110006 entity there may be one InstallationPointID 110018 attribute. The IndividualMaterialID 110022 attribute has a cardinality of 0 . . . 1 110024 meaning that for each instance of the MaintenanceTaskListSimpleSelectionByElements 110006 entity there may be one IndividualMaterialID 110022 attribute.

The MaintenanceTaskListGroupID 110026 attribute has a cardinality of 0 . . . 1 110028 meaning that for each instance of the MaintenanceTaskListSimpleSelectionByElements 110006 entity there may be one MaintenanceTaskListGroupID 110026 attribute. The MaintenanceTaskListTypeCode 110030 attribute has a cardinality of 0 . . . 1 110032 meaning that for each instance of the MaintenanceTaskListSimpleSelectionByElements 110006 entity there may be one MaintenanceTaskListTypeCode 110030 attribute.

The ProcessingConditions 110034 package includes a ProcessingConditions 110036 entity. The ProcessingConditions 110036 entity has a cardinality of 0 . . . 1 110038 meaning that for each instance of the ProcessingConditions 110034 package there may be one ProcessingConditions 110036 entity. The ProcessingConditions 110036 entity includes various attributes, namely a QueryHitsMaximumNumberValue 110040, an UnlimitedQueryHitsIndicator 110044 and a LastProvidedMaintenanceTaskListID 110048.

The QueryHitsMaximumNumberValue 110040 attribute has a cardinality of 0 . . . 1 110042 meaning that for each instance of the ProcessingConditions 110036 entity there may be one QueryHitsMaximumNumberValue 110040 attribute. The UnlimitedQueryHitsIndicator 110044 attribute has a cardinality of 0 . . . 1 110046 meaning that for each instance of the ProcessingConditions 110036 entity there may be one UnlimitedQueryHitsIndicator 110044 attribute. The LastProvidedMaintenanceTaskListID 110048 attribute has a cardinality of 0 . . . 1 110050 meaning that for each instance of the ProcessingConditions 110036 entity there may be one LastProvidedMaintenanceTaskListID 110048 attribute. The data types of the various packages, entities, and attributes are described with respect to FIG. 109.

FIGS. 111-1 through 111-2 show an example configuration of an Element Structure that includes a MaintTskListERPSimplElmntsRspMsg_111000 package. The MaintTskListERPSimplElmntsRspMsg_111000 package includes a MaintTskListERPSimplElmntsRspMsg_111002 entity. The MaintTskListERPSimplElmntsRspMsg_111000 package includes various packages, namely a MaintenanceTaskList 111004, a ProcessingConditions 111026 and a Log 111044.

The MaintenanceTaskList 111004 package includes a MaintenanceTaskList 111006 entity. The MaintenanceTaskList 111006 entity has a cardinality of 0 . . . n 111008 meaning that for each instance of the MaintenanceTaskList 111004 package there may be one or more MaintenanceTaskList 111006 entities. The MaintenanceTaskList 111006 entity includes various attributes, namely an ID 111010, a GroupID 111014, a TypeCode 111018 and a Description 111022. The ID 111010 attribute has a cardinality of 1 11012 meaning that for each instance of the MaintenanceTaskList 111006 entity there is one ID 111010 attribute. The GroupID 111014 attribute has a cardinality of 1 11016 meaning that for each instance of the MaintenanceTaskList 111006 entity there is one GroupID 111014 attribute. The TypeCode 111018 attribute has a cardinality of 1 11020 meaning that for each instance of the MaintenanceTaskList 111006 entity there is one TypeCode 111018 attribute. The Description 111022 attribute has a cardinality of 0 . . . 1 111024 meaning that for each instance of the MaintenanceTaskList 111006 entity there may be one Description 111022 attribute.

The ProcessingConditions 111026 package includes a ProcessingConditions 111028 entity. The ProcessingConditions 111028 entity has a cardinality of 1 11030 meaning that for each instance of the ProcessingConditions 111026 package there is one ProcessingConditions 111028 entity. The ProcessingConditions 111028 entity includes various attributes, namely a ReturnedQueryHitsNumberValue 111032, a MoreElementsAvailableIndicator 111036 and a LastProvidedMaintenanceTaskListID 111040. The ReturnedQueryHitsNumberValue 111032 attribute has a cardinality of 1 111034 meaning that for each instance of the ProcessingConditions 111028 entity there is one ReturnedQueryHitsNumberValue 111032 attribute. The MoreElementsAvailableIndicator 111036 attribute has a cardinality of 1 11038 meaning that for each instance of the ProcessingConditions 111028 entity there is one MoreElementsAvailableIndicator 111036 attribute. The LastProvidedMaintenanceTaskListID 111040 attribute has a cardinality of 0 . . . 1 111042 meaning that for each instance of the ProcessingConditions 111028 entity there may be one LastProvidedMaintenanceTaskListID 111040 attribute.

The Log 111044 package includes a Log 111046 entity. The Log 111046 entity has a cardinality of 1 11048 meaning that for each instance of the Log 111044 package there is one Log 111046 entity. The data types of the various packages, entities, and attributes are described with respect to FIG. 109.

FIG. 112 shows an example configuration of an Element Structure that includes a ParMaintTskListERPSimplByMaintTskListQryMsg_112000 package. The ParMaintTskListERPSimplByMaintTskListQryMsg_112000 package includes a ParMaintTskListERPSimplByMaintTskListQryMsg_112002 entity. The ParMaintTskListERPSimplByMaintTskListQryMsg_112000 package includes various packages, namely a Selection 112004.

The Selection 112004 package includes a ParMaintenanceTaskListSimpleSelectionByMaintenanceTaskList 112006 entity. The ParMaintenanceTaskListSimpleSelectionByMaintenanceTaskList 112006 entity has a cardinality of 1 12008 meaning that for each instance of the Selection 112004 package there is one ParMaintenanceTaskListSimpleSelectionByMaintenanceTaskList 112006 entity. The ParMaintenanceTaskListSimpleSelectionByMaintenanceTaskList 112006 entity includes various attributes, namely a MaintenanceTaskListID 112010, a MaintenanceTaskListGroupID 112014, a MaintenanceTaskListTypeCode 112018 and a LevelNumberValue 112022. The MaintenanceTaskListID 112010 attribute has a cardinality of 1112012 meaning that for each instance of the ParMaintenanceTaskListSimpleSelectionByMaintenanceTaskList 112006 entity there is one MaintenanceTaskListID 112010 attribute.

The MaintenanceTaskListGroupID 112014 attribute has a cardinality of 1 12016 meaning that for each instance of the ParMaintenanceTaskListSimpleSelectionByMaintenanceTaskList 112006 entity there is one MaintenanceTaskListGroupID 112014 attribute. The MaintenanceTaskListTypeCode 112018 attribute has a cardinality of 1 12020 meaning that for each instance of the ParMaintenanceTaskListSimpleSelectionByMaintenanceTaskList 112006 entity there is one MaintenanceTaskListTypeCode 112018 attribute. The LevelNumberValue 112022 attribute has a cardinality of 1 12024 meaning that for each instance of the ParMaintenanceTaskListSimpleSelectionByMaintenanceTaskList 112006 entity there is one LevelNumberValue 112022 attribute. The data types of the various packages, entities, and attributes are described with respect to FIG. 109.

FIGS. 113-1 through 113-2 show an example configuration of an Element Structure that includes a ParMaintTskListERPSimplByMaintTskListRspMsg_113000 package. The ParMaintTskListERPSimplBy- MaintTskListRspMsg_113000 package includes a ParMaintTskListERPSimplByMaintTskListRspMsg_113002 entity. The ParMaintTskListERPSimplByMaintTskListRspMsg_113000 package includes various packages, namely a MaintenanceTaskList 113004, and a Log 113030.

The MaintenanceTaskList 113004 package includes a MaintenanceTaskList 113006 entity. The MaintenanceTaskList 113006 entity has a cardinality of 0 . . . n 113008 meaning that for each instance of the MaintenanceTaskList 113004 package there may be one or more MaintenanceTaskList 113006 entities. The MaintenanceTaskList 113006 entity includes various attributes, namely an ID 113010, a GroupID 113014, a TypeCode 113018, a LevelNumberValue 113022 and a Description 113026. The ID 113010 attribute has a cardinality of 1 13012 meaning that for each instance of the MaintenanceTaskList 113006 entity there is one ID 113010 attribute.

The GroupID 113014 attribute has a cardinality of 1 13016 meaning that for each instance of the MaintenanceTaskList 113006 entity there is one GroupID 113014 attribute. The TypeCode 113018 attribute has a cardinality of 1 13020 meaning that for each instance of the MaintenanceTaskList 113006 entity there is one TypeCode 113018 attribute. The LevelNumberValue 113022 attribute has a cardinality of 1 13024 meaning that for each instance of the MaintenanceTaskList 113006 entity there is one LevelNumberValue 113022 attribute. The Description 113026 attribute has a cardinality of 0 . . . 1 113028 meaning that for each instance of the MaintenanceTaskList 113006 entity there may be one Description 113026 attribute.

The Log 113030 package includes a Log 113032 entity. The Log 113032 entity has a cardinality of 1 13034 meaning that for each instance of the Log 113030 package there is one Log 113032 entity. The data types of the various packages, entities, and attributes are described with respect to FIG. 109.

FIG. 114 shows an example configuration of an Element Structure that includes a SubordMaintTskListERPSimplByMaintTskListQryMsg_114000 package. The SubordMaintTskListERPSimplByMaintTskListQryMsg_114000 package includes a SubordMaintTskListERPSimplByMaintTskListQryMsg_114002 entity. The SubordMaintTskListERPSimplByMaintTskListQryMsg_114000 package includes various packages, namely a Selection 114004.

The Selection 114004 package includes a SubordinateMaintenanceTaskListSimpleSelectionByMaintenanceTaskList 114006 entity. The SubordinateMaintenanceTaskListSimpleSelectionByMaintenanceTaskList 114006 entity has a cardinality of 1 14008 meaning that for each instance of the Selection 114004 package there is one SubordinateMaintenanceTaskListSimpleSelectionByMaintenanceTaskList 114006 entity. The SubordinateMaintenanceTaskListSimpleSelectionByMaintenanceTaskList 114006 entity includes various attributes, namely a MaintenanceTaskListID 114010, a MaintenanceTaskListGroupID 114014, a MaintenanceTaskListTypeCode 114018 and a LevelNumberValue 114022. The MaintenanceTaskListID 114010 attribute has a cardinality of 1114012 meaning that for each instance of the SubordinateMaintenanceTaskListSimpleSelectionByMaintenanceTaskList 114006 entity there is one MaintenanceTaskListID 114010 attribute.

The MaintenanceTaskListGroupID 114014 attribute has a cardinality of 1 14016 meaning that for each instance of the SubordinateMaintenanceTaskListSimpleSelectionByMaintenanceTaskList 114006 entity there is one MaintenanceTaskListGroupID 114014 attribute. The MaintenanceTaskListTypeCode 114018 attribute has a cardinality of 1 14020 meaning that for each instance of the SubordinateMaintenanceTaskListSimpleSelectionByMaintenanceTaskList 114006 entity there is one MaintenanceTaskListTypeCode 114018 attribute. The LevelNumberValue 114022 attribute has a cardinality of 1 14024 meaning that for each instance of the SubordinateMaintenanceTaskListSimpleSelectionByMaintenanceTaskList 114006 entity there is one LevelNumberValue 114022 attribute. The data types of the various packages, entities, and attributes are described with respect to FIG. 109.

FIGS. 115-1 through 115-2 show an example configuration of an Element Structure that includes a SubordMaintTskListERPSimplByMaintTskListRspMsg_115000 package. The SubordMaintTskListERPSimplByMaintTskListRspMsg_115000 package includes a SubordMaintTskListERPSimplByMaintTskListRspMsg_115002 entity. The SubordMaintTskListERPSimplByMaintTskListRspMsg_115000 package includes various packages, namely a MaintenanceTaskList 115004, and a Log 115030.

The MaintenanceTaskList 115004 package includes a MaintenanceTaskList 115006 entity. The MaintenanceTaskList 115006 entity has a cardinality of 0 . . . N 115008 meaning that for each instance of the MaintenanceTaskList 115004 package there may be one or more MaintenanceTaskList 115006 entities. The MaintenanceTaskList 115006 entity includes various attributes, namely an ID 115010, a GroupID 115014, a TypeCode 115018, a LevelNumberValue 115022 and a Description 115026. The ID 115010 attribute has a cardinality of 1 15012 meaning that for each instance of the MaintenanceTaskList 115006 entity there is one ID 115010 attribute.

The GroupID 115014 attribute has a cardinality of 1 15016 meaning that for each instance of the MaintenanceTaskList 115006 entity there is one GroupID 115014 attribute. The TypeCode 115018 attribute has a cardinality of 1 15020 meaning that for each instance of the MaintenanceTaskList 115006 entity there is one TypeCode 115018 attribute. The LevelNumberValue 115022 attribute has a cardinality of 1 15024 meaning that for each instance of the MaintenanceTaskList 115006 entity there is one LevelNumberValue 115022 attribute. The Description 115026 attribute has a cardinality of 0 . . . 1 115028 meaning that for each instance of the MaintenanceTaskList 115006 entity there may be one Description 115026 attribute.

The Log 115030 package includes a Log 115032 entity. The Log 115032 entity has a cardinality of 1 15034 meaning that for each instance of the Log 115030 package there is one Log 115032 entity. The data types of the various packages, entities, and attributes are described with respect to FIG. 109.

FIG. 116 shows an example configuration of an Element Structure that includes a TopLvlMaintTskListERPSimplByMaintTskListQryMsg_116000 package. The TopLvlMaintTskListERPSimplByMaintTskListQryMsg_116000 package includes a TopLvlMaintTskListERPSimplByMaintTskListQryMsg_116002 entity. The TopLvlMaintTskListERPSimplByMaintTskListQryMsg_116000 package includes various packages, namely a Selection 116004.

The Selection 116004 package includes a TopLevelMaintenanceTaskListSimpleSelectionByMaintenanceTaskList 116006 entity. The TopLevelMaintenanceTaskListSimpleSelectionByMaintenanceTaskList 116006 entity has a cardinality of 1 16008 meaning that for each instance of the Selection 116004 package there is one TopLevelMaintenanceTaskListSimpleSelectionByMaintenanceTaskList 116006 entity. The TopLevelMaintenanceTaskListSimpleSelectionByMaintenanceTaskList 116006 entity includes various attributes, namely a MaintenanceTaskListID 116010, a MaintenanceTaskListGroupID 116014 and a MaintenanceTaskListTypeCode 116018. The MaintenanceTaskListID 116010 attribute has a cardinality of 1 16012 meaning that for each instance of the TopLevelMaintenanceTaskListSimpleSelectionByMaintenanceTaskList 116006 entity there is one MaintenanceTaskListID 116010 attribute.

The MaintenanceTaskListGroupID 116014 attribute has a cardinality of 1 16016 meaning that for each instance of the TopLevelMaintenanceTaskListSimpleSelectionByMaintenanceTaskList 116006 entity there is one MaintenanceTaskListGroupID 116014 attribute. The MaintenanceTaskListTypeCode 116018 attribute has a cardinality of 1 16020 meaning that for each instance of the TopLevelMaintenanceTaskListSimpleSelectionByMaintenanceTaskList 116006 entity there is one MaintenanceTaskListTypeCode 116018 attribute. The data types of the various packages, entities, and attributes are described with respect to FIG. 109.

FIG. 117 shows an example configuration of an Element Structure that includes a TopLvlMaintTskListERPSimplByMaintTskListRspMsg_117000 package. The TopLvlMaintTskListERPSimplByMaintTskListRspMsg_117000 package includes a TopLvlMainTskListERPSimplByMaintTskListRspMsg_117002 entity. The TopLvlMaintTskListERPSimplByMaintTskListRspMsg_117000 package includes various packages, namely a MaintenanceTaskList 117004, and a Log 117026.

The MaintenanceTaskList 117004 package includes a MaintenanceTaskList 117006 entity. The MaintenanceTaskList 117006 entity has a cardinality of 0 . . . 1 1117008 meaning that for each instance of the MaintenanceTaskList 117004 package there may be one MaintenanceTaskList 117006 entity. The MaintenanceTaskList 117006 entity includes various attributes, namely an ID 117010, a GroupID 117014, a TypeCode 117018 and a Description 117022.

The ID 117010 attribute has a cardinality of 1 17012 meaning that for each instance of the MaintenanceTaskList 117006 entity there is one ID 117010 attribute. The GroupID 117014 attribute has a cardinality of 1 17016 meaning that for each instance of the MaintenanceTaskList 117006 entity there is one GroupID 117014 attribute. The TypeCode 117018 attribute has a cardinality of 1 17020 meaning that for each instance of the MaintenanceTaskList 117006 entity there is one TypeCode 117018 attribute. The Description 117022 attribute has a cardinality of 0 . . . 1 117024 meaning that for each instance of the MaintenanceTaskList 117006 entity there may be one Description 117022 attribute.

The Log 117026 package includes a Log 117028 entity. The Log 117028 entity has a cardinality of 1 17030 meaning that for each instance of the Log 117026 package there is one Log 117028 entity. The data types of the various packages, entities, and attributes are described with respect to FIG. 109.

FIG. 118 shows an example configuration of an Element Structure that includes a MaintTskListERPByIDAndGrpIDAndTypeCodeQryMsg_118000 package. The MaintTskListERPByIDAndGrpIDAndTypeCodeQryMsg_118000 package includes a MaintTskListERPByIDAndGrpIDAndTypeCodeQryMsg_118002 entity. The MaintTskListERPByIDAndGrpIDAndTypeCodeQryMsg_118000 package includes various packages, namely a Selection 118004.

The Selection 118004 package includes a MaintenanceTaskListSelectionByIDAndGrpIDAndTypeCode 118006 entity. The MaintenanceTaskListSelectionByIDAndGrpIDAndTypeCode 118006 entity has a cardinality of 1118008 meaning that for each instance of the Selection 118004 package there is one MaintenanceTaskListSelectionByIDAndGrpIDAndTypeCode 118006 entity. The MaintenanceTaskListSelectionByIDAndGrpIDAndTypeCode 118006 entity includes various attributes, namely a MaintenanceTaskListID 118010, a MaintenanceTaskListGroupID 118014 and a MaintenanceTaskListTypeCode 118018.

The MaintenanceTaskListID 118010 attribute has a cardinality of 1 18012 meaning that for each instance of the MaintenanceTaskListSelectionByIDAndGrpIDAndTypeCode 118006 entity there is one MaintenanceTaskListID 118010 attribute. The MaintenanceTaskListGroupID 118014 attribute has a cardinality of 1 18016 meaning that for each instance of the MaintenanceTaskListSelectionByIDAndGrpIDAndTypeCode 118006 entity there is one MaintenanceTaskListGroupID 118014 attribute. The MaintenanceTaskListTypeCode 118018 attribute has a cardinality of 1 18020 meaning that for each instance of the MaintenanceTaskListSelectionByIDAndGrpIDAndTypeCode 118006 entity there is one MaintenanceTaskListTypeCode 118018 attribute. The data types of the various packages, entities, and attributes are described with respect to FIG. 109.

FIGS. 119-1 through 119-6 show an example configuration of an Element Structure that includes a MaintTskListERPByIDAndGrpIDAndTypeCodeRspMsg_119000 package. The MaintTskListERPByIDAndGrpIDAndTypeCodeRspMsg_119000 package includes a MaintTskListERPByIDAndGrpIDAndTypeCodeRspMsg_119002 entity. The MaintTskListERPByIDAndGrpIDAndTypeCodeRspMsg_119000 package includes various packages, namely a MaintenanceTaskList 119004 and a Log 119146.

The MaintenanceTaskList 119004 package includes a MaintenanceTaskList 119006 entity. The MaintenanceTaskList 119006 entity has a cardinality of 0 . . . 1 119008 meaning that for each instance of the MaintenanceTaskList 119004 package there may be one MaintenanceTaskList 119006 entity. The MaintenanceTaskList 119006 entity includes various attributes, namely an ID 119010, a GroupID 119014, a MaintenancePlanningPlantID 119018, a MaintenanceWorkCentreID 119022, a MaintenanceWorkCentrePlantID 119026, a MaterialInternalID 119030, an InstallationPointID 119034, an IndividualMaterialID 119038, a TypeCode 119042, a MaintenancePlannerGroupCode 119046, a ProcessingStatusCode 119050, an InstallationPointDescription 119054, an IndividualMaterialDescription 119058, a MaterialDescription 119062 and a Description 119066. The MaintenanceTaskList 119006 entity includes an Operation 119070 subordinate entity.

The ID 119010 attribute has a cardinality of 1 19012 meaning that for each instance of the MaintenanceTaskList 119006 entity there is one ID 119010 attribute. The GroupID 119014 attribute has a cardinality of 1 19016 meaning that for each instance of the MaintenanceTaskList 119006 entity there is one GroupID 119014 attribute. The MaintenancePlanningPlantID 119018 attribute has a cardinality of 1 119020 meaning that for each instance of the MaintenanceTaskList 119006 entity there is one MaintenancePlanningPlantID 119018 attribute. The MaintenanceWorkCentreID 119022 attribute has a cardinality 0 . . . 1 119024 meaning that for each instance of the MaintenanceTaskList 119006 entity there may be one MaintenanceWorkCentreID 119022 attribute. The MaintenanceWorkCentrePlantID 119026 attribute has a cardinality of 0 . . . 1 119028 meaning that for each instance of the MaintenanceTaskList 119006 entity there may be one MaintenanceWorkCentrePlantID 119026 attribute. The MaterialInternalID 119030 attribute has a cardinality of 0 . . . 1 119032 meaning that for each instance of the MaintenanceTaskList 119006 entity there may be one MaterialInternalID 119030 attribute.

The InstallationPointID 119034 attribute has a cardinality of 0 . . . 1 119036 meaning that for each instance of the MaintenanceTaskList 119006 entity there may be one InstallationPointID 119034 attribute. The IndividualMaterialID 119038 attribute has a cardinality of 0 . . . 1 119040 meaning that for each instance of the MaintenanceTaskList 119006 entity there may be one IndividualMaterialID 119038 attribute. The TypeCode 119042 attribute has a cardinality of 1 119044 meaning that for each instance of the MaintenanceTaskList 119006 entity there is one TypeCode 119042 attribute. The MaintenancePlannerGroupCode 119046 attribute has a cardinality of 0 . . . 1 119048 meaning that for each instance of the MaintenanceTaskList 119006 entity there may be one MaintenancePlannerGroupCode 119046 attribute. The ProcessingStatusCode 119050 attribute has a cardinality of 1 119052 meaning that for each instance of the MaintenanceTaskList 119006 entity there is one ProcessingStatusCode 119050 attribute. The InstallationPointDescription 119054 attribute has a cardinality of 0 . . . 1 119056 meaning that for each instance of the MaintenanceTaskList 119006 entity there may be one InstallationPointDescription 119054 attribute.

The IndividualMaterialDescription 119058 attribute has a cardinality of 0 . . . 1 119060 meaning that for each instance of the MaintenanceTaskList 119006 entity there may be one IndividualMaterialDescription 119058 attribute. The MaterialDescription 119062 attribute has a cardinality of 0 . . . 1 119064 meaning that for each instance of the MaintenanceTaskList 119006 entity there may be one MaterialDescription 119062 attribute. The Description 119066 attribute has a cardinality of 0 . . . 1 119068 meaning that for each instance of the MaintenanceTaskList 119006 entity there may be one Description 119066 attribute. The Operation 119070 entity has a cardinality of 0 . . . n 119072 meaning that for each instance of the MaintenanceTaskList 119006 entity there may be one or more Operation 119070 entities. The Operation 119070 entity includes various attributes, namely an ID 119074, an ActivityID 119078, a MaintenanceWorkCentreID 119082, a MaintenanceWorkCentrePlantID 119086, a ControlProfileCode 119090, a PlannedDurationQuantity 119094, a PlannedWorkQuantity 119098 and a Description 119102. The Operation 119070 entity includes various subordinate entities, namely a Relationship 119106 and a MaterialInput 119130.

The ID 119074 attribute has a cardinality of 1 119076 meaning that for each instance of the Operation 119070 entity there is one ID 119074 attribute. The ActivityID 119078 attribute has a cardinality of 0 . . . 1 119080 meaning that for each instance of the Operation 119070 entity there may be one ActivityID 119078 attribute. The MaintenanceWorkCentreID 119082 attribute has a cardinality of 1 119084 meaning that for each instance of the Operation 119070 entity there is one MaintenanceWorkCentreID 119082 attribute. The MaintenanceWorkCentrePlantID 119086 attribute has a cardinality of 1 119088 meaning that for each instance of the Operation 119070 entity there is one MaintenanceWorkCentrePlantID 119086 attribute. The ControlProfileCode 119090 attribute has a cardinality of 1 119092 meaning that for each instance of the Operation 119070 entity there is one ControlProfileCode 119090 attribute. The PlannedDurationQuantity 119094 attribute has a cardinality of 0 . . . 1 119096 meaning that for each instance of the Operation 119070 entity there may be one PlannedDurationQuantity 119094 attribute. The PlannedWorkQuantity 119098 attribute has a cardinality of 0 . . . 1 119100 meaning that for each instance of the Operation 119070 entity there may be one PlannedWorkQuantity 119098 attribute. The Description 119102 attribute has a cardinality of 0 . . . 1 119104 meaning that for each instance of the Operation 119070 entity there may be one Description 119102 attribute.

The Relationship 119106 entity has a cardinality of 0 . . . n 119108 meaning that for each instance of the Operation 119070 entity there may be one or more Relationship 119106 entities. The Relationship 119106 entity includes various attributes, namely an OperationID 119110, a MaintenanceWorkCentreID 119114, a MaintenanceWorkCentrePlantID 119118, a NetworkPlanElementSuccessionTypeCode 119122 and a LagDuration 119126. The OperationID 119110 attribute has a cardinality of 1 119112 meaning that for each instance of the Relationship 119106 entity there is one OperationID 119110 attribute. The MaintenanceWorkCentreID 119114 attribute has a cardinality of 0 . . . 1 119116 meaning that for each instance of the Relationship 119106 entity there may be one MaintenanceWorkCentreID 119114 attribute. The MaintenanceWorkCentrePlantID 119118 attribute has a cardinality of 0 . . . 1 119120 meaning that for each instance of the Relationship 119106 entity there may be one MaintenanceWorkCentrePlantID 119118 attribute.

The NetworkPlanElementSuccessionTypeCode 119122 attribute has a cardinality of 0 . . . 1 119124 meaning that for each instance of the Relationship 119106 entity there may be one NetworkPlanElementSuccessionTypeCode 119122 attribute. The LagDuration 119126 attribute has a cardinality of 0 . . . 1 119128 meaning that for each instance of the Relationship 119106 entity there may be one LagDuration 119126 attribute. The MaterialInput 119130 entity has a cardinality of 0 . . . n 119132 meaning that for each instance of the Operation 119070 entity there may be one or more MaterialInput 119130 entities. The MaterialInput 119130 entity includes various attributes, namely a MaterialInternalID 119134, a RequiredQuantity 119138 and a MaterialDescription 119142.

The MaterialInternalID 119134 attribute has a cardinality of 1 119136 meaning that for each instance of the MaterialInput 119130 entity there is one MaterialInternalID 119134 attribute. The RequiredQuantity 119138 attribute has a cardinality of 1 119140 meaning that for each instance of the MaterialInput 119130 entity there is one RequiredQuantity 119138 attribute. The MaterialDescription 119142 attribute has a cardinality of 0 . . . 1 119144 meaning that for each instance of the MaterialInput 119130 entity there may be one MaterialDescription 119142 attribute.

The Log 119146 package includes a Log 119148 entity. The Log 119148 entity has a cardinality of 1 119150 meaning that for each instance of the Log 119146 package there is one Log 119148 entity. The data types of the various packages, entities, and attributes are described with respect to FIG. 109.

RequestForSupplierFreightQuote Interfaces

A RequestForSupplierFreightQuote can be part of a Transportation Management subcontracting and tendering process, where transportation services can be tendered between transportation service providers. The terms and conditions of a transportation service, as well as the bidding rules of the tendering process, can be specified in the RequestForSupplierFreightQuote. The response of a supplier of the transportation service to a customer is included in the SupplierFreightQuote. A customer, such as Transportation Supplier Quote Processing, can request a freight quote from a supplier, such as Transportation Customer Quote Processing, by using the interfaces supplied by RequestForSupplierFreightQuote.

A RequestForSupplierFreightQuoteRequest can be a request to a supplier to provide a SupplierFreightQuote. The structure of the RequestForSupplierFreightQuoteRequest can be specified by the message data type RequestForSupplierFreightQuoteRequestMessage.

A RequestForSupplierFreightQuoteCancelRequest can be a request to a supplier to cancel a RequestForSupplierFreightQuote. The structure of the RequestForSupplierFreightQuoteCancelRequest can be specified by the message data type RequestForSupplierFreightQuoteCancelRequestMessage.

The message interfaces on the customer side include RequestForSupplierFreightQuoteRequest_Out and RequestForSupplierFreightQuoteCancelRequest_Out. The message interfaces on the supplier side include RequestForSupplierFreightQuoteRequest_In and RequestForSupplierFreightQuoteCancelRequest_In.

Figure 120:
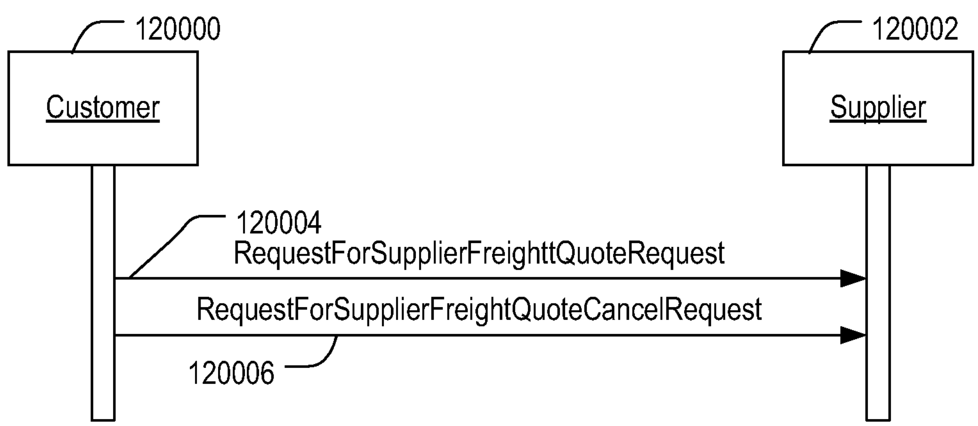

The message choreography of FIG. 120 describes a possible logical sequence of messages that can be used to realize a Transportation Management business scenario. A "Customer" system 120000 can request a freight quote from a "Supplier" system 120002, using a RequestForSupplierFreightQuoteRequest message 120004 as shown, for example in FIG. 120. The "Customer" system 120000 can request to cancel a freight quote request from the "Supplier" system 120002, using a RequestForSupplierFreightQuoteCancelRequest message 120006 as shown, for example in FIG. 120.

Figures 1, 121:
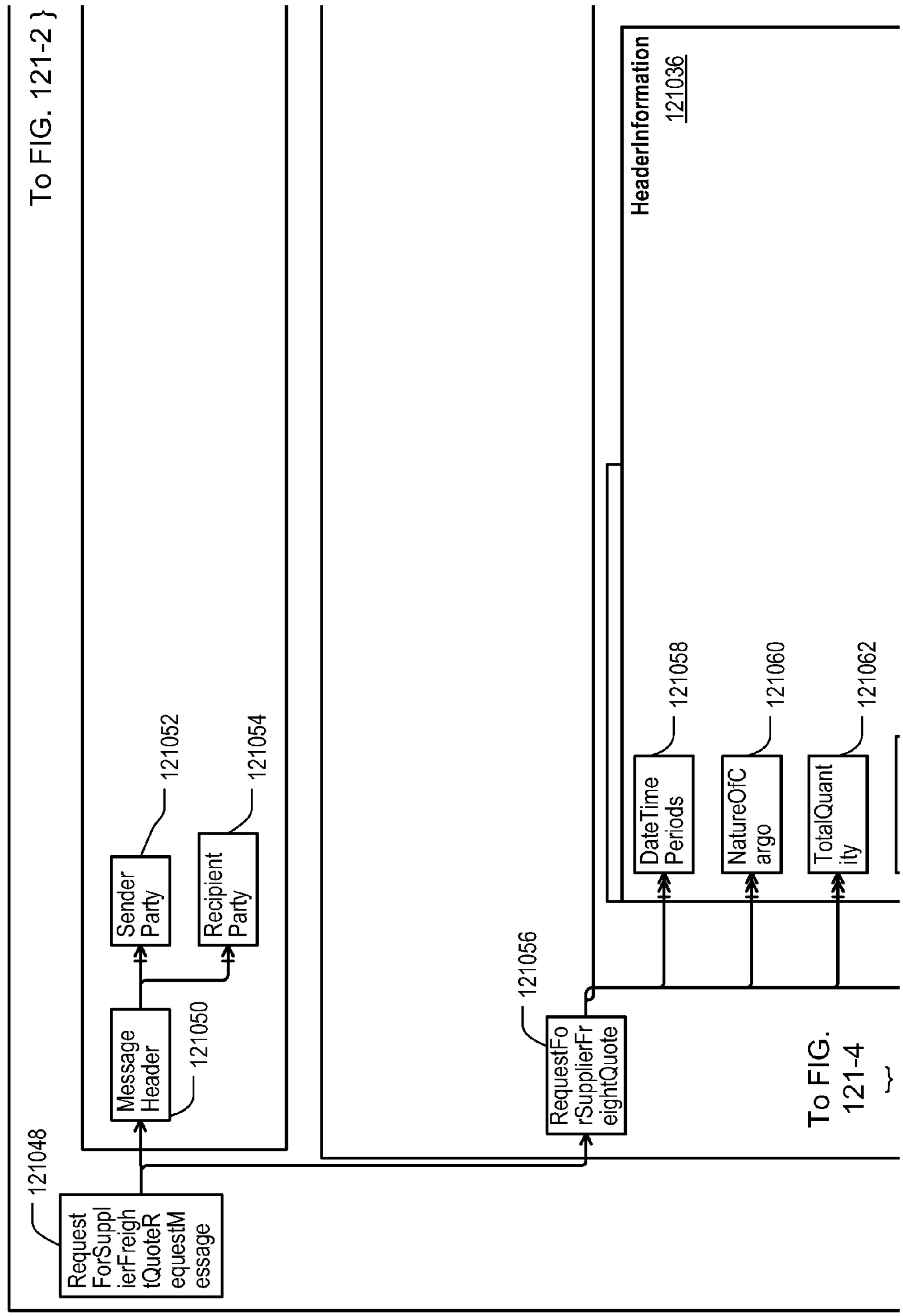
Figures 2, 121:
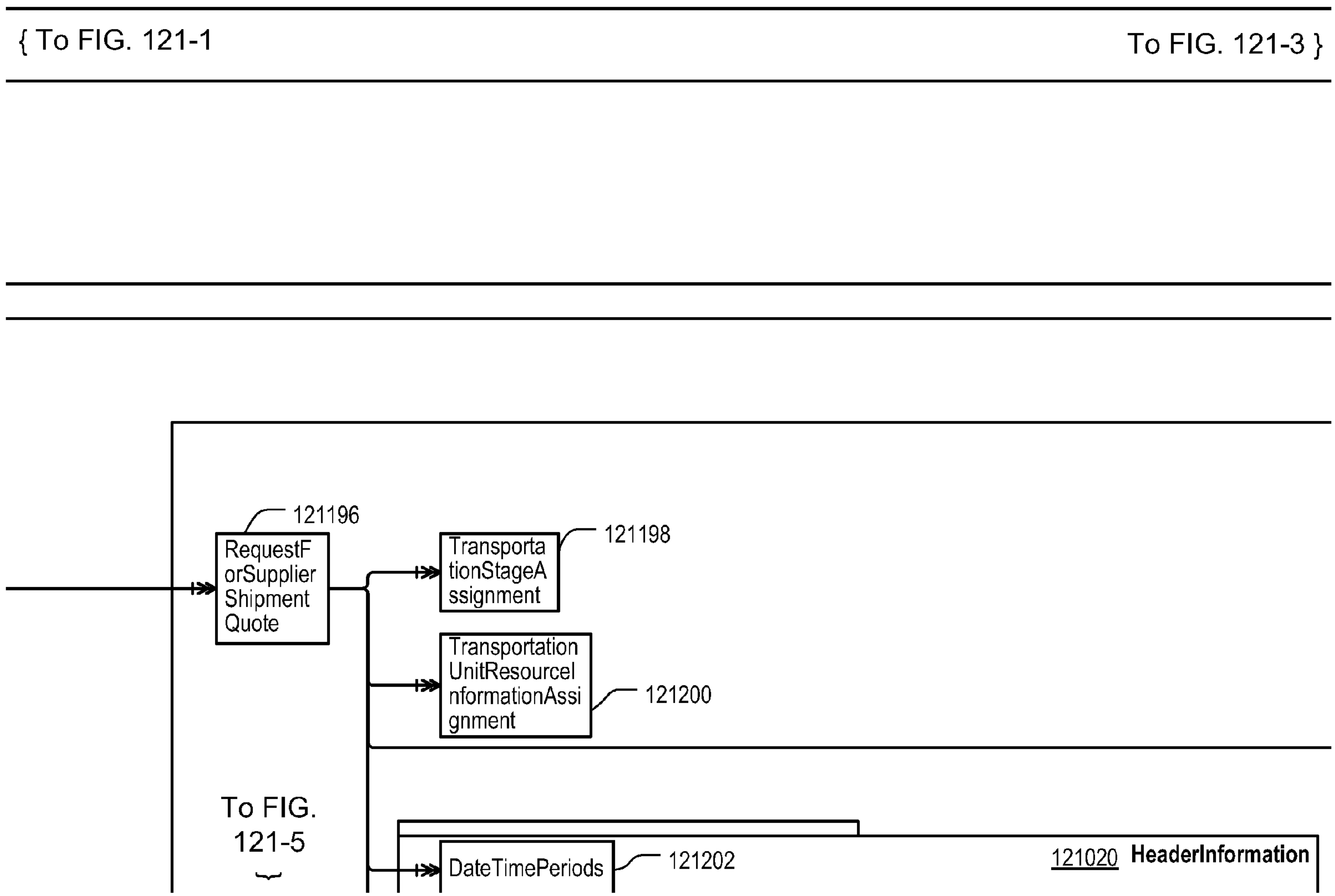
Figures 3, 121:
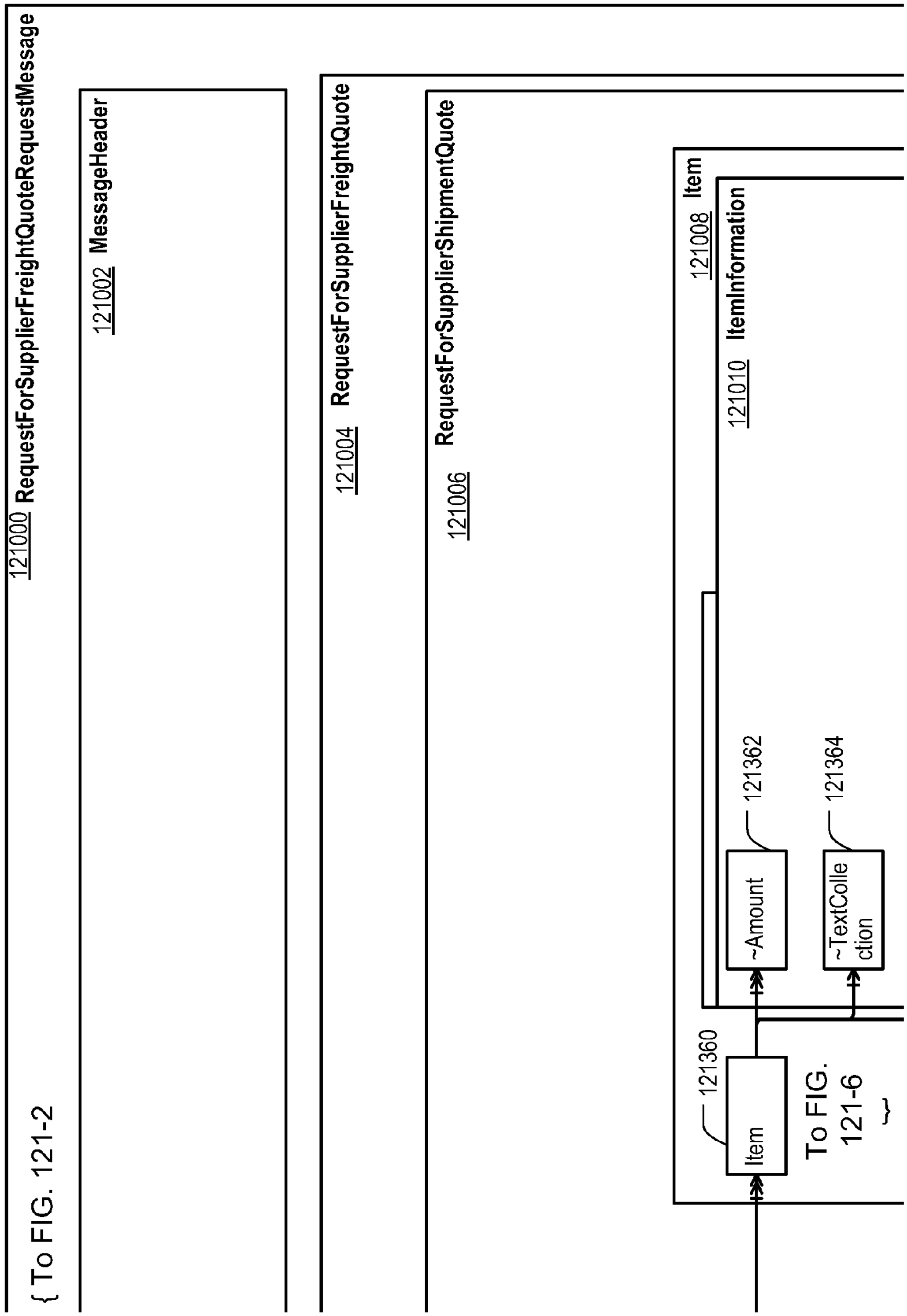
Figures 5, 121:
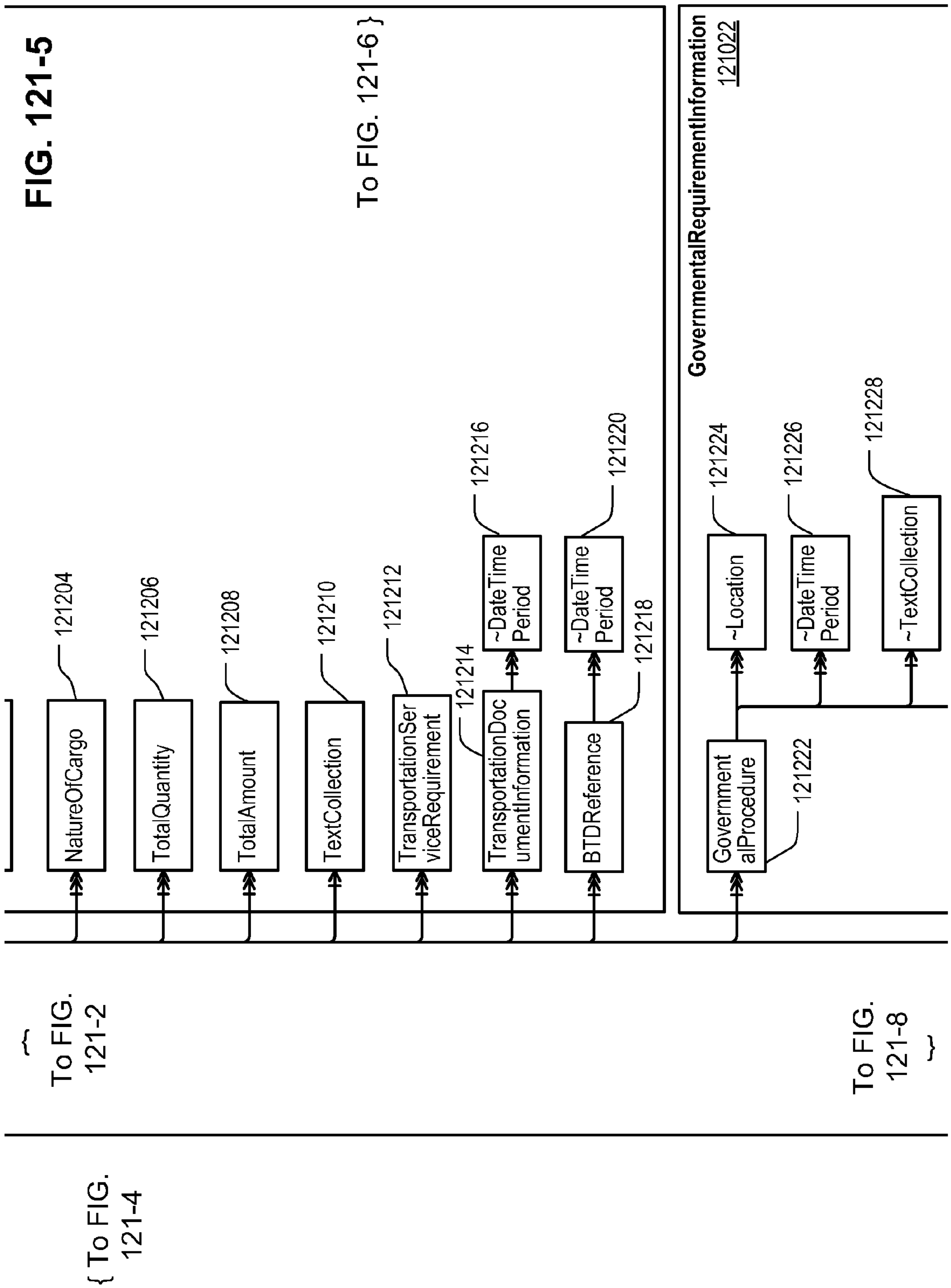
Figures 6, 121:
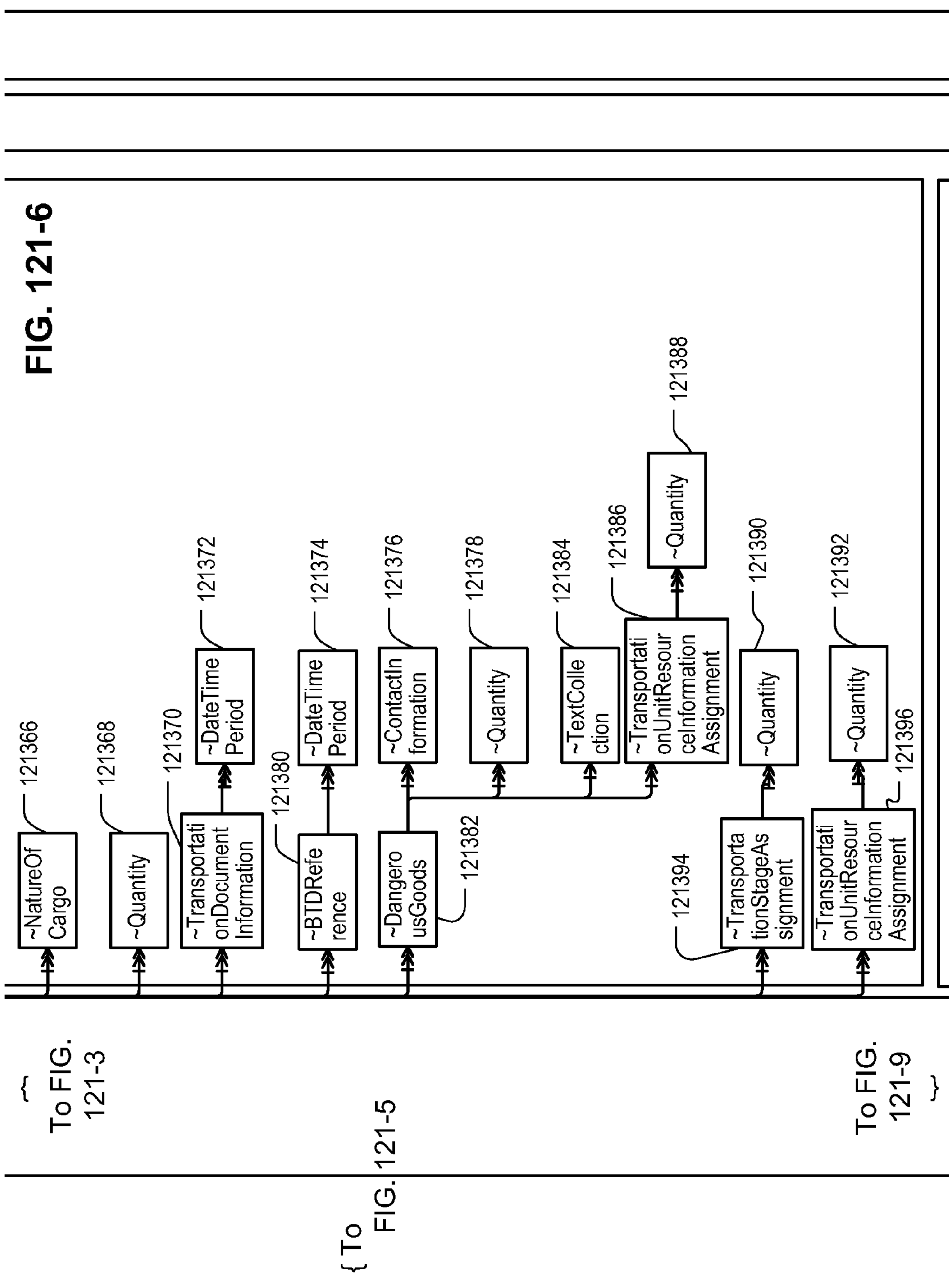
Figures 7, 121:
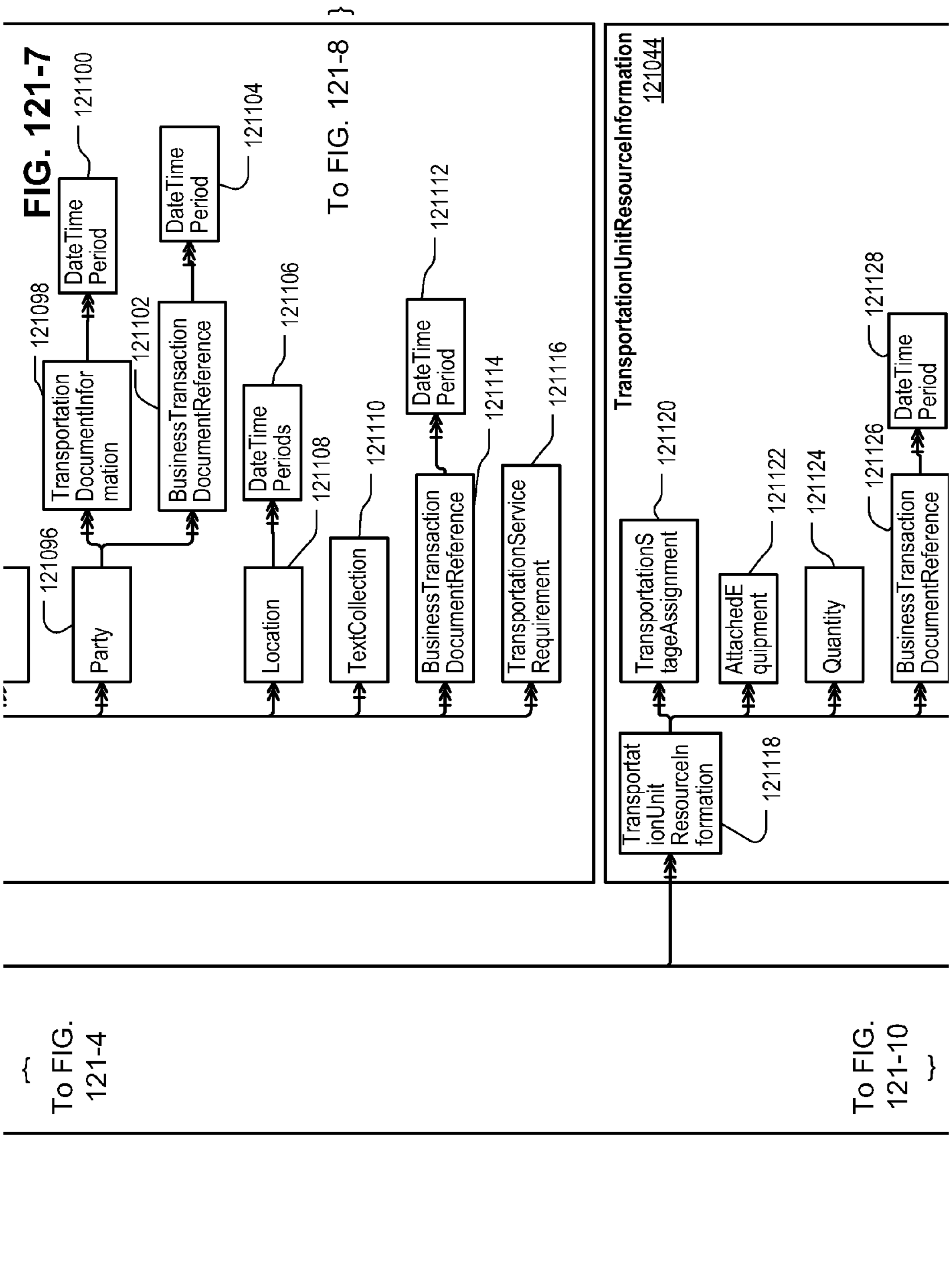
Figures 8, 121:
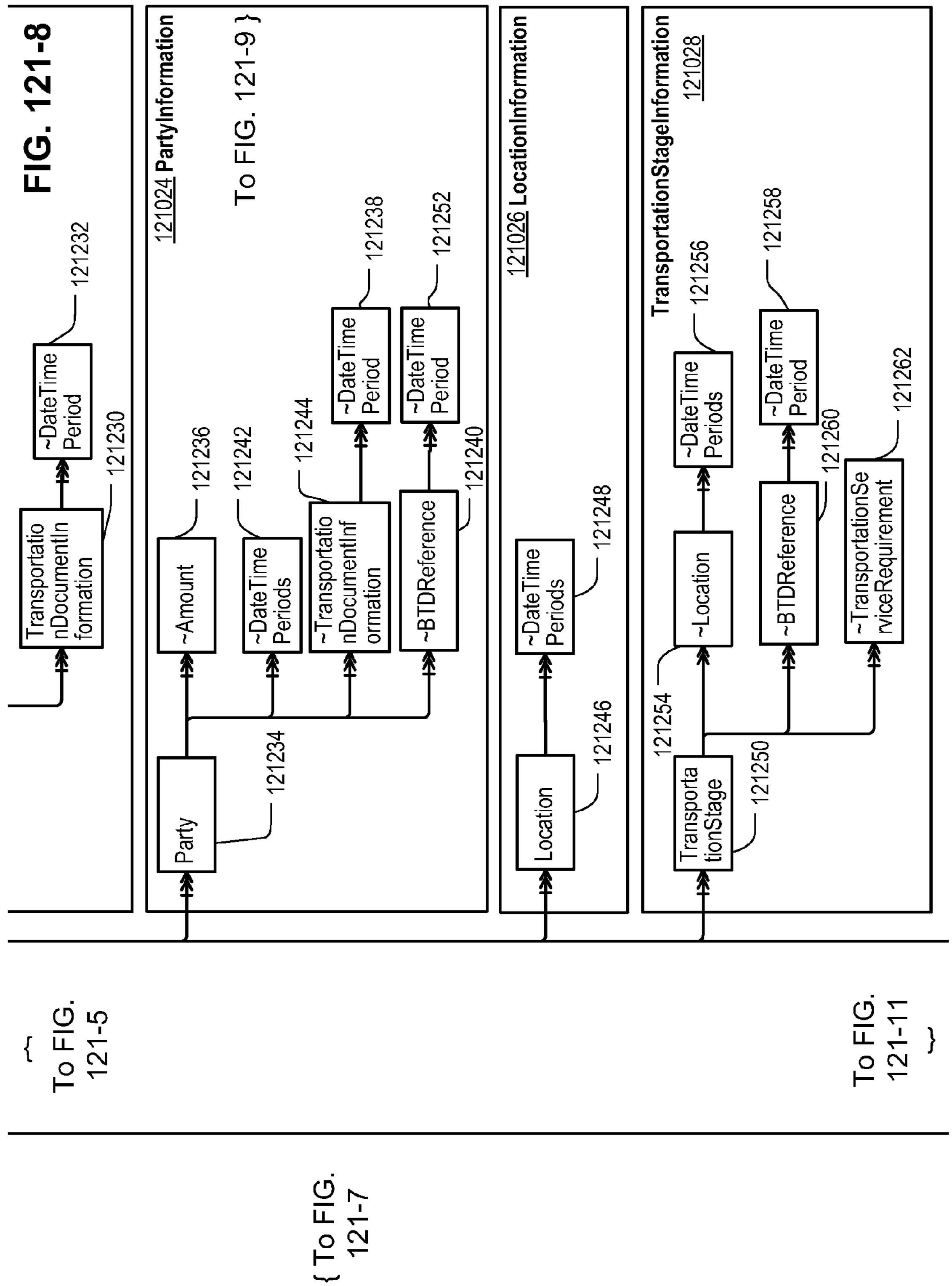
Figures 9, 121:
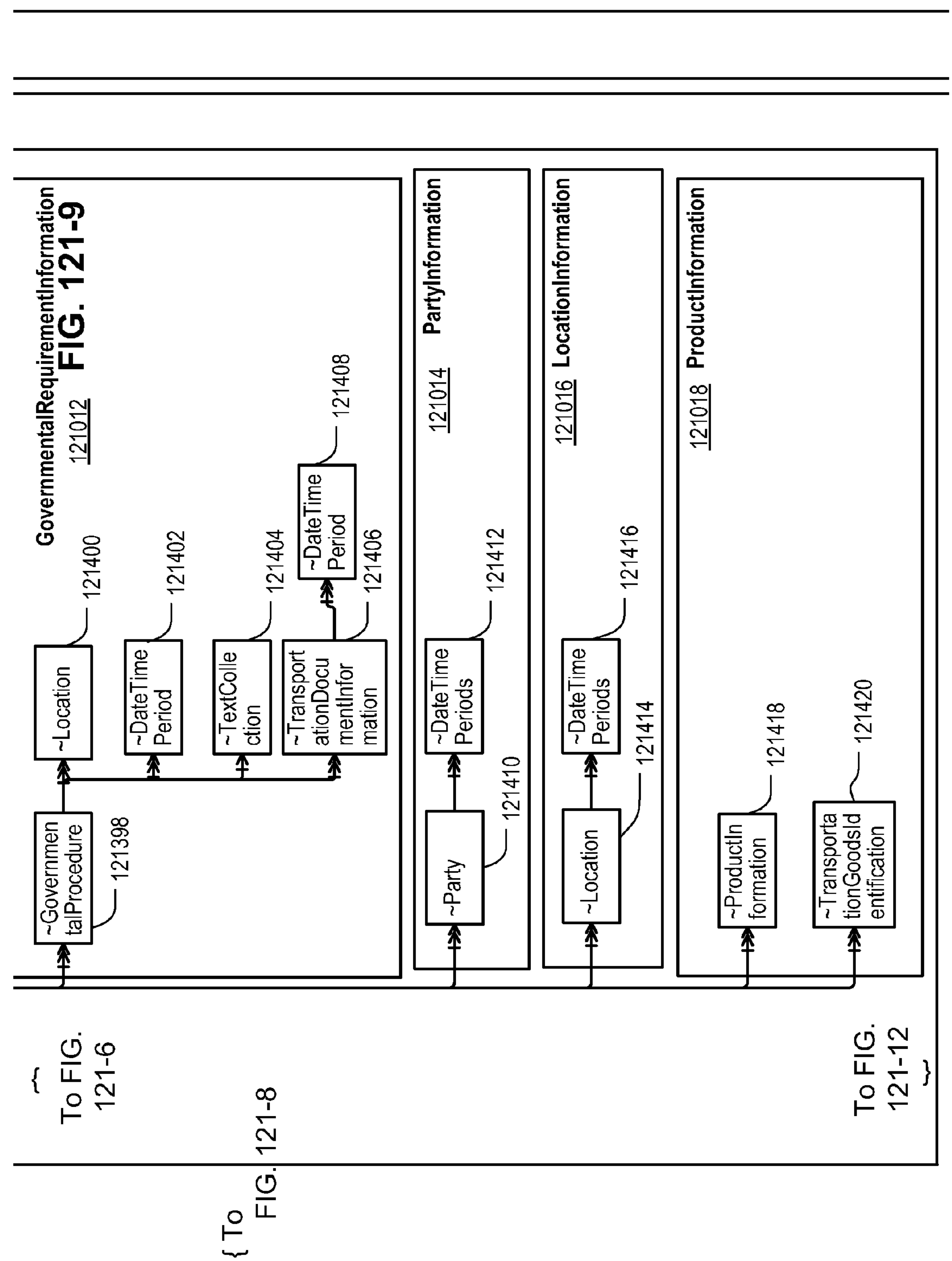
Figures 10, 121:
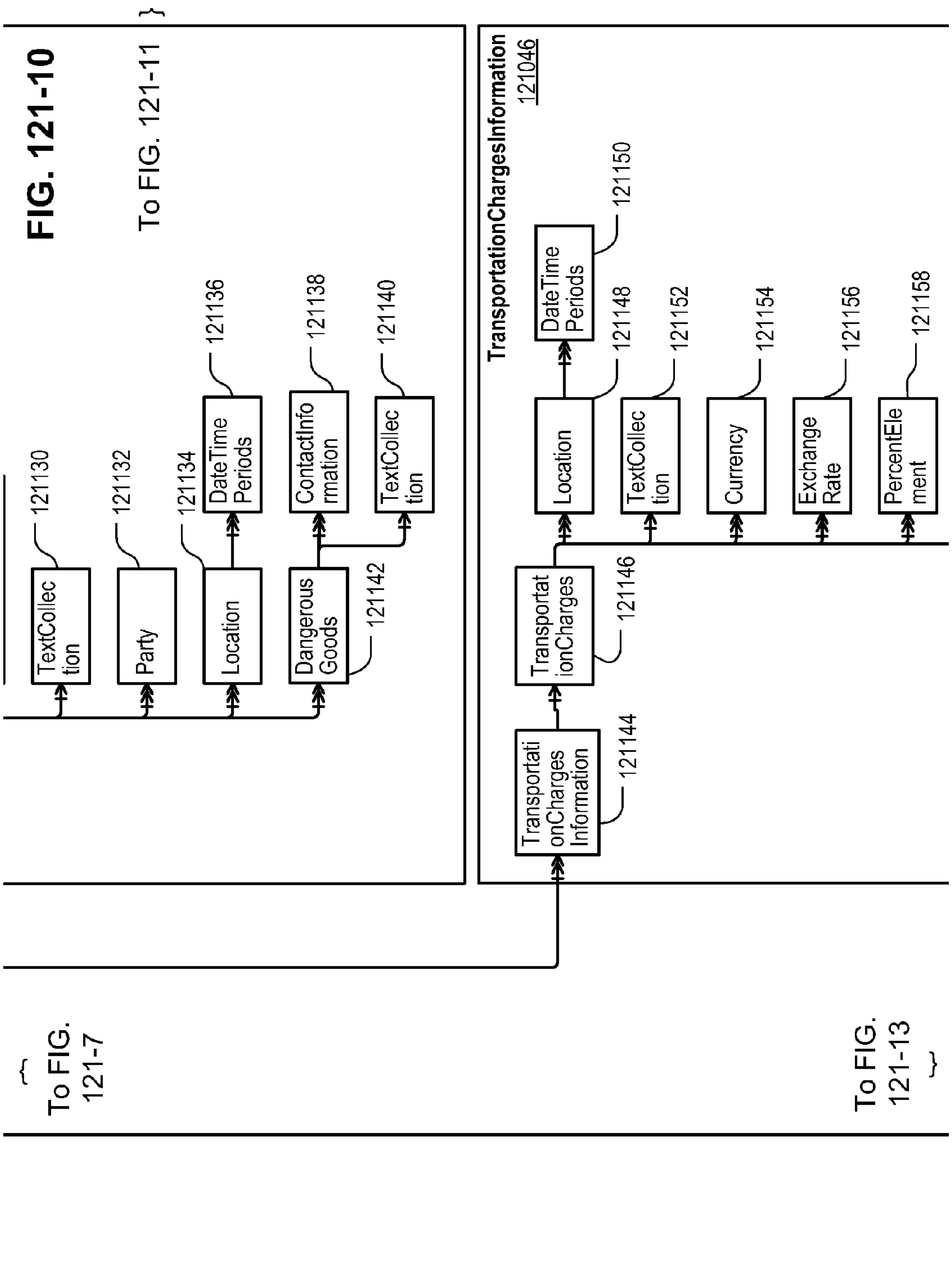
Figures 11, 121:
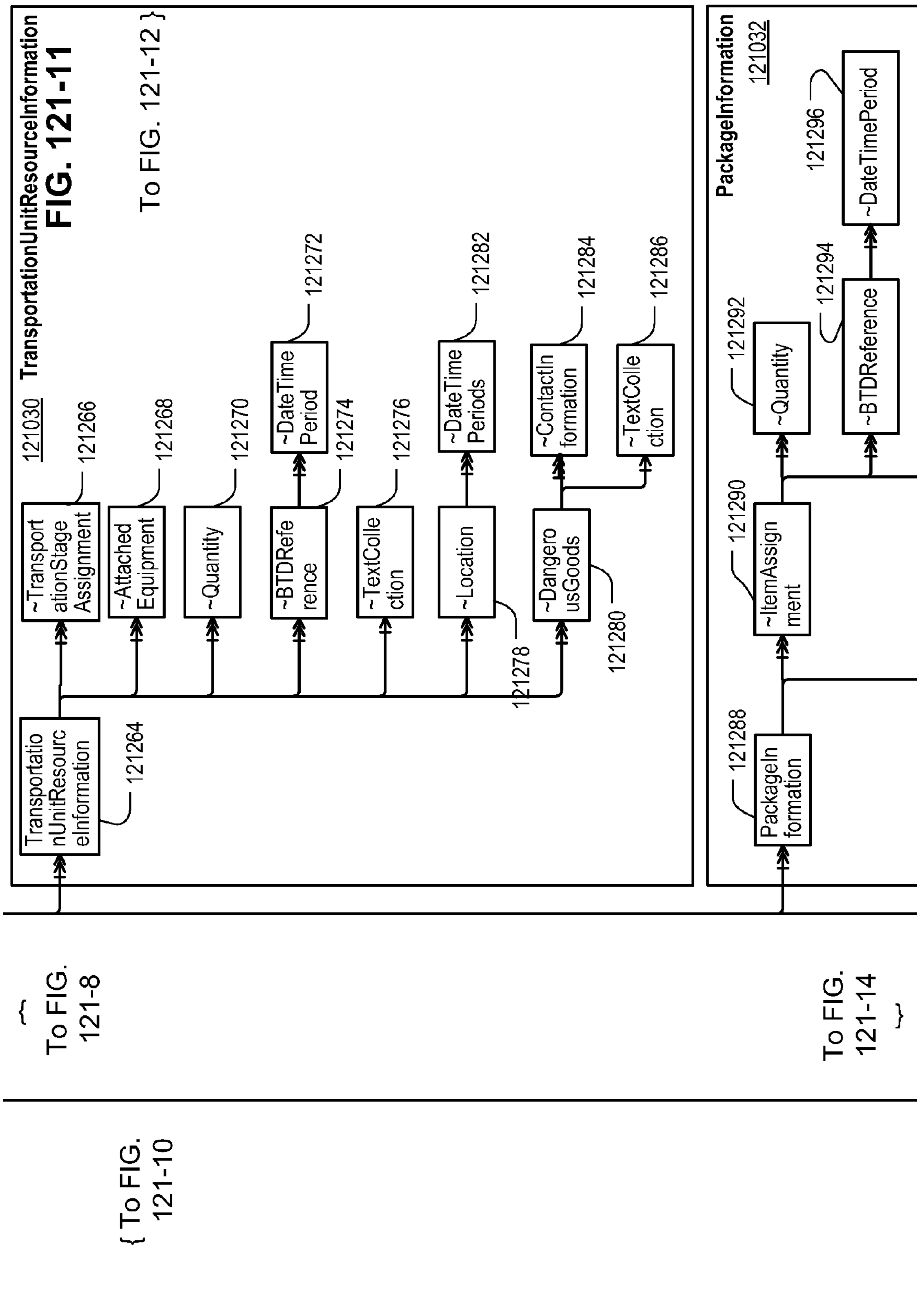
Figures 13, 121:
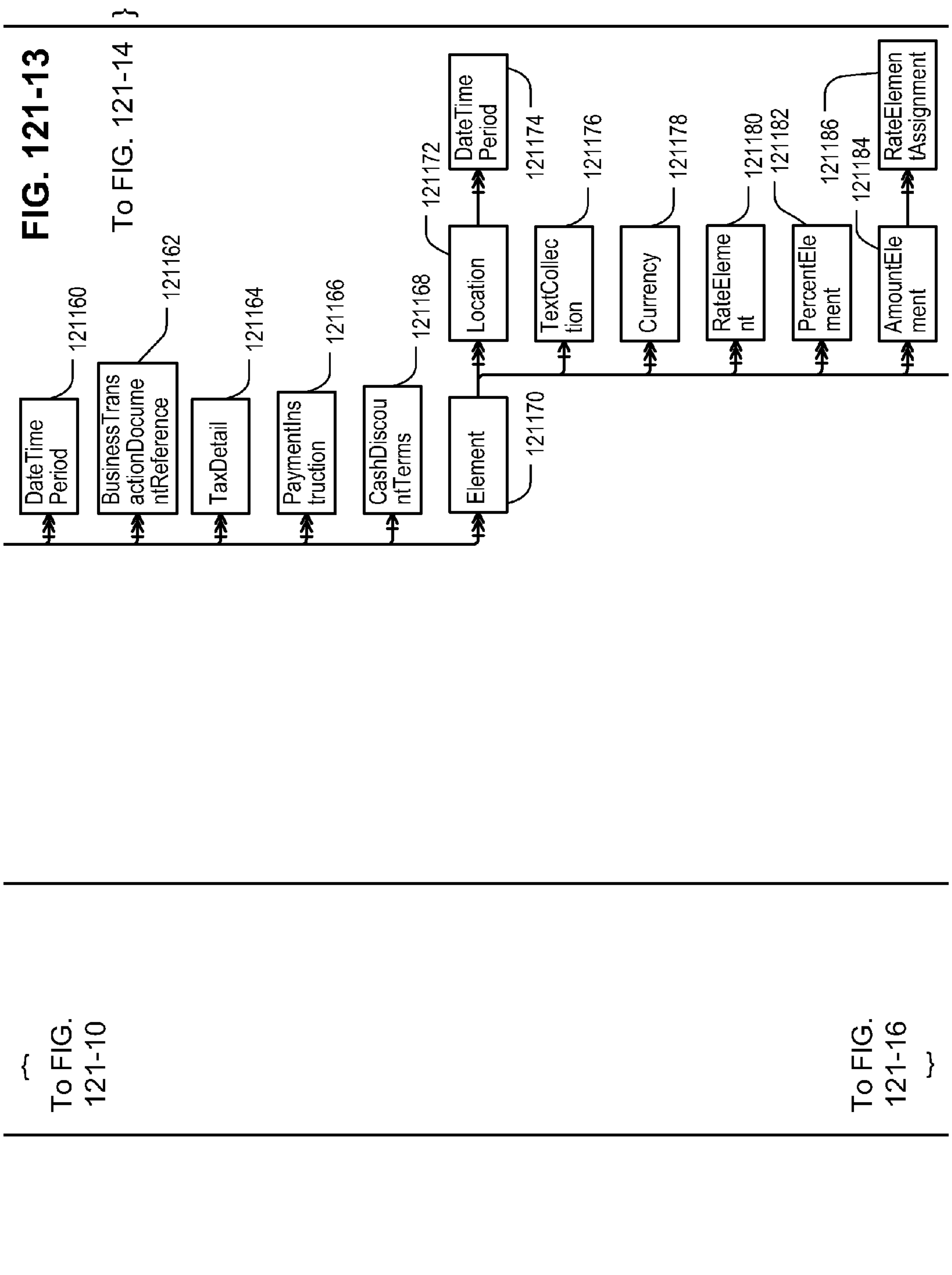
Figures 14, 121:
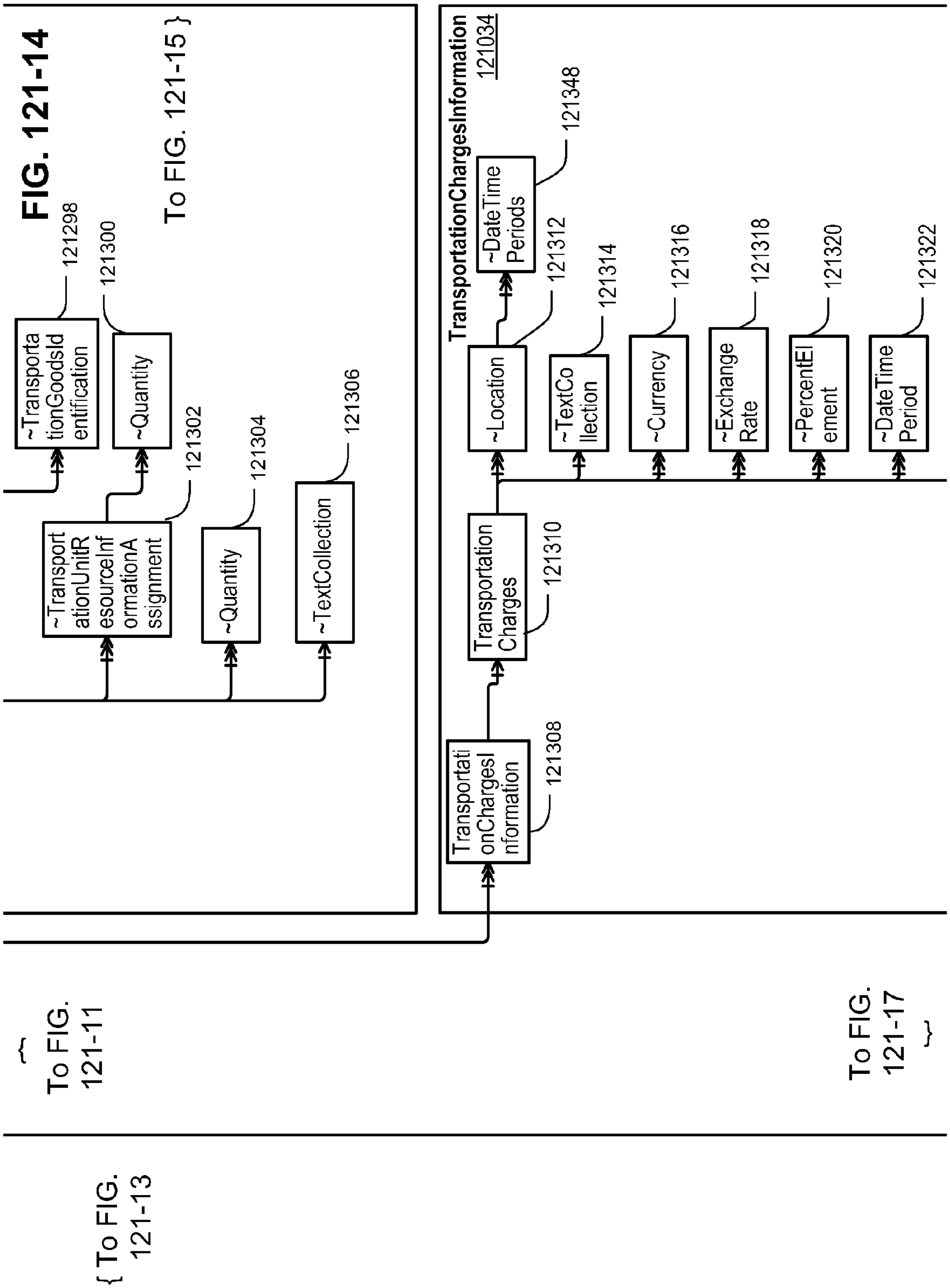
Figures 16, 121:
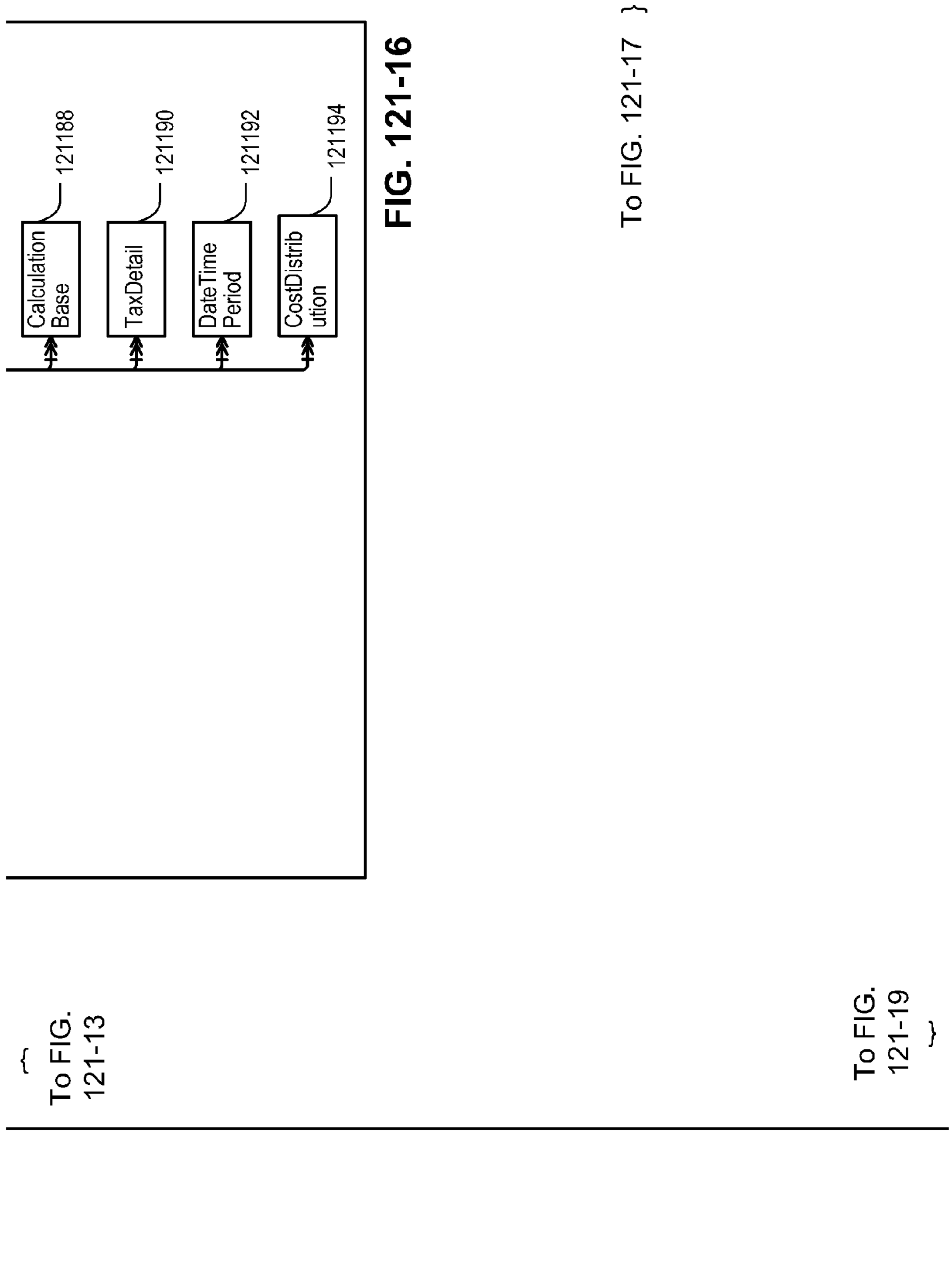
Figures 17, 121:
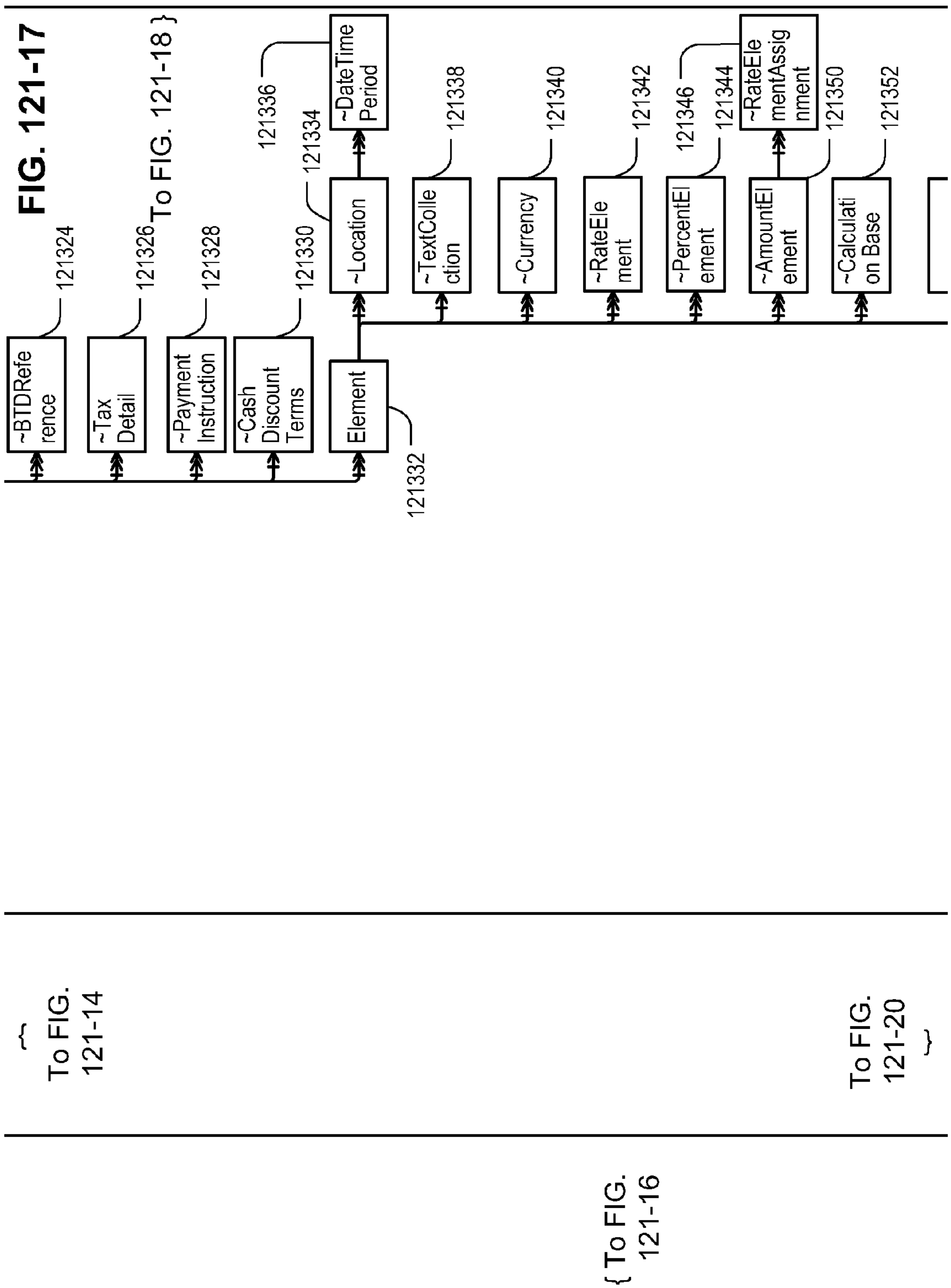
Figures 19, 121:
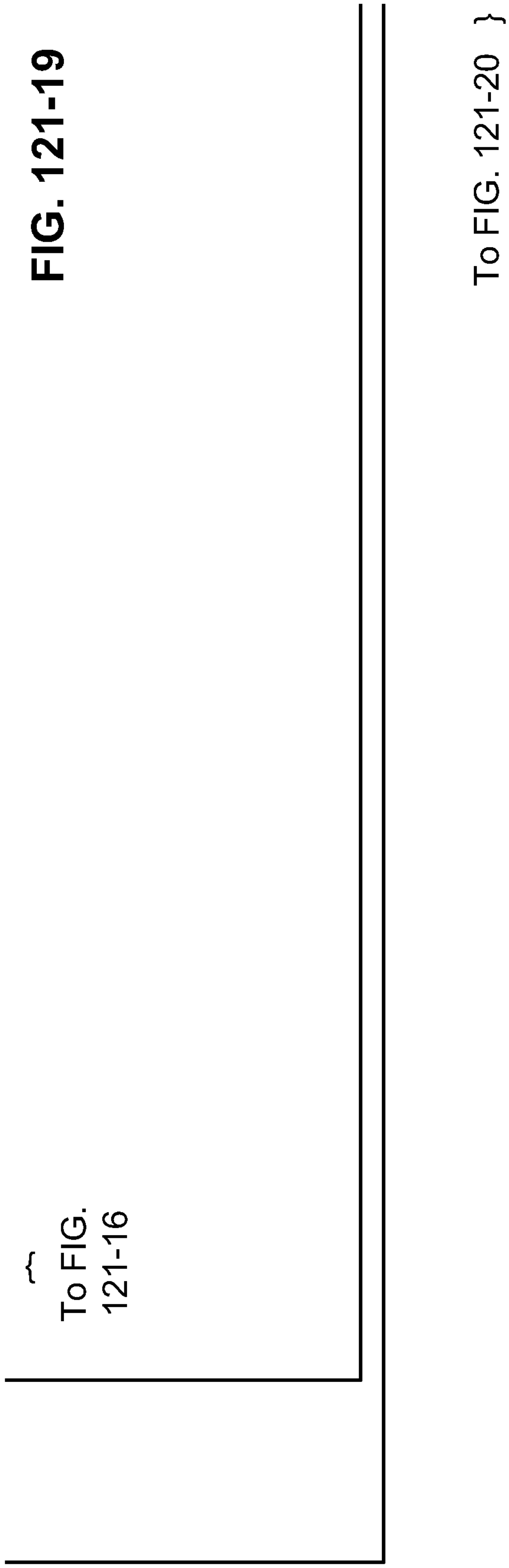
Figures 20, 121:
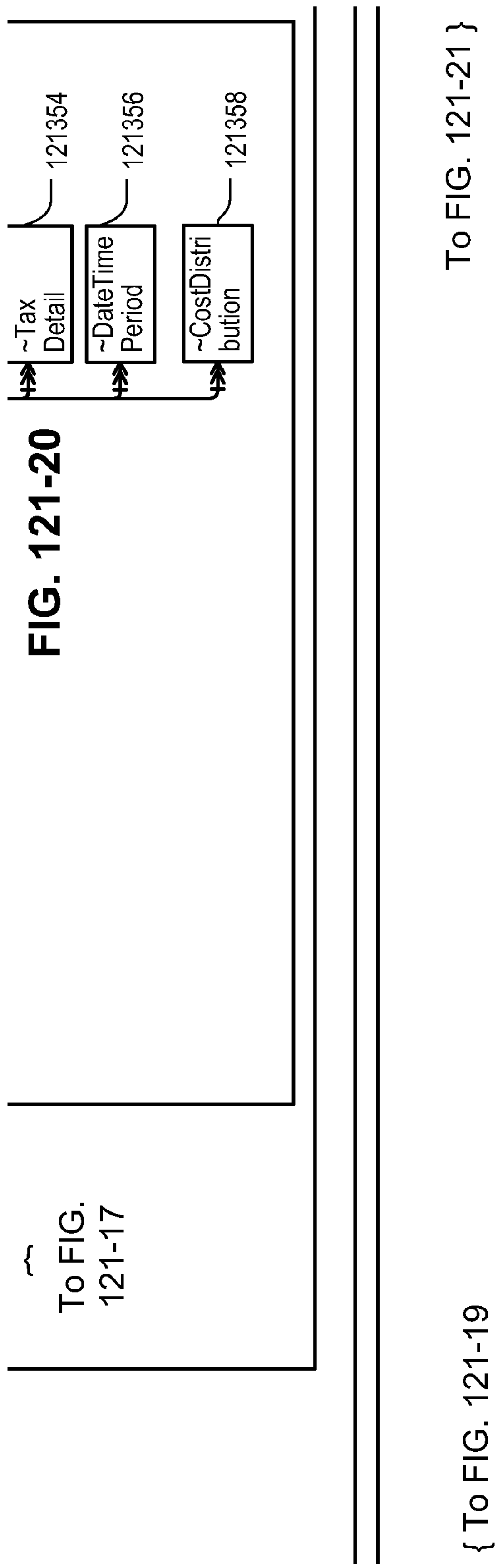
Figures 21, 121:
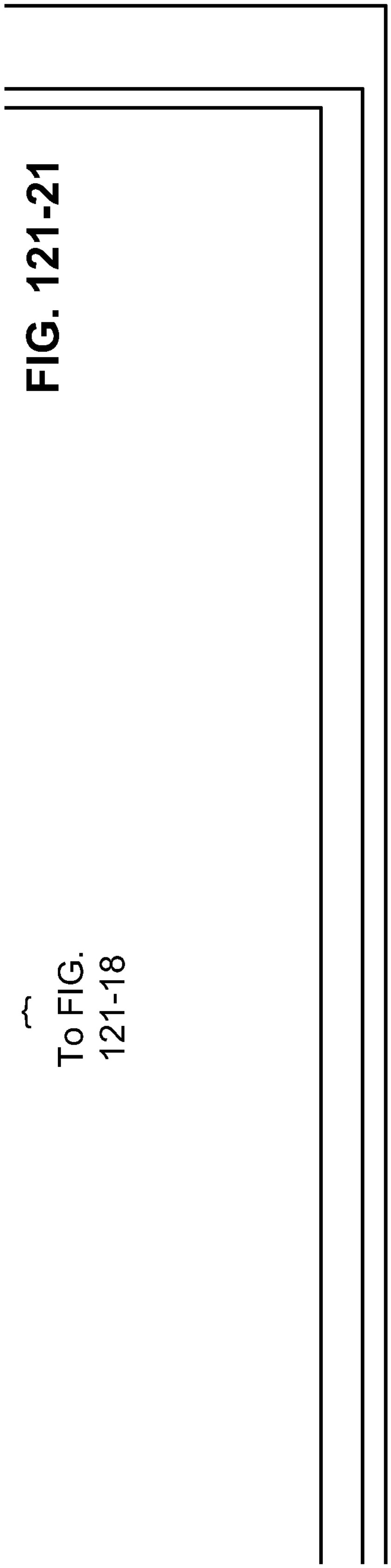

FIGS. 121-1 through 121-21 illustrate one example logical configuration of RequestForSupplierFreightQuoteRequestMessage message 121000. Specifically, this figure depicts the arrangement and hierarchy of various components such as one or more levels of packages, entities, and datatypes, shown here as 121002 through 121420. As described above, packages may be used to represent hierarchy levels. Entities are discrete business elements that are used during a business transaction. Data types are used to type object entities and interfaces with a structure. For example, RequestForSupplierFreightQuoteRequestMessage message 121000 includes, among other things, RequestForSupplierFreightQuote 121056. Accordingly, heterogeneous applications may communicate using this consistent message configured as such.

Figure 122:
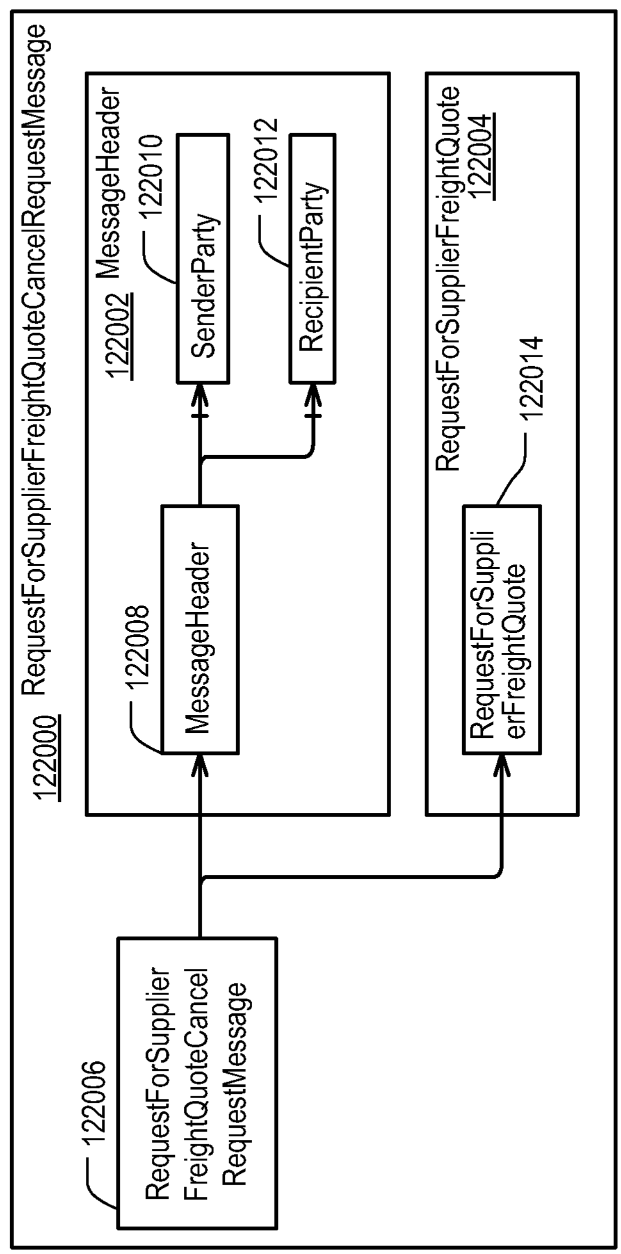

Additionally, FIG. 122 illustrates one example logical configuration of RequestForSupplierFreightQuoteCancelRequestMessage message 122000. Specifically, this figure depicts the arrangement and hierarchy of various components such as one or more levels of packages, entities, and datatypes, shown here as 122002 through 122014. As described above, packages may be used to represent hierarchy levels. Entities are discrete business elements that are used during a business transaction. Data types are used to type object entities and interfaces with a structure. For example, RequestForSupplierFreightQuoteCancelRequestMessage message 122000 includes, among other things, RequestForSupplierFreightQuote 122004. Accordingly, heterogeneous applications may communicate using this consistent message configured as such.

FIGS. 123-1 through 123-165 illustrate one example logical configuration or a RequestForSupplierFreightQuoteRequestMessage 1230000 element structure. Specifically, these figures depict the arrangement and hierarchy of various components such as one or more levels of packages, entities, and datatypes, shown here as 1230000 through 1234666. As described above, packages may be used to represent hierarchy levels. Entities are discrete business elements that are used during a business transaction. Data types are used to type object entities and interfaces with a structure. For example, the RequestForSupplierFreightQuoteRequestMessage 1230000 includes, among other things, a RequestForSupplierFreightQuoteRequestMessage entity 1230002. Accordingly, heterogeneous applications may communicate using this consistent message configured as such.

FIG. 124 illustrates one example logical configuration of a RequestForSupplierFreightQuoteCancelRequestMessage 124000 element structure. Specifically, this figure depicts the arrangement and hierarchy of various components such as one or more levels of packages, entities, and datatypes, shown here as 124000 through 124024. As described above, packages may be used to represent hierarchy levels. Entities are discrete business elements that are used during a business transaction. Data types are used to type object entities and interfaces with a structure. For example, the RequestForSupplierFreightQuoteCancelRequestMessage 124000 includes, among other things, a RequestForSupplierFreightQuoteCancelRequestMessage entity 124002. Accordingly, heterogeneous applications may communicate using this consistent message configured as such. Message Data Type RequestForSupplierFreightQuoteRequestMessage The message data type RequestForSupplierFreightQuoteRequestMessage includes business information relevant for sending a business document in a message, and the RequestForSupplierFreightQuote included in a business document. The message data type RequestForSupplierFreightQuoteRequestMessage includes the MessageHeader and RequestForSupplierFreightQuote packages.

A MessageHeader package can group together business information relevant for sending a business document in a message. The MessageHeader package includes the MessageHeader entity. A MessageHeader can group together business information from the perspective of a sending application, to identify a business document in a message, to provide information about the sender, to provide information about the recipient. The MessageHeader can be divided up into the following entities: SenderParty and RecipientParty. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by a sending application to name a contact person for problems with the message. A contact person can be useful if an additional infrastructure, such as a marketplace, is located between the sender and the recipient. The SenderParty can be used to transfer a message and can be ignored by the receiving application. SenderParty can be filled by the sender if the participating parties are not transferred with the ShipmentRequest package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that occur with the message. A contact person can be useful if an additional infrastructure, such as a marketplace, is located between the sender and the recipient. The RecipientParty can be used to transfer the message and can be ignored by the receiving application. RecipientParty can be filled by the sender if the ShipmentRequest package cannot be used to transfer the participating parties.

The RequestForSupplierFreightQuote package can group the RequestForSupplierFreightQuote together with its packages. The RequestForSupplierFreightQuote package includes the RequestForSupplierFreightQuote entity and the following packages: HeaderInformation, GovernmentalRequirementInformation, PartyInformation, TransportationStageInformation, TransportationUnitResourceInformation, TransportationChargesInformation, and RequestForSupplierShipmentQuote.

RequestForSupplierFreightQuote can be a request from an ordering party to a supplier of a transportation service to submit a quote for the transportation of goods from one or multiple ship-from parties to one or multiple ship-to parties with requested terms and conditions. The structure of RequestForSupplierFreightQuote includes the elements @actioncode and ID. The @actioncode element can be a coded representation of an instruction to a message recipient describing how to process the transmitted element. The @actioncode element can be based on GDT: ActionCode. ID can be a unique identifier for a RequestForSupplierFreightQuote. ID can be based on GDT: BusinessTransactionDocumentID. In some implementations, @actioncode "01" (Create) is supported.

The HeaderInformation package can group dates, total values, document and references related to a shipment request. The HeaderInformation package includes the following entities: DateTimePeriods, NatureOfCargo, TotalQuantity, TotalAmount, TextCollection, TransportationServiceRequirement, TransportationDocumentInformation, and BusinessTransactionDocumentReference.

DateTimePeriods can specify a requested and an acceptable date, time and period applying to a shipment request (e.g. date and time of document issue). A requested period can be a period in which an event is requested to take place. An acceptable period can be a period in which an event may take place at an earliest start date/time to a latest end date/time. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them can be filled.

NatureOfCargo can indicate a nature of cargo related to a shipment request (e.g., palletized, containerized, documents). The structure of NatureOfCargo includes the element ClassificationCode. ClassificationCode can be a coded representation of a classification of a nature of cargo. ClassificationCode can be based on GDT: NatureOfCargoClassificationCode.

TotalQuantity can specify a total quantity which is related to a whole shipment request (e.g., total number of equipment, total number of items). The structure of TotalQuantity includes the Quantity, RoleCode, and TypeCode elements. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them can be filled.

TotalAmount can specify a cumulated monetary amount related to a shipment request (e.g., duty amount, insurance amount, total value). The structure of TotalAmount includes the elements Amount and RoleCode. Amount can be an amount with a corresponding currency unit, and can be based on CDT: Amount. RoleCode can be a coded representation of a role of an amount, and can be based on GDT: AmountRoleCode.

TextCollection can be a group of textual information that relates to a shipment request. The structure of the TextCollection entity includes the TextCollection element. TextCollection can be based on GDT: TextCollection.

TransportationServiceRequirement can specify a contract and carriage condition and service and priority requirements for a transport which apply to a whole shipment request. The structure of TransportationServiceRequirement includes the elements TransportationServiceRequirementCode, AdditionalTransportationServiceRequirementCode, TransportationContractConditionCode, TransportServiceLevelCode, and NatureOfCargoClassificationCode. TransportationServiceRequirementCode can be a coded representation of a requirement related to a transportation service. TransportationServiceRequirementCode can be based on GDT : TransportationServiceRequirementCode.

AdditionalTransportationServiceRequirementCode can be a coded representation of an additional requirement related to a transportation service, and can be based on GDT: TransportationServiceRequirementCode, Qualifier: Additional. TransportationContractConditionCode can be a coded representation of a contract and carriage condition, and can be based on GDT: TransportationContractConditionCode. TransportServiceLevelCode can be a coded representation of agreed or defined services in terms of the delivery of goods with respect to the speed of the delivery. TransportServiceLevelCode can be based on GDT : TransportServiceLevelCode. NatureOfCargoClassificationCode can be a coded representation of a classification of a nature of cargo. NatureOfCargoClassificationCode can be based on GDT : NatureOfCargoClassificationCode.

TransportationDocumentInformation can specify information on a transportation document related to a shipment request. TransportationDocumentInformation includes the DateTimePeriod entity. The structure of TransportationDocumentInformation includes the following elements: TransportationDocumentTypeCode, TransportationDocumentNote, TransportationDocumentID, TransportationDocumentStatusCode, LanguageCode, CommunicationMediumTypeCode, RequiredIndicator, OutputCopyNumberValue, and OutputOriginalNumberValue. TransportationDocumentTypeCode can be a coded representation of a documentation type, and can be based on GDT: TransportationDocumentTypeCode.

TransportationDocumentNote can be a short note on documentation, and can be based on GDT: SHORT_Note. TransportationDocumentID can be a unique identifier for a transportation document, and can be based on GDT: TransportationDocumentID. TransportationDocumentStatusCode can be a coded representation of the status of a transportation document (e.g., to be printed, document complete). TransportationDocumentStatusCode can be based on GDT: TransportationDocumentStatusCode. LanguageCode can be a coded representation of the language of a documentation, and can be based on GDT: LanguageCode. CommunicationMediumTypeCode can be a coded representation of a type of a medium used for communication of a documentation, such as Fax, mail, EDI, or Letter. CommunicationMediumTypeCode can be based on GDT : CommunicationMediumTypeCode.

RequiredIndicator can indicate whether a documentation is required or not. RequiredIndicator can be based on GDT: Indicator Qualifier: Required. OutputCopyNumberValue can be a number specifying the number of copies of a document that may be issued. OutputCopyNumberValue can be based on GDT: NumberValue, Qualifier : OutputCopy. OutputOriginalNumberValue can be a number specifying the number of originals of a document that may be issued. OutputOriginalNumberValue can be based on GDT: NumberValue, Qualifier : OutputOriginal. In some implementations, TypeCode and TypeDescription are both optional, but at least one of them can be used. In some implementations, if the RequiredIndicator is set to true, at least one of NumberValues, OutputCopyNumberValue or OutputOriginalNumberValue may be filled.

DateTimePeriod can specify a date, time and/or period (e.g., validity date) related to business documentation. The structure of the DateTimePeriod entity includes the elements DateTimePeriod and PeriodRoleCode. DateTimePeriod can be a period that is defined by two points in time, and can be based on GDT: DateTimePeriod. PeriodRoleCode can be a coded representation of business semantics of a period, and can be based on GDT: PeriodRoleCode.

BusinessTransactionDocumentReference can specify a business document reference that is related to a whole shipment request. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

DateTimePeriod can specify a date, time and/or period related to a DocumentReference. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

The GovernmentalRequirementInformation package can specify applicable governmental procedures related to import, export and transport of goods of a shipment request. The GovernmentalRequirementInformation package includes the GovernmentalProcedure entity.

GovernmentalProcedure can specify applicable governmental procedures related to import, export and transport of goods of a shipment request. GovernmentalProcedure includes the entities Location, DateTimePeriod, TextCollection, and TransportationDocumentInformation. The structure of GovernmentalProcedure includes the following elements: TransportationGovernmentAgencyTypeCode, TransportationMovementTypeCode, TransportationGovernmentAgencyInvolvementStatusCode, TransportationGovernmentAgencyActionCode, and TransportationGovernmentAgencyProcedureStatusCode. TransportationGovernmentAgencyTypeCode can be a coded representation of a government agency type, and can be based on GDT: TransportationGovernmentAgencyTypeCode.

TransportationMovementTypeCode can be a coded representation of a transport movement type. Example transport movement types include Import, Export, Transit, and Transshipment. TransportationMovementTypeCode can be based on GDT: TransportationMovementTypeCode. TransportationGovernmentAgencyInvolvementStatusCode can be a coded representation for an involvement status of a transportation related government agency. TransportationGovernmentAgencyInvolvementStatusCode can be based on GDT: TransportationGovernmentAgencyInvolvementStatusCode. TransportationGovernmentAgencyActionCode can be a coded representation of an action of a transportation related government agency.

TransportationGovernmentAgencyActionCode can be based on GDT: TransportationGovernmentAgencyActionCode. TransportationGovernmentAgencyProcedureStatusCode can be a coded representation of a status of a procedure related to a transportation government agency. TransportationGovernmentAgencyProcedureStatusCode can be based on GDT: TransportationGovernmentAgencyProcedureStatusCode.

Location can be a physical place related to a GovernmentalProcedure. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole. RoleCode can be based on GDT: LocationRoleCode. TypeCode can be a coded representation of a type of a physical location. TypeCode can be based on GDT: LocationTypeCode. Name can be a name of a location. Name can be based on GDT: MEDIUM_Name, Qualifier:Location.

DateTimePeriod can specify a date, time and/or period related to a GovernmentalProcedure. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TextCollection can be a group of textual information that relates to a GovernmentalProcedure. The structure of the TextCollection entity includes the element TextCollection. TextCollection can be based on GDT: TextCollection.

TransportationDocumentInformation can specify information on a transportation document related to the GovernmentalProcedure. It includes the DateTimePeriod entity. The structure of TransportationDocumentInformation includes the elements: TransportationDocumentTypeCode, TransportationDocumentNote, TransportationDocumentID, TransportationDocumentStatusCode, LanguageCode, CommunicationMediumTypeCode, RequiredIndicator, OutputCopyNumberValue, and OutputOriginalNumberValue. TransportationDocumentTypeCode can be a coded representation of the type of a documentation, and can be based on GDT: TransportationDocumentTypeCode. TransportationDocumentNote can be a short Note on the documentation, and can be based on GDT: SHORT_Note. TransportationDocumentID can be a unique identifier for a transportation document, and can be based on GDT: TransportationDocumentID.

TransportationDocumentStatusCode can be a coded representation of the status of a transportation document, e.g. To be printed, or Document Complete. TransportationDocumentStatusCode can be based on GDT: TransportationDocumentStatusCode. LanguageCode can be a coded representation of the language of a documentation, and can be based on GDT: LanguageCode. CommunicationMediumTypeCode can be a coded representation of the type of a medium used for communication of the documentation, such as, Fax, mail, EDI, or Letter. CommunicationMediumTypeCode can be based on GDT : CommunicationMediumTypeCode. RequiredIndicator can indicate whether a documentation is required or not. RequiredIndicator can be based on GDT: Indicator Qualifier: Required.

OutputCopyNumberValue can be a number specifying the number of copies of the document that should be issued. OutputCopyNumberValue can be based on GDT: NumberValue, Qualifier : OutputCopy. OutputOriginalNumberValue can be a number specifying the number of originals of the document that should be issued. OutputOriginalNumberValue can be based on GDT: NumberValue, Qualifier: OutputOriginal. In some implementations, TypeCode and TypeDescription are both optional, but at least one of them has to be used. In some implementations, if the RequiredIndicator is set to true, at least one of the both NumberValues OutputCopyNumberValue or OutputOriginalNumberValue has to be filled.

DateTimePeriod can specify date, time and/or period related to the Documentation. The elements located directly at the DateTimePeriods entity include: RequestedFulfillmentPeriod, AcceptableFulfillmentPeriod, and PeriodRoleCode. RequestedFulfillmentPeriod can be a period which is requested depending on the semantic of the PeriodRoleCode. RequestedFulfillmentPeriod can be based on GDT: DATETIMEPERIOD, Qualifier: RequestedFulfillment. AcceptableFulfillmentPeriod can be a period which is still acceptable depending on the semantic of the PeriodRoleCode. AcceptableFulfillmentPeriod can be based on GDT: DATETIMEPERIOD, Qualifier: AcceptableFulfillment. PeriodRoleCode can be a coded representation of the business semantic of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them has to be filled.

The PartyInformation package includes information regarding a party of the shipment request, i.e., Shipper, Carrier, or Agent. It includes the Party entity. Party includes information exchanged, in accordance with common business understanding, in business documents about a party involved in business transactions. This information can be used to identify the party and the party's address, as well as the party's contact person and the contact person's address. This identification can take place using an internal ID, a standardized ID, or IDs assigned by the parties involved. It includes the entities: Amount, DateTimePeriods, TransportationDocumentInformation, and BusinessTransactionDocumentReference. The structure of the Party entity includes the Party, RoleCode, and FormattedName entities.

A Party includes information exchanged, in accordance with common business understanding, in business documents about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations the party has regarding a business object and corresponding processes. In some implementations, a PartyRole is assigned to a PartyRoleCategory and refines its semantics. RoleCode can be based on GDT: PartyRoleCode. FormattedName can be a complete, formatted name of a party, and can be based on GDT: LONG_Name, Qualifier: PartyFormatted.

Amount can specify an amount related to a party. The structure of the Amount entity includes the elements Amount and RoleCode. Amount can be an amount with a corresponding currency unit, and can be based on CDT: Amount. RoleCode can be a coded representation of a role of an amount, and can be based on GDT: AmountRoleCode.

DateTimePeriods can specify a requested and an acceptable date, time and period related to a party. A requested period can be a period in which an event is requested to take place. An acceptable period is a period in which an event may take place at an earliest start date/time to a latest end date/time. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TransportationDocumentInformation can specify business documentation related to a party according to a documentation type. TransportationDocumentInformation includes the DateTimePeriod entity. The structure of TransportationDocumentInformation includes the following elements: TransportationDocumentTypeCode, TransportationDocumentNote, TransportationDocumentID, TransportationDocumentStatusCode, LanguageCode, CommunicationMediumTypeCode, RequiredIndicator, OutputCopyNumberValue, and OutputOriginalNumberValue. TransportationDocumentTypeCode can be a coded representation of a documentation type, and can be based on GDT: TransportationDocumentTypeCode. TransportationDocumentNote can be a short note on documentation, and can be based on GDT: SHORT_Note. TransportationDocumentID can be a unique identifier for a transportation document, and can be based on GDT: TransportationDocumentID.

TransportationDocumentStatusCode can be a coded representation of a status of a transportation document (e.g., to be printed, document complete). TransportationDocumentStatusCode can be based on GDT: TransportationDocumentStatusCode. LanguageCode can be a coded representation of the language of a documentation, and can be based on GDT: LanguageCode. CommunicationMediumTypeCode can be a coded representation of the type of a medium used for communication of a documentation, such as Fax, mail, EDI, or Letter. CommunicationMediumTypeCode can be based on GDT : CommunicationMediumTypeCode. RequiredIndicator can indicate whether a documentation is required or not. RequiredIndicator can be based on GDT: Indicator Qualifier: Required.

OutputCopyNumberValue can be a number specifying the number of copies of a document that may be issued. OutputCopyNumberValue can be based on GDT: NumberValue, Qualifier : OutputCopy. OutputOriginalNumberValue can be a number specifying the number of originals of a document that may be issued. OutputOriginalNumberValue can be based on GDT: NumberValue, Qualifier : OutputOriginal. In some implementations, TypeCode and TypeDescription are both optional, but at least one of them can be used. In some implementations, if the RequiredIndicator is set to true, at least one of NumberValues, OutputCopyNumberValue or OutputOriginalNumberValue may be filled.

DateTimePeriod can specify date, time and/or period (e.g. validity date) related to a business documentation of a party. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

BusinessTransactionDocumentReference can specify a business document reference that is related to a party. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of a documentation type. TransportationDocumentTypeCode can be based on GDT: TransportationDocumentTypeCode. TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

DateTimePeriod can specify date, time and/or period related to a document referenced by a party. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

The TransportationStageInformation package includes information regarding a transportation stage of a shipment request. A transportation stage can represent a section of a transport. The TransportationStageInformation package includes the Stage entity. TransportationStage can specify the details related to a stage of a transport which is part of a shipment request. TransportationStage includes the entities Location, TransportationDocumentInformation, and TransportationServiceRequirement. The structure of TransportationStage includes the following elements: ID, OutputOriginalNumberValue, TypeCode, JourneyID, TransportModeCode, TransportMeansDescriptionCode, TransportMeansDescription, TransportMeansID, TransportMeansHomeCountryCode, TransportMeansOwnershipTypeCode, CarrierStandardID, CarrierFormattedName, TransportationTransitDirectionCode, CalculatedDistanceMeasure, and GivenDistanceMeasure. ID can be a unique identifier of a stage in a shipment request. ID can be based on GDT: TransportationStageID. OrdinalNumberValue can be an ordinal number to indicate a position of a transportation stage in a set of transportation stages.

OrdinalNumberValue can be based on GDT: OrdinalNumberValue, Qualifier: TransportationStage. TypeCode can be a coded representation of a type of a TransportationStage. TypeCode can be based on GDT: TransportationStageTypeCode. JourneyID can be an identifier of a Journey. JourneyID can be based on GDT: JourneyID. TransportModeCode can be a coded representation of a mode of transportation used for delivery. TransportModeCode can be based on GDT: TransportModeCode. TransportMeansDescriptionCode can be a coded representation of a transport means type with which goods or persons can be transported. TransportMeansDescriptionCode can be based on GDT: TransportMeansDescriptionCode. TransportMeansDescription can be a description of a means of transport, and can be based on GDT: SHORT_Description, Qualifier: TransportMeans. TransportMeansID can be a unique identifier of a means of transport, and can be based on GDT: TransportMeansID.

TransportMeansHomeCountryCode can be a coded representation of the home country of a transport means, and can be based on GDT: CountryCode, Qualifier: TransportMeansHome. TransportMeansOwnershipTypeCode can be a coded representation of a type of ownership for a means of transport, and can be based on GDT: TransportMeansOwnershipTypeCode. CarrierStandardID can be a standard identifier of a carrier, and can be based on GDT: PartyStandardID. CarrierFormattedName can be a name of a carrier, and can be based on GDT: LONG_Name, Qualifier: PartyFormatted. TransportationTransitDirectionCode can be a coded representation for a transportation transit direction. TransportationTransitDirectionCode can be based on GDT: TransportationTransitDirectionCode. CalculatedDistanceMeasure can be a calculated distance measure, and can be based on GDT: Measure, Qualifier: CalculatedDistance. GivenDistanceMeasure can be a given distance measure, and can be based on GDT: Measure, Qualifier: GivenDistance.

StageLocation can specify a physical place related to a stage. StageLocation includes the DateTimePeriods entity. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location. TypeCode can be based on GDT: LocationTypeCode. Name can be a name of a location, and can be based on GDT: MEDIUM_Name, Qualifier:Location.

DateTimePeriods can specify a date, time and/or period related to a Location. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of a PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of a PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

BusinessTransactionDocumentReference can specify a business document reference that is related to a Stage. BusinessTransactionDocumentReference includes the DateTimePeriod entity. The structure of the BusinessTransactionDocumentReference entity includes the elements BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of a documentation type. TransportationDocumentTypeCode can be based on GDT: TransportationDocumentTypeCode. TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

DateTimePeriod can specify a date, time and/or period related to a BusinessTransactionDocumentReference. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TransportationServiceRequirement can specify a contract and carriage condition and service and priority requirements related to a stage. The structure of TransportationServiceRequirement includes the following elements: TransportationServiceRequirementCode, AdditionalTransportationServiceRequirementCode, TransportationContractConditionCode, TransportServiceLevelCode, and NatureOfCargoClassificationCode. TransportationServiceRequirementCode can be a coded representation of a requirement related to a transportation service, and can be based on GDT: TransportationServiceRequirementCode.

AdditionalTransportationServiceRequirementCode can be a coded representation of an additional requirement related to a transportation service, and can be based on GDT: TransportationServiceRequirementCode, Qualifier: Additional. TransportationContractConditionCode can be a coded representation of a contract and carriage condition, and can be based on GDT: TransportationContractConditionCode. TransportServiceLevelCode can be a coded representation of agreed or defined services in terms of the delivery of goods with respect to the speed of the delivery. TransportServicesLevelCode can be based on GDT : TransportServiceLevelCode. NatureOfCargoClassificationCode can be a coded representation of a classification of the nature of cargo. NatureOfCargoClassificationCode can be based on GDT : NatureOfCargoClassificationCode.

The TransportationUnitResourceInformation package includes information regarding a transportation unit resource that is relevant for a shipment request (e.g., a container). The TransportationUnitResourceInformation package includes the TransportationUnitResourceInformation entity. TransportationUnitResourceInformation includes information on one or more transportation unit resources, such as a resource type and related properties, related measures or handling instructions. A Transportation Unit Resource can be a unit into which goods are loaded and/or from which goods are unloaded. In some implementations, this unit can provide transportation capacity for goods but may or may not move by itself. TransportationUnitResourceInformation includes the following entities: TransportationStageAssignment, AttachedEquipment, Quantity, Seal, BusinessTransactionDocumentReference, TextCollection, Location, and DangerousGoods. The structure of TransportationUnitResourceInformation includes the following elements: ID, ResourceNumberValue, ResourceID, ResourceHomeCountryCode, TransportationUnitResourceCategoryCode, TransportationUnitResourceTypeCode, FillLevelCode, ShippingTypeCode, HaulageArrangerCode, TransportationHandlingInstructionCode, and TransportationHandlingInstructionNote.

ID can be a unique identifier for a resource information, and can be based on GDT ResourceInformationID. ResourceNumberValue can be a count of resources, and can be based on GDT: NumberValue, Qualifier: Resource. ResourceID can be a unique identifier for a resource, and can be based on GDT: ResourceID. ResourceHomeCountryCode can be a coded representation of the home country of a resource, and can be based on GDT: CountryCode, Qualifier: ResourceHome. TransportationUnitResourceCategoryCode can be a coded representation of a category of transportation unit resources, and can be based on GDT: TransportationUnitResourceCategoryCode. TransportationUnitResourceTypeCode can be a coded representation of the type of a transportation unit resource. TransportationUnitResourceTypeCode can be based on GDT: TransportationUnitResourceTypeCode.

FillLevelCode can be a coded representation of a fill level of a resource, and can be based on GDT: FillLevelCode. ShippingTypeCode can be a coded representation of a shipping type. A shipping type can specify how planning and execution of a transportation can be performed. Transportation terms include detailed specifications on agreed means of transportation, such as shipping or transport type, and means of transport to be used. ShippingTypeCode can be based on GDT: ShippingTypeCode. HaulageArrangerCode can be a coded representation of an arranger of a haulage. Haulage can be inland transport of cargo. HaulageArrangerCode can be based on GDT: HaulageArrangerCode. TransportationHandlingInstructionCode can be a coded representation of a type of a transportation handling instruction, and can be based on GDT: TransportationHandlingInstructionCode. TransportationHandlingInstructionNote can be a note regarding a transportation handling instruction, and can be based on GDT: LONG_Note, Qualifier: TransportationHandlingInstruction.

TransportationStageAssignment can specify an assignment of a transportation stage to a transportation unit resource information. The structure of TransportationStageAssignment includes the element ShipmentRequestTransportationStageID. ShipmentRequestTransportationStageID can be a unique identifier of a TransportationStage in a shipment request, and can be based on GDT: TransportationStageID.

AttachedEquipment can specify equipment attached to a TransportationUnitResource. The structure of AttachedEquipment includes the element ShipmentRequestResourceInformationID. ShipmentRequestResourceInformationID can be a unique identifier of a resource information in a ShipmentRequest, and can be based on GDT: ResourceInformationID.

Quantity can specify a quantity related to the TransportationUnitResourceInformation. The structure of the Quantity entity includes the following elements: Quantity, RoleCode, and TypeCode. Quantity can be a non-monetary numerical specification of an amount in a unit of measurement. Quantity can be based on GDT: Quantity. RoleCode can be a coded representation of the role of a quantity, and can be based on GDT: QuantityRoleCode. TypeCode can be a coded representation of a type of a quantity that is based on a measurable characteristic of an object or physical phenomenon. TypeCode can be based on GDT: QuantityTypeCode. In some implementations, QuantityRoleCode and QuantityTypeCode are optional, but in every instance one of them can be filled.

BusinessTransactionDocumentReference can specify a business document reference that is related to the TransportationUnitResource. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type. TransportationDocumentTypeCode can be based on GDT: TransportationDocumentTypeCode.

TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

DateTimePeriod can specify a date, time and/or period related to a BusinessTransactionDocumentReference. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of a PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TextCollection can be a group of textual information that relates to a TransportationUnitResource. The structure of the TextCollection entity includes the TextCollection element. TextCollection can be based on GDT: TextCollection. Location can specify a physical place related to the TransportationUnitResource. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location, and can be based on GDT: LocationTypeCode. Name can be a name of a location, and can be based on GDT: MEDIUM_Name, Qualifier:Location.

DateTimePeriods can specify a requested and an acceptable date, time and period related to a Location of a resource. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of a PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of a PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

DangerousGoods can specify dangerous goods included in a resource. DangerousGoods includes the ContactInformation and TextCollection entities. The structure of DangerousGoods includes the following elements: ID, RegulationsCode, HazardCode, FlashpointMeasureInterval, PackagingGroupCode, EmergencySchedule, TransportEmergencyCardCode, DangerousGoodsLabelCode, DangerousGoodsLabelCode2, DangerousGoodsLabelCode3, PackagingInstructionTypeCode, TransportMeansDescriptionCode, and TransportAuthorisationCode. ID can be a unique identifier for a dangerous good, using the United Nations Dangerous Goods Number. ID can be based on GDT: DangerousGoodsID. RegulationsCode can be a coded representation of national or international dangerous goods rules or regulations. RegulationsCode can be based on GDT: DangerousGoodsRegulationsCode. HazardCode can be a coded representation of a hazard that is imminent in a dangerous good. HazardCode can be based on GDT: DangerousGoodsHazardCode. FlashpointMeasureInterval can be an interval of measures defined by a lower and an upper boundary indicating a flashpoint of a dangerous good. FlashpointMeasureInterval can be based on GDT: MeasureInterval, Qualifier: Flashpoint. PackagingGroupCode can be a coded representation of the effectiveness of a packaging to transport dangerous goods depending on a degree of danger of the goods. PackagingGroupCode can be based on GDT: DangerousGoodsPackagingGroupCode.

EmergencySchedule can be a coded representation of an emergency schedule for dangerous goods. EmergencySchedule can identify an emergency schedule. The DangerousGoodsEmergencySchedule can be used for transports of dangerous goods by sea similar to a Transport Emergency Card which is used for transports of dangerous goods by road. EmergencySchedule can be based on GDT: DangerousGoodsEmergencySchedule. TransportEmergencyCardCode can be a coded representation of a transport emergency card which specifies how to react in case of an accident. TransportEmergencyCardCode can be based on GDT: TransportEmergencyCardCode. DangerousGoodsLabelCode can be a coded representation of a label for a dangerous good. In some implementations, DangerousGoodsLabelCode's values are dependant on the DangerousGoodsRegulationsCode. DangerousGoodsLabelCode can be based on GDT: DangerousGoodsLabelCode.

DangerousGoodsLabelCode2 can be a coded representation of a label for a dangerous good. In some implementations, DangerousGoodsLabelCode's values are dependant on the DangerousGoodsRegulationsCode. DangerousGoodsLabelCode2 can be based on GDT: DangerousGoodsLabelCode. DangerousGoodsLabelCode3 can be a coded representation of a label for a dangerous good. In some implementations, DangerousGoodsLabelCode's values are dependant on the DangerousGoodsRegulationsCode. DangerousGoodsLabelCode3 can be based on GDT: DangerousGoodsLabelCode. PackagingInstructionTypeCode can be a coded representation of a packaging instruction. In some implementations, a packaging instruction can be an instruction defining which packaging can be used to pack a dangerous good. PackagingInstructionTypeCode can be based on GDT: PackagingInstructionTypeCode. TransportMeansDescriptionCode can be a coded representation of a transport means type with which goods or persons can be transported. TransportMeansDescriptionCode can be based on GDT: TransportMeansDescriptionCode. TransportAuthorisationCode can be a coded representation of an authorisation for the transportation of dangerous goods. This code can specify an authorisation for the transportation of a particular dangerous good. TransportAuthorisationCode can be based on GDT: DangerousGoodsTransportAuthorisationCode.

ContactInformation can specify information on a department or person to whom information regarding dangerous goods can be directed. The structure of ContactInformation includes the elements ContactPersonFunctionTypeCode, and Address. ContactPersonFunctionTypeCode can be a coded representation of the type of function that a contact person has. ContactPersonFunctionTypeCode can be based on GDT: ContactPersonFunctionTypeCode. Address can be an address related to the contact information defined by a corresponding FunctionTypeCode. Address can be based on GDT: Address.

TextCollection can be a group of textual information that relates to DangerousGoods. The structure of the TextCollection entity includes the TextCollection element. TextCollection can be based on GDT: TextCollection.

The TransportationChargesInformation package includes information regarding transportation charge calculation specific components related to a FreightRequest. The TransportationChargesInformation package includes the TransportationChargesInformation entity. The entity TransportationChargesInformation can define a relationship between transportation charges and the origin of these charges. TransportationChargesInformation includes the TransportationCharges entity. The structure of TransportationChargesInformation includes the following elements: TransportationChargesUsageCode, RequestForSupplierFreightQuotePartyStandardID, RequestForSupplierFreightQuoteTransportationUnitResourceID, and RequestForSupplierFreightQuoteTransportationStageID.

TransportationChargesUsageCode can be a coded representation of the usage of TransportationCharges. The usage can point out if subsequent information represents a revenue view or cost view on transportation charges. TransportationChargesUsageCode can be based on GDT: TransportationChargesUsageCode. RequestForSupplierFreightQuotePartyStandardID can be a unique identifier of a Party in a FreightRequest, and can be based on GDT: PartyStandardID. RequestForSupplierFreightQuoteTransportationUnitResourceID can be a unique identification of a TransportationUnitResource in a FreightRequest, and can be based on GDT: ResourceID. RequestForSupplierFreightQuoteTransportationStageID can be a unique identification of a TransportationStage in a FreightRequest, and can be based on GDT: TransportationStageID. If none of the IDs is maintained, the transportation charges may be related to an entire freight request.

TransportationCharges can be a summary of determined transportation charge specific components for a transportation business case. TransportationCharges includes the following entities: Location, TextCollection, Currency, ExchangeRate, PercentElement, DateTimePeriod, BusinessTransactionDocumentReference, TaxDetail, PaymentInstruction, CashDiscountTerms, and Element. The structure of TransportationCharges includes the following elements: ID, FreightAgreementID, CalculationOriginCode, TariffID, and CalculationSheetID. ID can be a unique identifier of TransportationCharges in a ShipmentRequest, and can be based on GDT: TransportationChargesID. FreightAgreementID can be an identification of a Freight Agreement which includes and points to a configuration for the Transportation Charges Calculation.

FreightAgreementID can be based on GDT: FreightAgreementID. CalculationOriginCode can be a coded representation of an origin of a transportation charges calculation. The calculation can be done automatically based on a system configuration. Data for the calculation, including the results, can be manually entered or received from another business system via a message. In some implementations, a clear distinction of the origin of TransportationChargesCalculation details such as the TransportationChargesCalculationSheet and its TransportationChargeElements can be included. The included details can give information whether the calculation was done completely automatically, or if the results were manually adopted. CalculationOriginCode can be based on GDT: TransportationChargesOriginCode.

TariffID can be an identifier for a transportation charges tariff. A transportation charges tariff can be a specific combination of a transportation charges calculation sheet and terms and conditions. The terms and conditions can define if a certain transportation charges calculation sheet and its related rates are applicable for a transportation business case. TariffID can be based on GDT: TransportationChargesTariffID. CalculationSheetID can be a unique Identifier for a transportation charges calculation sheet. A TransportationChargesCalculationSheet can represent a configuration how to calculate transportation charges for a transportation business case. A TransportationChargesCalculationSheet includes instructions describing which charges are applicable, which data from a transportation business case may be considered for a calculation, how the underlying transportation charge rates are determined and which special calculation methods can be considered. CalculationSheetID can be based on GDT: TransportationChargesCalculationSheetID.

A Location can specify a physical place to which TransportationCharges and their calculation can refer. Location includes the DateTimePeriod entity. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location, and can be based on GDT: LocationTypeCode. Name can be a name of a location, and can be based on GDT: MEDIUM_Name, Qualifier:Location.

DateTimePeriods can specify a date, time and/or period related to a TransportationChargesLocation. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of a PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TextCollection can be a group of textual information that relates to the TransportationCharges. The structure of the TextCollection entity includes the TextCollection element. TextCollection can be based on GDT: TextCollection.

Currency can be a currency which is valid for transportation charges. The structure of Currency includes the following elements: Code, RoleCode, and UsageCode. Code can be a coded representation of a currency, and can be based on GDT: CurrencyCode. RoleCode can be a coded representation of a role of a Currency, and can be based on GDT: CurrencyRoleCode. UsageCode can be a coded representation of how a currency is used, and can be based on GDT: CurrencyUsageCode. This currency can be valid for transportation charges, as long as there is no currency information on a charge element level.

ExchangeRate can be an exchange rate that has been especially negotiated for transportation charges. The structure of ExchangeRate includes the ExchangeRate and TypeCode elements. ExchangeRate can be a rate at which one unit of a currency can be changed into another currency. ExchangeRate can be based on GDT: ExchangeRate. TypeCode can be a coded representation of a type of an exchange rate. The actual exchange rate between two currencies can depend on an exchange rate type and currency conversion type. The exchange rate type can define characteristics of an exchange rate according to currencies that get converted. TypeCode can be based on GDT: ExchangeRateTypeCode.

PercentElement can be a detail about Transportation Charges, represented as a percentage. The structure of PercentElement includes the elements PercentRoleCode, Percent, TransportationChargesPercentCalculationBaseCode, and StatusCode. PercentRoleCode can be a coded representation of a role of a percent, and can be based on GDT: PercentRoleCode. Percent can be a number that relates to the comparison FIG. 100. Percent can be based on CDT: Percent. TransportationChargesPercentCalculationBaseCode can be a coded representation of a calculation base for a transportation charges percent. TransportationChargesPercentCalculationBaseCode can be based on GDT: TransportationChargesPercentCalculationBaseCode. StatusCode can be a coded representation of a status for a transportation charges percent element, and can be based on GDT: TransportationChargesPercentElementStatusCode.

DateTimePeriod can specify a date, time and/or period that is relevant for a transportation charges calculation. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

A BusinessTransactionDocumentReference can specify a business document reference that is related to a transportation charges calculation. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

A TaxDetail can be tax-relevant information which is applicable for each ChargeElement. The structure of TaxDetail includes the ProductTax element. ProductTax can be a tax that is incurred for product-related business transactions, such as purchasing, sales, or consumption. The ProductTax can be used to display different tax components in calculated and invoiced amounts, and to inform about tax declarations and payments of a company to responsible tax authorities. ProductTax can be based on GDT: ProductTax. In some implementations, within TaxDetail, the BusinessTransactionDocumentItemGroupID of the GDT ProductTax is not used.

PaymentInstruction can be an instruction about how a payment can be carried out or which additional activities can be carried out within a payment. There can be a separate instance for each Charge Category Code, such as Basic Freight, Origin haulage, or charges. The structure of PaymentInstruction includes the following elements: PaymentInstruction, TransportationChargesElementCategoryCode, TransportationChargesElementSubCategoryCode, and TransportationChargesPaymentArrangementCode. PaymentInstruction can be an instruction about how a payment can be carried out or which additional activities can be carried out within a payment. PaymentInstruction can be based on GDT: PaymentInstruction. TransportationChargesElementCategoryCode can be a coded representation of a category of a TransportationChargeElement.

The TransportationChargeElementCategoryCode can be used to group TransportationChargeElements. PaymentInstructions can be different per TransportationChargeElementCategory. TransportationChargesElementCategoryCode can be based on GDT: TransportationChargesElementCategoryCode. TransportationChargesElementSubCategoryCode can be a coded representation of a subcategory of a transportation charges element. TransportationChargesElementSubCategoryCode can be based on GDT: TransportationChargesElementSubCategoryCode. TransportationChargesPaymentArrangementCode can be a coded representation of an arrangement of a payment for transportation charges. TransportationChargesPaymentArrangementCode can be based on GDT: TransportationChargesPaymentArrangementCode.

CashDiscountTerms can be an agreement on a percentage of a cash discount that is granted during a transportation transaction when a payment takes place within a certain number of days after a baseline date for payment has passed. The structure of CashDiscountTerms includes the following elements: CashDiscountTerms, TransportationChargesElementCategoryCode, and TransportationChargesElementSubCategoryCode. CashDiscountTerms can be an agreement of cash discounts for a payment, and can be based on GDT: CashDiscountTerms. TransportationChargesElementCategoryCode can be a coded representation of a category of a TransportationChargesElement.

The TransportationChargesElementCategoryCode can be used to group TransportationChargesElements. PaymentInstructions can be different per TransportationChargesElementCategory. TransportationChargesElementCategoryCode can be based on GDT: TransportationChargesElementCategoryCode. TransportationChargesElementSubCategoryCode can be a coded representation of a subcategory of a transportation charges element. TransportationChargesElementSubCategoryCode can be based on GDT: TransportationChargesElementSubCategoryCode.

Element can be, together with its sub nodes, a single building block of a transportation charge calculation. A Charge Element can result from a manually created charge, an automatically determined charge, or another Charge Element distributed from an entire document. A Charge Element includes the following entities: Location, TextCollection, Currency, RateElement, PercentElement, AmountElement, CalculationBase, TaxDetail, DateTimePeriod, and CostDistribution. The structure of Element includes the following elements: CategoryCode, SubCategoryCode, TypeCode, CalculationResolutionCode, and TransportationChargesPaymentArrangementCode. CategoryCode can be a coded representation of a category of a TransportationChargesElement.

The TransportationChargesElementCategoryCode can be used to group TransportationChargesElements. PaymentInstructions can be different per TransportationChargesElementCategory. CategoryCode can be based on GDT: TransportationChargesElementCategoryCode. SubCategoryCode can be a coded representation of a subcategory of a transportation charges element. SubCategoryCode can be based on GDT: TransportationChargesElementSubCategoryCode. TypeCode can be a coded representation of a type of a transportation charge element. TypeCode can be based on GDT: TransportationChargesElementTypeCode. CalculationResolutionCode can be a coded representation of a resolution for a transportation charges element calculation. CalculationResolutionCode can be based on GDT: TransportationChargesElementCalculationResolutionCode. TransportationChargesPaymentArrangementCode can be a coded representation of an arrangement of a payment for transportation charges. TransportationChargesPaymentArrangementCode can be based on GDT: TransportationChargesPaymentArrangementCode.

Location can specify a physical place a specific ChargeElement refers to. Location includes the DateTimePeriod entity. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location. TypeCode can be based on GDT: LocationTypeCode. Name can be a name of a location, and can be based on GDT: MEDIUM_Name, Qualifier:Location.

DateTimePeriods can specify a date, time and/or period related to a location. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TextCollection can be a group of textual information that relates to a ChargeElement. The structure of the TextCollection entity includes the TextCollection element. TextCollection can be based on GDT: TextCollection.

Currency can emphasize if the ChargeElement may be considered with relation to a certain currency. The structure of Currency includes the following elements: Code, RoleCode, and UsageCode. Code can be a coded representation of a currency, and can be based on GDT: CurrencyCode. RoleCode can be a coded representation of a role of a Currency, and can be based on GDT: CurrencyRoleCode. UsageCode can be a coded representation of how a currency is used. UsageCode can be based on GDT: CurrencyUsageCode. This currency can be valid for transportation charges, as long as there is no currency information on a charge element level.

RateDetail can specify a rate with which the ChargeElement is calculated. The structure of RateElement includes the following elements: ID, Amount, BaseQuantity, TransportationChargesRateTypeCode, TransportationChargesRateRoleCode, and TransportationChargesRateElementStatusCode. ID can be a unique identifier of a rate element of a transportation charges element, and can be based on GDT: TransportationChargesElementRateElementID. Amount can be an amount with a corresponding currency unit, or a monetary amount of a rate. Amount can be based on CDT: Amount. BaseQuantity can be a non-monetary numerical specification of an amount in a unit of measurement, or a quantity to which an amount refers.

BaseQuantity can be based on CDT: Quantity, Qualifier: Base. TransportationChargesRateTypeCode can be a coded representation of a TransportationChargeRate type. Examples include gross weight rate and net weight rate. TransportationChargesRateTypeCode can be based on GDT: TransportationChargesRateTypeCode. TransportationChargesRateRoleCode can be a coded representation of a role of a TransportationChargeRate. Examples include an invoice rate and a rate for calculation purposes. TransportationChargesRateRoleCode can be based on GDT: TransportationChargesRateRoleCode. TransportationChargesRateElementStatusCode can be a coded representation of a status of a transportation charges rate element. TransportationChargesRateElementStatusCode can be based on GDT: TransportationChargesRateElementStatusCode.

PercentElement can be a detail about a transportation charges element represented as a percentage. The structure of PercentElement includes the following elements: PercentRoleCode, Percent, TransportationChargesPercentCalculationBaseCode, and StatusCode. PercentRoleCode can be a coded representation of a role of a percent, and can be based on GDT: PercentRoleCode. Percent can be a number that relates to the comparison FIG. 100. Percent can be based on CDT: Percent. TransportationChargesPercentCalculationBaseCode can be a coded representation of a calculation base for a transportation charges percent. TransportationChargesPercentCalculationBaseCode can be based on GDT: TransportationChargesPercentCalculationBaseCode. StatusCode can be a coded representation of a status for a transportation charges percent element, and can be based on GDT: TransportationChargesPercentElementStatusCode.

AmountElement can represent a monetary aspect of a Transportation Charge. AmountElement can be a result of a transportation charge calculation. There can be a separate instance for each monetary amount per AmountRoleCode. AmountElement includes the RateElementAssignment entity. The structure of AmountElement includes the following elements: Amount, AmountRoleCode, and TransportationChargesAmountElementStatusCode. Amount can be an amount with a corresponding currency unit, and can be based on CDT: Amount. AmountRoleCode can be a coded representation of a role of an amount, and can be based on GDT: AmountRoleCode. TransportationChargesAmountElementStatusCode can be a coded representation of a status of an amount element of transportation charges or its transportation charges element. TransportationChargesAmountElementStatusCode can be based on GDT: TransportationChargesAmountElementStatusCode.

RateElementAssignment can be an assignment of an amount to a RateElement. TransportationChargesElementRateElementID can be a unique Identifier of a rate element of a transportation charges element. TransportationChargesElementRateElementID can be based on GDT: TransportationChargesElementRateElementID.

CalculationBase can be data which can be included with the RateDetail as a basis for calculating an Amount. The structure of CalculationBase includes the following elements: TransportationChargesElementCalculationBaseCode, BaseQuantity, BaseQuantityRoleCode, and BaseQuantityTypeCode. TransportationChargesElementCalculationBaseCode can be a coded representation of a calculation base of a transportation charges element. TransportationChargesElementCalculationBaseCode can be based on GDT: TransportationChargesElementCalculationBaseCode. BaseQuantity can be a non-monetary numerical specification of an amount in a unit of measurement. BaseQuantity can be the value of a calculation base as a quantity. BaseQuantity can be based on GDT: Quantity, Qualifier: Base. BaseQuantityRoleCode can be a coded representation of a role of a quantity. BaseQuantityRoleCode can be based on GDT: QuantityRoleCode. BaseQuantityTypeCode can be a coded representation of a type of quantity that is based on a measurable characteristic of an object or physical phenomenon. BaseQuantityTypeCode can be based on GDT: QuantityTypeCode.

TaxDetail can be tax-relevant information which is applicable for each ChargeElement. The structure of TaxDetail includes the ProductTax element. ProductTax can be a tax that is incurred for product-related business transactions, such as purchasing, sales, or consumption. The ProductTax can be used to display different tax components in calculated and invoiced amounts, and to inform about tax declarations and payments of a company to responsible tax authorities. ProductTax can be based on GDT: ProductTax. In some implementations, within TaxDetail, the BusinessTransactionDocumentItemGroupID of the GDT ProductTax is not used.

DateTimePeriod can specify a date, time and/or period related to a ChargeElement. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

CostDistribution can be information on how a ChargeElement can be allocated or distributed from a financial accounting point of view. The structure of CostDistribution includes the AccountingCodingBlockAssignment element. An AccountingCodingBlockAssignment can be an assignment of an item to a coding block. Items that are typically assigned to a coding block can be an amount that is known from context, a quantity, or a company resource such as office space or working time. A coding block can be a set of account assignment objects of different types. An account assignment object can be a business object to which value changes from business transactions are assigned in Accounting. AccountingCodingBlockAssignment can be based on GDT: AccountingCodingBlockAssignment.

In some implementations, the RequestForSupplierShipmentQuote package includes a SupplierFreightQuoteAssignmentInformation package which can include information for supplier freight quote assignments. The RequestForSupplierFreightQuoteAssignmentInformation package includes the TransportationStageAssignment and TransportationUnitResourceInformationAssignment entities.

TransportationStageAssignment can specify an assignment of the RequestForSupplierShipmentQuote to a stage of the RequestForSupplierFreightQuote. The structure of RequestForSupplierFreightQuoteAssignmentInformation includes the element RequestForSupplierFreightQuoteTransportationStageID. RequestForSupplierFreightQuoteTransportationStageID can be a unique identifier of a TransportationStage in a RequestForSupplierFreightQuote, and can be based on GDT: TransportationStageID. TransportationUnitResourceInformationAssignment can specify an assignment of a RequestForSupplierShipmentQuote to a TransportationUnitResourceInformation of a RequestForSupplierFreightQuote. The structure of TransportationUnitResourceInformationAssignment includes the element RequestForSupplierFreightQuoteTransportationUnitResourceInformationID. RequestForSupplierFreightQuoteTransportationUnitResourceInformationID can be a unique identifier of a TransportationUnitResourceInformation in a RequestForSupplierFreightQuote. RequestForSupplierFreightQuoteTransportationUnitResourceInformationID can be based on GDT: TransportationUnitResourceID.

The TransportationUnitResourceInformation package includes information regarding a transportation unit resource relevant for a shipment request (e.g., a container). The TransportationUnitResourceInformation package includes the TransportationUnitResourceInformation entity. TransportationUnitResourceInformation includes information on one or more transportation unit resources, such as a resource type and related properties, related measures or handling instructions. A Transportation Unit Resource can be a unit into which goods are loaded and/or from which goods are unloaded. In some implementations, this unit can provide transportation capacity for goods but might not move by itself. TransportationUnitResourceInformation includes the following entities: TransportationStageAssignment, AttachedEquipment, Quantity, Seal, BusinessTransactionDocumentReference, TextCollection, Location, and DangerousGoods. The structure of TransportationUnitResourceInformation includes the following elements: ID, ResourceNumberValue, ResourceID, ResourceHomeCountryCode, TransportationUnitResourceCategoryCode, TransportationUnitResourceTypeCode, FillLevelCode, ShippingTypeCode, HaulageArrangerCode, TransportationHandlingInstructionCode, and TransportationHandlingInstructionNote. ID can be a unique identifier for a resource information, and can be based on GDT ResourceInformationID. ResourceNumberValue can be a number of resources, and can be based on GDT: NumberValue, Qualifier: Resource. ResourceID can be a unique identifier for a resource, and can be based on GDT: ResourceID. ResourceHomeCountryCode can be a coded representation of the home country of a resource, and can be based on GDT: CountryCode, Qualifier: ResourceHome. TransportationUnitResourceCategoryCode can be a coded representation of a category of transportation unit resources, and can be based on GDT: TransportationUnitResourceCategoryCode. TransportationUnitResourceTypeCode can be a coded representation of a transportation unit resource type.

TransportationUnitResourceTypeCode can be based on GDT: TransportationUnitResourceTypeCode. FillLevelCode can be a coded representation of a fill level of a resource, and can be based on GDT: FillLevelCode. ShippingTypeCode can be a coded representation of a shipping type. A shipping type can specify how planning and execution of a transportation can be performed. Transportation terms include detailed specifications on agreed means of transportation, such as shipping or transport type and means of transport to be used. ShippingTypeCode can be based on GDT: ShippingTypeCode. HaulageArrangerCode can be a coded representation of an arranger of a haulage. Haulage can be inland transport of cargo. HaulageArrangerCode can be based on GDT: HaulageArrangerCode. TransportationHandlingInstructionCode can be a coded representation of a type of a transportation handling instruction, and can be based on GDT: TransportationHandlingInstructionCode. TransportationHandlingInstructionNote can be a note regarding a transportation handling instruction, and can be based on GDT: LONG_Note, Qualifier: TransportationHandlingInstruction.

TransportationStageAssignment can specify an assignment of a transportation stage to a transportation unit resource information. The structure of TransportationStageAssignment includes the ShipmentRequestTransportationStageID element. ShipmentRequestTransportationStageID can be a unique identifier of a TransportationStage in a shipment request, and can be based on GDT: TransportationStageID.

AttachedEquipment can specify equipment attached to a TransportationUnitResource. The structure of AttachedEquipment includes the element ShipmentRequestResourceInformationID. ShipmentRequestResourceInformationID can be a unique identifier of a resource information in a ShipmentRequest, and can be based on GDT: ResourceInformationID.

Quantity can specify a quantity related to TransportationUnitResourceInformation. The structure of the Quantity entity includes the following elements: Quantity, RoleCode, and TypeCode. Quantity can be a non-monetary numerical specification of an amount in a unit of measurement. Quantity can be based on GDT: Quantity. RoleCode can be a coded representation of a role of a quantity, and can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them may be filled.

Seal can specify a seal related to a TransportationUnitResource. The structure of Seal includes the following elements: ID, PartyRoleCode, PartyFormattedName, and StatusCode. ID can be a unique identifier of a seal, and can be based on GDT: SealID. PartyRoleCode can be a coded representation of a party role, and can be based on GDT: PartyRoleCode. PartyFormattedName can be a complete, formatted name of a party, or the name of a SealingParty. PartyFormattedName can be based on GDT: LONG_Name, Qualifier: PartyFormatted. StatusCode can be a coded representation of a status of a seal, and can be based on GDT: SealStatusCode.

BusinessTransactionDocumentReference can specify a business document reference that is related to a TransportationUnitResource. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference. BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of a documentation type. TransportationDocumentTypeCode can be based on GDT: TransportationDocumentTypeCode. TransportationDocumentNote can be a short Note on documentation. TransportationDocumentNote can be based on GDT: SHORT_Note. TransportationDocumentID can be a unique identifier for a transportation document. TransportationDocumentID can be based on GDT: TransportationDocumentID. RelationshipTypeCode and RelationshipRoleCode are both optional. In some implementations, if used, both may be filled. Either the combination BusinessTransactionDocumentReference, BusinessTransactionDocumentRelationshipRoleCode, BusinessTransactionDocumentRelationshipTypeCode or TransportationDocumentTypeCode, TransportationDocumentNote, TransportationDocumentID may be filled.

DateTimePeriod can specify a date, time and/or period related to a BusinessTransactionDocumentReference. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of a PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TextCollection can be a group of textual information that relates to a TransportationUnitResource. The structure of the TextCollection entity includes the TextCollection element. TextCollection can be based on GDT: TextCollection.

Location can specify a physical place related to the TransportationUnitResource. The structure of Location includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole, and can be based on GDT: LocationRoleCode. TypeCode can be a coded representation of a type of a physical location. TypeCode can be based on GDT: LocationTypeCode. Name can be a name of a location, and can be based on GDT: MEDIUM_Name, Qualifier:Location.

DateTimePeriods can specify a requested and an acceptable date, time and period related to a Location of a resource. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantic of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

DangerousGoods can specify dangerous goods included in a resource. DangerousGoods includes the ContactInformation and TextCollection entities. The structure of DangerousGoods includes the following elements: ID, RegulationsCode, HazardCode, FlashpointMeasureInterval, PackagingGroupCode, EmergencySchedule, TransportEmergencyCardCode, DangerousGoodsLabelCode, DangerousGoodsLabelCode2, DangerousGoodsLabelCode3, PackagingInstructionTypeCode, TransportMeansDescriptionCode, and TransportAuthorisationCode. ID can be a unique identifier for a dangerous good, using the United Nations Dangerous Goods Number. ID can be based GDT: DangerousGoodsID. RegulationsCode can be a coded representation of national or international dangerous goods rules or regulations, and can be based on GDT: DangerousGoodsRegulationsCode. HazardCode can be a coded representation of a hazard that is imminent in a dangerous good. HazardCode can be based on GDT: DangerousGoodsHazardCode. FlashpointMeasureInterval can be an interval of measures defined by a lower and an upper boundary indicating a flashpoint of a dangerous good.

FlashpointMeasureInterval can be based on GDT: MeasureInterval, Qualifier: Flashpoint. PackagingGroupCode can be a coded representation of the effectiveness of a packaging to transport dangerous goods depending on the degree of danger of the goods. PackagingGroupCode can be based on GDT: DangerousGoodsPackagingGroupCode. EmergencySchedule can be a coded representation of an emergency schedule for dangerous goods. EmergencySchedule can identify an emergency schedule. The DangerousGoodsEmergencySchedule can be used for transports of dangerous goods by sea similar to a Transport Emergency Card which is used for transports of dangerous goods by road. EmergencySchedule can be based on GDT: DangerousGoodsEmergencySchedule. TransportEmergencyCardCode can be a coded representation of a transport emergency card which specifies how to react in case of an accident. TransportEmergencyCardCode can be based on GDT: TransportEmergencyCardCode.

DangerousGoodsLabelCode can be a coded representation of a label for a dangerous good. In some implementations, DangerousGoodsLabelCode's values are dependant on the DangerousGoodsRegulationsCode. DangerousGoodsLabelCode can be based on GDT: DangerousGoodsLabelCode. DangerousGoodsLabelCode2 can be a coded representation of a label for a dangerous good. In some implementations, DangerousGoodsLabelCode's values are dependant on the DangerousGoodsRegulationsCode. DangerousGoodsLabelCode2 can be based on GDT: DangerousGoodsLabelCode. DangerousGoodsLabelCode3 can be a coded representation of a label for a dangerous good. In some implementations, DangerousGoodsLabelCode's values are dependant on the DangerousGoodsRegulationsCode. DangerousGoodsLabelCode3 can be based on GDT: DangerousGoodsLabelCode.

PackagingInstructionTypeCode can be a coded representation of a packaging instruction. In some implementations, a packaging instruction is an instruction defining which packagings may be used to pack a dangerous good. PackagingInstructionTypeCode can be based on GDT: PackagingInstructionTypeCode. TransportMeansDescriptionCode can be a coded representation of a transport means type with which goods or persons can be transported. TransportMeansDescriptionCode can be based on GDT: TransportMeansDescriptionCode. TransportAuthorisationCode can be a coded representation of an authorisation for the transportation of dangerous goods. This code can specify an authorisation for the transportation of a particular dangerous good. TransportAuthorisationCode can be based on GDT: DangerousGoodsTransportAuthorisationCode.

ContactInformation can specify information on a department or person to whom information regarding dangerous goods can be directed. The structure of ContactInformation includes the ContactPersonFunctionTypeCode and Address elements. ContactPersonFunctionTypeCode can be a coded representation of a type of function that a contact person has. ContactPersonFunctionTypeCode can be based on GDT: ContactPersonFunctionTypeCode. Address can be an address related to contact information defined by a corresponding FunctionTypeCode. Address can be based on GDT: Address.

TextCollection can be a group of textual information that relates to the DangerousGoods. The structure of the TextCollection entity includes the TextCollection element. TextCollection can be based on GDT: TextCollection.

Message Data Type RequestForSupplierFreightQuoteCancelRequestMessage

The message data type RequestForSupplierFreightQuoteCancelRequestMessage can group together business information relevant for sending a business document in a message, and the RequestForSupplierFreightQuote object in a business document. The message data type RequestForSupplierFreightQuoteCancelRequestMessage includes the MessageHeader and RequestForSupplierFreightQuote packages.

A MessageHeader package can group together business information relevant for sending a business document in a message. The MessageHeader package includes the MessageHeader entity. A MessageHeader can group together business information from a perspective of the sending application, to identify a business document in a message, to provide information about the sender, and to provide information about the recipient. The MessageHeader can be divided up into the SenderParty and RecipientParty entities. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with the message. A contact person can be useful if an additional infrastructure, such as a marketplace, is located between the sender and the recipient. The SenderParty can be used to transfer a message and can be ignored by the receiving application. SenderParty can be filled by the sender if the participating parties are not transferred with the ShipmentRequest package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with the message. A contact person can be useful if an additional infrastructure, such as a marketplace, is located between the sender and the recipient. The RecipientParty can be used to transfer a message and can be ignored by the receiving application. RecipientParty can be filled by the sender if the ShipmentRequest package cannot be used to transfer the participating parties The RequestForSupplierFreightQuote package can group together information about the RequestForSupplierFreightQuote. The RequestForSupplierFreightQuote package includes the RequestForSupplierFreightQuote entity. RequestForSupplierFreightQuote can be a request from an ordering party to a supplier of a transportation service to submit a quote for the transportation of goods from one or more ship-from parties to one or more ship-to parties with requested terms and conditions. The structure of RequestForSupplierFreightQuote includes the ID element. ID can be a unique identifier for a RequestForSupplierFreightQuote. ID can be based on GDT: BusinessTransactionDocumentID.

SupplierFreightQuote Interfaces

A SupplierFreightQuote can be part of a Transportation Management subcontracting and tendering process, where transportation services can be tendered between transportation service providers. The terms and conditions of a transportation service, as well as the bidding rules of the tendering process, are included in the RequestForSupplierFreightQuote. The response of a supplier of a transportation service to a customer is included in the SupplierFreightQuote. A supplier, such as Transportation Customer Quote Processing, can respond to a customer, such as Transportation Supplier Quote Processing, with a freight quote by using the interfaces described below.

A SupplierFreightQuoteNotification can be a notification from a Supplier about a SupplierFreightQuote. The structure of the SupplierFreightQuoteNotification can be specified by the message data type SupplierFreightQuoteNotificationMessage. The message interface on the Supplier side includes SupplierFreightQuoteNotification_Out. The message interface on the Customer side includes SupplierFreightQuoteNotification_In.

Figure 125:

The message choreography of FIG. 125 describes a possible logical sequence of messages that can be used to realize a Transportation Management business scenario. A "Supplier" system 125000 can notify a "Customer" system 125002 about a freight quote, using a SupplierFreightQuoteNotification message 125004 as shown, for example in FIG. 125.

Figures 1, 126:
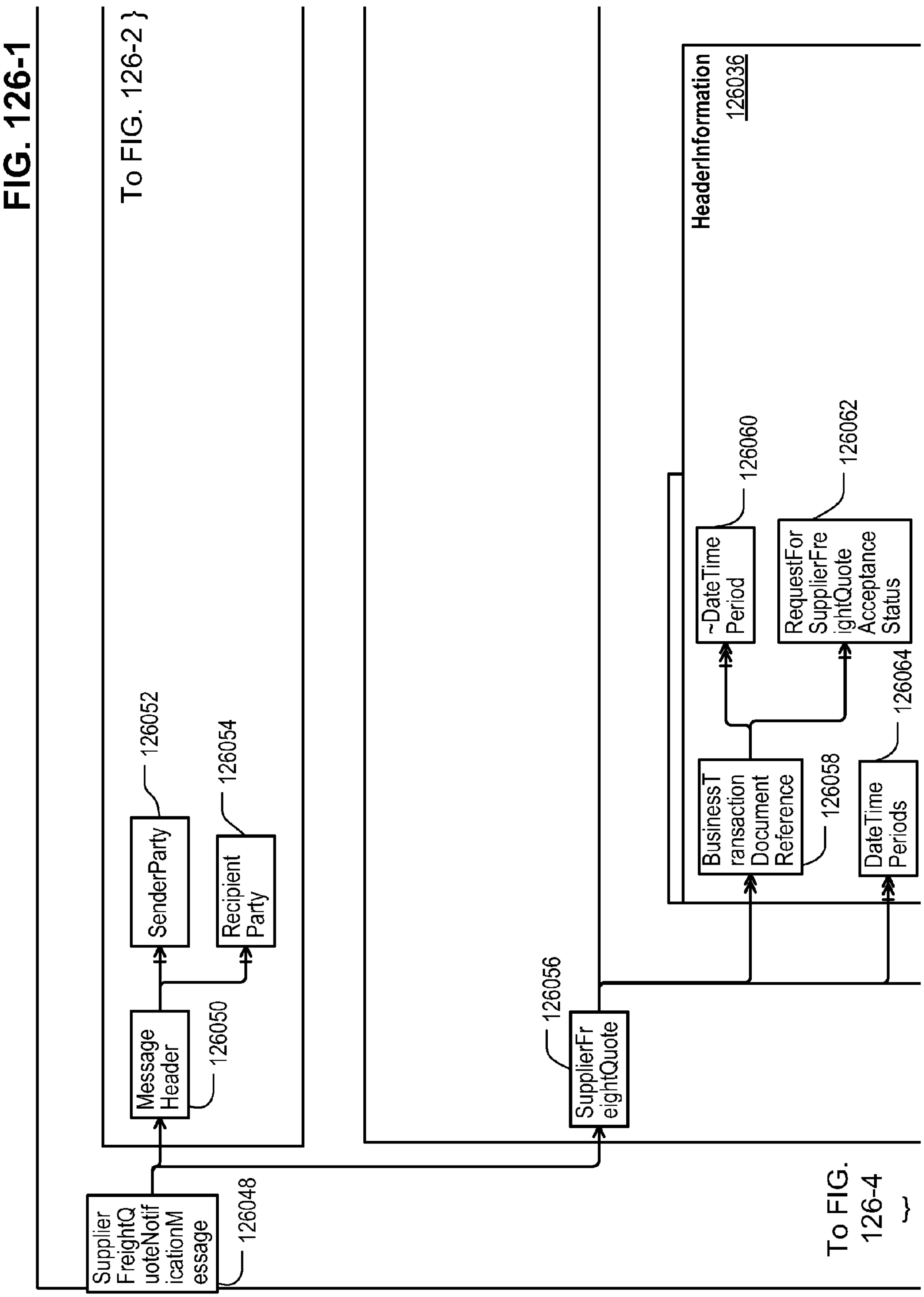
Figures 2, 126:
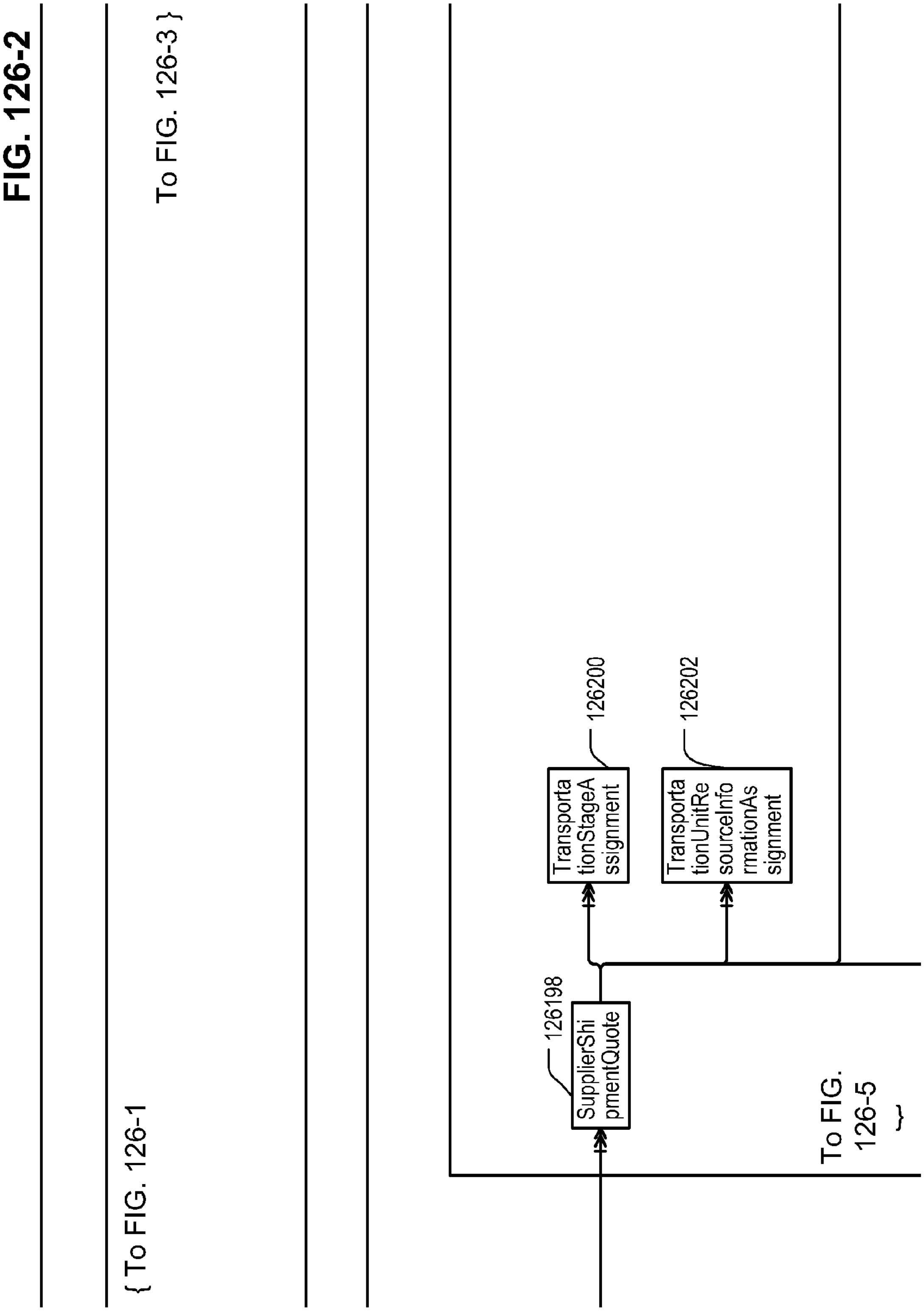
Figures 3, 126:
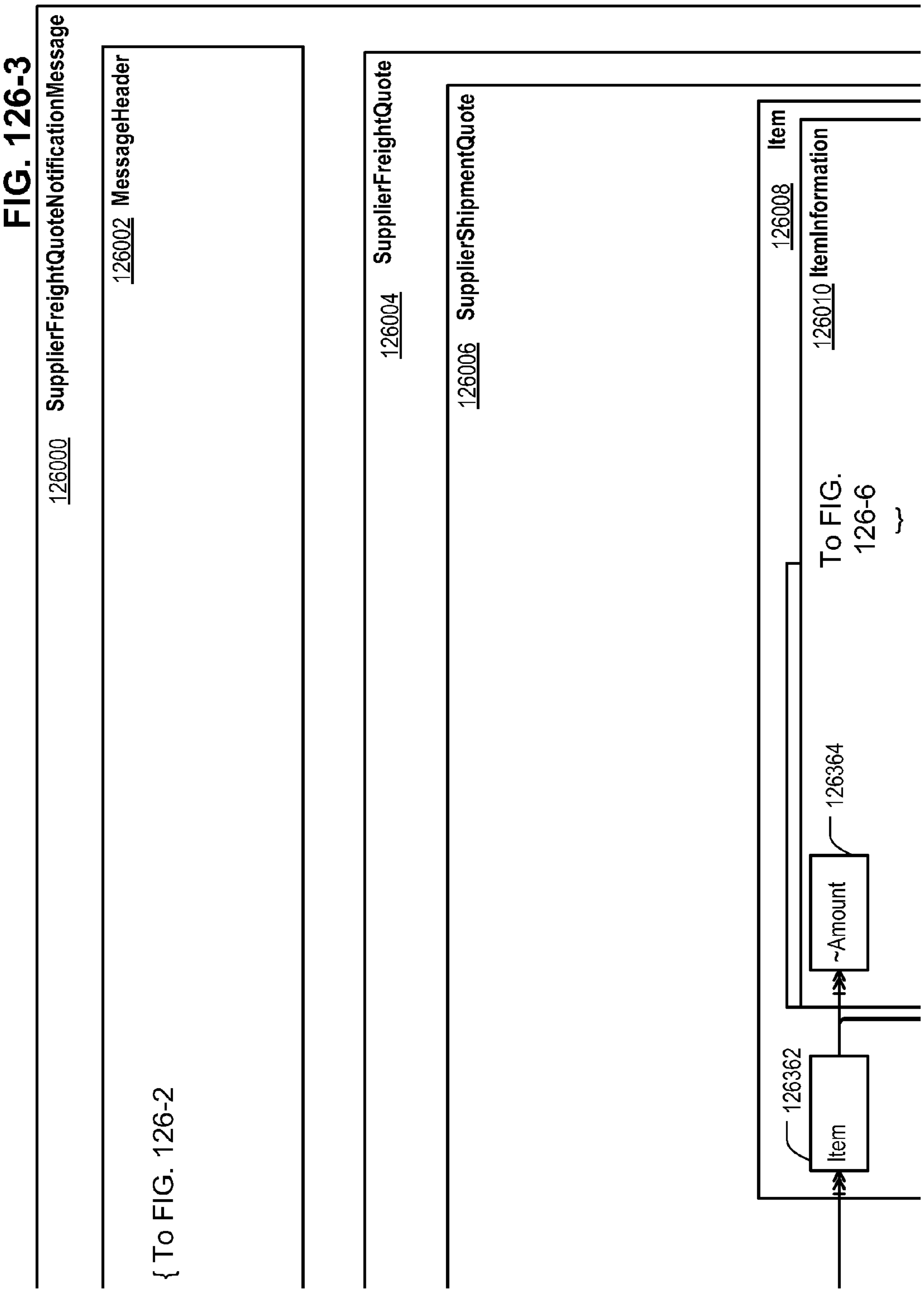
Figures 4, 126:
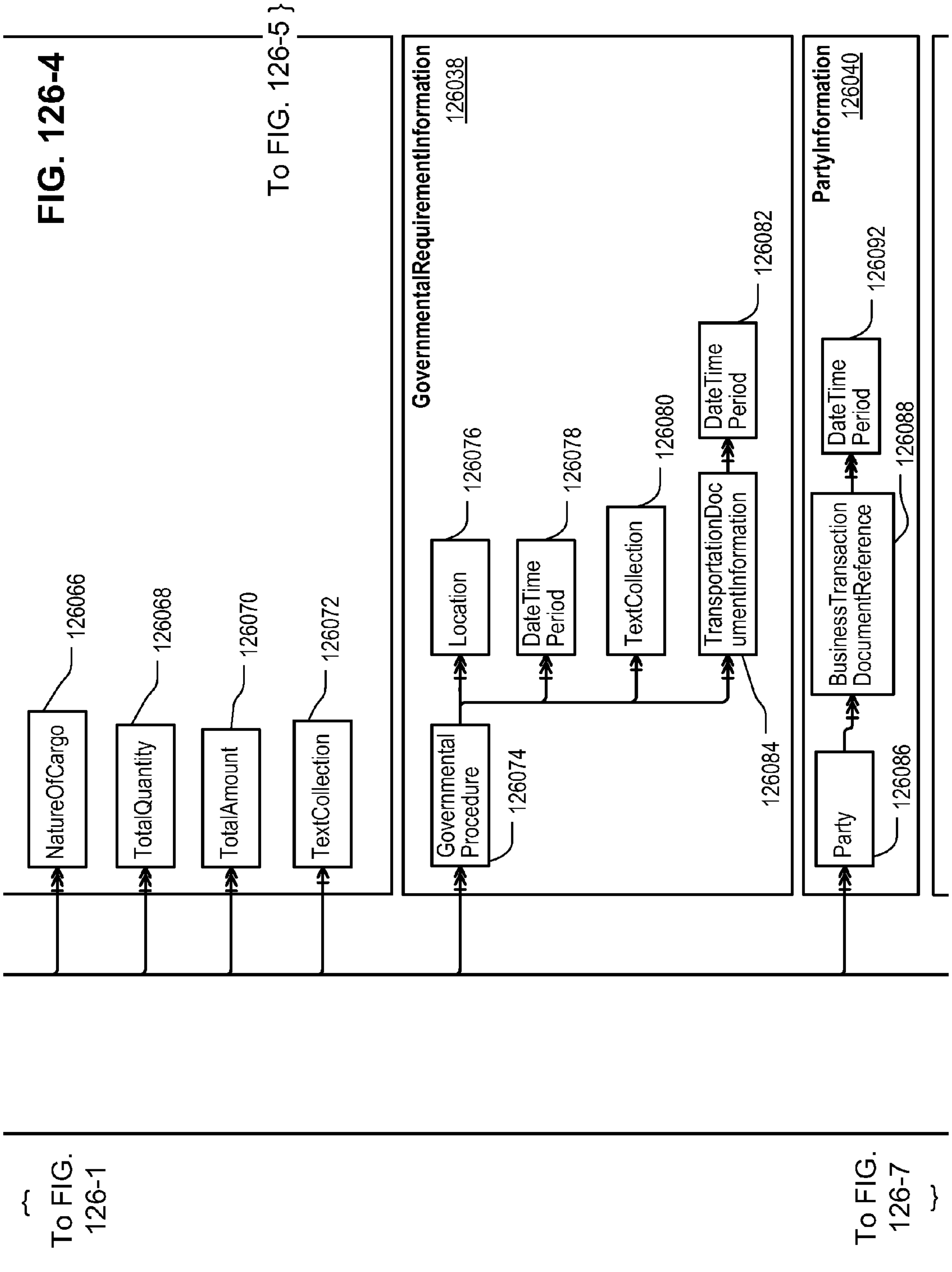
Figures 5, 126:
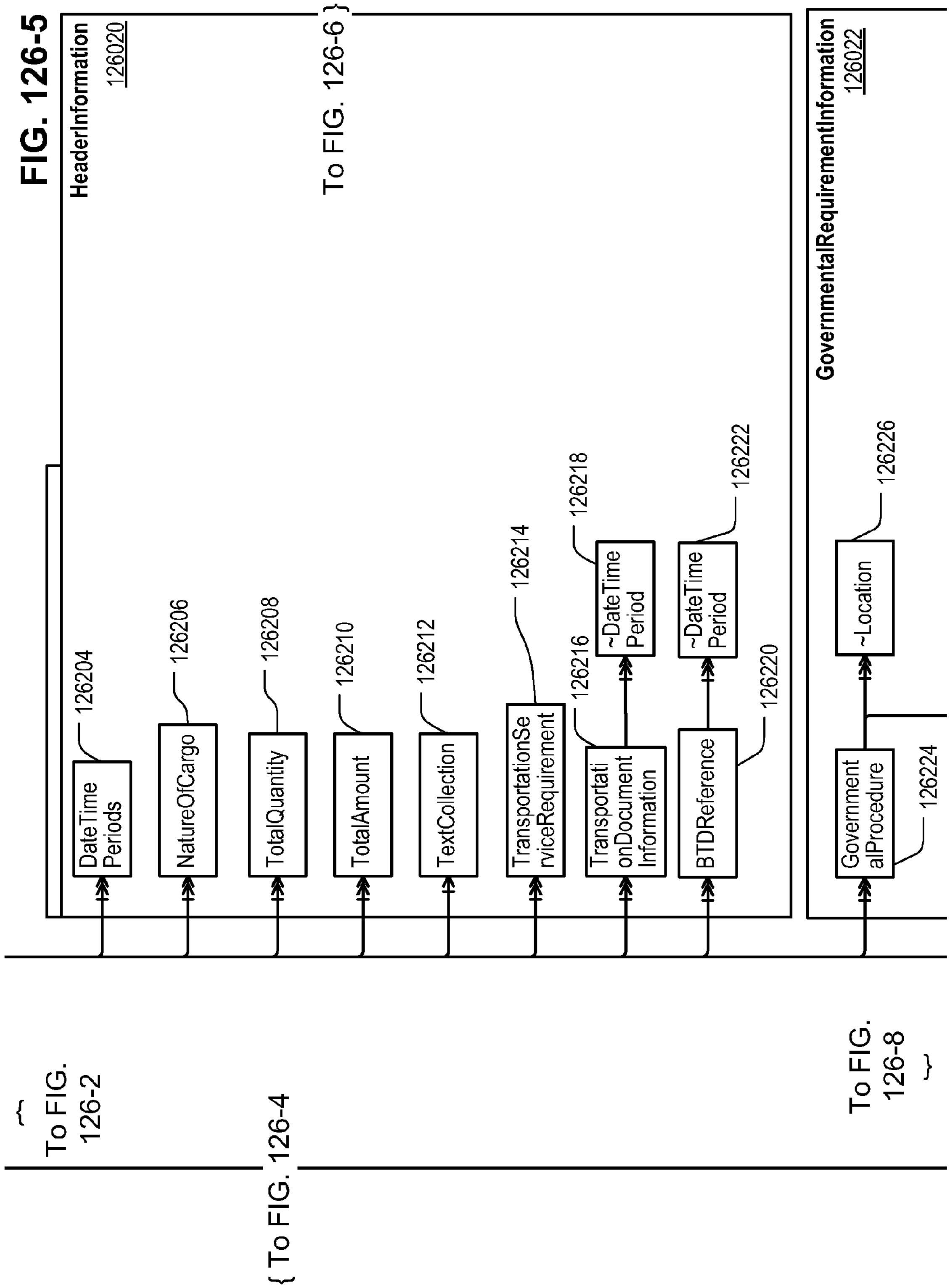
Figures 6, 126:
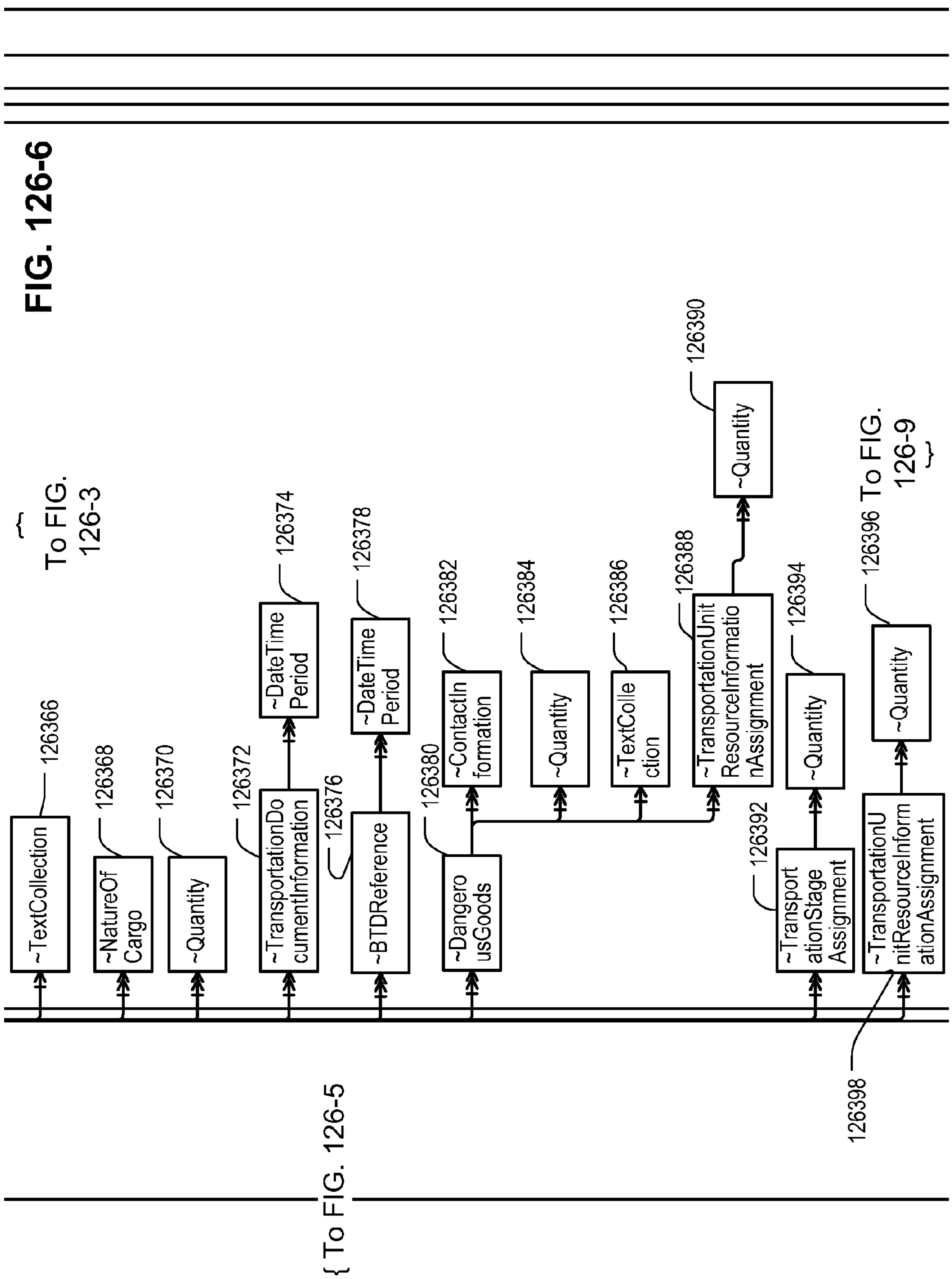
Figures 8, 126:
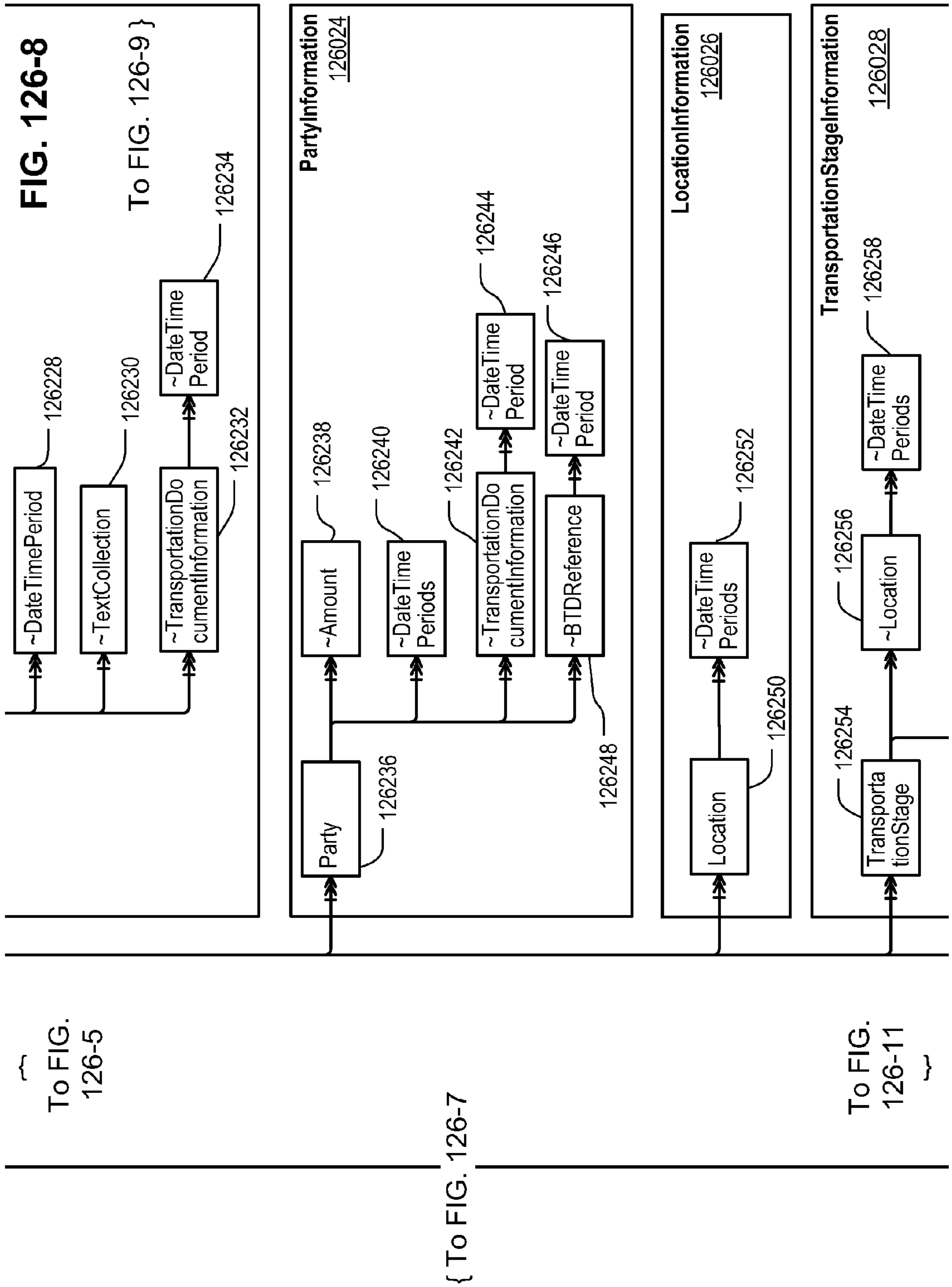
Figures 10, 126:
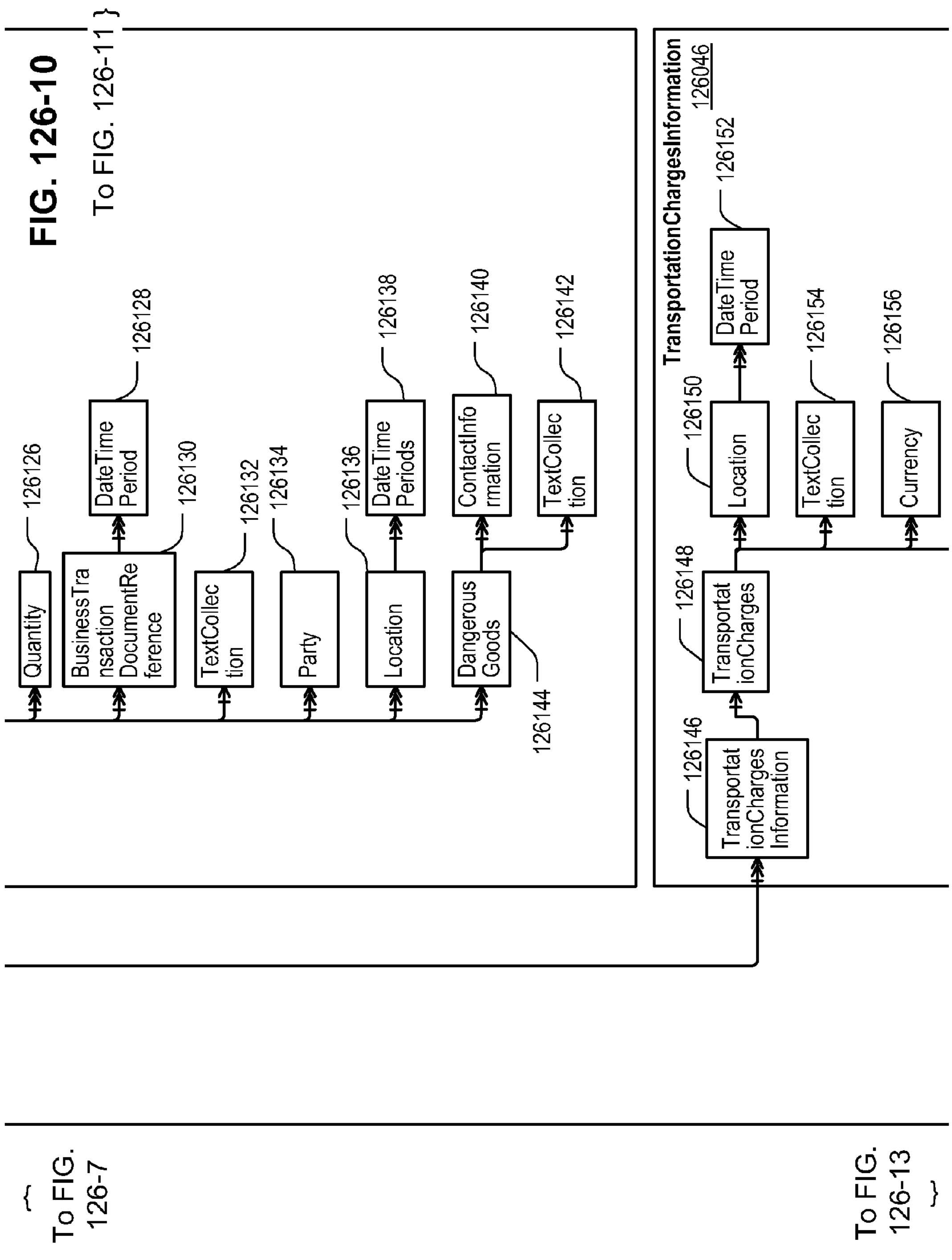
Figures 11, 126:
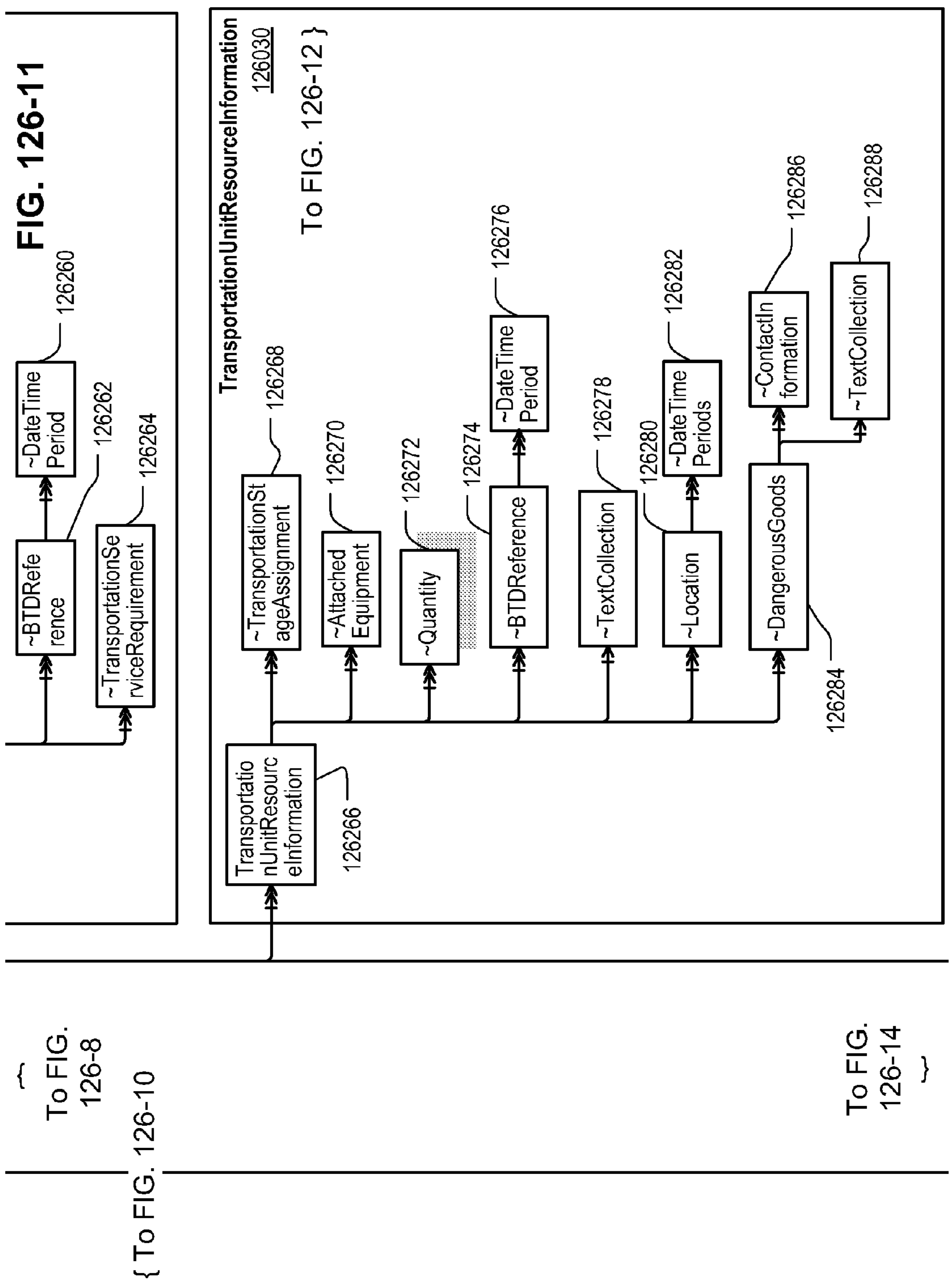
Figures 12, 126:
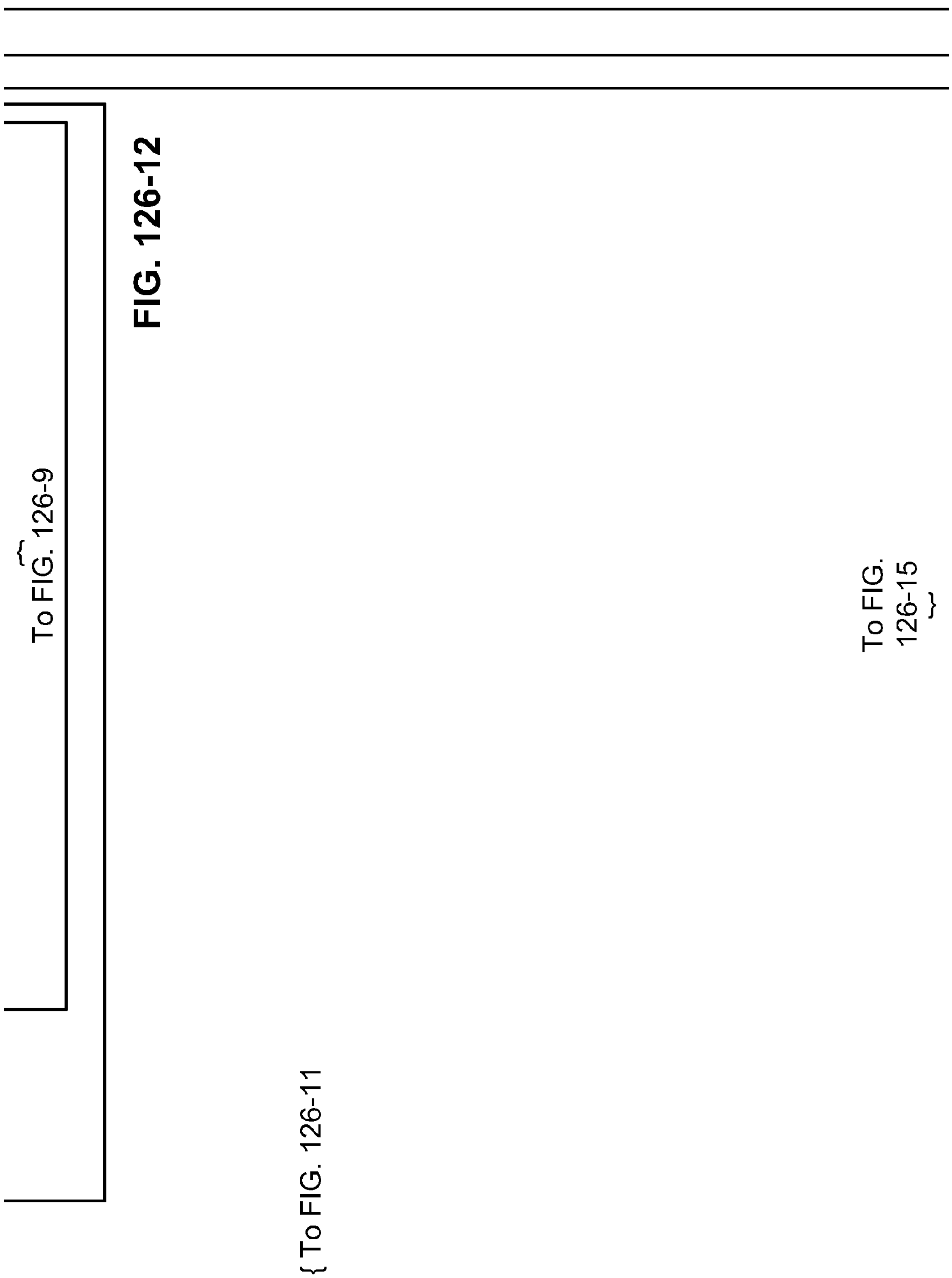
Figures 13, 126:
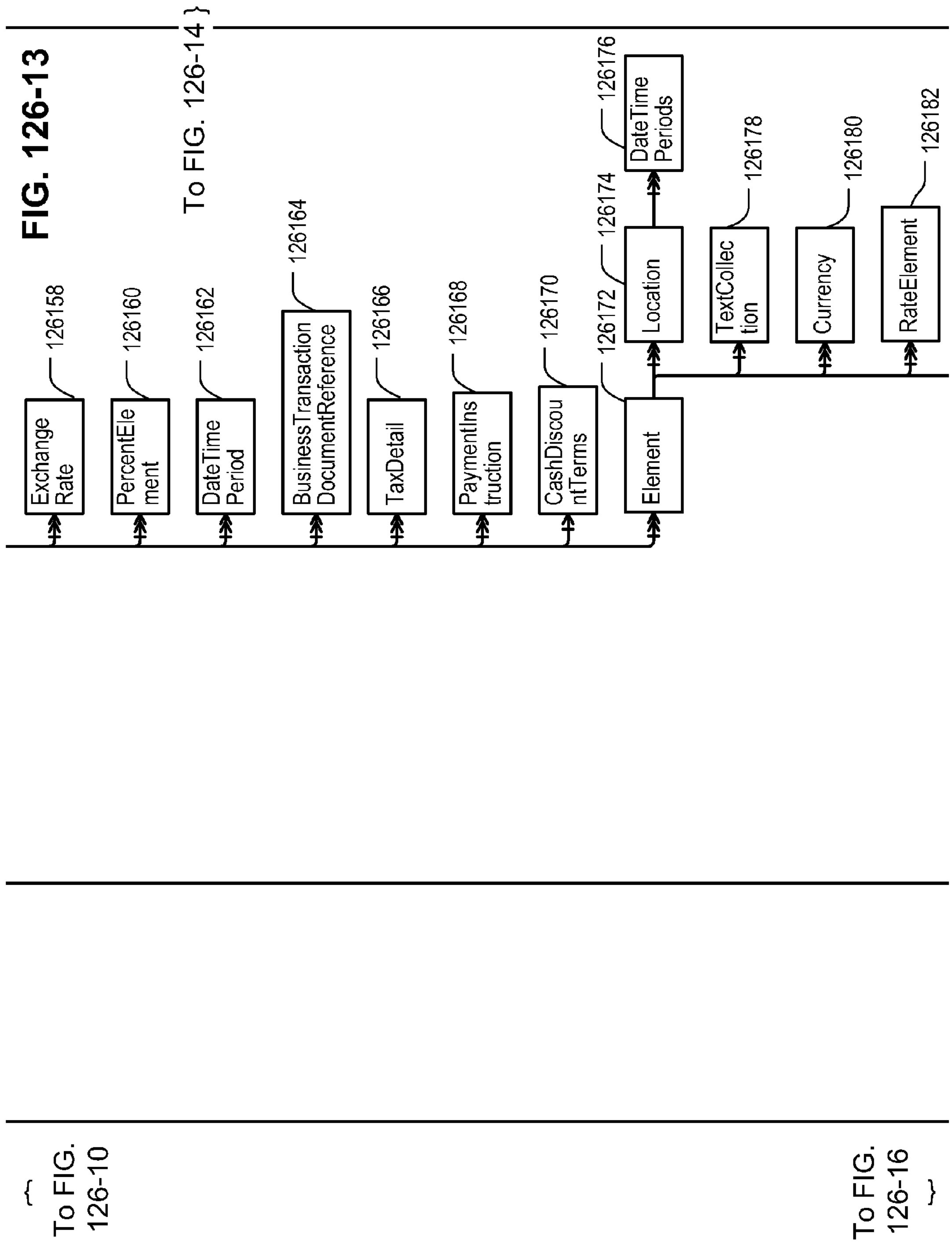
Figures 14, 126:
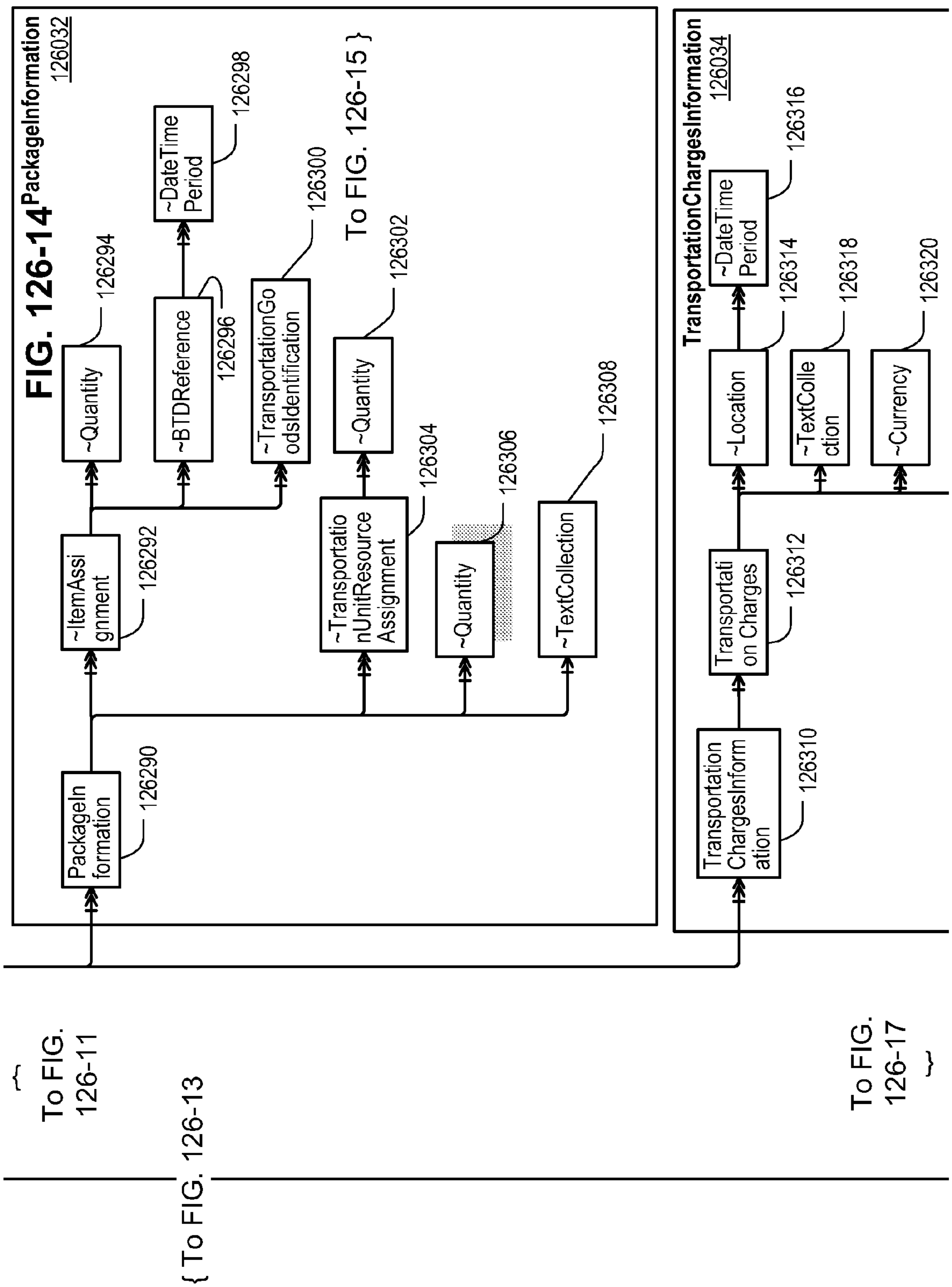
Figures 16, 126:
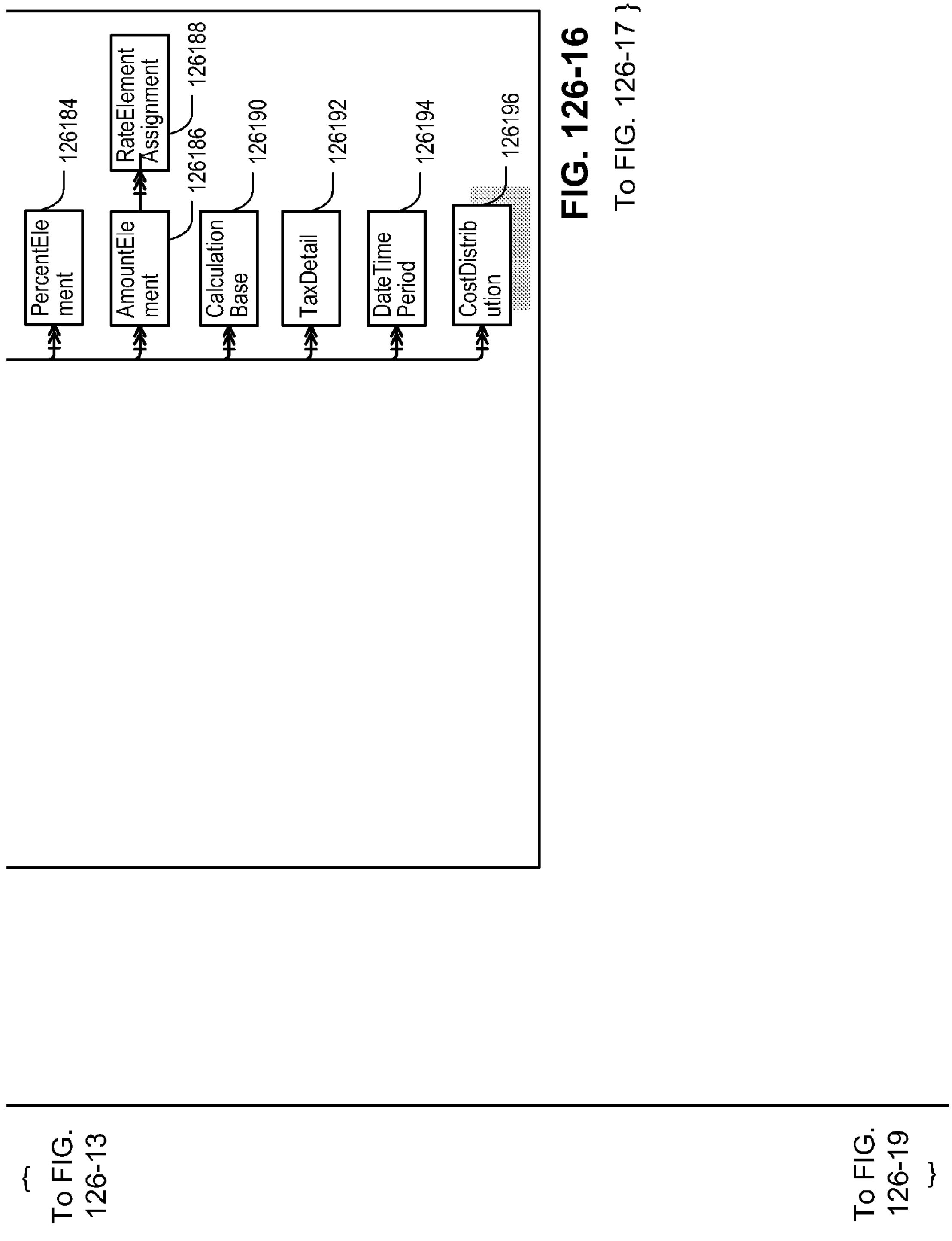
Figures 17, 126:
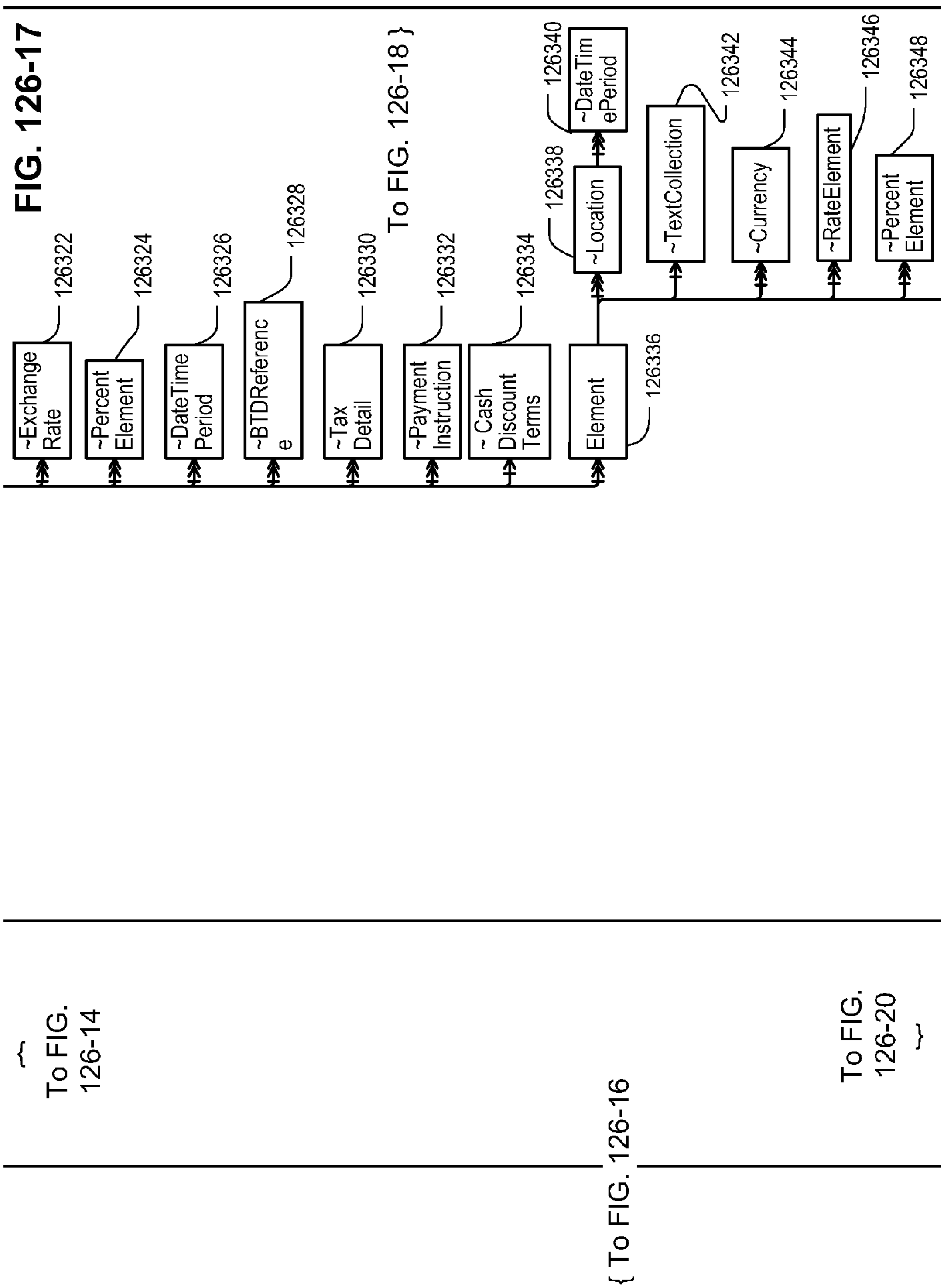
Figures 20, 126:
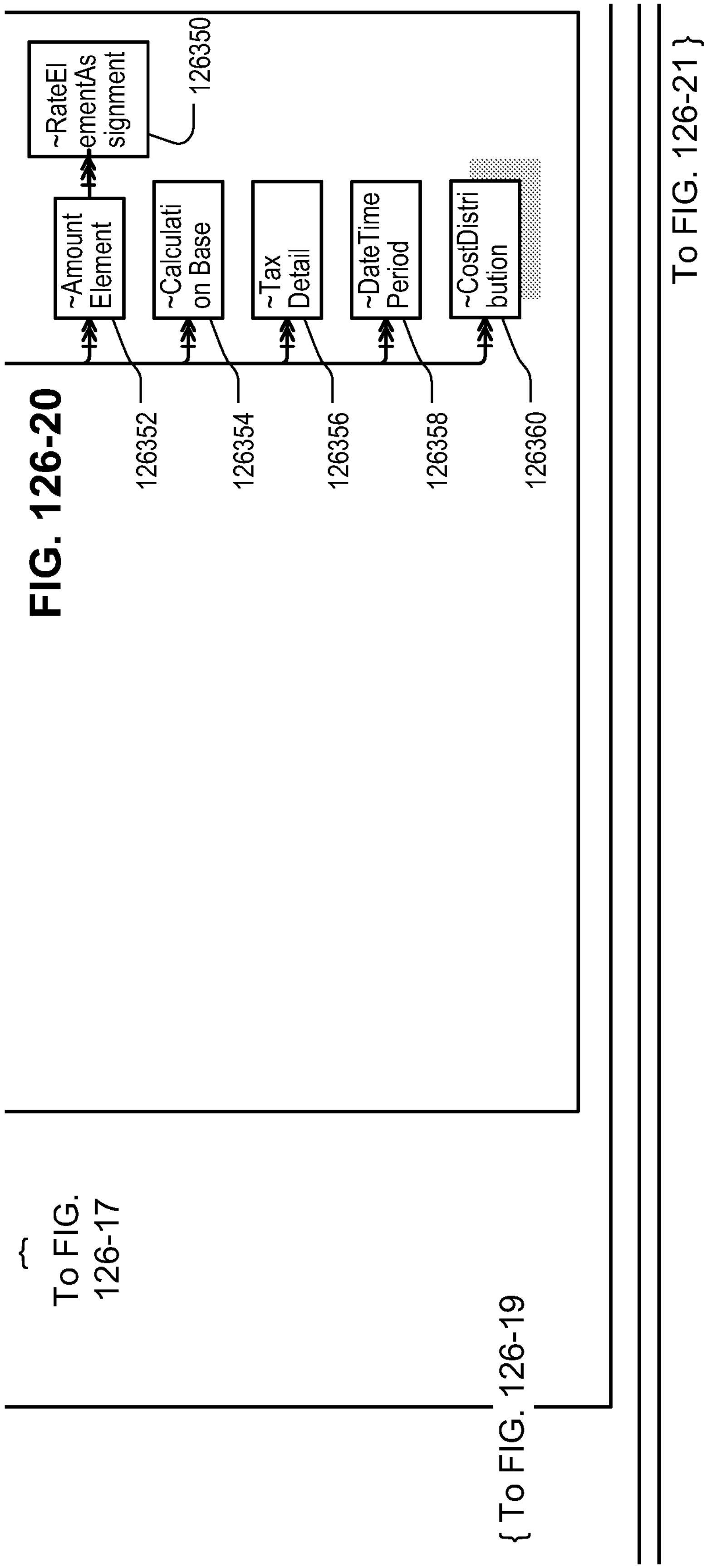
Figures 21, 126:
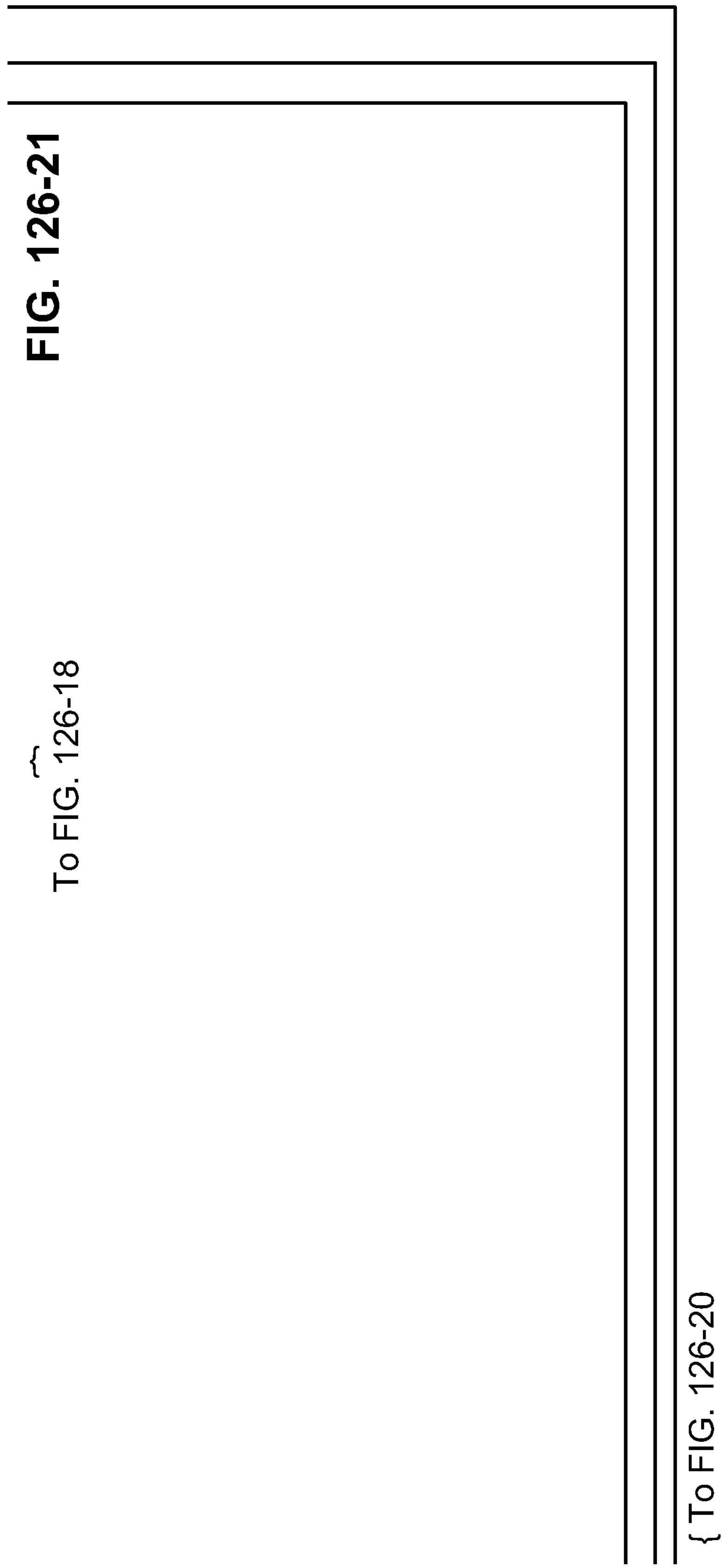

FIGS. 126-1 through 126-21 illustrate one example logical configuration of SupplierFreightQuoteNotificationMessage message 126000. Specifically, this figure depicts the arrangement and hierarchy of various components such as one or more levels of packages, entities, and datatypes, shown here as 126002 through 126422. As described above, packages may be used to represent hierarchy levels. Entities are discrete business elements that are used during a business transaction. Data types are used to type object entities and interfaces with a structure. For example, SupplierFreightQuoteNotificationMessage message 126000 includes, among other things, SupplierFreightQuote 126056. Accordingly, heterogeneous applications may communicate using this consistent message configured as such.

Additionally, FIGS. 127-1 through 127-158 illustrate one example logical configuration of a SupplierFreightQuoteNotificationMessage 1270000 element structure. Specifically, these figures depict the arrangement and hierarchy of various components such as one or more levels of packages, entities, and datatypes, shown here as 1270000 through 1274676. As described above, packages may be used to represent hierarchy levels. Entities are discrete business elements that are used during a business transaction. Data types are used to type object entities and interfaces with a structure. For example, the SupplierFreightQuoteNotificationMessage 1270000 includes, among other things, a SupplierFreightQuoteNotificationMessage entity 1270002. Accordingly, heterogeneous applications may communicate using this consistent message configured as such.

Message Data Type SupplierFreightQuoteNotificationMessage

The message data type SupplierFreightQuoteNotificationMessage includes business information relevant for sending a business document in a message and a SupplierFreightQuote included in a business document. The message data type SupplierFreightQuoteNotificationMessage includes the MessageHeader and SupplierFreightQuote packages.

A MessageHeader package can group together business information relevant for sending a business document in a message. The MessageHeader package includes the MessageHeader entity. A MessageHeader can group together business information from a perspective of the sending application to identify a business document in a message, to provide information about the sender, and to provide information about a recipient. The MessageHeader can be divided up into the SenderParty and RecipientParty. MessageHeader can be of type GDT: BusinessDocumentMessageHeader. The MessageHeader includes the following elements: ID, ReferenceID, and CreationDateTime. The MessageID can be set by the sending application. With the ReferencedMessageID, reference can be made in the current BusinessDocument to a previous BusinessDocument.

A SenderParty can be a party responsible for sending a business document at a business application level. The SenderParty can be of type GDT: BusinessDocumentMessageHeaderParty. The SenderParty includes the following elements: InternalID, StandardID, and ContactPerson. The SenderParty can be filled by the sending application to name a contact person for problems with a message. A contact person can be useful if an additional infrastructure, such as a marketplace, is located between the sender and the recipient. The SenderParty can be used to transfer a message and can be ignored by the receiving application. SenderParty can be filled by the sender if the participating parties are not transferred with the ShipmentRequest package.

A RecipientParty can be a party responsible for receiving a business document at a business application level. The RecipientParty can be of type GDT: BusinessDocumentMessageHeaderParty. The RecipientParty includes the following elements: InternalID, StandardID, and ContactPerson. The RecipientParty can be filled by the sending application to name a contact person for problems that may occur with a message. A contact person can be useful if an additional infrastructure, such as a marketplace, is located between the sender and the recipient. The RecipientParty can be used to transfer a message and can be ignored by the receiving application. In some implementations, RecipientParty may be filled by the sender if the ShipmentRequest package cannot be used to transfer the participating parties.

The SupplierFreightQuote package can group the SupplierFreightQuote together with its packages. The SupplierFreightQuote package includes the SupplierFreightQuote entity and the following packages: HeaderInformation, GovernmentalRequirementInformation, PartyInformation, TransportationStageInformation, TransportationUnitResourceInformation, TransportationChargesInformation, and SupplierShipmentQuote.

SupplierFreightQuote can be a quote from a supplier to an ordering party of a transportation service for the transportation of goods from one or more ship-from parties to one or more ship-to parties with requested terms and conditions. The structure of SupplierFreightQuote includes the ID element. ID can be a unique identifier for a SupplierFreightQuote. ID can be based on GDT: BusinessTransactionDocumentID.

The HeaderInformation package can group dates, total values, documents and references related to a shipment request. The HeaderInformation package includes the following entities: DateTimePeriods, NatureOfCargo, TotalQuantity, TotalAmount, TextCollection, TransportationServiceRequirement, TransportationDocumentInformation, and BusinessTransactionDocumentReference.

DateTimePeriods can specify a requested and an acceptable date, time and period applying to a shipment request (e.g. date and time of document issue). A requested period can be a period in which an event is requested to take place. An acceptable period can be a period in which an event may take place at an earliest start date/time to a latest end date/time. The elements located directly at the DateTimePeriods entity include RequestedFulfillmentPeriod, AcceptableFulfillmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

NatureOfCargo can indicate a nature of cargo related to a shipment request (e.g., palletized, containerized, documents). The structure of NatureOfCargo includes the ClassificationCode element. ClassificationCode can be a coded representation of a classification of a nature of cargo. ClassificationCode can be based on GDT: NatureOfCargoClassificationCode.

TotalQuantity can specify a total quantity which is related to a whole shipment request (e.g., total number of equipment, total number of items). The structure of TotalQuantity includes the following elements: Quantity, RoleCode, and TypeCode. Quantity can be a non-monetary numerical specification of an amount in a unit of measurement. Quantity can be based on GDT: Quantity. RoleCode can be a coded representation of a role of a quantity. RoleCode can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them may be filled.

TotalAmount can specify a cumulated monetary amount related to a shipment request (e.g., duty amount, insurance amount, total value). The structure of TotalAmount includes the Amount and RoleCode elements. Amount can be an amount with a corresponding currency unit. Amount can be based on CDT: Amount. RoleCode can be a coded representation of a role of an amount. RoleCode can be based on GDT: AmountRoleCode.

TextCollection can be a group of textual information that relates to a shipment request. The structure of the TextCollection entity includes the TextCollection element. TextCollection can be based on GDT: TextCollection.

TransportationServiceRequirement can specify a contract and carriage condition and service and priority requirements for a transport which apply to a whole shipment request. The structure of TransportationServiceRequirement includes the following elements: TransportationServiceRequirementCode, AdditionalTransportationServiceRequirementCode, TransportationContractConditionCode, TransportServiceLevelCode, and NatureOfCargoClassificationCode. TransportationServiceRequirementCode can be a coded representation of a requirement related to a transportation service. TransportationServiceRequirementCode can be based on GDT : TransportationServiceRequirementCode.

AdditionalTransportationServiceRequirementCode can be a coded representation of an additional requirement related to a transportation service. AdditionalTransportationServiceRequirementCode can be based on GDT : TransportationServiceRequirementCode, Qualifier: Additional. TransportationContractConditionCode can be a coded representation of a contract and carriage condition. TransportationContractConditionCode can be based on GDT: TransportationContractConditionCode. TransportServiceLevelCode can be a coded representation of agreed or defined services in terms of the delivery of goods with respect to the speed of the delivery. TransportServiceLevelCode can be based on GDT: TransportServiceLevelCode. NatureOfCargoClassificationCode can be a coded representation of the classification of a nature of cargo. NatureOfCargoClassificationCode can be based on GDT : NatureOfCargoClassificationCode.

TransportationDocumentInformation can specify information on a transportation document related to a shipment request. TransportationDocumentInformation includes the DateTimePeriod entity. TransportationDocumentTypeCode can be a coded representation of a documentation type. TransportationDocumentTypeCode can be based on GDT: TransportationDocumentTypeCode. TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. TransportationDocumentStatusCode can be a coded representation of a status of a transportation document (e.g., to be printed, document complete).

TransportationDocumentStatusCode can be based on GDT: TransportationDocumentStatusCode. LanguageCode can be a coded representation of the language of a documentation. LanguageCode can be based on GDT: LanguageCode. CommunicationMediumTypeCode can be a coded representation of the type of a medium used for communication of documentation, such as Fax, mail, EDI, or Letter. CommunicationMediumTypeCode can be based on GDT : CommunicationMediumTypeCode. RequiredIndicator can indicate whether a documentation is required or not. RequiredIndicator can be based on GDT: Indicator Qualifier: Required.

OutputCopyNumberValue can be a number specifying the number of copies of a document that may be issued. OutputCopyNumberValue can be based on GDT: NumberValue, Qualifier : OutputCopy. OutputOriginalNumberValue can be a number specifying the number of originals of a document that may be issued. OutputOriginalNumberValue can be based on GDT: NumberValue, Qualifier: OutputOriginal. In some implementations, TypeCode and TypeDescription are both optional, but at least one of them may be used. In some implementations, if the RequiredIndicator is set to true, at least one of the NumberValues OutputCopyNumberValue or OutputOriginalNumberValue may be filled.

DateTimePeriod can specify a date, time and/or period (e.g., validity date) related to required business documentation. The structure of the DateTimePeriod entity includes the DateTimePeriod and PeriodRoleCode elements. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

BusinessTransactionDocumentReference can specify a business document reference related to a whole shipment request. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. In some implementations, RelationshipTypeCode and RelationshipRoleCode are both optional. If used, both may be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID may be filled.

DateTimePeriod can specify a date, time and/or period related to a DocumentReference. The structure of the DateTimePeriod entity includes the DateTimePeriod and PeriodRoleCode elements. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode. PeriodRoleCode includes the modified entity BusinessTransactionDocumentReference.

BusinessTransactionDocumentReference can specify a business document reference related to a whole shipment request. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. In some implementations, RelationshipTypeCode and RelationshipRoleCode are both optional. If used, both may be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID, may be filled. The additional entity RequestForSupplierFreightQuoteAcceptanceStatus may be included.

RequestForSupplierFreightQuoteAcceptanceStatus can specify an acceptance status of a referenced request for a supplier freight quote. The structure of RequestForSupplierFreightQuoteAcceptanceStatus includes the AcceptanceStatusCode and RequestForQuoteRejectionReasonCode elements. The AcceptanceStatusCode can be a coded representation of a status of an acceptance by a communication partner regarding a business transaction that has been transmitted to that partner. AcceptanceStatusCode can be based on GDT: AcceptanceStatusCode. The RequestForQuoteRejectionReasonCode can be a coded representation of a reason for rejection of a request for a supplier freight quote. RequestForQuoteRejectionReasonCode can be based on GDT: RequestForQuoteRejectionReasonCode. In some implementations, the AcceptanceStatusCode values 'AP' (accepted) and 'RE' (rejected) are supported.

GovernmentalProcedureInformation can specify applicable governmental procedures related to import, export and transport of the goods of a shipment request. GovernmentalProcedureInformation includes the GovernmentalProcedure entity. GovernmentalProcedure can specify applicable governmental procedures related to import, export and transport of the goods of a shipment request. GovernmentalProcedure includes the following entities: Location, DateTimePeriod, Seal, TextCollection, and TransportationDocumentInformation. The structure of GovernmentalProcedure includes the following elements: TransportationGovernmentAgencyTypeCode, TransportationMovementTypeCode, TransportationGovernmentAgencyInvolvementStatusCode, TransportationGovernmentAgencyActionCode, and TransportationGovernmentAgencyProcedureStatusCode.

TransportationGovernmentAgencyTypeCode can be a coded representation of the type of a government agency, and can be based on GDT: TransportationGovernmentAgencyTypeCode. TransportationMovementTypeCode can be a coded representation of the type of a transport movement (e.g., Import, Export, Transit, Transshipment). TransportationMovementTypeCode can be based on GDT: TransportationMovementTypeCode. TransportationGovernmentAgencyInvolvementStatusCode can be a coded representation for an involvement status of a transportation related government agency. TransportationGovernmentAgencyInvolvementStatusCode can be based on GDT: TransportationGovernmentAgencyInvolvementStatusCode.

TransportationGovernmentAgencyActionCode can be a coded representation of an action of a transportation related government agency. TransportationGovernmentAgencyActionCode can be based on GDT: TransportationGovernmentAgencyActionCode. TransportationGovernmentAgencyProcedureStatusCode can be a coded representation of a status of a procedure related to a transportation government agency. TransportationGovernmentAgencyProcedureStatusCode can be based on GDT: TransportationGovernmentAgencyProcedureStatusCode.

Location can be a physical place related to a GovernmentalProcedure. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole. RoleCode can be based on GDT: LocationRoleCode. TypeCode can be a coded representation of a type of a physical location. TypeCode can be based on GDT: LocationTypeCode. Name can be a name of a location. Name can be based on GDT: MEDIUM_Name, Qualifier:Location.

DateTimePeriod specifies a date, time and/or period related to a GovernmentalProcedure. The structure of DateTimePeriod includes the DateTimePeriod and PeriodRoleCode elements. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

TextCollection can be a group of textual information that relates to a GovernmentalProcedure. The structure of the TextCollection entity includes the TextCollection element. TextCollection can be based on GDT: TextCollection.

TransportationDocumentInformation can specify information on a transportation document related to the GovernmentalProcedure. TransportationDocumentInformation includes the DateTimePeriod entity. The structure of the TransportationDocumentInformation entity includes the following elements: TransportationDocumentTypeCode, TransportationDocumentNote, TransportationDocumentID, TransportationDocumentStatusCode, LanguageCode, CommunicationMediumTypeCode, RequiredIndicator, OutputCopyNumberValue, and OutputOriginalNumberValue. TransportationDocumentTypeCode can be a coded representation of a documentation type. TransportationDocumentTypeCode can be based on GDT: TransportationDocumentTypeCode.

TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. TransportationDocumentStatusCode can be a coded representation of a status of a transportation document (e.g., to be printed, document complete). TransportationDocumentStatusCode can be based on GDT: TransportationDocumentStatusCode. LanguageCode can be a coded representation of the language of a documentation. LanguageCode can be based on GDT: LanguageCode. CommunicationMediumTypeCode can be a coded representation of the type of a medium used for communication of the documentation, such as Fax, mail, EDI, or Letter. CommunicationMediumTypeCode can be based on GDT: CommunicationMediumTypeCode.

RequiredIndicator can indicate whether a documentation is required or not. RequiredIndicator can be based on GDT: Indicator Qualifier: Required. OutputCopyNumberValue can be a number specifying the number of copies of a document that may be issued. OutputCopyNumberValue can be based on GDT: NumberValue, Qualifier : OutputCopy. OutputOriginalNumberValue can be a number specifying the number of originals of a document that may be issued. OutputOriginalNumberValue can be based on GDT: NumberValue, Qualifier : OutputOriginal. In some implementations, TypeCode and TypeDescription are both optional, but at least one of them may be used. In some implementations, if the RequiredIndicator is set to true, at least one of the NumberValues OutputCopyNumberValue or OutputOriginalNumberValue may be filled.

DateTimePeriod can specify a date, time and/or period related to documentation. The structure of the DateTimePeriod entity includes the DateTimePeriod and PeriodRoleCode elements. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

The PartyInformation package includes information regarding a party of a shipment request (e.g., Shipper, Carrier, Agent). PartyInformation includes the Party entity. Party includes information exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. The Party entity includes the following entities: Amount, DateTimePeriods, TransportationDocumentInformation, and BusinessTransactionDocumentReference. The structure of the Party entity includes the following elements: Party, RoleCode, and FormattedName.

A Party includes information exchanged, in accordance with common business understanding, in business documents, about a party involved in business transactions. This information can be used to identify the party and the party's address, as well as the party's contact person and the contact person's address. This identification can take place using an internal ID, a standardized ID, or IDs assigned by the parties involved. Party can be based on GDT: BusinessTransactionDocumentParty. RoleCode can be a coded representation of a PartyRoleCode which specifies which rights and obligations the party has regarding a business object and corresponding processes. In some implementations, a PartyRole is assigned to exactly one PartyRoleCategory and refines its semantics. RoleCode can be based on GDT: PartyRoleCode. FormattedName can be a complete, formatted name of a party. FormattedName can be based on GDT: LONG_Name, Qualifier: PartyFormatted.

Amount can specify an amount related to a party. Amount can be an amount with a corresponding currency unit, and can be based on CDT: Amount. RoleCode can be a coded representation of a role of an amount, and can be based on GDT: AmountRoleCode.

DateTimePeriods can specify a requested and an acceptable date, time and period related to a party. A requested period can be a period in which an event is requested to take place. An acceptable period can be a period in which an event may take place at an earliest start date/time to a latest end date/time. The elements located directly at the DateTimePeriods entity include RequestedFulfillmentPeriod, AcceptableFullfilmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment.

AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment.

PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TransportationDocumentInformation can specify business documentation related to a party according to a documentation type. TransportationDocumentInformation includes the DateTimePeriod entity. The structure of TransportationDocumentInformation includes the following elements: TransportationDocumentTypeCode, TransportationDocumentNote, TransportationDocumentID, TransportationDocumentStatusCode, LanguageCode, CommunicationMediumTypeCode, RequiredIndicator, OutputCopyNumberValue, and OutputOriginalNumberValue. TransportationDocumentTypeCode can be a coded representation of a documentation type. TransportationDocumentTypeCode can be based on GDT: TransportationDocumentTypeCode. TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. TransportationDocumentStatusCode can be a coded representation of a status of a transportation document (e.g., to be printed, document complete).

TransportationDocumentStatusCode can be based on GDT: TransportationDocumentStatusCode. LanguageCode can be a coded representation of the language of a documentation. LanguageCode can be based on GDT: LanguageCode. CommunicationMediumTypeCode can be a coded representation of the type of a medium used for communication of documentation, such as Fax, mail, EDI, or Letter. CommunicationMediumTypeCode can be based on GDT : CommunicationMediumTypeCode. RequiredIndicator can indicate whether a documentation is required or not. RequiredIndicator can be based on GDT: Indicator Qualifier: Required. OutputCopyNumberValue can be a number specifying the number of copies of a document that may be issued.

OutputCopyNumberValue can be based on GDT: NumberValue, Qualifier : OutputCopy. OutputOriginalNumberValue can be a number specifying the number of originals of a document that may be issued. OutputOriginalNumberValue can be based on GDT: NumberValue, Qualifier : OutputOriginal. In some implementations, TypeCode and TypeDescription are both optional, but at least one of them may be used. In some implementations, if the RequiredIndicator is set to true, at least one of the NumberValues OutputCopyNumberValue or OutputOriginalNumberValue may be filled.

DateTimePeriod can specify a date, time and/or period (e.g., validity date) related to business documentation of a party. DateTimePeriod can be a period that is defined by two points in time. DateTimePeriod can be based on GDT: DateTimePeriod. PeriodRoleCode can be a coded representation of the business semantic of a period. PeriodRoleCode can be based on GDT: PeriodRoleCode.

BusinessTransactionDocumentReference can specify a business document reference related to a party. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. In some implementations, RelationshipTypeCode and RelationshipRoleCode are both optional. If used, both may be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID may be filled.

DateTimePeriod can specify a date, time and/or period related to a document referenced by a party. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

The TransportationStageInformation package includes information regarding a transportation stage of a shipment request. A transportation stage represents a section of a transport. The TransportationStageInformation package includes the Stage entity. TransportationStage can specify details related to a stage of a transport which is part of a shipment request. TransportationStage includes the following entities: Location, TransportationDocumentInformation, and TransportationServiceRequirement. The structure of TransportationStage includes the following elements: ID, OrdinalNumberValue, TypeCode, JourneyID, TransportModeCode, TransportMeansDescriptionCode, TransportMeansDescription, TransportMeansID, TransportMeansHomeCountryCode, TransportMeansOwnershipTypeCode, CarrierStandardID, CarrierFormattedName, TransportationTransitDirectionCode, CalculatedDistanceMeasure, and GivenDistanceMeasure.

ID can be a unique identifier of a stage in a shipment request. ID can be based on GDT: TransportationStageID. OrdinalNumberValue can be an ordinal number to indicate a position of a transportation stage in a set of transportation stages. OrdinalNumberValue can be based on GDT: OrdinalNumberValue, Qualifier: TransportationStage. TypeCode can be a coded representation of the type of a TransportationStage. TypeCode can be based on GDT: TransportationStageTypeCode. JourneyID can be an identifier of a journey. JourneyID can be based on GDT: JourneyID. TransportModeCode can be a coded representation of a mode of transportation used for delivery. TransportModeCode can be based on GDT: TransportModeCode. TransportMeansDescriptionCode can be a coded representation of a transport means type with which goods or persons can be transported. TransportMeansDescriptionCode can be based on GDT: TransportMeansDescriptionCode.

TransportMeansDescription can be a description of a means of transport. TransportMeansDescription can be based on GDT: SHORT_Description, Qualifier: TransportMeans. TransportMeansID can be a unique identifier of a means of transport. TransportMeansID can be based on GDT: TransportMeansID. TransportMeansHomeCountryCode can be a coded representation of the home country of a transport means. TransportMeansHomeCountryCode can be based on GDT: CountryCode, Qualifier: TransportMeansHome. TransportMeansOwnershipTypeCode can be a coded representation of the type of ownership for a means of transport. TransportMeansOwnershipTypeCode can be based on GDT: TransportMeansOwnershipTypeCode.

CarrierStandardID can be a standard identifier of a carrier. CarrierStandardID can be based on GDT: PartyStandardID. CarrierFormattedName can be a name of a carrier. CarrierFormattedName can be based on GDT: LONG_Name, Qualifier: PartyFormatted. TransportationTransitDirectionCode can be a coded representation for a transportation transit direction. TransportationTransitDirectionCode can be based on GDT: TransportationTransitDirectionCode. CalculatedDistanceMeasure can be a calculated distance measure. CalculatedDistanceMeasure can be based on GDT: Measure, Qualifier: CalculatedDistance. GivenDistanceMeasure can be a given distance measure. GivenDistanceMeasure can be based on GDT: Measure, Qualifier: GivenDistance.

StageLocation can specify a physical place related to a stage. StageLocation includes the DateTimePeriods entity. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole. RoleCode can be based on GDT: LocationRoleCode. TypeCode can be a coded representation of a type of a physical location. TypeCode can be based on GDT: LocationTypeCode. Name can be a name of a location. Name can be based on GDT: MEDIUM_Name, Qualifier:Location.

DateTimePeriods can specify a date, time and/or period related to a Location. The elements located directly at the DateTimePeriods entity include RequestedFulfillmentPeriod, AcceptableFullfilmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

BusinessTransactionDocumentReference can specify a business document reference related to a Stage. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode.

TransportationDocumentTypeCode can be a coded representation of a documentation type. TransportationDocumentTypeCode can be based on GDT: TransportationDocumentTypeCode. TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. In some implementations, RelationshipTypeCode and RelationshipRoleCode are both optional. If used, both may be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID may be filled.

DateTimePeriod specifies a date, time and/or period related to a BusinessTransactionDocumentReference. The structure of the DateTimePeriod entity includes the elements DateTimePeriod and PeriodRoleCode. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

TransportationServiceRequirement specifies a contract and carriage condition and service and priority requirements related to a stage. The structure of TransportationServiceRequirement includes the following elements: TransportationServiceRequirementCode, AdditionalTransportationServiceRequirementCode, TransportationContractConditionCode, TransportServiceLevelCode, and NatureOfCargoClassificationCode. TransportationServiceRequirementCode can be a coded representation of a requirement related to a transportation service. TransportationServiceRequirementCode can be based on GDT : TransportationServiceRequirementCode.

AdditionalTransportationServiceRequirementCode can be a coded representation of an additional requirement related to a transportation service. AdditionalTransportationServiceRequirementCode can be based on GDT : TransportationServiceRequirementCode, Qualifier: Additional. TransportationContractConditionCode can be a coded representation of a contract and carriage condition. TransportationContractConditionCode can be based on GDT: TransportationContractConditionCode. TransportServiceLevelCode can be a coded representation of agreed or defined services in terms of the delivery of goods with respect to the speed of the delivery. TransportServiceLevelCode can be based on GDT: TransportServiceLevelCode. NatureOfCargoClassificationCode can be a coded representation of a classification of the nature of cargo. NatureOfCargoClassificationCode can be based on GDT : NatureOfCargoClassificationCode.

The TransportationUnitResourceInformation package includes information regarding a transportation unit resource that is relevant for a shipment request (e.g., a container). The TransportationUnitResourceInformation package includes the TransportationUnitResourceInformation entity. TransportationUnitResourceInformation includes information on one or more transportation unit resources, such as a resource type and related properties, or related measures or handling instructions. A Transportation Unit Resource can be a unit into which goods are loaded and/or from which goods are unloaded. In some implementations, this unit can provide transportation capacity for goods but might move by itself. TransportationUnitResourceInformation includes the following entities: TransportationStageAssignment, AttachedEquipment, Quantity, BusinessTransactionDocumentReference, TextCollection, Location, and DangerousGoods. The structure of TransportationUnitResourceInformation includes the following elements: ID, ResourceNumberValue, ResourceID, ResourceHomeCountryCode, TransportationUnitResourceCategoryCode, TransportationUnitResourceTypeCode, FillLevelCode, ShippingTypeCode, HaulageArrangerCode, TransportationHandlingInstructionCode, and TransportationHandlingInstructionNote.

ID can be a unique identifier for a resource information. ID can be based on GDT ResourceInformationID. ResourceNumberValue can be a count of resources. ResourceNumberValue can be based on GDT: NumberValue, Qualifier: Resource. ResourceID can be a unique identifier for a resource. ResourceID can be based on GDT: ResourceID. ResourceHomeCountryCode can be a coded representation of the home country of a resource. ResourceHomeCountryCode can be based on GDT: CountryCode, Qualifier: ResourceHome. TransportationUnitResourceCategoryCode can be a coded representation of a category of transportation unit resources. TransportationUnitResourceCategoryCode can be based on GDT: TransportationUnitResourceCategoryCode. TransportationUnitResourceTypeCode can be a coded representation of the type of a transportation unit resource.

TransportationUnitResourceTypeCode can be based on GDT: TransportationUnitResourceTypeCode. FillLevelCode can be a coded representation of a fill level of a resource. FillLevelCode can be based on GDT: FillLevelCode. ShippingTypeCode can be a coded representation of a shipping type. A shipping type can specify how the planning and execution of a transportation can be performed. Transportation terms include detailed specifications on agreed means of transportation, such as shipping or transport type and means of transport to be used. ShippingTypeCode can be based on GDT: ShippingTypeCode. HaulageArrangerCode can be a coded representation of an arranger of a haulage. Haulage can be inland transport of cargo. HaulageArrangerCode can be based on GDT: HaulageArrangerCode. TransportationHandlingInstructionCode can be a coded representation of a type of a transportation handling instruction. TransportationHandlingInstructionCode can be based on GDT: TransportationHandlingInstructionCode. TransportationHandlingInstructionNote can be a note regarding a transportation handling instruction. TransportationHandlingInstructionNote can be based on GDT: LONG_Note, Qualifier: TransportationHandlingInstruction.

TransportationStageAssignment can specify an assignment of a transportation stage to a transportation unit resource information. The structure of TransportationStageAssignment includes the element ShipmentRequestTransportationStageID. ShipmentRequestTransportationStageID can be a unique identifier of a TransportationStage in a shipment request. ShipmentRequestTransportationStageID can be based on GDT: TransportationStageID.

AttachedEquipment can specify equipment attached to a TransportationUnitResource. The structure of AttachedEquipment includes the ShipmentRequestResourceInformationID. ShipmentRequestResourceInformationID can be a unique identifier of a resource information in a ShipmentRequest. ShipmentRequestResourceInformationID can be based on GDT: ResourceInformationID.

Quantity can specify a quantity related to TransportationUnitResourceInformation. The structure of the Quantity entity includes the Quantity, RoleCode, and TypeCode elements. Quantity can be a non-monetary numerical specification of an amount in a unit of measurement. Quantity can be based on GDT: Quantity. RoleCode can be a coded representation of a role of a quantity. RoleCode can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them may be filled.

BusinessTransactionDocumentReference can specify a business document reference related to a TransportationUnitResource. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. In some implementations, RelationshipTypeCode and RelationshipRoleCode are both optional. If used, both may be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID may be filled.

DateTimePeriod can specify a date, time and/or period related to a BusinessTransactionDocumentReference. The structure of the DateTimePeriod entity includes the DateTimePeriod and PeriodRoleCode. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

TextCollection can be a group of textual information that relates to a TransportationUnitResource. The structure of the TextCollection entity includes the TextCollection element. TextCollection can be based on GDT: TextCollection.

Location can specify a physical place related to a TransportationUnitResource. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole. RoleCode can be based on GDT: LocationRoleCode. TypeCode can be a coded representation of a type of a physical location. TypeCode can be based on GDT: LocationTypeCode. Name can be a name of a location. Name can be based on GDT: MEDIUM_Name, Qualifier: Location.

DateTimePeriods can specify a requested and an acceptable date, time and period related to a Location of a resource. The elements located directly at the DateTimePeriods entity include RequestedFulfillmentPeriod, AcceptableFullfilmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

DangerousGoods can specify dangerous goods included in a resource. DangerousGoods includes the ContactInformation and TextCollection entities. The structure of DangerousGoods includes the following elements: ID, RegulationsCode, HazardCode, FlashpointMeasureInterval, PackagingGroupCode, EmergencySchedule, TransportEmergencyCardCode, DangerousGoodsLabelCode, DangerousGoodsLabelCode2, DangerousGoodsLabelCode3, PackagingInstructionTypeCode, TransportMeansDescriptionCode, and TransportAuthorisationCode. ID can be a unique identifier for a dangerous good, using the United Nations Dangerous Goods Number. ID can be based on GDT: DangerousGoodsID. RegulationsCode can be a coded representation of national or international dangerous goods rules or regulations. RegulationsCode can be based on GDT: DangerousGoodsRegulationsCode.

HazardCode can be a coded representation of a hazard that is imminent in a dangerous good. HazardCode can be based on GDT: DangerousGoodsHazardCode. FlashpointMeasureInterval can be an interval of measures defined by a lower and an upper boundary indicating a flashpoint of a dangerous good. FlashpointMeasureInterval can be based on GDT: MeasureInterval, Qualifier: Flashpoint. PackagingGroupCode can be a coded representation of the effectiveness of a packaging to transport dangerous goods depending on the degree of danger of the goods. PackagingGroupCode can be based on GDT: DangerousGoodsPackagingGroupCode. EmergencySchedule can be a coded representation of an emergency schedule for dangerous goods. EmergencySchedule can identify an emergency schedule. The DangerousGoodsEmergencySchedule can be used for transports of dangerous goods by sea similar to a Transport Emergency Card which is used for transports of dangerous goods by road. EmergencySchedule can be based on GDT: DangerousGoodsEmergencySchedule. TransportEmergencyCardCode can be a coded representation of a transport emergency card which specifies how to react in case of an accident.

TransportEmergencyCardCode can be based on GDT: TransportEmergencyCardCode. DangerousGoodsLabelCode can be a coded representation of a label for a dangerous good. In some implementations, DangerousGoodsLabelCode's values are dependant on the DangerousGoodsRegulationsCode. DangerousGoodsLabelCode can be based on GDT: DangerousGoodsLabelCode. DangerousGoodsLabelCode2 can be a coded representation of a label for a dangerous good. In some implementations, DangerousGoodsLabelCode's values are dependant on the DangerousGoodsRegulationsCode. DangerousGoodsLabelCode2 can be based on GDT: DangerousGoodsLabelCode. DangerousGoodsLabelCode3 can be a coded representation of a label for a dangerous good. In some implementations, DangerousGoodsLabelCode's values are dependant on the DangerousGoodsRegulationsCode. DangerousGoodsLabelCode3 can be based on GDT: DangerousGoodsLabelCode.

PackagingInstructionTypeCode can be a coded representation of a packaging instruction. In some implementations, a packaging instruction can be an instruction defining which packaging may be used to pack a dangerous good. PackagingInstructionTypeCode can be based on GDT: PackagingInstructionTypeCode. TransportMeansDescriptionCode can be a coded representation of a transport means type with which goods or persons can be transported. TransportMeansDescriptionCode can be based on GDT: TransportMeansDescriptionCode. TransportAuthorisationCode can be a coded representation of an authorisation for the transportation of dangerous goods. This code can specify an authorisation for the transportation of a particular dangerous good. TransportAuthorisationCode can be based on GDT: DangerousGoodsTransportAuthorisationCode.

ContactInformation can specify information on a department or person to whom information regarding the dangerous goods can be directed. The structure of ContactInformation includes the ContactPersonFunctionTypeCode and Address elements. ContactPersonFunctionTypeCode can be a coded representation of a type of function that a contact person has.

ContactPersonFunctionTypeCode can be based on GDT: ContactPersonFunctionTypeCode. Address can be an address related to the contact information defined by a corresponding FunctionTypeCode. Address can be based on GDT: Address.

TextCollection can be a group of textual information that relates to DangerousGoods. The structure of the TextCollection entity includes the TextCollection element. TextCollection can be based on GDT: TextCollection.

The TransportationChargesInformation package includes information regarding transportation charge calculation specific components related to a ShipmentRequest. The TransportationChargesInformation package includes the TransportationChargesInformation entity. The TransportationChargesInformation entity can define a relationship between the transportation charges and the origin of these charges. The TransportationChargesInformation entity includes the TransportationCharges entity. The structure of TransportationChargesInformation includes the following elements: TransportationChargesUsageCode, ShipmentRequestItemID, ShipmentRequestPartyStandardID, ShipmentRequestPartyInternalID, ShipmentRequestResourceInformationID, ShipmentRequestPackageInformationID, and ShipmentRequestTransportationStageID. TransportationChargesUsageCode can be a coded representation of the usage of TransportationCharges.

The usage can point out if the subsequent information represents a revenue- or cost-view on transportation charges. TransportationChargesUsageCode can be based on GDT: TransportationChargesUsageCode. ShipmentRequestItemID can be a unique identifier of an Item in a ShipmentRequest. ShipmentRequestItemID can be based on GDT: BusinessTransactionDocumentItemID. ShipmentRequestPartyStandardID can be a unique identifier of a Party in a ShipmentRequest. ShipmentRequestPartyStandardID can be based on GDT: PartyStandardID. ShipmentRequestPartyInternalID can be based on GDT: PartyInternalID. ShipmentRequestResourceInformationID can be a unique identification of a TransportationUnitResource in a ShipmentRequest. ShipmentRequestResourceInformationID can be based on GDT: ResourceInformationID. ShipmentRequestPackageInformationID can be a unique identification of a PackageInformation in a ShipmentRequest. ShipmentRequestPackageInformationID can be based on GDT: PackageInformationID. ShipmentRequestTransportationStageID can be a unique identification of a TransportationStage in a ShipmentRequest. ShipmentRequestTransportationStageID can be based on GDT: TransportationStageID. In some implementations, if none of the IDs is maintained, the transportation charges are related to the whole shipment request.

TransportationCharges can be a summary of determined transportation charge specific components for a transportation business case. TransportationCharges includes the following entities: Location, TextCollection, Currency, ExchangeRate, PercentElement, DateTimePeriod, BusinessTransactionDocumentReference, TaxDetail, PaymentInstruction, CashDiscountTerms, and Element. The structure of TransportationCharges includes the following elements: ID, FreightAgreementID, CalculationOriginCode, TariffID, and CalculationSheetID. ID can be a unique identifier of TransportationCharges in a ShipmentRequest. ID can be based on GDT: TransportationChargesID. FreightAgreementID can be an identification of a Freight Agreement which includes and points to a configuration for the Transportation Charges Calculation. FreightAgreementID can be based on GDT: FreightAgreementID.

CalculationOriginCode can be a coded representation of an origin of a transportation charges calculation. The calculation can be done automatically based on the system configuration. Data for the calculation, including the results, can be manually entered or received from another business system via a message. In some implementations, a clear distinction of the origin of TransportationChargesCalculation details like the TransportationChargesCalculationSheet and its TransportationChargeElements may be included. CalculationOriginCode can give information whether the calculation was done completely automatically, or if the results were manually adopted. CalculationOriginCode can be based on GDT: TransportationChargesOriginCode.

TariffID can be an identifier for a transportation charges tariff. A transportation charges tariff can be a specific combination of a transportation charges calculation sheet and terms and conditions. The terms and conditions can define if a certain transportation charges calculation sheet and its related rates are applicable for a transportation business case. TariffID can be based on GDT: TransportationChargesTariffID. CalculationSheetID can be a unique identifier for a transportation charges calculation sheet. A TransportationChargesCalculationSheet can represent a configuration describing how to calculate transportation charges for a transportation business case. TransportationChargesCalculationSheet includes instructions describing which charges are applicable, which data from a transportation business case may be considered for a calculation, how underlying transportation charge rates are determined, and which special calculation methods may be considered. CalculationSheetID can be based on GDT: TransportationChargesCalculationSheetID.

A Location can specify a physical place to which TransportationCharges and their calculation can refer. Location includes the DateTimePeriod entity. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole. RoleCode can be based on GDT: LocationRoleCode. TypeCode can be a coded representation of a type of a physical location. TypeCode can be based on GDT: LocationTypeCode. Name can be a name of a location. Name can be based on GDT: MEDIUM_Name, Qualifier:Location.

DateTimePeriods can specify a date, time and/or period related to a TransportationChargesLocation. The elements located directly at the DateTimePeriods entity include RequestedFulfillmentPeriod, AcceptableFullfilmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TextCollection can be a group of textual information that relates to TransportationCharges. The structure of the TextCollection entity includes the TextCollection element. TextCollection can be based on GDT: TextCollection.

Currency can be a currency which is valid for transportation charges. The structure of Currency includes the following elements: Code, RoleCode, and UsageCode. Code can be a coded representation of a currency. Code can be based on GDT: CurrencyCode. RoleCode can be a coded representation of a role of a Currency. RoleCode can be based on GDT: CurrencyRoleCode. UsageCode can be a coded representation of how a currency is used. UsageCode can be based on GDT: CurrencyUsageCode. In some implementations, a currency can be valid for transportation charges, as long as there is no currency information on a charge element level.

ExchangeRate can be an exchange rate that has been especially negotiated for transportation charges. The structure of the ExchangeRate entity includes the ExchangeRate and TypeCode elements. ExchangeRate can be a rate at which one unit of a currency can be changed into another currency. ExchangeRate can be based on GDT: ExchangeRate. TypeCode can be a coded representation of a type of an exchange rate. The actual exchange rate between two currencies can depend on an exchange rate type and currency conversion type. The exchange rate type can define characteristics of an exchange rate according to the currencies that get converted. TypeCode can be based on GDT: ExchangeRateTypeCode.

PercentElement is a detail about Transportation Charges represented as a percentage. The structure of PercentElement includes the following elements: PercentRoleCode, Percent, TransportationChargesPercentCalculationBaseCode, and Status. PercentRoleCode can be a coded representation of a role of a percent. PercentRoleCode can be based on GDT: PercentRoleCode. Percent can be a number that relates to the comparison FIG. 100. Percent can be based on CDT: Percent. TransportationChargesPercentCalculationBaseCode can be a coded representation of a calculation base for a transportation charges percent. TransportationChargesPercentCalculationBaseCode can be based on GDT: TransportationChargesPercentCalculationBaseCode. StatusCode can be a coded representation of a status for a transportation charges percent element. StatusCode can be based on GDT: TransportationChargesPercentElementStatusCode.

DateTimePeriod can specify a date, time and/or period that is relevant for a transportation charges calculation. The structure of the DateTimePeriod entity includes the DateTimePeriod and PeriodRoleCode. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

A BusinessTransactionDocumentReference can specify a business document reference related to a transportation charges calculation. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of aa role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type.

TransportationDocumentTypeCode can be based on GDT: TransportationDocumentTypeCode. TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. In some implementations, RelationshipTypeCode and RelationshipRoleCode are both optional. If used, both may be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID may be filled.

A TaxDetail can be a tax-relevant information which is applicable for each ChargeElement. The structure of TaxDetail includes the ProductTax element. ProductTax can be a tax incurred for product-related business transactions, such as purchasing, sales, or consumption. ProductTax can be used to display different tax components in calculated and invoiced amounts, and to inform about tax declarations and payments of a company to responsible tax authorities. ProductTax can be based on GDT: ProductTax. In some implementations, within TaxDetail, the BusinessTransactionDocumentItemGroupID of the GDT ProductTax is not used.

PaymentInstruction can be an instruction about how a payment may be carried out or which additional activities may be carried out within a payment. In some implementations, there is a separate instance for each Charge Category Code, such as Basic Freight, or Origin haulage charges. The structure of the PaymentInstruction entity includes the following elements: PaymentInstruction, TransportationChargesElementCategoryCode, TransportationChargesElementSubCategoryCode, and TransportationChargesPaymentArrangementCode.

PaymentInstruction can be an instruction about how a payment may be carried out, or which additional activities may be carried out within a payment. PaymentInstruction can be based on GDT: PaymentInstruction. TransportationChargesElementCategoryCode can be a coded representation of a category of a TransportationChargeElement. The TransportationChargeElementCategoryCode can be used to group TransportationChargeElements. PaymentInstructions can be different per TransportationChargeElementCategory. TransportationChargesElementCategoryCode can be based on GDT: TransportationChargesElementCategoryCode. TransportationChargesElementSubCategoryCode can be a coded representation of a subcategory of a transportation charges element. TransportationChargesElementSubCategoryCode can be based on GDT: TransportationChargesElementSubCategoryCode. TransportationChargesPaymentArrangementCode can be a coded representation of an arrangement of a payment for transportation charges. TransportationChargesPaymentArrangementCode can be based on GDT: TransportationChargesPaymentArrangementCode.

CashDiscountTerms can be an agreement on a percentage of cash discount that is granted during a transportation transaction when payment takes place within a certain number of days after a baseline date for payment has passed. The structure of the CashDiscountTerms entity includes the following elements: CashDiscountTerms, TransportationChargesElementCategoryCode, and TransportationChargesElementSubCategoryCode. CashDiscountTerms can be an agreement of cash discounts for a payment. CashDiscountTerms can be based on GDT: CashDiscountTerms. TransportationChargesElementCategoryCode can be a coded representation of a category of a TransportationChargesElement. The TransportationChargesElementCategoryCode can be used to group TransportationChargesElements. PaymentInstructions can be different per TransportationChargesElementCategory. TransportationChargesElementCategoryCode can be based on GDT: TransportationChargesElementCategoryCode. TransportationChargesElementSubCategoryCode can be a coded representation of a subcategory of a transportation charges element. TransportationChargesElementSubCategoryCode can be based on GDT: TransportationChargesElementSubCategoryCode.

Element can be, together with its sub nodes, a single building block of a transportation charge calculation. A Charge Element can result from a manually created charge, an automatically determined charge, or another Charge Element distributed from an entire document. Charge Element includes the following entities: Location, TextCollection, Currency, RateElement, PercentElement, AmountElement, CalculationBase, TaxDetail, DateTimePeriod, and CostDistribution. The structure of Element includes CategoryCode, SubCategoryCode, TypeCode, CalculationResolutionCode, and TransportationChargesPaymentArrangementCode. CategoryCode can be a coded representation of a category of a TransportationChargesElement. The TransportationChargesElementCategoryCode can be used to group TransportationChargesElements.

PaymentInstructions can be different per TransportationChargesElementCategory. CategoryCode can be based on GDT: TransportationChargesElementCategoryCode. SubCategoryCode can be a coded representation of a subcategory of a transportation charges element. SubCategoryCode can be based on GDT: TransportationChargesElementSubCategoryCode. TypeCode can be a coded representation of a type of a transportation charge element. TypeCode can be based on GDT: TransportationChargesElementTypeCode. CalculationResolutionCode can be a coded representation of a resolution for a transportation charges element calculation. CalculationResolutionCode can be based on GDT: TransportationChargesElementCalculationResolutionCode. TransportationChargesPaymentArrangementCode can be a coded representation of an arrangement of payment for transportation charges. TransportationChargesPaymentArrangementCode can be based on GDT: TransportationChargesPaymentArrangementCode.

Location can specify a physical place a specific ChargeElement refers to. Location includes the DateTimePeriod entity. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole. RoleCode can be based on GDT: LocationRoleCode. TypeCode can be a coded representation of a type of a physical location. TypeCode can be based on GDT: LocationTypeCode. Name can be a name of a location. Name can be based on GDT: MEDIUM_Name, Qualifier:Location. DateTimePeriods can specify a date, time and/or period related to a location.

The elements located directly at the DateTimePeriods entity include RequestedFulfillmentPeriod, AcceptableFullfilmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

TextCollection can be a group of textual information that relates to a ChargeElement. The structure of the TextCollection entity includes the TextCollection element. TextCollection can be based on GDT: TextCollection.

Currency can emphasize if a ChargeElement may be considered with relation to a certain currency. The structure of Currency includes the following elements: Code, RoleCode, and UsageCode. Code can be a coded representation of a currency. Code can be based on GDT: CurrencyCode. RoleCode can be a coded representation of a role of a Currency. RoleCode can be based on GDT: CurrencyRoleCode. UsageCode can be a coded representation of how a currency is used. UsageCode can be based on GDT: CurrencyUsageCode. In some implementations, this currency can be valid for transportation charges, as long as there is no currency information on a charge element level.

RateDetail can specify a rate with which a ChargeElement is calculated. The structure of RateDetail includes the following elements: ID, Amount, BaseQuantity, TransportationChargesRateTypeCode, TransportationChargesRateRoleCode, and TransportationChargesRateElementStatusCode. ID can be a unique identifier of a rate element of a transportation charges element. ID can be based on GDT: TransportationChargesElementRateElementID. Amount can be an amount with a corresponding currency unit, or a monetary amount of a rate. Amount can be based on CDT: Amount. BaseQuantity can be a non-monetary numerical specification of an amount in a unit of measurement. BaseQuantity can be a quantity to which an amount refers. BaseQuantity can be based on CDT: Quantity, Qualifier: Base.

TransportationChargesRateTypeCode can be a coded representation of a TransportationChargeRate type. Examples include gross weight rate and net weight rate. TransportationChargesRateTypeCode can be based on GDT: TransportationChargesRateTypeCode. TransportationChargesRateRoleCode can be a coded representation of the role of a TransportationChargeRate. Examples include an invoice rate or a rate for calculation purposes. TransportationChargesRateRoleCode can be based on GDT: TransportationChargesRateRoleCode. TransportationChargesRateElementStatusCode can be a coded representation of a status of a transportation charges rate element. TransportationChargesRateElementStatusCode can be based on GDT: TransportationChargesRateElementStatusCode.

PercentElement can be a detail about a transportation charges element represented as a percentage. The structure of PercentElement includes the following elements: PercentRoleCode, Percent, TransportationChargesPercentCalculationBaseCode, and Status. PercentRoleCode can be a coded representation of a role of a percent. PercentRoleCode can be based on GDT: PercentRoleCode. Percent can be a number that relates to the comparison FIG. 100. Percent can be based on CDT: Percent. TransportationChargesPercentCalculationBaseCode can be a coded representation of a calculation base for a transportation charges percent. TransportationChargesPercentCalculationBaseCode can be based on GDT: TransportationChargesPercentCalculationBaseCode. StatusCode can be a coded representation of a status for a transportation charges percent element. StatusCode can be based on GDT: TransportationChargesPercentElementStatusCode.

AmountElement can represent a monetary aspect of a Transportation Charge. AmountElement can be a result of a transportation charge calculation. There can be a separate AmountElement instance for each monetary amount per AmountRoleCode. AmountElement includes the RateElementAssignment entity. The structure of AmountElement includes the following elements: Amount, AmountRoleCode, and TransportationChargesAmountElementStatusCode. Amount can be an amount with a corresponding currency unit. Amount can be based on CDT: Amount. AmountRoleCode can be a coded representation of a role of an amount. AmountRoleCode can be based on GDT: AmountRoleCode. TransportationChargesAmountElementStatusCode can be a coded representation of a status of an amount element of transportation charges or its transportation charges element. TransportationChargesAmountElementStatusCode can be based on GDT: TransportationChargesAmountElementStatusCode.

RateElementAssignment can be an assignment of an amount to a RateElement. The structure of RateElementAssignment includes the element TransportationChargesElementRateElementID. TransportationChargesElementRateElementID can be a unique identifier of a rate element of a transportation charges element. TransportationChargesElementRateElementID can be based on GDT: TransportationChargesElementRateElementID.

CalculationBase can be data which, included with RateDetail, is a basis for calculating an Amount. The structure of CalculationBase includes the following elements: TransportationChargesElementCalculationBaseCode, BaseQuantity, BaseQuantityRoleCode, and BaseQuantityTypeCode. TransportationChargesElementCalculationBaseCode can be a coded representation of a calculation base of a transportation charges element. TransportationChargesElementCalculationBaseCode can be based on GDT: TransportationChargesElementCalculationBaseCode. BaseQuantity can be a non-monetary numerical specification of an amount in a unit of measurement. BaseQuantity can be a value of a calculation base as a quantity. BaseQuantity can be based on GDT: Quantity, Qualifier: Base. BaseQuantityRoleCode can be a coded representation of a role of a quantity. BaseQuantityRoleCode can be based on GDT: QuantityRoleCode. BaseQuantityTypeCode can be a coded representation of a type of quantity that is based on a measurable characteristic of an object or physical phenomenon. BaseQuantityTypeCode can be based on GDT: QuantityTypeCode.

TaxDetail can be tax-relevant information which is applicable for each ChargeElement. The structure of TaxDetail includes the ProductTax element. ProductTax can be a tax incurred for product-related business transactions, such as purchasing, sales, or consumption. The ProductTax can be used to display different tax components in calculated and invoiced amounts, and to inform about tax declarations and payments of a company to responsible tax authorities. ProductTax can be based on GDT: ProductTax. In some implementations, within TaxDetail, the BusinessTransactionDocumentItemGroupID of the GDT ProductTax is not used.

DateTimePeriod can specify a date, time and/or period related to a ChargeElement. The structure of the DateTimePeriod entity includes DateTimePeriod and PeriodRoleCode. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

CostDistribution can be information describing how a ChargeElement can be allocated or distributed from a financial accounting point of view. The structure of CostDistribution includes the AccountingCodingBlockAssignment element.

An AccountingCodingBlockAssignment can be an assignment of an item to a coding block. Items typically assigned to a coding block can be an amount that is known from context, a quantity, or a company resource such as office space or working time. A coding block can be a set of account assignment objects of different types. An account assignment object can be a business object to which value changes from business transactions are assigned in accounting. AccountingCodingBlockAssignment can be based on GDT: AccountingCodingBlockAssignment.

In some implementations, the SupplierShipmentQuote package includes a SupplierFreightQuoteAssignmentInformation package which can include information for supplier freight quote assignments. The SupplierFreightQuoteAssignmentInformation package includes the TransportationStageAssignment and TransportationUnitResourceInformationAssignment entities. TransportationStageAssignment can specify an assignment of the SupplierShipmentQuote to a stage of the SupplierFreightQuote. The structure of TransportationStageAssignment includes the element SupplierFreightQuoteTransportationStageID. SupplierFreightQuoteTransportationStageID can be a unique identifier of a TransportationStage in a SupplierFreightQuote, and can be based on GDT: TransportationStageID. TransportationUnitResourceInformationAssignment can specify an assignment of the SupplierShipmentQuote to a TransportationUnitResourceInformation of the SupplierFreightQuote. The structure of TransportationUnitResourceInformationAssignment includes the SupplierFreightQuoteTransportationUnitResourceInformationID element. SupplierFreightQuoteTransportationUnitResourceInformationID can be a unique identifier of a TransportationUnitResourceInformation in a SupplierFreightQuote, and can be based on GDT: TransportationUnitResourceID.

The TransportationUnitResourceInformation package includes information regarding a transportation unit resource relevant for a shipment request (e.g., a container. The TransportationUnitResourceInformation package includes the TransportationUnitResourceInformation entity. TransportationUnitResourceInformation includes information on one or more transportation unit resources, such as a resource type and related properties (e.g., related measures or handling instructions). A Transportation Unit Resource can be a unit into which goods are loaded and/or from which goods are unloaded. In some implementations, this unit can provide transportation capacity for goods but might not move by itself. TransportationUnitResourceInformation includes the following entities: TransportationStageAssignment, AttachedEquipment, Quantity, BusinessTransactionDocumentReference, TextCollection, Location, and DangerousGoods. The structure of TransportationUnitResourceInformation includes the following elements: ID, ResourceNumberValue, ResourceID, ResourceHomeCountryCode, TransportationUnitResourceCategoryCode, TransportationUnitResourceTypeCode, FillLevelCode, ShippingTypeCode, HaulageArrangerCode, TransportationHandlingInstructionCode, and TransportationHandlingInstructionNote.

ID can be a unique identifier for a resource information. ID can be based on GDT ResourceInformationID. ResourceNumberValue can be a count of resources. ResourceNumberValue can be based on GDT: NumberValue, Qualifier: Resource. ResourceID can be a unique identifier for a resource. ResourceID can be based on GDT: ResourceID. ResourceHomeCountryCode can be a coded representation of the home country of a resource. ResourceHomeCountryCode can be based on GDT: CountryCode, Qualifier: ResourceHome. TransportationUnitResourceCategoryCode can be a coded representation of a category of transportation unit resources. TransportationUnitResourceCategoryCode can be based on GDT: TransportationUnitResourceCategoryCode. TransportationUnitResourceTypeCode can be a coded representation of the type of a transportation unit resource. TransportationUnitResourceTypeCode can be based on GDT: TransportationUnitResourceTypeCode.

FillLevelCode can be a coded representation of a fill level of a resource. FillLevelCode can be based on GDT: FillLevelCode. ShippingTypeCode can be a coded representation of a shipping type. A shipping type can specify how planning and execution of a transportation may be performed. Transportation terms include detailed specifications on agreed means of transportation, such as shipping/transport type and means of transport to be used. ShippingTypeCode can be based on GDT: ShippingTypeCode. HaulageArrangerCode can be a coded representation of an arranger of a haulage. Haulage can be inland transport of cargo. HaulageArrangerCode can be based on GDT: HaulageArrangerCode. TransportationHandlingInstructionCode can be a coded representation of a type of transportation handling instruction. TransportationHandlingInstructionCode can be based on GDT: TransportationHandlingInstructionCode. TransportationHandlingInstructionNote can be a note regarding a transportation handling instruction. TransportationHandlingInstructionNote can be based on GDT: LONG_Note, Qualifier: TransportationHandlingInstruction.

TransportationStageAssignment can specify an assignment of a transportation stage to a transportation unit resource information. The structure of TransportationStageAssignment includes the ShipmentRequestTransportationStageID element. ShipmentRequestTransportationStageID can be a unique identifier of a TransportationStage in a shipment request. ShipmentRequestTransportationStageID can be based on GDT: TransportationStageID.

AttachedEquipment can specify equipment attached to a TransportationUnitResource. The structure of AttachedEquipment includes the element ShipmentRequestResourceInformationID. ShipmentRequestResourceInformationID can be a unique identifier of a resource information in a ShipmentRequest. ShipmentRequestResourceInformationID can be based on GDT: ResourceInformationID.

Quantity can specify a quantity related to a TransportationUnitResourceInformation. The structure of the Quantity entity includes the Quantity, RoleCode, and TypeCode elements. Quantity can be a non-monetary numerical specification of an amount in a unit of measurement. Quantity can be based on GDT: Quantity. RoleCode can be a coded representation of a role of a quantity. RoleCode can be based on GDT: QuantityRoleCode. TypeCode can be a coded representation of a type of quantity that is based on a measurable characteristic of an object or physical phenomenon. TypeCode can be based on GDT: QuantityTypeCode. In some implementations, QuantityRoleCode and QuantityTypeCode are optional, but in every instance one of them may be filled.

BusinessTransactionDocumentReference can specify a business document reference related to a TransportationUnitResource. BusinessTransactionDocumentReference includes the DateTimePeriod entity. The structure of the BusinessTransactionDocumentReference entity includes the following elements: BusinessTransactionDocumentReference, BusinessTransactionDocumentRelationshipRoleCode, BusinessTransactionDocumentRelationshipTypeCode, TransportationDocumentTypeCode, TransportationDocumentNote, and TransportationDocumentID. BusinessTransactionDocumentReference can be a unique reference to other business documents or business document items that are of significance within each respective business process. BusinessTransactionDocumentReference can be based on GDT: BusinessTransactionDocumentReference.

BusinessTransactionDocumentRelationshipRoleCode can be a coded representation of a role that a business document or a business document item has when set against another business document or business document item with a relationship. BusinessTransactionDocumentRelationshipRoleCode can be based on GDT: BusinessTransactionDocumentRelationshipRoleCode. BusinessTransactionDocumentRelationshipTypeCode can be a coded representation of a relationship between two business documents or business document items. BusinessTransactionDocumentRelationshipTypeCode can be based on GDT: BusinessTransactionDocumentRelationshipTypeCode. TransportationDocumentTypeCode can be a coded representation of a documentation type. TransportationDocumentTypeCode can be based on GDT: TransportationDocumentTypeCode.

TransportationDocumentNote can be a short note on documentation. TransportationDocumentNote can be based on GDT: SHORT_Note. TransportationDocumentID can be a unique identifier for a transportation document. TransportationDocumentID can be based on GDT: TransportationDocumentID. In some implementations, RelationshipTypeCode and RelationshipRoleCode are both optional. If used, both may be filled. Either the combination BusinessTransactionDocumentReference, BusinessTransactionDocumentRelationshipRoleCode, BusinessTransactionDocumentRelationshipTypeCode, or TransportationDocumentTypeCode, TransportationDocumentNote, TransportationDocumentID may be filled.

DateTimePeriod can specify a date, time and/or period related to a BusinessTransactionDocumentReference. The structure of the DateTimePeriod entity includes the DateTimePeriod and PeriodRoleCode. DateTimePeriod can be a period that is defined by two points in time. DateTimePeriod can be based on GDT: DateTimePeriod. PeriodRoleCode can be a coded representation of business semantics of a period. PeriodRoleCode can be based on GDT: PeriodRoleCode.

TextCollection can be a group of textual information that relates to a TransportationUnitResource. The structure of the TextCollection entity includes the TextCollection element. TextCollection can be based on GDT: TextCollection.

Location can specify a physical place related to a TransportationUnitResource. The structure of the Location entity includes the following elements: Location, RoleCode, TypeCode, and Name. Location includes information exchanged in business documents about a location relevant for business transactions. Location can be based on GDT: BusinessTransactionDocumentLocation. RoleCode can be a coded representation of a LocationRole. RoleCode can be based on GDT: LocationRoleCode. TypeCode can be a coded representation of a type of a physical location. TypeCode can be based on GDT: LocationTypeCode. Name can be a name of a location. Name can be based on GDT: MEDIUM_Name, Qualifier: Location.

DateTimePeriods can specify a requested and an acceptable date, time and period related to a Location of a resource. The elements located directly at the DateTimePeriods entity include RequestedFulfillmentPeriod, AcceptableFullfilmentPeriod, and PeriodRoleCode. RequestedFulfillmentPeriod can be a period which is requested depending on semantics of the PeriodRoleCode. RequestedFulfillmentPeriod can be based on GDT: DATETIMEPERIOD, Qualifier: RequestedFulfillment. AcceptableFulfillmentPeriod can be a period which is acceptable depending on semantics of the PeriodRoleCode. AcceptableFulfillmentPeriod can be based on GDT: DATETIMEPERIOD, Qualifier: AcceptableFulfillment. PeriodRoleCode can be a coded representation of business semantics of the two periods defined by the entities RequestedFulfillmentPeriod and AcceptableFulfillmentPeriod. PeriodRoleCode can be based on GDT: PeriodRoleCode. In some implementations, RequestedFulfillmentPeriod and AcceptableFulfillmentPeriod are optional, but in every instance one of them may be filled.

DangerousGoods can specify dangerous goods included in a resource. DangerousGoods includes the ContactInformation and TextCollection entities. The structure of DangerousGoods includes the following elements: ID, RegulationsCode, HazardCode, FlashpointMeasureInterval, PackagingGroupCode, EmergencySchedule, TransportEmergencyCardCode, DangerousGoodsLabelCode, DangerousGoodsLabelCode2, DangerousGoodsLabelCode3, PackagingInstructionTypeCode, TransportMeansDescriptionCode, and TransportAuthorisationCode. ID can be a unique identifier for a dangerous good, using the United Nations Dangerous Goods Number. ID can be based on GDT: DangerousGoodsID. RegulationsCode can be a coded representation of national or international dangerous goods rules or regulations. RegulationsCode can be based on GDT: DangerousGoodsRegulationsCode.

HazardCode can be a coded representation of a hazard that is imminent in a dangerous good. HazardCode can be based on GDT: DangerousGoodsHazardCode. FlashpointMeasureInterval can be an interval of measures defined by a lower and an upper boundary indicating a flashpoint of a dangerous good. FlashpointMeasureInterval can be based on GDT: MeasureInterval, Qualifier: Flashpoint. PackagingGroupCode can be a coded representation of the effectiveness of a packaging to transport dangerous goods depending on the degree of danger of the goods. PackagingGroupCode can be based on GDT: DangerousGoodsPackagingGroupCode. EmergencySchedule can be a coded representation of an emergency schedule for dangerous goods. EmergencySchedule can identify an emergency schedule. The DangerousGoodsEmergencySchedule can be used for transports of dangerous goods by sea similar to a Transport Emergency Card which is used for transports of dangerous goods by road. EmergencySchedule can be based on GDT: DangerousGoodsEmergencySchedule. TransportEmergencyCardCode can be a coded representation of a transport emergency card which specifies how to react in case of an accident.

TransportEmergencyCardCode can be based on GDT: TransportEmergencyCardCode. DangerousGoodsLabelCode can be a coded representation of a label for a dangerous good. In some implementations, DangerousGoodsLabelCode's values are dependant on the DangerousGoodsRegulationsCode. DangerousGoodsLabelCode can be based on GDT: DangerousGoodsLabelCode. DangerousGoodsLabelCode2 can be a coded representation of a label for a dangerous good. In some implementations, DangerousGoodsLabelCode's values are dependant on the DangerousGoodsRegulationsCode. DangerousGoodsLabelCode2 can be based on GDT: DangerousGoodsLabelCode. DangerousGoodsLabelCode3 can be a coded representation of a label for a dangerous good. In some implementations, DangerousGoodsLabelCode's values are dependant on the DangerousGoodsRegulationsCode. DangerousGoodsLabelCode3 can be based on GDT: DangerousGoodsLabelCode. PackagingInstructionTypeCode can be a coded representation of a packaging instruction.

In some implementations, a packaging instruction is an instruction defining which packagings may be used to pack a dangerous good. PackagingInstructionTypeCode can be based on GDT: PackagingInstructionTypeCode. TransportMeansDescriptionCode can be a coded representation of a transport means type with which goods or persons are to be transported. TransportMeansDescriptionCode can be based on GDT: TransportMeansDescriptionCode. TransportAuthorisationCode can be a coded representation of an authorisation for the transportation of dangerous goods. This code can specify an authorisation for the transportation of a particular dangerous good. TransportAuthorisationCode can be based on GDT: DangerousGoodsTransportAuthorisationCode.

ContactInformation can specify information on a department or person to whom information regarding dangerous goods can be directed. The structure of ContactInformation includes the ContactPersonFunctionTypeCode and Address elements. ContactPersonFunctionTypeCode can be a coded representation of the type of function that a contact person has. ContactPersonFunctionTypeCode can be based on GDT: ContactPersonFunctionTypeCode. Address can be an address related to contact information defined by the corresponding FunctionTypeCode. Address can be based on GDT: Address.

TextCollection can be a group of textual information that relates to DangerousGoods. The structure of the TextCollection entity includes the TextCollection element. TextCollection can be based on GDT: TextCollection.

A number of implementations have been described. Nevertheless, it will be understood that various modifications may be made without departing from the spirit and scope of the disclosure. Accordingly, other implementations are within the scope of the following claims.

What is claimed is:

1. A computer readable medium including program code for providing a message-based interface for performing a request for supplier freight quote service, the interface exposing at least one service as defined in a service registry, wherein upon execution the program code executes in an environment of computer systems providing message-based services and comprises:

program code for receiving, from a service consumer, a first message for processing information for requesting a freight quote from a supplier, including terms and conditions of a transportation service and bidding rules of the tendering process;

program code for invoking a request for supplier freight quote business object, wherein the business object is a logically centralized, semantically disjointed object for representing information for requesting a freight quote from a supplier, including terms and conditions of a transportation service and bidding rules of the tendering process, and comprises data logically organized as:

a request for supplier freight quote root node;
a date time periods subordinate node;
a nature of cargo subordinate node;
a total quantity subordinate node;
a total amount subordinate node;
a text collection subordinate node;
a business transaction document reference subordinate node and wherein the business transaction document reference node contains a date time period subordinate node;
a governmental procedure subordinate node and wherein the governmental procedure node contains:
  a location subordinate node;
  a date time period subordinate node;
  a text collection subordinate node; and
  a transportation document information subordinate node and wherein the transportation document information node contains a date time period subordinate node;
a party subordinate node and wherein the party node contains:
  a business transaction document reference subordinate node and wherein the business transaction document reference node contains a date time period subordinate node;
a transportation stage subordinate node and wherein the transportation stage node contains:
  a contact information subordinate node;
  a quantity subordinate node;
  a party subordinate node and wherein the party node contains:
    a transportation document information subordinate node and wherein the transportation document information node contains a date time period subordinate node; and
    a business transaction document reference subordinate node and wherein the business transaction document reference node contains a date time period subordinate node;
  a location subordinate node and wherein the location node contains a date time periods subordinate node;
  a text collection subordinate node;
  a business transaction document reference subordinate node and wherein the business transaction document reference node contains a date time period subordinate node; and
  a transportation service requirement subordinate node;
a transportation unit resource information subordinate node and wherein the transportation unit resource information node contains:
  a transportation stage assignment subordinate node;
  an attached equipment subordinate node;
  a quantity subordinate node;
  a business transaction document reference subordinate node and wherein the business transaction document reference node contains a date time period subordinate node;
  a text collection subordinate node;
  a party subordinate node;
  a location subordinate node and wherein the location node contains a date time periods subordinate node; and
  a dangerous goods subordinate node and wherein the dangerous goods node contains:
    a contact information subordinate node; and
    a text collection subordinate node;
a transportation charges information subordinate node and wherein the transportation unit resource information node contains:
  a transportation charges subordinate node and wherein the transportation charges node contains:
    a location subordinate node and wherein the location node contains a date time periods subordinate node;
    a text collection subordinate node;
    a currency subordinate node;
    an exchange rate subordinate node;
    a percent element subordinate node;
    a date time period subordinate node;
    a business transaction document reference subordinate node;
    a tax detail subordinate node;
    a payment instruction subordinate node;
    a cash discount terms subordinate node; and
    an element subordinate node and wherein the element node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate detail assignment subordinate node, a calculation base subordinate node, a tax detail subordinate node, a date time period subordinate node, and a cost distribution subordinate node; and
a request for supplier shipment quote subordinate node and wherein the request for supplier shipment quote node contains:
  a transportation stage assignment subordinate node;
  a transportation unit resource information assignment subordinate node;
  a date time periods subordinate node;
  a nature of cargo subordinate node;
  a total quantity subordinate node;
  a total amount subordinate node;
  a text collection subordinate node;
  a transportation service requirement subordinate node;
  a transportation document information subordinate node and wherein the transportation document information node contains a date time period subordinate node;
  a business transaction document reference subordinate node and wherein the business transaction document reference node contains a date time period subordinate node;
  a governmental procedure subordinate node and wherein the governmental procedure node contains:
    a location subordinate node;
    a date time period subordinate node;
    a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains a contact information subordinate node and a text collection subordinate node;

a package information subordinate node and wherein the package information node contains:

an item assignment subordinate node and wherein the item assignment node contains a quantity subordinate node, a business transaction document reference subordinate node and wherein the business transaction document reference node contains a date time period subordinate node, and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains a contact information subordinate node, a quantity subordinate node, a text collection subordinate node, and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains a location subordinate node, a date time period subordinate node, a text collection subordinate node, and a transportation document information subordinate node and wherein the transportation document information node contains a date time period subordinate node;

a party subordinate node and wherein the party node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node; and program code for initiating transmission of a message transmission of a message to a heterogeneous second application, executing in the environment of computer systems providing message-based services, based on the data in the request for supplier freight quote business object, the message comprising a request for supplier freight quote request message entity, a message header package, and a request for supplier freight quote package.

2. A computer readable medium including program code for providing a message-based interface for performing a request for supplier freight quote service, the software comprising computer readable instructions embodied on tangible media, wherein upon execution the software executes in a landscape of computer systems providing message-based services and comprises:

program code for initiating transmission of a message to a heterogeneous second application, executing in the environment of computer systems providing message-based services, based on data in a request for supplier freight quote business object invoked by the second application, wherein the business object is a logically centralized, semantically disjointed object for representing information for requesting a freight quote from a supplier, including terms and conditions of a transportation service and bidding rules of the tendering process, and comprises data logically organized as:

a request for supplier freight quote root node;
a date time periods subordinate node;
a nature of cargo subordinate node;
a total quantity subordinate node;
a total amount subordinate node;
a text collection subordinate node;
a business transaction document reference subordinate node and wherein the business transaction document reference node contains a date time period subordinate node;
a governmental procedure subordinate node and wherein the governmental procedure node contains:
a location subordinate node;
a date time period subordinate node;
a text collection subordinate node; and
a transportation document information subordinate node and wherein the transportation document information node contains a date time period subordinate node;
a party subordinate node and wherein the party node contains:
a business transaction document reference subordinate node and wherein the business transaction document reference node contains a date time period subordinate node;
a transportation stage subordinate node and wherein the transportation stage node contains:
a contact information subordinate node;
a quantity subordinate node;
a party subordinate node and wherein the party node contains:
a transportation document information subordinate node and wherein the transportation document information node contains a date time period subordinate node; and
a business transaction document reference subordinate node and wherein the business transaction document reference node contains a date time period subordinate node;
a location subordinate node and wherein the location node contains a date time periods subordinate node;
a text collection subordinate node;
a business transaction document reference subordinate node and wherein the business transaction document reference node contains a date time period subordinate node; and
a transportation service requirement subordinate node;
a transportation unit resource information subordinate node and wherein the transportation unit resource information node contains:
a transportation stage assignment subordinate node;
an attached equipment subordinate node;
a quantity subordinate node;
a business transaction document reference subordinate node and wherein the business transaction document reference node contains a date time period subordinate node;
a text collection subordinate node;
a party subordinate node;
a location subordinate node and wherein the location node contains a date time periods subordinate node; and
a dangerous goods subordinate node and wherein the dangerous goods node contains:
a contact information subordinate node; and
a text collection subordinate node;
a transportation charges information subordinate node and wherein the transportation unit resource information node contains:
a transportation charges subordinate node and wherein the transportation charges node contains:
a location subordinate node and wherein the location node contains a date time periods subordinate node;
a text collection subordinate node;
a currency subordinate node;
an exchange rate subordinate node;
a percent element subordinate node;
a date time period subordinate node;
a business transaction document reference subordinate node;
a tax detail subordinate node;
a payment instruction subordinate node;
a cash discount terms subordinate node; and
an element subordinate node and wherein the element node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate detail assignment subordinate node, a calculation base subordinate node, a tax detail subordinate node, a date time period subordinate node, and a cost distribution subordinate node; and
a request for supplier shipment quote subordinate node and wherein the request for supplier shipment quote node contains:
a transportation stage assignment subordinate node;
a transportation unit resource information assignment subordinate node;
a date time periods subordinate node;
a nature of cargo subordinate node;
a total quantity subordinate node;
a total amount subordinate node;
a text collection subordinate node;
a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a location subordinate node;

a date time period subordinate node;

a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains a contact information subordinate node and a text collection subordinate node;

a package information subordinate node and wherein the package information node contains:

an item assignment subordinate node and wherein the item assignment node contains a quantity subordinate node, a business transaction document reference subordinate node and wherein the business transaction document reference node contains a date time period subordinate node, and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains a contact information subordinate node, a quantity subordinate node, a text collection subordinate node, and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains a location subordinate node, a date time period subordinate node, a text collection subordinate node, and a transportation document information subordinate node and wherein the transportation document information node contains a date time period subordinate node;

a party subordinate node and wherein the party node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node; and and the message comprising a request for supplier freight quote request message entity, a message header package, and a request for supplier freight quote package; and program code for receiving a second message from the second application, the second message associated with the invoked request for supplier freight quote business object and in response to the first message.

3. A distributed system operating in a landscape of computer systems providing message-based services, the system processing business objects involving a request for supplier freight quote and comprising:

memory storing a business object repository storing a plurality of business objects; wherein each business object is a logically centralized, semantically disjointed object and at least one of the business objects is for representing information for requesting a freight quote from a supplier and comprises data logically organized as:

a request for supplier freight quote root node;

a date time periods subordinate node;

a nature of cargo subordinate node;

a total quantity subordinate node;

a total amount subordinate node;

a text collection subordinate node;

a business transaction document reference subordinate node and wherein the business transaction document reference node contains a date time period subordinate node;

a governmental procedure subordinate node and wherein the governmental procedure node contains:

a location subordinate node;

a date time period subordinate node;

a text collection subordinate node; and a transportation document information subordinate node and wherein the transportation document information node contains a date time period subordinate node;

a party subordinate node and wherein the party node contains:

a business transaction document reference subordinate node and wherein the business transaction document reference node contains a date time period subordinate node;

a transportation stage subordinate node and wherein the transportation stage node contains:

a contact information subordinate node;

a quantity subordinate node;

a party subordinate node and wherein the party node contains:

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a text collection subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a business transaction document reference subordinate node and wherein the business transaction document reference node contains a date time period subordinate node;

a text collection subordinate node;

a party subordinate node;

a location subordinate node and wherein the location node contains a date time periods subordinate node; and a dangerous goods subordinate node and wherein the dangerous goods node contains:

a contact information subordinate node; and a text collection subordinate node;

a transportation charges information subordinate node and wherein the transportation unit resource information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;

a payment instruction subordinate node;

a cash discount terms subordinate node; and an element subordinate node and wherein the element node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate detail assignment subordinate node, a calculation base subordinate node, a tax detail subordinate node, a date time period subordinate node, and a cost distribution subordinate node; and a request for supplier shipment quote subordinate node and wherein the request for supplier shipment quote node contains:

a transportation stage assignment subordinate node;

a transportation unit resource information assignment subordinate node;

a date time periods subordinate node;

a nature of cargo subordinate node;

a total quantity subordinate node;

a total amount subordinate node;

a text collection subordinate node;
a transportation service requirement subordinate node;
a transportation document information subordinate node and wherein the transportation document information node contains a date time period subordinate node;
a business transaction document reference subordinate node and wherein the business transaction document reference node contains a date time period subordinate node;
a governmental procedure subordinate node and wherein the governmental procedure node contains:
a location subordinate node;
a date time period subordinate node;
a text collection subordinate node; and
a transportation document information subordinate node and wherein the transportation document information node contains a date time period subordinate node;
a party subordinate node and wherein the party node contains:
an amount subordinate node;
a date time periods subordinate node;
a transportation document information subordinate node and wherein the transportation document information node contains a date time period subordinate node; and
a business transaction document reference subordinate node and wherein the business transaction document reference node contains a date time period subordinate node;
a location subordinate node and wherein the location node contains a date time periods subordinate node;
a transportation stage subordinate node and wherein the transportation stage node contains:
a location subordinate node and wherein the location node contains a date time periods subordinate node;
a business transaction document reference subordinate node and wherein the business transaction document reference node contains a date time period subordinate node; and
a transportation service requirement subordinate node;
a transportation unit resource information subordinate node and wherein the transportation unit resource information node contains:
a transportation stage assignment subordinate node;
an attached equipment subordinate node;
a quantity subordinate node;
a business transaction document reference subordinate node and wherein the business transaction document reference node contains a date time period subordinate node;
a text collection subordinate node;
a location subordinate node and wherein the location node contains a date time periods subordinate node; and
a dangerous goods subordinate node and wherein the dangerous goods node contains a contact information subordinate node and a text collection subordinate node;
a package information subordinate node and wherein the package information node contains:
an item assignment subordinate node and wherein the item assignment node contains a quantity subordinate node, a business transaction document reference subordinate node and wherein the business transaction document reference node contains a date time period subordinate node, and a transportation goods identification subordinate node;
a transportation unit resource information assignment subordinate node and wherein the transportation unit resource information assignment node contains a quantity subordinate node;
a quantity subordinate node; and
a text collection subordinate node;
an item subordinate node and wherein the item node contains:
an amount subordinate node;
a text collection subordinate node;
a nature of cargo subordinate node;
a quantity subordinate node;
a transportation document information subordinate node and wherein the transportation document information node contains a date time period subordinate node;
a business transaction document reference subordinate node and wherein the business transaction document reference node contains a date time period subordinate node;
a dangerous goods subordinate node and wherein the dangerous goods node contains a contact information subordinate node, a quantity subordinate node, a text collection subordinate node, and a transportation unit resource information assignment subordinate node and wherein the transportation unit resource information assignment node contains a quantity subordinate node;
a transportation stage assignment subordinate node and wherein the transportation stage assignment node contains a quantity subordinate node;
a transportation unit resource information assignment subordinate node and wherein the transportation unit resource information assignment node contains a quantity subordinate node;
a governmental procedure subordinate node and wherein the governmental procedure node contains a location subordinate node, a date time period subordinate node, a text collection subordinate node, and a transportation document information subordinate node and wherein the transportation document information node contains a date time period subordinate node;
a party subordinate node and wherein the party node contains a date time periods subordinate node;
a location subordinate node and wherein the location node contains a date time periods subordinate node;
a product information subordinate node; and
a transportation goods identification subordinate node; and
a transportation charges information subordinate node and wherein the transportation charges information node contains:
a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node; and a graphical user interface remote from the memory for presenting data associated with an invoked instance of the request for supplier freight quote business object, the interface comprising computer readable instructions embodied on tangible media.

4. A computer readable medium including program code for providing a message-based interface for performing a supplier freight quote service, the interface exposing at least one service as defined in a service registry, wherein upon execution the program code executes in an environment of computer systems providing message-based services and comprises:

program code for receiving, from a service consumer, a first message for processing information for transportation services tendered between transportation service providers, including quoted services in response to a request for a supplier freight quote;

program code for invoking a supplier freight quote business object, wherein the business object is a logically centralized, semantically disjointed object for representing information for transportation services tendered between transportation service providers, including quoted services in response to a request for a supplier freight quote, and comprises data logically organized as:

a supplier freight quote root node;

a date time periods subordinate node;

a nature of cargo subordinate node;

a total quantity subordinate node;

a total amount subordinate node;

a text collection subordinate node;

a business transaction document reference subordinate node and wherein the business transaction document reference node contains:

a date time period subordinate node; and a request for supplier freight quote acceptance status subordinate node;

a governmental procedure subordinate node and wherein the governmental procedure node contains:

a location subordinate node;

a date time period subordinate node;

a text collection subordinate node; and a transportation document information subordinate node and wherein the transportation document information node contains a date time period subordinate node;

a party subordinate node and wherein the party node contains:

a business transaction document reference subordinate node and wherein the business transaction document reference node contains a date time period subordinate node;

a transportation stage subordinate node and wherein the transportation stage node contains:

a contact information subordinate node;

a quantity subordinate node;

a party subordinate node and wherein the party node contains:

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains: a date time periods subordinate node;

a text collection subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a business transaction document reference subordinate node and wherein the business transaction document reference node contains a date time period subordinate node;

a text collection subordinate node;

a party subordinate node;

a location subordinate node and wherein the location node contains a date time periods subordinate node; and a dangerous goods subordinate node and wherein the dangerous goods node contains:

a contact information subordinate node; and a text collection subordinate node;

a transportation charges information subordinate node and wherein the transportation charges information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;

a payment instruction subordinate node;

a cash discount terms subordinate node; and an element subordinate node and wherein the element node contains, a location subordinate node and wherein the location node contains a date time periods subordinate node, a text collection subordinate node, a currency subordinate node, a rate element subordinate node, a percent element subordinate node, an amount element subordinate node and wherein the amount element node contains a rate detail assignment subordinate node, a calculation base subordinate node, a tax detail subordinate node, a date time period subordinate node, and a cost distribution subordinate node; and a supplier shipment quote subordinate node and wherein the supplier shipment quote node contains:

a transportation stage assignment subordinate node;

a transportation unit resource information assignment subordinate node;

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a location subordinate node;

a date time period subordinate node;

a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains a contact information subordinate node and a text collection subordinate node;

a package information subordinate node and wherein the package information node contains:

an item assignment subordinate node and wherein the item assignment node contains a quantity subordinate node, a business transaction document reference subordinate node and wherein the business transaction document reference node contains a date time period subordinate node; and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains a contact information subordinate node, a quantity subordinate node, a text collection subordinate node, and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains a location subordinate node, a date time period subordinate node, a text collection subordinate node, and a transportation document information subordinate node and wherein the transportation document information node contains a date time period subordinate node;

a party subordinate node and wherein the party node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node; and program code for initiating transmission of a message transmission of a message to a heterogeneous second application, executing in the environment of computer systems providing message-based services, based on the data in the supplier freight quote business object, the message comprising a supplier freight quote request message entity, a message header package, and a supplier freight quote package.

5. A computer readable medium including program code for providing a message-based interface for performing a supplier freight quote service, the software comprising computer readable instructions embodied on tangible media, wherein upon execution the software executes in a landscape of computer systems providing message-based services and comprises:

program code for initiating transmission of a message to a heterogeneous second application, executing in the environment of computer systems providing message-based services, based on data in a supplier freight quote business object invoked by the second application, wherein the business object is a logically centralized, semantically disjointed object for representing information for transportation services tendered between transportation service providers, including quoted services in response to a request for a supplier freight quote and comprises data logically organized as:

a supplier freight quote root node;

a date time periods subordinate node;

a nature of cargo subordinate node;

a total quantity subordinate node;

a total amount subordinate node;

a text collection subordinate node;

a business transaction document reference subordinate node and wherein the business transaction document reference node contains:

a date time period subordinate node; and a request for supplier freight quote acceptance status subordinate node;

a governmental procedure subordinate node and wherein the governmental procedure node contains:

a location subordinate node;

a date time period subordinate node;

a text collection subordinate node; and a transportation document information subordinate node and wherein the transportation document information node contains a date time period subordinate node;

a party subordinate node and wherein the party node contains:

a business transaction document reference subordinate node and wherein the business transaction document reference node contains a date time period subordinate node;

a transportation stage subordinate node and wherein the transportation stage node contains:

a contact information subordinate node;

a quantity subordinate node;

a party subordinate node and wherein the party node contains:

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains: a date time periods subordinate node;

a text collection subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a business transaction document reference subordinate node and wherein the business transaction document reference node contains a date time period subordinate node;

a text collection subordinate node;

a party subordinate node;

a location subordinate node and wherein the location node contains a date time periods subordinate node; and a dangerous goods subordinate node and wherein the dangerous goods node contains:

a contact information subordinate node; and a text collection subordinate node;

a transportation charges information subordinate node and wherein the transportation charges information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;
a payment instruction subordinate node;
a cash discount terms subordinate node; and
an element subordinate node and wherein the element node contains, a location subordinate node and wherein the location node contains a date time periods subordinate node, a text collection subordinate node, a currency subordinate node, a rate element subordinate node, a percent element subordinate node, an amount element subordinate node and wherein the amount element node contains a rate detail assignment subordinate node, a calculation base subordinate node, a tax detail subordinate node, a date time period subordinate node, and a cost distribution subordinate node; and
a supplier shipment quote subordinate node and wherein the supplier shipment quote node contains:
a transportation stage assignment subordinate node;
a transportation unit resource information assignment subordinate node;
a date time periods subordinate node;
a nature of cargo subordinate node;
a total quantity subordinate node;
a total amount subordinate node;
a text collection subordinate node;
a transportation service requirement subordinate node;
a transportation document information subordinate node and wherein the transportation document information node contains a date time period subordinate node;
a business transaction document reference subordinate node and wherein the business transaction document reference node contains a date time period subordinate node;
a governmental procedure subordinate node and wherein the governmental procedure node contains:
a location subordinate node;
a date time period subordinate node;
a text collection subordinate node; and
a transportation document information subordinate node and wherein the transportation document information node contains a date time period subordinate node;
a party subordinate node and wherein the party node contains:
an amount subordinate node;
a date time periods subordinate node;
a transportation document information subordinate node and wherein the transportation document information node contains a date time period subordinate node; and
a business transaction document reference subordinate node and wherein the business transaction document reference node contains a date time period subordinate node;
a location subordinate node and wherein the location node contains a date time periods subordinate node;
a transportation stage subordinate node and wherein the transportation stage node contains:
a location subordinate node and wherein the location node contains a date time periods subordinate node;
a business transaction document reference subordinate node and wherein the business transaction document reference node contains a date time period subordinate node; and
a transportation service requirement subordinate node;
a transportation unit resource information subordinate node and wherein the transportation unit resource information node contains:
a transportation stage assignment subordinate node;
an attached equipment subordinate node;
a quantity subordinate node;
a business transaction document reference subordinate node and wherein the business transaction document reference node contains a date time period subordinate node;
a text collection subordinate node;
a location subordinate node and wherein the location node contains a date time periods subordinate node; and
a dangerous goods subordinate node and wherein the dangerous goods node contains a contact information subordinate node and a text collection subordinate node;
a package information subordinate node and wherein the package information node contains:
an item assignment subordinate node and wherein the item assignment node contains a quantity subordinate node, a business transaction document reference subordinate node and wherein the business transaction document reference node contains a date time period subordinate node; and a transportation goods identification subordinate node;
a transportation unit resource information assignment subordinate node and wherein the transportation unit resource information assignment node contains a quantity subordinate node;
a quantity subordinate node; and
a text collection subordinate node;
an item subordinate node and wherein the item node contains:
an amount subordinate node;
a text collection subordinate node;
a nature of cargo subordinate node;
a quantity subordinate node;
a transportation document information subordinate node and wherein the transportation document information node contains a date time period subordinate node;
a business transaction document reference subordinate node and wherein the business transaction document reference node contains a date time period subordinate node;
a dangerous goods subordinate node and wherein the dangerous goods node contains a contact information subordinate node, a quantity subordinate node, a text collection subordinate node, and a transportation unit resource information assignment subordinate node and wherein the transportation unit resource information assignment node contains a quantity subordinate node;
a transportation stage assignment subordinate node and wherein the transportation stage assignment node contains a quantity subordinate node;
a transportation unit resource information assignment subordinate node and wherein the transportation unit resource information assignment node contains a quantity subordinate node;
a governmental procedure subordinate node and wherein the governmental procedure node contains a location subordinate node, a date time period subordinate node, a text collection subordinate node, and a transportation document information subordinate node and wherein the transportation document information node contains a date time period subordinate node;

a party subordinate node and wherein the party node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node; and and the message comprising a supplier freight quote request message entity, a message header package, and a supplier freight quote package; and program code for receiving a second message from the second application, the second message associated with the invoked supplier freight quote business object and in response to the first message.

6. A distributed system operating in a landscape of computer systems providing message-based services, the system processing business objects involving a supplier freight quote and comprising:

memory storing a business object repository storing a plurality of business objects; wherein each business object is a logically centralized, semantically disjointed object and at least one of the business objects is for representing information for transportation services tendered between transportation service providers, including quoted services in response to a request for a supplier freight quote and comprises data logically organized as:

a supplier freight quote root node;

a date time periods subordinate node;

a nature of cargo subordinate node;

a total quantity subordinate node;

a total amount subordinate node;

a text collection subordinate node;

a business transaction document reference subordinate node and wherein the business transaction document reference node contains:

a date time period subordinate node; and a request for supplier freight quote acceptance status subordinate node;

a governmental procedure subordinate node and wherein the governmental procedure node contains:

a location subordinate node;

a date time period subordinate node;

a text collection subordinate node; and a transportation document information subordinate node and wherein the transportation document information node contains a date time period subordinate node;

a party subordinate node and wherein the party node contains:

a business transaction document reference subordinate node and wherein the business transaction document reference node contains a date time period subordinate node;

a transportation stage subordinate node and wherein the transportation stage node contains:

a contact information subordinate node;

a quantity subordinate node;

a party subordinate node and wherein the party node contains:

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains: a date time periods subordinate node;

a text collection subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a business transaction document reference subordinate node and wherein the business transaction document reference node contains a date time period subordinate node;

a text collection subordinate node;

a party subordinate node;

a location subordinate node and wherein the location node contains a date time periods subordinate node; and a dangerous goods subordinate node and wherein the dangerous goods node contains:

a contact information subordinate node; and a text collection subordinate node;

a transportation charges information subordinate node and wherein the transportation charges information node contains:

a transportation charges subordinate node and wherein the transportation charges node contains:

a location subordinate node and wherein the location node contains a date time periods subordinate node;

a text collection subordinate node;

a currency subordinate node;

an exchange rate subordinate node;

a percent element subordinate node;

a date time period subordinate node;

a business transaction document reference subordinate node;

a tax detail subordinate node;

a payment instruction subordinate node;

a cash discount terms subordinate node; and an element subordinate node and wherein the element node contains, a location subordinate node and wherein the location node contains a date time periods subordinate node, a text collection subordinate node, a currency subordinate node, a rate element subordinate node, a percent element subordinate node, an amount element subordinate node and wherein the amount element node contains a rate detail assignment subordinate node, a calculation base subordinate node, a tax detail subordinate node, a date time period subordinate node, and a cost distribution subordinate node; and a supplier shipment quote subordinate node and wherein the supplier shipment quote node contains:

a transportation stage assignment subordinate node;

a transportation unit resource information assignment subordinate node;

a date time periods subordinate node;

a nature of cargo subordinate node;

a total quantity subordinate node;

a total amount subordinate node;

a text collection subordinate node;

a transportation service requirement subordinate node;

a transportation document information subordinate node and wherein the transportation document information node contains a date time period subordinate node;

a business transaction document reference subordinate node and wherein the business transaction document reference node contains a date time period subordinate node;

a governmental procedure subordinate node and wherein the governmental procedure node contains:

a location subordinate node;

a date time period subordinate node;

a text collection subordinate node; and a transportation document information subordinate node and wherein the transportation document information node contains a date time period subordinate node;

a party subordinate node and wherein the party node contains:

an amount subordinate node;

a date time periods subordinate node;

a transportation document information subordinate node and wherein the transportation document information node contains a date time period subordinate node; and a business transaction document reference subordinate node and wherein the business transaction document reference node contains a date time period subordinate node;

a location subordinate node and wherein the location node contains a date time periods subordinate node;

a transportation stage subordinate node and wherein the transportation stage node contains:

a location subordinate node and wherein the location node contains a date time periods subordinate node;

a business transaction document reference subordinate node and wherein the business transaction document reference node contains a date time period subordinate node; and a transportation service requirement subordinate node;

a transportation unit resource information subordinate node and wherein the transportation unit resource information node contains:

a transportation stage assignment subordinate node;

an attached equipment subordinate node;

a quantity subordinate node;

a business transaction document reference subordinate node and wherein the business transaction document reference node contains a date time period subordinate node;

a text collection subordinate node;

a location subordinate node and wherein the location node contains a date time periods subordinate node; and a dangerous goods subordinate node and wherein the dangerous goods node contains a contact information subordinate node and a text collection subordinate node;

a package information subordinate node and wherein the package information node contains:

an item assignment subordinate node and wherein the item assignment node contains a quantity subordinate node, a business transaction document reference subordinate node and wherein the business transaction document reference node contains a date time period subordinate node; and a transportation goods identification subordinate node;

a transportation unit resource information assignment subordinate node and wherein the transportation unit resource information assignment node contains a quantity subordinate node;

a quantity subordinate node; and a text collection subordinate node;

an item subordinate node and wherein the item node contains:

an amount subordinate node;

a text collection subordinate node;

a nature of cargo subordinate node;

a quantity subordinate node;

a transportation document information subordinate node and wherein the transportation document information node contains a date time period subordinate node;

a business transaction document reference subordinate node and wherein the business transaction document reference node contains a date time period subordinate node;

a dangerous goods subordinate node and wherein the dangerous goods node contains a contact information subordinate node, a quantity subordinate node, a text collection subordinate node, and a transportation unit resource information assignment subordinate node and wherein the transportation unit resource information assignment node contains a quantity subordinate node;

a transportation stage assignment subordinate node and wherein the transportation stage assignment node contains a quantity subordinate node;

a transportation unit resource information assignment subordinate node and wherein the transportation unit resource information assignment node contains a quantity subordinate node;

a governmental procedure subordinate node and wherein the governmental procedure node contains a location subordinate node, a date time period subordinate node, a text collection subordinate node, and a transportation document information subordinate node and wherein the transportation document information node contains a date time period subordinate node;

a party subordinate node and wherein the party node contains a date time periods subordinate node;

a location subordinate node and wherein the location node contains a date time periods subordinate node;

a product information subordinate node; and a transportation goods identification subordinate node; and a transportation charges information subordinate node and wherein the transportation charges information node contains:

a transportation charges subordinate node and wherein the transportation charges node contains a location subordinate node and wherein the location node contains a date time periods subordinate node, a text collection subordinate node, a currency subordinate node, an exchange rate subordinate node, a percent element subordinate node, a date time period subordinate node, a business transaction document reference subordinate node, a tax detail subordinate node, a payment instruction subordinate node, a cash discount terms subordinate node, and an element subordinate node; and a graphical user interface remote from the memory for presenting data associated with an invoked instance of the supplier freight quote business object, the interface comprising computer readable instructions embodied on tangible media.

7. The program code of claim 1, wherein the element node of the transportation charges node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate element assignment subordinate node, a calculation base subordinate node, a tax detail subordinate node, a date time period subordinate node, and a cost distribution subordinate node.

8. The program code of claim 4, wherein the element node of the transportation charges node contains a location subordinate node and wherein the location node contains a date time periods subordinate node, a text collection subordinate node, a currency subordinate node, a rate element subordinate node, a percent element subordinate node, an amount element subordinate node and wherein the amount element node contains a rate element assignment subordinate node, a calculation base subordinate node, a tax detail subordinate node, a date time period subordinate node, and a cost distribution subordinate node.

* * * * *